US011452032B2

(12) United States Patent
Gupta et al.

(10) Patent No.: US 11,452,032 B2
(45) Date of Patent: Sep. 20, 2022

(54) METHODS AND DEVICES FOR RADIO COMMUNICATIONS

(71) Applicant: Intel Corporation, Santa Clara, CA (US)

(72) Inventors: Ajay Gupta, Portland, OR (US); Reinhold Schneider, Veitsbronn (DE)

(73) Assignee: Intel Corporation, Santa Clara, CA (US)

(*) Notice: Subject to any disclaimer, the term of this patent is extended or adjusted under 35 U.S.C. 154(b) by 30 days.

(21) Appl. No.: 16/804,038

(22) Filed: Feb. 28, 2020

(65) Prior Publication Data

US 2020/0205062 A1 Jun. 25, 2020

Related U.S. Application Data

(63) Continuation of application No. 16/455,793, filed on Jun. 28, 2019, which is a continuation of application No. PCT/US2017/067466, filed on Dec. 20, 2017.

(Continued)

(51) Int. Cl.

*H04W 48/16* (2009.01)
*H04W 4/029* (2018.01)

(Continued)

(52) U.S. Cl.

CPC ........... *H04W 48/16* (2013.01); *H04W 4/029* (2018.02); *H04W 24/08* (2013.01); *H04W 48/10* (2013.01);

(Continued)

(58) Field of Classification Search

CPC ............... H04W 48/10; H04W 92/045; H04W 52/0261; H04W 52/0264; H04W 24/08; H04W 48/16; H04W 68/005; H04W 4/029

See application file for complete search history.

(56) References Cited

U.S. PATENT DOCUMENTS

| | | | | |
|---|---|---|---|---|
| 6,823,516 | B1 | 11/2004 | Cooper | |
| 8,363,622 | B1 * | 1/2013 | Oroskar | ................ H04W 36/18 370/332 |

(Continued)

FOREIGN PATENT DOCUMENTS

| | | | |
|---|---|---|---|
| CN | 1887023 | A | 12/2006 |
| CN | 102968139 | A | 3/2013 |
| WO | 2007145625 | A1 | 12/2007 |

OTHER PUBLICATIONS

Pyun, S.-Y. et al.; "Resource Allocation for Vehicle-to-Infrastructure Communication Using Directional Transmission"; Oct. 26, 2015; pp. 1183-1188; IEEE Transactions on Intelligent Transportation Systems, vol. 17, No. 4.

(Continued)

*Primary Examiner* — Syed Ali

(74) *Attorney, Agent, or Firm* — Viering, Jentschura & Partner mbB

(57) ABSTRACT

A circuit arrangement includes a preprocessing circuit configured to obtain context information related to a user location, a learning circuit configured to determine a predicted user movement based on context information related to a user location to obtain a predicted route and to determine predicted radio conditions along the predicted route, and a decision circuit configured to, based on the predicted radio conditions, identify one or more first areas expected to have a first type of radio conditions and one or more second areas expected to have a second type of radio conditions different from the first type of radio conditions and to control radio activity while traveling on the predicted route according to the one or more first areas and the one or more second areas.

9 Claims, 278 Drawing Sheets

Related U.S. Application Data

(60) Provisional application No. 62/440,501, filed on Dec. 30, 2016.

(51) Int. Cl.
*H04W 24/08* (2009.01)
*H04W 48/10* (2009.01)
*H04W 68/00* (2009.01)
*H04W 92/04* (2009.01)

(52) U.S. Cl.
CPC ....... *H04W 68/005* (2013.01); *H04W 92/045* (2013.01)

(56) References Cited

U.S. PATENT DOCUMENTS

| | | | | |
|---|---|---|---|---|
| 9,295,092 | B2 | 3/2016 | Kaur et al. | |
| 9,491,702 | B2 | 11/2016 | Dai | |
| 10,170,908 | B1 * | 1/2019 | Catalano | H02J 7/00 |
| 10,317,983 | B2 * | 6/2019 | Obie | G06F 1/266 |
| 2004/0085909 | A1 | 5/2004 | Soliman | |
| 2007/0275730 | A1 | 11/2007 | Bienas et al. | |
| 2008/0057894 | A1 * | 3/2008 | Aleksic | H04W 52/0258 455/187.1 |
| 2009/0210741 | A1 | 8/2009 | Yamaoka | |
| 2009/0289601 | A1 * | 11/2009 | Kanade | H04W 52/0277 320/135 |
| 2010/0178900 | A1 * | 7/2010 | Cheng | G06F 1/3203 455/414.1 |
| 2010/0313203 | A1 | 12/2010 | Dawson et al. | |
| 2012/0108224 | A1 * | 5/2012 | Cheng | H04W 52/0277 455/418 |
| 2013/0027115 | A1 | 1/2013 | Park et al. | |
| 2014/0177496 | A1 | 6/2014 | Backholm et al. | |
| 2015/0038156 | A1 | 2/2015 | Kilpatrick, II et al. | |
| 2015/0153810 | A1 * | 6/2015 | Sasidharan | G06F 1/329 713/320 |
| 2015/0222708 | A1 | 8/2015 | Addepalli et al. | |
| 2015/0281303 | A1 | 10/2015 | Yousef et al. | |
| 2016/0037379 | A1 | 2/2016 | Shafiee et al. | |
| 2017/0262039 | A1 * | 9/2017 | Das | H04L 67/1074 |
| 2017/0358940 | A1 * | 12/2017 | Parikh | G01R 31/3842 |
| 2018/0084504 | A1 * | 3/2018 | Lindoff | H04W 8/183 |

OTHER PUBLICATIONS

Iwamura, M. et al.; "Relay Technology in LTE-Advanced"; NTT DoCoMo Technical Journal, 2012; pp. 29-36, vol. 12, Nr. 2; retrieved from https://chenweixiang.github.io/docs/Relay_Technology_in_LTE-Advanced_DoCoMo_Report_Vol12_2_029en.pdf.
Raychaudhuri, D.; "5G Network Architecture and the Future Mobile Internet"; May 26, 2015; 30 pages; IEEE 5G Workshop; Princeton (http://www.winlab.rutgers.edu/documents/IEEE_5G_talk_5.15.pdf).
Ahlgren, B. et al.; "A Survey of Information-Centric Networking"; Jul. 2012; pp. 26-36; IEEE Communications Magazine.
Latha, P.V. et al.; "Device to Device Communication in LTE"; Jun. 14, 2016; 15 pages; retrieved from https://www.sasken.com/sites/default/files/Sasken_Whitepaper_Device_to_Device_LTE_Communication.pdf.
Roessler A. et al.; "LTE-Advanced (3GPP Rel.12) Technology Introduction White Paper"; Jun. 2014; 54 pages; retrieved from http://www.rohde-schwarz-usa.com/rs/324-UVH-477/images/1MA252_WP_LTE_Rel12_1E.pdf.
Freescale Semiconductor, Inc.; "Modular AdvancedMC™ Platform for Broadband/LTE Base Stations"; 2007; 8 pages; retrieved from http://cache.freescale.com/files/32bit/doc/fact_sheet/LTEWIMAXFS.pdf.
Fodor, G.; "D2D communication pushes the boundaries of future telecom systems"; Sep. 15, 2016; 6 pages; retrieved from https://www.ericsson.com/en/blog/2016/9/d2d-communication-pushes-the-boundaries-of-future-telecom-systems.
Wu, S.; "Application of D2D in 5G Networks"; May 6, 2015; 8 pages; retrieved from https://www.zte.com.cn/global/about/magazine/zte-technologies/2015/3/en_684/433771.
Qualcomm Technologies, Inc.; "LTE Direct Always-on Device-to-Device Proximal Discovery"; Aug. 2014; 13 pages; retrieved from https://www.qualcomm.com/media/documents/files/lte-direct-always-on-device-to-device-proximal-discovery.pdf.
Wallen, J.; "How to stop Android data from being gobbled up in the background"; Mar. 25, 2015; 9 pages; retrieved from https://www.techrepublic.com/article/pro-tip-stop-android-data-from-being-gobbled-up-in-the-background/.
Recomhub; "How to Turn OFF Background Apps on Galaxy J5"; Oct. 11, 2016; 5 pages; retrieved from https://www.techjunkie.com/how-to-turn-off-background-apps-on-galaxy-j5/.
Ling, J. et al.; "Enhanced capacity & coverage by Wi-Fi LTE Integration"; Jun. 2014; 6 pages; retrieved from https://arxiv.org/ftp/arxiv/papers/1406/1406.3147.pdf.
Lusky, I. et al.; "Adaptive Algorithms for Choosing Transmission Parameters in Dynamic Channel Conditions"; Sep. 2002; 9 pages; IEEE 14th International Conference on Digital Signal Processing Proceedings, DSP 2002.
Cisco Systems Inc.; "CPS Mobile Configuration Guide, Release 12.1.0 (1)"; 36 pages; Apr. 26, 2018; retrieved from https://www.cisco.com/c/en/us/td/docs/wireless/quantum-policy-suite/R10-0-0/bk_100Mobile_Config_Guide/bk_Mobile_Config_Guide_chapter_01001.pdf.
Ping, F.; "Dynamic Resource Allocation"; ICT Insights, 2015; 8 pages, Issue 16; Huawei Publications, Huawei Technologies Co., Ltd.; retrieved from https://e.huawei.com/in/publications/global/ict_insights/201512291113/Features/201512301002.
"Free Basics by Facebook"; 2 pages; retrieved on Mar. 21, 2018 from https://info.internet.org/en/story/free-basics-from-internet-org/.
Ali, K.; "Introducing OpenCellular: An open source wireless access platform"; Jul. 6, 2016; 8 pages; retrieved from https://code.facebook.com/posts/1754757044806180/introducing-opencellular-an-open-source-wireless-access-platform/.
Ali, K.; "OpenCellular—Wireless Access Platform Design"; 4 pages; retrieved on Mar. 21, 2018 from https://telecominfraproject.com/opencellular-wireless-access-platform-design/.
Nava, E.; "Google Cloud Messaging is Extremely Unreliable for Push Notifications"; Dec. 4, 2014; 16 pages; retrieved from https://eladnava.com/google-cloud-messaging-extremely-unreliable/.
"Push notifications delayed, Hearbeat Interval not reliable"; Mar. 12, 2014; 25 pages; Nexus Help Forum; retrieved from https://productforums.google.com/forum/#!topic/nexus/fslYqYrULto.
"IBM and Cisco Team to Offer Crisis Management Services"; Mar. 20, 2007; 3 pages; IBM News room; retrieved from https://www-03.ibm.com/press/us/en/pressrelease/21263.wss.
"Disaster Relief Depends Upon Reliable Communications"; 2016; 1 page; Knight Sky, LLC; retrieved from www.knight-sky.com/hurricanesandy.html.
Richards, C.; "When Communications Infrastructure Fails During a Disaster"; Nov. 12, 2015; 7 pages; retrieved from https://www.drj.com/articles/online-exclusive/when-communications-infrastructure-fails-during-a-disaster.html.
Cisco Systems Inc.; "Cisco Network Emergency Response Vehicle: Enabling IP-Based Incident Management"; Oct. 2010; 7 pages; retrieved from https://www.cisco.com/c/dam/en_us/about/doing_business/business_continuity/whitepaper_NERV.pdf.
Lending, J.; "11 Tips to Boost Your Android Phone's Battery Life"; May 1, 2014; 7 pages; retrieved on Mar. 21, 2018 from https://www.pcmag.com/article2/0,2817,2367542,00.asp.
Sliwa, B. et al.; "B.A.T.Mobile: Leveraging Mobility Control Knowledge for Efficient Routing in Mobile Robotic Networks"; 2016; 6 pages; 2016 IEEE Globecom Workshops (GC Wkshps).
Ding, N. et al.; "Characterizing and Modeling the Impact of Wireless Signal Strength on Smartphone Battery Drain"; Jun. 2013; 12 pages; ACM Sigmetrics Performance Evaluation Review.
Zhu, J.; "Indoor/Outdoor Location of Cellular Handsets Based on Received Signal Strength"; Aug. 2006; 140 pages; Georgia Institute

(56) References Cited

OTHER PUBLICATIONS of technology; retrieved from https://smartech.gatech.edu/bitstream/handle/1853/11489/Zhu_Jian_200608_phd.pdf.
Shaikh, F. S.; "Intelligent Proactive Handover and QoS Management using TBVH in Heterogeneous Networks"; Jan. 2010; 243 pages; School of Engineering and Information Sciences, Hendon, UK; retrieved from http://citeseerx.ist.psu.edu/viewdoc/download?doi=10.1.1.456.5112&rep=rep1&type=pdf.
Apple Inc.; "Maximizing Battery Life and Lifespan"; 10 pages; retrieved Mar. 21, 2018 from http://www.apple.com/ae/batteries/maximizing-performance/.
Schulman, A. et al.; "Bartendr: A Practical Approach to Energy-aware Cellular Data Scheduling"; 12 pages; Sep. 2010; ACM MobiCom '10, USA.
Xilinx; "3GPP RACH Preamble Detector v1.0"; Aug. 8, 2007; 22 pages; retrieved from https://www.xilinx.com/support/documentation/ip_documentation/rach_3gpp_ds629.pdf.
Bosch; "Electronic driver assistance system for trams"; May 3, 2016; 8 pages; retrieved from https://www.bosch-presse.de/pressportal/de/en/electronic-driver-assistance-system-for-trams-44870.html.
Bosch; "Forward collision warning system for light rail vehicles"; Sep. 18, 2014; 7 pages; retrieved form https://www.bosch-presse.de/pressportal/de/en/forward-collision-warning-system-for-light-rail-vehicles-42704.html.
ETSI; "LTE; Evolved Universal Terrestrial Radio Access (E-UTRA); Radio Resource Control (RRC); Protocol specification (3GPP TS 36.331 version 13.0.0 Release 13)"; Jan. 2016; 670 pages; retrieved from https://www.etsi.org/deliver/etsi_ts/136300_136399/136331/13.00.00_60/ts_136331v130000p.pdf.
LTE; "LTE UE Capability Configuration for DRX"; Aug. 25, 2016; 2 pages; retrieved from know-lte.blogspot.com/2016/08/lte-ue-capability-configuration-for-drx.html.
Kuo, Y.-W. et al.; "Power Saving Scheduling Scheme for Internet of Things over LTE/LTE-Advanced Networks"; Oct. 1, 2015; 10 pages; retrieved from https://www.hindawi.com/journals/misy/2015/971538/#B2.
Li, S. et al.; "Coded MapReduce"; Dec. 5, 2015; 16 pages; 53rd Annual Allerton Conference on Communication, Control, and Computing (Allerton).
Michael, N. et al.; "Cooperative Manipulation and Transportation with Aerial Robots"; Jan. 2011; 8 pages, vol. 30, Issue 1; Springer Press Autonomous Robots.
Li, Q. et al.; "End-to-end Network Slicing in 5G Wireless Communication Systems"; Jan. 27, 2016; 4 pages; ETSI Workshop on future Radio Technologies—Air Interfaces, France.
Li, S. et al.; "A Scalable Framework for Wireless Distributed Computing"; 2016; 9 pages; 29th Conference on Neural Information Processing Systems, Barcelona, Spain.
Van Rijmenam, M.; "Self-driving Cars Will Create 2 Petabytes of Data, What Are the Big Data Opportunities for the Car Industry?"; 2018; 7 pages; retrieved from https://datafloq.com/read/self-driving-cars-create-2-petabytes-data-annually/172.
LTE; 3rd Generation Partnership Project; Technical Specification Group Services and System Aspects; Study on architecture enhancements for LTE support of V2X services, Release 14, (3GPP TR 23.785 V14.0.0); Sep. 2016; 52 pages; retrieved from http://www.3gpp.org/DynaReport/23785.htm.
Karakus, C. et al.; "Enhancing Multiuser MIMO Through Opportunistic D2D Cooperation"; Jun. 7, 2017; pp. 1-47, vol. 16, Issue 9; IEEE Transactions on Wireless Communications.
Qualcomm Technologies Inc.; "Cellular Drone Communication"; Sep. 29, 2016; 9 pages; retrieved from https://www.qualcomm.com/invention/technologies/lte/advanced-pro/cellular-drone-communication.
Qualcomm Technologies Inc.; "Leading the world to 5G: Evolving cellular technologies for safer drone operation"; Sep. 2016; 31 pages; retrieved from https://www.qualcomm.com/media/documents/files/leading-the-world-to-5g-evolving-cellular-technologies-for-safer-drone-operation.pdf.
Jory, Z.; "Transforming Telecom Inspection with Intelligent Drones"; Oct. 27, 2016; 4 pages; retrieved from https://www.ibm.com/blogs/internet-of-things/intelligent-drones/.
Fodor, G. et al.; "An Overview of Device-to-Device Communications Technology Components in METIS"; Jun. 27, 2016; 11 pages, vol. 4; IEEE Access.
Addali, K. M. et al.; "Dual-Backhaul Links in LTE-A Mobile Relay System for High-Speed Railways"; Aug. 2016; 6 pages; IEEE 4th International Conference on Future Internet of Things and Cloud Workshops (FiCloudW).
Ghadialy, Z.; "Mobile Relay Nodes (MRN) in Rel-12"; Aug. 2, 2013; 9 pages; retrieved from https://blog.3g4g.co.uk/2013/08/mobile-relay-nodes-mrn-in-rel-12.html.
International Search Report based on Application No. PCT/US2017/067466, 6 pages, dated Jul. 4, 2018 (for reference purpose only).
Extended European Search Report issued for the corresponding EP application No. 17 88 8538, dated Sep. 16, 2020, 18 pages (for informational purpose only).
Chinese 1st Office Action issued for the corresponding CN application No. 201780081641.6, dated Aug. 25, 2020, 36 pages (for informational purpose only).
Nithi et al., "Smart power management for mobile handsets", Smart power management for mobile handsets, dated Mar. 2011, pp. 149-168, Nokia Bell Labs, vol. 15, issue 4.
European Supplementary Partial Search Report issued for the corresponding EP application No. 17 88 8538, dated May 26, 2020, 8 pages (for informational purpose only).

* cited by examiner

100

Forwarding Table

| Address 1 | Address 2 | Active? |
|---|---|---|
| a.b.c.d | e.f.g.h | on |
| i.j.k.l | m.n.o.p | off |

| Address 1 | Address 2 | Active? |
|---|---|---|
| a.b.c.d | e.f.g.h | on |
| i.j.k.l | m.n.o.p | off |

1900

2200

FIG 59
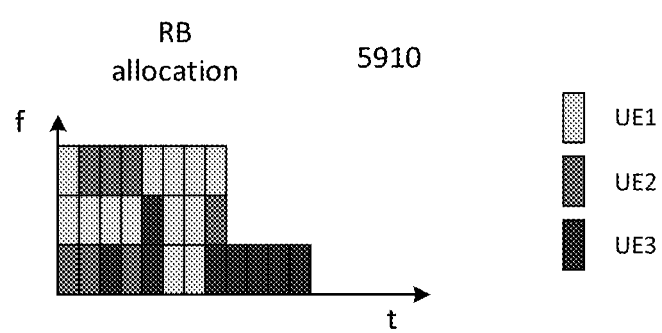
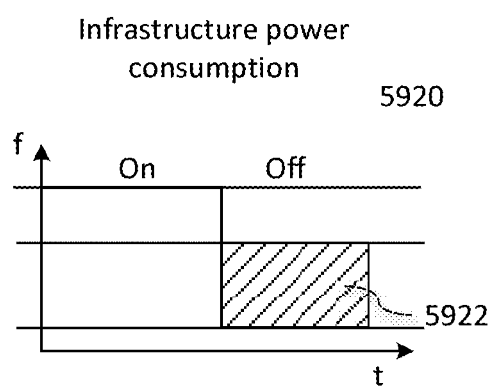

| | | | | | | |
|---|---|---|---|---|---|---|
| User ID | Msg Type (Data Upload) | Data Type 1 | Data Field values | Data Type 2 | Data Field Values | -------- |

10904

| | | | | | | |
|---|---|---|---|---|---|---|
| User ID | Msg Type (Data Req) | Data Type (BSSID) | Loc values for route | Data Type (RSSI) | BSSIDs | -------- |

10906

| | | | | | | |
|---|---|---|---|---|---|---|
| User ID | Msg Type (Data Response) | Data Type (BSSID) | Loc1 BSSID, Loc2 BSSID ... | Data Type (RSSI) | BSSID1 RSSI, BSSID2 RSSI etc | -------- |

10908

| | | | |
|---|---|---|---|
| User ID | Msg Type (Pred req) | Data Type (route prediction) | Curr Loc, Curr Time |

10910

| | | | |
|---|---|---|---|
| User ID | Msg Type (Pred resp) | Data Type (route prediction) | Time 1 Loc1, Time 2 Loc 2, ... |

| Device Capabilities → <br><br> Context information detail level ↓ | Capability class 0 | ... | Capability class "N" |
|---|---|---|---|
| Detail level 0 | Capabilities include 2G/3G/LTE & WiFi<br><br>Details include rudimentary information on RAT availability<br><br>Efficiency metric indication (probably low due to low information availability) | | Capabilities include 2G/3G/LTE & WiFi & mmWave & TV White Space & ....<br><br>Details include rudimentary information on RAT availability<br><br>Efficiency metric indication (probably low due to low information availability) |
| ... | | | |
| Detail level "M" | Capabilities include 2G/3G/LTE & WiFi<br><br>Details include detailed information on RAT availability and related performance KPIs (observed network load, PER/HARQ performance, etc.)<br><br>Efficiency metric indication (probably high due to high information availability) | | Capabilities include 2G/3G/LTE & WiFi & mmWave & TV White Space & ....<br><br>Details include detailed information on RAT availability and related performance KPIs (observed network load, PER/HARQ performance, etc.)<br><br>Efficiency metric indication (probably high due to high information availability) |

| | |
|---|---|
| Group ID | Resource Pool Configuration Information |

METHODS AND DEVICES FOR RADIO COMMUNICATIONS

CROSS-REFERENCE TO RELATED APPLICATIONS

This application is a continuation of U.S. patent application Ser. No. 16/455,793, filed on Jun. 28, 2019, which is a continuation of PCT Application No. PCT/US2017/067466, filed Dec. 20, 2017, which claimed priority to U.S. Provisional Patent Application No. 62/440,501, filed Dec. 30, 2016, each of which are incorporated herein by reference in their entirety.

TECHNICAL FIELD

Various aspects relate generally to methods and devices for radio communications.

BACKGROUND

End-to-end communication networks may include radio communications networks as well as wireline communication networks. Radio communication networks may include network access nodes (e.g., base stations, access points, etc.), and terminal devices (e.g., mobile phones, tablets, laptops, computers, Internet of Things (IoT) devices, wearables, implantable devices, machine-type communication devices, etc., and vehicles (e.g., cars, trucks, buses, bicycles, robots, motorbikes, trains, ships, submarines, drones, airplanes, balloons, satellites, spacecraft), machine-type communication devices, etc.) and may provide a radio access network for such terminal devices to communicate with other terminal devices or access various networks via the network access nodes. For example, cellular radio communication networks may provide a system of cellular base stations that serve terminal devices within an area to provide communication to other terminal devices or radio access to applications and services such as voice, text, multimedia, Internet, etc., while short-range radio access networks such as Wireless Local Area Network (WLAN) networks may provide a system of WLAN access points (APs) that may provide access to other terminal devices within the WLAN network or other networks such as a cellular network or a wireline communication networks.

BRIEF DESCRIPTION OF THE DRAWINGS

In the drawings, like reference characters generally refer to the same parts throughout the different views. The drawings are not necessarily to scale. Instead, the drawings generally emphasize one or more features. In the following description, various aspects of the disclosure are described with reference to the following drawings, in which:

FIG. 59 shows a second exemplary depiction of a relationship between radio resource allocation and power consumption in accordance with some aspects;

FIG. 109 shows various exemplary message formats for crowdsourcing context information in accordance with some aspects;

FIG. 119 shows an exemplary scenario for beamsteering with vehicular targets in accordance with some aspects;

FIG. 120 shows an exemplary internal configuration of control module for a network access node in accordance with some aspects;

FIG. 121 shows an exemplary method of performing beamsteering for vehicular targets in accordance with some aspects;

FIG. 122 shows an exemplary scenario in which a vehicle can bock another vehicle in accordance with some aspects;

FIG. 123 shows an exemplary scenario for radio access technology switching in accordance with some aspects;

FIG. 124 shows an exemplary scenario with aerial drones in accordance with some aspects;

FIG. 125 shows an exemplary method of performing radio communications according to some aspects;

FIG. 126 shows an exemplary network architecture in accordance with some aspects;

FIG. 127 shows an exemplary positioning of network access nodes for distributing radio environmental map (REM) data storage in accordance with some aspects;

FIG. 128 shows an exemplary internal configuration of a distributed REM server in accordance with some aspects;

FIG. 129 shows an exemplary message sequence chart illustrating a request-response mechanism for REM data in accordance with some aspects;

FIG. 130 shows an exemplary table related to a two-dimension framework for requesting REM data based on device capabilities and context information detail level in accordance with some aspects;

Figure 131:
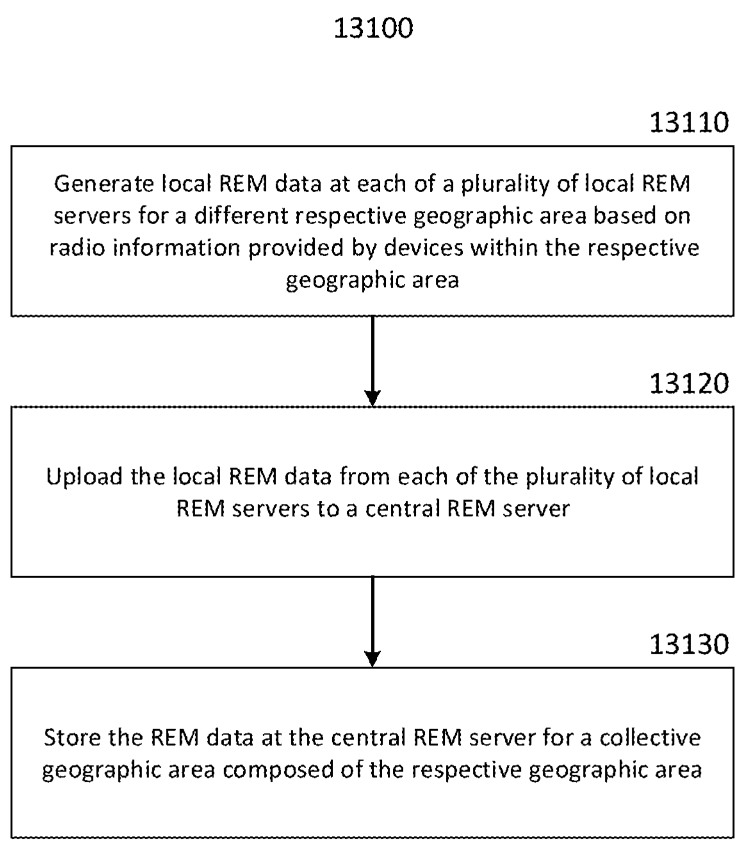
Figure 132:
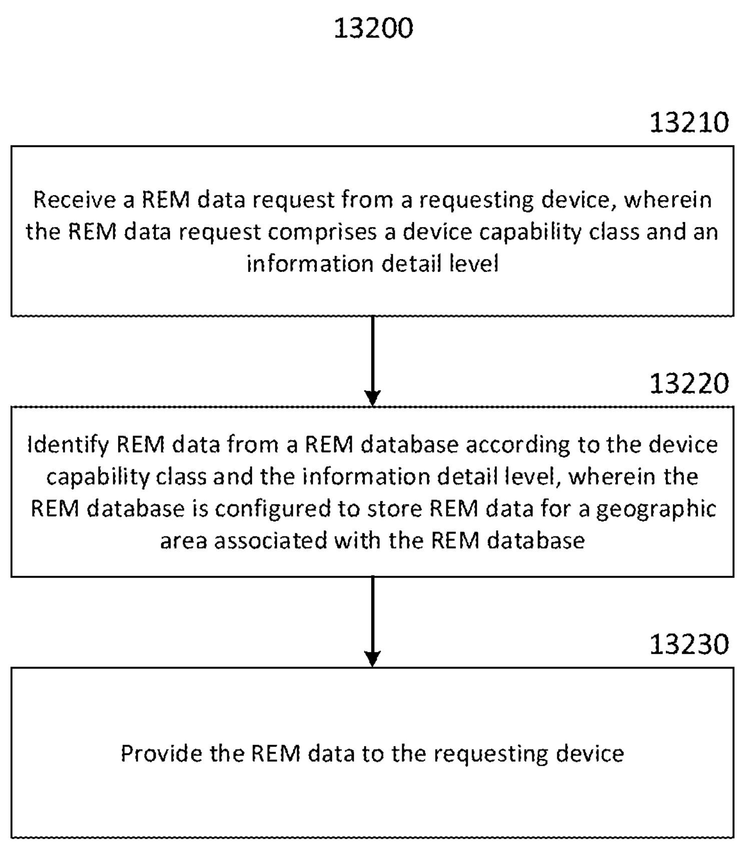
Figure 133:
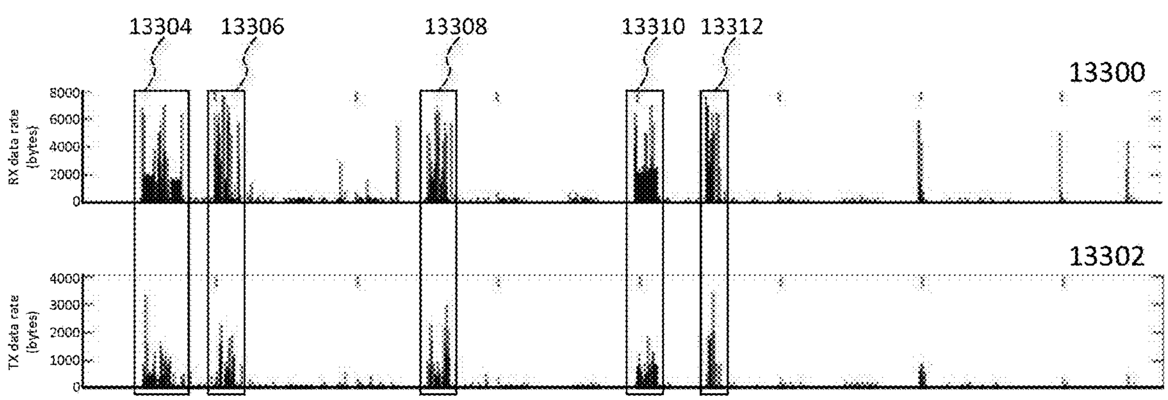
Figure 134:
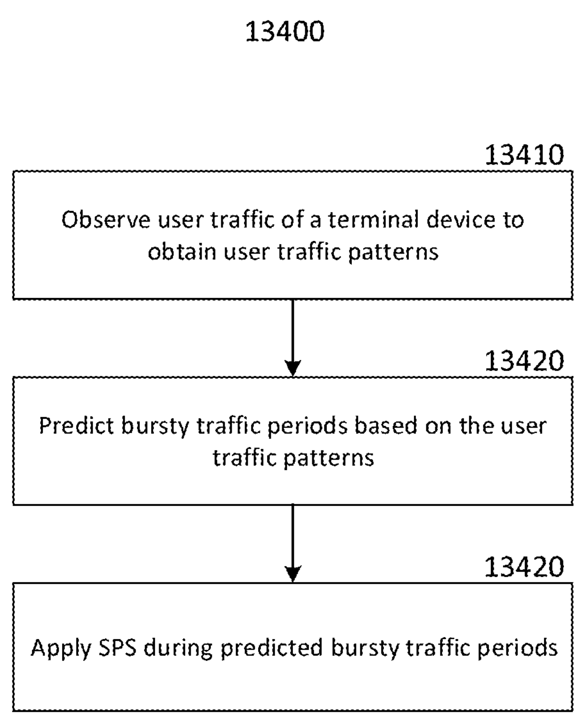
Figure 135:
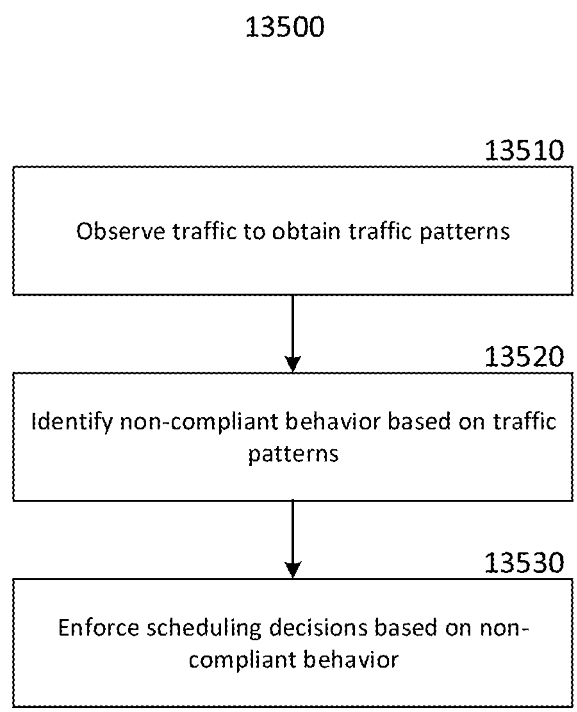
Figure 136:
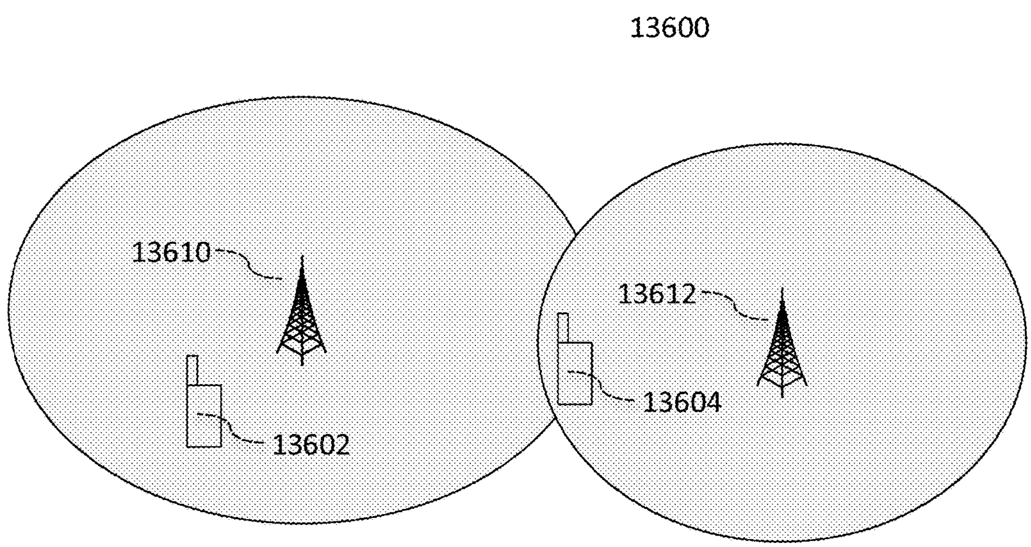
Figure 137:
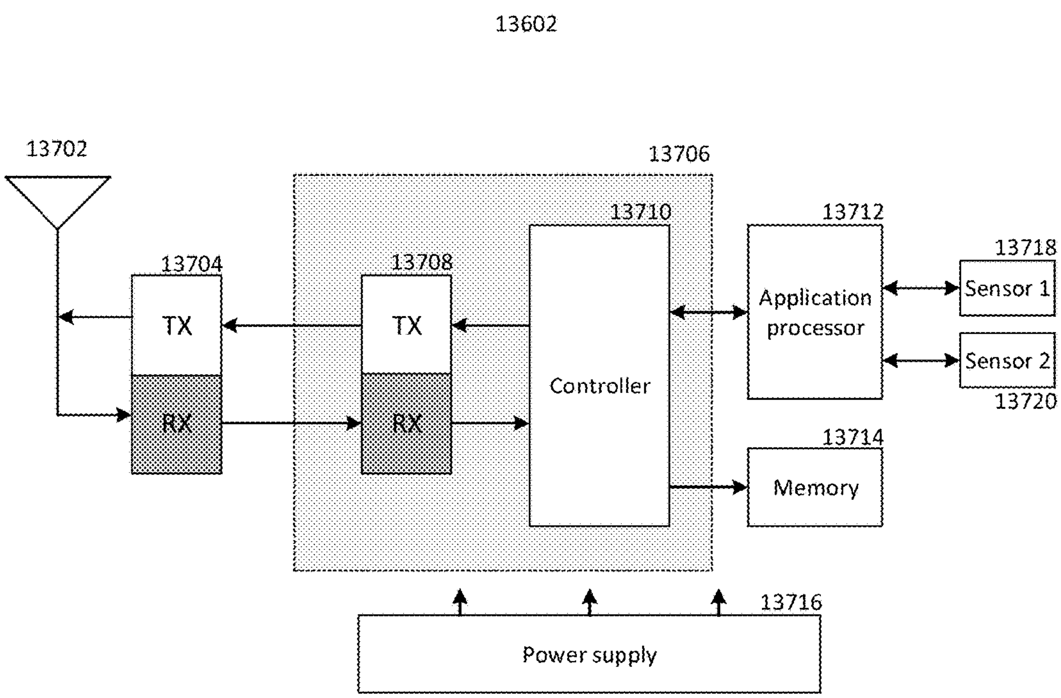
Figure 138:
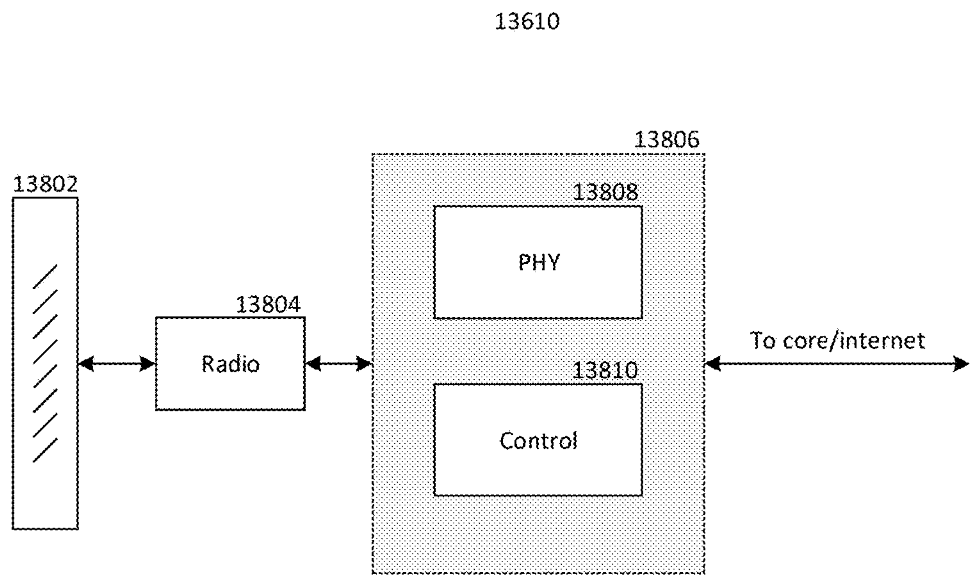
Figure 139:
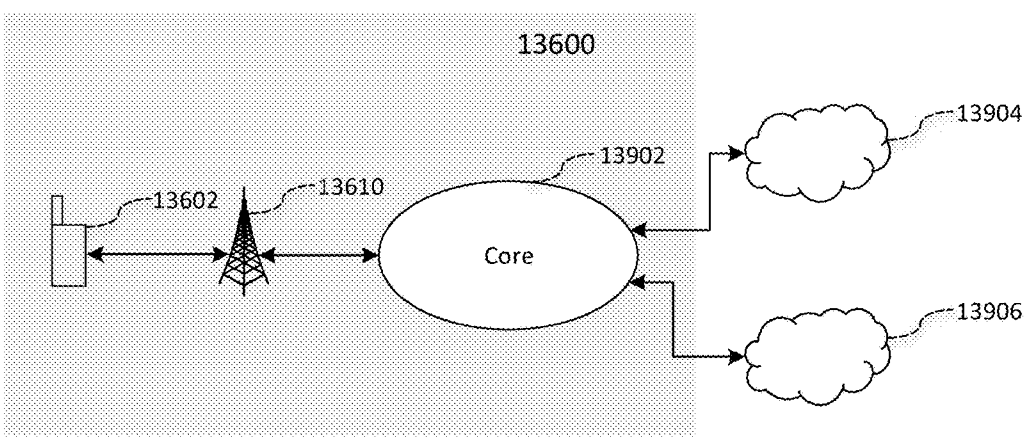
Figure 140:
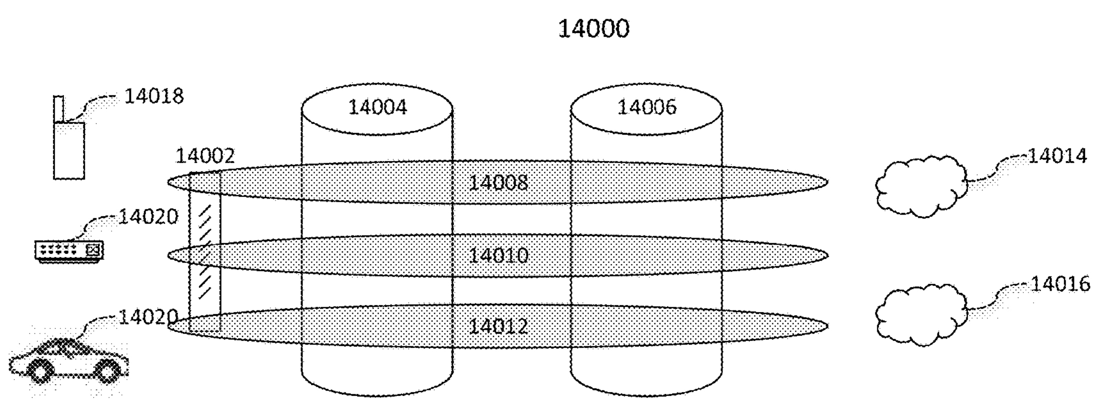
Figure 141:
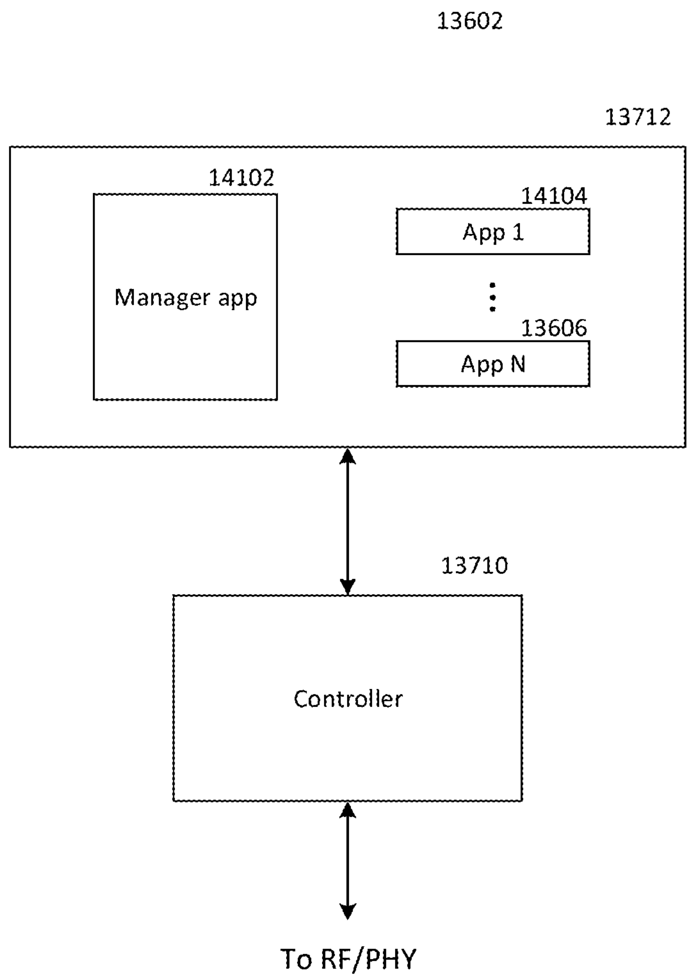
Figure 142:
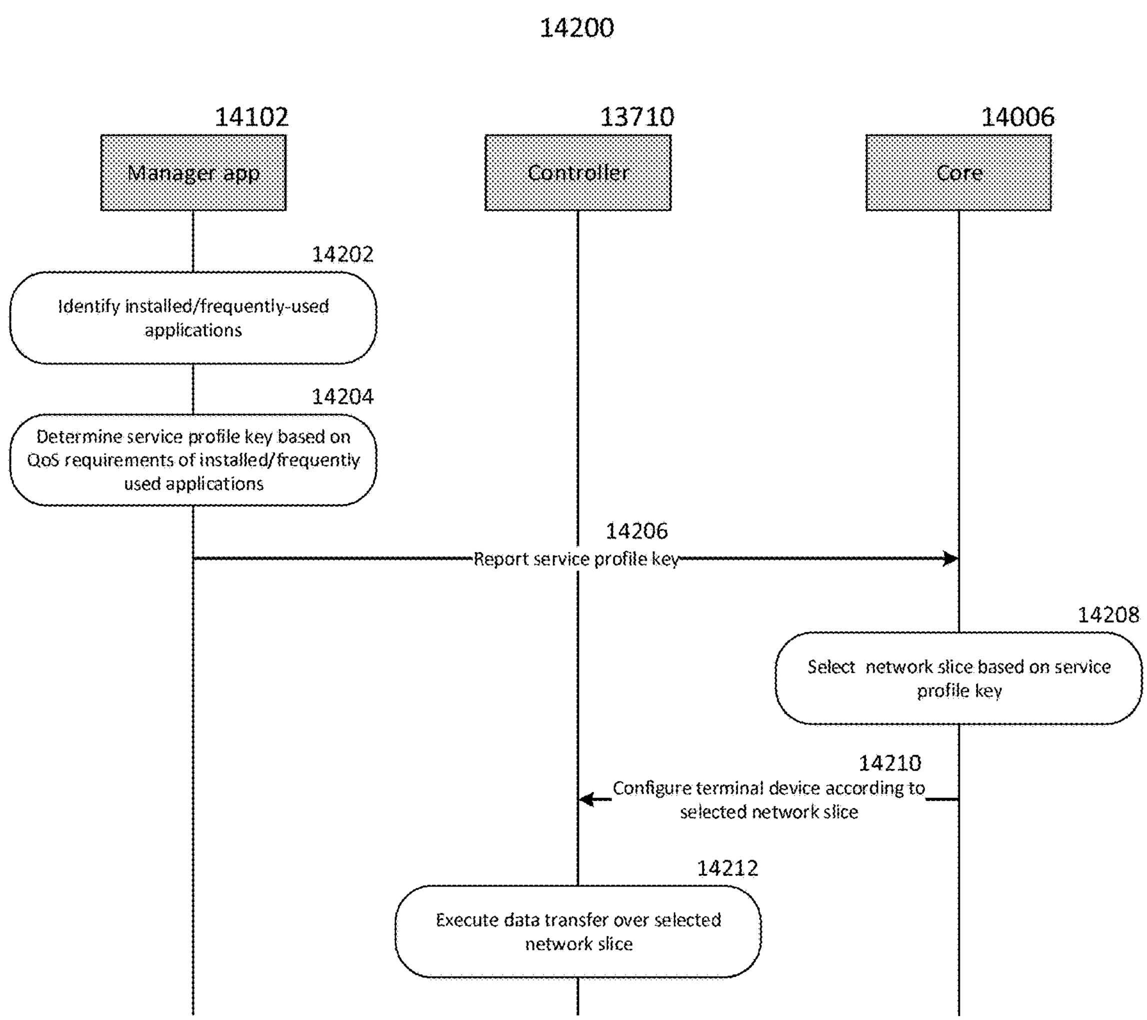
Figure 143:
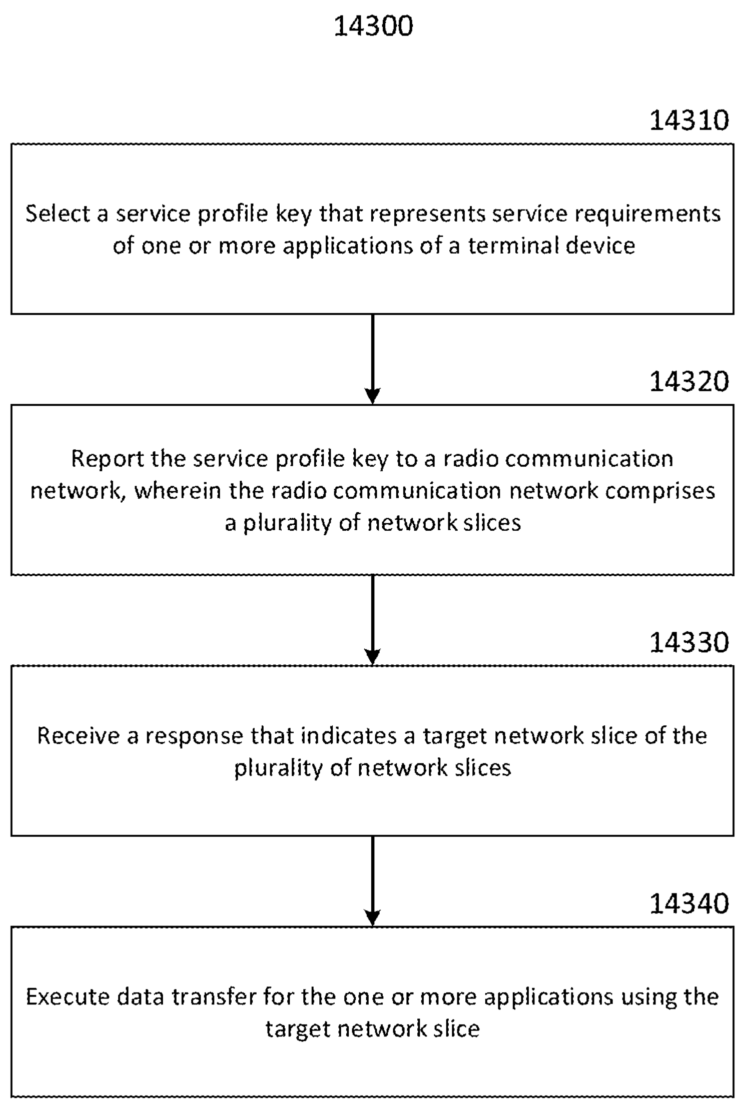
Figure 144:
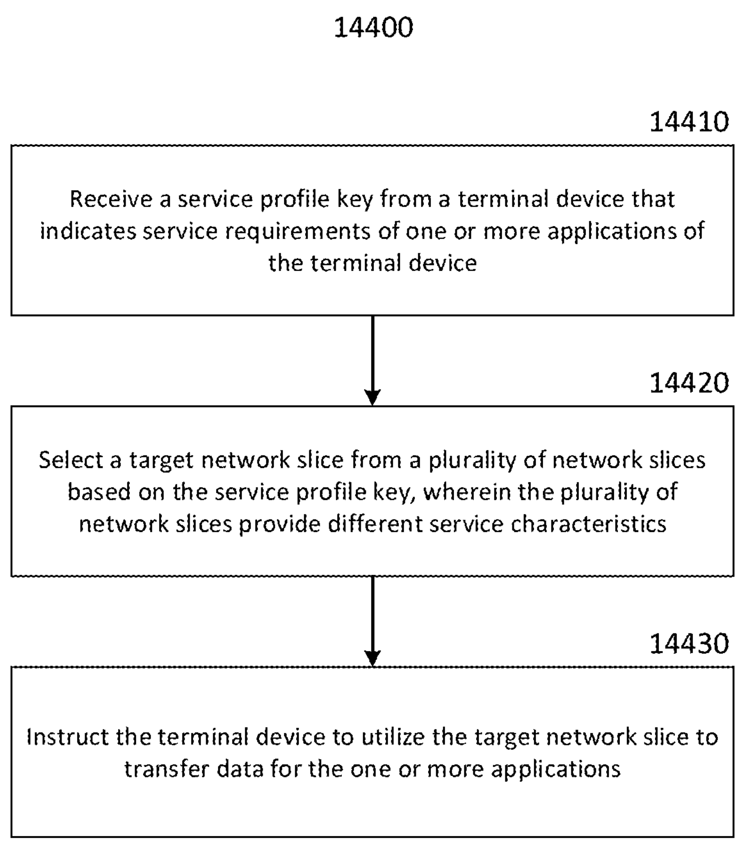
Figure 145:
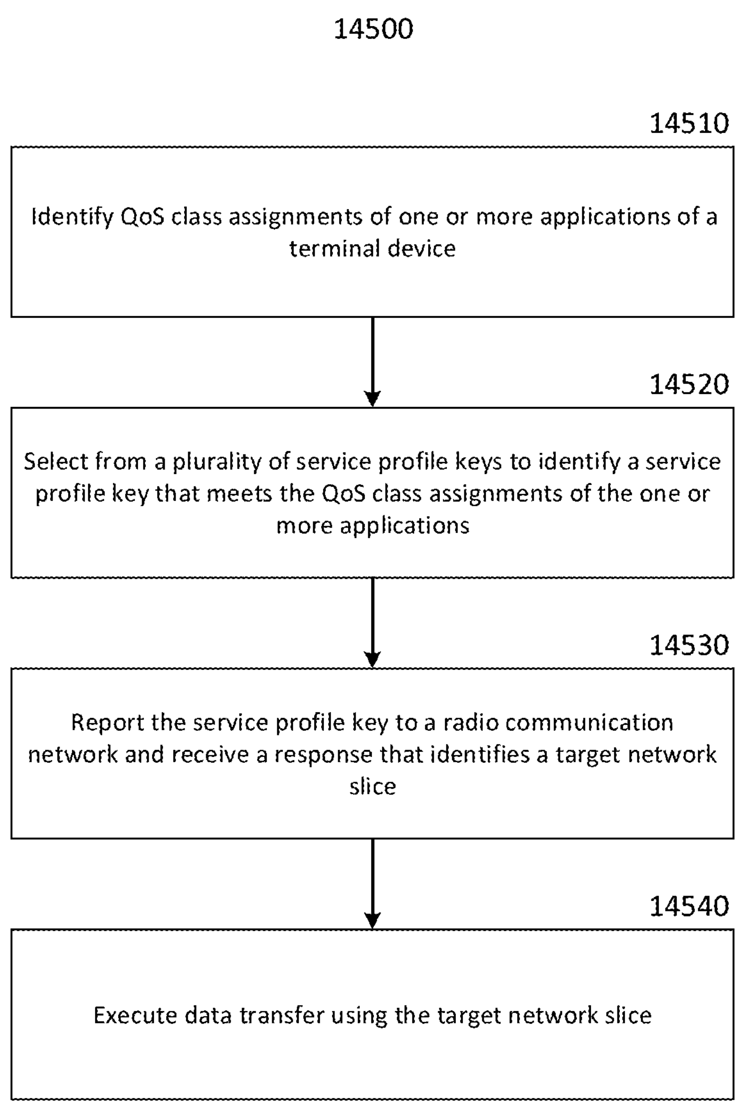
Figure 146:
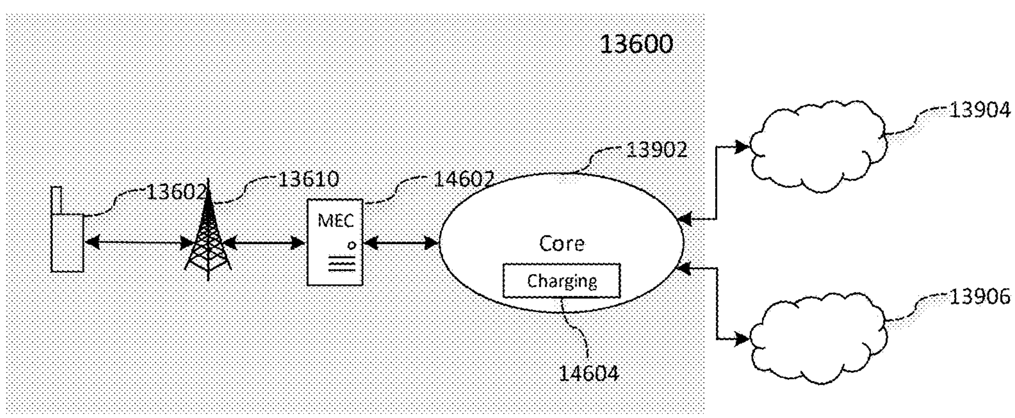
Figure 147:
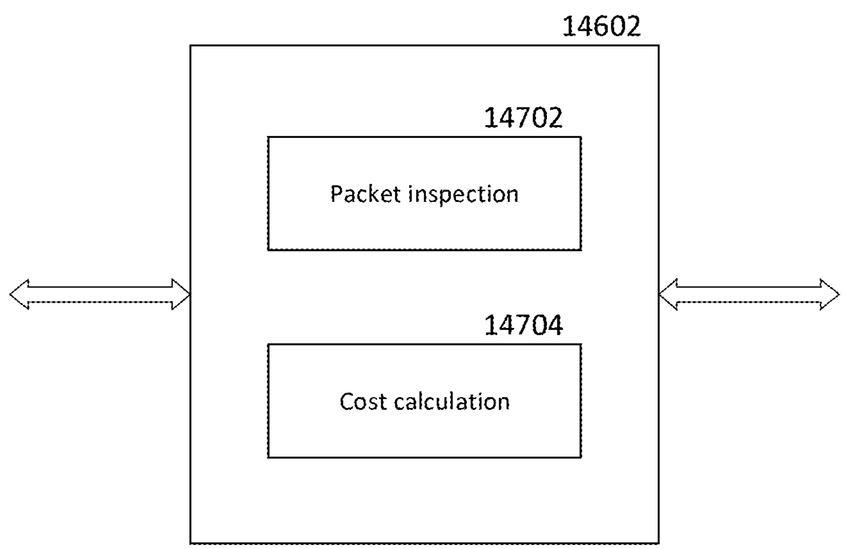
Figure 148:
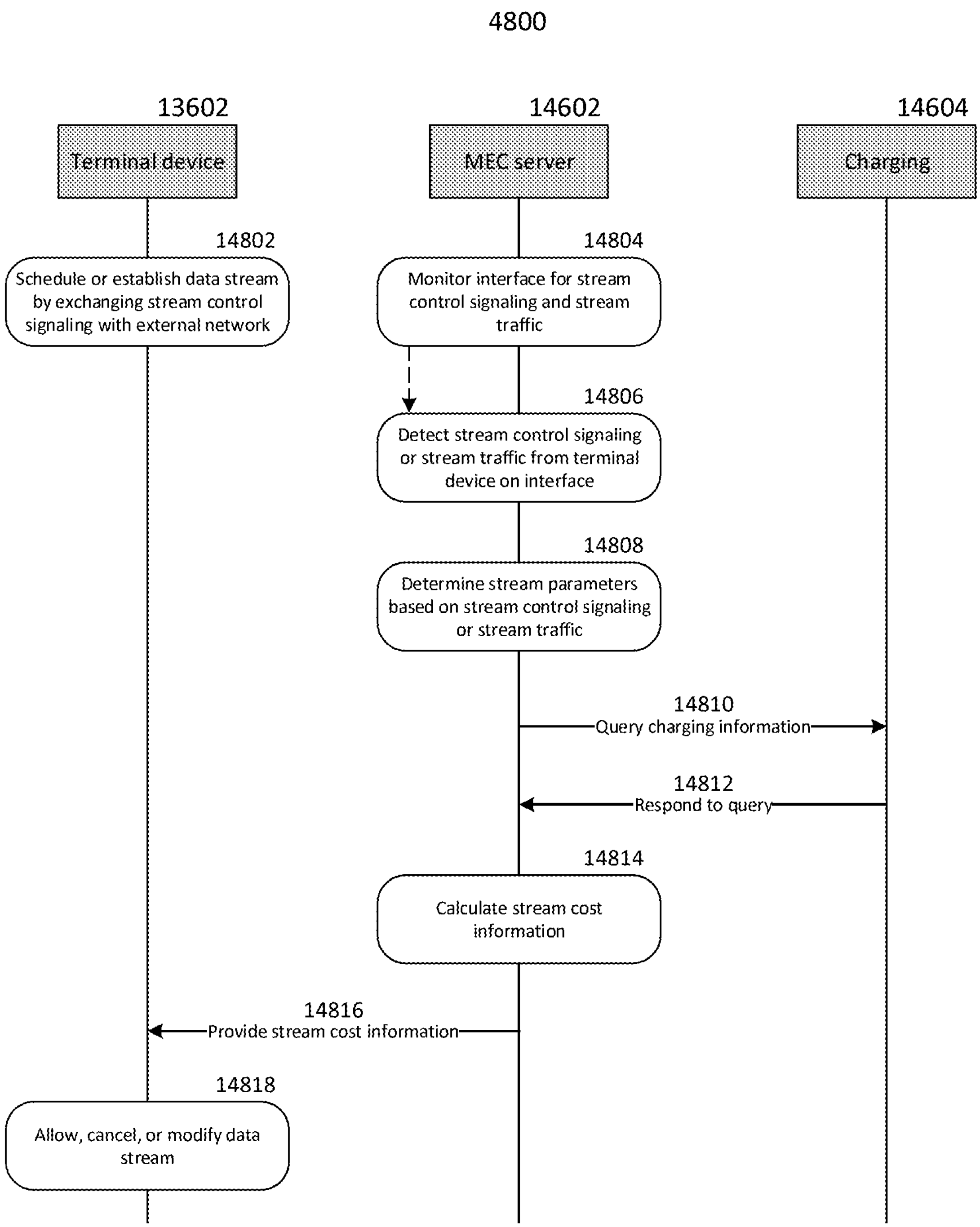
Figure 149:
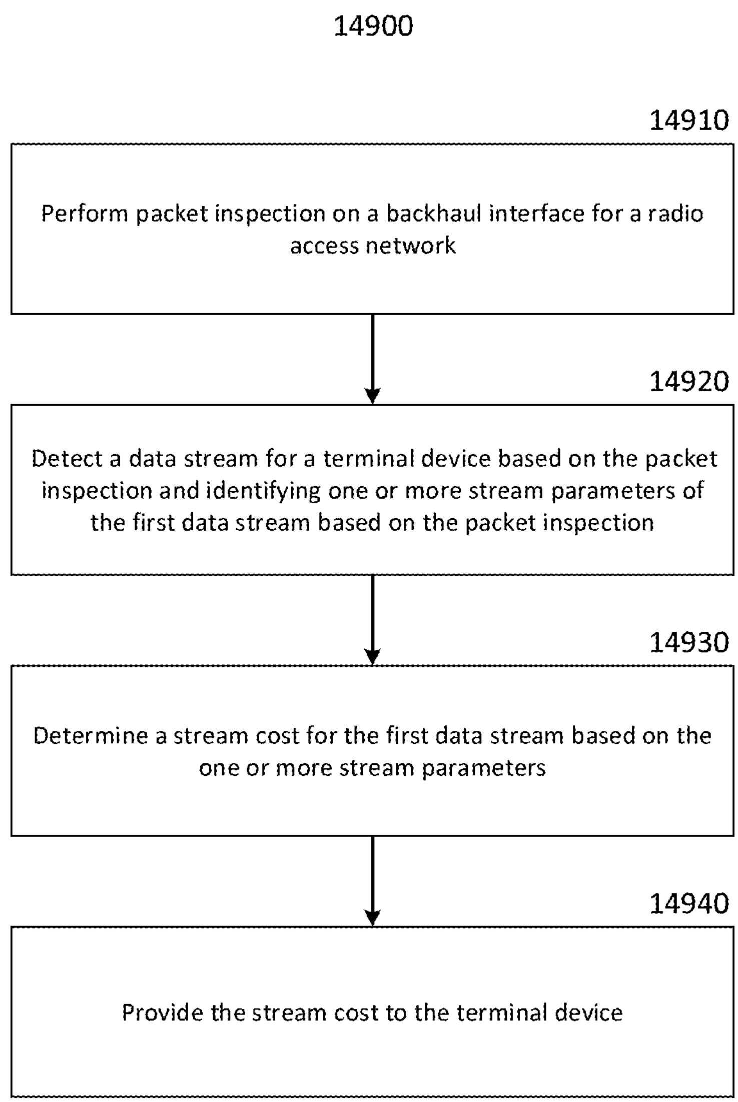
Figure 150:
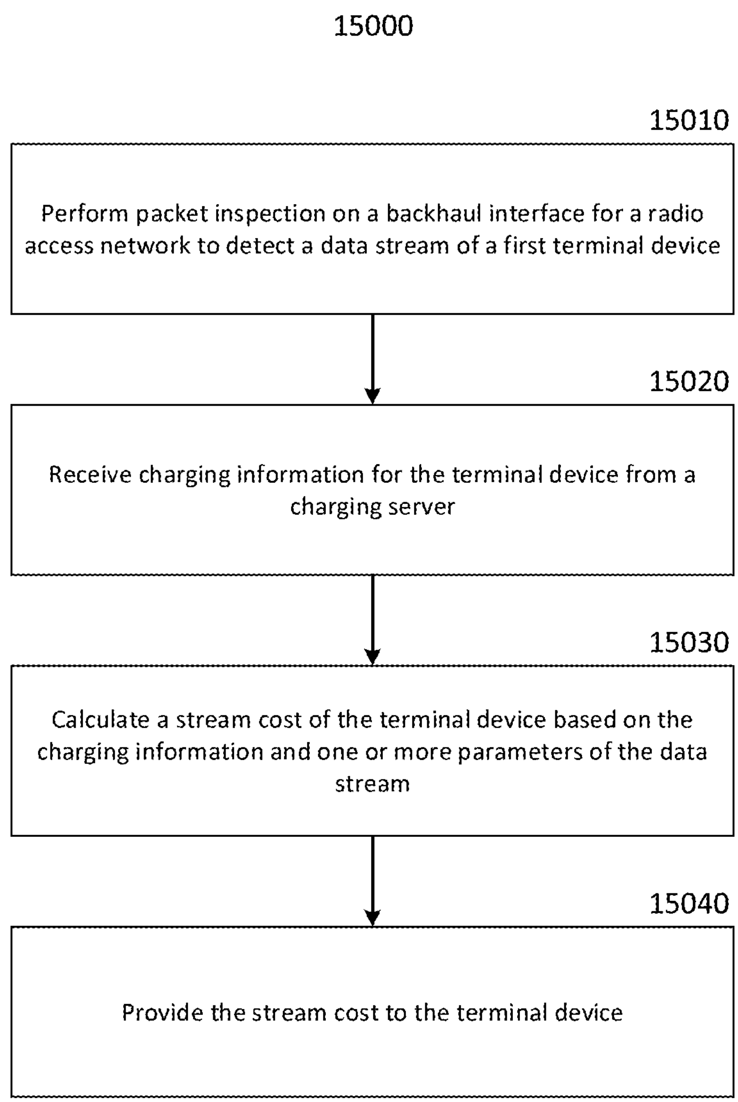
Figure 151:
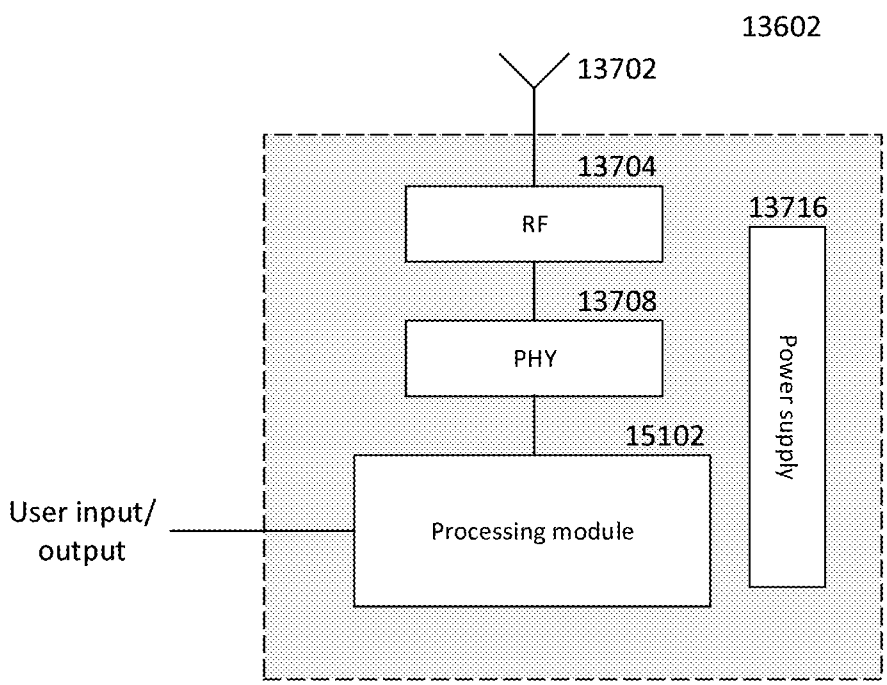
Figure 152:
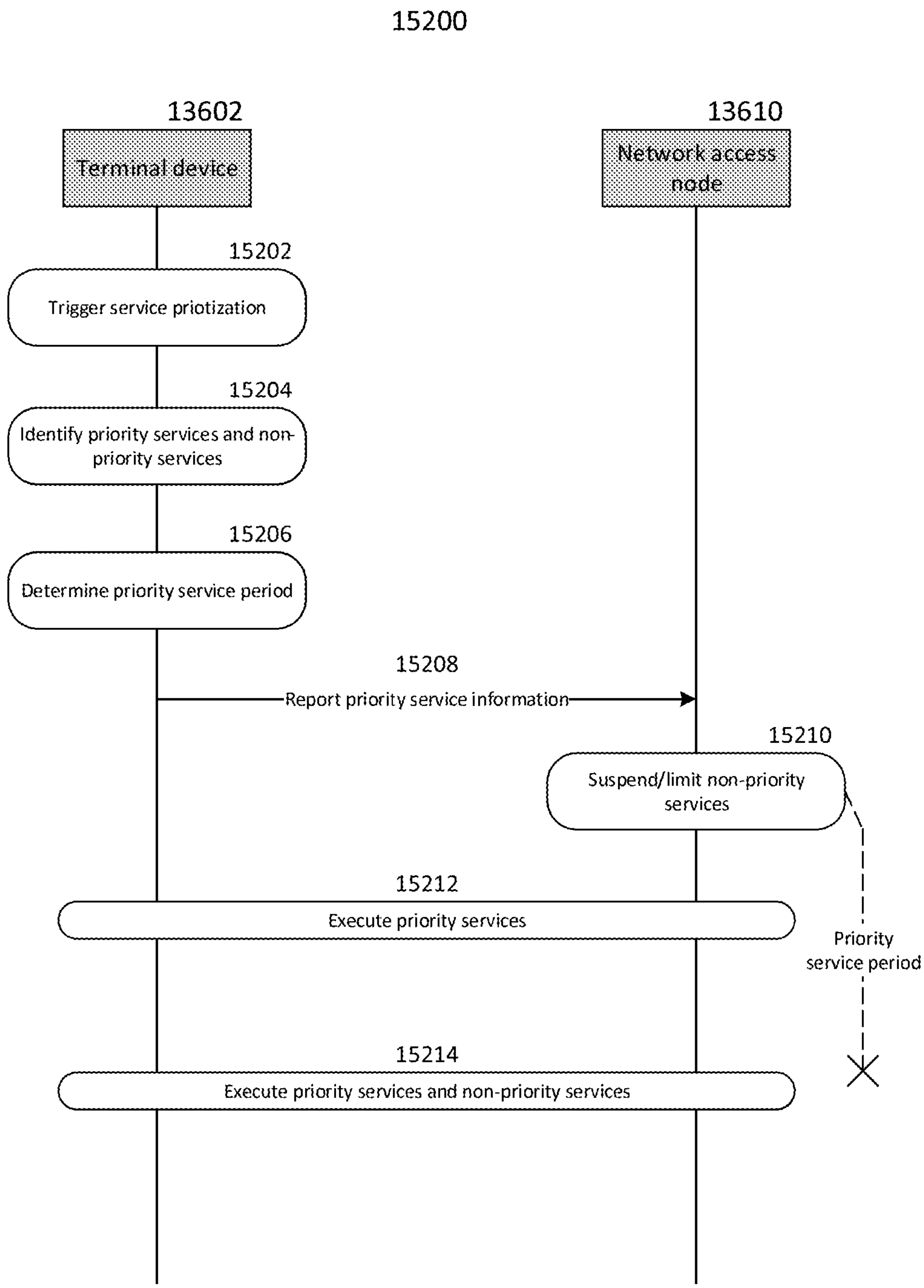
Figure 153:
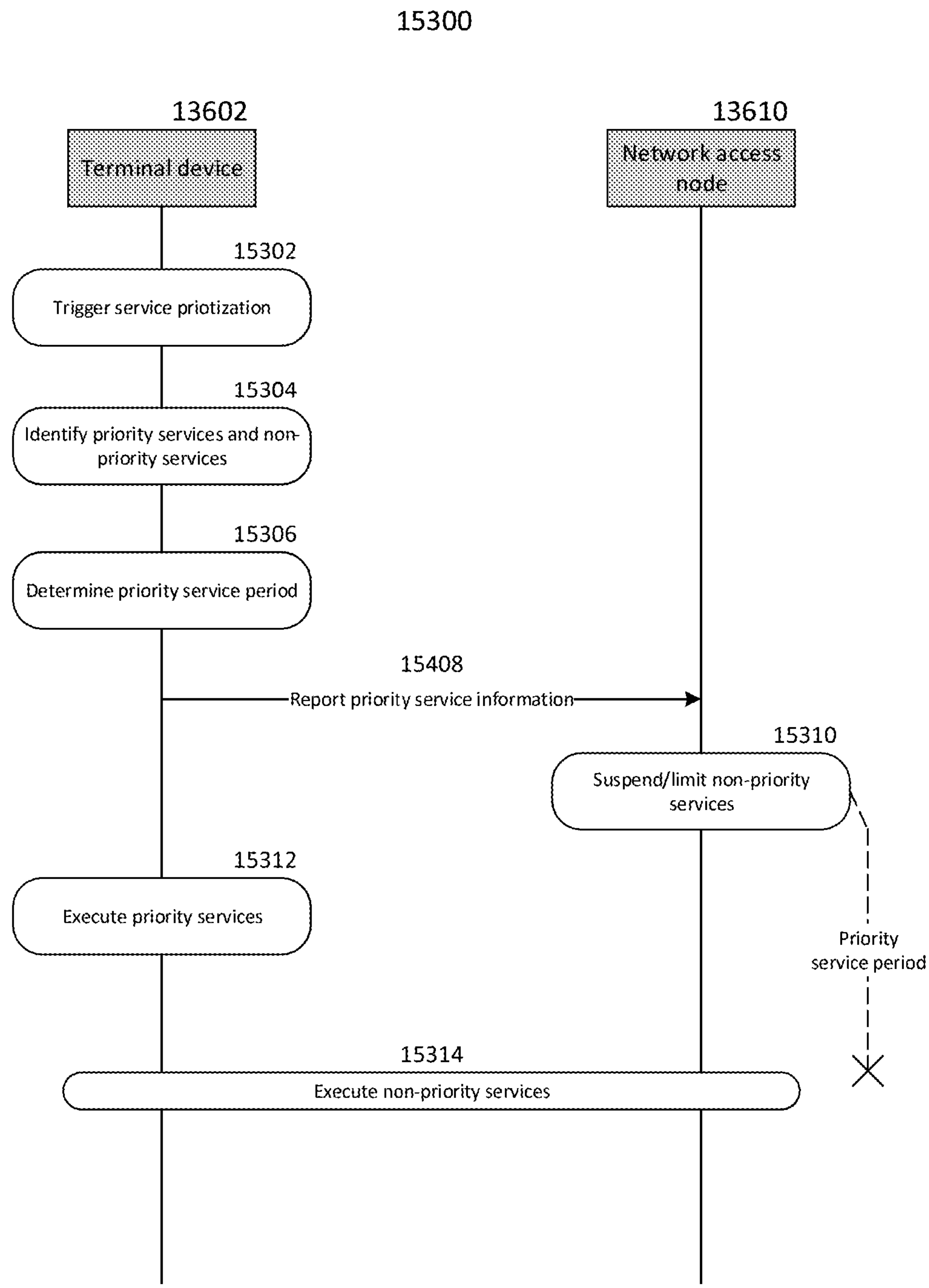
Figure 154:
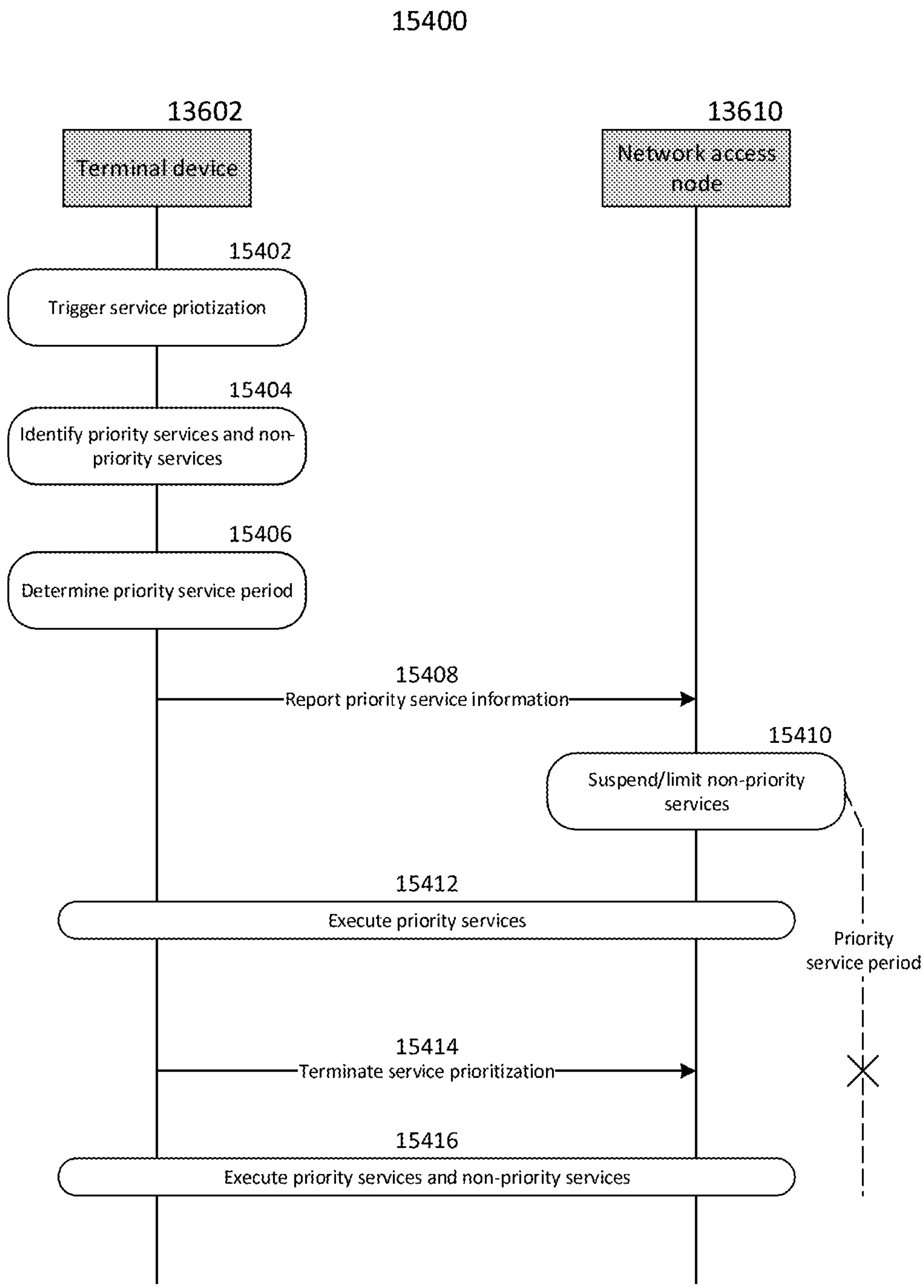
Figure 155:
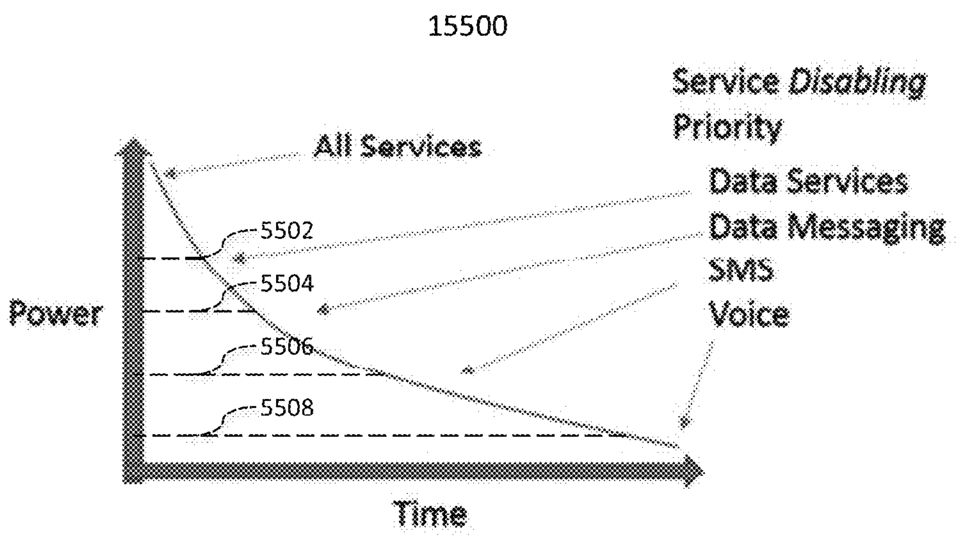
Figure 156:
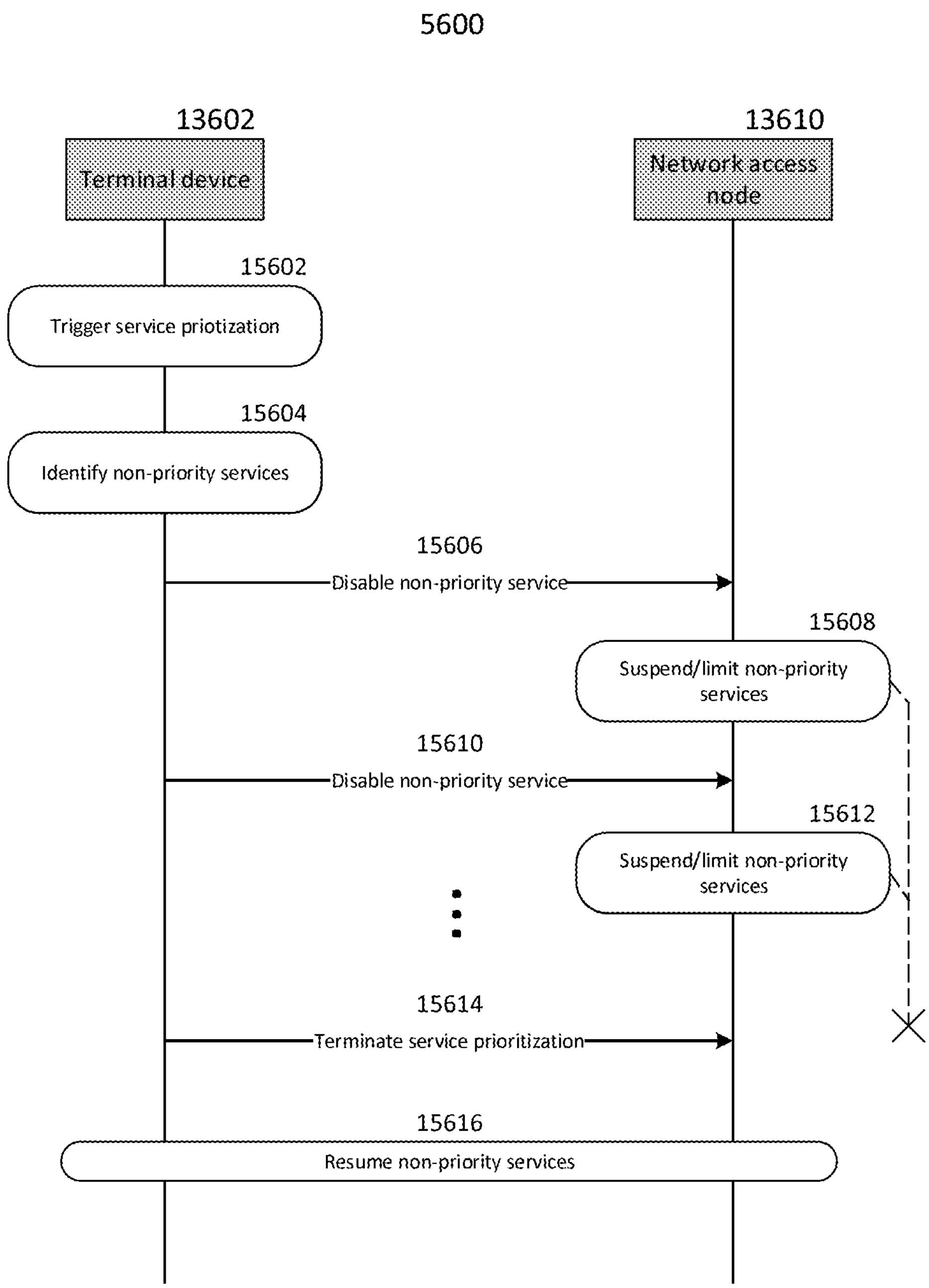
Figure 157:
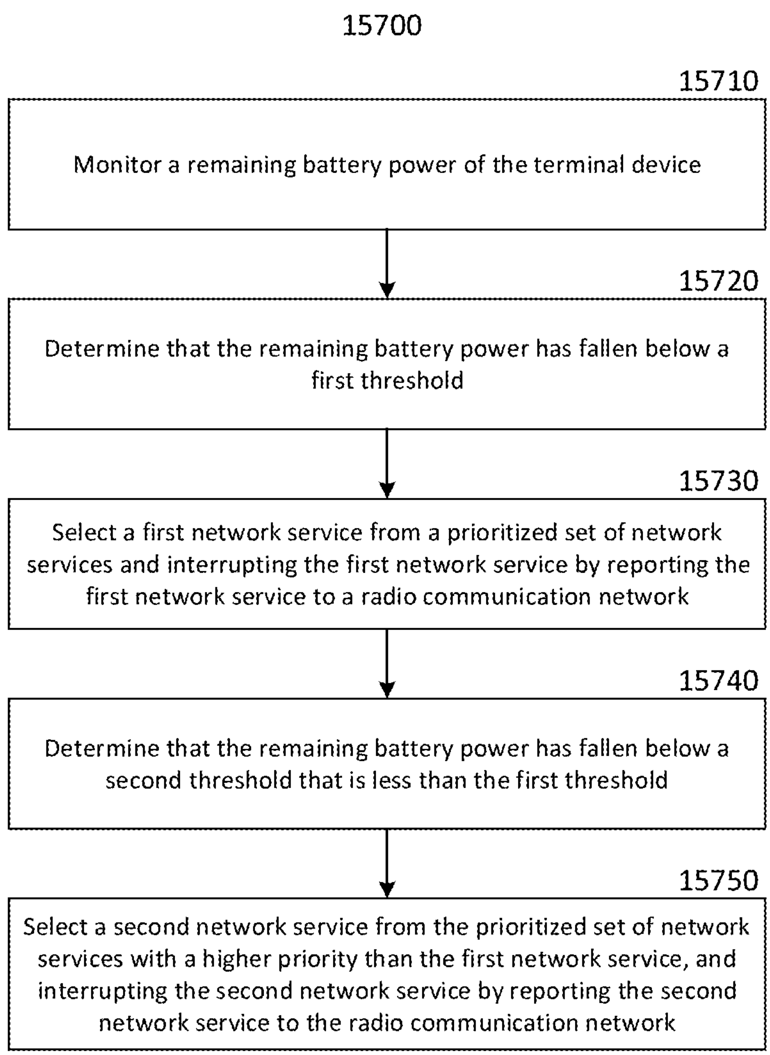
Figure 158:
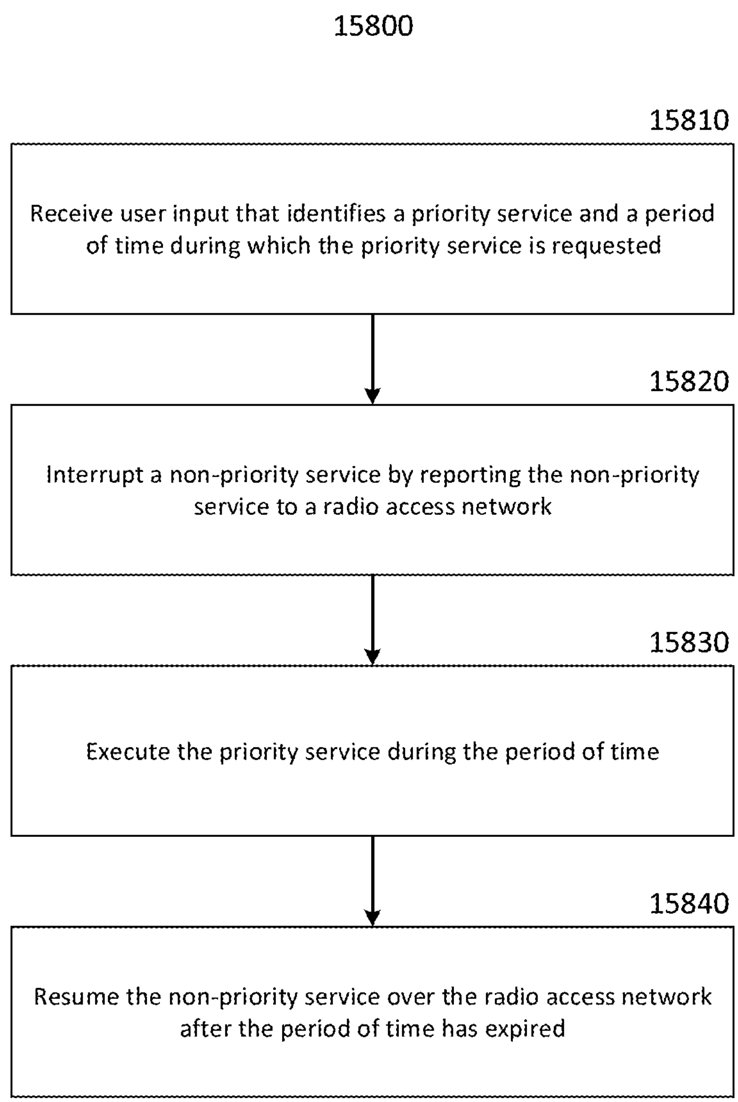
Figure 159:
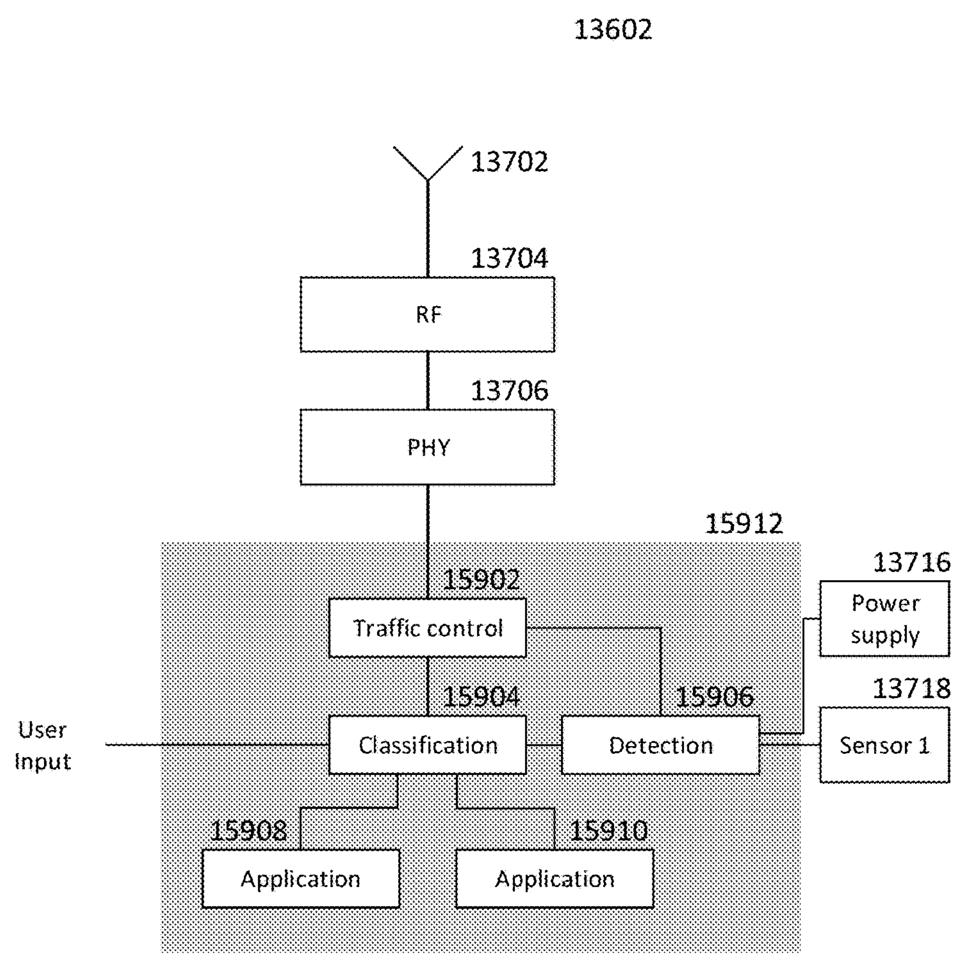
Figure 160:
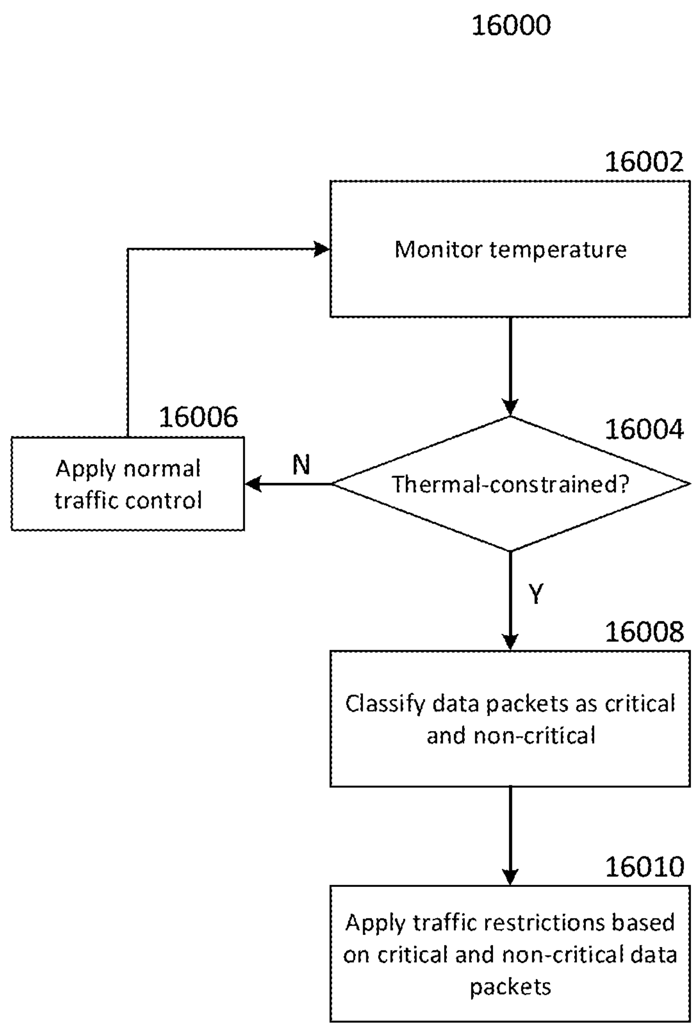
Figure 161:
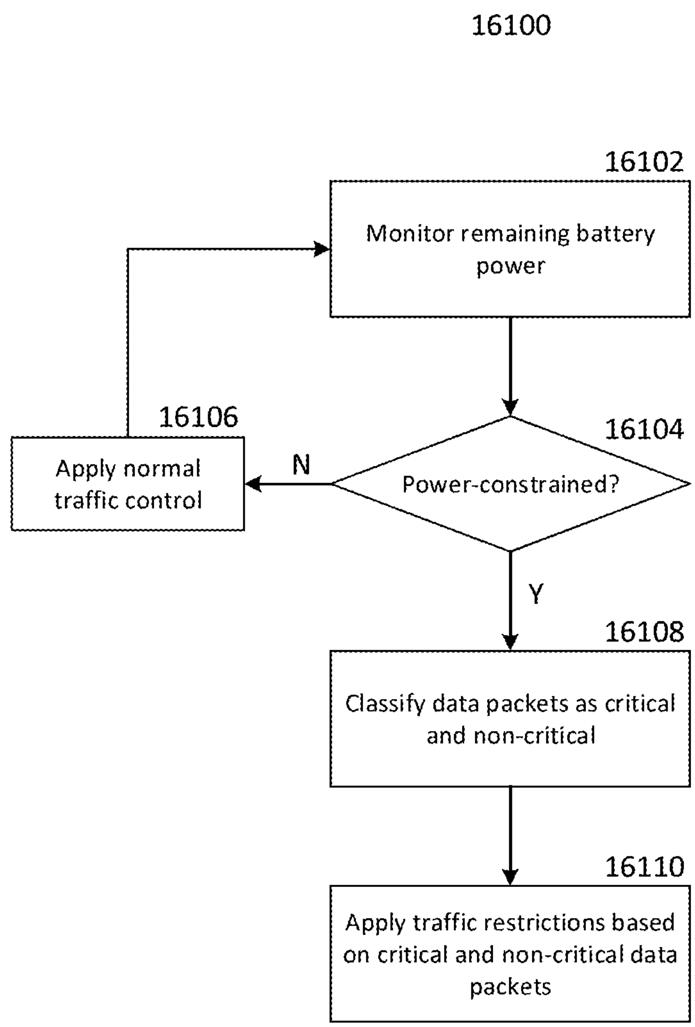
Figure 162:
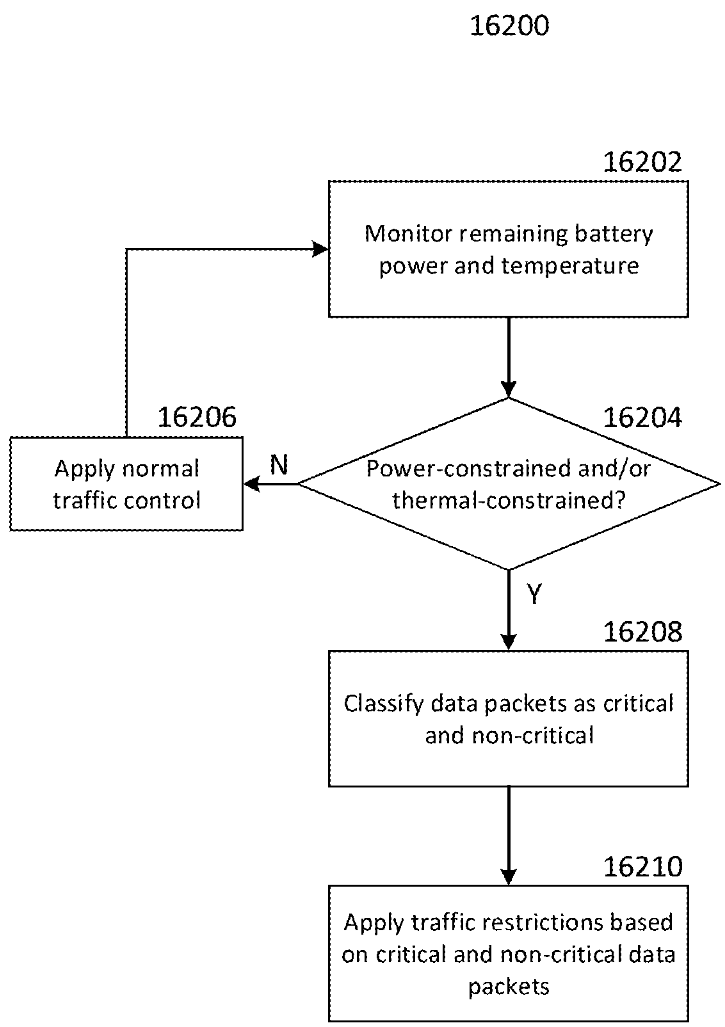
Figure 163:
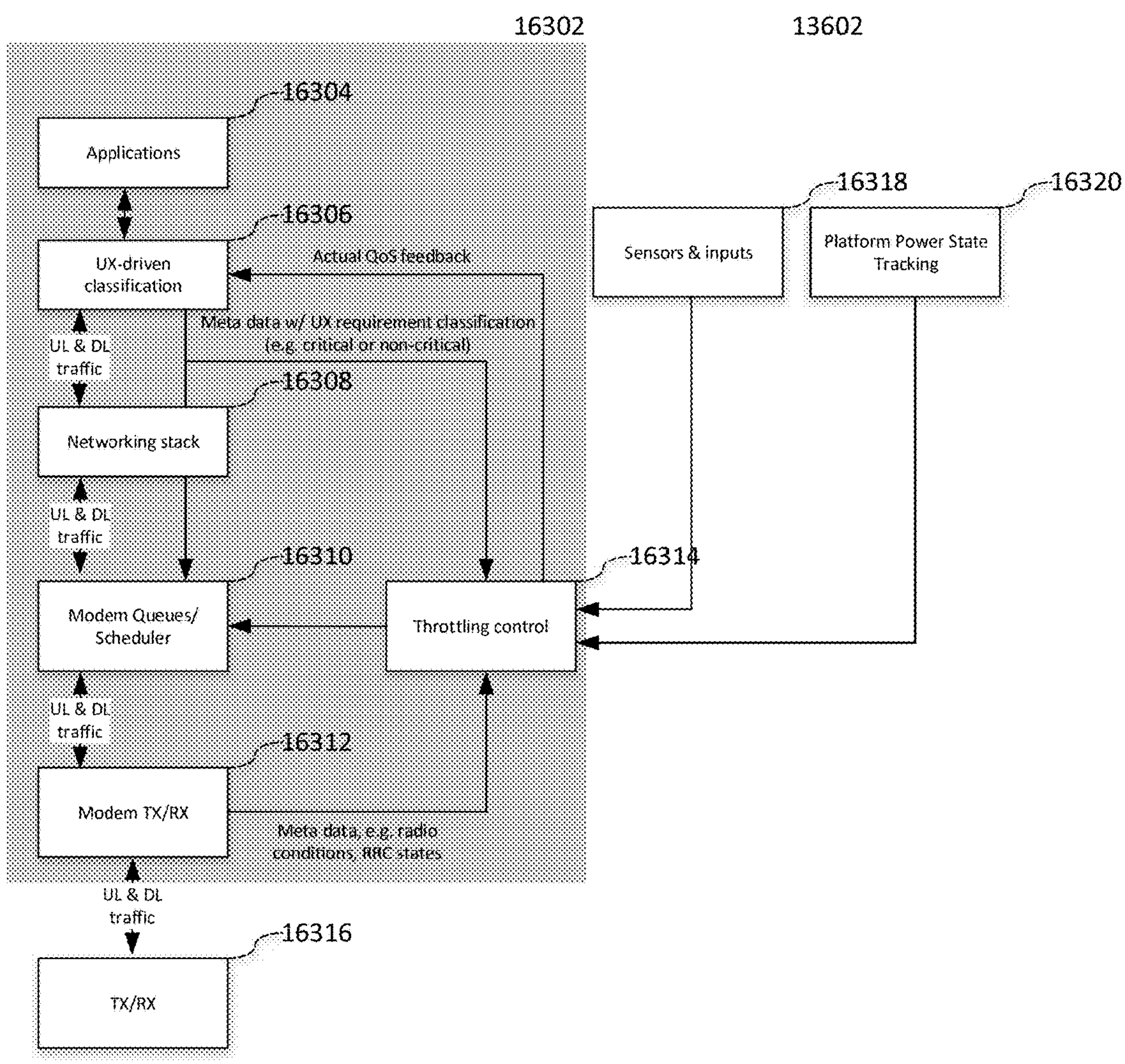
Figure 164:
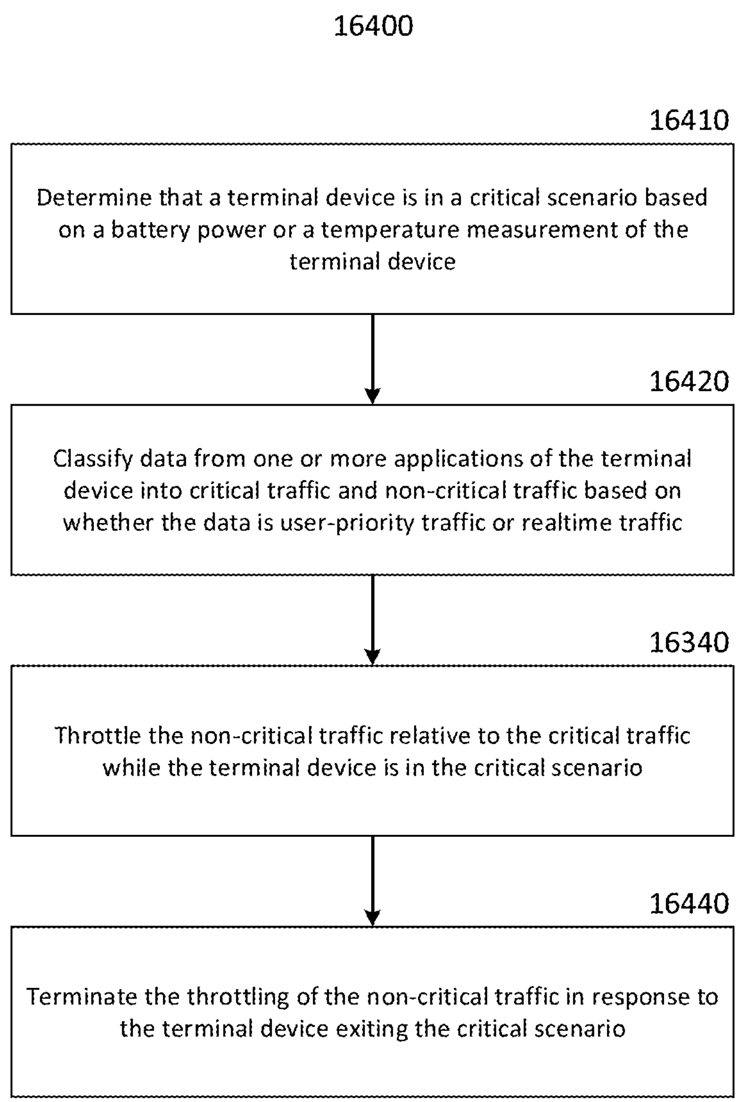
Figure 165:
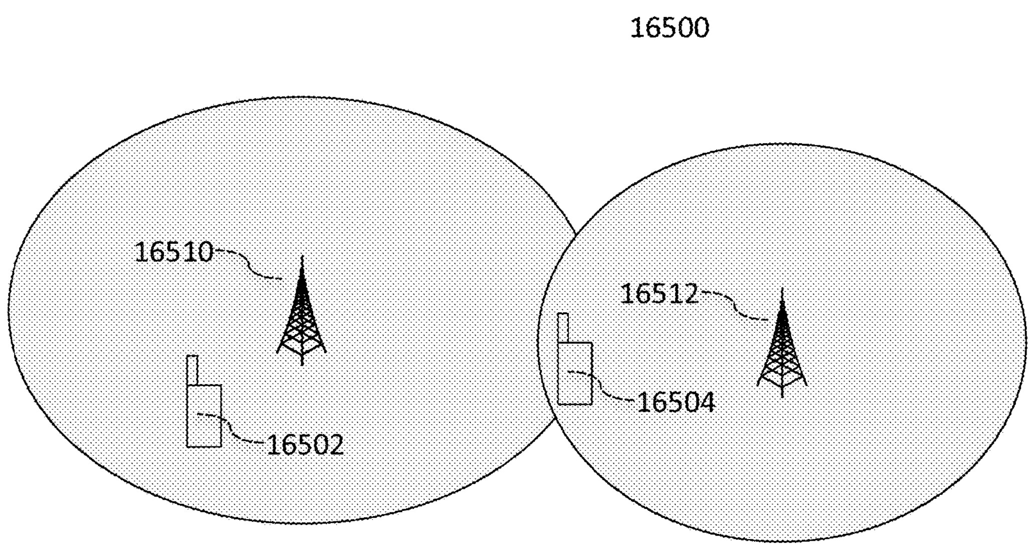
Figure 166:
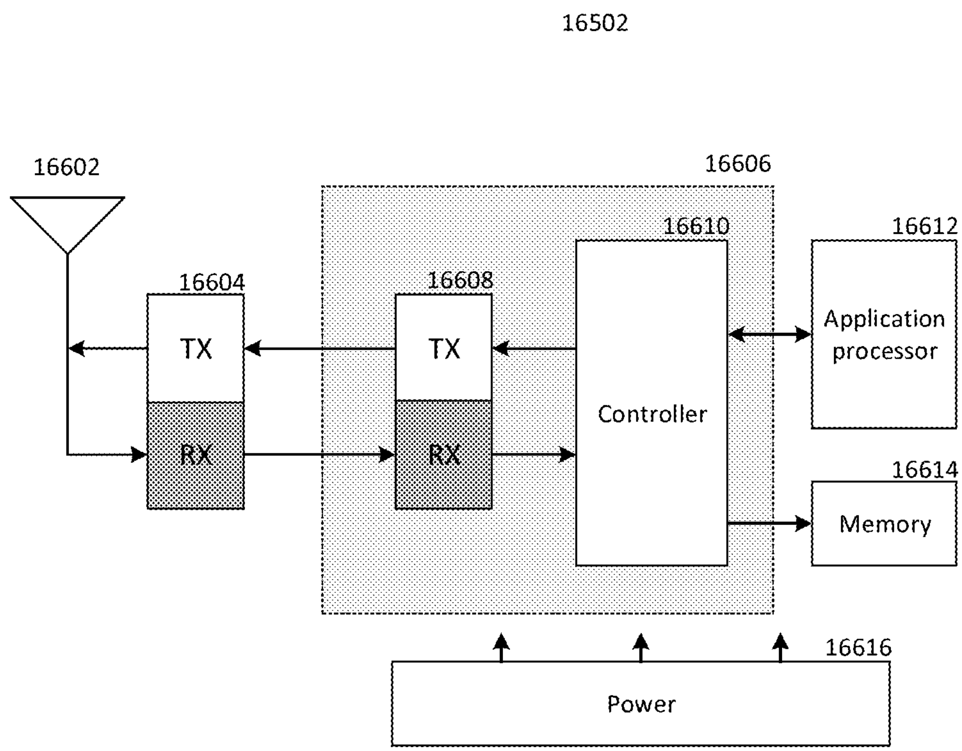
Figure 167:
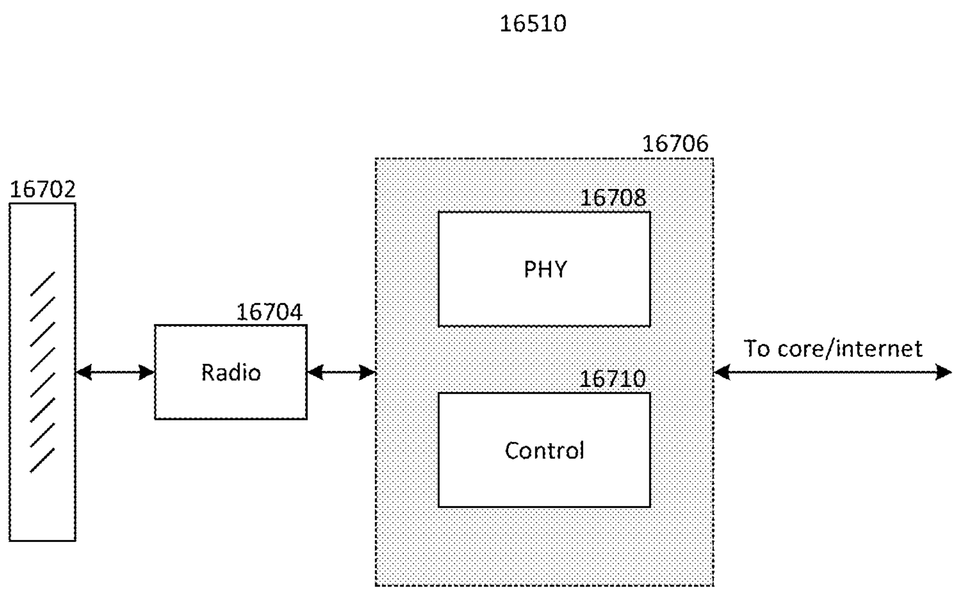
Figure 168:
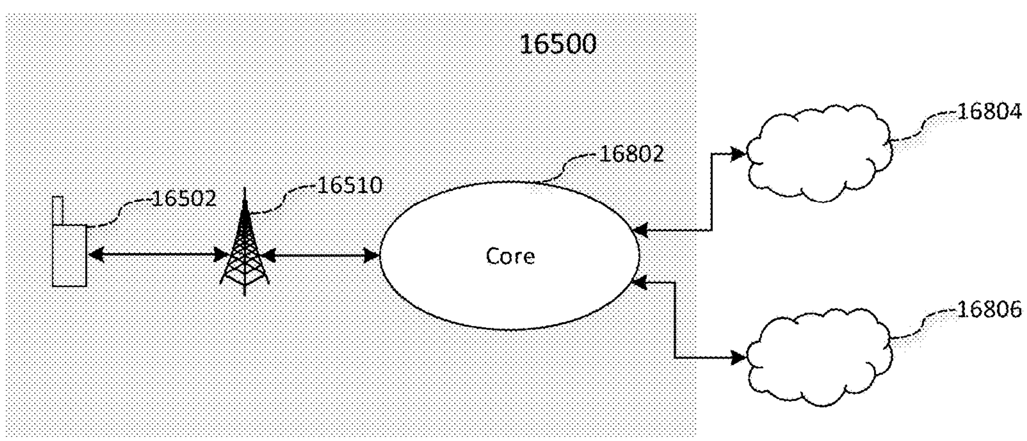
Figure 169:
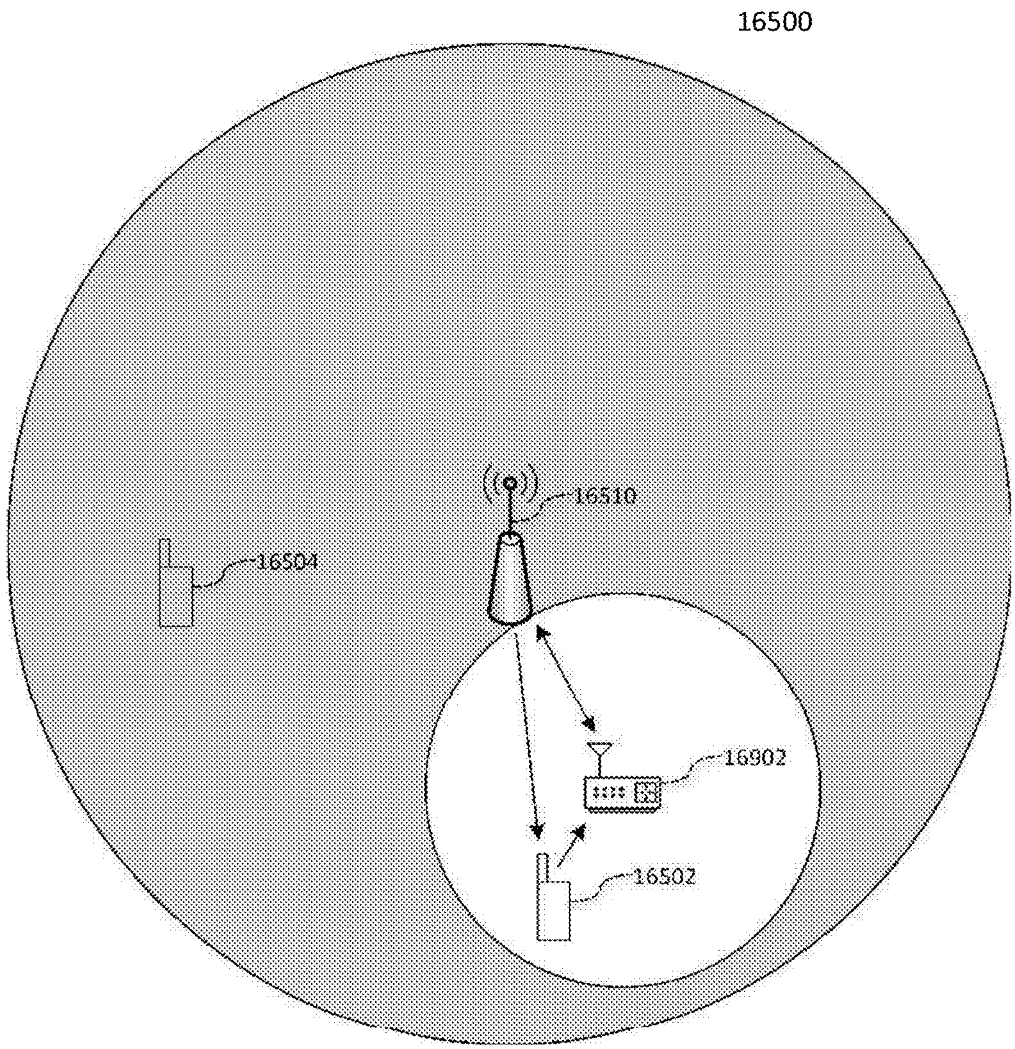
Figure 170:
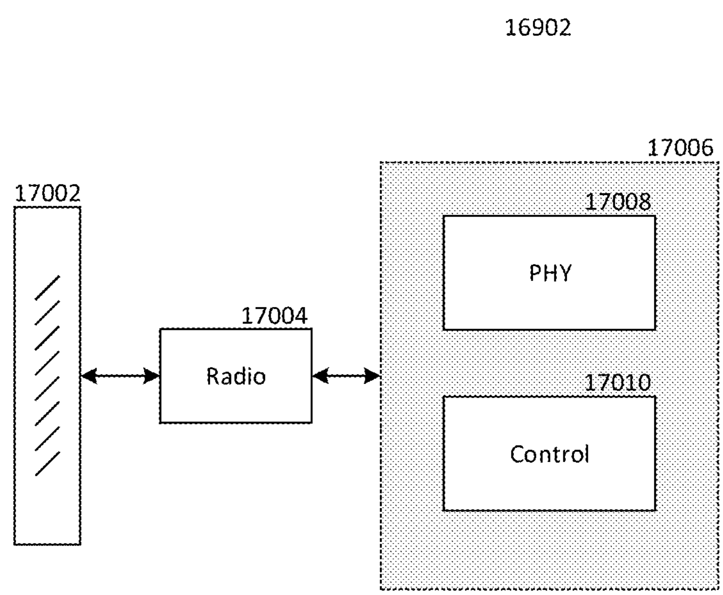
Figure 171:
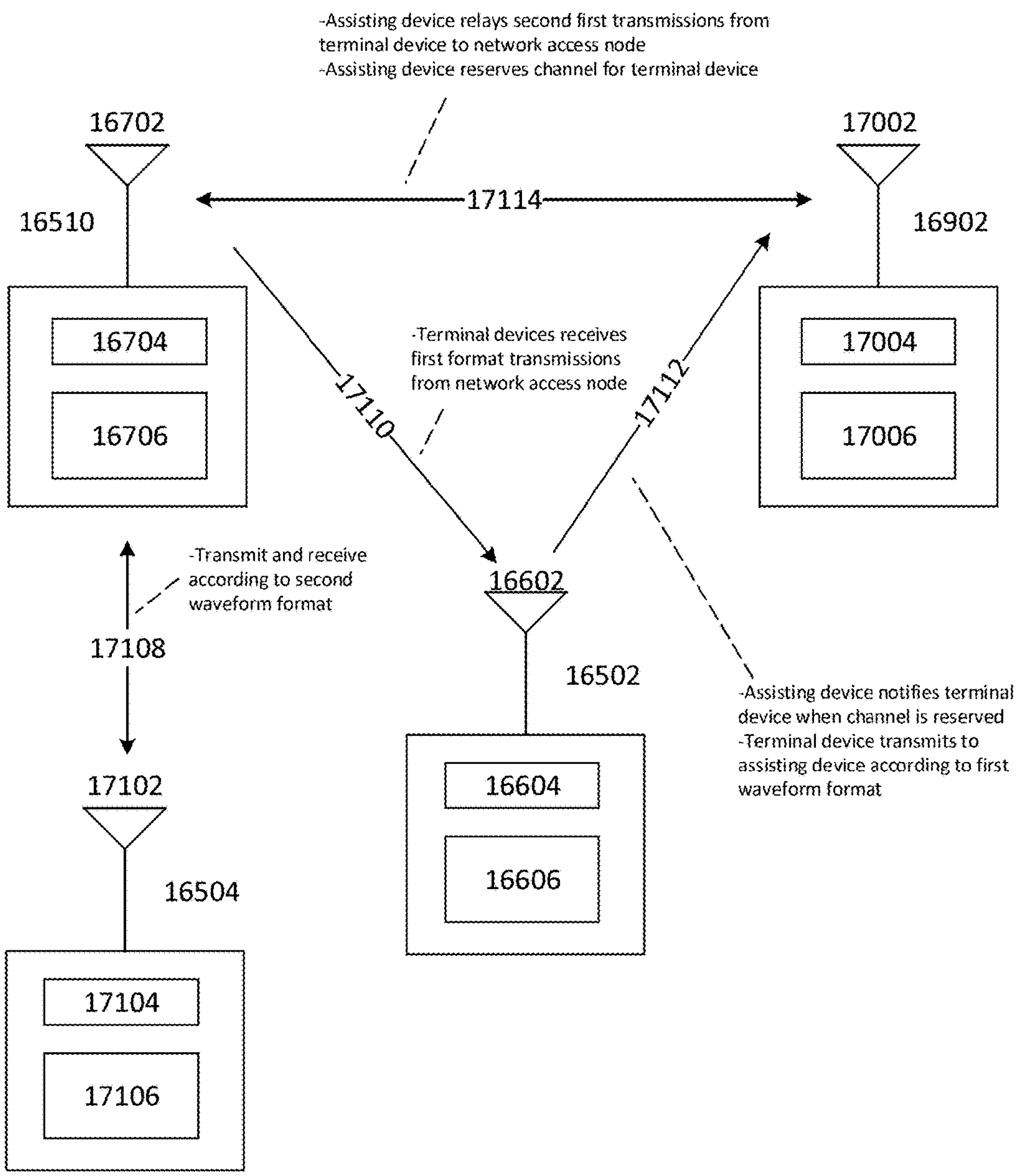
Figure 172:
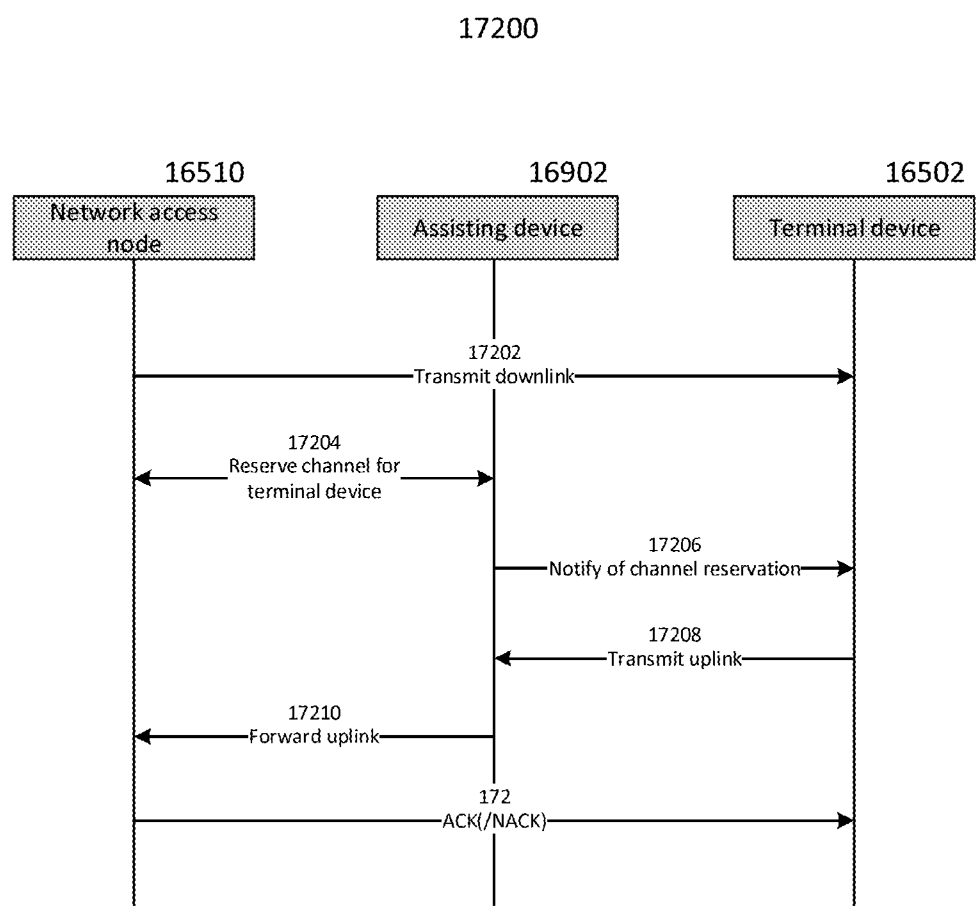
Figure 173:
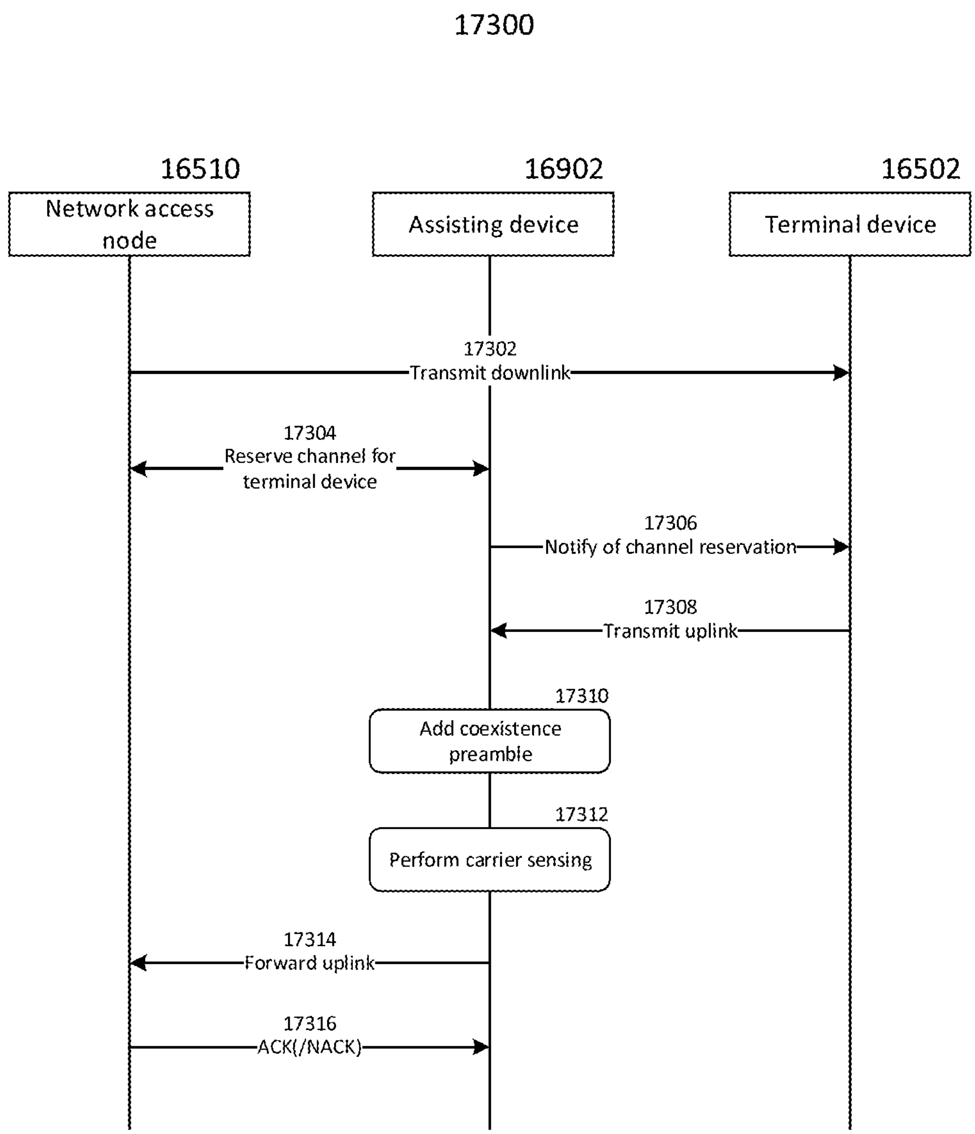
Figure 174:
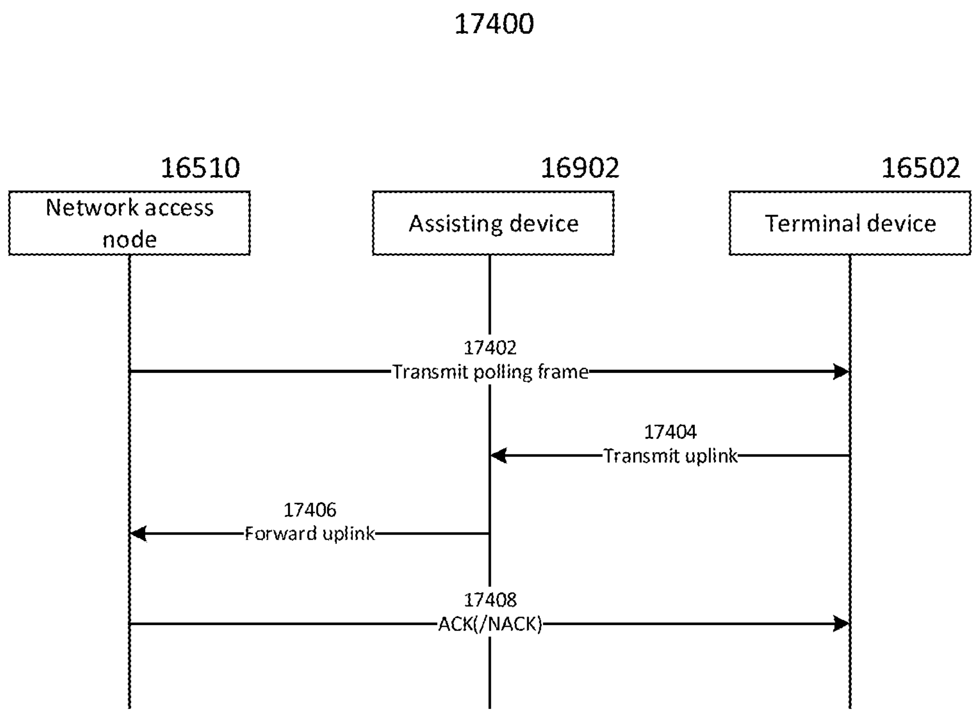
Figure 175:
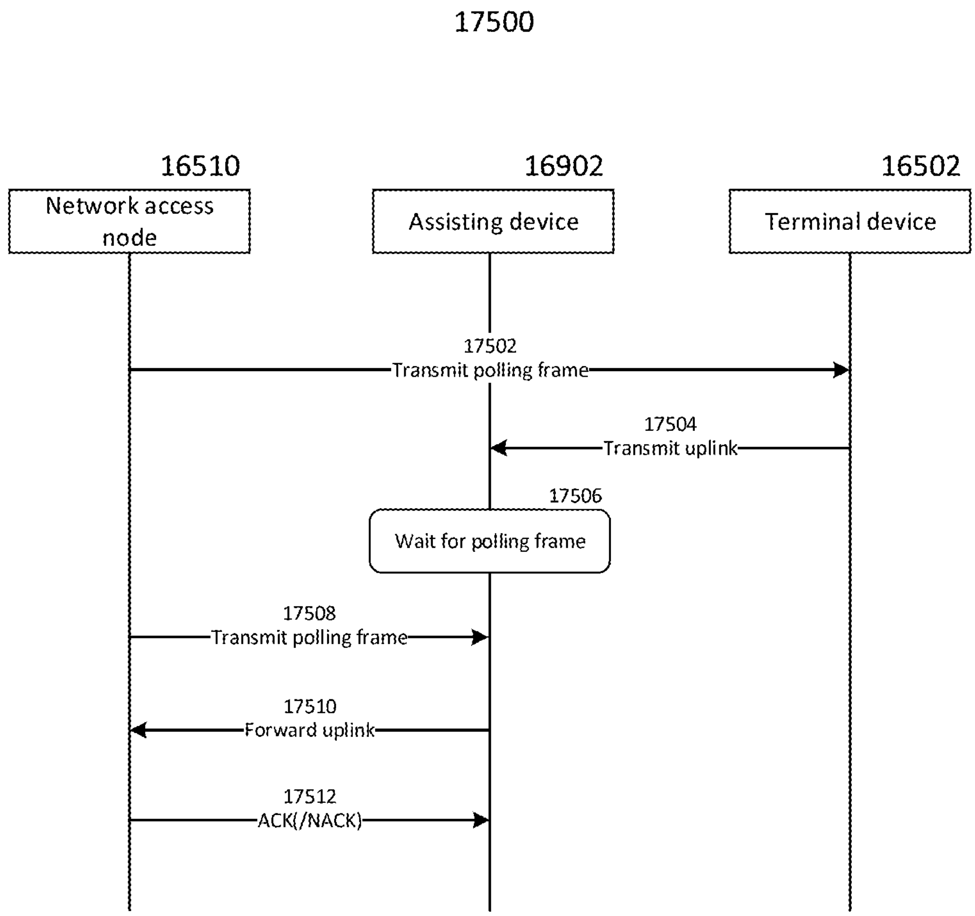
Figure 176:
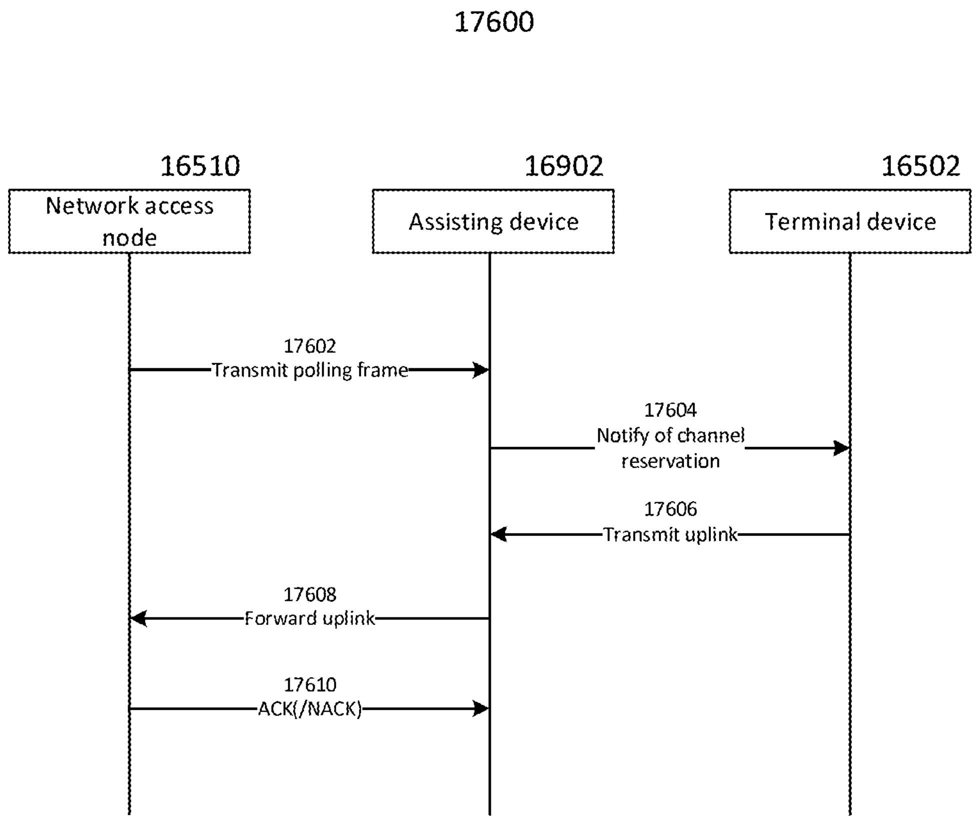
Figure 177:
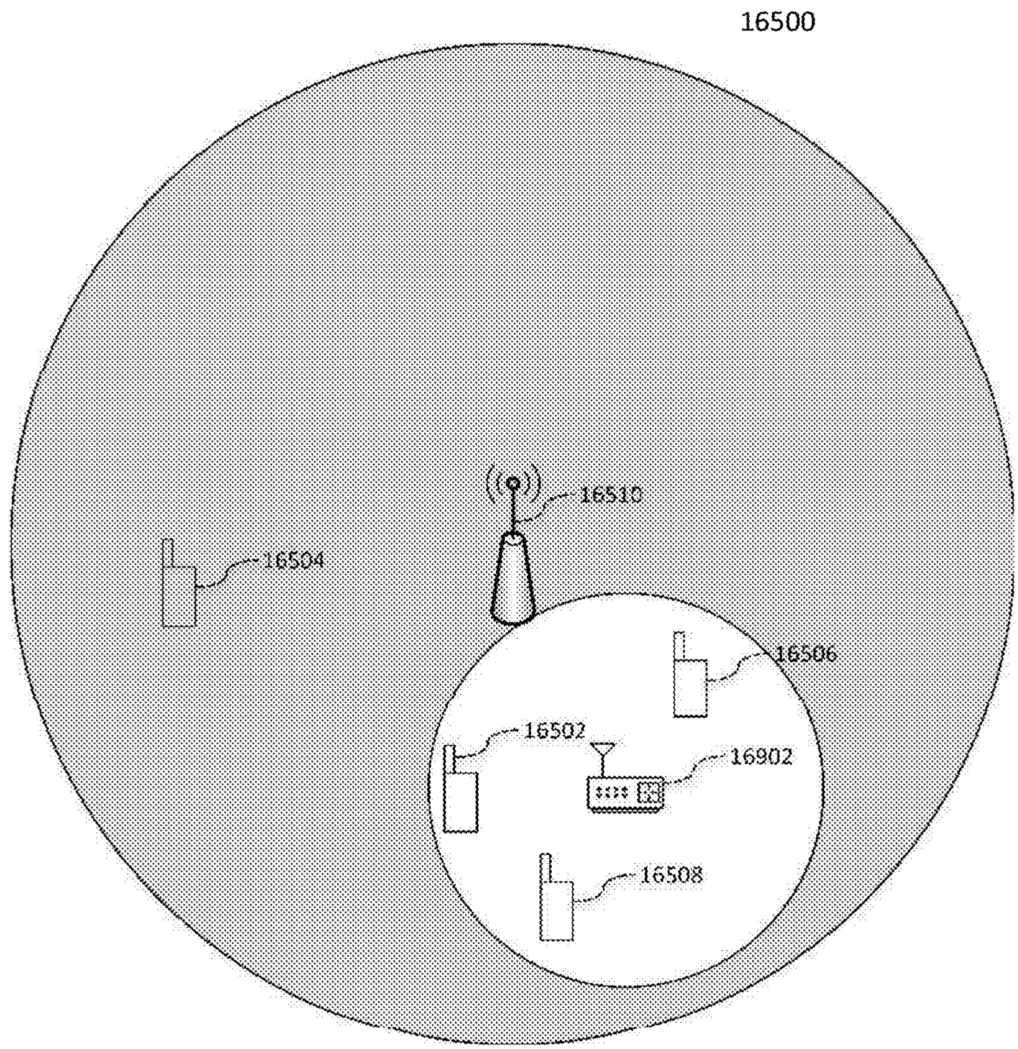
Figure 178:
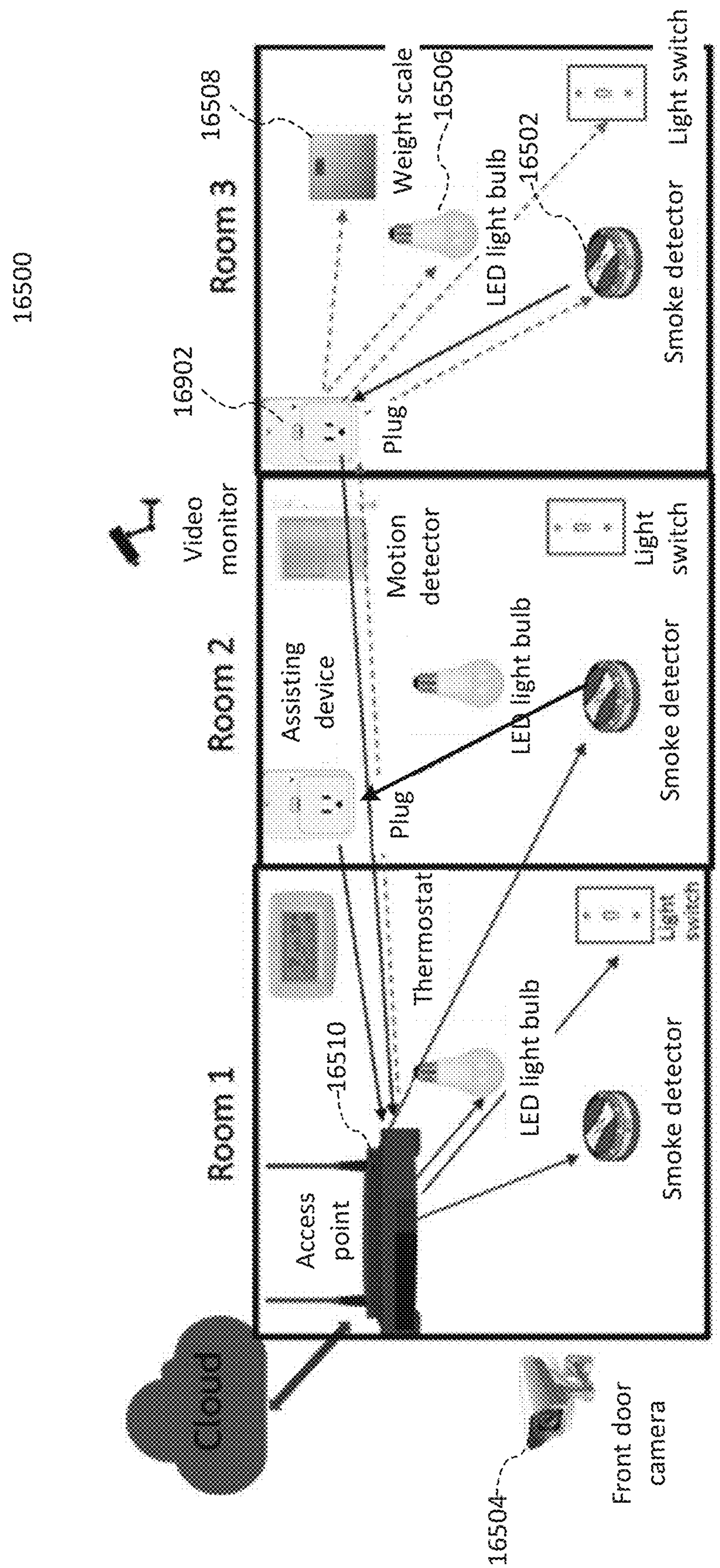
Figure 179:
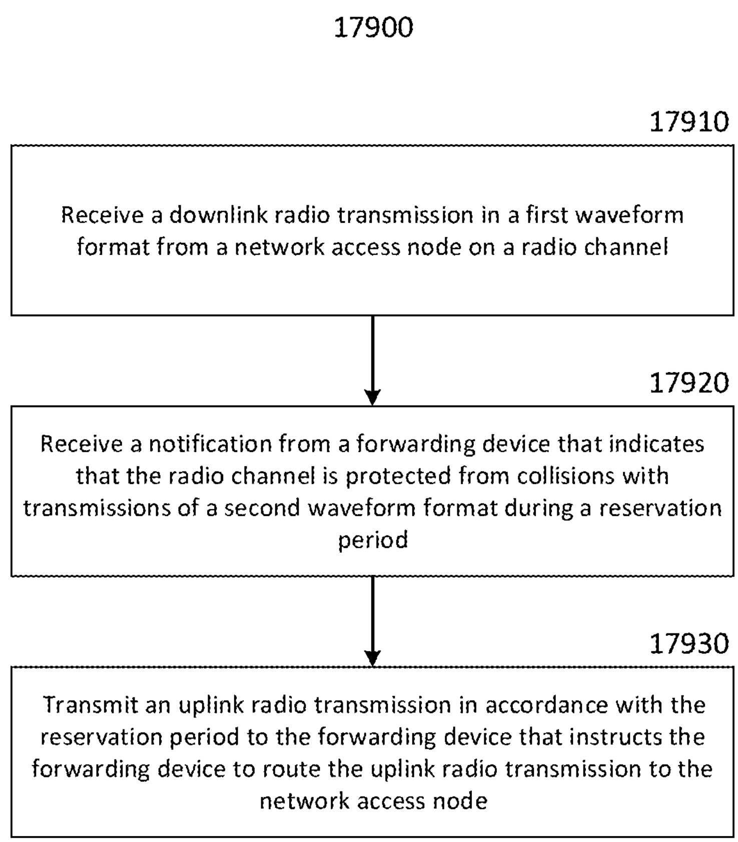
Figure 180:
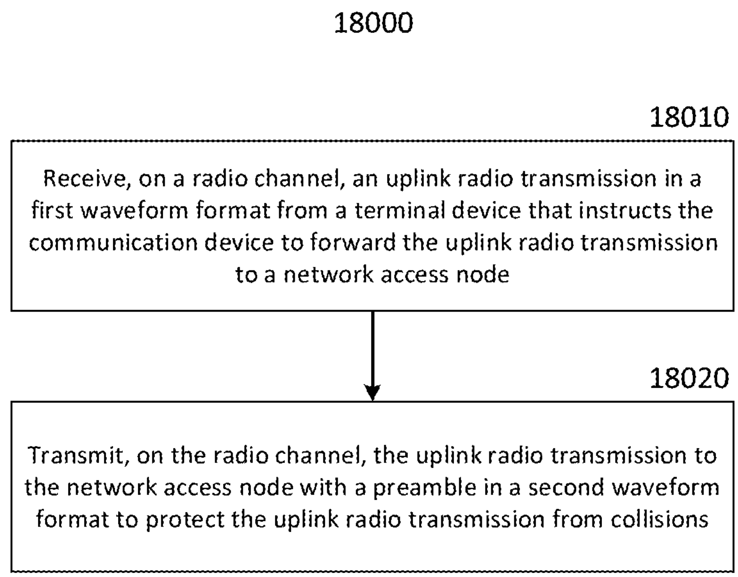
Figure 181:
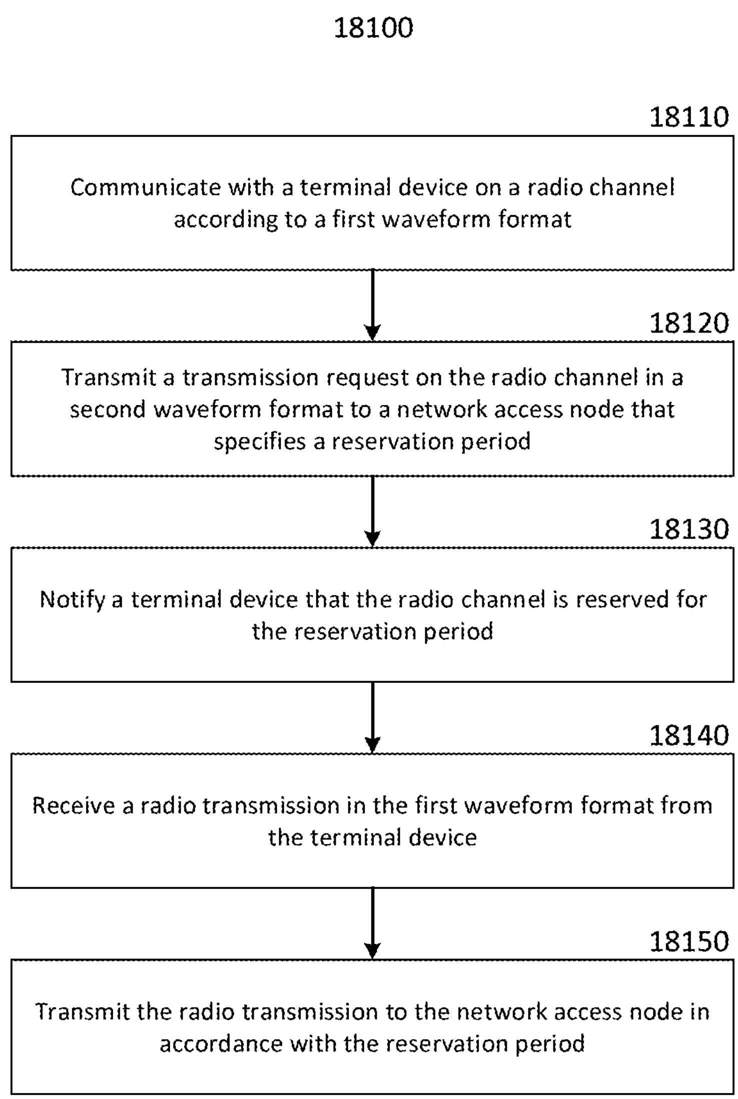
Figure 182:
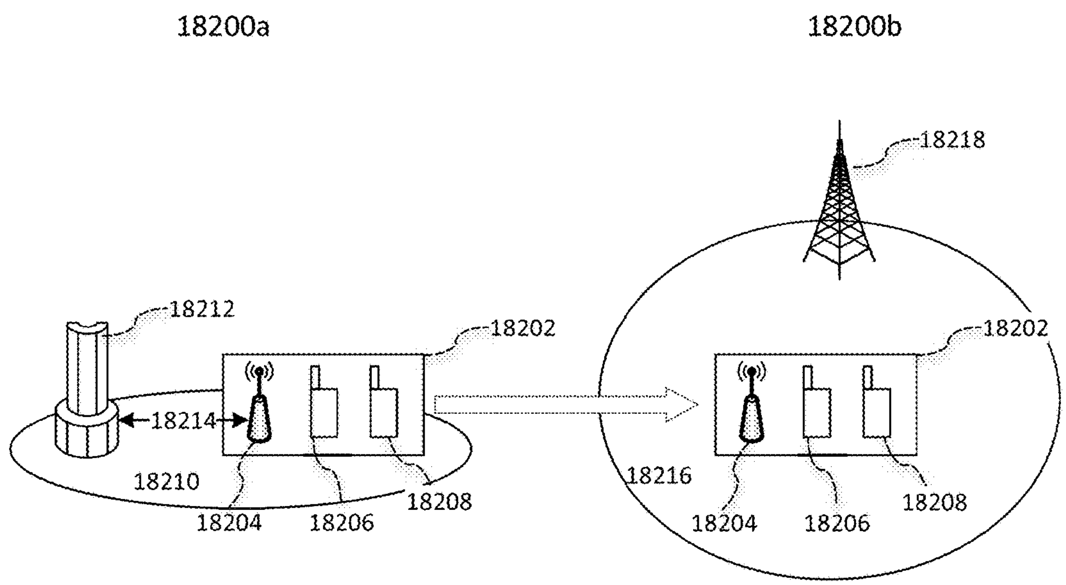
Figure 183:
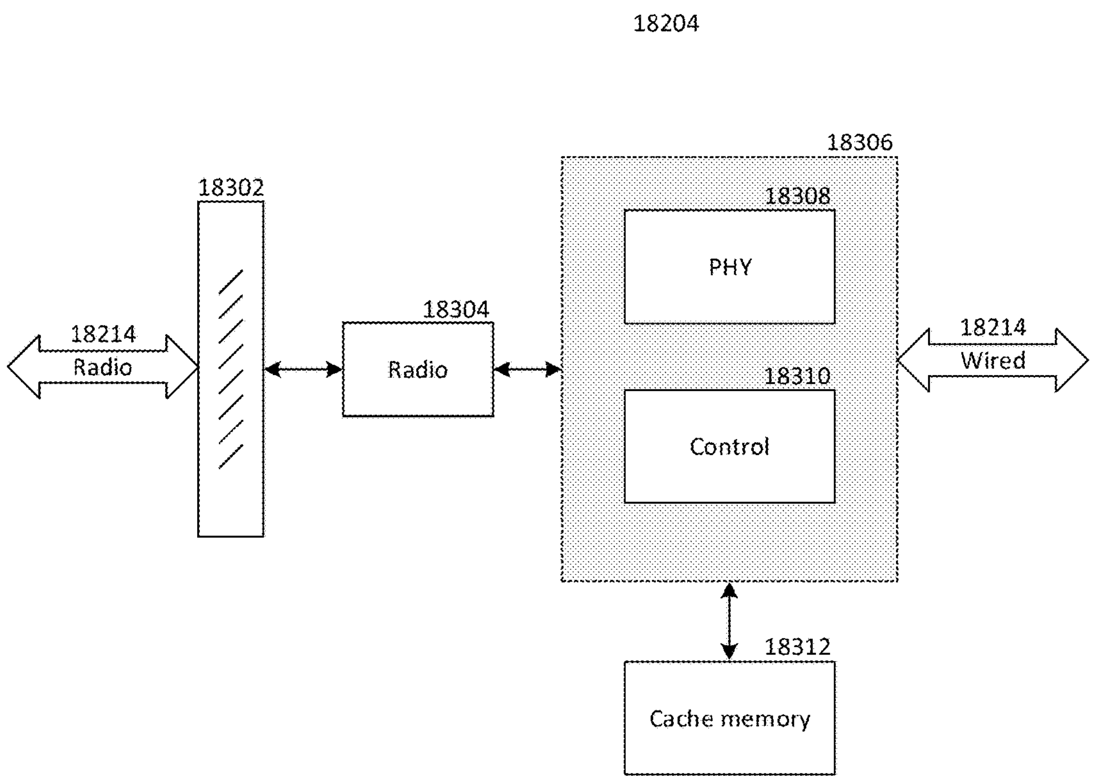
Figure 184:
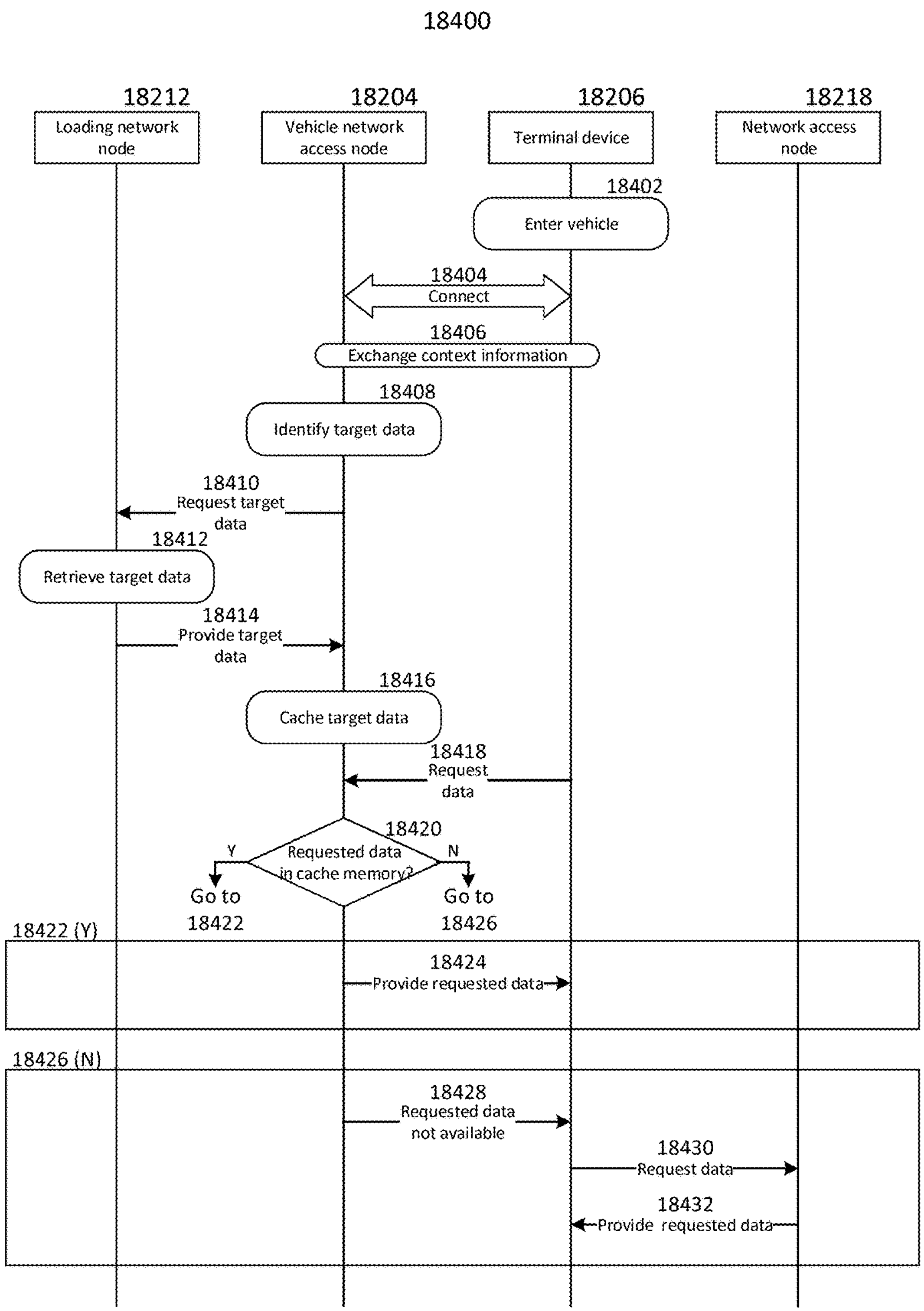
Figure 185:
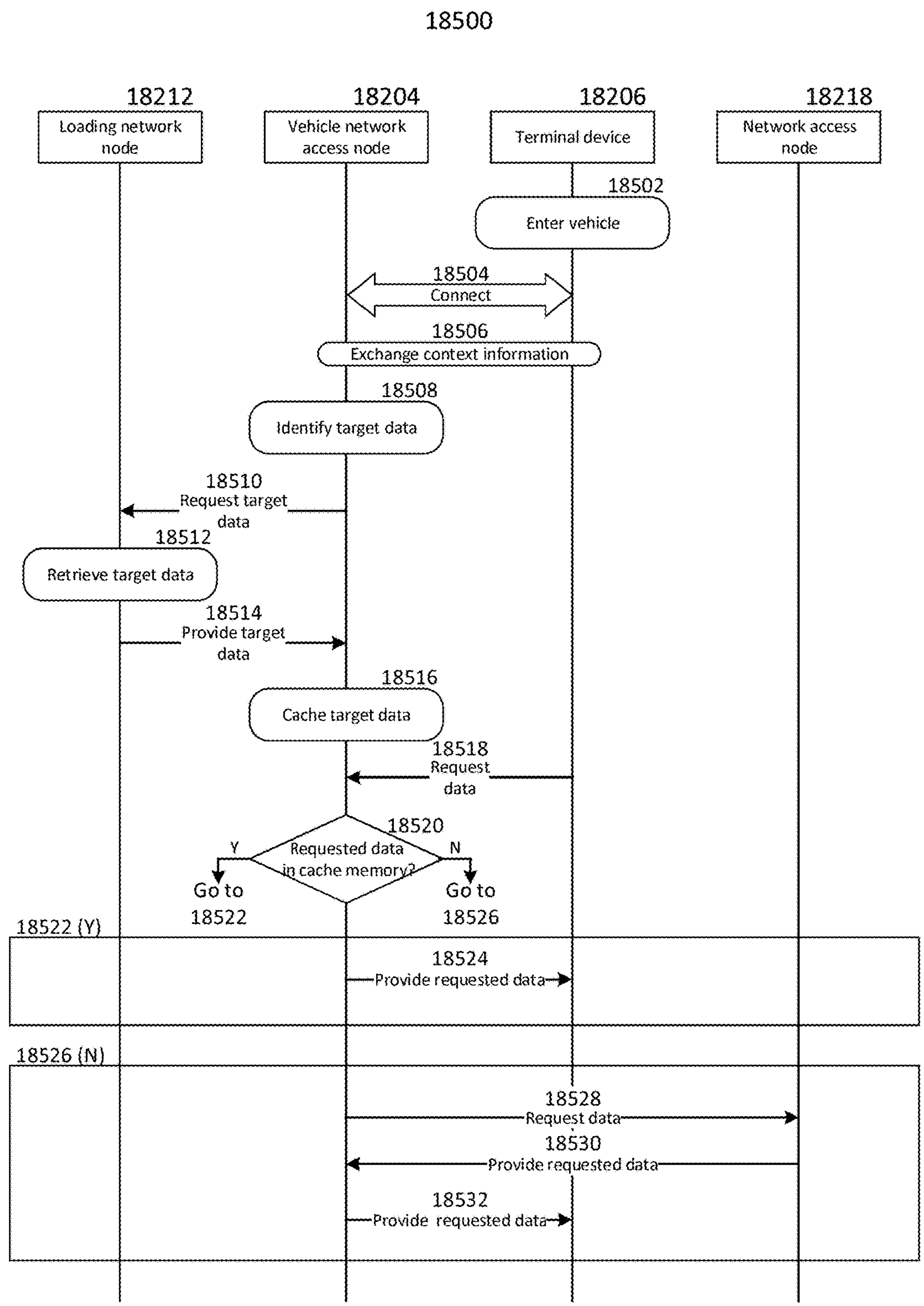
Figure 186:
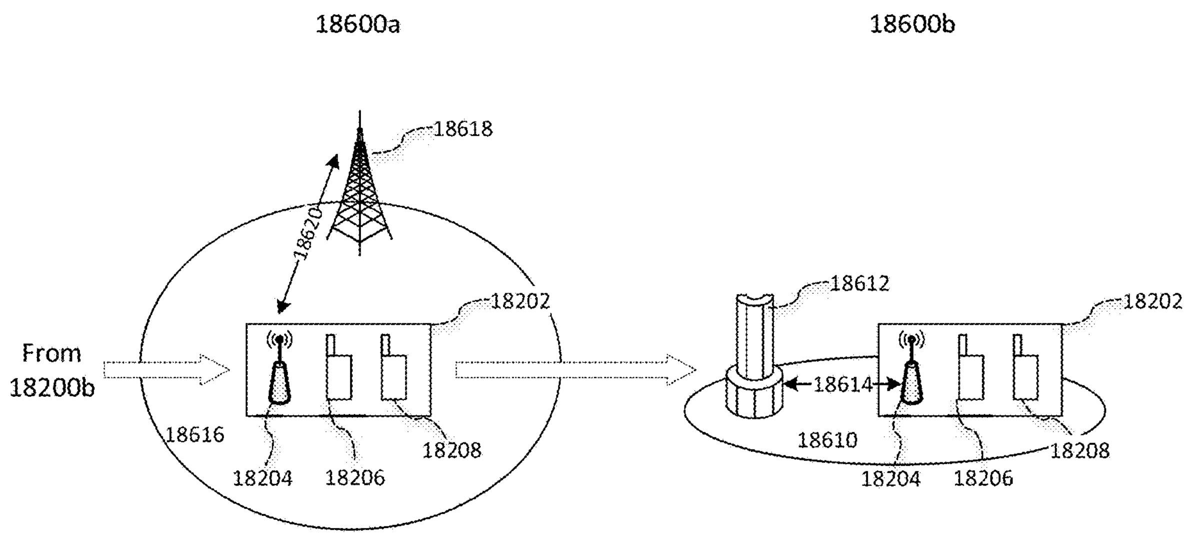
Figure 187:
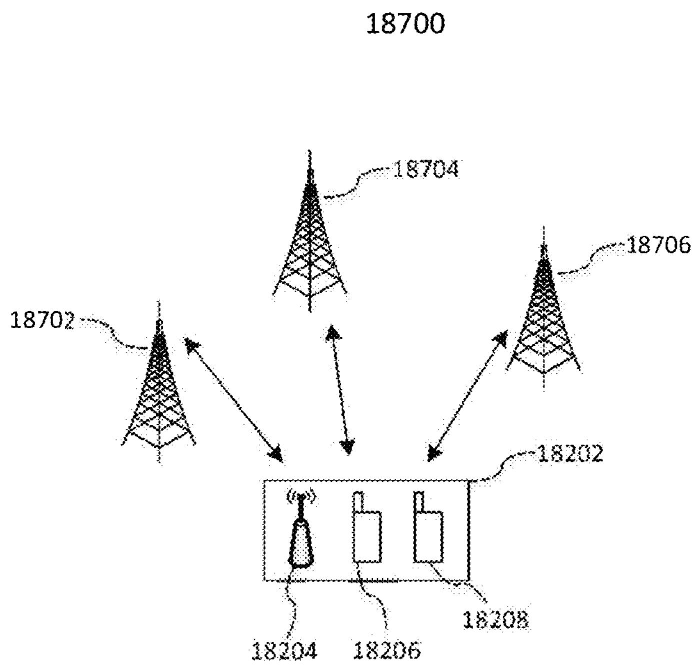
Figure 188:
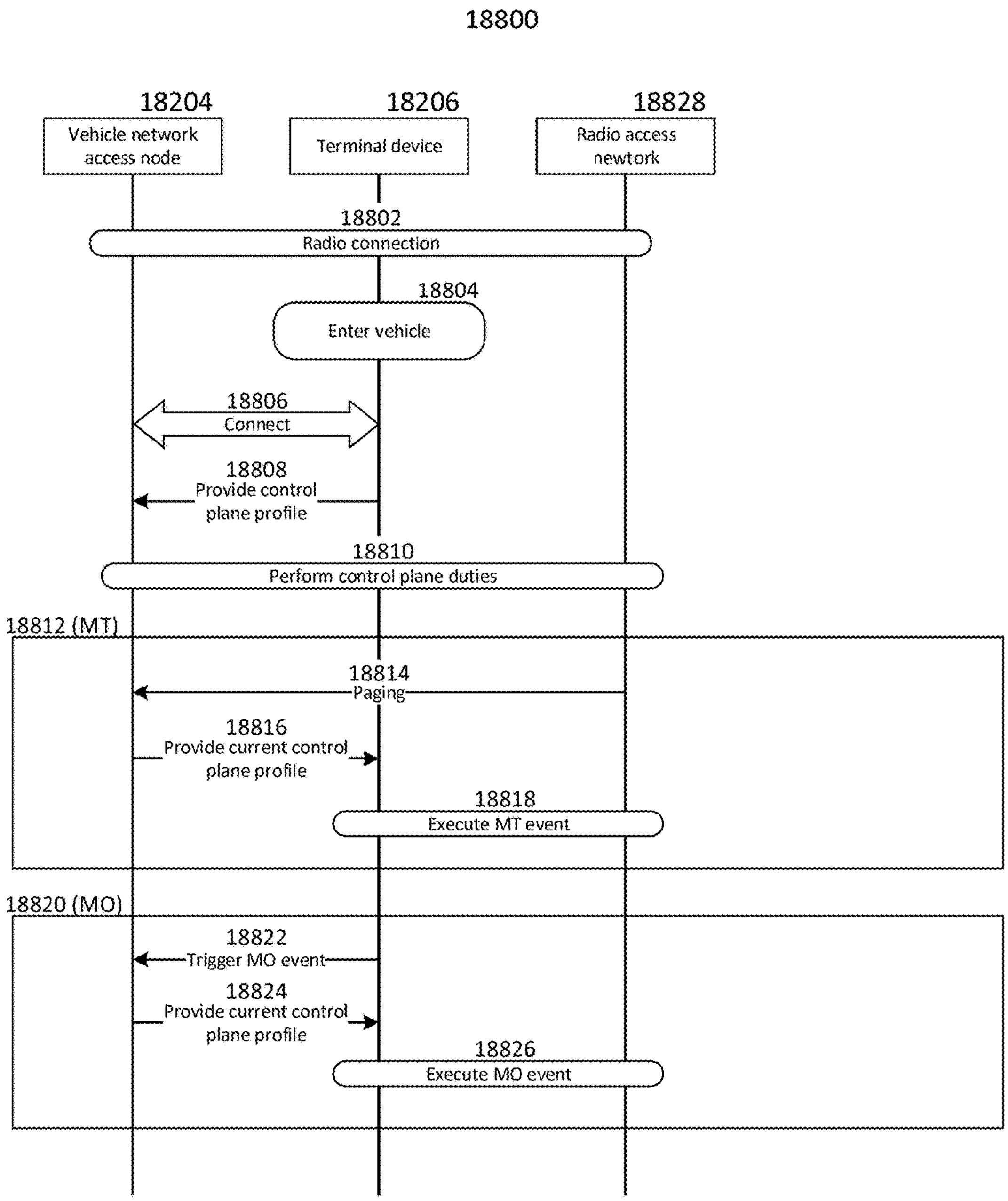
Figure 189:
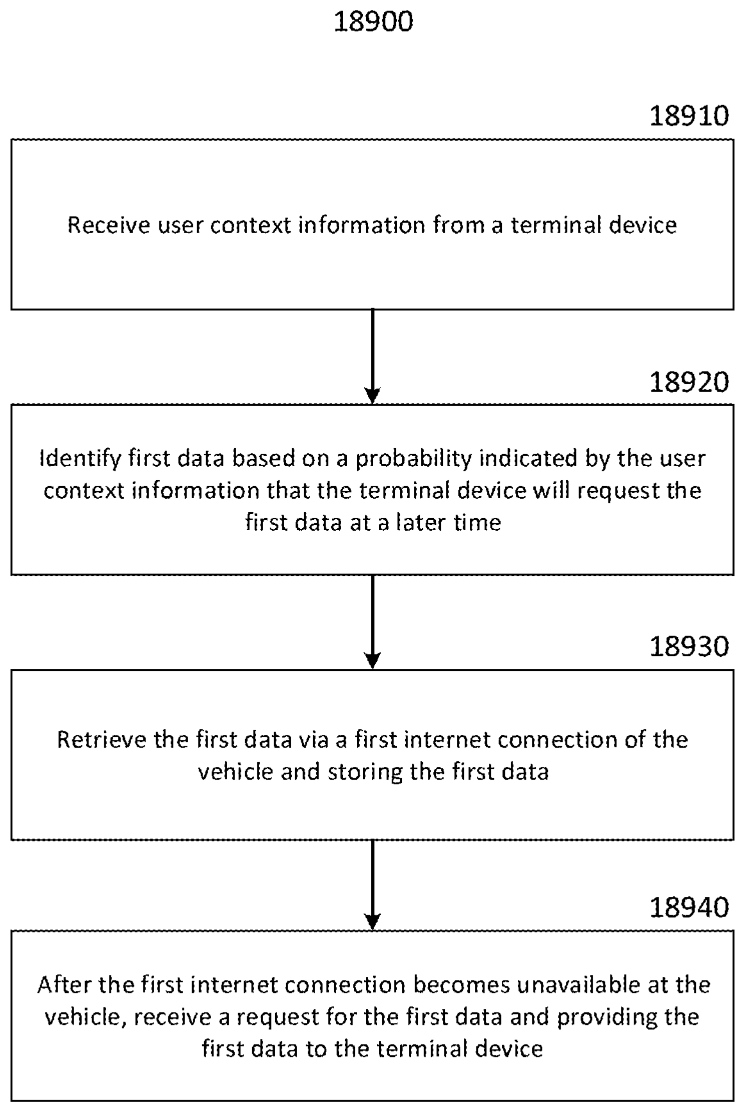
Figure 190:
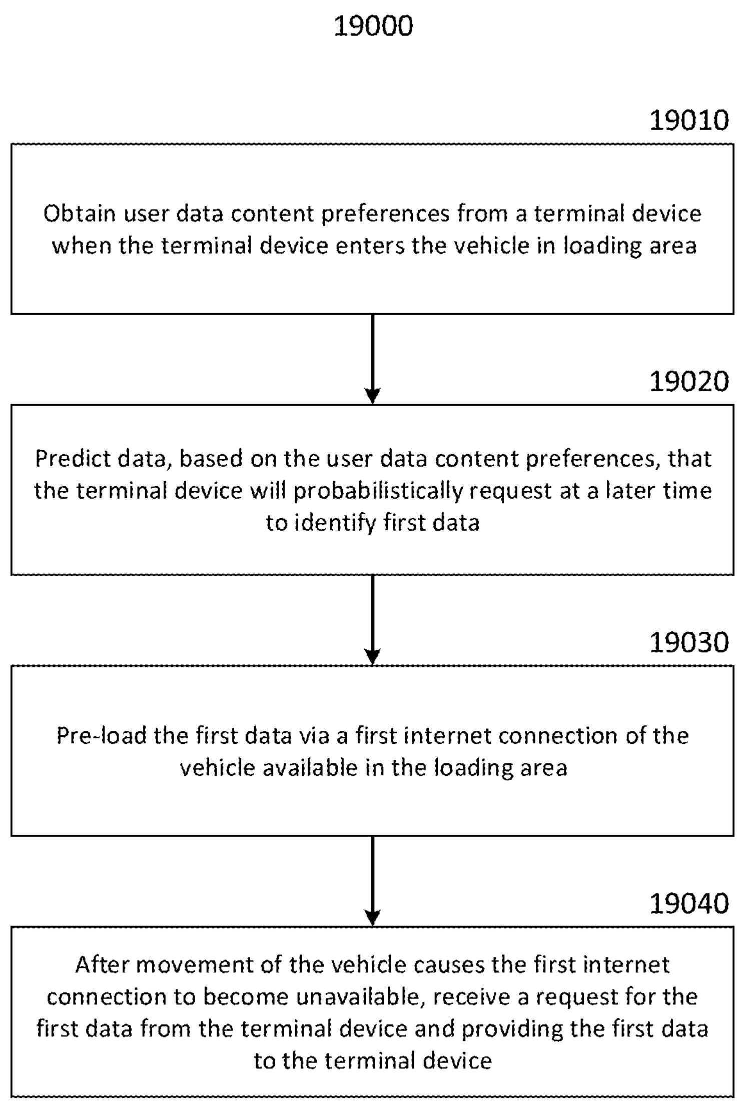
Figure 191:
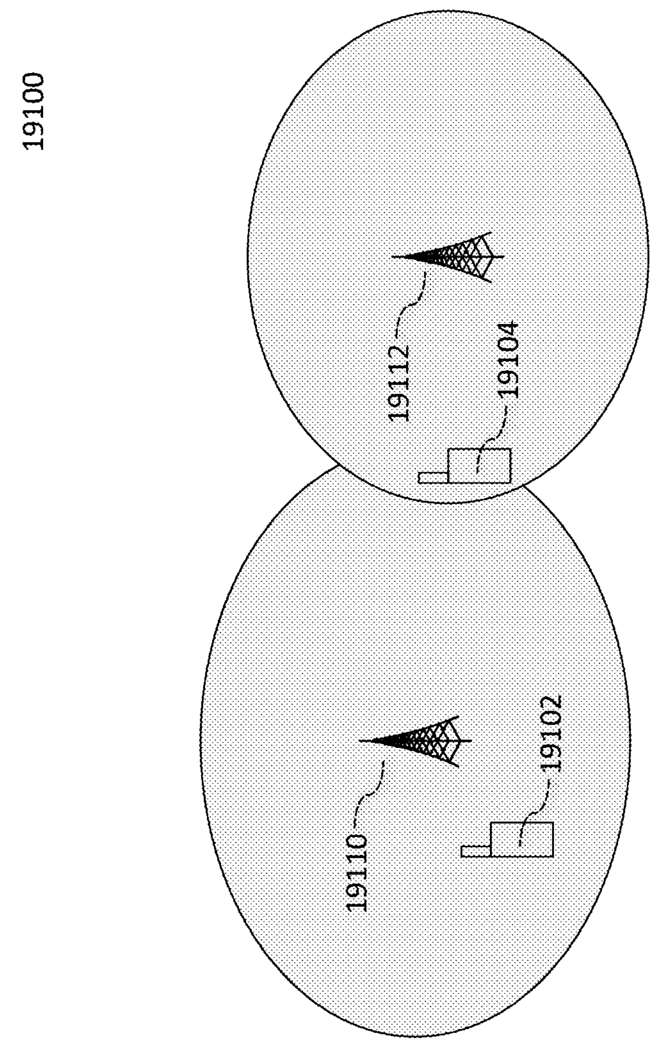
Figure 192:
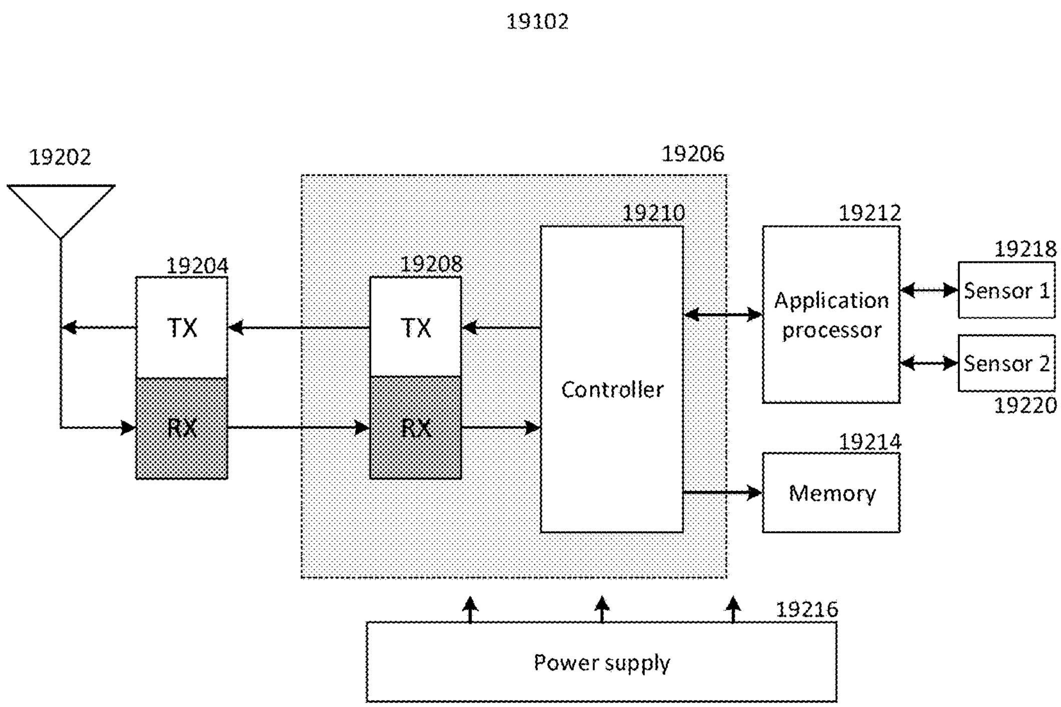
Figure 193:
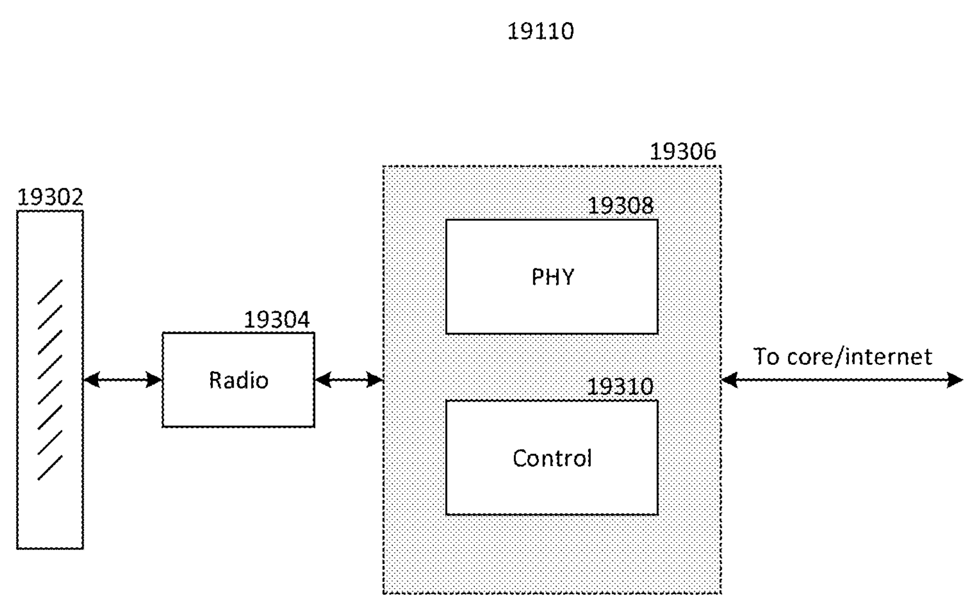
Figure 194:
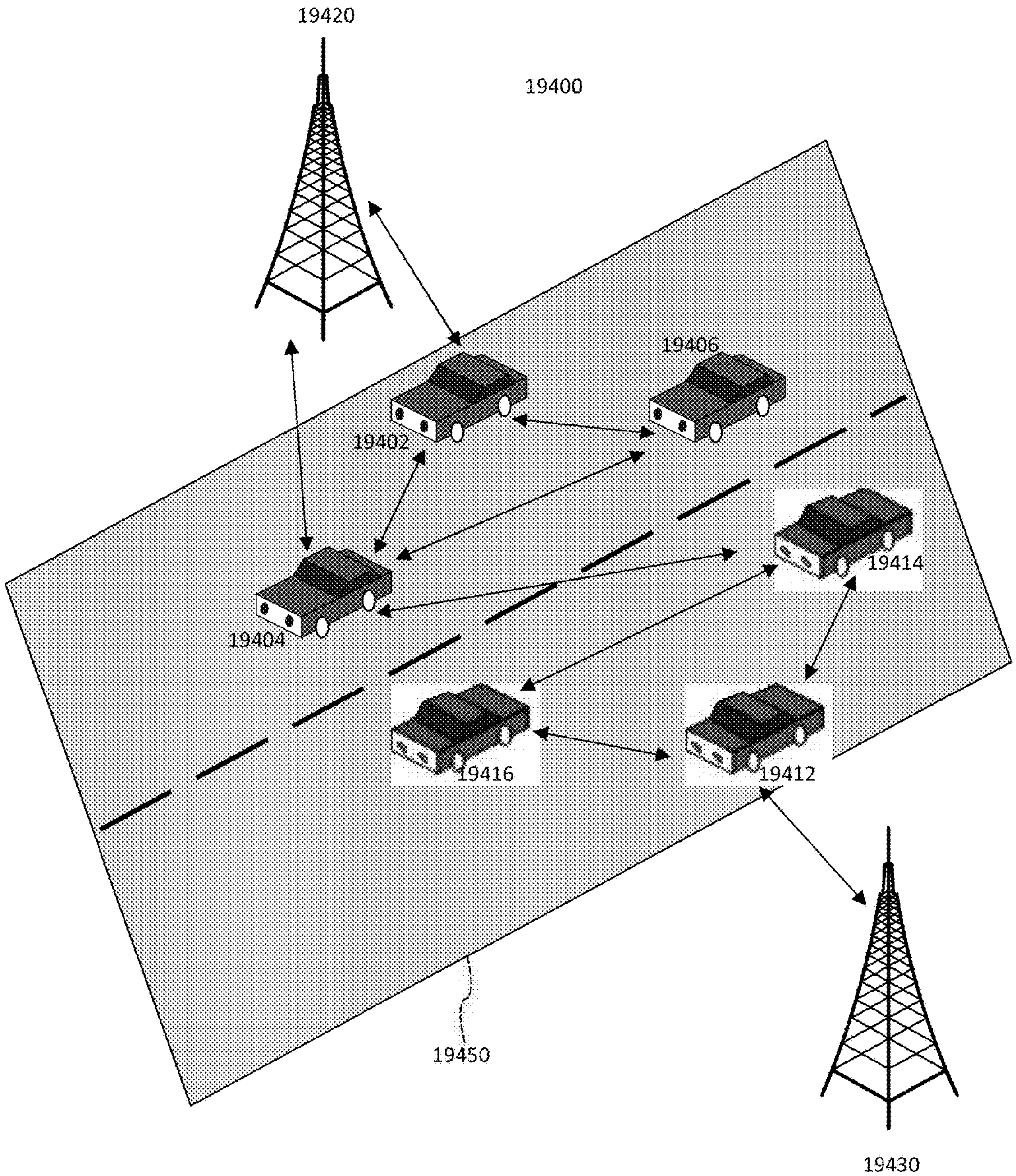
Figure 195:
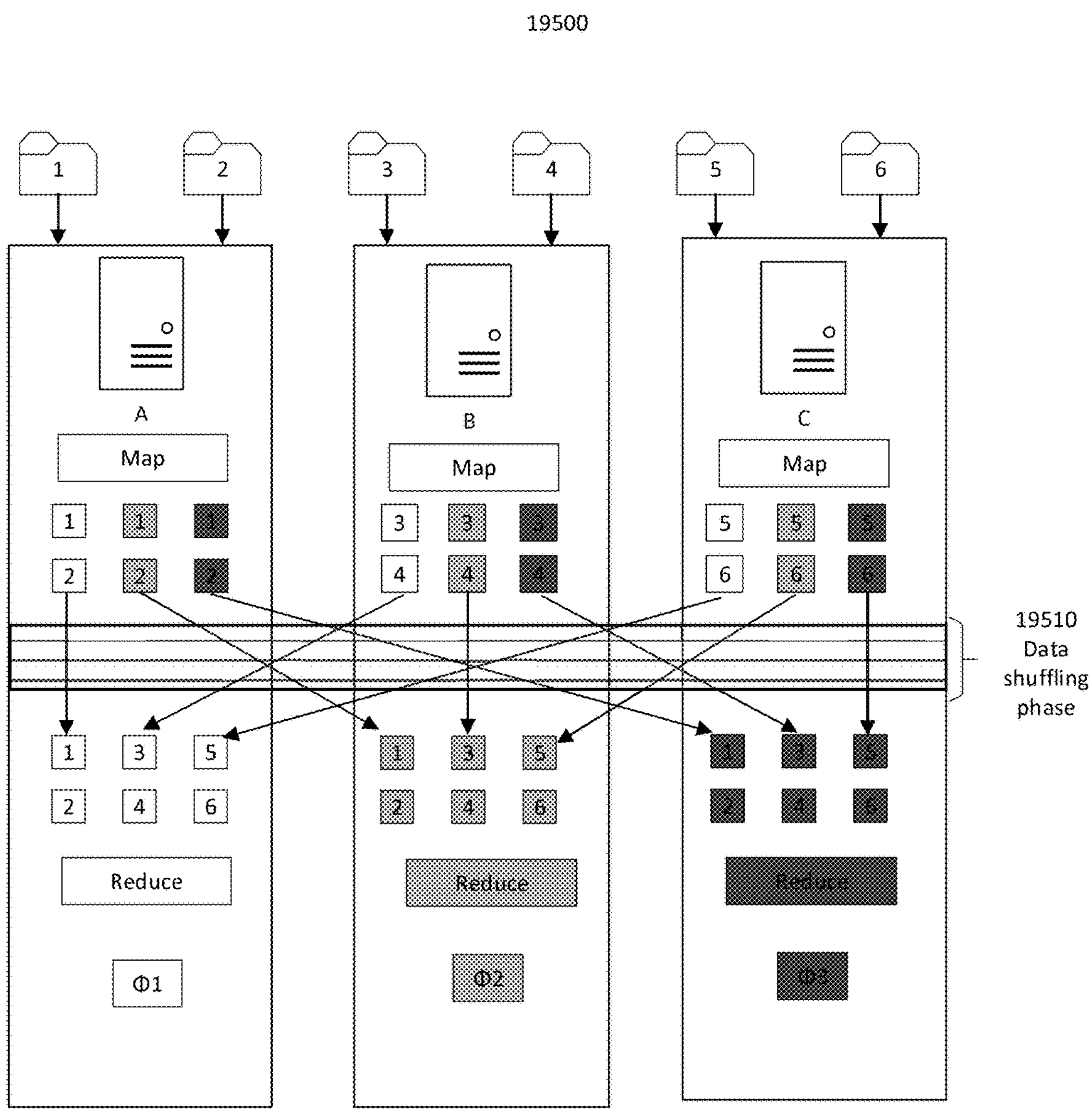
Figure 196:
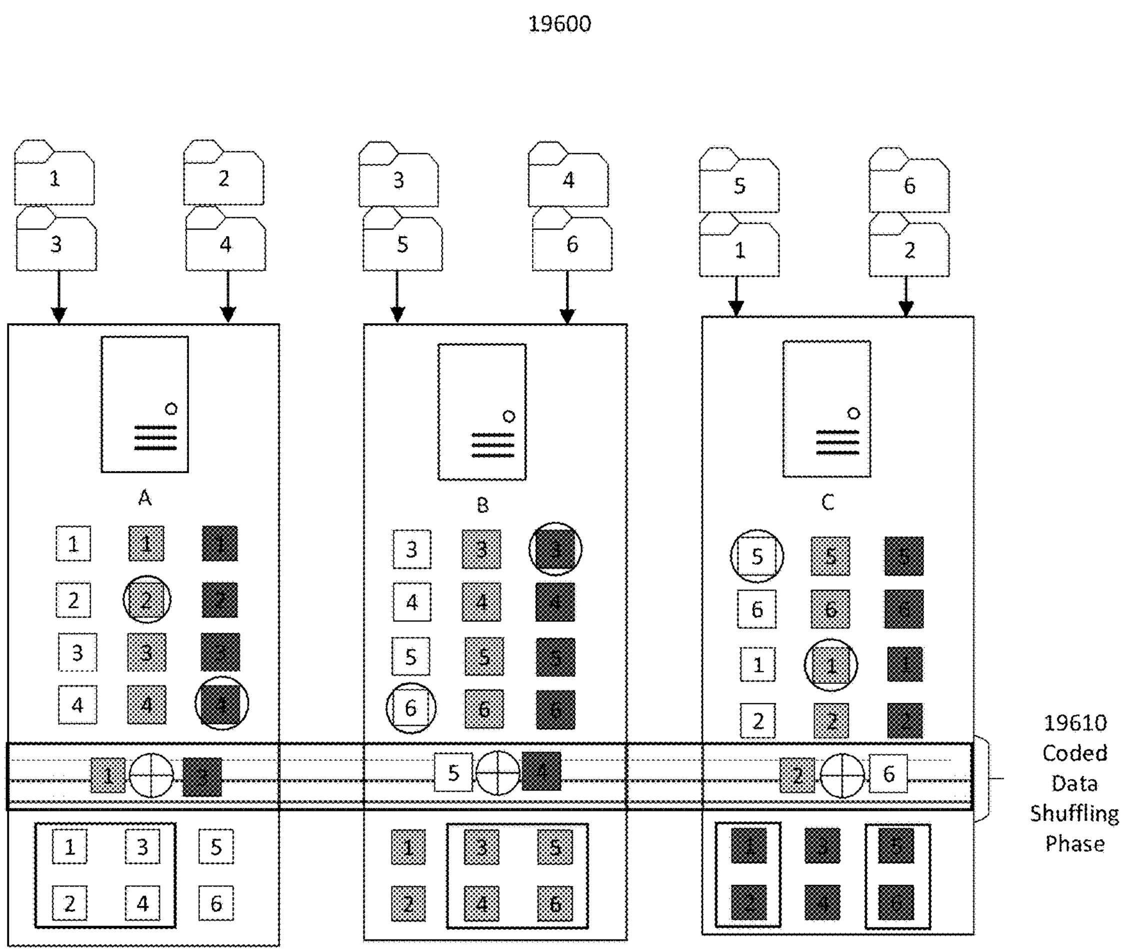
Figure 197:
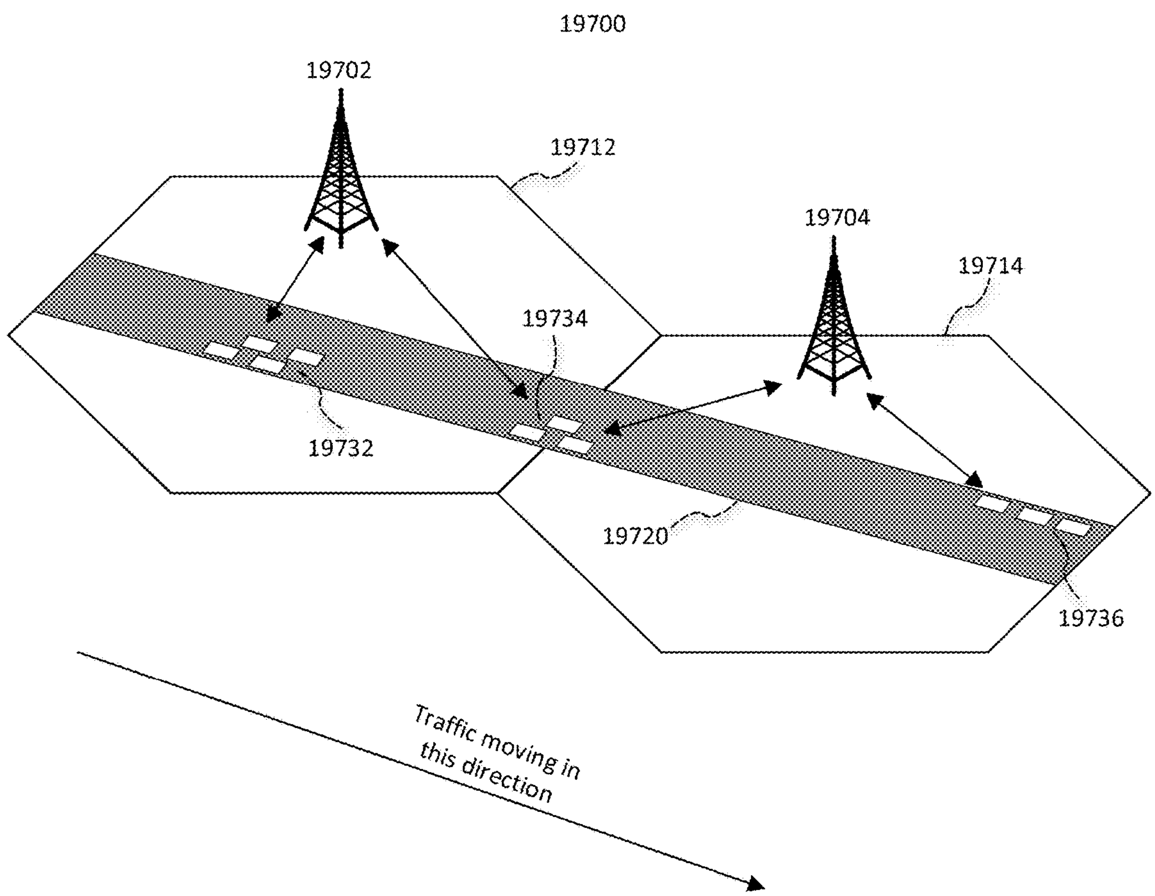
Figure 198:
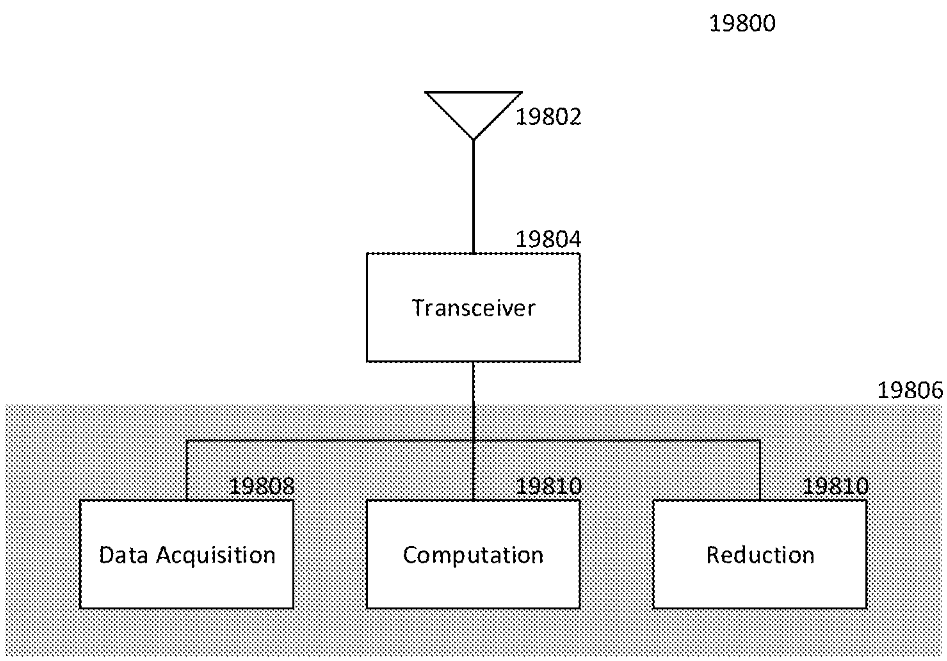
Figure 199:
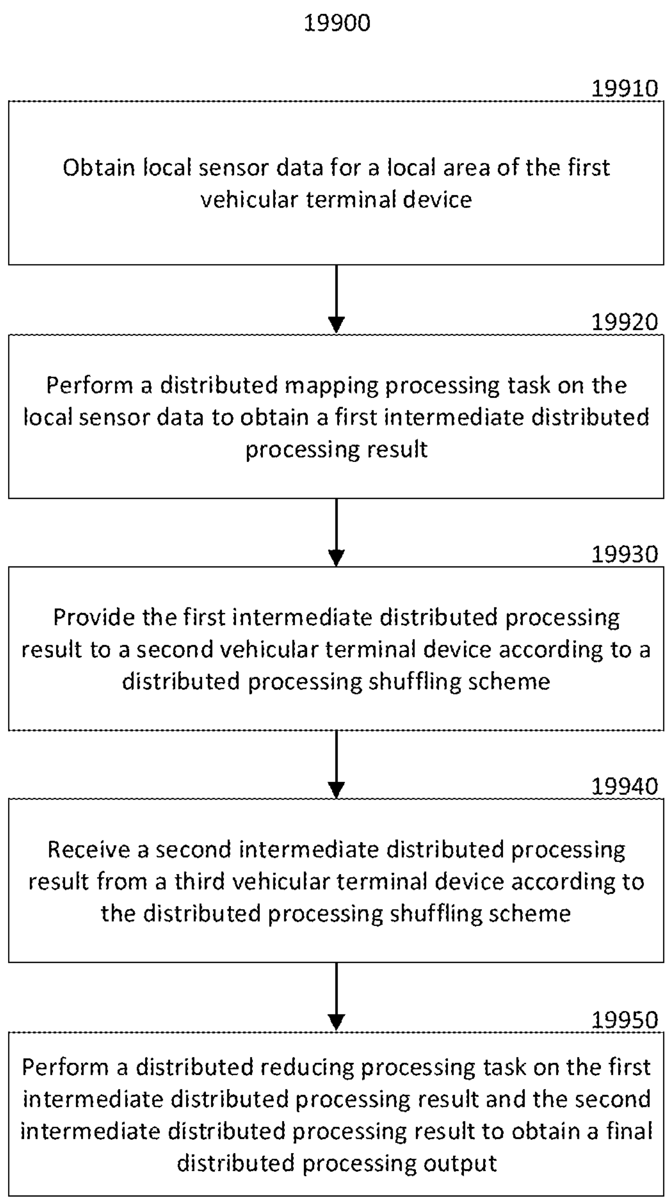
Figure 200:
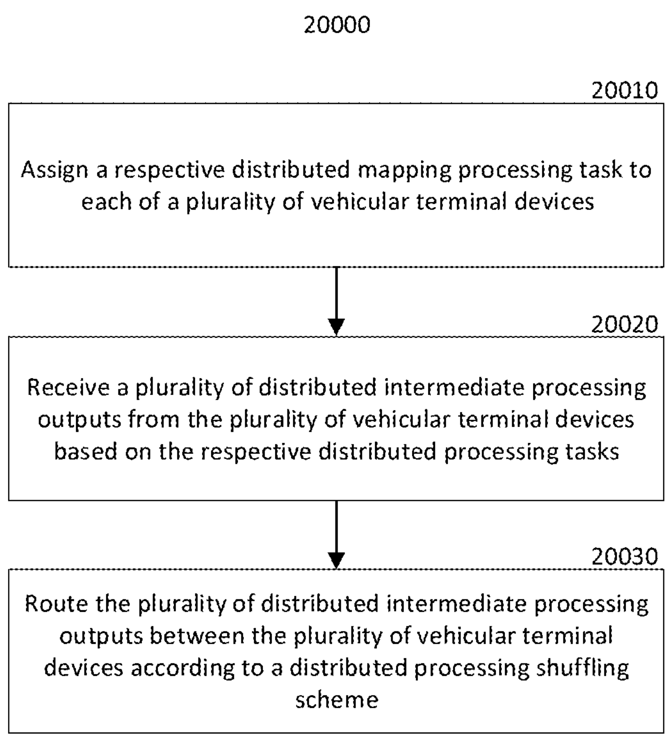
Figure 201:
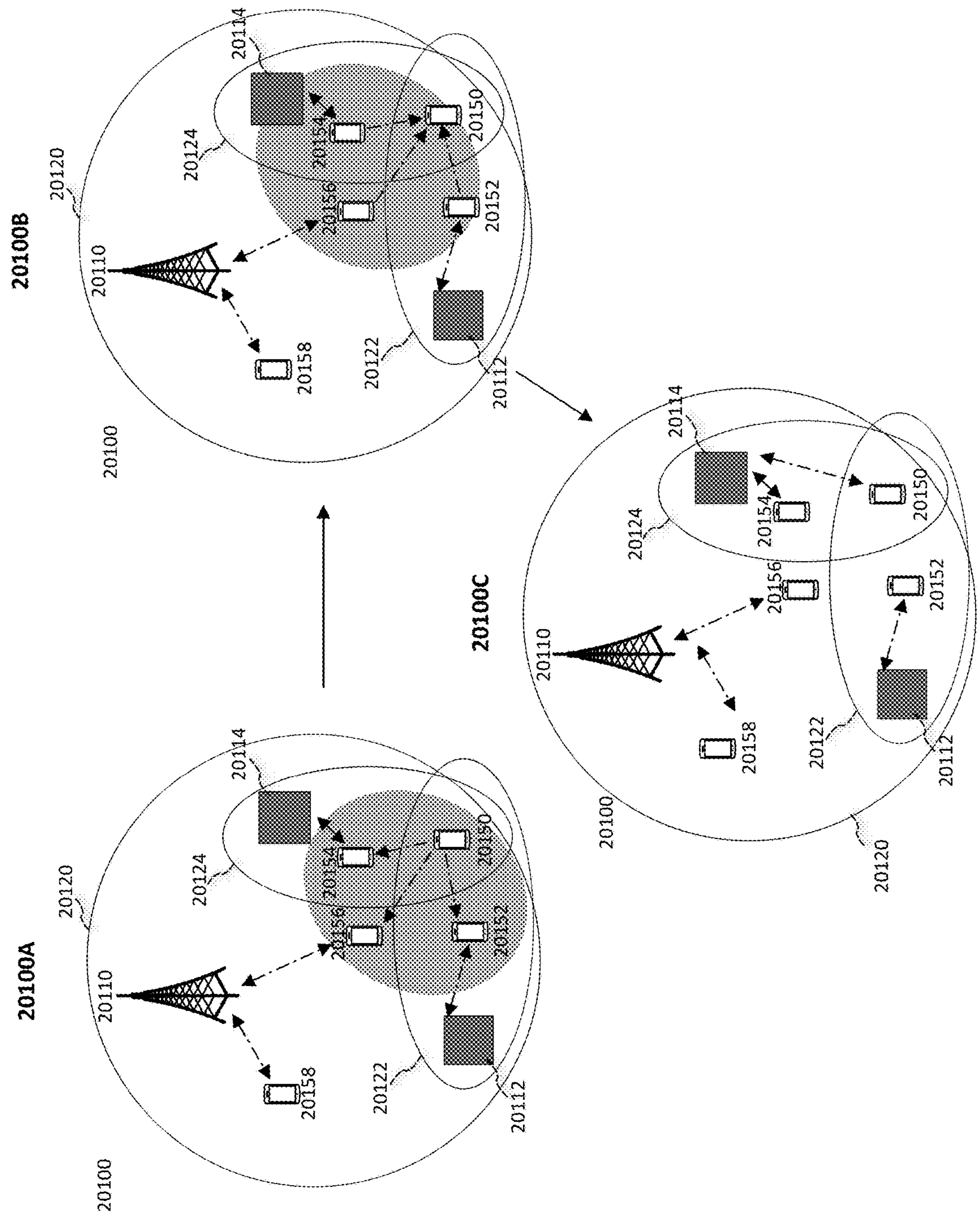
Figure 202:
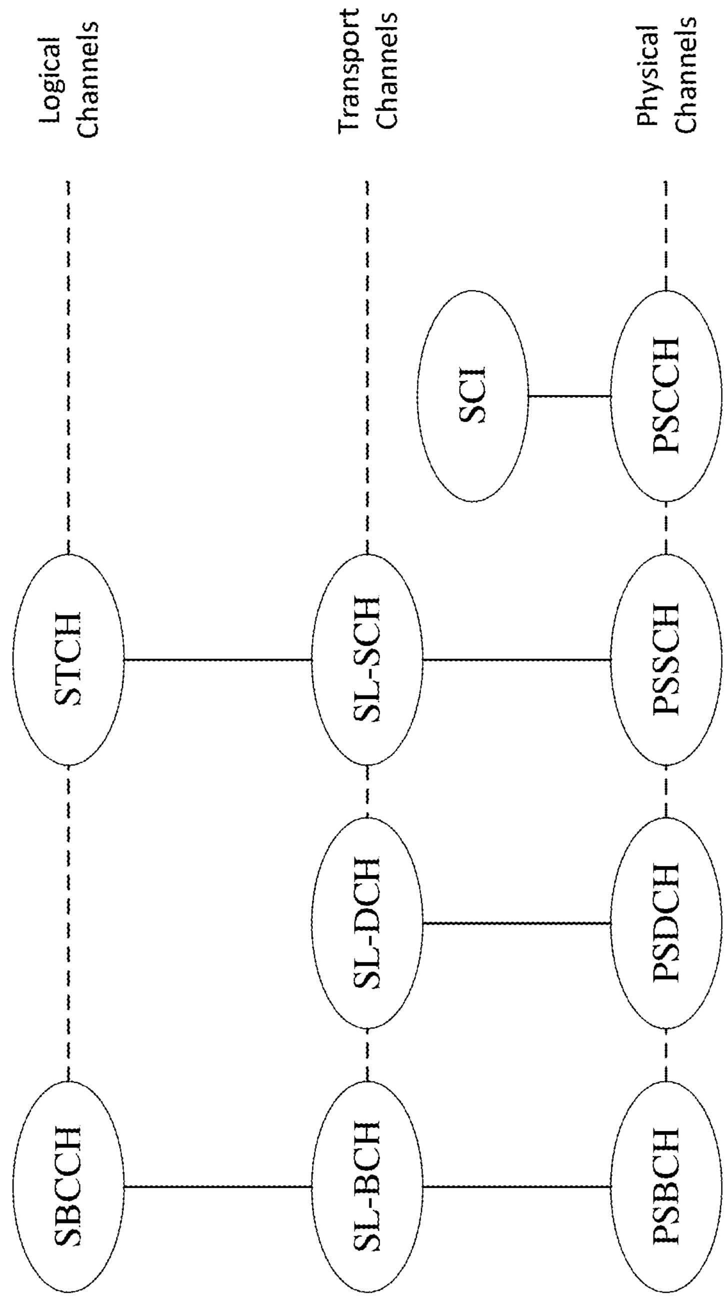
Figure 203:
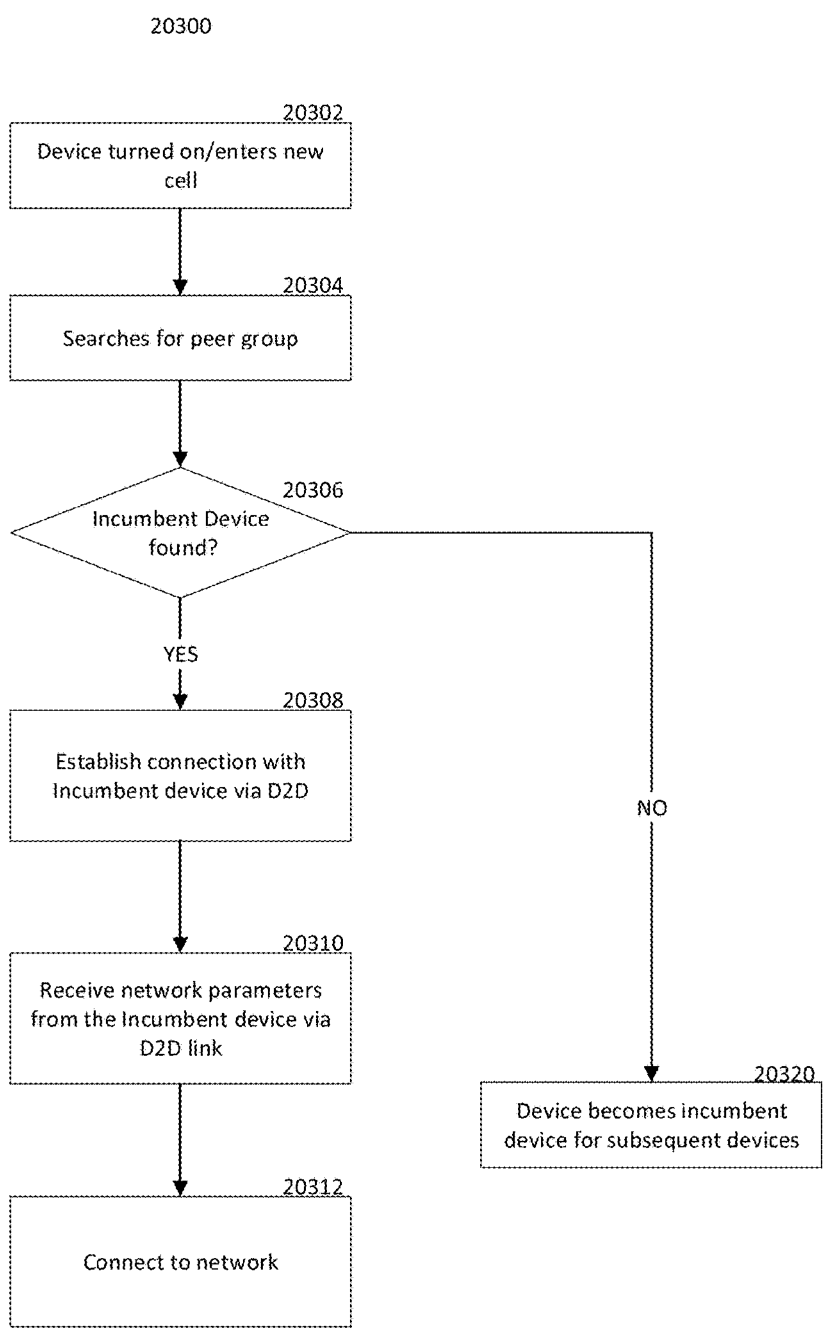
Figure 204:
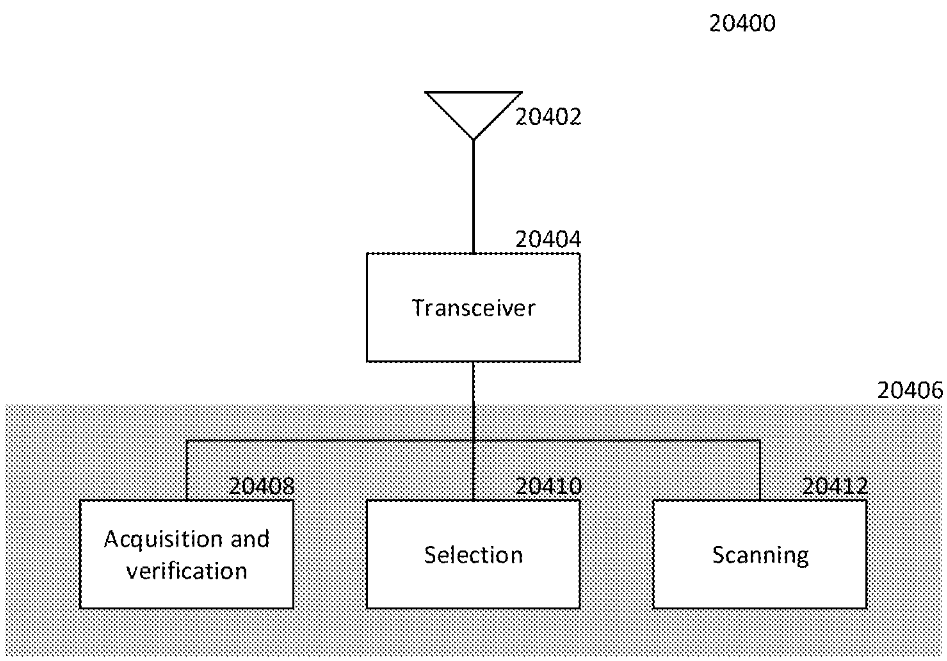
Figure 205:
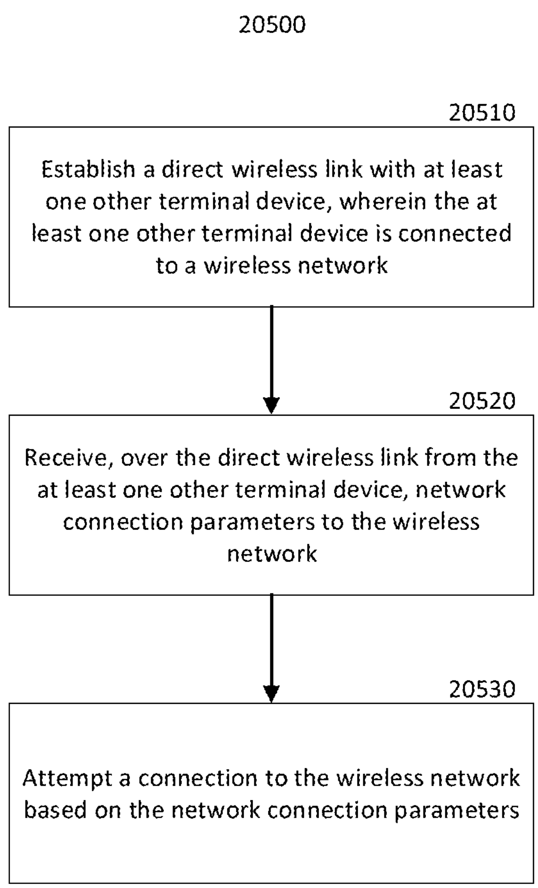
Figure 206:
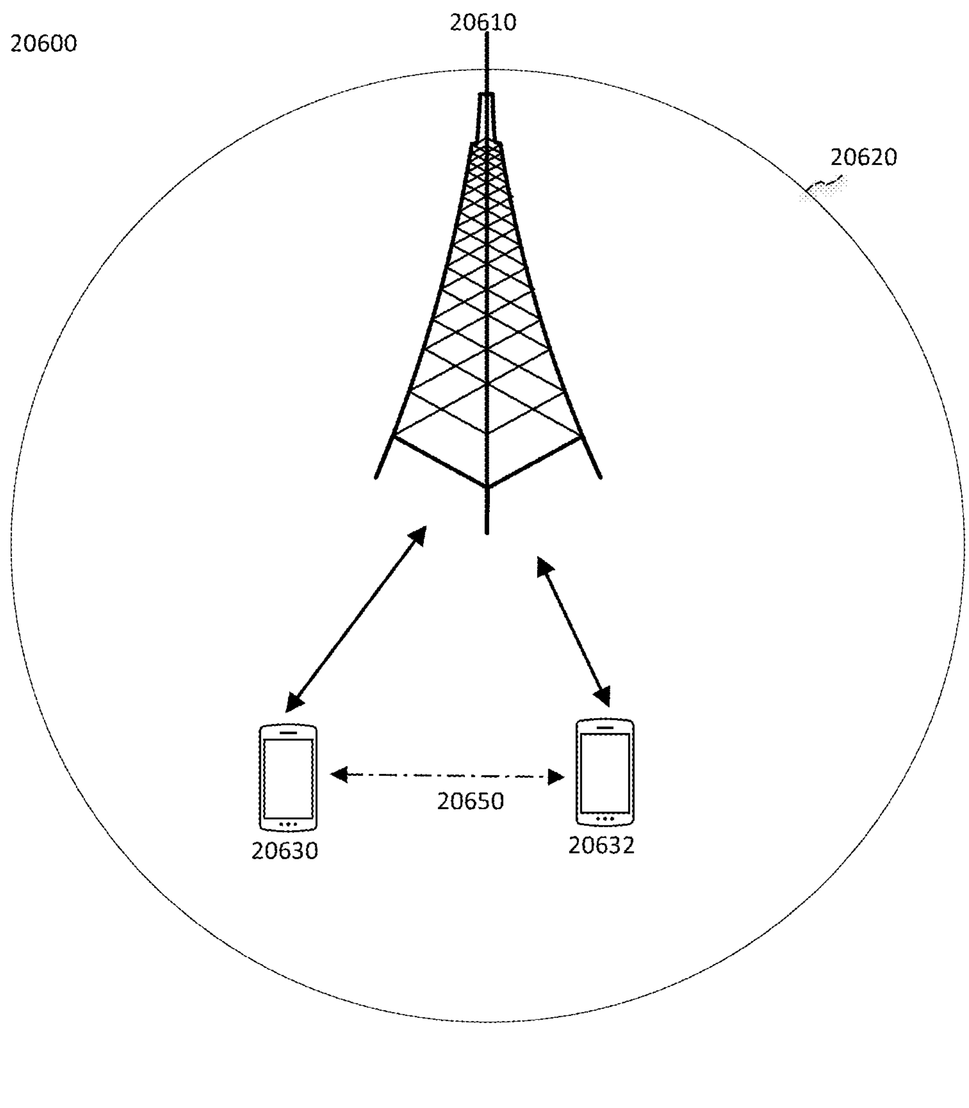
Figure 207:
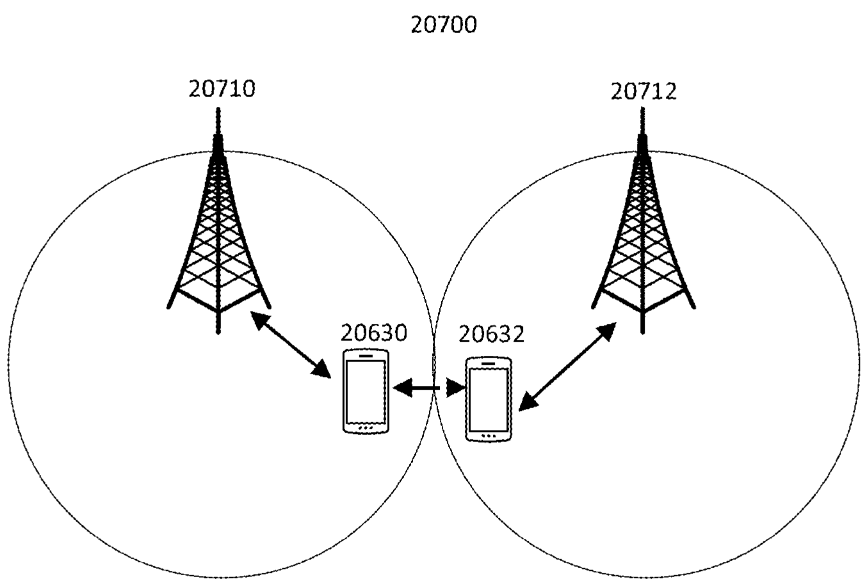
Figure 208:
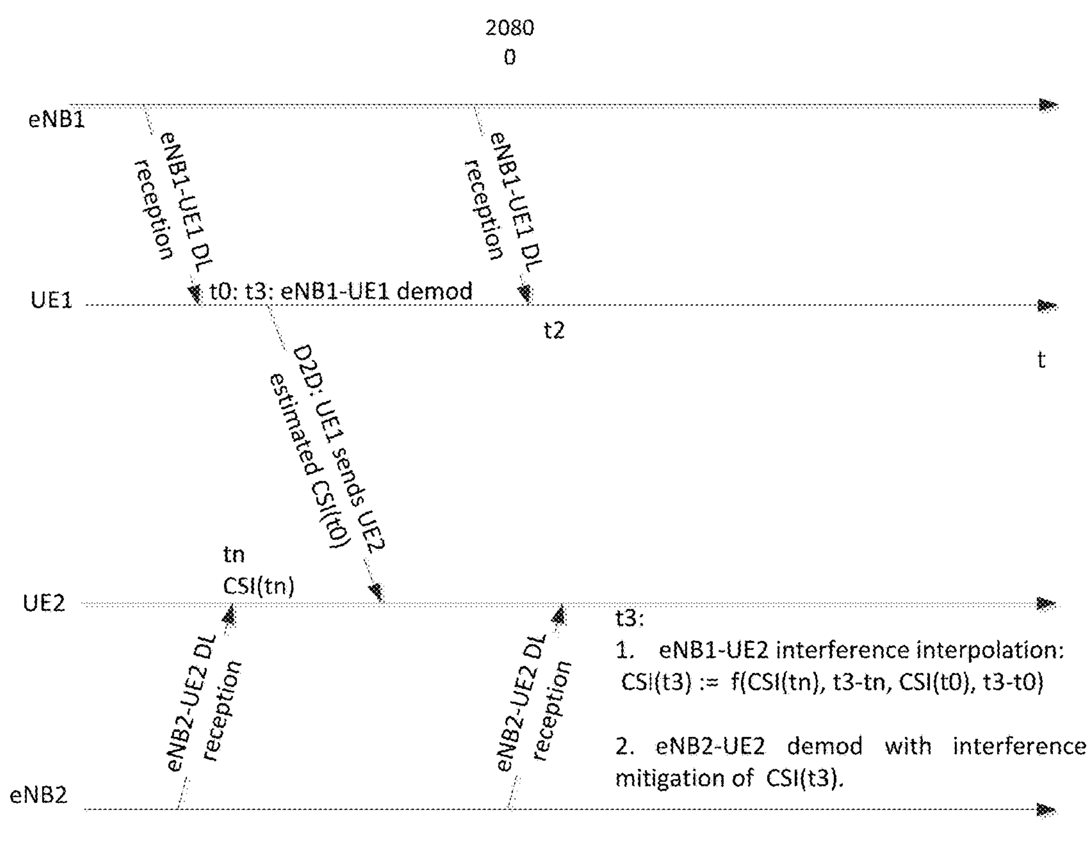
Figure 209:
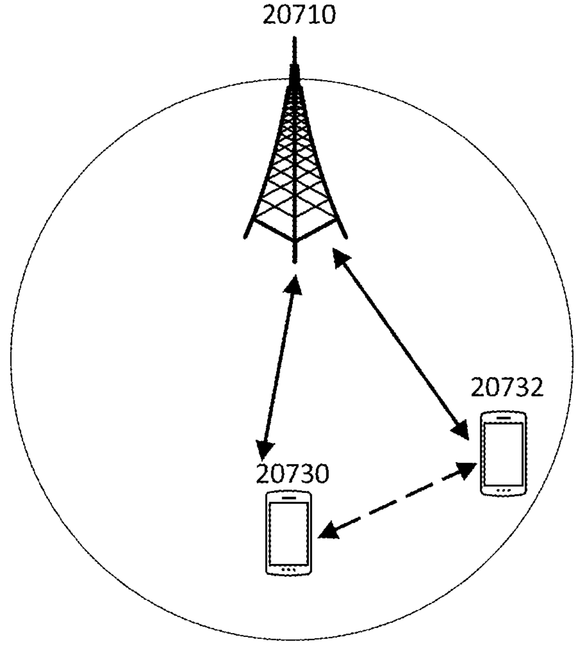
Figure 210:
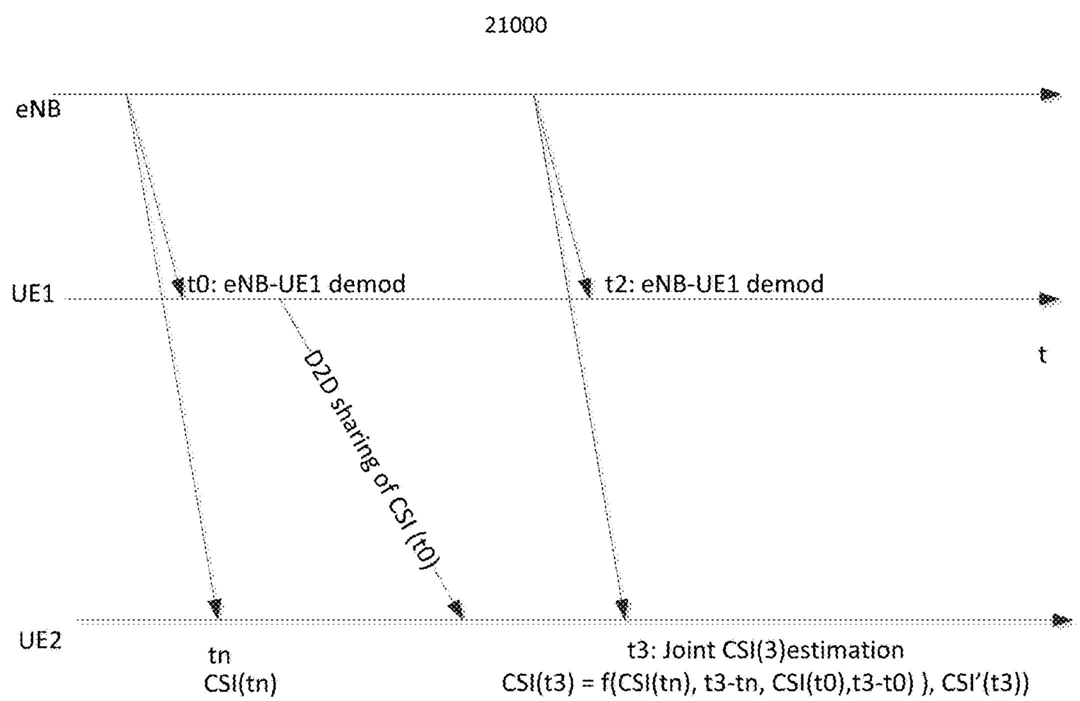
Figure 211:
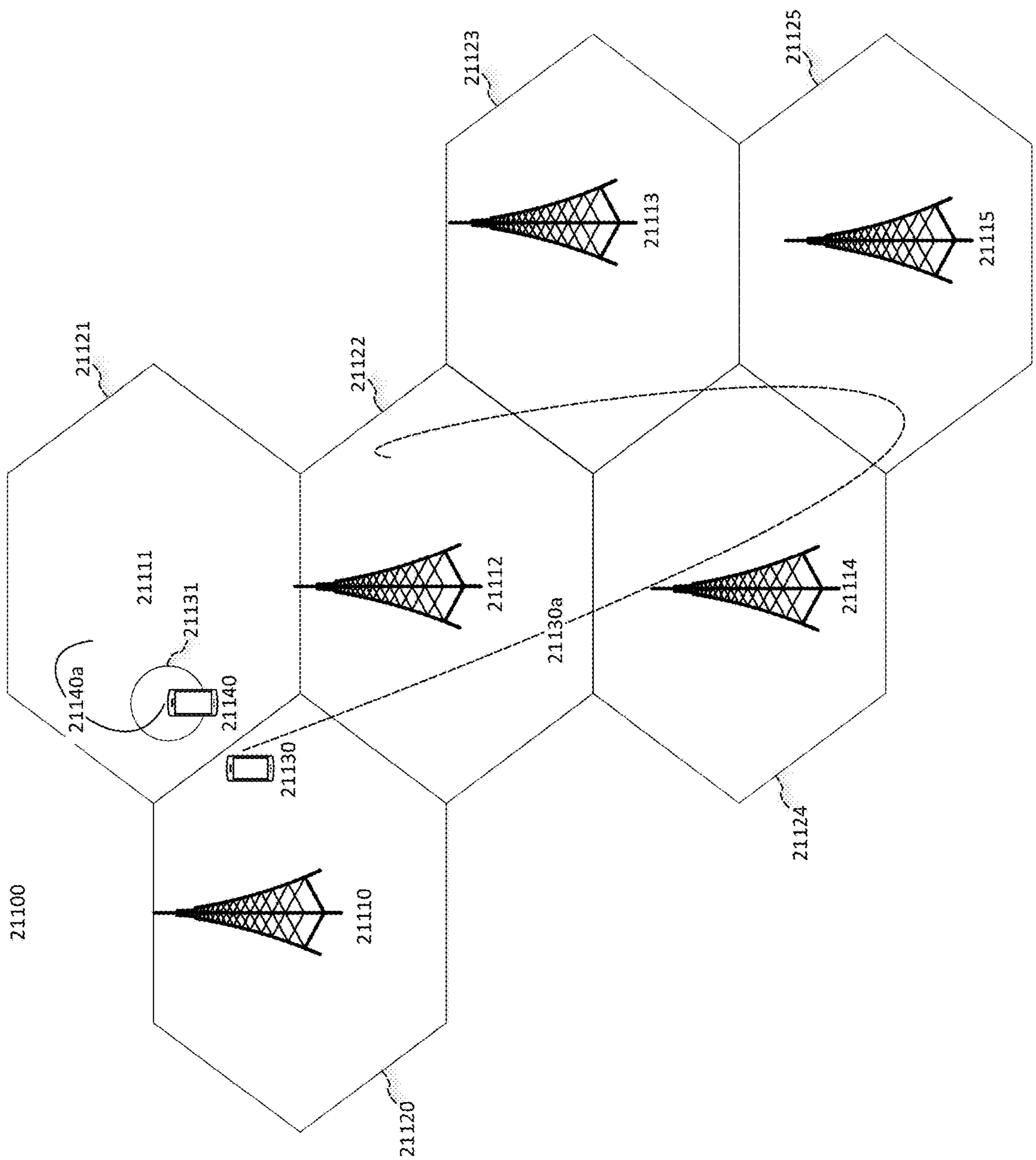
Figure 212:
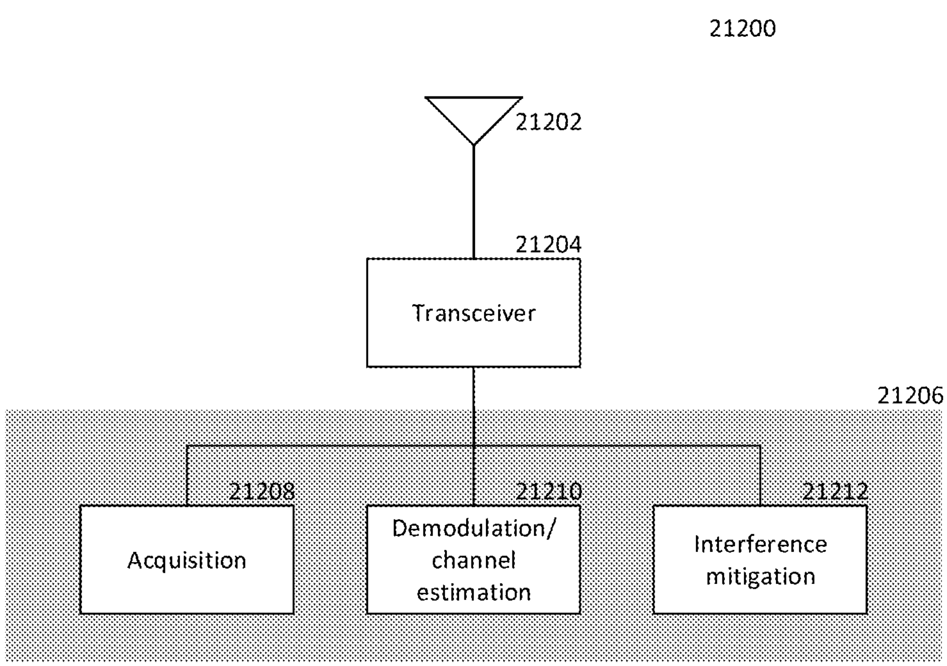
Figure 213:
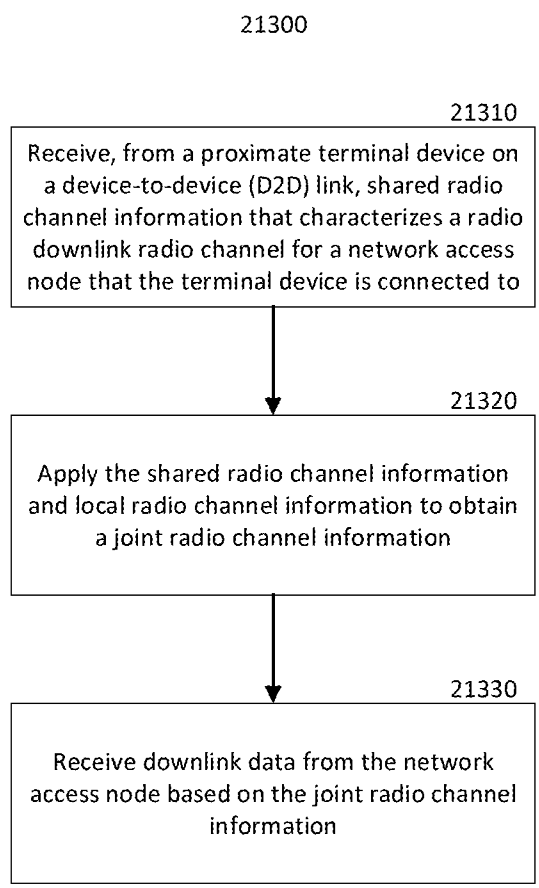
Figure 214:
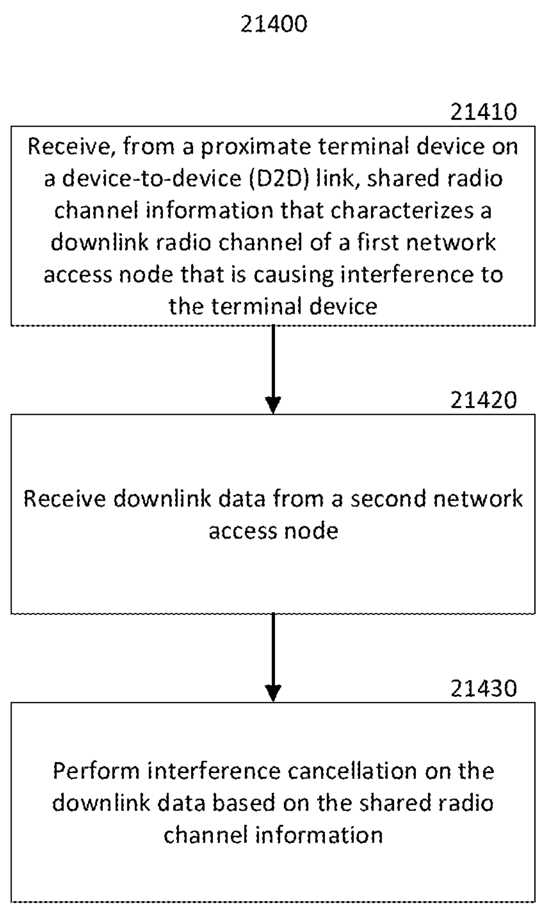
Figure 215:
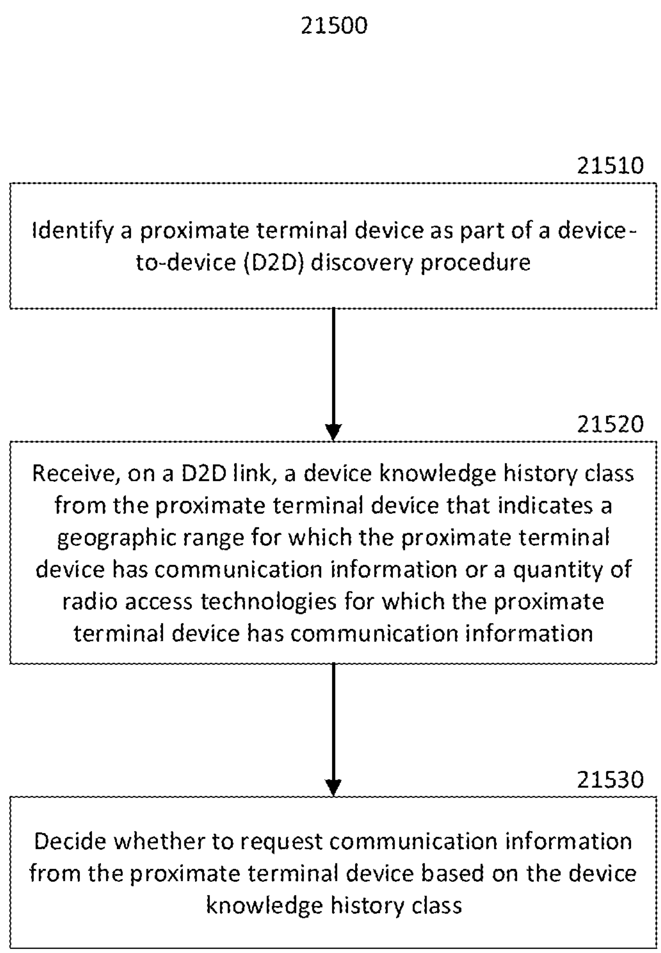
Figure 216:
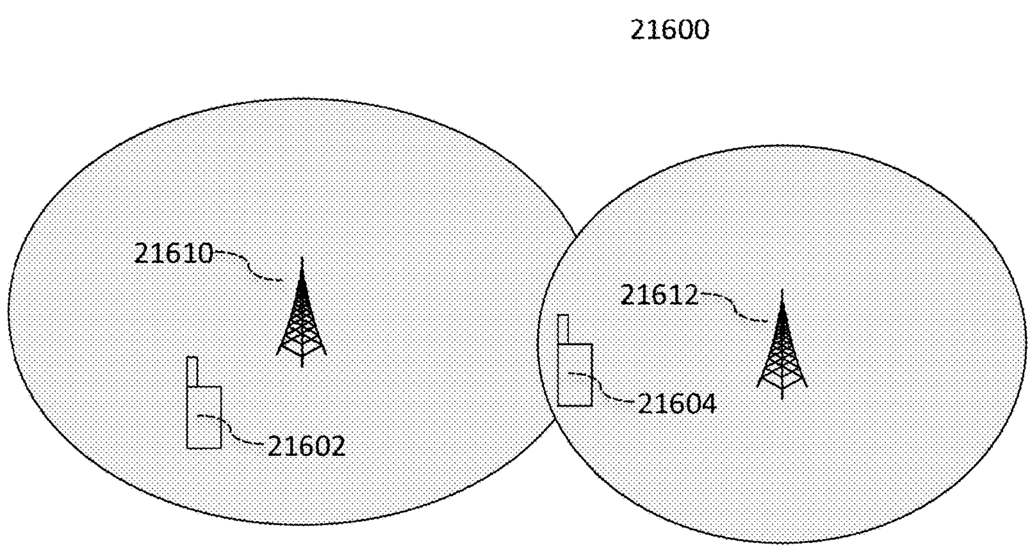
Figure 217:
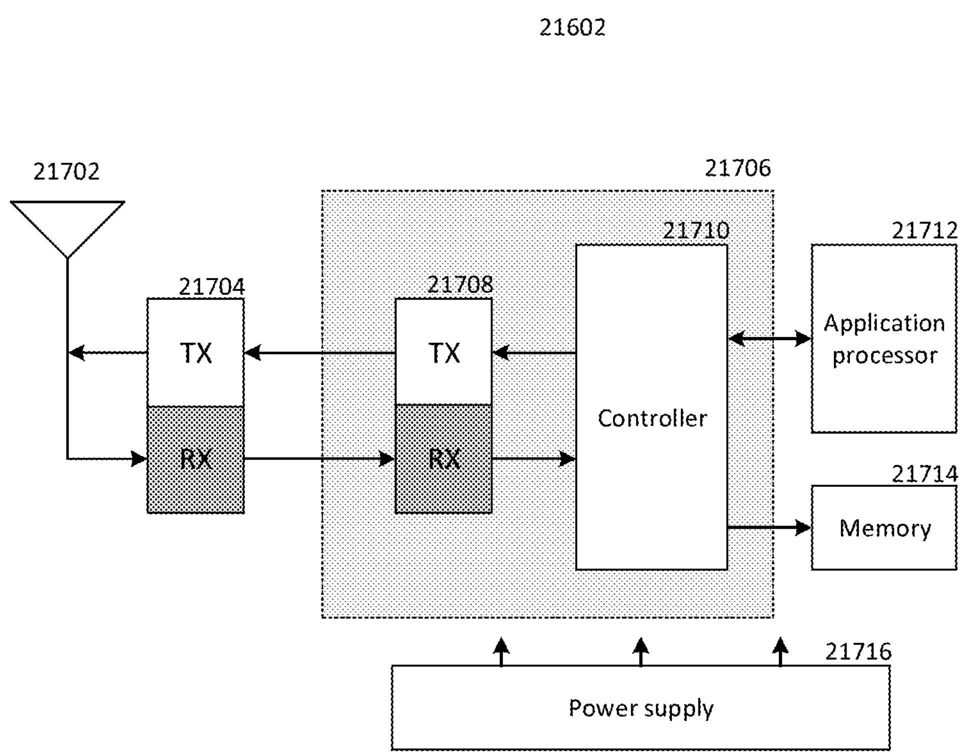
Figure 218:
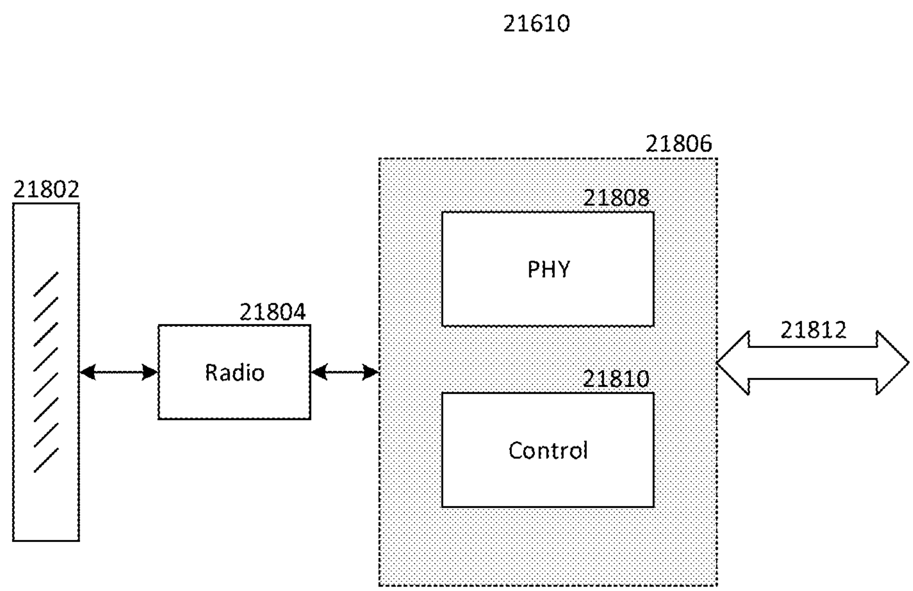
Figure 219:
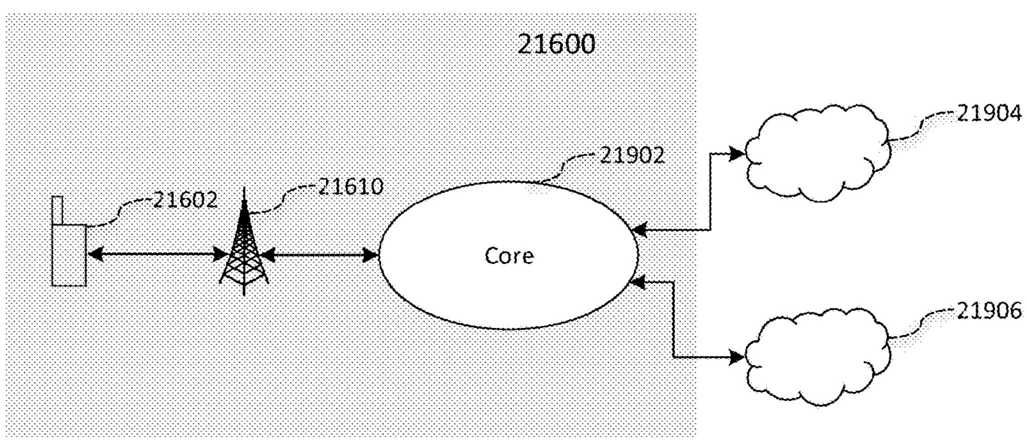
Figure 220:
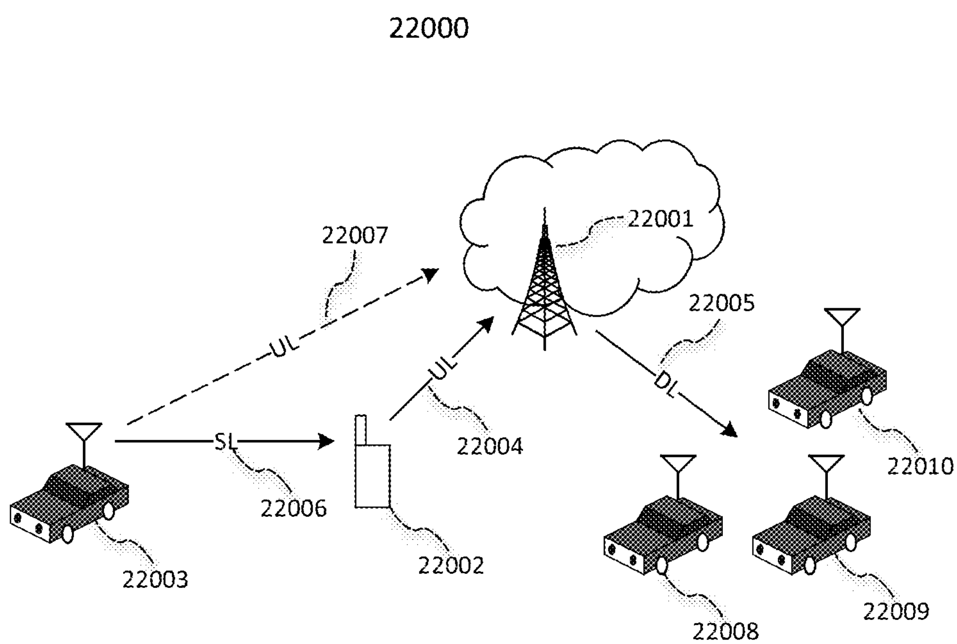
Figure 221:
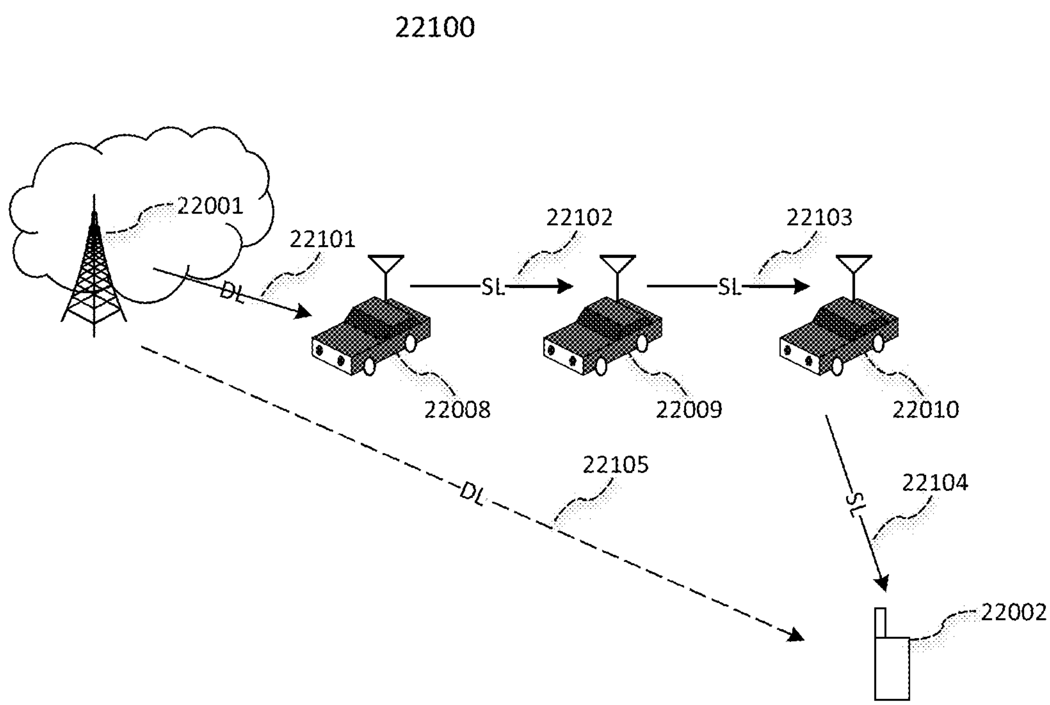
Figure 222:
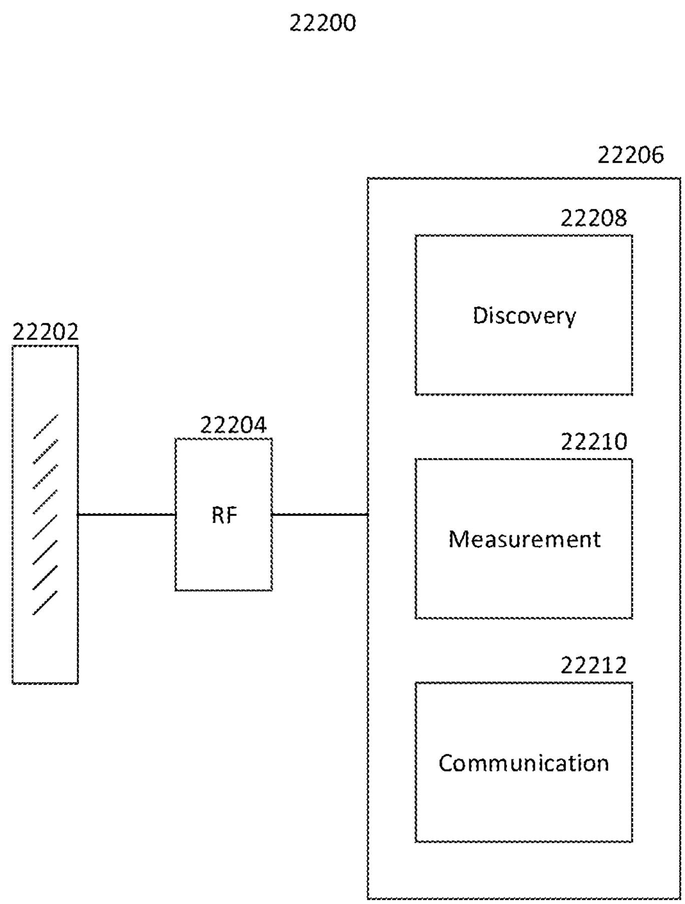
Figure 223:
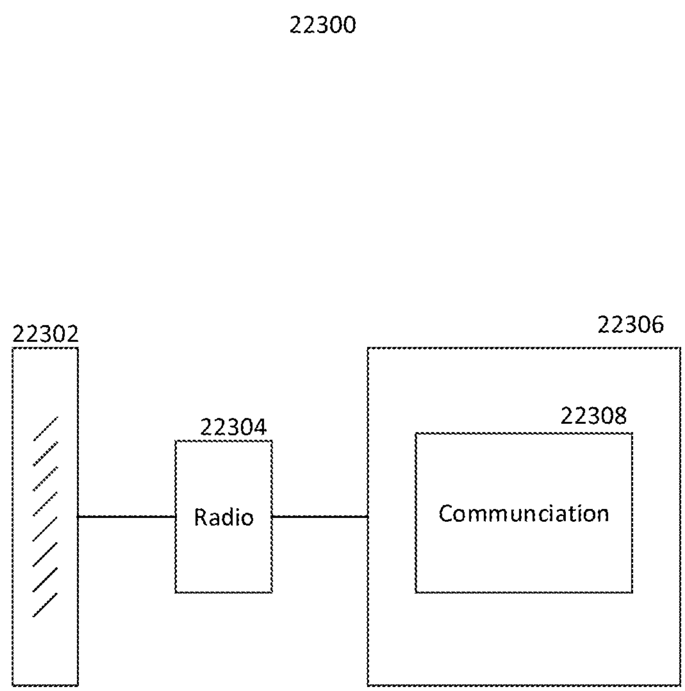
Figure 224:
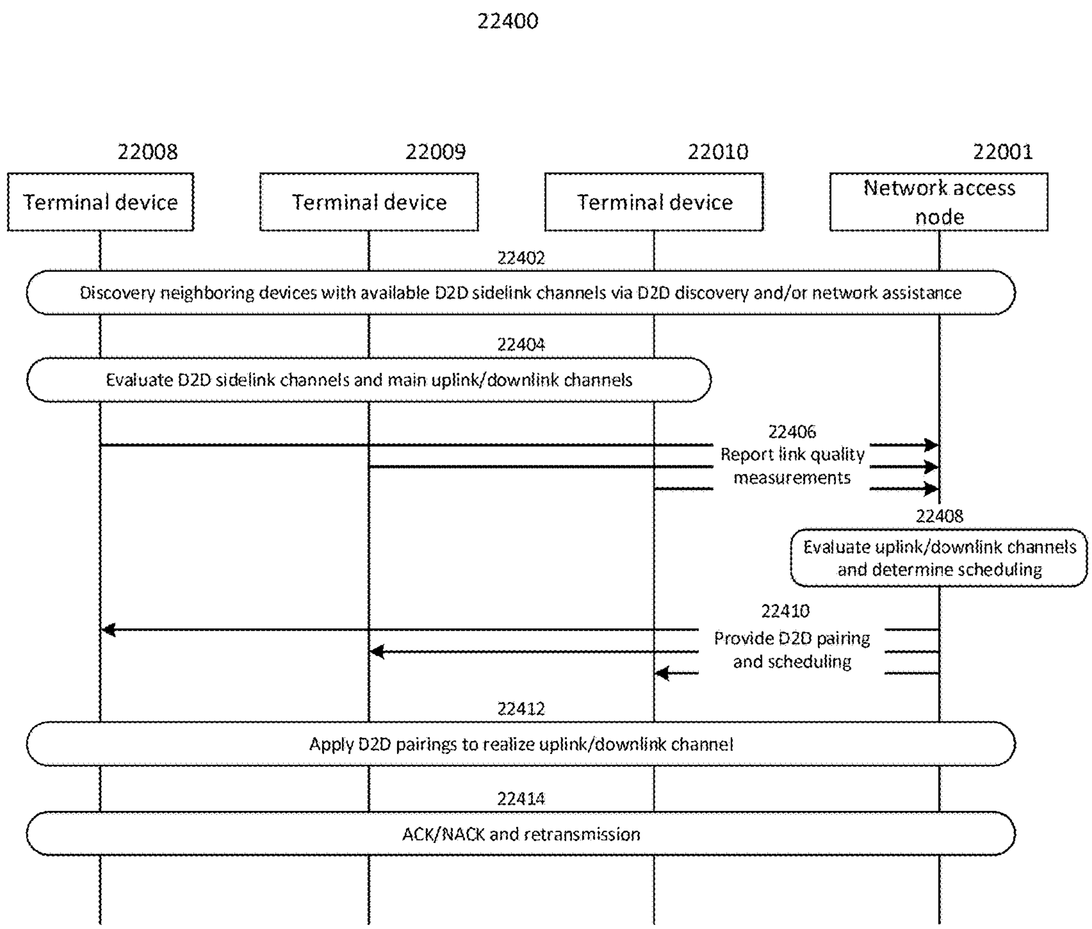
Figure 225:
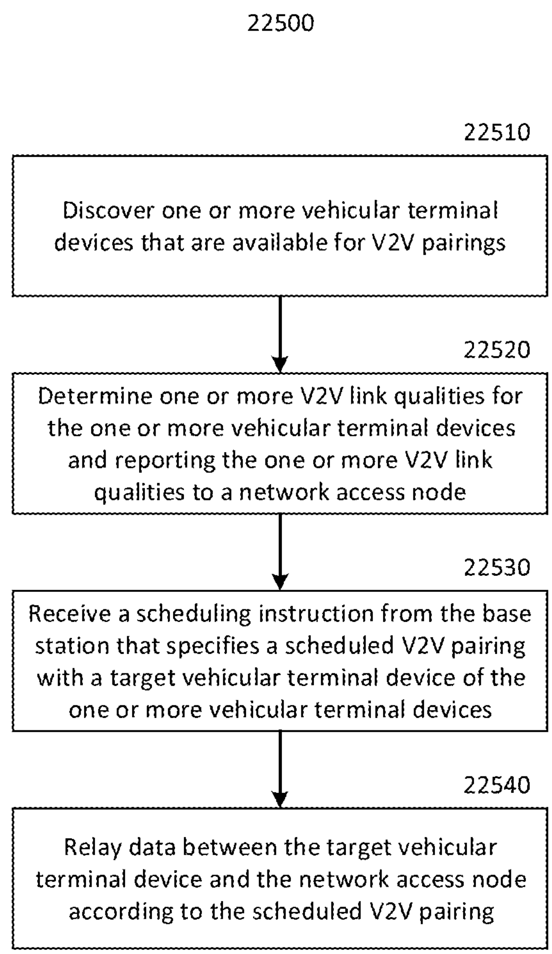
Figure 226:
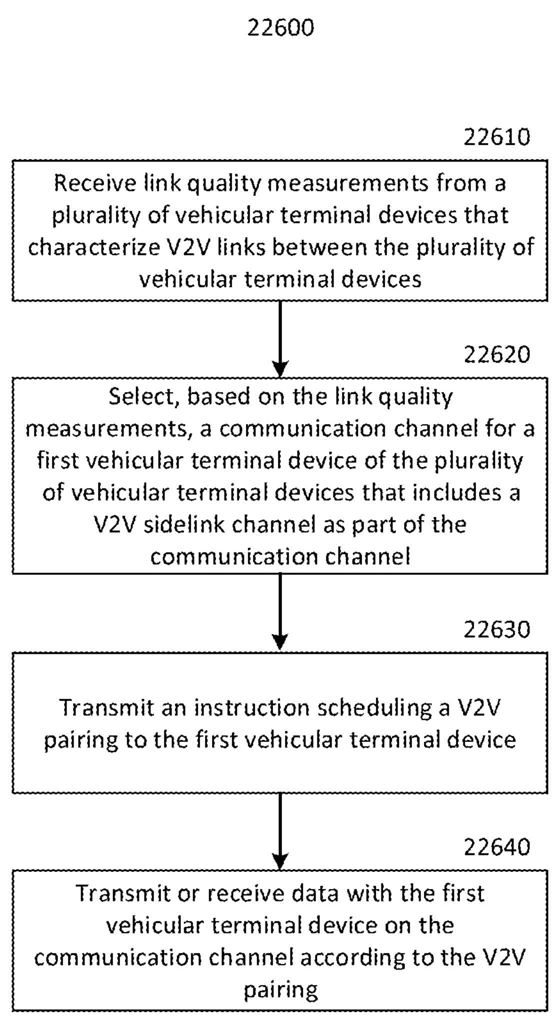
Figure 227:
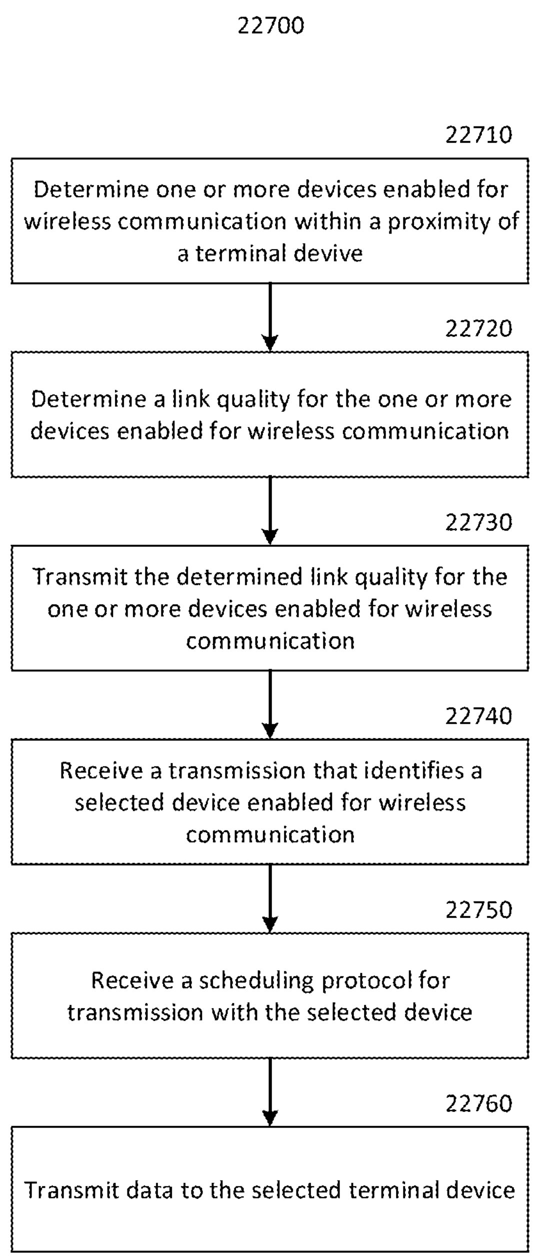
Figure 228:
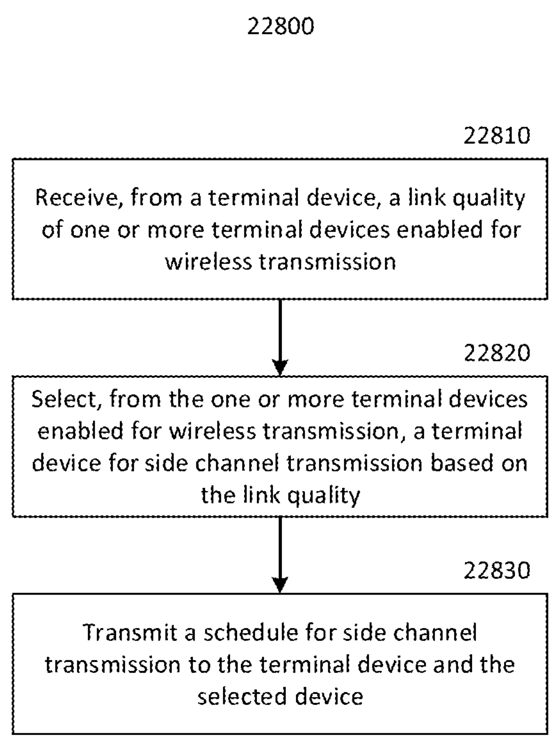
Figure 229:
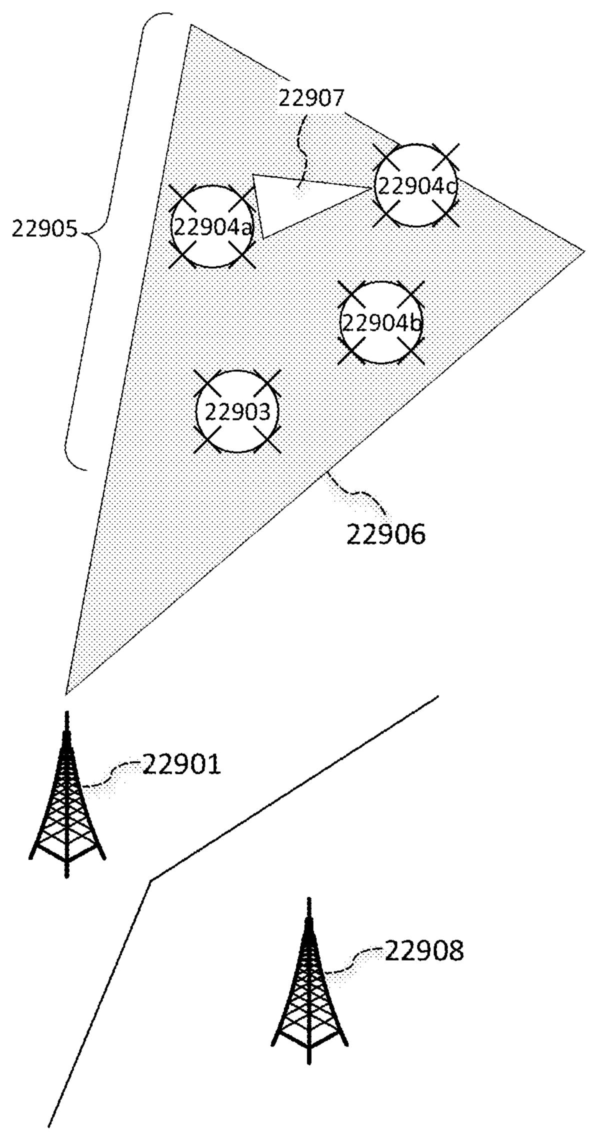
Figure 230:
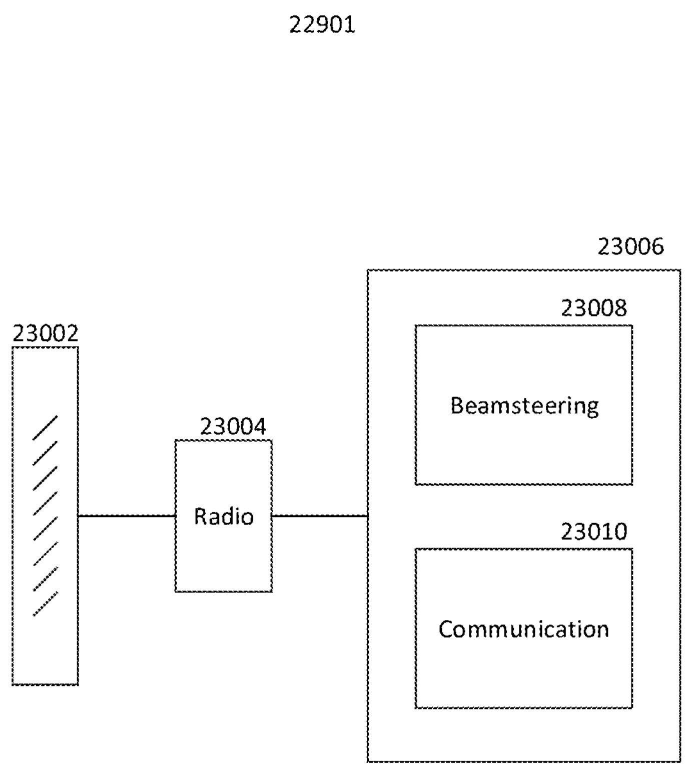
Figure 231:
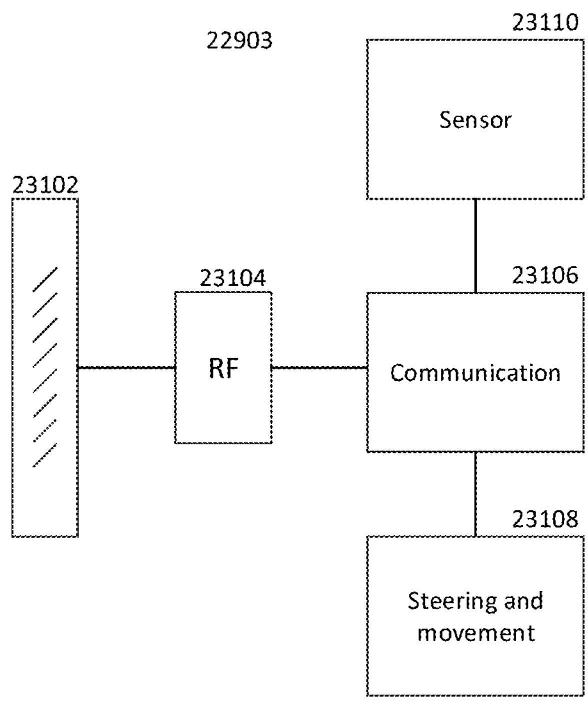
Figure 232:
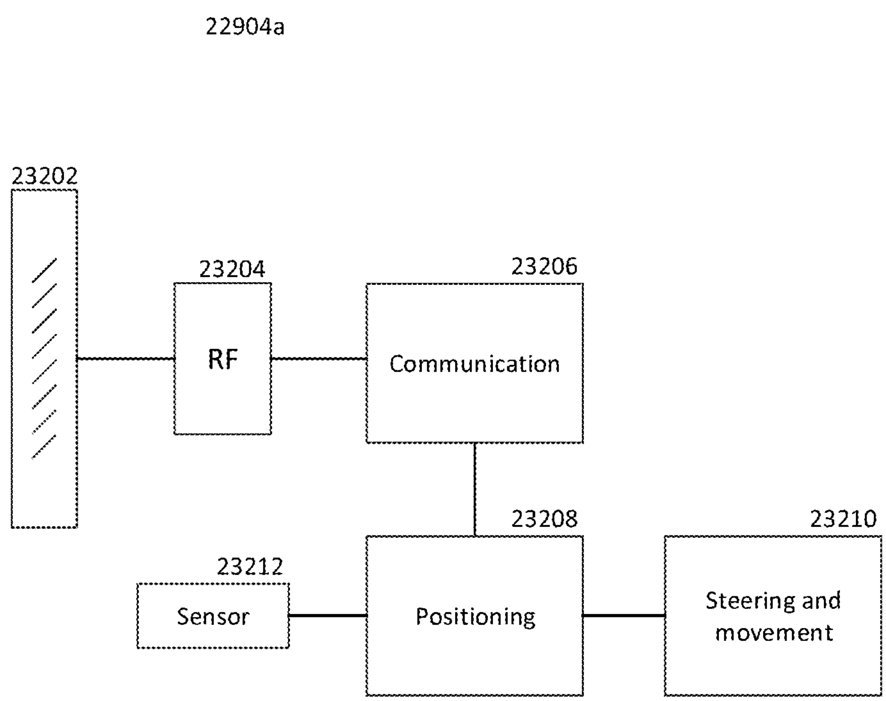
Figure 233:
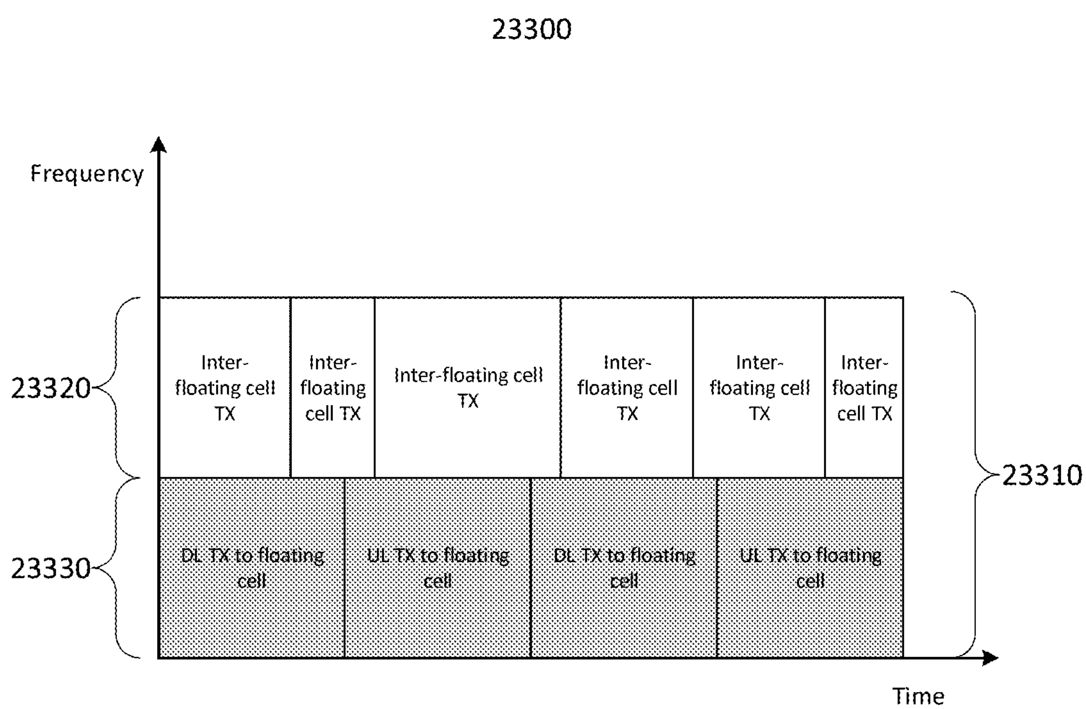
Figure 234:
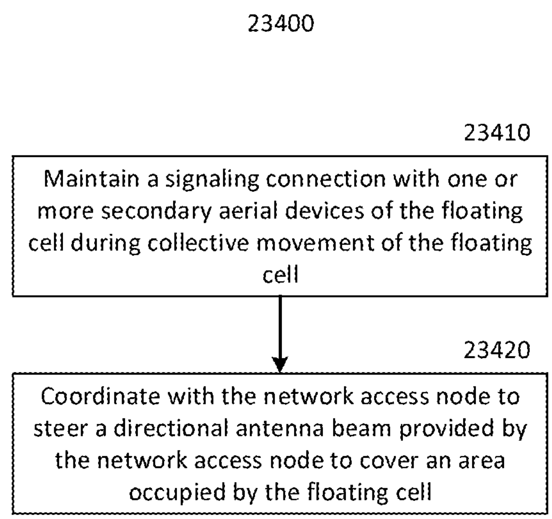
Figure 235:
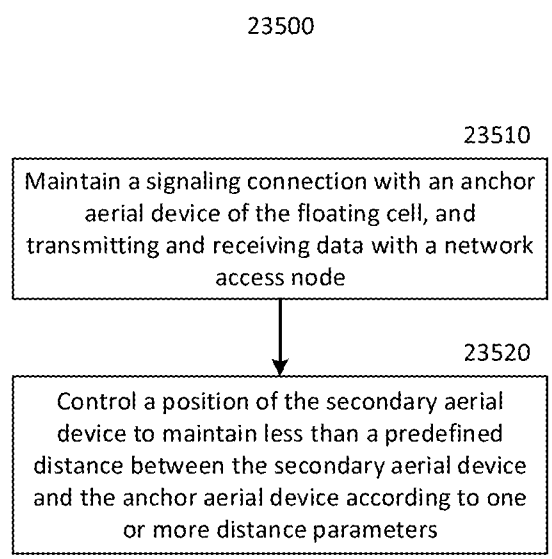
Figure 236:
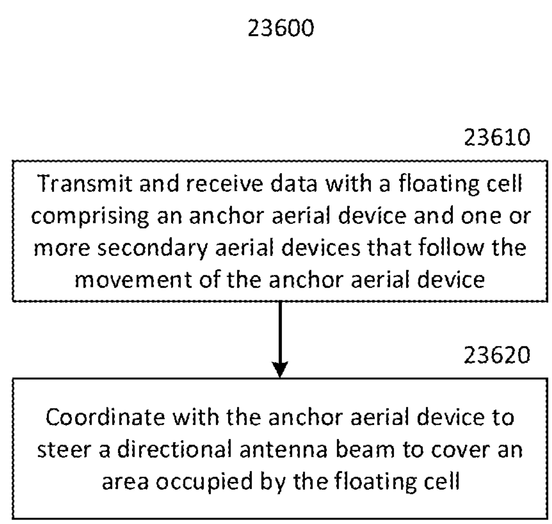
Figure 237:
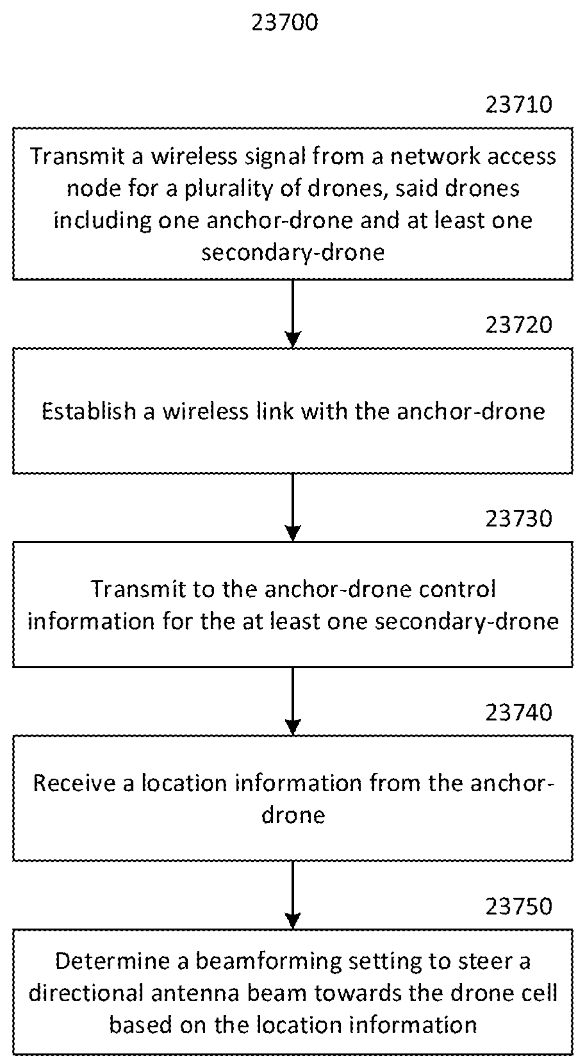
Figure 238:
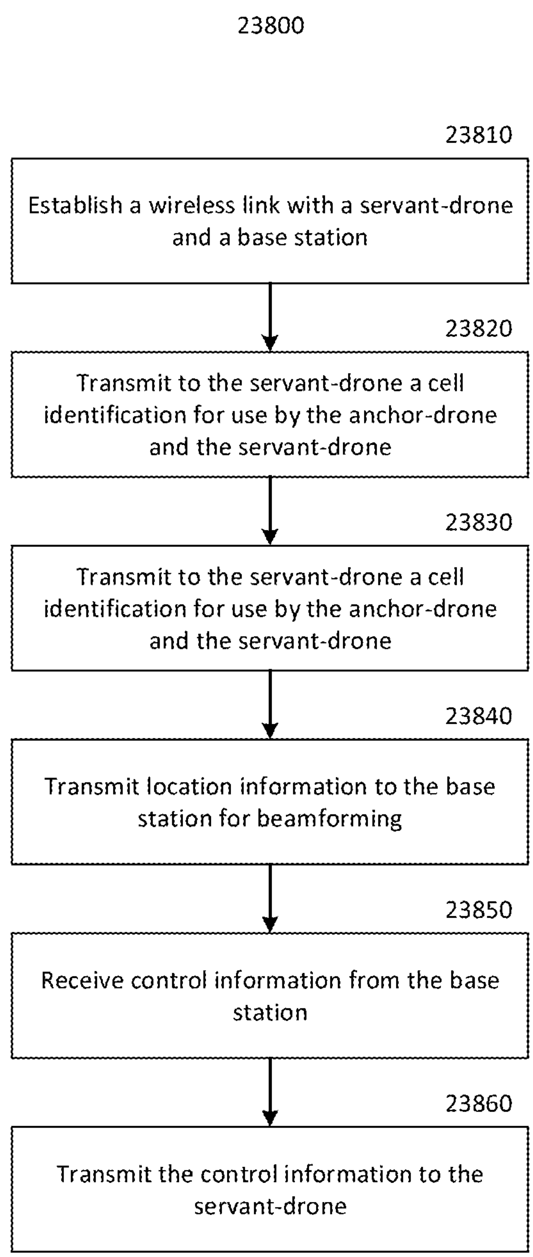
Figure 239:
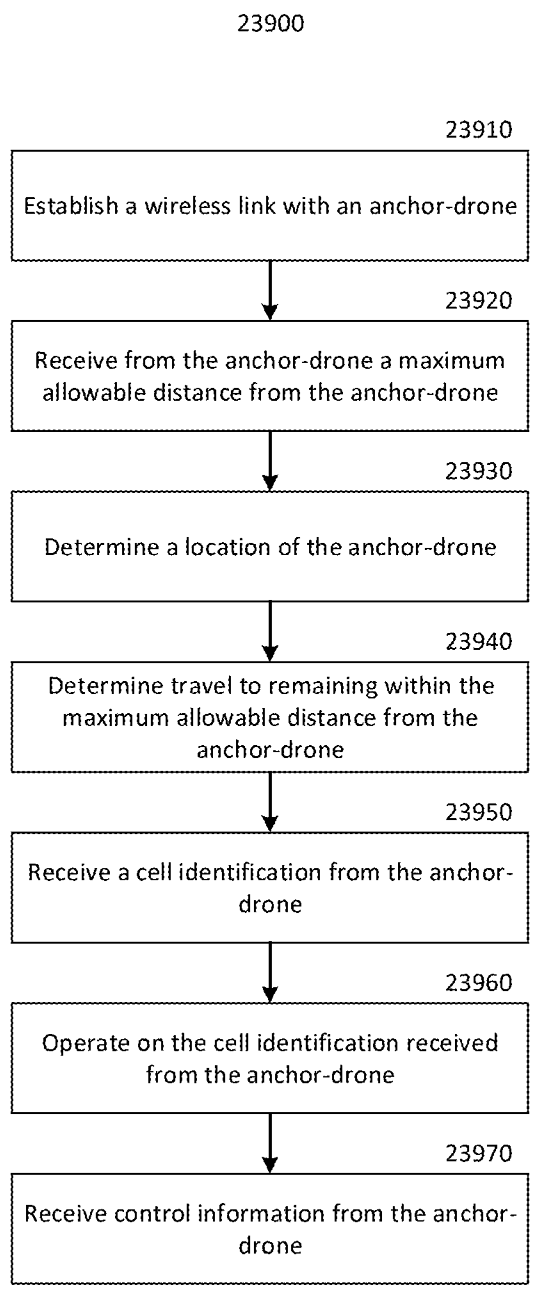
Figure 240:
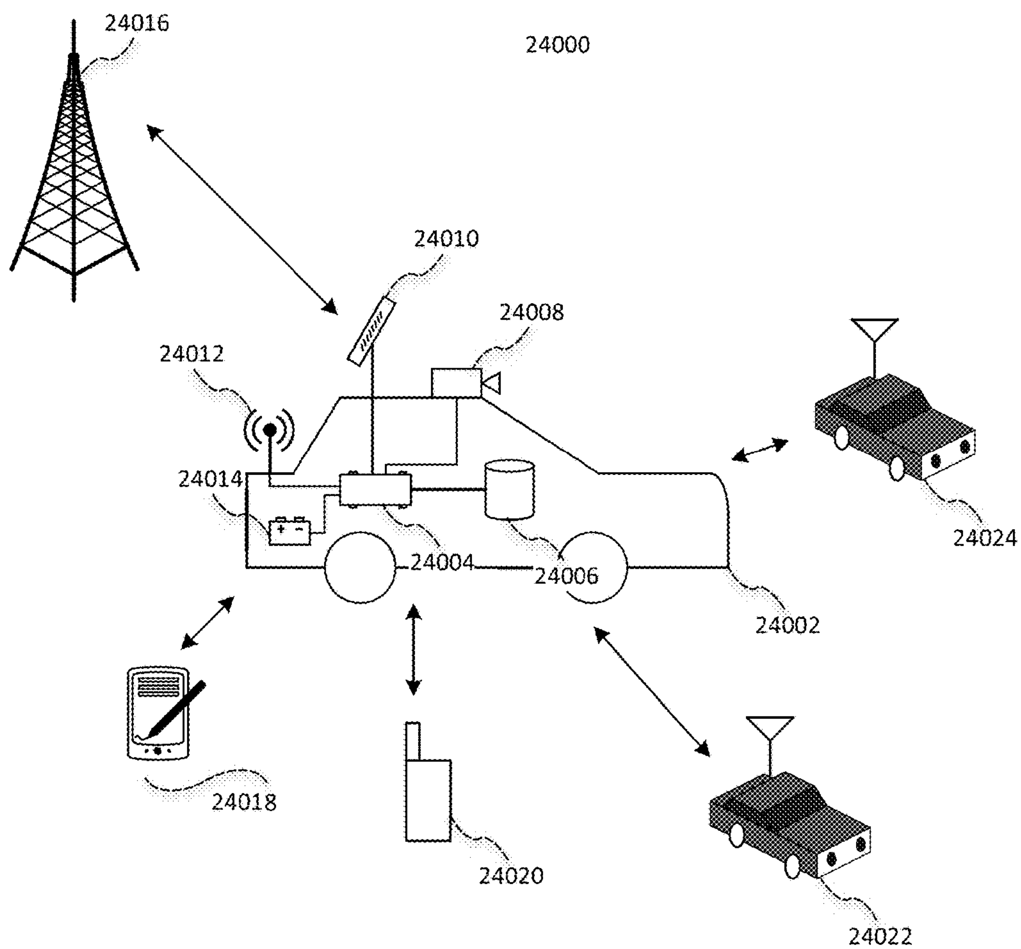
Figure 241:
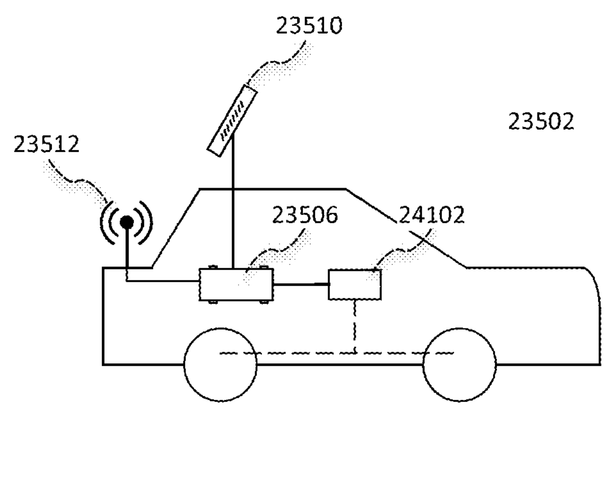
Figure 242:
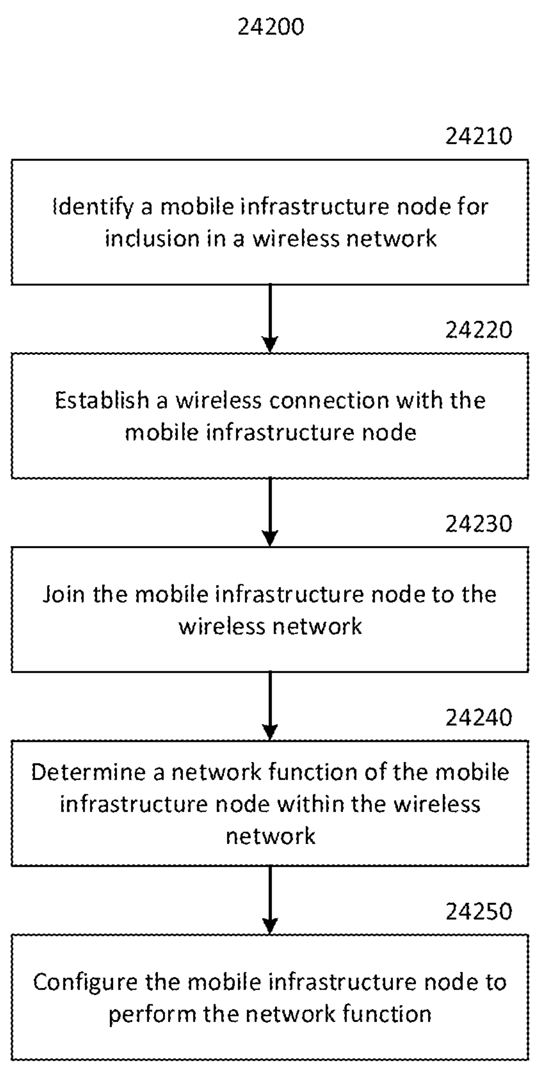
Figure 243:
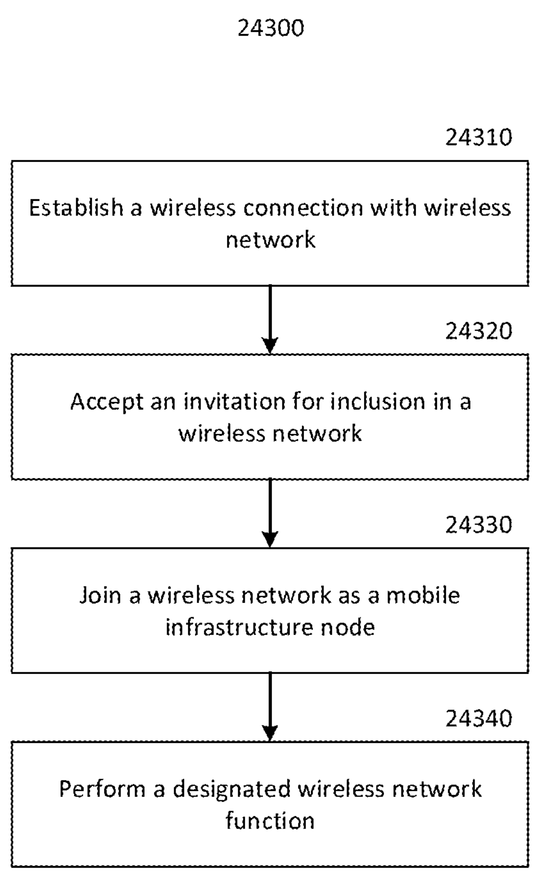
Figure 244:
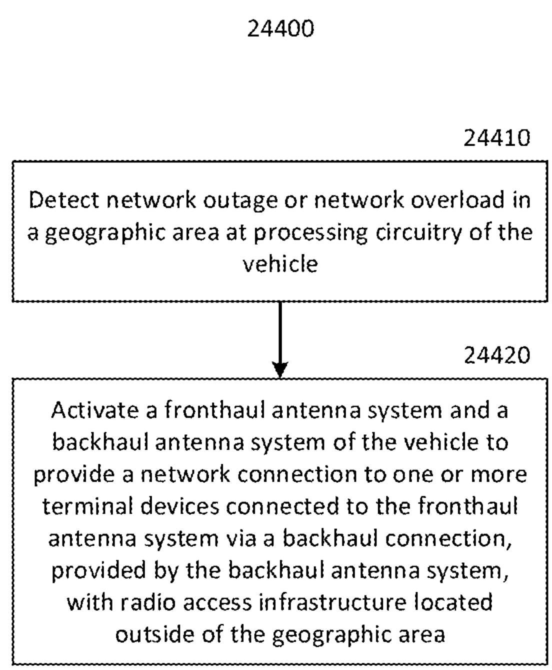
Figure 245:
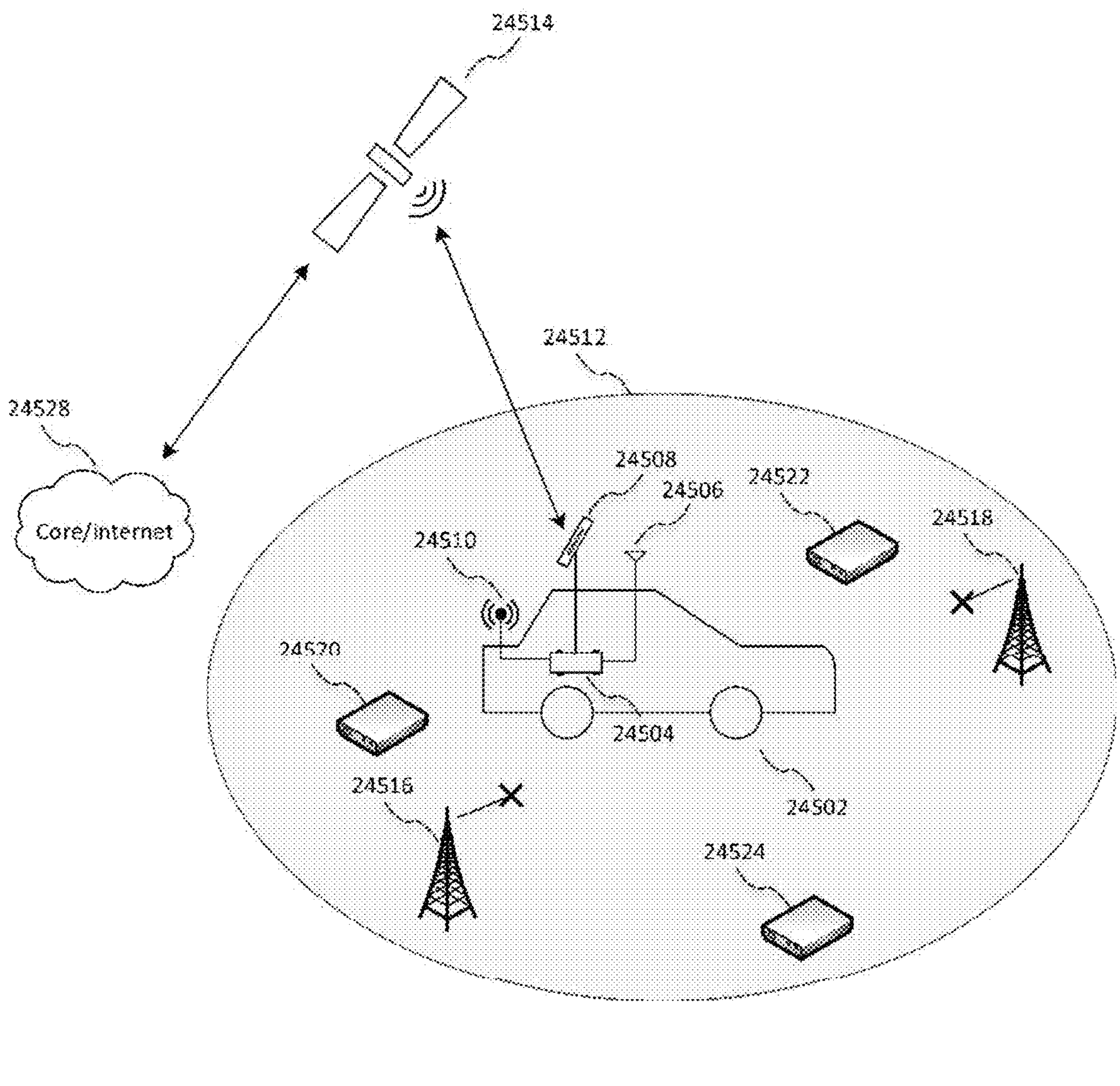
Figure 246:
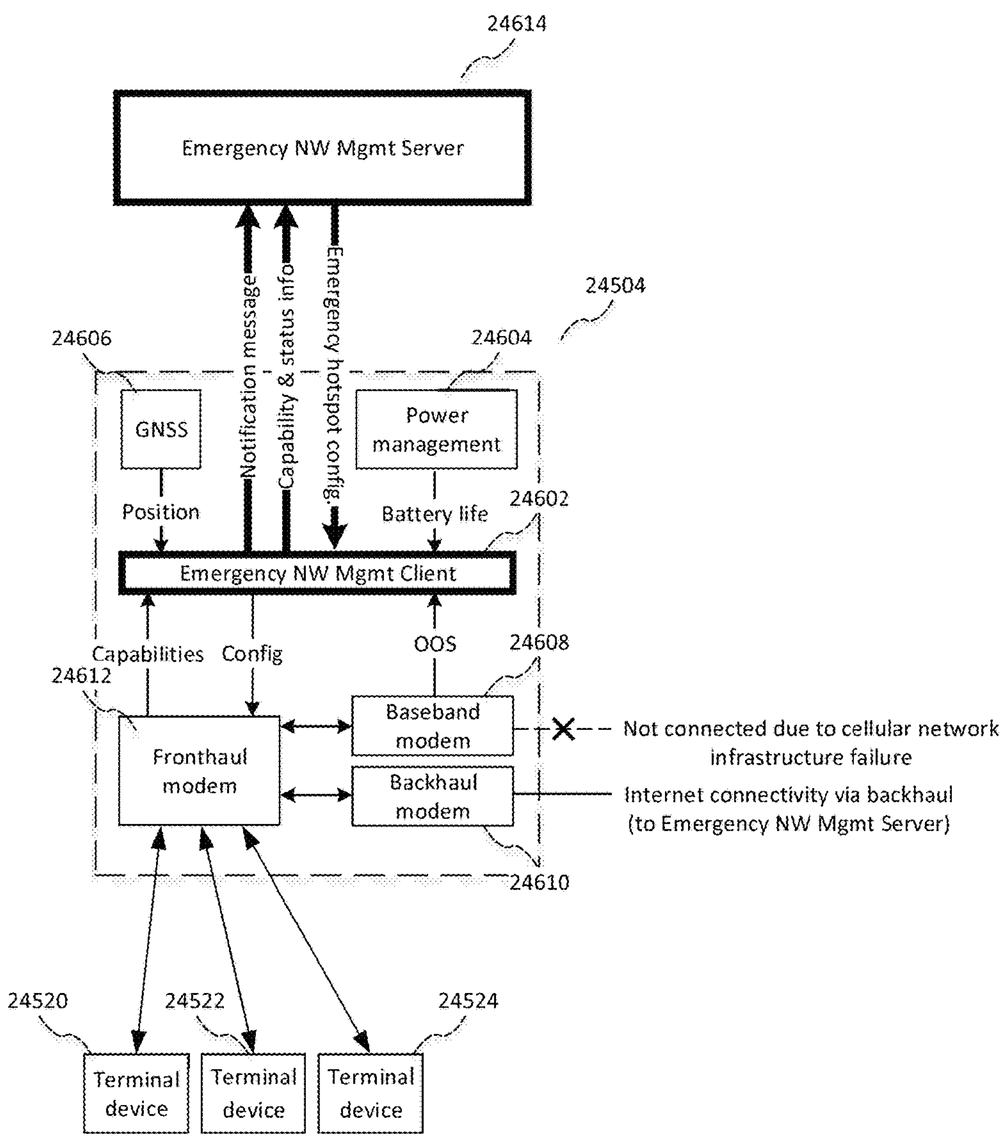
Figure 247:
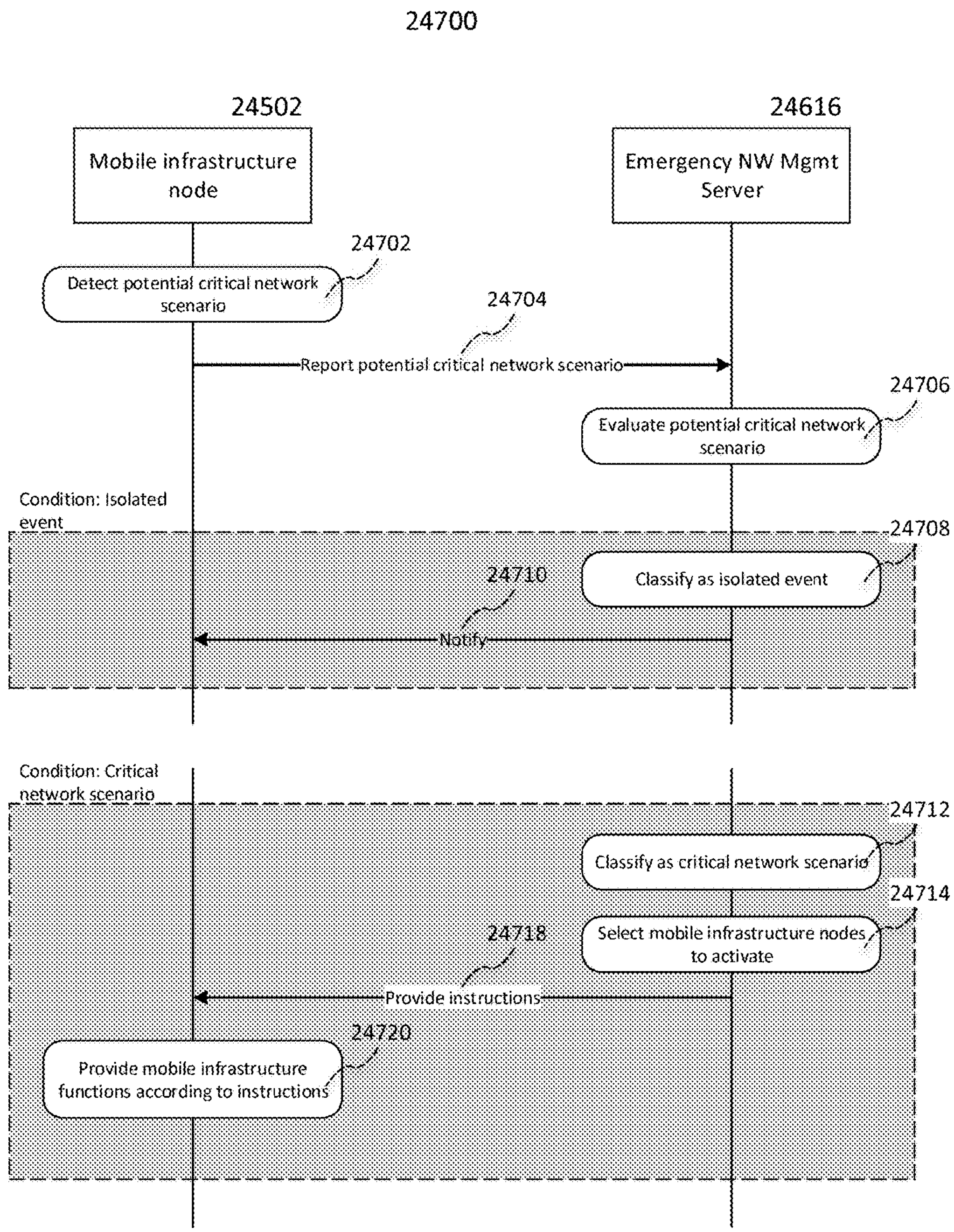
Figure 248:
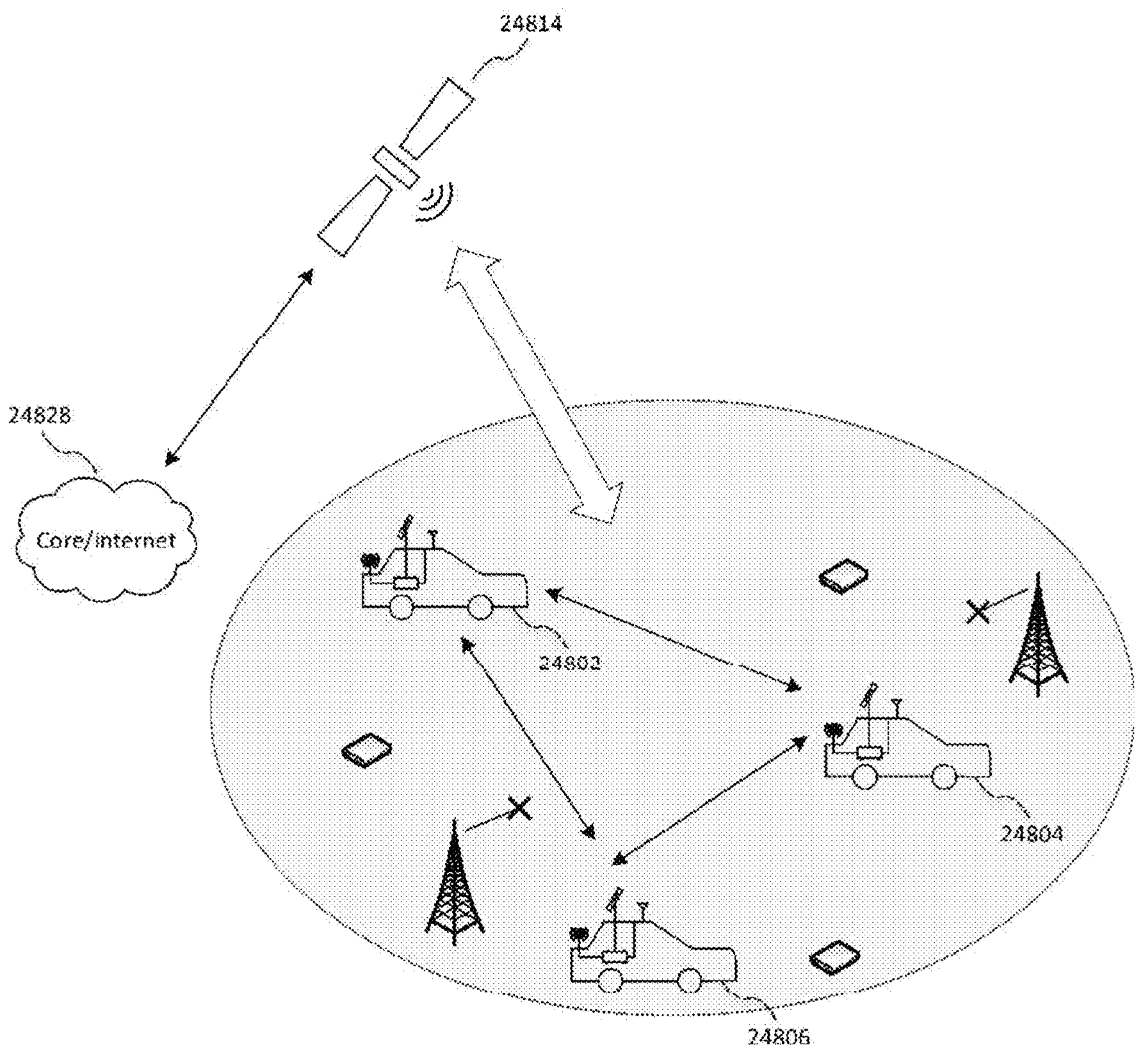
Figure 249:
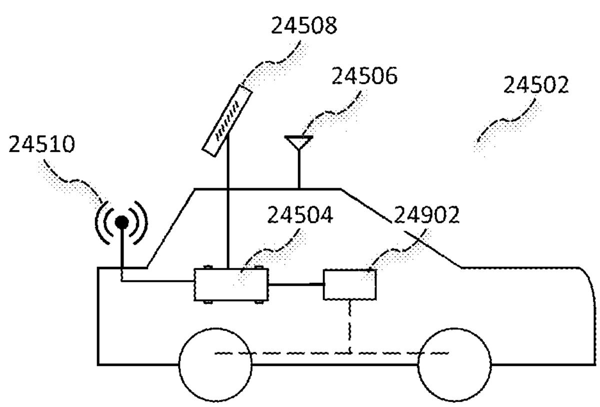
Figure 250:
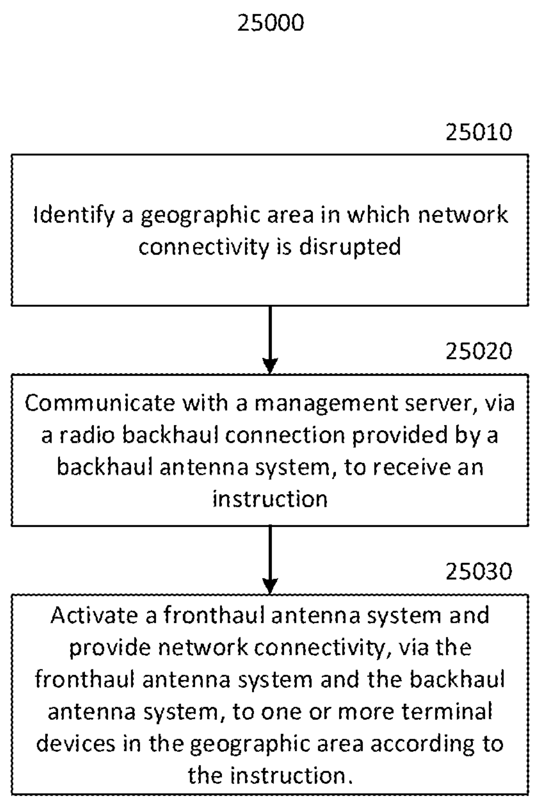
Figure 251:
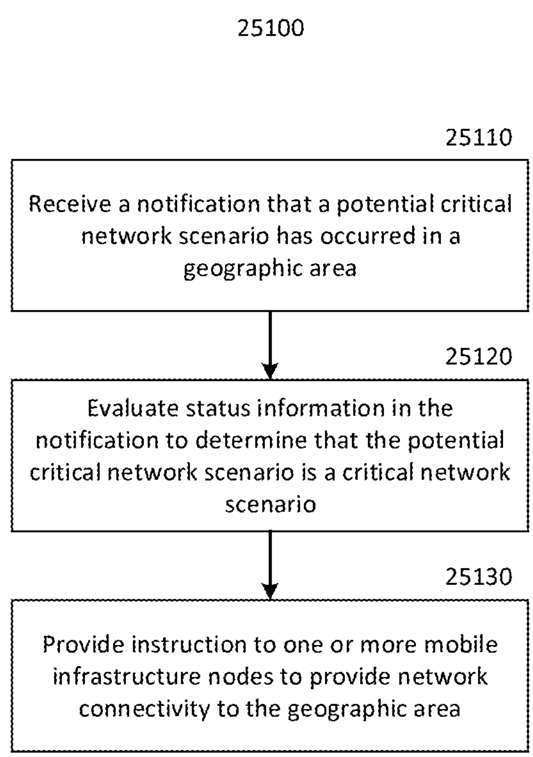
Figure 252:
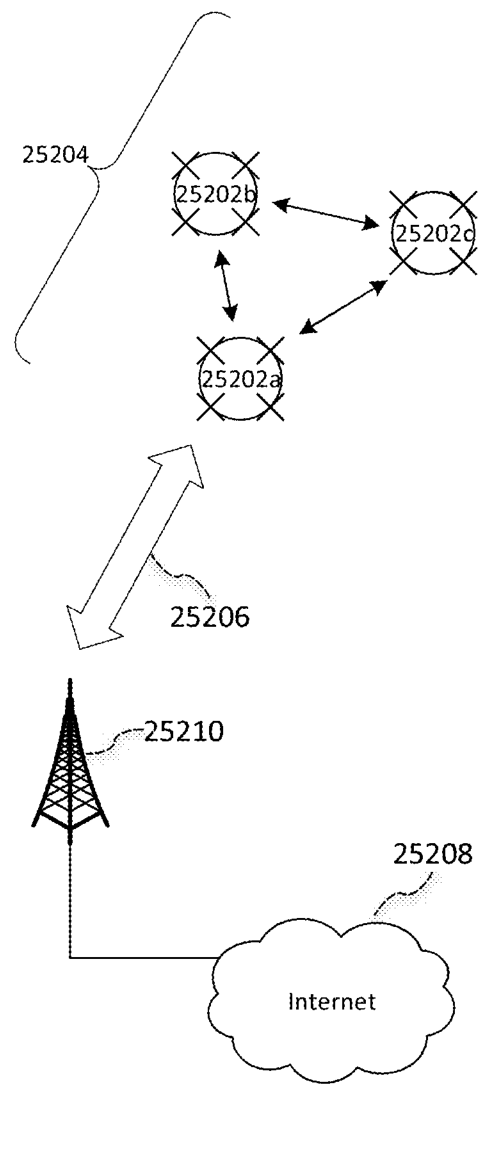
Figure 253:
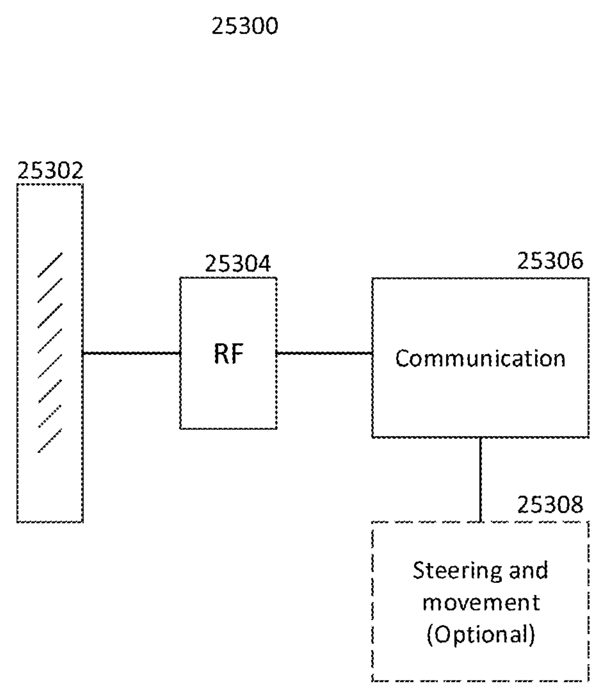
Figure 254:
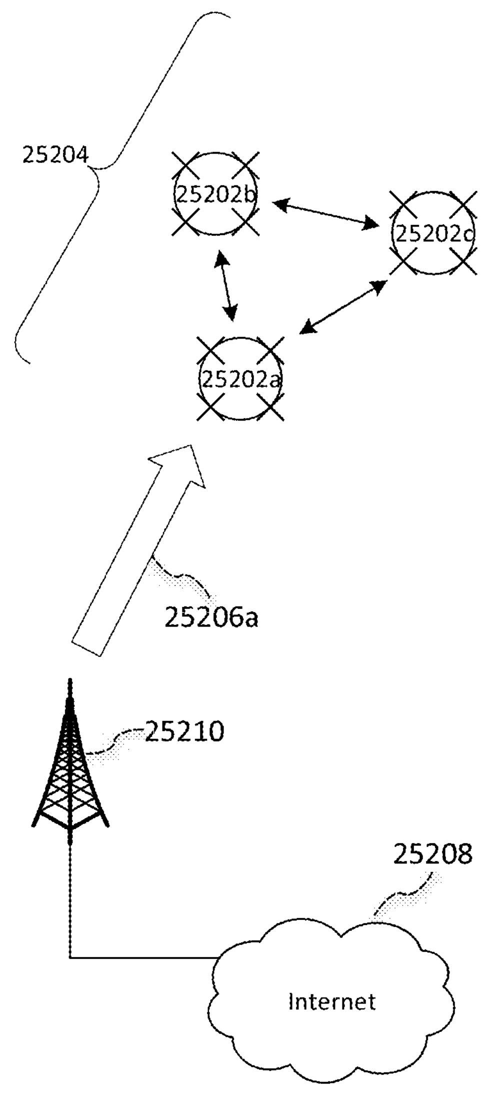
Figure 255:
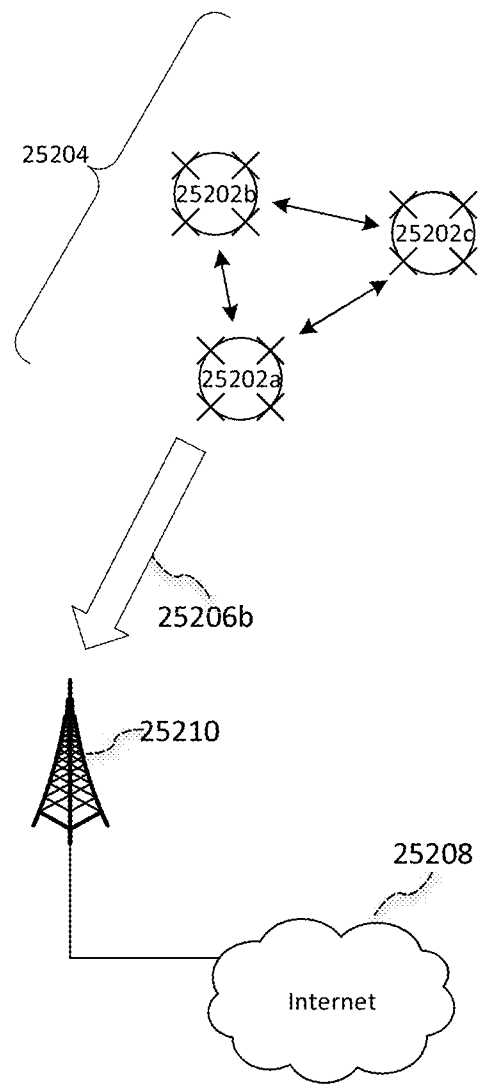
Figure 256:
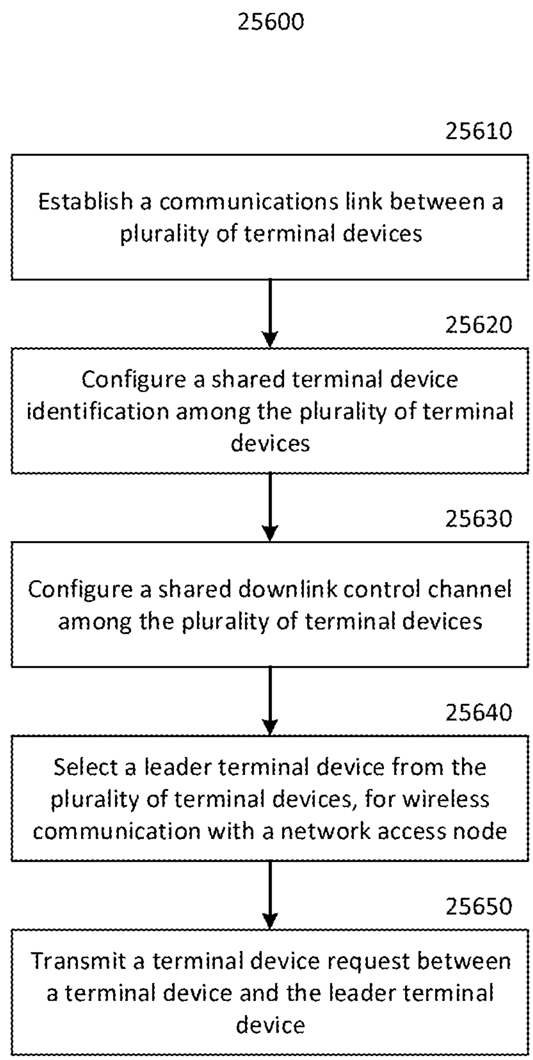
Figure 257:
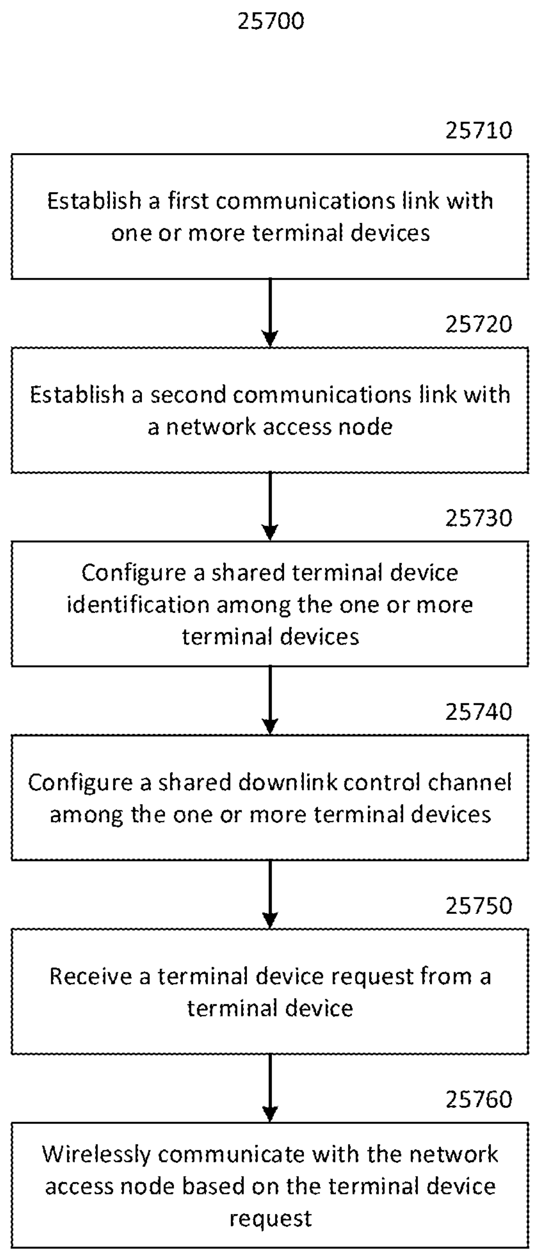
Figure 258:
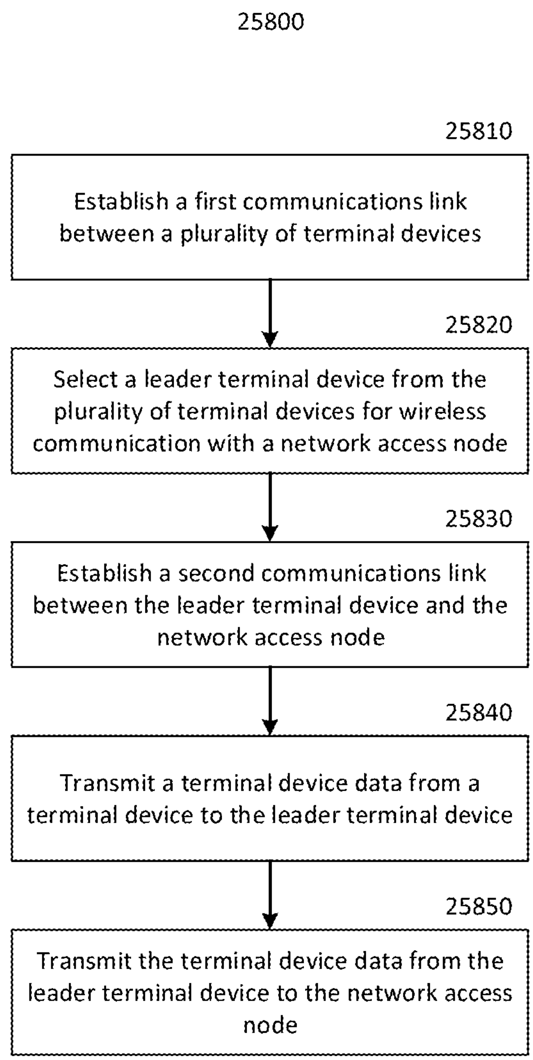
Figure 259:
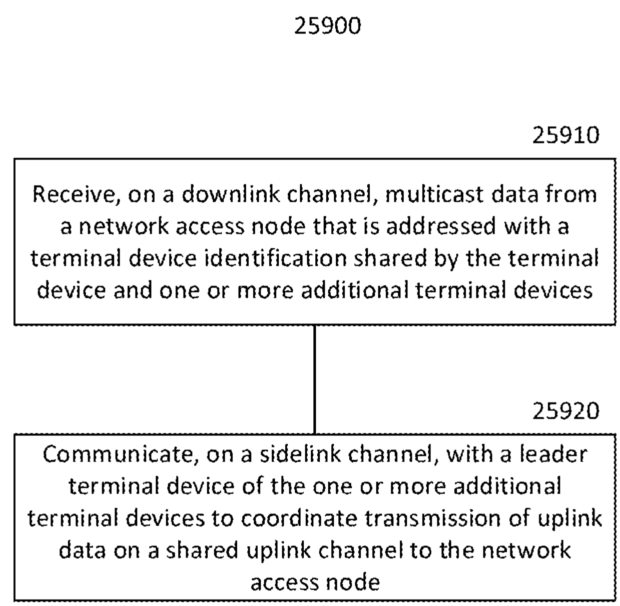
Figure 260:
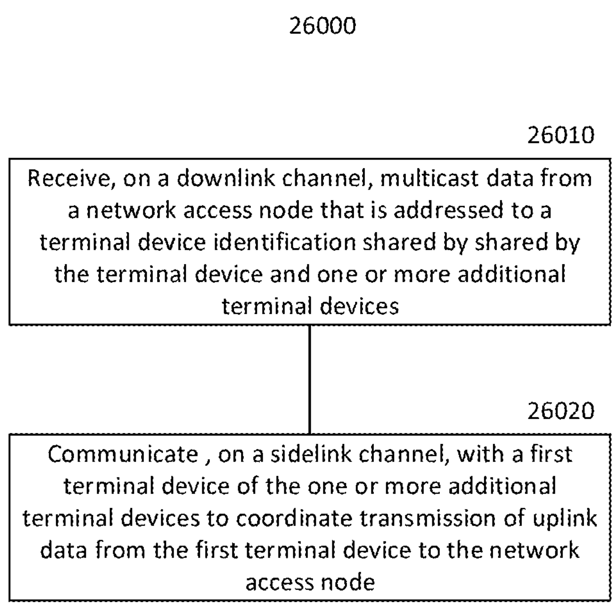
Figure 261:
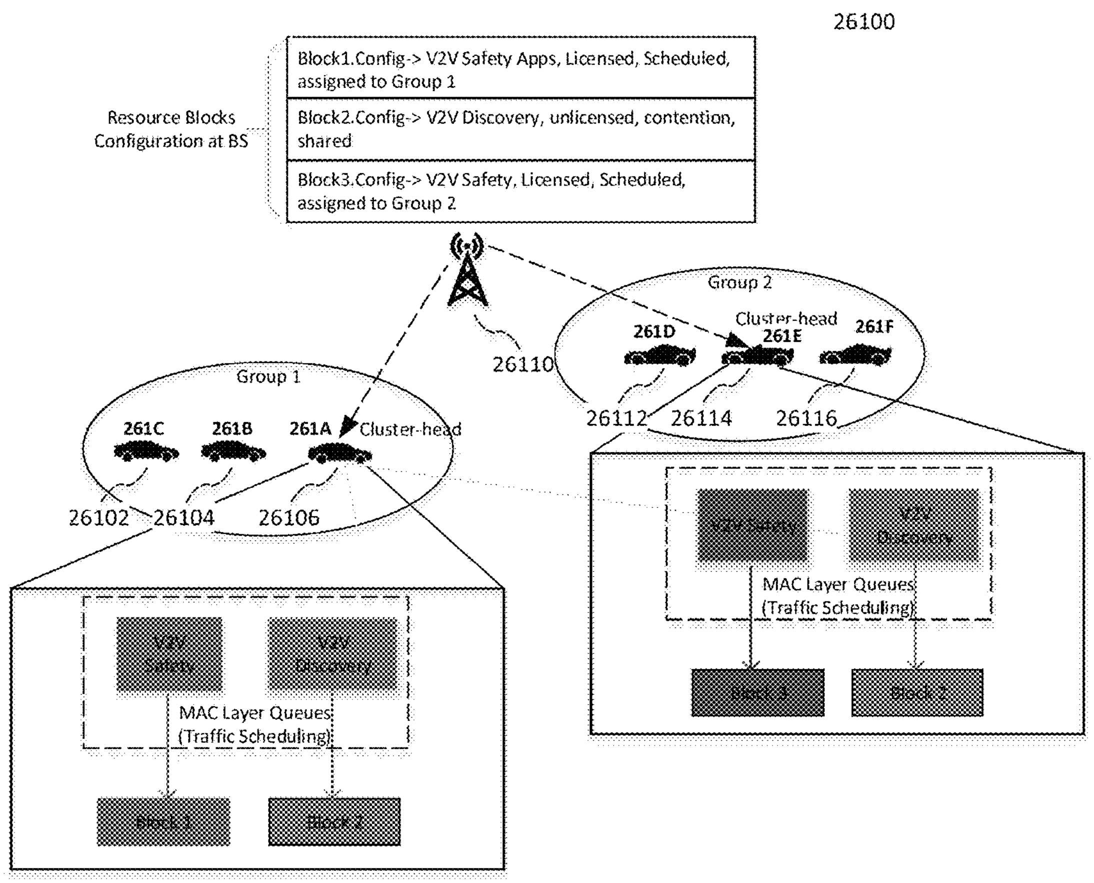
Figure 262:
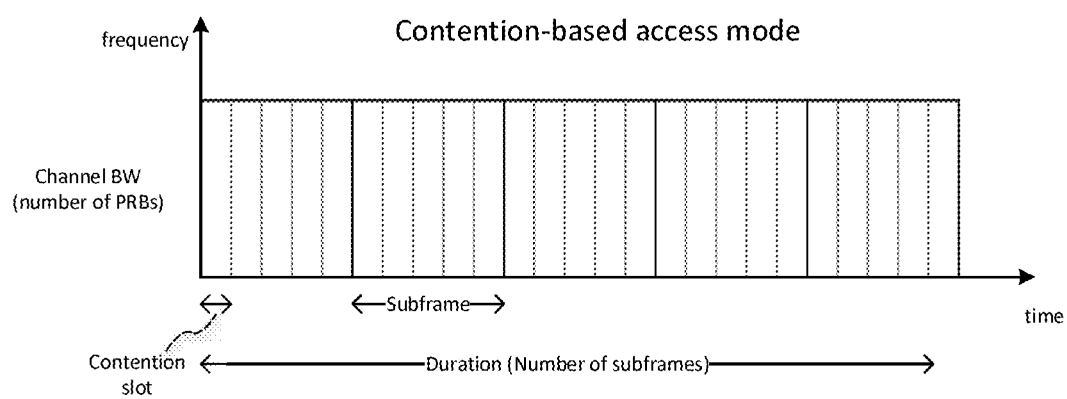
Figure 263:
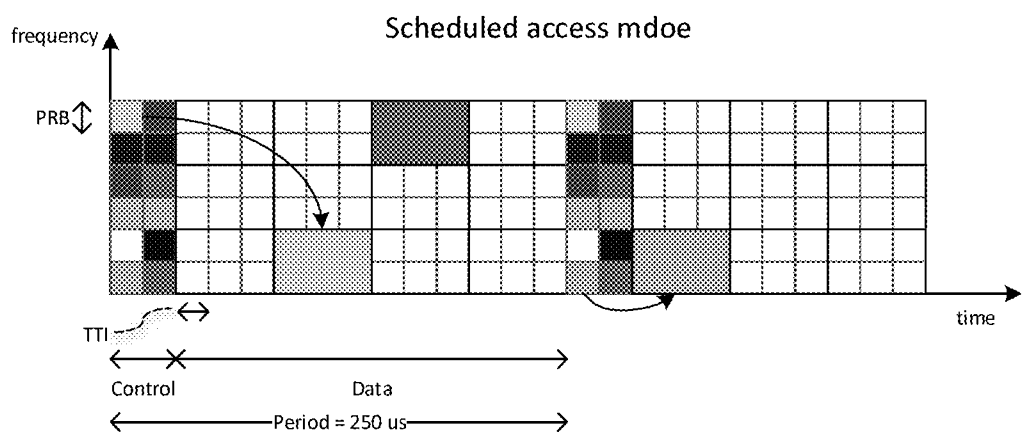
Figure 265:
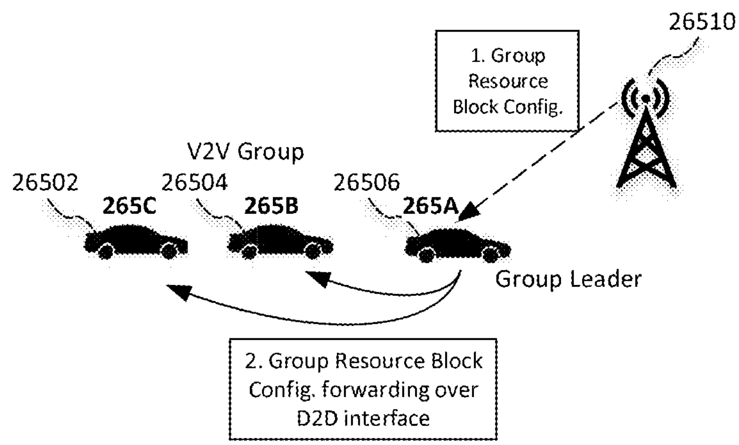
Figure 266:
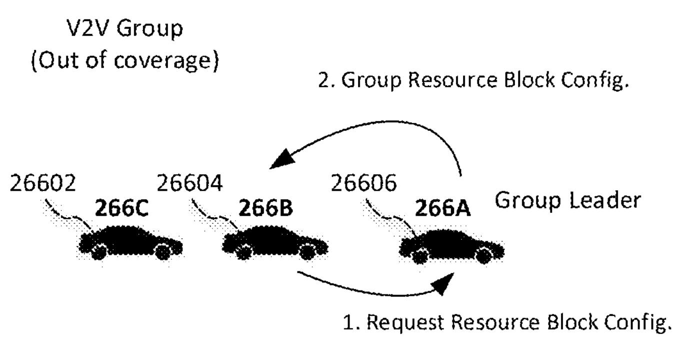
Figure 267:
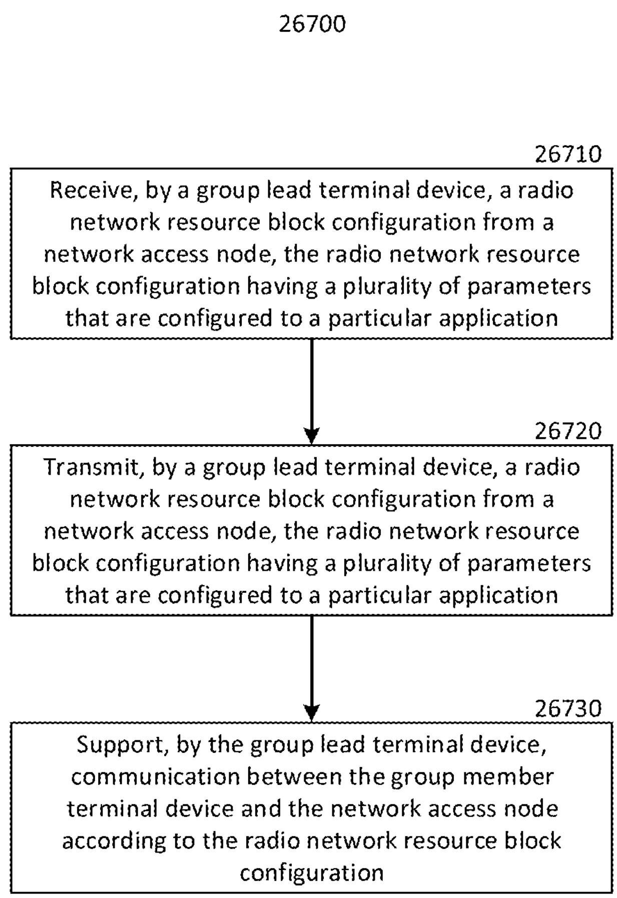
Figure 268:
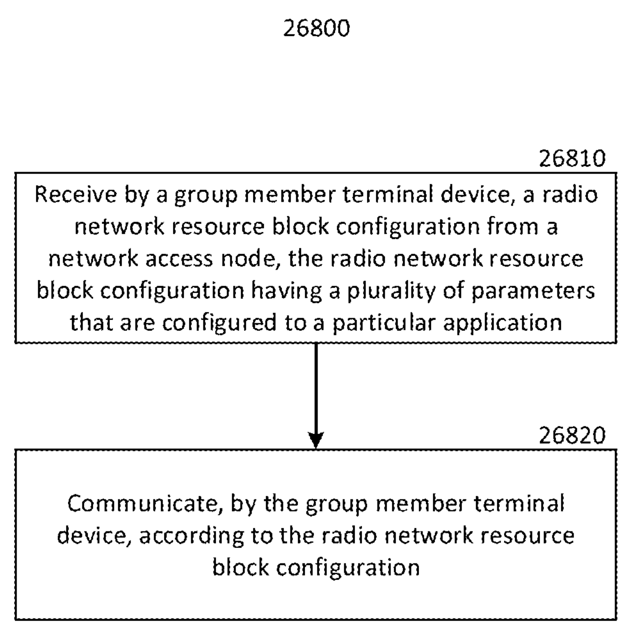
Figure 269:
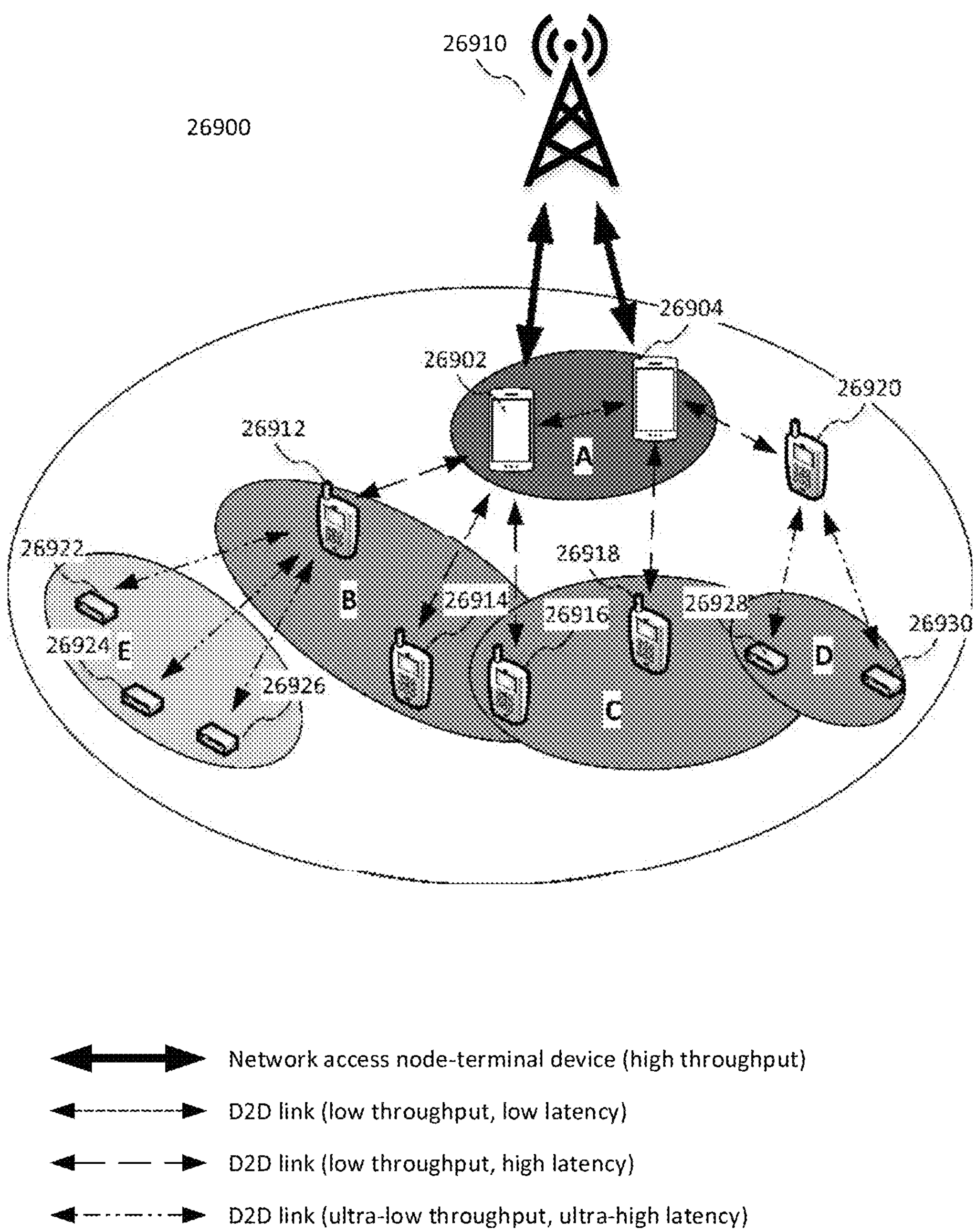
Figure 270:
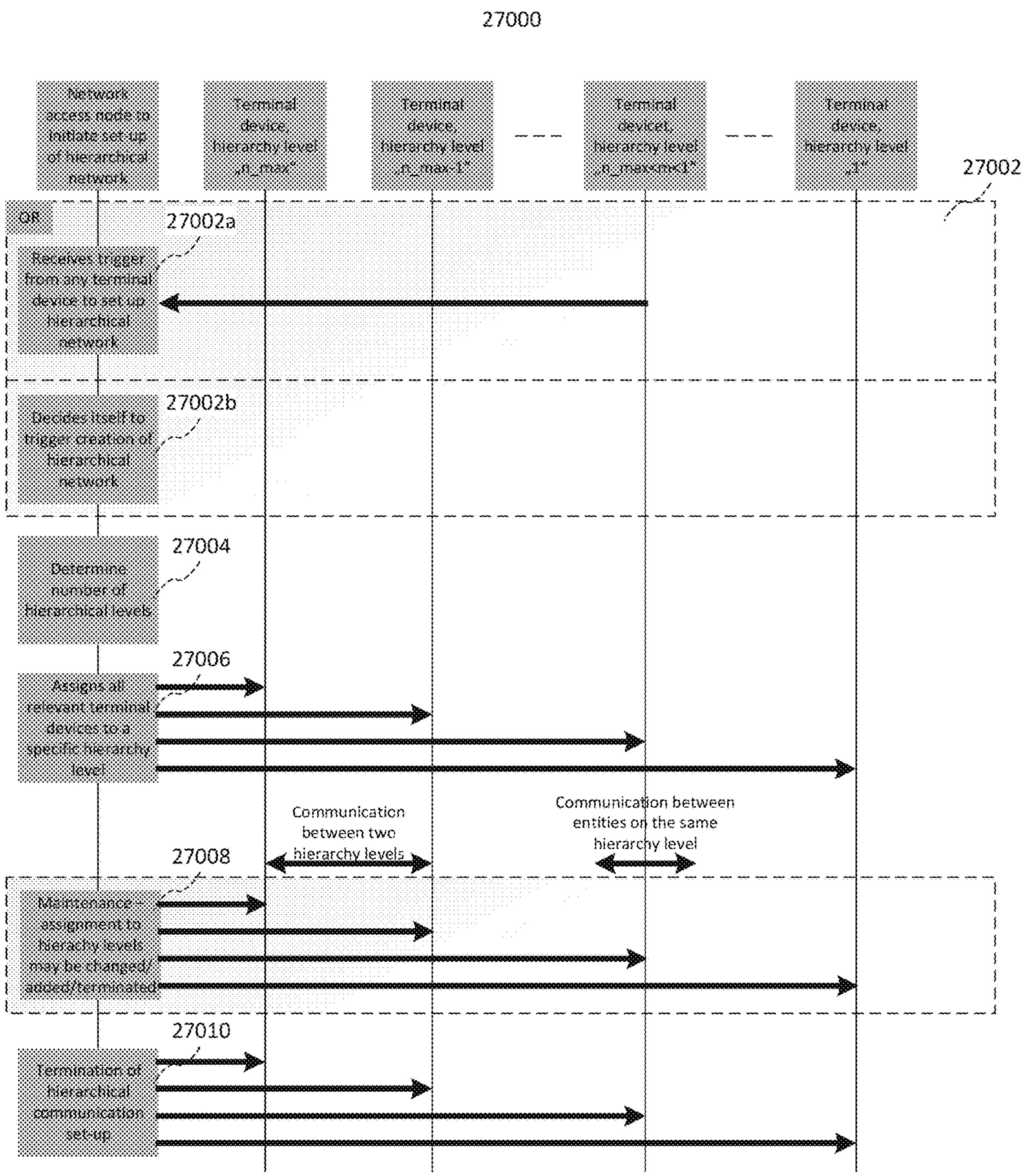
Figure 271:
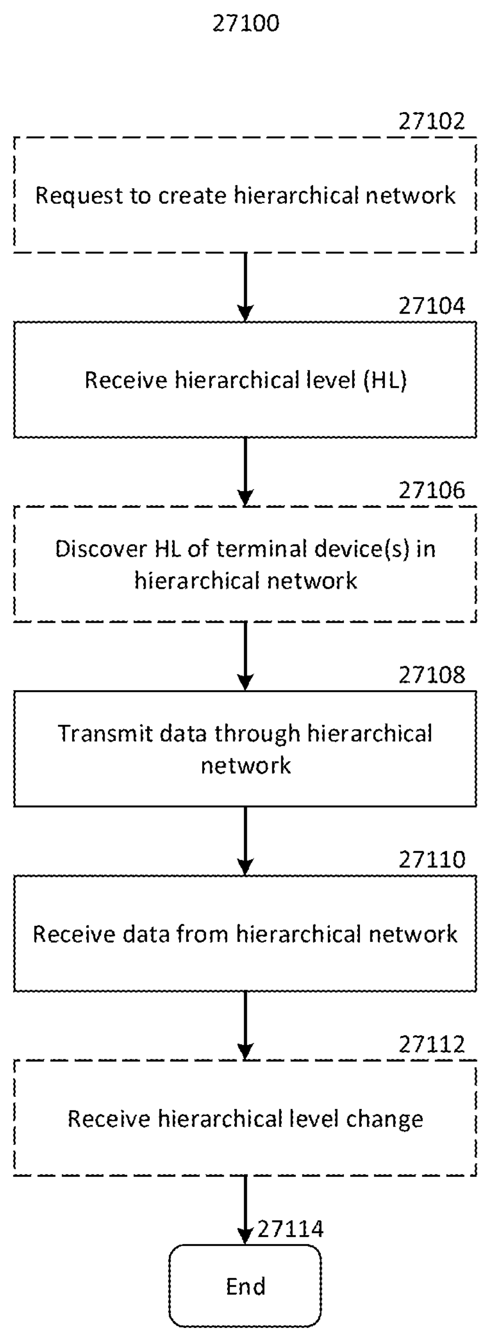
Figure 272:
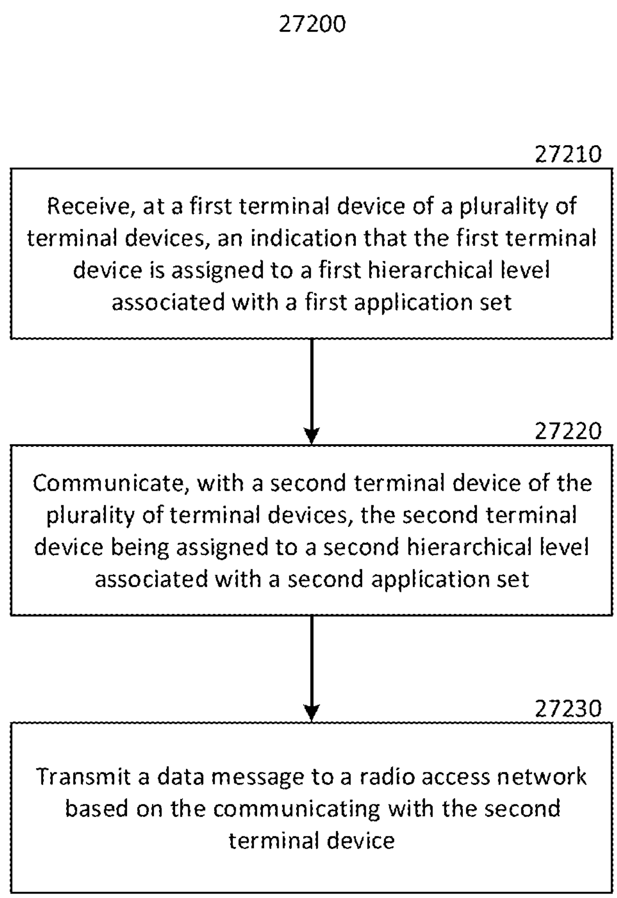
Figure 273:
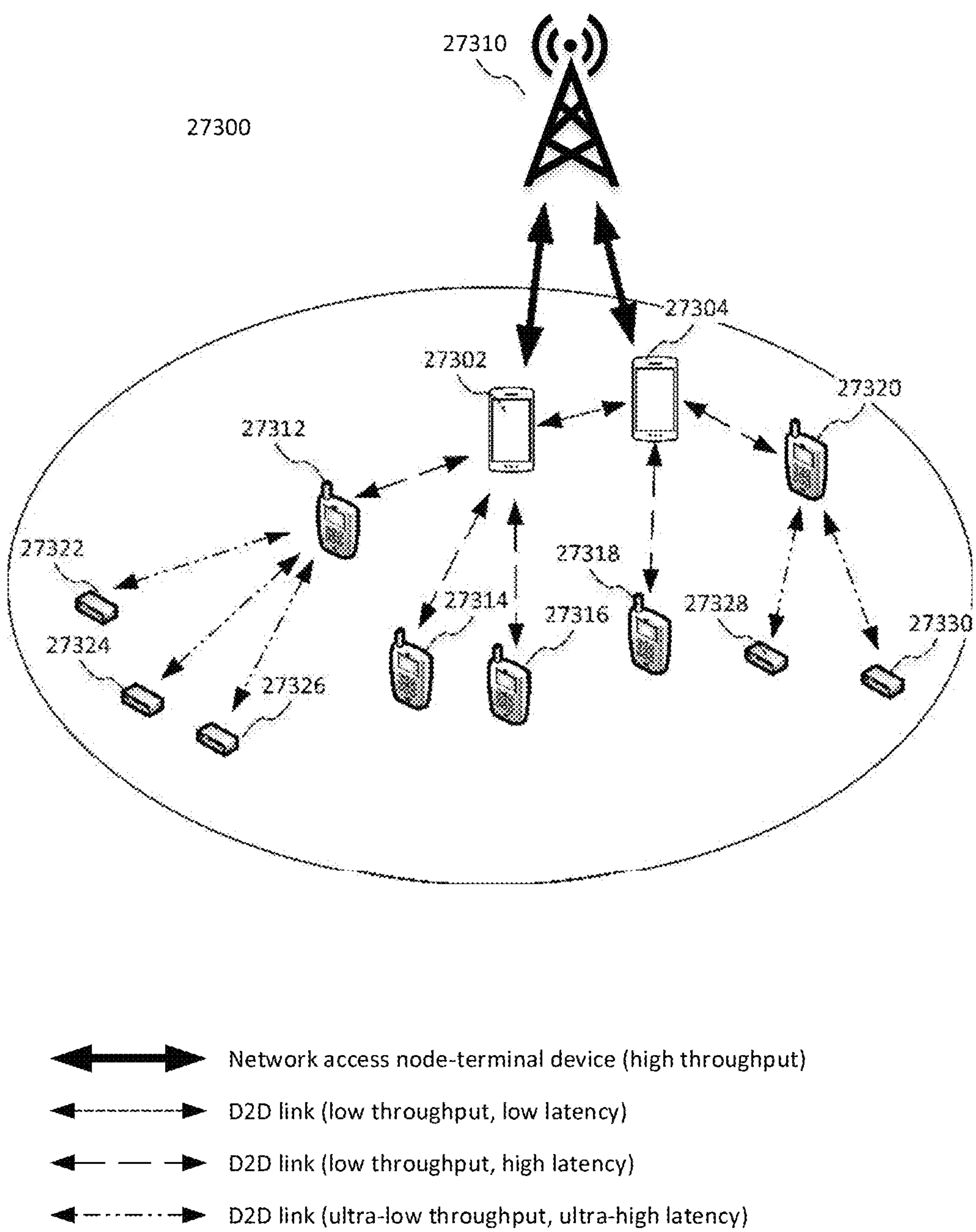
Figure 274:
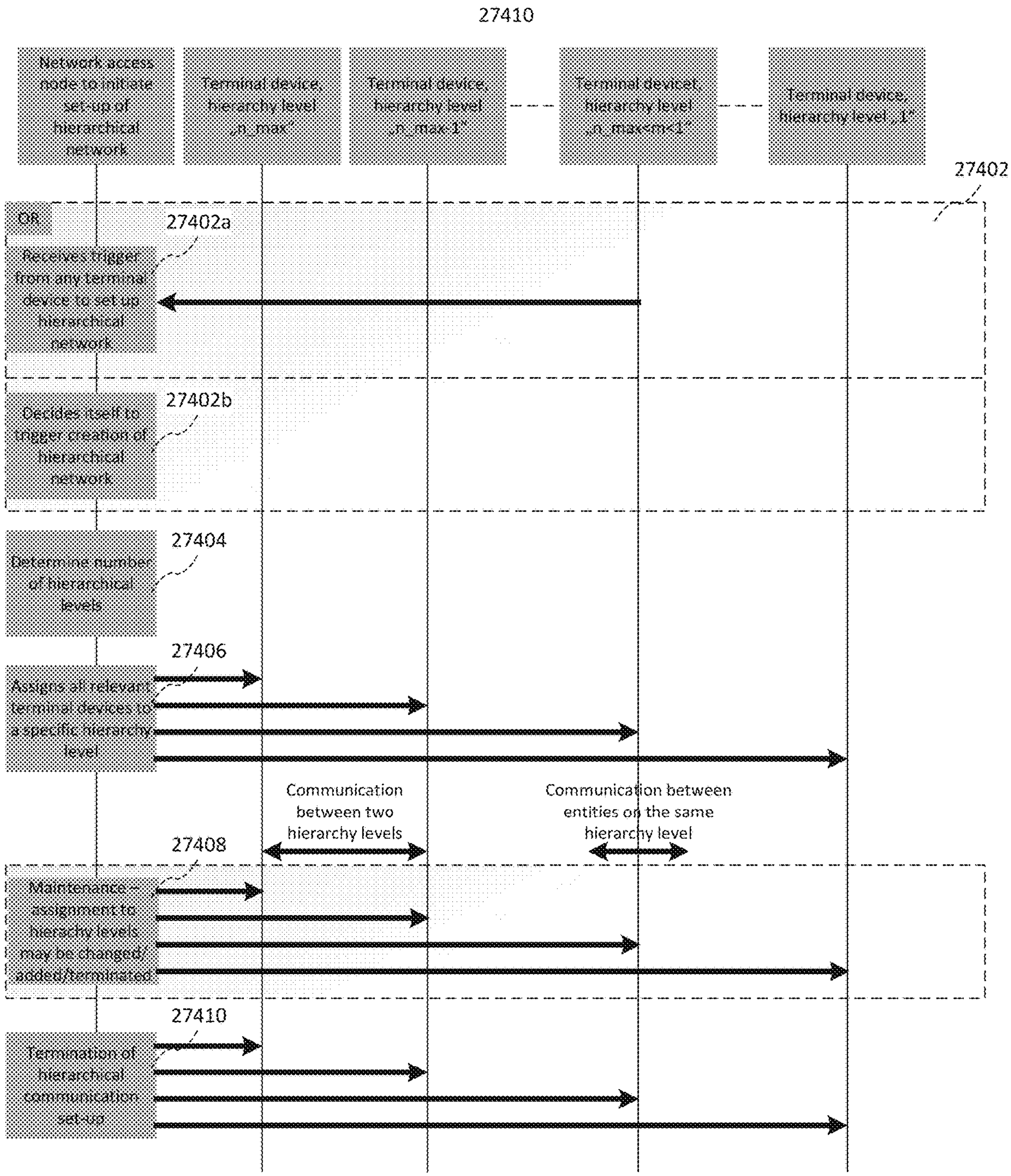
Figure 275:
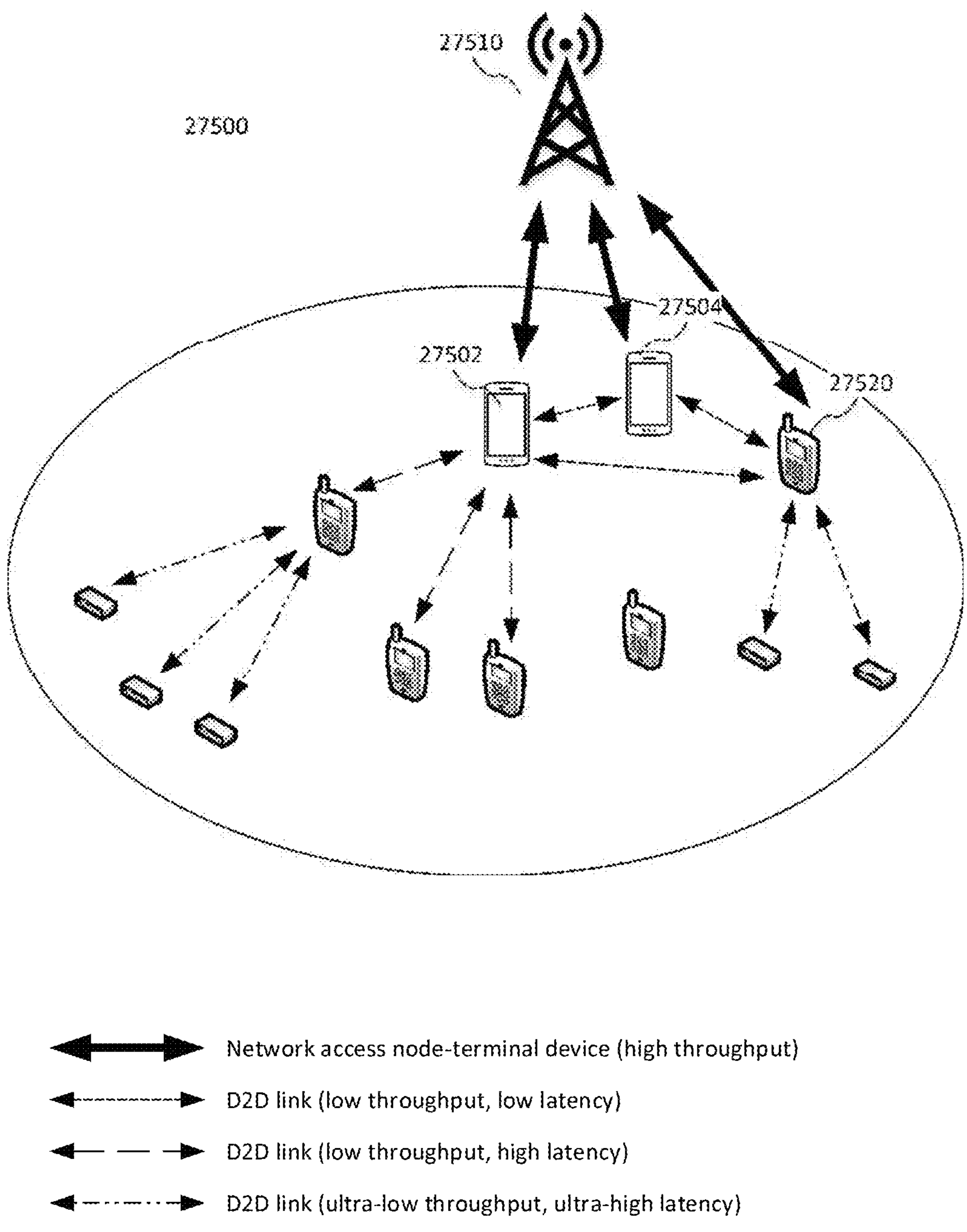
Figure 276:
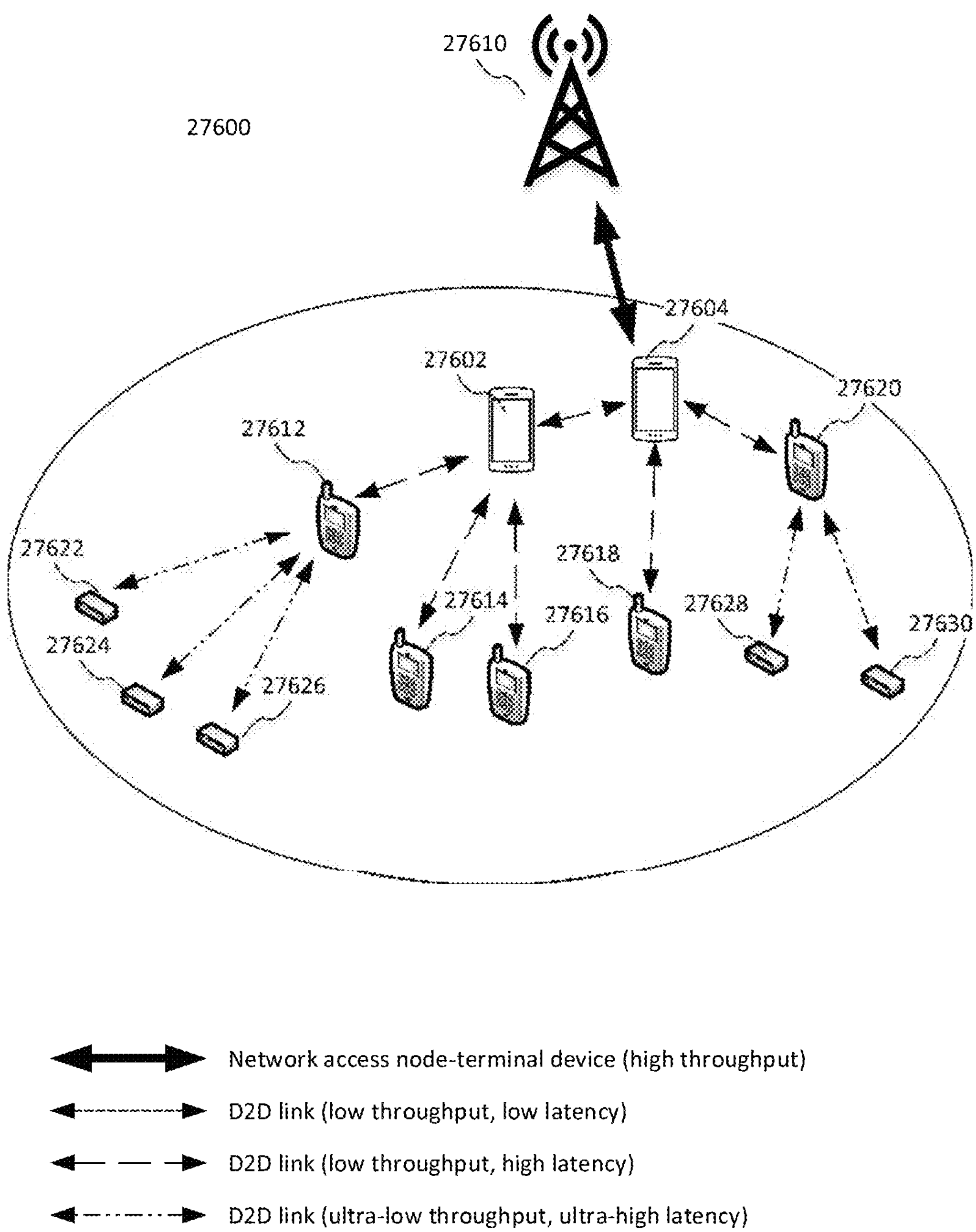
Figure 277:
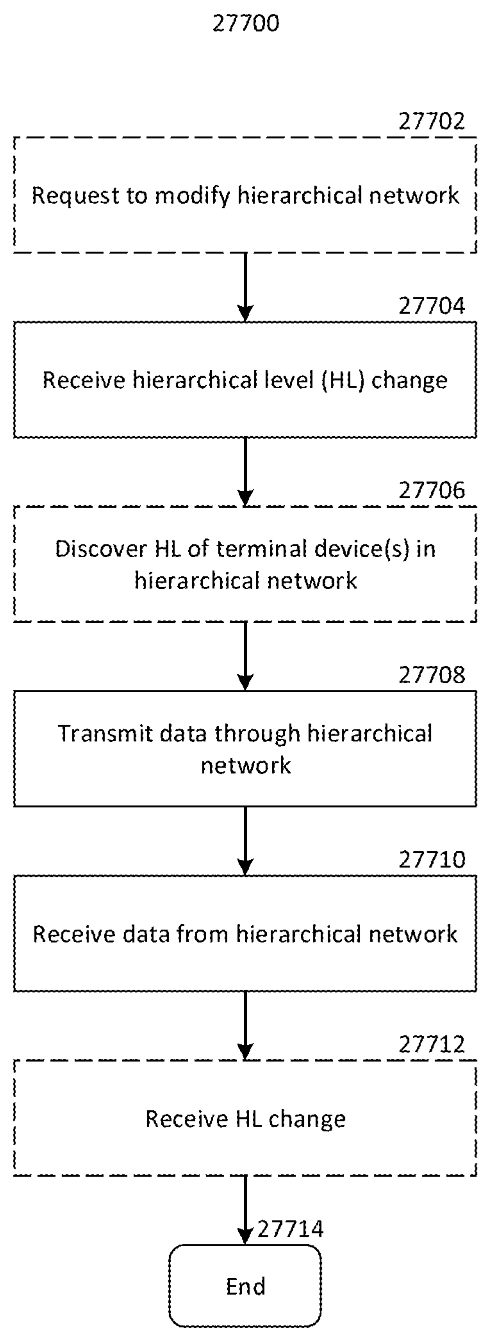
Figure 278:
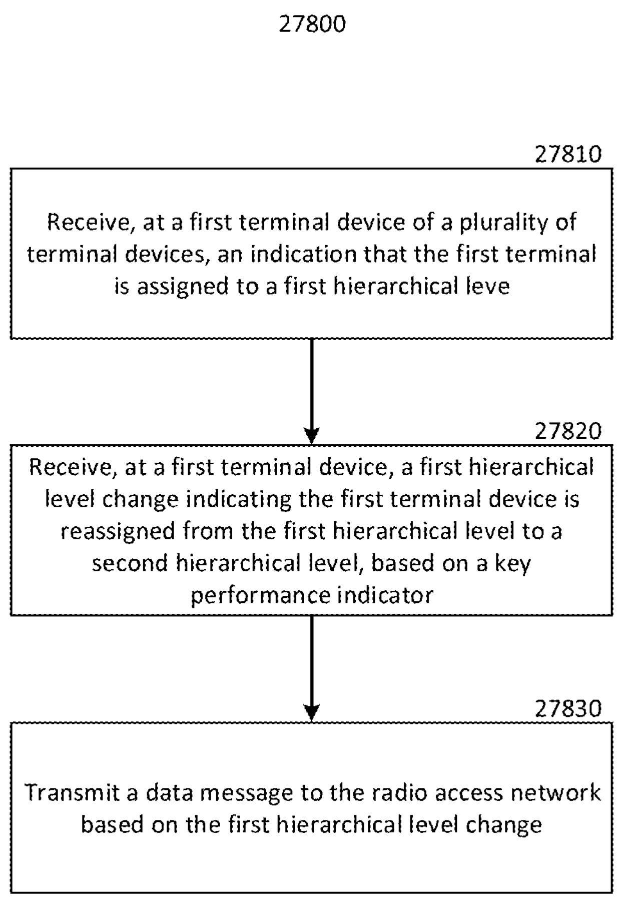

FIG. 131 shows a first exemplary method for managing REM data in a distributed manner in accordance with some aspects;

FIG. 132 shows a second exemplary method for managing REM data in accordance with some aspects;

FIG. 133 shows an exemplary plot of bursty traffic periods in accordance with some aspects;

FIG. 134 shows an exemplary method for triggering semi-persistent scheduling (SPS) based on predicted user traffic patterns in accordance with some aspects;

FIG. 135 shows an exemplary method of controlling scheduling decisions based on detection of non-compliant terminal device behavior in accordance with some aspects;

FIG. 136 shows an exemplary radio communication network in accordance with some aspects;

FIG. 137 shows an exemplary internal configuration of a terminal device in accordance with some aspects;

FIG. 138 shows an exemplary internal configuration of a network access node in accordance with some aspects;

FIG. 139 shows an exemplary end-to-end network architecture in accordance with some aspects;

FIG. 140 shows an exemplary end-to-end network architecture with network slicing in accordance with some aspects;

FIG. 141 shows an exemplary internal configuration of a terminal device in accordance with some aspects;

FIG. 142 shows an exemplary message sequence chart illustrating a message exchange between a terminal device and a core network for network slice selection in accordance with some aspects;

FIG. 143 shows a first exemplary method of performing radio communications in accordance with some aspects;

FIG. 144 shows a second exemplary method of performing radio communications in accordance with some aspects;

FIG. 145 shows a third exemplary method of performing radio communications in accordance with some aspects;

FIG. 146 shows an exemplary end-to-end network architecture with an edge computing server and charging server in accordance with some aspects;

FIG. 147 shows an exemplary internal configuration of an edge computing server in accordance with some aspects;

FIG. 148 shows an exemplary message sequence chart illustrating a message exchange between a terminal device, edge computing server, and charging server in accordance with some aspects;

FIG. 149 shows a first exemplary method of managing a data stream in accordance with some aspects;

FIG. 150 shows a second exemplary method of managing a data stream according in accordance with some aspects;

FIG. 151 shows an exemplary internal configuration of a terminal device in accordance with some aspects;

FIG. 152 shows a first exemplary message sequence chart illustrating a message exchange between a terminal device and a network access node in accordance with some aspects;

FIG. 153 shows a second exemplary message sequence chart illustrating a message exchange between a terminal device and a network access node in accordance with some aspects;

FIG. 154 shows a third exemplary message sequence chart illustrating a message exchange between a terminal device and a network access node in accordance with some aspects;

FIG. 155 shows an exemplary priority curve illustrating a service disabling priority in accordance with some aspects;

FIG. 156 shows an exemplary message sequence chart illustrating progressive service disablement in accordance with some aspects;

FIG. 157 shows a first exemplary method of performing radio communications in accordance with some aspects;

FIG. 158 shows a second exemplary method of performing radio communications in accordance with some aspects;

FIG. 159 shows an exemplary internal configuration of a terminal device in accordance with some aspects;

FIG. 160 shows an exemplary method of detecting and responding to thermal-constrained scenarios with throttling at a terminal device in accordance with some aspects;

FIG. 161 shows an exemplary method of detecting and responding to power-constrained scenarios with throttling at a terminal device in accordance with some aspects;

FIG. 162 shows an exemplary method of detecting and responding to thermal-constrained and/or power-constrained scenarios with throttling at a terminal device in accordance with some aspects;

FIG. 163 shows an exemplary configuration of a terminal device in accordance with some aspects;

FIG. 164 shows an exemplary method of performing radio communications in accordance with some aspects;

FIG. 165 shows an exemplary radio communication network in accordance with some aspects;

FIG. 166 shows an exemplary internal configuration of a terminal device in accordance with some aspects;

FIG. 167 shows an exemplary internal configuration of a network access node in accordance with some aspects;

FIG. 168 shows an exemplary end-to-end network architecture in accordance with some aspects;

FIG. 169 shows an exemplary network scenario in accordance with some aspects;

FIG. 170 shows an exemplary internal configuration of an assisting device in accordance with some aspects;

FIG. 171 shows an interactional diagram between terminal devices, network access nodes, and assisting device in accordance with some aspects;

FIG. 172 shows a first exemplary message sequence chart depicting interaction between a terminal device, an assisting device, and a network access node in accordance with some aspects;

FIG. 173 shows a second exemplary message sequence chart depicting interaction between a terminal device, an assisting device, and a network access node in accordance with some aspects;

FIG. 174 shows a third exemplary message sequence chart depicting interaction between a terminal device, an assisting device, and a network access node in accordance with some aspects;

FIG. 175 shows a fourth exemplary message sequence chart depicting interaction between a terminal device, an assisting device, and a network access node in accordance with some aspects;

FIG. 176 shows a fifth exemplary message sequence chart depicting interaction between a terminal device, an assisting device, and a network access node in accordance with some aspects;

FIG. 177 shows an exemplary network scenario involving support of multiple terminal devices by an assisting device in accordance with some aspects;

FIG. 178 shows an exemplary application of an Internet of Things (IoT) setting in accordance with some aspects;

FIG. 179 shows a first exemplary method of performing radio communications at a terminal device in accordance with some aspects;

FIG. 180 shows a second exemplary method of performing radio communications at a communication device in accordance with some aspects;

FIG. 181 shows a third exemplary method of performing radio communications at a communication device in accordance with some aspects;

FIG. 182 shows a first exemplary network scenario in accordance with some aspects of this disclosure;

FIG. 183 shows an exemplary internal configuration of a vehicle network access node in accordance with some aspects;

FIG. 184 shows a first exemplary message sequence chart illustrating prediction and pre-loading of target data for a terminal device in accordance with some aspects;

FIG. 185 shows a second exemplary message sequence chart illustrating prediction and pre-loading of target data for a terminal device in accordance with some aspects;

FIG. 186 shows a second exemplary network scenario in accordance with some aspects;

FIG. 187 shows an exemplary network scenario depicting terminal device and network access node connections in accordance with some aspects;

FIG. 188 shows a third exemplary message sequence chart illustrating prediction and pre-loading of target data for a terminal device in accordance with some aspects;

FIG. 189 shows a first exemplary method of performing radio communications at a local network access node of a vehicle in accordance with some aspects;

FIG. 190 shows a second exemplary method of performing radio communications at a local network access node of a vehicle in accordance with some aspects;

FIG. 191 shows an exemplary radio communication network in accordance with some aspects;

FIG. 192 shows an exemplary internal configuration of a terminal device in accordance with some aspects;

FIG. 193 shows an exemplary internal configuration of a network access node in accordance with some aspects;

FIG. 194 shows an exemplary network scenario involving roadside network access nodes and vehicles or vehicular terminal devices in accordance with some aspects;

FIG. 195 shows an exemplary illustration of a MapReduce framework in accordance with some aspects;

FIG. 196 shows an exemplary illustration of a coded MapReduce framework in accordance with some aspects;

FIG. 197 shows an exemplary network scenario involving groups of vehicles or vehicular terminal devices in accordance with some aspects;

FIG. 198 shows an exemplary internal configuration of a vehicular terminal device in accordance with some aspects;

FIG. 199 shows a first exemplary method of wireless distributed computation in accordance with some aspects;

FIG. 200 shows a second exemplary method of wireless distributed computation in accordance with some aspects;

FIG. 201 shows a progressive network scenario for a terminal device to connect to a network in accordance with some aspects;

FIG. 202 shows an exemplary logical, transport, and physical channel mapping scheme in accordance with some aspects;

FIG. 203 shows an exemplary method for connecting to a network using a direct link in accordance with some aspects;

FIG. 204 shows an exemplary internal configuration for a terminal device in accordance with some aspects;

FIG. 205 shows an exemplary method for telemetry aid over a direct link in accordance with some aspects;

FIG. 206 shows a first exemplary network scenario in accordance with some aspects;

FIG. 207 shows a second exemplary network scenario in accordance with some aspects;

FIG. 208 shows a first exemplary time chart illustrating a procedure for direct link sharing in accordance with some aspects;

FIG. 209 shows a third exemplary network scenario in accordance with some aspects;

FIG. 210 shows a second exemplary time chart illustrating a procedure for direct link sharing in accordance with some aspects;

FIG. 211 shows an exemplary network scenario related to the use of device knowledge history (DKH) classes in accordance with some aspects;

FIG. 212 shows an exemplary internal configuration of a terminal device in accordance with some aspects;

FIG. 213 shows a first exemplary method of performing radio communications at a terminal device in accordance with some aspects;

FIG. 214 shows a second exemplary method of performing radio communications at a terminal device in accordance with some aspects;

FIG. 215 shows a third exemplary method of performing radio communications at a terminal device in accordance with some aspects;

FIG. 216 shows an exemplary radio communication network in accordance with some aspects;

FIG. 217 shows an exemplary internal configuration of a terminal device in accordance with some aspects;

FIG. 218 shows an exemplary internal configuration of a network access node in accordance with some aspects;

FIG. 219 shows an exemplary end-to-end network architecture in accordance with some aspects;

FIG. 220 shows a first exemplary network scenario in accordance with some aspects;

FIG. 221 shows a second exemplary network scenario in accordance with some aspects;

FIG. 222 shows an exemplary internal configuration of a vehicular terminal device in accordance with some aspects;

FIG. 223 shows an exemplary internal configuration of a network access node in accordance with some aspects;

FIG. 224 shows an exemplary message sequence chart detailing the use of sidelink channels for vehicular communication links in accordance with some aspects;

FIG. 225 shows an exemplary method of performing radio communications at a vehicular terminal device in accordance with some aspects;

FIG. 226 shows an exemplary method of organizing vehicle-to-infrastructure (V2I) or vehicle-to-network (V2N) communications for a network access node in accordance with some aspects;

FIG. 227 shows an exemplary method of terminal device management of device-to-device communication in accordance with some aspects;

FIG. 228 shows an exemplary method of network management of device-to-device communication in accordance with some aspects;

FIG. 229 shows an exemplary network scenario related to serving a floating cell with a directional antenna beam in accordance with some aspects;

FIG. 230 shows an exemplary internal configuration of a network access node in accordance with some aspects;

FIG. 231 shows an exemplary internal configuration of an anchor aerial device in accordance with some aspects;

FIG. 232 shows an exemplary internal configuration of a secondary aerial device in accordance with some aspects;

FIG. 233 shows an exemplary time-frequency radio resource allocation in accordance with some aspects;

FIG. 234 shows an exemplary method for controlling a floating cell at an anchor aerial device of the floating cell in accordance with some aspects;

FIG. 235 shows an exemplary method of operating a secondary aerial device in a floating cell including a plurality of vehicles or aerial terminal devices in accordance with some aspects;

FIG. 236 shows an exemplary method of operating a network access node in accordance with some aspects;

FIG. 237 shows an exemplary method for network management of a floating cell in accordance with some aspects;

FIG. 238 shows an exemplary method of anchor drone operation within a floating cell in accordance with some aspects;

FIG. 239 shows an exemplary method of operating a secondary drone within a floating cell in accordance with some aspects;

FIG. 240 shows an exemplary network scenario that illustrates deployment of a mobile infrastructure node in accordance with some aspects;

FIG. 241 shows an exemplary internal configuration of a mobile infrastructure node with an autonomous driving system in accordance with some aspects;

FIG. 242 shows an exemplary method of activating a mobile infrastructure node as a dynamic mobile infrastructure in accordance with some aspects;

FIG. 243 shows an exemplar method of operating a mobile infrastructure node in accordance with some aspects;

FIG. 244 shows an exemplary method of operating a vehicle as a mobile infrastructure node in accordance with some aspects;

FIG. 245 shows an exemplary network scenario involving deployment of a mobile infrastructure node in response to a critical network scenario in accordance with some aspects;

FIG. 246 shows an exemplary configuration of a processing module of a mobile infrastructure node in accordance with some aspects;

FIG. 247 shows an exemplary message sequence chart illustrating activation and operation of a mobile infrastructure node in accordance with some aspects;

FIG. 248 shows an exemplary network scenario involving deployment of multiple mobile infrastructure nodes in accordance with some aspects;

FIG. 249 shows an exemplary internal configuration of a mobile infrastructure node with an autonomous driving system in accordance with some aspects;

FIG. 250 shows an exemplary method of providing network connectivity to an area impacted by network overload or outage at a mobile infrastructure node in accordance with some aspects;

FIG. 251 shows an exemplary method of coordinating one or more mobile infrastructure nodes to respond to network connectivity disruptions in accordance with some aspects;

FIG. 252 shows an exemplary network scenario involving a cluster of terminal devices that utilize the same identity in accordance with some aspects;

FIG. 253 shows an exemplary internal configuration of a terminal device in accordance with some aspects;

FIG. 254 shows an exemplary network scenario illustrating downlink communications in accordance with some aspects;

FIG. 255 shows an exemplary network scenario illustrating uplink communications in accordance with some aspects;

FIG. 256 shows an exemplary method for terminal device communication in accordance with some aspects;

FIG. 257 shows an exemplary method for managing a leader terminal device in accordance with some aspects;

FIG. 258 shows an exemplary method for terminal device communication in accordance with some aspects;

FIG. 259 shows a first exemplary method of performing radio communications at a terminal device in accordance with some aspects;

FIG. 260 shows a second exemplary method of performing radio communications at a terminal device in accordance with some aspects;

FIG. 261 shows an exemplary network scenario in accordance with some aspects;

FIG. 262 shows an exemplary time-frequency radio resource allocation related to a contention-based access mode in accordance with some aspects;

FIG. 263 shows an exemplary time-frequency radio resource allocation related to a scheduled-based access mode in accordance with some aspects;

FIG. 264 shows an exemplary group resource block in accordance with some aspects;

FIG. 265 shows an exemplary network scenario involving group resource block configuration forwarding in accordance with some aspects;

FIG. 266 shows an exemplary network scenario involving operation of a group leader in an out of coverage situation in accordance with some aspects;

FIG. 267 shows an exemplary method for provisioning radio network resources according to application requirements in accordance with some aspects;

FIG. 268 shows an exemplary method for provisioning radio network resources according to application requirements in accordance with some aspects;

FIG. 269 shows an exemplary network scenario involving a mobile cloud network in accordance with some aspects;

FIG. 270 shows an exemplary message sequence chart for setting up a temporary hierarchical network by a network access node in accordance with some aspects;

FIG. 271 shows an exemplary method for communication within a hierarchical network in accordance with some aspects;

FIG. 272 shows an exemplary method for communication in a hierarchical network in accordance with some aspects;

FIG. 273 shows an exemplary network scenario involving a mobile cloud network in accordance with some aspects;

FIG. 274 shows an exemplary message sequence chart for dynamically changing a hierarchical network by a network access node in accordance with some aspects;

FIGS. 275 and 276 show exemplary network scenarios that illustrate the effect of a hierarchical change on a mobile cloud network in accordance with some aspects;

FIG. 277 shows an exemplary method for dynamic communication within a hierarchical network in accordance with some aspects; and FIG. 278 shows an exemplary method for dynamic communication over a radio access network in accordance with some aspects.

DETAILED DESCRIPTION

The following detailed description refers to the accompanying drawings that show, by way of illustration, specific details and aspects in which the aspects of this disclosure may be practiced.

The word "exemplary" is used herein to mean "serving as an example, instance, or illustration". Any aspect or design described herein as "exemplary" is not necessarily to be construed as preferred or advantageous over other aspects or designs.

The words "plurality" and "multiple" in the description and the claims expressly refer to a quantity greater than one. The terms "group (of)", "set [of]", "collection (of)", "series (of)", "sequence (of)", "grouping (of)", etc., and the like in the description and in the claims, if any, refer to a quantity equal to or greater than one—for example, one or more. Any term expressed in plural form that does not expressly state "plurality" or "multiple" refers to a quantity equal to or greater than one. The terms "proper subset", "reduced subset", and "lesser subset" refer to a subset of a set that is not equal to the set—for example, a subset of a set that contains fewer elements than the set.

As used herein, the term "software" refers to any type of executable instruction or set of instructions, including embedded data in the software. Software can also encompass firmware. Software can create, delete or modify software, e.g., through a machine learning process.

A "module" as used herein is understood as any kind of functionality-implementing entity, which may include hardware-defined modules such as special-purpose hardware, software-defined modules such as a processor executing software or firmware, and mixed modules that include both hardware-defined and software-defined components. A module may thus be an analog circuit or component, digital circuit, mixed-signal circuit or component, logic circuit, processor, microprocessor, Central Processing Unit (CPU), application processor, Graphics Processing Unit (GPU), Digital Signal Processor (DSP), Field Programmable Gate Array (FPGA), integrated circuit, discrete circuit, Application Specific Integrated Circuit (ASIC), etc., or any combination thereof. Any other kind of implementation of the respective functions which will be described below in further detail may also be understood as a "module". It is understood that any two (or more) of the modules detailed herein may be realized as a single module with substantially equivalent functionality, and conversely that any single module detailed herein may be realized as two (or more) separate modules with substantially equivalent functionality. Additionally, references to a "module" may refer to two or more modules that collectively form a single module.

As used herein, the terms "circuit" and "circuitry" can include software-defined circuitry, hardware-defined circuitry, and mixed hardware-defined and software-defined circuitry.

As used herein, "memory" may be understood as a non-transitory computer-readable medium in which data or information can be stored for retrieval. Memory may be used by, included in, integrated or associated with a module. References to "memory" included herein may thus be understood as referring to volatile or non-volatile memory, including random access memory (RAM), read-only memory (ROM), flash memory, magnetoresistive random access memory (MRAM), phase random access memory (PRAM), spin transfer torque random access memory (STT MRAM), solid-state storage, 3-dimensional memory, 3-dimensional crosspoint memory, NAND memory, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be implemented as more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

Various aspects described herein can utilize any radio communication technology, including but not limited to a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LM), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, etc. These aspects can be applied in the context of any spectrum management scheme including dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable spectrum bands can also include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), Intelligent Transport Systems (ITS) band spectrum (5.9 GHz, typically 5.85-5.925 GHz), and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications, etc. Additionally, a hierarchical application of the scheme is possible, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. Various aspects can also be applied to different OFDM flavors (Cyclic Prefix OFDM (CP-OFDM), Single Carrier FDMA (SC-FDMA), Single Carrier OFDM (SC-OFDM), filter bank-based multicarrier (FBMC), OFDMA, etc.) and in particular 3GPP NR (New Radio) by allocating the OFDM carrier data bit vectors to the corresponding symbol resources. These aspects can also be applied to any of a Vehicle-to-Vehicle (V2V) context, a Vehicle-to-Infrastructure (V2I) context, an Infrastructure-to-Vehicle (I2V) context, or a Vehicle-to-Everything (V2X) context, e.g., in a DSRC or LTE V2X context, etc.

The term "base station" used in reference to an access node of a mobile communication network may be understood as a macro base station (such as, for example, for cellular communications), micro/pico/femto base station, Node B, evolved NodeB (eNB), Home eNodeB, Remote Radio Head (RRH), relay point, access point (AP, such as, for example, for Wi-Fi, WLAN, WiGig, millimeter Wave (mmWave), etc.) etc. As used herein, a "cell" in the setting of telecommunications may be understood as an area (e.g., a public place) or space (e.g., multi-story building or air-space) served by a base station or access point. The base station may be mobile, e.g., installed in a vehicle, and the covered area or space may move accordingly. Accordingly, a cell may be covered by a set of co-located transmit and receive antennas, each of which also able to cover and serve a specific sector of the cell. A base station or access point may serve one or more cells, where each cell is characterized by a distinct communication channel or standard (e.g., a base station offering 2G, 3G and LTE services). Macro-, micro-, femto-, pico-cells may have different cell sizes and ranges, and may be static or dynamic (e.g., a cell installed in a drone or balloon) or change its characteristic dynamically (for example, from macrocell to picocell, from static deployment to dynamic deployment, from omnidirectional to directional, from broadcast to narrowcast). Communication channels may be narrowband or broadband. Communication channels may also use carrier aggregation across radio communication technologies and standards, or flexibly adapt bandwidth to communication needs. In addition, terminal devices can include or act as base stations or access points or relays or other network access nodes.

For purposes of this disclosure, radio communication technologies or standards may be classified as one of a Short Range radio communication technology or Cellular Wide Area radio communication technology. Further, radio communication technologies or standards may be classified as person to person, person to machine, machine to person, machine to machine, device to device, point-to-point, one-to-many, broadcast, peer-to-peer, full-duplex, half-duplex, omnidirectional, beamformed, beam-formed, and/or directional. Further, radio communication technologies or standards may be classified as using electromagnetic or light waves or a combination thereof.

Short Range radio communication technologies include, for example, Bluetooth, WLAN (e.g., according to any IEEE 802.11 standard), WiGig (e.g., according to any IEEE 802.11 standard), millimeter Wave and other similar radio communication technologies. Cellular Wide Area radio communication technologies include, for example, Global System for Mobile Communications (GSM), Code Division Multiple Access 2000 (CDMA2000), Universal Mobile Telecommunications System (UMTS), Long Term Evolution (LTE), Long Term Evolution Advanced (LTE-A), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax), 5G (e.g., millimeter Wave (mmWave), 3GPP New Radio (NR)), next generation cellular standards like 6G, and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. Furthermore, as used herein the term GSM refers to both circuit- and packet-switched GSM, for example, including GPRS, EDGE, and any other related GSM technologies. Likewise, the term UMTS refers to both circuit- and packet-switched GSM, for example, including HSPA, HSDPA/HSUPA, HSDPA+/HSUPA+, and any other related UMTS technologies. Further communication technologies include Line of sight (Li Fi) communication technology. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, for example, in reference to a communication network such as a mobile communication network, encompasses both an access section of a network (e.g., a radio access network (RAN) section) and a core section of a network (e.g., a core network section), but also, for an end-to-end system, encompasses mobile (including peer-to-peer, device to device, and/or machine to machine communications), access, backhaul, server, backbone and gateway/interchange elements to other networks of the same or different type. The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network. The uplink communication channel may be a physical channel or a virtual channel. Idle or connection mode can be connection-switched or packet-switched.

The term "terminal devices" includes, for example, mobile phones, tablets, laptops, computers, Internet of Things (IoT) devices, wearables, implantable devices, machine-type communication devices, etc., and vehicles e.g., cars, trucks, buses, bicycles, robots, motorbikes, trains, ships, submarines, drones, airplanes, balloons, satellites, spacecraft, etc.) laptops), wearables trucks, buses, bicycles, robots, motorbikes, trains, ships, submarines, balloons, satellites, spacecraft. Vehicles can be autonomously controlled, semi-autonomously controlled, or under control of a person, e.g., according to one of the SAE J3016 levels of driving automation. The level of driving automation may be selected based on past, current and estimated future conditions of the vehicle, other vehicles, traffic, persons, or the environment.

Unless explicitly specified, the term "transmit" encompasses both direct (point-to-point) and indirect transmission (via one or more intermediary points), from terminal devices to network access or relay nodes, from terminal devices to terminal devices, from network access or relay nodes to backbone. Similarly, the term "receive" encompasses both direct and indirect reception and between terminal devices, network access and relay nodes and backbone. The term "communicate" encompasses one or both of transmitting and receiving, for example, unidirectional or bidirectional communication in one or both of the incoming and outgoing directions. Additionally, the terms "transmit", "receive", "communicate", and other similar terms encompass both physical transmission (e.g., the transmission of radio signals) and logical transmission (e.g., the transmission of logical data over a software-level connection). For example, a processor may transmit or receive data in the form of radio signals with another processor, where the physical transmission and reception is handled by radio-layer components such as RF transceivers and antennas and the logical transmission and reception is performed by the processor. The term "calculate" encompasses both direct calculations via a mathematical expression/formula/relationship and indirect calculations via lookup or hash tables and other indexing or searching operations.

Figure 1:
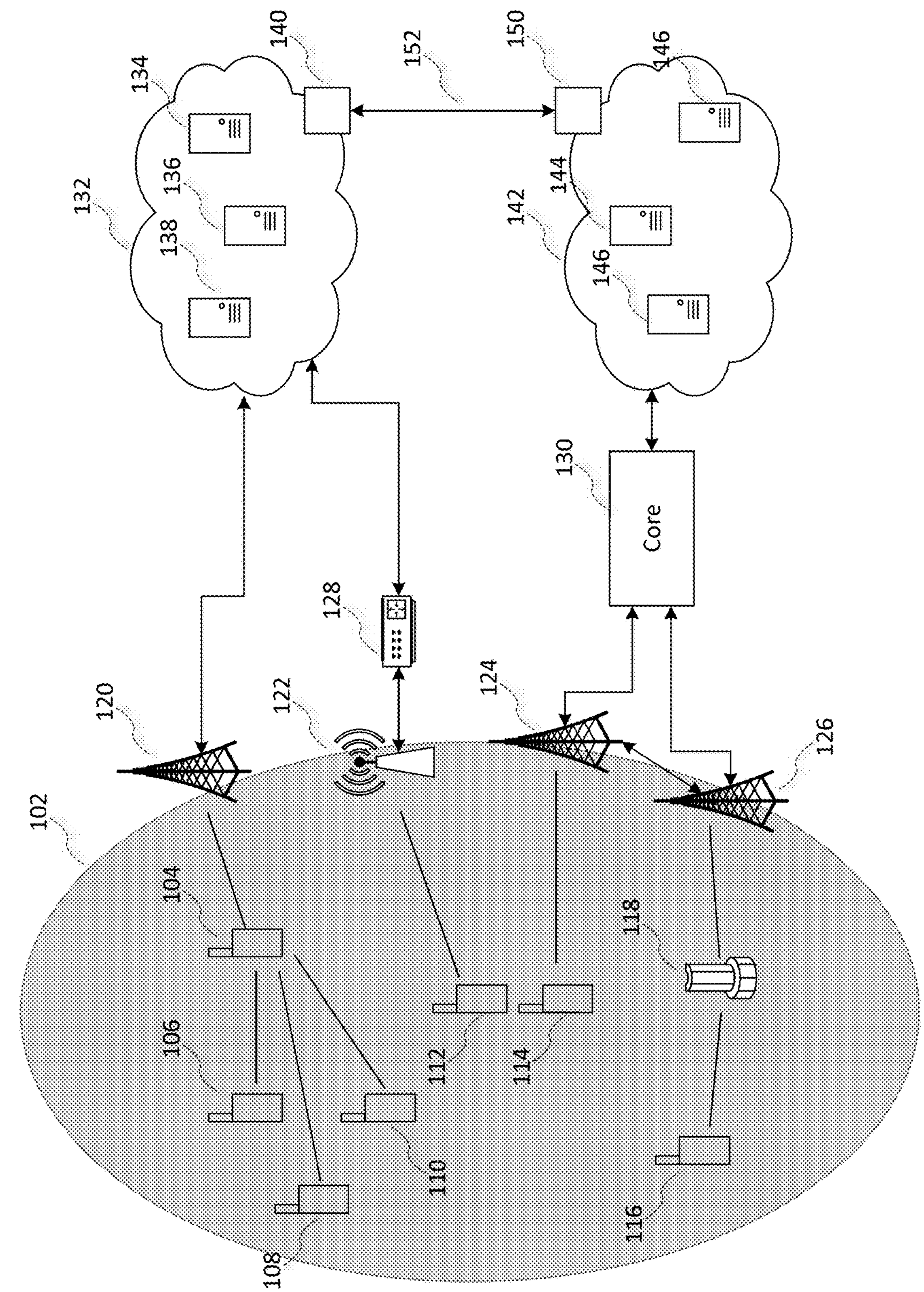
FIG. 1 shows an exemplary radio communication system including terminal devices, terminal devices also acting as access nodes, wireless links and standards, network access nodes, servers, gateways/interchanges and backbone infrastructures in accordance with some aspects.

FIG. 1 shows an exemplary depiction of communication network 100 according to some aspects. As shown in FIG. 1, communication network 100 may be an end-to-end network spanning from radio access network 102 to backbone networks 132 and 142. Backbone networks 132 and 142 may be realized as predominantly wireline networks. Network access nodes 120-126 may a radio access network and may wirelessly transmit and receive data with terminal devices 104-116 to provide radio access connections to terminal devices 104-116. Terminal devices 104-116 may utilize the radio access connections provided by radio access network 102 to exchange data on end-to-end connections with servers in backbone networks 132 and 142. The radio access connections between terminal devices 104-116 and network access nodes 120-126 may be implemented according to one or more radio access technologies, where each terminal device may transmit and receive data with a corresponding network access node according to the protocols of a particular radio access technology that governs the radio access connection. In some aspects, one or more of terminal devices 104-116 may utilize licensed spectrum or unlicensed spectrum for the radio access connections. In some aspects, one or more of terminal devices 104-116 may directly communicate with one another according to any of a variety of different device-to-device (D2D) communication protocols.

As shown in FIG. 1, in some aspects terminal devices such as terminal devices 106-110 may rely on a forwarding link provided by terminal device 104, where terminal device 104 may act as a gateway or relay between terminal devices 106-110 and network access node 120. In some aspects, terminal devices 106-110 may be configured according to a mesh or multi-hop network and may communicate with terminal device 104 via one or more other terminal devices. The configuration of terminal devices, e.g., a mesh or multi-hop configuration, may change dynamically e.g., according to terminal or user requirements, the current radio or network environment, the availability or performance of applications and services, or the cost of communications or access.

In some aspects, terminal devices such as terminal device 116 may utilize relay node 118 to transmit and/or receive data with network access node 126, where relay node 118 may perform relay transmission between terminal devices 116 and network access node 126, e.g., with a simple repeating scheme or a more complex processing and forwarding scheme. The relay may also be a realized as a series of relays, or use opportunistic relaying, where a the best or approximately best relay or series of relays at a given moment in time or time interval is used.

In some aspects, network access nodes such as network access node 124 and 126 may interface with core network 130, which may provide routing, control, and management functions that govern both radio access connections and core network and backhaul connections. As shown in FIG. 1, core network 130 may interface with backbone network 142, and may perform network gateway functions to manage the transfer of data between network access nodes 124 and 126 and the various servers of backbone network 142. In some aspects, network access nodes 124 and 126 may be directly connected with each other via a direct interface, which may be wired or wireless. In some aspects, network access nodes such as network access nodes 120 may interface directly with backbone network 132. In some aspects, network access nodes such as network access node 122 may interface with backbone network 132 via router 128.

Backbone networks 132 and 142 may contain various different internet and external servers in servers 134-138 and 144-148. Terminal devices 104-116 may transmit and receive data with servers 134-138 and 144-148 on logical software-level connections that rely on the radio access network and other intermediate interfaces for lower layer transport. Terminal devices 104-116 may therefore utilize communication network 100 as an end-to-end network to transmit and receive data, which may include internet and application data in addition to other types of user-plane data. In some aspects backbone networks 132 and 142 may interface via gateways 140 and 150, which may be connected at interchange 152.

1 Common Channel

Reception or transmission of discovery and control information may be an important part of wireless network activity for terminal devices or network access nodes. Terminal devices may reduce operating power and increase operating time and performance by intelligently finding or scanning the radio environment for network access nodes and standards or other terminal devices. Terminal devices can scan for discovery information in order to detect and identify available communication technologies and standards, parameters of these available communication technologies and standards, and proximate network access nodes or other terminal devices. In another aspect, there may be a known or from time to time published schedule, specifying one or more access technologies or standards, or specifying one or more channels, which may be scanned with priority to reduce scan efforts. In yet another aspect, discovery or control information may be communicated as payload or as part of the payload of channels, e.g., as a web or internet or cloud service, also using preferred or advertised channels, to reduce scan efforts. After identifying the presence of proximate network access nodes or other terminal devices via reception of such discovery information, terminal devices may be able to establish a wireless connection with a selected network access node or other terminal device in order to exchange data and/or pursue other radio interactions with network access nodes or other terminal devices such as radio measurement or reception of broadcast information. The selection of a network access node or other terminal may be based on terminal or user requirements, past, present and anticipated future radio and environment conditions, the availability or performance of applications and services, or the cost of communications or access.

In order to ensure that both incoming and outgoing data is received and transmitted properly with a selected network access node or other terminal device e.g., according to a wireless standard or a proprietary standard, or a mix thereof, a terminal device may also receive control information that provides control information or parameters. The control parameters can include, for example, time and frequency scheduling information, coding/modulation schemes, power control information, paging information, retransmission information, connection/mobility information, and/or other such information that defines how and when data is to be transmitted and received. Terminal devices may then use the control parameters to control data transmission and reception with the network access node or other terminal device, thus enabling the terminal device to successfully exchange user and other data traffic with the network access node or other terminal device over the wireless connection. The network access node may interface with an underlying communication network (e.g., a core network) that may provide a terminal device with data including voice, multimedia (e.g., audio/video/image), internet and/or other web-browsing data, etc., or provide access to other applications and services, e.g., using cloud technologies.

Therefore, in order to effectively operate on wireless communication networks, it may be important that terminal devices properly receive, transmit and interpret both discovery and control information. To this end, it may be desirable that terminal devices receive the discovery and control information on proper frequency resources at correct times (for example, in accordance with scheduling parameters) and demodulate and decode the received discovery and control information according to the modulation and coding schemes (for example, in accordance with formatting parameters) to recover the original data, or keep the effort of finding the discovery and control information low.

The procedure to receive and interpret such information according to the corresponding scheduling and formatting parameters may be defined by specific protocols associated with the radio access technology employed by the wireless communications network. For example, a first wireless network may utilize a first radio access technology (RAT, such as, for example, a 3GPP radio access technology, Wi-Fi, and Bluetooth), which may have a specific wireless access protocol that defines the scheduling and format for discovery information, control information, and user traffic data transmission and reception. Network access nodes and terminal devices operating on the first wireless network may thus follow the wireless protocols of the first radio access technology in order to properly transmit and receive wireless data on the first wireless network.

Each radio access technology may define different scheduling and format parameters for discovery and control information. For example, a second radio access technology may specify different scheduling and format parameters for discovery and control information (in addition to for user data traffic) from the first radio access technology. Accordingly, a terminal device may utilize a different reception procedure to receive discovery and control information for the first wireless network than for the second wireless network; examples include receiving different discovery signals/waveforms, receiving discovery and control information with different timing, receiving discovery and control information in different formats, receiving discovery and control information on different channels and/or using different frequency resources, etc.

The present disclosure relates to a terminal device that is configured to operate on a plurality of radio access technologies. A terminal device configured to operate on a plurality of radio access technologies (e.g., the first and second RATs) can be configured in accordance with the wireless protocols of both the first and second RATs (and likewise for operation on additional RATs). For example, LTE network access nodes (e.g., eNodeBs) may transmit discovery and control information in a different format (including the type/contents of information, modulation and coding scheme, data rates, etc.) with different time and frequency scheduling (including periodicity, center frequency, bandwidth, duration, etc.) than Wi-Fi network access nodes (e.g., WLAN APs). Consequently, a terminal device designed for both LTE and Wi-Fi operation may operate according to the specific LTE protocols in order to properly receive LTE discovery and control information and may also operate according to the specific Wi-Fi protocols in order to properly receive Wi-Fi discovery and control information. Terminal devices configured to operate on further radio access networks, such as UMTS, GSM, Bluetooth, may likewise be configured to transmit and receive radio signals according to the corresponding individual access protocols. In some aspects, terminal devices may have dedicated hardware and/or software component for each supported radio access technology.

In some aspects, a terminal device can be configured to omit the periodic scanning of the radio environment for available network access nodes, other terminal devices, and communication technologies and standards. This allows the terminal device to reduce operating power consumption and increase operating time and performance by omitting the periodic scanning of the radio environment for available network access nodes, other terminal devices, and communication technologies and standards. Instead, of performing periodic comprehensive scans of the radio environment, a terminal device can be configured scan dedicated discovery or control channels. In some aspects, dedicated discovery or control channels may be provided by network access nodes or other terminal devices. In other aspects, network access nodes or other terminal devices may advertise which discovery or control channels should be used by the terminal device.

Alternatively or additionally, in some aspects, network access nodes or other terminal devices can act as a proxy, relaying discovery or control information on a dedicated channel. For example, a resourceful other terminal device relaying discovery or control information via low power short range communication, such as Bluetooth or 802.15.4 Low Energy (LE), to a proximate terminal device.

Figure 2:
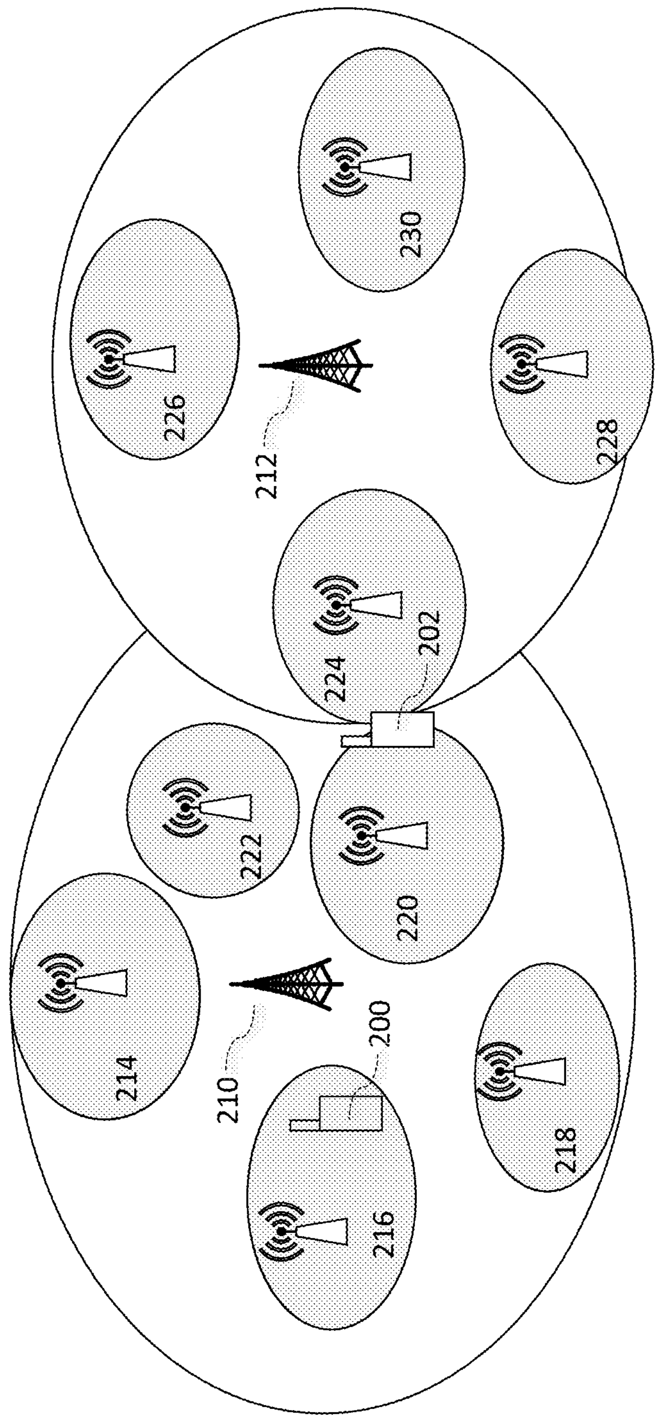
FIG. 2 shows a network scenario including terminal devices and network access nodes related to an exemplary discovery information scheme such as common discovery channel scheme in accordance with some aspects.

FIG. 2 shows an exemplary wireless network configuration in accordance with some aspects. As shown in FIG. 2, terminal devices 200 and 202 may interact with one or more network access nodes, including network access nodes 210-230. In some aspects, network access nodes 210 and 212 may be network access nodes for a first radio access technology (RAT) and network access nodes 214-230 may be network access nodes for a second RAT. Furthermore, in some aspects network access nodes 210 and 212 may be located at a cell site or radio tower (or a similar network broadcast point) that contain cells of additional radio access technologies. For example, one or more cells of a third RAT, a fourth RAT, and/or a fifth RAT may be located at a cell site with network access node 210 and/or 212. In an exemplary scenario, network access node 210 may be an LTE network access node and may be co-located with any one or more of UMTS, GSM, mmWave, 5G, Wi-Fi/WLAN, and/or Bluetooth. Although aspects detailed below may refer radio access networks, aspects provided below can use any other combinations of radio access networks, and network access nodes 210-212 and 214-230 may analogously utilize any type of radio access technology in compliance with the radio access networks. For example, aspects provided below can use LTE-Advanced and Wi-Fi/WLAN.

Terminal device 200 and terminal device 202 may be any type of terminal device such as a cellular phone, user equipment, tablet, laptop, personal computer, wearable, multimedia playback and/or other handheld electronic device, consumer/home/office/commercial appliance, vehicle, or any type of electronic devices capable of wireless communications.

In some aspects, terminal devices 200 and 202 may be configured to operate in accordance with a plurality of radio access networks, such as both LTE and Wi-Fi access networks. Consequently, terminal devices 200 and 202 may include hardware and/or software specifically configured to transmit and receive wireless signals according to each respective access protocol. Without loss of generality, terminal devices 200 (and/or 202) may also be configured to support other radio access technologies, such as other cellular, short-range, and/or metropolitan area radio access technologies including. For example, in an exemplary configuration terminal device 200 may be configured to support LTE, UMTS (both circuit- and packet-switched), GSM (both circuit- and packet-switched), and Wi-Fi. In another exemplary configuration, terminal device 200 may additionally or alternatively be configured to support 5G and mmWave radio access technologies.

Figure 3:
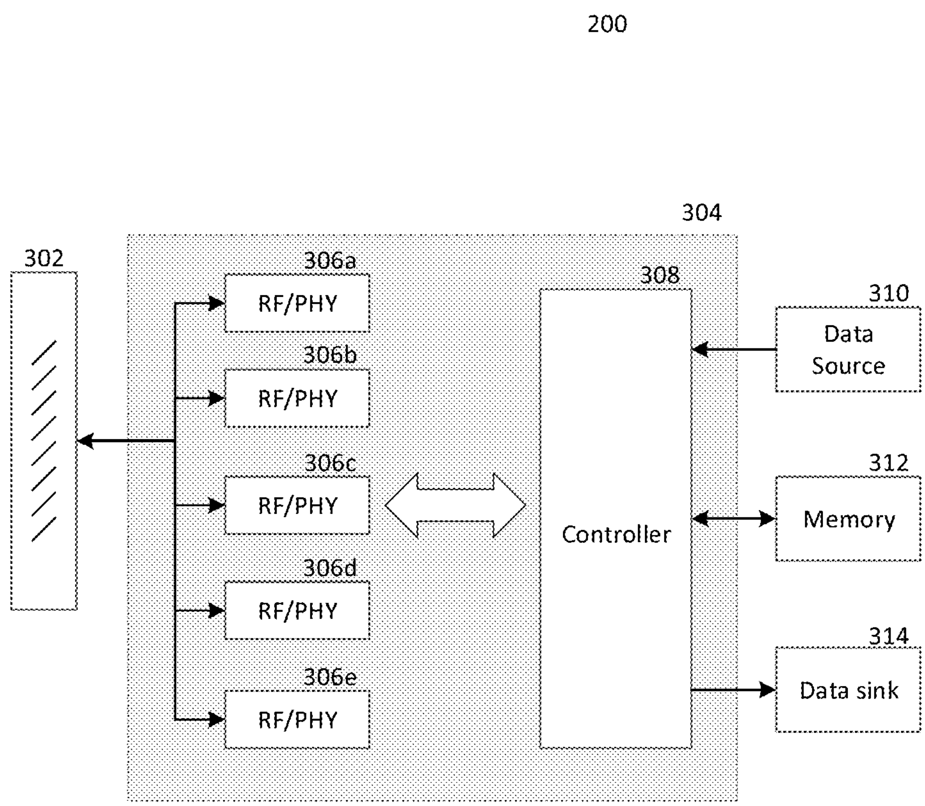
FIG. 3 shows an internal configuration of an exemplary terminal device in accordance with some aspects.

FIG. 3 shows an exemplary internal configuration of terminal device 200 in accordance with some aspects. As shown in FIG. 3, terminal device 200 may include antenna system 302, communication system 304 including communication modules **306*a*-306*e* and controller 308, data source 310, memory 312, and data sink 314. Although not explicitly shown in FIG. 3, terminal device 200** may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identify module(s) (SIMs), user input/output devices (display(s), keypad(s), touchscreen(s), speaker(s), external button(s), camera(s), microphone(s), etc.), etc.

In an abridged operational overview, terminal device 200 may transmit and receive radio signals on one or more radio access networks. Controller 308 may direct such communication functionality of terminal device 200 according to the radio access protocols associated with each radio access network and may execute control over antenna system 302 in order to transmit and receive radio signals according to the formatting and scheduling parameters defined by each access protocol.

Terminal device 200 may transmit and receive radio signals with antenna system 302, which may be an antenna array including multiple antennas and may additionally include analog antenna combination and/or beamforming circuitry. The antennas of antenna system 302 may be individually assigned or commonly shared between one or more of communication modules **306*a*-306*e*. For example, one or more of communication modules 306*a*-306*e* may have a unique dedicated antenna while other of communication modules 306*a*-306*e*** may share a common antenna.

Controller 308 may maintain RAT connections via communication modules **306*a*-306*d* by providing and receiving upper-layer uplink and downlink data in addition to controlling the transmission and reception of such data via communication modules 306*a*-306*d* as radio signals. Communication modules 306*a*-306*d* may transmit and receive radio signals via antenna system 302 according to their respective radio access technology and may be responsible for the corresponding RF- and PHY-level processing. In some aspects, first communication module 306*a* may be assigned to a first RAT, second communication module 306*b* may be assigned to a second RAT, third communication module 306*c* may be assigned to a second RAT, and fourth communication module 306*d* may be assigned to a fourth RAT. As further detailed below, common discovery module 306*e*** may be configured to perform common discovery channel monitoring and processing.

In the receive path, communication modules **306*a*-306*d* may receive analog radio frequency signals from antenna system 302 and perform analog and digital RF front-end processing on the analog radio frequency signals to produce digital baseband samples (e.g., In-Phase/Quadrature (IQ) samples). Communication modules 306*a*-306*d* may accordingly include analog and/or digital reception components including amplifiers (e.g., a Low Noise Amplifier (LNA)), filters, RF demodulators (e.g., an RF IQ demodulator), and analog-to-digital converters (ADCs) to convert the received radio frequency signals to digital baseband samples. Following the RF demodulation, communication modules 306a-306d may perform PHY layer reception processing on the digital baseband samples including one or more of error detection, forward error correction decoding, channel decoding and de-interleaving, physical channel demodulation, physical channel de-mapping, radio measurement and search, frequency and time synchronization, antenna diversity processing, rate matching, retransmission processing. In some aspects, communication modules 306a-306d can include hardware accelerators that can be assigned such processing-intensive tasks. Communication modules 306a-306d may also provide the resulting digital data streams to controller 308** for further processing according to the associate radio access protocols.

Although shown as single components in FIG. 3, communication modules 306a-306d may each be realized as separate RF and PHY modules including the respective RF and PHY components and functionality. Furthermore, one or more of such RF and PHY modules of multiple of communication modules 306a-306d may be integrated into a common component, such as, for example, a common RF front-end module that is shared between multiple radio access technologies. Such variations are thus recognized as offering similar functionality and are within the scope of this disclosure.

In the transmit path, communication modules 306a-306d may receive digital data streams from controller 308 and perform PHY layer transmit processing including one or more of error detection, forward error correction encoding, channel coding and interleaving, physical channel modulation, physical channel mapping, antenna diversity processing, rate matching, power control and weighting, and/or retransmission processing to produce digital baseband samples. Communication modules 306a-306d may then perform analog and digital RF front-end processing on the digital baseband samples to produce analog radio frequency signals to provide to antenna system 302 for wireless transmission. Communication modules 306a-306d may thus also include analog and/or digital transmission components including amplifiers (e.g., a Power Amplifier (PA), filters, RF modulators (e.g., an RF IQ modulator), and digital-to-analog converters (DACs) to mix the digital baseband samples to produce the analog radio frequency signals for wireless transmission by antenna system 302.

In some aspects, one or more of communication modules 306a-306d may be structurally realized as hardware-defined modules, for example, as one or more dedicated hardware circuits or FPGAs. In some aspects, one or more of communication modules 306a-306d may be structurally realized as software-defined modules, for example, as one or more processors executing program code defining arithmetic, control, and I/O instructions (e.g., software and/or firmware) stored in a non-transitory computer-readable storage medium. In some aspects, one or more of communication modules 306a-306d may be structurally realized as a combination of hardware-defined modules and software-defined modules.

Although not explicitly shown in FIG. 3, communication modules 306a-306d may include a controller, such as a processor, configured to control the various hardware and/or software processing components of communication modules 306a-306d in accordance with physical layer control logic defined by the communications protocol for the relevant radio access technologies.

While communication modules 306a-306d may be responsible for RF and PHY processing according to the respective radio access protocols, controller 308 may be responsible for upper-layer control and may be embodied as a processor configured to execute protocol stack software code that directs controller 308 to operate according to the associated radio access protocol logic. Controller 308 may direct upper-layer control over communication modules 306a-306d in addition to providing uplink data for transmission and receiving downlink data for further processing.

Although depicted as a single component in FIG. 3, controller 308 may be realized as multiple separate controllers each tasked with execution of protocol stack logic for one or more communication modules 306a-306d, such as, for example, a dedicated controller for each of communication modules 306a-306d. Controller 308 may be responsible for controlling antenna system 302 and communication modules 306a-306d in accordance with the communication protocols of supported radio access technology, and accordingly may represent the Access Stratum and Non-Access Stratum (NAS) (also encompassing Layer 2 and Layer 3) of supported radio access technology.

As shown in FIG. 3, terminal device 200 may also include data source 310, memory 312, and data sink 314, where data source 310 may include sources of communication data above controller 308 (e.g., above the NAS/Layer 3) and data sink 314 may include destinations of communication data above controller 308 (e.g., above the NAS/Layer 3). Such may include, for example, an application processor of terminal device 200, which may be configured to execute various applications and/or programs of terminal device 200 at an application layer of terminal device 200, such as, for example, an Operating System (OS), a User Interface (UI) for supporting user interaction with terminal device 200, and/or various user applications. The application processor may interface with controller 308 (as data source 310/data sink 314) as an application layer to transmit and receive user data, such as voice data, audio/video/image data, messaging data, application data, and basic Internet/web access data, over the radio network connection(s) provided by communication system 304. Data source 310 and data sink 314 may additionally represent various user input/output devices of terminal device 200, such as display(s), keypad(s), touchscreen(s), speaker(s), external button(s), camera(s), and microphone(s), which may allow a user of terminal device 200 to control various communication functions of terminal device 200 associated with user data. Memory 312 includes a memory component of terminal device 200, such as, for example, a hard drive or another such memory device. Although not explicitly depicted in FIG. 3, various other components of terminal device 200 shown in FIG. 3 may include integrated permanent and non-permanent memory components. These components can be used, for example, for storing software program code and/or buffering data.

1.1 Common Channel #1

In an exemplary network scenario such as depicted in FIG. 2, terminal device 200 may identify proximate wireless networks (e.g., one or more of network access nodes 210-230) by scanning for discovery signals broadcasted by network access nodes. In many conventional communication scenarios, each network access node may broadcast its corresponding discovery signal on a specific discovery channel (e.g., a radio frequency channel, which may be a single- or multi-carrier frequency channel depending on the corresponding radio access technology) according to RAT-specific scheduling and formatting parameters. For example, each radio access technology may define a specific discovery signal (e.g., with a specific coding and modulation format) that is broadcast on specific time-frequency resources (e.g., a specific carriers or subcarriers at specific time periods). For example, network access nodes 210 and 212 may broadcast discovery signals of the first RAT on one or more discovery channels for the first RAT (which may or may not be the same physical frequency channel, e.g., different cells of the first RAT may utilize different discovery channels) while network access nodes 214-230 may broadcast discovery signals of the second RAT on one or more discovery channels for the second RAT (which may or may not be the same physical frequency channel).

Depending on the specific RAT protocols, a RAT-specific discovery channel may overlap with the RAT-specific operating channel. For example, in an exemplary Wi-Fi setting, a Wi-Fi network access node may broadcast Wi-Fi discovery signals such as beacons on the Wi-Fi operating channel. Accordingly, the Wi-Fi operating channel may also function as the discovery channel, which terminal devices may monitor to detect beacons (Wi-Fi discovery signals) to detect Wi-Fi network access nodes. In an exemplary LTE setting, an LTE network access node may broadcast LTE discovery signals such as Primary Synchronization Sequences (PSSs) and Secondary Synchronization Sequences (SSSs) on a set of central subcarriers of the LTE operating channel (and may broadcast other LTE discovery signals such as Master Information Blocks (MIBs) and System Information Blocks (SIBs) on generally any subcarrier of the LTE operating channel). In other RATs, the discovery channel may be allocated separately from the operating channel. This disclosure covers all such cases, and accordingly RAT-specific discovery channels may be the same as the RAT-specific operating channel in frequency, may overlap with the RAT-specific operating channel in frequency, and/or may be allocated separately from the RAT-specific operating channel in frequency. Terminal devices may therefore perform discovery for a given RAT by monitoring radio signals on the RAT-specific discovery channel, which may or may not overlap with the RAT-specific operating channel. Furthermore, there may be a predefined set of operating channels for certain RATs (e.g., LTE center frequencies specified by the 3GPP, Wi-Fi operating channels specified by IEEE, etc.). Accordingly, in some aspects where the discovery channel overlaps with the operating channel, a terminal device may scan discovery channels by iterating through the predefined set of different operating channels and performing discovery, such as, for example, by iterating through one or more LTE center frequencies to detect LTE discovery signals or iterating through one or more Wi-Fi operating channels to detect Wi-Fi discovery signals.

In many conventional radio communication scenarios, terminal device 200 may therefore monitor the one or more discovery channels to discover network access nodes of various RATs. For example, in order to discover network access nodes of the first RAT, terminal device 200 may monitor discovery channels of the first RAT for discovery signals (where, as indicated above, the discovery channels may or may not overlap with the operating channel of the first RAT). In some aspects, discovery signals for particular radio access technologies may be defined by a specific standard or protocol, such as a particular signal format and/or a specific transmission schedule. Terminal device 200 may therefore discover cells of the first RAT by scanning for discovery signals on the discovery channels of the first RAT. Terminal device 200 may therefore attempt to discover network access nodes of the first RAT by monitoring radio signals according to the specifics of the first RAT (such as the signal format and scheduling of the discovery signal, discovery channel frequencies, etc., which may be standardized or defined in a protocol for the first RAT). In doing so, terminal device 200 may receive and identify discovery signals that are broadcasted by network access nodes 210 and 212 and subsequently identify, or 'discover', network access nodes 210 and 212. Likewise, terminal device 200 may attempt to discover network access nodes of the second RAT by monitoring radio signals according to the specifics of the second RAT (such as the signal format and scheduling of the discovery signal, discovery channel frequencies, etc., which may be standardized or defined in a protocol for the first RAT). Terminal device 200 may therefore similarly discover network access nodes 214-230. As noted above, in some aspects network access nodes 210 and 212 may additionally provide carriers for a third RAT and/or a fourth RAT, which terminal device 200 may also discover by monitoring radio signals according to the third and fourth RATs, respectively.

As introduced above, communication modules **306*a*-306*d* may be responsible for RF- and PHY-level signal processing of the respective radio access technology. Accordingly, controller 308 may maintain a different radio access connection via one or more of communication modules 306*a*-306*d* by utilizing communication modules 306*a*-306*d* to transmit and receive data. Controller 308** may maintain certain radio access connections independently from one another and may maintain other radio access connections in cooperation with other radio access connections.

For example, in some aspects controller 308 may maintain radio access connections for first communication module **306*a* (a first RAT connection), second communication module 306*b* (a second RAT connection), third communication module 306*c* (a third RAT connection), and fourth communication module 306*d* (a fourth RAT connection) in conjunction with one another, such as in accordance with a master/slave-RAT system. Conversely, in some aspects controller 308 may maintain the fourth RAT connection for fourth communication module 306*d* substantially separate from the cellular RAT connections of first communication module 306*a*, second communication module 306*b*, and third communication module 306*c***, e.g., not as part of the same master/slave RAT system.

Controller 308 may handle the RAT connections of each of communication modules **306*a*-306*d* according to the corresponding radio access protocols, which may include the triggering of discovery procedures. Controller 308 may trigger discovery procedures separately at each of communication modules 306*a*-306*d*, the specific timing of which may depend on the particular radio access technologies and the current status of the RAT connection. Accordingly, at any given time, there may be some, none, or all of communication modules 306*a*-306*d*** that perform discovery.

For example, during an initial power-on operation of terminal device 200, controller 308 may trigger discovery for communication modules **306*a*-306*d* as each RAT connection may be attempting to connect to a suitable network access node. In some aspects, controller 308 may manage the RAT connection s according to a prioritized hierarchy, such as where controller 308 may prioritize the first RAT over the second and third RATs. For example, controller 308 may operate the first, second, and third RATs in a master/slave RAT system, where one RAT is primarily active (e.g., the master RAT) and the other RATs (e.g., slave RATs) are idle. Controller 308 may therefore attempt to maintain the first RAT in the master RAT and may fall back to the second or third RAT when there are no viable cells of the first RAT available. Accordingly, in some aspects controller 308 may trigger discovery for communication module 306***a* following initial power-on and, if no cells of the first RAT are found, proceed to trigger discovery for the second or third RAT. In an exemplary scenario, the first RAT may be e.g., LTE and the second and third RATs may be 'legacy' RATs such as UMTS or GSM.

After RAT connections are established, controller 308 may periodically trigger discovery at one or more of communication modules 306*a*-306*d* based on the current radio access status of the respective RAT connections. For example, controller 308 may establish a first RAT connection with a cell of the first RAT via first communication module 306*a* that was discovered during initial discovery. However, if the first RAT connection becomes poor (e.g., weak signal strength or low signal quality, or when the radio link fails and should be reestablished), controller 308 may trigger a fresh discovery procedure at first communication module 306*a* in order to detect other proximate cells of the first RAT to measure and potentially switch to (either via handover or reselection) another cell of the first RAT. The controller 308 may also trigger inter-RAT discovery by triggering a new discovery procedure at second communication module 306*b* and/or third communication module 306*c*. Depending on the individual status of RAT connections of one or more of communication modules 306*a*-306*d*, zero or more of communication modules 306*a*-306*d* may perform discovery procedures at any given time.

As each of communication modules 306*a*-306*d* may be tasked with discovering a different type of radio access network (which may each have a unique discovery signal in terms of both scheduling and format), communication modules 306*a*-306*d* may perform RAT-specific processing on received radio signals in order to properly perform discovery. For example, as each radio access technology may broadcast a unique discovery signal on a unique discovery channel, communication modules 306*a*-306*d* may scan different discovery channels and utilize different discovery signal detection techniques (depending on the respective target discovery signal, e.g., the signal format and/or scheduling) in order to discover proximate network access nodes for each respective radio access technology. For example, first communication module 306*a* may capture radio signals on different frequency bands and perform different signal processing for detection of discovery signals of the first RAT than fourth communication module 306*d* for detection of discovery signals of the fourth RAT; such may likewise hold for second communication module 306*b* and third communication module 306*c*.

As discovery procedures may involve the detection of previously unknown network access nodes, time synchronization information of the network access nodes is likely not available during discovery. Accordingly, terminal device 200 may not have specific knowledge of when discovery signals for each radio access technology will be broadcast. For example, in an exemplary setting where the first radio access technology is LTE, when attempting to discover LTE cells, first communication module 306*a* may not have any timing reference point that indicates when PSS and SSS sequences and MIBs/SIBs will be broadcast by LTE cells. Communication modules 306*a*-306*d* may face similar scenarios for various different radio access technologies. Consequently, communication modules 306*a*-306*d* may continuously scan the corresponding discovery channels in order to effectively detect discovery signals, depending on which of communication modules 306*a*-306*d* are currently tasked with performing discovery (which may in turn depend on the current status of the ongoing communication connection for each communication module.) Each of communication modules 306*a*-306*d* that perform discovery at a given point in time may therefore be actively powered on and perform active reception processing on their respectively assigned frequency bands in order to discover potential network access nodes.

Communication modules 306*a*-306*d* may perform constant reception and processing or may only perform periodic reception and processing depending on the targeted radio access technology. Regardless, the frequent operation of communication modules 306*a*-306*d* (in addition to the respective antennas of antenna system 302) may have a considerable power penalty for terminal device 200. Unfortunately, such power penalty may be unavoidable as communication modules 306*a*-306*d* generally need to operate continuously to discover nearby wireless networks. The power penalty may be particularly aggravated where terminal device 200 is battery-powered due to the heavy battery drain associated with regular operation of communication modules 306*a*-306*d*.

Accordingly, in order to reduce the power penalty associated with monitoring potential nearby wireless networks, terminal device 200 may utilize common discovery module 306*e* to perform discovery in place of communication modules 306*a*-306*d*. Common discovery module 306*e* may then monitor a common discovery channel to discover proximate wireless networks and network access nodes, regardless of the type of the radio access technology used by the wireless networks. Instead of operating multiple of communication modules 306*a*-306*d* to discover proximate wireless networks for each radio access technology, terminal device 200 may utilize common discovery module 306*e* to monitor the common discovery channel to detect discovery signals for proximate wireless networks. In some aspects, the common discovery channel may include discovery signals that contain discovery information for network access nodes of multiple different radio access technologies.

In some aspects, network access nodes may cooperate in order to ensure that the network access nodes are represented on the common discovery channel. As further detailed below, such may involve either a centralized discovery broadcast architecture or a distributed discovery broadcast architecture, both of which may result in broadcast of discovery signals on the common discovery channel that indicate the presence of proximate wireless networks. Accordingly, as the proximate wireless networks are all represented on the common discovery channel, terminal device 200 may utilize the common discovery module to monitor the common discovery channel without needing to constantly operate communication modules 306*a*-306*d*. Such may markedly reduce power consumption at terminal device 200 without sacrificing effective discovery of proximate networks.

Accordingly, controller 308 may utilize communication modules 306*a*-306*d* to maintain separate RAT connections according to their respective RATs. As previously detailed, the RAT connections at communication modules 306*a*-306*d* may call for discovery procedures according to the specific radio access protocols and the current status of each RAT connection. Controller 308 may thus monitor the status of the RAT connections to determine whether discovery should be triggered at any one or more communication modules 306*a*-306*d*.

In some aspects, controller 308 may trigger discovery at any one or more communication modules 306*a*-306*d* during initial power-on procedures, following loss of coverage, and/or upon detection of poor radio measurements (low signal power or poor signal quality). Such discovery triggering criteria may vary according to the specific radio access protocols of each RAT connection.

In some aspects, instead of triggering discovery at communication modules 306*a*-306*d* when necessary, controller 308 may instead trigger discovery at common discovery module 306*e*. Common discovery module 306*e* may then scan a common discovery channel to detect network access nodes for one or more of the radio access technologies of communication modules 306*a*-306*d*. Terminal device 200 may thus considerably reduce power expenditure as communication modules 306*a*-306*d* may be powered down or enter a sleep state during discovery procedures.

Figure 4:
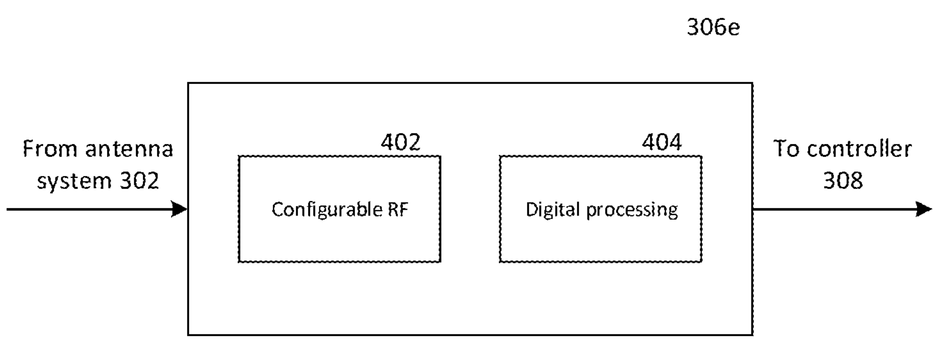
FIG. 4 shows an internal configuration of an exemplary common discovery module in accordance with some aspects.

In some aspects, common discovery module 306*e* includes only RF- and PHY-reception components (as detailed above regarding communication modules 306*a*-306*d*) related to reception and detection of discovery signals. FIG. 4 shows an exemplary internal configuration of common discovery module 306*e* in accordance with some aspects. As shown in FIG. 4, common discovery module 306*e* may include configurable RF module 402 and digital processing module 404. In some aspects, configurable RF module 402 may include analog and/or digital reception components including amplifiers (e.g., an LNA), filters, an RF demodulator (e.g., an RF IQ demodulator), and an ADC to convert the received radio frequency signals to digital baseband samples. Configurable RF module 402 may be configured to scan different RF channels (e.g., by frequency) and produce baseband samples to provide to digital processing module 404. Digital processing module 404 may then perform PHY-layer reception processing to process and evaluate the baseband samples. In some aspects, digital processing module 404 may be software-configurable and may include a controller and one or more dedicated hardware circuits, which may each be dedicated to performing a specific processing task as assigned by the controller (e.g., hardware accelerators). Digital processing module 404 may process baseband samples received from configurable RF module 402, for example as part of discovery. Digital processing module 404 may provide discovery results to controller 308.

As common discovery module 306*e* may only be employed for discovery of radio access technologies, common discovery module 306*e* may not maintain a full bidirectional RAT connection. Common discovery module 306*e* may therefore also be designed as a low-power receiver. In some aspects, common discovery module 306*e* may operate at a significantly lower power, and may be continuously kept active while still saving power compared to regular discovery scanning procedures (e.g., by communication modules 306*a*-306*d*).

In some aspects, common discovery module 306*e* may be implemented in as a hardware-defined module, for example, one or more dedicated hardware circuits or FPGAs. In some aspects, common discovery module 306*e* may be implemented as a software-defined module, for example, as one or more processors executing program code that defines arithmetic, control, and I/O instructions (e.g., software and/or firmware) stored in a non-transitory computer-readable storage medium. In some aspects, common discovery module 306*e* may be implemented as a combination of hardware-defined and software-defined components.

Figure 5:
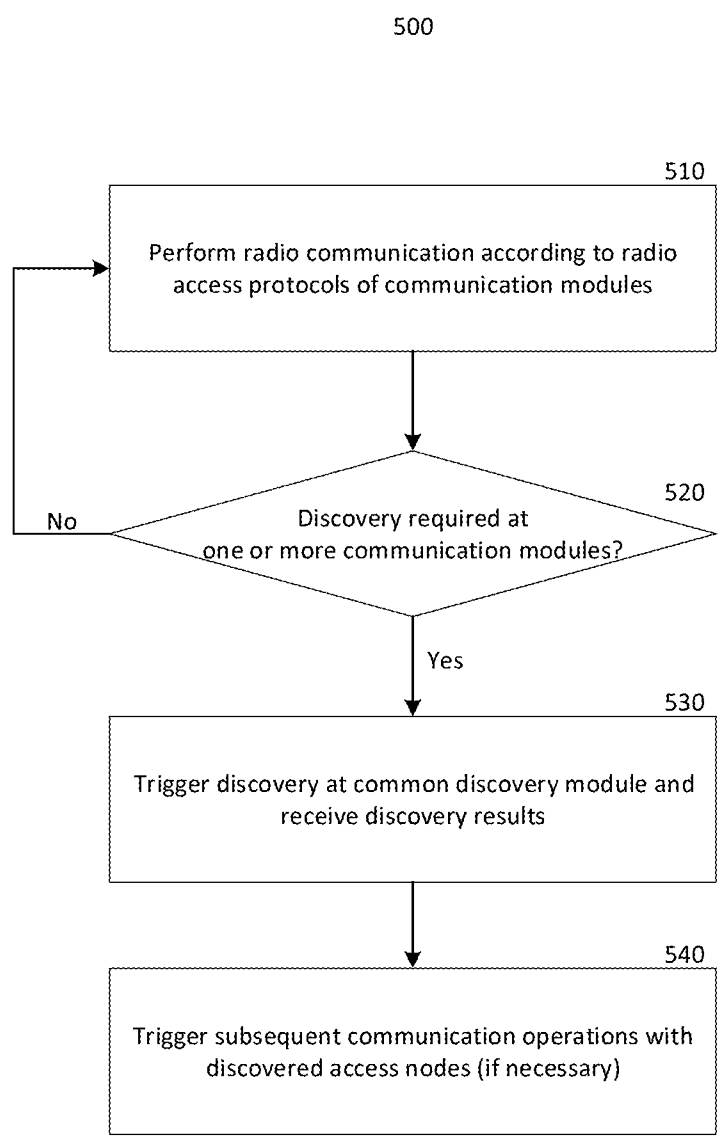
FIG. 5 shows a method for performing radio access communications using an exemplary common discovery channel scheme in accordance with some aspects.

FIG. 5 shows method 500 outlining the common discovery procedure executed by terminal device 200 in accordance with some aspects.

As shown in FIG. 5, controller 308 may perform radio communications in 510 according to the radio access protocols of one or more of communication modules 306*a*-306*d* and may thus support the underlying RAT connections for one or more of communication modules 306*a*-306*d*.

At 520, controller 308 may determine whether to trigger discovery at any of communication modules 306*a*-306*d*. In some aspects, discovery can be triggered, for example, during initial power-on procedures, following loss of coverage, and/or upon detection of poor radio measurements (low signal power or poor signal quality).

When controller 308 determines that discovery should not be triggered for any of communication modules 306*a*-306*d*, controller 308 may return to 510 to continue performing conventional radio communications with communication modules 306*a*-306*d*. In some aspects, controller 308 may keep common discovery module 306*e* active and continuously operate common discovery module 306*e* independent of communication modules 306*a*-306*d*. Controller 308 may therefore continue collecting discovery results from common discovery module 306*e*, even during conventional radio communication operation of communication modules 306*a*-306*d*.

When controller 308 determines that discovery should be triggered for one or more communication modules 306*a*-306*d*, controller 308 may trigger discovery at common discovery module 306*e* in 530. In some aspects, controller 308 can trigger discovery at common discovery module 306*e* by activating common discovery module 306*e* and commanding common discovery module 306*e* to perform discovery.

Subsequently, common discovery module 306*e* may then proceed to perform discovery by monitoring a common discovery channel (as will be later detailed) for discovery signals that include discovery information for various network access nodes. Common discovery module 306*e* may decode any detectable discovery signals to obtain the discovery information included therein and provide the discovery information to controller 308 to complete 530. There may be certain challenges associated with monitoring the common discovery channel in 530. For example, as further described below, the network access nodes cooperating with the common discovery channel scheme may operate in a distributed scheme, where multiple network access nodes share the common discovery channel to broadcast their own respective discovery signals, or in a centralized scheme, where a single network access node broadcasts a common discovery signal on the common discovery channel that contains discovery information for other network access nodes. For distributed schemes, the network access nodes may utilize a contention-based mechanism and consequently utilize carrier sensing to detect channel occupancy of the common discovery channel. This may help in avoiding collisions, as a network access node that detects that the common discovery channel is occupied may initiate a backoff procedure before attempting to transmit its discovery signal. In centralized schemes, terminal device 200 may tune common discovery module 306*e* to the common discovery channel and decode the discovery information from any common discovery channels that were broadcasted on the common discovery channel. In some aspects, the common discovery channel may utilize a simple modulation scheme in a channel with strong transmission characteristics (e.g., a common discovery channel allocated in sub-GHz frequencies), which may improve reception at terminal devices.

In 540, controller 308 may then proceed with subsequent (e.g., 'post-discovery') communication operations for RAT connection of one or more communication modules 306*a*-306*d* depending on the network access nodes represented by the obtained discovery information. For example, if the discovery information indicates that viable network access nodes are within range and available for connection, for example, if the discovery information indicates that network access node 216 is available for a RAT connection of the fourth RAT, controller 308 may modify the RAT connection of fourth communication module 306*d* to connect with network access node 216. Through common discovery module 306*e*, controller 308 may thus obtain discovery information in 530 without utilizing communication modules 306*a*-306*d*.

In some aspects, various options for subsequent communication operations in 540 include unilateral radio interactions with network access nodes, e.g., actions that controller 308 unilaterally performs without reciprocal action from network access nodes. For example, the controller 308 can perform radio measurements on a discovered network access node, and/or receive broadcast information of a discovered network access node. In some aspects, various options for subsequent communication operations in 540 include bilateral radio interactions with network access nodes, e.g., actions that controller 308 performs with reciprocal action from network access nodes. For example, the controller 308 can pursue and potentially establish a bidirectional connection with a discovered network access node.

In some aspects, common discovery module 306*e* can be configured to constantly monitor the common discovery channel (as opposed to being explicitly commanded by controller 308 as in 530). Upon detection of discovery signals on the common discovery channel, common discovery module 306*e* can be configured to report the detected discovery information to controller 308. Regardless, common discovery module 306*e* may perform discovery in place of communication modules 306*a*-306*d*, thus allowing terminal device 200 to avoid battery power penalties. Such power savings may particularly be enhanced when multiple of communication modules 306*a*-306*d* perform discovery concurrently as terminal device 200 may utilize a single, low-power receiver in common discovery module 306*e* instead.

In some aspects, network access nodes of various radio access technologies may cooperate by broadcasting discovery signals on the common discovery channel that are consequently detectable by common discovery module 306*e*. Specifically, network access nodes may broadcast discovery information (which would conventionally be broadcast on RAT-specific discovery channels) on the common discovery channel, thus enabling terminal devices to employ a common discovery module to monitor the common discovery channel.

In some aspects, network access nodes may participate in the broadcast of a common discovery channel according to either a centralized or distributed broadcast architecture. Both options may enable terminal devices such as, for example, terminal device 200 to employ common discovery module 306*e* according to method 500 to obtain discovery information for network access nodes.

In some aspects, in a centralized broadcast architecture, a single centralized network access node, also referred to as a centralized discovery node, may broadcast discovery signals for one or more other network access nodes, which may either use the same or different radio access technologies as the centralized discovery node. Accordingly, the centralized discovery node may be configured to collect discovery information for one or more other network access nodes and generate a common discovery signal that includes the discovery information for both the centralized and one or more other network access nodes. The centralized discovery node may then broadcast the common discovery signal on the common discovery channel, thus producing a common discovery signal containing discovery information for a group of network access nodes. Common discovery module 306*e* may therefore be able to discover all of the group of network access nodes by monitoring the common discovery channel and reading the common discovery signal broadcast by the centralized network access node.

Because common discovery module 306*e* is capable of monitoring discovery information of network access nodes associated with a variety of radio access technologies, communication modules 306*a*-306*d* of terminal device 200 can remain idle with respect to discovery operations. While controller 308 may still operate communication modules 306*a*-306*d* for non-discovery operations, such as conventional radio communication procedures related to reception and transmission of other control and user data, terminal device 200 may nevertheless conserve significant battery power by performing discovery solely at common discovery module 306*e*.

In some aspects, in a distributed broadcast architecture, an individual network access node (which may also be a relay node or relay device) may continue to broadcast its own discovery signal according to the radio access technology of the individual network access node. However, as opposed to broadcasting its discovery signal on the unique RAT-specific discovery channel, the network access node may broadcast its discovery signal on the common discovery channel. In order to enable terminal devices to receive the discovery signals with a common discovery module, each network access node may also broadcast its discovery signal using a common format, in other words, as a common discovery signal. Terminal device 200 may therefore employ common discovery module 306*e* to monitor the common discovery channel for such common discovery signals broadcasted by individual network access nodes, thus eliminating the need for individual communication modules 306*a*-306*d* to actively perform discovery.

backoff mechanisms Both the centralized and distributed discovery architectures may enable terminal devices such as terminal device 200 to perform discovery with a single common discovery module, thereby considerably reducing power consumption. Such may also simplify discovery procedures as discovery information for multiple network access nodes may be grouped together (either in the same common discovery signal or on the same common discovery channel), which may potentially enable faster detection.

FIG. 2 will now be utilized to describe a centralized discovery architecture in which a single centralized discovery node may assume discovery broadcast responsibilities for one or more other network access nodes. For example, in some aspects network access node 210 may assume discovery broadcast responsibilities for one or more of network access nodes 212-230. In other words, network access node 210 may broadcast a common discovery signal on the common discovery channel that contains discovery information for one or more of network access nodes 212-230. In order to generate the common discovery signal, network access node 210 may first collect discovery information for one or more of network access nodes 212-230. Network access node 210 may employ any of a number of different techniques to collect the required discovery information, including any one or more of radio scanning, terminal report collection, backhaul connections, and via an external service (as further detailed below).

Figure 6:
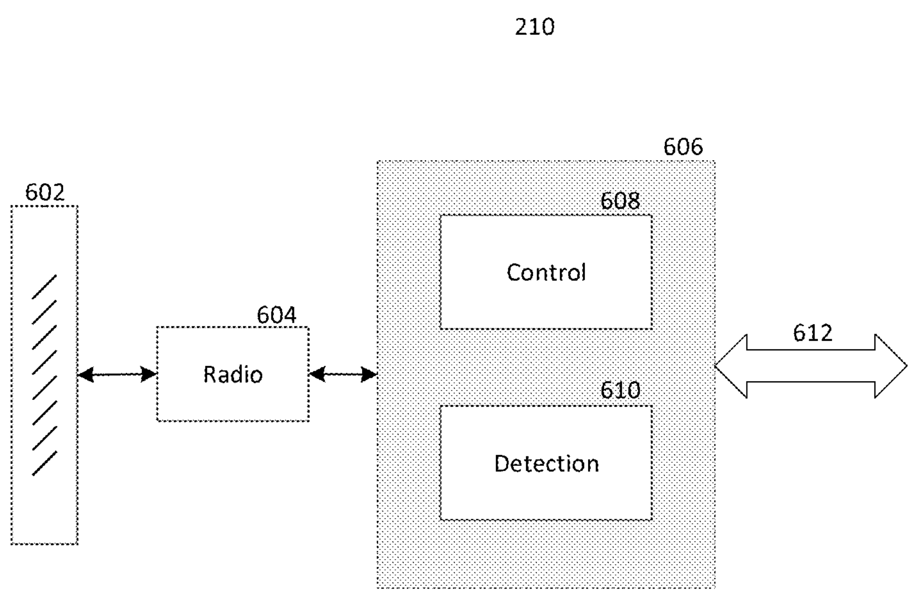
FIG. 6 shows a first internal configuration of an exemplary network access node in accordance with some aspects.

FIG. 6 shows an internal configuration of network access node 210 in accordance with some aspects. Network access node 210 may include antenna system 602, radio system 604, communication system 606 (including control module 608 and detection module 610), and backhaul interface 612. Network access node 210 may transmit and receive radio signals via antenna system 602, which may be an antenna array including multiple antennas. Radio system 604 is configured to transmit and/or receive RF signals and perform PHY processing in order (1) to convert outgoing digital data from communication system 606 into analog RF signals for radio transmission through antenna system 602 and (2) to convert incoming analog RF signals received from antenna system 602 into digital data to provide to communication system 606.

Control module 608 may control the communication functionality of network access node 210 according to the corresponding radio access protocols, which may include exercising control over antenna system 602 and radio system 604. Each of radio system 504, control module 508, and detection module 510 may be structurally realized as hardware-defined modules, e.g., as one or more dedicated hardware circuits or FPGAs, as software-defined modules, e.g., as one or more processors executing program code that define arithmetic, control, and I/O instructions (e.g., software and/or firmware) stored in a non-transitory computer-readable storage medium, or as mixed hardware-defined and software-defined module. Backhaul interface 612 may be a wired (e.g., Ethernet, fiber optic, etc.) or wireless (e.g., microwave radio or similar wireless transceiver system) connection point for physical connection configured to transmit and receive data with other network nodes, which may be e.g., a microwave radio transmitter, or a connection point and associated components for a fiber backhaul link.

Network access node 210 may receive external data via backhaul interface 612, which may include connections to other network access nodes, internet networks, and/or an underlying core network supporting the radio access network provided by network access node 210 (such as, for example, an LTE Evolved Packet Core (EPC)). In some aspects, backhaul interface 612 may interface with internet networks (e.g., via an internet router). In some aspects, backhaul interface 612 may interface with a core network that may provide control functions in addition to routing to internet networks. Backhaul interface 612 may thus provide network access node 210 with a connection to external network connections (either directly or via the core network), which may enable network access node 210 to access external networks such as the Internet. Network access node 210 may thus provide the conventional functionality of network access nodes in radio networks by providing a radio access network to enable served terminal devices to access user data.

Figure 7:
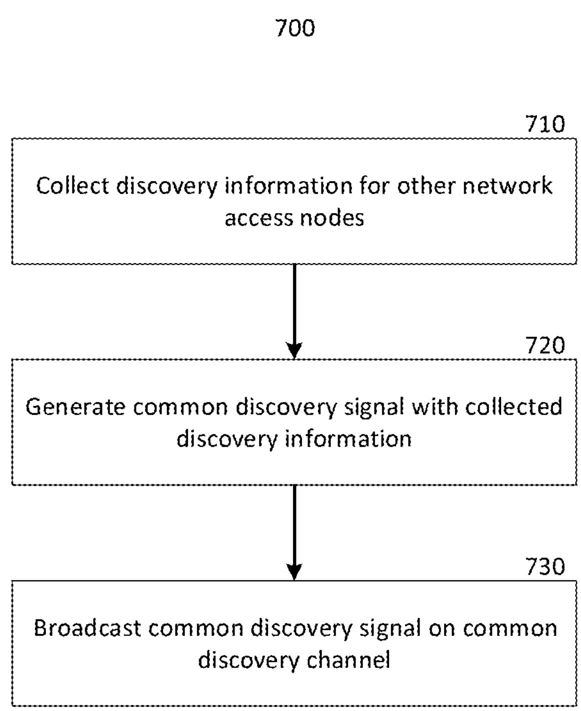
FIG. 7 shows an exemplary method of providing discovery signals on a common discovery channel scheme in accordance with some aspects.

As introduced above, network access node 210 may additionally be configured to act as a centralized discovery node by broadcasting a common discovery signal containing discovery information for other network access nodes such as one or more of network access nodes 212-230. FIG. 7 shows method 700, which details the general procedure performed by a centralized discovery node, such as network access node 210 in accordance with some aspects.

At 710, network access node 210 can collect discovery information for other network access nodes. At 720, network access node 210 can generate a common discovery signal with the collected discovery information. At 730, network access node 210 can broadcast the common discovery signal on the common discovery channel, thus allowing a terminal device such as terminal device 200 to perform discovery for multiple radio access technologies using common discovery module 306*e*. Network access node 210 may generate the common discovery signal with a predefined discovery waveform format, which may utilize, for example On/Off Key (OOK), Binary Phase Shift Keying (BPSK), Quadrature Amplitude Modulation (QAM, e.g., 16-QAM, 64-QAM, etc.). In some aspects, the common discovery signal may be a single-carrier waveform, while in other aspects the common discovery signal may be a multi-carrier waveform, such as an OFDM waveform or another type of multi-carrier waveform.

Accordingly, network access node 210 may first collect the discovery information for one or more of network access nodes 212-230 in 710. Network access node 210 can utilize any one or more of a number of different discovery information collection techniques in 710, including radio scanning, terminal report collection, backhaul connections to other network access nodes, and via an external service.

For example, in some aspects network access node 210 can utilize radio scanning in 710 to collect discovery information for other nearby network access nodes. Network access node 210 may therefore include detection module 610, which may utilize antenna system 602 and radio system 604 to scan the various discovery channels of other radio access technologies in order to detect other network access nodes. Detection module 610 may thus be configured to process signals received on various different discovery channels to detect the presence of network access nodes broadcasting discovery signals on the various different discovery channels.

Although FIG. 6 depicts detection module 610 as utilizing the same antenna system 602 and radio system 604 as employed by network access node 210 for conventional base station radio access communications, in some aspects network access node 210 may alternatively include a separate antenna system and radio system uniquely assigned to detection module 610 for discovery information collection purposes. Detection module 610 can be structurally realized as a hardware-defined module, e.g., as one or more dedicated hardware circuits or FPGAs, as a software-defined module, e.g., as one or more processors executing program code that define arithmetic, control, and I/O instructions (e.g., software and/or firmware) stored in a non-transitory computer-readable storage medium, or as a mixed hardware-defined and software-defined module.

In some aspects, detection module 610 is configured to implement analogous discovery signal detection as communication modules 306*a*-306*d*. This allows detection module 610 to detect RAT-specific discovery signals by processing received signals according to dedicated radio access protocols and consequently identify the corresponding broadcasting network access nodes.

In some aspects, detection module 610 may utilize antenna system 602 and radio system 604 to scan discovery channels for a plurality of radio access technologies to detect network access nodes on the discovery channels. For example, detection module 610 may utilize antenna system 602 and radio system 604 to scan through one or more LTE discovery channels (e.g., LTE frequency bands for PSS/SSS sequences and MIBs/SIBs) in order to detect proximate LTE cells. Detection module 610 may similarly scan through one or more Wi-Fi discovery channels to detect proximate Wi-Fi APs, one or more UMTS discovery channels to detect UMTS cells, one or more GSM discovery channels to detect GSM cells, and one or more Bluetooth discovery channels to detect Bluetooth devices. Detection module 610 may similarly scan discovery channels for any one or more radio access technologies. In some aspects, detection module 610 may capture signal data for each scanned discovery channel and process the captured signal data according to the discovery signal format of the corresponding radio access technology in order to detect and identify any network access nodes broadcasting discovery signals thereon.

In the exemplary setting of FIG. 7, in 710, detection module 610 may identify one or more of network access nodes 212-230 during scan of discovery channels for one or more radio access technologies. For example, in an exemplary scenario where network access node 212 is an LTE base station and network access nodes 214-230 are Wi-Fi APs, network access node 210 may detect (1) network access node 212 during scan of LTE discovery channels and (2) one or more of network access nodes 214-230 during scan of Wi-Fi discovery channels. Detection module 610 may collect certain discovery information from each detected discovery signal, which network access node 210 may subsequently utilize to generate a common discovery signal for broadcast on the common discovery channel that contains discovery information for the detected network access nodes.

In some aspects, detection module 610 may collect both 'common' information elements and 'RAT-specific' information elements for the one or more network access nodes identified during discovery information collection, where common information elements may include general information associated with the identified network access node (regardless of the specific radio access technology) and RAT-specific information elements may include specific information that is unique to the parameters of the corresponding radio access technology.

For example, common information elements may include:

a. RAT (e.g., LTE/Wi-Fi/UMTS/GSM/etc.)
b. Frequency band and center frequency
c. Channel bandwidth
d. Service provider
e. Geographic Location (geopositional information such as GPS coordinates or relative navigational parameters that detail the position of a network access node relative to a terminal device)

RAT-specific information elements may include, for example:

a. for LTE/UMTS/GSM: PLMN ID, Cell ID, maximum data rate, minimum data rate
b. for Wi-Fi: Service Set ID (SSID), beacon interval, capability information, frequency-hopping/direct-sequence/contention free parameter sets, traffic indication map, Public/private network, authentication type, capability information, AP location info
c. for Bluetooth: Bluetooth address, frequency-hopping information,
d. RAT-dependent: radio measurements (signal strength, signal quality, etc.) and other performance metrics (cell loading, energy-per-bit, packet-/block-/bit-error-rates, retransmission metrics, etc.)

while other RATs may demand similar information as RAT-specific information elements.

In some aspects, detection module 610 may obtain such discovery information in 710 by detecting and reading discovery signals from network access nodes on the scanned discovery channels. As each radio access technology may have unique discovery signals (e.g., signal format and/or transmission scheduling), detection module 610 may execute a specific process to obtain the discovery information for each radio access technology.

For example, in an exemplary LTE setting, detection module 610 may obtain a Cell ID of an LTE cell (in the form of Physical Cell Identity (PCI)) by identifying a PSS-SSS sequence pair broadcasted by the LTE cell. Detection module 610 may obtain channel bandwidth by reading the Master Information Block (MIB) messages. Detection module 610 may obtain a PLMN ID for an LTE cell by reading, for example, SIB1 messages. Detection module 610 may accordingly collect such discovery information for one or more detected network access nodes and store (e.g., in a memory; not explicitly shown in FIG. 6) the discovery information for later broadcast in the common discovery signal.

Depending on the configuration of detection module 610, radio system 604, and antenna system 602, in some aspects detection module 610 may be configured to perform the discovery channel scans for one or more radio access technologies in sequence or in parallel, for example, by scanning one or more discovery channels for one or more radio access technologies in series or simultaneously.

As introduced above, network access node 210 may utilize additional and/or alternative techniques in 710 to collect discovery information for the other network access nodes. Specifically, in some aspects, network access node 210 may utilize terminal report collection to obtain the discovery information for proximate network access nodes. For example, network access node 210 may request discovery reports from served terminal devices (via control signaling). Consequently, the served terminal devices may perform discovery scans and report discovery information for detected network access nodes back to network access node 210 in the form of measurement reports.

For example, detection module 610 may trigger transmission of control signaling to request measurement reports from terminal devices 200 and 202. Terminal devices 200 and 202 may then perform discovery channel scans for various radio access technologies (using e.g., communication modules such as communication modules 306*a*-306*d*) to obtain discovery information (e.g., common and RAT-specific information elements) for one or more detected network access nodes and report the discovery information back to network access node 210. Detection module 610 may receive the reports and collect the discovery information for reported network access nodes. Accordingly, instead of (or in addition to) having detection module 610 actively perform radio scans to discover proximate network access nodes, served terminal devices may perform the discovery scans and report results to network access node 210.

In some cases, terminal device 200 may discover network access node 216 while terminal device 202 may discover network access nodes 212, 220, and 224 as shown in FIG. 2. Terminal devices 200 and 202 may thus obtain the discovery information (common and RAT-specific information elements) for one or more discovered network access nodes and report the discovery information to network access node 210 in the form of discovery reports. The discovery reports can be received by network access node 210 via antenna system 602 and be processed at detection module 610. Network access node 210 may thus obtain the discovery information in 710 for the other network access nodes.

Although terminal report collection may involve terminal devices to perform discovery scans (as opposed to radio scanning in 710 in which network access node 210 performs the necessary radio operations and processing), this may still be advantageous and enable battery-power consumption at terminal devices. For example, network access node 210 may instruct a first group of terminal devices to perform discovery on certain radio access technologies (e.g., to scan certain discovery channels) and a second group of terminal devices to perform discovery on other radio access technologies (e.g., to scan other discovery channels). Network access node 210 may then consolidate the discovery information of discovered radio access nodes provided by both groups of terminal devices in 720 and broadcast the consolidated discovery information on the common discovery channel in 730. Both groups of terminal devices may thus obtain the discovery information from both radio access technologies while only having to individually perform discovery on one radio access technology, thus conserving battery power.

In some aspects, terminal devices may be able to utilize discovery information obtained by other terminal devices as the terminal devices move to different geographic locations. For example, in an exemplary scenario, terminal device 200 may report network access node 216 during terminal report collection while terminal device 202 may report network access nodes 220 and 224 during terminal report collection. As geographic location information may be included in the discovery information, if terminal device 200 moves to a new geographic position that is closer to the geographic locations of network access nodes 220 and 224, terminal device 200 may rely on discovery information previously received from network access node 210 on the common discovery channel to discover network access nodes 220 and 224 without performing a full discovery procedure. Accordingly, terminal device 200 may receive the discovery information for network access nodes 220 and 224 via common discovery module **306*e* and utilize such discovery information in the event that terminal device 200 moves within range of network access nodes 220 and 224. As previously noted, geographic location information in a discovery signal may include geopositioning information such as GSP coordinates or another 'absolute' location of a network access node (e.g., longitude and latitude coordinates) or other information that indicates a relative location of a network access node to terminal device 200** (e.g., a timestamped signal that can be used to derive the distance and/or other information that provides directional information that indicates the direction of a network access node from a terminal device).

Additionally or alternatively, in some aspects network access node 210 may employ backhaul connections to obtain discovery information in 710 for broadcast on the common discovery channel in 730. In particular, network access node 210 may be connected with other network access nodes either directly or indirectly via backhaul interface 612 (either wireless or wired) and may utilize backhaul interface 612 to receive discovery information from other network access nodes in 710. For example, network access node 210 may be connected with one or more of network access nodes 212-230 via backhaul interface 612, which may transmit their respective discovery information to network access node 210 in 710. Network access node 210 may thus consolidate the received discovery information in 720 to generate the common discovery signal and broadcast the common discovery signal in 730. Detection module 610 may thus interface with backhaul interface 612 in order to receive and consolidate the discovery information.

There exist numerous variations in the use of backhaul links to obtain discovery information. For example, in some aspects, network access node 210 may be directly connected to the other network access nodes via backhaul interface 612, such as, for example, over an X2 interface with other network access nodes, such as network access node 212. In some aspects, network access node 210 may additionally be directly connected with network access nodes of other radio access technologies, such as directly connected with WLAN Aps, such as network access nodes 214-230, over an inter-RAT interface through backhaul interface 612. Network access node 210 may receive the discovery information for other network access nodes via backhaul interface 612 and broadcast a common discovery signal accordingly.

In some aspects, network access node 210 may additionally be able to interface with other centralized discovery nodes (or similarly functioning network access nodes) via backhaul interface 612. For example, a first centralized discovery node (e.g., network access node 210) may collect discovery information for a first plurality of network access nodes discoverable by the first centralized discovery node (e.g., network access nodes 214-222). A second centralized discovery node (e.g., network access 212) may collect discovery information for a second plurality of network access nodes discoverable by the second centralized discovery node (e.g., network access nodes 224-230). In various aspects, the first and second centralized discovery node may a discovery collection technique to collect the discovery information for the respective first and second plurality of network access nodes, such as, for example, one or more of radio scanning, terminal report collection, backhaul connections, or an external service. The first centralized discovery node may then provide the collected discovery information for the first plurality of network access nodes to the second centralized discovery node, and the second centralized discovery node may then provide the collected discovery information for the second plurality of network access nodes to the first centralized discovery node. The first centralized discovery node may then consolidate the resulting 'combined' discovery information (for the first and second pluralities of network access nodes) and generate a first common discovery signal. The second centralized discovery node may likewise consolidate the resulting 'combined' discovery information (for the first and second pluralities of network access nodes) and generate a second common discovery signal. The first and second centralized discovery nodes may then transmit the respective first and second common discovery signals, thus producing common discovery signals that contain discovery information for network access nodes that are discoverable at different centralized discovery nodes.

Additionally or alternatively, in some aspects network access node 210 may employ an external service to obtain discovery information for other network access nodes in 710. The external service may function, for example, as a database located in an Internet-accessible network location, such as a cloud internet server, and may provide discovery information to network access node 210 via backhaul interface 612. Detection module 610 may thus receive discovery information via backhaul interface 612 in 710 and proceed to consolidate the discovery information to generate a common discovery signal in 720.

Figure 8:
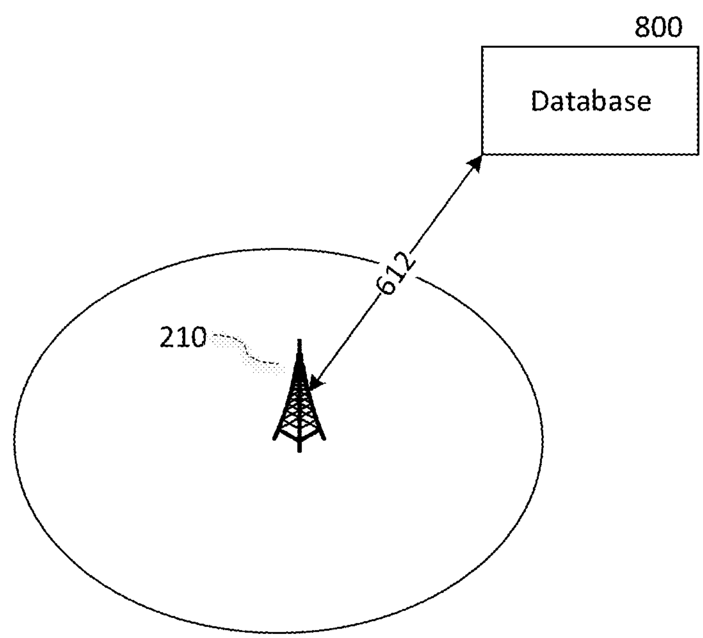
FIG. 8 shows a first exemplary network scenario with an external database for storing discovery information in accordance with some aspects.

For example, in the exemplary setting shown in FIG. 8, network access node 210 may connect with an external database 800 via backhaul interface 612. External database

800 may be in an Internet-accessible network location and thus may be accessible by network access node 210 over the Internet via backhaul interface 612. External database 800 may similarly interface with other network access nodes and may act as a repository for discovery information. For instance, one or more other network access nodes may provide external database 800 with their discovery information. Network access node 210 may then query external database 800 over backhaul interface 612 for discovery information of other network access nodes in 710, in response to which external database 800 may transmit discovery information to network access node 210 over backhaul interface 612. Such may thus not require a direct connection between network access node 210 and other network access nodes to obtain discovery information but may use a database manager to maintain and update the discovery information in external database 800.

In some aspects of radio sensing and terminal report collection, network access node 210 may already implicitly have knowledge that the obtained discovery information pertains to proximate network access nodes. For example, network access node 210 may assume that network access nodes that were discovered during radio sensing and network access nodes reported by terminal devices served by network access node 210 are located relatively proximate to network access node 210 (e.g., on account of their detectability via radio signals).

In certain backhaul link setups, the backhaul connections may be designed such that only proximate network access nodes contain direct backhaul links. For example, each of network access nodes 214-222 may have a direct backhaul connection to network access node 210 while other network access nodes located further from network access node 210 may not have a direct backhaul connection to network access node 210. Backhaul link setups may thus in certain cases implicitly provide information as to the proximity of other network access nodes.

In the case of external database 800, network access node 210 may not be able to implicitly determine which network access nodes represented in external database 800 are proximate to network access node 210. As network access node 210 will ultimately broadcast the obtained discovery information as a common discovery signal receivable by proximate terminal devices, network access node 210 may desire to only obtain discovery information for proximate terminal devices.

Accordingly, when querying external database 800 for discovery information, in some aspects network access node 210 may indicate geographic location information for network access node 210. In response, external database 800 may consequently retrieve discovery information for one or more network access nodes proximate to the indicated geographic location information and provide this discovery information to network access node 210.

In some aspects, network access node 210 may either specify a single location, e.g., the geographic location of network access node 210, or a geographic area, e.g., the coverage area of network access node 210. In response, external database 800 may retrieve discovery information for the corresponding network access nodes and provide the discovery information to network access node 210. In some aspects, external database 800 can include a hash table (e.g., a distributed hash table) to enable quick identification and retrieval of discovery information based on geographic location inputs.

In some aspects, network access node 210 may employ any of a number of different techniques in 710 to collect discovery information for other network access nodes with detection module 610. Detection module 610 may consolidate the collected discovery information and provide the discovery information to control module 608, which may generate a common discovery signal with the collected discovery information in 720. Such may include encoding the collected discovery information in as digital data with a predefined format that is known at both network access node 210 and common discovery module **306*e***. Many different such coding schemes may be available and employed in order to generate the common discovery signal.

Regardless of the particular predefined format employed for the common discovery signal, control module 608 may encode the relevant discovery information for one or more of the discovered network access nodes in the common discovery signal, e.g., the common information elements (RAT, frequency band and center frequency, channel bandwidth, service provider, and geographic location) and RAT-specific information elements (depending on the particular RAT). For example, network access node 210 may collect discovery information for network access node 210 and network access nodes 214-230 in 710 and may encode the discovery information in a common discovery signal in 720. Control module 608 may then broadcast the common discovery signal in 730 on the common discovery channel via radio system 604 and antenna system 602.

In some aspects, the common discovery channel may be predefined in advance in order to enable the centralized network access nodes to know which frequency (or frequencies) to broadcast the common discovery channel and to enable the common discovery modules at each terminal device to know which frequency (or frequencies) to monitor for the common discovery signal. Any of a variety of different channel formats may be utilized for the common discovery channel, which may either be a single- or multi-carrier channel with specific time-frequency scheduling (e.g., on specific carriers/subcarriers with a specific periodicity or other timing parameters). The common discovery channel may be standardized (e.g., from a standardization body such as the 3GPP, IEEE or other similar entities) and/or defined by regulation in different geographic regions (e.g., for different countries). In some aspects, the communication protocol used for the common discovery channel may be a broadcast protocol, which may not require a handshake or contact from terminal devices for the terminal devices to receive and decode discovery signals on the common discovery channel. This format of the discovery signals on the common discovery channel may enable terminal devices to utilize a simple digital receiver circuit to receive discovery signals and obtain the information encoded thereon. Each terminal device may then be able to undergo its own decision-making process based on its unique needs and capabilities (e.g., which network the terminal device is attempting to connect to).

In some aspects, the common discovery channel may either be a licensed frequency band (e.g., allocated for a specific radio access technology and licensed by an operator, e.g., LTE/UMTS/GSM or other cellular bands) or an unlicensed frequency band (e.g., not allocated for a specific radio access technology and openly available for use; e.g., Wi-Fi and Bluetooth in the Industrial, Science, and Medical (ISM bands). The common discovery channel may alternatively be a unique frequency band that is specifically designated (e.g., by a regulatory body) for authorized entities for broadcasting discovery information.

Furthermore, while certain examples herein may refer to a single common discovery channel, in some aspects, multiple common discovery channels (e.g., each with a different frequency allocation) may be employed. In such aspects, the common discovery modules can be configured to monitor (e.g., in parallel or sequentially) multiple different common discovery channels or, alternatively, multiple common discovery modules can be each dedicated to scan one or more of the common discovery channels. While such may slightly complicate common discovery procedures at common discovery modules, such may alleviate congestion if multiple broadcast nodes (either centralized or distributed discovery nodes) are broadcasting common discovery signals.

In some aspects, the other network access nodes that are not functioning as the centralized discovery node may not be configured to cooperate. For example, network access node 210 can be configured to perform discovery information collection techniques detailed above to unilaterally obtain discovery information for network access nodes 212-230 and broadcast such discovery information on the common discovery channel. Other network access nodes, such as network access nodes 212-230 can also broadcast discovery signals on their respective RAT-specific discovery channels. Accordingly, some aspects that use centralized discovery nodes may include some network access nodes that are specifically configured according to these aspects and other network access nodes that are not specifically configured according to these aspects.

Given operation of centralized discovery nodes such as network access node 210 according to these aspects, controller 308 may utilize common discovery module 306*e* to scan for common discovery signals on the common discovery channel as previously detailed regarding method 500 in FIG. 5. Common discovery module 306*e* may thus detect the common discovery signal broadcast by network access node 210 and may consequently decode the common discovery signal (according to the same predefined format employed by control module 608 to generate the common discovery signal) to recover the discovery information encoded in the common discovery signal. Common discovery module 306*e* may thus obtain the discovery information for network access nodes 210-230 and may proceed to report the discovery information to controller 308 (e.g., 530). Controller 308 may then proceed with post-discovery radio operations based on the received discovery information (e.g., 540 of method 500), which may include, for one or more of the radio access technologies supported by terminal device 200, unilateral (e.g., performing radio measurements on a discovered network access node, receiving broadcast information of a discovered network access node) and/or bilateral (e.g., pursuing and potentially establishing a bidirectional connection with a discovered network access node) radio interactions with various network access nodes. In some aspects, the specific usage of the discovery information at terminal device 200 may vary between the various radio access technologies and over different scenarios and may be directed by controller 308. For example, controller 308 may perform unilateral and/or bilateral radio interactions with one or more network access nodes according to the specific protocols of the respective radio access technologies. For example, if network access node 220 is configured according to e.g., Wi-Fi, controller 308 may perform radio measurements, receive broadcast information, establish a connection with, and/or transmit and receive data with network access node 220 according to the Wi-Fi-specific protocols. In another example, if network access node 212 is configured according to e.g., LTE, controller 308 may perform radio measurements, receive broadcast information, establish a connection with, and/or transmit and receive data with network access node 212 according to the LTE-specific protocols. In another example, controller 308 may be managing e.g., an LTE radio connection at e.g., communication modules 306*a*. If the LTE radio connection is currently in a radio idle state and controller 308 triggers a transition to a radio connected state, controller 308 may utilize discovery information (e.g., obtained from receipt of the common discovery signal) to identify an LTE network access node and initiate establishment and execution of an LTE radio connection with communication module 306*a* according to radio idle state LTE procedures. Controller 308 may similarly execute unilateral and bilateral radio interactions with discovered network access nodes depending on RAT-specific protocols and the current scenario of any RAT connections.

Accordingly, in accordance with some aspects of the common discovery signal framework, terminal device 200 may avoid separately performing discovery with communication modules 306*a*-306*d* and may instead perform a common discovery procedure at common discovery module 306*e*, thus potentially conserving significant battery power.

In some aspects, geographic location information can be important, in particular in the case of centralized discovery nodes. More specifically, by receiving discovery signals on the common discovery channel, terminal device 200 may be able to avoid having to physically detect (e.g., with reception, processing, and analysis of radio signals) one or more network access nodes during local discovery procedures. Instead, centralized discovery nodes may obtain the discovery information and report the discovery information to terminal device 200 via the common discovery channel. As terminal device 200 may not have physically detected each network access node, terminal device 200 may not actually know whether each network access node is within radio range. Accordingly, in some aspects terminal device 200 may consider geographic location information of the network access nodes in order to ensure that a network access node is actually within range before attempting post-discovery operations with the network access node (such as, for example, attempting to establish a connection or perform radio measurements).

As noted above, in some aspects, a centralized discovery node, such as network access node 210, may include geographic information as a common information element of discovery information broadcasted on the common discovery channel. For example, network access node 210 may obtain location information in 710, such as by estimating the geographic location of a network access node (e.g., via radio sensing and location estimation procedures) or by explicitly receiving (e.g., wirelessly or via backhaul interface 612) the geographic location of a network access node. In the example of FIG. 2, network access node 210 may identify the geographic locations of network access node 212 and network access nodes 214-230, which may either be explicit geographic positions (e.g., latitude and longitude) or a general geographic areas or regions. Control module 608 may then encode such geographic location information as discovery information in the common discovery signal, which terminal device 200 may receive and subsequently recover from the common discovery signal at controller 308.

Accordingly, in some aspects when controller 308 is deciding which network access node to select for further post-discovery radio operations, controller 308 may compare the current geographic location of terminal device 200 (e.g., obtained at a positioning module of terminal device 200 (not explicitly shown in FIG. 3) or reported by the network) to the geographic location of the network access nodes reported in the common discovery signal. Controller 308 may then select a network access node from the network access nodes reported in the common discovery signal based on the geographic location information, such as by selecting the most proximate or one of the most proximate reported network access nodes relative to the current geographic location of terminal device 200.

In some aspects, a centralized discovery node, such as network access node 210, may alternatively apply power control to transmission of the common discovery signal in 730 in order to reduce the terminal processing overhead involved in comparing geographic locations. For example, network access node 210 may broadcast a low-power common discovery signal that only contains discovery information for network access nodes that are significantly proximate to network access node 210, for example, within a certain radius. Accordingly, as the common discovery signal is broadcast with low power, only terminal devices that are close to network access node 210 may be able to receive the common discovery signal. Therefore, these terminal devices that are able to receive the common discovery signal will also be located close to the network access nodes reported in the low-power common discovery signal. In such a scenario, the terminal devices may assume that the network access nodes reported in the common discovery signal are geographically proximate and thus may substantially all be eligible for subsequent communication operations, such as, for example, establishing a radio connection. Such power-controlled common discovery signals may act according to radial distance. Additionally or alternatively, in some aspects network access node 210 may utilize sectorized or directional (e.g., with beamsteering) antennas in order to broadcast certain common discovery signals in specific directions where the directional common discovery channels contain discovery information for network access nodes located in the specific direction relative to network access node 210.

In some scenarios, these techniques may be problematic as terminal devices that are located further away from the centralized discovery node may not be able to receive the low-power common discovery signal. Accordingly, network access node 210 may instead assign different coverage sub-areas (within its overall coverage area) as different 'zones', e.g., Zone 1, Zone 2, Zone 3, etc., where each zone implies a certain distance from network access node 210. When network access node 210 broadcasts the common discovery signal in 730, network access node 210 may include zone information that indicates the coverage zone in which it is transmitting. Accordingly, terminal devices such as, for example, terminal device 200 may then only examine the network access nodes reported within the current zone of terminal device 200 instead of having to use geographic location information to identify which network access nodes are proximate (e.g., within a predefined radius of the current location of terminal device 200). This may alleviate the processing overhead involved in geographic location comparisons at terminal device 200.

While the description of centralized discovery architectures presented above may focus on a single centralized discovery node, e.g., network access node 210, in some aspects centralized discovery architectures may include multiple centralized discovery nodes, such as, for example, various centralized discovery nodes that are geographically positioned to serve a specific area. Consequently, terminal devices may receive common discovery signals from multiple centralized discovery nodes.

For example, in an exemplary aspect network access node 210 may be a centralized discovery node responsible for discovery broadcasting of network access nodes within the coverage area of network access node 210 and accordingly may broadcast discovery information for network access nodes 214-222 in the common discovery signal. Likewise, network access node 212 may be a centralized discovery node responsible for broadcasting discovery information for network access nodes 224-230. Network access nodes 210 and 212 may therefore both broadcast common discovery signals on the common discovery channel, which may be received by terminal device 200 (which as shown in the exemplary scenario of FIG. 2 may be within the coverage area of network access nodes 210 and 212).

Terminal device 200 may therefore receive discovery information from two (or more) centralized discovery nodes and thus may receive multiple sets of network access nodes via the common discovery procedure. Location information (either specific locations or zone regions) for network access node may be important in such scenarios as terminal device 200 may not be located proximate to one or more of network access nodes reported by network access nodes 210 and 212. Instead, terminal device 200 may only be within range of, for example, network access nodes 220 and 224 as shown in FIG. 2.

Accordingly, via either specific location information or zone location information, terminal device 200 can be configured to use its own geographic location to identify which network access nodes are within range and proceed to perform subsequent communication procedures accordingly. Additionally, multiple centralized discovery nodes may be deployed in a single frequency network where the centralized discovery nodes concurrently transmit the same discovery signal in a synchronized manner (which may require appropriate coordination between the centralized discovery nodes).

Furthermore, while the examples presented above focus on the use of a cellular access node, for example, network access nodes 210 and/or 212, as centralized discovery nodes, any type of network access nodes may be equivalently employed as a centralized discovery node regardless of radio access technology. For example, one or more of network access nodes 214-230 may additionally or alternatively function as a centralized discovery node. Network access nodes with longer-distance broadcast capabilities such as cellular base stations may be advantageous in some aspects due to the increased broadcast range of common discovery signals.

In some aspects, centralized discovery nodes may or may not serve as conventional network access nodes. For example, in some examples detailed above, network access nodes 210, 212, and 214-230 were described as being network access nodes (such as base stations or access points) that can provide RAT connections to terminal devices to provide terminal devices with user data traffic. However, in some aspects, centralized discovery nodes may alternatively be deployed specifically for common discovery channel purposes. For example, a third party may deploy one or more centralized discovery nodes that are configured to provide common discovery channel services but not configured to provide other conventional radio access services. Conventional network operators (e.g., mobile network operators (MNOs), public Wi-Fi network providers, etc.) may then be able to license use of the common discovery channel provided by the third party centralized discovery nodes.

In some aspects, the common discovery channel may additionally or alternatively be broadcasted via a distributed discovery architecture. In contrast to centralized discovery architectures where centralized discovery nodes assume the discovery broadcasting responsibilities for one or more other network access nodes, each network access node in a distributed discovery architecture may broadcast a unique discovery signal. However, as opposed to using separate a RAT-specific discovery channel depending on radio access technology, the network access nodes in distributed discovery architectures may each broadcast their respective discovery signals on a common discovery channel. Accordingly, terminal devices may perform discovery with a common discovery module that scans the common discovery channel as previously detailed regarding method 500 of FIG. 5 and consequently avoid having to activate multiple separate communication modules to perform discovery for multiple radio access technologies.

For example, returning to the exemplary setting of FIG. 2, network access nodes 210, 212, and 214-230 may act as a distributed discovery node and accordingly broadcast a unique discovery signal on the same common discovery channel that contains the discovery information (common and RAT-specific information elements) of the respective network access node. Accordingly, terminal devices such as terminal device 200 may utilize a single common discovery module, such as common discovery module **306*e*, to monitor the common discovery channel and read the respective discovery signals broadcast by each distributed discovery node. Accordingly, terminal device 200 may not have to activate communication modules 306*a*-306*d*** for discovery and may as a result conserve significant power.

More specifically, network access nodes 210, 212, and 214-230 may identify its own common and RAT-specific information elements (according to the corresponding radio access technology) and encode this discovery information into a discovery signal (e.g., at a control module such as control module 608). In order to simplify decoding at terminal devices, network access nodes 210, 212, and 214-230 may encode the respective discovery signals with the same predefined format at control module 608, thus resulting in multiple discovery signals that each contain unique information but are in the same format. Various digital coding and modulation schemes are well-established in the art and any may be employed as the predefined format.

Network access nodes 210, 212, and 214-230 may then each broadcast their respective discovery signals on the common discovery channel with the predefined discovery signal format, thus enabling terminal devices, such as terminal device 200, to monitor the common discovery channel and detect discovery signals according to the predefined discovery signal format with common discovery module **306*e* as detailed regarding method 500. As the predefined discovery signal format is known at common discovery module 306*e*, common discovery module 306*e*** may be configured to perform signal processing to both detect discovery signals (e.g., using reference signals or similar techniques) and decode detected discovery signals to recover the original discovery information encoded therein.

Common discovery module **306*e* may provide such discovery information to controller 308, which may proceed to trigger subsequent communication operations with any of communication modules 306*a*-306*d*** based on the obtained discovery information and current status of each RAT connection.

As multiple of network access nodes 210, 212, and 214-230 may be broadcasting discovery signals on the common discovery channel, there may be well-defined access rules to minimize the impact of transmission conflicts. For example, if network access node 210 and network access node 216 both broadcast their respective discovery signals on the common discovery channel at overlapping times, the two discovery signals may interfere with each other and complicate detection and decoding of the discovery signals at common discovery module **306*e***.

Accordingly, in some aspects, broadcast on the common discovery channel by distributed discovery nodes (including cases where multiple centralized discovery nodes act as distributed discovery nodes to share the same common discovery channel(s)) may be regulated by a set of access rules and broadcast transmission restrictions, such as maximum transmit power, maximum duty cycle, maximum single transmission duration. For example, in some aspects, one or more distributed discovery nodes may be constrained by a maximum transmit power and may not be permitted to transmit a discovery signal on the common discovery channel above the maximum transmit power. In another example, one or more distributed discovery nodes may be constrained by a maximum duty cycle and may not be permitted to transmit a discovery signal on the common discovery channel with a duty cycle exceeding the maximum duty cycle. In another example, one or more distributed discovery nodes may be constrained by a maximum single transmission and may not be permitted to transmit a discovery signal for a continuous period of time exceeding the maximum single transmission duration.

Such access rules may be predefined and preprogrammed into each distributed discovery node, thus enabling each distributed discovery node to obey the access rules when broadcasting discovery signals on the common discovery channel.

Additionally or alternatively, in some aspects the distributed discovery nodes e.g., network access nodes 210, 212, and 214-230 may utilize an active sensing mechanism similar to carrier sensing or collision detection and random backoff (as in e.g., Wi-Fi 802.11a/b/g/n protocols) in order to transmit their respective discovery signals without colliding with the discovery signals transmitted by other of network access nodes 210, 212, and 214-230 on the common discovery channel.

In such an active sensing scheme, distributed discovery nodes (including cases where multiple centralized discovery nodes act as distributed discovery nodes to share the same common discovery channel(s)) may employ 'listen-before-talk' and/or carrier sensing techniques (e.g., handled at control module 608 and radio system 604) in order to perform radio sensing on the common discovery channel prior to actively broadcasting discovery signals. For example, in an exemplary scenario network access node 210 may prepare to transmit a discovery signal on the common discovery channel. In order to prevent collisions with transmissions from other distributed discovery nodes on the common discovery channel, network access node 210 may first monitor the common discovery channel (e.g., over a sensing period) to determine whether any other distributed discovery nodes are transmitting on the common discovery channel. For example, in some aspects network access node 210 may measure the radio energy on the common discovery channel and determine whether the radio energy is above a threshold (e.g., in accordance with an energy detection scheme). If the radio energy on the common discovery channel is below the threshold, network access node 210 may determine that the common discovery channel is free; conversely, if the radio energy on the common discovery channel is above the threshold, network access node 210 may determine that the common discovery channel is busy, e.g., that another transmission is ongoing. In some aspects, network access node 210 may attempt to decode the common discovery channel (e.g., according to the common discovery signal format) to identify whether another network access node is transmitting a common discovery signal on the common discovery channel.

If network access node 210 determines that the common discovery channel is free, network access node may proceed to transmit its common discovery signal on the common discovery channel. If network access node 210 determines that the common discovery channel is busy, network access node 210 may delay transmission of its common discovery signal, monitor the common discovery channel again, and re-assess whether the common discovery channel is free. Network access node 210 may then transmit its common discovery signal once the common discovery channel is free. In some aspects, the network access nodes using the common discovery channel may utilize a contention-based channel access scheme such as carrier sensing multiple access (CSMA), CSMA Collision Avoidance (CSMA/CA), or CSMA Collision Detection (CSMA/CD) to govern access to the common discovery channel. Such may prevent collisions between common discovery signals transmitted by different network access nodes and prevent signal corruption on the common discovery channel. In some aspects, network access nodes may handle collisions unilaterally, and terminal devices may not need to address collisions. For example, if there is a collision between two (or more) network access nodes in transmitting a discovery signal on the common discovery signal, the involved network access nodes may detect the collision and perform a backoff procedure before they attempt to transmit the discovery signal again. There may be problems of hidden node, where network access nodes may be too far from one another to detect collisions observed at a terminal device (e.g., where the terminal device is in between two network access nodes and will observe collisions that the network access nodes may not detect at their respective locations). In various aspects, participating network access nodes may utilize different techniques to address the hidden node problem. For example, network access nodes may utilize repetition, in other words, by repeating transmission of a discovery signal multiple times. In some aspects, network access nodes may utilize random backoff, which may prevent two (or more) network access nodes from detecting a transmission by a third network access node and both attempting to transmit at the same time after using the same backoff time. In some aspects, the network access nodes may utilize a centrally managed scheme, such as where each network access node reports to a coordinating entity. The coordinating entity may be a designated network access node or a radio device that is specifically dedicated to managing access to the common discovery channel. The coordinating entity may grant access to the common discovery channel individually to network access nodes. In some aspects, each network access node may report to a single coordinating entity which then does the broadcast and is in communication with other nearby coordinating entities (that also perform broadcast) and have a way of managing their broadcasts so they do not overlap, for example by scrambling the signal using an orthogonal codes such as Zadoff-Chu sequence.

In some aspects, distributed discovery nodes (including cases where multiple centralized discovery nodes act as distributed discovery nodes to share the same common discovery channel(s)) may utilize cognitive radio technologies. In particular, cognitive radio devices can be configured to detect available, or ‘free’ channels, that are not being utilized. Cognitive radio devices may then seize a detected available channel and use the channel for radio transmission and reception. Accordingly, in some aspects, there may be a set of common discovery channels that are eligible for use as a common discovery channel. A distributed discovery node such as network access node 210 may be preparing to transmit a discovery signal and may aim to find an available time-frequency resource to use as the common discovery channel to transmit the discovery signal. Accordingly, in some aspects, network access node 210 may be configured to utilize cognitive radio techniques to adaptively identify an available common discovery channel from the set of common discovery channels that is available. For example, network access node 210 may evaluate radio signals received on one or more of the set of common discovery channels and determine whether any of the set of common discovery channels are free, such as e.g., by performing energy detection (e.g., to detect radio energy from any type of signal) or discovery signal detection (e.g., to detect discovery signals by attempting to decode the radio signals). Upon identifying an available common discovery channel, network access node 210 may utilize the available common discovery channel to transmit a discovery signal. In some aspects, the set of common discovery channels may be predefined, which may enable terminal devices to be aware of which frequency channels are common discovery channels and therefore to know which frequency channels to scan for discovery signals on. In some aspects, distributed discovery nodes may be configured to broadcast the set of common discovery channels (e.g., as part of the discovery signal) in order to inform terminals which frequency channels are eligible for use as a common discovery channel.

In some aspects, distributed discovery nodes (including cases where multiple centralized discovery nodes act as distributed discovery nodes to share the same common discovery channel(s)) may operate a single frequency network to broadcast a common discovery signal on a single frequency common discovery channel. For example, a plurality of distributed discovery nodes (e.g., multiple of network access nodes 210-230) may coordinate to exchange discovery information and consolidate discovery information and/or receive consolidated discovery information from a central coordinating point (e.g., a server or core network node that consolidates discovery information). The plurality distributed discovery nodes may then generate the same common discovery signal and then transmit the same common discovery signal in a synchronized fashion on the singe frequency common discovery channel, thus forming a single frequency network that carries the common discovery signal. In some aspects, this may require infrastructure coordination in order to consolidate information and/or maintain synchronized transmission. Single frequency common discovery channel broadcast in this manner may increase the coverage area and provide a common discovery signal across a large area.

In some aspects, distributed discovery nodes (including cases where multiple centralized discovery nodes act as distributed discovery nodes to share the same common discovery channel(s)) may utilize a minimum periodicity (and optionally also maximum periodicity) for discovery signal broadcast on the common discovery channel. Maximum channel access times may also be employed with required back-off times in which a distributed network access node may be required to wait for a predefined duration of time following a discovery signal broadcast to perform another discovery signal broadcast. Such techniques may ensure fairness by preventing distributed discovery nodes from overusing the common discovery channel by broadcasting discovery signals too frequently.

It is desirable that the discovery signal format be particularly robust for distributed discovery architectures due to the high potential for collisions (although such robustness may be beneficial in both centralized and distributed discovery architectures). Accordingly, it is desirable that the discovery signals be well-suited for low-sensitivity detection and decoding in addition to fast and accurate acquisition procedures. The requirements may however be less stringent than conventional cellular cases (e.g., LTE, UMTS, and GSM) signal reception due to the associated modality. In other words, only a deterministic amount of data may be included in the discovery signals and may be able to utilize a predefined bandwidth and rate. Such may enable design of low-power receiver circuitry at common discovery module 306*e*, which may offer further benefits.

As noted above, there may exist multiple centralized discovery nodes in centralized discovery architectures that each assume discovery broadcast responsibilities for other network access nodes. Accordingly, such scenarios may be treated as a mix between centralized and distributed discovery architectures where potential collisions may occur between discovery signal broadcasts. Centralized discovery nodes may consequently also employ similar access techniques as noted above, such as access rules and active sensing, in order to minimize the impact of such potential collisions.

In some aspects of centralized and distributed discovery architectures, terminal devices receiving discovery signals on the common discovery channel may perform error control in order to ensure that information transmitted on the common discovery channel is correct. For example, if there is incorrect information on the common discovery channel (for example, if a distributed discovery node broadcasts discovery information on the common discovery channel that is incorrect or misdirected), reception of such information by a terminal device may result in terminal resources being wasted to read the incorrect information and potentially to act on it by pursuing subsequent communication operations under false assumptions. In the case that a terminal device attempts to establish a connection with a false network access node, such may unavoidably result in a waste of terminal resources. However, these scenarios may not be a fatal error (e.g., may not lead to a total loss of connectivity or harm to the terminal device or network).

In the event of incorrect discovery information provided on the common discovery channel, there may instead exist several remedial options available to both terminal devices and network access nodes. Specifically, a terminal device that has identified incorrect discovery information (via a failed connection or inability to detect a network access node based on discovery information provided on the common discovery channel) may notify a network access node that the terminal device is connected to (potentially after an initial failure) that there is incorrect information being broadcasted on the common discovery channel.

The notified network access node may then report the incorrect information, e.g., via a backhaul link, to an appropriate destination in order to enable the erroneous discovery information to be fixed. For example, the notified network access node may utilize a connection via a backhaul link (if such exists depending on the network architecture) to the offending network access node that is broadcasting the incorrect discovery information to inform the offending network access node incorrect discovery information, in response to which the offending network access node may correct the incorrect discovery information. Alternatively, if the discovery information is handled in a database e.g., as in the case of external database 800 of FIG. 8, the notified network access node may inform the external database (via a backhaul link) of the incorrect discovery information, which may prompt the external database to correct the incorrect discovery information. The discovery information may thus be self-maintained, or 'self-policed', in order to ensure that the discovery information is correct.

In some aspects, centralized and distributed discovery architectures may enable terminal devices to employ a common discovery module to handle discovery responsibilities for multiple radio access technologies. As detailed above, such may significantly reduce the power penalty for discovery procedures and may further simplify discovery procedures due to the presence of only a single (or a limited number) of common discovery channels. In some aspects, the common discovery channel scheme may use cooperation of network access nodes in accordance with a centralized and/or distributed discovery architecture, which may coordinate with one another in order to consolidate discovery broadcast responsibilities at single network access nodes (in the case of centralized network architectures) and/or cooperate with one another to minimize the impact of collisions (in the case of distributed network architectures).

Continuing with the setting of FIG. 8 related to a centralized discovery architecture, in some aspects terminal devices may additionally utilize external database 800 in a more active role. For example, terminal devices that currently have a RAT connection providing access to external database 800 may query external database 800 for information related to nearby radio access networks and network access nodes. For example, in an exemplary configuration where external database 800 is provided as an external service in an Internet-accessible network location (e.g., as an internet cloud server), terminal devices that have active Internet connections (e.g., provided via a RAT connection) may exchange data with external database 800 in order to obtain discovery information for relevant network access nodes from external database 800.

Figure 9:
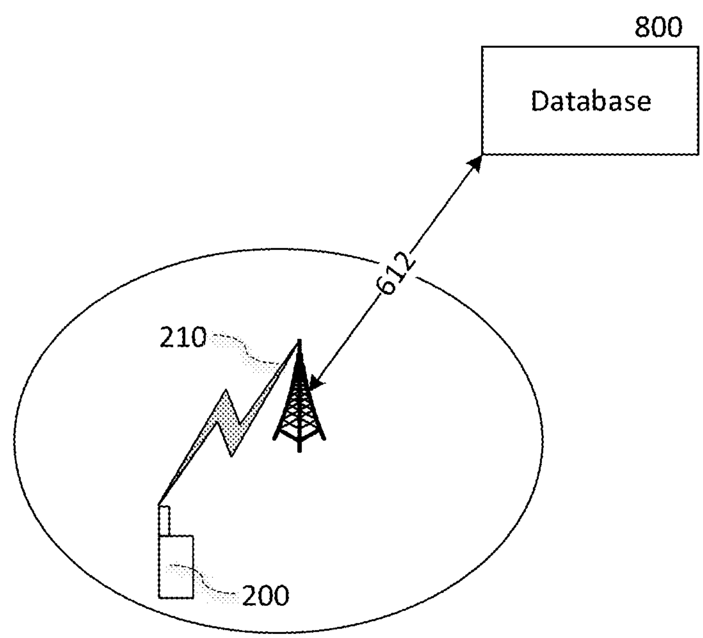
FIG. 9 shows a second exemplary network scenario with an external database for storing discovery information in accordance with some aspects.

FIG. 9 shows an exemplary scenario in which terminal device 200 has a RAT connection with network access node 210 in accordance with some aspects. As shown in FIG. 9, network access node 210 may also interface with external database 800 via backhaul interface 612. Terminal device 200 may utilize the RAT connection with network access node 210 in order to exchange network access node information with external database 800.

Specifically, external database 800 may be located in an Internet-accessible network location and may accordingly have a network address such as an Internet Protocol (IP) address, thus enabling Internet-connected devices to exchange data with external database 800. Accordingly, terminal devices such as terminal device 200 may utilize RAT connections that provide Internet access (e.g., many cellular RAT connections and short-range RAT connections) in order to exchange network access node information with external database 800. For example, terminal device 200 may utilize a RAT connection with network access node 210 (e.g., post-discovery) in order to access external database 800 and request information for network access nodes of interest.

Terminal device 200 may utilize external database 800 to obtain information for other network access nodes (including, for example, discovery information) of interest and may apply such information obtained from external database 800 in order to influence radio access communications with such network access nodes.

For example, in the exemplary scenario of FIG. 2 in which network access nodes 212-230 are proximate to network access node 110, controller 308 of terminal device 200 may query external database 800 (via the first RAT connection with network access node 210 supported by first communication module 306*a*) for information on proximate network access nodes. In response, external database 800 may provide controller 308 (via the first RAT connection with network access node 210 supported by first communication module 306*a*) with information on network access node 212 and network access nodes 214-230. Such information may include discovery information, which controller 308 may receive and utilize to direct future radio access communications.

For instance, based on discovery information provided by external database 800, controller 308 may identify that network access node 216 is within range of terminal device 200 (e.g., by comparing a current geographical location of terminal device 200 with a geographic location of network access node 216 provided by external database 800 as part of the discovery information). Controller 308 may then utilize the discovery information to connect to and establish a RAT connection with network access node 216. Accordingly, controller 308 may generally perform any unilateral radio interactions (e.g., performing radio measurements on a discovered network access node, receiving broadcast information of a discovered network access node) or bilateral radio interactions (e.g., pursuing and potentially establishing a bidirectional connection with a discovered network access node) with network access nodes based on the network access node information provided by external database 800.

In some aspects, external database 800 may obtain the network access node information via any number of different sources, including via connections with network access nodes (which may additionally obtain discovery information as detailed herein) and/or via interfacing with radio access network databases. Terminal devices may be able to request any type of network access node information from external database 800 during any time that the terminal devices have a RAT connection that provides Internet access. Such information may be particularly useful to terminal devices either during start-up procedures or during time periods when link quality is poor.

For example, during start-up and/or initial RAT connection establishment, terminal device 200 may seek to establish an initial RAT connection quickly (e.g., potentially without giving full-consideration to establishing the optimal RAT connection in terms of radio link strength and quality) with an Internet-connected network access node and, using the established RAT connection, may query external database 800 for information on other network access nodes such as, for example, discovery information. Terminal device 200 may then receive the requested network access node information from external database 800 via the RAT connection.

Upon obtaining the network access node information, terminal device 200 may be able to identify one or more other network access nodes and may utilize the network access node information to select a more suitable network access node to switch to (such as, for example, by utilizing discovery information provided by external database 800 to perform radio measurements in order to identify a more suitable network access node). Alternatively, in scenarios where a current RAT connection degrades, terminal device 200 may query external database 800 for information on proximate network access nodes, which may enable terminal device 200 to select a new network access node to connect to that may provide a better RAT connection.

Regardless of the particular scenario, in some aspects terminal devices such as terminal device 200 may utilize external database 800 to obtain information on network access nodes of interest and may potentially utilize such information (including, for example, discovery information) to perform unilateral or bilateral radio interactions with one or more of the network access nodes.

External database 800 may therefore receive queries for network access node information from one or more terminal devices, where the terminal devices may transmit the queries via a radio access network to external database 800 using network addressing protocols (e.g., Internet Protocol (IP) addressing, Media Access Control (MAC) addressing, etc.). External database 800 may respond to such queries by then providing the requested information back to the terminal devices via the reverse of the same link. Accordingly, external database 800 may individually respond to each query using network addressing protocols.

Alternatively, in some aspects external database 800 may collect a number of different requests from multiple terminal devices and distribute the requested information via a multicast or broadcast mode. Accordingly, external database 800 may be configured to provide the requested information via either the same link used by the counterpart terminal devices to query for information or by a multicast or broadcast channel. For example, external database 800 may provide the requested information in multicast or broadcast format on a common discovery channel as detailed above. Terminal devices may therefore either utilize a common discovery module such as common discovery module 306*e* or a dedicated radio access communication module (e.g., any of communication modules 306*a*-306*d* depending on which radio access technology was employed to query the information from external database 800).

In some aspects, the use of external database 800 in conjunction with a centralized discovery node architecture may also be expanded to provide information to network access nodes, such as, for example, to provide network access nodes with important information regarding other network access nodes. For example, Wi-Fi access points may be required to have radio sensing capabilities in order to ensure that their transmissions do not interfere with other transmitters using the same unlicensed spectrum. For example, Wi-Fi access points may be able to detect the presence of nearby radar transmitters, which may see governmental or defense usage and thus may be given a high priority in terms of avoiding interference (e.g., by a regulatory body such as the Federal Communications Commission (FCC)). As there may exist multiple different types of radar signals that may not all be detectable at a given geographic location, it may be relatively complex for Wi-Fi access points to perform comprehensive radar sensing.

In order to alleviate such issues, in some aspects, Wi-Fi access points may utilize external database 800 as a database to maintain information regarding radar signals. Accordingly, Wi-Fi access points may report detected radar signals to external database 800, which may through the use of a centralized discovery node broadcast such information in order to allow other Wi-Fi access points to be aware of nearby radar transmitters. Wi-Fi access points may thus be configured with reception components in order to receive such information on a common discovery channel and may consequently rely on such information instead of having to perform complete radar sensing functions.

Discovery signals that are broadcasted based on information provided by external database 800 may therefore in some cases not be limited only to reception and usage by terminal devices. Accordingly, in some aspects network access nodes may also utilize such information in particular for interference management purposes. For example, any number of different types of network access nodes may receive and apply such discovery signals in order to be aware of the presence of other network access nodes and subsequently apply interference management techniques in order to reduce interference.

Although detailed above and depicted as a single database, in some aspects multiple instances of external database 800 may be deployed where each instance may contain the same or different information, such as, for example, a different external database to serve certain geographic regions.

In some aspects, the techniques detailed above regarding the common discovery channel may also be expanded to device-to-device communications, where one or more terminal devices may utilize the common discovery channel to broadcast discovery information locally available at each mobile terminal. For example, controller 308 may previously have obtained discovery information for one or more network access nodes, for example, either via conventional discovery at one of communication modules 306*a*-306*d* or reception of discovery information on a common discovery channel via common discovery module 306*e*.

In order to simplify discovery procedures for other proximate terminal devices, controller 308 may then transmit the obtained discovery information as a discovery signal (e.g., by generating the discovery signal according to a predefined format) on a common discovery channel, for example, by using transmission components included in common discovery module 306*e* (in which case common discovery module 306*e* may be more than a simple low-complexity receiver) or another communication module configured to transmit discovery signals on the common discovery channel. Accordingly, other terminal devices may thus receive the discovery signal on the common discovery channel and utilize the discovery information contained therein to perform unilateral or bilateral radio interactions with the network access nodes represented in the discovery information.

In some aspects, such device-to-device operation of the common discovery channel may function similarly to distributed discovery architectures at detailed above, where each transmitting terminal device may operate as a distributed discovery node in order to broadcast discovery signals on the common discovery channel.

Figure 10:
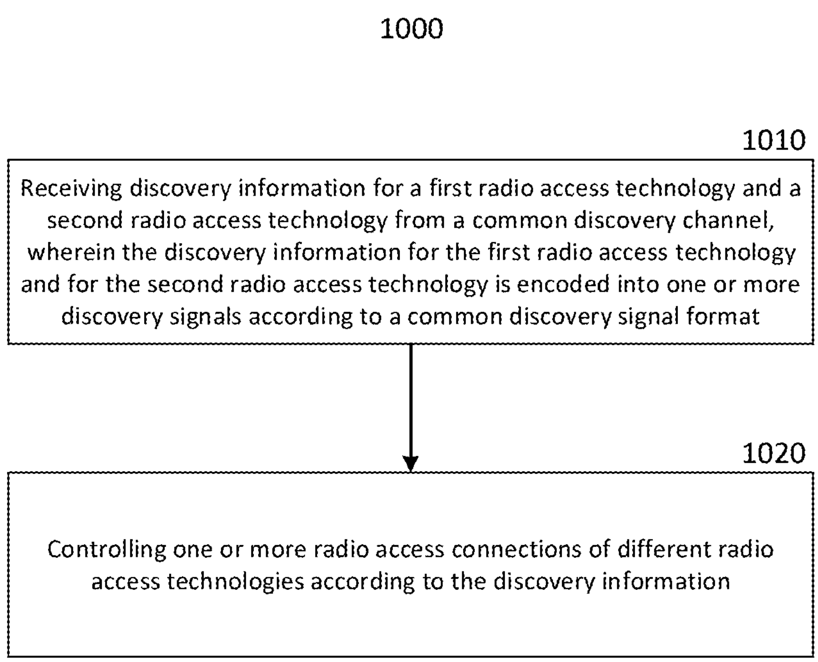
FIG. 10 shows an exemplary method of performing radio communications in connection with a common discovery channel scheme in accordance with some aspects.

FIG. 10 shows a method 1000 of performing radio communications in accordance with some aspects. The method 1000 includes decoding discovery information for a first radio access technology and a second radio access technology from a common discovery channel (1010), wherein the discovery information is encoded into one or more discovery signals according to a common discovery signal format, and controlling one or more RAT connections of different radio access technologies according to the discovery information (1020). In one or more further exemplary aspects of the disclosure, one or more of the features described above in reference to FIGS. 1-9 may be further incorporated into method 1000. In particular, method 1000 may be configured to perform further and/or alternate processes as detailed regarding terminal device 200.

1.2 Common Channel #2

In some aspects of this disclosure, terminal devices may coordinate with network access nodes to use a common control channel that provides control information for multiple radio access technologies. Accordingly, instead of monitoring a separate control channel for multiple radio access technologies, a terminal device may consolidate monitoring of the separate control channels into monitoring of a common control channel that contains control information for multiple radio access technologies.

In some aspects, terminal devices may also receive control information that instructs the terminal devices how and when to transmit and receive data over wireless access network. Such control information may include, for example, time and frequency scheduling information, coding/modulation schemes, power control information, paging information, retransmission information, connection/mobility information. Upon receipt of this information, terminal devices may transmit and receive radio data according to the specified control parameters in order to ensure proper reception at both the terminal device and on the network side at the counterpart network access node.

A RAT connection may rely on such control information. For example, as previously detailed regarding FIG. 3, controller 308 may maintain a separate RAT connection via two or more of communication modules 306*a*-306*d* (although in many scenarios the cellular connections for each of communication modules 306*a*-306*c* may be jointly managed, for example, in a master/slave RAT scheme). Accordingly, controller 308 may receive control information for the first RAT to maintain a first RAT connection via first communication module 306*a* (e.g., LTE control information to maintain an LTE connection in an exemplary LTE setting) while also receiving control information for the second RAT to maintain a second RAT connection via second communication module 306*c* (e.g., Wi-Fi control information to maintain a Wi-Fi connection in an exemplary Wi-Fi setting). Controller 308 may then manage the first and second RAT connections according to the respective control information and corresponding radio access protocols.

Even if one of the RAT connections is idle, for example, not actively exchanging user data traffic, controller 308 may still monitor that one of the RAT connections, in particular for control information such as, for example, paging messages.

For example, even if the first RAT connection at first communication module 306*a* is in an idle state, (e.g., camped on an LTE cell but not allocated any dedicated resources in an exemplary LTE setting), controller 308 may still monitor the first RAT connection via first communication module 306*a* in case a network access node of the first RAT (e.g., an LTE cell) transmits a paging message to first communication module 306*a* that indicates incoming data for first communication module 306*a*. Accordingly, controller 308 may continuously monitor first radio access LTE connection for incoming first RAT data with first communication module 306*a*.

Similarly, regardless of whether a second RAT connection at second communication module 306*b* is idle, controller 308 may also continuously monitor the second RAT connection for incoming second RAT data with second communication module 306*b* (and likewise for any other RAT connections, e.g., at communication modules 306*c*-306*d*). This may cause excessive power consumption at communication modules 306*a*-306*d* due to constant monitoring for control information.

It may therefore be advantageous to consolidate monitoring for multiple RAT connections into a single RAT connection, such as, for example, by being able to monitor a single RAT connection for control information of multiple RATs. For example, terminal device 200 may be able to monitor for Wi-Fi beacons and data (including e.g., beacon frames to indicate pending data for Wi-Fi devices currently using power-saving mode, which may prompt wakeup to receive the data) and other Wi-Fi control information of a Wi-Fi connection over an LTE connection. This may involve network-level forwarding of incoming data for one RAT connection to another RAT connection (e.g., forwarding Wi-Fi data via an LTE connection), which may enable terminal device 200 to monitor one RAT connection in place of multiple RAT connections. For example, terminal device 200 may be able to receive incoming Wi-Fi data with first communication module 306*a*, which may allow terminal device 200 to avoid continuously monitoring the Wi-Fi connection with second communication module 306*b*.

These aspects may therefore enable controller 308 to utilize a forwarding and common monitoring scheme where the monitoring of incoming data for multiple of communication modules 306*a*-306*d* is consolidated onto a single RAT connection. In the example described above, controller 308 may therefore only monitor the first RAT connection with first communication module 306*a*. As incoming second RAT data will be forwarded to the first RAT connection, e.g., forwarded to the network access node counterpart to terminal device 200 for the first RAT connection, controller 308 may receive such incoming second RAT data at first communication module 306*a*.

Controller 308 may proceed to identify the incoming data for the second RAT, such as, for example, a paging message for the second RAT connection at second communication module 306*b*, and proceed to control the second RAT connection according to the incoming second RAT data. For example, after receiving data on the first RAT connection, first communication module 306*a* may provide received data (which may include the incoming second RAT data embedded in first RAT data) to controller 308, which may identify the incoming second RAT data. In the case where the incoming second RAT data is e.g., a second RAT paging message, controller 308 may activate second communication module 306*b* and proceed to receive the incoming second RAT data indicated in the second RAT paging message. Analogous consolidation of monitoring for multiple RAT connections may likewise be realized with any other combination of two or more RAT connections. For example, in an exemplary LTE and Wi-Fi setting where the first RAT is LTE and the second RAT is Wi-Fi, controller 308 may receive Wi-Fi control data via first communication module 306*a* (where the Wi-Fi data was forwarded to the LTE connection at the network-level). Controller 308 may then control the Wi-Fi connection via second communication module 306*b* based on the Wi-Fi control data.

The forwarding and common monitoring system may rely on cooperation from at least one of the counterpart network access nodes. For example, in the above example the second RAT network access node may identify incoming data addressed to terminal device 200 and forward the identified data to the first RAT network access node for subsequent transmission to terminal device 200 over the first RAT connection. Accordingly, the forwarding and common monitoring system may rely on a forwarding scheme in which second RAT data at the second RAT network access node intended for terminal device 200 is forwarded to the first RAT network access node, thus enabling the first RAT network access node to subsequently transmit the second RAT data over the first RAT connection to first communication module 306*a*.

Although, in certain scenarios, both the first RAT network access node and the second RAT access node may be configured according to the forwarding and common monitoring scheme, the forwarding and common monitoring scheme may be implemented with only a single cooperating network access node that forwards data to the terminal device via a non-cooperating network access node.

Figure 11:
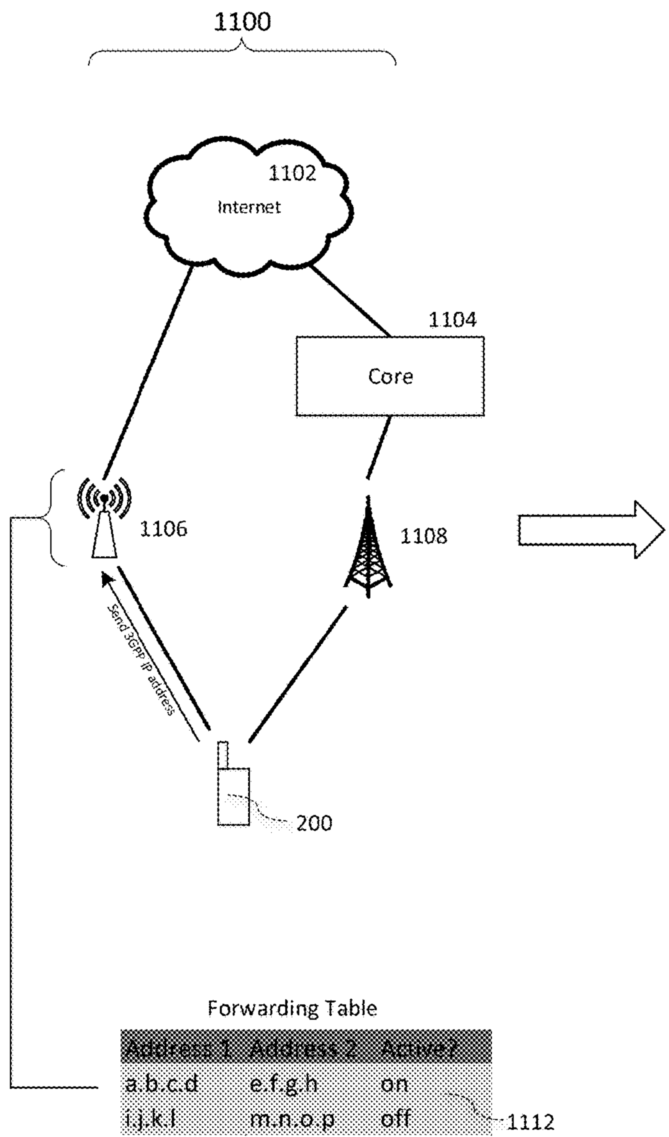
FIG. 11 shows an exemplary network scenario including terminal devices and network access nodes related to a forwarding and common monitoring scheme in accordance with some aspects.

FIG. 11 illustrates an exemplary forwarding and common monitoring system in accordance with some aspects. In FIG. 11, second RAT data intended for terminal device 200 is re-routed, or forwarded, from a second RAT connection to a first RAT connection, thus enabling terminal device 200 to forego monitoring of the second RAT connection and instead only monitor the first RAT connection. While some examples in the following description may focus on LTE and Wi-Fi, terminal device 200 may analogously apply the same forwarding and common monitoring technique for any two or more radio access technologies.

In scenario 1100 shown in FIG. 11, terminal device 200 may have a first RAT connection and a second RAT connection via first communication module 306*a* and second communication module 306*d*, respectively. As shown in 1100, terminal device 200 may have a second RAT connection supplied by network access node 1106 that provides terminal device 200 with a connection to internet network 1102. Terminal device 200 may also have a first RAT connection supplied by network access node 1108 that routes through core network 1104 to internet network 1102.

In some aspects, as the first RAT connection and the second RAT connections are separate, terminal device 200 may be assigned a network address for each connection. For example, terminal device 200 may have a network address of e.g., a. b. c. d for the second RAT connection (that identifies terminal device 200 as an end-destination of the second RAT connection) and a network address of e.g., e. f. g. h for the first RAT connection (that identifies terminal device 200 as an end-destination of the first RAT connection). Data packets (such as IP data) may be routed along the first and second RAT connections from internet network 1102 to terminal device 200 according to the first and second RAT network addresses. In some aspects, the network addresses may be IP addresses. In some aspects, the network addresses may be MAC addresses. Other network addressing protocols may also be used without departing from the scope of this disclosure. In some aspects, terminal device 200 can be associated with one or more network addresses, where networks may use the one or more addresses to route data to terminal device 200. The one or more network addresses can be any type of address that is compliant with the underlying network.

Controller 308 may therefore maintain both the first and second RAT connections with first communication module 306*a* and second communication module 306*b* in order to exchange user data traffic with internet network 1102. If a RAT connection is in an active state, controller 308 may constantly operate the corresponding communication module in order to exchange uplink and downlink data with the appropriate network access node. Alternatively, if a RAT connection is in an idle state, controller 308 may only periodically operate the corresponding communication module to receive infrequent control data such as paging messages, which may indicate that an idle connection may be transitioned to an active state in order to receive incoming data.

If a paging message is received for a given idle RAT connection, controller 308 may subsequently activate the corresponding communication module in order to transition the corresponding RAT connection to an active state to receive the incoming data indicated in the paging message. Accordingly, such paging message monitoring may require that controller 308 monitor both first communication module 306*a* and second communication module 306*b* even when the underlying RAT connections are in an idle state. This may require high battery power expenditure at terminal device 200.

In some aspects, in order to avoid having to monitor two or more RAT connections separately, controller 308 may execute the forwarding and common monitoring mechanism illustrated in FIG. 11. This temporarily disconnects one of the RAT connections and arranges for incoming data for the disconnected RAT connection to be forwarded to another RAT connection. Controller 308 may then monitor for data of the disconnected RAT connection on the remaining RAT connection.

For example, in a scenario where the second RAT connection with network access node 1106 is in an idle state and the first RAT connection with network access node 1108 is in either an active or idle state, controller 308 may temporarily disconnect the second RAT connection and transfer monitoring of the second RAT connection from second communication module 306*b* to first communication module 306*a*. Controller 308 may therefore place second communication module 306*b* in an inactive state, which may conserve battery power.

In some aspects, in order to disconnect a RAT connection (e.g., the second RAT connection), controller 308 may set up a forwarding path in order to ensure that data intended for terminal device 200 on the disconnected RAT connection, such as e.g., paging messages and other control data, is re-routed to another RAT connection (e.g., through network access node 1108).

Accordingly, as shown in scenario 1100, controller 308 may transmit a forwarding setup instruction to network access node 1106 (via second communication module 306*b* over the second RAT connection) that instructs network access node 1106 to temporarily disconnect the second RAT connection and to re-route second RAT data intended for terminal device 200 to an alternate destination. For example, controller 308 may instruct network access node 1106 to forward all second RAT data intended for the second RAT network address a. b. c. d of terminal device 200 to the first RAT network address e. f. g. h of terminal device 200. Upon receipt of the forwarding setup instruction network access node 1106 may register the alternate destination of terminal device 200, e.g., first RAT network address e. f. g. h in a forward table (as shown in FIG. 11), and thus activate forwarding to the alternate destination.

Figure 12:
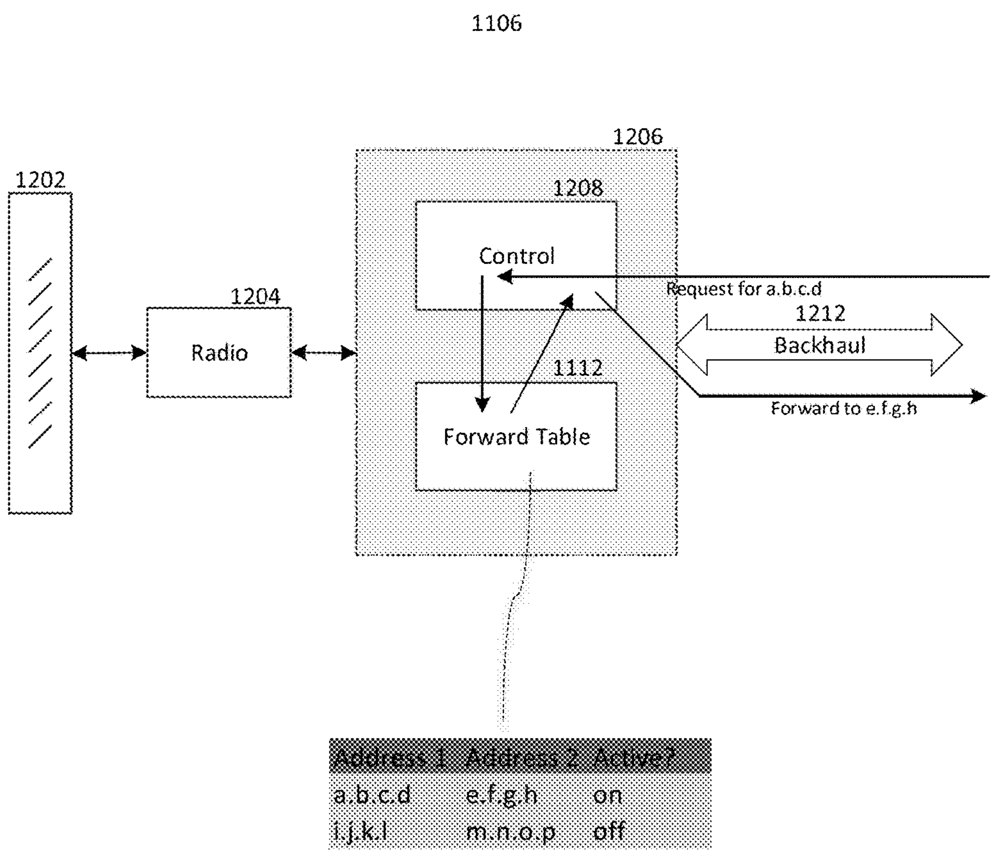
FIG. 12 shows a second exemplary internal configuration of a network access node in accordance with some aspects.

FIG. 12 shows an internal configuration of network access node 1106 in accordance with some aspects. Network access node 1106 may include antenna system 1202, radio system 1204, communication system 1206 (including control module 1208 and forwarding table 1112), and/or backhaul interface 1212. Network access node 1106 may transmit and receive radio signals via antenna system 1202, which may be an antenna array including multiple antennas. Radio system 1204 may perform transmit and receive RF and PHY processing in order to convert outgoing digital data from communication module 1206 into analog RF signals to provide to antenna system 1202 for radio transmission and to convert incoming analog RF signals received from antenna system 1202 into digital data to provide to communication module 1206. Control module 1208 may control the communication functionality of network access node 1106 according to the corresponding radio access protocols, e.g., Wi-Fi/WLAN, which may include exercising control over antenna system 1202 and radio system 1204.

Radio system 1204, control module 1208 may be structurally realized as hardware-defined modules, e.g., as one or more dedicated hardware circuits or FPGAs, as software-defined modules, e.g., as one or more processors executing program code that define arithmetic, control, and I/O instructions (e.g., software and/or firmware) stored in a non-transitory computer-readable storage medium, or as mixed hardware-defined and software-defined modules.

In some aspects, forwarding table 1112 may be embodied as a memory that is accessible (read/write) by control module 1208. Backhaul interface 1212 may be a wired (e.g., Ethernet, fiber optic, etc.) or wireless (e.g., microwave radio or similar wireless transceiver system) connection point for physical connection configured to transmit and receive data with other network nodes, which may be e.g., a microwave radio transmitter, or a connection point and associated circuitry for a fiber backhaul link.

In some aspects, control module 1208 may receive forwarding setup instructions (following processing by antenna system 1202 and radio system 1204) as illustrated in 1100 and proceed to activate forwarding for terminal device 200 by updating forwarding table 1112 according to the alternate destination, e.g., first RAT network address e. f. g. h as provided by controller 308 in the forwarding setup instructions.

Following forwarding activation, network access node 1106 may re-route all second RAT data received from internet network 1102 that is intended for terminal device 200 (e.g., addressed to second RAT network address a. b. c. d) to the alternate destination, e.g., first RAT network address e. f. g. h. As the alternate destination is merely the first RAT network address of the first RAT connection of terminal device 200, such may as a result re-route the second RAT data to terminal device 200 via the first RAT network address. Accordingly, terminal device 200 may receive the second RAT data over the first RAT connection at first communication module 306*a* along with other data addressed to first RAT network address e. f. g. h.

In some aspects, control module 1208 may populate forwarding table 1112 using forwarding setup instructions received from served terminal devices. Forwarding table 1112 may contain forwarding entries including at least an original network address and a forwarding network address. In some aspects, control module 1208 may register, in forwarding table 1112, the original network address (e.g., a. b. c. d for terminal device 200) of the terminal devices with the forwarding network address specified in the forwarding setup instruction (e.g., e. f. g. h for terminal device 200). Accordingly, upon receipt of the forwarding setup instruction from terminal device 200 (where terminal device 200 has second RAT network address a. b. c. d and specifies forwarding network address e. f. g. h in the forwarding setup instruction), control module 1208 may register the original second RAT network address a. b. c. d and forwarding network address e. f. g. h at forwarding table 1112. In some cases, control module 1208 may also set an 'active flag' for the forwarding entry of terminal device 200 to 'on', where the active flag for a forwarding entry may specify whether the forwarding path is currently active.

In some aspects, after receiving the forwarding setup instruction from terminal device 200 at 1100, control module 1208 may proceed to forward all incoming data intended for terminal device 200 at second RAT network address a. b. c. d to first RAT network address e. f. g. h. FIG. 11 shows the high-level forwarding path via internet network 1102, core network 1104, and network access node 1108 while FIG. 12 shows the internal path within network access node 1106 in accordance with some aspects. As depicted in 1110, internet network 1102 may provide data packets to network access node 1106, which may be addressed to various terminal devices that are served by network access node 1106. Network access node 1106 may receive such data packets at backhaul interface 1212, which may route incoming data packets to control module 1208. Control module 1208 may check the destination network address of each data packet with the original network addresses in forwarding table 1112 as shown in FIG. 12 in order to determine whether any data packets should be re-routed to a forwarding network address.

Accordingly, as shown in 1110, network access node 1106 may receive a data packet (or a stream of data packets where the following description may likewise apply for multiple data packets) from internet network 1102 that are addressed to destination network address a. b. c. d. Network access node 1106 may receive such data packets from internet network 1102 via backhaul interface 1212, where data packets may subsequently be received and processed at control module 1208.

Subsequently, control module 1208 may then, for each data packet addressed to a served terminal device, check whether the destination network address matches with an original network address registered in forwarding table 1112 with an active forwarding flag. If a data packet is addressed to an original network address with an active flag in forwarding table 1112, control module 1208 may forward the data packet to the forwarding network address registered with the original network address in forwarding table 1112.

Accordingly, as shown in FIG. 12, upon receipt of a data packet addressed to terminal device 200 (e.g., at network address a. b. c. d), control module 1208 may compare the destination network address of a. b. c. d to the forwarding entries of forwarding table 1112 and determine that destination network address a. b. c. d matches with original network address a. b. c. d for terminal device 200 and has an active forwarding flag. Consequently, instead of transmitting the data packet to terminal device 200 via the second RAT connection (provided from radio system 1204 and antenna system 1202 to second communication module 306*b*), control module 1208 may re-route the data packet to the forwarding network address of terminal device 200 registered to original network address a. b. c. d in forwarding table 1112, e.g., to forwarding network address e. f. g. h which may be the first RAT network address registered by terminal device 200 in the initial forwarding setup message.

Upon identifying the appropriate forwarding network address for the data packet, control module 1208 may re-address the data packet (e.g., depending on the corresponding header encapsulation and transmission protocols, e.g., according to a IP addressing scheme) and transmit the re-addressed data packet to internet network 1102 via backhaul interface 1212. Since the data packet is re-addressed to the forwarding network address a. b. c. d, internet network 1102 may route the re-addressed data packet to core network 1104.

In some aspects, core network 1104 may similarly utilize the forwarding network address a. b. c. d to route the re-addressed data packet to the appropriate network access node associated with the forwarding network address of e. f. g. h, for example, to network access node 1108 that is providing a first RAT connection to terminal device 200 with first RAT network address e. f. g. h as the user-side destination address.

Network access node 1108 may then transmit the re-addressed data packet to terminal device 200 using the first RAT connection, where terminal device 200 may receive the re-addressed data packet at first communication module 306*a* and subsequently process the re-addressed data packet at controller 308. Accordingly, controller 308 may not actively operate second communication module 306*b* to receive the data packet. Instead, controller 308 may consolidate monitoring for both the first and second RAT connections at only first communication module 306*a*. Controller 308 may identify that the re-addressed data packet is a second RAT data packet and may process the re-addressed data packet according to the associated second RAT protocols as if the data packet had actually been received at second communication module 306*b*.

As previously indicated, the data packet may be control data, such as a paging message, that indicates incoming second RAT data addressed to terminal device 200. Upon recognition that the data packet is a second RAT paging message, controller 308 may activate second communication module 306*b* and proceed to activate and control second communication module 306*b* in order to receive the incoming second RAT data over the second RAT connection.

In order to receive the incoming second RAT data over the second RAT connection, controller 308 may de-activate forwarding at network access node 1106. Accordingly, controller 308 may resume the second RAT connection at second communication module 306*b* with network access node 1106 and transmit a forwarding deactivation instruction to network access node 1106. In some aspects, network access node 1106 and controller 308 may maintain the second RAT connection 'virtually' during forwarding, such as by keeping the network addresses and ignoring any keep-alive timers (which may otherwise expire and trigger complete tear-down of the connection). Accordingly, once controller 308*f* decides to de-activate forwarding and utilize the second RAT connection again, second communication module 306*b* and network access node 1106 may resume using the second RAT connection without performing a full connection re-establishment procedure. For example, controller 308 may transmit a request (via the forwarding link) to network access node 1106 to resume using the second RAT connection. Network access node 1106 may then respond with an acknowledgement (ACK) (via the forwarding link), which may prompt control module 1208 to resume using the second RAT connection with second communication module 306*d*. In some aspects, controller 308 may expect that network access node 1106 is configured to continue monitoring the second RAT connection and may resume transmitting on the second RAT connection via second communication module 306*b*. Alternatively, in some aspects network access node 1106 and controller 308 may terminate (e.g., completely tear-down) the second RAT connection during forwarding, and may re-establish the second RAT connection, such as by performing e.g., via discovery and initial connection establishment.

In some aspects, control module 1208 may receive the forwarding deactivation instruction (via antenna system 1202 and radio system 1204) and proceed to de-activate the forwarding link. In some cases, control module 1208 may de-activate the forwarding link by changing the active flag in forwarding table 1112 for terminal device 200 to 'off' (control module 1208 may alternatively delete the forwarding entry from forwarding table 1112). Consequently, upon receipt of further data packets addressed to terminal device at a. b. c. d, control module 1208 may determine from forwarding table 1112 that no forwarding link is currently active for the destination network address a. b. c. d and may proceed to wirelessly transmit the data packets to terminal device 200 over the second RAT connection. Terminal device 200 may therefore receive the incoming second RAT data indicated in the initially-forwarded paging message over the second RAT connection at second communication module 306*b*.

As indicated above, in some aspects network access node 1106 may implement the forwarding link by re-addressing data packets that are initially addressed to the second RAT network address of terminal device 200 to be addressed to the first RAT network address. In some aspects, network access node 1106 may implement the forwarding link for a given data packet by wrapping the data packet with another wrapper (or header) that contains the first RAT network address of terminal device 200 (e.g., the forwarding network address). Network access node 1106 may then send the re-wrapped data packet to internet network 1102, which may then route the re-wrapped data packet to core network 1104 and network access node 1108 according to the wrapper specifying the first RAT network address of terminal device 200. Network access node 1108 may then complete the forwarding link by transmitting the re-wrapped data packet to terminal device 200 over the first RAT connection.

Figure 13:
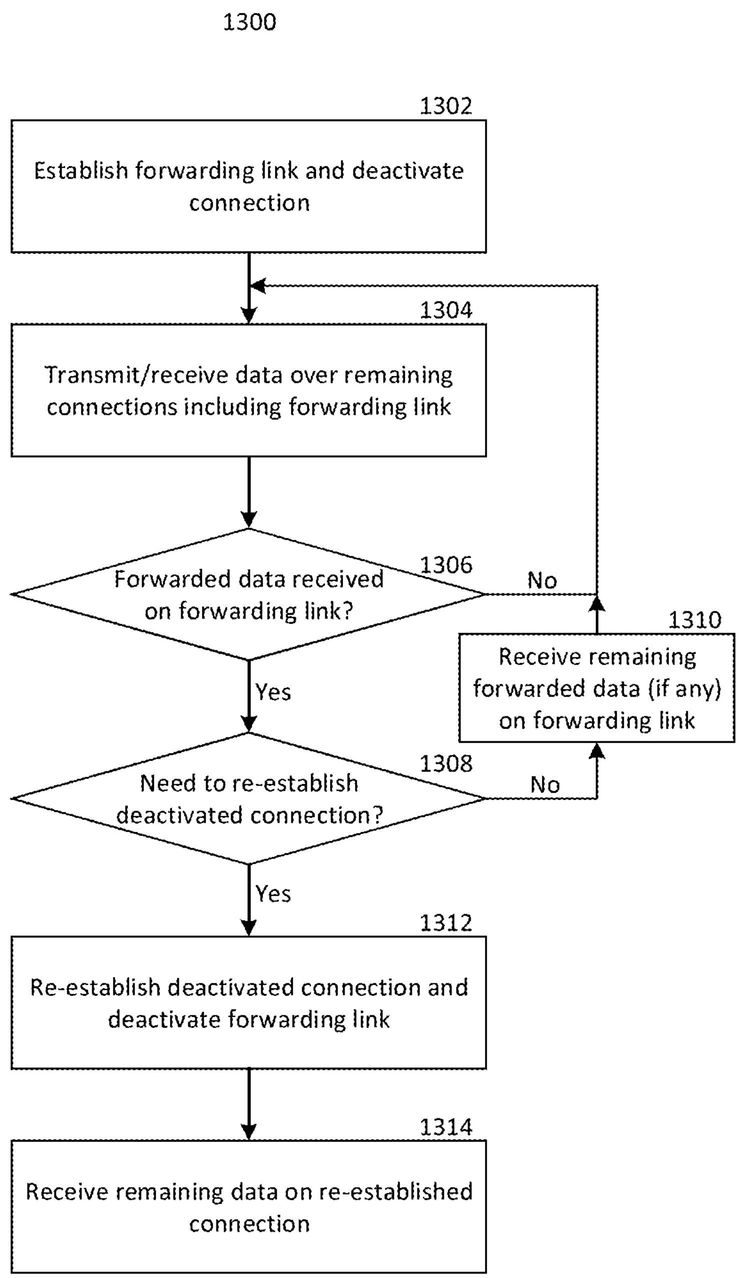
FIG. 13 shows a first exemplary method of performing radio communications in connection with a forwarding and common monitoring scheme in accordance with some aspects.

FIG. 13 outlines the forwarding and common monitoring scheme as method 1300 executed at terminal device 200 in accordance with some aspects. As shown in FIG. 13, controller 308 may first select a connection to temporarily deactivate, for example, the second RAT connection via network access node 1106, and may establish a forwarding link for all incoming data on the deactivated RAT connection in 1302. In particular, controller 308 may transmit a forwarding setup instruction to the network access node originally supporting the selected RAT connection, e.g., the 'original network access node', that specifies a forwarding network address for the original network access node to forward all future incoming data addressed to terminal device 200. Controller 308 may then deactivate the selected RAT connection, which may include deactivating associated communication components, e.g., second communication module 306*b*, which controller 308 may place in an idle, sleep, or power-off state in order to conserve power.

In some aspects, in 1304, controller 308 may then proceed to transmit and/or receive data over the remaining RAT connections including the RAT connection associated with the forwarding link, e.g., the first RAT connection with network access node 1108. Accordingly, as opposed to executing communications over the deactivated RAT connection, controller 308 may keep the communication components associated with the deactivated RAT connection in an inactive state and instead monitor for associated incoming data on the forwarding link. The original network access node may proceed to forward all incoming data addressed to terminal device 200 at the original network address to the forwarding network address specified by controller 308 in the forwarding setup instruction, which may be a network address of a remaining RAT connection of terminal device 200 that is provided by another network access node, e.g., the 'selected network access node'.

Controller 308 may thus examine data received from the selected network access node on the forwarding link in 1306 to determine whether incoming data is intended for the RAT connection associated with the forwarding link or has been forwarded after initially being addressed to terminal device 200 over the deactivated RAT connection. If all incoming data on the forwarding link is originally associated with the RAT connection associated with the forwarding link, controller 308 may continue transmitting and receiving data on the remaining RAT connections in 1304.

Alternatively, if controller 308 determines that forwarded data for the deactivated RAT connection was received on the forwarding link 1306, controller 308 may read the forwarded data to identify the contents of the forwarded data and determine what further action is appropriate. More specifically, controller 308 may determine in 1308 whether controller 308 needs to re-establish the deactivated RAT connection in order to receive further incoming data on the currently deactivated RAT connection.

In some aspects, if the forwarded data identified in 1306 is the only incoming data for the deactivated RAT connection or if the forwarded data identified in 1306 indicates that only a limited amount of further incoming data is pending for the deactivated RAT connection (e.g., a paging message that only indicates a limited amount of further incoming data), in 1308, controller 308 may decide that it is not necessary to re-establish the deactivated RAT connection and may proceed to receive any remaining forwarded data for the deactivated RAT connection from the selected network access node over the forwarding link in 1310.

Alternatively, if controller 308 decides in 1308 that the deactivated RAT connection should be re-established (e.g., in the event that the forwarded data identified in 1306 indicates a significant amount of incoming data for the deactivated RAT connection) or if the forwarded data indicates that uplink data traffic is necessary, controller 308 may proceed to 1312 to re-establish deactivated RAT connection and deactivate the forwarding link.

More specifically, controller 308 may re-connect to the original network access node that initially provided the currently deactivated RAT connection (if the network access node is still available, as further detailed below) to re-establish the deactivated RAT connection and subsequently deactivate the forwarding link by transmitting a forwarding deactivation instruction to the original network access node on the now-re-established RAT connection. Such may include re-activating the communication components associated with the re-established RAT connection, e.g., second communication module 306*b*. The original network access node may then deactivate the forwarding link by updating the forwarding table.

As the forwarding link is now deactivated, the original network access node may not forward incoming data addressed to terminal device 200 and may instead proceed to transmit the incoming data to terminal device 200 over the re-established RAT connection. Accordingly, controller 308 may receive the remaining data on the re-established RAT connection via the associated communication components in 1314.

If necessary, following conclusion of reception of the remaining data in 1314, controller 308 may in some aspects decide to establish a new forwarding link by transmitting a forwarding setup instruction to the original network access node (potentially routed through the selected network access node), thus once again deactivating the same RAT connection and allowing for deactivation of the associated communication components. Controller 308 may thus conserve power by deactivating the associated communication components and resuming the forwarding link via another RAT connection, e.g., by consolidating reception for multiple RAT connections into one.

While forwarding link activation as in 1302 may be completed via transmission of a forwarding setup instruction and subsequent registration by a network access node, re-establishment of previously deactivated RAT connections (and the associated forwarding link de-activation) as in 1312 may be complicated due to dynamic radio conditions and network mobility.

For example, while terminal device 200 may be within range of network access node 1106 in 1100 and 1110 (and thus capable of transmitting forwarding instructions to network access node 1106), terminal device 200 may move to a different geographic location after forwarding has been activated by network access node 1106. Additionally or alternatively, changing network and radio conditions may render network access node 1106 incapable of completing transmissions to terminal device 200 (or vice versa) even if terminal device 200 remains in the same geographic location.

Accordingly, in some cases controller 308 may not be able to re-establish the original RAT connection with network access node 1106. As a result, controller 308 may not be able to deactivate the forwarding link and resume communication over the original RAT. Accordingly, network access node 1106 may continue forwarding data addressed to terminal device 200 according to the forwarding link as initially established by controller 308.

If a RAT connection with the same radio access technology as the original RAT connection is desired, controller 308 may therefore discover a new network access node of the same radio access technology; for example, in the setting of FIG. 11 controller 308 may perform discovery for the second RAT in order to detect proximate network access nodes of the second RAT with which to establish a new RAT connection (e.g., to the same destination address in internet network 1102 using a new network access node).

Accordingly, controller 308 may trigger discovery at the appropriate communication module, e.g., second communication module 306*b* (or alternatively using a common discovery channel and procedure as previously detailed regarding common discovery module 306*e* in FIG. 3; such common discovery may equivalently be employed to discover network access nodes), in order to detect proximate network access nodes of the desired radio access technology. If the appropriate communication module, e.g., second communication module 306*b*, discovers a suitable network access node, controller 308 may establish a RAT connection with the selected network access node and, via the selected network access node, may hand over the deactivated RAT connection from the original network access node, e.g., network access node 1106, to the selected network access node, e.g., another network access node (not explicitly shown in FIG. 11). As the original network access node is still operating a forwarding link according to the forwarding setup instruction initially provided by controller 308, controller 308 may therefore utilize the selected network access node to route a forwarding deactivation instruction to the original network access node to instruct the original network access node to deactivate the forwarding link.

In the setting of FIG. 11, controller 308 may address the forwarding deactivation instruction to network access node 1106; consequently, the selected network access node may receive the forwarding deactivation instruction from controller 308 and route the forwarding deactivation instruction to the original network access node, e.g., via internet network 1102.

As controller 308 also needs all future data to be routed to terminal device 200 via the selected network access node, controller 308 may also arrange a connection handover in order permanently transfer the deactivated RAT connection at the original network access node to the selected network access node, thus enabling controller 308 to continue with the newly established RAT connection at the selected network access node.

Controller 308 may eventually decide to re-establish a forwarding link while connected to the selected network access node, in which case controller 308 may transmit a forwarding setup instruction to the selected network access node with a forwarding address in the same manner as previously detailed and subsequently have data associated with the RAT connection with the selected network access node be forwarded to terminal device 200 via another network access node.

While controller 308 may successfully perform discovery in certain scenarios to detect proximate network access nodes of the same radio access technology as the deactivated RAT connection, there may be other cases in which controller 308 is unable to detect any suitable network access nodes, thus leaving the forwarding link active at the original network access node without any way to re-establish a RAT connection with the same radio access technology as the deactivated RAT connection. Accordingly, controller 308 may resort to other radio access technologies.

For example, controller 308 may utilize the remaining RAT connection on which the forwarding link is active, e.g., the first RAT connection via network access node 1108 in the setting of FIG. 11, in order to deactivate the existing forwarding link at the original network access node, e.g., network access node 1106, and transfer the deactivated RAT connection to the remaining RAT connection.

More specifically, in some aspects controller 308 may utilize the remaining RAT connection to route a forwarding deactivation instruction to the original network access node; for example, in the setting of FIG. 11, controller 308 may utilize the first RAT connection with network access node 1108 to route a forwarding deactivation instruction to network access node 1106 via core network 1104 and internet network 1102. Network access node 1106 may thus receive the forwarding deactivation instruction and proceed to deactivate the forwarding link (e.g., via update of forwarding table 1112), thus terminating forwarding of data addressed to terminal device 200 to the forwarding network address originally specified by controller 308 in the initial forwarding setup instruction.

Controller 308 may also arrange transfer of the deactivated RAT connection at network access node 1106 to network access node 1108, thus ensuring that terminal device 200 continues to receive the associated data via the remaining RAT connection. As the second RAT connection is now broken, terminal device 200 may forfeit the second RAT network address and instead rely on the first RAT connection and associated first RAT network address for data transfer.

The forwarding and common monitoring scheme detailed above may not be limited to receipt of paging messages and may be particularly well-suited for forwarding and common monitoring for any sporadic and/or periodic information. Control information may thus be particularly relevant, in particular idle mode control information such as paging messages that occur relatively infrequently. However, the forwarding and common monitoring scheme may be equivalently applied for any data and/or data stream. For example, the re-addressed data packet detailed above may contain a second RAT paging message that indicates that only a small amount of incoming second data is pending transmission to terminal device 200. Accordingly, instead of re-activating the second RAT connection at second communication module 306*b* and deactivating the forwarding link with a forwarding deactivation instruction, controller 308 may instead leave the forwarding link untouched (e.g., refrain from transmitting a forwarding deactivation instruction) and thus allow network access node 1106 to continue to forward data packets to terminal device 200 by re-addressing the data packets with the forwarding network address e. f. g. h and routing the re-addressed data packets to terminal device 200 via internet network 1102, core network 1104, and network access node 1108 (e.g., the forwarding link). While excessive extraneous data traffic on the first RAT connection between network access node 1108 and terminal device 200 may lead to congestion, forwarding of reasonable amounts of data to terminal device 200 via the forwarding link may be acceptable. Accordingly, terminal device 200 may in some aspects avoid activating second communication module 306*b* to receive the incoming data and may instead receive the second RAT data via the forwarding link from network access node 1108.

Following reception of the incoming second RAT data via the forwarding link, terminal device 200 may continue to consolidate monitoring at first communication module 306*a* by leaving the forwarding link intact at network access node 1106, e.g., by refraining from transmitting a forwarding deactivation instruction. While it may be advantageous to avoid transmitting large amounts of data (such as a multimedia data stream or large files) over the forwarding link, terminal device 200 may implement forwarding for any type or size of data in the same manner as detailed above; accordingly, all such variations are within the scope of this disclosure.

Larger amounts of data such as for multimedia data streams or large files may also be manageable depending on the capacity and current traffic loads of the network access node selected to support the forwarding link; accordingly, high-capacity and/or low traffic network access nodes may be more suitable to handle larger amounts of forwarded data than other low-capacity and/or high traffic network access nodes.

The forwarding links detailed herein may be primarily utilized for downlink data; however, depending on the configuration of network access nodes, terminal device 200 can in some aspects transmit uplink data over the forwarding link. For example, if a forwarding link is active and controller 308 has uplink data to transmit on the idle RAT connection, controller 308 may decide whether to utilize the forwarding link to transmit the uplink data or to re-activate (or re-establish) the idle RAT connection. For example, if the uplink data is a limited amount of data (e.g., less than a threshold), controller 308 may transmit the uplink data via the forwarding link. If the uplink data is a larger amount of data (e.g., more than the threshold), controller 308 may re-activate (or re-establish) the idle RAT connection to transmit the uplink data. In some aspects, controller 308 may first transmit an access request message to the network access node of the idle RAT connection via the forwarding link to initiate re-establishment of the idle RAT connection.

In addition to forwarding setup and forwarding deactivation instructions, in some aspects terminal device 200 may additionally employ forwarding modification instructions. Terminal device 200 may employ such forwarding modification instructions in order to modify an existing forwarding link (either active or inactive). For example, terminal device 200 may be assigned a new first RAT network address, e.g., q. r. s. t, and may update the forwarding entry at network access node 1106 in order to ensure that future data packets are routed to the new first RAT network address. Controller 308 may therefore generate a forwarding modification instruction that identifies the new first RAT network address q. r. s. t. as the forwarding network address and transmit the forwarding modification instruction to network access node 1106 (via the second RAT connection with second communication module 306*b*).

Control module 1208 may receive the forwarding modification instruction via backhaul interface 1212 and subsequently update the entry for terminal device 200 in forwarding table 1112 to replace the old forwarding network address (e. f. g. h) with the new forwarding network address (q. r. s. t). Such forwarding modification instructions may additionally be combined with forwarding setup or forwarding deactivation instructions by including an activation or deactivation instruction in the forwarding modification instruction that prompts control module 1208 to set the active forwarding flag in forwarding table 1112.

The exemplary scenarios 1100 and 1110 detailed above may be employed for any type of radio access technology. For example, in some aspects the first RAT may be e.g., LTE and the second RAT may be e.g., Wi-Fi, where network access node 1108 may be an LTE eNodeB and network access node 1106 may be a Wi-Fi AP. In some aspects, the first RAT may be Wi-Fi and the second RAT may be LTE, where network access node 1108 may be a Wi-Fi AP and network access node 1106 may be an LTE eNodeB. In some aspects, the first or second RAT may be Wi-Fi and the other of the first or second RAT may be Bluetooth. Any radio access technology may be utilized without departing from the scope of this disclosure.

In various aspects, terminal device 200 may therefore rely on cooperation via various network access nodes in order to execute the forwarding and common monitoring scheme. In some aspects, the forwarding network access node (network access node 1106 or network access node 1108) may implement the forwarding procedure without manipulation of the underlying radio access protocols. Such may rely on the fact that incoming data may be forwarded to the same destination device via another network address assigned to the destination device. In other words, the standardized protocols, e.g., Wi-Fi, LTE, etc., in the specific examples, may not be modified in order to support the forwarding scheme as only the local configuration of the network access node may be modified to include the forwarding structure.

As cooperation by the network access nodes may be important, the ability of terminal device 200 to implement the forwarding and common monitoring scheme may depend on whether the associated network access nodes support the forwarding system. Accordingly, if only one of network access node 1106 or network access node 1108 supports forwarding, in some aspects terminal device 200 may only be able to forward data traffic associated with the forwarding-capable network access node to the non-forwarding-capable network access node (and not vice versa). Regardless, only one of the network access nodes may be compatible in order to allow terminal device 200 to utilize the forwarding and common monitoring scheme.

However, if multiple network access nodes support forwarding, e.g., if both network access node 1106 and network access node 1108 support forwarding, terminal device 200 may be able to select which of the RAT connections to temporarily disconnect and which to support the forwarding link. As previously detailed, the forwarding and common monitoring scheme may offer power consumption advantages as terminal device 200 may be able to temporarily deactivate one or more communication modules and have all associated data packets forwarded to other active communication modules, thus consolidating incoming data packet monitoring to the active communication modules. Applications where terminal device 200 has active RAT connections to two or more network access nodes that each are forwarding-capable may therefore be particularly advantageous if one RAT connection is more power-intensive than the other as terminal device 200 may be able to temporarily disconnect the power-intensive RAT connection and forward all associated data to the other RAT connection.

For example, if the second RAT connection over second communication module 306*b* requires less power consumption than the first RAT connection over first communication module 306*a*, controller 308 may elect to initiate first RAT-to-second RAT forwarding and thus transmit a forwarding setup instruction to network access node 1108 that specifies the second RAT network address of terminal device 200 as the destination network address.

In some aspects, controller 308 may consider factors instead of or in addition to power consumption in deciding which RAT connection to disconnect and which to support the forwarding link (which may only be viable in scenarios where multiple RAT connections are provided by forwarding-capable network access nodes). For example, controller 308 may consider which RAT connections are most 'active', e.g., which RAT connections are receiving the heaviest data traffic, and/or which RAT connections are most likely to receive data such as, for example, paging messages. As previously introduced, common monitoring may be particularly advantageous for idle-mode monitoring for messages such as paging messages and other control information (although all data is considered applicable). As each RAT connection of terminal device 200 may operate separately and may utilize different scheduling and formatting parameters, the various RAT connections may have different traffic loads at any given time.

For example, each RAT connection may be in an active or idle state (where radio access technologies may also have other activity states), where active RAT connections may be allocated dedicated radio resources and idle RAT connections may not have any dedicated radio resources allocated. Active RAT connections may thus have a large amount of data traffic (e.g., downlink and uplink control and user data) while idle RAT connections may have a minimal amount of data traffic (e.g., limited to paging messages).

Due to the relatively heavy data traffic of active RAT connections compared to idle RAT connections, controller 308 may elect to consolidate data traffic for idle RAT connections onto the active RAT connection by establishing a forwarding link at the network access node for the idle RAT connection that forwards data to the active RAT connection. As such may require the active RAT connection to transmit both the forwarded data and the existing data of the active RAT connection, the forwarded data traffic may be light enough that the active RAT connection does not become overloaded.

For example, the idle RAT connection may only provide paging messages over the forwarding link to the active RAT, which may be relatively infrequent and only contain a small amount of data; accordingly, it may be unlikely that forwarding links will become overloaded. Conversely, if controller 308 elects to consolidate e.g., a video stream from an active RAT connection onto another active RAT connection, the latter RAT connection may become overloaded (although such may depend on the capacity and current traffic scenario of the network access node tasked with forwarding).

Controller 308 may therefore be configured to select which RAT connections to temporarily disconnect and which RAT connection to activate as a forwarding link based on data traffic loads. Controller 308 may additionally consider which RAT connection is most likely to receive incoming data; for example, a given RAT connection may generally receive incoming data such as, for example, paging messages more frequently than another RAT connection, which may be due to the underlying access protocols and/or the current status of the RAT connection. Controller 308 may thus identify which RAT connection is more likely to receive incoming data and which RAT connection is less likely to receive incoming data and subsequently assign the 'more likely' RAT connection as a forwarding link for the 'less likely' RAT connection.

Controller 308 may additionally or alternatively be configured to consider the coverage range of the network access nodes associated with each RAT connection in selecting which RAT connection to disconnect and which to use for the forwarding link. For example, cellular network access nodes (e.g., base stations) may generally have a substantially larger coverage area than short-range network access nodes (e.g., WLAN APs, Bluetooth master devices, etc.), where similar comparisons may generally be established for various radio access technologies.

As the RAT connection associated with the larger coverage area will support a larger range of mobility of terminal device 200, controller 308 may elect to temporarily disconnect the RAT connection with the shorter range (e.g., by transmitting a forwarding setup instruction to the network access node providing the RAT connection with the shorter range) and thus utilize the RAT connection with the greater range as the forwarding link. In the exemplary setting of FIG. 11, controller 308 may therefore select to temporarily disconnect the second RAT connection provided by network access node 1106 and thus utilize the first RAT connection via network access node 1108 as the forwarding link.

Not only may cellular network access nodes provide a larger coverage area than short-range network access nodes, many cellular radio access networks may collectively provide more consistent coverage over large geographic areas. For example, Wi-Fi network access nodes that are available to terminal device 200 (e.g., that terminal device 200 has permission or credentials to connect to) may only be sporadically available on a geographic basis, e.g., such as in a home, office, or certain other public or private locations, and may generally not form a continuous geographic region of availability. Accordingly, if terminal device 200 moves outside of the coverage area of e.g., network access node 1106, terminal device 200 may not have any available Wi-Fi network access nodes to connect to. Consequently, if terminal device 200 selects to use a Wi-Fi connection as a forwarding link and later moves out of the coverage of the associated Wi-Fi network access node, terminal device 200 may not be able to continue to use the Wi-Fi connection as a forwarding link.

However, cellular radio access networks may generally have a largely continuous coverage area collectively formed by each cell, thus providing that terminal device 200 will have another cellular network access node available even if terminal device 200 moves outside of the coverage area of network access node 1108. Accordingly, controller 308 may additionally or alternatively also consider which underlying radio access network provides more continuous coverage, where cellular radio access networks and other long-range radio access networks are generally considered to provide more continuous coverage than short-range radio access network such as Wi-Fi and Bluetooth.

Additionally or alternatively, in some aspects controller 308 may consider the delay and/or latency demands of one or more RAT connections. For example, certain data streams such as voice and other multimedia streaming may have strict delay and latency demands, e.g., may not be able to tolerate large amounts of delay/latency. Accordingly, if one of the RAT connections have strict delay/latency demands, controller 308 may elect to temporarily disconnect another RAT connection and continue to utilize the RAT connection with strict delay/latency demands as the forwarding link as such may preserve the ability of the strict RAT connection to continue to seamlessly receive the underlying data.

Additionally or alternatively, in some aspects controller 308 may consider the security requirements of one or more RAT connections. For example, certain data streams may have high priority security requirements and thus may be transferred only over secure links. Accordingly, if, for example, one of the RAT connections has very strict security requirements, controller 308 may elect to temporarily disconnect another RAT connection and continue to utilize the RAT connection with strict security requirements as the forwarding link.

Controller 308 may thus be configured to utilize any one or combination of these factors in selecting which RAT connection to use as a forwarding link and which RAT connection to temporarily disconnect (e.g., which to consolidate onto the forward link).

Controller 308 may additionally or alternatively be configured to adapt or switch the forwarding link based on the changing statuses of the RAT connections. For example, in an exemplary scenario of FIG. 11 where controller 308 consolidates Wi-Fi traffic onto the LTE connection via a forwarding link, the Wi-Fi connection may initially be in an idle state while the LTE connection may initially be in an active state. However, upon receipt of a forwarded Wi-Fi data packet or network management message over the LTE connection, controller 308 may activate second communication module 306*b* in order to receive the incoming Wi-Fi data. As the Wi-Fi connection has therefore transitioned from idle to active and the LTE connection remains active, controller 308 may not implement any forwarding; however, if the LTE connection eventually transitions to idle, controller 308 may consolidate the LTE connection onto the Wi-Fi connection by transmitting a forwarding setup instruction to network access node 1108 that instructs network access node 1108 to forward incoming LTE data packets to the Wi-Fi network address of terminal device 200.

Likewise, if both the LTE and the Wi-Fi connections are initially idle, controller 308 may select to consolidate data traffic from one RAT connection onto the other via a forwarding link and proceed to only monitor for data traffic on the remaining active RAT connection, for example, by establishing a forwarding link at network access node 1108 that re-routes LTE data packets addressed to terminal device 200 to the Wi-Fi connection.

If controller 308 then receives a forwarded LTE data packet from network access node 1106 over the Wi-Fi connection that contains an LTE paging message, controller 308 may subsequently activate first communication module 306*a* to support the now-active LTE connection and 'switch' the forwarding link by de-activating the existing forwarding link at network access node 1108 (via a forwarding deactivation instruction) establish a new forwarding link at network access node 1106 (via a forwarding setup instruction) that forwards Wi-Fi data traffic for the still-idle Wi-Fi connection to the now-active LTE connection. All such variations are thus within the scope of this disclosure.

While the forwarding links detailed above have been described as being explicitly activated and de-activated with forwarding setup and deactivation instructions, respectively, in some aspects controller 308 may establish a forwarding link with an expiry period after which the forwarding network access node may terminate the forwarding link. For example, controller 308 may decide to establish a forwarding link for a certain time period, e.g., defined in the order of milliseconds, seconds, minutes, hours, etc., and accordingly may explicitly identify an expiry period in a forwarding setup instruction provided to a network access node, e.g., network access node 1106. Upon receipt and identification of the forwarding setup instruction, control module 1208 may register the forwarding link as a forwarding entry in forwarding table 1112 and additionally trigger an associated timer with an expiry time equal to the expiry period specified in the forwarding setup instruction. Control module 1208 may then forward all data packets addressed to terminal device 200 according to the registered forwarding link until the timer expires, after which control module 1208 may unilaterally deactivate the forwarding link (e.g., by setting the active flag to 'off' or deleting the forwarding entry from forwarding table 1112) and refrain from re-routing any further data packets addressed to terminal device 200 (until e.g., another forwarding setup message is received).

The RAT connections involved in the forwarding and common monitoring scheme detailed above may also be part of a multi-SIM scheme where e.g., some RAT connections are associated with a first SIM and other RAT connections are associated with a second SIM.

Figure 14:
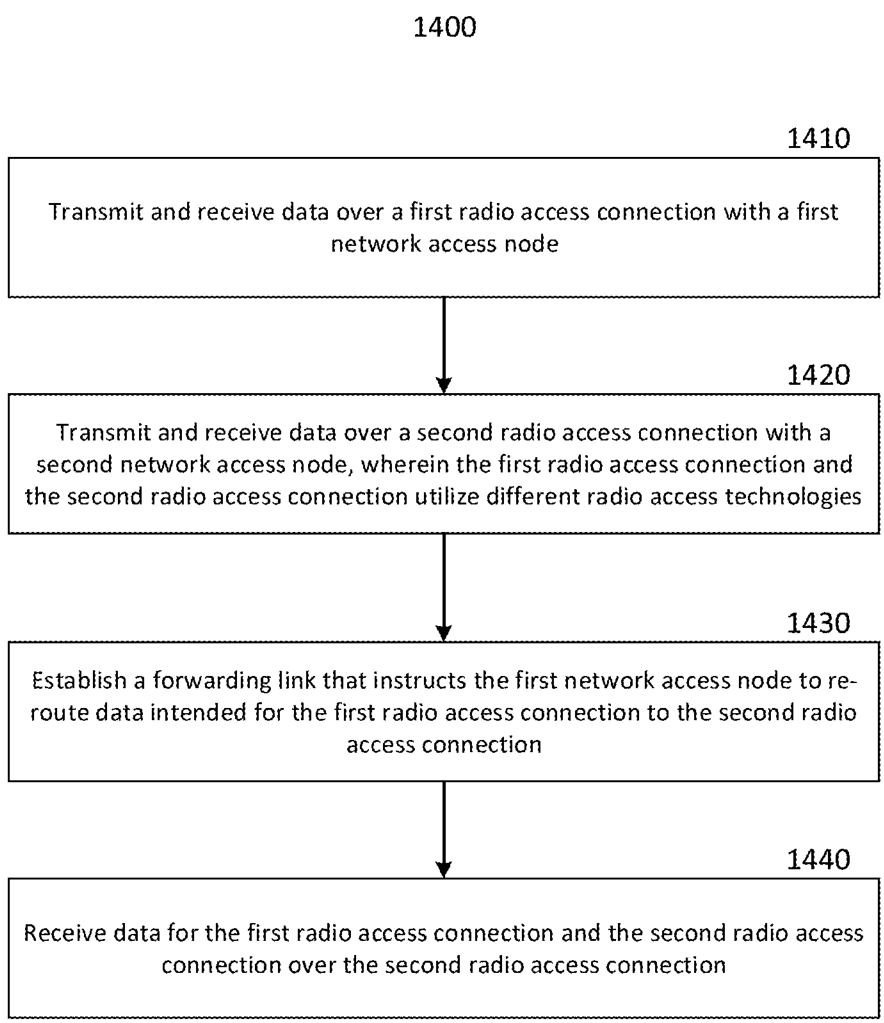
FIG. 14 shows a second exemplary method of performing radio communications in connection with a forwarding and common monitoring scheme in accordance with some aspects.

FIG. 14 shows method 1400 of performing radio communications in connection with the forwarding and common monitoring scheme detailed above. As shown in FIG. 14, method 1400 includes transmitting and receiving data over a first radio access connection with a first network access node (1410), transmitting and receiving data over a second radio access connection with a second network access node (1420), wherein the first radio access connection and the second radio access connection utilize different radio access technologies, establishing a forwarding link that instructs the first network access node to re-route data intended for the first radio access connection to the second radio access connection (1430), and receiving data for the first radio access connection and the second radio access connection over the second radio access connection (1440).

In one or more further exemplary aspects of the disclosure, one or more of the features described above in reference to FIGS. 11-13 may be further incorporated into method 1400. In particular, method 1400 may be configured to perform further and/or alternate processes as detailed regarding terminal device 200.

2 Power-Efficiency

Power management may be an important consideration for both network access nodes and terminal devices in radio communication networks. For example, terminal devices may need to employ power-efficient designs to reduce battery drain and increase operation time while network access nodes may strive for power efficiency in order to reduce operating costs. Power-efficient designs and features may therefore be exceedingly valuable.

Figure 15:
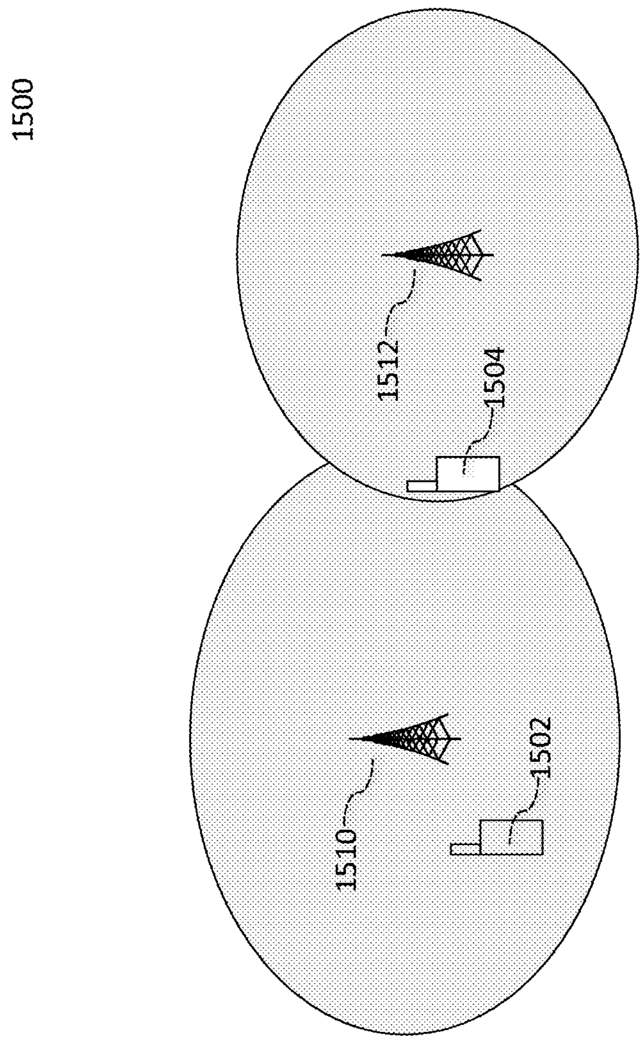
FIG. 15 shows an exemplary radio communication network in accordance with some aspects.

FIG. 15 shows radio communication network 1500 in accordance with some aspects, which may include terminal devices 1502 and 1504 in addition to network access nodes 1510 and 1512. Although certain aspects of this disclosure may describe certain radio communication network setting (such as e.g., an LTE, UMTS, GSM, other $3^{rd}$ Generation Partnership Project (3GPP) networks, WLAN/Wi-Fi, Bluetooth, 5G, mmWave, etc.), the subject matter detailed herein is considered demonstrative in nature and may therefore be analogously applied to any other radio communication network. The number of network access nodes and terminal devices in radio communication network 1500 is exemplary and is scalable to any amount.

Accordingly, in an exemplary cellular setting network access nodes 1510 and 1512 may be base stations (e.g., eNodeBs, NodeBs, Base Transceiver Stations (BTSs), etc.) while terminal devices 1502 and 1504 may be cellular terminal devices (e.g., Mobile Stations (MSs), User Equipments (UEs), etc.). Network access nodes 1510 and 1512 may therefore interface (e.g., via backhaul interfaces) with a cellular core network such as an Evolved Packet Core (EPC, for LTE), Core Network (CN, for UMTS), or other cellular core network, which may also be considered part of radio communication network 1500. The cellular core network may interface with one or more external data networks. In an exemplary short-range setting, network access node 1510 and 1512 may be access points (APs, e.g., WLAN or Wi-Fi APs) while terminal device 1502 and 1504 may be short range terminal devices (e.g., stations (STAs)). Network access nodes 1510 and 1512 may interface (e.g., via an internal or external router) with one or more external data networks.

Network access nodes 1510 and 1512 (and other network access nodes of radio communication network 1500 not explicitly shown in FIG. 15) may accordingly provide a radio access network to terminal devices 1502 and 1504 (and other terminal devices of radio communication network 1500 not explicitly shown in FIG. 15). In an exemplary cellular setting, the radio access network provided by network access nodes 1510 and 1512 may enable terminal devices 1502 and 1504 to wirelessly access the core network via radio communications. The core network may provide switching, routing, and transmission of traffic data related to terminal devices 1502 and 1504 and may provide access to various internal (e.g., control nodes, other terminal devices on radio communication network 1500, etc.) and external data networks (e.g., data networks providing voice, text, multimedia (audio, video, image), and other Internet and application data). In an exemplary short-range setting, the radio access network provided by network access nodes 1510 and 1512 may provide access to internal (e.g., other terminal devices connected to radio communication network 1500) and external data networks (e.g., data networks providing voice, text, multimedia (audio, video, image), and other Internet and application data). Network access nodes 1510 and 1512 may be network access nodes for any other type of radio access technology and analogously provide a radio access network to proximate terminal devices in this manner.

The radio access network and core network (if applicable) of radio communication network 1500 may be governed by network protocols that may vary depending on the specifics of radio communication network 1500. Such network protocols may define the scheduling, formatting, and routing of both user and control data traffic through radio communication network 1500, which includes the transmission and reception of such data through both the radio access and core network domains of radio communication network 1500. Accordingly, terminal devices 1502 and 1504 and network access nodes 1510 and 1512 may follow the defined network protocols to transmit and receive data over the radio access network domain of radio communication network 1500 while the core network may follow the defined network protocols to route data within and outside of the core network. Exemplary network protocols include LTE, UMTS, GSM, WiMAX, Bluetooth, Wi-Fi, mmWave, etc., any of which may be applicable to radio communication network 1500.

Both the radio access network and core network of radio communication network 1500 may be governed by network protocols that may vary depending on the specifics of radio communication network 1500. Such network protocols may define the scheduling, formatting, and routing of both user and control data traffic through radio communication network 1500, which includes the transmission and reception of such data through both the radio access and core network domains of radio communication network 1500. Accordingly, terminal devices 1502 and 1504 and network access nodes 1510 and 1512 may follow the defined network protocols to transmit and receive data over the radio access network domain of radio communication network 1500 while the core network may follow the defined network protocols to route data within and outside of the core network. Exemplary network protocols include LTE, UMTS, GSM, WiMax, Bluetooth, Wi-Fi, etc., or other 2G, 3G, 4G, 5G, next generation like 6G, etc. technologies either already developed or to be developed, any of which may be applicable to radio communication network 1500.

Figure 16:
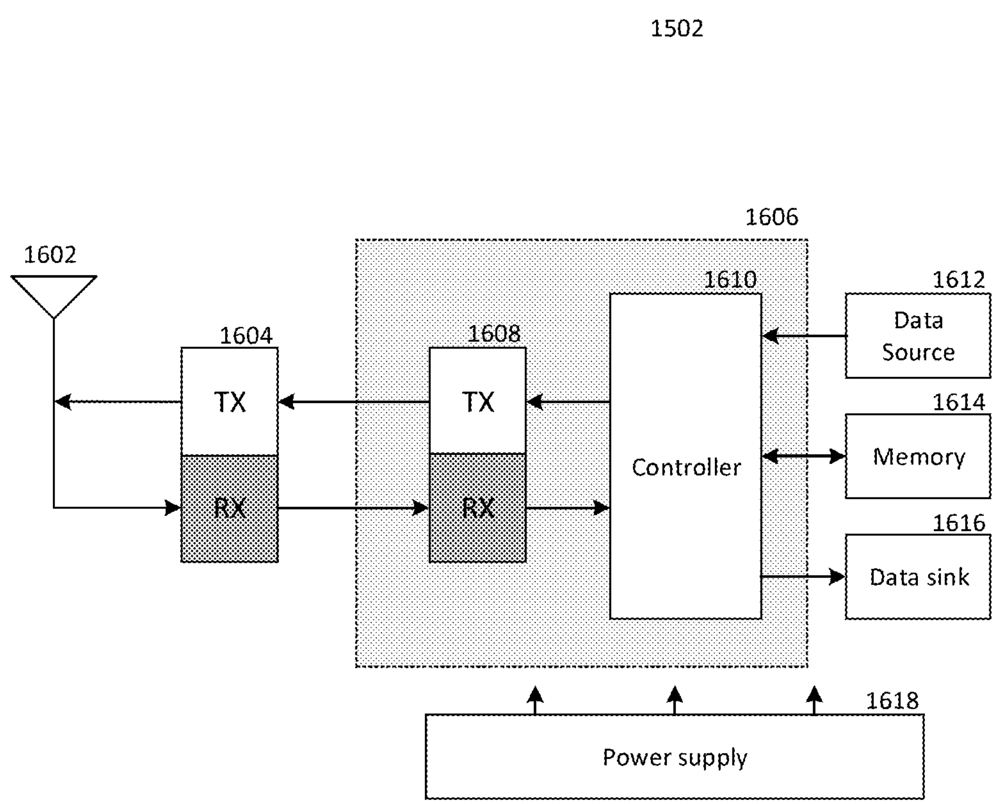
FIG. 16 shows an exemplary internal configuration of a terminal device in accordance with some aspects.

FIG. 16 shows an internal configuration of terminal device 1502, which may include antenna system 1602, radio frequency (RF) transceiver 1604, baseband modem 1606 (including physical layer processing module 1608 and controller 1610), data source 1612, memory 1614, data sink 1616, and power supply 1618. Although not explicitly shown in FIG. 16, terminal device 1502 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identity module(s) (SIMs), user input/output devices (display(s), keypad(s), touchscreen(s), speaker(s), external button(s), camera(s), microphone(s), etc.), etc.

Terminal device 1502 may transmit and receive radio signals on one or more radio access networks. Baseband modem 1606 may direct such communication functionality of terminal device 1502 according to the communication protocols associated with each radio access network, and may execute control over antenna system 1602 and RF transceiver 1604 in order to transmit and receive radio signals according to the formatting and scheduling parameters defined by each communication protocol. Although various practical designs may include separate communication subsystems for each supported radio access technology (e.g., a separate antenna, RF transceiver, physical layer processing module, and controller), for purposes of conciseness the configuration of terminal device 1502 shown in FIG. 16 depicts only a single instance of each such components.

Terminal device 1502 may transmit and receive radio signals with antenna system 1602, which may be a single antenna or an antenna array including multiple antennas and may additionally include analog antenna combination and/or beamforming circuitry. In the receive path (RX), RF transceiver 1604 may receive analog radio frequency signals from antenna system 1602 and perform analog and digital RF front-end processing on the analog radio frequency signals to produce digital baseband samples (e.g., In-Phase/Quadrature (IQ) samples) to provide to baseband modem 206. RF transceiver 1604 may accordingly include analog and digital reception components including amplifiers (e.g., a Low Noise Amplifier (LNA)), filters, RF demodulators (e.g., an RF IQ demodulator)), and analog-to-digital converters (ADCs) to convert the received radio frequency signals to digital baseband samples. In the transmit path (TX), RF transceiver 1604 may receive digital baseband samples from baseband modem 1606 and perform analog and digital RF front-end processing on the digital baseband samples to produce analog radio frequency signals to provide to antenna system 1602 for wireless transmission. RF transceiver 1604 may thus include analog and digital transmission components including amplifiers (e.g., a Power Amplifier (PA), filters, RF modulators (e.g., an RF IQ modulator), and digital-to-analog converters (DACs) to mix the digital baseband samples received from baseband modem 1606 to produce the analog radio frequency signals for wireless transmission by antenna system 1602. Baseband modem 1606 may control the RF transmission and reception of RF transceiver 1604, including specifying the transmit and receive radio frequencies for operation of RF transceiver 1604.

As shown in FIG. 16, baseband modem 1606 may include physical layer processing module 1608, which may perform physical layer (Layer 1) transmission and reception processing to prepare outgoing transmit data provided by controller 1610 for transmission via RF transceiver 1604 and prepare incoming received data provided by RF transceiver 1604 for processing by controller 1610. Physical layer processing module 3488 may accordingly perform one or more of error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Physical layer processing module 1608 may be structurally realized as a hardware-defined module, e.g., as one or more dedicated hardware circuits or FPGAs, as a software-defined module, e.g., as a processor configured to retrieve and execute program code defining arithmetic, control, and I/O instructions (e.g., software and/or firmware) stored in a non-transitory computer-readable storage medium, or as a mixed hardware-defined and software-defined module. Although not explicitly shown in FIG. 16, physical layer processing module 1608 may include a physical layer controller configured to retrieve and execute software-defined instructions that control the various hardware and software processing components of physical layer processing module 1608 in accordance with physical layer control logic defined by the communications protocol for the relevant radio access technologies. Furthermore, while physical layer processing module 1608 is depicted as a single component in FIG. 16, in some aspects physical layer processing module 1608 may be collectively implemented as separate sections of physical layer processing components where each respective section is dedicated to the physical layer processing of a particular radio access technology.

Terminal device 1502 may be configured to operate according to one or more radio access technologies, which may be directed by controller 1610. Controller 1610 may thus be responsible for controlling the radio communication components of terminal device 1502 (antenna system 1602, RF transceiver 1604, and physical layer processing module 1608) in accordance with the communication protocols of each supported radio access technology, and accordingly may represent the Access Stratum and Non-Access Stratum (NAS) (also encompassing Layer 2 and Layer 3) of each supported radio access technology. In some aspects, controller 1610 may be structurally embodied as a protocol processor configured to execute protocol software (e.g., from memory 1614 or a local controller or modem memory) and subsequently control the radio communication components of terminal device 1502 in order to transmit and receive communication signals in accordance with the corresponding protocol control logic defined in the protocol software.

Controller 1610 may therefore be configured to manage the radio communication functionality of terminal device 1502 in order to communicate with the various radio and core network components of radio communication network 1500, and accordingly may be configured according to the communication protocols for multiple radio access technologies. Controller 1610 may either be a unified controller that is collectively responsible for all supported radio access technologies (e.g., LTE and GSM/UMTS) or may be implemented as multiple separate controllers where each controller is a dedicated controller for a particular radio access technology, such as a dedicated LTE controller and a dedicated legacy controller (or alternatively a dedicated LTE controller, dedicated GSM controller, and a dedicated UMTS controller). Regardless, controller 1610 may be responsible for directing radio communication activity of terminal device 1502 according to the communication protocols of the LTE and legacy networks. As previously noted regarding physical layer processing module 1608, one or both of antenna system 1602 and RF transceiver 1604 may similarly be partitioned into multiple dedicated components that each respectively correspond to one or more of the supported radio access technologies. Depending on the specifics of each such configuration and the number of supported radio access technologies, controller 1610 may be configured to control the radio communication operations of terminal device 1502 in accordance with a master/slave Radio Access Technology (RAT) hierarchical or multi-Subscriber Identify Module (SIM) scheme.

Terminal device 1502 may also include data source 1612, memory 1614, data sink 1616, and power supply 1618, where data source 1612 may include sources of communication data above controller 1610 (e.g., above the NAS/Layer 3) and data sink 1616 may include destinations of communication data above controller 1610 (e.g., above the NAS/Layer 3). Such may include, for example, an application processor of terminal device 1502, which may be configured to execute various applications and/or programs of terminal device 1502 at an application layer of terminal device 1502, such as an Operating System (OS), a User Interface (UI) for supporting user interaction with terminal device 1502, and/or various user applications. The application processor may interface with baseband modem 1606 (as data source 1612/data sink 1616) as an application layer to transmit and receive user data such as voice data, audio/video/image data, messaging data, application data, basic Internet/web access data, etc., over radio network connection(s) provided by baseband modem 1606. In the uplink direction, the application layers (data sink 1616) can provide data (e.g., Voice Over IP (VoIP) packets, UDP packets, etc.) to baseband modem 1606, which may then encode, modulate, and transmit the data as radio signals via radio transceiver 1604 and antenna system 1602. In the downlink direction, baseband modem 1606 may demodulate and decode IQ samples provided by RF transceiver 1604 to generate downlink traffic. Baseband modem 1606 may then provide the downlink traffic to the application layers as data source 1612. Data source 1612 and data sink 1616 may additionally represent various user input/output devices of terminal device 1502, such as display(s), keypad(s), touchscreen(s), speaker(s), external button(s), camera(s), microphone(s), etc., which may allow a user of terminal device 1502 to control various communication functions of terminal device 1502 associated with user data.

Memory 1614 may embody a memory component of terminal device 1502, such as a hard drive or another such permanent memory device. Although not explicitly depicted in FIG. 16, in some aspects the various other components of terminal device 1502 shown in FIG. 16 may additionally each include integrated permanent and non-permanent memory components, such as for storing software program code, buffering data, etc.

Power supply 1618 may be an electrical power source that provides power to the various electrical components of terminal device 1502. Depending on the design of terminal device 1502, power supply 1618 may be a 'definite' power source such as a battery (rechargeable or disposable) or an 'indefinite' power source such as a wired electrical connection. Operation of the various components of terminal device 1502 may thus pull electrical power from power supply 1618.

Terminal devices such as terminal devices 1502 and 1504 of FIG. 15 may execute mobility procedures to connect to, disconnect from, and switch between available network access nodes of the radio access network of radio communication network 1500. As each network access node of radio communication network 1500 may have a specific coverage area, terminal devices 1502 and 1504 may be configured to select and re-select between the available network access nodes in order to maintain a strong radio access connection with the radio access network of radio communication network 1500. For example, terminal device 1502 may establish a radio access connection with network access node 1510 while terminal device 1504 may establish a radio access connection with network access node 1512. In the event that the current radio access connection degrades, terminal devices 1502 or 1504 may seek a new radio access connection with another network access node of radio communication network 1500; for example, terminal device 1504 may move from the coverage area of network access node 1512 into the coverage area of network access node 1510. As a result, the radio access connection with network access node 1512 may degrade, which terminal device 1504 may detect via radio measurements such as signal strength or signal quality measurements of network access node 1512. Depending on the mobility procedures defined in the appropriate network protocols for radio communication network 1500, terminal device 1504 may seek a new radio access connection (which may be triggered at terminal device 1504 or by the radio access network), such as by performing radio measurements on neighboring network access nodes to determine whether any neighboring network access nodes can provide a suitable radio access connection. As terminal device 1504 may have moved into the coverage area of network access node 1510, terminal device 1504 may identify network access node 1510 (which may be selected by terminal device 1504 or selected by the radio access network) and transfer to a new radio access connection with network access node 1510. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

The various network activities of terminal devices 1502 and 1504 and network access nodes 1510 and 1512 may necessarily consume power, such as in the transmission, reception, and processing of radio signals. Furthermore, power consumption may not be limited to exclusively network activities as many terminal devices may serve other purposes other than radio communications, such as in the case of e.g., smartphones, laptops, and other user-interactive devices. While terminal devices may generally be low-power devices, many terminal devices may additionally be mobile or portable and may thus need to rely on 'finite' battery power. Conversely, network access nodes such as cellular base stations and WLAN APs may generally (although not exclusively) have 'unlimited' wired power supplies; however, the high-transmission power and infrastructure support demands may expend considerable power and thus may lead to high operating costs. Accordingly, power-efficient designs may play a vital role in prolonging battery life at terminal devices and reducing operating costs at network access nodes.

Aspects disclosed herein may improve power-efficiency in radio access networks. Such aspects may be realized through efficient operational and structural design at terminal devices and network access nodes in order to reduce power consumption, thus prolonging battery life and reducing operating costs.

2.1 Power-Efficiency #1

According to an aspect of the disclosure, a radio access network may provide multiple different options of radio access channels for terminal devices; for example, as opposed to providing only a single paging, control, traffic data, or random access channel, a radio access network may provide multiple paging/control/random access channels, or multiple 'channel instances', that are each tailored to different needs, e.g., to a different power consumption level (e.g., power efficiency) need. Accordingly, terminal devices may be able to selectively choose which channel instances to utilize based on a desired power efficiency, e.g., where some terminal devices low-power consumption channels (that may offer higher power efficiency at the cost of performance) while other terminal devices may opt for 'normal' power consumption channels. In addition to power efficiency, terminal devices may also consider latency and reliability requirements when selecting channel instances. Some aspects may be applied with control, paging, and/or random access channels, where multiple of each may be provided that are each tailored for different power-efficiency, reliability, and latency characteristics. These aspects can be used with common channel aspects, e.g., a common channel tailored to specific power efficiency needs.

Network access nodes and terminal devices may transmit and receive data on certain time-frequency physical channels where each channel may be composed of specific frequency resources (e.g., bands or subcarriers) and defined for specific time periods. The time-frequency resources and data contents of such physical channels may be defined by the associated network access protocols, where e.g., an LTE framework may specify certain time-frequency resources for physical channels that are particular to LTE, a UMTS framework may specify certain time-frequency resources for physical channels that are particular to UMTS, etc. Physical channels may conventionally be allocated as either uplink or downlink channels, where terminal devices may utilize uplink channels to transmit uplink data while network access nodes may utilize downlink channels to transmit downlink data. Physical channels may be further assigned to carry specific types of data, such as specific channels exclusively designated to carry user data traffic and other channels designated to carry certain types of control data.

In various aspects, physical channels may be specific sets of time and/or frequency resources. For example, in some aspects a physical channel may be constantly allocated to a dedicated set of frequency resources, such as a subcarrier (or set of subcarriers) that only carries control data in the exemplary setting of a control channel. Additionally or alternatively, in some aspects a physical channel may be allocated time-frequency resources that vary over time, such as where a physical channel is allocated a varying set of time-frequency resources (e.g., subcarriers and time periods). For example, a paging channel may occupy different time periods and/or subcarriers over time. Accordingly, a physical channel is not limited to a fixed set of time-frequency resources.

The allocation of time-frequency resources for physical channels can depend on the corresponding radio access technology. While LTE will be used to describe the allocation of time-frequency resources for physical channels, this explanation is demonstrative and can be applied without limitation to other radio access technologies. The allocation of time-frequency resources for LTE radio access channels is defined by the 3GPP in 3GPP Technical Specification (TS) 36.211 V13.1.0, "Physical Channels and modulation" ("3GPP TS 36.211"). As detailed in 3GPP TS 36.211, LTE downlink discretizes the system bandwidth over time and frequency using a multi-subcarrier frequency scheme where the system bandwidth is divided into a set of subcarriers that may each carry a symbol during a single symbol period. In time, LTE downlink (for Frequency Division Duplexing (FDD)) utilizes 10 ms radio frames, where each radio frame is divided into 10 subframes each of 1 ms duration. Each subframe is further divided into two slots that each contain 6 or 7 symbol periods depending on the Cyclic Prefix (CP) length. In frequency, LTE downlink utilizes a set of evenly-spaced subcarriers each separated by 15 kHz, where each block of 12 subcarriers over 1 slot is designated as a Resource Block (RB). The base time-frequency resource may thus be a single subcarrier over a single symbol period, defined by the 3GPP as a Resource Element (RE) where each RB thus contains 180 REs.

Figure 17:
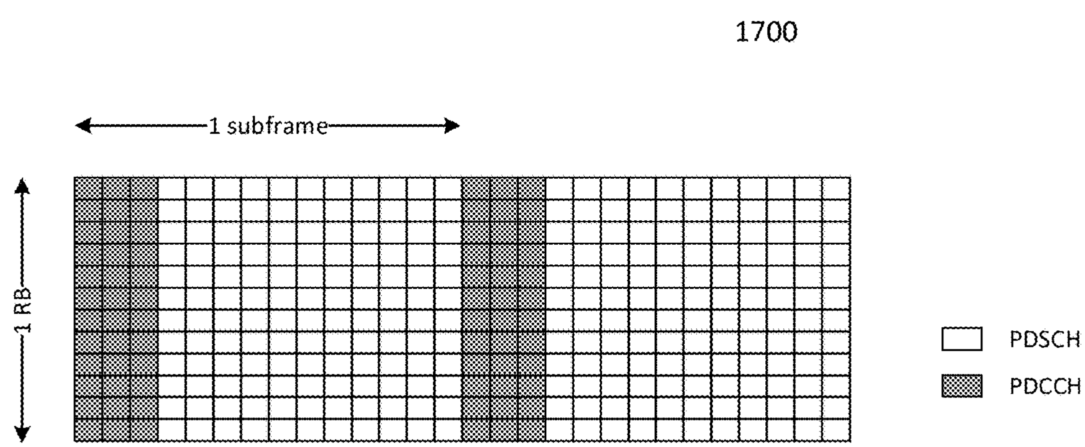
FIG. 17 shows a first exemplary time-frequency resource grid for radio communications in accordance with some aspects.

FIG. 17 depicts exemplary downlink resource grid 1700 in accordance with some aspects, which may be an LTE resource grid showing over two subframes and 1 resource block of subcarriers. Each unit block of downlink resource grid 1700 may represent one RE, e.g., one symbol period for one subcarrier, for a normal CP length. As specified by the 3GPP, downlink subframes may generally be divided into a control and data region, where the first several symbols are allocated for control data in the control region and the remaining symbol are allocated for user data traffic in the data region. Depending on the system bandwidth and control format, each subframe may contain between one and three control symbols at the beginning of each subframe (as indicated by a Control Format Indicator (CFI) provided on the Physical CFI Channel (PCFICH) which appears on certain REs in first symbol of each subframe).

FIG. 17 depicts the control region as containing Physical Downlink Control Channel (PDCCH) data. While the data region may generally contain Physical Downlink Shared Channel (PDSCH) data, REs in both regions may be allocated to other physical channels such as Physical Broadcast Channel (PBCH), Physical Hybrid Automatic Repeat Request (HARQ) Indicator Channel (PHICH), Physical Multicast Channel (PMCH), and the aforementioned PCFICH as detailed in 3GPP TS 36.211. Accordingly, each LTE physical downlink channel may be composed of specific REs (time-frequency resources) that carry data unique to that channel.

Figure 18:
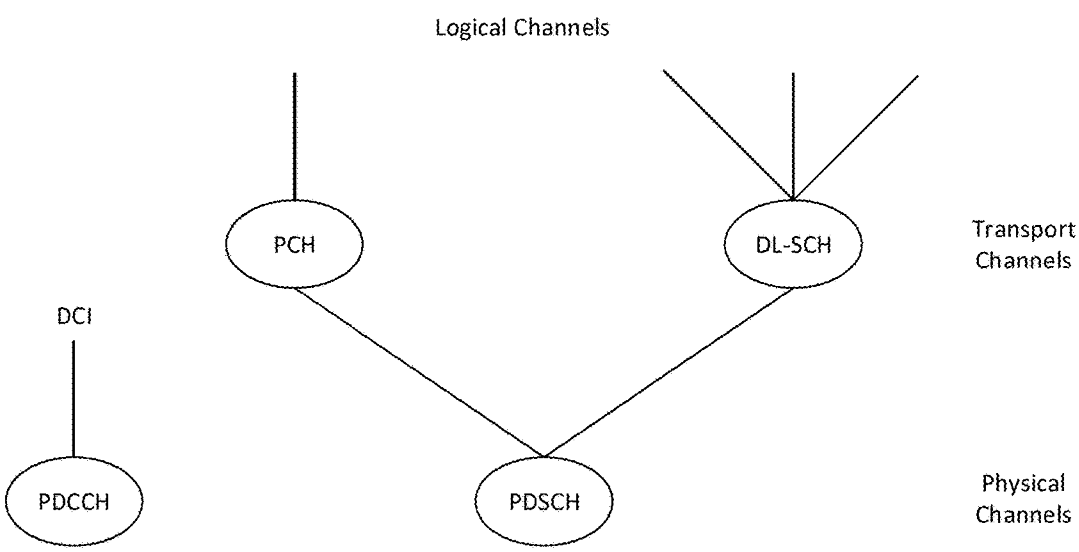
FIG. 18 shows an exemplary transport-to-physical channel mapping in accordance with some aspects.

The physical time-frequency resources (REs) of the resource grid may therefore be allocated to specific physical channels. Each physical channel may carry specific data provided by one or more transport channels, which may in turn each provide specific data to a particular physical channel that is provided by one or more particular logical channels. FIG. 18 shows an exemplary channel mapping illustrating the transport channel mapping for the PDSCH and PDCCH physical channels. As shown in FIG. 18, the PDCCH channel may carry Downlink Control Information (DCI) data, which may be control messages addressed to specific UEs that may be transmitted on the PDCCH, while the PDSCH channel may carry data provided by the Paging Channel (PCH) and Downlink Shared Channel (DL-SCH) logical channels. The PCH may carry paging messages addressed to specific UEs while the DL-SCH may mainly carry user data traffic in addition to some control information. Accordingly, while the REs of downlink resource grid 1700 may be directly allocated to physical channels, each physical channel may contain data provided via the associated transport and logical channels including traffic data, control data, and paging data.

A terminal device such as terminal device 1502 or 1504 receiving downlink signals from a network access nodes such as network access node 1510 or 1512 may therefore be able to process each data contained at each time-frequency element of the downlink signal in order to recover the data from each channel. In an exemplary LTE setting, terminal device 1502 may process PDCCH REs in order to recover important control data (specified in a DCI message addressed to terminal device 1502) that may identify the presence of other incoming data in the PDSCH REs that is addressed to terminal device 1502. The type of data indicated in a DCI message may depend on the current radio access status of terminal device 1502. For example, if terminal device 1502 is currently in a connected radio state terminal device 1502 may be allocated dedicated downlink resources to receive traffic data on the PDSCH. Accordingly, terminal device 1502 may monitor the PDCCH during each subframe to identify DCI messages addressed to terminal device 1502 (e.g., via a Radio Network Temporary Identity (RNTI)), which may specify the location of PDSCH REs containing downlink data intended for terminal device 1502 in addition to other parameters related to the downlink data.

Alternatively, if terminal device 1502 is currently in an idle radio state, terminal device 1502 may not be in position to receive any traffic data on the PDSCH and may instead only be in position to receive paging messages that signal upcoming traffic data intended for terminal device 1502. Accordingly, terminal device 1502 may monitor the PDCCH in certain subframes (e.g., according to periodic paging occasions) in order to identify paging control messages (DCI messages addressed with a Paging RNTI (P-RNTI)) that indicates that the PDSCH will contain a paging message. Terminal device 1502 (along with other idle mode UEs) may then receive the paging message on the PDSCH and identify whether the paging message is intended for terminal device 1502 (e.g., by means of a System Architecture Evolution (SAE) Temporary Mobile Subscriber Identity (S-TMSI) or International Mobile Subscriber Identity (IMSI) included in the paging message)).

In other words, terminal device 1502 may monitor a control channel and a paging channel for control and paging messages intended for terminal device 1502, where both the paging channel and the control channel may be composed of specific time-frequency resources. In addition, any reference to LTE is only for demonstrative purposes and is utilized only to provide contextual information for radio resource allocations for physical channels. Various other radio access technologies may also specify control and paging channels composed of specific time-frequency resources that a terminal device may need to monitor for the presence of control and paging messages addressed to the terminal device. Accordingly, physical channels in other radio access technologies may similarly utilize dynamic allocations of time-frequency resources.

Terminal device 1502 may transmit uplink data to a network access node such as network access nodes 1510 and 1512. While uplink resource grids may utilize a time-frequency discretization scheme similar to downlink resource grids, the resource allocation scheme per terminal device may differ slightly between downlink and uplink. This may depend on the specifics of the radio access technology, and some radio access technologies may use different uplink and downlink allocation schemes and physical layer waveforms in the uplink and downlink while other radio access technologies may use the same uplink and downlink allocation scheme and/or physical layer waveforms in the uplink and downlink. For example, LTE downlink primarily utilizes Orthogonal Frequency Division Multiple Access (OFDMA) for multiple access, where RBs may be allocated in a distributed and non-contiguous fashion to different users; accordingly, along the direction of the frequency axis the RBs addressed to a specific user may be interleaved with RBs addressed to other users and may not be neighboring in the downlink resource grid. In contrast, uplink primarily utilizes Single Carrier Frequency Division Multiple Access (SC-FDMA) in which at any point in time only a set of RBs which is contiguous along the direction of the frequency axis may be allocated to a single user.

Figure 19:
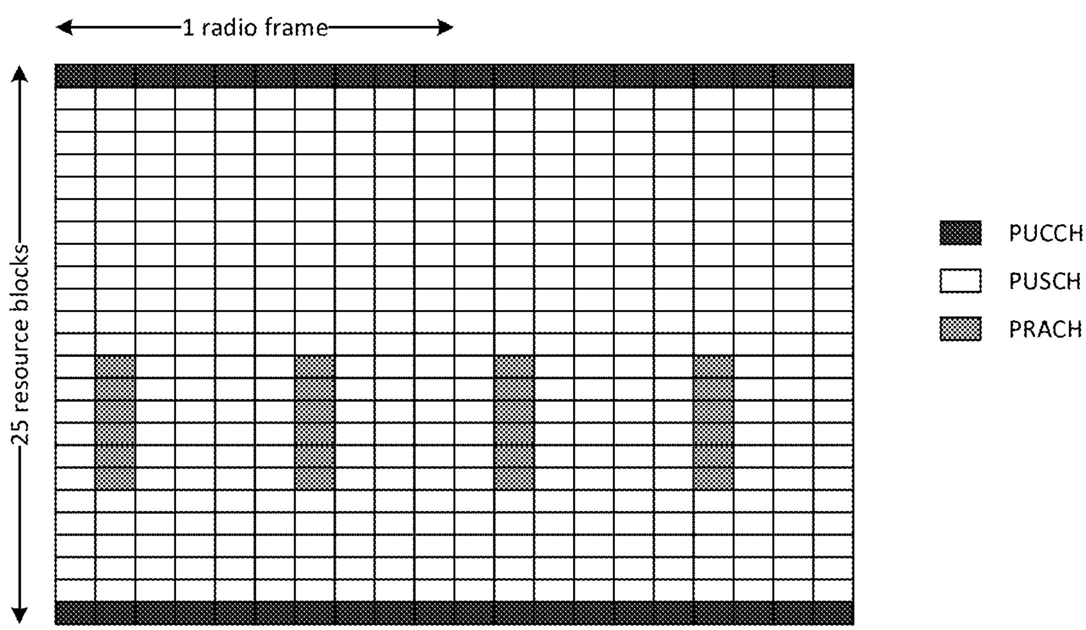
FIG. 19 shows a second exemplary time-frequency resource grid for radio communications in accordance with some aspects.

FIG. 19 shows exemplary uplink resource grid 1900, which may be an LTE resource grid over 25 resource blocks and two radio frames and may constitute an exemplary 5 MHz system bandwidth for FDD. As indicated above, uplink resource allocations may generally be restricted to utilize only blocks which are contiguous along the direction of the frequency axis. Note that the radio resources of uplink resource grid 1900 are shown on a different scale from downlink resource grid 1700 where each unit block of uplink resource grid 1900 represents the subcarriers of a single resource block over one subframe (two resource blocks in total).

As denoted by the shading in FIG. 19, the time-frequency resources of uplink resource grid 1900 may also be allocated to specific uplink physical channels including the Physical Uplink Control Channel (PUCCH), Physical Uplink Shared Channel (PUSCH), and Physical Random Access Channel (PRACH). PUCCH allocations may generally be at the upper and lower ends of the system bandwidth while the remaining portion of the system bandwidth may generally be allocated for PUSCH transmissions. Accordingly, UEs such as terminal device 1502 may be allocated radio resources (via uplink grants provided by the radio access network on the PDCCH) in order to transmit uplink traffic data on the PUSCH and uplink control data on the PUCCH.

As specified by a wireless communication standard, such as 3GPP TS 36.211, certain resource blocks generally located in the central region of the system bandwidth may be allocated for PRACH transmission. UEs such as terminal device 1502 may utilize the PRACH in order to establish an active radio connection with an eNodeB such as network access node 1510, which may occur during a transition from an idle to a connected state, during a handover to network access node 1510, or if timing synchronization with network access node 1510 has been lost. As opposed to the PUCCH and PUSCH radio resources that may each be uniquely allocated to individual UEs, eNodeBs may broadcast system information that identifies the PRACH radio resources (e.g., in form of a System Information Block (SIB)) to all UEs in a cell. Accordingly, PRACH radio resources may be available for use by any one or more UEs. Terminal device 1502 may therefore receive such system information from network access node 1510 in order to identify the PRACH configuration (PRACH Configuration Index), which may specify both the specific radio resources (in time and frequency) allocated for PRACH transmissions, known as a PRACH occasion, and other important PRACH configuration parameters. Terminal device 1502 may then generate and transmit a PRACH transmission containing a unique PRACH preamble that identifies terminal device 1502 during a PRACH occasion. Network access node 1510 may then receive radio data during the PRACH occasion and decode the received radio data in order to recover all PRACH transmissions transmitted by nearby UEs on the basis of the unique PRACH preamble generated by each UE. Network access node 1510 may then initiate establishment of an active radio connection for terminal device 1502.

Terminal devices may therefore transmit and receive data on specific uplink and downlink channels that are defined as time-frequency radio resources. These channels may include paging, random access, control channels, traffic data channels, and various other channels depending on the particulars of the associated radio access standard. As described above in the exemplary case of LTE, such may include the PDCCH (control), PDSCH (traffic data), PUCCH (control), PUSCH (traffic data), and PRACH (random access), where the PDCCH and PDSCH may also be considered ‘physical’ paging channels due to the transport of paging DCI messages (DCI 1C, addressed with P-RNTI) on the PDCCH and RRC paging messages on the PDSCH. Regardless of the specifics, physical channels for each radio access technology may be defined in time-frequency resources and may be available for transmission and reception of specific data by terminal devices and network access nodes. Accordingly, while each radio access standard may have a unique physical channel scheme, the common underlying features and usage of all radio access channels renders aspects disclosed herein applicable for radio channels of any radio access technology.

Instead of providing only a single ‘instance’ of such channels, various aspects may provide multiple instances of physical channels that have different characteristics. Furthermore, one or more of the channel instances may have characteristics tailored to a specific power efficiency, specific latency, and/or specific reliability, which may enable terminal devices to select which channel instance to utilize based on their current power efficiency and/or data connection characteristics (including the reliability and latency). The different channel instances may each utilize different settings such as periodicity, time, expected traffic, etc., in order to enable each channel instance to effectively provide desired power-efficiency, latency, and reliability levels. Furthermore, various channel instances may be provided via different radio access technologies, where channel instances provided by lower power radio access technologies may present a more power efficient option than other channel instances provided by higher power radio access technologies. Likewise, certain radio access technologies may provide greater reliability and/or lower latency, thus providing channel instances of varying reliability and latency across different radio access technologies.

Figure 20:
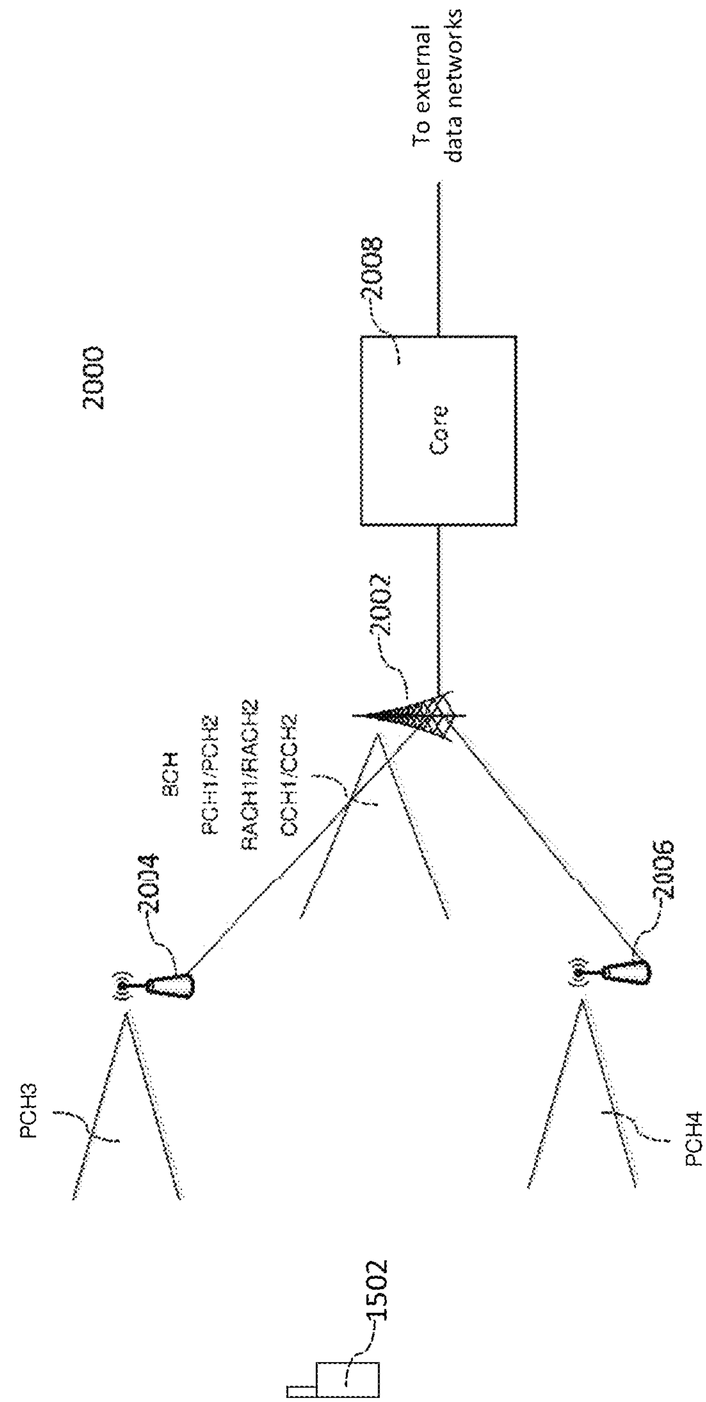
FIG. 20 shows an exemplary network scenario for a radio communication network in accordance with some aspects.

FIG. 20 shows an exemplary network scenario for radio communication network 2000 according to an aspect of the disclosure. As shown in FIG. 20, radio communication network 2000 may include terminal device 1502, network access node 2002, network access node 2004, network access node 2006, and core network 2008. In some aspects, network access nodes 2002-2006 may be configured according to the same radio access technology, while in other aspects network access node 2002-2006 may be configured according to different radio access technologies. For example, in an exemplary scenario, network access node 2002 may be cellular base station while network access nodes 2004 and 2006 may be short-range access points, such as eNodeB 2002, WLAN AP 2004, and Bluetooth Low Energy (BT LE) node 2006. Other exemplary scenarios with various radio access technologies are also within the scope of this disclosure.

Network access nodes 2002-2006 may be part of the radio access network of the radio communication network 2000 in order to provide radio access connections to terminal devices, such as terminal device 1502, thus providing a connection to core network 2008 and to other external data networks (such as external Packet Data Networks (PDNs), Internet Protocol (IP) Multimedia Subsystem (IMS) servers, and other Internet-accessible data networks). The description of radio communication network 2000 below is demonstrative and any radio access technology may be incorporated into radio communication network 2000. This includes, for example, other 2G, 3G, 4G, 5G, etc. technologies either already developed or to be developed.

Terminal device 1502 may transmit and receive radio signals on various physical channels with the various network access nodes 2002-2006 of radio communication network 2000. Network access nodes 2002-2006 may provide their respective physical channels according to the specifics of their respective RATs, which as previously indicated may be the same or different.

One or more of network access nodes 2002-2006 may offer a single 'instance' of each channel type, for example, with additional reference to FIG. 17 network access node 2002 may provide a single control channel instance where the control channel for each subframe has a constant and uniform configuration. Similarly, network access node 2002 may provide a single random access channel instance (by monitoring for uplink random access channel transmissions during random access channel occasions) according to a random access channel configuration, a single data traffic channel instance, a single uplink control channel instance, single uplink data traffic channel instance, etc. Stated another way, terminal device 1502 may not be free to select between multiple instances of each specific channel.

Thus, according to an aspect of the disclosure, network access nodes such as network access node 2002 may provide multiple channel instances, e.g., multiple physical channel configurations for a given channel type, thus enabling terminal devices to select between the channel instances according to an operational profile of a terminal device. As shown in FIG. 20, in an exemplary application, network access node 2002 may provide a broadcast channel BCH, a first and second paging channel PCH1 and PCH2, a first and second random access channel RACH1 and RACH2, and/or a first and second control channel CCH1 and CCH2. Terminal devices served by network access node 2002 may therefore have the option to select between the different channel instances (PCH1 vs. PCH2, RACH1 vs. RACH2, CCH1 vs. CCH2) when transmitting and receiving relevant data. Although specific channel types are denoted herein, in some aspects network access nodes such as network access node 2002 may provide other types of channel instances such as multiple traffic data channel instances, e.g., a first and second downlink data traffic channel, a first and second uplink data traffic channel, etc. Additionally or alternatively, the number of channel instances for each channel type can be scaled to any quantity.

One or more of the channel instances may be configured differently in order to have specific characteristics, e.g., in order to provide different levels of power efficiency, different levels of latency, and/or different levels of reliability. For example, PCH1 may be configured to enable lower power expenditure than PCH2 for terminal devices that utilize the channels; likewise, CCH1 may offer lower power expenditures than CCH2 while RACH1 may offer lower power expenditures than RACH2. Alternatively, PCH2 may provide lower latency and/or higher reliability than PCH1. The differing configurations and resulting power-efficiency, latency, and reliability characteristics may provide terminal devices with varying options in terms of which channel instances to utilize.

Figure 21:
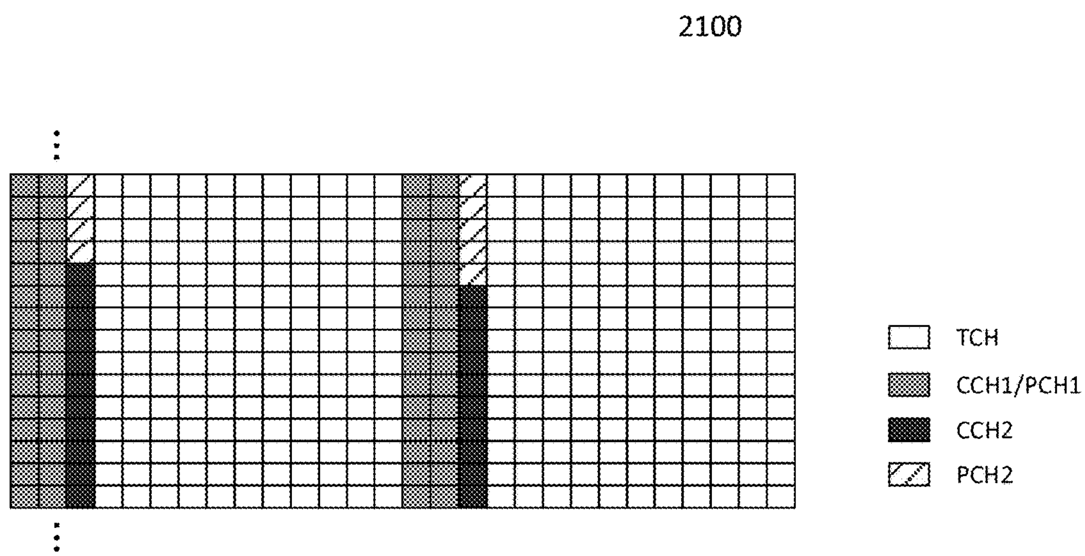
FIG. 21 shows a third exemplary time-frequency resource grid for radio communications in accordance with some aspects.
Figure 22:
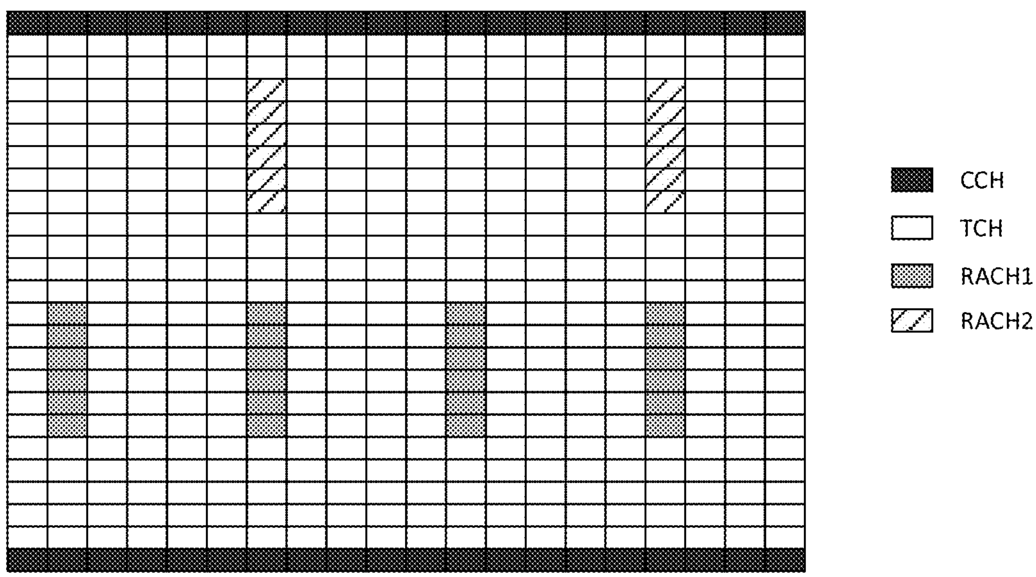
FIG. 22 shows a fourth exemplary time-frequency resource grid for radio communications in accordance with some aspects.

As each of the channel instances may function independently (e.g., logically separate from the other channel instances), each channel instance may be allocated a different set of time-frequency radio resources. FIGS. 21 and 22 depict exemplary channel resource allocations according to some aspects, with downlink resource grid 2100 showing a traffic channel (TCH), control channel instances CCH1 and CCH2, and paging channel instances PCH1 and PCH2, while uplink resource grid 2200 shows control channel CCH, traffic channel TCH, and random access channel instances RACH1 and RACH2. The channel resource allocation shown in FIG. 22 is exemplary and similar channel resource allocations can be realized for various different radio access technologies.

As shown in FIG. 21, network access node 2002 may provide CCH1 in the first two symbols of each subframe and CCH2 in the third symbol of each subframe; accordingly, terminal devices may have the option to utilize CCH1 if power efficiency is not of concern or to use CCH2 if power efficiency is of concern. As CCH2 includes less time-frequency elements, terminal devices may be able to decode CCH2 with less processing power and may accordingly be able to limit power expenditure when utilizing CCH2. As described above regarding downlink resource grid 1700, in some aspects the control channel can additionally carry paging control messages (e.g., DCI messes addressed with a P-RNTI in an exemplary LTE setting), which idle mode terminal devices may need to monitor for in order to identify that the upcoming TCH will contain a paging message. Accordingly, CCH1 may also serve as PCH1. Terminal devices utilizing PCH1 may therefore monitor CCH1 (e.g., according to an assigned DRX cycle) for paging control messages.

These radio resource allocations are exemplary, and there exist numerous different variations for radio resource allocations for the various channel instances and all such variations are considered within the scope of this disclosure. For example, other physical channel configurations for the various channel instances may provide higher reliability and/or latency, e.g., where paging channels with a shorter period may provide for lower-latency paging (with higher energy costs) while paging channels with a longer period have higher-latency paging. The radio resource allocation (or possible sets of radio resource allocations) may can be part of a defined standard, which may thus enable both terminal devices and network access nodes to have knowledge of the radio resources allocated for each channel instance. As will be described, the radio access network may broadcast the configuration information for each channel instance in order to provide terminal devices with the information necessary to access each channel instance.

With continued reference to FIG. 20, in some aspects the radio access network may additionally provide channel instances on different radio access technologies. The differences between the radio access technologies may also introduce differences in power-efficiency, latency, and/or reliability in each of the channel instances. As shown in FIG. 20, network access node 2004 and network access node 2006 may additionally interface with network access node 2002. Accordingly, network access node 2004 and network access node 2006 may cooperate with network access node 2002 in order to provide further channel instances on their respective radio access technologies. For example, network access node 2002 may be configured according to a first radio access technology, network access node 2004 may be configured according to a second radio access technology, and network access node 2006 may be configured according to a third radio access technology. Network access node 2004 and network access node 2006 may then additionally provide paging channel instances PCH3 and PCH4 on the second and third radio access technologies, respectively (which may also occur on different frequency resources from those employed by network access node 2002, such as on an unlicensed band compared to a licensed band employed by network access node 2002). Accordingly, in addition to the paging channel instances PCH1 and PCH2 provided by network access node 2002 on the first radio access technology, terminal device 1502 may be able to utilize PCH3 and PCH4 using the second or third radio access technology, respectively. Network access nodes 2002-2006 may additionally or alternatively cooperate in order to provide any such channel instances, e.g., random access channel instances, control channel instances, traffic data channel instances, etc. As network access node 2004 and network access node 2006 interface with network access node 2002, cooperation between network access nodes 2002-2006 may be straightforward in order to forward data between the network access nodes and manage all such channel instances.

Terminal device 1502 may therefore be able to select between the various channel instances when exchanging uplink and downlink data with the radio access network collectively composed of network access node 2002, network access node 2004, and network access node 2006. For example, terminal device 1502 may be able to select either channel instance in terms of random access channel, paging channel, and control channel in order to transmit or receive the associated data. Terminal device 1502 may select channel instances based on an 'operational profile' of terminal device 1502, which may depend on the current power, latency, and reliability requirements of terminal device 1502.

For example, certain types of terminal devices may serve certain applications that result in specific power, latency, and reliability requirements. For example, various devices dedicated to IoT applications may have extreme battery life requirements, such as certain types of sensors designed for operation over several years at a time without recharging or battery replacement, and may consequently require high power-efficiency. A non-limiting example can be a temperature sensor in a forest with a target battery lifetime of e.g., 10 years. The IoT applications served by these devices are typically more latency tolerant, and consequently may not have strict latency requirements compared to other devices.

Other types of terminal devices may be dedicated to V2X or machine control communications, such as vehicular terminal devices for autonomous driving or remote control for robots in a factory or production hall. Due to the critical and time-sensitive nature of such communications, these devices can have extremely high reliability requirements and low-latency requirements. Extreme battery life may in some cases not be as consequential, as recharging may be more regularly be available.

Other types of terminal devices may be 'multi-purpose' devices, such as smartphones, tablets, laptops, which may be heavily user-interactive and serve a diverse set of applications depending on use by the user. The power, latency, and reliability characteristics may vary depending on the applications being used. For example, a user could use a multi-purpose terminal device for a variety of applications including, without limitation, mobile real-time gaming, credit card reader, voice/video calls, or and web browsing. Mobile real-time gaming may low latency requirements, which may be more important than reliability and power-efficiency. Credit card reader applications may place higher importance on reliability than latency or power efficiency. Power efficiency may be more important for voice/video calls and web browsing, but there may not be as 'extreme' power-efficiency requirements as in the case of devices with certain IoT applications.

Figure 23:
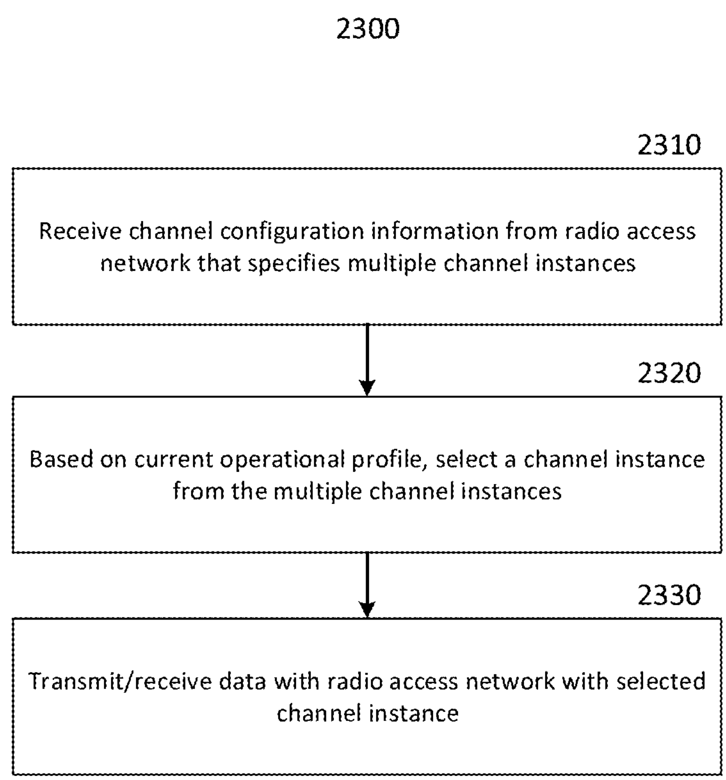
FIG. 23 shows an exemplary method related to selecting between available channel instances in accordance with some aspects.

FIG. 23 shows method 2300 in accordance with some aspects, which terminal device 1502 may execute in order to select and utilize a specific radio access channel instance based on an operational profile of terminal device 1502, which may depend on the power efficiency, latency, and reliability demands of terminal device 1502. Terminal device 1502 may primarily execute the control logic of method 2300 at controller 1610, which may utilize the radio transmission and reception services provided by antenna system 1602, RF transceiver 1604, and physical layer processing module 1608 in order to trigger transmission and reception of radio signals over the radio access network. As previously noted, while FIG. 16 depicts antenna system 1602, RF transceiver 1604, and physical layer processing module 1608 as single components for purposes of conciseness, each of antenna system 1602, RF transceiver 1604, and physical layer processing module 1608 may contain radio communication components for multiple radio access technologies, such as LTE, UMTS, GSM, Bluetooth, Wi-Fi, mmWave, 5G, etc.

In 2310, controller 1610 may receive channel configuration information from the radio access network, e.g., network access node 2002, that specifies the available or multiple channel instances and the physical channel configurations of each available or multiple channel instance. Network access node 2002 may transmit such channel configuration information in a broadcast format, such as with system information (e.g., SIB) or as a similar broadcast message. For example, in the setting of FIG. 20, the channel configuration information may specify the available multiple channel instances. The channel configuration may also specify the radio access technology and the radio resources allocated for each channel instance. Additionally, to allow terminal devices to evaluate each of the channel instances, network access node 2002 may provide further information detailing the specific characteristics of each channel instance, such as the power-efficiency, reliability, and latency of each channel instance.

Controller 1610 may therefore be able to identify each of the channel instances in 2310 from the channel configuration information. Controller 1610 may then select a channel instance in 2320. The type of channel instance selected by controller 1610 may depend on what type of controller 1610 is executing method 2300 to select. For example, controller 1610 may select a random access channel instance to perform RACH procedures, a control channel instance to transmit or receive control information, a paging channel instance in order to monitor for idle mode paging messages, a traffic data channel instance to transmit or receive traffic data on, etc.

In 2320, as there may be multiple channel instances specified for each channel type, controller 1610 may evaluate the channel instances based on a current operational profile of terminal device 1502 in order to select a channel instance from the multiple channel instances. For example, controller 1610 may determine the current operational profile of terminal device 1502 in 2320 based on a power efficiency requirement, a reliability requirement of a data connection, and/or a latency requirement of terminal device 1502. As another example, as previously indicated different types of terminal devices may serve different types of applications, and may consequently have varying power-efficiency, latency, and reliability requirements. Non-limiting examples introduced above include terminal devices for IoT applications (extreme power efficiency requirements with less importance on latency and reliability), terminal devices for V2X or machine control applications (extreme reliability and low latency requirements), and multi-purpose terminal devices for a variety of user-centric applications (higher power-efficiency requirements, but not to the level of extreme power efficiency requirements). Other types of devices and types of supported applications may also influence the power-efficiency, reliability, and latency requirements of terminal device 1502.

Controller 1610 may therefore select the operational profile of terminal device 1502 based on the power-efficiency, reliability, and latency requirements of terminal device 1502, which may in turn depend on the type of terminal device and types of applications supported by terminal device 1502. In some aspects, one or more of the power-efficiency, reliability, or latency requirements of terminal device 1502 may be preprogrammed into controller 1610.

In some aspects, the operational profile may be preprogrammed into controller 1610. For example, if terminal device 1502 is an IoT application terminal device, an operational profile (that prioritizes power-efficiency) and/or power-efficiency, latency, and reliability requirements of terminal device 1502 may be preprogrammed into controller 1610. Similarly, if terminal device 1502 is a multi-purpose or V2X/machine control terminal device, the corresponding operational profile and/or power-efficiency, latency, and reliability requirements may be preprogrammed into controller 1610. Controller 1610 may therefore reference the preprogrammed operational profile and/or power-efficiency, latency, and reliability requirements in 2320 to identify the operational profile.

In some aspects, the applications served by terminal device 1502 may vary over time. For example, multi-purpose terminal devices may execute different applications depending on user interaction. Other types of terminal devices may also execute different applications over time. Accordingly, in some aspects the power-efficiency, latency, and reliability requirements of terminal devices may change over time. Controller 1610 may therefore also evaluate the current applications being executed by terminal device 1502, in particular those that rely on network connectivity. Accordingly, controller 1610 may consider the current connection requirements, e.g., latency and reliability, of terminal device 1502 in 2320 as part of the operational profile. For example, if terminal device 1502 is a multi-purpose terminal device that is currently executing real-time gaming application, terminal device 1502 may have strict latency requirements. If terminal device 1502 is a multi-purpose terminal device that is executing a voice call, terminal device 1502 may have important power-efficiency requirements. Other cases may similarly yield connection requirements (e.g., latency and reliability requirements) for terminal device 1502. In some aspects, controller 1610 may interface with an application processor (data source 1612/data sink 1616) running applications (e.g., via Attention (AT) commands) in order to identify the current connection requirements of applications being executed by terminal device 1502. In some aspects, controller 1610 may consider other factors in determining the operational profile, such as e.g., whether a user has provided user input that specifies a power-efficiency, latency, or reliability requirement. In a non-limiting example, a user may activate a power-saving mode at terminal device 1502, which may indicate stricter power-efficiency requirements of terminal device 1502.

Accordingly, depending on the current power efficiency, latency, and reliability requirements of terminal device 1502, controller 1610 may determine the operational profile. Controller 1610 may then evaluate the multiple channel instances in 2320 based on the operational profile in order to identify a channel instance that best matches the operational profile. According to an exemplary aspect, controller 1610 may therefore evaluate the multiple channel instances based on power efficiency, latency, and reliability in 2320 in order to identify a channel instance that matches the operational profile.

Controller 1610 may thus apply predetermined evaluation logic to each of the multiple channel instances in order to identify which channel instances meet the power efficiency, reliability, and latency requirements as characterized by the operational profile. Accordingly, based on the physical channel configuration for each channel instance, controller 1610 may identify which channel instances are power-efficient, which channel instances are low-latency, and which channel instances are high-reliability. Using predetermined evaluation logic, controller 1610 may identify in 2320 which channel instances match the demands of the operational profile of terminal device 1502.

For example, in an exemplary scenario, controller 1610 may be performing method 2300 to identify a paging channel instance for the radio access network of radio communication network 2000. Controller 1610 may determine in 2320 that the operational profile of terminal device 1502 requires power efficiency. Accordingly, in 2320 controller 1610 may evaluate the multiple paging channel instances PCH1, PCH2, PCH3, and PCH4 to identify which paging channel provides power efficiency. Controller 1610 may therefore evaluate the physical channel configuration information of each of PCH1, PCH2, PCH3, and PCH4 to identify which paging channel instance is the most power efficient.

If controller 1610 considers the third radio access technology (supported by network access node 2006) to be the most power efficient, controller 1610 may select PCH4 as a paging channel instance in 2320. Alternatively, controller 1610 may determine that the physical channel configuration of PCH2 is the most-power efficient in 2320, such as based on the periodicity and time-frequency resource distribution of the physical channel configuration.

In another exemplary scenario, controller 1610 may be applying method 2300 to select a control channel instance and may determine in 2320 that the operational profile of terminal device 1502 requires low-latency, such as due to an active data connection that has high latency sensitivity. Controller 1610 may thus evaluate the physical channel configurations of the multiple channel instances in 2320 to identify which channel instance provides low latency, e.g., by identifying that CCH1 has lower latency than CCH2. Controller 1610 may thus select CCH1 in 2320.

Numerous such evaluation results are possible. In some aspects, the evaluation logic used by controller 1610 in such decisions in 2320 may be preprogrammed at controller 1610, e.g., as software-defined instructions. In some aspects, controller 1610 may additionally employ machine learning based on historical data to identify which physical channel configurations provide power-efficiency, low latency, and high reliability. Nonlimiting examples of machine learning techniques that controller 1610 can utilize include supervised or unsupervised learning, reinforcement learning, genetic algorithms, rule-based learning support vector machines, artificial neural networks, Bayesian-tree models, or hidden Markov models. Without loss of generality, in some aspects power-efficient channel configurations may have a smaller set of time-frequency resources (thus requiring less processing), be condensed in time and/or have longer transmission time periods (e.g., Transmission Time Intervals (TTI) in an exemplary LTE setting), which may enable longer time periods where radio components can be deactivated and/or powered down, and/or have a longer period (thus allowing for infrequent monitoring and longer periods where radio components can be deactivated and/or powered down). For example, in an exemplary LTE setting, for PDCCH and PDSCH, a shorter TTI can also mean that the signaling overhead for the scheduling of UL/DL grants will increase. For example, instead of scheduling always one full subframe (e.g., 2 consecutive time slots, or 1 ms) for the same terminal device, the network access node may be allowed to schedule single time slots (e.g., equivalent to 0.5 ms). Due to the finer granularity, the network access node may need more bits to describe which resources are assigned to the terminal device within the subframe (if the PDCCH is still included in the OFDM symbols 1 to 3 only). Alternatively, in some aspects there could be a PDCCH for the first time slot in OFDM symbols 1 and 2, and an additional PDCCH in OFDM symbols 8 and 9. For the terminal device this could mean in both cases that it needs to process more PDCCH information to determine whether the eNB has scheduled DL or UL resources for it.

In some aspects, a power-efficient channel configuration of a downlink traffic channel (TCH) may introduce a delay between the time slot carrying control information that indicates that the network access node has scheduled a downlink transmission and the time slot carrying the actual downlink transmission. For example, if the control information occurs immediately prior to the time slot carrying the downlink transmission, a terminal device may receive, store, and process the downlink transmission while simultaneously checking the control information to determine whether the downlink transmission is addressed to the terminal device. An exemplary case of this is the PDCCH followed by the PDSCH in LTE, where a terminal device may store and process the PDSCH while concurrently decoding the PDCCH to check if any of the PDSCH is addressed to the terminal device (e.g., a DCI addressed to the terminal device with an RNTI). A power efficient channel configuration may therefore add a delay between the control information and the downlink transmission, which may provide terminal devices with more time to receive and decode the control information before the downlink transmission starts. A terminal device may therefore be able to determine whether the downlink transmission is addressed to the terminal device at an earlier time (potentially prior to the start of the downlink transmission), and may consequently save power by avoiding the reception, storage, and processing of the downlink transmission in the window between reception of the control information and decoding of the control information. This power-efficient channel configuration may in some aspects increase power efficiency but increase latency. For example, in an exemplary LTE setting, for the DL, when the PDCCH of subframe 'n' indicates a DL transmission for a first terminal device, then the first part of this DL data is already included in subframe 'n'. As it takes time for the first terminal device to process the PDCCH, the first terminal device may be forced to always receive, store and process (up to a certain degree) the full resource block. If there is a sufficient delay between PDCCH and associated DL transmission, the first terminal device will only process the OFDM symbols including the PDCCH—and the OFDM symbols including the reference symbols (RSs). (The UE can use the RSs to perform a channel estimation for the RB, which may be a pre-requisite for decoding the PDCCH.) If the PDCCH is included in e.g., the first 3 OFDM symbols (which may also include some RSs), and that further RSs are included in the 3 additional OFDM symbols 5, 8 and 12, the first terminal device may normally only process 6 OFDM symbols out of the 14 OFDM symbols of a subframe. Only if the PDCCH in subframe "n" indicates a DL transmission for the first terminal device in subframe "n+k", then the first terminal device will process all OFDM symbols of that subframe "n+k". E.g., for the subframes which do not include data for the first terminal device, the first terminal device can ignore 8/14=57% of the OFDM symbols and save processing energy accordingly. This may increase power efficiency but also increase the latency for DL transmissions.

In some aspects, low latency channel configurations can reduce latency by having shorter transmission time periods, such as from e.g., 1 ms to 0.5 ms (where other reductions are similarly possible depending on the initial length of the transmission time period). This may provide a finer 'grid' of potential transmission times, and consequently may enable transmissions to begin earlier in time. This may also reduce round trip time. For example, in an exemplary LTE setting the TTI could be reduced from 1 subframe (=1 ms) to half a subframe (=0.5 ms) or even lower values (e.g., 2 OFDM symbols=0.14 ms). If transmissions can start every 0.5 ms, this can reduce latency (and round-trip time). In some aspects, there may be issues regarding where to put the "additional" PDCCH for the lower TTI, so that "low latency" channels and "power efficient" channels can coexist on the same resource grid. E.g., one could define "low TTI subframes" and "normal TTI subframes". In all subframes, OFDM symbols 1 to 3 carry the PDCCH which can be read and understood by all UEs. Low TTI subframes carry an additional PDCCH for the second half of the subframe in OFDM symbol 8 and 9, maybe only on certain RBs. The network access node can then schedule low TTI subframes and normal TTI subframes dependent on the scheduling requests from the terminal devices. For example, the network access node could occasionally insert a normal TTI subframe during which only "power efficient" terminal devices are scheduled. Or it could schedule transmissions for "power efficient" terminal devices for certain RBs (e.g., in a certain sub-band), and additionally, using the additional PDCCH, for the "low latency" terminal devices it schedules transmissions in the remaining sub-band.

In some aspects, low-latency channel configurations may reduce latency by reducing the delay between uplink transmission grants (granting permission for a terminal device to transmit) and the actual starting time of the uplink transmission. By enabling terminal devices to transmit at an earlier time following an uplink transmission grant, terminal devices may transmit information sooner in time, thus reducing latency. For example, in an exemplary LTE setting, delay between UL grant (given on the PDCCH in subframe 'n') and the actual start of the UL transmission in subframe 'n+k' can be reduced. As k is conventionally fixed to 4, e.g., 4 ms after the UL grant, 'k' could be reduced e.g., to '2' or '1' to reduce latency. This may involve modification on the terminal side to support this.

In some aspects, high reliability channel configurations may utilize a robust physical modulation scheme, where e.g., Binary Phase Shift Keying (BPSK) can be more robust than Quadrature Phase Shift Keying (QPSK), 16-Quadrature Amplitude Modulation (16-QAM), 64-QAM, 256-QAM, etc. In some aspects, high reliability channel configurations may send the same information repeatedly, where e.g., the repetition can occur spread over time (e.g., TTI bundling), spread over several frequencies at the same time, or spread over time and over different frequencies (e.g., frequency hopping). In some aspects, high reliability channel configurations can spread the information contained in a single bit over several coded bits by using different coding schemes, such as e.g., convolutional coding. Error correcting codes can then be used on the receiving side of the high-reliability channel configuration to detect and repair (to a certain degree) transmission errors. This may increase reliability at the expense of increased latency.

In addition to the aforementioned exemplary operational profile factors of power efficiency, latency, and reliability, controller 1610 may similarly consider any one or more factors related to Quality of Service (QoS), QoS Class Identifier (QCI), Power Saving Mode (PSM), extended DRX (eDRX), Vehicle-to-Any (V2X), etc.

As the operational profile of terminal device 1502 may depend on multiple factors, in various aspects controller 1610 may consider multiple or any combination of factors where various factors may involve tradeoffs with other factors. For example, in some cases power efficient channel instances may generally have higher latency and/or lower reliability. Accordingly, controller 1610 may 'balance' power efficiency vs. latency and/or reliability to select a channel instance in 2320. In some aspects, controller 1610 may utilize 'target' factor levels in order to perform such balancing. For example, controller 1610 may identify a target latency that is a maximum acceptable latency and/or a target reliability that is a minimum acceptable reliability and may attempt to select a channel instance that minimizes power consumption while still meeting the target latency and/or target reliability. Alternatively, controller 1610 may identify a target power consumption level that is a maximum acceptable battery power consumption and may attempt to select a channel instance that minimizes latency and/or maximizes reliability while still meeting the target power consumption level. Controller 1610 may therefore include such target factor levels in the evaluation logic utilized to select the channel instance in 2320 based on the current operational profile.

Accordingly, in 2330, based on an evaluation of the channel configuration information of the multiple channel instances in light of a current operational profile, controller 1610 may select a channel instance from the multiple channel instances that best matches the current operation profile of terminal device 1502 in 2320. Controller 1610 may then transmit and/or receive data to the radio access network with the selected channel instance. In some aspects, controller 1610 may trigger channel evaluation based on current radio conditions, such as when a radio measurement (e.g., signal strength, signal quality, SNR, etc.) falls below a threshold. In some aspects, controller 1610 may trigger channel evaluation periodically, such as with a fixed evaluation period.

Depending on the type of channel instance that controller 1610 is selecting with method 2300, controller 1610 may notify the radio access network as part of the selection procedure in 2330 of the selected channel instance in order to properly utilize the selected channel instance for transmission or reception. For example, if controller 1610 is selecting a paging channel instance with method 2300, controller 1610 may notify the radio access network of the selected paging channel instance to enable the radio access network to page terminal device 1502 on the correct channel. Controller 1610 may similarly notify the radio access network if selecting control or traffic data channel instances. Alternatively, there may be channel instances that controller 1610 may not notify the radio access network for, such as selection of a random access channel instance, as terminal device 1502 may be able to unilaterally utilize such channel instances without prior agreement with the radio access network.

Accordingly, in some aspects controller 1610 may be further configured in 2320 to provide the radio access network, e.g., any one of network access nodes 2002-2006, with a control message that specifies the selected channel instance. For example, if selecting a paging channel with method 2300 controller 1610 may transmit a control message to network access node 2002 that specifies PCH1 as a selected paging channel instance. Network access node 2002 may in certain cases need to verify the selected paging channel instance with a core network component of core network 2008 such a e.g., a Mobility Management Entity (MME). Network access node 2002 may then either accept or reject the selected paging channel instance by transmitting a response, after which controller 1610 may proceed in to, in the case of acceptance, utilize the selected paging channel instance in 2330 (e.g., by monitoring the selected paging channel instance for paging message) or, in the case of rejection, select and propose another paging channel instance to network access node 2002. In another example, if selecting a control channel with method 2300, controller 1610 may transmit a control message to network access node 2002 that specifies CCH1 as a selected control channel instance. Network access node 2002 may then accept or reject the selected control channel instance by transmitting a response, after which controller 1610 may proceed to, in the case of acceptance, utilize the selected control channel instance in 2330 (e.g., by receiving control data on the selected control channel instance in the case of downlink or by transmitting control data on the selected control channel instance in the case of uplink).

In some aspects of method 2300, the radio access network may be able to set-up and provide certain channel instances on demand, e.g., upon request by a terminal device. Controller 1610 may be able to request a specific channel instance in 2320 as opposed to selecting from a finite group of channel instances provided by the radio access network in the channel configuration information. For example, controller 1610 may receive the channel configuration information in 2310 and determine in 2320 that the channel instances specified therein do not meet the current criteria of controller 1610, such as if controller 1610 is targeting a low-power channel instance and none of the available channel instances meet the low-power criteria. Accordingly, controller 1610 may transmit a control message to the radio access network in 2320 that requests a low-power channel instance. The radio access network may then either accept or reject the requested channel instance. If the radio access network accepts the requested channel instance, the radio access network may allocate radio resources for the request channel instance and confirm activation of the requested channel instance to controller 1610 via a control message. Conversely, if the radio access network rejects the requested channel instance, the radio access network may transmit a control message to controller 1610 that rejects the requested channel instance. In the case of rejection, the radio access network may propose a modified requested channel instance, which controller 1610 may then either accept, reject, or re-propose. Such may continue until a modified requested channel instance is agreed upon or finally rejected. In the case of acceptance, controller 1610 may proceed to 2330 to transmit or receive data with the radio access network with the agreed-upon channel instance. Such requested channel instances may be UE-specific, e.g., accessible only by the requesting terminal device, or may be provided to groups of multiple terminal devices.

As previously described, the various channel instances may be on different radio access technologies, such as in the example of FIG. 20 where the radio access network may provide multiple channel instances on different radio access technologies. For example, controller 1610 may receive the channel configuration from network access node 2002 in 2310 (using the first radio access technology) and select a channel instance to report to network access node 2002 in 2310 where the selected channel instance is provided on a different radio access technology, such as PCH3 provided by network access node 2004. Accordingly, controller 1610 may monitor the selected paging channel instance in 2330 from network access node 2004. In other words, the selected channel instance may be on a different radio access technology than the radio access technology used to receive the channel configuration information in 2310 and/or report the selected channel instance in 2330. Accordingly, upon receipt of a control message from controller 1610 that specifies a selected channel instance provided by a different radio access technology, e.g., PCH3 provided by network access node 2004, network access node 2002 may accept the selected channel instance with controller 1610 and notify network access node 2004 that terminal device 1502 has selected PCH3 as a paging channel instance (e.g., via an interface between network access node 2002 and network access node 2004). Network access node 2002 may then provide paging data addressed to terminal device 1502 to network access node 2004, which network access node 2004 may transmit on PCH3. Controller 1610 may simultaneously monitor PCH3 for paging information and may accordingly be able to receive and process the paging information provided by network access node 2004 on PCH3. The involved network access nodes may need to be interfaced with a common core network mobility entity (e.g., an MME or similar entity) that is responsible for distributing paging at the involved network access nodes. Additional variations with different channel instances (e.g., random access channels, traffic data channels, control channels, etc.) and radio access technologies may similarly apply according to aspects of the disclosure.

In addition to employing a different radio access technology for a selected channel instance, in some aspects controller 1610 may be able to respond on a separate radio access technology in response to data received on the selected channel instance. For example, in the exemplary scenario introduced above where controller 1610 selects PCH3 as a paging channel instance after receiving the channel configuration information from network access node 2002 (with the first radio access technology), controller 1610 may receive a paging message on PCH3 from network access node 2004 (with the second radio access technology) that is addressed to terminal device 1502 and indicates that incoming data is waiting for terminal device 1502. Controller 1610 may then select to either receive the incoming data from network access node 2004 (e.g., with a traffic data channel instance provided by network access node 2004) or from a different network access node and/or different radio access technology. For example, controller 1610 may select to receive the incoming data from network access node 2002, e.g., on a traffic data channel instance provided by network access node 2002. Accordingly, controller 1610 may respond to the paging message at either network access node 2004 or network access node 2002 (depending on the specifics of the paging protocol) and indicate that the incoming data should be provided to terminal device 1502 on the selected traffic data channel instance. Network access node 2002 may then provide the incoming data to terminal device 1502 on the selected traffic data channel instance. Such may be useful if, for example, the selecting paging channel instance is power-efficient but the selected traffic data channel instance has a higher reliability, latency, link capacity, rate, or quality and thus may be a better alternative for reception of traffic data. In certain aspects, controller 1610 may re-employ method 2300 in order to select a new channel instance, e.g., to select a traffic data channel instance.

In some aspects, terminal device 1502 may employ a special 'low-power' radio access technology to receive paging messages. For example, antenna system 1602, RF transceiver 1604, and physical layer processing module 1608 may contain an antenna and RF and PHY components that are low-power and may be activated by an electromagnetic wave (similar to e.g., a Radio Frequency Identification (RFID) system).

Figure 24:
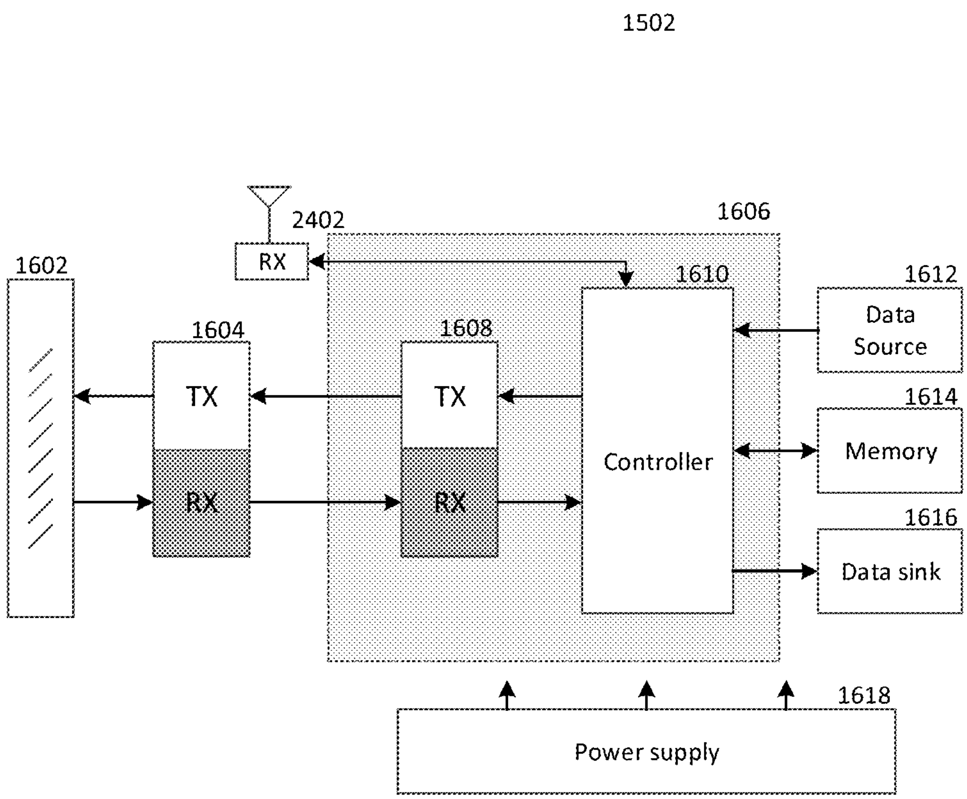
FIG. 24 shows an exemplary internal configuration of a terminal device with a low power radio access system in accordance with some aspects.

FIG. 24 shows an exemplary modified configuration of terminal device 1502 in accordance with some aspects that includes low-power RAT system 2402, which may include basic reception components such as an antenna and RF transceiver and may interface with controller 1610. Controller 1610 may utilize low-power RAT system 2402 as a low-power alternative for utilizing channel instances such as paging channel instances. For example, controller 1610 may utilize low-power RAT system 2402 to monitor a low-power paging channel instance. As previously indicated, low-power RAT system 2402 may be activated upon receipt of a particular trigger electromagnetic wave and may therefore not need external power to monitor the low-power paging channel instance. Accordingly, a network access node configured with a counterpart RAT system may be able to provide a paging channel instance to terminal device 1502 by broadcasting the particular trigger electromagnetic wave on the low-power paging channel instance when a paging message is waiting for terminal device 1502. Low-power RAT system 2402 may then receive trigger electromagnetic wave and 'wake up', thus signaling that a paging message is waiting for terminal device 1502. Low-power RAT system 2402 may either be configured to then enter an active reception state in order to receive the subsequent paging message on the paging channel instance or instead may signal controller 1610 that a paging message is waiting for terminal device 1502. If low-power RAT system 2402 is configured to receive the subsequent paging message, low-power RAT system 2402 may receive the paging message and provide the paging message to controller 1610. If low-power RAT system 2402 is configured to signal controller 1610 that a paging message is waiting for terminal device 1502, controller 1610 may then receive the indication from low-power RAT system 2402 and proceed to receive the subsequent paging message on another paging channel instance via antenna system 2402.

In some aspects of this disclosure related to random access channels, controller 1610 may select a random access channel (from multiple available random access channel instances) in 2320 based on various operational status factors including latency requirements, application criticality, or the presence of a 'RACH subscription'. For example, in evaluating the current operation status in 1612, controller 1610 may identify whether the underlying trigger for random access procedures, e.g., if a particular application requires a data connection, has strict latency requirements or involves critical data. If any of such conditions are true, controller 1610 may aim to select a random access channel instance that offers a low collision probability, e.g., a low likelihood that another terminal device will transmit a similar random access preamble during the same RACH occasion. Accordingly, controller 1610 may aim to select a random access channel instance in 1610 that is not expected to be accessed by a significant number of other terminal devices, thus reducing the collision probability. Controller 1610 may therefore be able to reduce expected latency as RACH transmissions may occur without a high potential for collisions. In some aspects, controller 1610 (or the network access node) may be able to estimate the number of terminal devices that are expected to access the random access channel in a given area by tracking the terminal devices (for example, monitoring uplink interference to estimate the number of proximate terminal devices) and/or by observing traffic patterns (e.g., observing the occurrence of contention in random access procedures).

Additionally, in some aspects terminal device 1502 may have access to a 'RACH subscription' in which terminal device 1502 has special access to a random access channel instance that is reserved for only a select group of terminal devices. Access to such a RACH subscription may be limited and may be available as a paid feature, e.g., where a user or other party pays for access to the RACH subscription and in return is guaranteed an improved 'level of service'.

As the RACH subscription may only available to a select number of terminal devices, the collision probability may be dramatically reduced. In the setting of method 2300 as applied for selecting a random access channel instance, the radio access network may broadcast channel configuration information that specifies the radio resources and scheduling for the RACH subscription, which controller 1610 may receive in 2310 (alternatively, the RACH subscription may be predefined). Controller 1610 may then select the RACH subscription as a random access channel instance in 2320 and proceed to transmit a RACH transmission on the RACH subscription in 2330. As the subscription RACH may be available to only a limited number of terminal devices, there may only be low collision probability. The radio access network may additionally need to verify access to the subscription RACH with a core network component that interfaces with network access node 2002, such as a Home Location Register (HLR) or Home Subscriber Service (HSS), which may contain a database of such subscriptions for verification purposes.

According to another aspect of method 2300, the radio access network may restrict access to certain channel instances based on specifics of each terminal device. The radio access network may therefore provide certain channel instances that are only accessible to terminal devices that meet certain criteria, such as only low-power devices. For example, the radio access network may provide certain channel instances that are only available to devices that report having low battery power. Accordingly, the radio access network may specify in the channel configuration information that certain available channel instances are only accessible by terminal devices with low battery power, e.g., battery power falling below a certain threshold. Terminal devices may then either be expected to obey such requirements or may be required to transmit a control message that explicitly provides the current battery power level. The radio access network may then either permit or deny terminal devices from accessing the restricted channel instances based on such criteria. Other criteria such as data connection requirements, including latency and reliability, for example, may similarly be employed to restrict access to specific channel instances to certain terminal devices. in some aspects, restrictions may be overwritten in certain circumstances. For example, if terminal device 1502 has limited power resources but has high-priority traffic to send (e.g., mission-critical low-latency traffic), terminal device 1502 may transmit the high-priority traffic at the cost of power consumption. For example, if controller 1610 is low on power but has mission-critical low-latency traffic, controller 1610 may transmit the mission-critical low-latency traffic regardless of the power consumption cost.

Accordingly, controller 1610 may utilize method 2300 to select and utilize a channel instance that offers desirable properties such as power efficiency, low latency, high reliability, etc. Controller 1610 may select the channel instance based on a current operation profile of terminal device 1502 that depends on the power efficiency and connection requirements (e.g., latency and reliability) of terminal device 1502. e.g., Although power-efficiency is relevant to aspects of the disclosure, in some aspects of power, controller 1610 may be able to select channel instances with method 2300 to satisfy any number of desired operational criteria.

As described above, cooperation from the radio access network may be relied on to provide the multiple channel instances.

Figure 25:
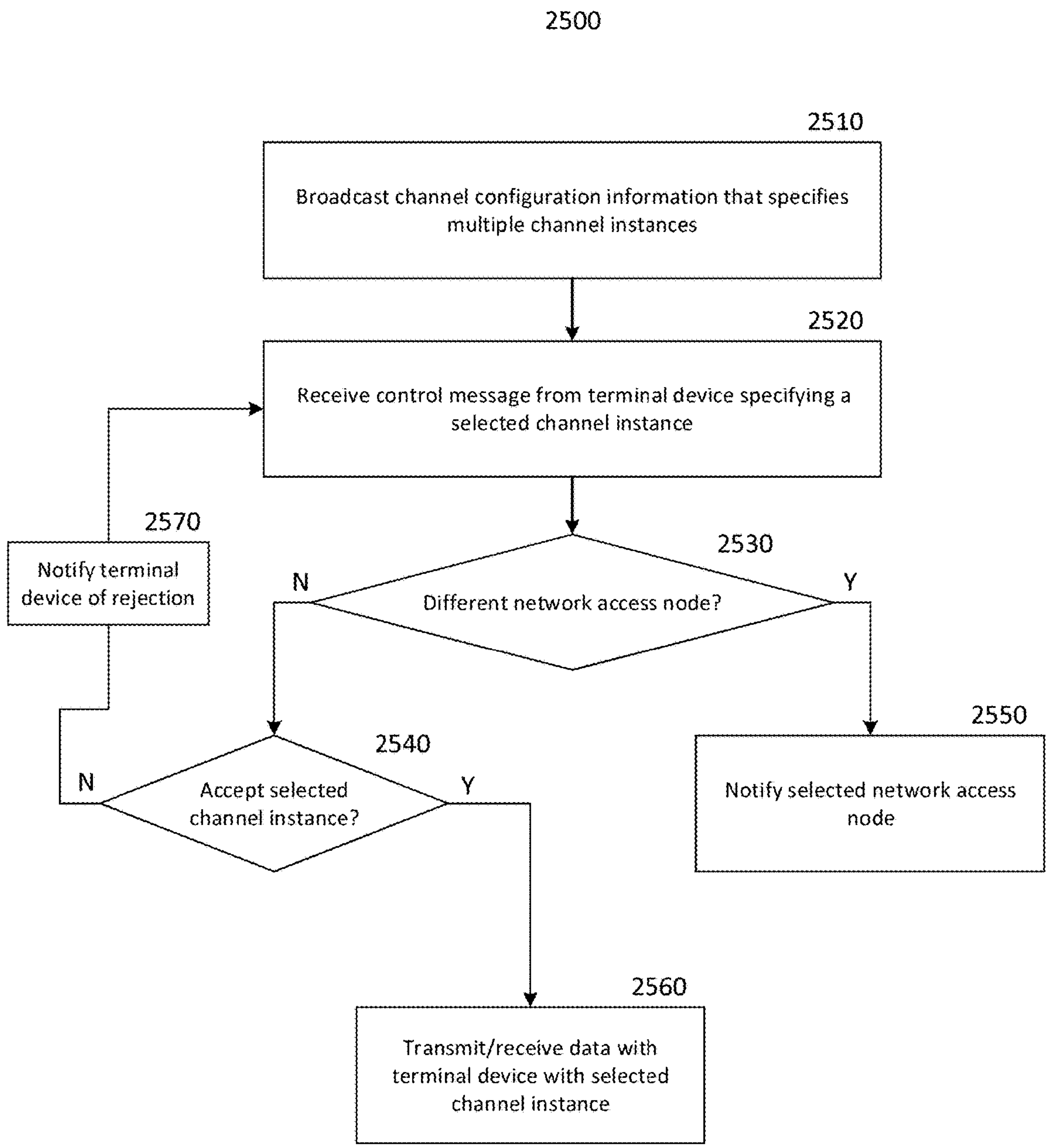
FIG. 25 shows an exemplary method related to providing multiple channel instances in accordance with some aspects.

FIG. 25 shows method 2500 in accordance with some aspects, which may be a counterpart to method 2300 and be executed at a network access node of the radio access network, such as network access node 2002 (or equivalently any network access node of the radio access network).

Figure 26:
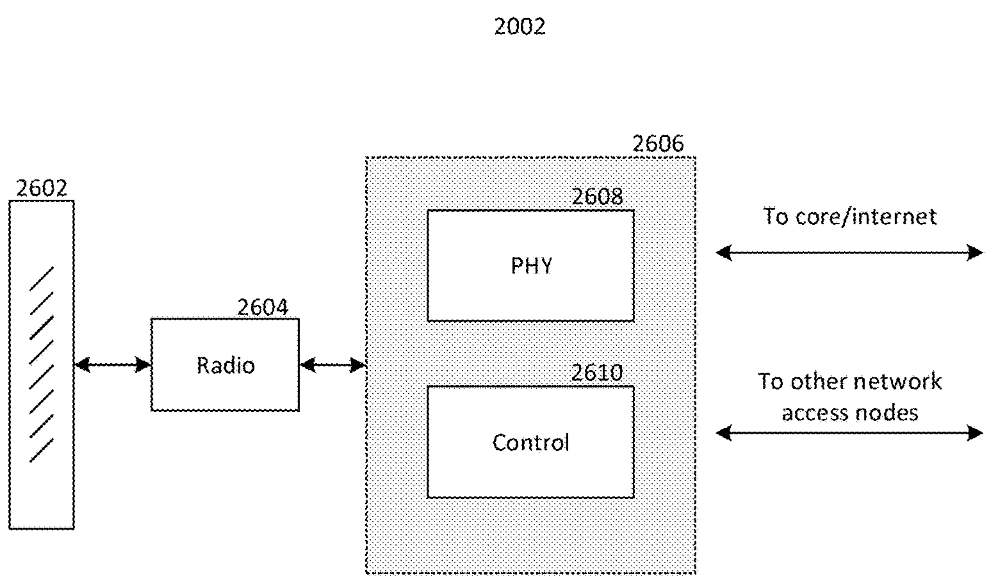
FIG. 26 shows an exemplary internal configuration of a network access node in accordance with some aspects.

FIG. 26 shows an internal configuration of an exemplary network access node, such as network access node 2002 in accordance with some aspects, which may be configured to execute method 2500. As shown in FIG. 26, network access node 2002 may include antenna system 2602, radio module 2604, and communication module 2606 (including physical layer module 2608 and control module 1910). In an abridged overview of the operation of network access node 2002, network access node 2002 may transmit and receive radio signals via antenna system 2602, which may be an antenna array including multiple antennas. Radio module 2604 may perform transmit and receive RF processing in order to convert outgoing digital data from communication module 2606 into analog RF signals to provide to antenna system 2602 for radio transmission and to convert incoming analog RF signals received from antenna system 2602 into digital data to provide to communication module 2606. Physical layer module 2608 may be configured to perform transmit and receive PHY processing on digital data received from radio module 2604 to provide to control module 2610 and on digital data received from control module 2610 to provide to radio module 2604. Control module 2610 may control the communication functionality of network access node 2002 according to the corresponding radio access protocols, e.g., LTE, which may include exercising control over antenna system 2602, radio module 2604, and physical layer module 2608. Each of radio module 2604, physical layer module 2608, and control module 2610 may be structurally realized as a hardware-defined module, e.g., as one or more dedicate hardware circuits or FPGAs, as a software-defined module, e.g., as one or more processors executing program code that define arithmetic, control, and I/O instructions (e.g., software and/or firmware) stored in a non-transitory computer-readable storage medium, or as mixed hardware-defined and software-defined modules. In some aspects, radio module 2604 may be a radio transceiver including digital and analog radio frequency processing and amplification circuitry. In some aspects, radio module 2604 may be a software-defined radio (SDR) component implemented as a processor configured to execute software-defined instructions that specify radio frequency processing routines. In some aspects, physical layer module 2608 may include a processor and one or more hardware accelerators, wherein the processor is configured to control physical layer processing and offload certain processing tasks to the one or more hardware accelerators. In some aspects, control module 2610 may be a controller configured to execute software-defined instructions that specify upper-layer control functions. In some aspects, control module 2610 may be limited to radio communication protocol stack layer functions, while in other aspects control module 2610 may also be responsible for transport, internet, and application layer functions.

Network access node 2002 may interface with a core network and/or internet networks (directly/via a router or via the core network), which may be through a wired or wireless interface. Network access node 2002 may also interface with other network access nodes, such as network access nodes 2004 and 2006, over a wired or wireless interface. Network access node 2002 may thus provide the conventional functionality of network access nodes in radio communication networks by providing a radio access network to enable served terminal devices to access desired communication data.

Network access node 2002 may execute method 2500 at control module 2610, which may utilize antenna system 2602, radio module 2604, and physical layer module 2608 to transmit and receive signals. As shown in FIG. 25, in 2510, control module 2610 may broadcast channel configuration information that specifies multiple channel instances, which may include channel configuration information for channel instances provided by network access node 2002 in addition to channel instances provided by other network access nodes, such as network access node 2004 and network access node 2006.

In 2520, control module 2610 may receive a control message from a terminal device, e.g., terminal device 1502, that specifies a selected channel instance. As previously indicated, the selected channel instance may be provided at either network access node 2002 or at another network access node, which may or may not be the same radio access technology as network access node 2002. Accordingly, control module 2610 may identify in 2530 whether the selected channel instance is provided by a different or another network access node and, if so, may proceed to 2550 to notify the selected network access node. In some aspects, this may involve verifying with the selected network access node whether the selected network access node will accept or reject the selected channel instance and reporting such back to terminal device 1502. If the selected network access node accepts the selected channel instance in 2550, control module 2610 may report such back to terminal device 1502 (thus allowing terminal device 1502 to begin utilizing the selected channel instance). Conversely, if the selected network access node rejects the selected channel instance in 2550, control module 2610 may report the rejection to terminal device 1502 and potentially handle further relay of information between terminal device 1502 and the selected network access node to negotiate a new selected channel instance or a modified selected channel instance.

If the selected channel instance is provided by network access node 2002, control module 2610 may proceed to 2540 to accept or reject the selected channel instance (which may include negotiating a new or modified selected channel instance in the case of an initial rejection). Control module 2610 may determine whether terminal device 1502 is authorized to access the selected channel instance in 2540. If control module 2610 accepts the selected channel instance in 2540, control module 2610 may proceed to 2560 to transmit or receive data with terminal device 1502 with the selected channel instance. As previously indicated, such may include transmitting or receiving traffic or control data with terminal device 1502 on a selected traffic or control channel instance, providing paging messages to terminal device 1502 on a selected paging channel instance, etc. Conversely, if control module 2610 rejects the selected channel instance, control module 2610 may notify the terminal device of the rejection of the selected channel instance in 2570. The terminal device may then select another channel instance and transmit a control message specifying a new channel instance, which control module 2610 may receive in 2520 and continue with the rest of method 2500.

Furthermore, as indicated above regarding random access channel instances, in some aspects terminal devices may be able to unilaterally utilize random access channels, and may not transmit a control message specifying a selected random access channel instance. Instead, terminal devices may select a random access channel instance and proceed to utilize the random access channel instance. If the selected random access channel instance is not restricted (e.g., not a RACH subscription), control module 2610 may receive and process the RACH transmission on the selected random access channel instance as per conventional procedures. However, if the selected random access channel instance is restricted (e.g., is a RACH subscription), control module 2610 may, upon receipt of a RACH transmission on the selected random access channel instance, verify whether the transmitting terminal device is authorized to utilize the selected random access channel instance. If the transmitting terminal device is authorized to utilize the selected random access channel instance, control module 2610 may proceed as per conventional random access procedures. If the transmitting terminal device is not authorized to utilize the selected random access channel instance, control module 2610 may either ignore the RACH transmission or respond with a control message specifying that the transmitting terminal device is not authorized to utilize the selected random access channel instance.

As described above regarding FIGS. 23 and 24, in some aspects the radio access network may provide channel configuration information in a 'broadcast format', e.g., by broadcasting channel configuration information for the multiple channel instances to all nearby terminal devices. Additionally or alternatively to such a broadcast scheme, in some aspects network access nodes such as network access node 2002 may provide channel configuration information in response to queries from requesting terminal devices such as terminal device 1502.

Figure 27:
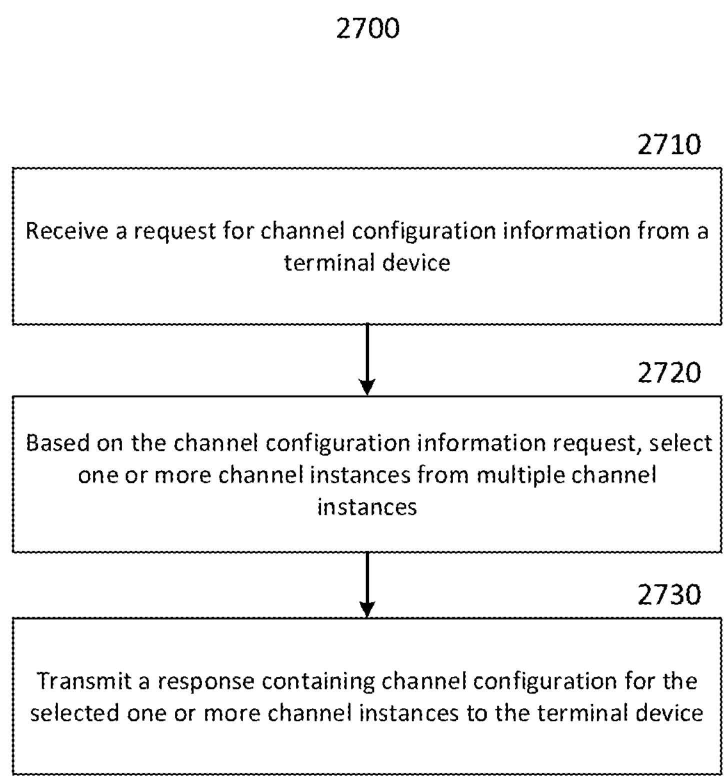
FIG. 27 shows an exemplary method for providing channel configuration information to requesting terminal devices in accordance with some aspects.

FIG. 27 shows method 2700 which control module 2610 may in some aspects execute at network access node 2002 in order to respond to queries for channel configuration information from terminal devices. As shown in FIG. 27, control module 2610 may receive a request for channel configuration information from controller 1610 of terminal device 1502 in 2710. The request may be a general request for channel configuration information for all channel instances, a request for channel configuration information for specific channel instances, or a request for channel configuration information for channel instances depending on a specified operational profile.

Control module 2610 may then select one or more channel instances from the available channel instances provided by the radio access network in 2720, e.g., PCH1, PCH2, PCH3, PCH4, RACH1, RACH2, CCH1, and CCH2. If the request received in 2710 is a general request for channel configuration information for all available channel instances, control module 2610 may simply select all available channel instances in 2720. If the request received in 2710 is a request for channel configuration information for specific channel instances, control module 2610 may select channel instances matching the specified channel instances in 2720. For example, the request may be for channel instances of a specific channel type, such as one or more of paging channel instances, random access channel instances, traffic data channel instances, or control channel instances, such as if controller 1610 is applying method 2300 in order to select a specific type of channel instance and may transmit the request in 2710 to request channel configuration information for the specific type of channel instance. Control module 2610 may then select channel instances matching the specific types of channel instances in 2720.

Alternatively, if the request received in 2710 is a request for channel configuration information for channel instances depending on a specified operational profile, controller 1610 may have transmitted a request in 2710 that specifies an operational profile for terminal device 1502 determined by controller 1610 (e.g., in 2320 as described above). Accordingly, the operational profile may indicate one or more of power efficiency requirements, latency requirements, or reliability requirements of terminal device 1502. Control module 2610 may then select one or more channel instances in 2720 that match the operational profile specified by controller 1610, such as using a similar or same procedure as described regarding controller 1610 in 2320 of method 2300, e.g., with preconfigured evaluation logic to identify channel instances with channel configurations that match a particular operational profile. Accordingly, in such cases control module 2610 may perform the operational profile-based evaluation of channel instances (as opposed to controller 1610 as previously described). Control module 2610 may either identify a single channel instance (e.g., a 'best match' based on the operational profile) or a group of channel instances (e.g., a group of 'best matches' based on the operational profile).

Control module 2610 may thus select one or more channel instances based on the channel configuration information request in 2720. Control module 2610 may then collect the channel configuration information for the selected one or more channel instances and transmit a response to terminal device 1502 containing the channel configuration information in 2730.

Accordingly, controller 1610 may receive the response containing the channel configuration information after transmission by network access node 2002. Controller 1610 may then select a channel instance based on the provided channel configuration information. If the initial channel configuration information request was a general request for channel configuration information for all available channel instances or for channel instances of a specific type, controller 1610 may select a channel instance from the specified channel instances based on the channel configuration information and the operational profile of terminal device 1502 (as previously described regarding 2320, e.g., using preconfigured evaluation logic). If the initial channel configuration information request included an operational profile, controller 1610 may utilize the channel instance specified by network access node 2002 as the selected channel instance (if control module 2610 provided only one channel instance based on the operational profile; controller 1610 may then proceed to 2330 to utilize the selected channel instance). Controller 1610 may alternatively evaluate the specified channel instances in order to select which of the specified channel instances best matches the operational profile of terminal device 1502 (and then proceed to 2330 to utilize the selected channel instance).

Figure 28:
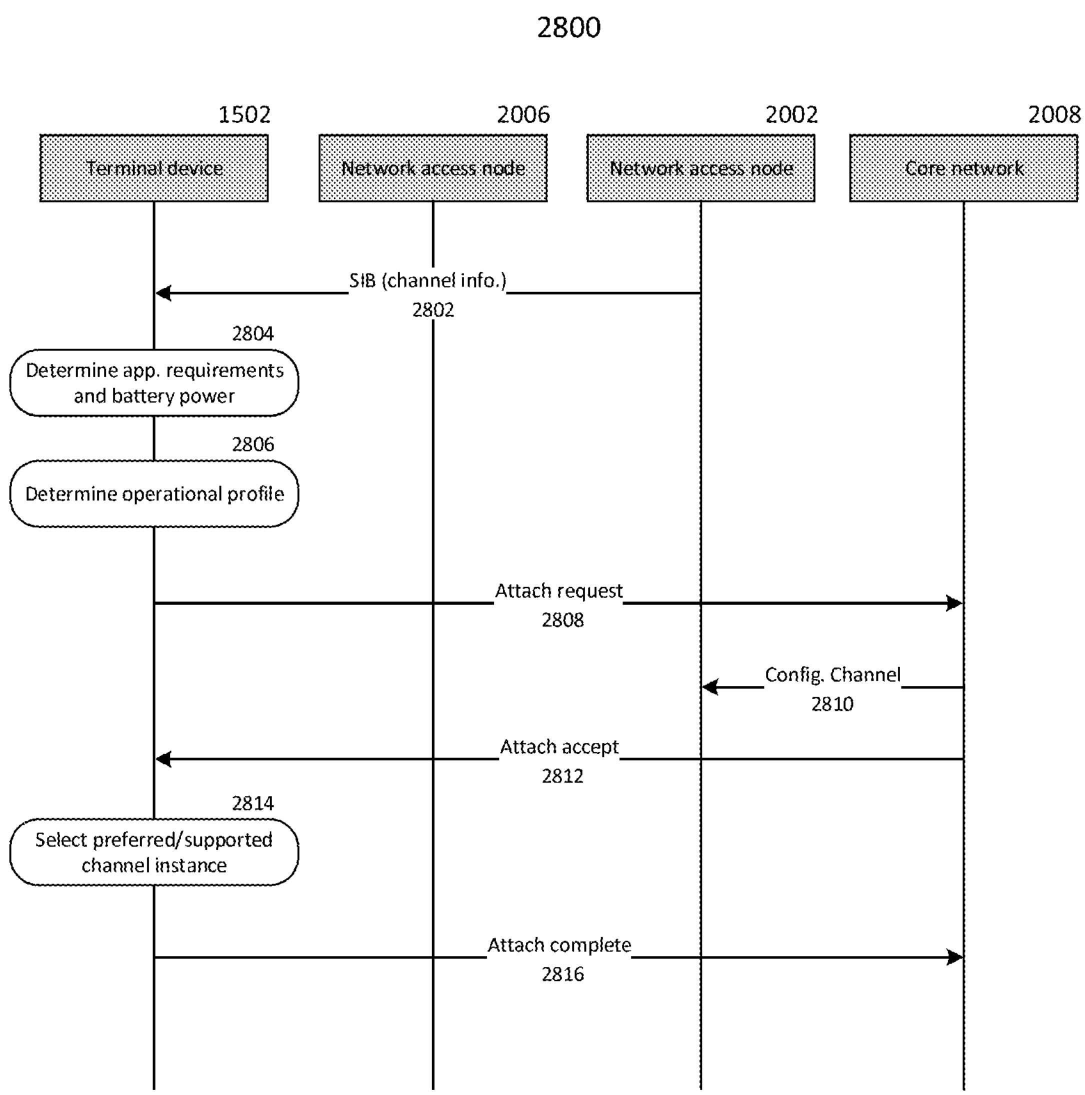
FIG. 28 shows an exemplary message sequence chart related to a procedure for selecting and attaching to a channel instance in accordance with some aspects.

FIG. 28 shows message sequence chart 2800 illustrating an exemplary operational flow according to some aspects. As shown in FIG. 28, network access node 2002 may broadcast system information in 2802 (e.g., as SIBs) that specify the current physical channel configuration information for the active channel instances. Terminal device 1502 may then determine the current power efficiency and connection requirements of terminal device 1502 in 2802, which may include identifying applications being executed at terminal device 1502. For example, an application processor of terminal device 1502 (at data source 1612/data sink 1616) may be executing mobile application 1, mobile application 2, and mobile application 3, which may have different latency, reliability, and power-efficiency requirements. Terminal device 1502 may collect such information in addition to a current power level of power supply 1618 in 2804. Terminal device 1502 may then determine an operational profile of terminal device 1502 in 2806 and provide the operational profile to a mobility control entity (e.g., an MME) of core network 2008 in the form of an attach request.

The mobility control entity may then decide whether to accept or reject the attach request. Optionally, in some aspects the mobility control entity may decide that a channel instance needs to be activated or reconfigured. For example, the mobility control entity may determine that terminal device 1502 should utilize a specific channel (e.g., RACH2) but that the channel instance has not been activated yet (e.g., by network access node 2002) or is not configured correctly. The mobility control entity may then instruct the network access node responsible for the channel instance (e.g., network access node 2002) to activate or reconfigure the channel instance in 2810.

The mobility control entity may then accept the attach request in 2812 with an attach accept. The attach accept may specify which channel instances terminal device 1502 should utilize (e.g., PCH1, PCH2, RACH2, PCCH2), where the attach accept may also provide different options of channel instances for terminal device 1502 to utilize (e.g., a choice between PCH1 and PCH2). If options are presented to terminal device 1502, terminal device 1502 may select a preferred or supported channel instance in 2814 (e.g., may select PCH2). Terminal device 1502 may then complete the attach by transmitting an attach complete in 2816, which may specify a selected channel instance (e.g., PCH2, in response to which the MME may instruct network access node 2002 to page terminal device 1502 only on PCH2).

Figure 29:
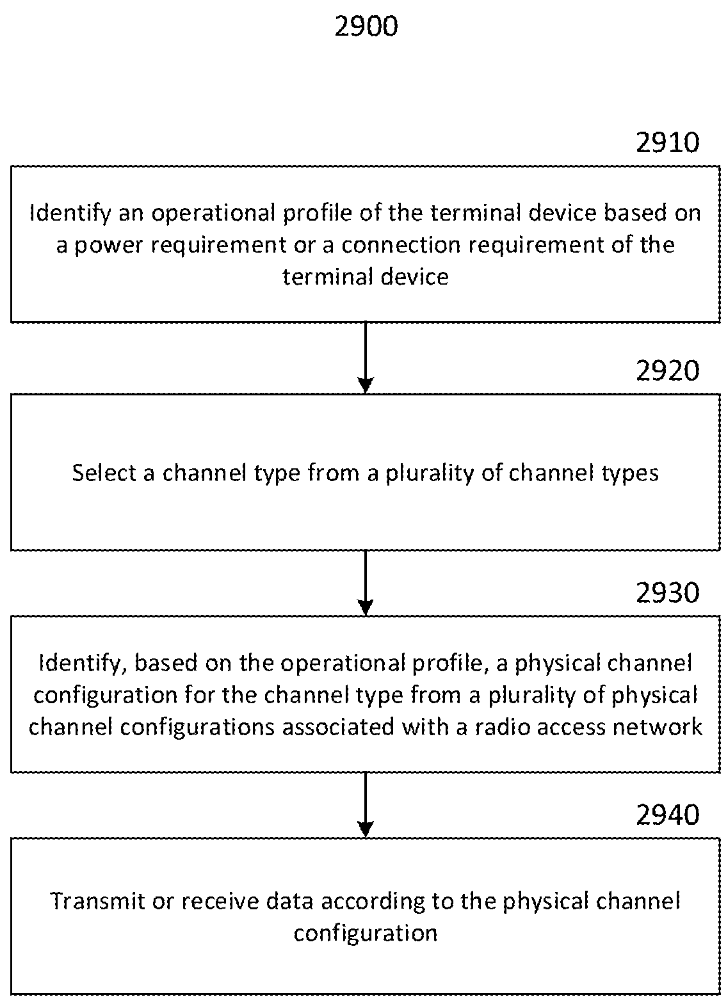
FIG. 29 shows an exemplary method for operating a terminal device in accordance with some aspects.

FIG. 29 shows method 2900 of operating a terminal device in accordance with some aspects. As shown in FIG. 29, method 2900 includes identifying an operational profile of the terminal device based on a power requirement or a connection requirement of the terminal device (2910), selecting a channel type from a plurality of channel types (2920), identifying, based on the operational profile, a physical channel configuration for the channel type from a plurality of physical channel configurations associated with a radio access network (2930), and transmitting or receiving data according to the physical channel configuration (2940).

Figure 30:
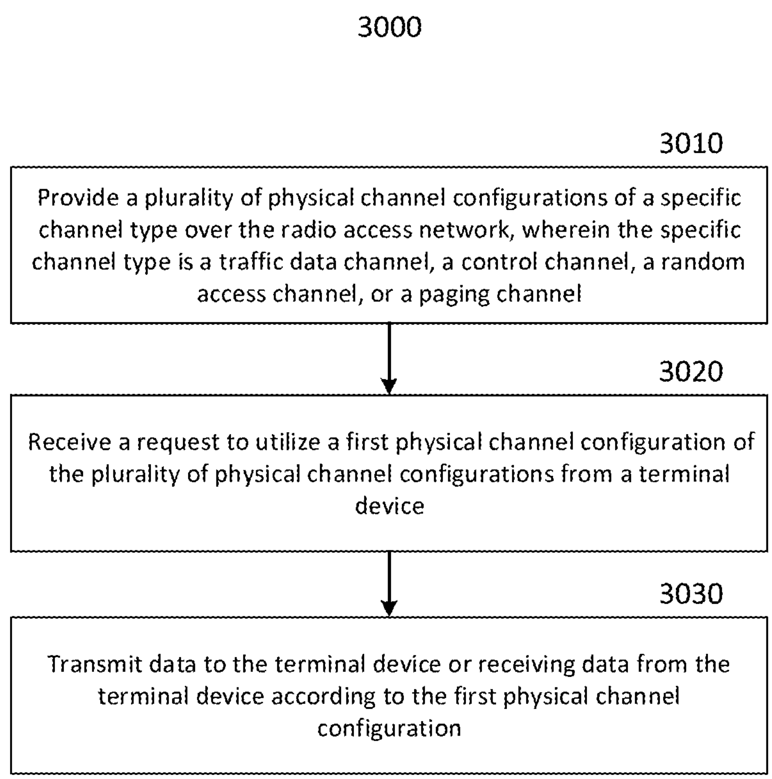
FIG. 30 shows an exemplary method for operating one or more network access nodes in accordance with some aspects.

FIG. 30 shows method 3000 of operating one or more network access nodes of a radio access network in accordance with some aspects of the disclosure. As shown in FIG. 30, method 3000 includes providing a plurality of physical channel configurations of a specific channel type over the radio access network (3010), wherein the specific channel type is a traffic data channel, a control channel, a random access channel, or a paging channel, receiving a request to utilize a first physical channel configuration of the plurality of physical channel configurations from a terminal device (3020), and transmitting data to the terminal device or receiving data from the terminal device according to the first physical channel configuration (3030).

Accordingly, various aspects of the disclosure may rely on cooperation between a radio access network and terminal devices in order to provide multiple channel instances for use by terminal devices. Terminal devices may therefore have the option to select between multiple channel instances of the same type of channel, thus enabling terminal devices to select channel instances dependent on a current operational profile of the terminal device that may be based on a number of factors such as power efficiency, low latency, reliability, probability, etc. The channel instances may be provided on different radio access technologies (where the various network access nodes may be interfaced and thus considered part of the same radio access network), which may accordingly enable terminal devices to select channel instances provided by desired radio access technologies.

2.2 Power-Efficiency #2

In accordance with another aspect of the disclosure, power, terminal device 1502 may optimize random access transmissions in order to conserve power. As previously described, terminal device 1502 may utilize random access procedures when establishing a connection with a network access node (e.g., transitioning from idle mode to connected mode or after an Out-of-Coverage (OOC) scenario), during handover to a network access node, or if timing synchronization is lost with a network access node (although other scenarios may trigger random access procedures depending on RAT-specific protocols). Accordingly, controller 1610 may identify the random access channel (e.g., PRACH in the case of LTE), including the timing and frequency resources allocated to the random access channel, and generate a random access preamble uniquely identifying terminal device 1502 (which controller 1610 may trigger at physical layer processing module 1608), and transmit a random access transmission containing the random access preamble on the radio resources allocated for the random access channel.

The target network access node, e.g., network access node 2002 without loss of generality, may monitor the random access channel for random access transmissions. Control module 2610 may therefore receive and decode random access transmissions (e.g., at physical layer module 2608) in order to identify random access preambles that identify terminal devices performing random access procedures. Control module 2610 may therefore decode and identify terminal device 1502 based on reception and identification of the random access transmission and may proceed to establish a connection with terminal device 1502 as per conventional random access procedures (which may vary based on RAT-specific protocols).

In order to allow network access node 2002 to successfully receive and process random access transmissions, terminal device 1502 may need to utilize a sufficient transmission power. If terminal device 1502 utilizes an insufficient transmission power, control module 2610 may not be able to correctly decode the random access preamble and random access procedures with terminal device 1502 may fail. However, random access transmission power may also be limited at terminal device 1502 by battery power constraints. For example, the use of a high random access transmission power may have a high battery power penalty.

According to an aspect of this disclosure, controller 1610 may utilize an 'optimal' random access transmission power that utilizes a minimum transmit power to achieve a target 'single shot RACH success rate' e.g., the rate at which a single random access transmission is successful. Controller 1610 may therefore balance transmission power and battery power usage with RACH success rate by using an optimal random access transmission power. A nonlimiting and exemplary target RACH success rate would be 95%; in other words, the probability of more than 2 RACH attempts is <1e-3. For this exemplary target RACH success rate, less than 1 out of 1000 LTE handover procedures with network timer T304 set to 50 ms (enough time for 2 RACH attempts) would fail.

Figure 31:
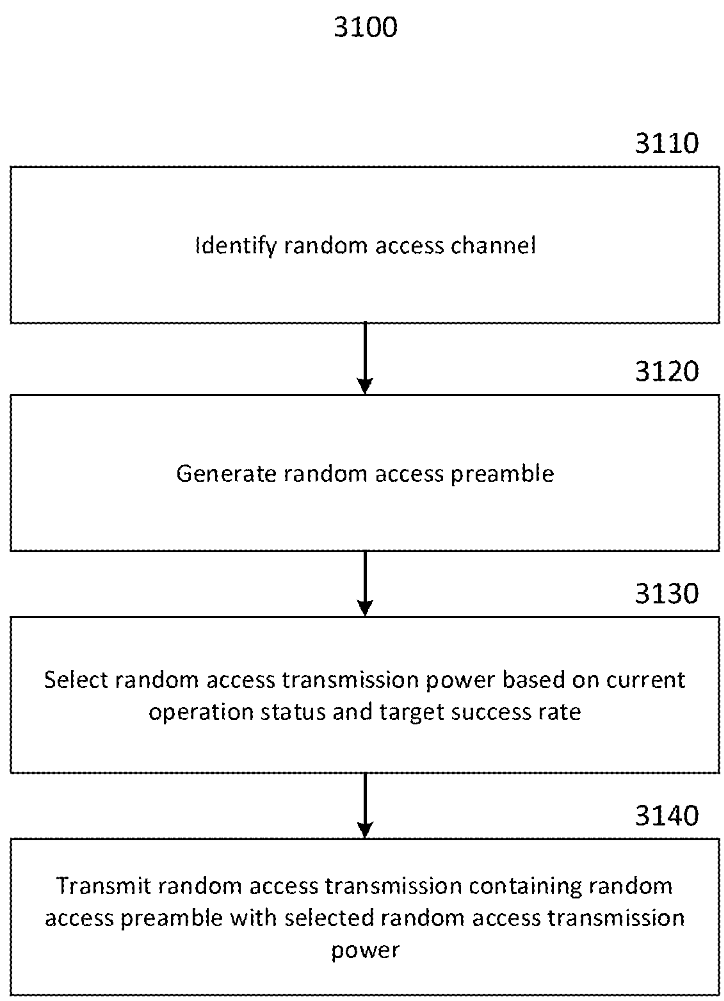
FIG. 31 shows an exemplary method for selecting a random access transmission power in accordance with some aspects.

FIG. 31 shows method 3100 according to some aspects, which controller 1610 may execute (via antenna system 1602, RF transceiver 1604, and physical layer processing module 1608) in order to perform random access procedures. Although described below in an exemplary LTE setting, controller 1610 may analogously perform method 3100 for random access procedures of any radio access technology according to the corresponding RAT-specific protocols. As shown in FIG. 31, controller 1610 may first in 3110 identify the random access channel of a target network access node, e.g., network access node 2002 without loss of generality. In an exemplary setting of LTE, controller 1610 may receive an SIB2 message from network access node 2002 and identify the PRACH configuration index in order to identify the random access channel. Controller 1610 may then generate a random access preamble that identifies terminal device 1502 in 3120, where the specific format of the random access preamble may be RAT-specific.

Following random access preamble generation, controller 1610 may select a random access transmission power based on a current operation status of terminal device 1502 in 3130. Accordingly, controller 1610 may attempt to select a random access transmission power that optimally balances between battery penalty and RACH success rate. In particular, controller 1610 may apply an algorithm in 3130 in order to determine the random access transmission power based on the current operation status, where the algorithm relies on status factors such as power-efficiency requirements, connection requirements, network environment data (e.g., radio measurements, cell load metrics, etc.), collision probability, current battery consumption rates, and current battery power level. Controller 1610 may thus input such quantitative factors to the algorithm in order to determine a random access transmission power that produces a target RACH success rate. The algorithm may thus output a random access transmission power that provides an 'optimum' transmission power, e.g., results in a minimum amount of energy being consumed by terminal device 1502 in order to perform a successful RACH procedure.

In some aspects, the algorithm employed by controller 1610 to select the random access transmission power in 3130 may be based on historical trace log data and modem power consumption data. Accordingly, the algorithm may be developed using offline training that considers data that characterizes power consumption and RACH success, for example supervised machine learning algorithms, like support vector machines, artificial neural networks or hidden Markov models may be trained with historical trace log data captured during regular inter-operability lab testing and field testing at cellular modem development time. The historical data may cover both cell center and cell edge conditions in order to accurately reflect a wide range of mobility scenarios. The algorithm may therefore learn how the aforementioned factors of data connection latency requirements, network environment data (e.g., radio measurements, cell load metrics, etc.) collision probability, current battery consumption rates, and current battery power level interact based on the historical data and may accordingly be able to effectively determine random access transmission powers that considers such factors. The algorithm may additionally employ runtime machine learning in order to adapt random access transmission powers based on actual observations of successful and unsuccessful random access transmissions, for example the random access transmission power level for the next random access attempt may be determined with supervised or unsupervised machine learning algorithms such as reinforcement learning, genetic algorithms, rule-based learning support vector machines, artificial neural networks, Bayesian-tree models, or hidden Markov models as a one-step ahead prediction based on actual observations of successful and unsuccessful random access transmissions and the aforementioned factors of data connection latency requirements, network environment data (e.g., radio measurements, cell load metrics, etc.) collision probability, current battery consumption rates, and current battery power level over a suitable past observation window.

After completion of 3130, controller 1610 may transmit a random access transmission to network access node 2002 that contains the random access preamble with the selected random access transmission power in 3140. Controller 1610 may then proceed with the random access procedure as per convention. Assuming that the selected random access transmission power was sufficient and no contention or collisions occurred, network access node 2002 may be able to successfully receive and decode the random access transmission to identify terminal device 1502 and proceed to establish a connection with network access node 2002.

2.3 Power-Efficiency #3

According to another aspect of this disclosure, terminal device 1502 may utilize a hardware configuration that enables scheduling-dependent activation or deactivation of certain hardware components. For example, the hardware design of terminal device 1502 (particularly e.g., physical layer processing module 1608) may be 'modularized' so that hardware components dedicated to specific functions, such as channel measurement, control channel search, and beamforming tracking hardware, may be deactivated during periods of inactivity. The radio access network may cooperate by utilizing specific scheduling settings that will allow terminal device 1502 to maximize power savings by frequently powering down such components. Although not limited to any particular RAT, aspects of the disclosure may be particularly applicable to LTE and 5G radio access technologies, such as millimeter wave (mmWave) other 5G radio access technologies.

Figure 32:
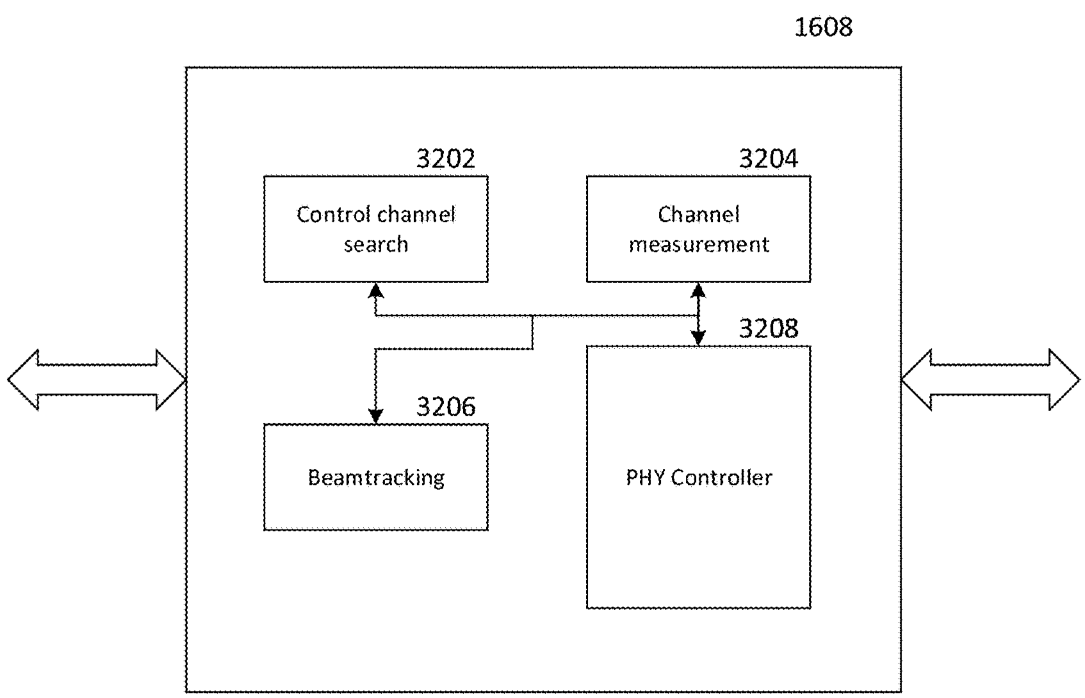
FIG. 32 shows an exemplary internal configuration of a physical layer processing module using modularization in accordance with some aspects.

As noted above, modularization may be particularly applicable for physical layer processing module 1608. As opposed to many protocol stack layer (Layers 2 and 3) tasks, most physical layer tasks may be highly processing-intensive and thus may be more suited to hardware implementation, such as in the form of dedicated hardware such as ASICs. Accordingly, physical layer processing module 1608 may be implemented as multiple different physical layer hardware components that are each dedicated to a unique physical layer task, such as control channel search, radio channel measurements, beamtracking, and a number of other similar functions. FIG. 32 shows an exemplary internal configuration of physical layer processing module 1608, which may include control channel search module 3202, channel measurement module 3204, beamtracking module 3206, and PHY controller 3208. Although not explicitly shown in FIG. 32, physical layer processing module 1608 may include a number of additional hardware and/or software components related to any one or more of error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc.

PHY controller 3208 may be implemented as a processor configured to execute program code for physical layer control logic software stored in a non-transitory computer readable medium (not explicitly shown in FIG. 32). Accordingly, PHY controller 3208 may control the other various components of physical layer processing module 1608 to perform the appropriate physical layer processing functions for both uplink data received from controller 1610 and provided to RF transceiver 1604 and downlink data received from RF transceiver 1604 and provided to controller 1610.

In contrast to the software implementation of PHY controller 3208, each of control channel search module 3202, channel measurement module 3204, and beamtracking module 3206 may be implemented as hardware, such as an application-specific circuit (e.g., an ASIC) or reprogrammable circuit (e.g., an FPGA). Control channel search module 3202, channel measurement module 3204, and beamtracking module 3206 may in some aspects also include software components. Further, each of control channel search module 3202, channel measurement module 3204, and beamtracking module 3206 may be 'modularized' and therefore may be able to be independently operated and activated. Accordingly, any one of control channel search module 3202, channel measurement module 3204, and beamtracking module 3206 may be activated/deactivated and powered up/down independent of any other components of physical layer processing module 1608. Channel search module 3202, channel measurement module 3204, and beamtracking module 3206 may be located in different physical chip areas of physical layer processing module 1608 to allow for entire areas of the chip to be turned off. In some aspects, one or more of control channel search module 3202, channel measurement module 3204, and beamtracking module 3206 may have different activation levels, such as varying levels of idle, sleep, and active states. Accordingly, PHY controller 3208 may be configured to independently control one or more of control channel search module 3202, channel measurement module 3204, and beamtracking module 3206 to operate at these different activation levels.

PHY controller 3208 may trigger activation and operation of control channel search module 3202, channel measurement module 3204, and beamtracking module 3206 according to the physical layer protocols for the relevant radio access technology. For example, where PHY controller 3208, control channel search module 3202, channel measurement module 3204, and beamtracking module 3206 are designed for LTE operation, PHY controller 3208 may trigger activation and operation of control channel search module 3202, channel measurement module 3204, and beamtracking module 3206 according to LTE physical layer protocols for an LTE radio access connection handled by physical layer processing module 1608. Accordingly, PHY controller 3208 may trigger operation of control channel search module 3202 when control channel data processing is received (e.g., for PDCCH search), operation of channel measurement module 3204 when channel measurement is called for (e.g., to perform reference signal measurements such as Cell-Specific Reference Signal (CRS) and other reference signal occasions), and operation of beamtracking module 3206 when periodic beamtracking is called for to support beamforming communications (e.g., for mmWave or massive MIMO systems These aspects can be used with common channel aspects, e.g., a common channel utilizing a hardware configuration that enables scheduling-dependent activation or deactivation of certain hardware components. 0818). Accordingly, depending on the flow of an LTE connection supported by physical layer processing module 1608, PHY controller 3208 may trigger operation of any of control channel search module 3202, channel measurement module 3204, and beamtracking module 3206 at varying points in time.

PHY controller 3208 may deactivate and/or power power-down control channel search module 3202, channel measurement module 3204, and beamtracking module 3206 during respective periods of inactivity for each module. This may be done to reduce power consumption and conserve battery power (e.g., at power supply 1618). Accordingly, PHY controller 3208 may deactivate and/or power down control channel search module 3202 (e.g., when there is no control channel data to decode, such as during the time period after each PDCCH has been decoded and before the next PDCCH in LTE), channel measurement module 3204 (e.g., when there is no signal to perform channel measurement on, such as during time periods when no reference signals are received), and beamtracking module 3206 (e.g., when beamtracking is not needed, such as during time periods in between periodic beamtracking occasions).

Physical layer processing module 1608 may minimize power consumption by powering down components such as control channel search module 3202, channel measurement module 3204, and beamtracking module 3206. According to an exemplary aspect, the physical layer processing module 1608 may power down the components (e.g., as often as possible). However, scheduling of the radio access connection supported by physical layer processing module 1608 may dictate when such power-downs are possible. For example, PHY controller 3208 may need to activate control channel search module 3202 for the control region (PDCCH symbols) of LTE subframes in order to decode the control data, which may limit the occasions when PHY controller 3208 can power down control channel search module 3202. Likewise, PHY controller 3208 may only be able to power down channel measurement module 3204 and beamtracking module 3206 during time periods when the scheduling of the radio access connection channel does not require channel measurement and beamtracking, respectively.

In accordance with an exemplary aspect of this disclosure, the radio access network may utilize specialized scheduling to enable terminal device 1502 to implement power saving measures more frequently. For example, the specialized scheduling may limit periods when operation of dedicated hardware such as control channel search module 3202, channel measurement module 3204, and beamtracking module 3206 is necessary and accordingly may allow PHY controller 3208 to conserve power by frequently powering down such components. In some aspects, PHY controller 3208 may utilize a machine learning technique such as supervised or unsupervised learning, reinforcement learning, genetic algorithms, rule-based learning support vector machines, artificial neural networks, Bayesian-tree models, or hidden Markov models to determine when and to what extent to implement the power saving measures. In some aspects, PHY controller 3208 may continuously learn and/or update the scheduling of the power saving measures.

Figure 33:
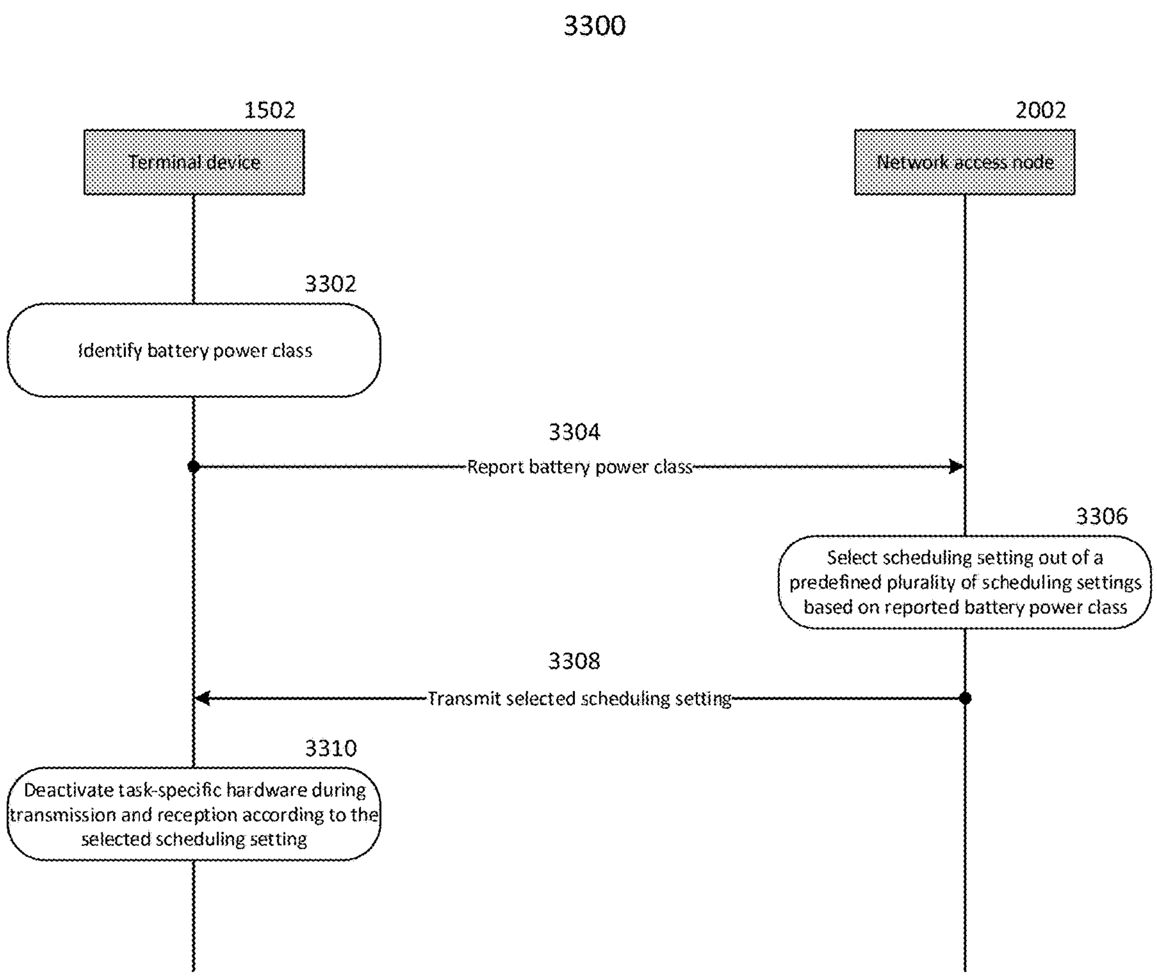
FIG. 33 shows an exemplary message sequence chart related to a procedure for arranging a scheduling setting for a modularized physical layer processing module in accordance with some aspects.

FIG. 33 shows method 3300, which may be executed at a terminal device e.g., terminal device 1502, and a network access node e.g., network access node 2002. Although the following description of FIG. 33 may explicitly reference LTE, this description is demonstrative and method 3300 may be analogously applied for any radio access technology.

Terminal device 1502 may employ method 3300 to utilize specialized scheduling settings with cooperation from the radio access network. In the setting of method 3300, terminal device 1502 may utilize a 'battery power class' scheme in order to indicate a current battery power level to network access node 2002, in response to which network access node 2002 may assign terminal device 1502 a scheduling setting dependent on the battery power class. Battery power classes that indicate low battery power may prompt network access node 2002 to assign more power efficient scheduling settings to terminal device 1502.

Accordingly, in process 3302 controller 1610 may identify a battery power class of terminal device 1502. For example, controller 1610 may monitor power supply 1618 to identify a current battery power level of power supply 1618, which may be e.g., expressed as a percentage or a watt-hours level. Controller 1610 may then determine a battery power class based on the current battery power level, where the battery power class scheme may have a predefined number of battery power classes that are each assigned to a range of battery power levels. For example, a four-level battery power class scheme may have a first battery power class for battery power levels between 100-90%, a second battery power class for battery power levels between 90-50%, a third battery power class for battery power levels between 50-30%, and a fourth battery power class for battery power levels between 30-0%. While exemplary percentage ranges are provided, the underlying principles can be applied for different ranges. Controller 1610 may therefore compare the current battery power level of power supply 1618 to the thresholds in the battery power class scheme to determine which battery power class is correct. Other battery power class schemes may be similarly defined with more or less battery power classes and different thresholds, such as a two-level battery power class scheme with a high power setting (e.g., 50% and above) and a low power setting (e.g., less than 50%) or an unlimited-level battery power class scheme that reports the absolute battery power (expressed e.g., as a percentage or watt-hours) instead of the 'piece-wise' battery power class schemes noted above.

As shown in FIG. 33, controller 1610 may then report the battery power class to network access node 2002 in 3304, e.g., as a control message. Control module 2610 may receive the battery power class report at network access node 2002. Control module 2610 may then proceed to select a scheduling setting for terminal device 1502 depending on the reported battery power class in 3306. As previously indicated, such scheduling settings may be designed to enable terminal device 1502 to selectively deactivate certain hardware components during periods of inactivity. As the battery power class reported by terminal device in 3304 is indicative of a current battery power level, control module 2610 may select scheduling settings in process 3306 that enable higher energy savings for low battery power classes (e.g., the exemplary third or further battery power classes introduced above). As such power-efficient scheduling settings may also result in slight performance degradations, in an exemplary aspect control module 2610 may not select such battery power classes for high battery power classes. Accordingly, control module 2610 may select the scheduling setting for terminal device 1502 based on the reported battery power class.

Control module 2610 may select the scheduling setting from a predefined plurality of scheduling settings that may each provide varying levels of energy savings to terminal devices. In the setting of FIG. 32, the scheduling settings may enable terminal device 1502 to deactivate one or more of control channel search module 3202, channel measurement module 3204, and beamtracking module 3206 for extended periods of time. Control module 2610 may therefore have a predefined plurality of different scheduling settings to select from that offer varying levels of energy savings based on the inactivity time of the modularized modules of physical layer processing module 1608.

For example, in an exemplary LTE setting, PHY controller 3208 may utilize control channel search module 3202 to search for control messages addressed to terminal device 1502 in the control region of each downlink subframe (as noted above with respect to FIG. 17, e.g., DCI messages addressed to terminal device 1502 with an RNTI). As specified by the 3GPP, there may be a large set of overlapping groups of REs in the control region that can each contain a control message, e.g., 'PDCCH candidates'. Accordingly, control channel search module 3202 may decode and check these PDCCH candidates in order to identify control messages addressed to terminal device 1502. This control channel search procedure may require processing resources and, given that the control region of each downlink subframe may be searched, could have a battery power penalty.

Accordingly, if terminal device 1502 reports a low-battery power class in 3304, control module 2610 may select a scheduling setting that reduces the amount of time that control channel search module 3202 needs to be active. Specifically, control module 2610 may select a scheduling setting in 3306 in which control messages addressed to terminal device 1502 will maintain the same position within the control region (e.g., the same PDCCH candidate) for each subframe. Accordingly, as opposed to checking each control message candidate location, PHY controller 3208 may only instruct control channel search module 3202 to search the dedicated control message position (e.g., the REs assigned to the PDCCH candidate dedicated to terminal device 1502). PHY controller 3208 may therefore only need to activate control channel search module 3202 for a reduced period of time to decode the dedicated control message position for each downlink subframe and may deactivate control channel search module 3202 during other times, thus conserving battery power. As an alternative to utilizing a single dedicated control message position, control module 2610 may select a scheduling setting in 3306 in which control messages addressed to terminal device 1502 will be located in a reduced subset of the candidate control message positions of the control region. Such may provide control module 2610 with greater flexibility in transmitting control messages (as control module 2610 may need to fit control messages for all terminal devices served by network access node 2002 into the control region) while still reducing the amount of time that control channel search module 3202 needs to be active for decoding. Additionally or alternatively, control module 2610 may select a scheduling setting that uses a temporary fixed control message candidate location scheme, where control messages addressed to terminal device 1502 will remain in a fixed control message location for a predefined number of subframes. Such may likewise reduce the amount of time that control channel search module 3202 needs to be active as control channel search module 3202 may only need to periodically perform a full control message search while maintaining a fixed control message location for all other subframes.

Additionally or alternatively to the fixed/reduced control message candidate location scheme, if terminal device 1502 reports a low-battery power class in 3304, control module 2610 may select a scheduling setting that reduces the amount of time that channel measurement module 3204 needs to be active. Specifically, control module 2610 may select a scheduling setting in 3306 in which terminal device 1502 is not required to perform and report channel measurements to network access node 2002. For example, in an LTE setting terminal device 1502 may need to periodically perform radio channel measurements on downlink reference signals (e.g., CRS signals) transmitted by network access node 2002, which PHY controller 3208 may perform at channel measurement module 3204. PHY controller 3208 may then either report these radio channel measurements back to network access node 2002 (e.g., for network access node 2002 to evaluate to determine an appropriate downlink modulation and coding scheme (MCS)) or utilize the radio channel measurements to assist in downlink decoding (e.g., for channel equalization). Performing such radio channel measurements necessarily consumes power at channel measurement module 3204, such that control module 2610 may select a scheduling setting in 3306 that instructs terminal device 1502 to skip radio channel measurements or perform radio channel measurements less frequently. As either case will involve less necessary operation time for channel measurement module 3204, PHY controller 3208 may conserve battery power by deactivating channel measurement module 3204 unless a radio channel measurement has to be performed according to the scheduling setting.

Additionally or alternatively to the fixed/reduced control message candidate location scheme and the channel measurement deactivation scheme, if terminal device 1502 reports a low-battery power class in 3304, control module 2610 may select a scheduling setting that reduces the amount of time that beamtracking module 3206 needs to be active. PHY controller 3208 may utilize beamtracking module 3206 to track antenna beamsteering configurations, which may be employed in advanced radio access technologies such as mmWave and other '5G' radio access technologies. As such technologies utilize very high carrier frequencies, path loss may be an issue. Accordingly, many such radio access technologies may employ highly sensitive beamsteering systems in order to counter pathloss with antenna gain. According to an exemplary aspect, PHY controller 3208 may therefore employ beamtracking module 3206 to process received signals to determine beamsteering directions, which may require constant tracking in order to monitor changes or blockages in the transmission beams. The tracking processing performed by beamtracking module 3206 may thus be frequent (e.g., occur less often in time) in addition to computationally intensive and may therefore have high battery power penalties. Accordingly, control module 2610 may select a scheduling setting in 3306 that instructs terminal device 1502 to either deactivate beamtracking or to perform beamtracking less frequently. Such may consequently enable PHY controller 3208 to deactivate beamtracking module 3206 more frequently and thus conserve power.

Each of the fixed/reduced control message candidate location scheme, channel measurement deactivation scheme, and reduced beamtracking scheme may therefore enable physical layer processing module 1608 to conserve power by deactivating one or more of control channel search module 3202, channel measurement module 3204, and beamtracking module 3206 at more frequent periods in time. Assuming control channel search module 3202, channel measurement module 3204, and beamtracking module 3206 are 'modularized', e.g., physically realized separately with the ability to independently deactivate, PHY controller 3208 may be able to deactivate (or trigger a low-power or sleep state) at each of control channel search module 3202, channel measurement module 3204, and beamtracking module 3206 during respective periods of inactivity as provided by the various scheduling settings. The deactivation or triggering of low-power or sleep state, can be made at each of the channel search module 3202, channel measurement module 3204, and beamtracking module 3206, or can be made selectively at one or more of the modules.

The scheduling settings available to control module 2610 may additionally include features not directly related to a modularized hardware design at terminal device 1502. For example, certain scheduling settings may utilize a fixed MCS and/or data channel position (e.g., PDSCH). Given such scheduling settings, physical layer processing module 1608 may be able to conserve power as a result of such fixed scheduling. Additionally or alternatively, certain scheduling settings may provide fixed and guaranteed uplink grants, where resource allocations for uplink data transmissions are guaranteed for terminal device 1502. Accordingly, instead of waking up and requesting permission to perform an uplink transmission via a scheduling request, terminal device 1502 may instead be able to wake up and directly proceed to utilize the guaranteed uplink grant resource allocation to perform an uplink transmission.

Additionally or alternatively, network access node 2002 may employ a 'data queuing' scheme as a component of the selected scheduling setting. For example, if terminal device 1502 reports a low-battery power class in 3304, control module 2610 may select a scheduling setting in 3306 that will 'queue' downlink data intended for terminal device 1502 at network access node 2002. Accordingly, when downlink data arrives at network access node 2002 from the core network that is addressed to terminal device 1502 (e.g., application data), network access node 2002 may check whether terminal device 1502 is currently in an idle or active state. If terminal device 1502 is in an active state, network access node 2002 may proceed to transmit the data. Conversely, if terminal device 1502 is in an idle state, network access node 2002 may refrain from providing terminal device 1502 with a paging message as per convention; instead, network access node 2002 may queue the data (e.g., temporarily store the data) and wait until terminal device 1502 enters an active state at a later time (e.g., when a voice or data connection is triggered by a user). Once terminal device 1502 enters an active state, network access node 2002 may transmit the waiting data. Such may allow terminal device 1502 to conserve power by having terminal device 1502 enter an active state a single time as opposed to multiple separate times.

The predefined plurality of scheduling settings available to control module 2610 for selection in 3306 may include any one or more of such features described above, including in particular scheduling settings such as the fixed/reduced control message candidate location scheme, channel measurement deactivation scheme, and reduced beamtracking scheme which may enable terminal devices to take advantage of modularized hardware designs to conserve power. As previously indicated, the predefined plurality of scheduling settings may contain individual scheduling settings that are designed for varying power efficiency levels. For example, certain scheduling settings may offer greater power efficiency than other scheduling settings (which may come with some performance cost) by incorporating more of the above-described features. While the predefined plurality of scheduling settings may be readily configurable, the full set of the predefined plurality of scheduling settings may be known at both terminal device 1502 and network access node 2002.

Control module 2610 may therefore select a scheduling setting out of the predefined plurality of scheduling settings in 3306 based on the battery power class reported by terminal device 1502 in 3304. Control module 2610 may utilize a predetermined mapping scheme, where each battery power class may be mapped to a specific scheduling setting. Control module 2610 may additionally be configured to consider factors other than battery power class in selecting the scheduling setting in 3306, such as current cell load and/or current radio conditions.

After selecting a scheduling setting in 3306, control module 2610 may transmit the selected scheduling setting to terminal device 1502 in 3308, e.g., as a control message. Terminal device 1502 may then apply the selected scheduling setting in 3310 (where controller 1610 may be responsible for upper layer scheduling while PHY controller 3208 is responsible for physical layer tasks). Accordingly, given the selected scheduling setting PHY controller 3208 may control the control channel search module 3202, channel measurement module 3204, and beamtracking module 3206 according to the selected scheduling setting by deactivating control channel search module 3202, channel measurement module 3204, and beamtracking module 3206 during respective periods of inactivity. For example, PHY controller 3208 may deactivate control channel search module 3202 according to periods of inactivity related to a fixed/reduced control message candidate location scheme of the selected scheduling setting (if applicable), deactivate channel measurement module 3204 according to periods of inactivity related to a channel measurement deactivation scheme of the selected scheduling setting (if applicable), and deactivate beamtracking module 3206 according to periods of inactivity related to a reduced beamtracking scheme of the selected scheduling setting (if applicable). PHY controller 1608 may additionally realize power savings through fixed MCS and/or resource allocation (uplink or downlink) according to the selected scheduling setting (if applicable). Terminal device 1502 may therefore conserve power in 3310 as a result of the selected scheduling setting provided by network access node 2002.

Figure 34:
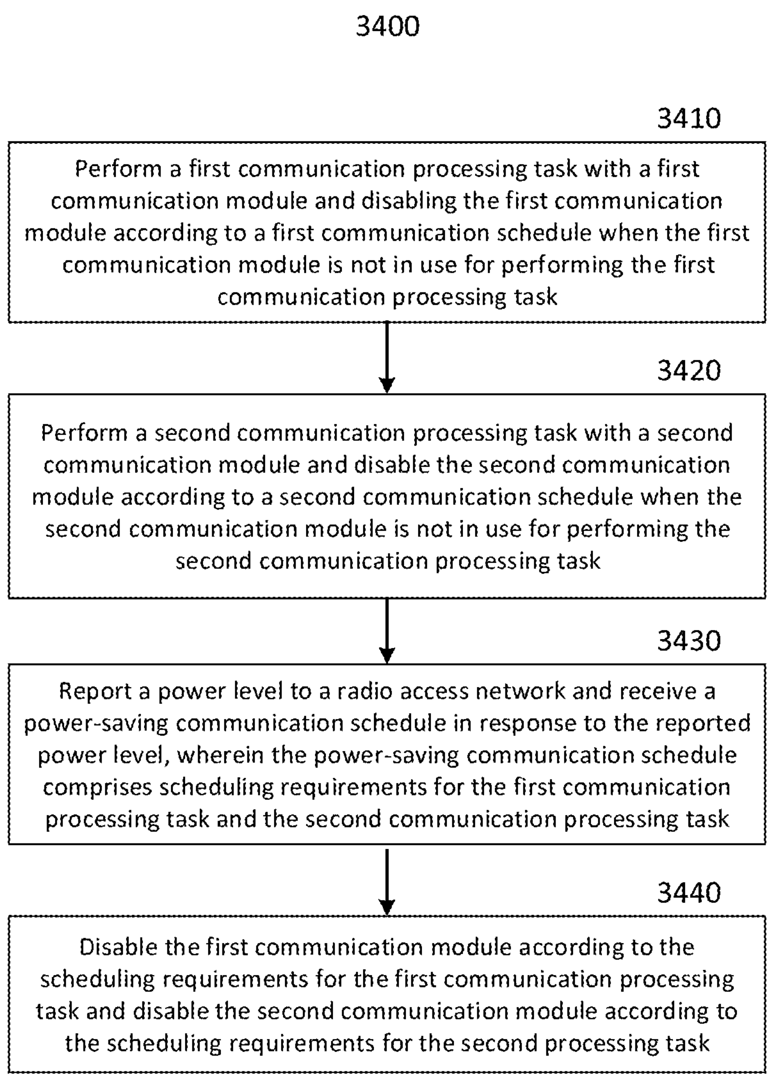
FIG. 34 shows an exemplary method for operating a communication module arrangement in accordance with some aspects.

FIG. 34 shows method 3400 of operating a communication module arrangement in accordance with an aspect of the disclosure. As shown in FIG. 34, method 3400 includes performing a first communication processing task with a first communication module and disable the first communication module according to a first communication schedule when the first communication module is not in use for performing the first communication processing task (3410). A second communication processing task is performed with a second communication module and the second communication module is temporarily disabled according to a second communication schedule when the second communication module is not in use for performing the second communication processing task (3420). A power level is reported to a radio access network and a power-saving communication schedule is received in response to the reported power level. The power-saving communication schedule may include scheduling requirements for the first communication processing task and the second communication processing task (3430), and disabling the first communication module according to the scheduling requirements for the first communication processing task and disabling the second communication module according to the scheduling requirements for the second processing task (3440).

Cooperation with a network access node, such as network access node 2002, may therefore be relied on to select scheduling settings based on a reported battery power. The predefined plurality of scheduling settings may therefore include various different scheduling settings that enable terminal devices, in particular terminal devices with modularized hardware designs such as terminal device 1502, to selectively deactivate hardware components in order to conserve power. While the above-described examples explicitly refer to specific hardware components (control channel search module 3202, channel measurement module 3204, and beamtracking module 3206) that are included as PHY-layer components, other types of modules including both PHY and non-PHY layer modules may be employed in an analogous manner, e.g., by deactivating during periods of inactivity according to a specialized scheduling setting in order to conserve power. For example, other types of modules to which these aspects can be applied include processors, which can be configured with sleep/wake schedules and/or frequency scaling (which other modules can also use).

2.4 Power-Efficiency #4

In accordance with a further aspect of the disclosure, a terminal device may adapt downlink and uplink processing based on current operating conditions of the terminal device including battery power level and radio conditions. For example, a terminal device may employ lower-complexity demodulation and receiver algorithms in the downlink direction if strong radio conditions and/or low battery power levels are observed. Additionally, the terminal device may modify uplink processing by disabling closed-loop power control, adjusting transmission power, and/or reducing RF oversampling rates if strong radio conditions and/or low battery power levels are observed. Additionally, a terminal device may employ dynamic voltage and frequency scaling to further reduce power consumption if low battery power and/or strong radio conditions are observed. These aspects may be used with common channel aspects, e.g., a common channel employing variable complexity demodulation and receiver algorithms depending on radio conditions or battery power levels.

Figure 35:
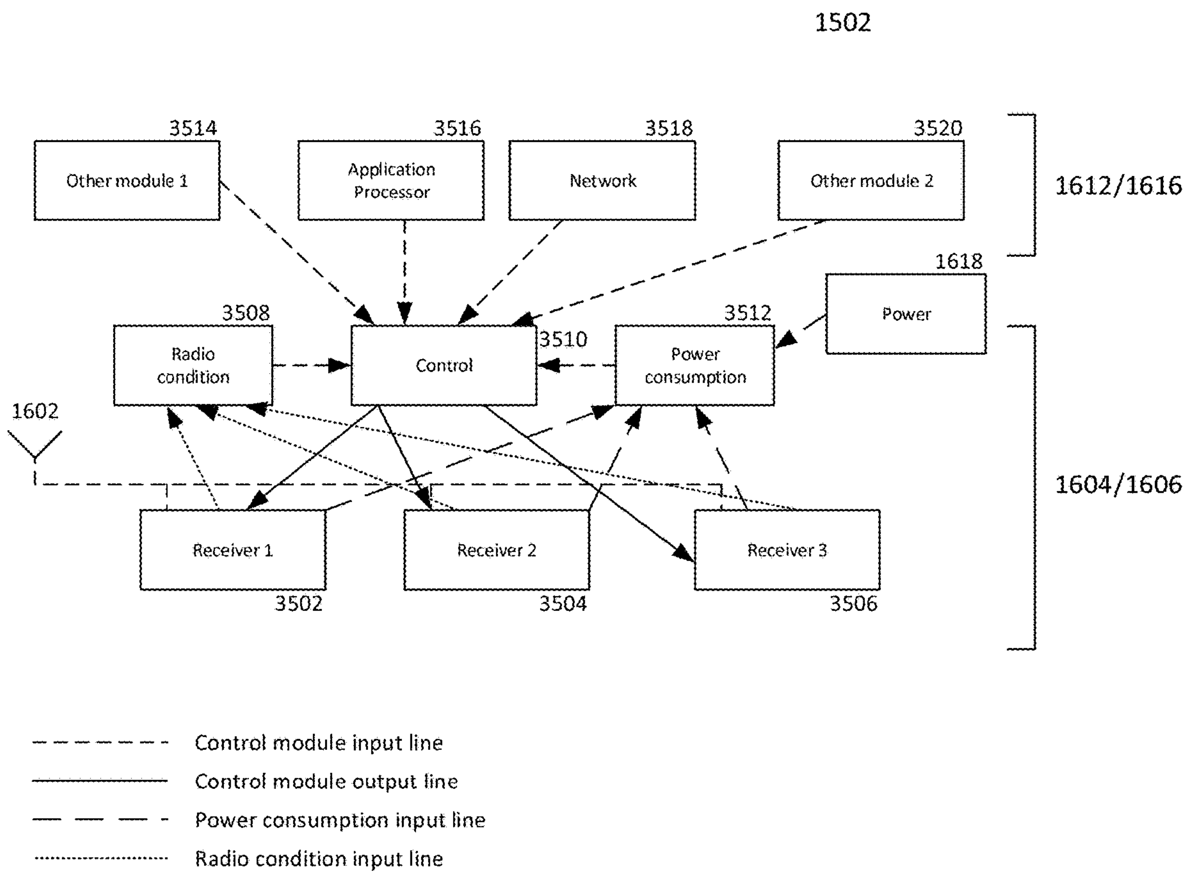
FIG. 35 shows a first exemplary internal configuration of a terminal device in accordance with some aspects.

FIG. 35 shows an exemplary internal architecture of terminal device 1502 in accordance with some aspects of an aspect of this disclosure. As shown in FIG. 35, terminal device 1502 may include antenna 1602, first receiver 3502, second receiver 3504, third receiver 3506, radio condition module 3508, control module 3510, power consumption module 3512, power supply 1618, other module 3514, application processor 3516, network module 3518, and other module 3520. As denoted in FIG. 35, first receiver 3502, second receiver 3504, third receiver 3506, radio condition module 3508, control module 3510, and power consumption module 3512 may be included as part of RF transceiver 1604 and/or baseband modem 1606 of terminal device 1502 while other module 3514, application processor 3516, network module 3518, and other module 3520 may be included as part of data source 1612 and/or data sink 1616 of terminal device 1502.

Receivers 3502, 3504, and 3506 may perform downlink processing on radio signals provided by antenna system 1602 as previously discussed with respect to terminal device 1502. In some aspects, each of receivers 3502, 3504, and 3506 may be physically distinct receiver structures (e.g., structurally separate receiver instances each implemented as different hardware and/or software components) or may be different configurations of one or more single receiver structures. For example, in some aspects each of receivers 3502, 3504, and 3506 may be implemented as separate hardware and/or software components (e.g., physically distinct) or may be different configurations of the same hardware and/or software components (e.g., different configurations of a single receiver structure). Regardless, the reception processing performed by each of receivers 3502, 3504, and 3506 may be different. For example, each of receivers 3502, 3504, and 3506 may utilize different receiver algorithms, hardware components, software control, etc. Accordingly, receivers 3502, 3504, and 3506 may each have different reception performance and different power consumption. Generally speaking, receivers with higher performance yield higher power consumption. For example, receiver 3502 may utilize an equalizer while receiver 3504 may utilize a rake receiver; consequently, receiver 3502 may have better performance and higher power consumption than receiver 3504. Additionally or alternatively, receiver 3504 may utilize a sphere decoder which may improve the demodulation performance of receiver 3504 while also increasing the power consumption. Each of receivers 3502, 3504, and 3506 may have similar such differences that lead to varying levels of performance and power consumption, such as different decoders, different equalizers, different filter lengths (e.g., Finite Impulse Response (FIR) filter taps), different channel estimation techniques, different interference cancellation techniques, different noise cancellation techniques, different processing bit width, different clock frequencies, different component voltages, different packet combination techniques, different number of algorithmic iterations, different usage of iterative techniques in or between components, etc. Although antenna system 1602 is depicted separately in FIG. 35, in some aspects receivers 3502, 3504, and 3506 may additionally utilize different antenna configurations, such as different numbers of antenna, different beamforming settings, different beam-steering settings, different antenna sensitivities, different null-steering settings (e.g., positioning of nulls based on interferers), etc. The specific configuration of such factors for each of receivers 3502, 3504, and 3506, along with the associated performance and power consumption levels, may be predefined. Each of receivers 3502, 3504, and 3506 may be implemented as various different antenna (antenna system 1602), RF (RF transceiver 1604), physical layer (physical layer processing module 1608), and/or protocol stack (controller 1610) components and thus may be related to reception processing at any of the RF, PHY, and/or protocol stack levels.

Control module 3510 may be responsible for selecting which of receivers 3502, 3504, and 3506 (via the control module output lines denoted in FIG. 35, which may be inter-core messages or control signals), to utilize for reception processing on signals provided by antenna system 1602. Accordingly, the selected receiver may perform its respective reception processing to produce the resulting downlink data. Control module 3510 may be a controller configured to execute program code defining control logic for receiver selection and may be included as a software component of controller 1610, a software component of a physical layer control module of physical layer processing module 1608, or as a separate software component of terminal device 1502.

Control module 3510 may be configured to select a receiver based on current radio conditions and current power levels. For example, in strong radio conditions control module 3510 may be configured to select a low-power receiver (which may also have lower performance) as the strong radio consumptions may not demand high performance. Conversely, control module 3510 may be configured to select a high-performance receiver in poor radio conditions in order to yield sufficient reception quality. Additionally, control module 3510 may be configured to select a low-power receiver if power supply 1618 has a low battery power level.

As shown in FIG. 35, control module 3510 may receive input from radio condition module 3508 and power consumption module 3512, which may be configured to monitor current radio conditions and power consumption, respectively, and thus may provide control module 3510 with current radio and power statuses. Radio condition module 3508 may thus monitor outputs from receivers 3502, 3504, and 3506 (via the radio condition input lines denoted in FIG. 34) which may report parameters such as radio measurements (e.g., signal power, signal quality, signal-to-noise ratio (SNR), signal-to-interference-plus-noise ratio (SINR), etc.), channel parameters (e.g., Doppler spread, delay spread, etc.), error metrics (e.g., cyclic redundancy check (CRC) rate, block/bit error rates, average soft bit magnitudes, etc.), retransmission rates, etc., provided by receivers 3502, 3504, and 3506 that are indicative of radio conditions. Radio condition module 3508 may evaluate such parameters and provide a radio condition indication to control module 3510 that specifies the current radio conditions of terminal device 1502, thus enabling control module 3510 to select a receiver based on the current radio conditions.

Similarly, power consumption module 3512 may monitor outputs from receivers 3502, 3504, and 3506 (via the power consumption input lines denoted in FIG. 34), and report power consumption data to control module 3510 which may indicate the current power consumption of receivers 3502, 3504, and 3506. Power supply 1618 may also provide at least one of power consumption data and current battery power level data to power consumption module 3512, which may indicate overall power consumption and remaining battery power levels of terminal device 1502. Power consumption module 3512 may then evaluate such data and provide a power status indication to control module 3510 that specifies, for example, both the current power consumption and current battery power level of terminal device 1502, thus enabling control module 3510 to select a receiver based on the current power status of terminal device 1502. In some aspects, radio condition module 3508 and power consumption module 3512 may be implemented as software components such as processors configured to receive input from receivers 3502, 3504, and 3506 and evaluate the inputs to provide indication data to control module 3510. Radio condition module 3508 and power consumption module 3512 may be implemented together (e.g., at a common processor which may e.g., be the same processor as control module 3510) or separately.

As shown in FIG. 35, control module 3510 may also receive input from data source 1612/data sink 1616 including e.g., other module 3514, application processor 3516, network module 3518, and other module 3520. Such input data may include data related to applications currently being executed on application processor 3516, user power control commands provided via application processor 3516, thermal or heat measurements by a heat detection module (provided by e.g., other module 3514 or other module 3520), positioning, location, and/or velocity information (provided by e.g., other module 3514 or other module 3520), network data provided by network module 3518, etc. Control module 3510 may also be configured to consider such input data in the receiver selection process. For example, high thermal or heat measurements may prompt selection of a lower-power receiver while high mobility (indicated by velocity and/or positional changes) may prompt selection of a higher performance receiver. In some aspects, control module 3510 may periodically analyze conditions as part of the selection process. The evaluation period can vary, and can also be different for different parts of the receive chain. For example, the inner receiver can evaluate/switch more frequently than an independent outer receiver component. In an exemplary LTE setting, the evaluation period can be, for example, 1 ms (e.g., one downlink TTI) or 0.5 ms (e.g., one slot). A frame that has a length of 1 ms could also be the evaluation period. In some aspects, the gaps in TDD for LTE, which can happen once or twice every 10 ms, could also serve as the evaluation period. In some aspects, there may also be much longer intervals in the order of seconds or minutes. For example, in an idle radio state (e.g., when paging), the receiver is only briefly active for the paging cycle, for example, every 1.28 seconds. Accordingly, control module 3510 may only be able to perform an evaluation according to this grid, e.g., when the receiver is on. In some aspects, the evaluation may be also based on an moving average so that the decision is not only based on a single evaluation interval but on a number of past evaluation intervals.

Control module 3510 may therefore be configured to select one of receivers 3502, 3504, and 3506 to utilize for reception processing based on radio conditions (reported by radio condition module 3508), power information (provided by power consumption module 3512), and other various factors (provided by other module 3514, application processor 3516, network module 3518, and other module 3520). As previously indicated, receivers 3502, 3504, and 3506 may preconfigured (either with different hardware or software configurations) according to different decoders, different equalizers, different filter lengths, different channel estimation techniques, different interference cancellation techniques, different noise cancellation techniques, different processing bit width, different clock frequencies, different component voltages, different packet combination techniques, different number of algorithmic iterations, different usage of iterative techniques in or between components, different numbers of antenna, different beamforming settings, different beamsteering settings, different antenna sensitivities, different null-steering settings, etc., and may accordingly each provide different performance and power consumption levels according to their respective configurations. It is appreciated that any combination of such factors may be available to a designer to arrive at the preconfiguration for each of receivers 3502, 3504, and 3506. Additionally, while FIG. 35 depicts three receivers, this is demonstrative and the number of preconfigured receivers can be scalable to any quantity.

Control module 3510 may then select one of receivers 3502, 3504, and 3506 based on, for example, the radio condition status, power consumption status, and the respective power consumption and performance properties of each of receivers 3502, 3504, and 3506. The selection logic may be predefined, such as with a lookup table with a first dimension according to a power consumption level (e.g., a quantitative power level and/or current power consumption level) provided by power consumption module 3512 and a second dimension according to a radio condition level (e.g., a quantitative radio condition level) provided by radio condition module 3508 where each entry of the lookup table gives a receiver selection of receiver 3502, 3504, or 3506. Control module 3510 may then input both the power consumption level and the radio condition level into the lookup table and select the receiver corresponding to the resulting entry as the selected receiver. Such a predefined lookup table scheme may be expanded to any number of dimensions, with any one or more of e.g., current power consumption, current battery power level, radio measurements (e.g., signal power, signal quality, signal-to-noise ratio (SNR), signal-to-interference-plus-noise ratio (SINR), etc.), channel parameters (e.g., Doppler spread, delay spread, etc.), error metrics (e.g., cyclic redundancy check (CRC) rate, block/bit error rates, average soft bit magnitude, etc.), retransmission rates, etc., used as dimensions of the lookup table where each entry identifies a receiver to utilize as the selected receiver. Depending on the specifics of the predefined lookup table, control module 3510 may input the current data into the lookup table to identify one of receivers 3502, 3504, and 3506 to use as the selected receiver. Alternative to a completely predefined lookup table, control module 3510 may update the lookup table during runtime, e.g., based on continuous power logging. Regardless of such specifics, control module 3510 may input certain radio condition and/or power parameters into a lookup table in order to identify which of receivers 3502, 3504, and 3506 to use as the selected receiver. Control module 3510 may store the lookup table locally or at another location accessible by control module 3510.

Although the receiver selection logic can be flexible and open to design considerations, without loss of generality, control module 3510 may largely aim to utilize high-performance receivers in poor radio condition scenarios and to utilize low-power receivers in low-power scenarios. For example, if radio condition module 3508 indicates that radio conditions are poor, control module 3510 may be configured to select a high-performance receiver out of receivers 3502, 3504, and 3506 (where e.g., the lookup table is configured to output high-performance receiver selections for poor radio condition inputs) via the control module output lines shown in FIG. 35, Similarly, if power consumption module 3512 indicates that battery power is low or current power consumption is high, control module 3510 may be configured to select a low-power receiver out of receivers 3502, 3504, and 3506 (where e.g., the lookup table is configured to output low-power receiver selections for low battery power and/or high power consumption inputs) via the control module output lines.

In some aspects, control module 3510 may perform receiver selection in a worst-case scenario, such as where radio conditions are poor and/or the receiver has low power. The worst-case scenario could also be listed in the lookup table, and have specific receiver selections that are tailored for worst case scenarios. In some aspects, there could also be a further process to consider additional parameters in receiver selection, such as traffic type (where, for example, during a voice call, the receiver selection strategy may be to keep the call alive, while in a data-only scenario a reduced data rate may be acceptable) or location/'social' knowledge (for example, proximity to a charging possibility). These parameters may be defined as inputs to the lookup table, and control module 3510 may accordingly obtain receiver selection outputs from the lookup table using these parameters as inputs during worst-case scenarios.

In some aspects, the prioritization for battery life or performance in receiver selection by control module 3510 may further depend on the associated application. For example, when performing voice communication, performance may be more important. Control module 3510 may accordingly place a higher priority on performance when performing voice communication. When performing downloads (e.g., non-realtime), battery life may be more important. Control module 3510 may consequently place a higher priority on battery life when performing downloads.

Control module 3510 may additionally or alternatively employ other strategies in receiver selection. For example, in some aspects control module 3510 may minimize total power consumption by, for example, selecting a high-performance receiver in order to download pending downlink data as quickly as possible. Alternatively, if the performance enhancement provided by a high-performance receiver is not warranted given the current radio conditions, control module 3510 may utilize a lower performance receiver with lower power consumption. Furthermore, in various aspects the configuration of terminal device 1502 may be more sensitive to either dynamic power or leakage power, where terminal devices sensitive to dynamic power may be more power efficient when performing light processing spread over long periods of time and terminal devices sensitive to leakage power may be more power efficient when performing heavy processing over short and brief periods of time. Control module 3510 may therefore be configured to select high-performance receivers to quickly download data in the leakage-sensitive case or low-performance receivers to gradually download data in the dynamic-sensitive case.

Figure 36:
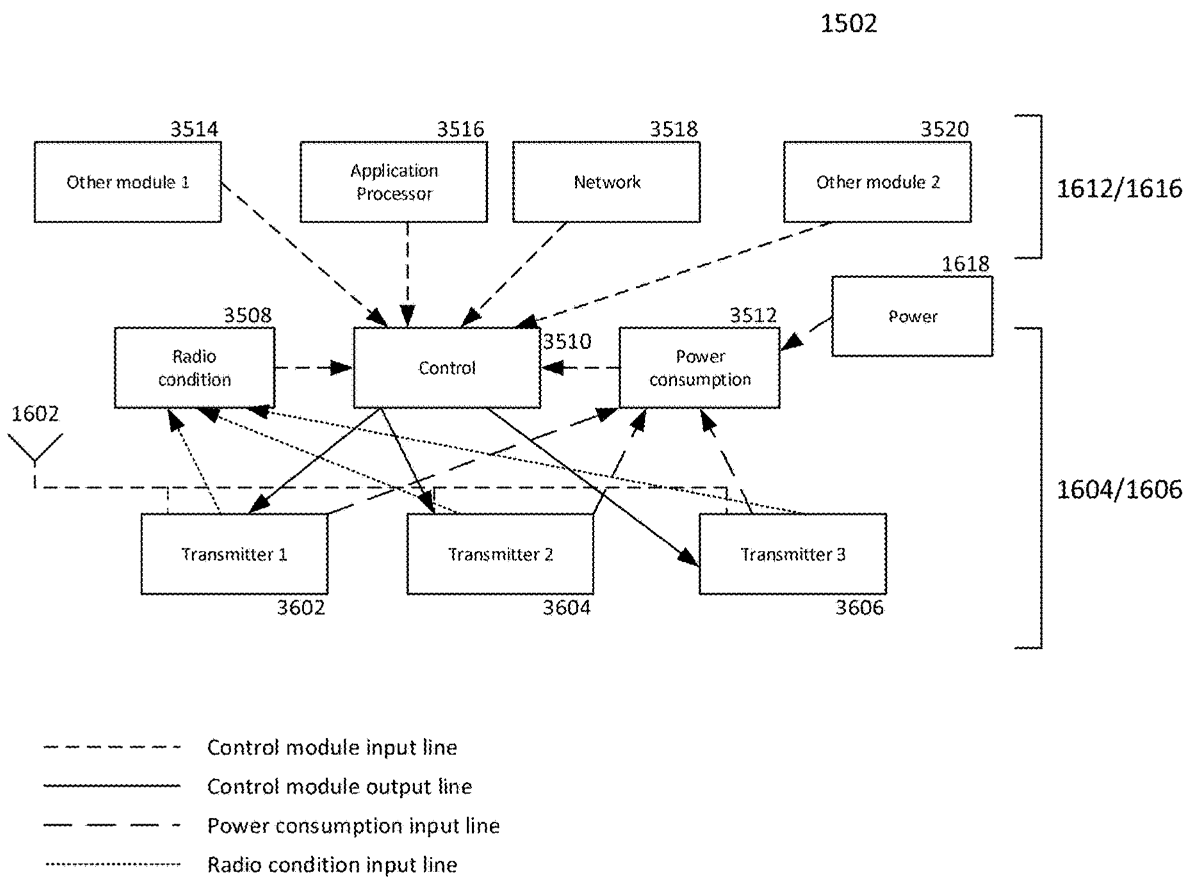
FIG. 36 shows a second exemplary internal configuration of a terminal device in accordance with some aspects.

Additionally or alternatively to receiver selection, in some aspects control module 3510 (or another dedicated control module) may employ transmitter selection similarly based on radio and/or power conditions. FIG. 36 shows an internal configuration of terminal device 1502 with transmitters 3602, 3604, and 3606 in accordance with some aspects. Although shown separately in FIGS. 35 and 36, in some aspects terminal device 1502 may include both receivers 3502, 3504, and 3506 and transmitters 3602, 3604, and 3606 and may utilize both the receiver and transmitter selection schemes. Transmitters 3602, 3604, and 3606 may perform uplink processing on uplink data provided by controller 1610 (not shown in FIG. 36) as discussed with respect to terminal device 1502. Similarly, as discussed with respect to receivers 3502, 3504, and 3506, in various aspects each of transmitters 3602, 3604, and 3606 may be physically distinct transmitter structures (e.g., structurally separate transmitter instances) or may be different configurations of one or more single transmitter structures. For example, in some aspects each of transmitters 3602, 3604, and 3606 may be implemented as separate hardware and/or software components (e.g., physically distinct) or may be different configurations of the same hardware and/or software components (e.g., different configurations of a single receiver structure). Regardless, the transmission processing performed by each of transmitters 3602, 3604, and 3606 may be different. For example, each of transmitters 3602, 3604, and 3606 may utilize different transmitter algorithms, hardware components, software control, etc. Although antenna system 1602 is depicted separately in FIG. 36, transmitters 3602, 3604, and 3606 may additionally utilize different antenna configurations, such as different numbers of antenna, different beamforming settings, different beamsteering settings, different antenna sensitivities, etc.

Accordingly, each of transmitters 3602, 3604, and 3606 may have different performance and power consumption levels, which may result from different RF oversampling rates, different transmission powers, different power control (e.g., closed-loop power control vs. open-loop power control), different numbers of antenna, different beamforming settings, different beamsteering settings, different antenna sensitivities, etc. The specific configuration of such factors for transmitters 3602, 3604, and 3606, along with the associated performance and power consumption levels, may be predefined. In some aspects, each of transmitters 3602, 3604, and 3606 may be implemented as various different antenna (antenna system 1602), RF (RF transceiver 1604), physical layer (physical layer processing module 1608), and/or protocol stack (controller 1610) components and thus may be related to reception processing at any of the RF, PHY, and/or protocol stack levels.

As in the case of receiver selection, control module 3510 may be configured to select which of transmitters 3602, 3604, and 3606 to utilize for transmission processing on signals provided to antenna 1602. Accordingly, control module 3510 may be configured to evaluate radio condition and power status data provided by radio condition module 3508 and power consumption module 3512 in order to select one of transmitters 3602, 3604, and 3606 based on the performance and power consumption characteristics of transmitters 3602, 3604, and 3606. As indicated above, transmitters 3602, 3604, and 3606 may have different RF oversampling rates, different transmission powers, different power control (e.g., closed-loop power control vs. open-loop power control), different numbers of antenna, different beamforming settings, different beamsteering settings, different antenna sensitivities, etc. Accordingly, both high RF oversampling rate and high transmission power may yield higher performance but have higher power consumption. Regarding power control, in some aspects certain transmitters may utilize a transmit feedback receiver, which may be an analog component included as part of the transmitter circuitry. Transmitters may utilize the transmit feedback receiver to monitor actual transmit power, thus forming a 'closed-loop' for power control in order to improve the accuracy of transmission power. While the use of such closed-loop power control may yield higher performance, operation of the transmit feedback receiver may increase power consumption. Accordingly, closed-loop power control may yield higher performance and higher power consumption than open-loop power control.

Control module 3510 may therefore similarly be configured to select one of transmitters 3602, 3604, and 3606 based on control logic, which may be e.g., a predefined or adaptive lookup table or similar type of selection logic in which control module 3510 may input parameters such as current power consumption, current battery power level, radio measurements (e.g., signal power, signal quality, signal-to-noise ratio (SNR), signal-to-interference-plus-noise ratio (SINR), etc.), channel parameters (e.g., Doppler spread, delay spread, etc.), error metrics (e.g., cyclic redundancy check (CRC) rate, block/bit error rates, average soft bit magnitude, etc.), retransmission rates, etc., in order to obtain a selection of one of transmitters 3602, 3604, and 3606. Control module 3510 may also generally be configured to select high performance transmitters during poor radio conditions, low performance and low power transmitters during strong radio conditions, and low power transmitters during low battery conditions and may also be configured to consider dynamic and leakage power sensitivity in transmitter selection.

For example, in an exemplary scenario, transmitter 3602 may be more precise than transmitter 3604 (e.g., according to Error Vector Magnitude (EVM)) but have higher power consumption than transmitter 3604. Due to its lesser performance, transmitter 3604 will require an increased transmit power to achieve the same performance. However, at low or minimum transmit powers the contribution of such a transmit power increase to total power consumption may be less than the power saved through use of transmitter 3604 over transmitter 3602. Consequently, it may be prudent to utilize transmitter 3604, which has the lower base power consumption.

In some aspects, control module 3510 may trigger transmitter selection based on a triggering criteria. Non-limiting examples of triggering criteria can include detection that the transmit power is above/below a certain threshold, detecting that the bandwidth actually being used is above or below a certain threshold, detecting that the measured error rate is above or below a certain threshold, detecting that battery power has fallen below a threshold, detecting that power supply 1618 is charging, or detecting that the retransmission rate (e.g., uplink HARQ rate from eNB to UE in an exemplary LTE setting) is above/below a threshold. Control module 3510 may monitor such triggering criteria and trigger transmitter selection when they are met.

As both transmitter and receiver selections may have an impact on power consumption and be impacted by radio conditions, in some aspects control module 3510 may be configured to consider the performance and power consumption requirements of both receivers and transmitters during transmitter and receiver selection. Control module 3510 can be implemented as a single unified control module responsible for control of both receivers and transmitters or as two separate control modules each respectively responsible for control of one of receiver or transmitter selection.

The receiver and transmitter selection schemes described herein can utilize fixed receiver and transmitter configurations, where the properties of receivers 3502, 3504, and 3506 and transmitters 3602, 3604, and 3606 are predefined and static, e.g., as either separate structural components or as different fixed configurations of the same structural components. Alternatively, in some aspects one or more of receivers 3502, 3504, and 3506 and one or more of transmitters 3602, 3604, and 3606 may be 'configurable' and accordingly may have certain enhancement features that may be turned on/off, switched, or adjusted, such as any of the aforementioned features related to decoders, equalizers, filter lengths, channel estimation techniques, interference cancellation techniques, noise cancellation techniques, processing bit width, clock frequencies, component voltages, packet combination techniques, number of algorithmic iterations, usage of iterative techniques in or between components, RF oversampling rates, transmission powers, power control, number of antennas, beamforming setting, beamsteering setting, antenna sensitivity, null-steering settings, etc. As these enhancement features may impact performance and power consumption, control module 3510 may oversee the activation, deactivation, and exchange of these enhancement features based on radio condition and power status data.

Figure 37:
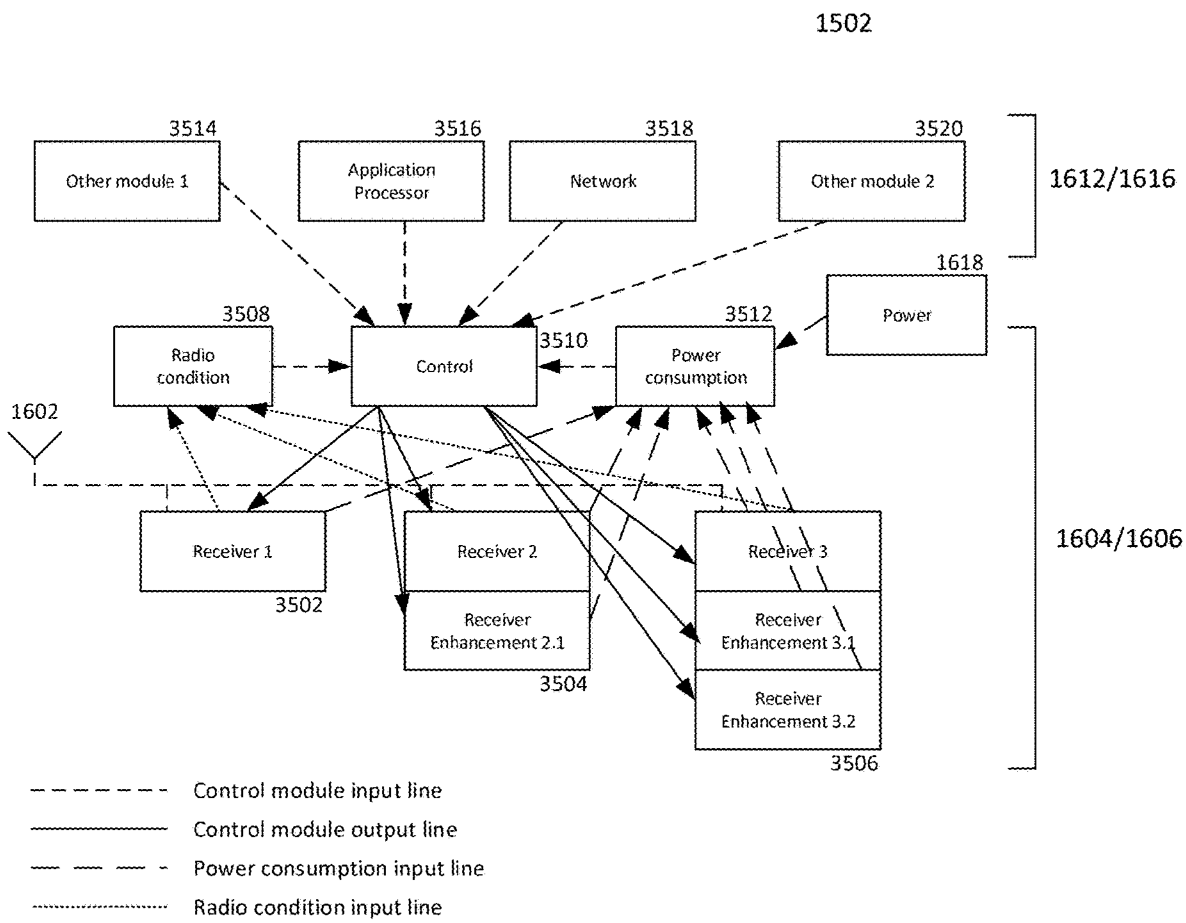
FIG. 37 shows a third exemplary internal configuration of a terminal device in accordance with some aspects.
Figure 38:
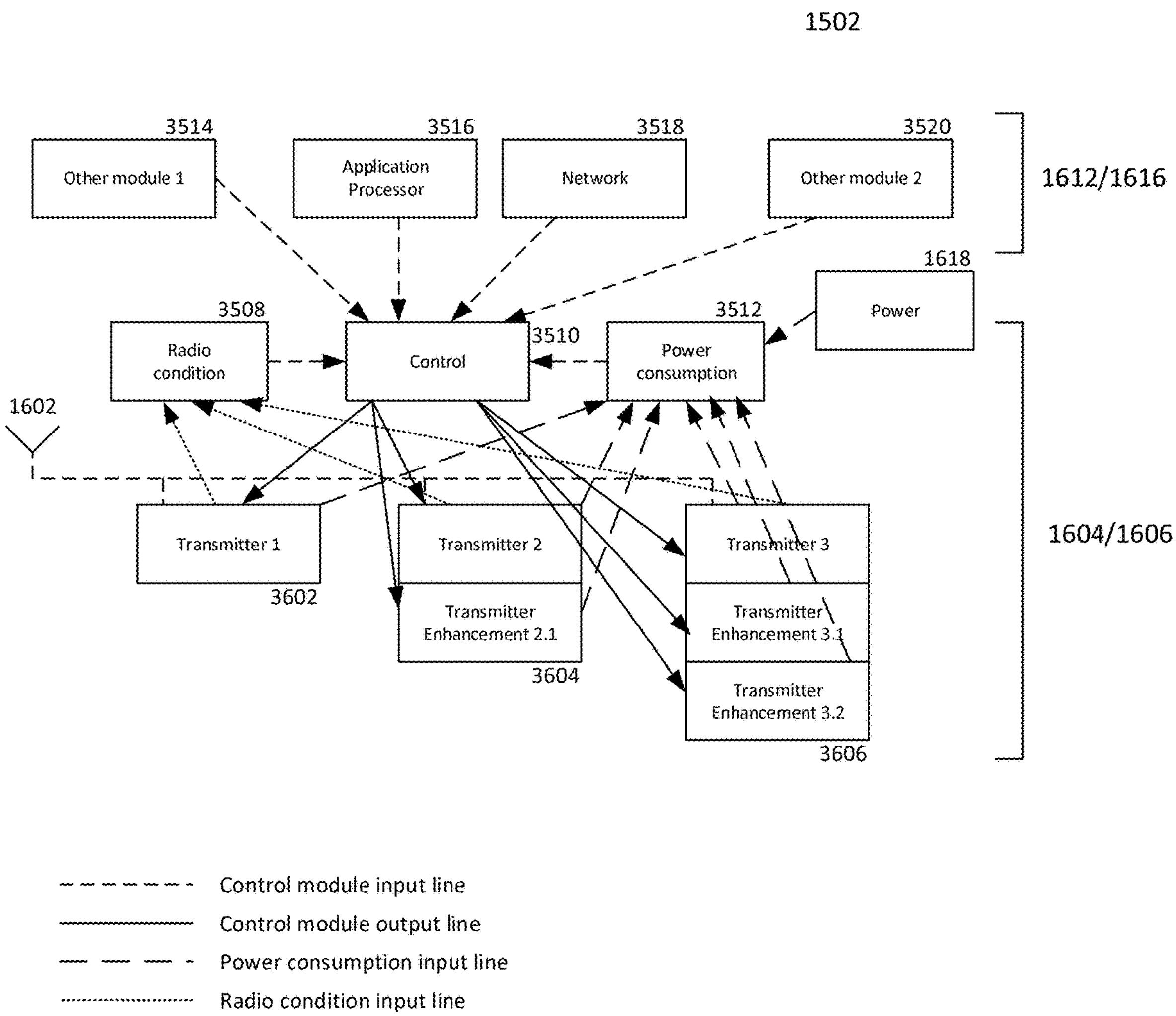
FIG. 38 shows a fourth exemplary internal configuration of a terminal device in accordance with some aspects.

FIGS. 37 and 38 show exemplary configurations of terminal device 1502 (which may both be implemented simultaneously or separately at terminal device 1502) in accordance with some aspects. As shown in FIGS. 37 and 38, one or more of receivers 3502, 3504, and/or 3506 and transmitters 3602, 3604, and 3606 may have enhancement features. Specifically, receiver 3504 may have receiver enhancement feature 2.1, receiver 3506 may have receiver enhancement features 3.1 and 3.2, transmitter 3604 may have transmitter enhancement feature 2.1, and transmitter 3606 may have transmitter enhancement features 3.1 and 3.2. The enhancement features may be software and/or hardware enhancement features; for example, the enhancement features may be a specific software algorithm, specific dedicated hardware, or a specific integrated hardware and software component. For example, the enhancement features may include particular decoders (e.g., sphere decoder), channel processor (e.g., equalizer), interference canceller (e.g., an advanced interference cancellation scheme), or any other feature related to decoders, equalizers, filter lengths, channel estimation techniques, interference cancellation techniques, noise cancellation techniques, processing bit width, clock frequencies, component voltages, packet combination techniques, different number of algorithmic iterations, different usage of iterative techniques in or between components, RF oversampling rates, transmission powers, power control, number of antennas, beamforming setting, beamsteering setting, antenna sensitivity, null-steering setting, etc. Each of the enhancement features may thus be 'fixed' features that can be selectively switched on or off by control module 3510.

The activation of such enhancement features may generally improve performance at the cost of increased power consumption. Instead of having to select between fixed sets of receivers and transmitters, control module 3510 may therefore also have the option to selectively activate any of the enhancement features in order to further control the balance between performance and power consumption. Control module 3510 may thus be configured with control logic (e.g., a lookup table or similar selection logic) to select a specific receiver along with any specific enhancement features from receivers 3502, 3504, and/or 3506 and likewise be configured with control logic to select a specific transmitter along with any specific enhancement features from transmitters 3602, 3604, and 3606. Such may accordingly give control module 3510 greater flexibility in controlling the performance and power consumption balance dependent on the current radio condition and power status reported by radio condition module 3508 and power consumption module 3512.

Although FIGS. 37 and 38 depict multiple 'fixed' receivers and transmitters, in some aspects control module 3510 may be able to perform receiver and transmitter selection with only one receiver and/or transmitter by deciding which enhancement features to activate and deactivate. For example, if terminal device 1502 includes only receiver 3506 and transmitter 3606, control module 3510 may monitor the radio condition and power status data provided by radio condition module 3508 and power consumption module 3512 in order to determine whether to increase performance (e.g., in the case of poor radio conditions) or to reduce power consumption (e.g., in the case of strong radio conditions or low battery power). Control module 3510 may then activate enhancement features to increase performance or deactivate enhancement features to decrease power consumption.

Figure 39:
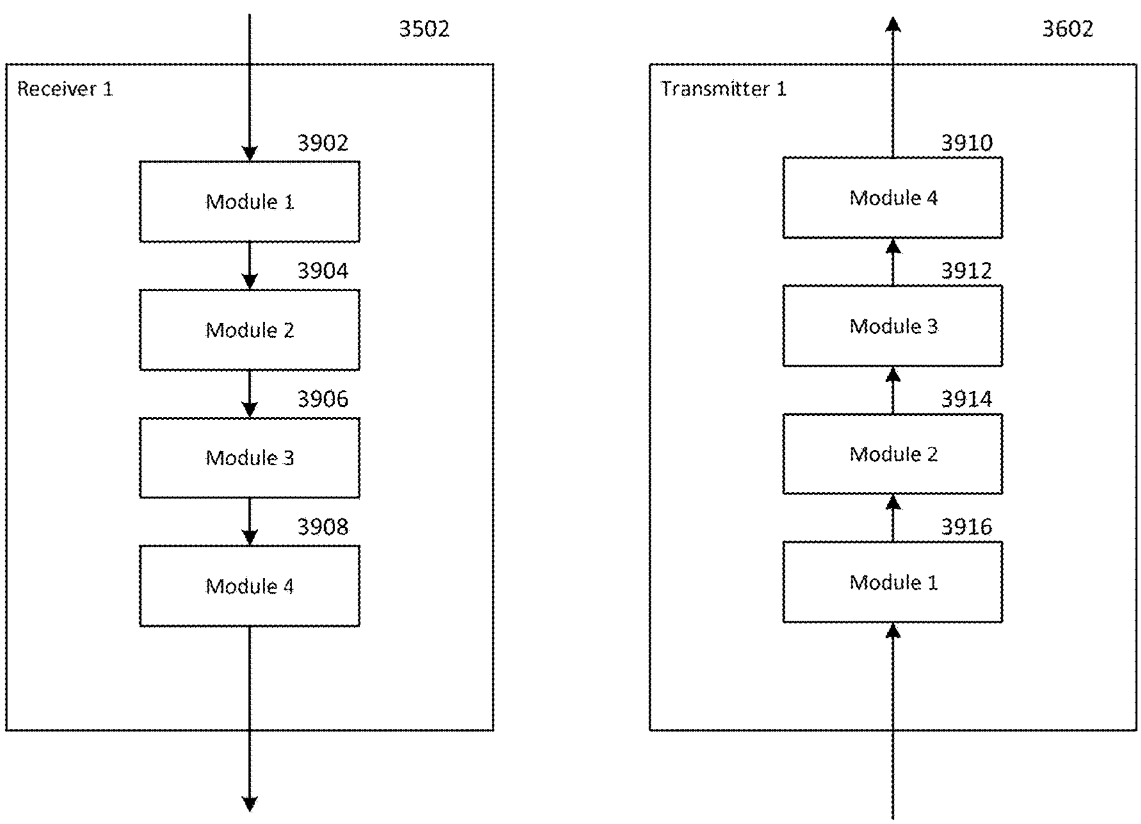
FIG. 39 shows an exemplary internal configuration of a receiver module and transmitter module in accordance with some aspects.

As previously indicated, in some aspects each of receivers 3502, 3504, and 3506 and transmitters 3602, 3604, and 3606 may be fixed receivers and transmitters (optionally with fixed enhancement features) and accordingly may each be implemented as antenna, RF, PHY, and protocol stack level components. Each of the individual components (hardware and/or software) may thus be a 'module', which may be a hardware or software component configured to perform a specific task, such as a module related to any one or more of decoders, equalizers, filter lengths, channel estimation techniques, interference cancellation techniques, noise cancellation technique, processing bit width, clock frequencies, component voltages, number of algorithmic iterations, usage of iterative techniques in or between components, packet combination techniques, RF oversampling rates, transmission powers, power control, number of antennas, beamforming setting, beamsteering setting, antenna sensitivity, null-steering settings, etc. (where each of the enhancement features of FIGS. 37 and 38 may also be considered a module or combination of modules). Exemplary modules thus include decoders, equalizers, rake receivers, channel estimators, filters, interference cancelers, noise cancelers, etc. FIG. 39 shows a simplified internal diagram of receiver 3502 and transmitter 3602 according to some aspects. As shown in FIG. 39, receiver 3502 may include modules 3902, 3904, 3906, and 3908, which may each configured to perform a different reception processing task in order to output downlink data while transmitter 3602 may include modules 3910, 3912, 3914, and 3916 each configured to perform a different transmission processing task in order to output uplink data. Modules 3902, 3904, 3906, 3908, 3910, 3912, 3914, and 3916 may be structurally realized as a hardware-defined module, e.g., as one or more dedicated hardware circuits or FPGAs, as a software-defined module, e.g., as one or more processors executing program code defining arithmetic, control, and I/O instructions (e.g., software and/or firmware) stored in a non-transitory computer-readable storage medium, or as a mixed hardware-defined and software-defined module.

In addition to switching between fixed receivers and transmitters (in addition to enhancement features) as described above, in some aspects control module 3510 may additionally be configured to adjust local parameters within receiver and transmitter modules to help optimize the performance and power consumption balance of terminal device 1502. Exemplary adjustments include e.g., adapting the number of iterations for iterative algorithms (e.g., turbo channel decoder iterations), adapting the number of rake fingers used for a certain cell or channel, adapting the size of an equalizer matrix (where smaller matrices simplify inversion), adapting processing efficiency (e.g., switching the number of finite impulse response (FIR) filter taps), adapting processing bit width, etc. Control module 3510 may therefore be able to control receivers 3502, 3504, and 3506 and transmitters 3602, 3604, and 3606 at the 'module' level in order to optimize performance and power consumption.

For example, in some aspects control module 3510 may monitor the current radio condition and power status data provided by radio condition module 3508 and power consumption module 3512 to determine whether there are currently strong or poor radio conditions, high or low remaining battery power, and/or high or low current power consumption. Depending on the current radio condition and power status data, control module 3510 may decide to increase/decrease performance or to increase/decrease power consumption. In addition to selecting a receiver (or, for example, in cases where terminal device 1502 has only one receiver), control module 3510 may adjust the selected receiver at a module level to optimize performance vs. power consumption (and likewise for transmitters). For example, control module 3510 may increase iterations for iterative algorithms to increase performance and vice versa to decrease power consumption, increase the number of rake fingers to increase performance and vice versa to decrease power consumption, increase equalizer matrix size to increase performance and vice versa to decrease power consumption, increase FIR filter length to increase performance and vice versa to decrease power consumption, increase processing bit-width to increase performance and vice versa to decrease power consumption etc. Such may be defined by the control logic at control module 3510 that renders decisions based on radio condition and power status data.

Figure 40:
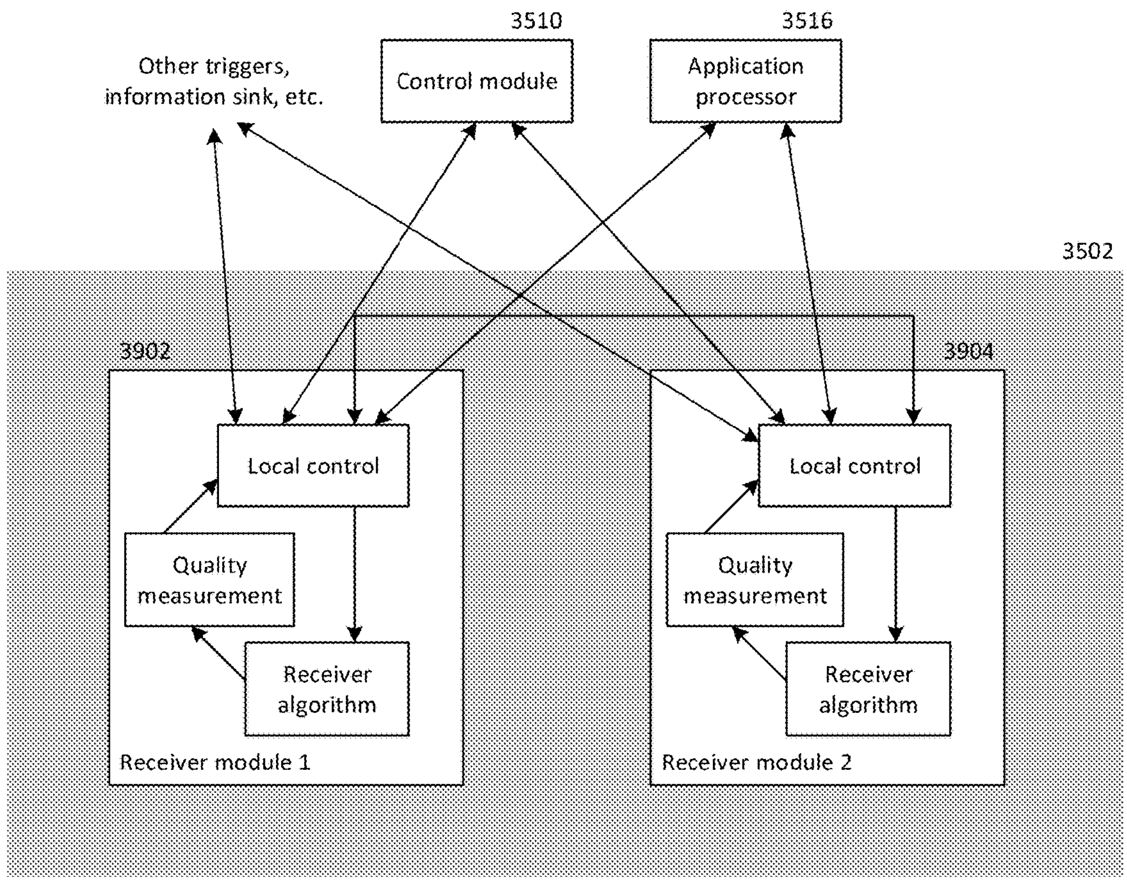
FIG. 40 shows an exemplary internal configuration of a receiver module in accordance with some aspects.

In some aspects, control module 3510 may also rely on local control at each of the receiver and transmitter modules. FIG. 40 shows exemplary internal architectures of receiver modules 3902 and 3904 of receiver 3502 in accordance with some aspects. As shown in FIG. 40, in some aspects modules 3902 and 3904 may include a local control module, a quality measurement module, and a receiver algorithm module. The receiver algorithm module may apply the actual dedicated receiver processing of the respective module. The quality measurement module may evaluate the local performance of the receiver algorithm module. The local control module may oversee operation of the respective module in accordance with the performance and power consumption balance optimization. Modules 3902 and 3904 may interface with control module 3510 at the respective local control modules. Accordingly, control module 3510 may provide module-level control, e.g., to increase performance or to decrease power consumption, to the local control modules, which may then be responsible for implementing the control. The local control modules may also receive input from application processor 3516 and other triggers or information sinks.

Accordingly, the quality measurement modules may evaluate the performance of the receiver algorithm modules, such as with a quantitative metric related to the receiver algorithm module. For example, if module 3902 is a decoder, the receiver algorithm module may perform decoding while the quality measurement module may evaluate the decoder performance, such as by evaluating the soft bit quality (e.g., magnitude of a soft probability) for input data to each channel decoder iteration. The quality measurement module may then provide the local control module with a performance level of the receiver algorithm module, which the local control module may utilize to evaluate whether performance is sufficient. If control module 3510 has indicated performance should be high, e.g., in poor radio conditions, and the local control module determines that the receiver algorithm module has insufficient performance, the local control module and control module 3510 may interface to determine whether the receiver algorithm module should be adjusted to have higher performance, which may come at the cost of higher power consumption.

Figure 41:
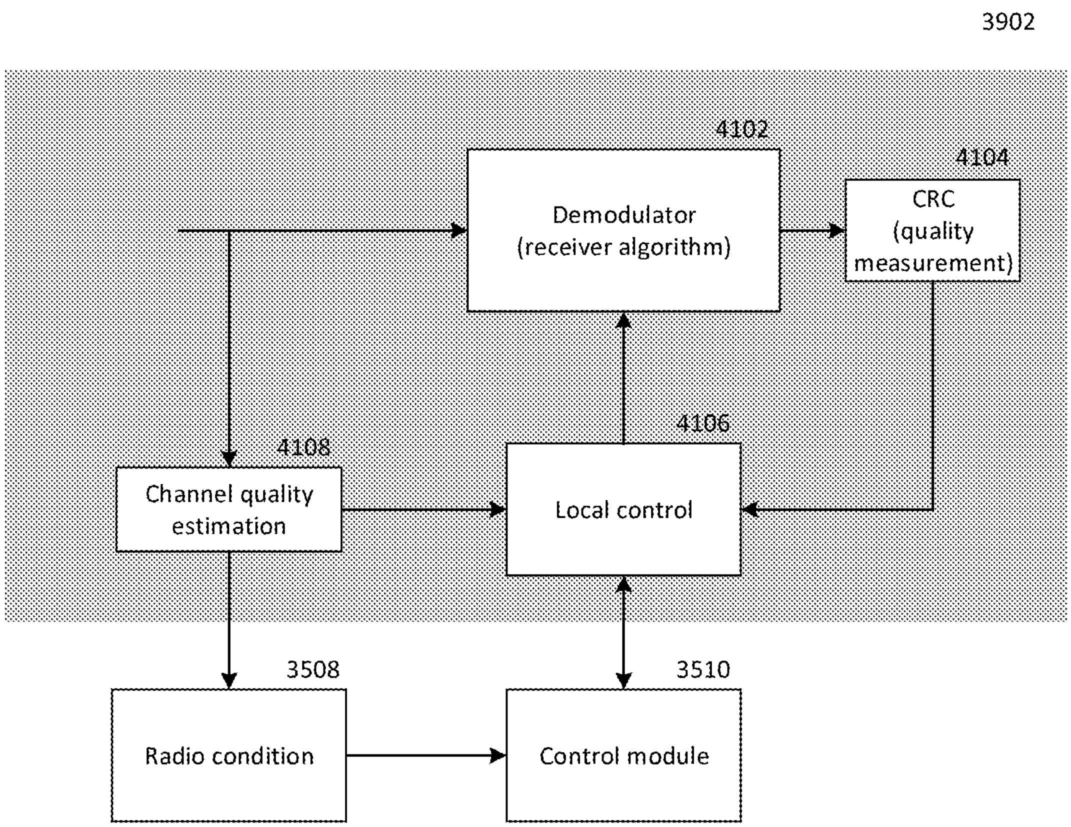
FIG. 41 shows an exemplary internal configuration of a receiver module for a demodulator application in accordance with some aspects.

FIG. 41 shows an exemplary internal configuration of module 3902 in accordance with some aspects. In the exemplary setting of FIG. 41, module 3902 may be configured as e.g., a demodulator. As shown in FIG. 41, module 3902 may include demodulator module 4102, cyclic redundancy check (CRC) module 4104, local control module 4106, and channel quality estimation module 4108. Demodulator module 4102 may function as the receiver algorithm module while CRC module 4104 may function as the quality measurement module. Local control module 4106 may therefore interface with CRC module 4104 to evaluate the performance of demodulator module 4102, where high CRC error may indicate poor performance and low CRC error may indicate high performance. Local control module 4106 may interface with control module 3510 to handle performance and power consumption commands from control module 3510. Local control module 4106 may then control complexity tuning at demodulator module 4102, where increases in complexity may yield better performance at the expense of higher power consumption. For example, local control module 4106 may increase or decrease the demodulation algorithm complexity of demodulator module 4102, such as e.g., by switching from a linear interpolator to advanced filters for channel estimation (complexity and performance increase, and vice versa for complexity and performance decrease), switching the equalization algorithm from simple minimum mean squared error (MMSE) decoder to complex maximal likelihood (ML) decoder (complexity and performance increase, and vice versa for complexity and performance decrease). Additionally or alternatively, local control module 4106 may increase the processing efficiency of a given demodulation algorithm, such as by increasing number of FIR filter taps for a channel estimator (complexity and performance increase, and vice versa for complexity and performance decrease) or by increasing the number of iterations of a channel decoder (complexity and performance increase, and vice versa for complexity and performance decrease).

Additionally, channel quality estimation module 4108 may estimate channel quality based on input signals to obtain a channel quality estimate, which channel quality estimation module 4108 may provide to radio condition module 3508 and local control module 4106. Radio condition module 3508 may then utilize inputs such as the channel quality estimate to evaluate radio conditions to indicate the current radio condition status to control module 3510. Local control module 4106 may utilize the channel quality estimate from channel quality estimation module 4108 and the quality measurement from CRC module 4104 to perform local control over the demodulation complexity of demodulator module 4102. Control module 3510 may perform global control (e.g., joint control of multiple local control modules) based on the radio conditions provided by radio condition module 3508 to scale demodulation complexity over multiple modules.

In some aspects, the local control modules of modules 3902 and 3904 may also interface with each other as shown in FIG. 40. Accordingly, the local control modules may communicate without control module 3510 as an intermediary and may consequently be able to cooperate in order to coordinate performance and power consumption. For example, module 3902 could request a change at module 3904 to ask for a performance enhancement or power consumption reduction at module 3904 if the modules are robust against the requests (e.g., can fulfill requests in most/all cases) and no deadlock or catastrophic resonant feedback loops can occur, for example. In an exemplary scenario, module 3902 may be a Turbo channel decoder and module 3904 may be a downlink power control unit. Turbo channel decoder/module 3902 may request downlink power control unit/module 3904 to request the radio access network for a higher downlink transmission power, which would enable Turbo channel decoder/module 3902 to improve demodulation performance and potentially require less decoder iterations, thus conserving power. Such an increase in downlink power may be possible if the radio access network/current serving cell is not loaded and should have no negative impact on the power consumption in other modules. Numerous different scenarios in which modules (both in the receiver case shown in FIG. 40 and in the analog transceiver case) may communicate with one another and/or with control module 3510 in order to adjust the performance and power consumption balance.

Control module 3510 may therefore have a wide degree of control over the receivers and transmitters of terminal device 1502, including the ability to select specific receivers and transmitters, activate/deactivate specific receiver and transmitter enhancement features, and control individual receivers and transmitters at a module level. In particular when controlling receivers and transmitters at a module level, the impact of even minor changes at multiple modules may have impacts on power consumption. Accordingly, control module 3510 may implement a monitoring scheme to monitor the status of multiple modules in order to help prevent or reduce sudden jumps in power consumption.

Figure 42:
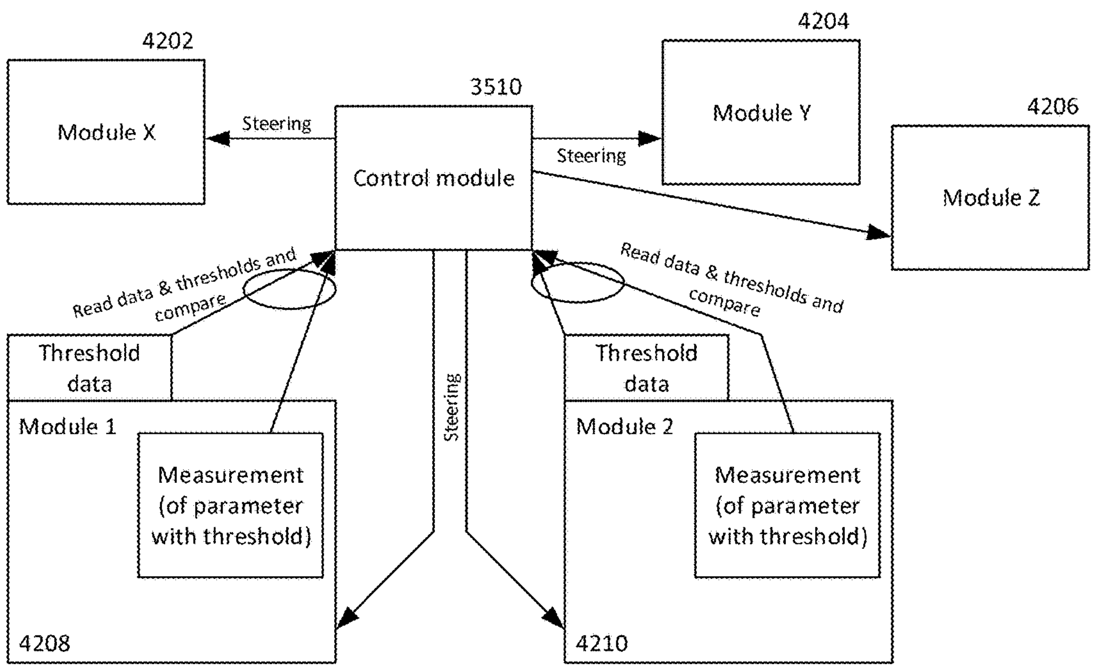
FIG. 42 shows an exemplary illustration of operation of a control module in accordance with some aspects.

FIG. 42 shows such a configuration (in which other components of terminal device 1502 are graphically omitted for simplicity) in accordance with some aspects, in which control module 3510 may interface with multiple modules 4202, 4204, 4206, 4208, and 4210, which may either be transmitter or receiver modules. Control module 3510 may monitor operation at each of modules 4202, 4204, 4206, 4208, and 4210 to detect potential jumps in power consumption that may arise from even small operational changes at one or more modules. For example, a slight increase in required Million Instructions per Second (MIPS) for a task at e.g., module 4202 may lead to a jump in voltage and/or clock of a software component, such as a processor core or digital signal processor (DSP), which may be implemented in module 4202, and which may not be linearly connected to the small MIPS increase that triggered it. Such voltage and/or clock changes may additionally apply to hardware blocks, such as module 4204 implemented as a hardware component. Additionally, if the radioed transmit power is increased above certain levels, there may be a switch to a different power amplifier mode, such as in, e.g., module 4208 implemented as a power amplifier, which could result in a jump in the power needed for the certain radioed transmit power.

Accordingly, in some aspects control module 3510 may interface with each of modules 4202, 4204, 4206, 4208, and 4210 to preemptively detect such jumps in power consumption prior to their actual occurrence. Upon detection, control module 3510 may adapt behavior of the corresponding modules to help prevent the power consumption jump from occurring. Such may include accepting minimal degradations in performance, which may avoid the power consumption jump and may in certain cases not be noticeable to a user. In some aspects, control module 3510 may perform such monitoring based on parameter measurements and threshold comparisons. For example, each module may have a specific operating parameter that control module 3510 may monitor in order to detect potential power consumption jumps. Accordingly, each module (shown for modules 4208 and 4210 in FIG. 42) may therefore include a measurement module for measuring the parameter of interest. The modules may then provide the measured parameter to control module 3510, which may determine if each respective measured parameter is above a respective threshold, where the thresholds may indicate potential triggering of a large jump in power consumption. If a module reports a measured parameter above the threshold, control module 3510 may instruct the module to modify behavior to bring the parameter back below the threshold. Control module 3510 may therefore help prevent power consumption jumps and thus maintain an optimal performance and power consumption balance.

Control module 3510 may thus employ any one or more of the techniques described above to maintain a desired balance between performance and power consumption, which control module 3510 may monitor based on performance and power status data. Control module 3510 may additionally consider the receiver and/or transmitter states of terminal device 1502, as different receiver and transmitter states may yield different power states and power consumptions.

For example, radio access technologies such as LTE, UMTS, and other 3GPP and non-3GPP radio access technologies may assign certain 'states' to terminal device operation. Such states may include connected states (e.g., RRC_CONNECTED or CELL_DCH), idle and paging states and other various states (e.g., Forward Access Channel (FACH) and enhanced FACH (eFACH), etc.). Terminal device 1502 may additionally have other 'internal states, such as related to algorithms such as whether Carrier Aggregation is enabled, bandwidth states such as an FFT size for LTE, whether HSDPA is enabled versus normal UMTS Dedicated Channel (DCH) operation, whether GPRS or EDGE is enabled, etc., in addition to other chip-level states such as low-power mode, high/voltage clock settings, memory switchoffs, etc. Such states may be present for multiple radio access technologies, e.g., during a handover. Control module 3510 may receive indications of such states from e.g., module 3514, application processor 3516, network module 3518, other module 3520, etc., and may utilize such knowledge in receiver and transmitter selection to optimize the performance and power consumption balance.

In some aspects, control module 3510 may utilize other techniques that may generally apply to the various receivers and transmitters of terminal device 1502. For example, during idle transmit and/or receive periods, control module 3510 may switch off the transmitters and receivers e.g., with clock and/or power gating. Alternatively, the components of RF transceiver 1604 and baseband modem 1606 may be configured to employ Dynamic Voltage and Frequency Scaling (DVFS). Consequently, depending on the current performance and processing complexity of the various receivers and transmitters of terminal device 1502, control module 3510 may scale back component voltage and/or processing clock frequency to conserve power. For example, based on the processing efficiency yielded by the performance level, control module 3510 may dynamically find and apply a new voltage and/processing clock setting that can satisfy the real-time processing requirements for the current receiver and transmitter selections.

In some aspects, user-implemented power schemes may also be incorporated. For example, a user of terminal device 1502 may be able to select a performance setting that affects operation of terminal device 1502. If the user selects e.g., a high performance setting, terminal device 1502 may avoid (or may never) select to use a low power transmitter or receiver and may only select high-performance transmitters and/or receivers.

In some aspects, terminal device 1502 may locally implement receiver and transmitter selection techniques described above and may not require direct cooperation with the radio access network to implement these techniques. However, cooperation with the radio access network may impart additional aspects to terminal device 1502 with respect to power consumption control.

For example, in some aspects control module 3510 may periodically check the power level of power supply 1618 to determine whether the current power level is below a threshold, e.g., low power. Control module 3510 may then evaluate the possible receiver and transmitter selections for the current power level and, based on the possible selections, may select a preferred scheduling pattern that may optimize power saving. For example, in the downlink direction such may include identifying a candidate downlink resource block scheduling pattern (and likewise in the uplink direction). Control module 3510 may then transmit this candidate downlink resource block scheduling pattern to the radio access network, e.g., network access node 1510. Network access node 1510 may then evaluate the requested candidate downlink resource block scheduling pattern and either accept or reject the requested candidate downlink resource block scheduling pattern via a response to control module 3510. If accepted, control module 3510 may perform downlink reception according to the requested candidate downlink resource block scheduling pattern. If rejected, control module 3510 may propose a new candidate downlink resource block scheduling pattern and continue until a candidate downlink resource block scheduling pattern is agreed upon with network access node 1510.

In some aspects, the candidate downlink resource block scheduling pattern requested by control module 3510 may be specifically selected based on the selected receiver and/or transmitter configurations. For example, the candidate downlink resource block scheduling pattern may be biased for either leakage or dynamic power saving depending on the power sensitivity of the selected receiver and/or transmitter configurations. For example, if the selected receiver is leakage-power sensitive, control module 3510 may request a scheduling pattern that schedules as many RBs as possible in a short duration of time (e.g., a frequency-dense pattern that fits the RB allocation into a few OFDM symbols at the beginning of a TTI). Such may allow terminal device 1502 to complete downlink processing at the selected receiver and power the receiver down for the remaining duration of each TTI. Alternatively, if the selected receiver is dynamic-power sensitive, control module 3510 may request a scheduling pattern that allocates a sparse amount of RBs in frequency over an extended period of time (e.g., multiple TTIs), which may allow control module 3510 to reduce the processing clock rate and potentially the voltage setting, which is proportional to the dynamic power consumption squared. Control module 3510 may similarly handle candidate uplink resource block scheduling patterns for the selected transmitter. Other scheduling patterns may combine uplink and downlink activity, such as an exemplary LTE scenario with 8 HARQ processes in which waking up every 4 TTI, for example, would be optimal as two uplink and downlink HARQ processes would be aligned.

Figure 43:
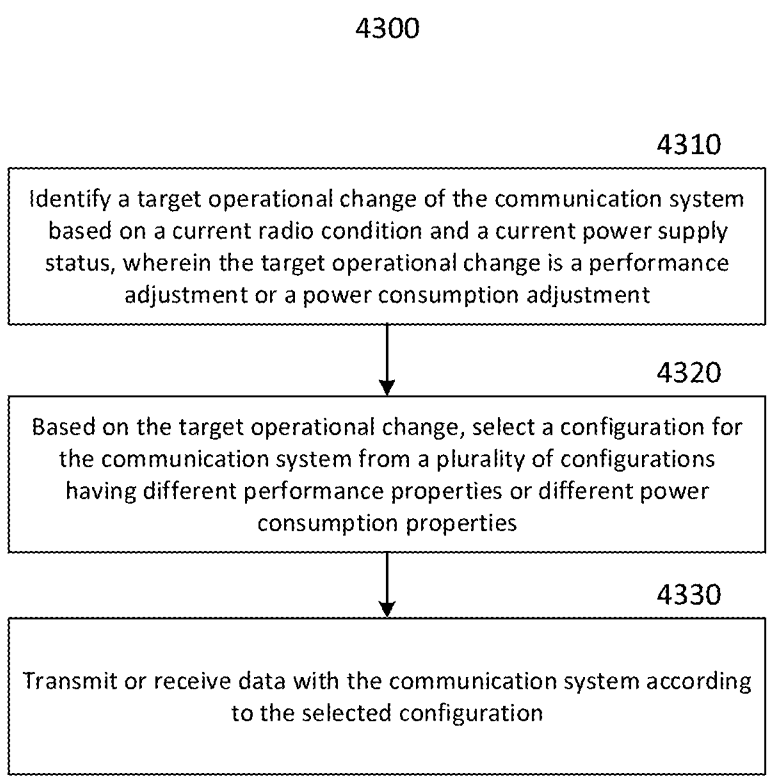
FIG. 43 shows a method of operating a communication system in accordance with some aspects.

FIG. 43 shows method 4300 of operating a communication system according to some aspects of an aspect of the disclosure. As shown in FIG. 43, method 4300 includes identifying a target operational change of the communication system based on a current radio condition and a current power supply status, wherein the target operational change is a performance adjustment or a power consumption adjustment (4310). Based on the target operational change, a configuration for the communication system from a plurality of configurations having different performance properties or different power consumption properties is selected (4320). Data is transmitted or received with the communication system arrangement according to the selected configuration (4330).

2.5 Power-Efficiency #5

According to another aspect of the disclosure, a terminal device may select different transmitters or receivers to apply to certain data streams, or 'data bearers', to satisfy requirements of the data bearers while optimizing power consumption. As each data bearer may have different requirements, certain high-importance data bearers may warrant more intensive reception processing, such as the application of advanced interference cancelation techniques, more decoder iterations, more accurate channel estimators, etc., that may incur a high power penalty at a terminal device. In contrast, data bearers of lower criticality may not need such extra processing in order to satisfy their respective requirements. Terminal devices may therefore select receivers to apply to different data bearers based on the performance of each receiver and the requirements of each data bearer. These aspects may be used with common channel aspects, e.g., a common channel may use a certain data bearer which may be received with a certain receiver to optimize power consumption.

Figure 44:
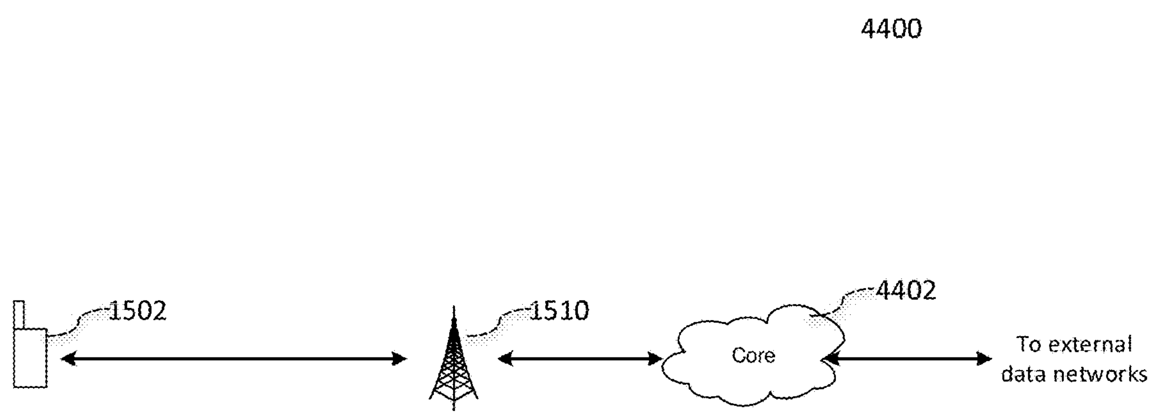
FIG. 44 shows an exemplary radio communication network that illustrates a data bearer in accordance with some aspects.

A 'data bearer' may be logical data connection that bidirectionally transports data along a specific route through a communication network. FIG. 44 shows a RAT-generic example in accordance with some aspects. As shown in FIG. 44, terminal device 1502 may utilize a radio access bearer (RAB) to communicate with a core network location of core network 4402 via network access node 1510. Terminal devices such as terminal device 1502 may therefore communicate with various internal and external nodes of a communication network with such data bearers. For example, an LTE terminal device may communicate with an eNodeB with a radio bearer and with a Serving Gateway (SGW) of the LTE core network (EPC) with a Radio Access Bearer (RAB), which may be composed of the radio bearer and an S1 bearer between the eNodeB and the SGW. Terminal devices may communicate with external locations such as external data networks, or PDNs, with an Evolved Packet Service (EPS) bearer stretching from the terminal device to the PDN Gateway (PGW) and an external bearer connecting the PGW and the PDN. Such data bearers may be similarly provided and utilized in various different radio access technologies.

Terminal device 1502 may utilize a different data bearer for each data network to which terminal device 1502 is connected. For example, terminal device 1502 may have a default data bearer (e.g., a default EPS bearer in an LTE setting) that is connected to a default data network such as an internet network. Terminal device 1502 may have additional dedicated data bearers (e.g., dedicated EPS bearers) to other data networks such as IMS servers used for voice and other data networks utilized for video, file download, push messaging, background updates, etc., multiple of which may be active at a given time. Each data bearer may rely on specific protocols and have specific Quality of Service (QoS) requirements, which may include data performance parameters such as guaranteed data rate, maximum error rate, maximum delay/latency, etc. Accordingly, certain data bearers, such as voice traffic data bearers (e.g., to IMS services for Voice over LTE (VoLTE)), may have higher QoS requirements than other data bearers. Each data bearer may be assigned a QoS priority (e.g., priority levels assigned by QoS Class Identifier (QCI) in the case of LTE) that assigns relative priorities between different data bearers.

Data bearers with high QoS priority, such as critical data, IMS data, conversational voice and video, etc., may therefore call for more intensive receiver processing than lower priority data bearers. As intensive receiver processing generally incurs a higher power penalty, received data from high priority data bearers may be identified and received data from lower priority data bearers may be identified, so as to subsequently process the high priority data with intensive receivers while processing the low priority data with low-power receivers. Such may allow terminal devices to optimize power consumption while still meeting the QoS requirements of each data bearer.

Figure 45:
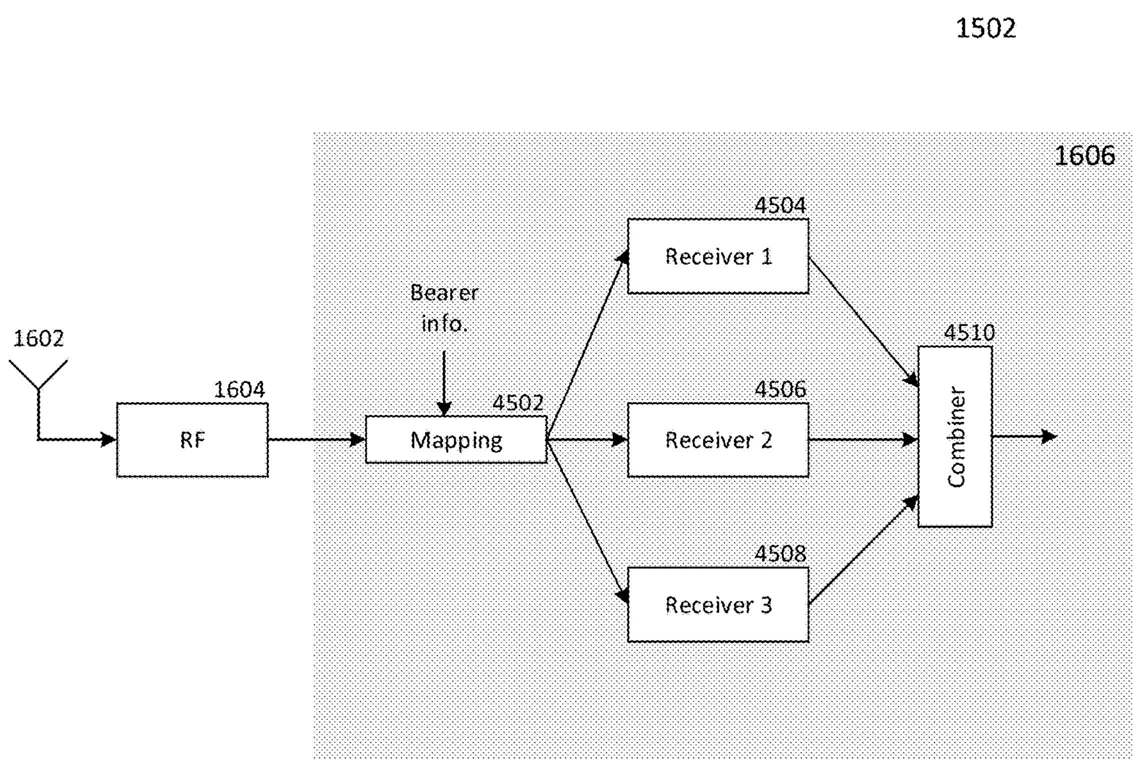
FIG. 45 shows an exemplary internal configuration of a terminal device in a reception setting in accordance with some aspects.

FIG. 45 shows an internal configuration of terminal device 1502 according to another aspect of the disclosure power (where other components of terminal device 1502 may be omitted from FIG. 45 for clarity). As shown in FIG. 45, terminal device 1502 may receive radio signals via antenna system 1602 and provide the resulting signals to RF transceiver 1604 for RF demodulation. RF transceiver 1604 may provide the resulting PHY level (baseband) data to baseband modem 1606 for PHY and protocol stack processing by baseband modem 1606, which as shown in FIG. 45 may include mapping module 4502, receiver 4504, receiver 4506, receiver 4508, and combiner module 4510. Similar to receivers noted above, receivers 4504, 4506, and 4508 may either be physically distinct receivers (e.g., separate physical hardware structures) or may be different configurations of one or more physical receivers (e.g., the same physical hardware with different parameters and/or software-defined components). Regardless, the reception processing of receivers 4504, 4506, and 4508 may be different and each of receivers 4504, 4506, and 4508 may therefore have varying performance and power consumption characteristics. Mapping module 4502 may be configured with the same capabilities as previously described regarding control module 3510, and therefore may be able to dynamically configure a single physical receiver with various different configurations in order to realize receivers 4504, 4506, and 4508. Although RF transceiver 1604 and antenna system 1602 are shown separately from receivers 4504, 4506, and 4508, in some aspects receivers 4504, 4506, and 4508 may be implemented as antenna, RF, PHY, and/or protocol stack level components.

As indicated above, terminal device 1502 may identify data of certain data bearers and map such data to specific receivers according to the QoS requirements of each data bearer. Accordingly, mapping module 4502 may be configured to receive data provided by RF transceiver 1604 and to map such data to receivers 4504, 4506, and 4508 based on the QoS requirements of the associated data bearer. Although described on a functional level herein, in some aspects mapping module 4502 may be structurally realized as a hardware-defined module, e.g., as one or more dedicated hardware circuits or FPGAs, as a software-defined module, e.g., as one or more processors executing program code defining arithmetic, control, and I/O instructions (e.g., software and/or firmware) stored in a non-transitory computer-readable storage medium, or as a mixed hardware-defined and software-defined module. Skilled persons will appreciate the possibility to embody mapping module 4502 in software and/or hardware according to the functionality described herein.

As denoted in FIG. 45, in some aspects mapping module 4502 may receive bearer information and power data as inputs. The power data may be provided by a component such as power consumption module 3512, and may accordingly specify current power consumption and current battery power levels of power supply 1618. As further described below, the bearer information may be provided by a higher-layer control component, such as controller 1610 or a PHY controller of physical layer processing module 1608.

The bearer information may identify on a PHY level which data received by mapping module 4502 from RF transceiver 1604 is part of each data bearer. Accordingly, mapping module 4502 may receive a stream of PHY data from RF transceiver 1604 and be able to determine on a bit-level which data is part of each data bearer. For example, terminal device 1502 may currently have an active default data bearer (associated with e.g., an internet connection) and one or more active dedicated data bearers (associated with e.g., a voice call or other IMS services). Accordingly, the data stream provided by RF transceiver 1604 may contain data from all active data bearers multiplexed onto a single data stream.

Using the bearer information, mapping module 4502 may be able to identify which parts of the data stream (on a bit level) are associated with each data bearer. The bearer information may also indicate the priority of each data bearer, which may accordingly inform mapping module 4502 of the QoS requirements of each data bearer. For example, a first data bearer may be an IMS data bearer (e.g., LTE QCI 5 with priority 1), a second data bearer may be a live video streaming data bearer (e.g., LTE QCI 7 with priority 7), and a third data bearer may be a default data bearer (e.g., LTE QCI 9 with a priority 9). Accordingly, the first data bearer may have the highest QoS requirements while the third data bearer may have the lowest QoS requirements.

A terminal device may simply process the entire PHY data stream, e.g., all data bearers, with a single receiver, such as by utilizing a receiver that has high enough performance to meet the QoS requirements of the highest priority data bearer, e.g., the first data bearer. While the first data bearer may require such high-performance receiver processing to meet the QoS requirements, such may over-exceed the QoS requirements of the remaining data bearers. As receiver power consumption typically scales with performance requirements, such may yield unnecessarily high power consumption.

Terminal device 1502 may thus instead utilize mapping module 4502 to map data for each data bearer to an appropriate receiver, thus meeting the QoS requirements of each data bearer and optimizing power consumption. For example, receiver 4504 may be a high-performance receiver that meets the QoS requirements of the first data bearer, receiver 4506 may be a medium-performance receiver that meets the QoS requirements of the second data bearer, and receiver 4508 may be a lower-performance receiver that meets the QoS requirements of the third data bearer (where the performance levels of each of receivers 4504, 4506, and 4508 may arise from factors as described above, including e.g., different decoders, different equalizers, different filter lengths, different channel estimation techniques, different interference cancelation techniques, different noise cancelation techniques, different processing bit width, different clock frequencies, different component voltages, different packet combination techniques, different number of algorithmic iterations, different usage of iterative techniques in or between components, etc.). For example, high performance receivers such as receiver 4504 may utilize receiver enhancements (e.g., interference cancelation, equalizers, etc.) and/or have higher complexity (e.g., longer FIR filters, more decoder iterations, larger processing bit width, etc.) than low performance receivers.

As receiver 4504 has the highest performance, receiver 4504 may also have the highest power consumption. Accordingly, instead of processing each of the data bearers at receiver 4504, terminal device 1502 may process the second data stream at receiver 4506 and the third receiver stream at receiver 4508. The QoS requirements of each data bearer may thus be met and, due to the use of lower-power receivers 4506 and 4508, power consumption may be reduced. Although described with specific numbers of data bearers and receivers in FIG. 45, this is demonstrative and can be scaled to any number of data bearers and receivers, where each receiver may process one or more data bearers for which each receiver meets the QoS requirements. In certain cases, there may be fewer receivers than data bearers. Accordingly, mapping module 4502 may map the data from each data bearer to the lowest-power receiver that meets the QoS requirements of each data bearer.

Each of receivers 4504, 4506, and 4508 may then perform the respective processing on the received data streams provided by mapping module 4502. In aspects where receivers 4504, 4506, and 4508 are separate physical receivers, receivers 4504, 4506, and 4508 may be able to perform the respective processing simultaneously in parallel. Alternatively, in aspects where one or more of receivers 4504, 4506, and 4508 are different configurations of the same shared physical receiver, the shared physical receiver may process the respectively received data streams sequentially by adjusting its configuration according to each receiver in a serial fashion. Receivers 4504, 4506, and 4508 may either have fixed configurations or may be adaptable. For example, a control module may adapt the configuration at one or more of receivers 4504, 4506, and 4508 to tailor the performance of receivers 4504, 4506, and 4508 by adjusting the configuration to match the QoS requirements of a given data bearer.

Following receiver processing according to their respective configurations, receivers 4504, 4506, and 4508 may then provide the respective processed output streams to combiner module 4510, which may combine the respective processed output streams to form a single data stream. In some aspects, combiner module 4510 may be a digital parallel-to-serial converter configured to combine the received digital data streams into a serial data stream. Combiner module 4510 may then pass the resulting data stream to other components of baseband modem 1606 for further downlink processing. For example, mapping module 4502, receivers 4504, 4506, and 4508, and combiner module 4510 may all be included in physical layer processing module 1608. Combiner module 4510 may then pass the output data stream to other components of physical layer processing module 1608 for further PHY-level processing and subsequent provision to the protocol stack layers of controller 1610.

The bearer information received by mapping module 4502 may therefore specify which data (e.g., on a bit-level) are connected to which data bearer. As the processing of receivers 4504, 4506, and 4508 may generally be done at the PHY level, mapping module 4502 may need to be able to discern which data is related to each data bearer at the PHY level, e.g., at physical layer processing module 1608. Mapping module 4502 may additionally be able to identify the QoS requirements of each data bearer. However, such data bearer information may not be available in radio access technologies such as LTE; for example, according to the LTE standard, LTE protocol stack layers (e.g., at controller 1610 and counterpart layers at the radio access network) may generate physical layer transport blocks that do not specify which data bearer the data is connected to. In other words, only higher layers in the protocol stack may be aware of which data is tied to which data bearer and consequently of the QoS requirements of each data bearer. Such may hold for other radio access technologies.

Accordingly, according to some aspects network cooperation may be relied on to provide mapping module 4502 with bearer information that specifies which data is connected to which data bearer and the associated QoS requirements of each data bearer. As described below, several options for network cooperation may provide mapping module 4502 with appropriate bearer information.

For example, in some aspects the radio access network may signal the bearer information in downlink grants, which may enable mapping module 4502 to receive each downlink grant and appropriately map the related data to receivers 4504, 4506, and 4508. For example, in an LTE setting, network access node 1510 of FIG. 44 may provide downlink grants in the form of PDCCH DCI messages during each TTI. In addition to the existing information provided in such downlink grants, network access node 1510 may additionally provide bearer information that both identifies which data in the upcoming TTI is connected to which data bearer in addition to the QoS requirements of each data bearer. Terminal device 1502 may therefore decode each downlink grant to identify the bearer information for upcoming TTIs and provide the bearer information to mapping module 4502 for subsequent application in mapping incoming downlink data to receivers 4504, 4506, and 4508. In some aspects, such may involve a PHY controller of physical layer processing module 1608 and/or a protocol-stack layer component (e.g., software-defined) of controller 1610 processing downlink grants to identify the bearer information and subsequently providing the bearer information to mapping module 4502.

As previously indicated, in some aspects receivers 4504, 4506, and 4508 may be implemented at separate physical receivers or at one or more shared physical receivers (e.g., where two or more of receivers 4504-4508 are implemented at the same physical receiver; in some aspects, other receivers may also be implemented at separate physical receivers concurrent with operation of the one or more shared physical receivers). In the shared physical receiver case, the shared physical receiver may need to be sequentially reconfigured to meet the performance requirements of each data bearer. Accordingly, the downlink data connected to each downlink grant provided by network access node 1510 may be slightly delayed in order to enable the shared physical receiver to switch between the configurations of receivers 4504, 4506, and 4508. Additionally, in some aspects the radio access network may be able to selectively activate and deactivate this feature (e.g., via higher layer reconfiguration control messages), such as in order to support data bearers with high throughput requirements that cannot tolerate the throughput loss resulting from the switching latency. If the network bearer information provision feature is deactivated, terminal device 1502 may fall back to conventional operation in which all incoming downlink data is processed with a single receiver that meets the QoS requirements of the highest priority data bearer.

Network access node 1510 may be configured in the same manner as network access node 2002 depicted in FIG. 26. In order to facilitate the provision of bearer information to terminal device 1502, network access node 1510 may need to identify the relevant bearer information and transmit the bearer information to terminal device 1502. In accordance with the above-described case in which bearer information is included in downlink grants (e.g., DCI messages), control module 2610 may identify the bearer information for the downlink data addressed to terminal device 1502 and include such information in downlink grants. As such bearer information may not conventionally be available at the PHY layer, control module 2610 may need to provide bearer information to physical layer module 2608, which physical layer module 2608 may then include in downlink grants. Network access node 1510 may then transmit such downlink grants via radio module 2604, and antenna 2602 as previously described.

Figure 46:
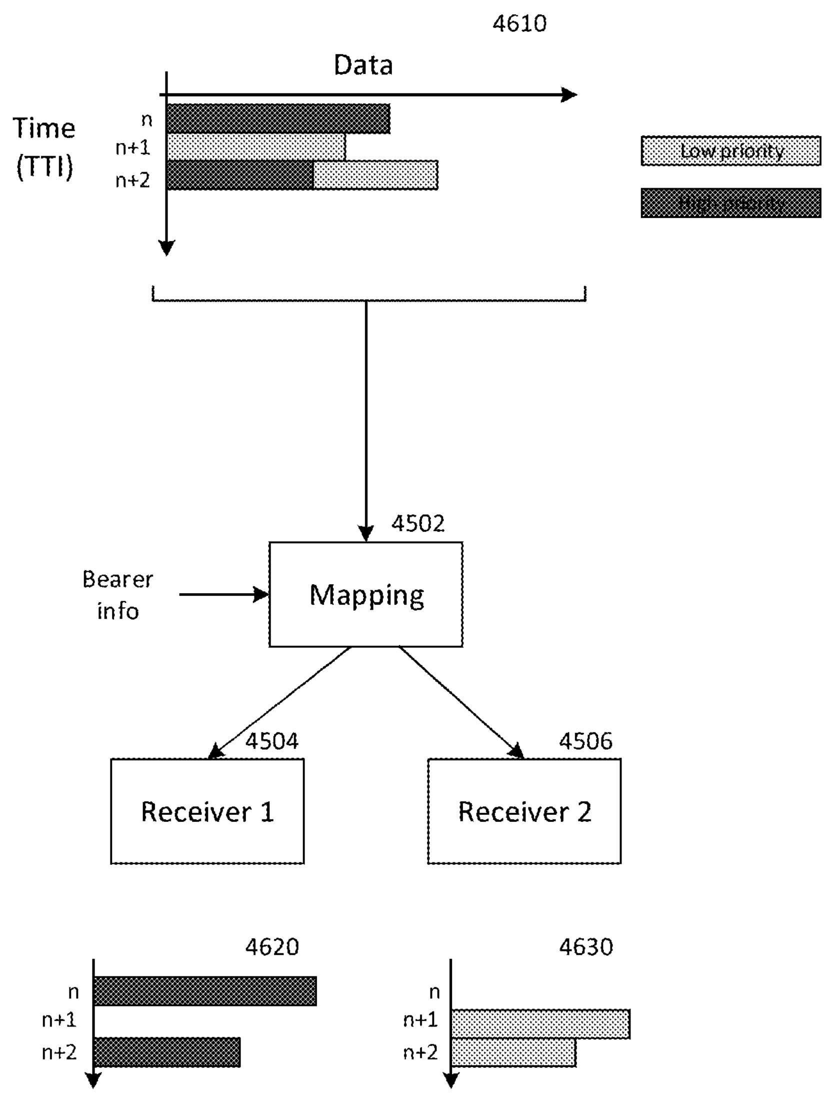
FIG. 46 shows a first mapping of data from different data bearers to different receiver modules in accordance with some aspects.

FIG. 46 shows a graphical depiction of the operation of mapping module 4502 and receivers 4504 and 4506 in accordance with some aspects. As shown in FIG. 46, terminal device 1502 may receive downlink data as indicated in data grid 4610, which may span three TTIs and be composed of downlink data belonging to a high priority data bearer and a low priority data bearer. Mapping module 4502 may receive the PHY-level data from RF transceiver 1604 along with the bearer information (obtained e.g., within a downlink grant provided by network access node 1510) that identifies which data belongs to which bearer and the QoS requirements of each data bearer. Mapping module 4502 may then identify the data belonging to the high priority data bearer and provide this data to receiver 4504, which may be a high performance receiver that meets the QoS requirements of the high priority data bearer. Mapping module 4502 may additionally identify the data belonging to the low priority data bearer and provide this data to receiver 4506, which may be a lower performance receiver with lower power consumption that meets the QoS requirements of the low priority data bearer. Receivers 4504 and 4506 may then perform receiver processing according to their respective configurations on the provided data, which may result in receivers 4504 and 4506 processing downlink data as respectively shown in data grids 4620 and 4630. Accordingly, as shown in data grids 4620 and 4630, receiver 4504 may process the data from the high priority data bearer during each TTI while receiver 4506 may process the data from the low priority data bearer during each TTI. The QoS requirements of each data bearer may therefore be met while allowing receiver 4506 to utilize a lower-power configuration, thus optimizing power consumption.

Additionally or alternatively, in some aspects network access node 1510 may use a carrier aggregation scheme to enable mapping module 4502 to map the data from each data bearer to an appropriate receiver. Accordingly, where e.g., two carriers are available for downlink transmissions from network access node 1510 to terminal device 1502, network access node 1510 may allocate the data from a first data bearer onto a first carrier and allocate the data from a second data bearer onto a second carrier. Mapping module 4502 may therefore provide the data from the first carrier to a receiver that meets the QoS requirements of the first data bearer and provide the data from the second carrier to another receiver that meets the QoS requirements of the second data bearer.

Figure 47:
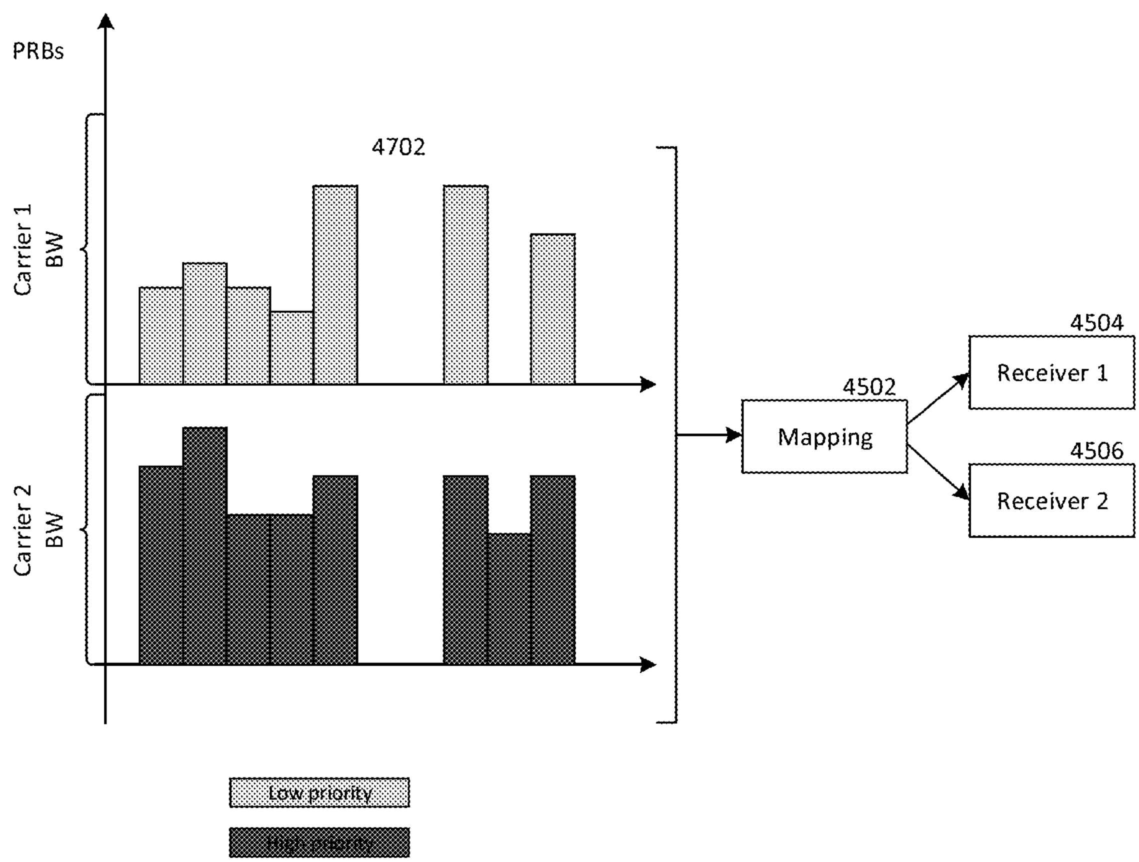
FIG. 47 shows a second mapping of data from different data bearers to different receiver modules in accordance with some aspects.

FIG. 47 shows a graphical depiction of the operation of terminal device 1502 in accordance with some aspects of a carrier aggregation network cooperation scheme introduced above. As shown in data grid 4702, a first carrier of the carrier aggregation scheme may contain data for a low priority data bearer while a second carrier of the carrier aggregation may contain data for a high priority data bearer. Such may rely on cooperation from network access node 1510, which may be responsible in a carrier aggregation scheme for allocating data to each carrier. Accordingly, network access node 1510 may identify which data intended for terminal device 1502 is connected to high priority data bearers and which data intended for terminal device 1502 is connected to low priority data bearers. As such information may conventionally be available at protocol stack layers, control module 2610 may provide physical layer module 2608 with bearer information that specifies which data is connected to which data bearers. Physical layer module 2608 may then utilize such bearer information to identify which data is connected to high priority data bearers and which data is connected to low priority data bearers. Physical layer module 2608 may then transmit the low priority data on the first carrier and the high priority data on the second carrier as shown in data grid 4702 of FIG. 47.

Terminal device 1502 may then receive both the first carrier and the second carrier according to the carrier aggregation scheme. Although not explicitly reflected in FIG. 45, in some aspects carrier aggregation compatibility may require more complex reception functionality at antenna system 1602, RF transceiver 1604, and baseband modem 1606 to receive and process both carriers simultaneously. For example, there may be separate 'duplicate' receive chains that are each dedicated to a separate carrier. There may also be a coordination function on top of the receive chains to oversee coordinated operation between the receive chains. In some aspects of merged approaches where the receive chains for multiple carriers are fully or partially merged, the coordination function may be needed to ensure that the data is processed correctly. Accordingly, receivers 4504-4508 may be controlled by a coordination function that coordinates reception of data by receivers 4504-4508 on the various carriers. In some aspects, there may be additional self-interference cancellation components that manage the interference from the transmit chain to the receive chain.

After receiving both carriers, mapping module 4502 may map the received data to receivers 4504 and 4506 for subsequent reception processing. As the first carrier contains data from a low priority data bearer and the second carrier contains data from a high priority data bearer, mapping module 4502 may route the data received on the first carrier to receiver 4506 (which as indicated above may be lower-performance and lower power than receiver 4504) and route the data received on the second carrier to receiver 4504. Terminal device 1502 may therefore meet the QoS requirements of both data bearers while conserving power through the use of lower-power receiver 4506 to process the low priority data bearer.

As opposed to the case described above regarding FIG. 46 where mapping module 4502 receives bearer information that specifies which data is connected to which data bearer on a bit-level, in some aspects mapping module 4502 may only require bearer information that specifies which carrier contains data for the high priority data bearer and which carrier contains data for the low priority data bearer. Accordingly, the bearer information provided by network access node 1510 in the case of FIG. 47 may be simplified and/or be provided less frequently.

Figure 48:
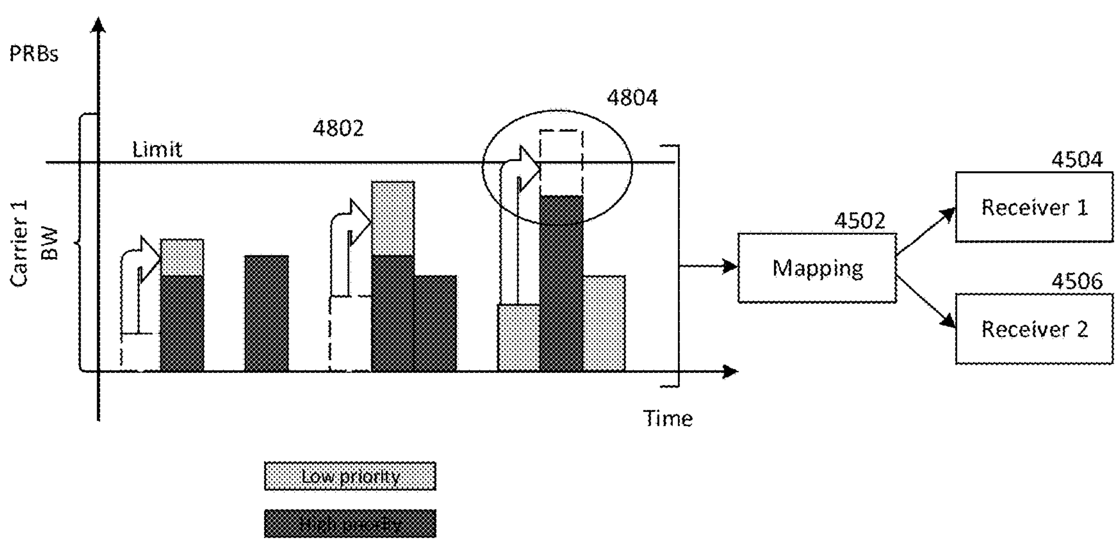
FIG. 48 shows a third mapping of data from different data bearers to different receiver modules in accordance with some aspects.

In various aspects, network access node 1510 and terminal device 1502 may also employ further cooperation techniques to conserve power at terminal device 1502. As shown in data grid 4802 of FIG. 48, in some aspects network access node 1510 may delay transmission of data for low-priority data bearers to enable terminal device 1502 to power down receiver components more often. Accordingly, control module 2610 of network access node 1510 may provide physical layer module 2608 with bearer information that specifies which data is connected to high priority data bearers and which data is connected to low priority data bearers. Physical layer module 2608 may then allocate data intended for terminal device 1502 in time to provide terminal device 1502 with more receiver inactivity periods. As data connected to a low priority data bearer may have less restrictive latency requirements, network access node 1510 may be able to slightly delay (depending on the latency QoS requirements) data for the low priority data bearer in order to create more receiver inactivity periods. As shown in data grid 4802, network access node 1510 may delay transmission of such data to align the low priority data in time with the high priority data. Accordingly, as opposed to activating receivers 4504 and 4506 for e.g., two consecutive time slots, terminal device 1502 may only activate receivers 4504 and 4506 for e.g., one time slot in which data for both the low priority and high priority data bearers is received. Terminal device 1502 may deactivate receivers 4504 and 4506 (e.g., place in a power saving state) during the resulting receiver inactivity periods, thus conserving more power. In some aspects, the ability of network access node 1510 to delay low priority data to align the low priority data with high priority data in time may depend on the latency requirements and the separation in time between the low priority data and the next scheduled high priority data. For example, network access node 1510 may be able to delay low priority data for e.g., one or two time slots (depending on the latency requirements) but may not be able to further delay the low priority data. Accordingly, network access node 1510 may only be able to align low priority data with high priority data if the high priority data is scheduled for one or two time slots following the low priority data. As in the case of FIG. 46, network access node 1510 may provide detailed bearer information to enable mapping module 4502 to route data from high and low priority bearers to the proper receivers. In addition to the latency and time scheduling constraints on network access node 1510, each time slot may have limited bandwidth for transmitting data to terminal device 1502. As shown at 4804 of data grid 4802, there may already be a large amount of high priority data scheduled for certain time slots which may prevent network access node 1510 from being able to align low priority data on the same time slot. Accordingly, if the cumulative bandwidth of the scheduled high priority data and the low priority data exceeds a bandwidth limit for a given time slot, network access node 1510 may not be able to delay the low priority data to align the low priority data with scheduled high priority data.

Figure 49:
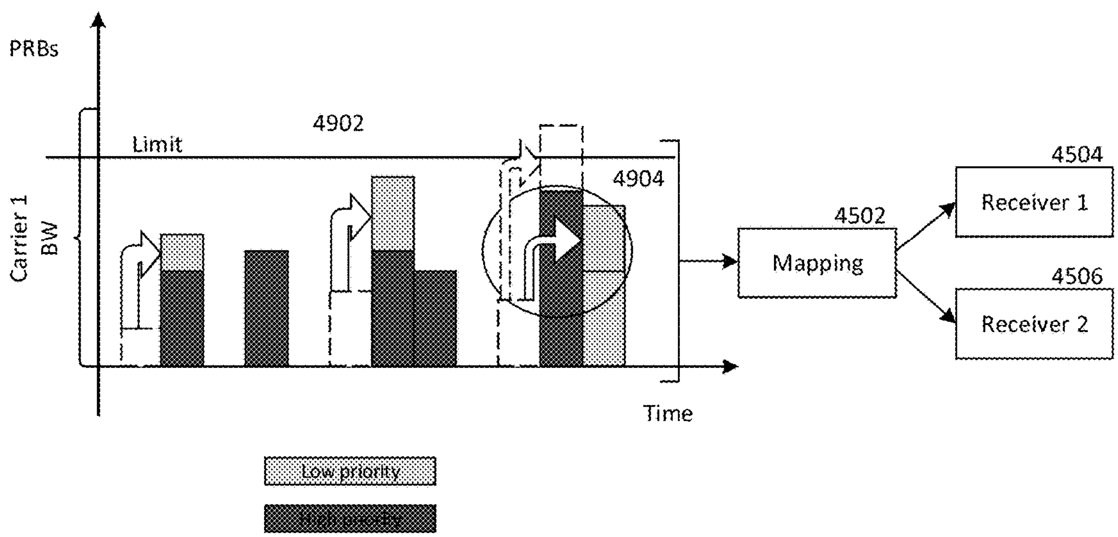
FIG. 49 shows a fourth mapping of data from different data bearers to different receiver modules in accordance with some aspects.

As data grid 4802 may include data from the high priority data bearer and the low priority data bearer on the same carrier in the same time slot, in some aspects the bearer information may specify in detail which data is connected to the high priority data bearer and which data is connected to the low priority data bearer. Alternative to the case of data grid 4802, if low priority data does not fit in the immediately succeeding time slot, network access node 1510 may schedule transmission of the low priority data on the next upcoming time slot that can fit the low priority data. FIG. 49 shows an example in data grid 4902, where at 4904 network access node 1510 may determine that the low priority data will not fit in the immediately succeeding time slot. Instead of transmitting the low priority data on the originally scheduled time slot, network access node 1510 may continue to delay the low priority data until the next time slot that has space for the low priority data, e.g., a delay of two time slots in the exemplary case of FIG. 49. In some aspects, network access node 1510 may consider delays of the low priority data based on the latency requirements of the low priority data, and accordingly may in some cases only consider delays of the low priority data within a certain number of time slots.

Figure 50:
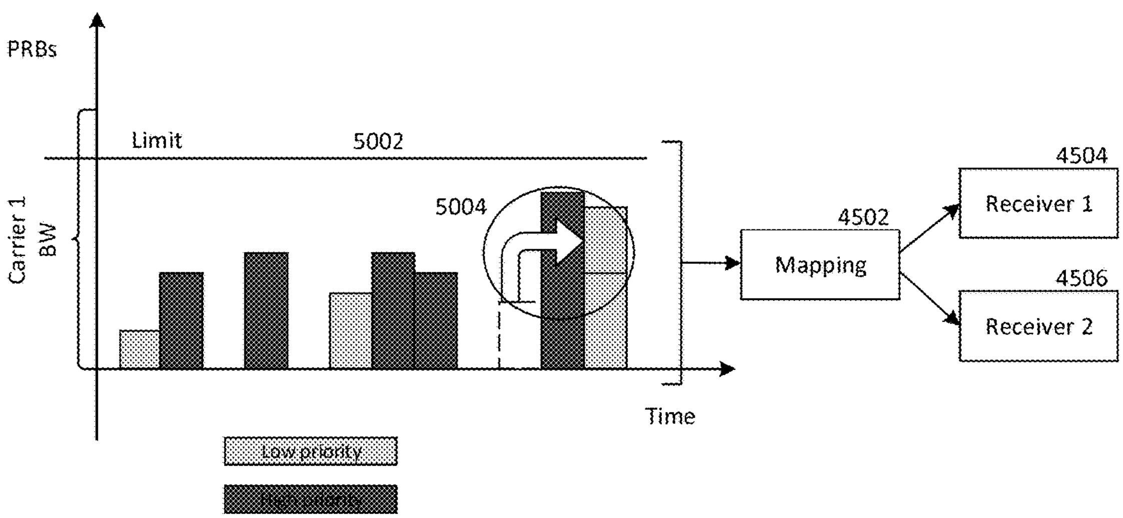
FIG. 50 shows a fifth mapping of data from different data bearers to different receiver modules in accordance with some aspects.

Alternative to the cases of data grids 4802 and 4902, in some aspects network access node 1510 may schedule transmission of data for the high priority and low priority data bearers so that each time slot contains data exclusively for one of the data bearers. As shown at 5004 of data grid 5002 in FIG. 50, network access node 1510 may delay data for the low priority data bearer to align the low priority data with other scheduled low priority data. Accordingly, each time slot may exclusively contain data for one data bearer (or alternatively contain data for data bearers of equivalent or similar QoS requirements). As noted above, the ability of network access node 1510 to perform such scheduling adjustments may depend on the latency requirements of the low priority data bearer, the time separation between low priority data and the next scheduled low priority data, and the bandwidth limit.

The case of data grid 5002 may simplify the bearer information that network access node 1510 provides to mapping module 4502. Instead of providing bearer information that specifies which data is connected to which data bearer, network access node 1510 may instead provide bearer information that specifies which data bearer an entire time slot is connected to. In other words, instead of specifying on a bit-level which data of each time slot is connected to which data bearer (as in the case of data grid 4802), the bearer information provided by network access node 1510 may instead specify which data bearer is connected to each time slot. Mapping module 4502 may then route data received in time slots containing high priority data to receiver 4504 and route data received in time slots containing low priority data to receiver 4506.

Figure 51:
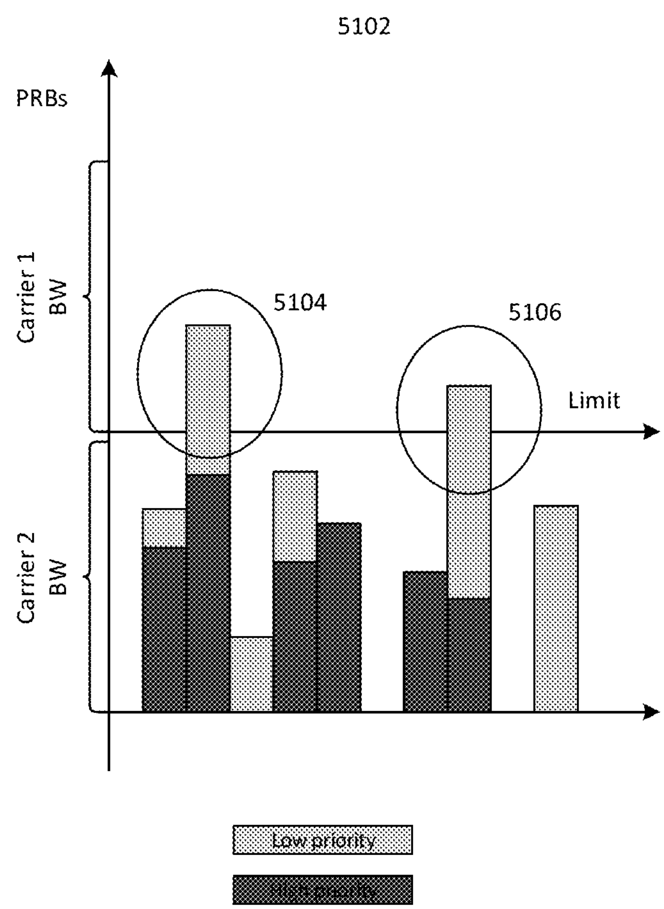
FIG. 51 shows an exemplary distribution of data across different carriers of a carrier aggregation scheme in accordance with some aspects.

FIG. 51 shows another scenario in which network access node 1510 and terminal device 1502 may cooperate to conserve power at terminal device 1502 by using a single carrier as opposed to multiple carriers. As operation of carrier aggregation schemes may involve more complex reception processing than single carrier schemes, terminal device 1502 may consume more power when employing carrier aggregation. Network access node 1510 may therefore cooperate with terminal device 1502 to utilize a single carrier to provide high and low priority data bearers whenever possible.

As shown in data grid 5102, there may be scenarios such as 5104 and 5106 in which the amount of downlink data for terminal device 1502 may exceed bandwidth limits for a single carrier. Instead of allocating data onto a second carrier, network access node 1510 may instead adjust the scheduling of downlink data to enable terminal device 1502 to continue using a single carrier.

Figure 52:
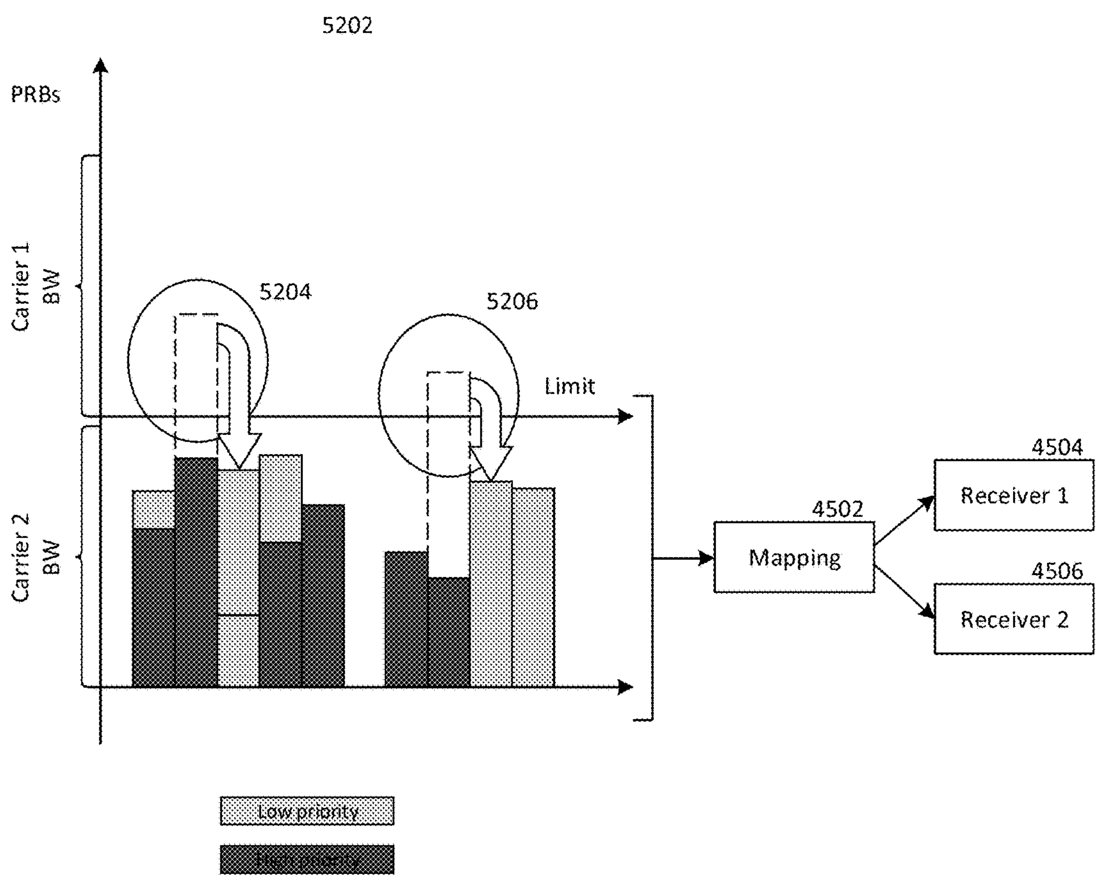
FIG. 52 shows a sixth mapping of data from different data bearers to different receiver modules in accordance with some aspects.
Figure 53:
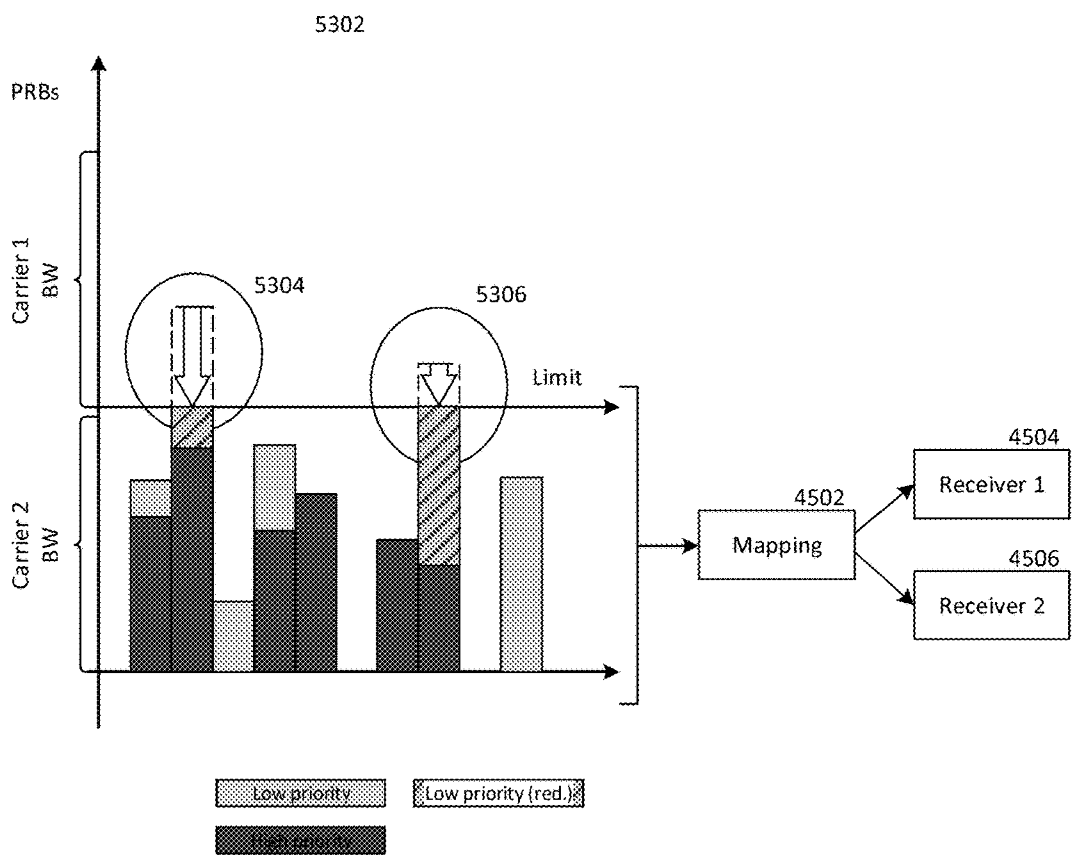
FIG. 53 shows a seventh mapping of data from different data bearers to different receiver modules in accordance with some aspects.

FIGS. 52 and 53 show two different solutions that network access node 1510 can utilize to allow for continued single carrier usage in accordance with some aspects. As shown in data grid 5202 of FIG. 52, network access node 1510 may delay data for a low priority data bearer to later time slots that have sufficient bandwidth headroom, e.g., that have enough remaining bandwidth capacity relative to the limit to fit low priority data from the time slots that exceed the bandwidth limit. As the low priority data bearer may have lower latency requirements, network access node 1510 may be able to delay the low priority data for several time slots while still meeting the latency requirements. As shown in data grid 5202, the resulting schedule adjustment may fit the data from both the high and low priority data bearers within a single carrier and avoid the need to utilize a second carrier for terminal device 1502. Network access node 1510 may similarly provide mapping module 4502 with bearer information for each time slot that identifies which data is connected to which data bearer on a bit-level, which mapping module 4502 may apply to route high priority data to receiver 4504 and low priority data to receiver 4506.

In some aspects, network access node 1510 may reduce the error protection on low priority data in order to reduce the total number of encoded bits for the low priority data, thus enabling network access node 1510 to fit data for both the high priority and low priority data bearers on a single carrier. More specifically, the data for both the high priority and low priority data bearers may be encoded with a channel coding scheme to provide for error correction and/or error checking (e.g., Turbo coding and Cyclic Redundancy Check (CRC) in an LTE setting). While lower coding rates (e.g., more coding bits) may provide better error protection, the resulting increase in coding bits may require greater bandwidth.

However, as the low priority data bearer may have a less restrictive error rate requirement than the high priority data bearer, network access node 1510 may be able to increase the coding rate of the low priority data to compress the size of the low priority data. The reduction in data size may then enable network access node 1510 to fit the data from both the high and low priority data bearers onto a single carrier. As shown in data grid 5302, network access node 1510 may therefore identify the time slots which exceed the bandwidth limit and increase the coding rate of the low priority data to a degree that the data fits within the bandwidth limit. As network access node 1510 may only increase the coding rate for certain time slots that exceed the bandwidth limit, the low priority data in the remaining time slots may have sufficient error protection to still meet the error rate requirements of the low priority data bearer. Network access node 1510 may avoid adjustments to the data of the high priority data in order to ensure that the QoS requirements of the high priority data bearer are maintained.

With respect to performing the coding rate adjustments, in some aspects control module 2610 may provide bearer information to physical layer module 2608, which physical layer module 2608 may utilize to identify time slots that exceed the bandwidth limit and to increase the coding rate for low priority data in such time slots to meet the bandwidth limit. Physical layer module 2608 may then provide terminal device 1502 with bearer information that specifies the bit-wise locations of high priority and low priority data in each time slot. Mapping module 4502 may then apply the bearer information to route the high priority data to receiver 4504 and the low priority data to receiver 4506.

As the increased coding rate for the low priority data may decrease error protection, in some aspects terminal device 1502 may also in certain cases increase the performance of the low performance receiver 4506 (or utilize a slightly higher performance receiver) to help ensure that the error rate requirements of the low priority data bearer are still met. Accordingly, if mapping module 4502 receives bearer information from network access node 1510 that indicates that the coding rate for the low priority data bearer has been increased, mapping module 4502 may select a slightly higher performance receiver than would be used for low priority data with a standard coding rate. While such may also slightly increase power consumption of terminal device 1502, this may be offset by the power savings from using a single carrier.

While described individually in FIGS. 46-53, multiple of these cooperation techniques may be employed in combination by network access node 1510 and terminal device 1502. Additionally, while FIGS. 46-53 show more than one receiver, mapping module 4502 may utilize any number of different receivers that may either be fixed or dynamically configurable, e.g., based on the QoS requirements of the data bearers. Any number of data bearers with varying QoS requirements and associated priorities may additionally be employed.

Mapping module 4502 may additionally be configured to consider power and radio condition status data in the same nature as control module 3510. For example, mapping module 4502 may be configured to utilize higher performance receivers in poor radio conditions, lower power and lower performance receivers in strong radio conditions, and low power receivers in low battery power conditions. Mapping module 4502 may be configured to implement such features while ensuring that the QoS requirements of each data bearer are met.

In addition to the downlink cases related to receivers described above, in some aspects terminal device 1502 may additionally be configured in the uplink direction to utilize specific transmitters for different uplink data bearers. As in the downlink case, terminal device 1502 may additionally be responsible for maintaining uplink data bearers, where the uplink data bearers may have specific QoS requirements (which may differ from the QoS requirements of the counterpart downlink data bearer). In some cases, the uplink data bearers may run counterpart to downlink data bearers, e.g., may form the other direction of a bi-directional link between terminal device 1502 and a network node, while in other cases terminal device 1502 may have unidirectional data bearers in the uplink and/or downlink direction that do not have a counterpart data bearer in the other direction. Instead of utilizing a transmitter configuration that meets the QoS requirements of the highest data bearer, terminal device 1502 may instead selectively map data from each data bearer to a specific transmitter that meets the QoS requirements of each data bearer. By utilizing lower power transmitters for lower priority data bearers, terminal device 1502 may improve power efficiency while still meeting the QoS requirements of each data bearer.

Figure 54A:
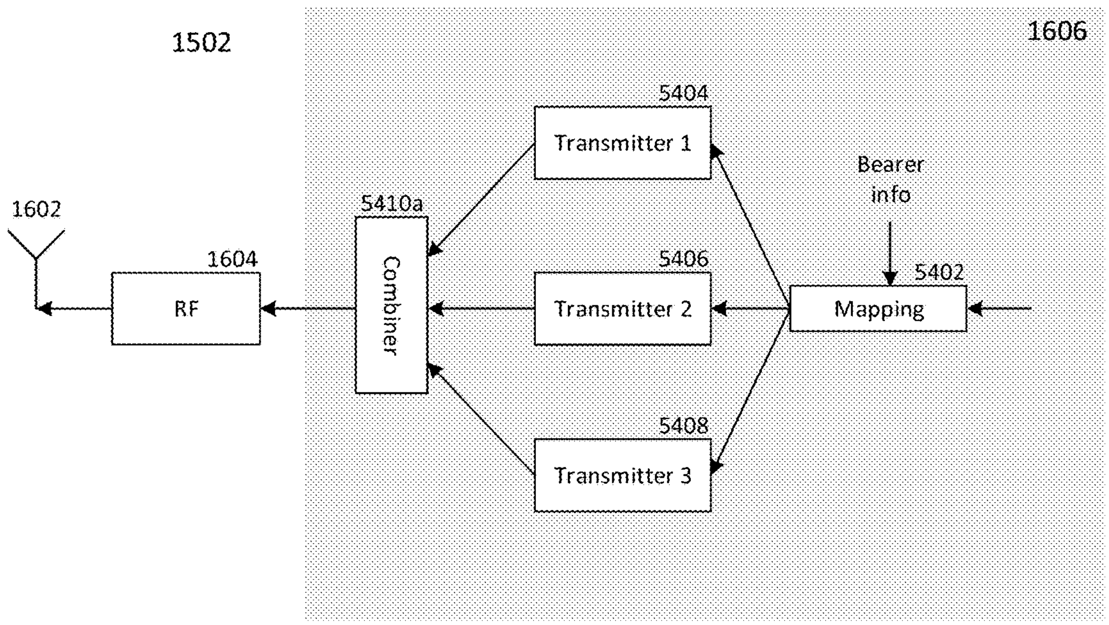
FIGS. 54A and 54B show various exemplary internal configuration of a terminal device in a transmission setting in accordance with some aspects.
Figure 54B:
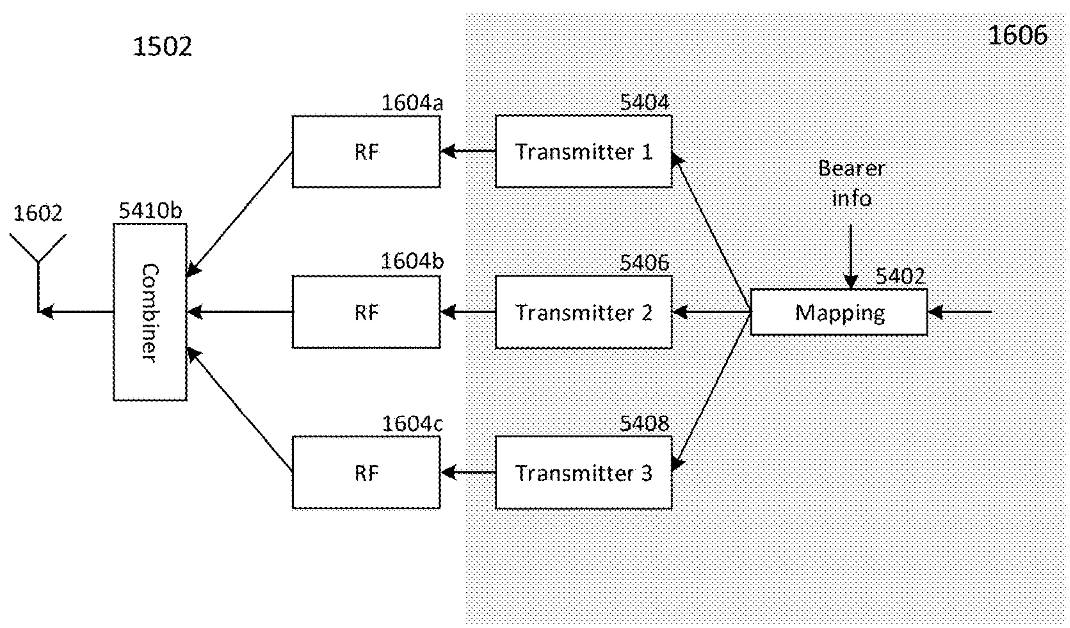

FIGS. 54A and 54B show exemplary internal configurations of terminal device 1502 according to an aspect of the disclosure with respect to the uplink direction. The depictions illustrated in FIGS. 54A and 54B may omit certain other components of terminal device 1502 not directly related to the current aspect with respect to the uplink direction. For example, baseband modem 1606 may additionally include the downlink-direction components shown in FIG. 45.

As shown in FIGS. 54A and 54B, in various aspects terminal device 1502 can combine transmitter outputs prior to RF modulation (FIG. 54A) or with combining of transmitter outputs after RF modulation (FIG. 54B). In both cases, and similar to the case of FIG. 36 described detailed above, transmitters 5404, 5406, and 5408 in FIG. 54A may in various aspects be physically distinct transmitters (e.g., separate physical hardware structures) or may be different configurations of one or more physical transmitters (e.g., the same hardware with different parameters and/or software-defined instructions for execution). Regardless, the transmission processing for each of transmitters 5404, 5406, and 5408 may be different and each of transmitters 5404, 5406, and 5408 may therefore have varying performance and power consumption characteristics. Mapping module 5402 can be configured with the same or similar capabilities as previously described regarding control module 3510, and therefore may be able to dynamically configure a single physical transmitter with various different configurations to realize transmitters 5404, 5406, and 5408.

Mapping module 5402 may therefore route data for a plurality of data bearers to transmitters 5404, 5406, and 5408 based on the QoS requirements of the data bearers and the performance and power efficiency of transmitters 5404, 5406, and 5408. For example, mapping module 5402 may route the data for each respective data bearer to the lowest-power transmitter that meets the QoS requirements of the respective data bearer.

In the case of FIG. 54A, transmitters 5404, 5406, and 5408 may then perform transmission processing on such data according to their respective configurations and provide the resulting processed data to combiner 5410*a*. Combiner 5410*a* may combine the received data into a single stream and provide the single data stream to RF transceiver 1604 and antenna system 1602 for RF processing and transmission. Although RF transceiver 1604 and antenna system 1602 are shown separately from transmitters 5404, 5406, and 5408, transmitters 5404, 5406, and 5408 may be implemented as antenna, RF, PHY, and/or protocol stack level components.

In the case of FIG. 54B, transmitters 5404, 5406, and 5408 may then perform transmission processing on such data according to their respective configurations and provide the resulting processed data to RF transceivers 1604*a*, 1604*b*, and 1604*c*, respectively. RF transceivers 1604*a*-1604*c* may then perform RF processing and modulation on the data received from transmitters 5404-5408 and provide the resulting RF signals to combiner 5410*b*, which may then combine the received RF signals into a single RF signal and provide the single RF signal to antenna system 1602 for transmission (although there may be additional components between combiner 5410 and antenna system 1602, such as power amplifier components). In some aspects, combiner 5410*a* may be configured for baseband data combination while combiner 5410*b* may be configured for RF signal combination. Although shown separately from transmitters 5404-5408 in FIG. 54B, in some aspects RF transceivers 1604*a*-1604*c* can be implemented as part of transmitters 5404-5408, such as e.g., RF transmitters configured to perform different RF modulation in accordance with a specific RF configuration of transmitters 5404-5408.

In both cases of FIGS. 54A and 54B, mapping module 5402 may perform the data routing based on bearer information that may be available locally at terminal device 1502. For example, the bearer information, e.g., the QoS requirements and the bit-level location of data for each bearer, may be available at the protocol stack layer at controller 1610 and/or the application layer at an application processor (e.g., data source 1612/data sink 1616). Accordingly, such upper layers may provide the bearer information to mapping module 5402, which may then route data to transmitters 5404, 5406, and 5408 based on the QoS requirements of each data bearer and the performance and power efficiency level of transmitters 5404, 5406, and 5408.

Terminal device 1502 may therefore also conserve power during transmission by using lower power transmitters that still meet the QoS requirements of the data bearers. Aspects of this disclosure may therefore provide for power efficiency in both reception and transmission by enabling terminal device 1502 to selectively apply receivers and transmitters based on the QoS requirements of data bearers. Terminal device 1502 may additionally employ any of the bearer mapping techniques described in FIGS. 47-53 in the uplink direction.

Figure 55:
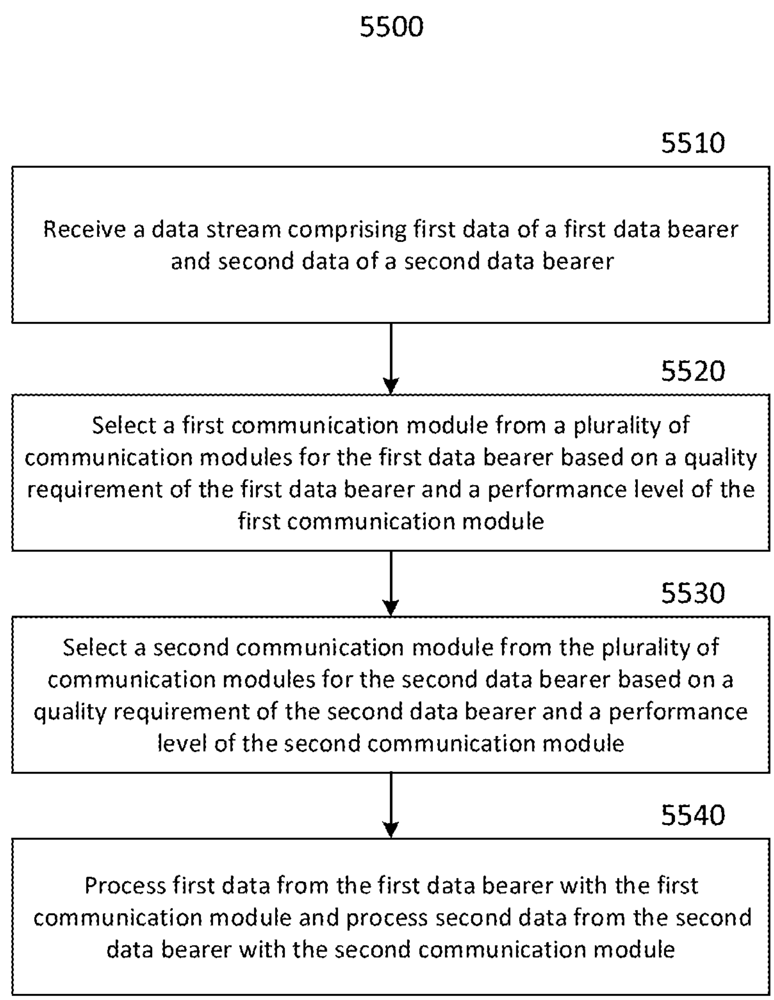
FIG. 55 shows a first exemplary method of performing radio communications in accordance with some aspects.

FIG. 55 shows method 5500 of performing radio communications in accordance with some aspects of the disclosure. As shown in FIG. 55, method 5500 includes receiving a data stream comprising first data of a first data bearer and second data of a second data bearer (5510). A first communication module is selected from a plurality of communication modules for the first data bearer based on a quality requirement of the first data bearer and a performance level of the first communication module (5520). A second communication module is selected from the plurality of communication modules for the second data bearer based on a quality requirement of the second data bearer and a performance level of the second communication module (5530). First data from the first data bearer is processed with the first communication module and second data from the second data bearer is processed with the second communication module (5540).

Figure 56:
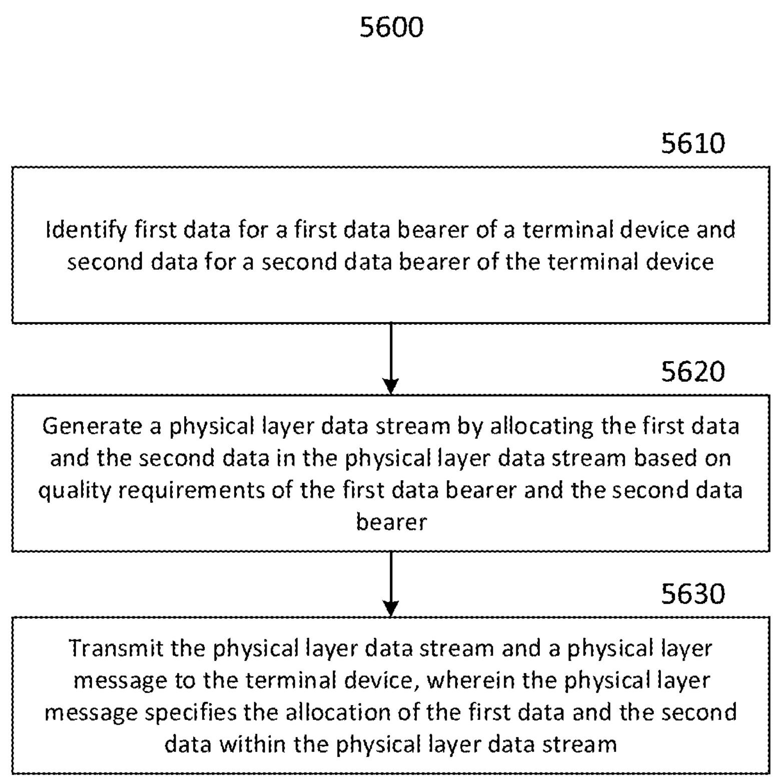
FIG. 56 shows a second exemplary method of performing radio communications in accordance with some aspects.

FIG. 56 shows method 5600 of performing radio communications according to an aspect of the disclosure. As shown in FIG. 56, method 5600 includes identifying first data for a first data bearer of a terminal device and second data for a second data bearer of the terminal device (5610). A physical layer data stream is generated by allocating the first data and the second data in the physical layer data stream based on quality requirements of the first data bearer and the second data bearer (5620). The physical layer data stream and a physical layer message are transmitted to the terminal device (5630), such that the physical layer message specifies the allocation of the first data and the second data within the physical layer data stream.

Aspects discussed herein generally relate to power savings at terminal devices, which is a consideration due to the finite power supply (e.g., battery-powered) of many terminal devices (although not all terminal devices may be exclusively battery powered). However, power efficiency may additionally be a notable characteristic of network access nodes in order to reduce operational costs. In particular, access nodes such as base stations and access points may be able to reduce operating costs for network operators by employing power-efficient architectures and techniques to reduce power consumption. The aforementioned techniques to map lower priority data bearers to lower performance receivers and transmitters, or techniques to schedule and delay lower priority data packets in order to obtain TTIs where receivers or transmitters can be turned off completely, or techniques where the code rate of lower priority data bearers is increased in order to avoid that a secondary component carrier and its associated receivers and transmitters have to be activated may allow to reduce power consumption of network access nodes, and various other techniques such as wake/sleep cycles, frequency scaling, and traffic/task concentration (less fragmented wake/sleep cycles). In various aspects, network access nodes may be configured with advanced power management architecture, such as where the processing infrastructure of the network access node has a predefined set of 'power states' where each power state has a predefined level of power consumption and processing capability (e.g., the ability to support a given processing demand). The lower performance receivers and transmitters for the lower priority data bearers may have lower processing demand and turning off or de-activating receivers or transmitters temporarily reduces the average processing demand. An advanced power management architecture in a network access node may allow to reduce power consumption of network access nodes in phases of lower processing demand.

2.6 Power-Efficiency #6

According to another aspect of this disclosure, a network processing component (at a network access nodes or in the core network) may utilize duty cycling in order to concentrate data traffic into 'active' phases while entering a power-efficient state during 'inactive' phases. The use of such power-efficient states during inactive phases may allow network processing components to reduce power consumption and consequently reduce operating costs. These aspects may be used with common channel aspects, e.g., a common channel may use certain duty cycling to reduce number, length and duration of 'active' phases.

As previously described, network access nodes may serve as bidirectional intermediaries in providing downlink data to terminal devices and receiving uplink data from terminal devices. In the downlink direction, network access nodes may provide terminal devices with both external data received from the core network and data generated locally at the network access node, where the local data may generally be radio access control data and the external data may be user data and higher-layer control data. The network access node may therefore receive such external data from the core network over backhaul links, process and package the external data according to radio access protocols (which may include insertion of locally generated control data), and provide the resulting data to terminal devices over a radio access network. In the uplink direction, network access nodes may receive uplink data from terminal devices and process the received uplink data according to radio access protocols. Certain uplink data may be addressed to further destinations upstream (such as higher-layer control data addressed to core network nodes or user traffic data addressed to external data networks) while other uplink data may be addressed to the network access node as the endpoint (such as radio access control data). FIG. 44 depicts a general example of such uplink and downlink paths related to terminal device 1502, network access node 1510, and core network 4402.

Accordingly, network access nodes such as base stations may perform processing in both the downlink and uplink directions according to the appropriate radio access protocols. Such may involve both physical layer and protocol stack layer processing, where network access nodes may process uplink and downlink data according to each of the respective layers in order to effectively utilize the radio access network to communicate with terminal devices.

The processing infrastructure at a network access node may be a combination of hardware and software components. FIG. 26 depicts a general architecture of a network access node, e.g., network access node 2002, where communication module 2606 including physical layer module 2608 and control module 2610 may provide the processing infrastructure utilized for the aforementioned uplink and downlink processing.

In a 'distributed' base station architecture, network access node 2002 may be split into two parts: a radio unit and a baseband unit. Accordingly, antenna system 2602 and radio module 2604 may be deployed as a remote radio head (RRH, also known as a remote radio unit (RRU)), which may be mounted on a radio tower. Communication module 2606 may then be deployed as a baseband unit (BBU), which may be connected to the RRH via fiber and may be placed at the bottom of the tower or a nearby location.

Other base station architectures including base station hoteling and Cloud RAN (CRAN) may also be applicable. In base station hoteling, multiple BBUs serving different RRHs at different locations may each be physically placed in the same location, thus allowing for easier maintenance of multiple BBUs at a single location. As the RRHs may be located further from the counterpart BBUs than in a conventional distributed architecture, the BBUs may need to interface with the RRHs over long distances e.g., with fiber connections. CRAN may similarly control multiple RRHs from centralized or remote baseband processing locations involving a pooled or non-pooled architecture where infrastructure may or may not be virtualized. In essence, CRAN may dynamically deliver processing resources to any point in the network based on the demand on the network at that point in time. CRAN for 5G includes delivering slices of network resource and functionality delivering avenue for network slicing.

Regardless of whether communication module 2606 is located at a distributed or centralized location and/or implemented as a standalone BBU or in a server, communication module 2606 may be configured to perform the physical layer and protocol stack layer processing at physical layer module 2608 and control module 2610, respectively. Control module 2610 may be implemented as a software-defined module and/or a hardware-defined module. For example, control module 2610 may include one or more processors configured to retrieve and execute software-defined program code that define protocol stack-layer functionality. In some aspects, control module 2610 may additionally include hardware components dedicated to specific processing intensive tasks, also known as 'hardware accelerators, which may be controlled by the processor(s) and used to implement certain tasks such as e.g., cryptography and encryption functions. Physical layer module 2608 may likewise be implemented as hardware-defined and/or software-defined module, such as e.g., one or more processors (e.g., a PHY controller) and/or one or more hardware accelerators for dedicated PHY-layer processing, such as Fast Fourier Transform (FFT) engines, Viterbi decoders, and other processing-intensive PHY-layer tasks. Any combination of full-hardware, full-software, or mixed-hardware/software for physical layer module 2608 and control module 2610 is within the scope of this disclosure. Due to the processing complexity, in some aspects the software portion of physical layer module 2608 and control module 2610 may be structurally implemented with a multi-core system, such as, for example, based on an Intel x86 architecture.

Physical layer module 2608 and control module 2610 may therefore handle the baseband processing tasks for both uplink and downlink communications. As previously described, downlink processing may include receiving user-addressed downlink data from the core network over a backhaul interface, processing and packaging the user-addressed downlink data with locally generated downlink data according to physical layer (physical layer module 2608) and protocol stack (control module 2610) radio access protocols, and providing the resulting downlink data to terminal devices via radio module 2604 and antenna system 2602. Uplink processing may include receiving uplink data from terminal device via antenna system 2602 and radio module 2604, processing the received uplink data according to physical layer (physical layer module 2608) and protocol stack (control module 2610) radio access protocols to obtain locally-addressed and externally-addressed uplink data, and routing the externally-addressed uplink data to the core network over the backhaul interface.

Such uplink and downlink processing may require increased power expenditures at network access node 2002. The power consumption of network access node 2002 related to uplink and downlink processing may directly depend on the traffic conditions of network access node 2002. For example, if network access node 2002 is currently serving a large number of terminal devices with many in connected mode, communication module 2606 may need to perform a substantial amount of processing which may consequently require additional power expenditure. Conversely, if network access node 2002 is only serving a small number of terminal devices or most of the served terminal devices are in idle mode, communication module 2606 may only need to perform a small amount of processing, which may have lower power expenditure. Regardless of the current processing demands, communication module 2606 may additionally have some load-independent power consumption arising from the power needed to keep communication module 2606 on.

Figure 57:
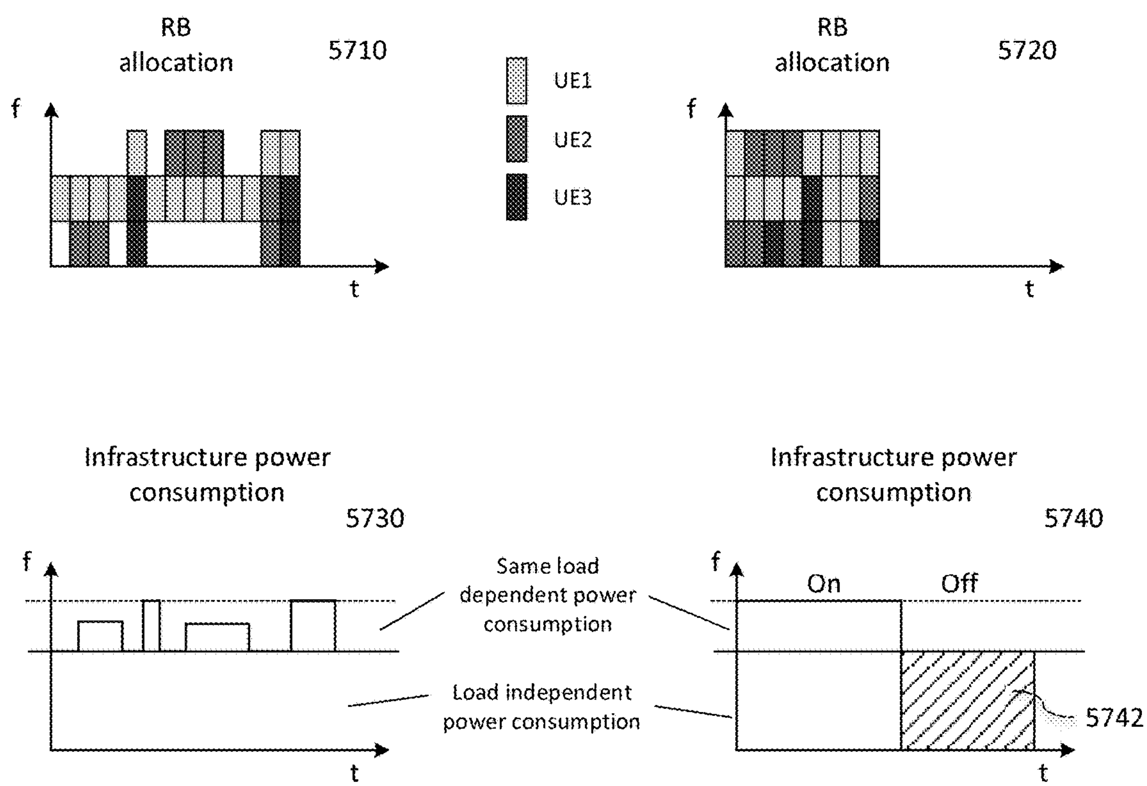
FIG. 57 shows a first exemplary depiction of a relationship between radio resource allocation and power consumption in accordance with some aspects.

FIG. 57 depicts general examples of such power consumption by communication module 2606. Data grid 5710 shows an exemplary resource block (RB) allocation over time (which may be either uplink or downlink in the exemplary setting of FIG. 57; the shadings of data grid 5710 indicate RBs for three different terminal devices UE1, UE2, and UE3) while data grid 5730 shows the power consumption at communication module 2606. As shown in data grids 5710 and 5730, communication module 2606 may expend greater power during times when communication module 2606 needs to process a greater number of RBs. The power consumption related to actual active processing may be the load dependent energy consumption, which dynamically follows the traffic load envelope. The overall power consumption of communication module 2606 may also include load-independent power consumption, which may be relatively constant and result from the power needed to maintain the processing components (processors and hardware accelerators) of communication module 2606 in an active state. Continuous operation of communication module 2606 may, regardless of actual processing demand, expend at least the power related to the load-independent energy consumption.

Accordingly, an aspect of this disclosure may operate a network processing component such as the processing infrastructure of physical layer module 2608 and control module 2610 with a duty cycle composed of 'active' phases and 'inactive' phases, where the network processing component may fit all intensive processing during the active phases and perform no or minimal processing during inactive phases. As all intensive processing is fit into the active phases, the load dependent power consumption may be greater than the alternative case. However, the network processing component may avoid load independent power consumption during the inactive phases by entering into an inactive or minimally active state. Power consumption can therefore be reduced.

Data grids 5720 and 5740 illustrate an exemplary scenario according to an aspect of this disclosure. As communication module 2606 may be in control of scheduling decisions (e.g., may include a Media Access Control (MAC) scheduler), communication module 2606 may be able to schedule all traffic during an 'active' phase as shown in data grid 5720. As shown in data grid 5720, communication module 2606 may allocate all RBs during a first time period (the active phase) and allocate no RBs during a second time period (the inactive phase). While the load-dependent power consumption may be at high levels during the active phase of data grid 5740 (e.g., at a maximum power consumption level corresponding to the maximum processing capability indicated by the upper dotted line), communication module 2606 may power off during the inactive phase and thus have little or no power consumption. In some aspects, communication module 2606 may be 'disabled' as an alternative to powering off, e.g., may still have some power but may not be fully active or functionally operational. As communication module 2606 may be powered off or disabled, there may not be any (or may only be negligible) load-independent power consumption at communication module 2606, thus resulting in power savings as indicated at 5742. It is noted that in some aspects the active phase of the duty cycle used by communication module 2606 may not be exactly aligned in time with the allocated RBs as the processing by communication module 2606 may not be completed in real-time. Accordingly, the active phase of the duty cycle may end at a later time than the latest RB allocated to the active phase. Furthermore, in some aspects the active phase of the processing by communication module 2606 may have a longer duration than the allocated RBs in time as communication module 2606 may process the allocated RBs over a longer period of time than the allocated RBs occupy in time. While there may therefore exist differences in the duty cycle of the allocated RBs (e.g., active phases when many RBs are allocated and inactive phases when few RBs are allocated and the duty cycle of the processing by communication module 2606), for purposes of simplicity the following description will refer to a single duty cycle that is common to both the allocated RBs and communication module 2606.

According to an aspect of the disclosure, communication module 2606 may perform different functions, including determining an appropriate duty cycle based on traffic loads. For example, communication module 2606 may utilize longer active phases and shorter inactive phases in high traffic conditions (higher overall power consumption) while low traffic conditions may allow communication module 2606 to utilize shorter active phases and longer inactive phases (lower overall power consumption). Communication module 2606 may then utilize a power management framework to carry out the selected duty cycle scheme. In some aspects, communication module 2606 may also perform scheduling functions to allocate scheduled traffic (in both the downlink and uplink) into the active phases. Furthermore, in some aspects communication module 2606 may manage the inactive phases to support latency-critical traffic. For example, instead of utilizing an inactive phase in which communication module 2606 is completely powered down or disabled, communication module 2606 may employ a very low power 'always-on' state that has a limited amount of processing resources available to support latency-critical traffic such as voice data (thus avoiding having to delay such traffic until the next active phase).

Figure 58:
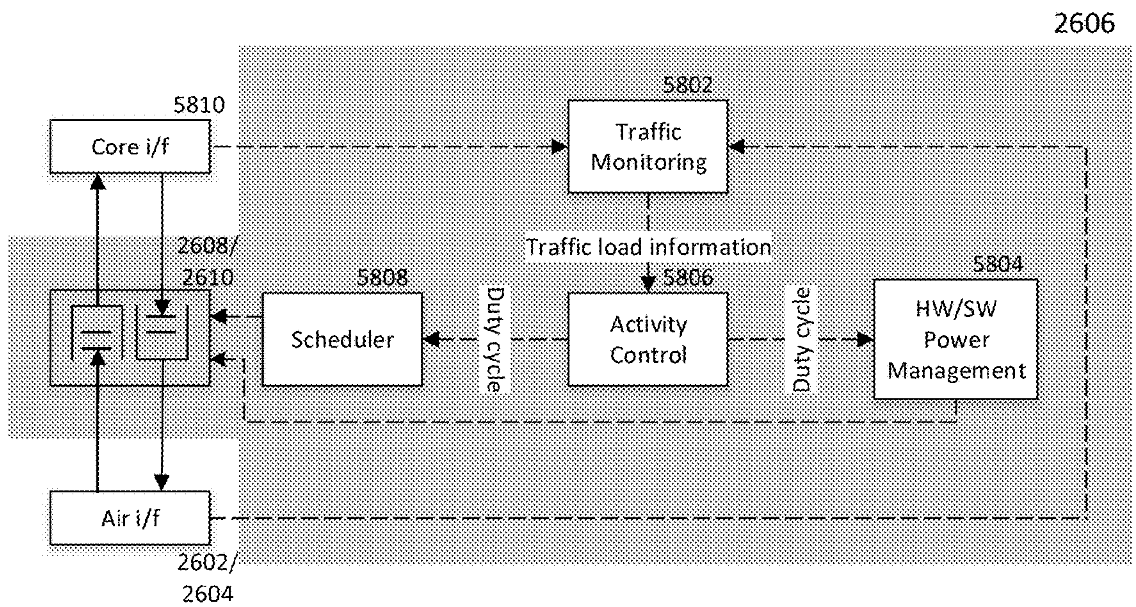
FIG. 58 shows an exemplary internal configuration of a network access node in accordance with some aspects.

FIG. 58 shows an internal diagram of network access node 2002 and communication module 2606 depicting components according to an aspect some aspects of the of this disclosure. Accordingly, FIG. 58 may omit certain components of network access node 2002 and communication module 2606 that are not related to this aspect. As shown in FIG. 58, communication module 2606 may include traffic monitoring module 5802, hardware/software (HW/SW) power management module 5804, activity control module 5806, scheduler module 5808, and processing infrastructure 2608/2610 (implemented as physical layer module 2608/control module 2610). Each of traffic monitoring module 5802, HW/SW power management module 5804, activity control module 5806, and scheduler module 5808 may be structurally realized as a hardware-defined module, e.g., as one or more dedicated hardware circuits or FPGAs, as a software-defined module, e.g., as one or more processors executing program code that define arithmetic, control, and I/O instructions (e.g., software and/or firmware) stored in a non-transitory computer-readable storage medium, or as a mixed hardware-defined and software-defined module. While the individual components of communication module 2606 are depicted separately in FIG. 58, this depiction serves to highlight the operation of communication module 2606 on a functional level. Consequently, in some aspects one or more of the components of communication module 2606 may be integrated into a common hardware and/or software element. Additionally, the functionality described herein (in particular e.g., the formulas/equations, flow charts, and prose descriptions) may be readily incorporated using ordinary skill in the art into program code for retrieval from a non-transitory computer readable medium and execution by a processor. For example, in some aspects each of traffic monitoring module 5802, HW/SW power management module 5804, activity control module 5806, and scheduler module 5808 may be executed as separate software modules on a processor. Furthermore, in some aspects one or more of traffic monitoring module 5802, HW/SW power management module 5804, activity control module 5806, and scheduler module 5808 may additionally be executed as software modules by control module 2610, in particular scheduler module 5808 which may be e.g., a MAC scheduler of control module 2610.

Physical layer module 2608 and control module 2610 may serve as the processing infrastructure of network access node 2002 while traffic monitoring module 5802, HW/SW power management module 5804, activity control module 5806, and scheduler module 5808 may oversee application of duty cycling to the processing schedule of physical layer module 2608 and control module 2610. Communication module 2606 may provide output to the air interface (via antenna system 2602 and radio module 2604) in the downlink direction and to the core interface (via a backhaul interface) in the uplink direction. Communication module 2606 may receive input in via the air interface in the uplink direction and may receive input via the core interface in the downlink direction.

Traffic monitoring module 5802 may be responsible for monitoring current traffic loads (for uplink and downlink) and providing traffic load information to activity control module 5806. Activity control module 5806 may then select an appropriate duty cycle based on the traffic load information, where high traffic loads may demand long active phases and low traffic loads may allow for long inactive phases. Activity control module 5806 may provide the selected duty cycle to scheduler module 5808 and HW/SW power management module 5804. Scheduler module 5808 may then implement the selected duty cycle by determining a network resource allocation (e.g., in the form of data grid 5720) based on the active and inactive phases of the selected duty cycle that concentrates data traffic into the active phase. HW/SW power management module 5804 may implement the selected duty cycle by controlling processing infrastructure 2608/2610 (physical layer module 2608 and control module 2610) to power up and down or transition between high performance/high power consumption and low performance/low power consumption states according to the active and inactive phases selected duty cycle. Processing infrastructure 2608/2610 may process data according to the control provided by scheduler module 5808 and HW/SW power management module 5804.

Accordingly, in the downlink direction traffic monitoring module 5802 may monitor incoming downlink traffic arriving over core interface 5810 (which may be e.g., an S1 interface with an MME and/or an S-GW of an LTE EPC). Traffic monitoring module 5802 may monitor such incoming downlink traffic to determine traffic load information that quantifies the current level of downlink traffic, e.g., by throughput or another similar measure. For example, traffic monitoring module 5802 may calculate an average throughput such as with a sliding window technique or other similar averaging algorithm. As downlink traffic throughput may change relatively slowly over time, such a metric that evaluates average throughput over a past observation period may be predictive of future traffic patterns. Traffic monitoring module 5802 may then provide the downlink traffic throughput to activity control module 5806 as the traffic load information.

Activity control module 5806 may be configured to receive the traffic load information and select an appropriate duty cycle based on the traffic load information. For example, in some aspects activity control module 5806 may utilize a predefined mapping scheme that accepts a downlink traffic throughput as input and provides a duty cycle as output where the duty cycle defines the active phase during active and inactive phase duration. As previously indicated, heavy traffic conditions may call for longer active phases while light traffic conditions may allow for longer inactive phases. The predefined mapping scheme may be configurable by a designer and may need to provide a suitable amount of radio resources in the active phase to support the downlink traffic throughput, e.g., may need to provide a sufficient number of RBs to contain all scheduled downlink traffic. For example, in the case of an LTE-FDD cell with 20 MHz bandwidth, 64 QAM modulation and 2×2 MIMO capabilities (LTE category 4), processing infrastructure 2608/2610 may continuously operate in active phase at full processing efficiency (100% duty cycle, no inactive phases) at maximum downlink traffic, e.g., 150 Mbps for the LTE category 4 capabilities assumed in this example. When the current downlink traffic demand reduces to e.g., 75 Mbps, processing infrastructure 2608/2610 may be operated at a ratio of active to inactive phases equal to one, e.g., active and inactive phases have equal length (50% duty cycle). Exemplary duty cycles may be in the range of e.g., 5 ms, 10 ms, 20 ms, 50 ms, 100 ms, etc., where each duty cycle may be split between active and inactive phases according to a specific ratio. The overall duty cycle length as well as the active/inactive phase ratio may depend on the amount of traffic throughput as well as the latency requirements of the traffic. As processing infrastructure 2608/2610 may process and package the incoming downlink traffic to produce a physical layer data stream, the predefined mapping scheme may also approximate how much physical layer data will be produced from the incoming downlink traffic to ensure that the active phase has sufficient resources to transport the physical layer data stream.

After selecting a duty cycle based on the traffic load information, activity control module 5806 may provide the selected duty cycle to scheduler module 5808 and HW/SW power management module 5804. Scheduler module 5808 may then shape the downlink traffic according to the duty cycle, which in some aspects may include scheduling all downlink grants within the active phase. Scheduler module 5808 may determine the relative position of the downlink grants according to conventional network scheduling algorithms, e.g., MAC scheduler algorithms, which may include, for example, round robin scheduling. Scheduler module 5808 may therefore generally produce a downlink grant schedule as shown in data grid 5720 where all downlink grants are scheduled during the active phase. Scheduler module 5808 may also provide the downlink grants (in addition to related control information) to served terminal devices in order to enforce the determined schedule. While scheduler module 5808 may additionally provide control information to served terminal devices that specifies the active and inactive phases of the selected duty cycle, in some aspects scheduler module 5808 may instead enforce the active and inactive phases via downlink (and as later detailed uplink) grants without explicitly notifying served terminal devices of the selected duty cycle.

HW/SW power management module 5804 may then be configured to control processing infrastructure 2608/2610 based on the selected duty cycle. Processing infrastructure 2608/2610 may then perform downlink processing on the incoming downlink traffic provided by core interface 5810 according to the active and inactive phases as directed by HW/SW power management module 5804. Processing infrastructure 2608/2610 may provide the resulting downlink data to air interface 2602/2604 for downlink transmission.

Activity control module 5806 may control the duty cycle in a dynamic manner based on the varying levels of traffic detected by traffic monitoring module 5802. For example, if traffic monitoring module 5802 provides traffic load information to activity control module 5806 that indicates less downlink traffic, activity control module 5806 may adjust the duty cycle to have longer inactive phases to increase power savings (and vice versa in the case of more downlink traffic). Accordingly, traffic monitoring module 5802 may continuously or periodically provide traffic load information to activity control module 5806, in response to which activity control module 5806 may continuously or periodically select a duty cycle to provide to HW/SW power management module 5804 and scheduler module 5808 for implementation.

The power management architecture of processing infrastructure 2608/2610 may determine the degree of control that HW/SW power management module 5804 has over processing infrastructure 2608/2610. For example, in a simple case HW/SW power management module 5804 may only be able to turn processing infrastructure 2608/2610 on and off. Accordingly, HW/SW power management module 5804 may turn processing infrastructure 2608/2610 on during active phases and off during inactive phases in accordance with the duty cycle.

According to a further aspect, processing infrastructure 2608/2610 may be configured with advanced power management architecture, such as where processing infrastructure 2608/2610 has a predefined set of 'power states' where each power state has a predefined level of power consumption and processing capability (e.g., the ability to support a given processing demand). Accordingly, in addition to a completely 'off' state, the predefined power states may include a lowest power state with the lowest power consumption and lowest processing capability and further power states of increasing power consumption and processing capability up to the highest power state. Such power states may provide varying power consumption and processing capability for software components through different CPU clock frequencies, different voltages, and different use of cores in a multi-core system. As power consumption is proportional to voltage-squared times frequency ($V^2f$), low power states may have lower CPU frequency and/or voltage than higher power states. In a multi-core system, the use of more cores may have increased power consumption than the use of less cores, where the power consumption at each core may additionally be controlled by CPU frequency and voltage. In terms of hardware components, such power states may utilize dynamic frequency and voltage scaling (DVFS), different clock gating, and different power gating to provide varying power consumption and processing capability across the power states. For multi-core uses, such as for CRAN or virtual-RAN (VRAN) architectures, processing infrastructure 2608/2610 can be implemented on a multi-core server CPU and may utilize power states according to e.g., an Intel x86 architecture. Such power management techniques may involve complex distributions of computing load across each of the cores. Regardless of specifics, each power state may delimit a predefined configuration of such features (e.g., a predefined setting of one or more of CPU clock frequency, voltage, number of cores, combined interaction between multiple cores, DVFS, clock gating, and power gating) for the software and/or hardware components of processing infrastructure 2608/2610.

Accordingly, some aspects where HW/SW power management module 5804 may utilize the predefined power states of processing infrastructure 2608/2610 to control processing infrastructure 2608/2610 according to the active and inactive phase of the duty cycle. Alternative to a predefined power state scheme, HW/SW power management module 6204 may be configured to control processing infrastructure 2608/2610 to operate according to configurable power states, where HW/SW power management module 6204 may be able to individually adjust (e.g., in a continuous or discretized fashion) one or more of CPU clock frequency, voltage, number of cores, combined interaction between multiple cores, DVFS, clock gating, and power gating to adjust the processing efficiency and power consumption of processing infrastructure 2608/2610.

In some aspects, HW/SW power management module 5804 may be configured to power down processing infrastructure 2608/2610 during inactive phases. As previously described regarding data grid 5740, such may result in power savings in particular due to the avoidance of load-independent power consumption during the inactive phases. However, the complete shutdown of processing infrastructure 2608/2610 during the inactive phases may be detrimental to latency-critical traffic as the delays between active phases may introduce extra latency into downlink traffic. This added latency may have negative impacts on latency-critical traffic such as voice traffic. Accordingly, in some aspects HW/SW power management module 5804 may split processing infrastructure 2608/2610 into an 'always-on' part and a 'duty-cycling' part, where the always-on resources may constantly provide limited processing capabilities at low power and the duty cycling resources may turn on and off according to the active and inactive phases. The processing resources employed for the always-on part may have very low leakage power and, although some power consumption will occur, may not have high load-independent power consumption as in the case of data grid 5730.

Accordingly, in some aspects higher protocol stack layers (e.g., transport layers) may indicate the traffic types to activity control module 5806, which may enable activity control module 5806 to identify latency-critical traffic (e.g., voice traffic) and non-latency-critical traffic (e.g., best-effort traffic) and subsequently route latency-critical traffic to the always-on resources and non-latency critical traffic to the duty-cycling resources. In some aspects scheduler module 5808 can also be configured to perform the scheduling functions for scheduling downlink grants for the latency-critical data during the inactive phase. Processing infrastructure 2608/2610 may then process the latency-critical traffic with the always-on resources during inactive phases and with either the always-on resources or duty-cycling resources during active phases, thus offering the same or similar latency as in a conventional non-duty-cycled case. Processing infrastructure 2608/2610 may then process the non-latency-critical traffic with the duty-cycling resources during the next active phase, which may introduce latency to the non-latency-critical traffic during the intervening time period.

FIG. 59 shows an exemplary depiction of the use of always-on resources at processing infrastructure 2608/2610, where terminal devices UE1 and UE2 may be receiving non-latency critical traffic and terminal device UE3 may be receiving latency-critical traffic. As shown in data grid 5910, scheduler module 5808 may schedule the traffic for all of UE1, UE2, and UE3 during the active phase while only scheduling the traffic for UE3 during the inactive phase. Accordingly, processing infrastructure 2608/2610 may be configured to process the latency-critical traffic for UE3 with the always-on resources during the inactive phase, thus avoiding the introduction of extra latency to the latency-critical traffic.

As shown in data grid 5920, the active phase may have similar power-consumption to the case of data grid 5740 while the inactive phase may have slightly higher power consumption due to the operation of the always-on resources of processing infrastructure 2608/2610. However, the power savings indicated at 5922 may still be considerable (e.g., less than the load independent power consumption of data grid 5730) while avoiding excessive latency in latency-critical traffic.

There may be various options available for the always-on resources of processing infrastructure 2608/2610. For example, in some aspects of a multi-core implementation, HW/SW power management module 5804 may control processing infrastructure 2608/2610 to utilize e.g., a single core for the always-on resources and the remaining cores for the duty-cycling resources. Additionally or alternatively, in some aspects a low predefined power state may be utilized for the always-on resources. Various implementations using more complex embedded system power management functions can also be applied to provide resources of processing infrastructure 2608/2610 for the always-on portion.

In some aspects, HW/SW power management module 5804 may also consider the amount of latency-critical traffic when selecting always-on resources from processing infrastructure 2608/2610. For example, in the case of data grid 5910 there may only be a limited amount of latency-critical traffic. Accordingly, HW/SW power management module 5804 may only require a limited portion of the total processing resources available at processing infrastructure 2608/2610 for the always-on resources. If there is a large amount of latency-critical traffic, HW/SW power management module 5804 may require a greater amount of the total processing resources of processing infrastructure 2608/2610 for the always-on resources. In certain cases, the always-on resources of processing infrastructure 2608/2610 may have greater processing capability than the duty-cycling resources, such as in order to support a large amount of latency-critical traffic. Although such may result in greater power consumption, the use of duty-cycling resources at processing infrastructure 2608/2610 may still provide power savings.

In some aspects, processing infrastructure 2608/2610 may use a variety of different modifications depending on further available features. For example, in a setting where network access node 2002 is utilizing carrier aggregation, processing infrastructure 2608/2610 may realize the primary component carrier with the always-on resources while subjecting secondary component carriers to duty cycling with the duty-cycling resources. In another example, dual-connectivity setting processing infrastructure 2608/2610 may provide the master cell group with the always-on resources and the secondary cell group with the duty-cycling resources. In another example, in an anchor-booster setting, processing infrastructure 2608/2610 may provide the anchor cell with the always-on resources and the booster cell with the duty-cycling resources.

Traffic monitoring module 5802, HW/SW power management module 5804, activity control module 5806, scheduler module 5808, and processing infrastructure 2608/2610 may therefore utilize a duty cycle in the downlink direction, thus allowing for power savings at network access nodes. As shown in FIG. 58, in some aspects traffic monitoring module 5802 may also monitor uplink traffic at air interface 2602/2604 to enable communication module 2606 to similarly implement duty cycling for uplink processing. Communication module 2606 may either implement such uplink duty cycling separately from or in coordination with the downlink duty cycling described above. For example, if processing infrastructure 2608/2610 has a strict allocation between uplink and downlink processing resources, in particular where, for example, power consumption for uplink processing is substantially independent from power consumption from downlink processing, communication module 2606 may be configured to separately select uplink and downlink duty cycles. In other words, activity control module 5806 may be configured to select a downlink duty cycle based on downlink traffic at core interface 5810 and to select an uplink duty cycle based on uplink traffic at air interface 2602/2604 or at a suitable internal interface in communication module 2606. Alternatively, if processing resources at processing infrastructure 2608/2610 are shared between uplink and downlink processing, activity control module 5806 may in some aspects be configured to coordinate the uplink and downlink duty cycles, such as by aligning the active and inactive phases of the uplink and downlink duty cycles as closely as possible to maximize power savings.

Traffic monitoring module 5802 may be configured to monitor uplink traffic at air interface 2602/2604 and/or an interface of communication module 2606 to provide traffic load information to activity control module 5806 that indicates a current uplink traffic throughput. Likewise to the downlink direction, traffic monitoring module 5802 may monitor uplink traffic to calculate an average uplink throughput, such as with a sliding window technique or other similar averaging algorithm, which may be predictive of future uplink traffic patterns. In addition to measuring average uplink throughput, traffic monitoring module 5802 may monitor uplink traffic such as buffer status reports (BSRs) and scheduling requests (SRs) received at air interface 2602/2604 (and potentially identified at communication module 2606). As both BSRs and SRs may be indicative of the amount of uplink data at terminal devices that is pending for uplink transmission, traffic monitoring module 5802 may utilize such information in addition to average uplink throughput to generate the traffic load information for activity control module 5806. Traffic monitoring module 5802 may additionally utilize metrics such as HARQ processing turnaround time, e.g., the amount of time required to process uplink data before providing HARQ feedback, to indicate traffic load.

In some aspects, activity control module 5806 may be configured to select an uplink duty cycle in an equivalent manner as in the downlink case described above, e.g., according to a predefined mapping scheme that receives the uplink traffic load information as input and outputs an uplink duty cycle (where the predefined mapping scheme may be different for uplink and downlink according to the differences in uplink and downlink traffic). As previously indicated, if performing both uplink and downlink duty cycling, activity control module 5806 may be configured to adjust the uplink and/or downlink duty cycle relative to each other in order to align (or partially align) active and inactive phases. The uplink and downlink duty cycles may be the same (e.g., have the same active and inactive phase durations) or different.

Activity control module 5806 may then provide the selected duty cycle to scheduler module 5808 and HW/SW power management module 5804. Scheduler module 5808 may then shape uplink traffic according to the active and inactive phases of the selected duty cycle, which may include scheduling uplink grants during the active phase. HW/SW power management module 5804 may then control processing infrastructure 2608/2610 to perform processing on uplink data according to the active and inactive phases of the selected duty cycle.

As in the downlink case, in some aspects HW/SW power management module 5804 and processing infrastructure 2608/2610 may additionally utilize always-on resources of processing infrastructure 2608/2610 to support latency-critical uplink traffic such as voice traffic or any other traffic type with strict latency requirements. Accordingly, activity control module 5806 may utilize traffic type information provided by higher protocol stack layers to route latency-critical uplink data to the always-on resources and non-latency-critical data to the duty-cycling resources.

In addition to the use of always-on resources for latency-critical uplink traffic, in some aspects communication module 2606 may have additional applications of always-on resources of processing infrastructure 2608/2610 in the uplink direction. As opposed to the downlink direction in which scheduler module 5808 may have complete control over scheduling decisions, terminal devices may have some flexibility in the timing of uplink transmissions. Accordingly, in certain scenarios terminal devices may decide to transmit uplink data such as a scheduling request during the inactive phase of processing infrastructure 2608/2610. Accordingly, if processing infrastructure 2608/2610 is completely off during the inactive phase, communication module 2606 may not be able to receive the scheduling request and the terminal device will thus need to re-transmit the scheduling request at a later time.

This scenario may occur for terminal devices that are in a connected DRX (C-DRX) state, e.g., for LTE. As opposed to normal connected mode terminal devices that need to monitor the control channel (e.g., for downlink grants) during each TTI, terminal devices in a C-DRX state may only need to monitor the control channel during certain TTIs. Terminal devices in a C-DRX state may therefore be able to conserve power by entering a sleep state for all TTIs that the terminal device does not need to monitor. The C-DRX cycle may have a fixed period and may be composed of a DRX active state where the terminal device needs to monitor control channel and a DRX sleep state where the terminal device does not need to monitor the control channel.

Communication module 2606 (e.g., at scheduler module 5808 or another protocol stack layer entity of control module 2610) may be configured to specify the DRX configuration to terminal devices and accordingly may dictate when the DRX active and sleep states occur. As terminal devices may generally be monitoring the control channel for downlink grants (which indicate pending downlink data), scheduler module 5808 may configure terminal devices with C-DRX cycles that fit the DRX active state within the active phase of the downlink duty cycle and the DRX sleep state within the inactive phase of the downlink duty cycle.

While such scheduling may be sufficient to fit downlink traffic for C-DRX terminal devices into the active downlink phases, C-DRX terminal devices may not be bound to the DRX cycle for uplink transmission such as scheduling requests (although other uplink transmissions may require an uplink grant from communication module 2606). Accordingly, C-DRX terminal devices may in certain cases 'break' the C-DRX sleep cycle to transmit a scheduling request to network access node 2002. If such occurs during an inactive phase of processing infrastructure 2608/2610, during which processing infrastructure 2608/2610 is completely off, network access node 2002 may not receive the scheduling request.

Accordingly, in addition to supporting latency-critical uplink and downlink traffic, in some aspects it may be useful for HW/SW power management module 5804 to utilize an always-on power state of processing infrastructure 2608/2610 to support scheduling requests, such as from C-DRX terminals. Such may also be useful to support random access from idle mode terminal devices, in particular if the random access configuration employed by network access node 2002 has random access occasions that occur during inactive uplink phases (although communication module 2606 may alternatively be able to select a random access configuration and uplink duty cycle in which all random access occasions occur during active uplink phases).

Figure 60:
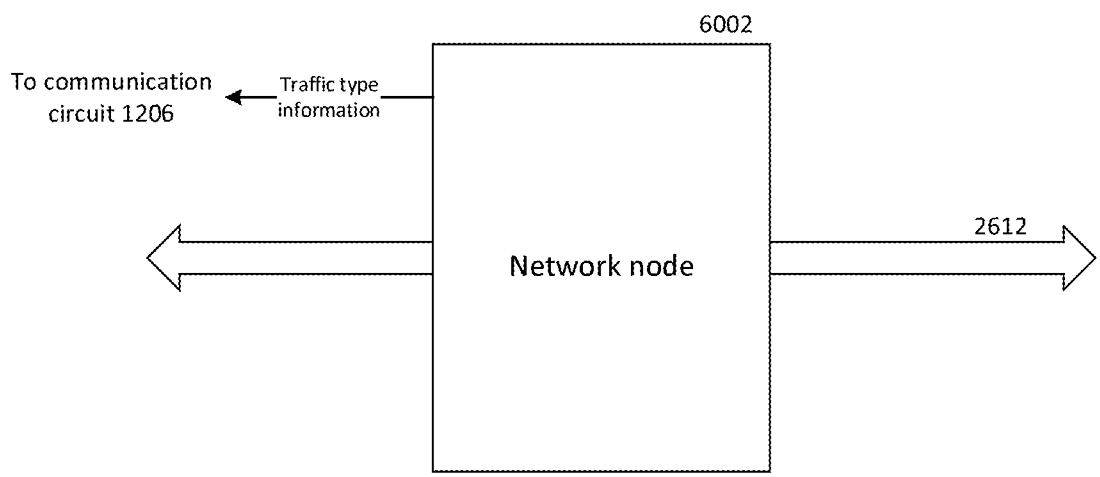
FIG. 60 shows an exemplary depiction of a network node that performs processing in accordance with some aspects.

As previously indicated, activity control module 5806 and scheduler module 5808 may rely on traffic type information in order to identify latency-critical traffic. Such traffic type information may generally be available at layers above the radio access protocol stack layers of network access node 2002, such as Transmission Control Protocol (TCP)/Internet Protocol (IP) at network and transport layers. These higher layer protocols may be physically embodied as software components in network nodes that are located along a backhaul interface and are responsible for exercising data transfer between network access node 2002 and core network, e.g., over an S1 interface. They may in general be embodied as software components in access network nodes, core network nodes and external data network nodes and handle data transfer from source (which may be a data source 1612 in terminal device 1502 or an equivalent function in an application server) to destination (which may be a data sink 1616 in terminal device 1502 or an equivalent function in an application server) through core network, external data network and access network. FIG. 60 shows an exemplary depiction in which network node 6002 is located as part of a backhaul interface, which may carry data between network access node 2002 and the core network. Network node 6002 may be a processor configured to execute software-defined instructions in accordance with network and transport layer protocols, for example, TCP/IP, to facilitate such data transfer, and may be a software connection with transport layers of one or more terminal devices served by network access node 2002. Network node 6002 may be physically placed at a base station site, e.g., proximate to communication module 2606 e.g., on a rack, at another physical location along a backhaul interface, or may be implemented on one or more servers, e.g., as part of a cloud computing system.

As network node 6002 encompasses the network and transport layer of the data connection feeding into network access node 2002, network node 6002 may have access to traffic type information that indicates which data is latency-critical. For example, the traffic type information may be IP source and destination addresses, TCP port numbers, or Differentiated Services (DiffServ) information, which network node 6002 may be able to identify and recognize using IP-layer protocols. For example, in the case of DiffServ information, IP packet headers may have a differentiated services field (DS field) containing a Differentiated Services Code Point (DSCP) that indicates the priority of the traffic, which may consequently indicate latency-critical traffic.

Accordingly, in some aspects network node 6002 may be configured to obtain traffic type information that identifies the latency-critical data and may provide this information to activity control module 5806 and scheduler module 5808 to enable activity control module 5806 and scheduler module 5808 to select duty cycles based on the latency-critical traffic (e.g., with an always-on power state sufficient to support the latency-critical traffic) and to schedule the latency-critical traffic appropriately.

In accordance with network and transport layer protocols, network node 6002 may be configured to implement QoS and flow control mechanisms to handle the bidirectional transfer of data traffic over a backhaul interface and in general between source and destination, which may be e.g., different queues for IP packets with different priorities. Although the duty cycling at network access node 2002 may affect the transfer of data in the radio access network, network access node 2002 may simply appear like a base station suffering from regular congestion at the transport layer of the data source and the destination, e.g., the device and the server the device is communicating with; in other words, the duty cycling may be transparent to the flow control mechanisms, for example, TCP slow start and TCP windows. Accordingly, network node 6002 may implement the proper QoS mechanisms in order to control risk of packet losses by queue overflow.

In some aspects, network access node 2002 may take additional measures to help ensure that the capacity under duty cycling meets certain minimum requirements. For example, the activity control module 5806 may derive terminal-specific uplink and downlink grant budgets from higher protocol layer information, e.g., QoS Class Identifier (QCI) during EPS default and dedicated bearer setup procedure. Activity control module 5806 may then consider these uplink and downlink budgets when selecting duty cycles while scheduler module 5808 may not allow uplink and/or downlink grants in an active phase for a particular terminal device that has exceeded its budget.

In some aspects, packet loss due to queue overflow during inactive duty cycle phases may also be addressed with latency tolerance reporting schemes, such as from Peripheral Component Interconnect Express (PCIe) 3.0 devices. Accordingly, a backhaul interface, e.g., an S1 interface, and the terminal devices served by network access node 2002 may report their buffering capabilities in the downlink and uplink directions, respectively, to activity control module 5806. Activity control module 5806 may then consider such buffering reports when determining the length of inactive phases in selecting a duty cycle. Such may also ensure that a backhaul interface, for example, an S1 interface, is served again by a downlink grant in the next active phase and each reporting terminal device is served again by an uplink grant before the respective queues overflow.

In various aspects, communication module 2606 may additionally employ any of a number of different congestion avoidance schemes established for fully-loaded network components. Furthermore, in some aspects, traffic monitoring module 5802 may rely on cooperation from terminal devices to apply more enhanced prediction of traffic patterns. For example, a terminal device served by network access node 2002 such as terminal device 1502 may preemptively indicate that uplink and/or downlink traffic at terminal device 1502 is expected to increase in the near future, such as when a user of terminal device 1502 unlocks the screen, picks up the phone, opens a certain application, etc. If terminal device 1502 detects any such action, e.g., at an application layer of an application processor of data source 1612/data sink 1616 or via a motion sensor (e.g., a gyroscope or accelerometer), terminal device 1502 may report to network access node 2002 that a mobile originating operation may be triggered in the near future that will result in increased uplink or downlink traffic. For example, terminal device 1502 may utilize a reporting mechanism, such as a Power Preference Indicator (PPI) bit, to indicate potential imminent triggering of terminal uplink or downlink traffic to network access node 2002. Traffic monitoring module 5802 (or another component of communication module 2606) may be configured to detect such indications in uplink traffic received at air interface 2602/2604 and to consider such indications when providing traffic load information to activity control module 5806, e.g., by increasing traffic estimates provided the traffic load information when such information is received from terminal devices.

Network access node 2002 may therefore utilize the duty cycling scheme to reduce power consumption of the processing infrastructure. As described above, network access node 2002 may be configured to select appropriate duty cycles based on current and past traffic conditions in addition to utilizing enhancements such as always-on resources to support both latency-critical and unpredictable traffic. Aspects of the disclosure may be useful where the processing infrastructure is configured with complex power management features that provide a high degree of control based on predefined power states.

Furthermore, while described above in the setting of a base station, some aspects of the disclosure may be implemented in any network processing component that provides scheduling functionality for at least one of its fronthaul or backhaul interfaces. For example, network node 6002 or any other processing component located e.g., along a backhaul interface may employ the disclosed duty-cycling techniques to implement duty cycling at its processing infrastructure and regulate uplink and/or downlink traffic accordingly. For example, network node 6002 may be configured to provide scheduling functions for traffic on the backhaul interface and, in order to conserve power, may select a duty cycle (e.g., based on the traffic conditions of the backhaul interface) with which to operate one or more processing components of network node 6002 (e.g., processors, hardware accelerators, etc.). Network node 6002 may thus implement any of the techniques described above, including the use of predefined power states of a power management system, always-on resources, etc.

Figure 61:
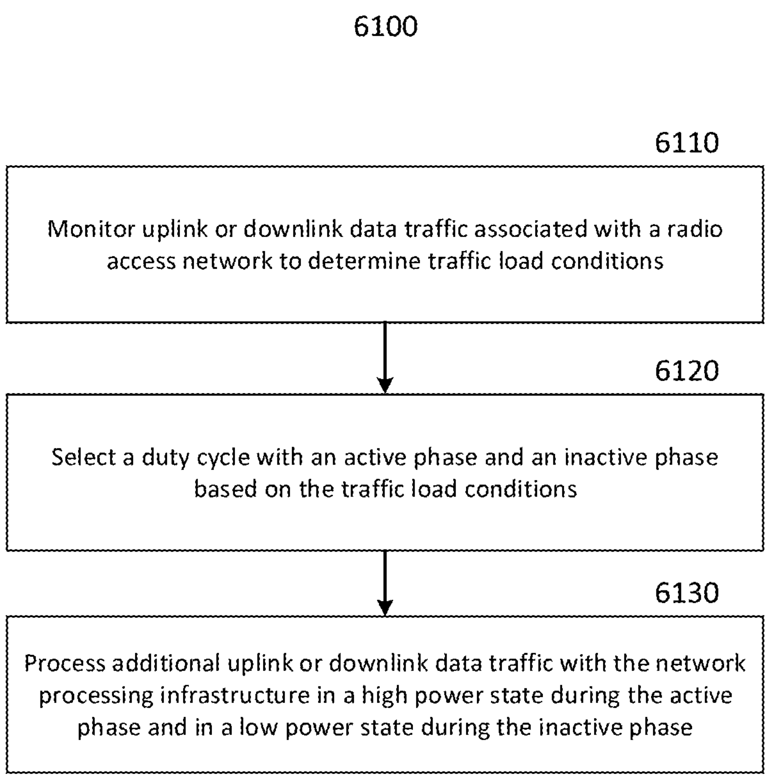
FIG. 61 shows an exemplary method of operating a network processor in accordance with some aspects.

FIG. 61 shows method 6100 of operating a network processor according to an aspect of the disclosure. As shown in FIG. 61, method 6100 includes monitoring uplink or downlink data traffic associated with a radio access network to determine traffic load conditions (6110), selecting a duty cycle with an active phase and an inactive phase based on the traffic load conditions (6120), and processing additional uplink or downlink data traffic with the network processing infrastructure in a high power state during the active phase and in a low power state during the inactive phase (6130).

2.7 Power-Efficiency #7

In some aspects of this disclosure, a network processing component may conserve power by triggering low power states based on anticipated processing demands. Accordingly, the network processing component may monitor certain performance indicators to estimate upcoming processing demands and may scale processing efficiency and the resulting power consumption based on a history of past processing, current processing, or an estimated upcoming processing demand. By adapting processing efficiency and power consumption based on history of past processing, current processing, or estimated upcoming processing demand, network processing components may provide processing efficiency sufficient for upcoming processing demands without expending unnecessary power. These aspects may be used with common channel aspects, e.g., a network processing component may process a common channel based on history of past processing, current processing, or estimated future processing, or past, present, or estimated future demand.

As described above, network access nodes such as network access node 2002 of FIG. 26 may perform processing on downlink and/or uplink data with hardware and/or software components. The processing demand on a given network access node may be directly correlated with the radio traffic load. For example, a base station serving a large number of terminal devices with active connections may have a high processing demand while a base station serving only a few terminal devices with active connections may have a much lower processing demand.

To assist with optimizing power consumption, a network access node may monitor traffic conditions to anticipate an upcoming processing demand. The network access node may then scale processing efficiency according to specific techniques to optimize processing efficiency based on the anticipated upcoming processing demand. As reduced processing efficiency may result in reduced power consumption, the network access node may avoid excessive power consumption.

As described above, network access node 2002 may employ physical layer module 2608 and control module 2610 as the processing infrastructure to process uplink and downlink data, which may include physical layer processing in the case of physical layer module 2608 and protocol stack layer processing in the case of control module 2610. Although not limited to such, physical layer module 2608 and control module 2610 may include one or more processors and/or one or more hardware accelerators, where the processors may generally execute control and algorithmic functions (defined as retrievable program code) and assign specific processing-intensive tasks to the hardware accelerators depending on their respective dedicated functionalities. Control module may be responsible for upper layer base station protocol stack functions including S1-MME and S1-U protocol such as Media Access Control (MAC), Radio Link Control (RLC), Packet Data Convergence Protocol (PDCP), RRM, Radio Resource Control (RRC), in an exemplary LTE setting.

Figure 62:
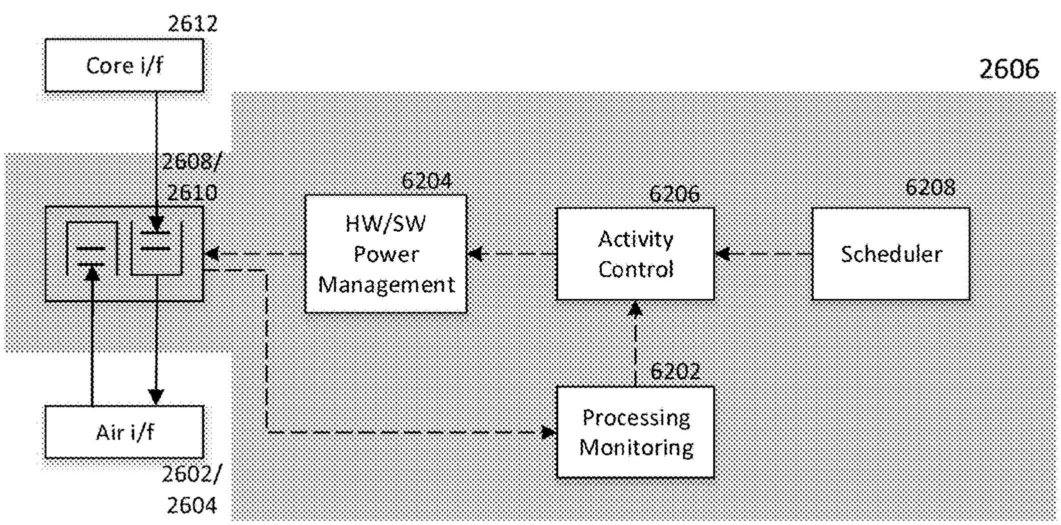
FIG. 62 shows an exemplary internal configuration of a network access node in accordance with some aspects.

Communication module 2606 of network access node 2002 may therefore employ processing infrastructure 2608/2610 to process uplink and downlink data. FIG. 62 depicts an internal configuration of network access node 2002 according to some aspects in which network access node 2002 may control the processing efficiency of processing infrastructure 2608/2610 according to anticipated processing demands to assist with optimizing power consumption. As shown in FIG. 62, communication module 2606 may include processing infrastructure 2608/2610, processing monitoring module 6202, HW/SW power management module 6204, activity control module 6206, and scheduler module 6208. Each of processing monitoring module 6202, HW/SW power management module 6204, activity control module 6206, and scheduler module 6208 may be structurally realized as a hardware-defined module, e.g., as one or more dedicated hardware circuits or FPGAs, as a software-defined module, e.g., as one or more processors executing program code that define arithmetic, control, and I/O instructions (e.g., software and/or firmware) stored in a non-transitory computer-readable storage medium, or as a mixed hardware-defined and software-defined module. While the individual components of communication module 2606 are depicted separately in FIG. 62, this depiction serves to highlight the operation of communication module 2606 on a functional level. Consequently, one or more of the components of communication module 2606 may be integrated into a common hardware and/or software element. Additionally, the functionality described herein (in particular e.g., formulas/equations, flow charts, and prose descriptions) may be readily incorporated by one of ordinary skill in the art into program code for retrieval from a non-transitory computer readable medium and execution by a processor. For example, each of processing monitoring module 6202, HW/SW power management module 6204, activity control module 6206, and scheduler module 6208 may be executed as separate software modules on a processor. Furthermore, one or more of processing monitoring module 6202, HW/SW power management module 6204, activity control module 6206, and scheduler module 6208 may additionally be executed as software modules by control module 2610. Scheduler module 6208 may be e.g., a MAC scheduler of control module 2610.

In the uplink direction, processing infrastructure 2608/2610 may process uplink data received from terminal devices over air interface 2602/2604 (implemented as antenna system 2602 and radio module 2604) to provide to the core network via core interface 5810. In the downlink direction, processing infrastructure 2608/2610 may process downlink data received from the core network via core interface 5810 to provide to terminal devices via air interface 2602/2604.

With respect to uplink processing at processing infrastructure 2608/2610, activity control module 6206 may be configured to anticipate future uplink processing demands for processing infrastructure 2608/2610 and provide commands to HW/SW power management module 6204, which may control the power consumption and processing efficiency of processing infrastructure 2608/2610 based on the commands provided by activity control module 6206. Activity control module 6206 may be configured to evaluate processing behavior via processing monitoring module 6202 and/or scheduling load via scheduler 6208 to determine an appropriate processing efficiency and power consumption for processing infrastructure 2608/2610.

Processing monitoring module 6202 may therefore be configured to monitor processing behavior at processing infrastructure 2608/2610 to anticipate future processing demand. As previously indicated, processing infrastructure 2608/2610 may have high processing demand when network access node 2002 is highly loaded, e.g., when network access node 2002 is serving a large number of active terminal devices, and may have lower processing demand when network access node 2002 is lightly loaded, e.g., when network access node 2002 is serving a small number of active terminal devices. Similarly, there may be a high processing demand when terminal devices being served by network access node 2002 have strict latency demands, as processing infrastructure 2608/2610 may need to complete processing in a timely manner. For example, in an LTE setting the eNB scheduler may apply more power (and frequency) to processing infrastructure 2608/2610 to achieve lower latency for specific QCIs.

In the uplink direction, processing infrastructure 2608/2610 may complete uplink processing on uplink data received from terminal devices within a specific timing constraint. In an exemplary LTE setting, an eNodeB may need to receive uplink data over a given TTI (1 ms in duration) and may have, for example, the three following TTIs to complete uplink processing on the received uplink data before providing acknowledgement (ACK)/non-acknowledgement (NACK) feedback (known to as 'HARQ' feedback in LTE). Accordingly, processing infrastructure 2608/2610 may need to receive, decode, demodulate, and error-check uplink data received from various served terminal devices to determine whether the uplink data was received correctly or incorrectly. If processing infrastructure 2608/2610 determines that uplink data was received correctly from a given terminal device, processing infrastructure 2608/2610 may transmit an ACK (in the fourth TTI after the TTI in which the uplink data was received) to the terminal device. Conversely, if processing infrastructure 2608/2610 determines that uplink data was not received correctly from a given terminal device, processing infrastructure 2608/2610 may transmit a NACK (in the fourth TTI after the TTI in which the uplink data was received) to the terminal device. Other uplink processing time constraints may similarly be imposed in other radio access technologies depending on the associated RAT-specific parameters.

Figure 63:
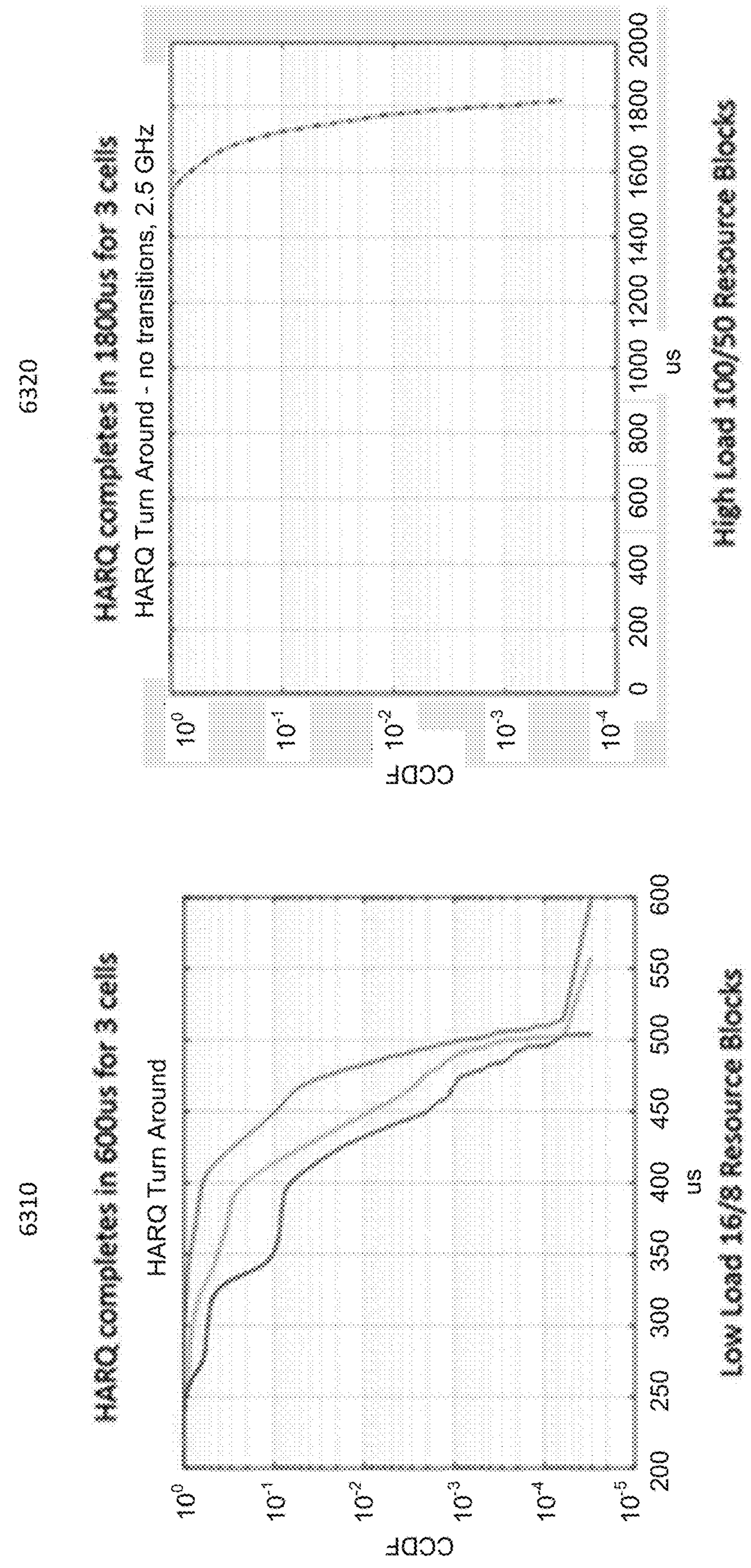
FIG. 63 shows various exemplary charts illustrating retransmission notification turnaround times in accordance with some aspects.

Accordingly, in an exemplary LTE setting, processing infrastructure 2608/2610 may have three TTIs (3 ms) to complete uplink HARQ processing (reception, decoding, demodulating, error checking, etc.) on uplink data to transmit ACK/NACK feedback in a timely manner. The total amount of time needed to complete ACK/NACK processing may be referred to as 'HARQ turnaround' in an LTE setting and 'retransmission notification turnaround' in a general setting. There may be a limit to retransmission notification turnaround times, such as a three TTI (3 ms) processing time budget for HARQ turnaround in LTE. The aspects detailed herein are applicable to other radio access technologies, which may also have retransmission notification turnaround times in which a network access node is expected to complete uplink retransmission processing and provide ACK/NACK feedback. FIG. 63 shows two different charts 6310 and 6320 detailing HARQ turnaround for low-loaded cells (6310) and for high-loaded cells (6320) in accordance with some aspects of an exemplary LTE setting. As shown in chart 6310 illustrating the cumulative distribution function (CCDF) of HARQ processing completion time, processing infrastructure 2608/2610 may be able to complete uplink HARQ processing with a HARQ turnaround of about 600 us (where each line in chart 6310 is the processing for a single cell out of three cells), which may be well within the 3 ms processing time budget. As shown in chart 6320, processing infrastructure 2608/2610 may need about 1800 us to complete uplink HARQ processing for high-loaded cells and/or cells with strict latency demands.

As previously described, processing infrastructure 2608/2610 may be able to operate at different processing efficiencies, where higher processing efficiencies may generally result in higher power consumption. For example, processing infrastructure 2608/2610 may operate software components with a higher CPU clock frequency, a higher voltage, and/or a higher number of cores (in a multi-core design) in order to increase processing efficiency while also increasing power consumption (where power consumption at a single core is generally proportional to voltage-squared times frequency ($V^2f$)). Processing infrastructure 2608/2610 may additionally or alternatively operate hardware components with lower DVFS, lower clock gating, and/or lower power gating in order to increase processing efficiency while increasing power consumption.

The various processing efficiencies of processing infrastructure 2608/2610 may be organized into a set of predefined power states, where each power state may be defined as a predefined configuration of one or more of CPU clock frequency, voltage, number of cores, combined interaction between multiple cores, DVFS, clock gating, and power gating for the software and/or hardware components of processing infrastructure 2608/2610. The various processing efficiencies may further use dynamic frequency and voltage scaling. In some aspects, the predefined power states can be lower frequency states (in some cases known as "P states") and/or lower power states (in some cases known as "C states"). Another non-limiting example can be a "Turbo Boost" state, which may be a power feature that can increase frequency and deliver lower latency for key workloads. Each of the predefined power states may therefore provide a certain processing efficiency with a certain power consumption, where HW/SW power management module 6204 may be configured to control processing infrastructure 2608/2610 to operate according to each of the predefined power states. Alternative to a predefined power state scheme, HW/SW power management module 6204 may be configured to control processing infrastructure 2608/2610 to operate according to configurable power states, where HW/SW power management module 6204 may be able to individually adjust (e.g., in a continuous or discretized fashion) one or more of CPU clock frequency, voltage, number of cores, combined interaction between multiple cores, DVFS, clock gating, and power gating to adjust the processing efficiency and power consumption of processing infrastructure 2608/2610.

To assist with optimizing power consumption, activity control module 6206 may evaluate past retransmission notification turnaround (e.g., HARQ turnaround) times provided by processing monitoring module 6202 to select a target processing efficiency at which to operate processing infrastructure 2608/2610. Accordingly, processing monitoring module 6202 may monitor processing behavior at processing infrastructure 2608/2610 over time to characterize the retransmission notification turnaround time based on the current processing efficiency. For example, processing monitoring module 6202 may measure an average retransmission notification turnaround time (e.g., with windowing over a predefined number of most recent TTIs) when processing infrastructure 2608/2610 is set to a first power state. Processing monitoring module 6202 may then provide the average retransmission notification turnaround time to activity control module 6206, which may compare the average retransmission notification turnaround time to the processing time budget, e.g., 3 ms in the exemplary setting of HARQ. Depending on how much budget headroom the average retransmission notification turnaround time provides (where budget headroom is the difference between the processing time budget and the average retransmission notification turnaround time), activity control module 6206 may instruct HW/SW power management module 6204 to increase or decrease the power state, thus increasing or reducing processing efficiency while still meeting the needs of the network and/or HARQ turnaround. For example, if there is a large budget headroom (e.g., the average retransmission notification turnaround time is far below the processing time budget) when processing infrastructure 2608/2610 is operating at the first power state, activity control module 6206 may instruct HW/SW power management module 6204 to utilize a power state with lower power consumption and lower processing efficiency than the first power state. Conversely, if there is a small budget headroom (e.g., if the average retransmission notification turnaround time is just below the processing time budget), activity control module 6206 may instruct HW/SW power management module 6204 to either utilize a power state with higher power consumption and higher processing efficiency than the first power state or to continue using the first power state. Activity control module 6206 may therefore be preconfigured with decision logic (e.g., in the form of a fixed or adaptive lookup table or similar decision logic) that receives budget headroom or retransmission notification turnaround time as input and provides a change in processing efficiency or power consumption as output. For example, if the retransmission notification turnaround time is e.g., 600 us (e.g., budget headroom is 2.4 ms), activity control module 6206 may decide to reduce processing efficiency or power consumption of processing infrastructure 2608/2610 by e.g., 25% according to the decision logic. Alternatively, if the retransmission notification turnaround time is e.g., 1800 us (e.g., budget headroom is 1.2 ms), activity control module 6206 may decide to reduce processing efficiency or power consumption of processing infrastructure 2608/2610 by e.g., 10% according to the decision logic. In another example, if the retransmission notification turnaround time is 2.9 ms (e.g., budget headroom is 0.1 ms), activity control module 6206 may determine that the budget headroom is insufficient (and thus susceptible to potential retransmission notification failures if processing demand increases) and decide to increase processing efficiency or power consumption of processing infrastructure 2608/2610 by e.g., 25% according to the decision logic. Such values are nonlimiting and exemplary and the decision logic employed by activity control module 6206 to make decisions regarding power state changes based on retransmission notification turnaround time may be broadly configurable and may depend on the various power states and configuration of processing architecture 2608/2610. Activity control module 6206 may generally select to reduce power consumption to the lowest acceptable rate for which processing efficiency is still sufficient to meet the retransmission notification processing time budget (e.g., including some processing efficiency tolerance in case of variations).

Activity control module 6206 may therefore provide HW/SW power management module 6204 with a command to increase or decrease power consumption or processing efficiency of processing infrastructure 2608/2610. In some aspects, activity control module 6206 may provide the command to adjust power consumption or processing efficiency in the form of a specific adjustment instruction, e.g., to increase processing efficiency at processing infrastructure 2608/2610 by a certain amount, or in the form of a selected power state, e.g., by determining an appropriate power state based on the retransmission notification turnaround time and specifying the selected power state of infrastructure 2608/2610 directly to HW/SW power management module 6204. Regardless, activity control module 6206 may provide HW/SW power management module 6204 with a command regarding the appropriate power state of processing infrastructure 2608/2610.

HW/SW power management module 6204 may then control processing infrastructure 2608/2610 to operate according to the selected power state, where the selected power state may be the same or different from the previous power state of processing infrastructure 2608/2610. Processing infrastructure 2608/2610 may then process uplink data received via air interface 2602/2604 according to the selected power state.

In some aspects, processing monitoring module 6202 may continuously measure retransmission notification turnaround at processing infrastructure 2608/2610 to provide average retransmission notification turnaround measurements to activity control module 6206. Activity control module 6206 may therefore control operation of processing infrastructure 2608/2610 in a continuous and dynamic fashion over time based on the average retransmission notification turnaround times provided by processing monitoring module 6202. As retransmission notification turnaround time may generally vary slowly over time (as substantial increases in cell load may be relatively gradual), the average retransmission notification turnaround measured by processing monitoring module 6202 may be generally predictive and thus be effective in characterizing future processing demands on processing infrastructure 2608/2610.

Accordingly, activity control module 6206 may continuously adjust the processing efficiency and power consumption of processing infrastructure 2608/2610 (via specific adjustment or power state commands to HW/SW power management module 6204) based on average retransmission notification turnaround to assist with optimizing power consumption and processing efficiency. In particular, activity control module 6206 may control processing infrastructure 2608/2610 to utilize a power state that minimizes power consumption while maintaining processing efficiency at a sufficient level to meet the processing demands indicated by the average retransmission notification turnaround. For example, activity control module 6206 may control processing infrastructure 2608/2610 to use the power state that provides the lowest processing consumption while still meeting processing demands, e.g., that provides retransmission notification turnaround time within a predefined tolerance value (e.g., 0.1 ms, 0.05 ms, etc.) of the retransmission notification processing time budget (e.g., 3 ms for HARQ). The predefined tolerance value may thus allow processing infrastructure 2608/2610 to achieve retransmission notification turnaround close to the retransmission notification processing time budget without exceeding it, e.g., due to unpredictable spikes in processing demand.

In some aspects, utilizing a power state that brings retransmission notification turnaround time close to the retransmission notification processing time budget may be useful for cases where processing infrastructure 2608/2610 is sensitive to dynamic power, for example, where processing infrastructure 2608/2610 consumes a large amount of power when operating at a high processing efficiency. In an alternative case, processing infrastructure 2608/2610 may be leakage power-sensitive, e.g., may expend a large amount of power simply from being on. Accordingly, it may be useful for activity control module 6206 to select higher power states that enable processing infrastructure 2608/2610 to finish retransmission notification processing at an earlier time (e.g., with large budget headroom) and power down for the remaining retransmission notification processing time budget. Such may allow processing infrastructure 2608/2610 to avoid expending leakage power as processing infrastructure 2608/2610 will be off.

Additionally or alternatively to the use of processing behavior (as measured by processing monitoring module 6202 as e.g., retransmission notification turnaround time), in some aspects activity control module 6206 may utilize anticipated processing demands as indicated by scheduling information to select power states for processing infrastructure 2608/2610. As shown in FIG. 62, activity control module 6206 may also receive scheduling information from scheduler module 6208, which may be e.g., a MAC scheduler of control module 2610 configured to perform scheduling functions for terminal devices served by network access node 2002. Scheduler module 6208 may be configured to provide scheduling information including one or more of number of allocated resource blocks, modulation and coding scheme, QoS requirements (e.g., QoS Class Identifier (QCI)), random access channel information (e.g., PRACH), etc., to activity control module 6206. Such scheduling information may be for uplink schedules determined by scheduler module 6208.

The scheduling information may provide a basis to anticipate future processing demand on processing infrastructure 2608/2610. For example, a large number of allocated resource blocks (e.g., a high number of resource blocks allocated to served terminal devices for uplink transmissions) may result in a high processing demand on processing infrastructure 2608/2610, as processing infrastructure 2608/2610 may need to process a larger amount of data (e.g., to complete uplink retransmission notification processing). Higher modulation and coding schemes, e.g., with more complex modulation schemes and/or lower coding rates, may also result in a high processing demand as processing infrastructure 2608/2610 may need to demodulate data with a more complex scheme and/or decode more encoded data according to a lower coding rate. Higher priority QoS requirements may also result in higher processing demand, which may require higher processing efficiency in order to meet the low latency and low jitter requirements of high QoS requirements (e.g., higher processing frequency thus yielding a minimized processing time and expedited delivery to a terminal device). The presence of random access channel occasions (which in an exemplary LTE setting may be deterministic in each TTI according to the current PRACH configuration that specifies the occurrence of PRACH occasions) may also result in higher processing demand as processing infrastructure 2608/2610 may need to receive and process random access channel data to identify terminal devices engaging in random access procedures.

In some aspects, scheduler module 6208 may have such scheduling information available for both the next TTI in addition to several TTIs in the future, e.g., up to three TTIs (which may depend on the specifics of the scheduling functionality provided by scheduler module 6208). Such future scheduling information may either be complete scheduling information, e.g., where scheduler module 6208 has determined a full resource grid of uplink scheduling for served terminal devices for one or more upcoming TTIs, or partial, e.g., where scheduler module 6208 has some information (such as the number of terminal devices that will be allocated resources) for one or more upcoming TTIs. Regardless of the specificity, such future scheduling information may be useful in characterizing upcoming processing demand on processing infrastructure 2608/2610.

Accordingly, in some aspects scheduler module 6208 may be able to evaluate both past and future scheduling information to characterize upcoming demands. As uplink scheduling may generally vary gradually, past scheduling information may be useful to anticipate upcoming processing demands. Additionally, any future scheduling information available at scheduler module 6208 (e.g., for three TTIs in advance; either complete or partial future scheduling information) may provide a direct characterization of processing demand in the immediately upcoming time frame. In some aspects, scheduler module 6208 may be configured to provide activity control module 6206 with 'raw' scheduling information, e.g., directly with scheduling information, or with 'refined' scheduling information, e.g., an indicator or characterization of upcoming traffic load. In the raw scheduling information case, scheduler module 6208 may provide activity control module 6206 with a number of allocated resource blocks, modulation and coding scheme, QoS requirements, random access channel information, etc., which activity control module 6206 may evaluate in order to characterize, or 'anticipate', upcoming traffic load. In the refined scheduling information case, scheduler module 6208 may evaluate a number of allocated resource blocks, modulation and coding scheme, QoS requirements, random access channel information, etc., in order to anticipate the upcoming processing demand and provide an indication to activity control module 6206 that specifies the anticipated upcoming processing demand.

The evaluation performed by activity control module 6206 or scheduler 6208 may thus anticipate upcoming traffic load based on one or more of number of allocated resource blocks, modulation and coding scheme, QoS requirements, random access channel information, etc., where the number of allocated resource blocks, modulation and coding scheme, QoS requirements, and random access channel information may impact processing demand as described above. Activity control module 6206 may therefore determine an anticipated processing demand on processing infrastructure 2608/2610 based on the scheduling information. Similar to as described above regarding the processing behavior evaluation based on retransmission notification turnaround time, in some aspects activity control module 6206 may then determine if a processing efficiency or power consumption adjustment is needed at processing infrastructure 2608/2610. For example, if activity control module 6206 determines from the scheduling information that processing demand at processing infrastructure 2608/2610 is anticipated to increase, activity control module 6206 may determine that processing efficiency at processing infrastructure 2608/2610 should be increased such as via a switch to a power state with higher processing efficiency. Alternatively, if activity control module 6206 determines from the scheduling information that processing demand at processing infrastructure 2608/2610 is anticipated to decrease, activity control module 6206 may determine that power consumption at processing infrastructure 2608/2610 should be decreased such as via a switch to a power state with less power consumption. As in the case described above regarding retransmission notification turnaround time, activity control module 6206 may determine processing efficiency and power consumption adjustments based on decision logic (e.g., in the form of a fixed or adaptive lookup table or similar decision logic) that receives scheduling information as input and provides a change in processing efficiency or power consumption as output.

Activity control module 6206 may generally decide to adjust processing efficiency and power consumption at processing infrastructure 2608/2610 to utilize a power state that provides processing efficiency sufficient to support the anticipated processing demand with the least power consumption (e.g., including some processing efficiency tolerance in case the anticipated processing demand is an underestimate). Activity control module 6206 may then provide HW/SW power management module 6204 with a command to adjust processing infrastructure 2608/2610 according to the processing efficiency and power consumption adjustment determined by activity control module 6206. Activity control module 6206 may either provide the command to adjust power consumption or processing efficiency in the form of a specific adjustment instruction, e.g., to increase processing efficiency at processing infrastructure 2608/2610 by a certain amount, or in the form of a selected power state, such as by determining an appropriate power state based on the anticipated processing demand and specifying the selected power state of infrastructure 2608/2610 directly to HW/SW power management module 6204. Regardless, activity control module 6206 may provide HW/SW power management module 6204 with a command regarding the appropriate power state of processing infrastructure 2608/2610.

HW/SW power management module 6204 may then control processing infrastructure 2608/2610 to operate according to the selected power state, where the selected power state may be the same or different from the previous power state of processing infrastructure 2608/2610. Processing infrastructure 2608/2610 may then process uplink data received via air interface 2602/2604 according to the selected power state.

In some aspects, scheduler module 6208 may continuously provide scheduling information to activity control module 6206. Accordingly, activity control module 6206 may control operation of processing infrastructure 2608/2610 in a continuous and dynamic fashion over time based on the scheduling information provided by scheduler module 6208. Activity control module 6206 may thus continuously adjust the processing efficiency and power consumption of processing infrastructure 2608/2610 (via specific adjustment or power state commands to HW/SW power management module 6204) based on processing demand anticipated by scheduling information in order to optimize power consumption and processing efficiency. In particular, activity control module 6206 may control processing infrastructure 2608/2610 to utilize a power state that minimizes power consumption while maintaining processing efficiency at a sufficient level to meet the processing demands indicated by the scheduling information.

Activity control module 6206 may utilize one or both of retransmission notification turnaround time and scheduling information to determine control over the processing efficiency and power consumption of processing infrastructure 2608/2610. In some aspects where activity control module 6206 is configured to utilize retransmission notification turnaround time and scheduling information to control processing infrastructure 2608/2610, activity control module 6206 may be configured with decision logic to select power consumption and processing efficiency adjustments to processing infrastructure 2608/2610 based on both retransmission notification turnaround time and scheduling information, such as a two-dimensional lookup table or similar decision logic that receives retransmission notification turnaround time and scheduling information as input and provides a power consumption and processing efficiency adjustment as output (e.g., in the form of either a specific adjustment or a selected power state). For example, activity control module 6206 may receive both an average retransmission notification turnaround time and scheduling information from processing monitoring module 6202 and scheduler module 6208, respectively, and control processing infrastructure 2608/2610 to utilize minimal power consumption while meeting the processing demand anticipated by the average retransmission notification turnaround time and the scheduling information. As both average retransmission notification turnaround time and scheduling information (both past and future) may be predictive in characterizing future processing demand, such may provide activity control module 6206 with information to effectively select optimal power states for processing infrastructure 2608/2610.

In various aspects, HW/SW power management module 6204 may utilize other techniques to minimize power consumption at processing infrastructure 2608/2610. In the retransmission notification turnaround case described above, processing infrastructure 2608/2610 may complete uplink retransmission notification processing for a given TTI with a certain amount of budget headroom time remaining. After processing infrastructure 2608/2610 completes retransmission notification processing for a given TTI, HW/SW power management module 6204 may then power down the resources of processing infrastructure 2608/2610 dedicated to retransmission notification processing for the TTI (where separate resources may be dedicated to different TTIs to address the overlap between the three TTI retransmission notification processing time budget; e.g., in the case of separate cores or in a more complex resource management architecture). HW/SW power management module 6204 may thus conserve further power as these resources of processing infrastructure 2608/2610 may not be needed for the remaining budget headroom.

In some aspects, communication module 2606 may additionally rely on cooperation from terminal devices to reduce power consumption. For example, communication module 2606 (e.g., control module 2610 and/or scheduler module 6208) may provide control signaling to terminal devices that the terminal devices will only be allocated a limited amount of uplink resources over a specific or indefinite time period. Such may reduce the traffic load on communication module 2606 and consequently reduce the processing demand on processing infrastructure 2608/2610.

Accordingly, communication module 2606 may assist with optimizing power consumption and processing efficiency of processing infrastructure 2608/2610 based on processing demand indicators such as retransmission feedback processing times (e.g., HARQ processing times) and/or scheduling information (e.g., at a MAC scheduler). Such may allow communication module 2606 to anticipate future processing demands based on the processing demand indicators and consequently minimize power consumption at processing infrastructure 2608/2610 while ensuring that processing infrastructure 2608/2610 has processing efficiency sufficient to support future processing demands. Without loss of generality, application of such may be applied to uplink processing at BBUs, which may be deployed in any type of base station architecture including distributed and cloud/virtual.

Figure 64:
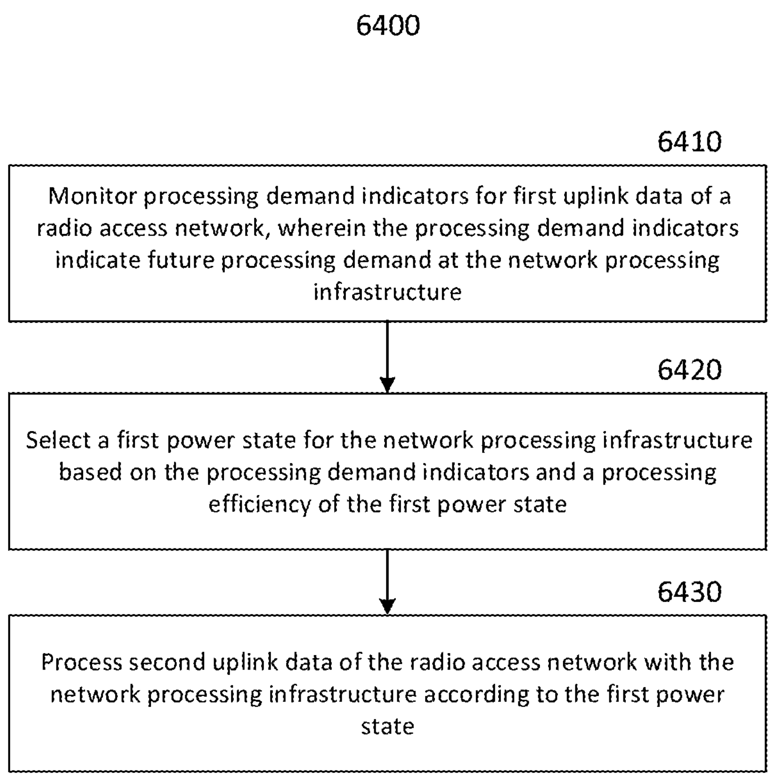
FIG. 64 shows an exemplary method of operating a network processing module in accordance with some aspects.

FIG. 64 shows method 6400 of operating a network processing module in accordance with some aspects of the disclosure. As shown in FIG. 64, method 6400 includes monitoring processing demand indicators for first uplink data of a radio access network (6410), the processing demand indicators indicating future processing demand at the network processing circuit infrastructure. A first power state for the network processing infrastructure is selected based on the processing demand indicators and a processing efficiency of the first power state (6420). Second uplink data of the radio access network is processed with the network processing infrastructure according to the first power state (6430).

2.8 Power-Efficiency #8

In some aspects of this disclosure, a network access node may reduce power consumption by detecting whether terminal devices that have 'unpredictable' data traffic are connected to the network access node and, when no terminal devices with unpredictable are detected, activating a discontinuous communication schedule (discontinuous transmission and/or discontinuous reception). The network access node may then communicate with any remaining terminal devices with 'predictable' traffic with the discontinuous communication schedule. As discontinuous communication schedules may be suitable for predictable terminal devices but may not be able to support the data traffic demands of unpredictable terminal devices, the network access node may conserve power without interrupting data connections of the unpredictable terminal devices. These aspects may be used with common channel aspects, e.g., a common channel may use a 'predictable' traffic scheme.

Terminal devices such as mobile phones, tablets, laptops, etc. may have data connections that are unpredictably triggered by users while terminal devices such as smart alarms (fire/burglar alarms, doorbells, surveillance cameras, etc.), smart home controllers (thermostats, air conditioners, fans, etc.), smart appliances (refrigerators, freezers, coffee machines), may generally have 'regular' or 'predictable' data schedules. Many such predictable terminal devices may utilize Internet of Things (IoT) technology and may rely on periodic network access, such as by transmitting and/or receiving periodic updates or reports (e.g., temperature reports, 'all-okay' reports, periodic surveillance images, etc.). Accordingly, discontinuous communication schedules may be well-suited to support the data traffic for such predictable terminal devices as the data traffic may be regular and/or periodic. Conversely, unpredictable terminal devices may have data traffic triggered at times that are not deterministic and thus may not be able to be serviced by a discontinuous communication schedule. As discontinuous communication schedules may be more power efficient than continuous communication schedules, network access nodes according to an aspect of this disclosure may switch between discontinuous and continuous communication schedules based on whether any unpredictable terminal devices are present in order to meet the traffic demands of terminal devices, reduce power consumption, and, as a result, reduce operating costs.

Figure 65:
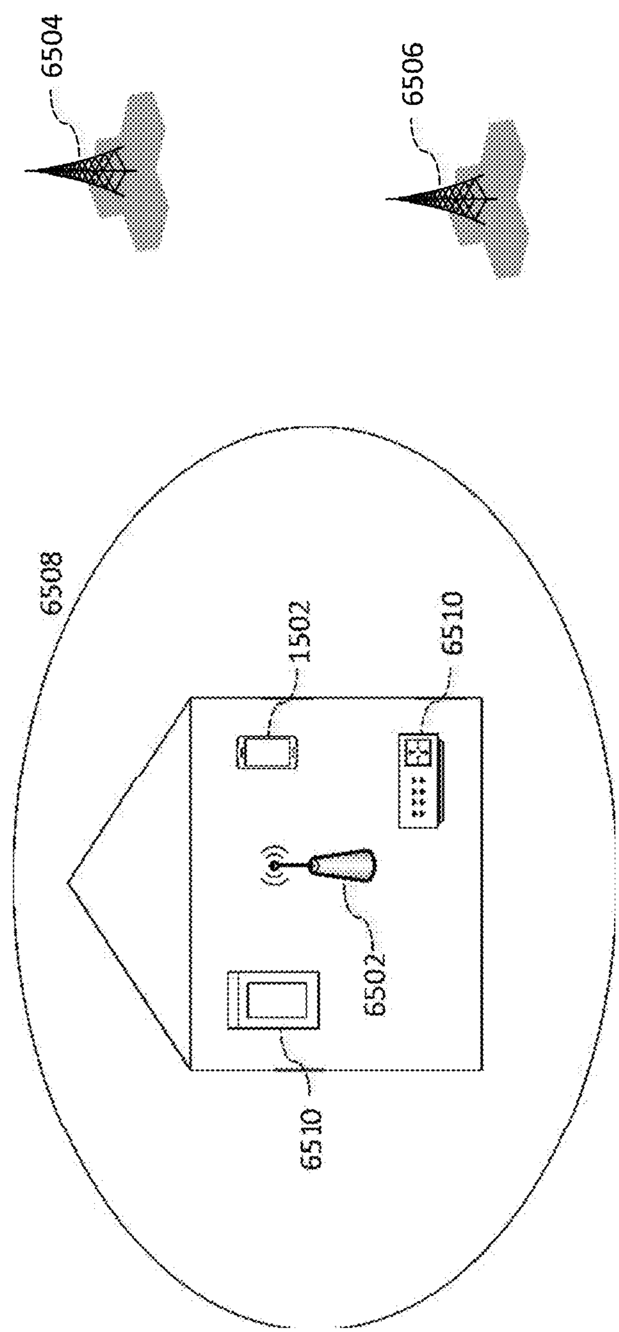
FIG. 65 shows a first exemplary network scenario in accordance with some aspects.

FIG. 65 shows an exemplary network scenario in accordance with some aspects. As shown in FIG. 65, network access nodes 6502, 6504, and 6506 may each be configured to provide radio access connections to terminal devices within their respective coverage areas. In the exemplary setting of FIG. 65, network access node 6502 may be a small cell such as a microcell or femtocell (e.g., a home eNodeB or similar cell) that provides a cellular radio access technology. Alternatively, network access node 6502 may be an access point that provides a short range radio access technology such as a WLAN AP. Network access node 6502 may provide radio access to terminal devices within coverage area 6508, which may contain a building, such as a residential house or commercial structure, or another area of predictable size. Network access nodes 6504 and 6506 may be macro cells that provide a cellular radio access technology. Although not explicitly depicted in FIG. 65, in some aspects network access nodes 6504 and 6506 may have coverage areas larger than coverage area 6508.

Terminal devices 1502, 6510, and 6512 may be located within coverage area 6508 and may be connected with network access node 6502 (e.g., may be 'served' by network access node 6502). Accordingly, network access node 6502 may be aware of the presence of terminal devices 1502, 6510, and 6512 and may provide radio access to terminal devices 1502, 6510, and 6512.

Terminal device 1502 may be a terminal device with 'unpredictable' data traffic such as a smart phone, tablet, laptop, smart TV/media player/streaming device, or any similar terminal device that is user-interactive and may have data connections triggered by a user at unpredictable times. For example, a user of a smart phone may be able to initiate a data connection such as voice/audio streams, video streams, large downloadable files, Internet web browser data, etc., at any point in time, while a serving network access node may not be able to determine in advance when such a connection will be initiated by a user. As a result, network access node 6502 may need to provide a radio access connection to terminal device 1502 that can support unpredictable data traffic.

In contrast, terminal devices 6510 and 6512 may be terminal devices with 'predictable' data traffic, such as terminal devices that operate on Internet of Things (IoT) connections that generally rely on data traffic with predictable or 'fixed' schedules. Examples include alarm systems (fire, burglar, etc.), surveillance systems (doorbells, security cameras, etc.), home control systems (thermostats, air conditioning controllers, lighting/electricity controllers, etc.), appliances (refrigerators/freezers, ovens/stoves, coffee machines, etc.). Although some exceptions may apply (as described below), such predictable terminal devices may generally utilize a data connection with network access node 6502 that involves periodic and/or scheduled communications, such as temperature reports, 'all-okay' reports, periodic surveillance images, etc. As the communications of terminal device 6510 and 6512 may be predictable, network access node 6502 may be able to support such data connections with discontinuous communication schedules. Furthermore, data traffic activity for predictable terminal devices may be scheduled further in advance than data traffic activity for unpredictable terminal devices, which may be triggered by a user at any time.

To assist with reducing power consumption and consequently reduce operating costs, network access node 6502 may utilize discontinuous communication modes such as discontinuous transmission (DTX) and/or discontinuous reception (DRX) depending on which types of terminal devices, e.g., unpredictable and predictable, network access node 6502 is serving. For example, if network access node 6502 is only serving predictable terminal devices at a given time, network access node 6502 may not need to support unpredictable data traffic (as may be needed if unpredictable terminal devices are present) and thus may be able to employ DTX and/or DRX for the predictable terminal devices. For example, network access node 6502 may employ a DTX and/or DRX schedule that has relatively sparse transmission and/or reception periods and may be able to schedule all data traffic for the predictable terminal devices within these 'active' periods. Network access node 6502 may then be able to power down communication components for the remaining 'inactive' periods, thus reducing power consumption.

Conversely, if network access node 6502 is serving any unpredictable terminal devices, network access node 6502 may not be able to utilize DTX or DRX due to the likelihood that an unpredictable terminal device will require a data activity during an inactive period of the discontinuous communication schedule. Network access node 6502 may therefore instead use a 'continuous' communication schedule in order to support the potentially unpredictable data traffic requirements of unpredictable terminal devices. Network access node 6502 may therefore continually monitor the served terminal devices to identify whether network access node 6502 is serving any unpredictable terminal devices and, if not, switch to DTX and/or DRX. Such may allow network access node 6502 to meet the data traffic requirements of all served terminal devices while reducing power consumption in scenarios where only predictable terminal devices are being served.

According to an aspect of this disclosure, network access node 6502 may in some aspects be configured in a similar manner to network access node 2002 shown in FIG. 26 and may include antenna system 2602, radio module 2604, communication module 2606 (including physical layer module 2608 and control module 1910). Network access node 6502 may be configured to operate according to any one or more radio access technologies and may provide radio access to terminal devices accordingly.

Figure 66:
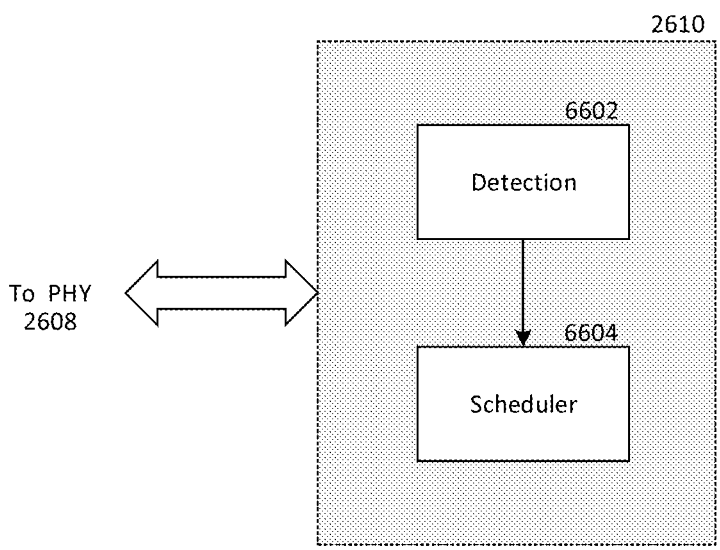
FIG. 66 shows an exemplary internal depiction of a control module for a network access node in accordance with some aspects.

As introduced above, network access node 6502 may identify scenarios in which network access node 6502 is not serving any unpredictable terminal device (e.g., only serving predictable terminal devices or not serving any terminal devices) and, upon identifying such scenarios, initiate DTX and/or DRX. Without loss of generality, such may be handled at control module 2610. FIG. 66 shows an exemplary internal configuration of control module 2610, which may include detection module 6602 and scheduler module 6604 (other components of control module 2610 not directly related to the current aspect are omitted from FIG. 66 for clarity). While detection module 6602 and scheduler module 6604 are depicted separately in FIG. 66, such serves to highlight the operation of control module 2610 on a functional level. Consequently, in some aspects detection module 6602 and scheduler module 6604 may be integrated into a common hardware and/or software component such as separate software modules stored on a non-transitory computer readable medium that are executed as software-defined instructions by a processor of control module 2610.

In accordance with some aspects, detection module 6602 may be configured to monitor the set of terminal devices served by network access node 6502 in order to detect scenarios when no unpredictable terminal devices are being served by network access node 6502. Accordingly, detection module 6602 may evaluate a list of terminal devices currently being served by network access node 6502 to identify whether any served terminal devices are unpredictable terminal devices. Detection module 6602 may obtain the information for the list of served terminal devices by receiving explicit indicators from terminal devices that identify themselves as unpredictable or predictable terminal devices, by monitoring data traffic for served terminal devices to classify each served terminal devices as unpredictable or predictable terminal devices, by receiving information from the core network or another external location that identifies each terminal device as an unpredictable or a predictable terminal device, etc. Regardless, information that details the terminal devices served by network access node 6502 may be available at control module 2610. The list of served terminal devices may explicitly specify terminal devices as being predictable or unpredictable. For example, the list of terminal devices may specify which terminal devices are IoT (or a similar technology), which may inform detection module 6602 that these terminal devices are predictable terminal devices. In some aspects, detection module 6602 may additionally or alternatively 'classify' the terminal devices as either predictable or unpredictable, for which detection module 6602 may rely on a model (for example, a predefined or adaptive model) that evaluates past data traffic requirements to identify terminal devices as either predictable or unpredictable based on traffic patterns (e.g., which terminal devices have deterministic or regular traffic patterns and which terminal devices have random traffic patterns). Detection module 6602 may in any case be configured to identify predictable and unpredictable terminal devices from the list of terminal devices.

In the exemplary setting of FIG. 65, terminal device 1502 may be a smart phone, terminal device 6510 may be a home appliance operating an IoT connection, and terminal device 6512 may be a home controller operating an IoT connection. Terminal device 1502 may thus have heavy data traffic requirements and may consequently need to frequently and continually transmit and receive data with network access node 6502 in order to satisfy such heavy data traffic requirements. Conversely, terminal devices 6510 and 6512 may only have light and/or sporadic data traffic requirements and not require substantial transmission and reception with network access node 6502 to support their respective data traffic requirements.

Accordingly, the list of served terminal devices available at detection module 6602 may include terminal devices 1502, 6510, and 6512 and may specify that terminal device 1502 is an unpredictable terminal device and that terminal devices 6510 and 6512 are predictable terminal devices. Detection module 6602 may therefore determine that network access node 6502 is serving at least one unpredictable terminal device and may report to scheduler module 6604 that unpredictable terminal devices are being served by network access node 6502.

Scheduler module 6604 may be configured to determine transmission and reception (e.g., downlink and uplink) scheduling for network access node 6502. Scheduler module 6604 may therefore receive information from detection module 6602 and, based on the information, select a communication schedule for network access node 6502. Accordingly, if detection module 6602 reports that network access node 6502 is serving at least one unpredictable terminal device, scheduler module 6604 may select a continuous communication schedule (e.g., not DTX or DRX) that can support heavy data traffic for unpredictable terminal devices. Conversely, if detection module 6602 reports that network access node 6502 is not serving any unpredictable terminal devices, scheduler module 6604 may select a discontinuous communication schedule (e.g., DTX and/or DRX) that can support light and/or sparse data traffic for predictable terminal devices while conserving power.

Figure 67:
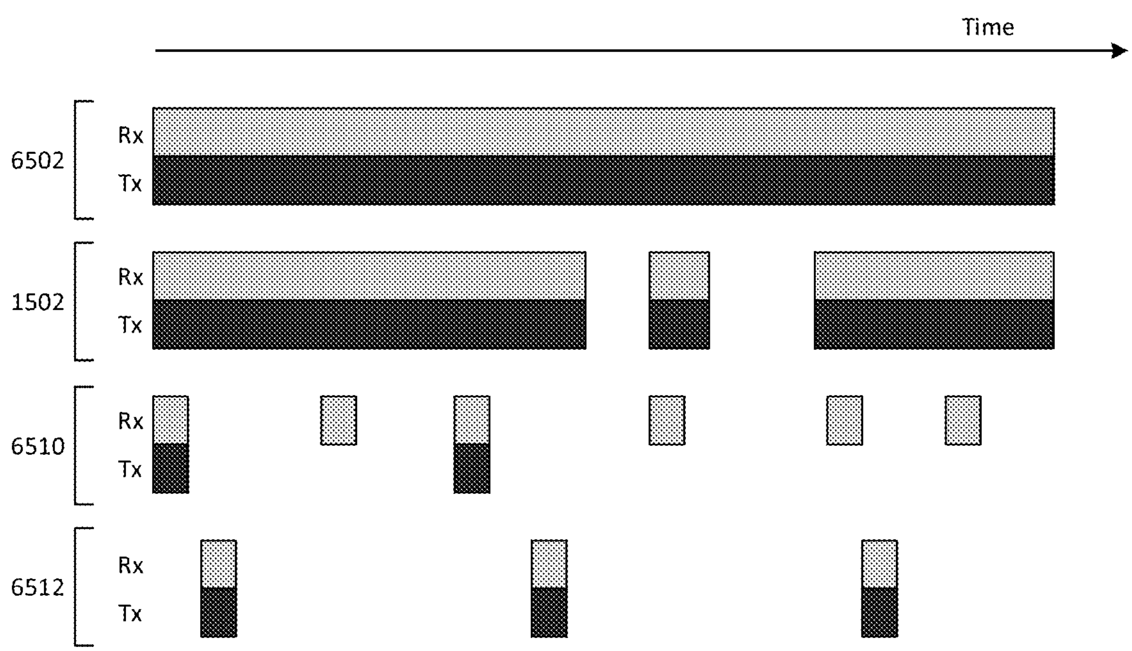
FIG. 67 shows various exemplary transmission and reception schedules in accordance with some aspects.

Accordingly, in the setting of FIG. 67 scheduler module 6604 may receive the report from detection module 6602 and determine that network access node 6502 is serving at least one unpredictable terminal device in terminal device 1502. Scheduler module 6604 may consequently select a continuous communication schedule for network access node 6502. Network access node 6502 may then transmit and receive data with terminal devices 1502, 6510, and 6512 according to the continuous communication schedule (e.g., via physical layer module 2608, radio module 2604, and antenna system 2602). Scheduler module 6604 may allocate radio resources to the terminal devices served by network access node 6502 according to the continuous communication schedule and may also provide control signaling to terminal device 1502, 6510, and 6512 that specifies the radio resource allocation.

FIG. 67 shows an exemplary transmission and reception timing chart for network access node 6502 and terminal devices 1502, 6510, and 6512 in accordance with some aspects. As shown in FIG. 67, terminal device 1502 may frequently transmit and receive data with network access node 6502 to support heavy data traffic while terminal devices 6510 and 6512 may only infrequently transmit and receive data with network access node 6502. As terminal device 1502 requires frequent transmission and reception, scheduler module 6604 may select a continuous communication schedule for network access node 6502 (which may in certain cases (e.g., TDD) have breaks in transmission or reception but may nevertheless not be a DRX or DTX schedule). Network access node 6502 may therefore provide transmission and reception sufficient to support heavy data traffic for terminal device 1502.

Figure 68:
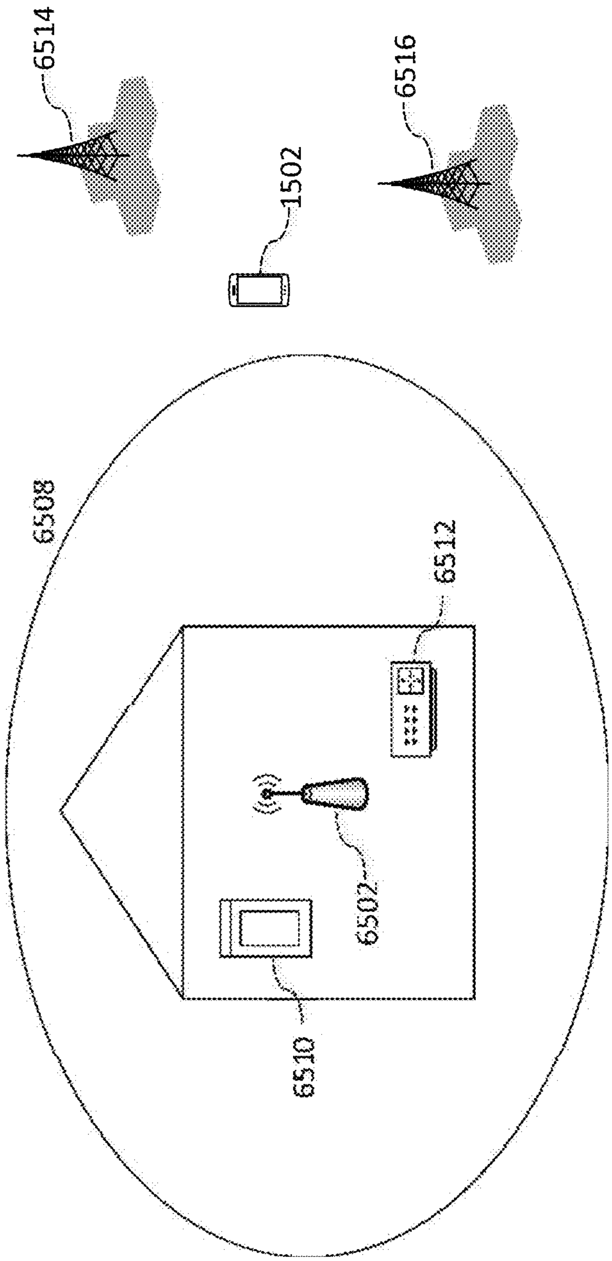
FIG. 68 shows a second exemplary network scenario in accordance with some aspects.

In alternate exemplary scenarios to FIG. 65, network access node 6502 may not be serving any unpredictable terminal devices (e.g., may be serving exclusively predictable terminal devices or may not be serving any terminal devices). FIG. 68 shows an exemplary scenario according to some aspects in which network access node 6502 may only be serving terminal devices 6510 and 6512 (e.g., as terminal device 1502 has moved outside of coverage area 6508 and/or terminal device 1502 has gone into a radio idle state). Accordingly, when detection module 6602 evaluates the list of served terminal devices (which may be periodically updated and thus reflect that terminal device 1502 is no longer being served by network access node 6502), detection module 6602 may determine that network access node 6502 is not serving any unpredictable terminal devices. Detection module 6602 may then report to scheduler module 6604 that network access node 6502 is not serving any unpredictable terminal devices.

Accordingly, upon determining that network access node 6502 is not serving any unpredictable terminal devices based on the report from detection module 6602, scheduler module 6604 may select a discontinuous communication schedule for network access node 6502. Network access node 6502 may then transmit and receive data with terminal devices 1502, 6510, and 6512 according to the discontinuous communication schedule (e.g., via physical layer module 2608, radio module 2604, and antenna system 2602). Scheduler module 6604 may allocate radio resources to the terminal devices served by network access node 6502 according to the discontinuous communication schedule and may also provide control signaling to terminal device 1502, 6510, and 6512 that specifies the radio resource allocation, which may include downlink and uplink grants that respectively fall within the transmit and receive periods of the discontinuous communication schedule. As network access node 6502 is not serving any unpredictable terminal devices and consequently does not need to support heavy data traffic, network access node 6502 may be able to conserve power while still meeting the data traffic needs of predictable terminal devices with the discontinuous communication schedule.

Figure 69A:
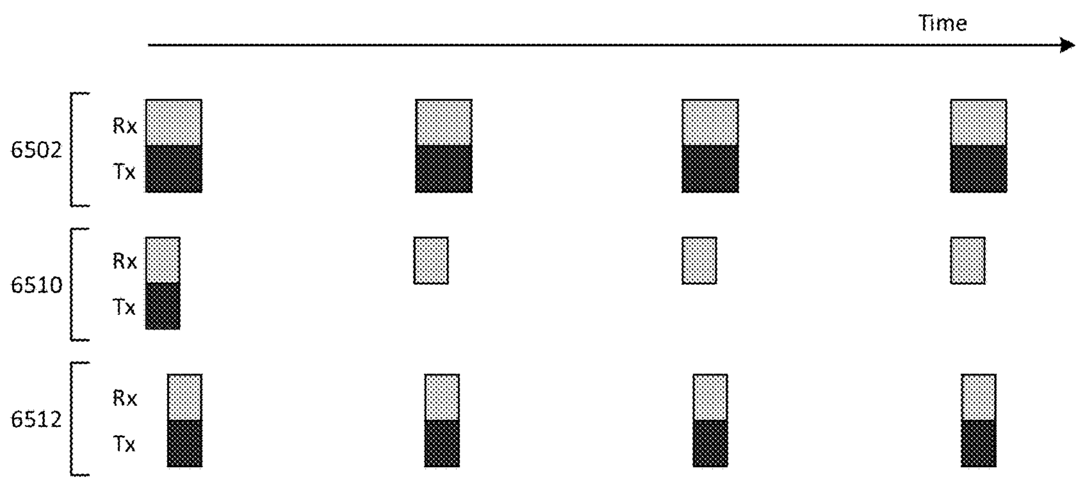
FIGS. 69A and 69B show various transmission and reception schedules using discontinuous transmission and/or reception in accordance with some aspects.
Figure 69B:
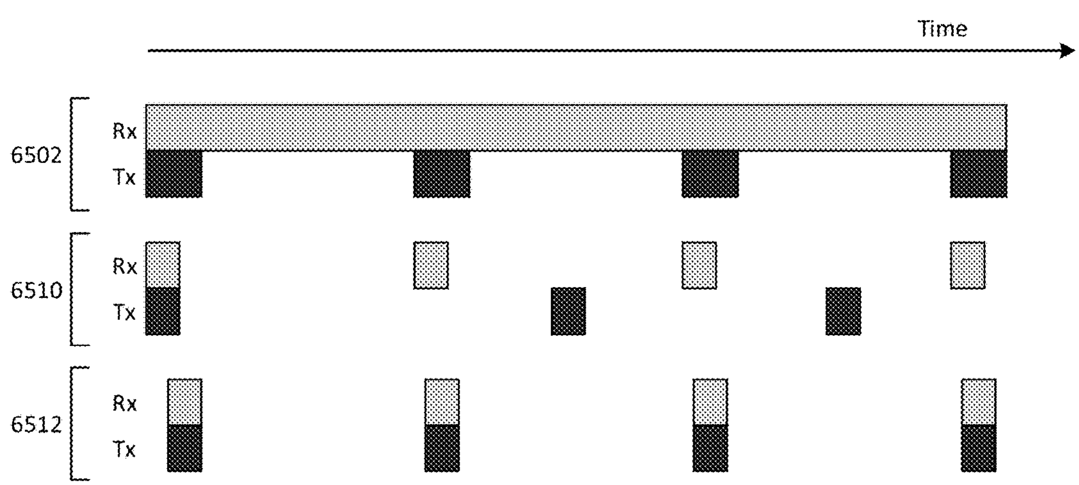

Scheduler module 6604 may be able to select either a DRX/DTX communication schedule or a DTX-only communication schedule for network access node 6502. FIGS. 69A and 69B depict exemplary, non-limiting transmission and reception timing charts for a DRX/DTX communication schedule or a DTX-only communication schedule, respectively, in accordance with some aspects. As shown in FIG. 69A, scheduler module 6604 may select a DRX/DTX schedule that utilizes both DRX and DTX. In contrast to the continuous communication schedule of FIG. 67, the DRX/DTX schedule may only have periodic transmit and receive periods instead of continuous transmit and receive periods. Scheduler module 6604 may therefore schedule transmission and reception traffic with terminal devices 6510 and 6512 within the transmit and receive periods of the DRX/DTX schedule, where the periodicity and duration of the transmit and receive periods may be configurable. Control module 2610 may therefore control transmission and reception components of network access node 6502 (e.g., antenna system 2602, radio module 2604, physical layer module 2608, etc.) to power down during inactive periods where no transmission or reception is occurring, thus enabling network access node 6502 to reduce power consumption. As terminal devices 6510 and 6512 may be predictable terminal devices and thus only require sparse and infrequent transmission and reception, network access node 6502 may be able to support terminal devices 6510 and 6512 with the DRX/DTX schedule of FIG. 69A while reducing power consumption and consequently reducing operating costs of network access node 6502.

Alternative to the DRX/DTX schedule of FIG. 69A, in some aspects network access node 6502 may utilize a DTX-only schedule, e.g., a communication schedule with DTX but continuous reception. Such DTX-only schedules may allow network access node 6502 to instantly receive data from certain terminal devices. Accordingly, if terminal device 6512 is, e.g., a burglar or fire alarm, terminal device 6512 may be able to instantly transmit alarm data to network access node 6502 (instead of having to wait until the next receive period of network access node 6502). Network access node 6502 may then be able to provide such alarm data to the proper destination, e.g., the police or fire authorities, an earlier time than if network access node 6502 was utilizing a DRX schedule. Accordingly, as shown in FIG. 69B, in some aspects network access node 6502 may only transmit data during transmit periods but may provide constant reception. Terminal devices 6510 and 6512 may therefore restrict reception to the periodic transmit periods of network access node 6502 but be able to transmit data to network access node 6502 at any point during the continuous reception period of network access node 6502. As transmission by network access node 6502 may be predictable to the transmit periods, network access node 6502 may conserve power by deactivating transmission components (e.g., antenna system 2602, radio module 2604, physical layer module 2608, etc.) during other time periods. Although the DTX-only schedule may have higher power consumption than the DRX/DTX schedule, network access node 6502 may still consume less power with DTX-only schedules than with continuous communication schedules.

In some aspects, detection module 6602 may recurrently monitor the list of terminal devices served by network access node 6502 to react to changes in the types of terminal devices served by network access node 6502. Specifically, detection module 6602 may identify when unpredictable terminal devices enter and exit the service of network access node 6502. For example, if terminal device 1502 moves from its position in FIG. 68 to within coverage area 6508 while scheduler module 6604 is utilizing a discontinuous communication schedule, detection module 6602 may need to identify that an unpredictable terminal device is currently being served by network access node 6502 and report such information to scheduler module 6604. Scheduler module 6604 may then switch from a discontinuous communication schedule to a continuous communication schedule in response. In an alternative example, terminal device 1502 may be located within coverage area 6508 as shown in FIG. 68 but may initially be in radio idle state. Accordingly, as terminal device 1502 is in a radio idle state, network access node 6502 may not have direct knowledge of terminal device 1502 and detection module 6602 may not consider terminal device 1502 in the list of served terminal devices. However, terminal device 1502 may enter a radio connected state (e.g., by performing random access procedures with network access node 6502 and establishing a radio access connection with network access node 6502) and thus may begin being served by network access node 6502. Detection module 6602 may thus detect that an unpredictable terminal device is being served by network access node 6502 and may notify scheduler module 6604. Scheduler module 6604 may thus switch from a discontinuous communication schedule to a continuous communication schedule to support the heavy data traffic requirements of terminal device 1502. If terminal device 1502 then moves outside of coverage area 6508 and/or enters a radio idle state, detection module 6602 may notify scheduler module 6604 which may subsequently switch to a discontinuous communication state (assuming no other unpredictable terminal devices have begun being served by network access node 6502). Detection module 6602 and scheduler module 6604 may thus 'toggle' the communication schedule of network access node 6502 between discontinuous and continuous communication schedules based on whether any unpredictable terminal devices are being served by network access node 6502.

In various aspects, scheduler module 6604 may be also able to configure the DRX/DTX and DTX-only schedules according to different factors. For example, scheduler module 6604 may utilize discontinuous schedules with longer and/or more frequency transmit and/or receive periods when network access node 6502 is serving a large number of predictable terminal devices and/or predictable terminal devices with higher data traffic requirements (e.g., that need to send or receive a large amount for a predictable terminal device, that need to have frequent radio access (e.g., for an alarm system), etc.). Scheduler module 6604 may therefore be configured to select and adjust discontinuous communication schedules based on the changing set of terminal devices served by network access node 6502.

Accordingly, in various aspects scheduler module 6604 may consider any one or more of the number of terminal devices connected to it, the activity patterns of the terminal devices connected to it, the device types (predictable vs. unpredictable) of the terminal devices connected to it, a time of day (e.g., nighttime when less data traffic is expected vs. daytime when more data traffic is expected), a day of the week (e.g., weekends or holidays when more traffic is expected), a location (e.g., a workplace will have less traffic during the weekend or holiday than a home), etc.

In some aspects, scheduler module 6604 may instruct terminal devices to reselect to a certain RAT and shut off another RAT. For example, if network access node 6502 supports multiple RATs and all of the terminal devices support a particular RAT, scheduler module 6604 may instruct all the terminal devices to switch the supported RAT and subsequently switch off the other RATs to conserve power and reduced interference. Scheduler module 6604 may also schedule its communication schedules with alternating transmission times relative to neighboring network access nodes to reduce interference.

In some aspects, detection module 6602 may treat unpredictable terminal devices as 'temporarily predictable' terminal devices. For example, terminal device 1502 may be in a radio connected state and positioned in coverage area 6508 as shown in FIG. 65. However, terminal device 1502 may not currently be in use, e.g., may be motionless, not being handled by a user, have its screen turned off, not receiving input from a user, etc. Accordingly, even though terminal device 1502 is in a radio connected state, terminal device 1502 may not imminently require a radio access connection that supports heavy data traffic. Terminal device 1502 may thus provide network access node 6502 with an indication that terminal device 1502 is temporarily predictable, such as by transmitting a control message to network access node 6502 that specifies that terminal device 1502 is temporarily predictable. Terminal device 1502 may be configured to transmit such control messages based on a timer, such as to transmit a temporarily predictable control message after terminal device 1502 has been unused (e.g., screen off, motionless, no user input, etc.) for a certain amount of time (e.g., 10 seconds, 1 minutes, etc.). Network access node 6502 may receive the temporarily predictable control message, which may indicate to detection module 6602 that terminal device 1502 may be temporarily predictable and thus may be considered as a predictable terminal device. Accordingly, assuming that network access node 6502 is not serving any other unpredictable terminal devices, detection module 6602 may indicate to scheduler module 6604 that network access node 6502 is not currently serving any unpredictable terminal devices. Scheduler module 6604 may therefore switch to a discontinuous communication schedule. Alternatively, terminal device 1502 may be configured to transmit an 'in-use' control messages every time terminal device 1502 is being used (e.g., screen on, motion detected, user input, etc.) and to recurrently transmit 'in-use' control messages during the duration that terminal device 1502 is being used (and not transmit any 'in-use' control messages when terminal device 1502 is not in use). Detection module 6602 may then be configured to determine the time elapsed since the last message and may consider terminal device 1502 as temporarily predictable after a predefined duration of time has elapsed.

In some aspects, there may be other scenarios in which detection module 6602 may consider unpredictable terminal devices as being temporarily predictable. For example, terminal device 1502 may have a user setting in which a user setting may activate a 'temporarily predictable setting' of terminal device 1502. Terminal device 1502 may report activation and de-activation of the temporarily predictable setting to network access node 6502, thus enabling detection module 6602 to consider terminal device 1502 as unpredictable or temporarily predictable based on whether the setting is respectively de-activated or activated. Detection module 6602 may additionally utilize 'time of day' to classify unpredictable terminal devices as temporarily predictable. For example, detection module 6602 may consider unpredictable terminal devices as temporarily predictable during nighttime or sleeping hours and as unpredictable during daytime hours. Additionally or alternatively, detection module 6602 may monitor data traffic for unpredictable terminal devices to determine whether discontinuous communication schedules can be used. For example, terminal device 1502 may be in a radio connected state with network access node 6502 but may only have light or sporadic data traffic usage. Detection module 6602 may identify that terminal device 1502 does not require heavy data traffic support (e.g., by evaluating average data traffic of terminal device 1502 over a period of time) and may consider terminal device 1502 as being temporarily predictable. Scheduler module 6604 may then be able to utilize a discontinuous communication schedule. Additionally or alternatively, terminal device 1502 may provide network access node 6502 with control information detailing conditions when terminal device 1502 may be considered temporarily predictable and/or discontinuous scheduling parameters. For example, terminal device 1502 may specify inactivity time periods and/or conditions (e.g., time of day, specific types of inactivity, inactivity duration, etc.) that detection module 6602 may utilize to classify terminal device 1502 as being temporarily predictable. Terminal device 1502 may also specify maximum DRX or DTX length, frequency, and/or duration, which scheduler module 6604 may utilize to select discontinuous communication schedules when terminal device 1502 is temporarily predictable.

Although discussed above in the exemplary setting of a small cell, various aspects of can use any network access node for the implementation. For example, network access node 6504 may be e.g., a macro cell configured with detection module 6602 and scheduler module 6604 as described above. Network access node 6504 may therefore monitor the types of terminal devices served by network access node 6504, e.g., unpredictable vs. predictable, and switch between continuous and discontinuous communication schedules based on which types of terminal devices are currently being served by network access node 6504. The above-noted aspect is exemplary rand may be implemented in any type of network access node.

Network access node 6502 may therefore selectively activate discontinuous communication schedules (e.g., DRX/DTX or DTX-only) based on the types of terminal devices currently being served by network access node 6502. Certain terminal devices may have heavy data traffic requirements and may be considered 'unpredictable' terminal devices while other terminal devices may have sporadic or light data traffic requirements and may be considered 'predictable' terminal devices. Network access node 6502 may therefore determine at a first time that network access node 6502 is not serving any unpredictable terminal devices and may utilize a discontinuous communication schedule. Network access node 6502 may determine at a second time that network access node is serving at least one unpredictable terminal device and may utilize continuous communication schedule. Network access node 6502 may therefore switch between continuous and discontinuous communication schedules based on the types of terminal device served by network access node 6502 and the data traffic requirements of the types.

By selectively utilizing discontinuous communication schedule, network access node 6502 may meet the data traffic requirements of the served terminal devices while being able to conserve power. The use of discontinuous communication schedules may also conserve power at the terminal devices served by network access node 6502 as the served terminal devices may be able to deactivate transmission and reception components during inactive periods in the discontinuous communication schedule. Additionally, interference to other neighboring network access nodes such as network access nodes 6504 and 6506 may be reduced as a result of less frequent transmissions by network access node 6502.

Figure 70:
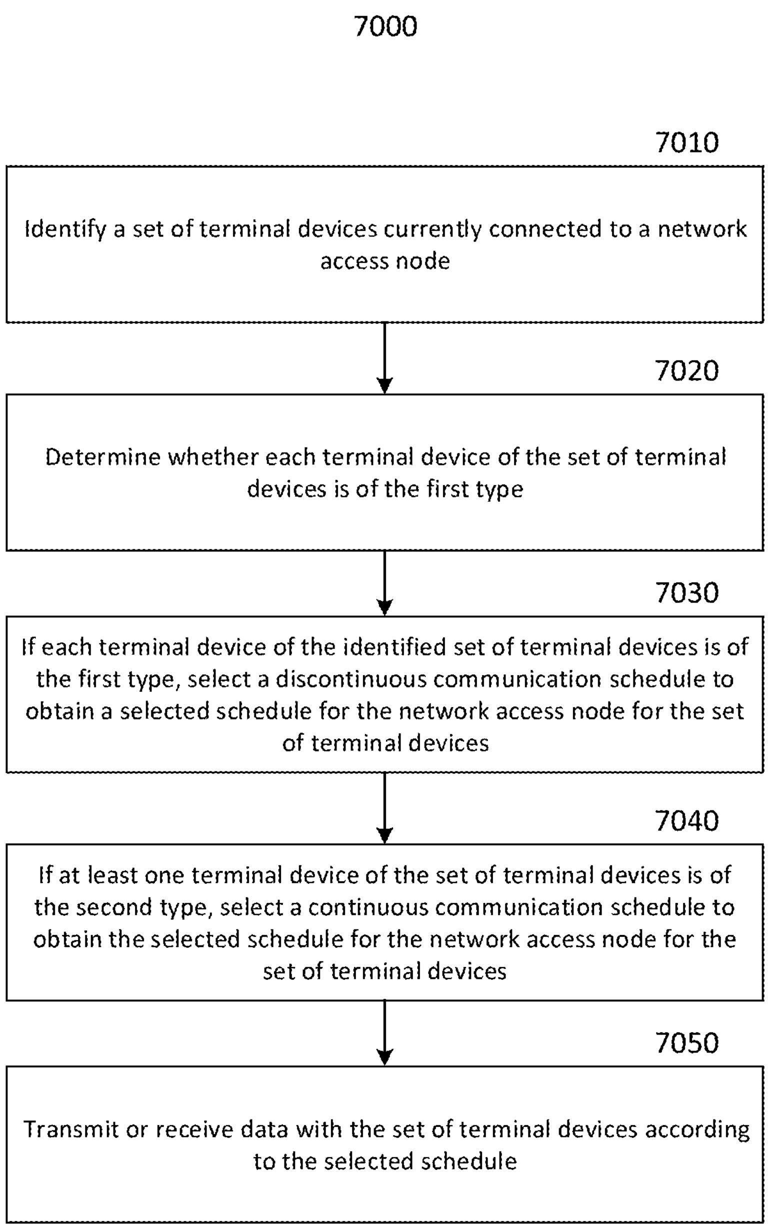
FIG. 70 shows a first exemplary method of performing radio communications in accordance with some aspects.

FIG. 70 shows method 7000 of performing radio communications according to some aspects of the disclosure in a communications system comprising at least one terminal device of a first type and at least one terminal device of a second type different from the first type. As shown in FIG. 70, method 7000 includes identifying a set of terminal devices currently connected to a network access node (7010). A determination is made regarding whether each terminal device of the set of terminal devices is of the first type (7020). If each terminal device of the identified set of terminal devices is of the first type, a discontinuous communication schedule is selected to obtain a selected schedule for the network access node for the set of terminal devices (7030). If at least one terminal device of the set of terminal devices is of the second type, a continuous communication schedule is selected to obtain the selected schedule for the network access node for the set of terminal devices (7040). Data is transmitted or received with the set of terminal devices according to the selected schedule (7050).

Figure 71:
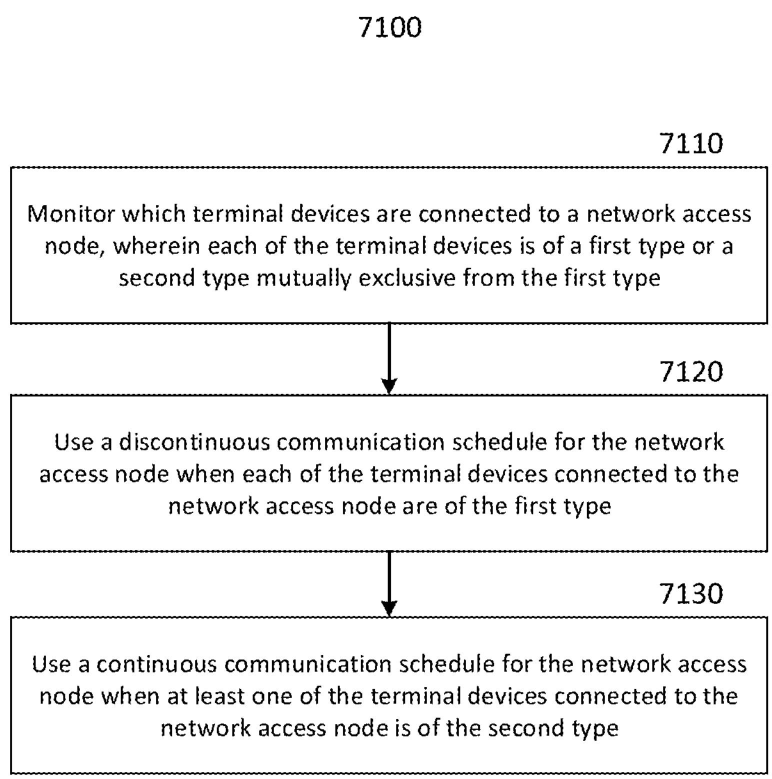
FIG. 71 shows a second exemplary method of performing radio communications in accordance with some aspects.

FIG. 71 shows method 7100 of performing radio communications according to some aspects of the disclosure. As shown in FIG. 71, method 7100 includes monitoring which terminal devices are connected to a network access node, wherein each of the terminal devices is of a first type or a second type, where the first and second types may be mutually exclusive (7110). A discontinuous communication schedule is used for the network access node when each of the terminal devices connected to the network access node are of the first type (7120). A continuous communication schedule for the network access node is used when at least one of the terminal devices connected to the network access node is of the second type (7130).

2.9 Power-Efficiency #9

According to a further aspect of this disclosure, a network processing component may assume 'keepalive' responsibilities (e.g., connection continuity services) for a terminal device, thus enabling the terminal device to maintain a data connection without having to repeatedly transmit keepalive messages (e.g., connection continuity messages). The terminal device may therefore be able to enter a low-power state without having to repeatedly wake up and consequently may reduce power consumption. These aspects may be used with common channel aspects, e.g., a common channel where a network processing component assumes 'keepalive' responsibilities.

Figure 72:
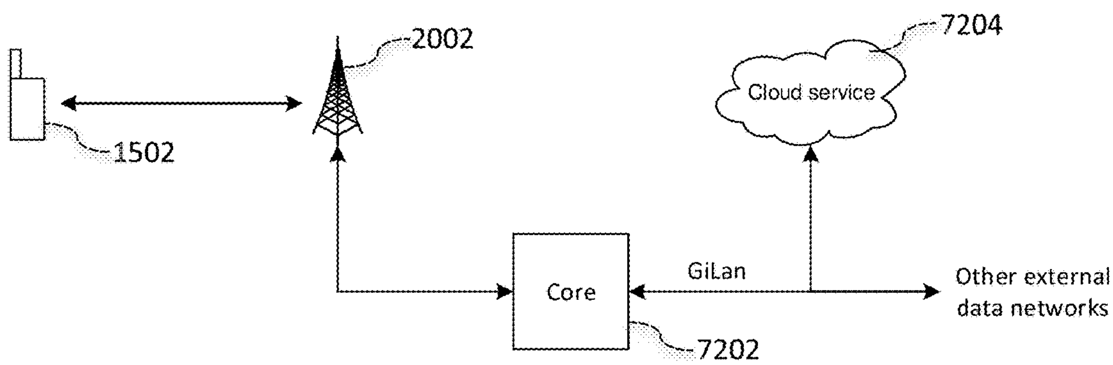
FIG. 72 shows an exemplary network scenario in accordance with some aspects using a network access node.

FIG. 72 shows an exemplary network scenario including some aspects of terminal device 1502 that may have a radio access connection with network access node 2002. Network access node 2002 may be e.g., a cellular base station or a short-range network access node such as a Wi-Fi access point. Without loss of generality, in a cellular radio access setting, network access node 2002 may interface with core network 7202, which may provide an external outlet to cloud service 7204 and other external data networks. Alternatively, in a short-range radio access setting, network access node 2002 may interface with cloud service 7204 and the other external data networks via an internet connection.

As previously described, network access node 2002 may provide a radio access network which terminal device 1502 can utilize to exchange data with network access node 2002, core network 7202, cloud service 7204, and various other external data networks. Terminal device 1502 may thus have a logical software-level connection with each of network access node 2002, core network 7202 (including various core network nodes), cloud service 7204, and various other external data networks that utilizes both the radio access network provided by network access node 2002 and other wired and/or wireless connections to support the exchange of data.

Terminal device 1502 may have a connection with cloud service 7204 to exchange data. For example, an application program of terminal device 1502 (e.g., a mobile application program executed at an application processor of data source 1612/data sink 1616 of terminal device 1502) may exchange data with cloud service 7204 (e.g., with a counterpart application program executed at cloud service 7204), which may be a server that provides data to the application program. The application program of terminal device 1502 may thus exchange data with cloud service 7204 as an application-layer software connection that relies on lower layers including the transport layer and radio access layers (cellular protocol stack and physical layer).

The application program of terminal device 1502 and the counterpart application program of cloud service 7204, which may communicate at the application layer, may rely on lower layers to handle data transfer between the various intermediary nodes (network access node 2002 and the core network nodes of core network 7202). These lower layers may include the transport layer and radio access layers. Accordingly, the application program and counterpart application program may provide data to the transport layer which may package and provide the data to the lower layers for transport through the network. Without loss of generality, in an exemplary case the application program of terminal device 1502 may rely on a TCP connection at the transport layer to handle data transfer with cloud service 7204.

Such TCP connections may be end-to-end connections on the transport layer (e.g., of the Open Systems Interconnection (OSI) model). In other words, the TCP connection may span from terminal device 1502 and cloud service 7204 (in contrast to other intermediary connections, such as from terminal device 1502 to network access node 2002 that only encompass part of the overall data path). While by definition TCP connections may not have a 'timeout', e.g., a time limit at which point an inactive connection will be terminated, there may be several different scenarios in which the TCP connection between terminal device 1502 and cloud service 7204 may be terminated. For example, security gateways such as firewalls may monitor TCP data (data at the transport layer) and may have TCP connection timeout policies in place that 'close' inactive TCP connections after a certain duration of inactivity, e.g., after no data has been transmitted for 5 minutes, 10 minutes, 20 minutes, etc. There may be various different locations where such security gateways may be placed. For example, in a case where network access node 2002 is a WLAN access point, a router placed between network access node and the internet may have a security gateway that monitors TCP connections and is capable of closing TCP connections due to timeout. There may be various other locations where security gateways such as firewalls are placed between network access node 2002 and cloud service 7204 that may act as potential locations where the TCP connection may be closed. In a case where network access node 2002 is a cellular base station, there may be a security gateway placed between network access node 2002 and core network 7202. Additionally or alternatively, there may be a security gateway placed between core network 7202 and the external data networks (including cloud service 7204), such as at the GiLAN interface between a PGW of core network 7202 and an internet router leading to cloud service 7204. There may additionally be a security gateway placed at cloud service 7204. Security gateways may therefore be placed at any number of other points between terminal device 1502 and cloud service 7204 and may selectively terminate inactive TCP connections.

Cloud service 7204 may additionally be configured to close inactive TCP connections. For example, if cloud service 7204 detects that the TCP connection with terminal device 1502 has been inactive for a certain period of time, cloud service 7204 may close the TCP connection. In any such scenario where the TCP connection is closed, terminal device 1502 and cloud service 7204 may need to re-establish the TCP connection in order to continue exchanging data. Such may be expensive in terms of latency, as establishment of a new TCP connection may be a time-consuming procedure. Additionally, terminal device 1502 and cloud service 7204 may not be able to exchange any data until the TCP connection is re-established. Such TCP connection timeout may be inconvenient for a user of terminal device 1502, as the user will not be able to transmit or receive any data for the application program.

In an exemplary use case, the application program of terminal device 1502 may receive 'push' notifications from cloud service 7204. Push notifications may be utilized to provide a brief notification message (e.g., in text form, a visual alert, etc.) related to the application program and may 'pop up' on a display of terminal device 1502 to be presented to a user. Cloud service 7204 may thus transmit push notifications to the mobile application of terminal device 1502 via the data connection between terminal device 1502 and cloud service 7204. The push notifications may therefore pass through core network 7202 and be transmitted by network access node 2002 over the radio access network to terminal device 1502, which may receive the push notifications and provide the push notifications to the application program.

TCP connection timeout may thus prevent terminal device 1502 from receiving these push notifications (in addition to any other data provided by cloud service 7204). A user of terminal device 1502 may thus not be able to receive such push notifications until the TCP connection is re-established, which may only occur after a large delay.

In addition to TCP connection timeouts at the transport layer by security gateways, network access node 2002 may also conventionally be configured to close radio bearer connections at radio access layers (for example, at the control plane, e.g., at the RRC of Layer 3 Accordingly, if the radio access bearer spanning between terminal device 1502 and core network 7202 is inactive for a certain period of time, network access node 2002 may be configured to close the radio access bearer. Radio access bearer termination may also require re-establishment of the radio access bearer before network access node 2002 can provide any data to terminal device 1502 on the closed radio access bearer. As a result, if the radio access bearer carrying the data between terminal device 1502 and cloud service 7204 is closed, there may be an excessive delay until the radio access bearer is re-established. Such radio access bearer closures may therefore also prevent terminal device 1502 from receiving data (including push notifications) from cloud service 7204.

The data connection between terminal device 1502 and cloud service 7204 may therefore be susceptible to connection timeout at the transport layer and radio access layers. The application program of terminal device 1502 may be configured to send 'heartbeats' to cloud service 7204, which may be small network packets that terminal device 1502 may transmit to cloud service 7204 to notify cloud service

7204 that the TCP connection remains alive (and prevent cloud service 7204 from closing the TCP connection), which may consequently avoid TCP and radio access bearer connection timeouts. If the connection to cloud service 7204 is not alive, terminal device 1502 may re-establish the connection between the application program and cloud service 7204, thus enabling the transmission of all new and deferred push notifications. Although described above in the setting of push notifications, TCP connection timeouts may be relevant for any type of data transmitted over such connections.

However, these heartbeats may be transmitted too infrequently to be effective in preventing termination of TCP and radio access bearer connections at network access nodes and/or core network interfaces. Furthermore, even if the heartbeat periodicity was reduced to within typical TCP timeout levels (e.g., 5 minutes), this would impose large battery penalties on terminal devices that would need to wake up at least every 5 minutes to send heartbeats for every open connection.

Accordingly, in some aspects the radio access network may be configured, either at a network access node or at an 'edge' computing device, to assume keepalive responsibilities (e.g., connection continuity services) for terminal devices to help ensure that data connections are maintained without being closed. Both TCP and radio access bearer connection timeouts may be addressed, thus allowing terminal devices to maintain data connections without timeout and without having to continually wake up to send heartbeats. As terminal devices may remain in a low-power state while the network access node or edge computing device handles connection continuity services, terminal devices may avoid connection timeouts (thus improving latency) while reducing power consumption.

Cooperation from the radio access network may be relied on to enable such power savings at terminal devices. In a first exemplary option, a network access node may be configured to assume connection continuity services and accordingly may transmit heartbeats to a destination external data network (e.g., cloud service 7204) on behalf of a terminal device to keep data connections for the terminal device alive. In a second exemplary option, an edge computing device such as a Mobile Edge Computing (MEC, also known as Multi-Access Edge Computing) server positioned at or near the network access node may assume connection continuity services by transmitting heartbeats to a destination external data network on behalf of a terminal device in addition to interfacing with the network access node to prevent connection timeouts by both the network access node and security gateways. Both options may therefore help prevent connection timeouts without requiring the terminal device to send heartbeats.

Figure 73:
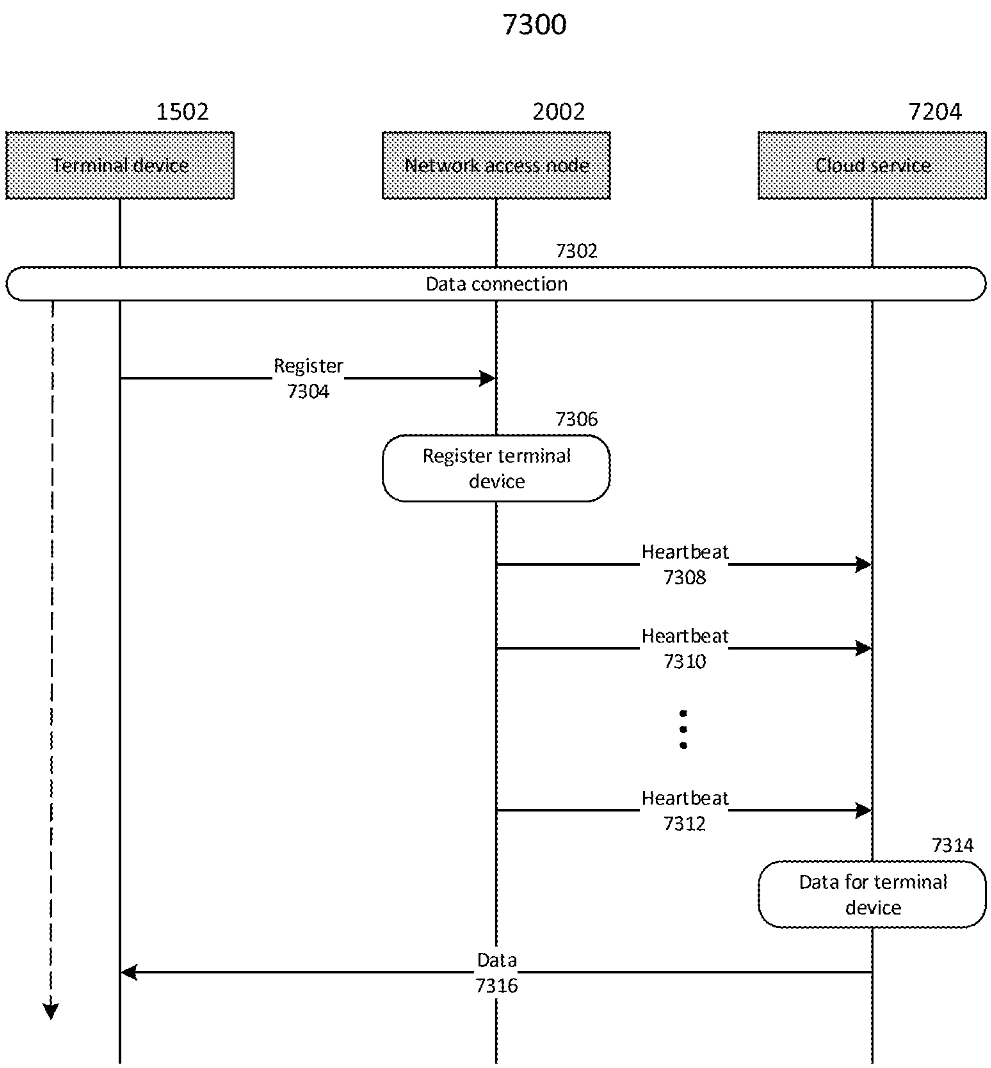
FIG. 73 shows an exemplary message sequence chart illustrating connection continuity services using a network access node in accordance with some aspects.

FIG. 73 shows message sequence chart 7300 illustrating the first exemplary option in which network access node 2002 may assume connection continuity services for terminal device 1502 to prevent connection timeouts according to some aspects. As shown in FIG. 73, terminal device 1502 may have a data connection in 7302 with cloud service 7204 via network access node 2002 (and core network 7202, not shown in FIG. 73), which may be a software-level connection between an application program of terminal device 1502 and cloud service 7204 at the application layer that relies on lower layers including the transport layer (e.g., an end-to-end connection) and radio access layers. It is possible that the data connection may be vulnerable to connection timeouts, such as at a network access node and/or at a security gateway which may close inactive data connections (e.g., TCP connections and/or radio access bearers) after a timeout period has expired in which no data transfer occurred. In order to help avoid such connection timeout, in accordance with some aspects, terminal device 1502 may register with network access node 2002 in 7304 to request that network access node 2002 assume connection continuity services for terminal device 1502. For example, controller 1610 of terminal device 1502 may transmit control signaling to control module 2610 of network access node 2002 that requests connection continuity services from network access node 2002. Control module 2610 may accept the keepalive request and register terminal device 1502 in 7306. Accordingly, network access node 2002 may not locally execute any connection timeouts of data connections for terminal device 1502, such as closing a radio access bearer, regardless of inactivity on the data connections. To conserve power, terminal device 1502 may also enter a low-power or sleep state following registration in 7304 (which may depend on activity on other data connections).

Additionally, to help avoid timeout connections at other network nodes such as security gateways between network access node 2002 and cloud service 7204, network access node 2002 (e.g., control module 2610) may transmit heartbeats to cloud service 7204 at 7308. To help ensure that other security gateways identify such heartbeats as activity on the data connection between terminal device 1502 and cloud service 7204, network access node 2002 (e.g., control module 2610) may transmit the heartbeat over the same data connection. Accordingly, any security gateways monitoring the data connection for inactivity and subsequent timeout may interpret the heartbeat as activity on the data connection and as a result may not close the data connection. Network access node 2002 (e.g., control module 2610 or another dedicated higher layer processor) may also be configured with TCP protocols in order to generate heartbeats to transmit on the data connection to cloud service 7204.

As security gateways may close data connections based on inactivity timers, network access node 2002 may continually transmit heartbeats at 7310, 7312, etc., where the periodicity of the heartbeat transmissions at 7308-7312 may be less than an inactivity timer, for example, 5 minutes. The repeated heartbeat transmissions at 7308-7312 may therefore keep the data connection active and avoid connection timeout at security gateways between network access node 2002 and cloud service 7204. In some aspects, cloud service 7204 may also transmit keepalive messages, which network access node 2002 may respond to in order to maintain the data connection. In a non-limiting example, a cloud service such as a cloud-side initiated software update to terminal device 1502 may wish to maintain the data connection during the update. The cloud service may therefore transmit keepalive messages to ensure that the data connection remains active, which network access node 2002 may decode and respond to.

As the data connection may remain active, cloud service 7204 may identify data addressed to terminal device 1502 in 7314 and transmit the data to terminal device 1502 in 7316. Accordingly, aspects of the option disclosed in FIG. 73 may enable terminal device 1502 to maintain active data connections with an external data connection without having to continually transmit heartbeats by assigning connection continuity services to network access node 2002.

Without loss of generality, in some aspects network access node 2002 may utilize a special radio connection state to register terminal device 1502 in 7306. For example, LTE specifies two radio connectivity states in RRC idle (RRC_IDLE) and RRC connected (RRC_CONNECTED)

that define behavior of the radio access connection between terminal device 1502 and network access node 2002. Other radio access technologies may similarly define multiple radio connectivity states. Network access node 2002 (e.g., control module 2610) may therefore in some aspects utilize a special radio connectivity state to register terminal devices for connection continuity (keepalive) purposes. Accordingly, upon receipt of a registration request from terminal device 1502 in 7304, network access node 2002 may register terminal device 1502 with the special radio connectivity state, which may prompt network access node 2002 to assume connection continuity services for terminal device 1502 as described regarding message sequence chart 7300. In some aspects, the special radio connectivity state may also prevent network access node 2002 from closing radio access bearers for terminal devices registered in the special radio connectivity state. In some aspects, the special radio connectivity state may use a longer connection timeout, which may be longer than the standard timer that is used for general purposes and may result in network access node 2002 waiting for a longer period of time before closing radio access bearers for terminal devices registered in the special radio connectivity state. In some aspects, network access node 2002 may never close radio access bearers for a terminal device that is registered in the special radio connectivity state until the terminal device de-registers from the special radio connectivity state.

Figure 74:
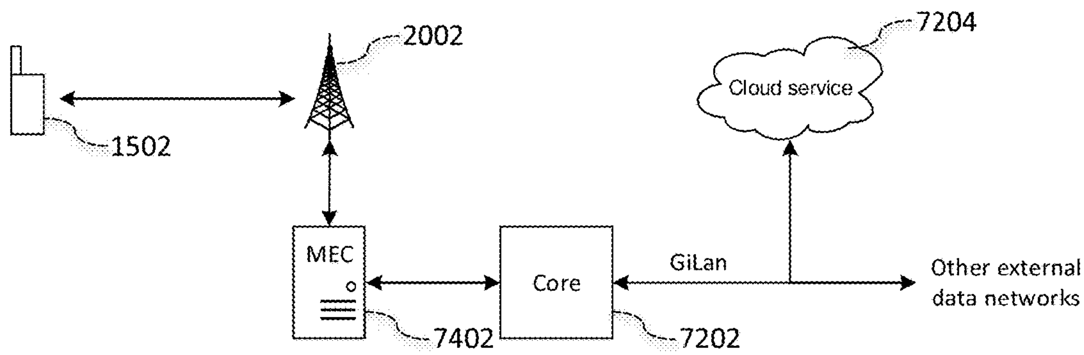
FIG. 74 shows an exemplary network scenario in accordance with some aspects using an edge computing server.

In the second exemplary option, an edge computing device such as a MEC server may assume connection continuity services for terminal device 1502 to help ensure that a data connection between terminal device 1502 and cloud service 7204 is not terminated due to inactivity. FIG. 74 shows a network configuration including edge computing server 7402 placed between network access node 2002 and core network 7202 according to some aspects. edge computing server 7402 may be an edge computing device such as a MEC server placed at or near network access node 2002. Such edge computing devices may perform various cloud processing and data provision to functions at a location at the 'edge' of the cellular network close to the user. Accordingly, edge computing devices may have lower latency in exchanging data with terminal devices and may avoid core network congestion by eliminating the need for data to traverse through the core network. Edge computing server 7402 can be physically placed at network access node 2002 (e.g., at a radio access tower location) or at another location proximate to network access node 2002. Edge computing server 7402 may be a processor configured to execute program code to perform various processing and data provision operations, where the program code may define the functionality of edge computing server 7402 detailed herein as a set of arithmetic, control, and I/O instructions. Edge computing server 7402 may be configured to retrieve the program code from a non-transitory computer readable medium configured to store the program code.

In addition to conventional edge computing functions, edge computing server 7402 may be configured to assume connection continuity services for terminal devices. Accordingly, edge computing server 7402 may transmit heartbeats on a data connection between terminal device 1502 and cloud service 7204 to help prevent the data connection from being closed, e.g., TCP connection timeout at a security gateway, due to inactivity. Additionally, as edge computing server 7402 may be separate from network access node 2002, edge computing server 7402 may also need to interface with network access node 2002 to help prevent network access node 2002 from closing the data connection, e.g., by closing a radio access bearer.

Figure 75:
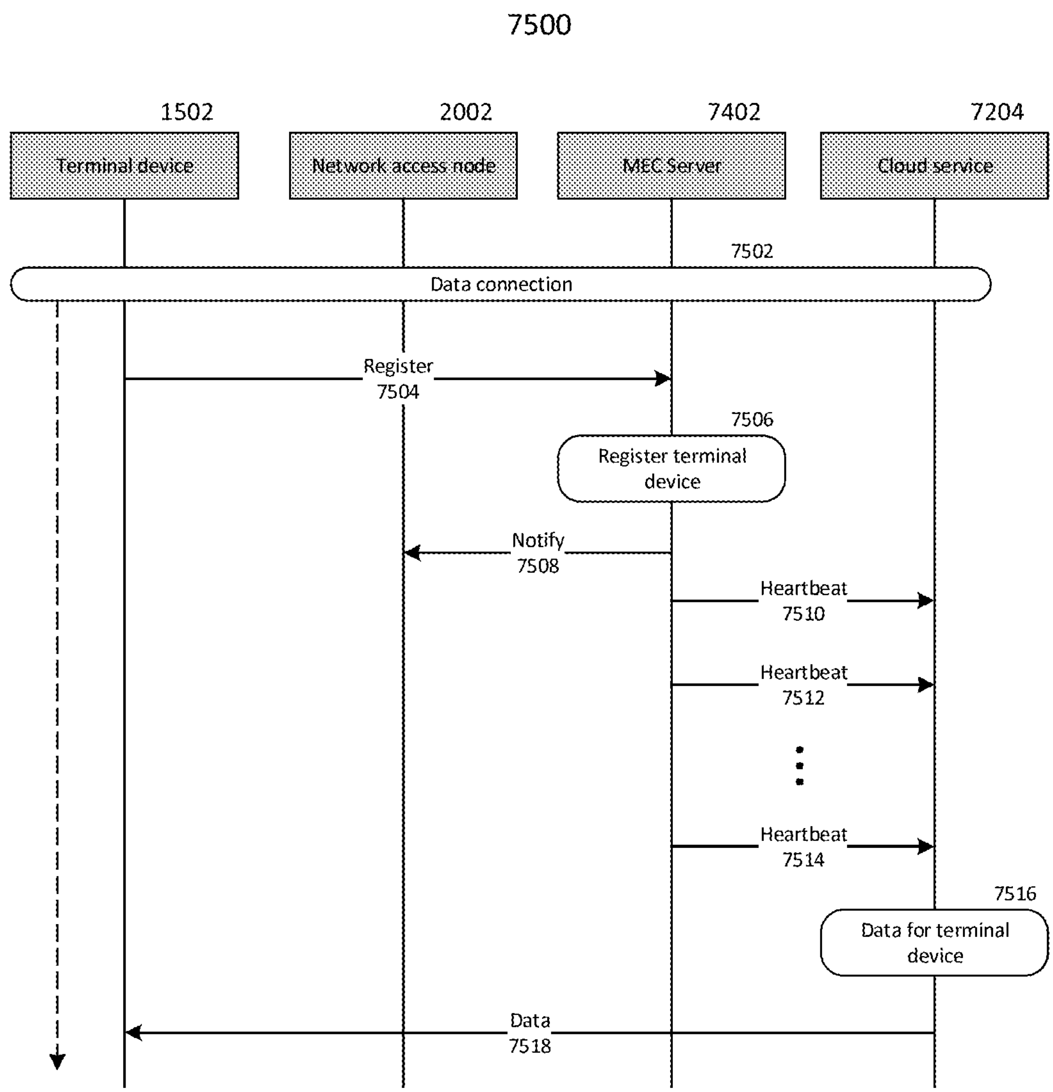
FIG. 75 shows an exemplary message sequence chart illustrating connection continuity services using an edge computing server in accordance with some aspects.

FIG. 75 shows message sequence chart 7500 illustrating the second exemplary option according to some aspects in which edge computing server 7402 may assume connection continuity services for terminal device 1502 to help prevent connection timeouts. As shown in FIG. 75, terminal device 1502 may have a data connection in 7502 with cloud service 7204, which may be a software-level connection between an application program of terminal device 1502 and cloud service 7204. To help prevent connection timeout at the transport and radio access layers, terminal device 1502 may register with edge computing server 7402 in 7504 to request that edge computing server 7402 assume connection continuity services for terminal device 1502, e.g., by controller 1610 transmitting control signaling to edge computing server 7402 that requests connection continuity services from edge computing server 7402. Edge computing server 7402 may accept the keepalive request and register terminal device 1502 in 7506. To conserve power, terminal device 1502 may enter a low-power or sleep state following registration in 7504 (which may depend on activity on other data connections).

To help prevent connection timeouts by network access node 2002 at the radio access layers, edge computing server 7402 may notify network access node 2002 in 7508 that the data connection between terminal device 1502 and cloud service 7204 should be maintained. As edge computing server 7402 has instructed network access node 2002 to maintain the data connection, network access node 2002 may not close the data connection at the radio access layers, in other words, may not close the radio access bearer. Alternative to explicitly instructing network access node 2002 to keep the data connection alive, edge computing server 7402 may send heartbeats on the data connection to terminal device 1502. Accordingly, such heartbeats may pass through network access node 2002 at the radio access layers, which network access node 2002 may interpret as activity on the radio access bearer for the data connection and thus defer closing the radio access bearer. edge computing server 7402 may periodically send heartbeats to help continuously prevent closure of the data connection at the radio access layers by network access node 2002. Terminal device 1502 may alternatively be configured to exchange control signaling with network access node 2002, such as to register terminal device 1502 in a special radio connectivity state for terminal devices that wish to maintain data connections, to inform network access node 2002 that the data connection should not be closed.

As shown in FIG. 75, in some aspects edge computing server 7402 may additionally send heartbeats to cloud service 7204 on the data connection at 7510-7514 to help prevent the data connection from being closed at the transport layer. As previously indicated, security gateways such as firewalls may monitor transport layer data and close TCP connections due to inactivity. As edge computing server 7402 may transmit heartbeats on the data connection, security gateways that are located between edge computing server 7402 and cloud service 7204 may interpret such data traffic as activity on the data connection and keep the data connection open. Edge computing server 7402 may therefore keep the data connection alive on behalf of terminal device 1502 by transmitting heartbeats on the data connection, which may include generating heartbeats at the transport layer and transmitting the heartbeats over the data connection. At 7516, cloud service 7204 may identify data for terminal device 1502 and may transmit the data over the data connection in 7518. As edge computing server 7402 has prevented the data connection from being prematurely closed, cloud service 7204 may transmit the data immediately in 7518 without having to re-establish the data connection.

Accordingly, aspects of the first and second options can enable terminal device 1502 to maintain a data connection (such as a TCP connection relying on radio access bearers at the radio access layers) with cloud service 7204 without connection timeouts (e.g., by a network access node or security gateway) and without having to wake up to transmit heartbeats. Terminal devices may therefore reduce power consumption while preventing connection timeout of data connections. Furthermore, as data connections are maintained instead of being torn down, latency may be reduced by avoiding teardown and re-establishment procedures that would be required when connection timeout occurs. Such may be useful in particular for IoT devices such as an IoT Wi-Fi doorbell and/or IoT Wi-Fi security camera. Such IoT devices may thus improve latency and reduce power consumption as they will have immediately available data connections (and thus be able to quickly provide push notifications to a counterpart user handset) without having to constantly perform keepalive.

Although described above in the exemplary setting of TCP connections and TCP connection timeouts, the disclosed aspects may be employed for any similar type of connection, including 'connectionless' protocols such as User Datagram Protocol (UDP) and Quick DUP Internet Connections (QUIC) which may similarly rely on 'heartbeats' to prevent connection timeout.

Figure 76:
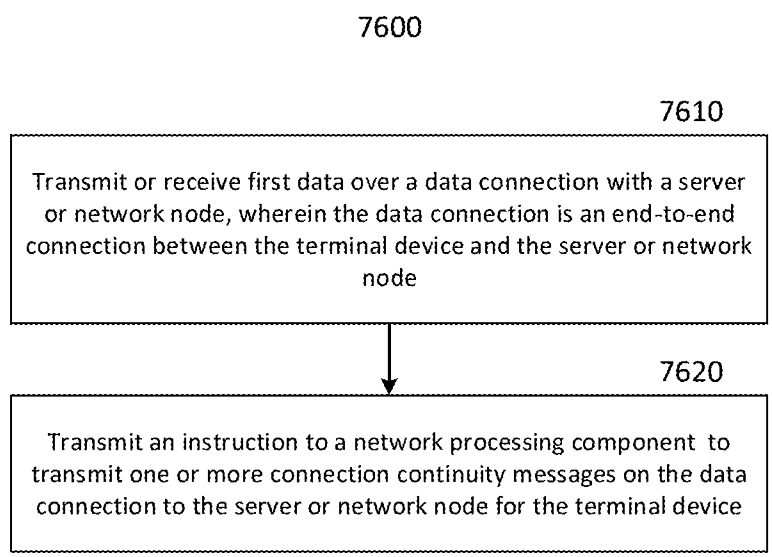
FIG. 76 shows an exemplary method of performing radio communications at a terminal device in accordance with some aspects.

FIG. 76 shows exemplary method 7600 of performing radio communications at a terminal device in accordance with some aspects. As shown in FIG. 76, method 7600 includes transmitting or receiving first data over a data connection with a server or network node, wherein the data connection is an end-to-end connection between the terminal device and the server or network node. An instruction is transmitted to a network processing component to transmit one or more connection continuity messages on the data connection to the server or network node for the terminal device (7620).

Figure 77:
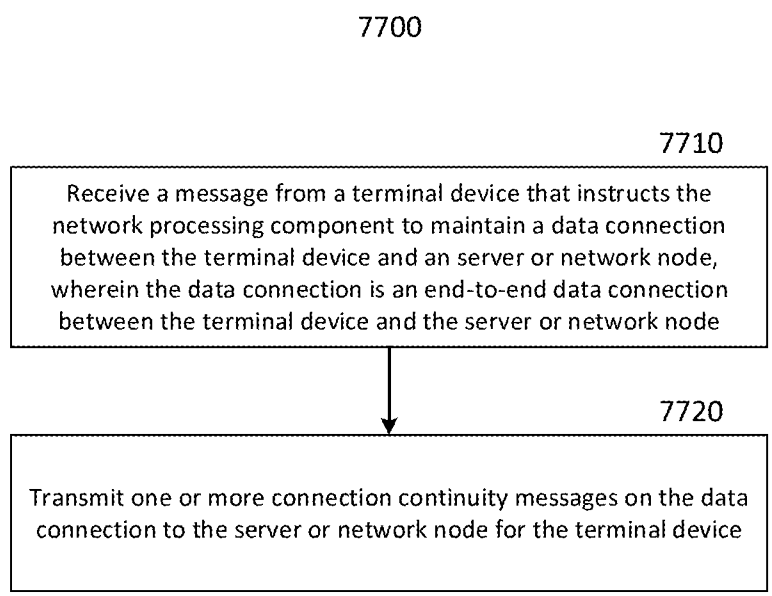
FIG. 77 shows an exemplary method of performing radio communication at a network processing component in accordance with some aspects.

FIG. 77 shows exemplary method 7700 of performing radio communication at a network processing component. As shown in FIG. 77, method 7700 includes receiving a message from a terminal device that instructs the network processing component to maintain a data connection between the terminal device and a server or network node, wherein the data connection is an end-to-end data connection between the terminal device and the server or network node (7710). One or more connection continuity messages on the data connection to the server or network node for the terminal device are transmitted (7720).

2.10 Power-Efficiency #10

In accordance with a further aspect of this disclosure, groups of terminal devices may delegate connection continuity services to an edge computing device, which may then assume connection continuity services for each terminal device based on the individual keepalive requirements for each terminal device. The terminal devices may therefore avoid having to send keepalive messages and may be able to instead enter a low-power state to conserve power. Each group of terminal devices may additionally utilize a 'gateway' technique where one terminal device acts as a gateway device to communicate directly with the radio access network while the remaining terminal devices communicate with a simpler and/or lower-power communication scheme, thus further increasing power savings. These aspects may be used with common channel aspects, e.g., a common channel where an edge computing device assumes connection continuity services for the common channel based on keepalive requirements.

Figure 78:
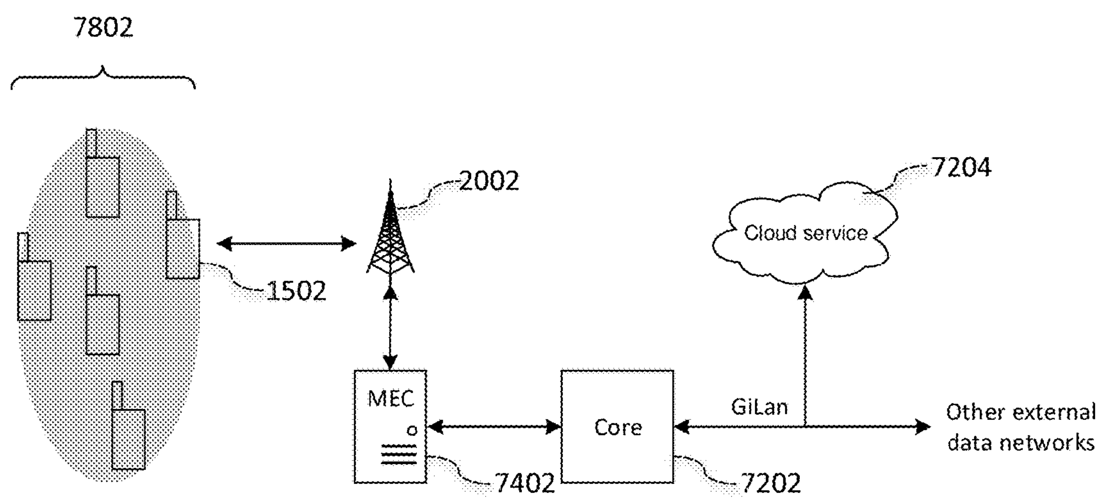
FIG. 78 shows an exemplary network scenario in accordance with some aspects.

FIG. 78 shows an exemplary network scenario including some aspects that terminal device 1502 may have a data connection with cloud service 7204. The data connection may be an application layer connection that relies on the transport and radio access layers to route data between terminal device 1502 and cloud service 7204 via network access node 2002, edge computing server 7402, and core network 7202.

In addition to the radio access connection with network access node 2002, terminal device 1502 may additionally be connected to one or more terminal devices in group network 7802. The terminal devices of group network 7802 may communicate with one another via a simple and/or low-power communication scheme such as bi-directional forwarding network, a multi-hop network, or a mesh network. Accordingly, terminal device 1502 may act as a gateway device to receive data from network access node 2002 to provide to terminal devices of group network 7802 and receive data from terminal devices of group network 7802 to provide to network access node 2002. Instead of each of the terminal devices of group network 7802 maintaining a radio access connection directly with network access node 2002, terminal device 1502 may thus act as an intermediary gateway to provide radio access to the other terminal devices of group network 7802. The other devices of group network 7802 may therefore communicate with one another on the lower-power communication scheme in order to reduce power consumption. The gateway device may in certain cases switch between the various terminal devices of group network 7802.

The terminal devices of group network 7802 may therefore each be able to have a data connection, such as with cloud service 7204, where terminal device 1502 may forward data between the other terminal devices of group network 7802 and network access node 2002. In some aspects, the terminal devices of group network 7802 may be IoT devices with relatively low data requirements. Accordingly, the amount of data that terminal device 1502 may need to forward between the terminal devices of group network 7802 and network access node 2002 may be manageable. Terminal device 1502 may thus receive data from cloud service 7204 for the data connections of each of the terminal devices of group network 7802 and forward the data to the appropriate terminal device of group network 7802. Although descriptions are provided various aspects where each terminal device of group network 7802 is connected to cloud service 7204, various aspects of the disclosure can also apply to cases where different terminal devices of group network 7802 are connected to different external data networks. In such cases, terminal device 1502 may similarly act as a gateway device to relay data between the terminal devices of group network 7802 and network access node 2002, which may route the data of each data connection to the proper external data network.

As the data connections of the terminal devices of group network 7802 may extend between terminal device 1502 and cloud service 7204, the data connections may be susceptible to connection timeouts in a manner similar to that noted above regarding FIGS. 58-63. For example, if there is no activity on a data connection for an extended period of time, a security gateway may close the data connection at the transport layer due to inactivity. Additionally or alternatively, network access node 2002 may terminate the data connection at the radio access layer (e.g., by closing a radio access bearer for the data connection) if the data connection is idle for an extended period of time.

The terminal devices of group network 7802 may each perform keepalive procedures to prevent their respective data connections from being closed. However, such may require that either the terminal devices of group network 7802 each establish a radio access connection to network access node 2002 to transmit heartbeats or that terminal device 1502 forward heartbeats on behalf of the terminal devices of group network 7802, both of which may require power consumption.

In accordance with an aspect some aspects of this disclosure, the terminal devices of group network 7802 may instead register with edge computing server 7402, which may assume connection continuity services for group network 7802 and transmit heartbeats to cloud service 7204 on behalf of the terminal devices of group network 7802. As the terminal devices of group network 7802 may have different keepalive requirements (e.g., connection timeout timers), edge computing server 7402 may manage the different connection continuity services to effectively help prevent closure of any of the data connections. Additionally, in some aspects terminal device 1502 may collaborate with each of the other terminal devices of group network 7802 to provide gateway forwarding services that meet the individual service requirements of each terminal device of group network 7802. Edge computing server 7402 may also in some aspects interface with network access node 2002 to manage the radio access connection between group network 7802 and network access node 2002, such as to ensure that the gateway connection from terminal device 1502 and network access node 2002 has radio resources sufficient to support each of the terminal devices of group network 7802.

Figure 79:
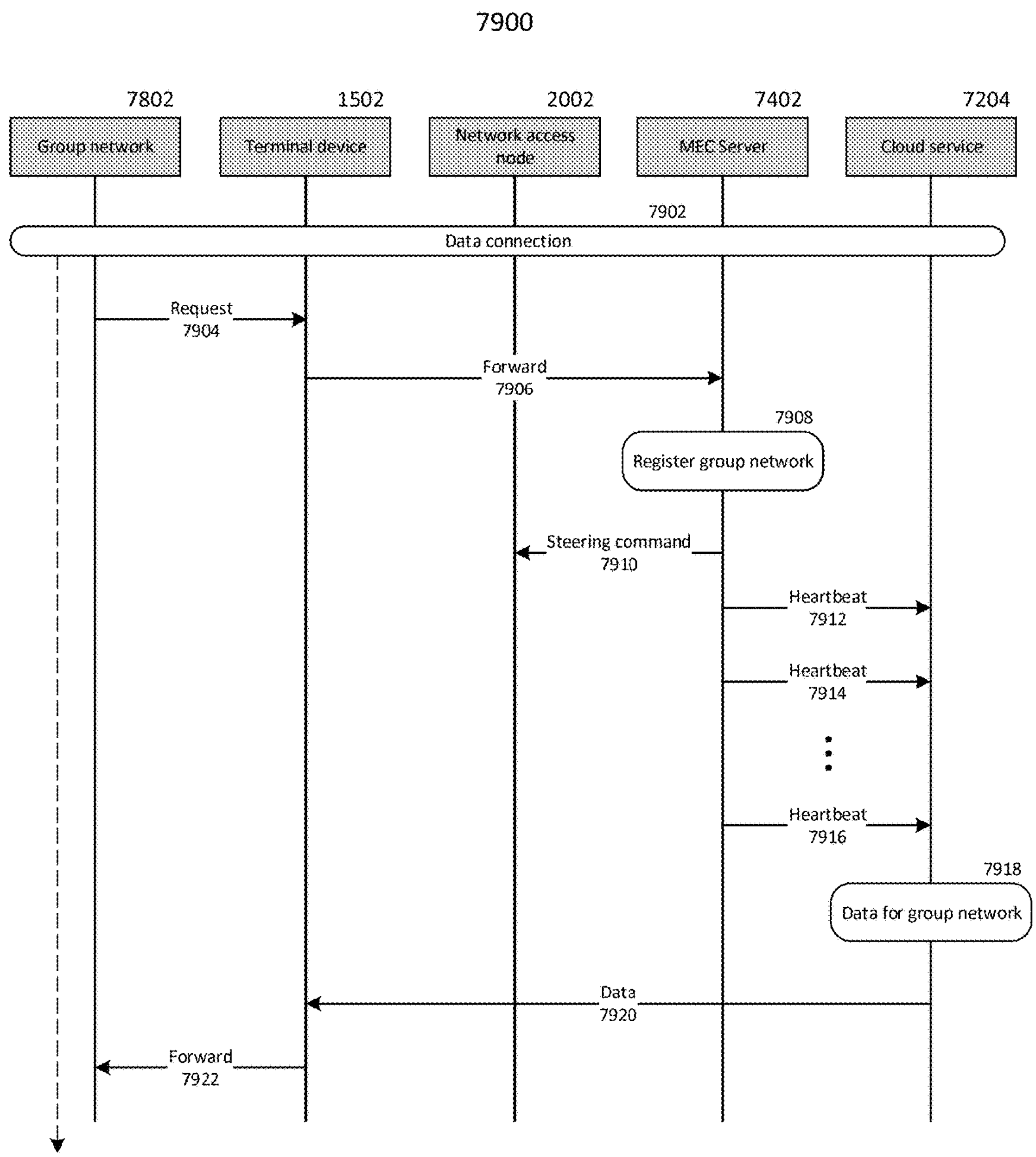
FIG. 79 shows an exemplary message sequence chart illustrating connection continuity services for a group of terminal devices in accordance with some aspects.

FIG. 79 shows an exemplary message sequence chart 7900 according to some aspects. As shown in FIG. 79, a first terminal device of group network 7802 may have a data connection with cloud service 7204 in 7902. Terminal device 1502 may have a direct radio access connection with network access node 2002, where the remaining terminal devices of group network 7802 may indirectly communicate with network access node 2002 by communicating with terminal device 1502 via a local communication scheme (e.g., bidirectional forwarding or a similar scheme for a mesh network) of group network 7802 and relying on terminal device 1502 to forward the data to network access node 2002 over the radio access network. In various other aspects, multiple terminal devices of group network 7802 may communicate with network access node 2002 and provide forwarding for other terminal devices of group network 7802.

The terminal devices of group network 7802 may rely on edge computing server 7402 to perform connection continuity services on their behalf to help prevent connection timeout. Accordingly, the first terminal device of group network 7802 may wish to request for edge computing server 7402 to assume connection continuity services on behalf of the first terminal device. As the first terminal device may need to rely on terminal device 1502 as a gateway to edge computing server 7402 (via network access node 2002), the first terminal device may transmit a request to terminal device 1502 in 7904, where the request includes an instruction that instructs edge computing server 7402 to perform connection continuity services on behalf of the first terminal device to help prevent connection timeout of the data connection. The request may also specify the type of services that the first terminal device is currently using and/or the type of services that the other terminal devices of group network 7802 is using, which may allow edge computing server 7402 to interface with network access node 2002 to manage the radio resources allocated to group network 7802 via the gateway connection between terminal device 1502 and network access node 2002.

Terminal device 1502 may then forward the request to edge computing server 7402 in 7906. Upon receipt of the request in 7908, edge computing server 7402 may register the first terminal device of group network 7802 for connection continuity services. In addition to connection continuity services, edge computing server 7402 may interface with network access node 2002 to perform IoT service steering to ensure that the 'gateway' radio access connection between terminal device 1502 and network access node 2002 has sufficient resources (e.g., time-frequency resources) to support the services (e.g., the respective data connections) of each terminal device of group network 7802. Accordingly, edge computing server 7402 may also in 7908 determine the appropriate amount of resources needed for the services of the terminal devices of group network 7802 (which terminal device 1502 may obtain via the request in 7904 and provide to edge computing server 7402 in the forwarding of 7906) and transmit a steering command to network access node 2002 in 7910 that informs network access node 2002 of the proper resources needed for the gateway radio access connection with terminal device 1502 to support the services of the terminal devices of group network 7802. Network access node 2002 may then perform resource allocations for the radio access connection with terminal device 1502 based on the steering command, which may include adjusting the resources allocated to the gateway radio access connection with terminal device 1502 based on the steering command. edge computing server 7402 may be able to perform such steering on an individual basis (e.g., for each individual terminal device of group network 7802) or a group basis (e.g., for multiple terminal devices of group network 7802). Accordingly, edge computing server 7402 may ensure that the gateway radio access connection between terminal device 1502 and network access node 2002 has radio resources sufficient to support each of the terminal devices of group network 7802.

In some aspects, network access node 2002 may additionally employ a special radio connectivity state for the terminal devices of group network 7802, such as a special RRC state. Such may be particularly applicable in cases where the terminal devices of group network 7802 are IoT devices, which may have substantially different radio access connection requirements from 'smart' terminal devices such as smartphones, tablets, laptops, etc. In some cases where network access node 2002 utilizes such a special radio connectivity state for terminal devices of group network 7802, the terminal devices of group network 7802 may retain radio resources (e.g., still remain connected) but may be able to enter an energy-efficient or low-power state for extended durations of time without network access node 2002 tearing down the radio access connection. In some aspects, network access node 2002 may be configured to register terminal devices in the special radio connectivity state upon receipt of a steering command (e.g., as in 7910) and/or after exchange of control signaling with terminal devices that trigger assignment of the special radio connectivity state.

Edge computing server 7402 may assume connection continuity services to help prevent the data connection with cloud service 7204 from being closed, such as by service gateways that close inactive TCP connections. For example, edge computing server 7402 may repeatedly send heartbeats to cloud service 7204 on the data connection at 7912, 7914, and 7916. As previously described, service gateways placed between edge computing server 7402 and cloud service 7204 (such as at a firewall at the GiLAN interface) may interpret such heartbeats as activity, which may help prevent the service gateways from closing the data connection (e.g., at the transport layer). The data connection of the first terminal device may therefore be kept alive without requiring that the first terminal device actively transmit heartbeats to cloud service 7204.

In some aspects, edge computing server 7402 may additionally handle connection continuity services for groups of terminal devices, such as the terminal device of group network 7802. For example, each of the terminal devices of group network 7802 may have a respective data connection with cloud service 7204, such as in an exemplary case where the terminal devices of group network 7802 are IoT devices each connected to the same cloud server in cloud service 7204. Accordingly, each of the terminal devices of group network 7802 may need to ensure that their respective data connection with cloud service 7204 is kept alive. Instead of individually transmitting heartbeats to cloud service 7204 over their respective data connections, the terminal devices of group network 7802 may each register with edge computing server 7908, e.g., in the manner of 7904-7908 via terminal device 1502. Edge computing server 7908 may then assume connection continuity services for each of the terminal devices of group network 7802 by transmitting heartbeats on each respective data connection, for example, as in the manner of 7912-7916. The terminal device of group network 7802 may each register with edge computing server 7402 individually or in a joint process, such as by instructing terminal device 1502 to forward a joint request to edge computing server 7402 that instructs edge computing server 7402 to perform connection continuity services for each of the terminal devices of group network 7802.

In certain scenarios, the terminal devices of group network 7802 may have data connections with different keepalive requirements and that may require heartbeats with different periodicities in order to help prevent connection timeouts. The terminal devices of group network 7802 may therefore need to specify the keepalive requirements of each terminal device to edge computing server 7402. Edge computing server 7402 may then need to evaluate the individual keepalive requirements and subsequently need to transmit heartbeats on each data connection according to the individual keepalive requirements in order to maintain each data connection. Additionally or alternatively, in some aspects the terminal devices of group network 7802 may have data connections with different destinations, e.g., may not all have data connections with cloud service 7204. In such cases, edge computing server 7402 may transmit heartbeats to the various different destinations for each of the terminal devices of group network 7802.

Continuing with the setting of FIG. 79, edge computing server 7402 may maintain the data connection between terminal device 1502 and cloud service 7204 for the first terminal device (in addition to other terminal devices of group network 7802 if applicable). Accordingly, when cloud service 7204 identifies data intended for the first terminal device in 7918, cloud service 7204 may immediately transmit the data over the data connection (without having to re-establish the data connection as would be the case if the data connection was closed). Cloud service 7204 may thus transmit the data to terminal device 1502 in 7920, which may forward the data to the first terminal device 7922 via group network 7802.

While the terminal devices of group network 7802 may not maintain 'direct' radio access connections with network access node 2002 (instead relying on the gateway radio access connection via terminal device 1502), in some aspects the terminal devices of group network 7802 may maintain active communications with one another via a lower-power communication scheme of group network 7802. For example, the terminal devices of group network 7802 may wake up to communicate with one another according to a certain 'liveliness rate'. Accordingly, terminal device 1502 may receive the data from cloud service in 7920 and wait for the next active cycle of group network 7802 to forward the data to the first terminal device in 7922. The liveliness rate may depend on the service requirements of the terminal devices of group network 7802. Accordingly, if a terminal device of group network 7802 has low latency requirements, group network 7802 may utilize a high liveliness rate where the terminal devices of group network 7802 wake up frequently. The liveliness rate may be adaptive and may be independent from the rate at which edge computing server 7402 needs to transmit heartbeats to cloud service 7204.

Edge computing server 7402 may therefore be configured to perform both steering and keepalive for groups of terminal devices, where the steering may ensure that the terminal devices of the group have sufficient resources (e.g., via a gateway radio access connection) to support their services and keepalive may help ensure that the data connections for the terminal devices will not be closed. As described above regarding FIG. 79, in some aspects edge computing server 7402 may be able to control both steering and keepalive on an individual basis (e.g., for a single terminal device in the group) or on a group basis (e.g., for two or more of the terminal devices in the group). Furthermore, in some aspects group network 7802 may be configured to send updated requests as in 7904, either periodically or when a triggering condition occurs e.g., if a keepalive requirement or steering-related requirement of one or more of the terminal devices of group network 7802 changes. Terminal device 1502 may thus be configured to again forward the request in 7906 to edge computing server 7402, which may adjust the steering (via an updated steering command in 7910) and/or the keepalive operations (via heartbeats in 7912-7916 according to a different schedule).

In some aspects, edge computing server 7402 may additionally be configured to perform steering and keepalive for multiple groups of terminal devices, where edge computing server 7402 may separately handle resource steering and keepalive for each group of devices separately based on the resource and keepalive requirements of the terminal devices in each group. Accordingly, in a scenario with a first group of IoT devices of a first type and a second group of IoT devices of a second type, edge computing server 7402 may assume connection continuity services for both groups by transmitting heartbeats according to the keepalive requirements of the first group and transmitting heartbeats according to the keepalive requirements of the second group.

Since stationary IoT devices may not be mobile and will have light data connection requirements, it may be useful for these devices to remain in an energy-efficient or low-power state for extended periods of time. Exemplary cases may include systems of IoT-enabled streetlamps/streetlights, vending machines, etc. One terminal device of the group may act as a gateway terminal device to provide a radio access connection and may execute a local communication scheme with the rest of the terminal devices in the group, which may include forwarding data between the other terminal devices and the radio access connection. The terminal devices may rely on a MEC server to maintain data connections to external data networks for each terminal device, thus enabling the terminal devices to avoid actively maintaining each individual connection. If data arrives for one of the terminal devices at the gateway terminal device, the gateway terminal device may forward the data to the destination terminal device using the local communication scheme. The edge computing server may also handle steering by issuing steering commands to the network access node to ensure that the radio access connection between the gateway terminal device and the network access node has sufficient resources to support the services of all the terminal devices in the group.

Figure 80:
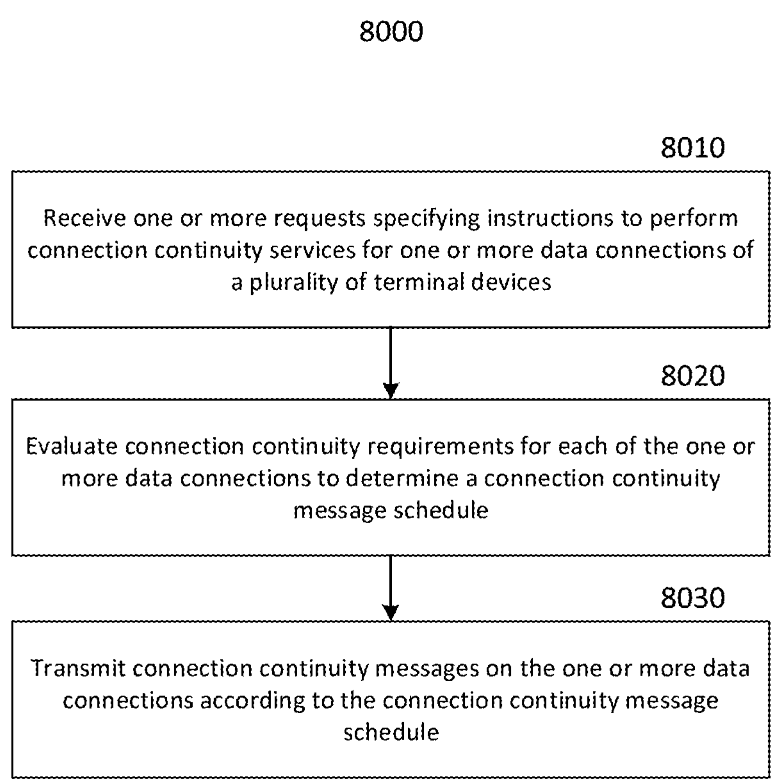
FIG. 80 shows an exemplary method for performing radio communications in accordance with some aspects.

FIG. 80 shows exemplary method 8000 for performing radio communications according to some aspects. As shown in FIG. 80, method 8000 includes receiving one or more requests specifying instructions to perform connection continuity services for one or more data connections of a plurality of terminal devices (8010). Connection continuity requirements are evaluated for each of the one or more data connections to determine a connection continuity message schedule (8020). Connection continuity messages are transmitted on the one or more data connections according to the connection continuity message schedule (8030).

Figure 81:
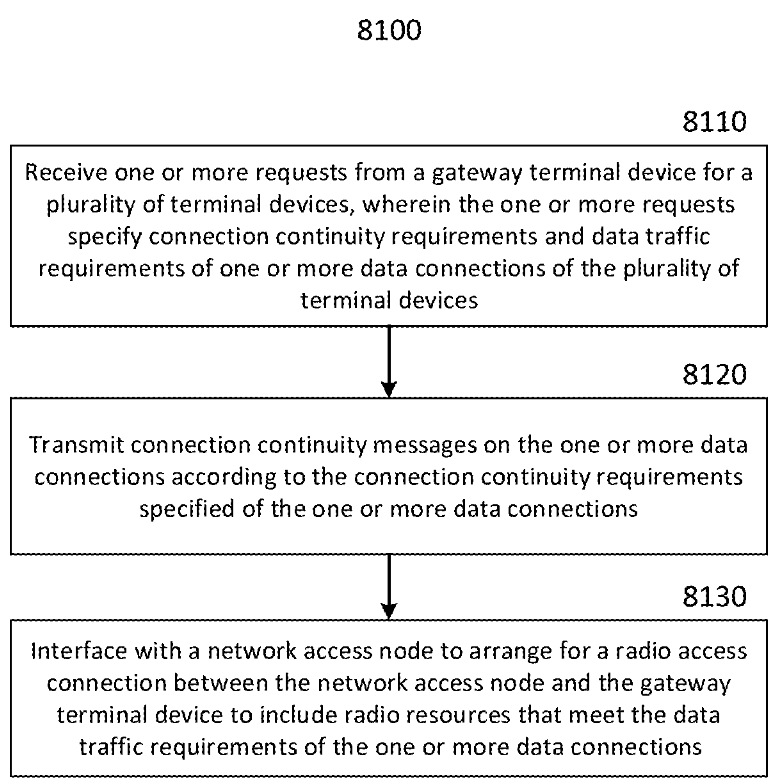
FIG. 81 shows an exemplary method for performing radio communications in accordance with some aspects.

FIG. 81 shows exemplary method 8100 for performing radio communications according to some aspects. As shown in FIG. 81, method 8100 includes receiving one or more requests from a gateway terminal device for a plurality of terminal devices, wherein the one or more requests specify connection continuity requirements and data traffic requirements of one or more data connections of the plurality of terminal devices (8110). Connection continuity messages are transmitted on the one or more data connections according to the connection continuity requirements specified of the one or more data connections (8120). A network access node is interfaced with to arrange for a radio access connection between the network access node and the gateway terminal device to include radio resources that meet the data traffic requirements of the one or more data connections (8130).

2.11 Power-Efficiency #11

According to a further aspect of this disclosure, autonomously moving vehicles or devices connected to a wireless network may conserve power by ‘desensitizing’ (either powering down or only partially desensitizing, e.g., lowering resolution or frequency) certain sensors when notified over the wireless network that no or limited obstacles or other vehicles or devices are present, e.g., during low traffic situations or a simple environments (e.g., empty airspace). For example, autonomously moving vehicles or devices such as drones, balloons, satellites, robots, smart cars, trucks, buses, trains, ships, submarines, etc., may navigate and steer with the assistance of sensors that detect obstacles and allow the autonomously moving vehicles or devices to avoid collisions. However, these navigation sensors used for collision-free movement may have high power consumption and consequently result in battery drain. To reduce power consumption, an autonomously moving device may, with the cooperation of a wireless network or another vehicle or device, identify scenarios in which certain navigation sensors may be desensitized. Specifically, a network access node may provide information to the autonomously moving vehicle or device via a wireless network that its surrounding vicinity is free of other autonomously moving vehicles or devices (which may likewise be connected to the same wireless network) and/or other moving objects or static obstacles, in other words, that the autonomous vehicle or device has low traffic surroundings or no obstacles e.g., a mountain or a closed railway crossing. As the autonomously moving vehicle or device may assume the surrounding vicinity is free of autonomous moving devices or moving objects or static obstacles, the autonomously moving vehicle or device may then shut down or partially desensitize sensors used for motion control, e.g., location sensors, etc. (yielding a reduction in power consumption) or used for detecting static obstacles, e.g., radar sensors, etc. Autonomously moving vehicles or devices may thus reduce power consumption while still avoiding collisions and make way. These aspects can be used with common channel aspects, e.g., a common channel carrying information for determining power down or desensitization levels.

Aspects discussed herein can be implemented in any of a variety of different autonomous moving devices including aerial drones, moving robots, smart cars and other autonomous vehicles, etc., which may be configured to perform autonomous navigation and steering across a number of different terrains (e.g., ground, air, water, underwater, space, etc.). These autonomous moving devices may rely on navigational sensors (including image/video sensors, radar sensors, motion sensors, laser scanners, ultrasonic/sonar sensors, accelerometer/gravitational sensors, positional/GPS sensors, etc.) to both steer along a target path and to avoid collisions with obstacles. Autonomous moving devices may aim to avoid collisions with both mobile and immobile obstacles. For example, autonomous robots working in a warehouse or industrial worksite may attempt to avoid immobile obstacles such as shelving/outdoor storage/buildings, walls, boxes/containers, hills/holes/other natural obstacles, etc., and mobile obstacles such as other autonomous robots, human workers, human-operated vehicles, animals, etc. Aerial drones working in an outdoor environment may attempt to avoid immobile obstacles such as buildings/towers/power lines/telephone poles/other manmade structures, trees, etc., in addition to mobile obstacles such as other aerial drones, planes, birds, etc. Due to the lack of movement, detection of immobile obstacles may in many cases be easier than detection of mobile obstacles. Accordingly, an autonomous moving device may be able to detect immobile obstacles with less-sensitive sensors than needed to detect mobile obstacles. For example, an autonomous moving device may be able to detect immobile obstacles with less accurate or less reliable sensors than needed to detect mobile obstacles. Additionally, autonomous moving devices may have certain low-sensitivity sensors that are only effective for detecting immobile obstacles and other high-sensitivity sensors that can detect both mobile and immobile obstacles. Furthermore, higher-sensitivity sensors may be needed in high-traffic surroundings, e.g., when many obstacles are nearby, to help ensure that all obstacles can be detected and avoided.

Accordingly, in scenarios where an autonomous moving device only aims to detect immobile obstacles or where only a small number of obstacles are nearby, the autonomous moving device may be able to use less sensitive sensors. The autonomous moving device may therefore be able to either desensitize certain high-sensitivity sensors (e.g., sensors used for detecting mobile obstacles or sensors that are needed to detect many obstacles in high-traffic surroundings) and subsequently utilize the remaining low-sensitivity sensors for navigation and steering. As low-sensitivity sensors (including higher sensitivity sensors that are being operated at lower performance levels) may generally consume less power than high-sensitivity sensors, the autonomous moving device may be able to reduce power consumption while still avoiding obstacles.

Accordingly, in some aspects, an autonomous moving device may rely on cooperation from a wireless network to identify such low traffic scenarios. For example, the autonomous moving device may be connected to a wireless network to which other autonomous moving devices are also connected. Network access nodes of the wireless network may therefore have access to information about the locations of the other autonomous moving devices, such as through positional reporting by the autonomous moving devices or sensing networks. In some aspects, network access nodes may additionally use local or external sensors to detect the presence of other mobile and immobile obstacles to likewise determine the locations of such obstacles. A network access node may thus be able to determine when the autonomous moving device is in low-traffic surroundings, e.g., when the surrounding vicinity is free of certain obstacles and/or only contains a limited number of obstacles, and provide control signaling to the autonomous moving device that has low-traffic surroundings. As 'full' sensitivity sensors may not be required in low-traffic surroundings, the autonomous moving device may receive such control signaling and proceed to desensitize certain sensors, thus reducing power consumption while still avoiding collisions.

The network access node may monitor the locations of the other autonomous moving devices and other obstacles relative to the autonomous moving device and inform the autonomous moving device via control signaling when the surrounding traffic situation changes, e.g., when another autonomous moving device or other obstacle enters the surrounding vicinity of the autonomous moving device. As higher traffic surroundings may warrant operation of sensors at higher sensitivity to detect and avoid obstacles, the autonomous moving device may then reactivate (e.g., increase the sensitivity of) the previously desensitized sensors to detect the presence of obstacles and avoid collisions.

An autonomous moving device may also be able to desensitize certain sensors depending on which types of obstacles are in its surrounding vicinity. For example, if only immobile obstacles are in its surrounding vicinity, an autonomous moving device may be able to shut down any sensors used for detecting mobile obstacles. Likewise, if no other autonomous moving devices are in its surrounding vicinity, an autonomous moving device may be able to desensitize any sensors exclusively used for detecting autonomous moving devices. Accordingly, a network access node monitoring the traffic situation of an autonomous moving device may additionally inform the autonomous moving device of what types of obstacles are in its surrounding vicinity in order to enable the autonomous moving device to selectively desensitize certain sensors.

Figure 82:
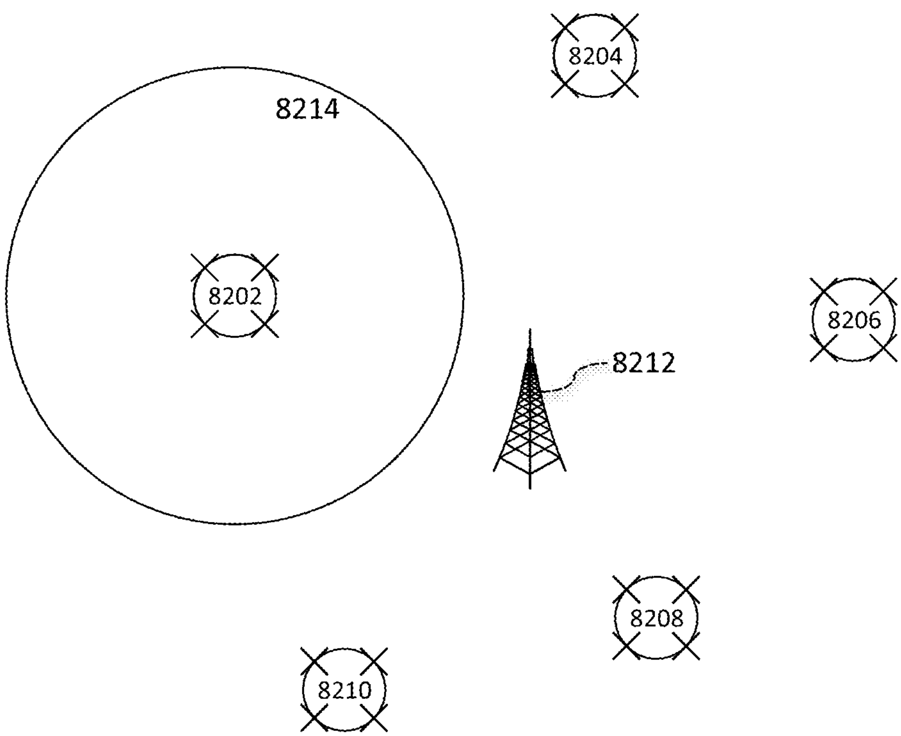
FIG. 82 shows an exemplary network scenario in accordance with some aspects.

Cooperation from a network access node in a wireless network may be relied on to inform an autonomous moving device when low-traffic scenarios occur that would allow the autonomous moving device to desensitize (including both power down and reducing the sensitivity) of navigational sensors, in particular navigational sensors used for detecting mobile obstacles. FIG. 82 shows network some aspects of autonomous moving devices 8202, 8204, 8206, 8208, and 8210 operating in a geographical area. Examples include, without limitation, robots working in a factory or warehouse, autonomous vehicles working in an industrial complex, aerial delivery drones working in an urban environment, etc.

The autonomous moving devices 8202-8210 may rely on navigational sensors to provide input to guide navigation and steering. Accordingly, autonomous moving devices 8202-8210 may navigate and steer to a target destination while avoiding collisions with immobile and mobile obstacles that are detected with the navigational sensors. Autonomous moving devices 8202-8210 may also be connected to network access node 8212 via respective radio access connections and may accordingly be able to exchange data with network access node 8212.

Network access node 8212 may be configured to monitor the locations of autonomous moving devices 8202-8210 and identify scenarios when the surrounding vicinity of any of autonomous moving devices 8202-8210 is low-traffic, for example, free of obstacles or only containing a limited number of obstacles. For example, network access node 8212 may identify that surrounding vicinity 8214 of autonomous moving device 8202 is low-traffic and may provide control signaling to autonomous moving device 8202 indicating that surrounding vicinity 8214 is low-traffic, where surrounding vicinity 8214 may be a predefined radius or area. Autonomous moving device 8202 may then be configured to desensitize (either shut off or partially reduce the sensitivity of) certain sensors used to detect other autonomous moving devices and/or mobile obstacles and to perform navigation and steering using remaining active sensors, which may include desensitized active sensors in addition to basic or emergency collision sensors. Autonomous moving device 8202 may therefore reduce power consumption while still avoiding collisions.

Figure 83:
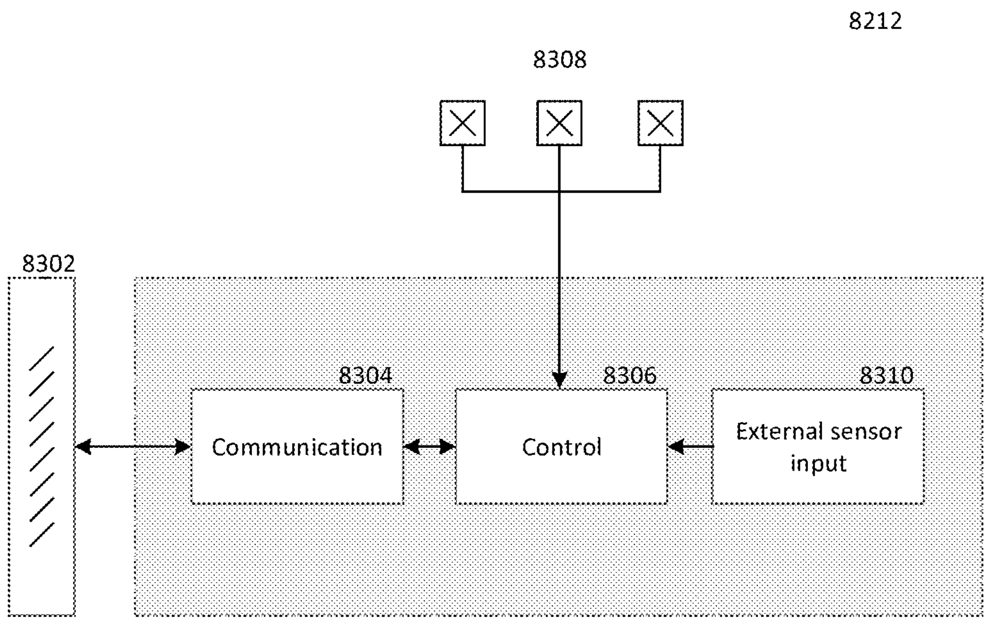
FIG. 83 shows an exemplary internal configuration of a network access node in accordance with some aspects.

FIG. 83 shows an internal configuration of network access node 8212 according to some aspects, which may provide a radio access network to autonomous moving devices 8202-8210 (optionally in conjunction with other network access nodes not explicitly shown in FIG. 82). Network access node 8212 may be configured to utilize any of variety of different radio access technologies to provide the radio access network, such as any short range or cellular radio access technology. Network access node 8212 may transmit and receive wireless radio signals with antenna system 8302 and may perform radio frequency, physical layer, and control processing with communication module 8304. Communication module 8304 may be configured to perform the radio frequency, physical layer, and control processing in the same manner as previously described regarding radio module 2604, physical layer module 2608, and control module 2610 of network access node 2002. Accordingly, communication module 8304 may include components configured with equivalent functionality.

Network access node 8212 may additionally include control module 8306, which may be configured to manage the functionality of network access node 8212. Control module 8306 may be configured to monitor the positions of autonomous moving devices and/or other obstacles to identify scenarios where the surrounding vicinity of an autonomous moving device is free of or only contains a limited number of autonomous moving devices and/or other obstacles. When control module 8306 identifies such low-traffic scenarios, control module 8306 may provide control signaling to the autonomous moving device that informs the autonomous moving device that it is in low-traffic surroundings.

As shown in FIG. 83, control module 8306 may receive input from communication module 8304, local sensor array 8308, and external sensor input 8310. Control module 8306 may process these inputs to determine and monitor the locations of autonomous moving devices and/or other obstacles and subsequently to identify scenarios where the surrounding vicinity of an autonomous moving device is free of or only contains a limited number of autonomous moving devices and/or other obstacles. Control module 8306 may then transmit control signaling to the autonomous moving device via communication module 8304 and antenna system 8302 to inform the autonomous moving device that it has low-traffic surroundings. Control module 8306 may be may be structurally realized as a hardware-defined module, e.g., as one or more dedicated hardware circuits or FPGAs, as a software-defined module, e.g., as one or more processors executing program code defining arithmetic, control, and I/O instructions (e.g., software and/or firmware) stored in a non-transitory computer-readable storage medium, or as a mixed hardware-defined and software-defined module. The functionality of control module 8306 described herein may therefore be embodied in software and/or hardware. In some aspects, control module 8306 may be a processor.

Figure 84:
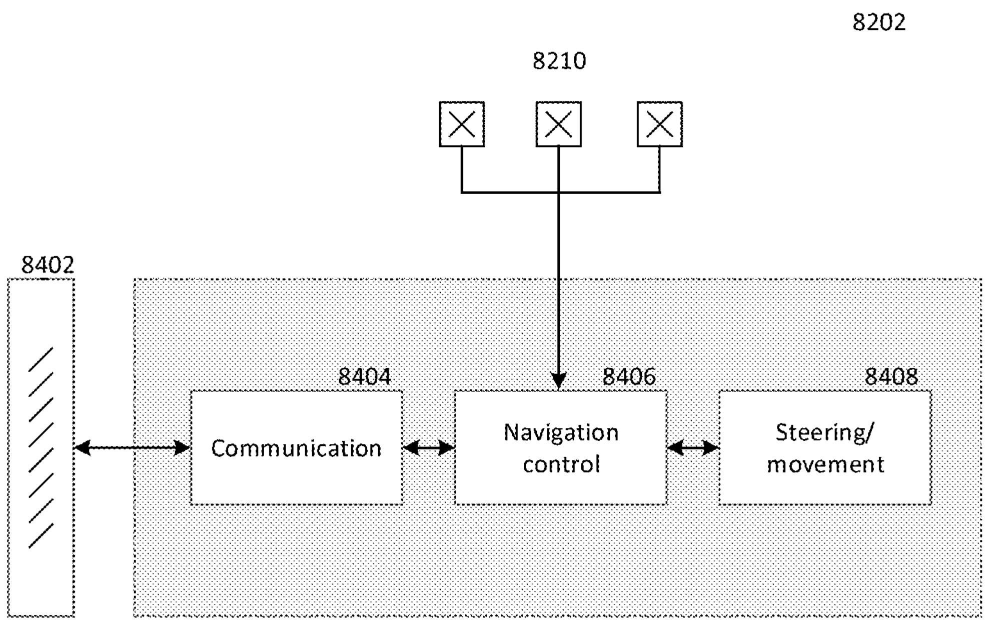
FIG. 84 shows an exemplary internal configuration of an autonomous moving device in accordance with some aspects.

FIG. 84 shows an exemplary internal configuration of autonomous moving device 8202 according to some aspects, which may be any type of autonomous moving device including, without limitation, an aerial drone, a moving robot, a smart car or other autonomous vehicle, etc. One or more of autonomous moving devices 8204-8210 may also be configured in the same manner. As shown in FIG. 84, autonomous moving device 8202 may include antenna system 8402 and communication module 8404, which may be configured to perform radio communications with network access node 8212. Autonomous moving device 8202 may transmit and receive radio signals with antenna system 8402 and may perform radio frequency, physical layer, and control processing with communication module 8404. Communication module 8404 may be configured to perform the radio frequency, physical layer, and control processing in the same manner as previously described regarding antenna system 1602, RF transceiver 1604, physical layer processing module 1608, and controller 1610 of terminal device 1502. Accordingly, communication module 8404 may include components configured with equivalent functionality.

Navigation control module 8406 may be responsible for controlling the movement of autonomous moving device 8202. Navigation control module 8406 may be structurally realized as a hardware-defined module, e.g., as one or more dedicated hardware circuits or FPGAs, as a software-defined module, e.g., as one or more processors executing program code defining arithmetic, control, and I/O instructions (e.g., software and/or firmware) stored in a non-transitory computer-readable storage medium, or as a mixed hardware-defined and software-defined module. The functionality of navigation control module 8406 described herein may therefore be embodied in software and/or hardware. As shown in FIG. 84, navigation control module 8406 may receive input from sensor array 8410, which may include one or more sensors such as image/video sensors/cameras, radar sensors, motion sensors, laser scanners, ultrasonic/sonar sensors, accelerometer/gravitational sensors, positional/GPS sensors, etc. The sensors of sensor array 8410 may each obtain sensor data from the environment of autonomous moving device 8202 and provide the sensor data to navigation control module 8406. Navigation control module 8406 may then utilize the sensor data to make navigation and steering decisions, such as to navigate autonomous moving device 8202 to a target designation while avoiding any mobile or immobile obstacles detected by sensor array 8410. Navigation control module 8406 may thus render navigation and steering decisions and issue commands to steering/movement system 8408 to move according to the navigation and steering decisions. Steering/movement system 8408 may thus be configured to physically move autonomous moving device 8202. Steering/movement system 8408 may thus be a movement system compatible with the device type of autonomous moving device 8202. Accordingly, steering/movement system 8408 may be any type of movement system including e.g., wheel or tread system, an aerial propeller or rotor system, an outboard or inboard aquatic motor, a marine propulsion system, a jet propulsion system, a bipedal/quadrupedal or similar 'walking' system, etc.

As noted above, the sensors of sensor array 8410 may have different capabilities and may have varying effectiveness in certain scenarios to detect certain types of obstacles. Additionally, the sensitivity of the sensors of sensor array 8410 may be adjustable. For example, navigation control module 8406 may be able to turn on and off sensors of sensor array 8410, thus switching the sensitivity of the sensors of sensor array 8410 between full sensitivity (on) and no sensitivity (off). Alternatively, navigation control module 8406 may be configured to adjust operational parameters of the sensors of sensor array 8410 to adjust the sensitivity of the sensors between full sensitivity and no sensitivity. For example, navigation control module 8406 may be configured to adjust a measurement frequency of one or more sensors of sensor array 8410, which may be the frequency at which measurements are taken. Navigation control module 8406 may thus be able to increase and decrease the sensitivity of the sensors of sensor array 8410, where sensor sensitivity may generally be directly proportional to power consumption. Accordingly, operation of a sensor of sensor array 8410 at full sensitivity may consume more power than operation of the sensor at low or no sensitivity. Navigation control module 8406 may also be able to adjust the sensitivity of a sensor of sensor array 8410 by adjusting the processing complexity or algorithmic complexity of the sensor data obtained from the sensor, where reduced processing complexity or algorithmic complexity may reduce power consumption by navigation control module 8406. Navigation control module 8406 may therefore be configured to selectively increase and decrease the sensitivity of the sensors of sensor array 8410, which may consequently increase and decrease power consumption at navigation control module 8406.

Additionally, in some aspects navigation control module 8406 may utilize certain sensors of sensor array 8410 for different purposes. For example, navigation control module 8406 may utilize one or more sensors of sensor array 8410 for detection of immobile obstacles while utilizing one or more other sensors of sensor array 8410 for detection of mobile obstacles. Additionally, in some aspects navigation control module 8406 may also utilize certain sensors of sensor array 8410 exclusively to detect other autonomous moving devices. In some aspects, one or more other sensors of sensor array 8410 may be used for detecting multiple of mobile obstacles, immobile obstacles, or autonomous moving devices and may be able to selectively turn on and off a 'mobile obstacle detection mode', 'immobile obstacle detection mode', or 'autonomous moving device detection mode'. Furthermore, in some aspects navigation control module 8406 may be able to operate sensors of sensor array 8410 at lower sensitivity levels to detect immobile obstacles but may need to operate sensors of sensor array 8410 at higher sensitivity levels to detect mobile obstacles. In some aspects, one or more sensors of sensor array 8410 may also be basic or 'emergency' collision sensors that are low-power and only suitable for simple detection of objects, e.g., as a last resort in case other sensors fail.

Figure 85:
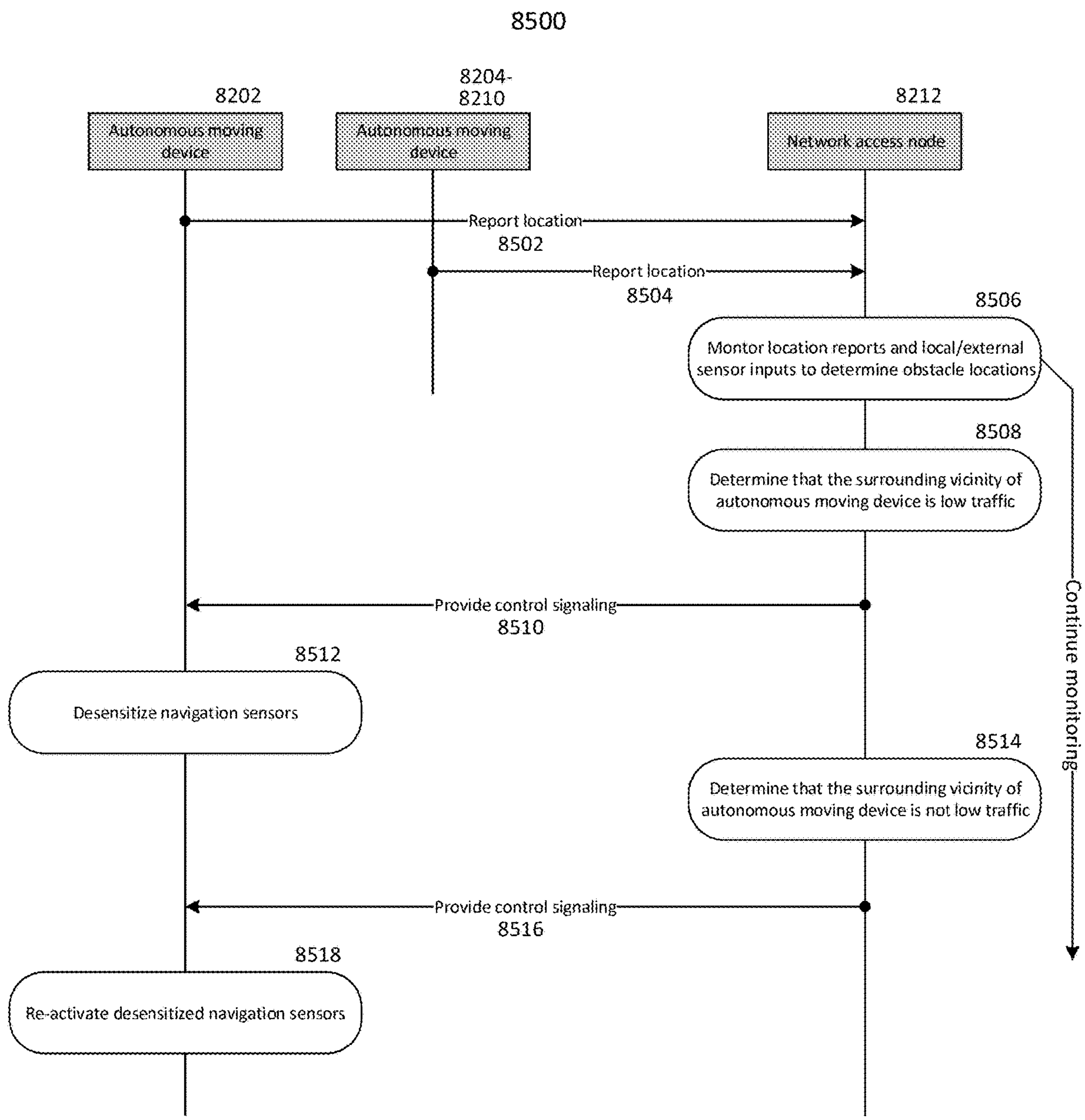
FIG. 85 shows an exemplary message sequence chart related to a procedure for selecting sensitivity levels for navigation sensors at autonomous moving devices in accordance with some aspects.

As previously indicated, various aspects of power, autonomous moving device 8202 may rely on cooperation from network access node 8212 to identify scenarios in which there is low chance of collision with other autonomous moving devices and/or mobile obstacles and subsequently desensitize one or more sensors of sensor array 8410. FIG. 85 shows an exemplary message sequence chart 8500 in accordance with some aspects. As previously described, network access node 8212 may be configured to determine the locations of autonomous moving devices 8202-8210 and/or other obstacles, which control module 8306 may perform based on any one or more of location reports, local sensor data, or external sensor data. For example, autonomous moving devices 8202-8210 may each determine their respective locations (e.g., at navigation control module 8406 using a location sensor of sensor array 8410) and report their respective locations to network access node 8212 in 8502 and 8504 (e.g., by transmitting control signaling from navigation control module 8406 via communication module 8404 and antenna system 8402) as shown in message sequence chart 8500. Autonomous moving device 8202-8210 may be configured to periodically report their locations according to a fixed period and/or if a movement condition is triggered, e.g., if movement is detected that exceeds a predefined threshold.

Control module 8306 of network access node 8212 may therefore receive the location reports in 8502 and 8504. In addition to utilizing location reports to determine the locations of autonomous moving devices 8202-8210, in some aspects control module 8306 may additionally monitor sensor data provided by local sensor array 8308 and external sensor input 8310. Specifically, local sensor array 8308 may be located at network access node 8212 and may be positioned to sense obstacles. For example, in a warehouse robot scenario, network access node 8212 may be positioned in a central location of the warehouse with the sensors of local sensor array 8308 positioned facing outwards around network access node 8212. The sensors of local sensor array 8308 may be thus be able to detect various obstacles around network access node 8212, where network access node 8212 may be deployed in a location from which local sensor array 8308 can detect obstacles near autonomous moving devices 8202-8210.

Figure 86:
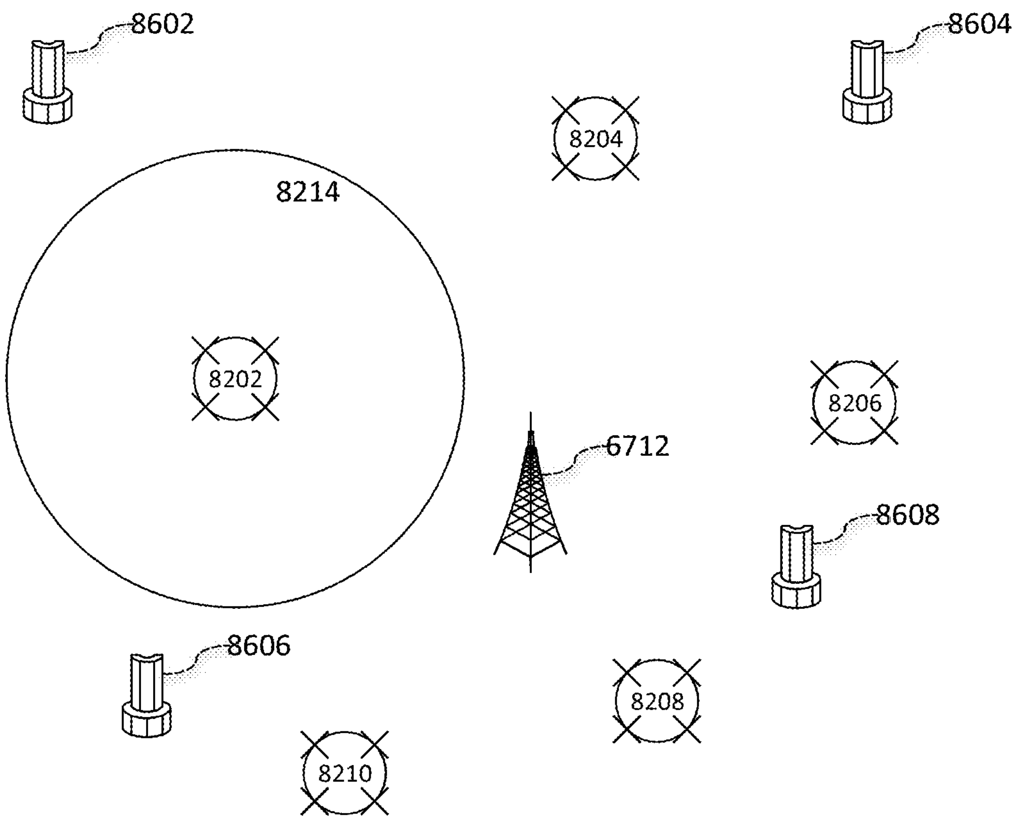
FIG. 86 shows an exemplary network scenario using an external sensor network in accordance with some aspects.

In some aspects, control module 8306 of network access node 8212 may additionally receive sensor data from an external sensor network via external sensor input 8310. FIG. 86 shows an exemplary external sensor network including external sensors 8602, 8604, 8606, and 8608 in accordance with some aspects. As shown in FIG. 86, external sensors 8602-8608 may be positioned around network access node 8212 within the operating area of autonomous moving devices 8202-8210. Accordingly, external sensors 8602-8608 may be positioned to detect both autonomous moving devices in addition to other proximate obstacles. Network access node 8212 may interface with external sensors 8602-8608 either via a wired or wireless connection, where the wireless connection may utilize the same or different radio access network as provided by antenna system 8302 and communication module 8304. Accordingly, external sensor input 8310 of network access node 8212 may be a wired or wireless input (and may potentially be the same as communication module 8304) that receives sensor data from an external sensor data network.

Control module 8306 may therefore utilize some or all of local sensor data (from local sensor array 8308), external sensor data (from external sensor input 8310), and location reports (from autonomous moving devices 8202-8210) to determine the locations of autonomous moving devices and/or other obstacles. As shown in message sequence chart 8500, in some aspects control module 8306 may continuously monitor location reports, local sensor data, and external sensor data to determine obstacle locations in 8506. Accordingly, control module 8306 may process the raw location information (e.g., location reports, local sensor data, and external sensor data) to determine the positions of autonomous moving devices 8202-8210 and any other obstacles. While the location reports may specify the location of autonomous moving devices 8202-8210, control module 8306 may process the sensor data to determine the positions of other obstacles. Control module 8306 may utilize any type of sensor-based object location technique to process the sensor data to identify the positions of other obstacles, including both mobile and immobile obstacles.

Control module 8306 may continuously monitor the location reports and sensor data to track the locations of autonomous moving devices 8202-8210 and other obstacles. In some aspects, control module 8306 may compare the locations of each of autonomous moving devices 8202-8210 to the locations of the other autonomous moving devices 8202-8210 and to the locations of the detected obstacles to determine whether the surrounding vicinity of any of autonomous moving devices 8202-8210 contains any obstacles.

For example, as shown in FIG. 82, surrounding vicinity 8214 (e.g., an area of predefined size) of autonomous moving device 8202 may be free of autonomous moving devices 8204-8210 and other obstacles. Accordingly, upon comparing the locations of autonomous moving devices 8202-8210 and any detected obstacles, control module 8306 may determine in 8508 that surrounding vicinity 8214 is free of obstacles. Control module 8306 may then provide control signaling to autonomous moving device 8202 in 8510 that informs autonomous moving device 8202 that its surrounding vicinity 8214 is free of obstacles (e.g., by transmitting the control signaling via communication module 8304 and antenna system 8302 over the radio access connection).

Navigation control module 8406 of autonomous moving device 8202 may receive the control signaling in 8510 (e.g., via antenna system 8402 and navigation control module 8406). As the control signaling specifies that surrounding vicinity 8214 of autonomous moving device 8202 is free of obstacles, autonomous moving device 8202 may not need to operate sensor array 8410 at full sensitivity (and full power) and may consequently desensitize one or more sensors of sensor array 8410 in 8512, thus reducing power consumption.

Specifically, as navigation control module 8406 may assume that surrounding vicinity 8214 is free of all obstacles, navigation control module 8406 may be able to shut down all sensors of sensor array 8410, desensitize all sensors of sensor array 8410 to emergency or basic collision detection levels, shut down all sensors of sensor array 8410 except specific emergency or basic collision sensors, etc.

In an alternative scenario, control module 8306 may determine in 8508 that surrounding vicinity 8214 is free of mobile obstacles (e.g., free of autonomous moving devices 8204-8210 and any other mobile obstacles) but contains one or more immobile obstacles (which control module 8306 may detect with sensor data). Control module 8306 may then provide control signaling to autonomous moving device 8202 in 8510 that indicates that surrounding vicinity 8214 contains only immobile obstacles. As previously described, one or more sensors of sensor array 8410 may be exclusively dedicated to detecting mobile obstacles while other sensors of sensor array 8410 may be used for detecting immobile obstacles. As the control signaling specified that surrounding vicinity 8214 is free of mobile obstacles, navigation control module 8406 may be able to desensitize the sensors of sensor array 8410 in 8512 that are dedicated to detecting mobile obstacles by either turning off these sensors or by partially reducing the sensitivity of these sensors. For example, navigation control module 8406 may initially operate a given sensor of sensor array 8410 that is dedicated to detecting mobile obstacles at a first sensitivity level and may reduce the sensitivity of the sensor to a second sensitivity level that is less than the first sensitivity level in 8512. In some aspects, navigation control module 8406 may reduce the sensitivity of sensors of sensor array 8410 that are dedicated to detecting mobile obstacles in addition to reducing the sensitivity of other sensors of sensor array 8410, such as e.g., sensors dedicated to detecting immobile obstacles. For example, navigation control module 8406 may reduce the sensitivity of the sensors dedicated to mobile obstacle detection by a comparatively greater amount (e.g., by relative or absolute measures) than the sensors dedicated to immobile obstacle detection. In some aspects, if one or more sensors of sensor array 8410 are configured to detect both mobile and immobile obstacles and have toggleable mobile and immobile obstacle detection modes, navigation control module 8406 may deactivate the mobile obstacle detection mode and autonomous moving device detection mode while keeping the immobile obstacle detection mode active. As toggling of detection modes at sensors involves configuring sensor array to detect more or less obstacles, this can also be considered a type of desensitization.

Furthermore, as mobile obstacles may generally require higher sensitivity to detect, in some aspects navigation control module 8406 may also be able to partially reduce the sensitivity of sensors of sensor array 8410 that are used for detection of both mobile and immobile obstacles in 8512. For example, a first sensitivity level of a given sensor of sensor array 8410 may be suitable for detection of both mobile and immobile obstacles while a second sensitivity level lower than the first sensitivity level may be suitable for detection of immobile obstacles but unsuitable for detection of mobile obstacles. Accordingly, upon receipt of the control signaling in 8510, navigation control module 8406 may be configured to reduce the sensitivity of the given sensor from the first sensitivity level to the second sensitivity level.

In some aspects, navigation control module 8406 may also desensitize sensor array 8410 in 8512 by reducing the processing of sensor data performed at navigation control module 8406. For example, navigation control module 8406 may be configured to periodically receive and process inputs from the sensors of sensor array 8410 according to a set period, where low periods may result in more processing than high periods. Accordingly, navigation control module 8406 may desensitize sensor array 8410 in 8512 by increasing the period, which may consequently also reduce both the amount of processing and power expenditure at navigation control module 8406. Navigation control module 8406 may also be configured to reduce the processing or algorithmic complexity of processing the sensor data from sensor array 8410 to reduce sensitivity and consequently reduce power consumption.

Such scenarios in which surrounding vicinity 8214 is free of all obstacles or free of mobile obstacles can be generalized as 'low-traffic scenarios', where autonomous moving device 8202 may desensitize sensor array 8410 in such low-traffic scenarios to conserve power. In some aspects control module 8306 of network access node 8212 may be responsible for monitoring location reports and/or sensor data to identify low-traffic scenarios and subsequently notify autonomous moving device 8202. There may be other types of low-traffic scenarios, such as where surrounding vicinity 8214 only contains a limited number of obstacles, does not contain any other autonomous moving devices, etc. For example, control module 8306 may be configured to monitor location reports and sensor data in 8506 to determine when the surrounding vicinity of an autonomous moving device contains only light traffic in 8508, e.g., when autonomous moving device 8202 is in low-traffic surroundings. For example, instead of determining that surrounding vicinity 8214 is free of all obstacles or contains only immobile obstacles, control module 8306 may utilize location reports and sensor data in 8506 to determine when surrounding vicinity 8214 contains only a limited number of obstacles, e.g., 1, 2, 3, etc., mobile obstacles and/or 1, 2, 3, etc., immobile obstacles. Depending on the numbers and/or types (mobile vs. immobile) of obstacles in surrounding vicinity 8214, control module 8306 may be configured to classify the traffic situation and identify scenarios with 'low' traffic (which may rely on predefined criteria that classify low-traffic scenarios based on the numbers and types of obstacles). Upon identification of a low traffic scenario in surrounding vicinity 8214, control module 8306 may provide control signaling to autonomous moving device 8202 in 8510 to inform autonomous moving device 8202 of the low traffic scenario. Navigation control module 8406 may then receive such control signaling and desensitize sensor array in 8512. As low traffic scenarios may involve some obstacles in surrounding vicinity 8214, navigation control module 8406 may not completely shut off sensor array 8410. However, navigation control module 8406 may either partially desensitize sensor array 8410 to a sensitization level sufficient to avoid collisions in low traffic, where the sensitization level may not be sufficient to avoid collisions in high traffic, or may shut off all sensors except for emergency or basic collision sensors. In some aspects, network access node 8212 may additionally specify in the control signaling of 8510 which types of obstacles are part of the low-traffic scenario, e.g., the quantity of each of autonomous moving devices, other mobile obstacles, and immobile obstacles that are in surrounding vicinity 8214. Navigation control module 8406 may then be able to selectively desensitize sensors of sensor array 8410 (and/or activate and deactivate certain detection modes if applicable) depending on which type of obstacles each sensor of sensor array 8410 is configured to detect. Alternatively, in some aspects, network access node 8212 may be configured to classify traffic situations based on a predefined traffic levels, e.g., a first level, a second level, a third level, etc., which may each indicate varying amounts of traffic. Network access node 8212 may specify the current traffic level to autonomous moving device 8202 via control signaling in 8510. Autonomous moving device 8202 may then desensitize sensor array 8410 based on the traffic level indicated by network access node 8212, where autonomous moving device 8202 may operate sensor array 8410 at a low sensitivity level when network access node 8212 indicates low traffic levels, a medium sensitivity level when network access node 8212 indicates medium traffic levels, a high sensitivity level when network access node 8212 indicates high traffic levels, etc.

In some aspects, network access node 8212 may be configured to monitor the location of other autonomous moving devices but may not be able to detect other obstacles, such as if network access node 8212 is configured to receive location reports from autonomous moving devices but does not have local or external sensor data to detect other obstacles. Accordingly, network access node 8212 may be able to notify autonomous moving device 8202 in 8510 when surrounding vicinity 8214 is free of autonomous moving devices 8204-8210 (or alternatively only contains 1, 2, 3, etc. autonomous moving devices) but may not be able to specify whether surrounding vicinity 8214 contains any other mobile obstacles. Similar to the low traffic scenario described above, in some aspects navigation control module 8406 may then partially desensitize sensor array 8410 in 8512 to a sensitivity level that is sufficient to avoid collisions in low traffic scenarios but not for high traffic scenarios. Alternatively, in some aspects navigation control module 8406 may desensitize specific sensors of sensor array 8410 that are configured to exclusively detect other autonomous moving devices. In some aspects, navigation control module 8406 may reduce the sensitivity of sensors of sensor array 8410 that are dedicated to detecting autonomous vehicles in addition to reducing the sensitivity of other sensors of sensor array 8410, such as e.g., sensors dedicated to detecting immobile obstacles. For example, navigation control module 8406 may reduce the sensitivity of the sensors dedicated to mobile obstacle detection by a comparatively greater amount (e.g., by relative or absolute measures) than the sensors dedicated to immobile obstacle detection. As the traffic of other obstacles may not be known, such may be particularly applicable for scenarios where there is assumed to be a low number of other obstacles in the operating area of autonomous moving vehicles 8204-8210.

Regardless of the specific type of desensitization employed by navigation control module 8406, navigation control module 8406 may reduce the sensitivity of sensor array 8410 in 8512, which may consequently reduce power consumption at autonomous moving device 8202. Navigation control module 8406 may then control autonomous moving device 8202 to navigate and steer with steering/movement system 8408 based on the sensor data obtained from desensitized sensor array 8410. As network access node 8212 has indicated in 8510 that surrounding vicinity 8214 is low traffic, navigation control module 8406 may still be able to detect low numbers of obstacles with desensitized sensor array 8410 and steer along a target path by avoiding any detected obstacles.

Navigation control module 8406 may continue to navigate and steer autonomous moving device 8202 with sensor array 8410 in a desensitized state. Consequently, control module 8306 may in some aspects continue tracking the locations of obstacles in the operating area of autonomous moving devices 8202-8210 to notify autonomous moving device 8202 if traffic conditions in surrounding vicinity 8214 change, which may potentially require reactivation of sensor array 8410 (or reactivation of certain detection modes) to a higher sensitivity level if traffic conditions increase. As shown in message sequence chart 8500, control module 8306 of network access node 8212 may continue to monitor location reports and/or sensor data to track the locations of obstacles relative to autonomous moving devices 8202-8210. At a later point in time, one or more obstacles may eventually move within surrounding vicinity 8214 of autonomous moving device 8202, which may change the traffic situation in surrounding vicinity 8214. For example, autonomous moving device 8210 may move within surrounding vicinity 8214 (which may be as a result of movement of one or both of autonomous moving device 8202 and autonomous moving device 8210), which control module 8306 may detect based on location reports received from autonomous moving devices 8202 and 8210. Additionally or alternatively, control module 8306 may detect that one or more mobile or immobile obstacle has moved within surrounding vicinity 8214 in 8514 (due to movement of one or both of autonomous moving device 8202 and the obstacles).

As the traffic situation has changed, control module 8306 may notify autonomous moving device 8202 of the change in its surrounding traffic situation by providing control signaling to autonomous moving device 8202 in 8516. As the control signaling may indicate to navigation control module 8406 that surrounding vicinity 8214 has greater traffic (e.g., an increased number of mobile and/or immobile obstacles), navigation control module 8406 may re-activate desensitized sensors of sensor array 8410 in 8518 (including re-activating certain detection modes that were previously deactivated). For example, if navigation control module 8406 previously desensitized sensors of sensor array 8410 dedicated to detecting mobile obstacles and the control signaling indicates that surrounding vicinity 8214 now contains mobile obstacles, navigation control module 8406 may increase the sensitivity of the previously desensitized sensors, e.g., to the previous pre-desensitization level or to another sensitivity level depending on the traffic situation reported in the control signaling. Navigation control module 8406 may then proceed to navigate and steer autonomous moving device 8202 using the reactivated sensors of sensor array 8410.

In a more general setting, control module 8306 may continually provide traffic situation updates to navigation control module 8406 via control signaling that indicate the current traffic situation (e.g., the number and/or types of obstacles) in surrounding vicinity 8214. If the control signaling indicates increased traffic in surrounding vicinity 8214, navigation control module 8406 may respond by increasing the sensitivity level of sensor array 8410, which may also include increasing the sensitivity of certain sensors (e.g., sensors dedicated to detection of mobile obstacles) of sensor array 8410 based on the types of sensors and types of traffic. Conversely, if the control signaling indicates decreased traffic in surrounding vicinity 8214, navigation control module 8406 may respond by decreasing the sensitivity level of sensor array 8410, which may also include decreasing the sensitivity of certain sensors (e.g., sensors dedicated to detection of mobile obstacles) of sensor array 8410 based on the types of sensors and types of traffic.

Accordingly, instead of continuously operating sensor array 8410 at full sensitivity, which may yield high power consumption, in some aspects navigation control module 8406 may instead increase and decrease the sensitivity of sensor array 8410 based on traffic situation updates provided by network access node 8212. Such may enable navigation control module 8406 to conserve power while still avoiding collisions by adapting the sensitivity of sensor array 8410 according to the traffic situations indicated by network access node 8212.

Figure 87:
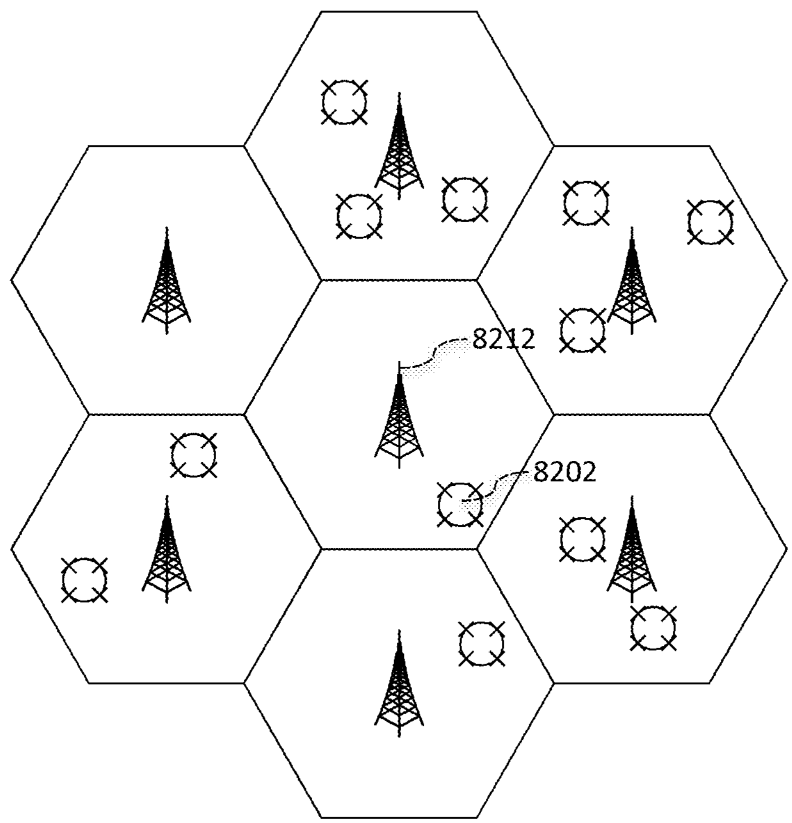
FIG. 87 shows an exemplary network scenario using multiple network access nodes with respective cells in accordance with some aspects.

Additionally or alternatively, in some aspects network access node 8212 may utilize its coverage area to determine when a surrounding vicinity of autonomous moving device 8202 is free of other autonomous moving devices. FIG. 87 shows an exemplary network scenario according to some aspects where network access node 8212 may provide a radio access network in conjunction with multiple other network access nodes, where each of the network access nodes may have a coverage area and serve autonomous moving devices within its own coverage area. Network access node 8212 may therefore know which autonomous moving devices are in its coverage area on the basis of which autonomous moving devices are being served by network access node 8212. Accordingly, in the scenario of FIG. 87, network access node 8212 (e.g., control module 8306) may identify that autonomous moving device 8202 is the only autonomous moving device in its coverage area. Network access node 8212 may then provide control signaling to autonomous moving device 8202 that indicates that autonomous moving device 8202 is the only autonomous moving device in the coverage area of network access node 8212. Autonomous moving device 8202 may consequently desensitize sensor array 8410, such as by utilizing a sensitivity level suitable for low-traffic situations, by shutting off sensors that are dedicated to detecting other autonomous moving devices, and/or by turning off an autonomous moving device mode at one or more sensors of sensor array 8410. This deployment option may enable network access node 8212 to rely solely on information regarding which autonomous moving devices are in its coverage area as opposed to relying on location reports and sensor data. However, network access node 8212 may utilize location reports and/or sensor data in conjunction with served autonomous moving device information to monitor the traffic situation in its coverage area.

Figure 88:
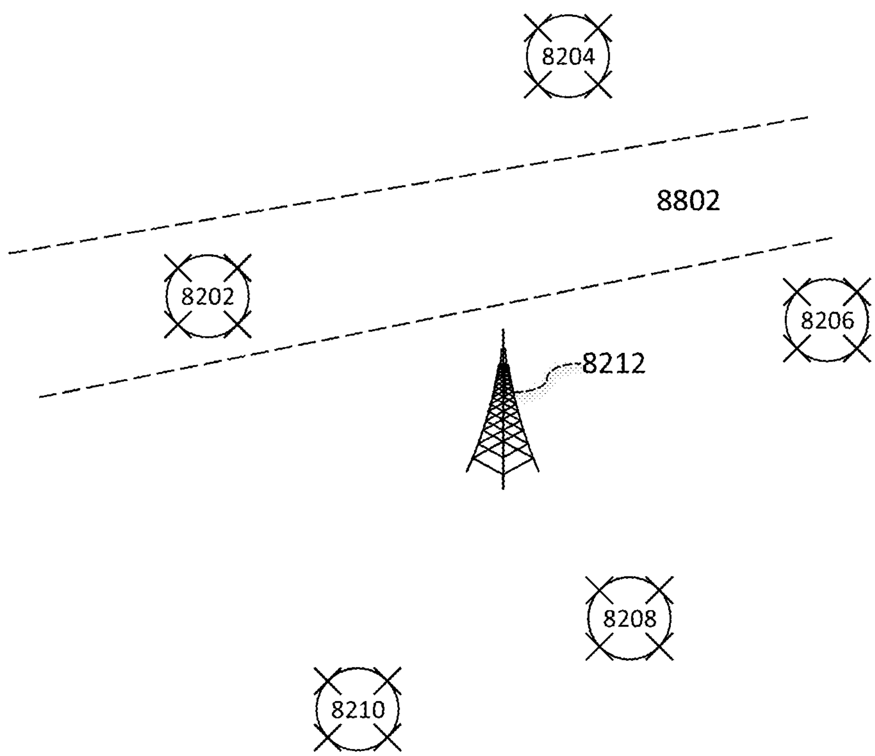
FIG. 88 shows an exemplary network scenario using planned routes of autonomous moving devices in accordance with some aspects.

Additionally or alternatively, in some aspects network access node 8212 may utilize a planned movement path of autonomous moving device 8202 to provide traffic situation updates to autonomous moving device 8202. FIG. 88 shows an exemplary network scenario in which autonomous moving device 8202 may be moving along planned movement path 8802, which may be selected by navigation control module 8406. Autonomous moving device 8202 may report planned movement path 8802 to network access node 8212, which may then utilize location reports and/or sensor data to monitor planned movement path 8802 to determine whether any obstacles are in or will enter planned movement path 8802. If network access node 8212 detects that planned movement path 8802 is free of autonomous moving devices 8204-8210 and other obstacles or only contains light traffic, network access node 8212 may provide control signaling to autonomous moving device 8202 that indicates the traffic situation of planned movement path 8802. Network access node 8212 may continue to monitor the traffic situation of planned movement path 8802 and provide any necessary traffic situation updates to autonomous moving device 8202 via control signaling. Autonomous moving device 8202 may then control the sensitivity of sensor array 8410 based on the traffic situation updates to reduce power consumption while still avoiding collisions. Furthermore, each of autonomous moving devices 8204-8210 may also provide planned movement paths to network access node 8212. Network access node 8212 may then compare the planned movement paths of each of autonomous moving device 8204-8210 to planned movement path 8802 to determine the traffic situation of planned movement path 8802 and subsequently notify autonomous moving device 8202.

Additionally or alternatively, in some aspects network access node 8212 and autonomous moving devices 8202-8210 may additionally utilize predefined traffic 'rules' that constrain the movement of autonomous moving devices 8202-8210. For example, autonomous moving devices 8202-8210 may be restricted to movement along a system of predefined 'lanes' and 'intersections' according to specific rules for entering and leaving, changing directions, and other permitted maneuvers. An exemplary scenario may be a warehouse or industrial site defined with a floorplan having predefined lanes and intersections, an aerial zone with predefined air traffic control lanes, etc. In such a scenario, autonomous moving device 8202 may decrease the sensitivity of sensor array 8410 as fewer collisions with other autonomous moving devices may be possible. Additionally, in scenarios where network access node 8212 acts a 'mission control' node to oversee the movement paths of autonomous moving devices 8202-8210 (potentially where autonomous moving devices 8202-8210 operate in a coordinated 'fleet', e.g., for drones), the number of events to be monitored and the amount of sensor data and commands transmitted between autonomous moving device 8202 and network access node 8212 may be reduced. Network access node 8212 may then control the route of autonomous moving devices 8202-8210 by tracking a limited number of foreseeable collision events and, in the case of congestion, re-calculate the route and sends instructions to autonomous moving devices 8202-8210 for the new route. Autonomous moving devices 8202-8210 may utilize basic collision sensors to react to unforeseeable events.

Additionally or alternatively, in some aspects, network access node 8212 may be a 'master' autonomous moving device that provides a wireless network to autonomous moving devices 8202-8210. Accordingly, as opposed to being a stationary base station or access point, network access node/master autonomous moving device 8212 may additionally be configured with a navigation control module and steering/movement system and may also navigate and steer using local sensor array 8308. Network access node/master autonomous moving device 8212 may monitor location reports and sensor data and provide traffic situation updates to autonomous moving devices 8202-8210 in the same manner as described above.

Figure 89:
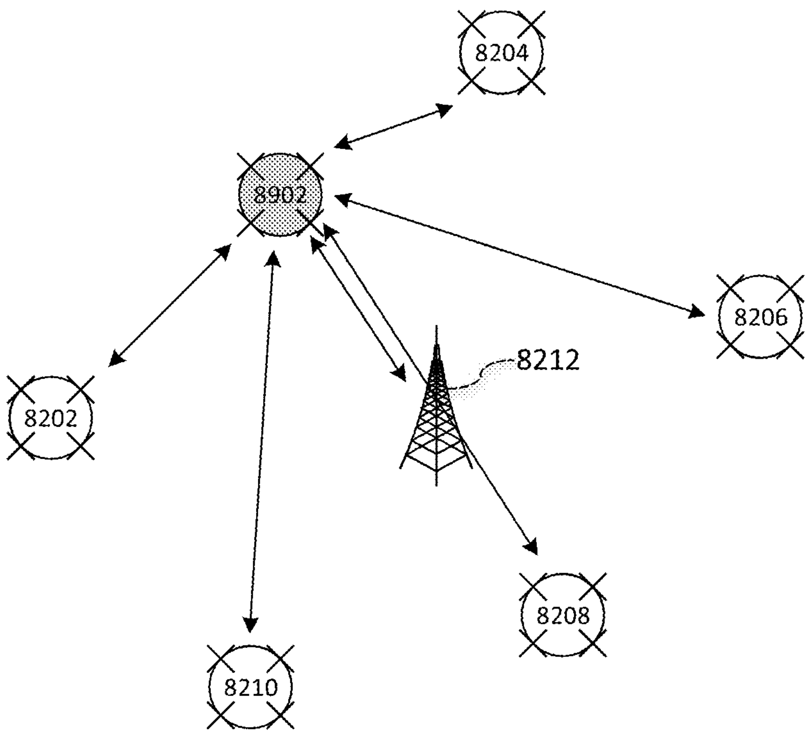
FIG. 89 shows an exemplary network scenario using a master autonomous moving device in accordance with some aspects.

Furthermore, in some aspects autonomous moving device 8202-8210 may rely on a 'master' autonomous moving device for sensing and collision avoidance. FIG. 89 shows an exemplary network scenario according to some aspects in which autonomous moving devices 8202 may be connected to master autonomous moving device 8902. Master autonomous moving device 8902 may be configured in a similar manner as autonomous moving device 8202 as depicted in FIG. 84. However, master autonomous moving device 8902 may have a larger battery capacity and/or more sensitive sensor array. Master autonomous moving device 8902 may maintain a radio connection with network access node 8212 and each of autonomous moving devices 8202-8210, which may utilize the same or different radio access technologies (which may require separate instances of antenna systems and communication modules to support each radio access technology). Master autonomous moving device 8902 may perform sensing with its sensor array and provide control signaling to autonomous moving devices 8202-8210 to inform autonomous moving devices 8202-8210 of the surrounding traffic situation, such as whether any obstacles are in the surrounding vicinity of each of autonomous moving devices 8202-8210. Autonomous moving devices 8202-8210 may then adjust the sensitivity of their respective sensor arrays based on the traffic situations reported by master autonomous moving device 8902. Additionally or alternatively, in some aspects master autonomous moving device 8902 may directly provide sensor data or obstacle locations from its sensor array to autonomous moving devices 8202-8210, which autonomous moving devices 8202-8210 may utilize in place of operating their respective sensor arrays. Autonomous moving devices 8202-8210 may thus be able to significantly desensitize their respective sensor arrays, such as by shutting down all sensors except for basic collision sensors.

Additionally or alternatively, in some aspects autonomous moving devices 8202-8210 may provide sensor data or obstacle locations to one another (which may not rely on a master autonomous moving device). Accordingly, autonomous moving devices 8202-8210 may coordinate with one another to provide sensor data and obstacle locations. This may enable some of autonomous moving devices 8202-8210 desensitize their respective sensor arrays while other of autonomous moving devices 8202-8210 utilize their sensor arrays to obtain sensor data and obstacle locations to provide to the other of autonomous moving devices 8202-8210. In some aspects, all of autonomous moving devices 8202-8210 may be able to partially desensitize their respective sensor arrays and exchange sensor data or obstacle information with one another to compensate for the desensitization. In some aspects, autonomous moving devices 8202-8210 may take turns desensitizing their sensor arrays while some of autonomous moving devices 8202-8210 obtain sensor data and obstacle locations to provide to those of autonomous moving devices 8202-8210 that have desensitized their sensor arrays.

Implementations of these aspects can be realized in any environment, including any of the aforementioned ground, air, water, underwater, space, etc. Each environment may provide specific scenarios and use cases based on the unique environment-specific characteristics and properties. For example, in an aerial drone setting, autonomous moving devices 8202-8210 may need to avoid collisions with birds, which may fly in flocks. Such collision avoidance may be unique to such an environment (or e.g., for underwater vehicles and marine life) and may present solutions specific to an aerial environment. For example, if confronted by a flock of birds, a master drone may be configured to control the other drones group together and follow an 'imposing' drone or a small group of imposing drones designed to scare away birds with its appearance. The drones may thus be able to avoid collisions by grouping together under the control of the master drones and, once clear of the flock of birds, may be able to desensitize their sensor arrays if no other obstacles are nearby.

Additionally, in some aspects where people, such as workers, carrying terminal devices connected to network access node 8212 are within the operating area of autonomous moving devices 8202-8210, network access node 8212 may additionally utilize the terminal devices in order to track movement of the workers and treat the workers as mobile obstacles. Network access node 8212 may rely on information about how many terminal devices are within its coverage area (e.g., in the manner of FIG. 87) and/or rely on location reports provided by the terminal devices in order to track the location of the terminal devices and thus determine whether a surrounding vicinity of any of autonomous moving devices 8202-8210 are free of workers and/or in low traffic scenarios. Network access node 8212 may then provide traffic situation updates to e.g., autonomous moving device 8202 detailing the presence of any workers carrying terminal devices, other autonomous moving devices, other mobile obstacles, other immobile obstacles, etc. If workers are in the operating area of network access node 8212 that are not carrying terminal devices connected to network access node 8212, network access node 8212 may also be able to detect the workers as mobile obstacles via sensor data.

Accordingly, autonomous moving devices may receive traffic situation information related to collision avoidance and utilizing the traffic situation information to adjust collision sensor sensitivity. As described above, such may enable autonomous moving devices to reduce power consumption by reducing sensor sensitivity in low traffic situations.

Figure 90:
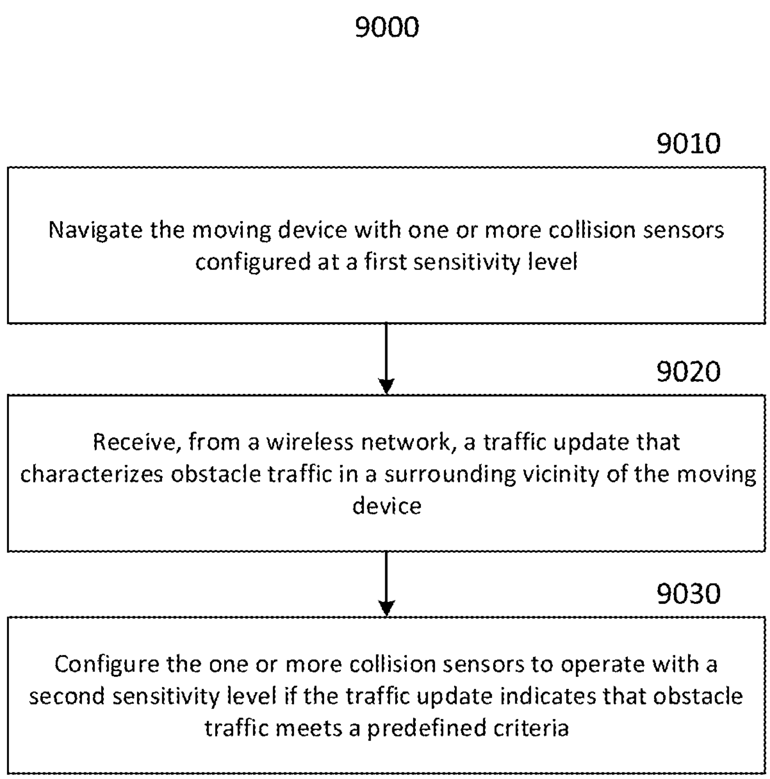
FIG. 90 shows an exemplary method of operating a moving device in accordance with some aspects.

FIG. 90 shows exemplary method 9000 of operating a moving device according to some aspects. As shown in FIG. 90, method 9000 includes navigating the moving device with one or more collision sensors configured at a first sensitivity level (9010). A traffic update is received, from a wireless network, a traffic update that characterizes obstacle traffic in a surrounding vicinity of the moving device (9020). The one or more collision sensors are configured to operate with a second sensitivity level if the traffic update indicates that obstacle traffic meets a predefined criteria (9030).

3 Context-Awareness

Designers and manufacturers may aim to optimize device and network operation in order to improve a variety of functions such as battery life, data throughput, network load, radio interference, etc. As detailed below for the various aspects of this disclosure related to context-awareness, the collection and processing of context information, including device location and movement, past user activity and routines, history or usage patterns of mobile and desktop applications, etc., may provide a valuable mechanism to optimize such functions. These aspects may be used with other power saving methods described herein, e.g., the use of context information only when needed, or adapting the schedule of context information to reduce power and increase operation time.

Figure 91:
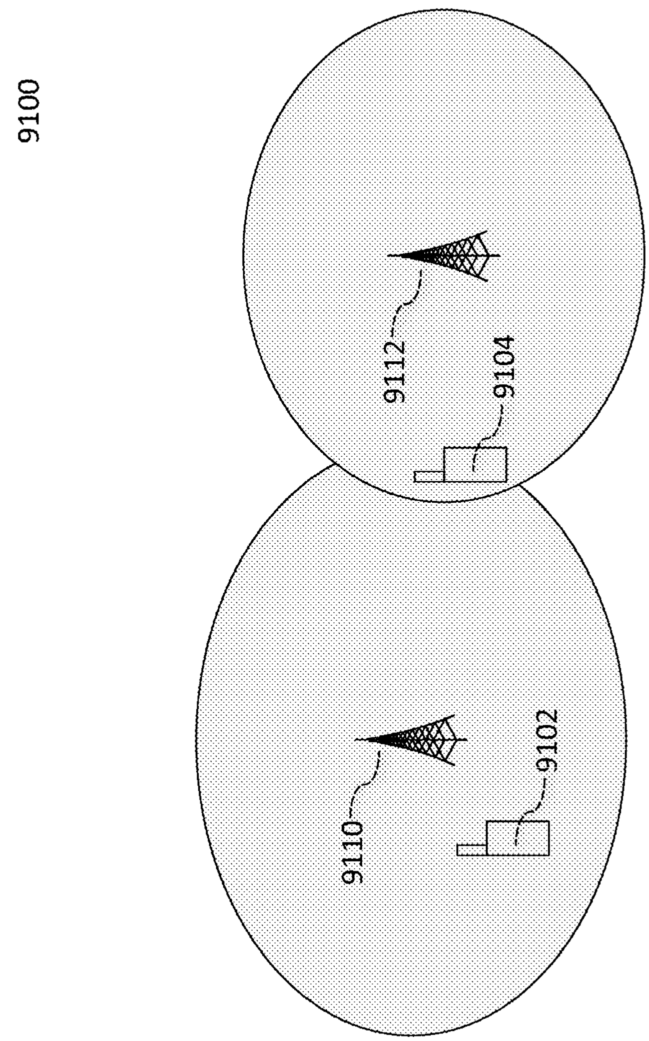
FIG. 91 shows an exemplary radio communication network in accordance with some aspects.

FIG. 91 shows radio communication network 9100 in accordance with some aspects, which may include terminal devices 9102 and 9104 in addition to network access nodes 9110 and 9112. Although certain aspects of this disclosure may describe certain radio communication network setting (such as an LTE, UMTS, GSM, other 3rd Generation Partnership Project (3GPP) networks, WLAN/Wi-Fi, Bluetooth, 5G, mmWave, device-to-device (D2D), etc.), the subject matter detailed herein is considered demonstrative in nature and may therefore be analogously applied to any other radio communication network. The number of network access nodes and terminal devices in radio communication network 9100 is exemplary and is scalable to any amount.

Accordingly, in an exemplary cellular setting network access nodes 9110 and 9112 may be base stations (e.g., eNodeBs, NodeBs, Base Transceiver Stations (BTSs), etc.) while terminal devices 9102 and 9104 may be cellular terminal devices (e.g., Mobile Stations (MSs), User Equipments (UEs), etc.). Network access nodes 9110 and 9112 may therefore interface (e.g., via backhaul interfaces) with a cellular core network such as an Evolved Packet Core (EPC, for LTE), Core Network (CN, for UMTS), or other cellular core network, which may also be considered part of radio communication network 9100. The cellular core network may interface with one or more external data networks. In an exemplary short-range setting, network access node 9110 and 9112 may be access points (APs, e.g., WLAN or Wi-Fi APs) while terminal device 9102 and 9104 may be short range terminal devices (e.g., stations (STAs)). Network access nodes 9110 and 9112 may interface (e.g., via an internal or external router) with one or more external data networks.

Network access nodes 9110 and 9112 (and other network access nodes of radio communication network 9100 not explicitly shown in FIG. 91) may accordingly provide a radio access network to terminal devices 9102 and 9104 (and other terminal devices of radio communication network 9100 not explicitly shown in FIG. 91). In an exemplary cellular setting, the radio access network provided by network access nodes 9110 and 9112 may enable terminal devices 9102 and 9104 to wirelessly access the core network via radio communications. The core network may provide switching, routing, and transmit for traffic data related to terminal devices 9102 and 9104 and may provide access to various internal (e.g., control nodes, other terminal devices on radio communication network 9100, etc.) and external data networks (e.g., data networks providing voice, text, multimedia (audio, video, image), and other Internet and application data). In an exemplary short-range setting, the radio access network provided by network access nodes 9110 and 9112 may provide access to internal (e.g., other terminal devices connected to radio communication network 9100) and external data networks (e.g., data networks providing voice, text, multimedia (audio, video, image), and other Internet and application data).

The radio access network and core network (if applicable) of radio communication network 9100 may be governed by network protocols that may vary depending on the specifics of radio communication network 9100. Such network protocols may define the scheduling, formatting, and routing of both user and control data traffic through radio communication network 9100, which includes the transmission and reception of such data through both the radio access and core network domains of radio communication network 9100. Accordingly, terminal devices 9102 and 9104 and network access nodes 9110 and 9112 may follow the defined network protocols to transmit and receive data over the radio access network domain of radio communication network 9100 while the core network may follow the defined network protocols to route data within and outside of the core network. Exemplary network protocols include LTE, UMTS, GSM, WiMAX, Bluetooth, Wi-Fi, mmWave, etc., any of which may be applicable to radio communication network 9100.

Figure 92:
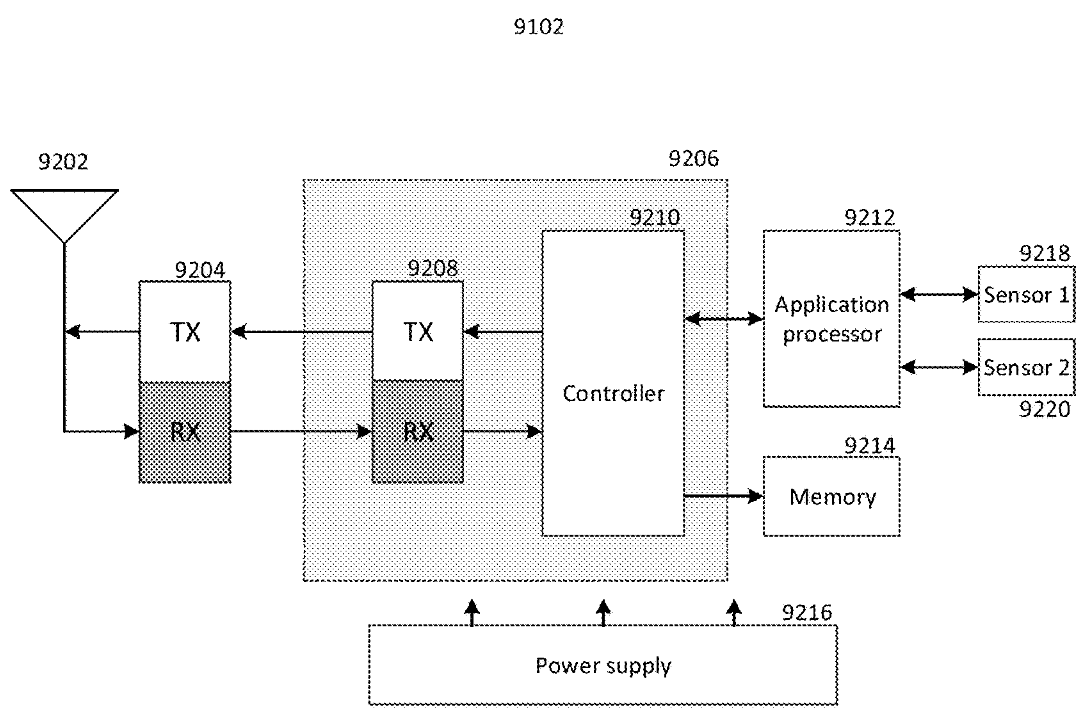
FIG. 92 shows an exemplary internal configuration of a terminal device in accordance with some aspects.

FIG. 92 shows an internal configuration of terminal device 9102 according to some aspects, which may include antenna system 9202, radio frequency (RF) transceiver 9204, baseband modem 9206 (including physical layer processing module 9208 and controller 9210), application processor 9212, memory 9214, power supply 9216, sensor 9218, and sensor 9220. Although not explicitly shown in FIG. 92, terminal device 9102 may include one or more additional hardware, software, and/or firmware components (such as processors/microprocessors, controllers/microcontrollers, other specialty or generic hardware/processors/modules, etc.), peripheral device(s), memory, power supply, external device interface(s), subscriber identify module(s) (SIMs), user input/output devices (display(s), keypad(s), touchscreen(s), speaker(s), external button(s), camera(s), microphone(s), etc.), etc.

In an abridged operational overview, terminal device 9102 may transmit and receive radio signals on one or more radio access networks. Baseband modem 9206 may direct such communication functionality of terminal device 9102 according to the communication protocols associated with each radio access network, and may execute control over antenna system 9202 and RF transceiver 9204 in order to transmit and receive radio signals according to the formatting and scheduling parameters defined by each communication protocol. Although various practical designs may include separate communication components for each supported radio access technology (e.g., a separate antenna, RF transceiver, physical layer processing module, and controller), for purposes of conciseness the configuration of terminal device 9102 shown in FIG. 92 depicts only a single instance of each such components.

Terminal device 9102 may transmit and receive radio signals with antenna system 9202, which may be a single antenna or an antenna array comprising multiple antennas and may additionally include analog antenna combination and/or beamforming circuitry. In the receive path (RX), RF transceiver 9204 may receive analog radio frequency signals from antenna system 9202 and perform analog and digital RF front-end processing on the analog radio frequency signals to produce digital baseband samples (e.g., In-Phase/Quadrature (IQ) samples) to provide to baseband modem 9206. RF transceiver 9204 may accordingly include analog and digital reception components including amplifiers (e.g., a Low Noise Amplifier (LNA)), filters, RF demodulators (e.g., an RF IQ demodulator)), and analog-to-digital converters (ADCs) to convert the received radio frequency signals to digital baseband samples. In the transmit path (TX), RF transceiver 9204 may receive digital baseband samples from baseband modem 9206 and perform analog and digital RF front-end processing on the digital baseband samples to produce analog radio frequency signals to provide to antenna system 9202 for wireless transmission. RF transceiver 9204 may thus include analog and digital transmission components including amplifiers (e.g., a Power Amplifier (PA), filters, RF modulators (e.g., an RF IQ modulator), and digital-to-analog converters (DACs) to mix the digital baseband samples received from baseband modem 9206 to produce the analog radio frequency signals for wireless transmission by antenna system 9202. Baseband modem 9206 may control the RF transmission and reception of RF transceiver 9204, including specifying the transmit and receive radio frequencies for operation of RF transceiver 9204.

As shown in FIG. 92, baseband modem 9206 may include physical layer processing module 9208, which may perform physical layer (Layer 1) transmission and reception processing to prepare outgoing transmit data provided by controller 9210 for transmission via RF transceiver 9204 and prepare incoming received data provided by RF transceiver 9204 for processing by controller 9210. Physical layer processing module 9208 may accordingly perform one or more of error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Physical layer processing module 9208 may be structurally realized as a hardware-defined module, e.g., as one or more dedicated hardware circuits or FPGAs, as a software-defined module, e.g., as one or more processors configured to retrieve and execute program code defining arithmetic, control, and I/O instructions (e.g., software and/or firmware instructions) stored in a non-transitory computer-readable storage medium, or as a mixed hardware-defined and software-defined module. Although not explicitly shown in FIG. 92, physical layer processing module 9208 may include a physical layer controller configured to control the various hardware and software processing components of physical layer processing module 9208 in accordance with physical layer control logic defined by the communications protocol for the relevant radio access technologies. Furthermore, while physical layer processing module 9208 is depicted as a single component in FIG. 92, physical layer processing module 9208 may be collectively composed separate sections of physical layer processing components where each respective section is dedicated to the physical layer processing of a particular radio access technology.

Terminal device 9102 may be configured to operate according to one or more radio access technologies, which may be directed by controller 9210. Controller 9210 may thus be responsible for controlling the radio communication components of terminal device 9102 (antenna system 9202, RF transceiver 9204, and physical layer processing module 9208) in accordance with the communication protocols of each supported radio access technology, and accordingly may represent the Access Stratum and Non-Access Stratum (NAS) (also encompassing Layer 2 and Layer 3) of each supported radio access technology. Controller 9210 may be structurally embodied as a protocol processor configured to execute protocol software (retrieved from a controller memory) and subsequently control the radio communication components of terminal device 9102 in order to transmit and receive communication signals in accordance with the corresponding protocol control logic defined in the protocol software.

Controller 9210 may therefore be configured to manage the radio communication functionality of terminal device 9102 in order to communicate with the various radio and core network components of radio communication network 9100, and accordingly may be configured according to the communication protocols for multiple radio access technologies. Controller 9210 may, for example, be a unified controller that is collectively responsible for all supported radio access technologies (e.g., LTE and GSM/UMTS) or may comprise multiple controllers where each controller may be a dedicated controller for a particular radio access technology, such as a dedicated LTE controller and a dedicated legacy controller (or alternatively a dedicated LTE controller, dedicated GSM controller, and a dedicated UMTS controller). Regardless, controller 9210 may be responsible for directing radio communication activity of terminal device 9102 according to the communication protocols of the LTE and legacy networks. As previously noted regarding physical layer processing module 9208, one or both of antenna system 9202 and RF transceiver 9204 may similarly be partitioned into multiple dedicated components that each respectively correspond to one or more of the supported radio access technologies. Depending on the specifics of each such configuration and the number of supported radio access technologies, controller 9210 may be configured to control the radio communication operations of terminal device 9102 in accordance with a master/slave RAT hierarchical or multi-SIM scheme.

Terminal device 9102 may also include application processor 9212, memory 9214, and power supply 9216. Application processor 9212 may be a CPU configured to execute various applications and/or programs of terminal device 9102 at an application layer of terminal device 9102, such as an Operating System (OS), a User Interface (UI) for supporting user interaction with terminal device 9102, and/or various user applications. The application processor may interface with baseband modem 9206 as an application layer to transmit and receive user data such as voice data, audio/video/image data, messaging data, application data, basic Internet/web access data, etc., over the radio network connection(s) provided by baseband modem 9206.

Memory 9214 may embody a memory component of terminal device 9102, such as a hard drive or another such permanent memory device. Although depicted separately in FIG. 92, in some aspects baseband modem 9206 and/or application processor 9212 may each have a dedicated memory, such as a dedicated baseband memory integrated into or interfacing with baseband modem 9206 and/or a dedicated application-layer memory integrated into or interfacing with application processor 9212. Additionally or alternatively, in some aspects baseband modem 9206 may utilize a memory connected to application processor 9212. Although not explicitly depicted in FIG. 92, the various other components of terminal device 9102 shown in FIG. 92 may additionally each include integrated permanent and non-permanent memory components, such as for storing software program code, buffering data, etc.

Power supply 9216 may be an electrical power source that provides power to the various electrical components of terminal device 9102. Depending on the design of terminal device 9102, power supply 9216 may be a 'finite' power source such as a battery (rechargeable or disposable) or an 'indefinite' power source such as a wired electrical connection. Operation of the various components of terminal device 9102 may thus pull electrical power from power supply 9216.

Sensors 9218 and 9220 may be sensors that provide sensor data to application processor 9212. Sensors 9218 and 9220 may be any of a location sensor (e.g., a global navigation satellite system (GNSS) such as a Global Positioning System (GPS)), a time sensor (e.g., a clock), an acceleration sensor/gyroscope, a radar sensor, a light sensor, an image sensor (e.g., a camera), a sonar sensor, etc. Although shown as connected with application processor 9212 in FIG. 92, in some aspects sensors 9218 and 9220 can interface with baseband modem 9206 (e.g., via a hardware interface). Baseband modem 9206 may then route sensor data to application processor 9212.

In accordance with some radio communication networks, terminal devices 9102 and 9104 may execute mobility procedures to connect to, disconnect from, and switch between available network access nodes of the radio access network of radio communication network 9100. As each network access node of radio communication network 9100 may have a specific coverage area, terminal devices 9102 and 9104 may be configured to select and re-select between the available network access nodes in order to maintain a strong radio access connection with the radio access network of radio communication network 9100. For example, terminal device 9102 may establish a radio access connection with network access node 9110 while terminal device 9104 may establish a radio access connection with network access node 9112. In the event that the current radio access connection degrades, terminal devices 9102 or 9104 may seek a new radio access connection with another network access node of radio communication network 9100; for example, terminal device 9104 may move from the coverage area of network access node 9112 into the coverage area of network access node 9110. As a result, the radio access connection with network access node 9112 may degrade, which terminal device 9104 may detect via radio measurements such as signal strength or signal quality measurements of network access node 9112. Depending on the mobility procedures defined in the appropriate network protocols for radio communication network 9100, terminal device 9104 may seek a new radio access connection (which may be triggered at terminal device 9104 or by the radio access network), such as by performing radio measurements on neighboring network access nodes to determine whether any neighboring network access nodes can provide a suitable radio access connection. As terminal device 9104 may have moved into the coverage area of network access node 9110, terminal device 9104 may identify network access node 9110 (which may be selected by terminal device 9104 or selected by the radio access network) and transfer to a new radio access connection with network access node 9110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Figure 93:
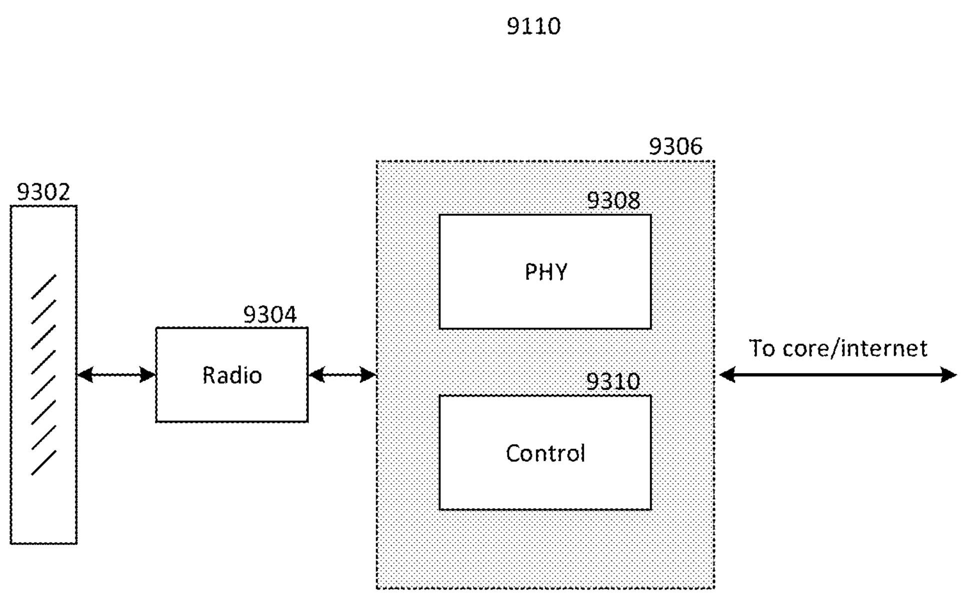
FIG. 93 shows an exemplary internal configuration of a network access node in accordance with some aspects.

FIG. 93 shows an internal configuration of a network access node such as network access node 9110 as introduced in FIG. 91, which may be configured to execute method 10200. As shown in FIG. 93, network access node 9110 may include antenna system 9302, radio module 9304, and communication module 9306 (including physical layer module 9308 and control module 9310). In an abridged overview of the operation of network access node 9110, network access node 9110 may transmit and receive radio signals via antenna system 9302, which may be an antenna array comprising multiple antennas. Radio module 9304 may perform transmit and receive RF processing in order to convert outgoing digital data from communication module 9306 into analog RF signals to provide to antenna system 9302 for radio transmission and to convert incoming analog RF signals received from antenna system 9302 into digital data to provide to communication module 9306. Physical layer module 9308 may be configured to perform transmit and receive PHY processing on digital data received from radio module 9304 to provide to control module 9310 and on digital data received from control module 9310 to provide to radio module 9304. Control module 9310 may control the communication functionality of network access node 9110 according to the corresponding radio access protocols, e.g., LTE, which may include exercising control over antenna system 9302, radio module 9304, and physical layer module 9308. Each of radio module 9304, physical layer module 9308, and control module 9310 may be structurally realized as a hardware-defined module, e.g., as one or more dedicated hardware circuits or FPGAs, as a software-defined module, e.g., as one or more processors executing program code that define arithmetic, control, and I/O instructions (e.g., software and/or firmware instructions) stored in a non-transitory computer-readable storage medium, or as a mixed hardware-defined and software-defined module. In some aspects, radio module 9304 may be a radio transceiver including digital and analog radio frequency processing and amplification circuitry. In some aspects, radio module 9304 may be a software-defined radio (SDR) component implemented as a processor configured to execute software-defined instructions that specify radio frequency processing routines. In some aspects, physical layer module 9308 may be include a processor and one or more hardware accelerators, wherein the processor is configured to control physical layer processing and offload certain processing tasks to the one or more hardware accelerators. In some aspects, control module 9310 may be a controller configured to execute software-defined instructions that specify upper-layer control functions. In some aspects, control module 9310 may be limited to radio communication protocol stack layer functions, while in other aspects control module 9310 may also be responsible for transport, internet, and application layer functions.

Network access node 9110 may thus provide the functionality of network access nodes in radio communication networks by providing a radio access network to enable served terminal devices to access desired communication data. For example, communication module 9306 may interface with a core network and/or one or more internet networks, which may provide access to external data networks such as the Internet and other public and private data networks.

Radio communication networks may be highly dynamic due to a variety of factors that impact radio communications. For example, terminal devices 9102 and 9104 may move (e.g., by a user) to various different positions relative to network access nodes 9110 and 9112, which may affect the relative distances and radio propagation channels between terminal devices 9102 and 9104 and network access node 9110 and 9112. The radio propagation channels may also vary due to factors unrelated to mobility such as interference, moving obstacles, and atmospheric changes. Additionally, local conditions at terminal device 9102 and 9104, such as battery power, the use of multiple radio access technologies, varying user activity and associated data traffic demands, etc., may also impact radio communication. Radio communications may also be affected by conditions at network access nodes 9110 and 9112 in addition to the underlying core network, such as network load and available radio resources.

The radio communication environment between terminal devices 9102 and 9104 and network access nodes 9110 and 9112 may thus be in a constant state of flux. In order to operate effectively and enhance user experience, terminal devices 9102 and 9104 and network access nodes 9110 and 9112 may need to recognize such changes and adapt operation accordingly.

Radio communication systems may therefore react to changes in the surrounding environment using 'context awareness', in which, for example, terminal devices or the radio access network may utilize context information that characterizes the radio environment in order to detect and respond to changes. Thus, in some aspects, the various aspects of this disclosure related to context-awareness solutions present techniques and implementations to optimize user experience and radio communication performance via the use of context awareness.

3.1 Context-Awareness #1

In some aspects of this disclosure, a terminal device may utilize context information to optimize power consumption and/or data throughput during movement through areas of varying radio coverage. In particular, a terminal device may predict when or where the poor and strong radio coverage will occur and schedule radio activity such as cell scans and/or data transfers based on the predictions, which may enable the terminal device to conserve power by avoiding unnecessary failed cell scans and to optimize data transfer by executing transfers in high throughput conditions. In another aspect, the collection or processing of context information may be provided by a network node, e.g., a base station, mobile edge computing node, server node, cloud service, etc.

Figure 94:
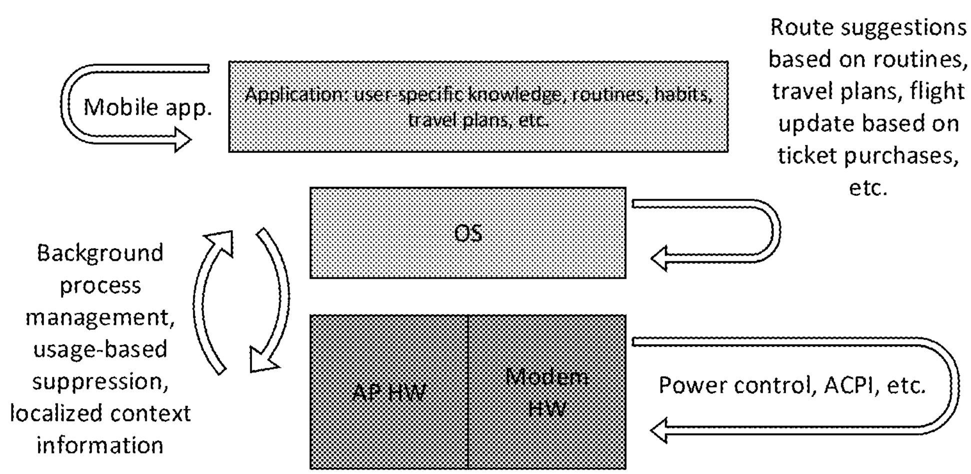
FIG. 94 shows an exemplary depiction of uses for context information at different platforms of a terminal device in accordance with some aspects.

Some terminal devices may utilize context information in a limited manner to optimize single 'platforms', such as to optimize operation of a single application program or to conserver power at a hardware level. FIG. 94 depicts exemplary usages of context information at different platforms in accordance with some aspects. For example, application programs (e.g., executed at application processor 9212) such as personal assistants, travel assistants, navigational programs, etc., may rely on application-layer context information such as the routines, habits, and scheduled plans of a user of the application program to predict user behavior and make user-specific suggestions and tracking. A navigation program may make driving route suggestions based on past routes, make travel plan suggestions based on past user destinations or past user searches, provide flight updates based on previously purchased airline tickets, etc. Such information may be provided to the application program by a user at the application layer and recycled within the application program to predict user behavior and subsequently adapt interaction with the user. Additionally, an operating system (e.g., executed at application processor 9212) may also recycle local context information to adapt operation If an application requests a background sync at a time when the device is in poor conditions, and when a user of terminal device 9102 is unlikely to see the application, then the operating system could stall the request until a later time. The decision is made as a combination of the habits and the signal environment. If it is a foreground request, then the request may not be ignored. The hardware of application processor 9212 may also interact with the operating system of application processor 9212 in order to perform background process management and usage-based suppression with local context information. Modem hardware (e.g., of baseband modem 9206) may also utilize local context information for power control (e.g., Advanced Configuration and Power Interface (ACPI)). A non-limiting example, application processor 9212 can be duty-cycled where the period of the duty cycle is adapted based on the usage patterns of the user. For example, if it is known that the user is not going to be using the device for an extended period of time in a day, and that non-critical tasks can be postponed, application processor 9212 can be put to sleep. Another non-limiting example, application processor 9212 can be duty-cycled where the period of the duty cycle is adapted based on the frequency of services, e.g., synchronization of emails.

As introduced above, various aspects of this disclosure may apply high-level context information to optimize radio activity on predicted radio conditions. Specifically, various aspects may, for example, observe user behavior (e.g., user of a mobile terminal device, users of mobile terminal devices proximate to each other, users of mobile terminal devices in a cell, area or space, etc.) to identify user-specific routines, habits, and schedules in order to predict user travel routes and subsequently optimize radio activity such as cell scans and data transfer along predicted routes. For example, by anticipating when or where a user will be in poor radio coverage along a known route (e.g., depending on base station or access point coverage, spectrum use, spectrum congestion, etc), a terminal device may, for example, suspend cell scans and/or data transfer until improved radio coverage is expected. As repeated cell scans and data transfer in low or no coverage scenarios may waste considerable battery power, terminal devices may therefore reduce power consumption and extend battery life. Additionally, in some aspects terminal devices may predict which network access nodes will be available along a predicted travel route and may utilize such information to make radio and radio access selections, such as selecting certain cells, certain networks (e.g., Public Land Mobile Networks (PLMNs)), certain RATs, certain SIMS, or certain transceivers. Terminal devices may also optimize battery life time based on expected charging times. In some aspects, terminal devices may also be able to predict radio coverage on a more fine-grained scale, such as by examining a recent trace of radio measurements and other context information to predict radio conditions for near-future time instant (e.g., in the order of milliseconds or seconds).

Figure 95:
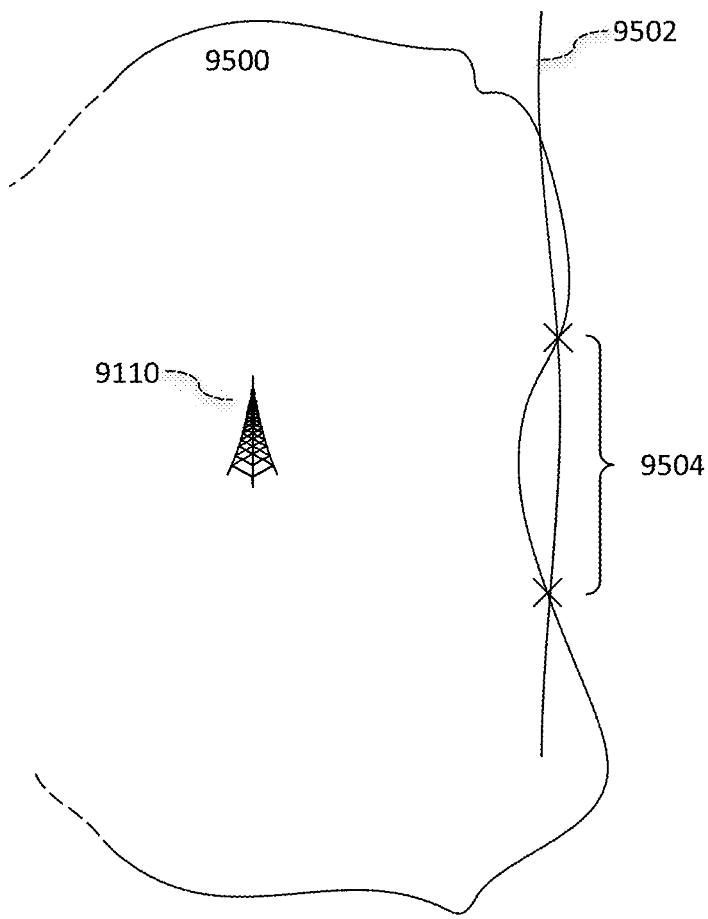
FIG. 95 shows a road travel scenario in accordance with some aspects.

FIG. 95 illustrates an exemplary application of some aspects of this disclosure to a road or path travel scenario. As shown in FIG. 95, road 9502 may be located in the vicinity of coverage area 9500 of network access node 9110. In an exemplary scenario, a user of terminal device 9102 may travel on road 9502 as part of a normal routine, such as on their everyday work route, a morning or evening walking routine, a frequent bicycling or jogging route, etc. While terminal device 9102 may be in coverage of network access node 9110 for certain sections of road 9502, other sections such as section 9504 of road 9502 may fall outside of coverage area 9500. Terminal device 9102 may therefore have low or no signal coverage (e.g., poor radio coverage) when the user is driving along section 9504 (e.g., where no other network access nodes may be nearby to provide coverage to section 9504). Similar scenarios may, for example, occur in coverage 'holes' in coverage area 9500 (not explicitly shown in FIG. 95), or if a user of terminal device 9102 travels out-of-town, e.g., to go hiking or skiing, which may produce longer time periods of poor radio coverage.

According to some operation scenarios, terminal device 9102 may repeatedly perform cell scans while moving along section 9504. However, in particular if section 9504 is a large distance, e.g., several miles, terminal device 9102 may waste considerable power in performing numerous failed cell scans. Certain solutions may employ 'backoff' techniques, such as exponential or linear backoffs. For example, if terminal device 9102 does not detect any cells during a series of cell scans, terminal device 9102 may start a backoff counter that increases exponentially or linearly with each successive failed cell scan. However, while the number of failed cell scans may be reduced by such backoff techniques, there may still be considerable power expenditure as the backoff timers may be 'blind' and may not utilize any indication of a user's actual behavior. Furthermore, cell scans may be excessively delayed when a user moves back into cell coverage, in particular if a large backoff timer is started right before a user returns to cell coverage. Users of terminal device 9102 may also manually shut off terminal device 9102 or place terminal device 9102 into airplane mode; however, it is unlikely that a user will be aware of an optimal time to reactivate terminal device 9102.

In addition to OOC scenarios, in some aspects there may be situations where terminal device 9102 has limited signal coverage from network access node 9110, such as near the cell edges of coverage area 9500 or in other sections of coverage area 9500 where the radio channel is obstructed or has strong interference. While terminal device 9102 may be able to maintain a connection with network access node 9110 in such low signal scenarios, terminal device 9102 may attempt to perform cell scans (e.g., by the wireless standard as specified by triggering thresholds based on signal strength or quality) in order to search for network access nodes that provide better coverage. Similar to the above case, there may not be any other network access nodes within the detectable range of terminal device 9102; consequently, any cell scans may not detect any other network access nodes and result in a considerable waste of battery power.

Additionally, in some aspects poor signal conditions may impede data transfer by terminal device 9102. As radio conditions may be poor, terminal device 9102 may utilize a simple modulation scheme and/or high coding rate, which may result in slow data transfer speeds. Poor radio conditions may also yield significant transmission errors, which may produce a high number of retransmissions. Accordingly, terminal device 9102 may experience high battery drain when attempting data transfer while in low signal conditions (such as at the cell edge of coverage area 9500).

In recognition of these issues, various aspects may, for example, utilize high-level context information (e.g., obtained at the application layer from a user) of terminal device 9102, including user/device attribute, time/sensory information, location information, user-generated movement information, detected networks, signal strength/other radio measurements, battery charging, active applications, current data traffic demands and requirements, etc., to, for example, predict travel routes and optimize radio activity along the travel routes. In particular, various aspects may, for example, optimize cell scan timing, data transfer scheduling, and radio access selections based on factors such as predicted routes and corresponding predicted radio conditions. For example, upon detecting an identifiable route that a user is traveling on, terminal device 9102 may anticipate that the user will continue along the route to obtain a predicted route and may subsequently predict radio conditions along the predicted route (e.g., using previously obtained radio measurements along the route and/or crowdsourced information). Terminal device 9102 may then suspend cell scans during OOC or other poor coverage scenarios, schedule data transfer for strong radio conditions, and perform radio access selections of cells, networks, and RATs based on the predicted radio conditions along the predicted route.

In some aspects, terminal device 9102 may also, for example, optimize battery life time based on expected charging times. For example, terminal device 9102 may monitor when power supply 9216 is being charged to identify regular times and/or locations when a user charges terminal device 9102. Terminal device 9102 may then predict an expected time until next charge and subsequently adjust power consumption at terminal device 9102 (e.g., by entering low power or sleep states) based, for example, on the expected time until next charge. Additionally, terminal device 9102 may, for example, shut down certain tasks and applications at baseband modem 9206 and application processor 9212 in order to conserve power. For example, if battery life at power supply 9216 is low, then baseband modem 9206 can switch to a lower-power RAT (e.g., a RAT that is more power-efficient) and/or may shut down non-critical tasks such as data. In some aspects, the Wi-Fi modem (e.g., integrated as part of baseband modem 9206 or implemented as a separate component) could be completely turned off and only be activated if the user wants to use Wi-Fi. In another example, application processor 9212 could be put in an idle mode (except for monitoring system-critical tasks) and/or suspend background synchronization procedures.

Figure 96:
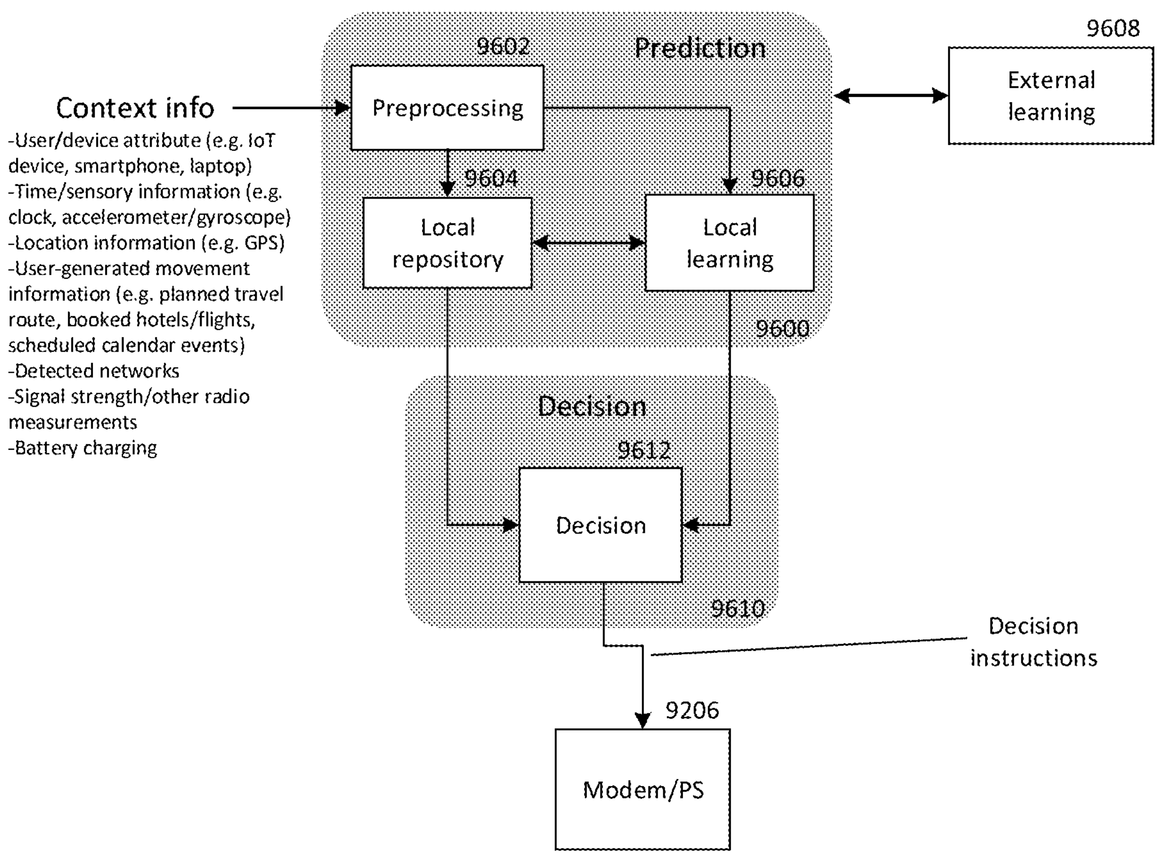
FIG. 96 shows an exemplary implementation of a terminal device in accordance with some aspects.

FIG. 96 shows a functional diagram of terminal device 9102 in accordance with some aspects. As shown in FIG. 96, prediction engine 9600 may include preprocessing module 9602, local repository 9604, and local learning module 9606 while decision engine 9610 may include decision module 9612. As will be described in detail, prediction engine 9600 may receive context information as input, which prediction engine 9600 may, for example, process, store, and evaluate in order to make predictions about expected user behavior including in particular user travel routes. Prediction engine 9600 may also receive input from external learning module 9608, which may enable prediction engine 9600 to predict user routes and radio conditions based on ‘crowdsourced’ context information from other terminal devices. Prediction engine 9600 may, for example, provide predicted travel routes and predicted radio conditions to decision engine 9610, which may render radio activity decisions at decision module 9612 based, for example, on the predicted user routes and/or predicted radio conditions and provide the radio activity instructions to baseband modem 9206 of terminal device 9102 (e.g., to the protocol stack of baseband modem 9206 for execution). The corresponding functionality of the components of prediction engine 9600 and decision engine 9610 may be structurally realized as a hardware-defined module, e.g., as one or more dedicated hardware circuits or FPGAs, as a software-defined module, e.g., as one or more processors executing program code that define arithmetic, control, and I/O instructions (e.g., software and/or firmware instructions) stored in a non-transitory computer-readable storage medium, or as a mixed hardware-defined and software-defined module. Accordingly, while the individual components of prediction engine 9600 and decision engine 9610 are depicted separately in FIG. 96, this depiction serves to highlight the operation of prediction engine 9600 and decision engine 9610 on a functional level; consequently, in some aspects one or more of the components of prediction engine 9600 and decision engine 9610 may be integrated into a common hardware and/or software element. Additionally, the functionality detailed herein (in particular e.g., the formulas/equations, flow charts, and prose descriptions) may be readily incorporated by skilled persons into program code for retrieval from a non-transitory computer readable medium and execution by a processor. In accordance with the configuration of terminal device 9102 depicted in FIG. 92, prediction engine 9600 and decision engine 9610 may, for example, be implemented as software-defined instructions that are retrieved and executed at application processor 9212 (and/or, e.g., at controller 9210). Prediction engine 9600 and decision engine 9610 may thus be configured to process and evaluate high-level context information obtained at an application layer of terminal device 9102 and apply the context information to influence radio activity at baseband modem 9206.

As previously indicated, terminal device 9102 may utilize context information, for example, to control radio activity, and in particular, to evaluate context information to predict user travel routes and radio conditions and to subsequently control radio activity based thereon. As shown in FIG. 96, prediction engine 9600 may collect a variety of high-level context information, including user/device attributes (e.g., the type of device, including IoT device, smartphone, laptop, tablet, etc.), time/sensory information (e.g., from a clock, accelerometer/gyroscope, etc., which may be sensors 9218 and 9220), location information (e.g., from a GNSS such as a GPS), user-generated movement information (e.g., planned travel routes from a navigation application (which may be executed at application processor 9212 or in a vehicle/other device connected to terminal device 9102, such as a vehicular navigation system connected to terminal device 9102 with e.g., Bluetooth), booked hotels/flights/trains from a travel booking application, scheduled calendar events from a calendar application, etc.), detected network information (e.g., network access node or cell ID, network or PLMN ID, battery information (e.g., indicators when power supply 9216 is being charged, current battery power levels, etc.), etc., which may, for example, be provided by baseband modem 9206 and/or the application layer), radio measurements (e.g., signal strength measurements, signal quality measurements, interference measurements, etc., which may, for example, be provided by baseband modem 9206 and/or the application layer), battery charging information (e.g., by monitoring power supply 9216).

Accordingly, one or more applications executed at application processor 9212 may provide such context information to prediction engine 9600. Additionally, one or more sensors, such as sensors 9218 and 9220 (e.g., a location sensor and a time sensor), may, in addition to baseband modem 9206, provide other context information to processing engine 9600 as specified above. Preprocessing module 9602 may receive such context information and interpret and organize the received context information before providing it to local repository 9604 and local learning module 9606. For example, preprocessing module 9602 may receive incoming context information and prepare the context information in a manner that is consistent for prediction engine 9600 to utilize, e.g., for storage and/or use. This may include discarding data, interpolating data, converting data, or other such operations to arrange the data in a proper format for prediction engine 9600. Furthermore, in some aspects, preprocessing module 9602 may associate certain context information with other context information during preprocessing, such as detected network information and signal strength measurements associated with a particular location, time, or route, and provide the associated context information to local repository 9604 for storage. In some aspects, preprocessing module 9602 may continually receive context information from the various applications, sensors, location systems, and baseband modem 9206 and may continuously perform the preprocessing before providing the preprocessed context information to local repository 9604 and local learning module 9606.

As previously detailed, terminal device 9102 may predict user travel routes based on the context information and subsequently apply the predicted user travel routes to optimize radio activity. Terminal device 9102 may be configured to detect when a user is traveling on an identifiable route and subsequently anticipate that the user will continue to follow the identifiable route. For example, in some aspects terminal device 9102 may utilize context information to detect when a user is traveling on a regular route (e.g., a driving route between home and work or another frequently traveled route) or is traveling on a planned route (e.g., traveling to a target destination with a navigation application, on a planned vacation, traveling to a scheduled appointment at a particular location, etc.). After detecting that a user is traveling, for example, on a regular or planned route, terminal device 9102 may predict user behavior, for example, by anticipating that the user will continue along the detected route. In some aspects, terminal device 9102 may utilize probabilistic prediction based on multiple possible routes. In an exemplary scenario, a user may sometimes go directly home after work and other times go to a school to pick up children. Accordingly, terminal device 9102 may be configured to make predictions based on the probability of different possible routes. In some aspects, terminal device 9102 may perform a statistical estimation of which routes a user could take based on a prior probability, and can then update a posterior probability based on observations as the user starts traveling on a particular route.

For example, by monitoring context information such as location information (such as by tracking GPS positions over multiple days/weeks), user-generated movement information (such as by tracking target destinations over multiple days/weeks), time/sensory information (such as by evaluating times/dates when routes are taken), and radio-related context information including detected networks (such as by recognizing certain PLMNs, cells, and RATs that are available on certain routes) of terminal device 9102 over time, local learning module 9606 may 'learn' certain routes that a user frequently uses, such as a route from home to work. As local learning module 9606 may perform such learning based on accumulated past context information, prediction engine 9600 may store previously preprocessed context information in local repository 9604. Local learning module 9606 may therefore access previously preprocessed context information in order to evaluate the previously preprocessed context information to detect travel patterns and consequently learn regular routes. Local learning module 9606 may therefore generate regular routes based on the previously preprocessed context information and save the regular routes (e.g., defined as a sequence of locations).

Local learning module 9606 may then monitor current and recent (e.g., over the last 5 minutes, over the last 5 miles of travel, etc.) context information provided by preprocessing module 9602 to detect when a user is traveling along a previously learned regular route. For example, local learning module 9606 may compare current/recent location information, time/sensory information, and detected network information to the saved context information of previously learned regular routes to determine whether a user is traveling on a regular route. If the current/recent location information, time/sensory information, and/or detected network information matches the saved context information for a previously learned regular route, local learning module 9606 may determine that a user is traveling along the matched regular route. Local learning module 9606 may then predict user movement by, for example, anticipating that the user will continue moving along the matched regular route. Although in certain cases not as predictive as frequently traveled routes, local learning module 9606 may also compare current and recent context information, especially related to location and time, to context information for known roads such as highways stored at local repository 9604. If, for example, the current and recent context information matches the context information for a known road, local learning module 9606 may detect that a user is traveling along the road. In particular if the road is e.g., a highway, local learning module 9606 may anticipate that the user will continue along the road for a duration of time and utilize the current road as a regular route. Local learning module 9606 may also classify regular routes such as a home to work route based on which roads are the regular route and later detect that a user is traveling along the regular route by detecting that a user has traveled along the roads of the regular route in sequence.

In addition to detecting when a user is on a regular route, local learning module 9606 may also be configured to detect when a user is traveling on a planned route, such as a route entered into a navigation application, along a route to an appointment scheduled in a calendar application, etc. For example, local learning module 9606 may monitor user-generated movement information provided by preprocessing module 9602 to detect e.g., when a user enters a route into a navigation program, when a user books a vacation/flight/train/bus in a travel application, when a user has a scheduled calendar event or appointment with a specified location, etc. As such user-generated movement information may directly identify a route (or at least a target destination for which a planned route can be identified), local learning module 9606 may utilize such user-generated movement information to identity planned routes and consequently predict user behavior by anticipating that a user will continue along the planned route.

In addition to predicting user movement based on regular and planned routes, prediction engine 9600 may also predict radio conditions along routes in order to ultimately make radio activity decisions (such as suspending cell searches, rescheduling data transfers, making radio access selections, optimizing power consumption levels, etc.). Prediction engine 9600 may therefore also store radio-related context information including previously detected network information and past radio measurements in local repository 9604. As previously indicated, preprocessing module 9602 may associate such radio-related context information with other context information such as location information, user-generated movement information, and time/sensory information. Accordingly, local repository 9604 may have a record of detected networks (such as which PLMNs are available, which cells are available, which RATs are available) and radio measurements (e.g., signal strength, signal quality, and interference measurements) that match with certain locations, routes, and/or times/dates.

In addition to storing context information explicitly in local repository 9604, local learning module 9606 may in some aspects also be configured to generate more complex data structures such as Radio Environment Maps (REMs) or other types of radio coverage maps. Such REMs may be map-like data structures that specify radio conditions over a geographic area along with other information such as network and RAT coverage, network access node locations, and other radio-related information. Accordingly, local learning module 9606 may be configured to generate such an REM and utilize the REM in order to predict radio conditions along a particular travel route. For example, upon identifying a predicted route, local learning module 9606 may access the REM stored in local repository 9604 and determine radio coverage along the predicted route in addition to which networks, cells, and RATs are available at various locations along the predicted route.

Local learning module 9606 may utilize radio-related context information observed by terminal device 9102 to generate the REM, including in particular radio measurements at different locations, and may also apply a radio propagation model using such radio measurements to generate a comprehensive coverage map. However, an REM generated with local observations may be useful for routes that a user has previously taken, such as a regular route, the REM may in some cases not be useful in predicting radio conditions for new routes, such as a new planned route detected via user-generated movement information (e.g., by detecting that a user has entered a new route into a navigation program, by identifying an appointment in a calendar application that is in a new location, etc.). Accordingly, in some aspects prediction engine 9600 may rely on crowdsourced information obtained via external learning module 9608, which may be located external to terminal device 9102 such as a cloud-based server, edge computing server (e.g., a Mobile Edge Computing (MEC) server), a server in the core network, or a component of network access node 9110. Regardless of deployment specifics, external learning module 9608 may utilize crowdsourced information provided by other terminal devices and provide radio-related context information to prediction engine 9600. For example, external learning module 9608 may be an edge or cloud server configured to generate REMs and other coverage data based on crowdsourced context information provided by multiple terminal devices. Local learning module 9606 may therefore query external learning module 9608 (e.g., via a software-level connection that relies on the radio access network via network access node 9110 for data transfer) for radio-related context information or predicted radio conditions. For example, local learning module 9606 may identify a new predicted route and may query external learning module 9608 with the new route (or locations proximate to the new route). External learning module 9608 may then respond with radio-related context information and/or predicted radio conditions (which external learning module 9608 may generate with an REM), which local learning module 9606 may utilize to predict radio conditions along the new route. External learning module 9608 may therefore either respond with 'raw' radio-related context information, e.g., by providing radio-related context information along with associated location and/or user-generated movement information, or may perform the radio condition prediction at external learning module 9608 (e.g., with an REM) and respond to local learning module 9606 with predicted radio conditions along the new route.

Local learning module 9606 may continually and/or periodically evaluate context information provided by preprocessing module 9602 in order to learn and update regular routes, to detect when a user is traveling on a regular route or on a planned route, and to predict radio conditions on a particular detected route. As shown in FIG. 96, local learning module 9606 may provide predicted radio conditions and predicted route information to decision module 9612 of decision engine 9610. In accordance with some aspects, decision module 9612 may control radio activity such as cell scans, data transfer, and radio access selection based on the predicted radio conditions and predicted route information. As shown in FIG. 96, decision module 9612 may provide instructions to baseband modem 9206 in order to control radio activity of terminal device 9102.

Figure 97:
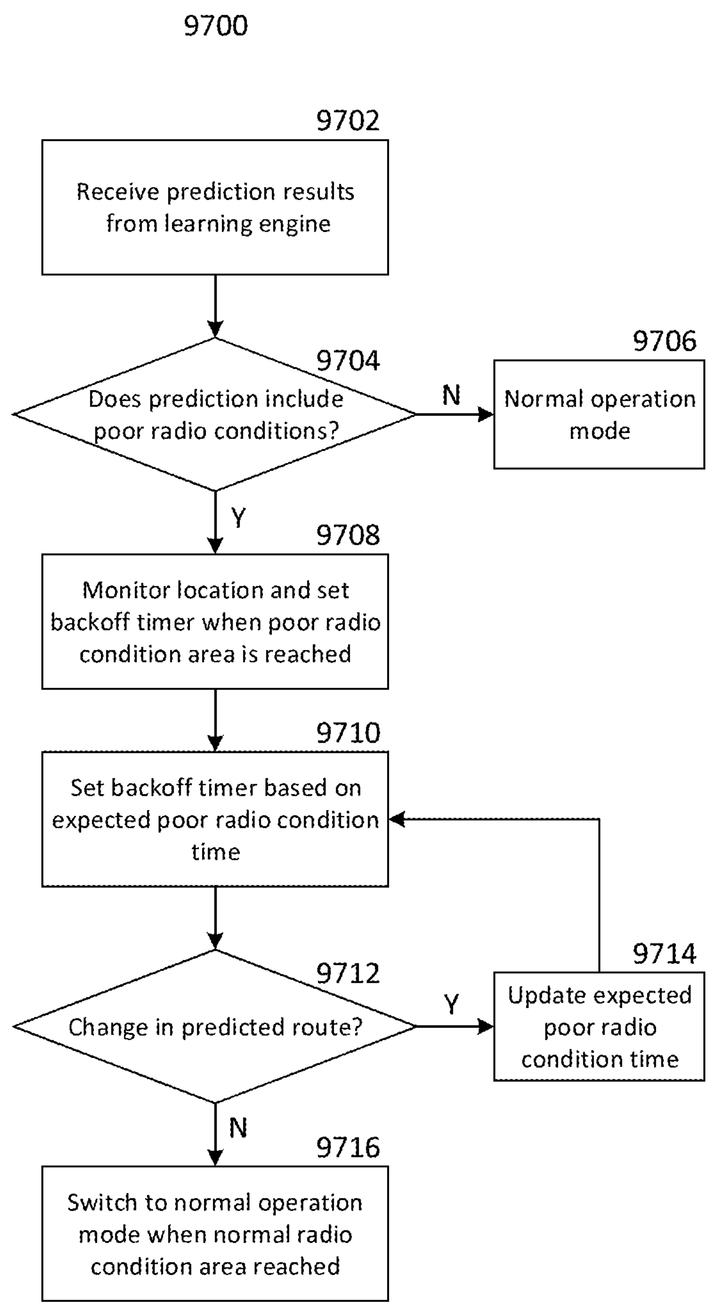
FIG. 97 shows an exemplary method at a terminal device in accordance with some aspects.

FIG. 97 shows an exemplary method 9700, which decision module 9612 may perform to make radio activity decisions related to cell scan timing based on prediction results provided by prediction engine 9600 in accordance with some aspects. As shown in FIG. 97, decision module 9612 may first receive predicted radio conditions and predicted route information from prediction engine 9600. Decision module 9612 may then evaluate the predicted radio conditions and predicted route information in 9704 to determine whether the prediction results indicate that poor radio conditions (e.g., OOC and/or low signal conditions) will be experienced along the predicted route. If decision module 9612 determines that the predicted route will not include poor radio conditions, decision module 9612 may set baseband modem 9206 to a normal operation mode at 9706; consequently, baseband modem 9206 may continue operating without intervention by decision engine 9610.

Conversely, if decision module 9612 determines that the predicted route includes poor radio conditions in 9704, decision module 9612 may proceed to 9708 to monitor the current location of terminal device 9102 in comparison with the expected poor radio condition area. For example, in the setting of FIG. 95, prediction engine 9600 may identify road 9502 as the predicted route and coverage area 9500 as the predicted radio conditions. Prediction engine 9600 may identify road 9502 as the predicted route by tracking recent location information of terminal device 9102 and matching recent location information with saved location information for a route along road 9502 or by determining that a planned route (e.g., entered at a navigation application) includes road 9502. Prediction engine 9600 may then predict radio conditions along road 9502, such as by applying a radio propagation model and/or interpolation scheme to previously obtained radio measurements at various locations along road 9502.

In various aspects, prediction engine 9600 may apply a prediction algorithm such as a machine learning algorithm to perform route predictions. For example, prediction engine 9600 may apply a Hidden Markov Model (HMM) or Bayesian tree-based algorithm (e.g., executed as instructions at a processor that defines the predictive algorithm). In some aspects, prediction engine 9600 may select the most likely route based on a generic cost function, which may be a simple probability threshold or a weighted sum. As terminal device 9102 traverses a route, prediction engine 9600 may update the probability of the next location and possible radio conditions based on observations (e.g., update the posterior probability) as the possible outcomes become narrower. In some aspects, prediction engine 9600 may utilize a MAP estimate to predict a single route. Additionally or alternatively, in some aspects prediction engine 9600 may utilize a hybrid approach that considers multiple probabilistic outcomes concurrently, and updates the probabilities based on actual observations.

The predicted radio conditions obtained by prediction engine 9600 may indicate that section 9504 has poor radio coverage (due to e.g., previous travel by terminal device 9102 on section 9504 that produced poor radio measurements and/or crowdsourced radio conditions provided by external learning module 9608 that indicate poor radio coverage on section 9504). Accordingly, decision module 9612 may utilize the predicted radio conditions to identify in 9704 that road 9502 has poor radio conditions at section 9504. Decision module 9612 may then monitor the current location of terminal device 9102 relative to section 9504 and, upon reaching the beginning of section 9504, may, e.g., set a backoff timer at baseband modem 9206 for cell scans according to the expected duration of the poor coverage conditions, e.g., the expected amount of time until improved coverage conditions are reached. Decision module 9612 may set the backoff timer based on, e.g., previously observed times that measure the time taken to travel section 9504 and/or current velocity measurements (which may, e.g., be directly available as context information or may be derived from context information, such as by comparing successive locations to estimate current velocity).

Baseband modem 9206 may then set the backoff timer as instructed by decision module 9612 and consequently may suspend cell scans until the backoff timer has expired. Accordingly, instead of triggering cell scans due to poor radio conditions (e.g., in OOC conditions or when a signal strength or signal quality of network access node 9110 falls below a threshold), baseband modem 9206 may not perform any radio scans and may as a result conserve power.

In some aspects, decision module 9612 may continue receiving prediction results from learning engine 9702 and may continually evaluate predicted route information in 9712 to determine if the predicted route has changed. For example, while prediction engine 9600 may anticipate that a user will continue on a regular or planned route, a user may make other decisions that affect the predicted route, such as by stopping a car, taking a detour, being stuck in traffic, speeding up or down; alternatively, prediction engine 9600 may have mistakenly identified another route as a regular route. Decision module 9612 may thus continuously monitor the prediction results in 9712 to identify whether the predicted route has changed. If decision module 9612 determines that the predicted route has changed in 9712, decision module 9612 may update the expected poor radio condition time in 9714 and re-set the backoff timer at baseband modem 9206 in 9710.

Decision module 9612 may continue monitoring prediction results and updating the backoff timer if necessary. Eventually, terminal device 9102 may reach the end of section 9504 and thus leave the expected poor radio condition area, which may coincide with the expiry of the backoff timer. Baseband modem 9206 may then switch to normal operation modes in 9716 and restart performing cell scans (e.g., according to cell scan triggering conditions). As opposed to section 9504 in which no cells may be available, baseband modem 9206 may re-detect network access node 9110 within range of terminal device 9102 and may subsequently re-establish a connection with network access node 9110. In other low signal conditions, such as when terminal device 9102 is at a cell edge and only a single cell is detectable, decision module 9612 may utilize the prediction results to set the backoff timer to coincide with an expected time when terminal device 9102 enters the coverage area of a stronger cell.

In a variation of method 9700, in some aspects decision module 9612 may instruct baseband modem 9206 to suspend cell scans indefinitely when decision module 9612 determines that terminal device 9102 will begin experiencing poor radio conditions along a predicted route. Decision module 9612 may continually monitor prediction results provided by prediction engine 9600 to track when terminal device 9102 is expected to return to normal radio coverage on the predicted route. When decision module 9612 determines that terminal device 9102 has returned to normal radio coverage (e.g., by comparing a current location of terminal device 9102 to an area expected to have improved radio coverage), decision module 9612 may instruct baseband modem 9206 to resume cell scans. In another modification, in some aspects decision module 9612 may request a single cell scan from baseband modem 9206 when decision module 9612 determines that terminal device 9102 has returned to normal radio coverage and may subsequently check the cell scan results to determine whether terminal device 9102 has actually returned to normal radio coverage. In all such cases, decision module 9612 may control baseband modem 9206 to suspend cell scans until decision module 9612 expects that terminal device 9102 has returned to normal radio coverage.

Figure 98:
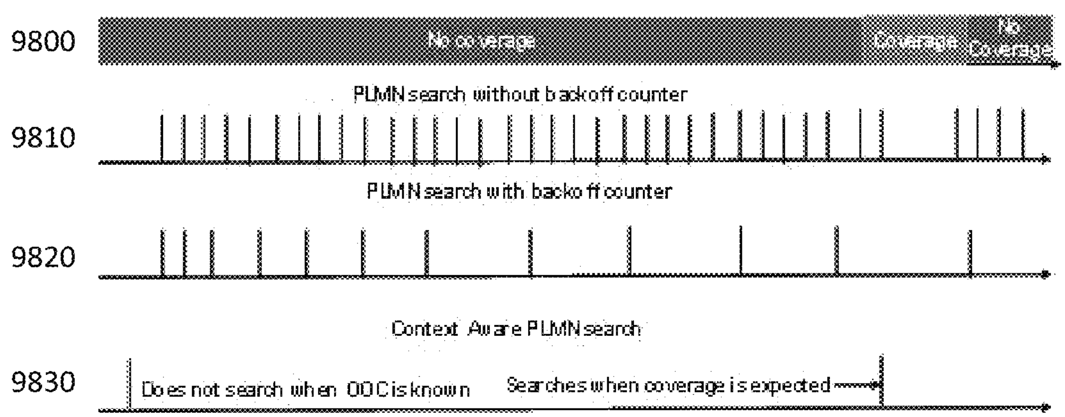
FIG. 98 shows an exemplary depiction of network scan timing results in accordance with some aspects.

FIG. 98 shows exemplary results of cell scan optimization in accordance with some aspects. As shown at 9800, in an exemplary coverage terminal device 9102 may be OOC for a first time period, enter into coverage for a second time period, and return to OOC for a third time period. In the exemplary case 9810 where a terminal device utilizes normal cell scans without a backoff counter, the terminal device may repeatedly perform failed cell scans during the first OOC period, which may waste considerable battery power without successfully detecting any cells. While the exemplary case 9820 where the terminal device employs a backoff counter may reduce the number of failed cell scans during the first OOC period, and as a result reduce the amount of wasted battery power, the use of a backoff counter may result in the terminal device missing an opportunity to successfully detect cells during the second time period.

In contrast to 9810 and 9830, terminal device 9102 may apply the current aspect in exemplary case 9830 and may detect that an OOC scenario will occur (e.g., based on predicted route information and/or predicted radio conditions) and suspend cell scans until a return to normal coverage is expected. Accordingly, terminal device 9102 may avoid wasting battery power performing failed cell scans during the first OOC period and subsequently predict a return to normal coverage during the second time period. These aspects may therefore be effective in avoiding unnecessary waste of battery power.

As previously indicated, terminal device 9102 may in some aspects also apply the current aspect to control various other radio activities at baseband modem 9206. For example, decision module 9612 may receive prediction results from prediction engine 9600 that indicate that terminal device 9102 will be in low signal conditions while traveling on a predicted route for an expected duration of time. As such low signal conditions may limit data transfer speeds (e.g., by low modulation schemes, high coding rates, high retransmission rates, etc.), decision module 9612 may decide to adjust data transfer scheduling in accordance with the prediction results. In a scenario where terminal device 9102 is expected to move out of low signal conditions to higher signal conditions at a later point on the predicted route (e.g., according to higher Received Signal Strength Indicator (RSSI) measurements), decision module 9612 may instruct baseband modem 9206 to delay data transfer for the expected duration of time until terminal device 9102 is expected to move into higher signal conditions, thus causing baseband modem 9206 to delay data transfer until terminal device 9102 transitions to the higher signal conditions that may offer higher data transfer speeds and more power-efficient data transfer. In another scenario where terminal device 9102 is expected to move out of low signal conditions to an OOC area along the predicted route, decision module 9612 may instruct baseband modem 9206 to immediately initiate data transfer in low signal conditions to allow for data transfer before coverage ends. Prediction engine 9600 and decision engine 9610 may continue this process along the predicted route by identifying areas that are expected to have strong radio conditions and scheduling data transfer by baseband modem 9206 to occur during the expected strong radio conditions. The ability of baseband modem 9206 to delay data transfer until strong radio conditions are expected may depend on the latency requirements of the data. For example, data with strict latency requirements such as voice traffic may not be able to be delayed while other data with lenient latency requirements such as best-effort packet traffic may be able to be delayed. Consequently, if decision module 9612 instructs baseband modem 9206 to delay and reschedule data transfer for a duration of time until improved radio coverage is expected, baseband modem 9206 may reschedule some data transfer (e.g., for latency-tolerant data) but not for other data (e.g., for latency-critical data). Such smart scheduling of data transfer may dramatically reduce power consumption as data transfer will occur in more efficient conditions. Similarly, prediction engine 9600 may identify that a desired network such as a home Wi-Fi network will soon be available along the predicted route. Depending on the latency-sensitivity of data, decision module 9612 may decide to suspend data transfer until the desired network is available (e.g., in order to reduce cellular data usage).

Figure 99:
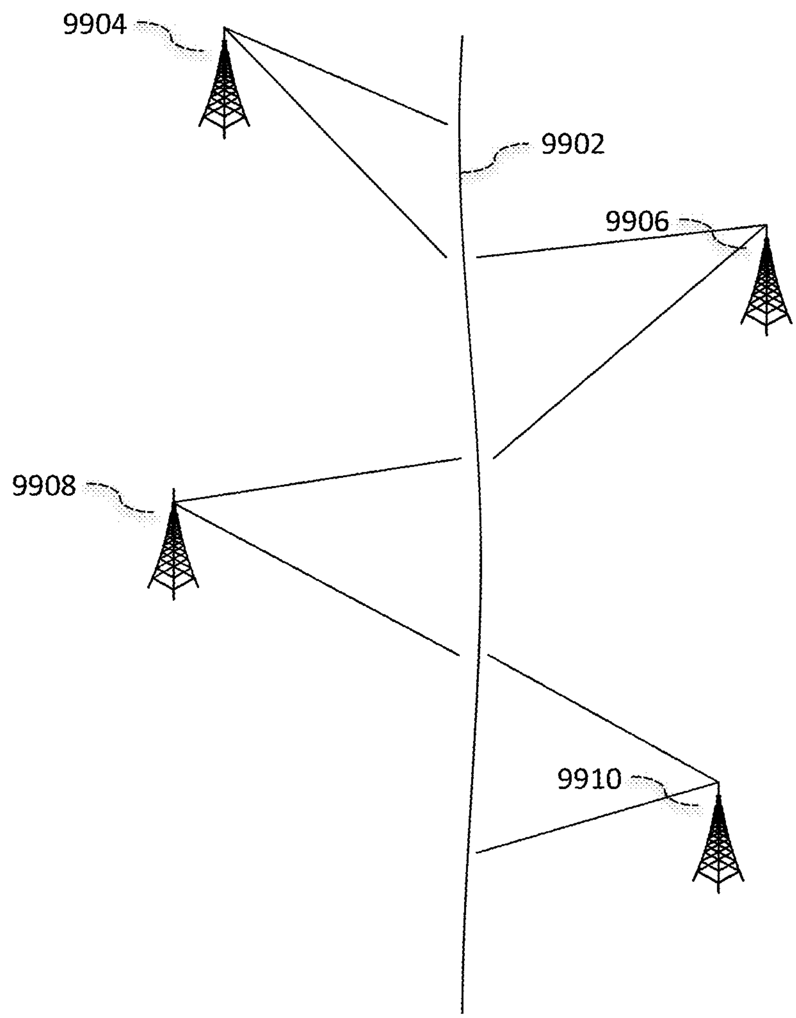
FIG. 99 shows an exemplary application in a road travel scenario with multiple network access nodes in accordance with some aspects.

Additionally or alternatively, in some aspects decision module 9612 may utilize prediction results provided by prediction engine 9600 to make radio access selections including cell, network, and/or RAT selections. For example, prediction engine 9600 may provide a predicted route to decision engine 9610 that is accompanied by a list of cells, networks, and/or RATs that are expected available at specific locations on the predicted route. FIG. 99 shows an exemplary scenario according to some aspects in which different sections of road 9902 may have coverage from network access nodes 9904, 9906, 9908, and 9910, where network access nodes 9904-9910 may differ in terms of cell ID optionally in addition to network (e.g., PLMN) and/or RAT (e.g., LTE, UMTS, GSM, etc.). Prediction engine 9600 may identify (e.g., based on previous travel on road 9902 and/or crowdsourced information provided by external learning module 9608) the sections of road 9902 that are served by each of network access nodes 9904-9910 in addition to the cell ID (e.g., Basic Service Set Identification (BSSID), Physical Cell Identity (PCI), etc.), network ID (e.g., PLMN ID), and RAT provided by each of network access nodes 9904-9910.

Accordingly, at a subsequent time when terminal device 9102 is traveling on road 9902, local learning module 9606 may detect road 9902 as a predicted route and provide road 9902 and the associated radio-related context information of network access nodes 9904-9910 to decision module 9612. Decision module 9612 may then instruct baseband modem 9206 to make radio access selections based on the radio-related context information. For example, decision module 9612 may instruct baseband modem 9206 to make serving cell selections based on the radio-related context information; e.g., by sequentially selecting network access nodes 9904, 9906, 9908, and 9910 as a serving cell during travel on road 9902. Accordingly, instead of having to perform full cell scan and measurement procedures, baseband modem 9206 may simplify cell scan and measurement by utilizing the cell IDs, network IDs, and RAT information provided by decision module 9612.

In many actual use scenarios, there may be multiple network access nodes available at different points along a travel route. Accordingly, in some aspects prediction engine 9600 and decision engine 9610 may identify all network access nodes that are expected to be available at each location and provide the expected network access nodes to baseband modem 9206, which may then make radio access selections based on expected available network access nodes and their associated network and RAT characteristics. For example, decision engine 9610 may provide baseband modem 9206 with a list of available network access nodes, which may optimize cell search and selection at baseband modem 9206 as baseband modem 9206 may have a priori information regarding which network access nodes will be available.

Additionally or alternatively, decision engine 9610 may consider power efficiency properties of multiple RATs supported by baseband modem 9206 in conjunction with the prediction results provided by prediction engine 9600. For example, baseband modem 9206 may support a first radio access technology and a second radio access technology, where the first radio access technology is more power efficient (e.g., less battery drain) than the second radio access technology. If prediction engine 9600 provides prediction results that indicate that both the first and second radio access technologies will be available in a given area, but that radio conditions for both radio access technologies will be poor, decision module 9612 may select to utilize the first radio access technology, e.g., the more power efficient radio access technology, at baseband modem 9206. In some aspects, decision module 9612 may select to utilize the first radio access technology over the second radio access technology even if the second radio access technology has a higher priority than the first radio access technology (e.g., in a hierarchical master/slave-RAT system). Furthermore, in some aspects, decision module 9612 may refrain from attempting to connect to other RATs (e.g., may continue to utilize the first radio access technology, e.g., the more power efficient radio access technology) until a stronger coverage area is reached (as indicated by the prediction results). Accordingly, in various aspects decision module 9612 may control RAT selection and switching based on predicted radio coverage and power efficiency characteristics of the RATs supported by baseband modem 9206.

In addition to making radio access selections based on which network access nodes are expected to be available, in some aspects decision module 9612 may also make selections based on other characteristics of the available network access nodes. For example, prediction engine 9600 may also receive information such as congestion levels, transport layer (e.g., Transport Control Protocol (TCP)) disconnection duration, latency, throughput, Channel Quality Indication (CQI), etc., as radio-related context information (e.g., locally from terminal device 9102 and/or externally as crowdsourced information from external learning module 9608). Local learning module 9606 may then make predictions about expected congestion, expected transport layer disconnection duration, expected latency, expected CQI, expected throughput, etc., based on previously learned characteristics of the available network access nodes and provide these prediction results to decision module 9612. Decision module 9612 may then also consider the predicted characteristics of the network access nodes expected to be available on a given route as part of the cell, network, and/or RAT selection process. Decision module 9612 may also make decisions on data transfer scheduling based on the expected congestion, expected transport layer disconnection duration, expected latency, expected CQI, expected throughput, etc., of network access nodes that are expected to be available along a given route. Decision module 9612 may also modify retransmission times at an Internet Protocol (IP) layer as part of radio activity decisions, which may include utilizing predicted congestion and/or latency in order to adjust a TCP/IP timeout timer in order to avoid retransmissions.

As previously introduced, in some aspects terminal device 9102 may implement these aspects on a more fine-grained scale. For example, in addition or alternative to applications related to controlling radio activity during travel on roads or other longer paths (which may be in the order of minutes or hours), terminal device 9102 may control radio activity over much smaller durations of time (e.g., milliseconds or seconds). For example, prediction engine 9600 may monitor radio-related information over a windowed time period (e.g., in the order of seconds or milliseconds) to obtain a historical sequence of radio conditions, which may be a sequence of signal strength measurements, signal quality measurements, or other radio-related context information. Prediction engine 9600 may also obtain other context information, such as one or more of location information, user-generated movement information, or time/sensory information, and utilize the historical sequence of radio conditions along with the other context information (such as current location, accelerometer or gyroscope information, etc.) in order to predict a future sequence of radio conditions (e.g., in the order of milliseconds or seconds in the future). Prediction engine 9600 may then provide the future sequence of radio conditions to decision engine 9610, which may control radio activity based on the future sequence of radio conditions.

Figure 100:
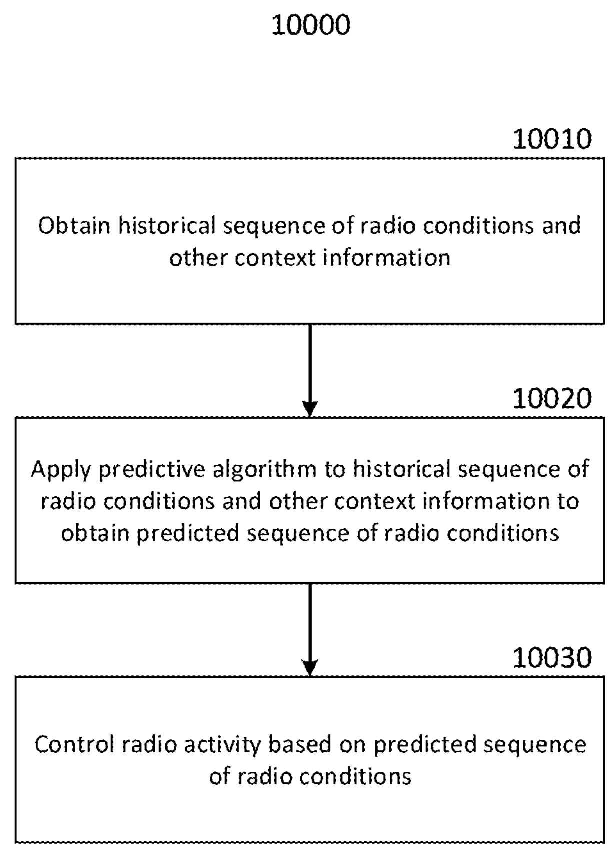
FIG. 100 shows an exemplary method of controlling radio activity based on a historical sequence of radio conditions and other context information in accordance with some aspects.

FIG. 100 shows method 10000 of related aspects. As shown in FIG. 100, prediction engine 9600 may first obtain a historical sequence of radio conditions and other context information in 10010. In some aspects, the historical sequence of radio conditions may be a past series of radio measurements, such as signal strength or signal quality measurements, while the other context information may be one or more of location information, user-generated movement information, or time/sensory information. For example, in one aspect, the historical sequence of radio measurements may be a sequence of signal strength measurements obtained over a recent period of time, such as several milliseconds or seconds. The other context information may be time/sensory information such as gyroscope or accelerometer movement data that indicates recent movement of terminal device 9102.

Local learning module 9606 of prediction engine 9600 may then apply a predictive algorithm (e.g., as executable instructions) to the historical sequence of radio conditions and the other context information in 10020 to obtain a predicted sequence of radio conditions. For example, local learning module 9606 may utilize the points of the historical sequence of radio conditions (which may each occur at a specific time point in the recent past) to extrapolate the past radio conditions onto a predicted sequence of radio conditions in the future. Local learning module 9606 may also utilize the other context information to shape the predicted sequence of radio conditions. For example, movement of terminal device 9102 as indicated by accelerometer or gyroscope data may indicate the similarity of past radio conditions to future radio conditions, where significant movement of terminal device 9102 may generally reduce the correlation between past and future radio conditions. In some aspects, the predictive algorithm applied by local learning module 9606 may plot a movement trajectory based on the other context information. Accordingly, in various aspects local learning module 9606 may obtain the predicted sequence of radio conditions in 10020 based on the historical sequence of radio conditions and other context information.

Local learning module 9606 may then provide the predicted sequence of radio conditions to decision module 9612 of decision engine 9610. Decision module 9612 may then control radio activity at baseband modem 9206 based on the predicted sequence of radio conditions in 10030. In various aspects, this may include controlling cell scans, data transfer, and radio access selection at baseband modem 9206 based on the predicted sequence of radio conditions. For example, if the predicted sequence of radio conditions indicates poor radio conditions (e.g., in the upcoming duration of time characterized by the predicted sequence of radio conditions), decision module 9612 may suspend radio activity, e.g., for a period of time or indefinitely. This may avoid attempting cell scans and data transfer in poor radio conditions, which may yield low cell detection rates and/or low throughput rates. In some aspects, the predicted sequence of radio conditions may indicate radio conditions of multiple RATs, multiple cells, or multiple networks, and accordingly may provide decision module 9612 with a basis to perform radio access selections. For example, if baseband modem 9206 is currently utilizing a first RAT and the predicted sequence of radio conditions indicates that a second RAT is expected to have better radio conditions, decision module 9612 may trigger a RAT switch at baseband modem 9206 from the first RAT to the second RAT. Decision module 9612 may trigger cell and network reselections in the same manner.

As previously indicated, the historical sequence of radio conditions and predicted sequence of radio conditions may in some aspects be centered around near-past and near-present, e.g., in the order of milliseconds or seconds. Accordingly, in some aspects method 10000 may not include route prediction over longer periods of time, and may focus more on control over radio activity in the near future, e.g., over several milliseconds or seconds. In some aspects, this may include triggering relatively instantaneous decisions based on recent radio condition history (e.g., a historical sequence of radio conditions spanning the most recent several milliseconds or seconds) and other context information, in particular related to user movement.

In some aspects, baseband modem 9206 may suspend all modem activity during predicted OOC scenarios. For example, decision module 9612 may identify that a predicted route includes poor coverage conditions and identify a backoff timer according to the expected duration of the poor coverage conditions. In addition to suspending radio scans during the expected duration of the poor coverage conditions, in some aspects baseband modem 9206 may stop all connected mode activity (e.g., connection (re)establishment (e.g., via random access channel (RACH) procedures), connection release, connected mode measurements, data-plane transmit and receive activity, etc.) during the expected duration of poor coverage conditions, e.g., until the backoff timer expires. In some aspects, baseband modem 9206 may also stop all idle mode activity (e.g., cell search as part of cell (re)selection, system information acquisition (e.g., Master Information Block (MIB) and/or System Information Block (SIB, e.g., SIB1)), idle mode measurements, etc.) until the backoff timer expires. Accordingly, in addition to suspending radio scans, baseband modem 9206 may suspend all radio activity (e.g., depending on whether in connected or idle mode) when decision module 9612 determines that poor radio conditions are expected to occur on the predicted route. This may increase power savings at terminal device 9102. Additionally, in some aspects terminal device 9102 may enter the lowest possible power state (e.g., a sleep state) until the backoff timer expires in order to maximize power consumption.

In some aspects, prediction engine 9600 and decision engine 9610 may also optimize battery power consumption based on predicted battery charging information. For example, prediction engine 9600 may receive battery charging information as context information at preprocessing module 9602, which may be a simple indicator that power supply 9216 is being charged. Preprocessing module 9602 may then associate a time and location with the charging indicator and provide the associated information to local repository 9604 and local learning module 9606. Prediction engine 9600 may thus keep a record of past charging locations and times, which may enable local learning module 9606 to learn regular charging locations and times (such as at a home location on evenings). Local learning module 9606 may then be able to anticipate and expected time until next charge based on the regular charging locations and times (relative to a current location and time indicated by current context information) and provide the expected time until next charge to decision module 9612. Decision module 9612 may then be able to make power control decisions for baseband modem 9206, such as by instructing baseband modem 9206 to utilize a low power state if the expected time until next charge is a long duration of time. Preprocessing module 9602 may also predict an expected battery power remaining based on current battery power levels and past history of battery power duration and provide such information to decision module 9612. Decision module 9612 may additionally provide power control instructions to other components of terminal device 9102, such as to a general power manager (e.g., executed as software-defined instructions at application processor 9212) in order to control total power consumption at terminal device 9102.

As indicated above, external learning module 9608 can be located external to terminal device 9102 and may in some aspects be configured to provide prediction results (e.g., based on crowdsourced context information from other terminal devices) to prediction engine 9600. Accordingly, some of the processing load can be offloaded to external learning module 9608. In a variation, some or all of the processing load at local learning module 9606 in addition to storage of context information at local repository 9604 may be offloaded to external learning module 9608, such as in a cloud-processing setup. Accordingly, as opposed to performing prediction processing and/or storage at prediction engine 9600, prediction engine 9600 may provide context information (raw or preprocessed) to external learning module 9608, which may then perform prediction processing (e.g., in the manner as detailed above regarding local learning module 9606; potentially using more crowdsourced context information) and provide prediction results to decision module 9612. Decision module 9612 may then render decisions using the prediction results in the manner detailed above.

Terminal devices may therefore apply various aspects to use high-level context information to optimize radio activity and other operations such as battery power. In particular, terminal devices may render predictions related to both expected user movement (e.g., regular or planned routes) and radio conditions (e.g., radio conditions and available cells/networks/RATs) to optimize radio activity along expected user movement paths, including suspending cell scans and data transfers and making cell/network/RAT selections. Additionally, terminal devices may predict battery charging scenarios and optimize power consumption based on the expected time until the next charge.

Figure 101:
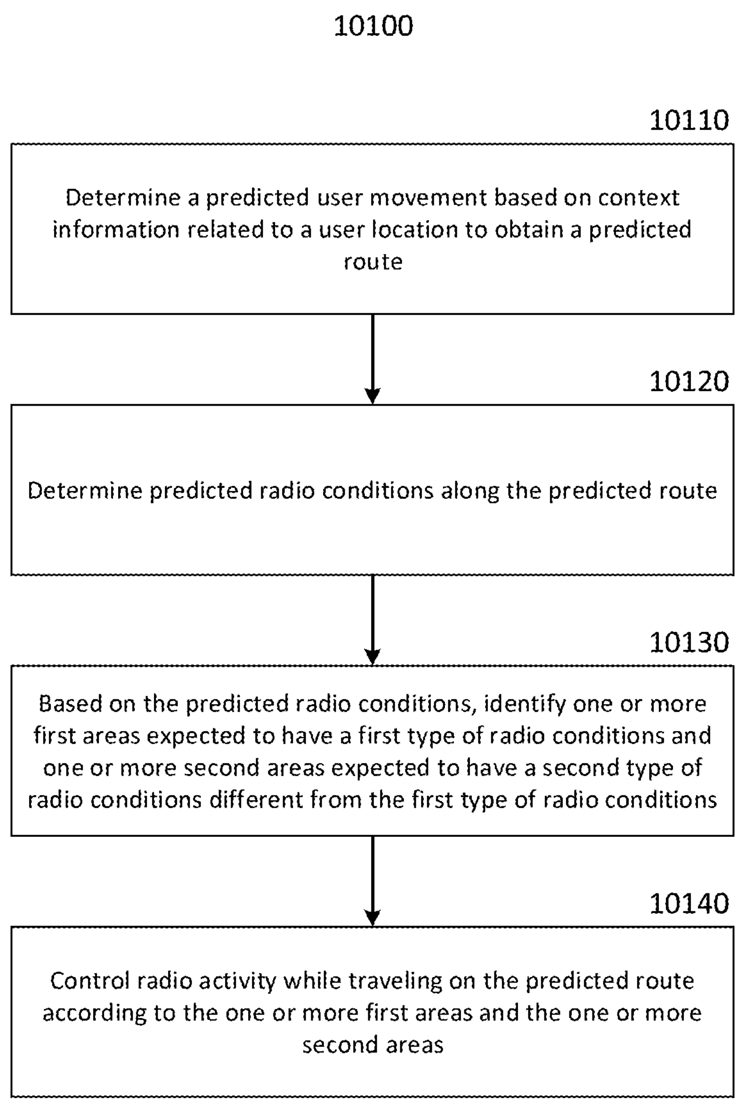
FIG. 101 shows an exemplary method of performing radio communications in accordance with some aspects.

FIG. 101 shows exemplary method 10100 of performing radio communications in accordance with some aspects. As shown in FIG. 101, method 10100 includes determining a predicted user movement based on context information related to a user location to obtain a predicted route (10110), determining predicted radio conditions along the predicted route (10120), based on the predicted radio conditions, identifying one or more first areas expected to have a first type of radio conditions and one or more second areas expected to have a second type of radio conditions different from the first type of radio conditions (10130), and controlling radio activity while traveling on the predicted route according to the one or more first areas and the one or more second areas (10140).

3.2 Context-Awareness #2

Certain aspects described above may thus yield considerable benefits locally at terminal devices. However, optimization based on context awareness may also produce significant advantages on the network side, in particular at network access nodes to optimize network activity. In particular, knowledge of expected user travel routes may enable network access nodes to optimize a variety of parameters such as spectrum and resource allocation, cell loading, Quality of Service (QoS), handovers and other device mobility, etc. Accordingly, in some aspects of this disclosure, terminal devices and network access nodes may cooperate to provide user travel and usage predictions for a number of terminal devices to the network. Network access nodes may then be able to utilize the user travel predictions to optimize service across numerous users. Coordination between multiple terminal devices and network access nodes may additionally facilitate crowdsourcing of data across many devices and enhance prediction accuracy and applicability.

Some aspects of this disclosure may therefore include prediction and decision engines at both terminal devices and network access nodes. The terminal device and network access node prediction engines may interface with each other (e.g., via a software-level connection relying on a radio connection for low-layer transport) in order to share context information and make overall predictions based on the shared prediction information, which may allow one or both sides to enhance prediction results based on information or predictions of the other side. For example, in some aspects multiple terminal devices may each predict user movement using context information at a local terminal device (TD) prediction engine, such as by detecting travel on regular or planned routes as described above. Terminal devices may also be able to predict data transfer-related parameters such as expected traffic demands, expected QoS requirements, expected active applications (which may impact traffic demands and QoS requirements), etc., which may provide a characterization of the data transfer requirements of each terminal device. The terminal devices may then provide the movement and data requirement predictions to a counterpart network access node (NAN) prediction engine, which may then be able to utilize the movement and data requirement predictions from the terminal devices in order to anticipate where each terminal devices will be located and what the data requirements will be for each terminal device. The BS prediction engine may therefore be able to predict network conditions such as expected network traffic, expected load, expected congestion, expected latency, expected spectrum usage, and expected traffic types based on the predicted routes and predicted data requirements of each terminal device. The TD and NAN prediction engines may then provide terminal device and network predictions to TD and NAN decision engines, which may then make optimization decisions for the terminal devices and network access nodes based on the predictions generated by the TD and NAN prediction engines. For example, the NAN decision engine may use the prediction results to optimize spectrum and resource allocation, optimize scheduling and offloading, perform smart handovers and network switching of terminal devices, and arrange for variable spectrum pricing and leasing. The TD decision engines at each terminal device may use the prediction results to optimize cell scan timing, optimize service and power levels, perform smart download/data transfer scheduling, make decisions on flexible pricing schemes, adjust travel or navigation routes based on predicted radio coverage and service, or negotiate with networks or other terminal devices or users of terminal devices for resources and timing of resource availability.

Figure 102:
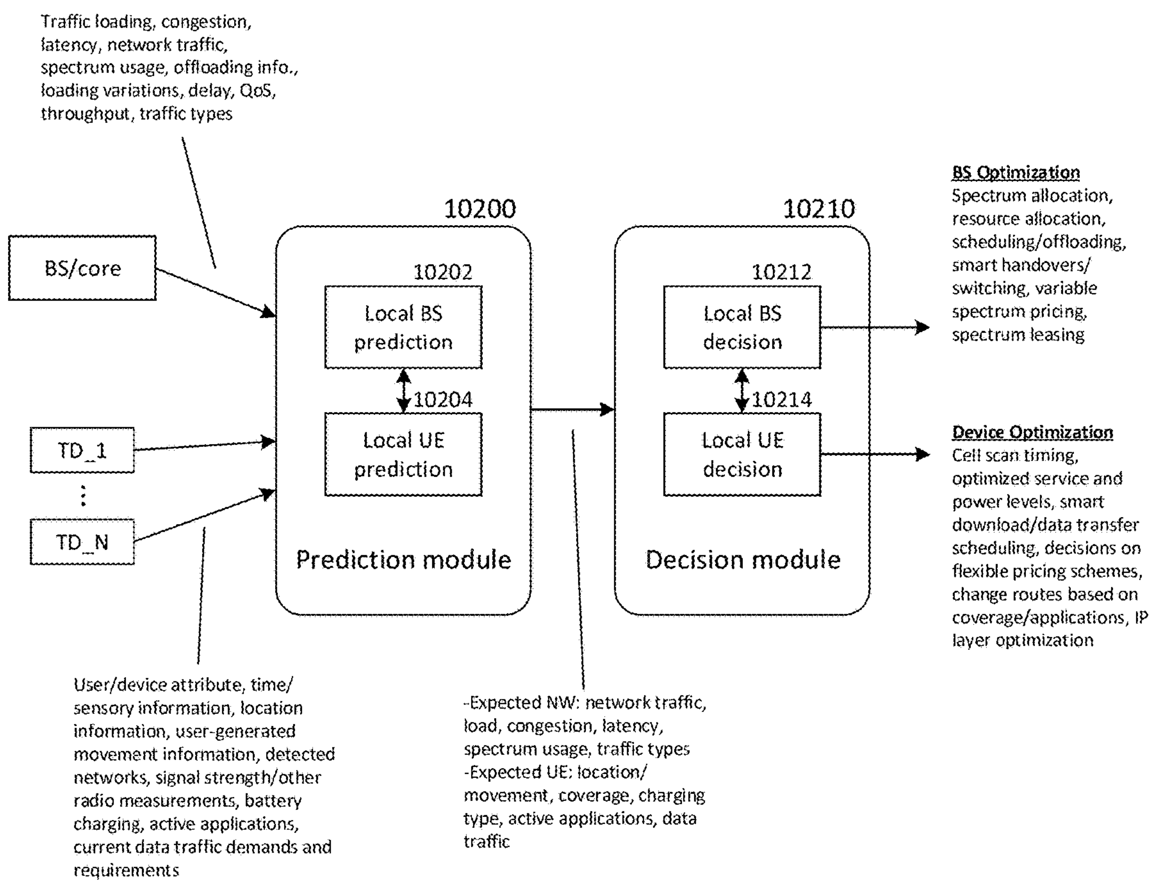
FIG. 102 shows an exemplary implementation of a terminal device and network access node in accordance with some aspects.

FIG. 102 shows an exemplary arrangement of the TD and NAN prediction and decision engines according to some aspects, which may be logically grouped into prediction module 10200 comprising local NAN prediction module 10202 and local TD prediction module 10204 and decision module 10210 comprising local NAN decision module 10212 and local TD decision module 10214. The implementation of prediction module 10200 and decision module 10210 may be a 'logical' arrangement; accordingly, local TD prediction module 10204 and local TD decision module 10214 may be located at a terminal device, such as terminal device 9102, while local NAN prediction module 10202 and local NAN decision module 10212 may be located at a network access node, such as network access node 9110. For example, in some aspects local TD prediction module 10204 and local TD decision module 10214 may be implemented as software-defined instructions executed at application processor 9212 of terminal device 9102 while local NAN prediction module 10202 and local NAN decision module 10212 may be implemented as software-defined instructions executed at control module 9310 of network access node 9110. Local NAN prediction module 10204 may have a software-level connection with local TD prediction module 10204 (which may rely on a radio access connection between terminal device 9102 and network access node 9110 for lower-layer transport) to form prediction module 10200. Similarly, local NAN decision module 10212 may have a software-level connection with local TD decision module 10214 (which may rely on a radio access connection between terminal device 9102 and network access node 9110 for lower-layer transport) to form decision module 10210. In some aspects, one or more of local TD prediction module 10204, local TD decision module 10214, local NAN prediction module 10202 and local NAN decision module 10212 may be implemented in a hardware-defined manner, such as with one or more dedicated hardware circuits, which may be completely hardware or a mixture of software and hardware (e.g., a processor that can offload certain tasks to hardware accelerators or other dedicated hardware circuits).

Furthermore, one or more additional terminal devices (denoted as TD_1-TD_N in FIG. 102) may each include a local TD prediction module and local TD decision module as part of prediction module 10200 and decision module 10210. Additionally, prediction module 10200 and decision module 10200 may include local NAN prediction modules and local NAN decision modules from one or more additional network access nodes. The incorporation of additional terminal devices and network access nodes may expand the prediction results, e.g., to include predictions from numerous different terminal devices and base stations, and expand the decision making, e.g., to make decisions at numerous different terminal devices and base stations. Prediction module 9300 may also receive context information from core network components, such as Mobility Management Entities (MMEs), Home Subscriber Services (HSSs), etc., which may also relate to traffic loading, congestion, latency, network traffic, spectrum usage, offloading info., loading variations, delay, QoS, throughput, and traffic types and be utilized by prediction module 10200 to make predictions. Additionally, while local NAN prediction module 10202 and local NAN decision module 10212 are detailed above as being implemented at a network access node, local NAN prediction module 10202 and local NAN decision module 10212 may alternatively be implemented as part of the core network, such as at a core network location that interfaces with multiple network access nodes and thus has access to context information from the multiple network access nodes. Also, prediction module 10200 and decision module 10210 may include respectively include core network prediction modules and core network decision modules located in the core network that interface with the other prediction and decision modules of prediction module 10200 and decision module 10210. Accordingly, prediction module 10200 and decision module 10210 may therefore be implemented in a distributed manner between terminal device 9102, network access node 9110, one or more other terminal devices, one or more other network access nodes, and one or more other core network components. Prediction module 10200 and decision module 10210 may therefore be compatible with numerous different physical placements of local NAN prediction module 10202, local TD prediction module 10204, local NAN decision module 10212, and local TD decision module 10214.

Figure 103:
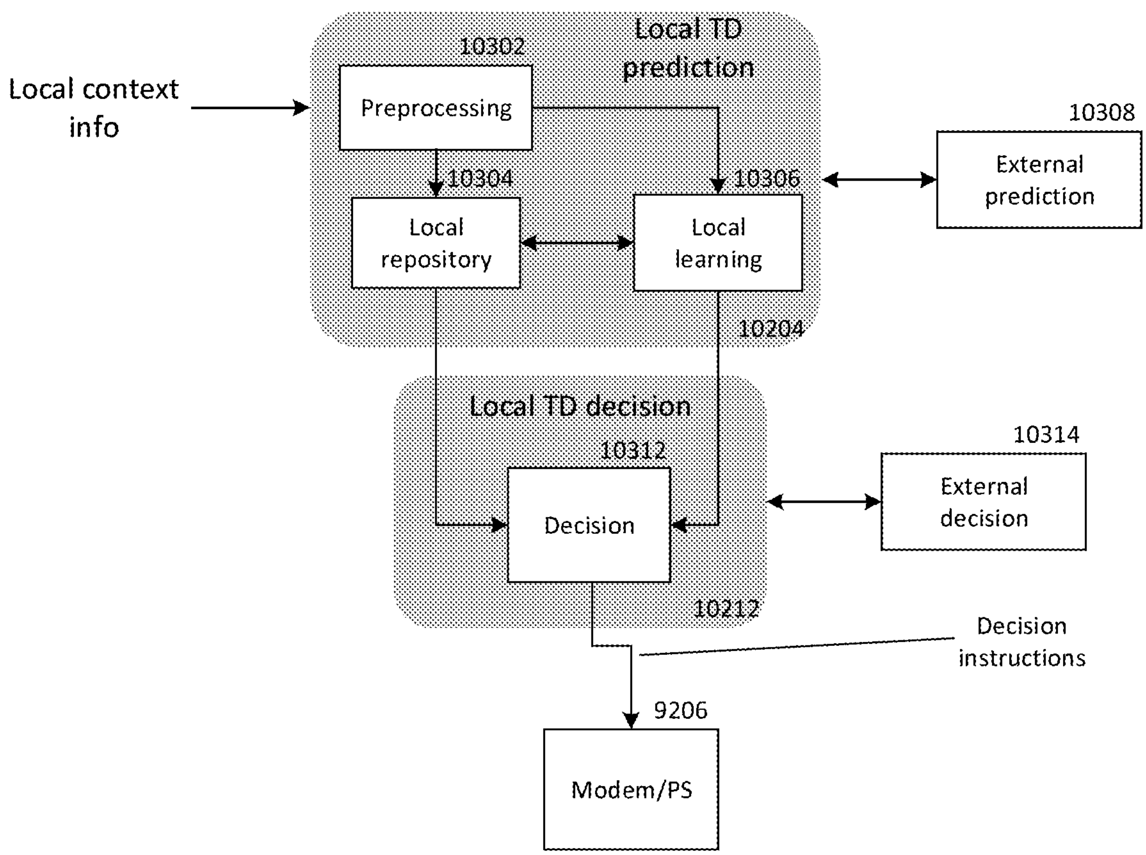
FIG. 103 shows an exemplary configuration of terminal device prediction and decision modules in accordance with some aspects.
Figure 104:
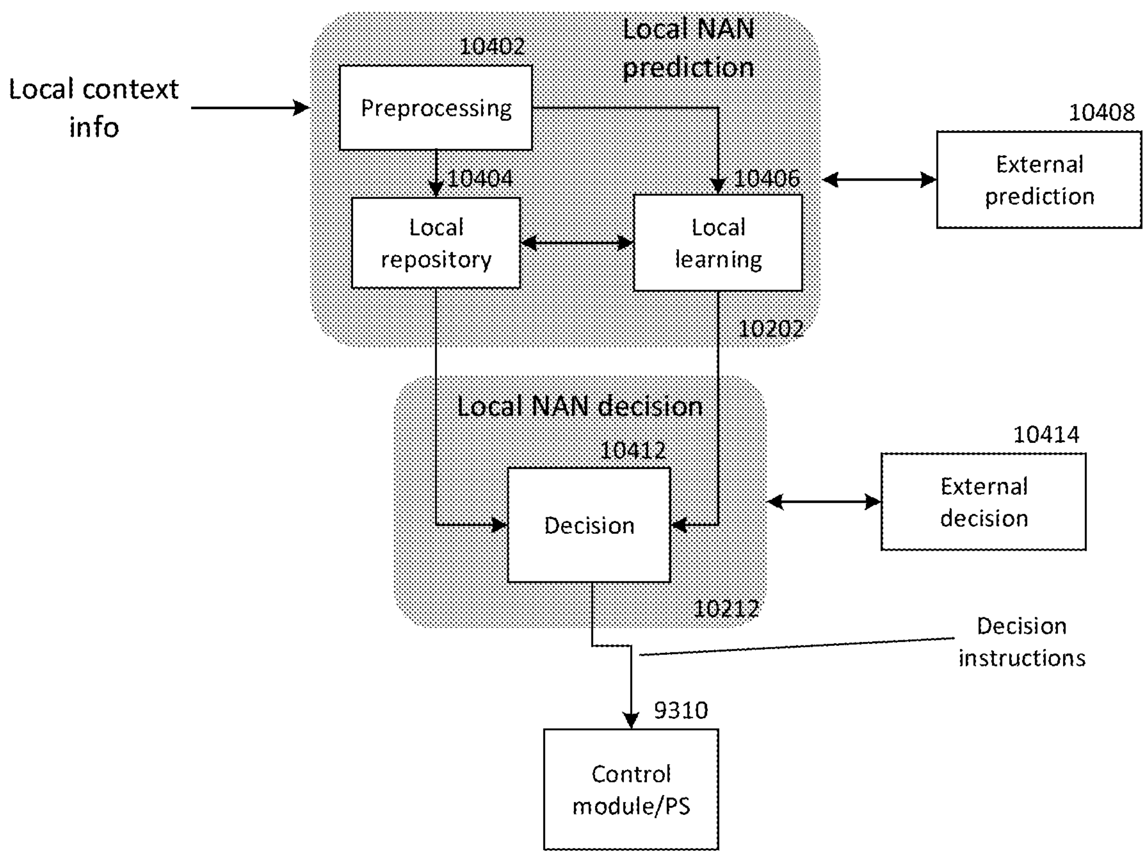
FIG. 104 shows an exemplary configuration of network access node prediction and decision modules in accordance with some aspects.
Figure 105:
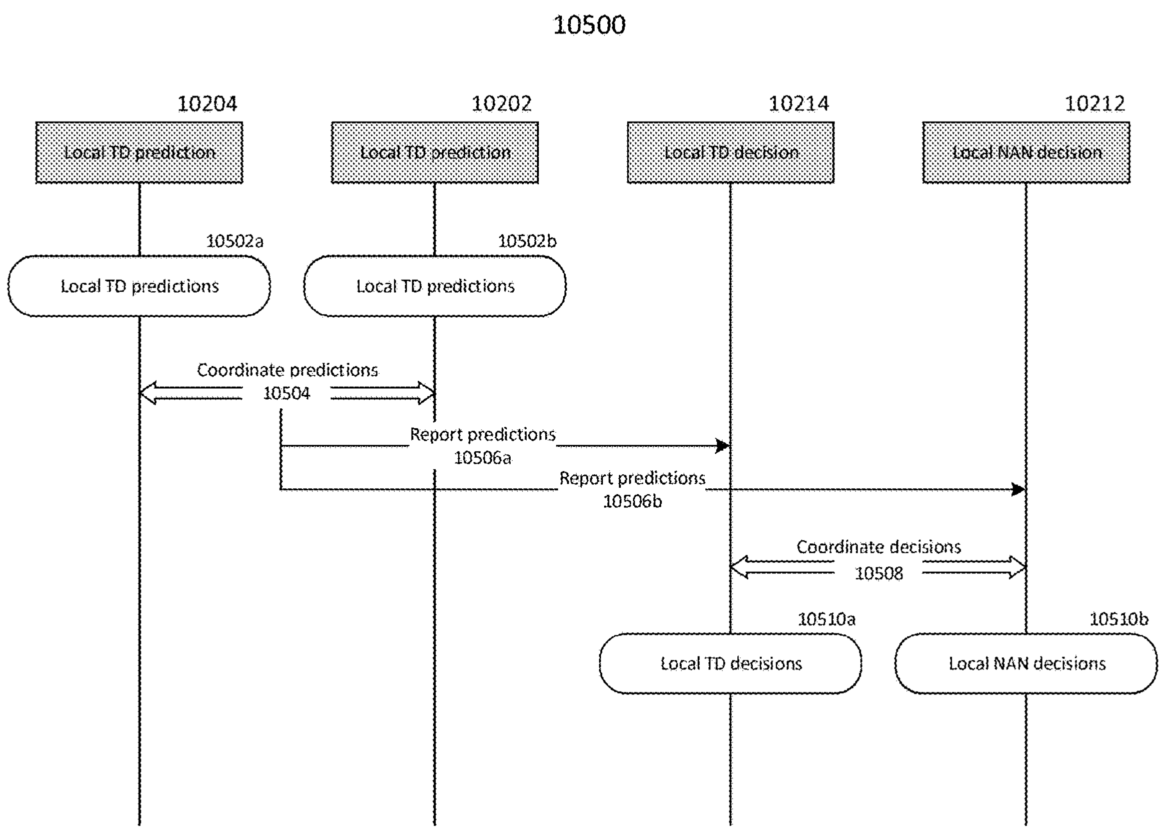
FIG. 105 shows an exemplary message sequence chart detailing interaction between terminal device and network access node predication and decision modules in accordance with some aspects.

FIGS. 103 and 104 show exemplary configurations of local TD prediction module 10204, local TD decision module 10214, local NAN prediction module 10202, and local NAN decision module 10212 according to some aspects. FIG. 105 shows message sequence chart 10500, which details the operations of local TD prediction module 10204, local TD decision module 10214, local NAN prediction module 10202 in accordance with some aspects. As will be detailed, local NAN prediction module 10202 and local TD prediction module 10204 may make local predictions based on local context information (10502*a* and 10502*b*) and coordinate prediction results with each other in order to refine the prediction results (10504). Local NAN prediction module 10202 and local TD prediction module 10204 may then provide the prediction results to local NAN decision module 10212 and local TD decision module 10214 (10506*a* and 10506*b*), which may then coordinate decisions (10508) and render final decisions at terminal device 9102 and network access node 9110 (10510*a* and 10510*b*).

As shown in FIGS. 103 and 104, local TD prediction module 10204, local TD decision module 10214, local NAN prediction module 10202, and local NAN decision module 10212 may in some aspects be configured in a similar manner as prediction engine 9600 and decision engine 9610 as described above. Accordingly, local TD prediction module 10204 may receive local TD context information in 10502*a*, including user/device attributes, time/sensory information, location information, user-generated movement information, detected networks, signal strength/other radio measurements, battery charging information, active applications, and current data traffic demands and requirements. Preprocessing module 10302 may then preprocess the received context information, such as to associate certain types of context information with other related context information, and provide the preprocessed context information to local repository 10304 for storage and to local learning module 10306 for learning and prediction. Local learning module 10306 may then evaluate current context information (received from preprocessing module 10302) and past context information (received from local repository 10304) in order to predict user movement, radio conditions, and data service requirements (thus obtaining the local predictions in 10502*a*). In particular, local learning module 10306 may evaluate the context information to detect when a user is traveling on an identifiable route, such as a regular route or a planned route, and predict user movement by anticipating that the user will continue to travel on the detected route. After predicting user movement, local learning module 10306 may predict radio conditions along the predicted route, which may include predicting radio coverage conditions in addition to predicting which networks, cells, and RATs will be available along the predicted route. Local learning module 10306 may perform the route and radio condition prediction in the same manner as detailed above regarding local learning module 10500.

Local learning module 10306 may also predict upcoming data service requirements as part of 10502*a*, which may include predicting expected traffic demands, expected QoS requirements, and expected active applications (which may impact traffic demands and QoS requirements depending on the data traffic of the active applications). In particular, local learning module 10306 may evaluate context information related to active applications and current data traffic demands and requirements to predict upcoming data service requirements. For example, local learning module 10306 may identify which applications are currently active at terminal device 9102 and evaluate the data traffic requirements of the active applications, such as the throughput demands, QoS demands, data speed demands, reliability demands, etc., of the active applications. Additionally, if, for example, local learning module 10306 identifies that terminal device 9102 is on a regular route, local learning module 10306 may access local repository 10304 to identify whether any particular applications are normally used on the regular route (such as a streaming music player application on a regular driving route), which preprocessing module 10402 may have previously associated with locations on the regular route during earlier preprocessing and stored in local repository 10304. Additionally, local learning module 10306 may look at current and recent data traffic demands and requirements at terminal device 9102, including overall throughput demands, QoS demands, data speed demands, and reliability demands. Local learning module 10306 may then be able to predict what the upcoming data service requirements will be based on the current and recent data traffic demands and requirements.

For example, in some aspects local learning module 10306 may predict a congestion level of a network access node as part of the predicted radio conditions. Local learning module 10306 may apply a predefined prediction function with input variables derived from context information in order to produce the congestion level. For example, local learning module 10306 may calculate $CL_p=F(Nw, t, Loc)$, where $CL_p$ is the predicted congestion level, Nw is the radio access network type (e.g., cellular or Wi-Fi) and network access node identifier (e.g., by BSSID or AP ID), t is the time, and Loc is the location. The prediction function F may be a simple linear function of its input parameters or may be a complicated learning function such as a Support Vector Machine (SVM) or Bayes network derived from a learning algorithm. Each local learning module may apply such algorithms and prediction functions in order to obtain the respective prediction results.

Local NAN prediction module 10202 may also obtain local predictions in 10502*b*. As shown in FIG. 104, local NAN prediction module 10204 may receive local context information for network access node 9110, which may include context information from network access node 9110 in addition to core network context information (e.g., from an MME or HSS). Such context information can include, without limitation, traffic loading information, congestion information, latency information, network traffic information, spectrum usage information, offloading information, loading variation information, delay information, QoS information, throughput information, and traffic type information. Preprocessing module 10402 may then preprocess the context information and provide the preprocessed context information to local repository 10404 and local learning module 10406. Local learning module 10406 may evaluate current context information (received from preprocessing module 10402) and recent context information (received from local repository 10404) to make predictions regarding network conditions, including expected network traffic, expected network load, expected congestion, expected latency, expected spectrum usage, and expected traffic types. For example, in some aspects local learning module 10406 may evaluate context information over a recent window of time in order to average context information and determine expected network conditions. Local learning module 10406 may additionally utilize more complex prediction techniques to extrapolate current and recent context information to predict upcoming network conditions.

Local TD prediction module 10204 and local NAN prediction module 10202 may therefore obtain local prediction results in 10502*a* and 10502*b*, where local TD prediction module 10204 may, for example, obtain predicted route, predicted data service requirements, and predicted radio conditions and local NAN prediction module 10202 may, for example, obtain predicted network conditions. As prediction results at local TD prediction module 10204 may be highly relevant to the prediction results at local NAN prediction module 10202 (and vice versa), local TD prediction module 10204 and local NAN prediction module 10202 may coordinate prediction results in 10504 (as also shown in FIG. 102 in prediction module 10200) in some aspects. Additionally, in some aspects one or more other prediction modules may be part of prediction module 10200, such as one or more other UE prediction modules and one or more core network prediction modules, the other prediction modules may also coordinate prediction results with local TD prediction module 10204 and local NAN prediction module 10202 (e.g., with an REM or similar coverage map). Accordingly, as shown in FIG. 103, local TD prediction module 10202 may receive prediction results from one or more other predictions modules (including local NAN prediction module 10204) as external prediction module 10308 while local NAN prediction module 10204 may receive prediction results from one or more other prediction modules (including local TD prediction module 10202) as external prediction module 10408.

In some aspects, local TD prediction module 10204 and local NAN prediction module 10202 may then update local prediction results based on the external prediction results in 10504. For example, local learning module 10306 may utilize context information and prediction results from other UE prediction modules as 'crowdsourced' information (e.g., in the manner detailed above regarding external learning module 9608, potentially with an REM or similar procedure), which may enable local TD prediction module 10204 to obtain context information related to new locations and routes (such as radio condition and network selection information for a new route). Additionally, in some aspects the local TD prediction results from terminal device 9102 and one or more other terminal devices may have a significant impact on the local NAN prediction results. For example, multiple TD prediction modules of external prediction modules 10408 may each be able to provide a predicted route and predicted data service requirements along the predicted route to local learning module 10406. Based on the predicted routes and predicted data service requirements, local learning module 10406 may more accurately predict, for example, expected network traffic, expected network load, expected congestion, expected latency, expected spectrum usage, and expected traffic types as local learning module 10406 may have predictive information that anticipates the number of served terminal devices (e.g., based on which terminal devices have predicted routes that fall within the coverage area of network access node 9110) and the data service requirements of each terminal device. Local learning module 10406 may update and/or recalculate the predicted network conditions using the external prediction results from external prediction modules 10408.

After coordinating prediction results in 10504, prediction module 10200 may have a comprehensive set of prediction results, included predicted routes, predicted data service requirements, predicted radio conditions, and/or predicted network conditions. Prediction module 10200 may then provide the comprehensive prediction results to decision module 10210 at local TD decision module 10214 and local NAN decision module 10212 in 10506*a* and 10506*b*.

Local TD decision module 10214 and local NAN decision module 10212 may then be able optimize terminal device and network decisions based on the comprehensive prediction results. As network decisions (such as spectrum/resource allocations, scheduling, handovers, spectrum pricing/leasing) may have an impact on terminal device activity and terminal device decisions (such as service levels, scheduling, pricing schemes, radio access selection, radio activity, power states, and routes) may have an impact on network activity, local TD decision module 10214 and local NAN decision module 10212 may coordinate in 10508 in order to make decisions. For example, local NAN decision module 10212 may utilize the predicted network conditions obtained based on predicted data service requirements and predicted routes to perform spectrum allocation for multiple terminal devices including terminal device 9102, such as by assigning terminal device 9102 to operate on a specific band. The spectrum allocation may have a direct impact on the radio conditions, data service, and network conditions experienced by terminal device 9102, which may be traveling along a predicted route that is served in part by network access node 9110. Accordingly, if local NAN decision module 10212 decides on a spectrum allocation that is unsatisfactory to terminal device 9102, local TD decision module 10214 may decide to select a different network access node along the predicted route, which may in turn affect the data traffic requirements of network access node 9110. Due to the interconnectedness between terminal device and network decisions, decision coordination in 10508 may be important to provide for maximum optimization of terminal device and network activity. Numerous other network decisions can be applied, such as moving mobile network access nodes (e.g., drones or other vehicular network access nodes) to areas of higher expected demand. Local TD decision module 10214 and local NAN decision module 10212 may also make decisions regarding offloading, such as by triggering offloading from the network side based on expected demand. In some aspects, local TD decision module 10214 and local NAN decision module 10212 may adjust the use of unlicensed spectrum and relaying based on expected demand in certain areas. In some aspects, local TD decision module 10214 and local NAN decision module 10212 can also adjust cell sizes of network access nodes, such as switching between macro and micro cell sizes. In some aspects, these decisions may be handled at local NAN decision module 10212, while in other aspects these decisions may be performed as a cooperative process between local TD decision module 10214 and local NAN decision module 10212.

Local TD decision module 10214 and local NAN decision module 10212 may utilize the prediction results (e.g., predicted routes, predicted data service requirements, predicted radio conditions, and/or predicted network conditions) to make any of a number of different terminal device and network decisions. For example, local NAN decision module 10212 may make decisions on a variety of communication activities such as spectrum allocation (e.g., assigning terminal devices to specific bands), resource allocation (e.g., assigning radio resources to terminal devices), scheduling/offloading, handovers/switching, variable spectrum pricing (e.g., offering flexible pricing if when network loading is expected to be high), or spectrum leasing (e.g., leasing additional spectrum when predicted demand is high) based on the prediction results. In particular, local NAN decision module 10212 may utilize the predicted routes, predicted data service requirements, and/or predicted radio conditions (e.g., as a REM) for multiple terminal devices to plan spectrum and resource allocations and/or coordinate handovers as the terminal devices move along the predicted routes.

In some aspects, local TD decision module 10214 may perform cell scan timing (e.g., as described above), schedule other modem activity (e.g., by suspending connected and/or idle mode modem activity as described above), optimize service and power levels (e.g., by selecting optimized power states, entering low power states during poor coverage conditions, etc., e.g., as described above), perform scheduling for downloads and data transfers (e.g., as described above), make decisions on flexible pricing schemes (e.g., decide on flexible pricing based on predicted coverage and predicted data service requirements), and/or change navigation routes in a navigation program (e.g., based on predicted radio conditions and coverage). As local TD decision module 10214 may have both predicted radio conditions and predicted network conditions, local TD decision module 10214 may be configured to select network access nodes that have strong predicted radio conditions and strong predicted network conditions, such as a network access node that has one or more of strong signal strength, strong signal quality, low interference, low latency, low congestion, low transport layer disconnection duration, low load, etc., according to the predicted radio conditions and/or predicted network conditions. Additionally, in some aspects local TD decision module 10214 may be configured to schedule data transfer when predicted radio conditions and predicted network conditions indicate one or more of strong signal strength, strong signal quality, low interference, low latency, low congestion, low transport layer disconnection duration, low load, etc., along the predicted route.

Figure 106:
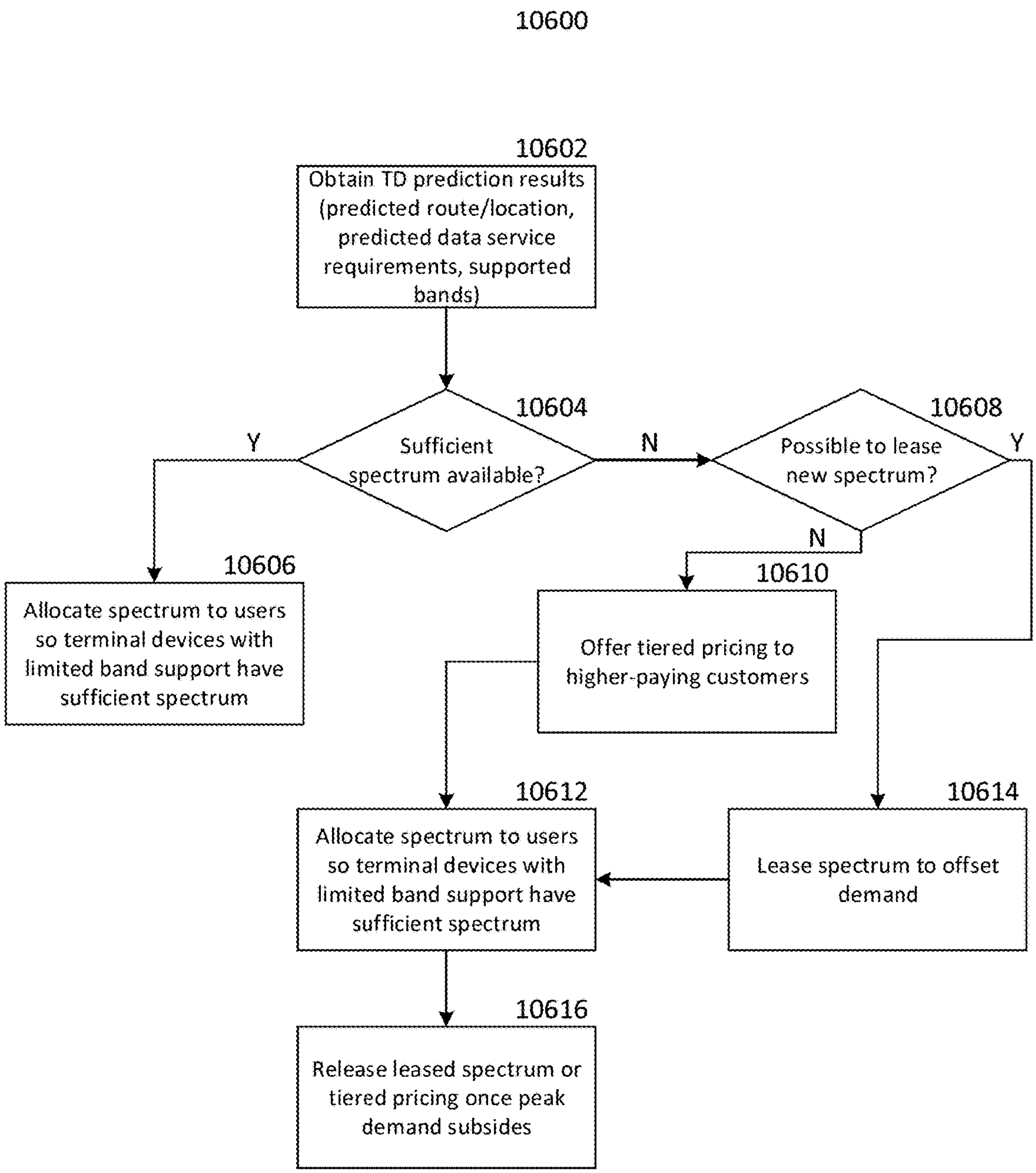
FIG. 106 shows an exemplary method making spectrum allocation decisions in accordance with some aspects.

FIG. 106 shows method 10600, which illustrates an exemplary procedure in which local NAN decision module 10212 may make a spectrum allocation decision based on the prediction results according to some aspects. Different terminal devices may support different spectrum (e.g., different bands) and different levels of service (e.g., different RATs, which may be indicated as user/device attribute context information). Each terminal device may attempt to find and remain on the highest level of service/most effective RAT, e.g., from 4G to 3G to 2G. However, spectrum may become congested due to high demand; accordingly, it may be advantageous for the network (e.g., network access nodes) to predict when and where network congestion may occur in order to enable the network to ensure that all users obtain service that meets their expected QoS. If there is not sufficient spectrum, the network operator may attempt to lease new spectrum from various entities, such as in accordance with a Licensed Shared Access (LSA) or Spectrum Access System (SAS), and/or may intelligently allocate spectrum to different terminal devices to ensure that all terminal devices have sufficient spectrum. Accordingly, if the network can predict the network load in advance, the network can allocate the frequencies in an efficient manner, which may reduce switching and thus avoid both wasting energy and reducing QoS.

Accordingly, in some aspects local NAN decision module 10212 may implement method 10600 to perform spectrum allocation based on predicted routes and data service requirements of various terminal devices. As shown in FIG. 106, local NAN decision module 10212 may obtain TD prediction results in 10602 including predicted routes and predicted data service requirements in addition to the bands supported by each terminal device. Local NAN decision module 10212 may then determine in 10604 whether sufficient spectrum will be (is expected to be) available based on the predicted routes and predicted data service requirements. If sufficient spectrum is expected to be available in 10604, local NAN decision module 10212 may not need to lease any addition spectrum and may proceed to 10606 to allocate spectrum to users while ensuring that terminal devices with limited band support have sufficient spectrum.

Conversely, is sufficient spectrum is not expected to be available in 10604, local NAN decision module 10212 may determine in 10608 if it is possible to lease new spectrum, such as part of an LSA or SAS scheme. If it is not possible to lease new spectrum, local NAN decision module 10610 may offer tiered pricing to higher-paying customers to ensure that higher paying customers receive a high quality of service. If it is possible to lease new spectrum, local NAN decision module 10212 may lease spectrum to offset demand 10614, where the total amount of leased spectrum and duration of the lease may depend on the predicted network load. Following 10610 or 10614, may proceed to 10606 to allocate spectrum to users while ensuring that terminal devices with limited band support have sufficient spectrum. Local NAN decision module 10212 may continue to use the leased spectrum or tiered pricing until peak demand subsides, at which point local NAN decision module 10212 may release the leased spectrum or tiered pricing in 10616.

In various aspects, local TD decision module 10214 may perform a variety of different optimizing decisions to control radio activity in 10510*a*. For example, local TD decision module 10214 may utilize its predicted route along with predicted radio conditions (e.g., as a REM) to schedule delay-tolerant data for strong radio coverage areas along the predicted route, to select a desired network type to utilize based on predicted available networks along the predicted route, to scan for certain network access nodes based on predicted available network access nodes along the predicted route, to make decisions on flexible pricing schemes, to change routes on a navigation application (e.g., to select a new route with better radio conditions than a current route), to perform IP layer optimization (such as optimizing retransmissions and acknowledgements/non-acknowledgements (ACK/NACKs)), to suspend cell scans, to suspend modem activity, to select optimized power states, etc.

In accordance with various aspects, local TD decision module 10214 and local NAN decision module 10212 may therefore render local TD decisions and local NAN decision at 10510*a* and 10510*b* and provide the decision instructions to baseband modem 9206 (e.g., to the terminal device protocol stack) or application processor 9212 and control module 9310 (e.g., to the network access node protocol stack), respectively, which may carry out the decisions as instructed. Such may include transmitting or receiving data in accordance with the decisions.

As previously indicated, in some aspects prediction module 10200 may also include a core network prediction module, and decision module 10210 may also include a core network decision module. Accordingly, as opposed to network prediction and decisions on a network access node level, the core network prediction module and core network decision module may be able to make predictions and decisions for multiple network access nodes. Accordingly, as opposed to only making predictions and decisions based on the terminal devices served by a single network access node, the core network prediction module and core network decision module may be able to evaluate terminal devices connected to multiple network access nodes (and accordingly evaluate terminal device prediction results including predicted routes and predicted data service requirements over the coverage area of multiple network access nodes). Accordingly, the core network prediction module may predict a sequence of serving network access nodes that each terminal device is expected to utilize over time and execute decisions to control each of the network access nodes based on the predicted routes and predicted data service requirements of each terminal device, such as planning the handovers for each terminal device, planning the spectrum/resource allocations needed at each network access node at each time, etc. For example, in some aspects the core network prediction module and core network decision module could plan optimizations across the coverage areas of multiple network access nodes, such as if a terminal device is at the cell edge of e.g., two or three network access nodes. Due to signal variations, there could be a cycle of handoffs where the terminal device transfers repeatedly between the network access nodes. This may consume power and resources. However, the core network prediction module may know obtain the context information for the terminal device. Accordingly, in scenarios where the terminal device is static (as indicated by the context information and detected by the core network prediction module) or has other predictable movement around the cell edge, the core network prediction module and core network decision module can coordinate amongst the network access nodes (via the logical connections of prediction module 10200 and/or decision module 10210) to decide which base station the terminal device should connect to.

Figure 107:
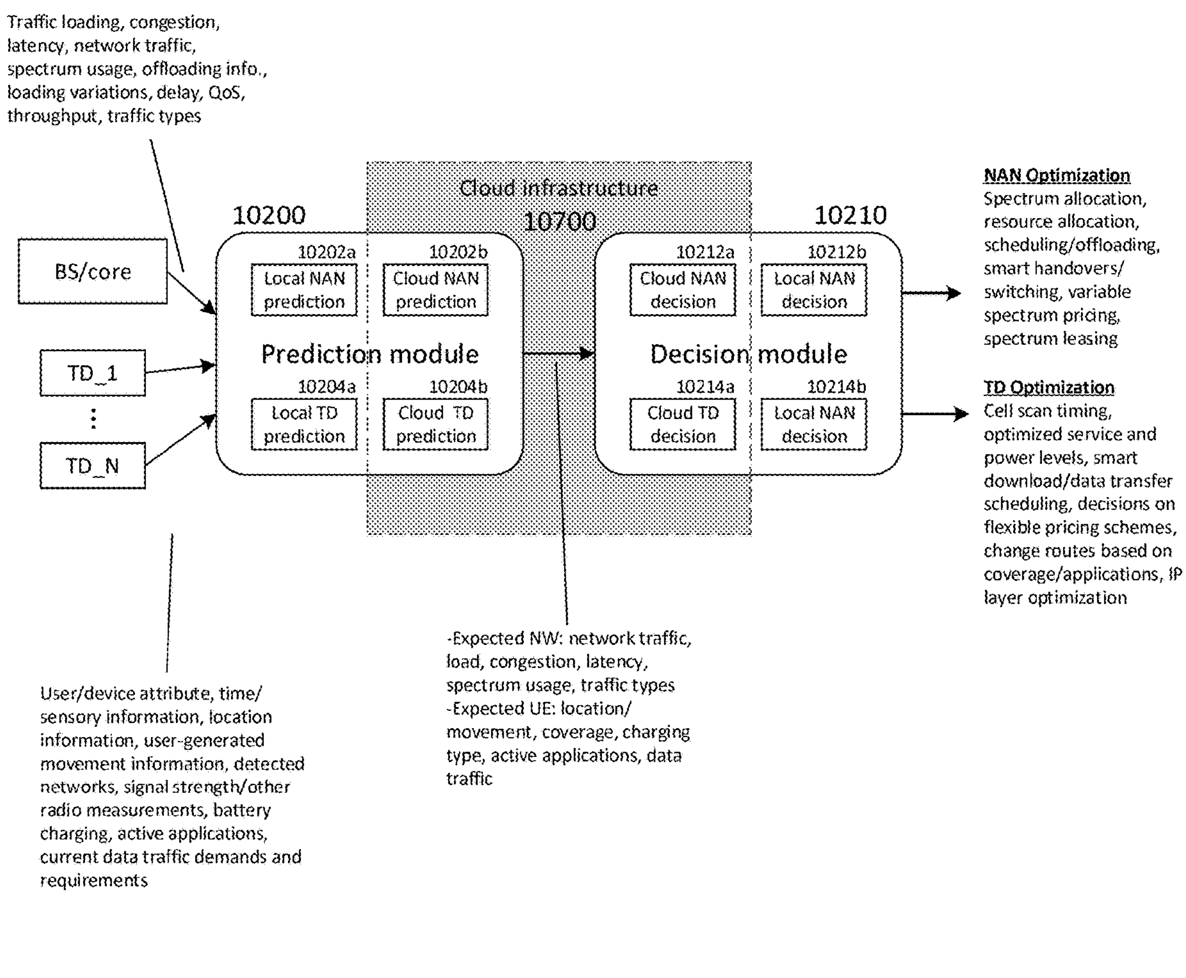
FIG. 107 shows an exemplary implementation of a cloud-based infrastructure in accordance with some aspects.

Furthermore, in some aspects prediction module 10200 and decision module 10210 may be implemented in a 'distributed' manner, where local NAN prediction module 10202, local TD prediction module 10204, local NAN decision module 10212, local TD decision module 10214, one or more other terminal device prediction and decision modules, one or more other network access node prediction and decision modules, and one or more other core network prediction and decision modules are physically located at different locations and may form prediction module 10200 and decision module 10210 via software-level connections. As shown in FIG. 107, in some aspects this 'distributed' architecture can be further expanded to a cloud-based architecture where terminal device and network access node prediction and decisions may be partially or fully implemented at cloud infrastructure 10700. Cloud infrastructure 10700 may therefore be a server comprising cloud NAN prediction module 10202*b*, cloud TD prediction module 10204*b*, cloud NAN decision module 10212*a*, and cloud TD decision module 10214*a*, which may each be software-defined instructions executed at cloud infrastructure 10700.

Accordingly, in various aspects local NAN prediction module 10202*a* may perform part of the network access node prediction at network access node 9110 while cloud NAN prediction module 10202*b* may perform the rest of the network access node prediction at cloud infrastructure 10700, local TD prediction module 10204*a* may perform part of the terminal device prediction at terminal device 9102 while cloud TD prediction module 10204*b* may perform the rest of the terminal device prediction at cloud infrastructure 10700, cloud NAN decision module 10212*a* may perform part of the network access node decision at cloud infrastructure 10700 while local NAN decision module 10212*b* may perform the rest of the network access node decision at network access node 9110, and cloud TD decision module 10214*a* may perform part of the terminal device decision at cloud infrastructure 10700 while local TD decision module 10214*b* may perform the rest of the terminal device decision at terminal device 9102. While the cloud-based architecture of FIG. 107 may be able to provide equivalent functionality to the distributed architecture of FIG. 102, the cloud-based architecture may substantially reduce computational and storage load at terminal devices. Accordingly, as opposed to completely performing the terminal device prediction and decision locally at terminal device 9102, cloud infrastructure 10700 may handle the terminal device prediction and decision at cloud TD prediction module 10204*b* and cloud TD E decision module 10214*b*. Although network access nodes may generally not be as constricted by computation and storage considerations, cloud infrastructure 10700 may also offload network access node prediction and decision from network access node 9110.

Figure 108:
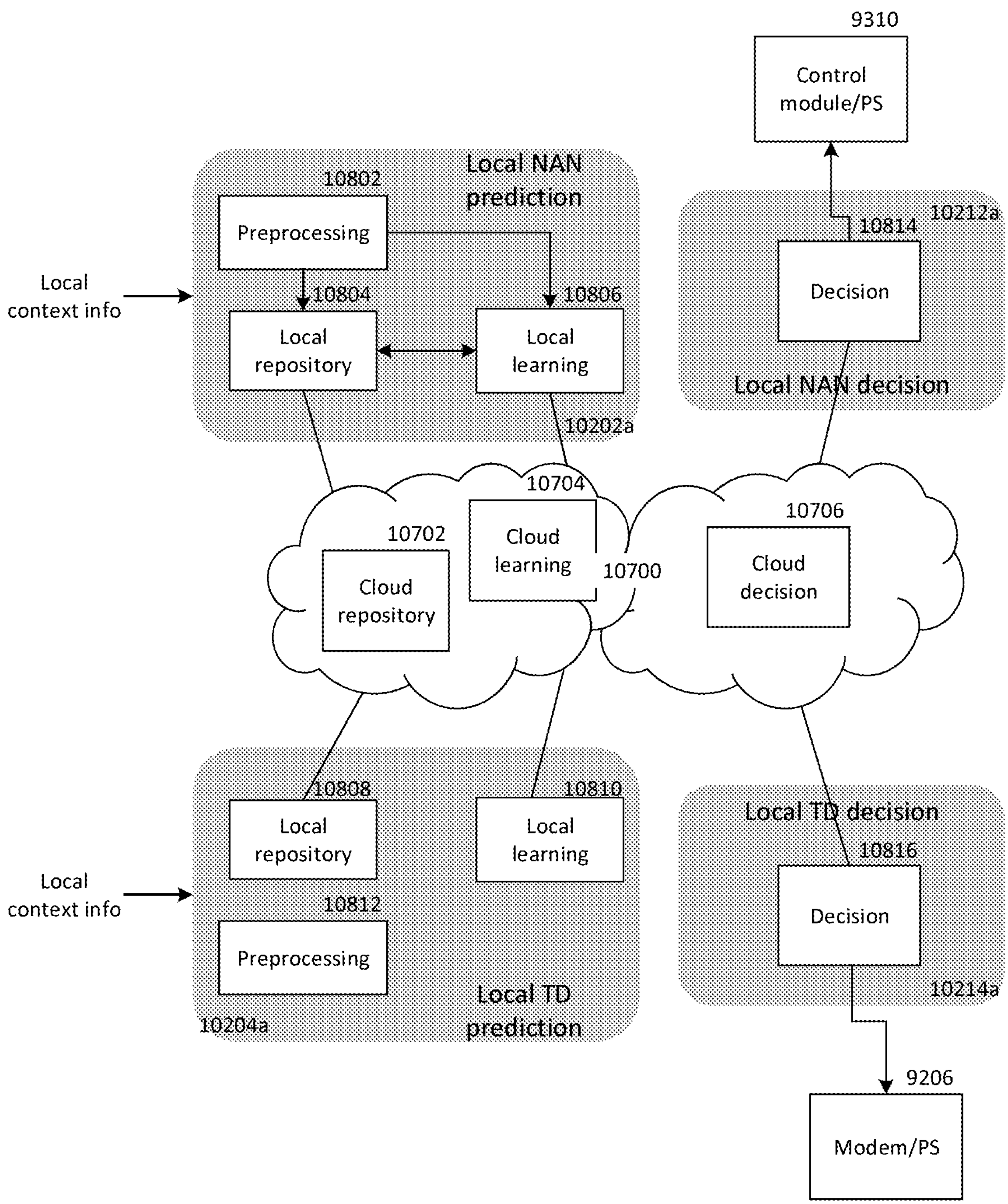
FIG. 108 shows an exemplary internal configuration of local and cloud prediction and decision modules in accordance with some aspects.

FIG. 108 further illustrates the cloud-based architecture in accordance with some aspects. As shown in FIG. 108, local NAN prediction module 10202*a* and local TD prediction module 10204*a* may be configured in a similar manner as local NAN prediction module 10202 and local TD prediction module 10204. However, instead of performing all storage and learning locally, local NAN prediction module 10202*a* and local TD prediction module 10204*a* may rely on cloud repository 10702 and cloud learning module 10704 (which may collectively comprise cloud NAN prediction module 10202*b* and cloud TD prediction module 10204*b*) to perform storage of context information and prediction results (cloud repository 10702) and to perform learning processing (e.g., cloud learning module 10704). Accordingly, the processing and storage burdens at network access node 9110 and terminal device 9102 may be reduced. Similarly, local NAN decision module 10212*a* and local TD decision module 10214*a* may offload decision processing to cloud decision module 10706 (which may comprise cloud NAN decision module 10212*b* and cloud TD decision module 10214*b*). Local NAN decision module 10212*a* and local TD decision module 10214*a* may then issue decision instructions to control module 9310 and baseband modem 9206.

The cloud-based architecture of FIGS. 107 and 108 may additionally facilitate easier crowdsourcing, such as for crowdsourcing terminal device context information and prediction results. Accordingly, instead of relying on connections between terminal devices (e.g., between local TD prediction modules of terminal devices), each local TD prediction module may maintain a software-level connection with cloud infrastructure 10700, which may maintain crowdsourced information at cloud repository 10702, and may retrieve data including both context information and prediction results from cloud repository 10702 on request. Local NAN prediction module 10202*a* may similarly maintain a software-level connection with cloud repository 10702 and thus may have access to context information and prediction results provided by terminal devices to cloud repository 10702; likewise, the local TD prediction module of each terminal device may have access to context information and prediction results provided by network access node 9110 (and one or more other network access nodes).

Cloud learning module 10704 may be configured to perform learning processing, in particular with the context information and prediction results stored in cloud repository 10702. As cloud learning module 10704 may have access to a substantial amount of data at a central location, prediction coordination in 10504 of message sequence chart 10500 may be simplified. Similarly, cloud decision module 10706 may have access to prediction results from cloud learning module 10704, which may apply to each terminal device and base station connected to cloud infrastructure 10700. Cloud decision module 10706 may thus perform decision coordination in 10508 of message sequence chart 10500 and provide decision results to local NAN decision module 10212*a* and local TD decision module 10214*a*, which may have control over final decisions.

For example, cloud learning module 10704 may be configured to generate radio coverage maps such as REMs using the context information and prediction results provided by each participating terminal device and network access node. Cloud learning module 10704 may then be configured to store the radio coverage maps in cloud repository 10702, which cloud decision module 10706 may access for later decisions. For example, cloud learning module 10704 may receive predicted routes from one or more terminal devices and apply the radio coverage map to the predicted routes in order to predict radio conditions and network conditions for each terminal device based on the radio coverage map. Cloud decision module 10706 may then make radio activity decisions, such as cell scan timing, data transfer scheduling, radio access selections, etc., for the terminal devices based on the radio coverage map.

In some aspects, the participating terminal devices and base stations may utilize a preconfigured interface to exchange data with cloud infrastructure 10700, such as with a 'request/response' configuration. Accordingly, different types of messages can be predefined and used to store and retrieve information from cloud infrastructure 10700 by each terminal device and network access node. FIG. 109 illustrates exemplary message formats to support such an interface in accordance with some aspects. As shown in FIG. 109, a client device such as a terminal device or network access node (e.g., a local TD prediction module or a local NAN prediction module with a software-level connection to cloud infrastructure 10700) may utilize upload message 10902 to upload data to the cloud by addressing the message with an identifier of the device and including various different data information fields, which may include any type of context information and/or stored prediction result. Cloud infrastructure 10700 may receive multiple upload messages 10900 and store the contained data in cloud repository 10702. Client devices may then request data with request message 10904, which may request that cloud infrastructure 10700 respond with a certain type of requested data. Cloud infrastructure 10700 may respond with response message 10906, which may include the requested data. For example, a terminal device may request a list of network access nodes (e.g., BSSIDs) along a predicted route, radio measurements (e.g., RSSI measurements) for certain network access nodes, etc., with request message 10904, which cloud infrastructure 10700 may receive from cloud repository 10702 (which may come from crowdsourced information) and provide to the requesting terminal device with response message 10906. Conversely, cloud infrastructure 10700 may request specific data from a client device with request message 10904, which the client device may respond to with response message 10906.

Additionally, in some aspects a client device may be able to request for cloud infrastructure 10700 to perform predictions with prediction request message 10908, which may specify a type of prediction (e.g., route prediction, radio condition prediction, etc.) in addition to data related the prediction (e.g., location information such as current and recent locations with timestamps). For example, terminal device 9102 may obtain a series of timestamped locations at preprocessing module 10302 and may wish to detect whether terminal device 9102 is on an identifiable route, such as a regular route. Local TD prediction module 10204 may then transmit prediction request message 10908 with the timestamped locations to cloud infrastructure 10700. Cloud infrastructure 10700 may receive and process prediction request message 10908 at cloud learning module 10704, which may include comparing the timestamped locations to information stored in cloud repository 10702 (e.g., either previous locations of terminal device 9102 in order to recognize a regular route or to known roads in order to identify a road that terminal device 9102 is traveling on). Cloud learning module 10704 may then predict the route of terminal device 9102 and respond to terminal device 9102 with prediction response message 10910, which may provide a series of predicted timestamped locations that identify the predicted route. Cloud learning module 10704 may also provide predicted radio conditions to terminal device 9102 that predict radio conditions along the predicted route, which cloud learning module 10704 may generate based on an REM or other radio coverage map stored in cloud repository 10702. Local TD decision module 10312 may then make radio activity decisions and instruct baseband modem 9206 accordingly, such as to schedule data transfers, control cell scan timing, make radio access selections, etc.

The distributed architecture of these aspects may therefore enable a high level of coordination between terminal devices, base stations, and the core network and accordingly may provide highly accurate predictions on both the terminal device and network side. Additionally, these aspects may be very compatible with cloud-based architectures that may reduce storage and processing burdens on terminal devices and network access nodes in addition to readily facilitating crowdsourcing.

Figure 110:
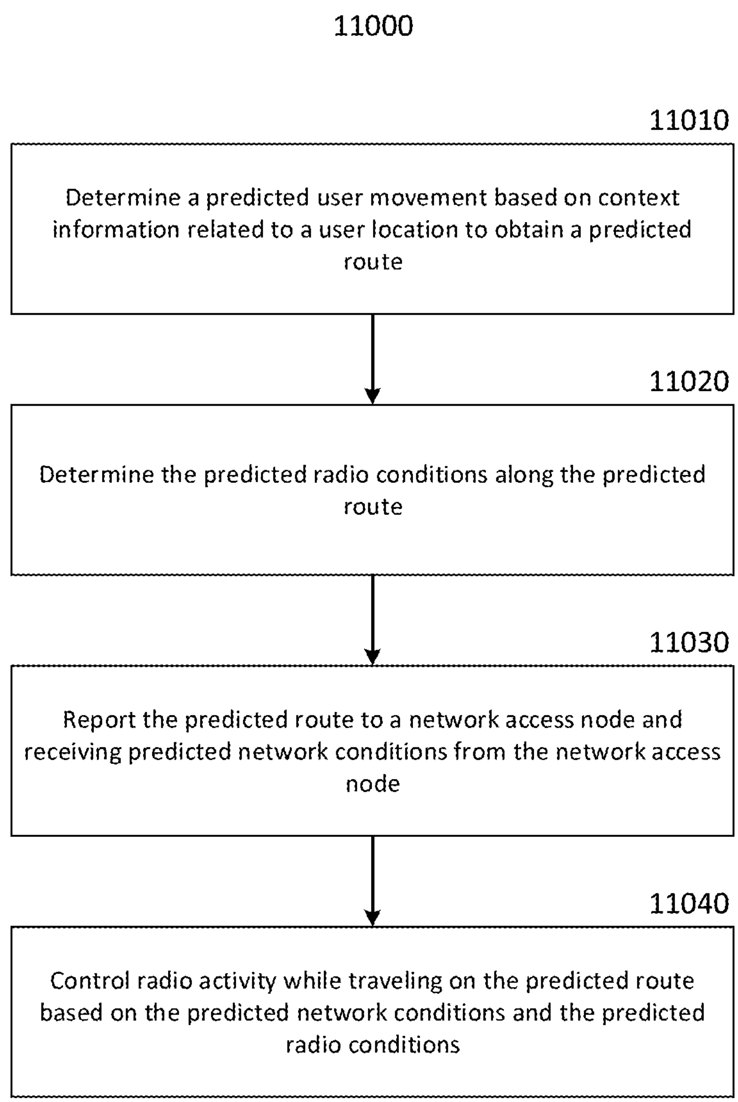
FIG. 110 shows a first exemplary method of performing radio communications in accordance with some aspects.

FIG. 110 shows exemplary method 11000 of performing radio communications in accordance with some aspects. As shown in FIG. 110, method 11000 includes determining a predicted user movement based on context information related to a user location to obtain a predicted route (11010), determining the predicted radio conditions along the predicted route (11020), reporting the predicted route to a network access node and receiving predicted network conditions from the network access node (11030), and controlling radio activity while traveling on the predicted route based on the predicted network conditions and the predicted radio conditions (11040).

Figure 111:
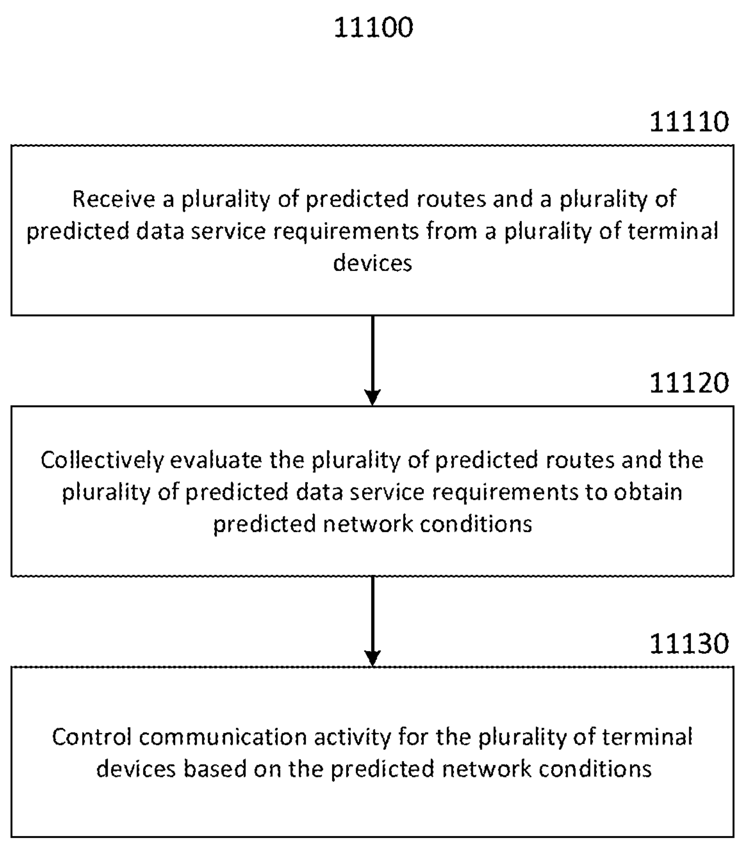
FIG. 111 shows a second exemplary method of performing radio communications in accordance with some aspects.

FIG. 111 shows method 11100 of performing radio communications in accordance with some aspects. As shown in FIG. 111, method 11100 includes receiving a plurality of predicted routes and a plurality of predicted data service requirements from a plurality of terminal devices (11110), collectively evaluating the plurality of predicted routes and the plurality of predicted data service requirements to obtain predicted network conditions (11120), and controlling communication activity for the plurality of terminal devices based on the predicted network conditions (11130).

3.3 Context-Awareness #3

In some aspects of this disclosure, a mesh network comprising e.g., Internet of Things (IoT) devices may implement an effective system of collecting measurements to initialize the mesh network and interfacing with external network management entities to enable outside control and oversight of network configurations.

Figure 112:
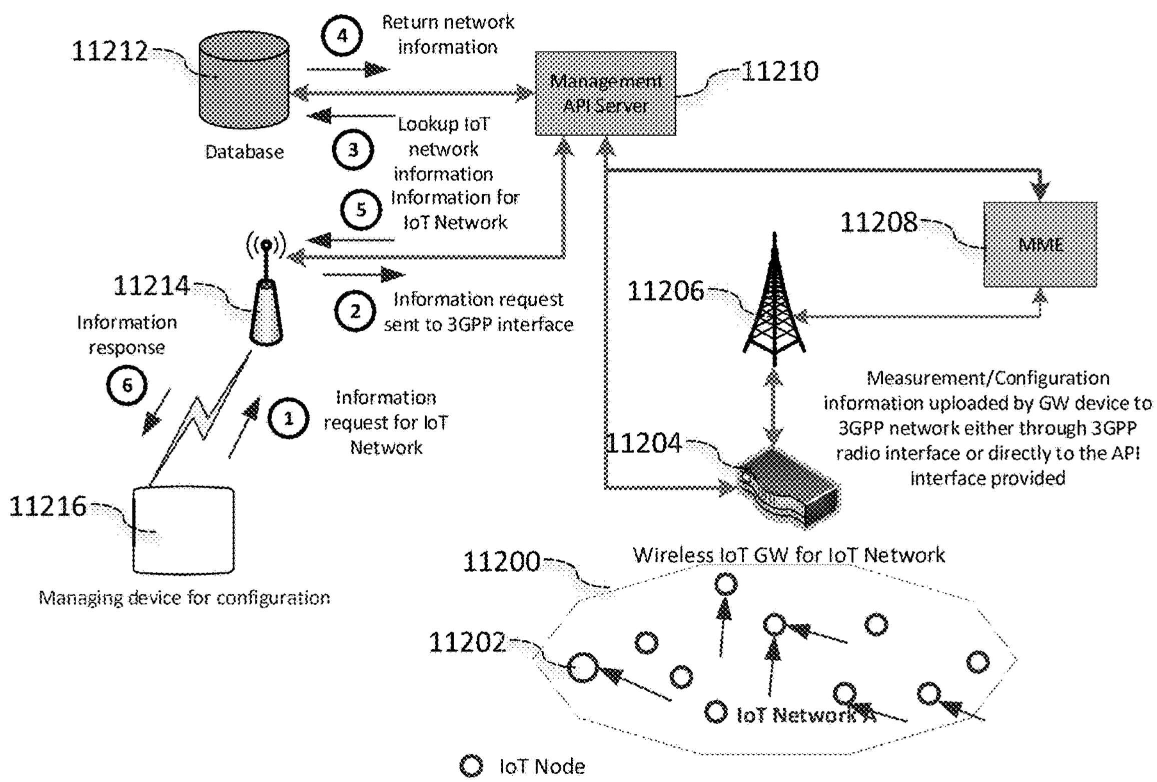
FIG. 112 shows an exemplary network scenario for managing an IoT network in accordance with some aspects.

FIG. 112 shows an illustration in accordance with some aspects implemented with wireless network 11200, which may be a multi-hop network comprising IoT devices, or 'nodes', operating on a mesh network or multi-hop radio standard. A non-limiting example can be as e.g., IEEE 802.15.4 (although other similar standards can analogously be utilized). The IoT nodes may generally utilize low-power radio interfaces that may utilize long sleep cycles. As shown in FIG. 112, multiple IoT nodes may coordinate with one another and gateway device 11204 to form a wireless network, where gateway device 11204 may act as a coordinator node and provide access to an external wireless network to the IoT nodes of wireless network 11200. Accordingly, the IoT nodes of wireless network 11200 may coordinate with one another, such as by utilizing other IoT nodes as 'relay nodes' in order to establish a connection with gateway device 11204 that relies on zero or more relay nodes as intermediaries. The IoT nodes may then communicate with one another and with gateway device 11204 via the mesh network. As shown in FIG. 112, gateway device 11204 may interface with an external network, such as a cellular network, via network access node 11206, which may be a cellular base station such as a 3GPP eNodeB. The interface between gateway device 11204 and network access node 11206 may be either a wireless or a wired interface. For example, in some aspects gateway device 11204 may operate on a radio access network provided by network access node 11206, and may consequently transmit and receive data wirelessly with network access node 11206. Alternatively, in some aspects gateway device 11206 may interface with network access node 11206 via a fiber optic, Ethernet, or similar wired interface. In some aspects, gateway device 11204 may operate on a 3GPP radio access network to interface with network access node 11206 or, alternatively, may operate on a non-3GPP radio access network such as Wi-Fi IEEE 802.11 to interface with network access node 11206.

In some aspects, the 3GPP network may also verify and authenticate gateway device 11204 as a valid operator on the 3GPP network, which network access node 11206 may perform via MME 11208. After authentication and verification, gateway device 11204 may be able to operate on the 3GPP radio access network and may provide access to wireless network 11200. The IoT nodes may then utilize the 3GPP radio access network for data services, such as to access external internet servers and cloud services.

Figure 113:
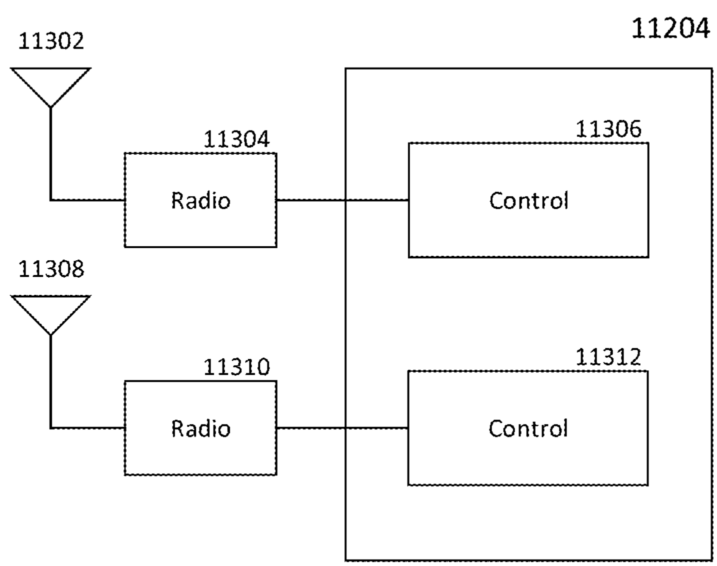
FIG. 113 shows an exemplary internal configuration of a gateway device in accordance with some aspects.

One or more IoT nodes of wireless network 11200 can be configured as a terminal device, such as in the manner of terminal device 9102 as shown in FIG. 92. Accordingly, IoT node 11202 may transmit and receive radio signals, e.g., according to a multi-hop network standard such as IEEE 802.15.4, on wireless network 11200 with antenna system 9202 and RF transceiver 9204 under the control of baseband modem 9206. Gateway device 11204 can be configured similarly to network access node 9110. However, in some aspects gateway device 11204 may have both a radio interface configured to communicate with network access node 11206, which may be e.g., a 3GPP radio interface such as LTE, UMTS, or GSM, and a radio interface configured to communicate with wireless network 11200, which may be e.g., an 802.15.4 radio interface. FIG. 113 shows an exemplary internal configuration of gateway device 11204 in accordance with some aspects, which may include a first radio interface comprising antenna 11302, radio module 11304, and control module 11306, and a second radio interface including antenna 11308, radio module 11310, and control module 11312. Control module 11306 may be a radio modem configured to perform control and physical layer processing for the first radio interface and to control the transmission and reception of radio signals with radio module 11304 and antenna 11302 according to the radio interface of wireless network 11200, such as 802.15.4 or another similar radio interface compatible with IoT deployments. Control module 11312 may be a radio modem configured to perform control and physical layer processing for the second radio interface and to control the transmission and reception of radio signals with radio module 11310 and antenna 11308 according to the radio interface of network access node 11206, such as 802.15.4. Control module 11306 and control module 11312 may each include a processor configured to execute software-defined instructions for the protocol stack of the respective radio interface optionally in addition to one or more circuits configured with hardware-defined circuitry to perform processing tasks, such as for physical layer processing functions (e.g., hardware accelerators). Radio module 11304 and radio module 11310 may be configured as radio transceivers and include one or more amplifiers, filters, RF modulator/demodulators, DACs/ADCs, etc. Alternative to the configuration shown in FIG. 113, gateway device 11204 may interface with network access node 11206 via a wired interface, such as a fiber optic or Ethernet connection, and may, for example, consequently only contain the first radio interface for communicating with wireless network 11200.

Gateway device 11204 may play an important role in initializing and maintaining wireless network 11200. As indicated above, gateway device 11204 may act in a 'bridging' role in order to provide the IoT nodes with access to the 3GPP radio access network (and other external networks, if applicable). Accordingly, gateway device 11204 may provide data routing and buffering between wireless network 11200 and network access node 11206. Additionally, gateway device 11204 may authenticate nodes that request to wireless network 11200 in order to verify which IoT nodes are permitted to join wireless network 11200.

In addition to such general functionality, in accordance with some aspects, gateway device 11204 may additionally utilize measurement reports provided by the IoT nodes of wireless network 11200 in order to optimize the configuration of wireless network 11200. In particular, gateway device 11204 may control scheduling and contention parameters in order to enable wireless network 11200 to effectively manage collisions and contention between the IoT nodes. Furthermore, as will be later detailed, gateway device 11204 may additionally utilize a service interface to enable external configuration of wireless network 11200, such as by a network manager operating outside of wireless network 11200.

In particular, various aspects may attempt to address contention-related issues in wireless network 11200. For example, wireless network 11200 may utilize a radio interface that includes a contention-based access system, such as 802.15.4 or another interface that utilizes a 'listen before talk' technique. In contention-based access systems based on listen before talk, a transmitter may need to sense for activity on a particular channel before transmitting on the channel. If the transmitter detects other transmissions, e.g., if contention occurs, the transmitter may need to wait before using the channel. The transmitter may then access the channel at a later time when no other transmissions are detected.

If wireless network 11200 is very dense, e.g., if IoT nodes generally have a large number of neighboring IoT nodes within range, there may be a high degree of contention. Conversely, if wireless network 11200 is sparse, e.g., if IoT nodes generally have zero or a small number of neighboring IoT nodes within range, there may only be a low degree of contention. Accordingly, IoT nodes operating in a dense network may be exposed to frequent collisions, which may severely impede data transfer.

In accordance with some aspects, gateway device 11204 may attempt to detect when wireless network 11200 is experiencing high levels of contention and, in response to detecting high levels of contention, may reconfigure wireless network 11200 in order to reduce the contention. Gateway device 11204 may be configured to evaluate contention levels monitoring certain measurements of wireless network 11200, such as, without limitation, neighbor counters (e.g., the number of detectable neighbors at a given IoT node), contention counters (e.g., the number of contention occurrences), the amount of data transfer (e.g., the amount of data exchanged in a certain time period), channel access delay (e.g., the amount of delay experienced when attempting to access the channel) frame transmission delay, packet or frame error rate, retransmission counters, or other measurements. By monitoring these measurements, gateway device 11204 may estimate contention levels and adapt scheduling and contention parameters in order to alleviate high contention.

Many existing low-power wireless connectivity standards, such as those related to IoT including 802.15.4, do not currently provide a mechanism to discover network characteristics and to adapt network configurations in real time. Accordingly, various aspects may employ a new measurement collection and reporting scheme in order to obtain measurement reports at gateway device 11204 from the IoT nodes of wireless network 11200. Gateway device 11204 may then evaluate the measurement reports in order to estimate operating conditions such as contention levels and adjust the configuration of wireless network 11200 based on the estimated contention levels.

Accordingly, the IoT nodes of wireless network 11200 may cooperate with gateway device 11204 by performing radio measurements and reporting the radio measurements to gateway device. The IoT nodes may collect the radio measurements during network initialization, e.g., prior to connecting to gateway device 11204, and/or during normal operation on wireless network 11200.

Figure 114:
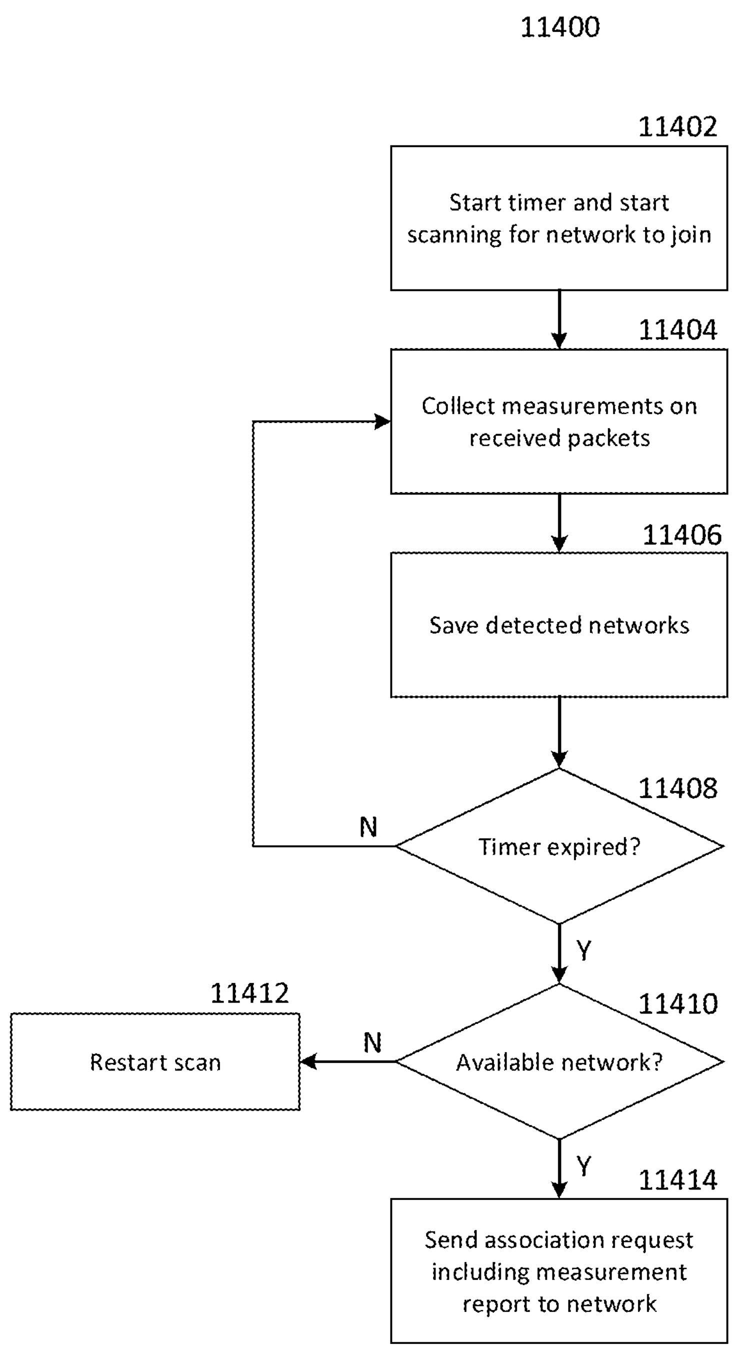
FIG. 114 shows an exemplary method at an IoT node to perform radio measurements and detect networks in accordance with some aspects.

FIG. 114 shows exemplary method 11400 in accordance with some aspects, which an IoT node such as IoT node 11202 may perform. As will be detailed, as opposed to searching for a network to connect to and sending an association request to a detected network, IoT node 11202 may collect radio measurements during an initial network scan (e.g., prior to connecting to a network) and continue collecting radio measurements and scanning for networks until a timer expires. After the timer expires, IoT node 11202 may connect to a detected network and report the collected measurements to the detected network, e.g., a gateway device of the detected network. The gateway device may then be able to utilize the measurements in order to evaluate the current status of the network and make any necessary adjustments, in particular if high levels of contention are detected.

Figure 115:
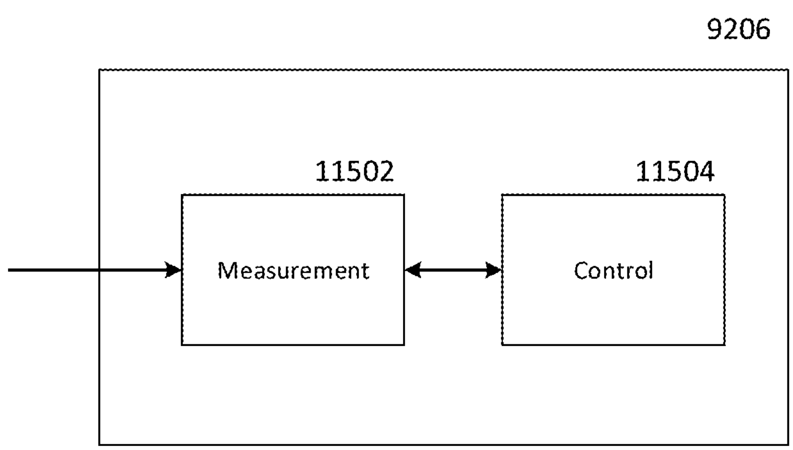
FIG. 115 shows an exemplary internal configuration of a baseband modem for an IoT node in accordance with some aspects.

FIG. 115 shows an exemplary internal configuration of baseband modem 9206 in accordance with some aspects, which illustrates various components of baseband modem 9206 configured to perform method 11400. As shown in FIG. 115, baseband modem 9206 may include measurement module 11502 and control module 11504, which may each be components of physical layer processing module 9208 and controller 9210. The illustrated depiction of FIG. 115 may omit certain components of baseband modem 9206 that are not directly related to the current aspect in addition to control, power, and clock lines. In various aspects, the components of baseband modem 9206 shown in FIG. 115 may be structurally realized as a hardware-defined module, e.g., as one or more dedicated hardware circuits or FPGAs, as a software-defined module, e.g., as one or more processors executing program code defining arithmetic, control, and I/O instructions (e.g., software and/or firmware instructions) stored in a non-transitory computer readable storage medium, or as a mixed hardware-defined and software-defined module. The functionality of each component of baseband modem 9206 as detailed herein may therefore be embodied in a software-defined and/or hardware-defined module.

Returning to method 11400, control module 11504 may start a measurement timer in 11402 and instruct measurement module 11502 to start scanning for available networks. Accordingly, measurement module 11502 may be configured to receive and decode data packets in order to determine whether any data packets contain discovery signals from available networks. For example, in accordance with a multi-hop network setting, one or more of the IoT nodes of wireless network 11200 may broadcast discovery signals that identify themselves, identify neighboring IoT nodes, and identify routing paths are available to a coordinating node such as gateway device 11204. Accordingly, in some aspects measurement module 11502 may attempt to decode data packets to identify neighboring IoT nodes of wireless network 11200 in addition to detecting a valid routing path to gateway device 11204. Depending on the proximity and radio conditions between IoT node 11202 and gateway device 11204, measurement module 11502 may also be able to directly detect gateway device 11204 by receiving data packets from gateway device 11204. By reading data packets from other IoT nodes of wireless network 11200 and gateway device 11204, measurement module 11502 may detect wireless network 11200. Control module 11504 may instruct measurement module 11502 to perform network scanning continuously or periodically according to a duty cycle, which may conserve power at the expense of performance.

In addition to reading received data packets for network scanning purposes, in some aspects measurement module 11502 may also perform radio measurements on received packets in 11404, which measurement module 11502 may continue to do until the measurement timer expires. The measurement timer may therefore define an interval during which IoT node 11202 is expected to perform measurements before requesting association to wireless network 11200. In some aspects, the measurement time can be defined in part of a radio access standard, or alternatively, may not be defined in a standard and may be an implementation-specific feature. Additionally, in some aspects control module 11504 may also select the measurement timer randomly within a given range, which may ensure that both IoT nodes do not synchronize their association procedures (as may occur, e.g., if the measurement timers were identical) and consequently that at least some IoT nodes are communicating during the measurements of other IoT nodes to yield useful measurement results.

Measurement module 11502 may perform any of a variety of radio measurements in 11404. For example, in some aspects measurement module 11502 may measure the number of frames received during a given scanning interval, which may characterize the traffic level being produced by nearby IoT nodes. Additionally or alternatively, measurement module 11502 may count the number of neighboring devices detected, such as by incrementing a running counter each time a packet is received that has a previously undetected MAC address, which may characterize the number of nearby transmitting devices. In some aspects, measurement module 11502 may perform a signal strength measurement, such as by calculating the Received Signal Strength Indicator (RSSI) of each received packet, and tracking the signal strength over time, e.g., as an average RSSI., which may indicate whether other IoT nodes are far (weak RSSI) or near (strong RSSI) and consequently characterize network density. In some aspects, measurement module 11502 also perform a signal quality measurement such as a signal-to-noise ratio (SNR) or signal-to-interference-plus-noise ratio (SINR). Furthermore, measurement module 11502 may measure contention by determining the number of clear channel assessments (CCAs), e.g., a listen before talk test on a given channel to determine whether the channel is busy, that yield busy results per scanning interval (e.g., where measurement module 11502 may perform the CCA measurement even without data packets just to measure the contention level). Measurement module 11502 may collect all such measurements in 11404 for later provision to control module 11504.

As previously indicated, measurement module 11502 may detect wireless network 11200 by reading packets from other IoT nodes of wireless network 11200 and gateway device 11202. Instead of connecting to wireless network 11200 after detecting wireless network 11200, IoT node 11202 may continue performing measurements until the measurement timer expires. Measurement module 11502 may therefore save any detected networks in 11406 and check whether the measurement timer has expired in 11408. If the measurement timer has not expired in 11408, measurement module 11502 may return to 11404 and 11406 to collect measurements on received packets and save any detected networks.

Upon expiry of the measurement timer in 11408, measurement module 11404 may have collected measurements and saved detected networks, if any. Measurement module 11502 may provide the measurements and any detected networks to control module 11504, which may determine in 11410 if any networks are available. If no networks are available, control module 11504 may restart the network scan in 11412 to again read data packets and perform radio measurements. If networks are available, control module 11504 may proceed to 11414 to connect to an available network.

As measurement module 11502 has identified data packets from other IoT nodes of wireless network 11200 and/or gateway device 11204, control module 11504 may determine that wireless network 11200 is available in 11410. For example, control module 11504 may identify that measurement module 11502 identified a data packet from another IoT node of wireless network 11200 and/or from gateway device 11204. Control module 11504 may then connect to wireless network 11200 by sending an association request to wireless network 11200 in 11414. In particular, if IoT node 11202 is within range of gateway device 11204, control module 11504 may send an association request directly to gateway device 11204. If IoT node 11202 is not within range of gateway device 11204, control module 11504 may need to utilize other IoT nodes of wireless network 11200 as relay nodes in order to transmit an association request to gateway device 11204. Control module 11504 may select the relay nodes to form a routing path between IoT node 11202 and gateway device 11204 based on the data packets received from neighboring IoT nodes, which may provide information that details which IoT nodes of wireless network 11200 offer the best paths (e.g., based on link conditions, number of hops, etc.) to gateway device 11204.

In addition to transmitting the association request to gateway device 11204 in 11414, in some aspects control module 11504 may also transmit the measurements collected by measurement module 11502 as a measurement report along with the association request (e.g., as an information element of the association request or as separate data sent proximate in time to the association request). Gateway device 11204 may receive the association request and measurement report from IoT node 11202 at control module 11306 via antenna 11302 and radio module 11304 and may process the association request and measurement report at control module 11306 in order to obtain statistics for wireless network 11200. Control module 11306 may then perform the access control procedures in order to process the association request from IoT node 11202 to decide whether to allow IoT node 11202 to join wireless network 11200. In certain cases, such as when an association request from IoT node 11202 includes a measurement report as an information element, control module 11306 may first perform security procedures to authenticate IoT node 11202 and may only collect the measurement reports once IoT node 11202 has been successfully authenticated and allowed to join wireless network 11200.

Additionally or alternatively to collecting measurements prior to connecting to a wireless network, in some aspects IoT nodes may also periodically perform measurements and provide resulting measurement reports to a gateway device. For example, after permitting IoT node 11202 to join wireless network 11200, gateway device 11204 may instruct IoT node 11202 to (or alternatively IoT node 11202 may be originally configured to) periodically perform radio measurements and report the radio measurement back to gateway device 11204. Accordingly, IoT node 11202 may wake up to perform radio measurements at measurement module 11502 according to the measurement period and provide measurements to control module 11504 for collection. Control module 11504 may collect the measurements and transmit a measurement report to gateway device 11204. In some aspects where gateway device 11204 controls measurement behavior of connected IoT nodes, control module 11306 may be able to selectively activate and deactivate measurements in certain IoT nodes by sending an instruction to an IoT node to trigger measurements, e.g., as a measurement trigger command frame. The instruction can also configure the type of measurements the IoT nodes are required to perform (e.g., frame counts, neighbor counts, signal strength, signal quality, channel activity assessment, channel access delay, frame transmission delay, packet or frame error rate, retransmission count). The instruction can also configure a specific measurement reporting mode. For example, each IoT node may be configured to report measurements according to either a normal reporting mode or a piggyback reporting mode, which gateway device 11204 may select and include in the instruction in order to prompt the IoT node to perform the desired type of reporting. In a scenario where gateway device 11204 configures IoT node 11202 in normal reporting mode, control module 11504 may periodically wake up measurement module 11502 according to the measurement period, measurement module 11502 may perform radio measurements and provide the measurements to control module 11504, and control module 11504 may report the measurements to gateway device 11204. In a scenario where gateway device 11204 has configured IoT node 11202 in piggyback reporting mode, control module 11304 may trigger radio measurements at measurement module 11302, measurement module 11502 may perform radio measurements and provide the measurements to control module 11504, control module 11302 may wait to identify a data packet scheduled to be transmitted to gateway device 11204 and may subsequently piggyback the measurement report on the identified data packet. The piggyback reporting mode may reduce the reporting overhead (e.g., as normal reporting mode may require standalone measurement report messages), in particular for applications that generate small data packets.

As multiple of the IoT nodes of wireless network 11200 may cooperate in these aspects, in some aspects control module 11306 may collect measurement reports from multiple IoT nodes along with association requests from the IoT nodes when the IoT nodes request to join wireless network 11200. Furthermore, as the IoT nodes of wireless network 11200 may operate asynchronously, different IoT nodes may provide measurement reports to gateway device 11204 at different times. Control module 11306 may thus continuously collect measurement reports from IoT nodes.

Figure 116:
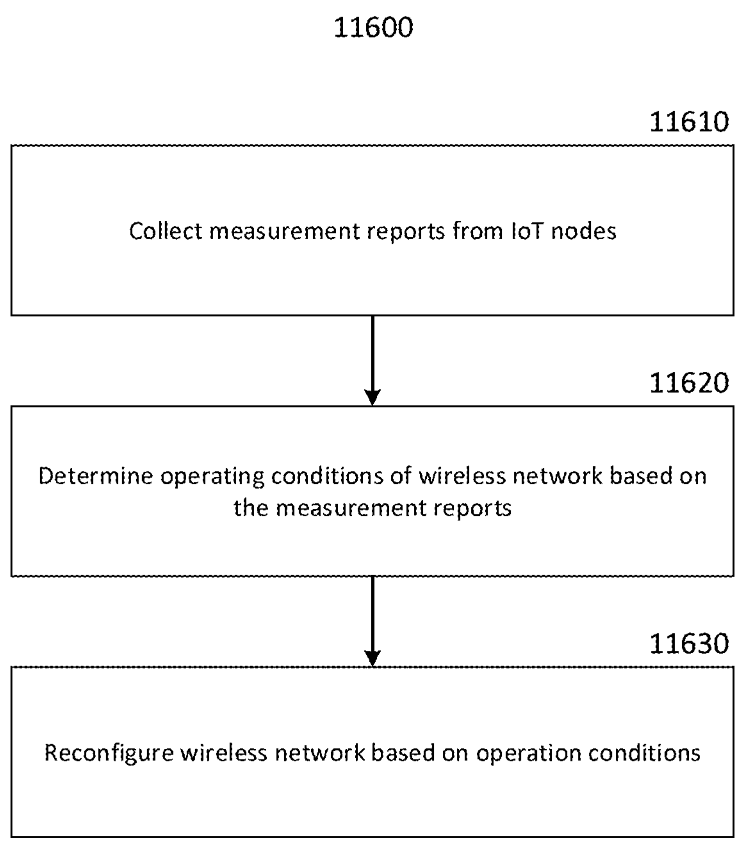
FIG. 116 shows an exemplary method at a gateway device to collect radio measurements and reconfigure a wireless network in accordance with some aspects.

Both the pre- and post-connection measurement reporting by IoT nodes may provide gateway device 11204 with radio measurements that may indicate the operating conditions of wireless network 11200. As shown in FIG. 116, control module 11306 may perform method 11600 in order to collect measurements from connected IoT nodes and to optimize operation of wireless network 11200 based on the collected measurements. As previously indicated, control module 11306 may include a processor configured to execute software-defined instructions, which may include control instructions that manages wireless network 11200.

As shown in FIG. 116, control module 11306 may collect measurement reports from IoT nodes in 11610. As previously indicated, the measurement reports can include number of received frames, number of neighbors, signal strength measurements, signal quality measurements, and channel activity measurements, which may indicate operating conditions of wireless network 11200. Control module 11306 may then determine the operating conditions of wireless network 11200 in 11620 based on the measurement reports. In particular, control module 11306 may estimate the density of wireless network 11200 and/or collision conditions of wireless network 11200 in 11620. For example, as previously indicated each of number of received frames, number of neighbors, signal strength measurements, and channel activity measurements may indicate how closely the IoT nodes of wireless network 11200 are to each other and the frequency of collisions between IoT nodes of wireless network 11200. Specifically, high numbers of received frames may indicate high traffic levels and thus high density/collision frequency, high numbers of neighboring devices may indicate high density/collision frequency, high signal strength measurements may indicate proximate neighbors and thus high density/collision frequency, and high frequencies of busy channel evaluations (such as CCAs) may indicate high density/collision frequency. Control module 11306 may thus evaluate the measurement reports to estimate network density and collision potential as the operating conditions in 11620.

Control module 11306 may then reconfigure wireless network 11200 based on the operating conditions in 11630, in particular to reduce collision potential for dense networks. For example, control module 11306 may be configured to adjust scheduling parameters, contention parameters, and power usage parameters based on the operating conditions. For example, if control module 11306 detects that wireless network 11200 is a dense network, control module 11306 may adjust scheduling and contention parameters to be optimized for dense network operation, such as by adjusting the listen before talk scheme (e.g., adjusting the amount of time an IoT node needs to listen before transmitting or adjusting the amount of time an IoT node needs to wait after detecting a busy channel before retrying, e.g., a wait time), adjusting a transmission interval (e.g., adjusting the amount of time an IoT node needs to wait after a transmission before being permitted to perform another transmission), or adjusting a duty cycling scheme (e.g., by using a duty cycling scheme in dense network conditions in order to offset high power consumption caused by excessive contention or by adjusting power consumption commands and/or sleep commands to IoT nodes to conserve power in high contention scenarios). In some aspects, control module 11306 may also be configured to adjust the individual schedules of the IoT nodes, such as by selecting schedules of the IoT nodes that reduces the potential for collisions. In some aspects control module 11306 may be configured to adapt PHY and/or MAC layer parameters including scheduling and contention parameters may be effective in reducing conditions. In some aspects, control module 11306 may also be configured to reconfigure which IoT nodes are connected to wireless network 11200 in 11630. For example, control module 11306 may be able to register and/or deregister specific IoT nodes. Control module 11306 may also in some aspects be configured to control which frequency band or bands wireless network 11200 utilizes. In some aspects, control module 11306 may be configured to adjust the routing configurations of wireless network 11200, such as by changing the routing within the mesh architecture.

Accordingly, in various aspects control module 11306 may adapt the configuration of wireless network 11200 based on estimated density and/or collision conditions in order to improve the performance of wireless network 11200. Control module 11306 may therefore be configured to react to the instantaneous operating conditions and/or any changes to the operation of wireless network 11200. For example, control module 11306 may estimate network density and/or contention levels of wireless network 11200 and compare the estimated network density and/or contention level to a predefined threshold and, when the estimated network density and/or contention levels exceed the predefined threshold, triggering a reconfiguration of wireless network 11200 to reduce contention. Control module 11306 may quantitatively estimate the network density and contention level by evaluating the radio measurements to determine density and contention conditions. Control module 11306 may provide control signaling to the IoT nodes of wireless network 11200 that enforces the reconfiguration. Additionally, in some aspects gateway device 11204 may execute method 11600 during the initial formation of wireless network 11200 (such as when each of the IoT nodes are initially connecting to gateway device 11204, and may provide measurement reports with association requests), which may enable gateway device 11204 to initially configure wireless network 11200 based on the measurement reports.

Various aspects may therefore enable a coordinating node such as a gateway device to receive measurement reports from nodes of a mesh network or other similar low-power network and to adaptively adjust the network configuration based on the measurement reports. Continuing with the setting of FIG. 112, some aspects may also provide a service interface with which a network manager may externally monitor the operation of wireless network 11200 and/or externally adjust the configuration of wireless network 11200. As shown in FIG. 112, managing device 11216 may be connected to a different network than gateway device 11204, such as a non-3GPP network (e.g., Wi-Fi). As managing device 11216 may not be connected to the same network as gateway device 11204, managing device 11216 may not be able to interact with gateway device 11204; however, some aspects may provide for a service interface supported by management Application Program Interface (API) server 11210 that provides a mechanism for managing device 11216 to interact with gateway device 11204. These aspects may therefore enable managing device 11216 to both interact with gateway device 11204 to control wireless network 11200 and to monitor operation of wireless network 11200 via database 11212, which may store configuration information and measurement information of wireless network 11200.

Managing device 11216 may be a communication device operated by a network manager that is responsible for or has management authorization for wireless network 11200. Managing device 11216 may be configured in the same manner as terminal device 9120 as shown in FIG. 92 and may have a radio interface comprising antenna system 9202, RF transceiver 9204, and baseband modem 9206 that is configured for operation with network access node 11214, which may be a non-3GPP network access node such as a Wi-Fi AP. As network access node 11214 may not be connected to the same network as gateway device 11204, managing device 11216 may not be able to directly access wireless network 11200 via network access node 11214. In accordance with some aspects, management API server 11210 may be placed between the non-3GPP network of network access node 11214 and the 3GPP network of network access node 11206. Management API server 11210 may therefore be implemented as a server that acts as an interface between different networks and may provide a service interface for managing device 11216 to interact with wireless network 11200.

Managing device 11216 may be able to both monitor operation of wireless network 11200 and to configure operation of wireless network 11200 via management API server 11210. As shown in FIG. 112, gateway device 11204 may interface with database 11212 via management API server 11210. Accordingly, after receiving measurement reports from the IoT nodes of wireless network 11200, gateway device 11204 may upload the measurements to management API server 11210 (e.g., via a direct interface and/or via network access node 11206), which may store the measurements at database 11212. Gateway device 11204 may also upload the current configuration information, such as scheduling and contention parameters, to database 11212 via management API server 11200. Database 11212 may be implemented as a server configured to store data, and may be implemented collectively with or separately from management API server 11210. Database 11212 may therefore store the measurement and configuration information as operating information for wireless network 11200 provided by wireless network 11200.

As managing device 11216 may not be able to interact directly with gateway device 11204 due to the different serving networks, managing device 11216 may rely on management API server 11210 to monitor and configure wireless network 11200. For example, managing device 11216 may request measurement or configuration information for wireless network 11200 from management API server 11210, which may retrieve the measurement or configuration information from database 11212 and provide the measurement or configuration information to client device 11216. As shown in FIG. 112, managing device 11216 may first generate an information request measurement or configuration information for wireless network 11200. The information request may be prompted by a user of managing device 11216, which may utilize an application layer at application processor 9212 of managing device 11216 to trigger an information request. Application processor 9212 may then generate the information request and transmit the information request to network access node 11214 via the radio interface provided by baseband modem 9206, RF transceiver 9204, and antenna system 9202. Network access node 11214 may then route the information request to management API server 11210, which may verify that managing device 11216 is authorized to access operating information such as measurement and configuration information for wireless network 11200. Management API server 11210 may then query database 11212 for the measurement or configuration information specified in the information request. Database 11212 may respond to management API server 11210 with the measurement or configuration information, which may generate an information response with the measurement or configuration information and transmit the information response to managing device 11216 via network access node 11214. Accordingly, as gateway device 11204 has previously uploaded the measurement and configuration information for wireless network 11200 to database 11212 via management API server 11210, some aspects may enable managing device to access configuration or measurement information for wireless network 11200 even though managing device 11216 and gateway device 11204 may be connected to different networks, e.g., a non-3GPP network vs. a 3GPP network.

In addition to accessing measurement and configuration information for wireless network 11200 via management API server 11210, in some aspects managing device 11216 may also configure and adapt wireless network 11200 via gateway device 11204. For example, as previously indicated regarding method 11600, gateway device 11204 can adapt and reconfigure wireless network 11200, such as by adjusting scheduling and contention parameters and power control parameters, based on the measurement reports provided by the IoT nodes of wireless network 11200. As management API server 11210 may provide managing device 11216 with a service interface to gateway device 11204, these aspects may also enable managing device 11216 to adapt and configure wireless network 11200 externally. Accordingly, a user of managing device 11216, such as a network manager, may utilize the service interface provided by management API server 11210 to instruct gateway device 11204 to reconfigure wireless network 11204.

For example, managing device 11216 may first receive operating information such as measurement and/or configuration information for wireless network 11200 from management API server 11210 as detailed above. Managing device 11216 may then decide on a configuration change for wireless network 11200 based on the measurement and configuration information. For example, managing device 11216 may present the measurement and configuration information to a user of managing device 11216 (via the application layer), in response to which the user may decide on a configuration change for wireless network 11200, such as in order to address excessive contention or density problem of wireless network 11200 indicated by the measurement information or to adjust measurement related parameters. Managing device 11216 may for example adjust scheduling and contention parameters or power-related parameters including listen before talk configurations, node scheduling, node duty cycling, PHY/MAC parameters, etc. Application processor 9212 of managing device 11216 may then generate a configuration change instruction addressed to gateway device 11204 and may transmit the configuration change instruction to network access node 11214 (e.g., via baseband modem 9206, RF transceiver 9204, and antenna system 9202). Network access node 11214 may then route the configuration change instruction to management API server 11210, which may act in its role interfacing between the non-3GPP network and the 3GPP network and route the configuration change instruction to gateway device 11204. Gateway device 11204 may receive the configuration change instruction and reconfigure wireless network 11200 according to the configuration change instruction, which may include adjusting scheduling or contention parameters or power control parameters. The configuration change instruction may also specify a change in measurement-related parameters, such as adjusting the measurement reporting period of the IoT nodes in order to receive more or less frequent measurement reports. Gateway device 11204 may transmit control signaling to the IoT nodes of wireless network 11200 in order to enforce the reconfiguration.

Various aspects may therefore also provide a service interface for a managing device to control a mesh network from a different network. However, some aspects can also be implemented when the managing device and gateway device are connected to the same network. For example, managing device 11216 may be connected to network access node 11206 (or another network access node of the same network) and thus may also be connected to the same 3GPP network as gateway device 11204. Gateway device 11204 may similarly upload measurement and configuration information to database 11212, which may be located inside of and/or external to the 3GPP network, or may provide the measurement and configuration information to managing device 11216 via the 3GPP network. Managing device 11216 may thus obtain the measurement and configuration information (e.g., via database 11212 or from gateway device 11204) and may subsequently issue configuration change instructions to gateway device 11204 in order to reconfigure wireless network 11200 based on the measurement and configuration information, such as to address density or contention-related problems.

These aspects can also be used in conjunction with other aspects described herein, such as determining a predicted route for the IoT devices (e.g., in the manner detailed regarding any of FIGS. 94-111) and/or using beamforming and V2I applications. The capabilities of IoT devices may be limited, mainly for IoT devices that resource constrained. The network measurements collected by gateway device 11204 may be combined with other context information (for example, information about the specific application, latency requirements, location, etc.) to decide how to best configure the operation of wireless network 11200. In some aspects, beamforming for the IoT devices of wireless network 11200 can also be applied.

Figure 117:
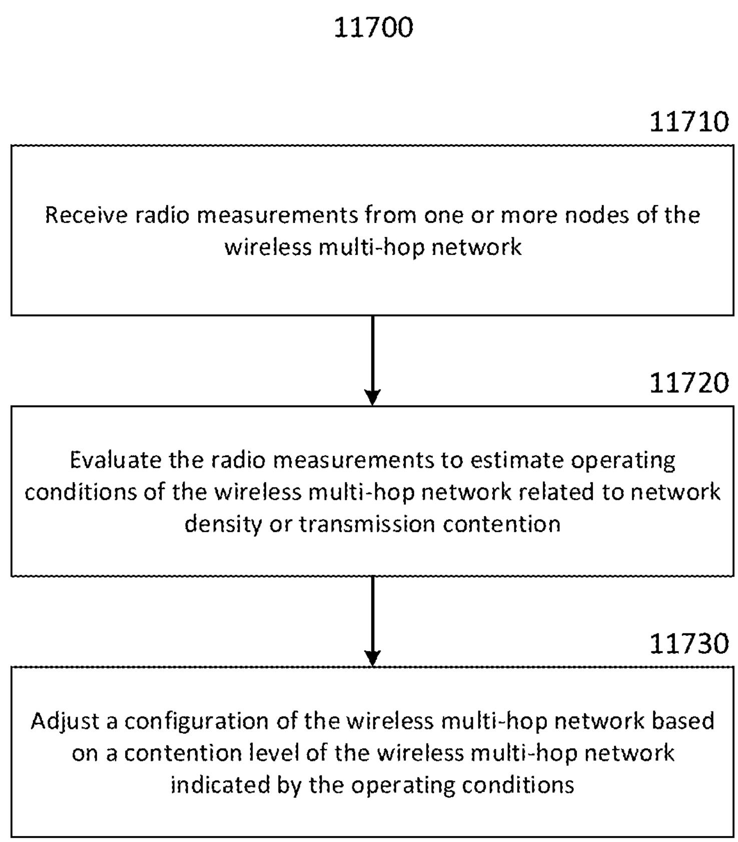
FIG. 117 shows an exemplary method of managing a wireless multi-hop network in accordance with some aspects.

FIG. 117 shows exemplary method 11700 of managing a wireless multi-hop network according to some aspects. As shown in FIG. 117, method 11700 includes receiving radio measurements from one or more nodes of the wireless multi-hop network (11710), evaluating the radio measurements to estimate operating conditions of the wireless multi-hop network related to network density or transmission contention (11730), and adjusting a configuration of the wireless multi-hop network based on a contention level of the wireless multi-hop network indicated by the operating conditions (11740).

Figure 118:
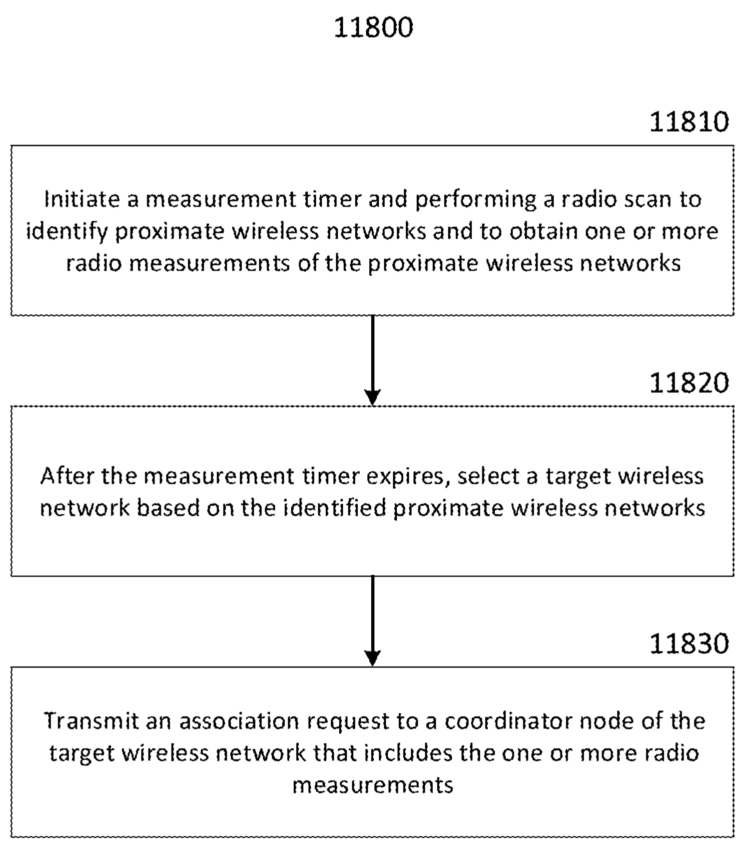
FIG. 118 shows an exemplary method of performing radio communications according to some aspects.

FIG. 118 shows exemplary method 11800 of performing radio communications according to some aspects. As shown in FIG. 118, method 11800 includes initiating a measurement timer and performing a radio scan to identify proximate wireless networks and to obtain one or more radio measurements of the proximate wireless networks (11810), after the measurement timer expires, selecting a target wireless network based on the identified proximate wireless networks (11820), and transmitting an association request to a coordinator node of the target wireless network that includes the one or more radio measurements (11830).

3.4 Context-Awareness #4

In some aspects of this disclosure, a vehicle-to-infrastructure (V2I) communication system may rely on context information of moving vehicles in order to accurately steer antenna beams from a network access node such as a Road Side Unit (RSU). As moving vehicles such as cars, automobiles or drones may travel at high speeds and may inadvertently act as moving obstacles to each other, beamsteering systems that rely on sector sweeps to determine antenna steering directions may be problematic. Accordingly, a roadside network access node may rely on context information such as vehicle position, vehicle speed, vehicle route, etc., in order to predict vehicle trajectories and subsequently steer antenna beams based on the predicted vehicle trajectories to effectively deliver wireless data to the vehicles. Some aspects may be applied to beamsteering for both radio-enabled vehicles and handheld/portable terminal devices carried by users in vehicles.

Figure 119:
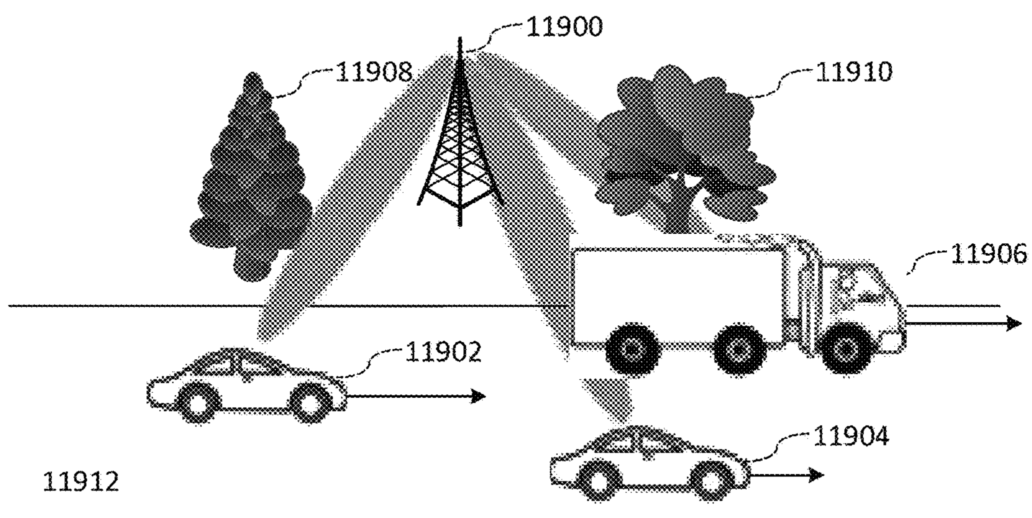

FIG. 119 shows an exemplary use case in accordance with some aspects in which roadside network access node 11900 may be configured to provide a radio access network to vehicles traveling on road 11912. As shown in FIG. 119, at a given point in time vehicles 11902, 11904, and 11906 may be traveling on road 11912 and may either vehicular terminal devices (e.g., a radio-enabled car) or may be carrying a handheld/portable terminal device inside of the vehicle. In order to increase the array gain for transmissions to vehicles 11902-11906, roadside network access node 11900 may utilize beamsteering in order to focus an antenna beam to each of vehicles 11902-11906. Roadside network access node 11900 may steer each of the antenna beams using an antenna array in which the signals at each antenna are phase-shifted and/or weighted in order to create patterns of constructive and destructive interference that collectively form the steered antenna beams as shown in FIG. 119. Although depicted with a static network access node in the exemplary setting of FIG. 119, some aspects may utilize these techniques for a mobile network access node or V2V context. For example, a vehicular network access node that is embodied as a vehicle (or equivalently another moving device, such as a drone) with network access node capabilities (e.g., transmission and reception of data on a radio access network and a backhaul connection to core or internet networks) may assume the role of roadside network access node 11900 in these aspects. Accordingly, the vehicular network access node may predict vehicle trajectories based on context information of one or more vehicles and steer one or more antenna beams according towards the one or more vehicles based on the predicted trajectories. In some aspects, these techniques may also be applied in a V2V setting, such as where a vehicle performs the functionality described herein for network access node 11900, and accordingly predicts the trajectories of one or more vehicles based on context information and steers one or more antenna beams towards the one or more vehicles based on the predicted trajectories. These aspects may also be applied at nomadic network access nodes (such as mobile infrastructure nodes as described below regarding hierarchical communication).

In order to steer each antenna beam in the proper direction to each of vehicles 11902-11906, roadside network access node 11900 may rely on knowledge of the direction at which each of vehicles 11902-11906 are positioned relative to roadside network access node 11900. Beamsteering systems may identify steering directions through sector sweeps or other similar techniques in which a transmitter may ‘sweep’ though multiple different steering directions and receive feedback from a receiver that indicates the effectiveness of each steering direction. The transmitter may thus be able to pinpoint the proper steering direction based on the feedback (such as by using an initial coarse sweep in order to identify an initial sector and subsequently refining the identified sector to determine a narrow optimal steering direction).

However, in cases where the receivers are traveling at high speeds such as in FIG. 119, the latency in performing a sweep over multiple sectors and receiving feedback may be too large to effectively track the receivers. The movement of the receivers may also be problematic in terms of obstacles. As shown in FIG. 119, trees 11908 and 11910 may act as obstacles that provide varying degrees of obstruction to the line-of-sight (LOS) path between roadside network access node 11900 and vehicles 11902-11906 depending on the positioning of vehicles 11902-11906. Additionally, vehicles 11902-11906 may act as obstacles to one another. As shown in FIG. 119, vehicle 11906 may obstruct the LOS path between roadside network access node 11900 and vehicle 11904. As the degree of obstruction caused by the obstacles may change over time as vehicles 11902-11906 move, sector sweeps may not be able to accurately detect the appropriate steering angle.

Accordingly, various aspects may utilize context information such as location information, velocity information, route information, etc., from vehicles 11902-11906 at roadside network access node 11900 in order to predict vehicle trajectories and perform beamsteering based on the predicted vehicle trajectories. Roadside network access node 11900 may therefore be configured to accurately track the movement of vehicles 11902-11906 and select effective steering directions for each antenna beam. Roadside network access node 11900 may also be configured to predict the locations of other vehicles based on their context information in order to respond to obstruction caused by other vehicles, and may be able to apply machine learning in order to detect the stationary obstacles such as trees 11908 and 11910 and adjust the beamsteering accordingly. For example, roadside network access node 11900 can utilize a machine learning technique such as a supervised or unsupervised learning, reinforcement learning, genetic algorithms, rule-based learning support vector machine, artificial neural networks, Bayesian-tree modeling, or hidden Markov modeling. This beamsteering adjustment at roadside network access node 11900 may be considered intra-RSU beam switching, where roadside network access node 11900 may adjust the beam based on vehicle and obstacle positioning (e.g., based on an adaptive codebook).

In some aspects, roadside network access node 11900 may be configured in the same manner as network access node 9110 as shown in FIG. 93 and accordingly may include antenna system 9302, radio module 9304, and communication module 9306. Antenna system 9302 may be an antenna array comprising multiple antennas, which roadside network access node 11900 may utilize to steer antenna beams as shown in FIG. 119. In various aspects, roadside network access node 11900 may utilize any beamsteering technique to steer antenna system 9302, including any analog (e.g., with analog RF phase shifters to manipulate phase shifts of the signals at each antenna of antenna system 9302), digital baseband (e.g., with a digital processor to manipulate phase shifts and/or gains of the signals at each antenna of antenna system 9302), and/or hybrid (e.g., with a mixture of analog RF phase shifters and digital processors) beamforming to steer antenna system 9302. This may include the use of an adaptive beamsteering codebook, which may provide different complex weighting (phase and weight) settings for the antennas of antenna system 9302 that provide specific antenna beams pointed in a certain direction. Roadside network access node 11900 may therefore be configured to adjust the antenna beam produced by antenna system 9302 by adjusting the complex antenna weightings, which may in some aspects include the use of an adaptive beamsteering codebook. As previously indicated, this may be considered intra-RSU beam switching.

Roadside network access node 11900 may be configured to operate antenna system 9302, radio module 9304, and communication module 9306 to provide a radio access network to vehicles 11902-11906. For example, in some aspects roadside network access node 11900 may be configured to provide a 5G radio access network using e.g., a millimeter wave (mmWave) radio access technology. Roadside network access node 11900 may also be configured to operate antenna system 9302, radio module 9304, and communication module 9306 according to multiple radio access technologies and accordingly may be a multi-RAT radio access node. For example, in some aspects roadside network access node 11900 may be configured to operate according to multiple of 5G (e.g., mmWave), 4G (e.g., LTE), 3G (e.g., UMTS), and 2G (e.g., GSM) radio access technologies.

Figure 120:
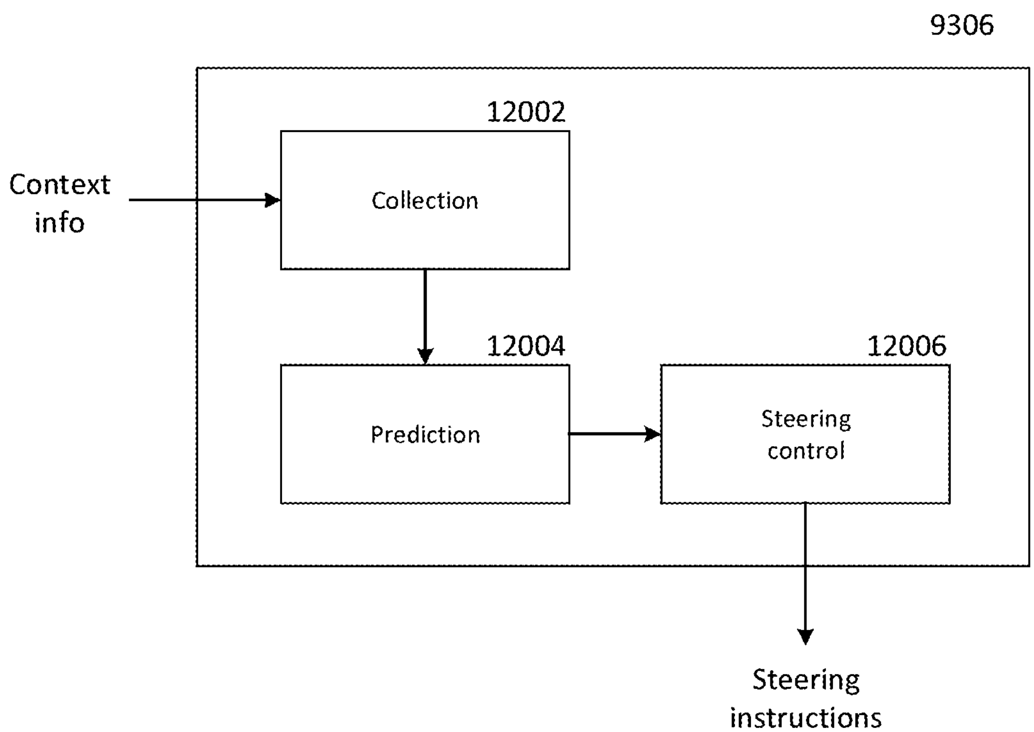

FIG. 120 shows an exemplary internal configuration of communication module 9306 in accordance with some aspects. As shown in FIG. 120, communication module 9306 can include collection module 12002, prediction module 12004, and steering control module 12006, which may be components of physical layer module 9308 and/or control module 9310 in some aspects. The configuration of communication module 9306 depicted in FIG. 120 may omit certain components of communication module 9306 that are not directly related to the current aspect in addition to control, power, and clock lines. Each of the components of communication module 9306 shown in FIG. 120 may be structurally realized as a hardware-defined module, e.g., as one or more dedicated hardware circuits or FPGAs, as a software-defined module, e.g., as one or more processors executing program code defining arithmetic, control, and I/O instructions (e.g., software and/or firmware instructions) stored in a non-transitory computer readable storage medium, or as a mixed of hardware-defined and software-defined module. The functionality of each component of communication module 9306 as detailed herein may therefore be embodied in a software-defined module and/or hardware-defined module.

Figure 121:
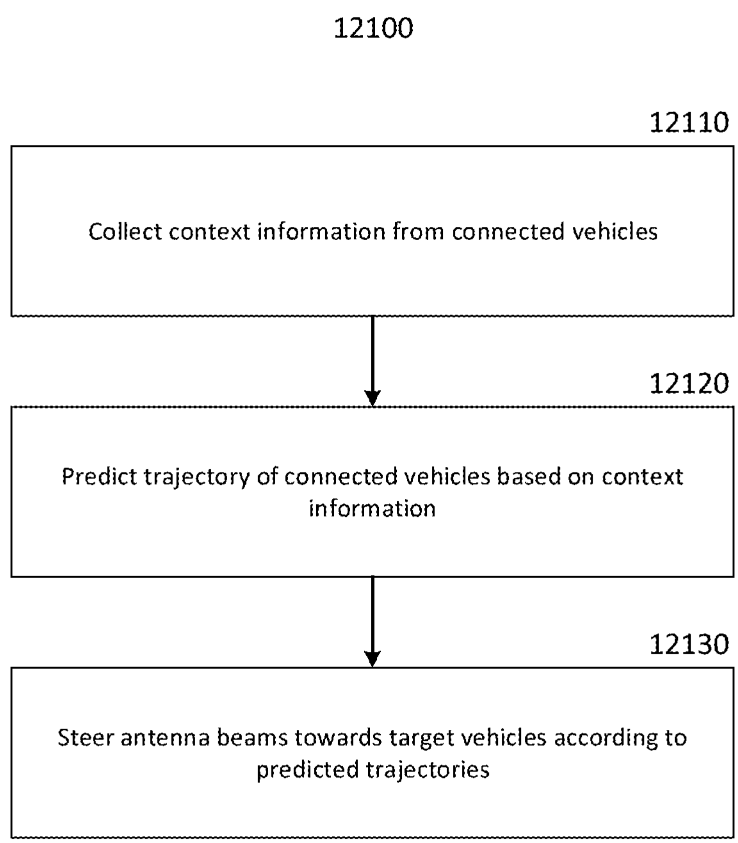

As previously indicated, roadside network access node 11900 may predict the trajectory of vehicles and steer antenna beams based on the predicted trajectories. As sector sweep-based steering may be inefficient in scenarios with fast moving vehicles, roadside network access node 11900 may utilize context information such as location, velocity, and route information for vehicles in order to predict the trajectories. FIG. 121 shows method 12100 according to some aspects, which communication module 9306 of roadside network access node 11900 may perform in order to steer beams of antenna system 9302 based on predicted vehicle trajectories.

As previously indicated, each of vehicles 11902-11906 may either be configured as a vehicular terminal device (e.g., a car with radio communication capabilities) or may be a vehicle that is carrying a handheld/portable terminal device. Accordingly, one or more of vehicles 11902-11906 may include an instance of terminal device 9102 as shown in FIG. 92, either as a built-in component of the vehicle or as a standalone handheld/portable terminal device carried by a user in the vehicle. Regardless, vehicles 11902-11906 may be configured to report context information including location, velocity, or route information to roadside network access node 11900. For example, vehicle 11902 may obtain the location or velocity information via sensors such as sensor 9218 and sensor 9220, where sensor 9218 may be e.g., a positioning system such as a GPS or other GNSS system and sensor 9220 may be e.g., an accelerometer or velocity sensor. Application processor 9212 may be configured to obtain the context information sensor data from sensors 9218 and 9220 and provide the context information to baseband modem 9206 for wireless transmission to roadside network access node 11900. Additionally and/or alternatively, in some aspects application processor 9212 may be configured to execute a navigation application program with which a user may input a destination of vehicle 11902. The navigation application program may then generate a target route of vehicle 11902, which application processor 9212 may then obtain as context information and provide to baseband modem 9206 for wireless transmission to roadside network access node 11900.

In some aspects, vehicle 11902 may be configured to transmit an initial context report and/or periodic context reports containing context information to roadside network access node 11900. For example, vehicle 11902 may initially connect to roadside network access node 11900 (such as after driving inside the coverage area of roadside network access node 11900 on road 11912) and may provide roadside network access node 11900 with an initial context report that contains context information for vehicle 11902. Vehicle 11902 may then be configured to periodically report (e.g., every 100 ms or another reporting period) updated context information to roadside network access node 11900, which may reflect changes location, velocity, or route.

One or more of the vehicles connected to roadside network access node 11900 may report context information to roadside network access node 11900 with one or both of initial and periodic context reports. Accordingly, as detailed in FIG. 121, collection module 12002 may receive and collect the context information from vehicle 11902-11906 in 12110. As vehicles 11902-11906 may provide context reports at different times, in some aspects collection module 12002 may continuously collect context reports that are transmitted by connected vehicles and received at roadside network access node 11900 via antenna system 9302 and radio module 9304.

Collection module 12002 may provide the context reports to prediction module 12004, which may evaluate the context information for each of vehicles 11902-11906 in 12120 in order to predict vehicle trajectories. For example, prediction module 12004 may receive location information and velocity information for vehicle 11902 in an initial context report from vehicle 11902. Prediction module 12004 may then be configured to utilize the current location and velocity of vehicle 11902 to predict the trajectory of vehicle 11902 on road 11912 over time, which may include anticipating that vehicle 11902 will maintain the same velocity from the current position. The velocity information may also be a directional velocity, which may indicate the direction that vehicle 11902 is traveling, which prediction module 12004 may also utilize to predict the vehicle trajectory. In some aspects, collection module 12002 may also receive periodic context reports from vehicle 11902 at subsequent times, which may indicate updated location and velocity information for vehicle 11902. Prediction module 12004 may receive the updated location and velocity information from collection module 12002 and update the predicted trajectory of vehicle 11902 accordingly.

As previously indicated, in some aspects the context reports may also contain route information for vehicle 11902. Accordingly, prediction module 12004 may be configured to utilize the route information to predict the trajectory of vehicle 11902, in particular for cases where the coverage area of roadside network access node 11900 covers multiple roads. For example, using the route information of vehicle 11902, prediction module 12004 may be able to predict turns and other road and lane changes of vehicle 11902 based on road and lane changes indicated by the route information. Prediction module 12004 may therefore include such road and lane changes in the predicted trajectory for vehicle 11902 obtained in 12004.

In some aspects, prediction module 12004 may additionally or alternatively utilize knowledge of the driving area of vehicle 11902 in order to obtain the predicted trajectory. For example, prediction module 12004 may know the physical path of road 11912, which may be preprogrammed or uploaded (such as from a geomapping database) into roadside network access node 11900. Prediction module 11902 may therefore be aware of turns, curves, and similar changes in road 11912 and may be able to generate a predicted trajectory for vehicle 11902 in 12904 based on knowledge of the path of road 11912 and the current location and velocity of vehicle 11902, such as by anticipating when vehicle 11902 will change its trajectory according to a change in the path of road 11912. Alternative to or in addition to being preprogrammed with information for road 11912, in some aspects prediction module 11902 may be configured to apply machine learning in order to identify the path of road 11912. For example, by observing changes in location information for multiple vehicles over time, prediction module 12004 may be configured to identify locations in road 11912 that lead to trajectory changes in vehicles, which prediction module 12004 may utilize to map the path of road 11902 and subsequently predict vehicle trajectories.

In some aspects, prediction module 12004 may be configured to apply machine learning in order to identify obstacles as well to learn changes in antenna beams and links over time. Prediction module 12004 may therefore adapt the prediction process over time based on the machine learning, which may be performed online or offline. Non-limiting examples of machine learning techniques that prediction module 12004 can apply include supervised or unsupervised learning, reinforcement learning, genetic algorithms, rule-based learning support vector machines, artificial neural networks, Bayesian-tree modeling, or hidden Markov modeling.

FIG. 119 depicts exemplary predicted trajectories for vehicles 11902-11906 in the arrows leading each of vehicles 11902-11906 in accordance with some aspects, where the length of each arrow indicates an exemplary velocity of the corresponding vehicle. Accordingly, prediction module 12004 may determine a predicted trajectory for each of vehicles 11902-11906 in 12120 based on the context information obtained in 12110. Prediction module 12004 may then provide the predicted trajectories to steering control module 12006. Steering control module 12006 may then calculate the steering directions for each of vehicles 11902-11906 based on the predicted trajectories in 12130 and steer the antenna beams of antenna system 9302 according to the calculated steering directions. As the predicted trajectories may indicate the expected position of vehicles 11902-11906 relative to roadside network access node 11900, steering control module 12006 may be able to calculate the angle at which each of vehicles 11902-11906 will be located relative to network access node 11900 and utilize the angle as the steering direction.

After calculating the steering directions, steering control module 12006 may provide steering instructions that specify the calculated steering directions to antenna system 9302, which may receive the steering instructions and implement the steering directions by adjusting the phases and/or gains of individual antennas of antenna system 9302 in accordance with a beamsteering scheme (where antenna system 9302 may divide the antenna array into e.g., 3 sub-arrays in the case of FIG. 119 and steer the collective antenna beam from each sub-array toward one of vehicles 11902-11906). In some aspects, steering control module 12006 may issue the steering instructions, e.g., as explicit angles or, if a steering codeword scheme is used, as codewords that correspond to the calculated steering directions. Antenna system 9302 may receive the steering instructions and steer the antenna beams of antenna system 9302 according to the steering instructions in 12130.

As the steering direction for each antenna beam can change over time as vehicles 11902-11906 move along road 11912, in some aspects steering control module 12006 may continually update the steering directions according to the predicted trajectories provided by prediction module 12004 in order to reflect the position changes of vehicles 11902-11906. Accordingly, steering control module 12006 may be configured to periodically recalculate the steering directions based on the predicted trajectories and provide updated steering instructions to antenna system 9302. If prediction module 12004 has provided any updated predicted trajectories, such as if one of vehicles 11902-11906 are providing periodical context reports that enable prediction module 12004 to update the predicted trajectory, steering control module 12006 may recalculate the steering directions based on the updated predicted trajectories; otherwise, steering control module 12004 may recalculate the steering directions based on the original predicted trajectories by anticipating that vehicles 11902-11906 will continue along the original predicted trajectory.

Roadside network access node 11900 may therefore utilize context information including location, velocity, and route information of vehicles 11902-11906 in order to predict the trajectories of vehicles 11902-11906 and perform beamsteering to direct antenna beams at vehicles 11902-11906 based on the predicted trajectories. As the vehicles traveling on road 11912 that are within the coverage area of roadside network access node 11900 can change over time, roadside network access node 11900 may be configured to perform beamsteering for different vehicles (where the number of vehicles and thus the number of required antenna beams may also change). Accordingly, 'new' vehicles may move within the coverage area of roadside network access node 11900 and, after connecting to roadside network access node 11900), may provide an initial context report and/or periodic context reports to enable roadside network access node 11900 to predict their trajectory and direct antenna beams accordingly. Roadside network access node 11900 may continue tracking each vehicle until the vehicle reselects to another network access node. As roadside network access node 11900 may not require any feedback from vehicles 11902-11906 (in contrast to sector sweep applications that require feedback), roadside network access node 11900 may perform 'open-loop' beamsteering. Roadside network access node 11900 may also combine these aspects with closed-loop beamsteering techniques and use both context information and feedback (such as from sector sweeping) from vehicles 11902-11906 in order to calculate beamsteering directions based on both predicted trajectories and steering feedback.

In addition to the beamsteering techniques as described above, various roadside network access node 11900 may utilize other information and data in order to perform beamsteering. In particular, in some aspects prediction module 12004 may additionally or alternatively be configured to identify blockages between roadside network access node 11900 and vehicle 11902 in 12120. For example, prediction module 12002 may identify the locations of stationary or permanent obstacles such as trees 11908 and 11910 and, based on the predicted trajectory of vehicle 11902, may be able to determine when the obstacles will block the antenna beam from roadside network access node 11900 and vehicle 11902. The locations of obstacles may be preprogrammed into roadside network access node 11900 (such as from a geomapping database). In some aspects, prediction module 12004 may also identify the locations of obstacles using other sensors. For example, roadside network access node 11900 may be configured with a radar sensor, imaging sensor (such as a camera), sonar sensor, etc., which roadside network access node 11900 may apply to detect the location of obstacles along road 11912. Prediction module 12004 may then access the sensor data to predict blockages between roadside network access node 11900 and vehicle 11902.

As vehicles may act as obstacles to each other, in some aspects prediction module 12004 may also predict when other vehicles will block the path between roadside network access node 11900 and vehicle 11902. For example, prediction module 12004 may predict the trajectories of each of vehicles 11902-11906 and may therefore identify when one of vehicles 11902-11906 will block another of vehicles 11902-11906. FIG. 119 depicts an exemplary scenario in which vehicle 11906 may block the path between roadside network access node 11900 and vehicle 11904, thus blocking the antenna beam to vehicle 11904. However, as denoted by the exemplary vehicular trajectory arrows, vehicles 11904 and 11906 may be traveling at different velocities, thus causing the amount of blockage by vehicle 11906 to change over time. Accordingly, prediction module 12004 may predict the varying degrees of blockage caused by vehicles over time.

There may also be scenarios where other vehicles are not connected to roadside network access node 11900 (e.g., are not radio-enabled or may be connected to a different network/network access node). These other vehicles may form moving obstacles that roadside network access node 11900 may not be able to detect via context information; accordingly, prediction module 12004 may rely on external sensor data (e.g., from a radar sensor, an imaging sensor (such as a camera), a sonar sensor, etc.) to detect other vehicles and other moving obstacles and to track their trajectories to identify blockages.

Figure 122:
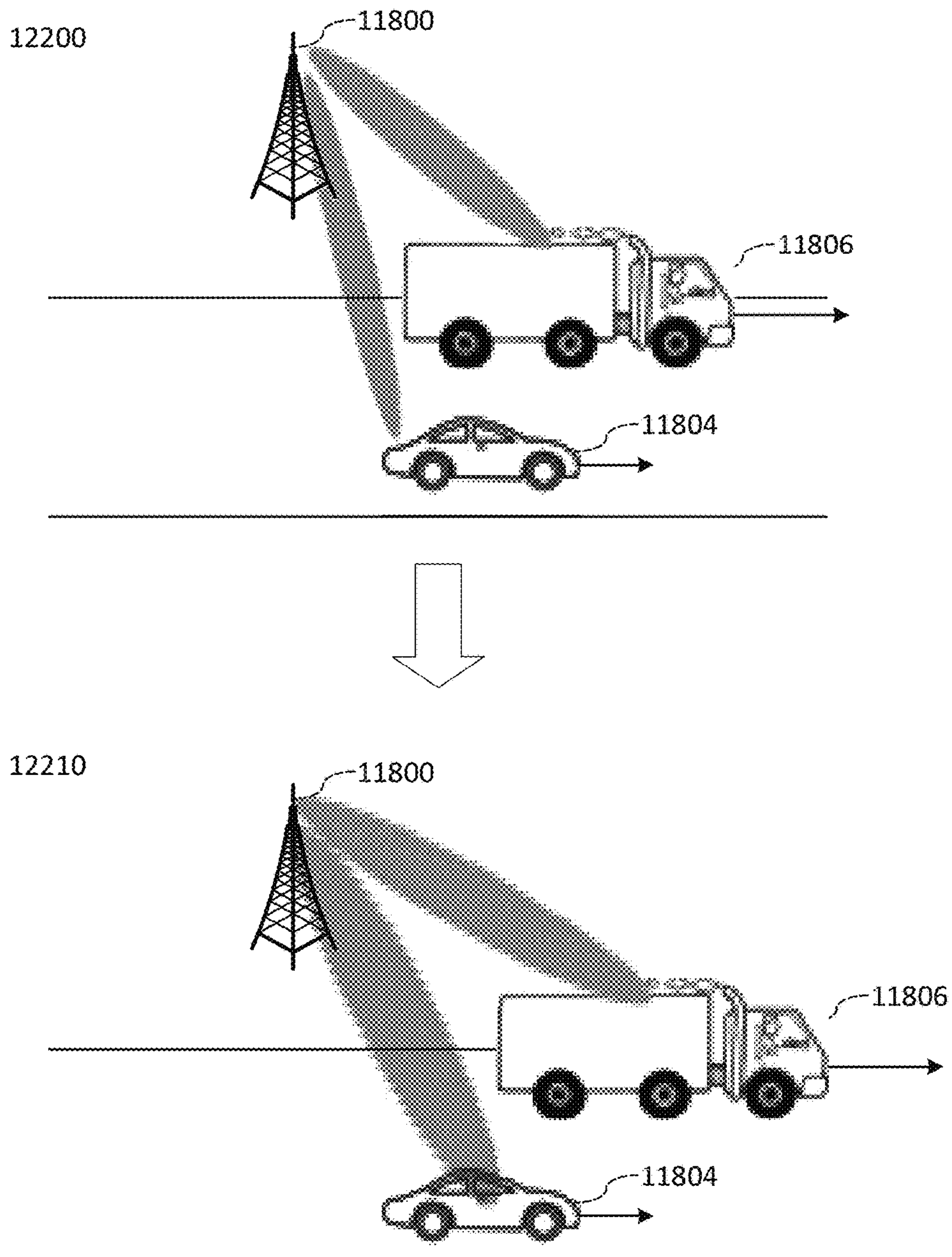

In some aspects, roadside network access node 11900 may therefore be configured to detect different obstacles along road 11912. Prediction module 12004 may then identify or predict the stationary location or moving trajectory of such obstacles in relation to vehicles 11902-11904 and may manipulate beamsteering based on the detected obstacles, such as by one or more of beam broadening, intra/inter RSU beam switching, or switching to another radio access technology. FIG. 122 shows an exemplary scenario according to some aspects where vehicle 11906 may block vehicle 11904, where scenarios 12200 and 12210 illustrate the changing positions of vehicles 11904 and 11906 according to their respective trajectories. In scenario 12200, vehicle 11906 may form a substantial blockage between roadside network access node 11900 and vehicle 11904 and may only leave a narrow unobstructed path. Accordingly, prediction module 12004 may utilize the predicted trajectories of vehicles 11904 and 11906 to determine the degree of blockage (e.g., in angular degrees) that vehicle 11906 is causing to vehicle 11904. Prediction module 12004 may then provide the degree of blockage to steering control module 12006, which may perform beam narrowing or beam broadening with antenna system 9302 in order to provide a substantially unobstructed antenna beam to vehicle 11904. As shown in scenario 12200, steering control module 12006 may select a narrow antenna beam when vehicle 11906 is providing a high degree of blockage to vehicle 11904. However, once vehicle 11906 moves forward relative to vehicle 11904 (according to a higher velocity of vehicle 11906) in scenario 12210, the degree of blockage may decrease, which prediction module 12004 may identify with the predicted trajectories of vehicles 11904 and 11906. Accordingly, steering control module 12006 may broaden the antenna beam in scenario 12210. Prediction module 12004 and steering control module 12006 may similarly perform beam broadening and beam narrowing in response to stationary obstacles as the degree of blockage changes as a vehicle moves.

Roadside network access node 11900 may also perform inter RSU beam switching in response to detected obstacles. For example, roadside network access node 11900 may handoff the radio access connection for a vehicle to another roadside network access node. In some aspects, roadside network access node 11900 may handoff a vehicle based on obstacle block and/or due to movement of the vehicle away from roadside network access node 11900 toward the other roadside network access node. As the other roadside network access node is located at a different position relative to the vehicle, the transmit antenna beam may also be switched by virtue of the handoff. In some aspects, roadside network access node 11900 may provide the other roadside network access node with beamsteering information and/or other positional information for the vehicle, which may give the other roadside network access node a basis for selecting a beamsteering direction for the vehicle. Both this inter-RSU beam switching and the intra-RSU beam switching (switching beamsteering from the same roadside network access node based on e.g., an adaptive codebook) previously detailed may enable improved link quality between roadside network access node 11900 and served vehicles.

Figure 123:
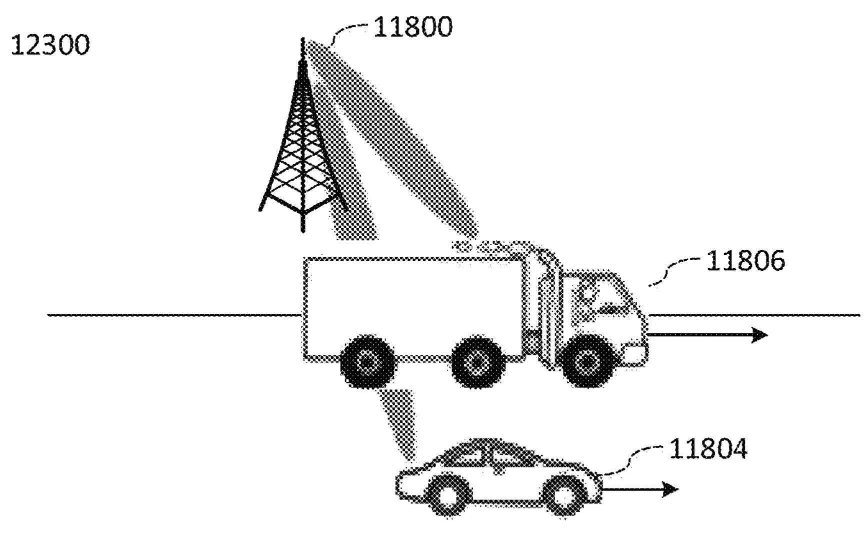

Additionally, in some aspects roadside network access node 11900 may adaptively switch radio access technologies based on detected obstacles. For example, radio access technologies with high carrier frequencies such as mmWave may experience substantial pathloss on account of the high carrier frequency and consequently may be impaired by obstructed transmission paths. Accordingly, if roadside network access node 11900 is initially using mmWave to communicate with vehicle 11904 and vehicle 11906 directly obstructs vehicle 11904 as shown in scenario 12300 of FIG. 123, prediction module 12004 may detect the blockage and notify steering control module 12006. Steering control module 12006 may then switch from mmWave to an alternate radio access technology that is less susceptible to pathloss, such as LTE, UMTS, GSM, or another radio access technology with a lower carrier frequency. Roadside network access node 11900 may thus notify vehicle 11904 of the radio access technology switch (e.g., via control signaling generated by steering control module 12006 and transmitted via radio module 9304 and antenna system 9302 using the original mmWave connection) and proceed to transmit further data using the alternate radio access technology. When prediction module 12004 determines that the blockage is reduced or gone, e.g., when vehicle 11906 moves further past vehicle 11904, prediction module 12004 may notify steering control module 12004 which may then trigger a switch back to mmWave (e.g., potentially using beam narrowing according to the remaining degree of blockage caused by vehicle 11906, if any). Roadside network access node 11900 may similarly be able to utilize another sidelink connection such as dedicated short range communications (DSRC) as an alternate radio access technology.

In some aspects, roadside network access node 11900 may additionally utilize sensor data reported by vehicles 11902-11906 in order to detect obstacles. For example, in another scenario, vehicle 11906 may not be connected to roadside network access node 11900; accordingly, prediction module 12004 may not be able to predict the trajectory of vehicle 11906 based on context information and may not be able to predict blockages to vehicle 11904 caused by vehicle 11906. However, vehicle 11904 may be equipped with sensors such as a radar sensor, an imaging sensor, a sonar sensor, etc., which may be e.g., sensor 9218 and/or sensor 9220. Vehicle 11904 may therefore be able to detect vehicle 11906 with sensors 9218 and 9220, which baseband modem 9206 may report to roadside network access node 11900. For example, baseband modem 9206 may be able to determine the location and/or velocity of vehicle 11906 and report location and velocity information to roadside network access node 11900. Roadside network access node 11900 may then be configured to utilize the location and velocity information of vehicle 11906 as context information and consequently predict the trajectory of vehicle 11906 with prediction module 12004. Steering control module 12006 may then similarly adjust the beamsteering of antenna system 9302 based on the blockage caused by vehicle 11906 to vehicle 11904 as detailed above. Vehicle 11904 may also be able to identify stationary obstacles such as trees 11908 and 11910 with sensors 9218 and 9220 and report the location information to roadside network access node 11900, which prediction module 12004 and steering control module 12006 may utilize to adjust the beamsteering.

In some aspects, roadside network access node 11900 and vehicles 11902-11906 may additionally employ relaying in order to address blockages. For example, in scenario 12300 shown in FIG. 123, vehicle 11906 may cause substantial blockage to vehicle 11904, which may critically impair transmission from roadside network access node 11900 to vehicle 11904. Instead of accepting the pathloss and attempting to transmit through vehicle 11906, roadside network access node 11900 may instead utilize vehicle 11906 as a relay point in order to relay data from roadside network access node 11900 to vehicle 11904 and vice versa. Accordingly, after prediction module 12004 has identified the predicted trajectories of vehicles 11904 and 11906 and steering control module 12006 has identified vehicle 11906 as a blockage to vehicle 11904 based on predicted trajectories, steering control module 11906 may instruct vehicle 11906 (e.g., via control signaling) to act as a relay point for data intended for vehicle 11904. Roadside network access node 11900 may then transmit data intended for vehicle 11904 to vehicle 11906 (e.g., via the antenna beam with vehicle 11906). Vehicle 11906 may receive the data intended for vehicle 11904 and forward the data to vehicle 11904, such as using DSRC or another type of vehicle-to-vehicle (V2V) communication or sidelink. Roadside network access node 11900 may continue transmitting data to vehicle 11904 via vehicle 11906 as a relay point until steering module 12006 identifies that vehicle 11906 is no longer blocking vehicle 11904 (or the degree of blockage has decreased to an acceptable amount). Roadside network access node 11900 may then switch back to a direct transmission path to vehicle 11904 using beamsteering.

Although detailed above regarding roadside network access node 11900, in some aspects the context information-based beamsteering can also be implemented in vehicles 11902-11906 in the reverse link. For example, vehicle 11902 may include an instance of collection module 12002, prediction module 12004, and steering control module 12006 in baseband modem 9210. Collection module 12002 may then collect sensor measurements from sensors 9218 and/or 9220 (via application processor 9212) in order to determine the location and velocity of vehicle 11902. Roadside network access node 11900 may also broadcast its location, which may enable prediction module 12004 of vehicle 11902 to predict the trajectory of vehicle 11902 relative to roadside network access node 11900. Steering control module 12006 may then utilize the predicted trajectory to perform beamsteering at antenna system 9202 in order to direct an antenna beam from vehicle 11902 to roadside network access node 11900 and continually update the steering direction of the antenna beam based on the predicted trajectory. Alternatively, steering control module 12006 may report the steering direction of the beam used by roadside network access node 11900 to vehicle 11902, which may then utilize the reported steering direction to steer a beam back towards roadside network access node 11900.

Figure 124:
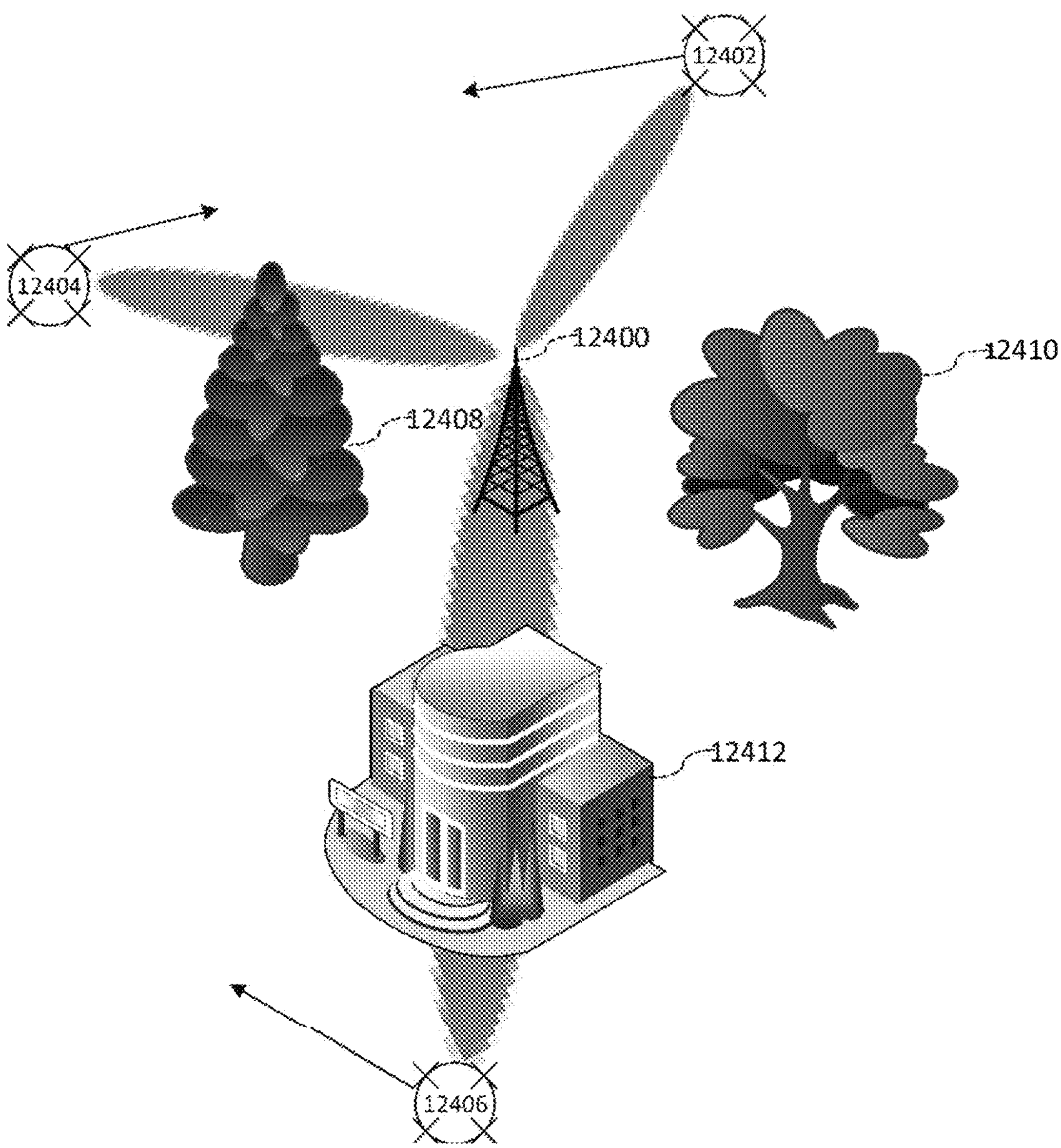

Various aspects can be implemented in a variety of other radio access scenarios, in particular including other V2I use cases. FIG. 124 shows an implementation of the fourth context-awareness in a drone use case according to some aspects, where drones 12402, 12404, and 12406 may be connected with network access node 12400. Drones 12402 may accordingly report context information such as location, velocity (e.g., directional velocity), and/or route information to network access node 12400. Network access node 12400 may be configured in the same manner as roadside network access node 11900 and may predict aerial trajectories of drones 12402-12406 with prediction module 12004 based on the context reports. Steering control module 12006 may then steer antenna system 9302 of network access node 12400 form antenna beams directed at each of drones 12402-12404. Prediction module 12004 may also detect obstacles such as trees 12408 and 12410 and building 12412 and adapt the antenna beams and other transmission aspects such as radio access technology switching and relaying in order to transmit and receive data with drones 12402-12406.

In addition to the drone use case depicted in FIG. 124, these aspects can be applied to any type of moving device, including both vehicular and non-vehicular cases, and any scenario involving different types of moving devices.

While description of some aspects above may generally focus on a transmission setting, the detailed beamsteering techniques may be equivalently applied in a reception setting where an antenna array may apply phase shifts and/or gains to individual antenna elements to produce a directional receive beam.

Figure 125:
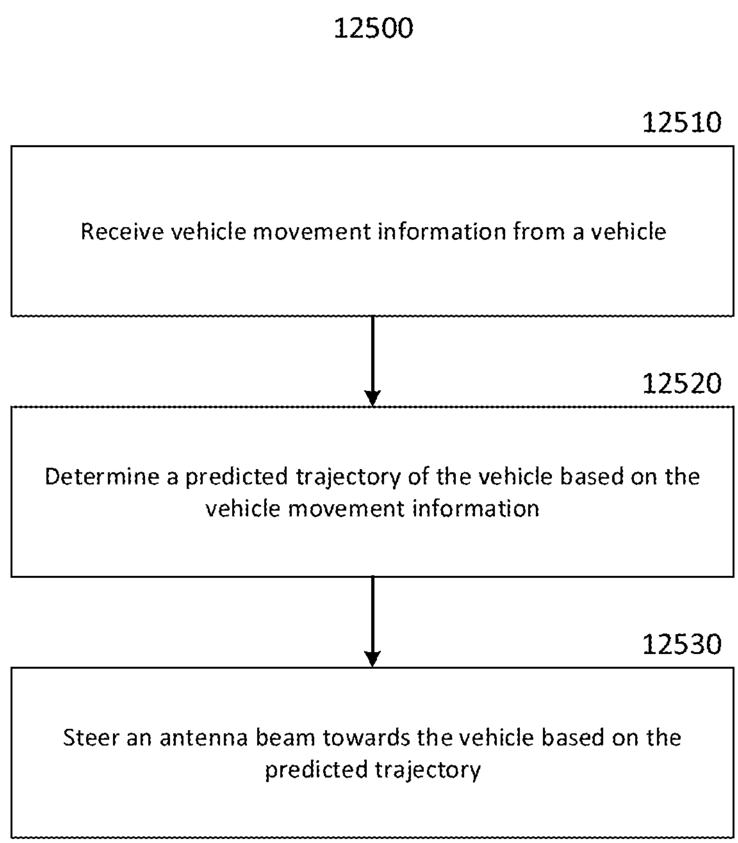

FIG. 125 shows exemplary method 12500 of performing radio communications according to some aspects. As shown in FIG. 125, method 12500 includes receiving vehicle movement information from a vehicle (12510), determining a predicted trajectory of the vehicle based on the vehicle movement information (12520), and steering an antenna beam towards the vehicle based on the predicted trajectory (12530).

3.5 Context-Awareness #5

In some aspects of this disclosure, a radio environment map (REM) infrastructure may utilize a distributed architecture (e.g., server architecture, cloud infrastructure, mobile edge computing infrastructure, roadside infrastructure, multitude of devices, multitude of terminal devices, multitude of vehicles, etc.) in order to locally store REM data at locations for which the REM data is relevant. Additionally, the REM infrastructure may utilize a data provision system that selectively provides certain types of context information to requesting devices. Accordingly, instead of utilizing a centralized service, some aspects may store REM data locally and may provide only concise amounts of REM data, which may reduce backhaul load and avoid excessive data download at requesting devices. These aspects may therefore provide a mechanism for network access nodes to get channel and radio information, network access node information (for example, available cells), and radio access technology availability information (for example, which RATs are available) without receiving feedback from (or pinging) terminal devices.

In certain cellular systems, base stations constantly send reference signals to user equipments (UEs), which may measure the reference signals to determine channel quality and other radio characteristics. The UEs may then report the measurements back to the base stations, which may utilize the reported measurements for various tasks including user scheduling, beamforming/beamsteering, modulation and coding scheme selection, handovers and other mobility operations, etc. However, the continuous measurement reporting may incur a large overhead and many new techniques such as network multi-input multi-output (MIMO) and multi-user/massive MIMO may consequently not be supported due to the excessive feedback demands. Cross-cell coordination also remains in limited stages as techniques such as real-time interference coordination may need fast fiber-like connections for transferring channel and scheduling information. These aspects may be used with common channel aspects, e.g., a common channel selected based on REM information.

While measurement reporting and feedback may be effective in tracking instantaneous changes in the radio conditions, the radio environment may generally be static for most users. Given that scheduling functions tend to be very conservative in practice, the correlation between large-scale properties of the channel and the final optimal scheduling solution is more pronounced.

Additionally, new 5G developments such as mmWave, massive MIMO, and massive IoT deployments are becoming more prevalent. Due to the high frequency bands employed by mmWave, radio signals (which mainly utilize beamforming) may be easily blocked by the environment, such as trees, walls, ceilings, etc. As there may be a large number of antennas and a high density of devices, channel feedback for massive MIMO and IoT devices may present a bottleneck.

Radio Environment Maps, or REMs, may present a valuable solution that alleviates many of the overhead issues related to channel feedback. These REMs may provide a map of the channel environment at different locations and thus may provide a representation of obstacles and pathloss characteristics that radio access network devices may utilize in place of or in addition to channel feedback techniques. Accordingly, as opposed to reference signal transmission and feedback reporting to determine channel conditions, network access nodes and terminal devices may access a REM in order to determine channel conditions between transmitters and receivers. The REM may be stored in a central cloud and queried by requesting devices for radio information.

As opposed to storing REM data in a central server, some aspects of this disclosure may utilize a distributed architecture that generates and stores REM data locally for a local geographic area, where terminal devices and network access nodes proximate to the local geographic area may access the local REM data without causing significant strain across the network infrastructure. Additionally, these aspects may include a request-response framework that selectively provides concise selections of REM data to requesting devices, thus avoiding excessive downloads.

Figure 126:
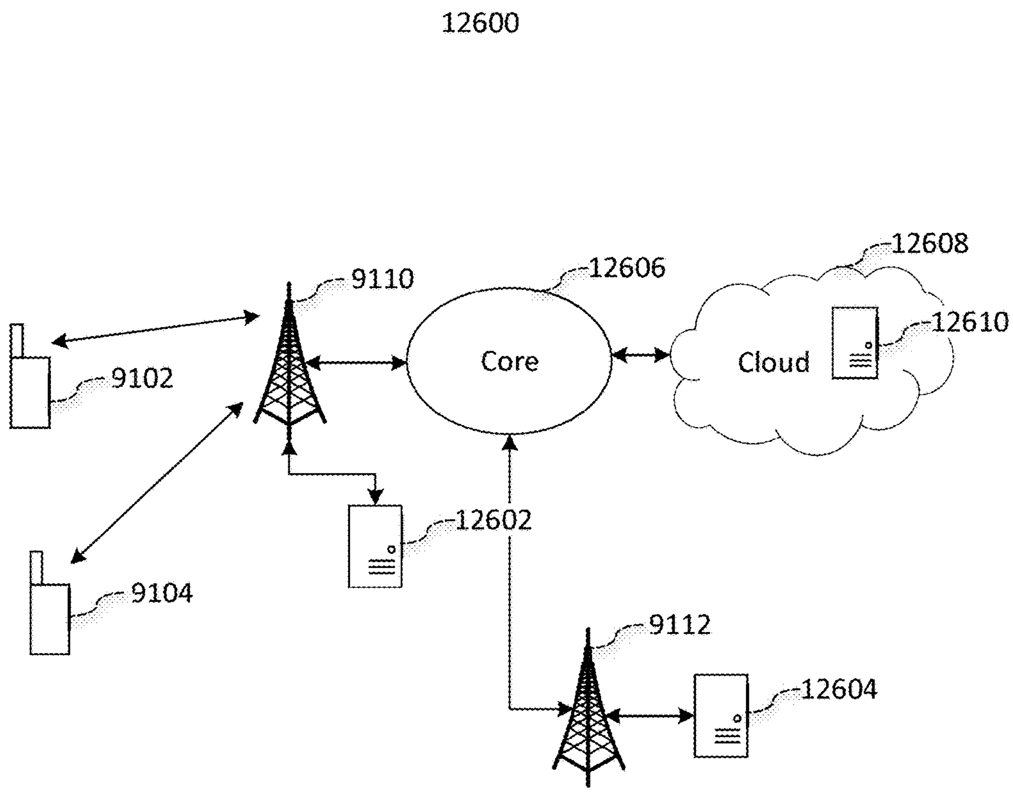

FIG. 126 shows an exemplary network architecture of communication network 12600 in accordance with some aspects. As shown in FIG. 126, terminal devices 9102 and 9104 may be connected to network access node 9110, which may interface with core network 12606. Core network 12606 may be connected to cloud network 12608, which may be one more internet-based networks that include central REM server 12610. Network access node 9110 may therefore provide a radio access network to terminal devices 9102 and 9104 that enables terminal device 9102 and 9104 to access cloud network 12608 via core network 12606. One or more additional network access nodes may also interface with core network 12606, such as network access node 9112.

The radio access network section of communication network 12600, including terminal devices 9102 and 9104 and network access nodes 9110 and 9112, may rely on REM data in order to identify radio conditions and to perform tasks such as scheduling, beamforming/beamsteering, modulation and coding scheme selection, handovers and other mobility operations, radio access selection, traffic management, power/cost management, etc. However, instead of accessing central REM server 12610, which may involve data transfer across core network 12606 and via cloud network 12608, network access node 9110 and terminal devices 9102 and 9104 (in addition to any other terminal devices connected to network access node 9110) may access local REM server 12602 while network access node 9112 (and any terminal devices connected to network access node 9112) may access local REM server 12604. While FIG. 126 depicts REM servers 12602 and 12604 as interfacing with one network access node each, other REM servers may interface with multiple network access nodes and may thus provide multiple network access nodes with access to the same database of REM data.

Figure 127:
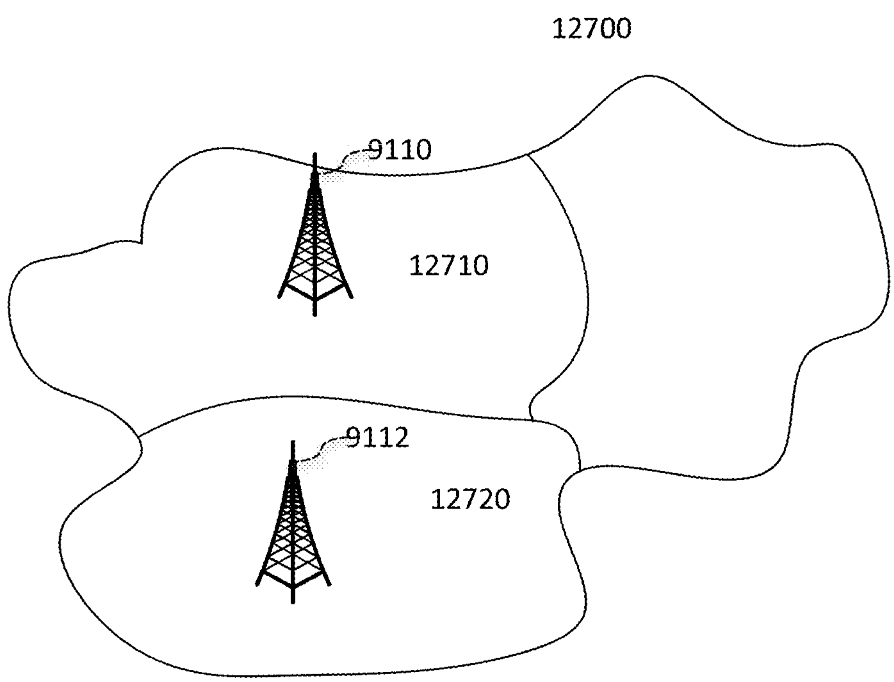

REM servers 12602 and 12604 may each store different REM data that is locally relevant to the respective areas assigned to REM servers 12602 and 12604. For example, REM server 12602 may store REM data that is relevant for a first geographic area around network access node 9110 while REM server 12604 may store REM data that is relevant for a second geographic area around network access node 9112 (although there may be some overlap between the first and second geographic areas). FIG. 127 shows an exemplary mapping according to some aspects where network access node 9110 may be located in area 12710 while network access node 9112 may be located in area 12720 (which may or may not correspond to the actual coverage areas of network access nodes 9110 and 9112). REM server 12602 may store REM data, such as channel conditions and other radio coverage information, for area 12710 (although REM server 12602 may not necessarily be physically located in area 12710) while REM server 12604 may store REM data for area 12720. Although areas 12710 and 12720 are shown as mutually exclusive in FIG. 127, there may be overlap between the areas that each REM server stores data for; however, there may be at least some of areas 12710 and 12720 that is mutually exclusive.

Figure 128:
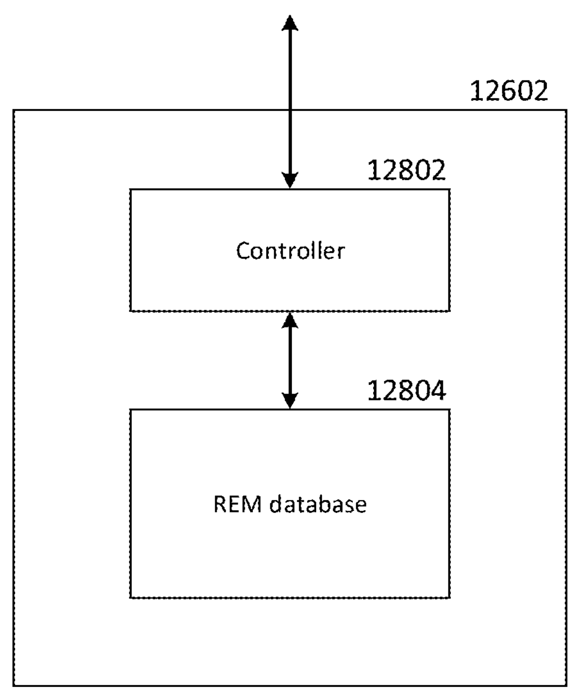

Accordingly, terminal devices 9102 and 9104 and network access node 9110 may query REM server 12602 for REM data for area 12710, which REM server 12602 may provide on request. FIG. 128 shows an exemplary internal configuration of REM server 12602, which may include REM controller 12802 and REM database 12804. In some aspects, REM controller 12802 may be a processor configured to execute instructions in order to process and responds to queries in addition to calculating and generating REM data for storage or update in REM database 12604. REM database 12604 may be a memory component configured to store REM data, which may be a geomap with radio condition data linked to various locations on the geomap that provides a spatial representation of the radio environment across a geographic area. The REM data may also be temporally dependent, such as to reflect changing radio conditions over different times of day and/or days of the week.

Terminal devices 9102 and 9104 and network access node 9110 may thus query REM server for REM data by transmitting a request to REM controller 12802, which may retrieve the requested REM data and provide a response back to the requesting devices. As the radio environment in area in 12710 may be dynamic over time, terminal devices 9102 and 9104 and network access node 9110 may provide REM server 12602 with radio condition information that REM server 12602 may utilize to update the REM data stored in REM database 12804. For example, terminal devices 9102 and 9104 may perform radio measurements at various locations in area 12710 and provide geotagged radio measurements to REM controller 12802. REM controller 12802 may then apply radio propagation modeling in order to update the REM data at the geotagged locations based on the associated radio measurements and may thus maintain accurate REM data in REM database 12804 over time. REM controller 12802 may calculate the REM data based on a combination of recent and past information indicated by the geotagged radio measurements. In additional to the spatial dimension of the REM data, REM controller 12802 may additionally generate the REM data with time-dependent considerations, such as time of day and day of the week, in order to represent the radio environment as varying over time.

In some aspects, REM controller 12802 may request the radio measurements. Additionally or alternatively, in some aspects terminal device 9102 and/or 9104 may be configured to periodically perform radio measurements and report the radio measurements back to REM controller 12802. As terminal devices 9102 and 9104 and network access node 9110 may aim to reduce overhead through the use of REM data, in some aspects terminal devices 9102 and 9104 may be configured to perform radio measurements with an relatively long period (as opposed to some channel feedback, which may require feedback every transmission time interval and thus have a small period) or may perform continual radio measurements and report the radio measurements collectively with a large period between reports (e.g., may perform radio measurements over the period and report the radio measurements for a given period after each period ends). In some aspects, REM server 12604 may be configured in the same manner as REM server 12602.

REM servers 12602 and 12604 may therefore each store local REM data that is updated based on local radio measurements. As the REM data is stored and updated locally, terminal devices and network access nodes may not need to query a centralized REM server to obtain REM data and may therefore alleviate network congestion by interacting with local REM servers. As shown in FIG. 126, cloud network 12608 may also contain central REM server 12610, which may store REM data for a comprehensive geographic area that includes both areas 12710 and 12720. Accordingly, REM servers 12602 and 12604 may be configured to periodically upload (which may be triggered and controlled by REM controller 12802 to upload the REM data from REM database 12804 to central REM server 12610) the REM data stored in REM database 12804 to central REM server 12610, which may hold a REM database that contains REM data for areas 12710, 12720, and various other geographic areas. In order to reduce network congestion, REM servers 12602 and 12604 may perform REM data uploads infrequently, such as once per day. Accordingly, central REM server 12610 may hold a comprehensive REM while REM servers 12602 and 12604 may hold local REM data that is relevant to a limited area.

FIG. 126 depicts REM servers 12602 and 12604 as interfacing with network access nodes 9110 and 9112; accordingly, in some aspects REM servers 12602 and 12604 may be deployed locally at network access nodes, such as inside an equipment room which may allow communication module 9306 of a network access node to quickly access the REM data. Alternatively, in some aspects REM servers 12602 and 12604 may be deployed at various other locations. For example, REM servers 12602 and 12604 may be deployed as edge computing devices, such as with Mobile Edge Computing (MEC) servers that may be positioned between the radio access network and core network or at a network access node. Alternatively, in some aspects REM servers 12602 and 12604 may also be deployed in core network 12606. As previously indicated, REM servers 12602 and 12604 may contain REM data related to an area that is relevant to multiple network access nodes and may therefore interface with multiple network access nodes with any such deployment.

Terminal devices and network access nodes may therefore be able to query local REM servers for REM data that is relevant to their surrounding vicinity and, upon moving to a new area in the case of terminal devices, may query a different REM server for REM data that is relevant to the new area. While terminal devices may be mobile, there may not be a need to have REM data for excessively large geographic areas (e.g., for 100 or more miles/or kilometers) and terminal devices may instead be able to utilize REM data for a limited area at any given time and downloading REM data for other areas only when moving into these areas. Similarly, as network access nodes are generally stationary as in the case of some base stations, network access nodes may only need to have REM data for a limited area at any given time. REM servers 12602 and 12604 may therefore function to locally store and update REM data and to provide REM data to requesting devices.

In addition to local REM data storage and update, in some aspects REM servers 12602 and 12604 may provide an advantageous mechanism for requesting devices such as terminal devices and network access nodes to request and receive REM data. Similarly to how a single terminal device or network access node may not need to have REM data for excessively large areas (e.g., a terminal device may not need to download REM data that covers hundreds of miles), requesting devices may not need to download all of the REM data from a local REM server. For example, REM server 12602 may store an immense database of spatial-temporal data for area 12710, including a comprehensive collection of performance metrics such as network load, retransmission parameters (such as Hybrid Automatic Repeat Request (HARQ) metrics), packet/bit/block error rate (PER/BER/BLER) statistics, call drop probabilities, signal strength and signal quality data, pathloss and obstacle information, interference levels, etc., that are represented in both spatial and temporal dimensions across area 12710. Additionally, REM server 12602 may store such performance metrics for different RATs, such as a separate collection of performance metrics for each of 5G (e.g., mmWave), 4G (e.g., LTE), 3G (e.g., UMTS), 2G (e.g., GSM) in addition to other radio access technologies such as Wi-Fi (such as for public Wi-Fi networks). Furthermore, although the radio access and core network sections of communication network 12600 shown in FIG. 126 may be operated by a single network operator, REM servers 12602 may also be configured to interface with multiple networks (e.g., with the infrastructure of multiple PLMNs) and accordingly may store performance metrics for multiple different networks.

Accordingly, while REM server 12602 may store a substantial amount of REM data for area 12710, a given requesting device (terminal device, vehicle or network access node) may not need to download all of the REM data for area 12710. Various aspects may therefore utilize a request-response mechanism that provides specific REM data to requesting devices that is most relevant. Accordingly, these aspects may avoid congestion issues in some aspects by only providing relevant data to requesting devices.

The request-response mechanism may be based on a 'context information detail level', a 'device capability class' of the requesting device, an area or space, intended use, required throughput, required quality of service, etc. Local REM servers such as REM servers 12602 and 12608 may be configured to retrieve specific REM data based on the context information detail level, e.g., how comprehensive/detailed in scope of REM data the requesting device wants, and the device capability class, e.g., how complex the radio capabilities of the requesting device are. Accordingly, if the requesting device specifies a low context information detail level, REM server 12602 may only retrieve generic REM data to provide to the requesting device, such as a list of which RATs are available without any accompanying detailed spatial-temporal performance metrics. Conversely, if the requesting device specifies a high context information detail level, REM server 12602 may retrieve a detailed set of REM data including lists of available RATs in addition to spatial-temporal performance metrics for each RAT.

Similarly, if the requesting device has a low device capability class and is thus only capable of basic radio communications, such as LTE and Wi-Fi, REM server 12602 may optionally only provide REM data for the basic supported RATs. Conversely, if the requesting device has a high device capability class and is able to support more complex RATs such as mmWave, advanced Wi-Fi (e.g., IEEE 802.11ax), TV White Space technology, etc., REM server 12602 may provide REM data for both the basic and complex RATs. Device capability class may also indicate the distinction between terminal devices and network access nodes, where network access nodes may require more comprehensive REM data and may thus be classified as a higher device capability class while terminal devices may only need less comprehensive REM data and may be classified as a lower device capability class.

Figure 129:
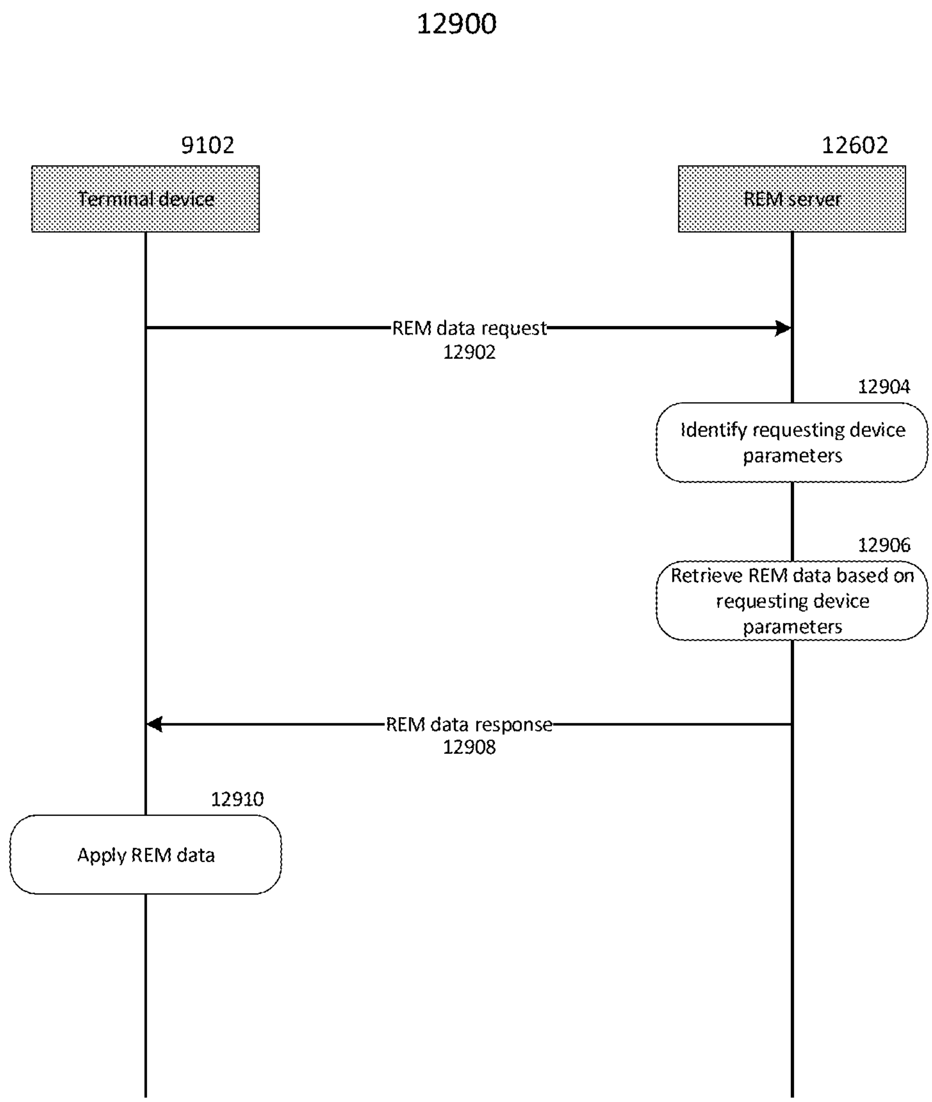

FIG. 129 shows message sequence chart 12900 illustrating the request-response mechanism according to some aspects. As shown in FIG. 129, terminal device 9102 may first transmit a REM data request to REM server 12602. In particular, controller 9210 of baseband modem 9206 may determine that REM data is needed, such as in order to perform radio access selection, traffic management, power/cost management, or another terminal device radio operation. Controller 9210 may then identify the context information detail level and the device capability class and generate the REM data request to include context information detail level and the device capability class. The device capability class may be static for terminal device 9102; for example, a first device capability class may be for terminal devices that only support basic radio communications such as 2G/3G and Wi-Fi, a second device capability class may be for terminal devices that support more complex radio communications such as 2G/3G/LTE and Wi-Fi, while a third device capability class may be for terminal devices that support 3G/3G/LTE, Wi-Fi, mmWave, TV White Space, etc.

In some aspects, the context information detail level can vary depending on the radio operation that terminal device 9102 intends to use the REM data for in addition to other parameters. For example, if terminal device 9102 merely intends to perform RAT selection, terminal device 9102 may only need low-level REM data that specifies which RATs are available. Controller 9210 may therefore select a low context information detail level. However, if terminal device 9102 is currently transferring high-sensitivity data, such as with strict QoS requirements, and needs to select a new cell, terminal device 9102 may need more detailed performance metrics such as network load, PER/BER/BLER statistics, latency, HARQ performance, etc., for each cell on a fine temporal-spatial basis. Accordingly, controller 9210 may select a high context information detail level.

In some aspects, the request-response mechanism may have a predefined framework of context information detail level and device capability classes which controller 9210 may utilize. FIG. 130 shows table 13000 according to some aspects that illustrates an exemplary framework of requesting device parameters that is defined over a two-dimensional of context information detail levels (from detail level 0 to detail level M) and device capability classes (from capability class 0 to capability class N). As shown in FIG. 130, capability class 0 may indicate basic radio capabilities while capability class N may indicate the most complex radio capabilities. Additional capability classes between capability class 0 and capability class N with intermediate radio capabilities may similarly be defined. Other detail levels between detail level 0 and detail level M may similarly be defined.

Controller 9210 may therefore select the context information detail level and device capability class based on requesting device parameter framework shown in table 13000 (where the exact capability classes and detail levels may be configurable) to generate the REM data request and proceed to transmit the REM data request to REM server 12602 in 12902 (via a software-level connection with control module 11902 of REM server 12602 that relies on RF transceiver 9204 and antenna system 9202 and network access node 9110 as a radio interface). REM server 12602 may receive the REM data request at REM controller 12802, which may be configured to process REM data requests, retrieve the appropriate REM data from REM database 12804, and provide the REM data to the requesting device. Accordingly, as shown in FIG. 129, REM controller 12802 may process the REM data request to identify the requesting device parameters in 12904. REM controller 12802 may therefore identify the context information detail level and device capability class specified by terminal device 9102 in the REM data request. REM controller 12802 may then retrieve the appropriate REM data from REM database 12804 according to the requesting device parameters. REM controller 12802 may then generate a REM data response containing the retrieved REM data and transmit the REM data response to terminal device 9102 in 12908. As the REM data response may contain a significant amount of data, such may include establishing a data transfer connection and transferring the data to terminal device 9102 over time.

Controller 9210 may receive the REM data response in 12908 and apply the REM data in 12910. In particular, in various aspects controller 9210 may utilize the REM data to perform radio access selection, traffic management, power/cost management, or another terminal device radio operation. Controller 9210 may include other information in the REM data request, such as location information of terminal device 9102. Instead of providing terminal device 9102 with REM data for all of area 12710, REM server 12602 may then instead provide REM data proximate to the current location of terminal device 9102 (or within a certain radius of the current location or in the direction of travel, which terminal device 9102 may also specify). The radius may be determined on the basis of route information, network coverage, presence of other devices, speed of movement, direction, availability of data, etc.

In some aspects, network access node 9110 may similarly request and receive REM data from REM server 12602, which may be controlled by control module 9310 in place of controller 9210. As network access node 9110 may operate as network-side infrastructure responsible for providing radio access connections to multiple terminal devices, the types and depth of REM data required by network access node 9110 from REM server 12602 may be different from that required by terminal device 9102. For example, network access node 9110 may use the REM data to perform scheduling, beamforming/beamsteering, modulation and coding scheme selection, handovers and other mobility operations, etc., which may utilize different types of REM data (e.g., different performance metrics) and different specificities of REM data. Additionally, as network access node 9110 may be responsible for providing service to many different terminal devices in its coverage area, in some aspects network access node 9110 may wish to access REM data for multiple locations and for a greater area size than a single terminal device. Network access node 9110 may specify such information in the REM data request. The type of device, e.g., terminal device vs. network access node, may be specified to REM server 12602 as part of the device capability class, device information detail level, or as a separate information field of the REM data request.

Accordingly, the request-response mechanism may utilize requesting device parameters such as device capability class and context information detail level to ensure that requesting devices receive only REM data that is relevant and do not exceed additional unneeded REM data (which may waste resources). For example, terminal device 9102 may not require any REM data for RATs that it does not support, such as mmWave. These aspects may utilize device capability classes in the REM data request to ensure that REM data for unsupported RATs is not provided, which may not be useful and may only waste resources. In another example, terminal device 9102 may only require high-level context information, such as generic information on available RATs. A specific case may be if terminal device 9102 is moving at a very high velocity (such as traveling with a user in a vehicle). As terminal device 9102 may have high mobility, most detailed REM data that is tied to very specific locations may quickly become terminal device 9102 may only remain relevant for a very short period of time before terminal device 9102 moves to a new location. However, if terminal device 9102 is generally stationary, terminal device 9102 may wish to optimize the current radio access connection with network access node 9110 to a maximum level. As the REM data will likely be valid for an extended period of time due to the limited mobility of terminal device 9102, terminal device 9102 may wish to receive the fine-grained REM data (which may have significant size) and utilize the REM data to optimize the connection. Alternatively, terminal device 9102 may wish to first start with high-level REM data, such as generic RAT availability information, and only request more detailed REM data (including detailed performance metrics) if an initial RAT selection is unsatisfactory.

In some aspects, terminal device 9102 may also be able to indicate specific routes or areas for which REM data is desired, such as in the case of terminal device 9102 identifying a route that a user will take and pre-downloading REM data for the identified route from REM server 12602.

While each requesting device may theoretically be able to better optimize a radio connection if all of the REM data is available, it may be a waste of resources for REM server 12602 to provide large amounts of REM data. Requesting devices may thus be configured to consider how efficient it will be to receive more comprehensive REM data. As shown in table 13000, in some aspects each entry in the capability class-detail level table may have an 'efficiency metric indication' that indicates the degree of optimization that can occur in terms of link configuration with the REM data that will be provided. The efficiency metric can for example indicate the level of optimality that can be achieved in spite of the lack of detailed context information (e.g., a typical average such as a mean or median value divided by the theoretical maximum) for energy perf bit (Joules/bit), the throughput, etc. The efficiency metric can therefore indicate whether it is worth it for a terminal device to request further context information for a specific application. Requesting devices may therefore consider the efficiency metric indication when selecting device capability classes and context information detail levels for REM data requests.

Some aspects may also apply information centric network (ICN) to enable discovery, advertising, routing, and storing of data across the network. The networking actions may therefore be based on the actual information/content of the data rather than the traditional method source-destination addresses (as in IP-based networking). Accordingly, the generator of the REM data (such as a local REM server, e.g., REM server 12602, that is connected to a network of other REM servers that each store REM data for a different area) can 'publish' locally-generated REM data to certain other anchor nodes (which may be other REM servers such as REM server 12604 or other non-REM server node) and the requestors of the data (requesting devices such as terminal devices 9102 and 9104 and network access nodes 9110 and 9112) can 'subscribe' to the REM data. Each requestor can then obtain data from their local anchor node after subscribing and subsequently discovering the data from their local anchor node. Other network nodes may then be able to route/store the data based on 'content specific labels' as opposed to traditional end-user IP addresses. The publishing, discovery, requesting, and access permissions of the REM data can thus utilize such ICN principles to generate and route REM data between local REM servers, central REM servers, and requesting devices.

In some aspects, REM server 12602 may also be configured to identify terminal devices and network access nodes that are providing unreliable data (e.g., as radio measurements for updating the REM data stored in REM database 12804) and to remove data provided by such devices from REM database 12804.

FIG. 131 shows exemplary method 13100 for managing REM data in a distributed manner in accordance with some aspects. As shown in FIG. 131, method 13100 includes generating local REM data at each of a plurality of local REM servers for a different respective geographic area based on radio information provided by devices within the respective geographic area (13110), uploading the local REM data from each of the plurality of local REM servers to a central REM server (13120), and storing the REM data at the central REM server for a collective geographic area comprising the respective geographic area (13130).

FIG. 132 shows exemplary method 13200 for managing REM data in accordance with some aspects. As shown in FIG. 132, method 13200 includes receiving a REM data request from a requesting device (13210), wherein the REM data request includes a device capability class and an information detail level, identifying REM data from a REM database according to the device capability class and the information detail level (13220), wherein the REM database is configured to store REM data for a geographic area associated with the REM database, and providing the REM data to the requesting device (13230).

While detailed above with a general focus on cellular communication technologies, some aspects can be applied to REM data and servers for any radio access technology.

3.6 Context-Awareness #6

In some aspects of this disclosure, a scheduling function at a network access node (such as a MAC scheduler) may observe traffic to predict traffic patterns of single users, groups of users, or machine-type communication. The scheduling function may then use the traffic patterns to govern scheduling for terminal devices, devices or vehicles. In some aspects, the scheduling function may determine when periods of heavy traffic are likely to occur, and may subsequently then initiate a low-overhead scheduling pattern such as semi persistent scheduling (SPS) during anticipated bursty traffic periods to support transfer of large amounts of data without incurring high overhead costs. In some aspects, the scheduling function may use the traffic patterns to identify when terminal devices are exhibiting non-compliant behavior, such as radio behavior that does not comply with a standard that governs the radio activity between terminal devices and network access nodes, or radio behavior indicating suspicious activity. The scheduling function may then adjust scheduling when non-compliant or suspicious behavior is detected. These aspects may be used with common channel aspects, e.g., a common channel selected on the basis of traffic pattern analysis.

FIG. 133 depicts exemplary user traffic patterns in accordance with some aspects. Traffic pattern 13300 depicts exemplary traffic data rates in the receive direction (e.g., downlink) while traffic pattern 13302 depicts exemplary traffic data rates in the transmit direction (e.g., uplink). As shown in FIG. 133, one or more bursty traffic periods (13304-13312) may occur at various times, where the data rate during bursty traffic periods 13304-13312 may be significantly higher than the data rate during other periods. The bursty traffic periods may also be considered 'bursty' traffic periods.

Accordingly, in an exemplary scenario, terminal device 9102 of FIG. 91 may experience bursty traffic periods where there is a significant amount of user-plane traffic exchanged with network access node 9110 in the downlink and/or uplink directions (e.g., as in bursty traffic periods 13304-13312). For example, there may be certain periods when a user of terminal device 9102 triggers a traffic-intensive activity such as a voice call, a video call, a file download, a video or audio stream, an online gaming session, web browsing, etc. During the duration of such traffic-intensive activities, there may be heavy traffic exchange between network access node 9110 and terminal device 9102. The traffic may also be sporadic or inconsistent, and may be composed of intermittent 'bursts' as opposed to a constant stream. The radio access connection between terminal device 9102 and network access node 9110 may accordingly occupy a large amount of bandwidth and contribute to network loading.

Traffic-intensive activities may involve large quantities of user-plane data that may also be concentrated into sporadic bursts. For example, a voice call may produce a large amount of voice data transferred from terminal device 9102 to network access node 9110 (in the uplink) and transferred from network access node 9110 to terminal device 9102 (in the downlink). There may be bursts of traffic during speech periods that may be bridged by very little traffic during silence periods. Many types of internet traffic may produce such bursty traffic, including web browser data, video streams, and other internet traffic. Traffic-intensive activities may also produce large amounts of control-plane data that can add significant overhead to the radio access connection. For example, in order for terminal device 9102 to know which time-frequency resources contain downlink data intended for terminal device 9102 or are reserved for uplink data of terminal device 9102, network access node 9110 may provide scheduling and resource allocation information to terminal device 9102 as control-plane information. For example, in order for network access node 9110 to know about pending uplink data, terminal device 9102 transmits uplink control plane information, such as buffer status reports (BSRs) and scheduling requests (SRs).

Control-plane information may contribute to significant signaling overhead in the radio access network, in particular during bursty traffic periods where terminal device 9102 may receive and/or transmit continuous control information to support a constant stream of user-plane traffic. The control plane data may also contribute to radio interference and processing power consumption at terminal devices and network access nodes. Accordingly, some radio access technologies such as LTE utilize low-overhead scheduling schemes such as SPS for specific types of radio activity. For example, in an LTE setting, a network access node (e.g., eNodeB) can activate an SPS-configured downlink assignment or uplink grant with a special control message. Upon receipt of the special control message, a terminal device may know a priori that it will receive downlink data or can transmit uplink data every SPS interval. For example, standardized SPS intervals can be e.g., 10, 20, 32, 40, 64, 80, 128, 160, 320, or 640 ms. Accordingly, a terminal device configured with an SPS interval of e.g., 40 ms will know that it will receive downlink data every 40 ms (for downlink SPS) or that it will be able to transmit uplink data every 40 ms (for uplink SPS). While the network access node may still provide control information specifying resource allocations for every repetition of the SPS interval, the terminal device will not need to transmit any buffer status reports (BSRs) or scheduling requests (SRs) to request uplink grants. Additionally, the inactivity timer (e.g., drx-InactivityTimer in LTE) will not be started for SPS-configured downlink assignments, and the terminal device may be able to (depending on timer settings) stop monitoring the control channel and switch the receive chain into low-power mode a few subframes in advance.

These aspects may predict bursty traffic periods, such as those shown in FIG. 133, based on observations of user traffic patterns and may apply SPS scheduling during predicted bursty traffic periods. Various aspects may not rely on higher-layer signaling that indicates bursty traffic, and may instead focus on identifying bursty traffic periods based on monitoring of user traffic (which may be any type of traffic and not only limited to voice packet data). Accordingly, some aspects may avoid the high overhead that can occur during bursty traffic periods, which may reduce load and congestion on the radio access network.

FIG. 134 shows method 13400 in accordance with some aspects. A network access node such as network access node 9110 as shown in FIG. 93 may implement method 13400 at communication module 9306. In some aspects, network access node 9110 may implement this functionality at a MAC scheduler component, such as at control module 9310. In some aspects, communication module 9306 may implement this functionality with hardware-defined and/or software-defined modules.

As shown in FIG. 134, communication module 9306 may observe user traffic of a terminal device to obtain user traffic patterns in 13410. For example, there may be certain periods or times of day when a user of terminal device, such as terminal device 9102, triggers a large amount of user-plane traffic. For example, a user may frequently perform certain traffic-intensive activities at predictable times, such as a user that regularly browses the internet on weekday evenings or during lunch time. In various other examples, a user may regularly watch certain shows (scheduled e.g., every week or day) on terminal device 9102, may regularly make voice or video calls with terminal device 9102 at certain times or on certain days, may regularly stream sporting events with terminal device 9102 at certain times or on certain days, may regularly utilize terminal device 9102 to listen to internet radio at certain times or on certain days, may regularly utilize terminal device 9102 for online gaming at certain times or on certain days, etc.

Accordingly, by identifying the user traffic patterns associated with these regular uses of terminal device 9102, communication module 9306 may be able to anticipate when (e.g., time of day and/or day of week) a user will initiate a traffic-intensive activity (causing a bursty traffic period) with terminal device 9102. In some aspects, communication module 9306 may be configured to execute a predictive algorithm (embodied as software-defined instructions stored on and retrievable from a non-transitory computer readable medium) in 13420 to identify user traffic patterns. For example, communication module 9306 may monitor and measure the uplink and downlink traffic of terminal device 9102 and input the measured uplink and downlink data rates into the predictive algorithm. The predictive algorithm (executed by communication module 9306) may then evaluate the uplink and downlink data rates to identify user traffic patterns, such as what times of day and/or days of the week that bursty traffic periods regularly occur. In some aspects, communication module 9306 may apply machine learning techniques such as decision tree learning, neural network learning, support vector machines, etc., in order to process the user traffic observations (e.g., uplink and downlink data rates) and identify user traffic patterns. In some aspects, communication module 9306 may observe user traffic from terminal device 9102 over an extended observation time, such as days, weeks, months, etc. In some aspects, as terminal device 9102 may be mobile and not remain connected to network access node 9110 for entirety of the extended observation time, communication module 9306 may maintain a database of user traffic observations (identified via identity information of terminal device 9102) that communication module 9306 collects during times when terminal device 9102 is connected to network access node 9110. In some aspects, communication module 9306 may interface with a central server and/or other network access nodes to obtain user traffic observations for terminal device 9102 observed by other network access nodes.

After identifying user traffic patterns based on user traffic observations in 13410, communication module 9306 may predict bursty traffic periods based on the user traffic patterns. For example, if communication module 9306 identifies that a user of terminal device 9102 regularly triggers traffic-intensive activities at a certain time of day during a certain day (e.g., a user traffic pattern), communication module 9306 may predict that upcoming occurrences of the certain time of day during the certain day will potentially be bursty traffic periods. Communication module 9306 may therefore identify the certain time of day during the certain day as a bursty traffic period. Depending on the traffic patterns obtained by communication module 9306 in 13410, communication module 9306 may identify one or more bursty traffic periods based on the user traffic patterns in 13420. In some aspects, each of the bursty traffic periods may be a certain time of day and, in some aspects, may also occur on a specific day (e.g., depending on whether the bursty traffic period regularly occurs on a specific day or days) and/or span a specific duration of time (e.g., depending on whether the bursty traffic period regularly takes place over a specific duration of time). In some aspects, communication module 9306 may predict bursty traffic from loading a particular website dependent on content (e.g., ads, flash video, etc.).

After predicting the bursty traffic periods in 13420, communication module 9306 may apply SPS during predicted bursty traffic periods. Accordingly, when the specific time and/or day occurrence of a bursty traffic period occurs, and terminal device 9102 is connected to network access node 9110, communication module 9306 may trigger SPS for terminal device 9102. Accordingly, as opposed to providing control plane information during e.g., every subframe (as in some cases of conventional scheduling, or 'dynamic scheduling'), communication module 9306 may apply SPS to terminal device 9102. Accordingly, communication module 9306 may reduce overhead by refraining from transmitting control plane information to terminal device 9102 every subframe. In addition to overhead reduction from transmitting the downlink control plane information, terminal device 9102 may refrain from transmitting uplink control plane information when SPS is active, such as buffer status reports (BSRs) and scheduling requests (SRs). SPS may therefore also reduce power consumption at terminal device 9102 as terminal device 9102 may not transmit as much information as for conventional dynamic scheduling. Uplink interference may also be reduced. Terminal device 9102 may also conserve power due to the reduced processing demands of SPS.

In some aspects, communication module 9306 may continue to apply SPS for the duration of the predicted bursty traffic period (e.g., if the user traffic pattern also indicated a duration of the bursty traffic period). In some aspects, communication module 9306 may monitor the actual traffic of terminal device 9102 to determine whether to continue applying SPS, and in some aspects may terminate SPS if terminal device 9102 is not generating bursty traffic. In some aspects, communication module 9306 may update the user traffic patterns (obtained in 13420) based on user traffic observations observed during application of SPS in 13430. In some aspects, communication module 9306 may apply method 13400 to multiple terminal devices, and accordingly may obtain specific user traffic patterns for multiple terminal devices and utilize the user traffic patterns to individually trigger SPS for the each of the multiple terminal devices.

In some aspects, communication module 9306 may additionally or alternatively apply user traffic patterns to detect and react to non-compliant behavior. For example, the radio access connection between terminal device 9102 and network access node 9110 may be defined in a standard. Exemplary standards include e.g., 3GPP standards (such as for LTE, UMTS, and GSM), IEEE standards (e.g., for IEEE 802.11 Wi-Fi and other radio access technologies), European Telecommunications Standards Institute (ETSI) standards, etc. Accordingly, terminal devices and network access nodes can be expected to follow the protocols defined in the standard, e.g., to perform compliant behavior.

However, in particular at the terminal side, terminal devices and network access nodes can be configured to execute non-compliant behavior. For example, in an exemplary scenario a terminal device can be configured (e.g., by a manufacturer or a user) to report false information to a network access node, such as in order to obtain more radio resources, faster data rates, etc. For example, a terminal device can be configured to report false BSRs or Channel State Information (CSI) feedback, which may be able to manipulate a network access node into providing different radio resources than normal. By manipulating the network access node via such non-compliant behavior, a manufacturer or user may be able to improve user experience, such as by influencing a network access node to provide higher data rates, more reliable connections, faster speed connections, more bandwidth, etc. However, such benefits may come at the expense of other users as finite radio resources may be unfairly distributed towards the non-compliant terminal devices.

Accordingly, in some aspects network access node 9110 may implement the functionality of the current aspect in order to detect and respond to non-compliant behavior. FIG. 135 shows method 13500 in accordance with some aspects. In some aspects, network access node 9110 may implement this functionality at a MAC scheduler component, such as at control module 9310. In some aspects, communication module 9306 may implement this functionality with hardware-defined and/or software-defined modules.

As shown in FIG. 135, communication module 9306 may observe user traffic of terminal device 9102 to obtain traffic patterns in 13510. In some aspects, communication module 9306 may observe control plane traffic in 13510, which may include monitoring control plane information such as BSRs and CSI feedback. In some aspects, communication module 9306 may also observe user plane traffic in 13510, and may associate user plane traffic with corresponding control plane traffic. For example, communication module 9306 may observe BSRs and/or CSI feedback provided by terminal device 9102 and observe the user traffic generated in connection with the BSRs and/or CSI feedback. For example, as BSRs indicate the amount of pending uplink data, the value reflected in the BSR should directly correspond with the amount of uplink data transmitted by terminal device 9102 after the BSR. In another example, as CSI feedback indicates the channel quality observed at terminal device 9102, the CSI feedback should reflect the error rate (including block/bit/packet error rates, ACK/NACK rates, etc.) as CSI feedback that indicates strong channels should correspond to low error rates and vice versa for CSI feedback that indicates weak channels. In some aspects, CSI feedback provided by other terminal devices may be expected to correlate to some degree with CSI feedback provided by terminal device 9102. Accordingly, in some aspects communication module 9306 may also compare CSI feedback provided by terminal device 9102 with CSI feedback provided by other terminal devices.

Communication module 9306 may then identify traffic patterns based on the associated control plane and user plane information. For example, communication module 9306 may identify whether the control plane information provided by terminal device 9102 regularly fits with the associated user plane information. In some aspects, communication module 9306 may identify occurrences where the BSR and/or CSI feedback does not match the associated user plane information, such as where BSR values do not match the amount of transmitted uplink data (e.g., within a tolerance value to prevent false positives) or CSI feedback does not match the error rate or CSI feedback provided by other terminal devices (e.g., within a tolerance value to prevent false positives). In some aspects, communication module 9306 may count a number of occurrences where control plane information does not match observed user plane information or control plane information provided by other terminal devices.

Communication module 9306 may then identify non-compliant behavior based on the traffic patterns in 13520. For example, if terminal device 9102 regularly provides control plane information that is potentially non-compliant (e.g., a high number of occurrences of conflicting control plane and user plane data, such as exceeding a threshold), communication module 9306 may identify terminal device 9102 as exhibiting non-compliant behavior in 13520.

Communication module 9306 may then enforce scheduling decisions based on non-compliant behavior in 13530. If communication module 9306 does not identify non-compliant behavior by terminal device 9102 (e.g., a pattern of repeated or regular non-compliant behavior), communication module 9306 may perform normal scheduling, e.g., according to standard MAC scheduling functions. However, if communication module 9306 identifies non-compliant behavior in terminal device 9102, communication module 9306 may adjust scheduling for terminal device 9102 (e.g., adjusting a MAC scheduling function), such as in order to address or counteract the non-compliant behavior.

In some aspects, communication module 9306 may compensate for the non-compliant behavior of terminal device 9102 by restricting the radio resources scheduled for terminal device 9102 in 13530. For example, instead of performing normal scheduling based on BSRs and/or CSI feedback, communication module 9306 may assume that terminal device 9102 is manipulating the BSRs and/or CSI feedback and enforce scheduling decisions based on the assumed manipulation, e.g., by allocating less uplink resources than the BSR would normally require and/or restricting the radio resources compared to if the CSI feedback was accurate. Communication module 9306 may therefore enforce scheduling decisions based on non-compliant behavior in 13530.

In some aspects, communication module 9306 may restrict scheduling in 13530 only if the non-compliant behavior by terminal device 9102 is expected to harm other terminal devices. For example, if communication module 9306 detects non-compliant behavior by terminal device 9102 in 13520, communication module 9306 may evaluate whether the non-compliant behavior will harm the radio access network (such as via an evaluation of context information for other terminal devices in the cell). In some aspects, communication module 9306 may evaluate the potential harm to the radio access network via a maximum likelihood framework.

If communication module 9306 determines that the non-compliant behavior of terminal device 9102 will harm the radio access network, communication module 9306 may restrict scheduling for terminal device 9102, such as by adjusting the radio resource allocation or scheduling. Conversely, if communication module 9306 determines that the non-compliant behavior of terminal device 9102 will not harm the radio access network, communication module 9306 may perform scheduling for terminal device 9102 as requested, e.g., based on the BSRs and/or CSI feedback provided by terminal device 9102. In some cases, scheduling terminal device 9102 as requested may be beneficial (e.g., of mutual interest) for both network access node 9110 and terminal device 9102 if no harm (or minimal harm) to the radio access network will occur.

In some aspects, communication module 9306 may perform method 13500 for multiple terminal devices and individually enforce scheduling decisions based on whether each terminal device exhibits patterns of non-compliant behavior.

In some aspects, communication module 9306 may therefore utilize past terminal device behavior as input to the scheduling function. In some aspects, communication module 9306 may predict bursty traffic periods based on past behavior of terminal devices and initiate SPS during predicted bursty traffic periods. In some aspects, communication module 9306 may identify traffic patterns based on terminal device behavior and identify non-compliant behavior (e.g., a 'greedy' terminal device, compared to an 'honest' terminal device that exhibits compliant behavior). Communication module 9306 may then enforce scheduling decisions based on non-compliant behavior, such as adjusting scheduling for non-compliant terminal devices to counteract the non-compliant behavior (which may protect the radio access network from non-compliant behavior).

4 QOS

FIG. 136 shows radio communication network 13600 in accordance with some aspects, which may include terminal devices 13602 and 13604 in addition to network access nodes 13610 and 13612. Although certain aspects of this disclosure may describe certain radio communication network setting (such as e.g., an LTE, UMTS, GSM, other $3^{rd}$ Generation Partnership Project (3GPP) networks, WLAN/Wi-Fi, Bluetooth, 5G, mmWave, etc.), the subject matter detailed herein is considered demonstrative in nature and may therefore be analogously applied to any other radio communication network. The number of network access nodes and terminal devices in radio communication network 13600 is exemplary and is scalable to any amount.

Accordingly, in an exemplary cellular setting network access nodes 13610 and 13612 may be base stations (e.g., eNodeBs, NodeBs, Base Transceiver Stations (BTSs), etc.) while terminal devices 13602 and 13604 may be cellular terminal devices (e.g., Mobile Stations (MSs), User Equipments (UEs), etc.). Network access nodes 13610 and 13612 may therefore interface (e.g., via backhaul interfaces) with a cellular core network such as an Evolved Packet Core (EPC, for LTE), Core Network (CN, for UMTS), or other cellular core network, which may also be considered part of radio communication network 13600. The cellular core network may interface with one or more external data networks. In an exemplary short-range setting, network access node 13610 and 13612 may be access points (APs, e.g., WLAN or Wi-Fi APs) while terminal device 13602 and 13604 may be short range terminal devices (e.g., stations (STAs)). Network access nodes 13610 and 13612 may interface (e.g., via an internal or external router) with one or more external data networks.

Network access nodes 13610 and 13612 (and other network access nodes of radio communication network 13600 not explicitly shown in FIG. 136) may accordingly provide a radio access network to terminal devices 13602 and 13604 (and other terminal devices of radio communication network 13600 not explicitly shown in FIG. 136). In an exemplary cellular setting, the radio access network provided by network access nodes 13610 and 13612 may enable terminal devices 13602 and 13604 to wirelessly access the core network via radio communications. The core network may provide switching, routing, and transmission of traffic data related to terminal devices 13602 and 13604 and may provide access to various internal (e.g., control nodes, other terminal devices on radio communication network 13600, etc.) and external data networks (e.g., data networks providing voice, text, multimedia (audio, video, image), and other Internet and application data). In an exemplary short-range setting, the radio access network provided by network access nodes 13610 and 13612 may provide access to internal (e.g., other terminal devices connected to radio communication network 13600) and external data networks (e.g., data networks providing voice, text, multimedia (audio, video, image), and other Internet and application data). Network access nodes 13610 and 13612 may be network access nodes for any other type of radio access technology and analogously provide a radio access network to proximate terminal devices in this manner.

The radio access network and core network (if applicable) of radio communication network 13600 may be governed by network protocols that may vary depending on the specifics of radio communication network 13600. Such network protocols may define the scheduling, formatting, and routing of both user and control data traffic through radio communication network 13600, which includes the transmission and reception of such data through both the radio access and core network domains of radio communication network 13600. Accordingly, terminal devices 13602 and 13604 and network access nodes 13610 and 13612 may follow the defined network protocols to transmit and receive data over the radio access network domain of radio communication network 13600 while the core network may follow the defined network protocols (e.g., internet protocol) to route data within and outside of the core network. Exemplary network protocols include LTE, UMTS, GSM, WiMAX, Bluetooth, Wi-Fi, mmWave, etc., any of which may be applicable to radio communication network 13600.

Both the radio access network and core network of radio communication network 13600 may be governed by network protocols that may vary depending on the specifics of radio communication network 13600. Such network protocols may define the scheduling, formatting, and routing of both user and control data traffic through radio communication network 13600, which includes the transmission and reception of such data through both the radio access and core network domains of radio communication network 13600. Accordingly, terminal devices 13602 and 13604 and network access nodes 13610 and 13612 may follow the defined network protocols to transmit and receive data over the radio access network domain of radio communication network 13600 while the core network may follow the defined network protocols to route data within and outside of the core network. Exemplary network protocols include LTE, UMTS, GSM, WiMax, Bluetooth, Wi-Fi, etc., or other 2G, 3G, 4G, 5G, next generation like 6G, etc. technologies either already developed or to be developed, any of which may be applicable to radio communication network 13600.

FIG. 137 shows an internal configuration of terminal device 13602, which may include antenna system 13702, radio frequency (RF) transceiver 13704, baseband modem 13706 (including physical layer processing module 13708 and controller 13710), application processor 13712, memory 13714, power supply 13716, sensor 13718, and sensor 13720. Although not explicitly shown in FIG. 137, terminal device 13602 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identify module(s) (SIMs), user input/output devices (display(s), keypad(s), touchscreen(s), speaker(s), external button(s), camera(s), microphone(s), etc.), etc.

In an abridged operational overview, terminal device 13602 may transmit and receive radio signals on one or more radio access networks. Baseband modem 13706 may direct such communication functionality of terminal device 13602 according to the communication protocols associated with each radio access network, and may execute control over antenna system 13702 and RF transceiver 13704 in order to transmit and receive radio signals according to the formatting and scheduling parameters defined by each communication protocol. Although various practical designs may include separate communication components for each supported radio access technology (e.g., a separate antenna, RF transceiver, physical layer processing module, and controller), for purposes of conciseness the configuration of terminal device 13602 shown in FIG. 137 depicts only a single instance of each such components.

Terminal device 13602 may transmit and receive radio signals with antenna system 13702, which may be a single antenna or an antenna array including multiple antennas and may additionally include analog antenna combination and/or beamforming circuitry. In the receive path (RX), RF transceiver 13704 may receive analog radio frequency signals from antenna system 13702 and perform analog and digital RF front-end processing on the analog radio frequency signals to produce digital baseband samples (e.g., In-Phase/Quadrature (IQ) samples) to provide to baseband modem 13706. RF transceiver 13704 may accordingly include analog and digital reception components including amplifiers (e.g., a Low Noise Amplifier (LNA)), filters, RF demodulators (e.g., an RF IQ demodulator)), and analog-to-digital converters (ADCs) to convert the received radio frequency signals to digital baseband samples. In the transmit path (TX), RF transceiver 13704 may receive digital baseband samples from baseband modem 13706 and perform analog and digital RF front-end processing on the digital baseband samples to produce analog radio frequency signals to provide to antenna system 13702 for wireless transmission. RF transceiver 13704 may thus include analog and digital transmission components including amplifiers (e.g., a Power Amplifier (PA), filters, RF modulators (e.g., an RF IQ modulator), and digital-to-analog converters (DACs) to mix the digital baseband samples received from baseband modem 13706 to produce the analog radio frequency signals for wireless transmission by antenna system 13702. Baseband module 13706 may control the RF transmission and reception of RF transceiver 13704, including specifying the transmit and receive radio frequencies for operation of RF transceiver 13704.

As shown in FIG. 137, baseband modem 13706 may include physical layer processing module 13708, which may perform physical layer (Layer 1) transmission and reception processing to prepare outgoing transmit data provided by controller 13710 for transmission via RF transceiver 13704 and prepare incoming received data provided by RF transceiver 13704 for processing by controller 13710. Physical layer processing module 13708 may accordingly perform one or more of error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Physical layer processing module 13708. Although not explicitly shown in FIG. 137, physical layer processing module 13708 may include a physical layer controller configured to control the various hardware and software processing components of physical layer processing module 13708 in accordance with physical layer control logic defined by the communications protocol for the relevant radio access technologies. Furthermore, while physical layer processing module 13708 is depicted as a single component in FIG. 137, physical layer processing module 13708 may be collectively implemented as separate sections of physical layer processing components where each respective section is dedicated to the physical layer processing of a particular radio access technology.

Terminal device 13602 may be configured to operate according to one or more radio access technologies, which may be directed by controller 13710. Controller 13710 may thus be responsible for controlling the radio communication components of terminal device 13602 (antenna system 13702, RF transceiver 13704, and physical layer processing module 13708) in accordance with the communication protocols of each supported radio access technology, and accordingly may represent the Access Stratum and Non-Access Stratum (NAS) (also encompassing Layer 2 and Layer 3) of each supported radio access technology. Controller 13710 may be structurally embodied as a protocol processor configured to execute protocol software (retrieved from a controller memory) and subsequently control the radio communication components of terminal device 13602 in order to transmit and receive communication signals in accordance with the corresponding protocol control logic defined in the protocol software.

Controller 13710 may therefore be configured to manage the radio communication functionality of terminal device 13602 in order to communicate with the various radio and core network components of radio communication network 13600, and accordingly may be configured according to the communication protocols for multiple radio access technologies. Controller 13710 may either be a unified controller that is collectively responsible for all supported radio access technologies (e.g., LTE and GSM/UMTS) or may be implemented as multiple separate controllers where each controller is a dedicated controller for a particular radio access technology or group of technologies, such as e.g., a dedicated LTE controller and a dedicated legacy controller (or alternatively a dedicated LTE controller, dedicated GSM controller, and a dedicated UMTS controller). Regardless, controller 13710 may be responsible for directing radio communication activity of terminal device 13602 according to the communication protocols of the LTE and legacy networks. As previously noted regarding physical layer processing module 13708, one or both of antenna system 13702 and RF transceiver 13704 may similarly be partitioned into multiple dedicated components that each respectively correspond to one or more of the supported radio access technologies. Depending on the specifics of each such configuration and the number of supported radio access technologies, controller 13710 may be configured to control the radio communication operations of terminal device 13602 in accordance with, e.g., a master/slave RAT hierarchical or multi-SIM scheme.

Terminal device 13602 may also include application processor 13712, memory 13714, and power supply 13716. Application processor 13712 may be a CPU configured to execute various applications and/or programs of terminal device 13602 at an application layer of terminal device 13602, such as e.g., an operating system (OS), a user interface (UI) for supporting user interaction with terminal device 13602, and/or various user applications. The application processor may interface with baseband modem 13706 as an application layer to transmit and receive user data such as voice data, audio/video/image data, messaging data, application data, basic Internet/web access data, etc., over the radio network connection(s) provided by baseband modem 13706.

Memory 13714 may embody a memory component of terminal device 13602, such as e.g., a hard drive or another such permanent memory device. Although not explicitly depicted in FIG. 137, the various other components of terminal device 13602 shown in FIG. 137 may additionally each include integrated permanent and non-permanent memory components, such as for storing software program code, buffering data, etc.

Power supply 13716 may be an electrical power source that provides power to the various electrical components of terminal device 13602. Depending on the design of terminal device 13602, power supply 13716 may be a 'definite' power source such as e.g., a battery (rechargeable or disposable) or an 'indefinite' power source such as e.g., a wired electrical connection. Operation of the various components of terminal device 13602 may thus pull electrical power from power supply 13716.

Sensors 13718 and 13720 may be sensors that provide sensor data to application processor 13712. Sensors 13718 and 13720 may be any of a location sensor (e.g., a global navigation satellite system (GNSS) such as a Global Positioning System (GPS)), a time sensor (e.g., a clock), an acceleration sensor/gyroscope, a radar sensor, a light sensor, an image sensor (e.g., a camera), a sonar sensor, etc.

Terminal devices such as terminal devices 13602 and 13604 of FIG. 136 may execute mobility procedures to connect to, disconnect from, and switch between available network access nodes of the radio access network of radio communication network 13600. As each network access node of radio communication network 13600 may have a specific coverage area, terminal devices 13602 and 13604 may be configured to select and re-select between the available network access nodes in order to maintain a strong radio access connection with the radio access network of radio communication network 13600. For example, terminal device 13602 may establish a radio access connection with network access node 13610 while terminal device 13604 may establish a radio access connection with network access node 13612. In the event that the current radio access connection degrades, terminal devices 13602 or 13604 may seek a new radio access connection with another network access node of radio communication network 13600; for example, terminal device 13604 may move from the coverage area of network access node 13612 into the coverage area of network access node 13610. As a result, the radio access connection with network access node 13612 may degrade, which terminal device 13604 may detect via radio measurements such as signal strength or signal quality measurements of network access node 13612. Depending on the mobility procedures defined in the appropriate network protocols for radio communication network 13600, terminal device 13604 may seek a new radio access connection (which may be triggered at terminal device 13604 or by the radio access network), such as by performing radio measurements on neighboring network access nodes to determine whether any neighboring network access nodes can provide a suitable radio access connection. As terminal device 13604 may have moved into the coverage area of network access node 13610, terminal device 13604 may identify network access node 13610 (which may be selected by terminal device 13604 or selected by the radio access network) and transfer to a new radio access connection with network access node 13610. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

FIG. 138 shows an internal configuration of a network access node such as network access node 13610. As shown in FIG. 138, network access node 13610 may include antenna system 13802, radio module 13804, and communication module 13806 (including physical layer module 13808 and control module 13810). In an abridged overview of the operation of network access node 13610, network access node 13610 may transmit and receive radio signals via antenna system 13802, which may be an antenna array including multiple antennas. Radio module 13804 may perform transmit and receive RF processing in order to convert outgoing digital data from communication module 13806 into analog RF signals to provide to antenna system 13802 for radio transmission and to convert incoming analog RF signals received from antenna system 13802 into digital data to provide to communication module 13806. Physical layer module 13808 may be configured to perform transmit and receive PHY processing on digital data received from radio module 13804 to provide to control module 13610 and on digital data received from control module 13810 to provide to radio module 13804. Control module 13810 may control the communication functionality of network access node 13610 according to the corresponding radio access protocols, e.g., LTE, which may include exercising control over antenna system 13802, radio module 13804, and physical layer module 13808. Each of radio module 13804, physical layer module 13808, and control module 13810 may be structurally realized as a hardware-defined module, e.g., as one or more dedicated hardware circuits or FPGAs, as a software-defined module, e.g., as one or more processors executing program code defining arithmetic, control, and I/O instructions (e.g., software and/or firmware) stored in a non-transitory computer-readable storage medium, or as a mixed hardware-defined and software-defined module. In some aspects, radio module 13804 may be a radio transceiver including digital and analog radio frequency processing and amplification circuitry. In some aspects, radio module 13804 may be a software-defined radio (SDR) component implemented as a processor configured to execute software-defined instructions that specify radio frequency processing routines. In some aspects, physical layer module 13808 may include a processor and one or more hardware accelerators, wherein the processor is configured to control physical layer processing and offload certain processing tasks to the one or more hardware accelerators. In some aspects, control module 13810 may be a controller configured to execute software-defined instructions that specify upper-layer control functions. In some aspects, control module 13810 may be limited to radio communication protocol stack layer functions, while in other aspects control module 13810 may also be responsible for transport, internet, and application layer functions.

Network access node 13610 may thus provide the functionality of network access nodes in radio communication networks by providing a radio access network to enable served terminal devices to access desired communication data. For example, network access node 13610 may also interface with a core network, one or more other network access nodes, or various other internet networks and servers via a wired or wireless backhaul interface.

Radio communication networks may be highly dynamic due to a variety of factors that impact radio communications. For example, terminal devices 13602 and 13604 may move (e.g., by a user) to various different positions relative to network access nodes 13610 and 13612, which may affect the relative distances and radio propagation channels between terminal devices 13602 and 13604 and network access node 13610 and 13612. The radio propagation channels may also vary due to factors unrelated to mobility such as interference, moving obstacles, and atmospheric changes. Additionally, local conditions at terminal device 13602 and 13604, such as battery power, the use of multiple radio access technologies, varying user activity and associated data traffic demands, etc., may also impact radio communication. Radio communications may also be affected by conditions at network access nodes 13610 and 13612 in addition to the underlying core network, such as network load and available radio resources.

As previously indicated, network access nodes 13610 and 13612 may interface with a core network. FIG. 139 shows an exemplary configuration where network access node 13610 interfaces with core network 13902. Core network 13902 may provide a variety of functions essential to operation of radio communication network 13600, such as data routing, authenticating and managing users/subscribers, interfacing with external networks, and various network control tasks. Core network 13902 may therefore provide an infrastructure to route data between terminal device 13602 and various external networks such as data network 13904 and data network 13906; accordingly, terminal device 13602 may rely on the radio access network provided by network access node 13610 to wirelessly transmit and receive data with network access node 13610, which may then provide the data to core network 13902 for further routing to external locations such as data networks 13904 and 13906 (which may be packet data networks (PDNs)). Terminal device 13602 may therefore establish a data connection with data network 13904 and/or data network 13906 that relies on network access node 13610 and core network 13902 for data transfer and routing.

Terminal device 13602 may maintain data connections with various different network nodes, including network access node 13610, various nodes of core network 13902, and data networks 13904 and 13906, where each data connection may be a virtual software-level connection referred to as a 'bearer' that is defined by specific network parameters (e.g., guaranteed minimum bitrate, latency requirements, acceptable packet loss rate requirements, etc.) governing the data transfer over the connection. The various bearers may be arranged in hierarchical manner, where higher bearers may utilize lower bearers for to transport data. For example, application processor 13712 may maintain an end-to-end bearer with data network 13904 and an end-to-end bearer with data network 13906. The end-to-end bearers may each rely on lower bearers to transport data packets. In particular, the end-to-end bearers may be composed of a network bearer and an external bearer, where the network bearer spans between terminal device 13602 across radio communication network 13600 to a network gateway of core network 13902 and the external bearer spans between the network gateway and data network 13904 or data network 13906. In an LTE setting, the network bearer may be an evolved packet service (EPS) bearer between terminal device 13602 and a PDN gateway (PGW) of core network 13600 while the external bearer may extend between the PGW and data network 13904 or 13906 and include various routers and firewalls. As the network bearer spans across radio communication network 13600, the network bearer may be composed of multiple lower bearers between network nodes of radio communication network 13600 that the network bearer uses to transfer data packets between each network node. In an exemplary LTE setting, the EPS bearer may be composed of a radio bearer between terminal device 13602 and network access node 13610, an S1 bearer between network access node 13610 and a serving gateway (SGW) of core network 13902, and an S5/S8 bearer between the SGW and the PGW, where the radio bearer and the S1 bearer form a radio access bearer (RAB).

Terminal device 13602 may therefore maintain separate end-to-end bearers with data networks 13904 and 13906, which may each rely on a separate network bearer (e.g., an EPS bearer) for data transfer across radio communication network 13600 and a separate external bearer to transfer data from radio communication network 13600 to data network 13904 or 13906 (where each network bearer and associated external bearer form an end-to-end bearer). In an exemplary use case, application programs executed at application processor 13712 of terminal device 13602 may establish an end-to-end bearer with external data networks such as data networks 13904 and 13906 in order to exchange application data and perform a variety of services, such as web browsing, voice and video calls, multimedia streaming, file downloads, IoT applications, remote machine control applications, and other application-specific data transfer operations such as for email, social networking, and other mobile applications. For example, data network 13904 may be an operator specific network including IP Multimedia Subsystem (IMS) servers while data network 13906 may be an Internet network or server. A first application executed at application processor 13712 may establish a first end-to-end bearer with data network 13904 (e.g., with a counterpart application at data network 13904) and a second application executed at application processor 13712 may establish a second end-to-end bearer with data network 13906 (e.g., with a counterpart application at data network 13906). Terminal device 13602 may then utilize the first end-to-end bearer to exchange IMS call data with data network 13904, such as to make Voice over LTE (VoLTE) calls and may utilize the second end-to-end bearer to exchange Internet web browsing traffic with data network 13906.

The first and second end-to-end bearers may therefore support different services depending on the connected data networks. As the data traffic profiles for each end-to-end bearer may vary depending on the supported service, the requirements of the end-to-end bearers, and accordingly of each of the lower bearers that compose the end-to-end bearers, may also vary across different services. For example, as the first end-to-end bearer may be utilized for transfer of realtime IMS signaling in the example introduced above, the first end-to-end bearer may have strict latency and acceptable packet-loss requirements in order to ensure that IMS call quality is sufficient. As the second end-to-end bearer may be utilized for ‘best-effort’ packet data transfer, such as loading websites and other non-realtime traffic, the second end-to-end bearer may have more relaxed latency and acceptable packet-loss requirements. As the end-to-end bearers may utilize lower bearers in the hierarchy to transfer data packets, the bearer requirements of the end-to-end bearers may also be imposed on the underlying bearers (e.g., including the network, and external bearers that form each end-to-end bearer).

As each end-to-end bearer relies on a network bearer to transport data between terminal device 13602 and the network gateways of core network 13902, radio communication network 13600 may therefore maintain a separate network bearer for each end-to-end bearer. As each end-to-end bearer supports a different underlying service, radio communication network 13600 may need to manage each network bearer in order to meet the requirements of the underlying services. These requirements of each network bearer, referred to as QoS requirements, may specify parameters such as latency, acceptable packet loss, and bitrate guarantees (if any) that are required by each network bearer in order to ensure that transfer of data packets across each network bearer meets the specific requirements of the underlying service. More sensitive or critical services such as IMS calls, realtime voice and video traffic, mission-critical services such as mission-critical push-to-talk (MCPTT) for public safety, and remote machine control services (e.g., autonomous vehicles) may have stricter QoS requirements than other services such as buffered voice/video and best-effort packet data. In order to ensure satisfactory user experience, many communication systems may prioritize data bearers based on the QoS requirements, where network bearers with strict QoS requirements are given higher priority than network bearers with more relaxed QoS requirements. Data traffic for higher priority network bearers may then be prioritized during transfer across radio communication network 13600. Radio communication network 13600 may therefore give priority to data traffic for high priority network bearers by meeting the strict bitrate, latency, and packet loss requirements of the high priority network bearers. Additionally, if network congestion occurs radio communication network 13600 may discard or delay data traffic for the lowest priority network bearers.

Communication systems such as LTE and other radio access technologies may employ a predefined and standardized QoS framework that classifies and prioritizes network data bearers based on the QoS requirements of the underlying services and regulates data traffic in accordance with the classification and priority of each network bearer. LTE provides an exemplary such framework in the QoS Class Identifier (QCI) mechanism, which classifies network bearers into a number of predefined QCI classes. Each QCI class may be tailored to a specific service type, such as conversational voice and video, IMS signaling data, buffered voice and video, live/realtime voice and video, general packet data (e.g., best-effort), control signaling, etc., and may have specific bitrate guarantees, latencies, and packet loss tolerances. As previously indicated, the QoS classes may be arranged in a hierarchical scheme where each QoS class is assigned a priority, where sensitive services such as IMS signaling data and conversational voice and video may have high priority QCI classes and tolerant services such as buffered streaming and best-effort packet data may have lower priority QCI classes.

In addition to classifying network bearers based on QoS requirements, the QCI framework in LTE may also recognize 'priority' users that subscribe to a premium service that guarantees higher performance. For example, users that wish to be guaranteed high performance guarantees may subscribe to a premium service that guarantees higher QoS to data traffic of that user. Accordingly, the QCI framework may also assign network bearers of these premium users with higher QCI priorities, thus guaranteeing a better QoS to such users. Network bearers for premium users may often be assigned QCI classes with guaranteed bitrates. Other radio communication technologies may also provide standardized QoS frameworks that similarly prioritize certain data streams to ensure that QoS requirements and/or additional subscription guarantees are met.

Radio communication networks may therefore assign each network bearer a QoS class based on a standardized QoS framework that considers the QoS requirements of the underlying service in addition to other considerations such as premium QoS subscriptions. After assigning each network bearer with a QoS class, radio communication networks may then manage data traffic across the radio communication network to ensure that the data of each network bearer is delivered according to the QoS requirements.

Continuing with the setting of FIG. 139, radio communication network 13600 may assign each network bearer with a QoS class during establishment of the bearer. For example, in an LTE setting, when attaching to the radio communication network 13600 terminal device 13602 may initiate an initial PDN connection with data network 13904 by sending a PDN connectivity request to a Mobility Management Entity (MME) of core network 13902. As terminal device 13602 is requesting an initial PDN connection with data network 13904 (e.g., terminal device 13602 does not have any other PDN connections with data network 13904), the MME may establish the network bearer as a 'default' bearer. Before establishing the network bearer, the MME may retrieve subscription data for terminal device 13602 from a Home Subscriber Server (HSS) in core network 13902. The subscription data may include context information for data network 13904, which may include an access point name (APN) for data network 13904, QoS information for data network 13904 including a QCI and an allocation/retention priority (ARP) for the default bearer, and an aggregate maximum bitrate (AMBR) for all non-guaranteed bitrate (non-GBR) bearers which are established for this APN. The subscription data applicable to the PDN connection may depend on the APN for which the application is requesting the default network bearer and additionally on the presence of premium subscription information. For example, certain applications such as IMS applications may require a PDN connection for an APN associated with a higher QCI, AMBR, and/or ARP than other applications (which may result in default bearers with higher QCI, AMBR, and/or ARP) while certain subscribers may have premium subscriptions (which may result in default bearers with higher QCI, AMBR, and/or ARP).

The MME may then establish the network bearer across radio communication network 13600 with the QCI, AMBR, and ARP (which may involve a propagating sequence of messages across the various network nodes of radio communication network 13600 to establish the underlying data bearers). The PGW of core network 13904 that interfaces with data network 13904 may then establish an external bearer in order to complete the end-to-end data bearer supporting the PDN connection with data network 13904. Terminal device 13602 and the PGW may then map uplink and downlink data onto the network bearer using the TFT information, which specifies packet filters for identifying data packets that belong on the network bearer. Terminal device 13602 may also establish additional PDN connections with other data networks, such as data network 13906, by sending additional PDN connectivity requests.

As this network bearer is a default network bearer, the QoS requirements of the assigned QCI may be relatively low. For example, default bearers in LTE may generally be assigned QCI=9, which is intended for standard 'best-effort' data traffic. As an exception to this, the default bearer for a PDN connection for IMS services may be assigned QCI=5 so that it fulfills the high QoS requirements for IMS signaling data. If terminal device 13602 needs different QoS requirements for a given service with data network 13904 (such as voice/video/audio/multimedia streaming), terminal device 13602 may need to establish a dedicated network bearer with data network 13904 that has a different QCI than the default network bearer. Terminal device 13602 may determine the QoS requirements for the dedicated network bearer based on the requesting application or service. Accordingly, terminal device 13602 may transmit a bearer resource allocation request to the MME that specifies a QCI and TFT information for the requested dedicated bearer resources (in addition to other bearer parameters such as a guaranteed bitrate (GBR) and maximum bitrate (MBR) if the requested dedicated bearer is a GBR bearer). The MME may then carry out dedicated bearer establishment in radio communication network 13600 (which may involve a propagating sequence of messages across the various network nodes of radio communication network 13600 to establish the underlying data bearers in addition to verifying the QCI information). Radio communication network 13600 may then establish the dedicated network bearer (although if there is another dedicated network bearer between terminal device 13602 and data network 13904 with the same QCI, radio communication network 13600 may 'add' bearer resources to the existing dedicated network bearer, e.g., increase the GBR and MBR accordingly, and map data from the existing and the requested dedicated network bearer onto the existing dedicated network bearer). The PGW of core network 13904 that interfaces with data network 13904 may then establish an external bearer for the dedicated network bearer in order to complete the end-to-end data bearer supporting the PDN connection with data network 13904

Terminal device 13602 may then utilize the default and dedicated network bearers to exchange data with data network 13904, where terminal device 13602 may map and receive certain data of the PDN connection on the default network bearer and other data on the dedicated network bearer. For example, in an IMS application, the default network bearer may be utilized for IMS signaling while the dedicated network bearer may be utilized for IMS call traffic. The dedicated network bearer may be a GBR bearer (e.g., QCI=1) in contrast to the default network bearer which is non-GBR (e.g., QCI=5); consequently, the dedicated network bearer may be more suitable for delivering IMS call traffic across radio communication network 13600. As indicated above, terminal device 13602 and the PGW of core network 13902 interfacing with data network 13904 may be responsible for mapping the appropriate data packets onto the proper network bearer according to the TFT filters. The various nodes of radio communication network 13600 may then deliver the data packets across radio communication network 13600 by enforcing the QoS requirements of each network bearer (which may include e.g., admission control, scheduling, rate control, etc. across each of the lower bearers that compose each network bearer (e.g., the radio bearer, S1 bearer, and S5/S8 bearer that form an EPS network bearer in LTE)). Dedicated network bearer establishment may also be triggered by radio communication network 13600 as opposed to by terminal device 13602.

Accordingly, in the setting of FIG. 136, terminal device 13602 may establish a first default network bearer for data network 13904 and a second default network bearer for data network 13906. Depending on the needs of the underlying services provided by data networks 13904 and 13906, terminal device 13602 may also establish dedicated network bearers to deliver data traffic with other QoS requirements. Each default and dedicated bearer may be assigned a QoS class with specific QoS requirements, where the QoS class may be determined by radio communication network 13600 or terminal device 13602. Radio communication network 13600 may then oversee data transfer for the various default and dedicated network bearers between terminal device 13602 and the network gateways at the back end of core network 13902 according to the QoS requirements specified by the respective QoS classes.

Maintaining and optimizing QoS requirements for the various bearers in radio communication networks may help provide a satisfactory user experience, and in some cases may be important in providing satisfactory user experience. It may therefore be important that the various nodes of radio communication network 13600 carry out their respectively assigned QoS responsibilities in order that data traffic on each network bearer is handled according to the priority, latency, packet loss, and bitrate guarantees of the respective QoS class. While existing QoS frameworks may uphold QoS requirements in many cases, further improvements in QoS guarantees may be invaluable in maximizing user experience. Various aspects of this disclosure may therefore provide various mechanisms to improve, or in some cases to optimize, QoS in radio communication networks in order that the QoS requirements for various applications and services are met.

4.1 QoS #1

In some aspects of this disclosure, a radio communication network may perform network slice selection for a terminal device to use based on the QoS requirements of the various applications of the terminal device. In particular, a management application may identify which applications are installed on the terminal device and/or which applications are frequently used by a user and evaluate the QoS requirements of the identified applications and associated services to determine a 'service profile key' that characterizes the collective QoS requirements of the applications of the terminal device. The radio communication network may then utilize the service profile key to select a suitable network 'slice' for the terminal device to utilize. As will be detailed, in network slicing architectures the infrastructure of a single network may be logically divided into multiple separate network 'slices' that each form a virtual end-to-end network that is tailored to support specific services based on the resources logically assigned to each slice. These aspects may be used with power efficiency aspects described herein.

Aspects in the '5G' class may utilize such network slicing in order to meet the requirements of a number of different services (e.g., mobile broadband, massive IoT, remote machine control, etc.) with a single physical network. Accordingly, instead of providing a common radio access and core network for all terminal devices to use, these advanced networks may divide the radio access and core network into separate logical 'slices' that each implement a virtual end-to-end network. Each network slice may then be allocated dedicated resources tailored to meet certain network parameters such as latency, reliability, mobility, charging, security, data rate, policy control, power consumption, battery life, capacity, coverage, etc., in order to effectively support certain services. For example, a first network slice of a given network may target mobile broadband uses while a second network slice of the network may target massive IoT applications. The first network slice may therefore be configured to offer higher data rates and mobility with lower latency while the second network slice may offer lower power consumption while also supporting lower mobility. Alternatively, the network may have fine-grained network slices and e.g., may have multiple mobile broadband slices that are each configured to support specific types of mobile broadband traffic, such as a network slice for video delivery and another network slice for web browser traffic. All variations of such network slice configurations are within the scope of this disclosure.

Each network slice may therefore be tailored (e.g., by virtue of the assigned resources) to support specific services on account of the parameters (latency, reliability, mobility, charging, security, data rate, policy control, power consumption, capacity, coverage, etc.) specific to each network slice. Despite the flexibility offered by such slicing, the allocation of terminal devices to different slices may generally be fixed. For example, IoT devices employed in a massive IoT deployment, such as for a sensor network, may be assigned to a massive IoT network slice while user-operated terminal devices such as mobile phones and tablets may be assigned to a mobile broadband network slice.

However, depending on the services offered by a terminal device, this fixed slice assignment may not be applicable in many use cases. Accordingly, the current aspects may aggregate the QoS requirements of the applications and related services of a given terminal device to determine a service profile key that collectively characterizes the QoS requirements of the terminal device. These aspects may then apply the service profile key to select an ideal network slice to support the data traffic for the terminal device. This may therefore improve (e.g., optimize) data transfer for terminal devices by selecting a network slice that fits the QoS requirements of the terminal device. These aspects can also provide a mechanism to adapt to changes in the usage of the terminal device by updating the service profile key when the application and service usage changes.

FIG. 140 shows an exemplary network slicing architecture for radio communication network 14000. As shown in FIG. 140, radio communication network 14000 may physically include radio infrastructure 14002, baseband infrastructure 14004, and core infrastructure 14006, where radio infrastructure 14002 and baseband infrastructure 14004 may form the radio access section of radio communication network 14000. Radio infrastructure 14002 may include antennas and radio circuitry (e.g., in the manner of antenna system 13802 and radio module 13804 of network access node 13610 as shown in FIG. 138) that may transmit and receive radio signals with terminal devices over the radio access network of radio communication network 14000. The antennas and radio circuitry of radio infrastructure 14002 may be geographically deployed throughout the coverage area to provide the radio access network to proximate terminal devices. Baseband infrastructure 14004 may handle the baseband processing section of the radio access network (e.g., in the manner of baseband module 13810 of network access node 13804). However, instead of having separate baseband processing instances at network access node site locations, baseband infrastructure 14004 may implement the baseband processing of the radio access network in centralized locations, such as in a software-defined architecture executed at central servers (which may be commercial cloud servers) that may optionally be supported by dedicated baseband hardware (e.g., hardware accelerators). Core network system 14006 may handle the core network functionality of radio communication network 14000 (e.g., in the manner of core network 13902 as shown in FIG. 139) and, similarly to baseband infrastructure 14004, may be implemented in a software-defined architecture on central servers. Although shown as single components in FIG. 140, in some aspects baseband infrastructure 14004 and core infrastructure 14006 may be implemented in a cloud architecture and may thus be spread across different physical servers, such as with network virtualization techniques. Core network 14000 may interface with external data networks such as data networks 14014 and 14016.

Instead of supporting all terminal devices with a single, monolithic architecture, radio communication network 14000 may be divided into network slices 14008, 14010, and 14012. As shown in FIG. 140, network slices 14008-14012 may be formed from radio infrastructure 14002, baseband infrastructure 14004, and core infrastructure 14006 and may each provide an end-to-end network path across radio communication network 14000. As previously indicated, each network slice may be a logically separate 'virtual' network with dedicated resources and accordingly may offer a virtually different radio access and core network. As baseband infrastructure 14004 and core infrastructure 14006 may be implemented on central servers, in some aspects each of network slices 14008-14012 may be implemented using network virtualization such as network function virtualization (NFV) in which the various baseband and core network functions are embodied as software and executed separately on the servers that support baseband infrastructure 14004 and core infrastructure 14006. For example, core network functions such as MME, PGW, SGW, and PCRF may be embodied in software and installed onto the servers supporting core infrastructure 14006. In some aspects baseband processing functions, such as those related to Digital Units (DUs) in an LTE cloud-RAN (C-RAN) architecture may similarly be embodied as software and installed onto the servers supporting baseband infrastructure 14004. As previously indicated, baseband infrastructure 14004 can optionally also be implemented in part with dedicated baseband hardware, such as dedicated circuitry referred to as hardware accelerators that are specifically designed to perform processing-intensive physical layer operations. In order to realize the different network slicing for network slices 14008-14012, multiple instances of the core network and baseband processing functions may be installed and executed as software on baseband infrastructure 14004 and core infrastructure 14006 in order to realize each of network slices 14008-14012, such as by using a virtual machine framework. Any dedicated baseband hardware may also be shared between network slices or duplicated and uniquely assigned to each network slice. In some aspects, the various subcomponents (e.g., virtual machines) that constitute each network slice may then be connected with networking techniques such as software defined networking (SDN) in order to logically realize each of network slices 14008-14012.

As indicated above, radio infrastructure 14002 may be implemented using geographically deployed antenna and radio circuitry nodes. The equipment of radio infrastructure 14002 dedicated to each of network slices 14008-14012 may overlap (e.g., network slices 14008-14012 may utilize the same antenna and radio circuitry of radio infrastructure 14002) or may be separate (e.g., each of network slices 14008-14012 may utilize different antenna and radio circuitry of radio infrastructure 14002).

The network slicing of radio communication network 14000 may provide greater flexibility and service-specific resources. For example, network slice 14008 may be tailored for mobile broadband (MBB), network slice 14010 may be tailored for massive Machine Type Communication (mMTC), and network slice 14012 may be tailored for ultra-reliable low-latency communication (URLLC). The individual differences between MBB vs. mMTC vs URLLC traffic will be reflected in the configuration and deployment of network slices 14008-14012. For example, MBB is generally the continuation of the past evolution from e.g., UMTS to LTE to LTE-A, which targets higher throughputs with greater numbers and higher efficiency of channels. MBB slices such as network slice 14008 will be expected to support download of substantial amounts of data with high throughput, which may require specialized hardware that is optimized for user-plane throughput. However, this specialized hardware may not necessarily support low-latency (e.g., for a quick start of data transfer), and at least in the near future the highest targeted data rates (e.g., 10 Gbps in the uplink and 20 Gbps in the downlink) may not be required by many subscribers. MBB slices may also target support of a high degree of mobility due to the mobile nature of many MBB terminal devices.

For mMTC applications, the ratio between the amount of signaling (e.g., control) and user data transferred is definitively shifted towards signaling data. Accordingly, mMTC slices such as network slice 14010 will be expected (e.g., at both hardware and software components) to handle many simultaneous access attempts in parallel. Although the lifetime of a specific connection may be relatively short (and the amount of user data transferred relatively small). mMTC slices may also be expected to support terminal devices under extreme (e.g., extremely poor) coverage conditions which may require special protocols (e.g., at PHY and Layer 2) that proved additional redundancy. Due to the added redundancy, these special protocols will most likely not be very efficient, in particular in terms of spectral efficiency. In some cases, the mobility demands for mMTC slices may be less than that of MBB, in particular for stationary IoT device networks such as fixed sensor networks.

URLLC slices such as network slice 14012 may be configured with special hardware in order to achieve the low-latency needed to support URLLC devices. URLLC slices may in some cases also target high throughput, although potentially for only very short durations of time as the amount of data that needs to be transferred may be relatively small (e.g., in the order of several hundred octets). Due to the high reliability requirements, some additional redundancy may also be required. However, in this case the redundancy/error resilience may not be able to be met by distributing the information over time (e.g., by repeating transmissions, which may unacceptably impact latency), and accordingly transmissions may be repeated by, for example, transmitting simultaneously on several frequency bands. This may lead to lower spectral efficiency in URLLC slices compared to MBB slices. In certain cases the mobility demands of URLLC slices may also be higher than mMTC slices, such as for autonomous driving applications.

Accordingly, the different demands and targets of network slices 14008-14012 may lead to different configurations and resources. For example, network slices 14008-14012 may require different specialized hardware and/or hardware accelerators to support the extreme use cases unique to each network slice. As this hardware is expensive and likely a scarce resource, networks may aim to only assign terminal devices to each network slice that have a real need for the properties (latency, reliability, throughput, mobility) offered by each slice. Although MBB, mMTC, and URLLC may be referred to for network slices 14008-14012, in some aspects radio communication network 14000 may also be configured with more or fewer network slices that may support other services.

Network slicing may be relatively fixed in assigning terminal devices to network slices. For example, terminal devices may be classified based on an overall service type, e.g., MBB terminal devices, massive MTC terminal devices, URLLC terminal devices, etc., and may be rigidly fixed to a corresponding network slice. The network may assign this service type, e.g., based on specific capabilities of the terminal device (e.g., maximum supported bitrate, minimum supported transmission time interval (TTI), support of device-to-device (D2D) communication) or based on the subscription. In the latter case the subscriber could be responsible for inserting the universal subscriber identity module (USIM) representing the subscription in a terminal device with capabilities suitable for the service type.

These aspects may therefore present greater flexibility and improve, or in some cases optimize, QoS with a framework that characterizes the services and applications of a terminal device (e.g., installed and/or frequently-used applications) as a service profile key. The terminal device may then signal the service profile key to a network, which may assign the terminal device to a particular network slice that best meets the QoS requirements indicated by the service profile key. As the services and applications of the terminal device may change over time, in some aspects the terminal device may update the service profile key and therefore enable the network to switch the assigned network slice in order to dynamically improve, or in some cases optimize, the QoS of data transfer for the terminal device.

FIG. 141 shows an exemplary internal diagram of terminal device 13602 according to some aspects. As shown in FIG. 141, application processor 13712 may include manager application 14102 and one or more dedicated applications 14104-14106. Other components of terminal device 13602 not directly related to the current aspects in addition to control, power, and clock lines may not be expressly shown in FIG. 141. In some aspects, manager application 14102 and dedicated applications 14104-14106 may each be embodied as software logic stored in a non-transitory computer readable medium that is retrieved and executed by application processor 13712. Each of manager application 14102 and dedicated applications 14104-14106 may each be stored as separate program code modules that may be separately executed by application processor 13712. Dedicated applications 14104-14106 may be any of a number of various types of applications, such as voice/video call applications, web browser applications, email applications, messaging applications, social media applications, navigation applications, calendar/scheduling applications, IoT applications, mMTC applications, remote machine control applications, autonomous driving applications, etc. In some aspects, application processor 13712 may also interact with other components of terminal device 13602 to make dedicated applications 14104-14106 user-interactive, such as with user I/O components e.g., a display screen, audio speakers, touchpads, microphones, cameras, and buttons.

Dedicated applications 14104-14106 may be 'online' applications that require exchange of data traffic with data networks. Accordingly, in a setting where terminal device 13602 is connected to radio communication network 14000, dedicated application 14104 may establish and maintain a software-level logical connection with data network 14014 while dedicated application 14106 may establish and maintain a software-level logical connection with data network 14016. As previously indicated, the software-level logical connections between application processor 13712 and data networks 14014 and 14016 may include various data bearers that perform transfer of data packets between terminal device 13602 and data networks 14014 and 14016. In the same manner as detailed above regarding radio communication network 13600, radio communication network 14000 may utilize network bearers to transfer data across radio communication network 14000, which may include both default and dedicated network data bearers. However, as each of network slices 14008-14012 utilize dedicated resources with unique traffic characteristics (e.g., latency, reliability, mobility, charging, security, data rate, policy control, power consumption, capacity, coverage, etc.), the network bearers provided by each network slice may inherit the characteristics of the underlying network slice at least to some extent. For example, if network slice 14010 is an mMTC slice as introduced above, network slice 14010 may not be able to provide a low latency and high throughput network bearer that would be sufficient to deliver e.g., IMS signaling or various other types of MBB traffic. Similarly, network slices 14008 and 14012 may not be capable of supporting the sizable number of network bearers as would be needed for mMTC due to their respective aims for MBB and URLLC traffic. In a more fine-grained deployment, e.g., where radio communication network 14000 provides multiple network slices for certain services such as multiple different mobile broadband network slices, certain network slices also may be better suited to transferring certain types of data traffic, such as a low-latency MBB network slice for delivering IMS signaling and a high throughput MBB network slice for file download.

Manager application 14102 may be configured to evaluate which applications are installed on and/or frequently used by application processor 13712, such as by monitoring the usage of dedicated applications 14104-14106, and determine a 'service profile key' based on the QoS requirements of the installed/frequently used applications. Manager application 14102 may then provide the service profile key to radio communication network 14000 (e.g., to a core network entity of core infrastructure 14006), which may then select an appropriate network slice for terminal device 13602 by identifying which network slice is best configured to meet the QoS requirements collectively represented by the service profile key. Terminal device 13602 may then utilize the network slice selected by radio communication network 14000 to establish network bearers and exchange data traffic with data networks 14014 and 14016.

FIG. 142 shows message sequence chart 14200 according to some aspects. As shown in FIG. 142, manager application 14102 may first identify installed and/or frequently-used applications of application processor 13712 in 14202. For example, manager application 14102 may identify applications that are currently installed on application processor 13712, which may include dedicated applications 14104-14106. As these aspects may improve QoS for data activity, in some aspects manager application 14102 may only identify applications that are 'online', e.g., that utilize data transfer over radio communication network 14000. Additionally or alternatively, in some aspects manager application 14102 may determine which applications are frequently-used, such as by monitoring application usage at application processor 13712 over time according to a predetermined criteria, for example, applications that are used for more than a predefined duration in a given time window (which may also be average values) or applications that transfer more than a predefined amount of data in a given time window (which may be average values).

After identifying the relevant applications, e.g., dedicated applications 14104-14106, manager application 14102 may evaluate the QoS requirements of the identified applications in order to determine a service profile key in 14204. The service profile key may therefore collectively characterize the QoS requirements of the applications of terminal device 13602 that are involved in data transfer. As each of the identified applications may utilize specific services provided by the associated data networks, such as voice/video calls, web browser traffic, email, IoT, remote machine control, etc., each of the identified applications may rely on network bearers that meet the QoS requirements of the underlying services. For example, each of the applications identified by manager application 14102 in 14202 may have latency, reliability, mobility, charging, security, data rate, policy control, power consumption, battery life, capacity, or coverage requirements that a network bearer should meet in order to provide sufficient service. Manager application 14102 may collect these QoS requirements each identified application and determine a service profile key that jointly characterizes the QoS requirements of the identified applications.

Manager application 14102 may collect the QoS requirements of the identified applications in 14202 in several different ways. For example, as detailed above terminal device 13602 may be configured to request a dedicated network bearer (e.g., with a bearer resource allocation request in an LTE setting) with a specific QoS class from core infrastructure 14006. Terminal device 13602 may determine the desired QoS class for a dedicated network bearer based on a mapping table that maps the various applications of application processor 13712 to a specific QoS class (where each QoS class has specific QoS requirements including latency, bitrate, packet loss, and priority requirements). For example, in an exemplary scenario, dedicated application 14104 may request an IP connection with data network 13904. Application processor 13712 may provide the request to baseband modem 13706 and may specify a unique 'application ID' for dedicated application 14104, where the application ID is a predefined number or string that uniquely identifies dedicated application 14104. Controller 13710 may then reference a mapping table with the application ID for dedicated application 14104 to determine if the mapping table includes an explicit mapping rule for dedicated application 14104. In some aspects, the explicit mapping rule may be, for example, a rule that specifies a QoS class that should be utilized for dedicated network bearers requested by dedicated application 14104 and that may be different from the QoS class of the default network bearer. If the mapping table does not have an explicit mapping rule for a given application (e.g., there are no entries in the mapping table with the application ID of the application), controller 13710 may utilize a default QoS class and map the data packets for application 14104 onto the default network bearer for data network 13904.

In some aspects, manager application 14102 may therefore utilize the mapping table (e.g., used for assigning QoS classes to dedicated bearers based on application IDs) to collect the QoS requirements of the applications identified in 14202. For example, manager application 14102 may identify the application IDs for the applications identified in 14202 and reference the mapping table to determine if any of the identified applications have an explicit mapping rule (with an associated QoS class) in the mapping table. Manager application 14102 may utilize the QoS class specified in the mapping table for each identified application with an explicit mapping rule and may utilize a default QoS class (for default network bearers) for each identified application that does not have an explicit mapping rule. As previously indicated, each QoS class may be assigned specific QoS requirements. For example, each QoS class may be part of a standardized QoS framework (e.g., QCI in LTE) and may be mapped to predefined QoS requirements.

In some aspects, the mapping table utilized for QoS class assignment may be provided by core infrastructure 14006. For example, a dedicated network server (e.g., an Open Mobile Alliance (OMA) device management server) in core infrastructure 14006 may store the mapping table and may provide the mapping table to terminal devices (e.g., as an OMA Managed Object (MO)), e.g., after each terminal device has initially attached to core infrastructure 14006. In some aspects, the dedicated network server may also provide updates to the terminal devices if the mapping table changes. Accordingly, manager application 14102 may utilize the network-provided mapping table in 14204 in order to identify the QoS requirements of each of the identified applications. As this mapping table is provided by the network, this mapping table may also be considered 'operator-defined'.

Alternatively, in some aspects manager application 14204 may 'override' the network-provided/operator-defined mapping table with an alternate mapping table. The alternate mapping table may specify QoS requirements for certain applications that are different from the QoS requirements mapped to each application by the network-provided mapping table. The alternate mapping table may optionally also be specific to these aspects, in other words, may be specifically provided to define QoS requirements in accordance with these aspects. In some aspects, the alternate mapping table may be preprogrammed into terminal device 13602 or may be received by terminal device 13602 from an alternate location, such as an external server (not part of radio communication network 13600) that provides the alternate mapping table to terminal device 13602.

Similar to the network-provided mapping table, in some aspects the alternate mapping table may be indexed with application IDs and may define QoS requirements for each application ID. Accordingly, if manager application 14102 utilizes the alternate mapping table in 14204, manager application 14102 may reference the alternate mapping table with the application IDs of the applications identified in 14202 and determine the QoS requirements mapped to each identified application in the alternate mapping table. In some aspects, terminal device 13602 may also utilize the alternate mapping table to establish data bearers and may accordingly override the network-provided mapping table for bearer establishment purposes.

In some aspects, manager application 14102 may utilize other information to identify the QoS requirements for dedicated applications 14104-14106. For example, dedicated applications 14104-14106 may be pre-assigned metadata that indicates their QoS requirements. For example, if dedicated application 14104 is an application focused on mMTC use cases, dedication application 14104 may have preassigned metadata that is consistent with QoS requirements for mMTC applications (and likewise for MBB and URLLC cases). Manager application 14102 may also access this preassigned metadata for dedicated applications 14104-14106 to identify their QoS requirements.

After identifying the QoS requirements of the identified applications, manager application 14102 may determine a service profile key based on the QoS requirements. The service profile key may characterize the QoS requirements of the identified applications. In some aspects, the service profile key may therefore provide a characterization of the latency, reliability, mobility, charging, security, data rate, policy control, power consumption, battery life, capacity, and/or coverage requirements of the applications of terminal device 13602, which may provide a basis for identifying an appropriate network slice of radio communication network 14000 to assign to terminal device 13602. While applications of application processor 13712 may still utilize separate network bearers across the selected network slice (where the network bearers are configured according to the individual QoS requirements of the applications), selection of an ideal network slice that fits the QoS requirements of the applications may be more effective than attempting to maintain a network bearer with QoS requirements that are not compatible with the supporting network slice.

In various aspects, manager application 14102 may have different options for determining the service profile key (which may in some cases also require cooperation from core infrastructure 14006). For example, in some aspects manager application 14102 and core infrastructure 14006 may utilize an existing QoS framework as the service profile keys. In this case, manager application 14102 may determine a QoS class from the standardized QoS framework (e.g., QCI in LTE) that best matches the QoS requirements of the identified applications. In some aspects, manager application 14102 may compare the QoS requirements of each identified application to the QoS requirements of each standardized QoS class to determine which standardized QoS class is the 'closest' (e.g., by a multi-variable distance measurement, which may also weight certain QoS requirements higher than others) overall to the QoS requirements of the identified applications. Alternatively, in some aspects manager application 14102 may identify the dedicated application with the strictest QoS requirements and utilize the corresponding QoS class as the service profile key. In either case, manager application 14102 may then report the selected QoS class as the service profile key to core infrastructure 14006 in 14206, which may then utilize the selected QoS class to perform network slice selection.

Alternatively, in some aspects manager application 14102 and core infrastructure 14006 may utilize a different service profile key scheme, such as a service profile key scheme that is specific to these aspects. For example, the service profile key scheme may be predefined and specify a set of predefined service profile keys that are each assigned different QoS requirements. Similarly to the above case with standardized QoS frameworks, manager application 14102 may compare the QoS requirements of the identified applications to each of the predefined service profile keys in 14204 to determine which of the predefined service profile keys provides the best match (e.g., by applying a multi-variable distance measurement to the QoS requirements and the predefined service profile keys to determine which predefined service profile key has the least distance with the QoS requirements). Manager application 14102 may then report the closest predefined service profile key to core infrastructure 14006 in 14206, which may then utilize the closest predefined service profile key to perform network slice selection.

In some aspects, manager application 14102 may also determine the service profile key based on a usage profile, such as how often and/or at what times or days a particular application is used, of dedicated applications 14104-14106. For example, dedicated application 14104 may be used very often (e.g., by a user of terminal device 13602) while dedicated application 14106 may only be used sporadically or infrequently. As dedicated application 14104 may therefore be used more frequently than dedicated application 14106, in some aspects manager application 14102 may weight the service profile key towards the QoS requirements of dedicated application 14104 (e.g., by weighting the QoS requirements of dedicated application 14104 with a higher weight than QoS requirements of other applications in a multi-variable distance measurement with the predefined service profile keys). In another example, dedicated application 14106 may be used frequently during certain times of day or days of the week (such as during work hours or during work days) and rarely during other times of day or days of the week. Accordingly, in some aspects manager application 14102 may identify the times/days when dedicated application 14106 is most frequently used and determine the service profile key to more heavily reflect the QoS requirements of dedicated application 14106 during times/days of the week that dedicated application 14106 is used and to less heavily reflect the QoS requirements of dedicated application 14106 during other times/days. In some aspects, manager application 14102 may determine the usage profile based on location and movement of terminal device 13602, such as where a user may be more likely to use maps when away from frequently visited areas and when moving at car speeds. In some aspects, manager application 14102 may determine the usage profile from social network information, such as where a user of terminal device 13602 is at an event where many other users are tweeting, live streaming, and other social actions. Manager application 14102 may then adjust the usage profile accordingly if the user is likely to do the same. In some aspects, manager application 14102 may determine the usage profile based on data in other applications, such as calendar appointments in a calendar or email application. In some aspects, manager application 14102 may determine the usage profile based on information about access to Wi-Fi services, such as if terminal device 13602 is near a Wi-Fi hotspot that the user has used before (e.g., if a user subscribes to a particular network and is going to an event with a hotspot of that network). Manager application 14102 may then adjust the usage profile accordingly.

In some aspects, manager application 14102 may also determine the service profile key in 14204 based on a 'target', such as a service optimization target (e.g., optimized QoS), cost optimization target (e.g., the lowest cost service), or battery usage optimization target (e.g., the lowest battery power consumption), or a cost optimization target (e.g., the lowest cost). For example, low latency or high bitrate may provide improved service but come at the expense of higher cost (e.g., if the operator has a traffic-dependent charging policy) and higher power consumption. Accordingly, if there is currently low battery power at terminal device 13602 or if a user sets terminal device 13602 in a power saving mode, manager application 14102 may in some aspects utilize a power consumption optimization target and assign QoS classes to the identified applications that improve, or even optimize, battery power consumption (potentially at the expense of service). Alternatively, if a trigger at terminal device 13602 indicates that service should be improved or optimized (which may be initiated by a user or by another trigger), in some aspects manager application 14102 may utilize a service optimization target and assign QoS classes to the identified application that improve or optimize service (potentially at the expense of cost and power consumption). Alternatively, if a trigger at terminal device indicates that cost should be improved or optimized (such as a billing for terminal device 13602 approaching a limit or cap or a user indicating a desire to reduce or minimize cost), in some aspects manager application 14102 may utilize a cost optimization target and assign QoS classes to the identified application that improve or optimize cost (potentially at the expense of service).

Manager application 14102 may therefore consider such targets during service profile key determination in 14204. For example, manager application 14102 may have several different alternate mapping tables (for mapping application ID to QoS requirements) where each alternate mapping table has QoS requirements that are tailored to one of the specific targets. For example, a first alternate mapping table tailored for a cost reduction or optimization target may have specific QoS requirements for each application while a second alternate mapping table tailored for a service improvement or optimization target may have specific different QoS requirements for each application. The QoS requirements of the first alternate mapping table may be tailored to reducing or optimizing cost while the QoS requirements of the second alternate mapping table may be tailored to improving or optimizing service. If a specific target is desired, manager application 14102 may therefore utilize the corresponding alternate mapping table to obtain the QoS requirements of the identified application. Manager application 14102 may then determine the service profile key based on these QoS requirements, which may cause the service profile key to reflect the target.

Alternative to using different alternate mapping tables, in some aspects manager application 14102 may modify the service profile key based on an improvement or optimization target. For example, manager application 14102 may first determine a service profile key based on the QoS requirements in 14204, modify the service profile key (which may include selecting a different service profile key that better meets the target), and transmit the modified service profile key to core infrastructure 14006 in 14206. Manager application 14102 may therefore select the service profile key based on an improvement or optimization target.

Additionally or alternatively, in some aspects manager application 14102 may utilize a points scheme to determine the service profile key. For example, manager application and core infrastructure 14006 may utilize a set of predefined classes for each of the network slice dimensions, e.g., MBB, mMTC, and URLLC dimensions. Based on the requirements of dedicated applications 14104-14106, manager application 14102 may tally points for each network slice dimension to obtain a final point count for each network slice dimension that indicates which network slice dimension represents the best match for dedicated applications 14104-14106 (e.g., on the basis of a collective match or a match for the most extreme requirements). For example, as MBB places a high demand on throughput, manager application 14102 may assign 1 point to the MBB dimension for a dedicated application with a throughput requirement of [0-100 Kbit], 2 points for [100 Kbit-1 Mbit], 3 points for [1 Mbit-100 Mbit], 4 points for [100 Mbit-1 Gbit], and 5 points as [1 Gbit-100 Gbit]. For the mMTC dimension, manager application 14102 may assign 1 point for enhanced coverage and 2 points for 'extreme' enhanced coverage, add 1 to 3 points based on power restrictions (1 point for up to 1 week, 2 points for up to 5 years, 3 points for 10 years and more of operation without re-charging), add 1 point for 'infrequent' transmission of small data packets, and/or add up to 2 points for the support of 3GPP Cellular IoT (CIoT) optimizations. For the URLLC dimension, manager application 14102 may assign 1 or 2 points if the supported TTI is <0.5 ms or 0.1 ms, respectively, and up to 3 additional points dependent on whether the packet error loss rate needs to be $<10^{-6}$, $10^{-8}$, $10^{-10}$, respectively. In some aspects, manager application 14102 may tally the points for each of dedicated applications 14104-14106 to obtain a total point count for each dimension that includes the points from each of dedicated applications 14104-14106. In some aspects, manager application 14102 may shift or alter the point counts for each network slice dimension based on one or more factors noted above, such as usage profiles or optimization targets. This point scheme is non-limiting and demonstrative and numerous other point schemes relying on the same concept can be used without departing from the scope of this disclosure.

Manager application 14102 may then select the service profile key based on the point counts for each of the network slice dimensions. For example, in an aspect where the service profile key indicates a network slice dimension, manager application 14102 may select a service profile key that indicates the network slice dimension with the highest point count. For example, if the point count for the MBB dimension is 4, the point count for the mMTC dimension is 1, and the point count for the URLLC dimension is 2, manager application 14102 may select the service profile key as corresponding to the MBB dimension. Alternatively, in some aspects manager application 14102 may compile or combine the point counts for the network slice dimensions and send the point counts as the service profile key, which may enable core infrastructure 14006 to evaluate the point counts to select a network slice. For example, in some aspects manager application 14102 may encode the result in a 3-dimensional vector. For example, if each dimension the device can achieve between 0 and n−1 points, one could set service profile key=(#of MBB points)*n^2+(#of mMTC points)*n+(#of URLLC points).

In each case, the service profile key selected by manager application 14102 in 14204 may provide a characterization of the requirements of the applications of terminal device 13602. The service profile key may therefore provide a basis for identifying an appropriate network slice of radio communication network 14000 to assign to terminal device 13602. While applications of application processor 13712 may still utilize separate network bearers across the selected network slice (where each network bearer is configured according to the individual QoS requirements of each application), selection of an ideal network slice that fits the QoS requirements of the applications may be much more effective than attempting to maintain a network bearer with QoS requirements that are not compatible with the supporting network slice.

As shown in FIG. 142, manager application 14102 may report the service profile key to core infrastructure 14006 in 14206, which as previously indicated may be a server system that implements various core network entities in a virtual manner across one or more servers. In particular, manager application 14102 may report the service profile key to a virtual entity of core infrastructure 14006 (e.g., a virtualized network function executed as software on core infrastructure 14006) that is responsible for managing the assignment of terminal devices to network slices 14008-

14012, such as a mobility management entity or a dedicated network slice selection entity (e.g., an entity responsible for Common Control Network Functions (CCNF)). Manager application 14102 may report the service profile key on an existing radio access connection (e.g., on one of network slices 14008-14012 that terminal device 13602 is initially connected to) by providing the service profile key to controller 13710 for wireless transmission via RF transceiver 13704 and antenna system 13702. If terminal device 13602 is not initially connected to radio communication network 14000, controller 13710 may in some aspects transmit the service profile key to core infrastructure 14006, e.g., as part of an initial attach or registration procedure. Additionally or alternatively, in some aspects controller 13710 may provide the service profile key to core infrastructure 14006 as part of a Tracking Area Update (TAU) or other registration update procedure. Additionally or alternatively, in some aspects controller 13710 may provide the service profile key to core infrastructure 14006 as standalone control signaling.

Core infrastructure 14006 may receive the service profile key in 14206 and select a network slice for terminal device 13602 in 14208 based on the service profile key. As the service profile key represents the QoS requirements of the installed/frequently-used applications identified by manager application 14102 in 14202, in some aspects core infrastructure 14006 may be able to compare the QoS requirements indicated by the service profile key to the QoS provided by each of network slices 14008-14012 in 14208 in order to determine which of network slices 14008-14012 best satisfies the QoS requirements of the service profile key. For example, core infrastructure 14006 may compare the latency, reliability, mobility, charging, security, data rate, policy control, power consumption, battery life, capacity, and/or coverage properties of network slices 14008-14012 to the QoS requirements indicated by the service profile key to determine which of network slices 14008-14012 is able to meet the QoS requirements of the service profile key.

In some aspects, core infrastructure 14006 may be configured to select a network slice that collectively matches the QoS requirements as represented by the service profile key. Accordingly, core infrastructure 14006 may utilize a distance metric (e.g., a multi-variable distance measurement) or similar measure to compare the QoS requirements collectively represented by dedicated applications 14104-14106 to the properties of network slices 14008-14012 and to identify which of network slices 14008-14012 provides the closest match.

Additionally or alternatively, in some aspects core infrastructure 14006 may be configured to select a network slice to meet the most demanding QoS requirements. For example, if dedicated application 14104 has extreme requirements in one of the network slice dimensions (e.g., extreme throughput requirements for the MBB dimension, extreme coverage or battery life requirements for the mMTC dimension, extreme latency or reliability requirements for the URLLC dimension, etc.), core infrastructure 14006 may be configured to select a network slice that meets the extreme requirements, in other words, a network slice corresponding to the network slice dimension with the extreme requirements. Accordingly, in some aspects manager application 14102 may select the network slice that meets the most extreme requirements, even at the cost that other applications running on terminal device 13602 will not be using the network slice most suitable for their QoS requirements. For example, as previously described manager application 14102 may obtain point counts for each network slice dimension and provide a service profile key that reflects the point count for each dimension, e.g., a service profile key that indicates the network slice dimension with the highest point count or a service profile key that indicates each of the point counts. In some cases where the service profile key indicates the network slice dimension with the highest point count, core infrastructure 14006 may select the corresponding network slice in 14208, which may ensure that the selected network slice addresses the most extreme requirements (as indicated by the network slice dimension with the highest point count). In some cases where the service profile key indicates the point counts of each network slice dimension (e.g., for a 3-dimensional), core infrastructure 14006 may identify the network slice dimension with the highest point count and select the corresponding network slice. Numerous variations with different QoS requirements indicated by the service profile key and different QoS provided by network slices 14008-14012 (including more network slices) are also within the scope of this disclosure.

Core infrastructure 14006 may then configure terminal device 13602 according to the selected network slice in 14210. In some aspects, core infrastructure 14006 may notify terminal device 13602 of the selected network slice. For example, core infrastructure 14006 may notify controller 13710 of the selected network slice, provide a radio interface configuration for controller 13710 to use in accordance with the selected network slice, and release the existing radio and core network connection. Controller 13710 may then proceed to register with the selected network slice, which may include establishing a new radio and core network connection with the selected network slice (with the components of radio infrastructure 14002, baseband infrastructure 14004, and core infrastructure 14006 associated with the selected network slice, which may be a virtual association). For example, controller 13710 may establish network bearers for dedicated applications 14104-14106 as part of end-to-end bearers with data networks that provide the underlying services for dedicated applications 14104-14106, e.g., data networks 14014 and 14016. As controller 13710 may be utilizing the selected network slice, the network bearers may run along the virtual path of the selected network slice through radio infrastructure 14002, baseband infrastructure 14004, and core infrastructure 14006 to network gateways of radio communication network 14000 that interface with data networks 14014 and 14016. Each of the network bearers may have unique QoS requirements depending on the QoS class of dedicated applications 14104-14106; however, as the network bearers run through the selected network slice, the QoS afforded to each network bearer may be constrained by the QoS provided by the resources of the selected network slice. However, as core infrastructure 14006 has selected the selected network slice based on the QoS requirements indicated by the service profile key, the selected network slice may provide an advantageous balance between the QoS requirements of each of dedicated applications 14104-14106.

In some aspects, core infrastructure 14004 may provide an explicit slice ID to terminal device 13602 that explicitly identifies the selected network slice to terminal device 13602. This slice ID information may be useful in cases such as where terminal device 13602 enters into a radio idle state at a later time. When transitioning back to radio connected state, terminal device 13602 may signal the slice ID to radio infrastructure 14002 during connection establishment procedures. This may provide radio infrastructure 14002 (e.g., a particular network access node that terminal device 13602 has initially attached to) with an indication of which core entities of core infrastructure 14006 to utilize that are consistent with the selected network slice. For example, in an exemplary LTE setting, terminal device 13602 may have moved to a new tracking area that is served by a different MME pool. Terminal device 13602 may provide the slice ID to an eNodeB during a TAU procedure, which may provide the eNB with an indication of which MME to select from a pool of possible MMEs for terminal device 13602 that is consistent with the selected network slice. Terminal device 13602 may similarly utilize the slice ID in the setting of other radio access technologies according to their specific mobility procedures.

Alternatively, in some aspects core infrastructure 14006 may not explicitly notify terminal device 13602 of the selected network slice, and information about the selected network slice may be available only in the radio communication network 14000. For example, core infrastructure 14006 may configure the radio infrastructure 14002, baseband infrastructure 14004 and core infrastructure 14006 for the selected network slice and notify controller 13710 to use a certain radio interface configuration according to the selected network slice. While controller 13710 may execute radio communications with the radio interface configuration, terminal device 13602 may not explicitly have knowledge of which of network slices 14008-14012 was selected by core infrastructure 14006 as the selected network slice.

For example, core infrastructure 14006 (e.g., an MME in an exemplary LTE setting) may select network resources (e.g., an SGW, PGW, and transmission means between the SGW and PGW and the eNB and SGW) that are able to meet the requirements indicated by the service profile key, e.g., may select a network slice that fits the service profile key. Core infrastructure 14006 may not explicitly provide a slice ID for the selected network slice to terminal device 13602, and may instead store the slice ID internally (e.g., by the MME storing a certain SGW address and PGW address and storing interface identifiers (such as GTP Tunnel Endpoint ID (GTP TEID)) for the SGW towards the eNB, which implicitly define the transmission means).

In both cases, core infrastructure 14006 may provide a radio interface configuration for controller 13710 to utilize, where the radio interface configuration corresponds to the selected network slice. Controller 13710 may therefore proceed to execute data transfer over the selected network slice in 14212 using the radio interface configuration (where controller 13710 may or may not have explicit knowledge of the selected network slice). In some aspects, controller 13710 may map data packets provided by dedicated applications 14104-14106 to the appropriate network bearers (e.g., according to TFT filtering) and transmit the data packets on each network bearer across the selected network slice of radio communication network 14000 to network gateways (e.g., PGWs) of core infrastructure 14006, which may then map the data packets from each network bearer onto counterpart external bearers (that each collectively form an end-to-end bearer with the counterpart network bearer) for transfer to data networks 14014 and 14016. The network gateways may similarly filter data packets received from data networks 14014 and 14016 on the external bearers and map the data packets onto the appropriate network bearers (e.g., with TFT filtering) to deliver the data packets of each network bearer to terminal device 13602 across the selected network slice. In some aspects, controller 13710 may therefore execute data transfer over the selected network slice in 14212 in order to route data packets to and from dedicated applications 14104-14106 on the selected network slice.

As the installed and frequently-used applications at application processor 13712 may change over time, in some aspects manager application 14102 may continually repeat 14202-14206 in order to identify the installed/frequently-used applications and their associated QoS requirements and to determine the service profile key based on the identified QoS requirements. In some aspects, core infrastructure 14006 may then be able to dynamically adapt the network slice assigned to terminal device 13602 over time, which may ensure that terminal device 13602 is configured to utilize a network slice that satisfies the collective QoS requirements of the installed/frequently used applications of application processor 13712. Such may be advantageous in deployments of radio communication network 14000 with fine-grained network slicing, e.g., with multiple mobile broadband network slices. As the data traffic profiles of dedicated applications 14104-14106 changes over time, in some aspects manager application 14102 may update the service profile key and trigger selection to a new network slice that ideally matches the current data traffic profile. Service may therefore be optimized for terminal device 13602. In some aspects, core infrastructure 14006 may explicitly notify terminal device 13602 of the network slice update and provide a new radio interface configuration (if necessary for the network slice update). In some aspects, core infrastructure 14006 may not explicitly notify terminal device 13602 of the network slice update (although core infrastructure 14006 may provide a new radio interface configuration if necessary for the network slice update).

In some aspects, manager application 14102 may initiate the procedure detailed in message sequence chart 14200 periodically according to a fixed period or on the occurrence of certain triggering conditions. For example, manager application 14102 may initiate 14202-14204 each time that terminal device 13602 attaches to radio communication network 14000 or each time terminal device 13602 performs a registration update (e.g., a TAU, periodic TAU or a similar procedure).

In some aspects, the optimization targets utilized by manager application 14102 to assign QoS classes to dedicated applications 14104-14106 (e.g., with an operator-defined QoS class mapping) may also change over time, such as if a battery power of terminal device 13602 falls below a predefined level, if a billing cost of terminal device 13602 exceeds a predefined level, if a user of terminal device 13602 selects a power or cost saving setting, etc. As such actions may adjust the optimization target, manager application 14102 may re-assign QoS classes based on the new optimization target and select a new service profile key based on the updated QoS requirements. Core infrastructure 14006 may then select a new network slice for terminal device 13602 based on the new service profile key. In this manner, terminal device 13602 may also react to optimization target changes by triggering selection to new network slices.

These aspects may therefore enable terminal device 13602 to switch between network slices depending on the QoS requirements of the applications of terminal device 13602. The use of optimization targets such as service, power consumption, and cost may also enable terminal device 13602 to utilize network slices that meet specific goals.

FIG. 143 shows method 14300 of performing radio communications in accordance with some aspects. As shown in FIG. 143, method 14300 includes selecting a service profile key that represents service requirements of one or more applications of a terminal device (14310), reporting the service profile key to a radio communication network (14320), wherein the radio communication network includes a plurality of network slices, and receiving a response that causes the terminal device to utilize a target network slice of the plurality of network slices (14330).

FIG. 144 shows method 14400 of performing radio communications in accordance with some aspects. As shown in FIG. 144, method 14400 includes receiving a service profile key from a terminal device that indicates service requirements of one or more applications of the terminal device (14410), selecting a target network slice from a plurality of network slices based on the service profile key (14420), wherein the plurality of network slices provide different service characteristics, and instructing the terminal device to utilize the target network slice to transfer data for the one or more applications (14430).

FIG. 145 shows method 14500 of performing radio communications in accordance with some aspects. As shown in FIG. 145, method 14500 includes identifying QoS class assignments of one or more applications of a terminal device (14510), selecting from a plurality of service profile keys to identify a service profile key that meets the QoS class assignments of the one or more applications (14520), reporting the service profile key to a radio communication network and receiving a response that identifies a target network slice (14530), and executing data transfer using the target network slice (14540). In some aspects, application processor 13712 may be configured to override the default QoS classifications of applications such as dedicated applications 14104-14106 when establishing data bearers. For example, in normal operation, an application may provide a QoS classification to the baseband modem when requesting a data connection (e.g., via an Attention (AT) command over an interface between the application processor and the baseband modem). The baseband modem can then request a data bearer (e.g., a dedicated data bearer) from the network with the QoS classification. The network may then make a decision as to whether to accept the QoS classification or to deny the QoS classification, which may assist in preventing applications from receiving dedicated bearers that have unnecessarily high QoS. The QoS classification provided by a given application may be preprogrammed by the application developer and consequently application developers may provide QoS classifications that are likely to be accepted by the network while still meeting the QoS requirements of the application on a functional level.

The QoS classification provided by a given application may therefore be the default QoS classification. In some aspects, application processor 13712 may override the default QoS classifications provided by applications when requesting data bearers, and utilize different QoS classifications.

For example, in some aspects application processor 13712 may utilize a mapping for QoS classification to applications that specifies a QoS classification (e.g., a QCI) for various applications. The mapping may be a table that provides a QoS classification based on application ID, where each application may have an application identifier (which may be OS-specific). When an application requests a data bearer, application processor 13712 may access the mapping with the application ID of the application, retrieve the QoS classification mapped to the application ID, and request a data bearer for the application with the QoS classification.

This functionality may be handled at a manager application of application processor 13712 such as manager application 14102. Manager application 14102 may therefore monitor data bearer requests originating from other applications of application processor 13712, such as dedicated applications 14104-14106. When manager application 14102 identifies a data bearer request from a given application, for example, dedicated application 14104, manager application 14102 may access the mapping with the application ID of dedicated application 14104 to retrieve the QoS classification mapped to the application of dedicated application 14104. Manager application 14102 may then provide a data bearer request to baseband modem 13706 (e.g., via an AT command that bridges the application-layer and protocol stack layers) with that requests a data bearer for dedicated application 14104 with the QoS classification. Baseband modem 13706 may then request the data bearer from radio communication network 13600, which may accept or deny the data bearer request (and may allocated a data bearer with a different QoS classification if the initial data bearer request is denied). After radio communication network 13600 decides on a QoS classification for the data bearer and establishes the data bearer, dedicated application 14104 may proceed to transmit and receive data on the data bearer.

In some aspects, the mapping that is used to override the default QoS classifications may be provided by a network operator, for example, the operator of radio communication network 13600. Radio communication network 13600 may therefore transmit the mapping to baseband modem 13706 (e.g., in the form of an Open Mobile Alliance (OMA) Managed Object (MO)), which may receive the mapping and provide the mapping to application processor 13712. Manager application 14102 may then store the mapping in an accessible location, e.g., a local memory of application processor 13712.

In some aspects, the QoS classifications of the mapping may be standardized QoS classification values, such as QCI mappings as standardized by the 3GPP in TS 23.203 or another type of RAT-specific QoS classification mapping. Accordingly, the mapping may map application IDs to standardized QoS classifications; however, applications may be mapped to different QoS classifications than the default QoS classification that the application is configured with. In some aspects, the QoS classifications of the mapping may be different from the standardized QoS classification values, and may be, for example, proprietary QoS classifications that are uniquely specified by the network operator.

In some aspects, the mapping of QoS classifications may depend on an optimization target. For example, as previously described, terminal device 13602 may operate with a service optimization target (e.g., optimized QoS), cost optimization target (e.g., the lowest cost service), or battery usage optimization target (e.g., the lowest battery power consumption), or a cost optimization target (e.g., the lowest cost). This target may be set by a user of terminal device 13602 (via user I/O), or may be triggered by manager application 14102 based on operating conditions of terminal device 13602 (e.g., low battery or poor radio conditions). In some aspects, manager application 14102 may request a mapping (via baseband modem 13706) that is specific to the optimization target, and radio communication network 13600 may accordingly provide a mapping that maps QoS classifications to applications depending on the optimization target. For example, a service-optimized mapping may map QoS classifications with higher-performance QoS properties to applications than a mapping that is not service optimized, while a battery usage-optimized mapping may map QoS classifications that are lower-performance and/or associated with lower power consumption to applications. Radio communication network 13600 may then provide a mapping based on the requested optimization target. Alternatively, in some aspects manager application 14102 may modify the mapping based on an optimization target, such as by selecting different QoS classifications than those originally specified in the mapping based on the optimization target (e.g., by selecting higher-performance QoS classifications than those specified in the mapping).

In some aspects, a user of terminal device 13602 may be able to manually define and/or modify the mapping. Accordingly, manager application 14102 may accept user input that can generate the mapping from scratch and/or modify an existing mapping (which may have been originally provided by radio communication network 13600). In some aspects, manager application 14102 may store multiple mappings, such as a network-provided mapping and a user-provided mapping. In some aspects, a network-provided mapping may take precedence over a user-provided mapping (e.g., manager application 14102 may utilize the network-provided mapping instead of the user-provided mapping), while in other aspects a user-provided mapping may take precedence over a network-provided mapping (e.g., manager application 14102 may utilize the user-provided mapping instead of the network-provided mapping).

4.2 QoS #2

In some aspects of this disclosure, an edge computing device may monitor user traffic to detect when a terminal device is accessing a data stream, access charging information for the terminal device to calculate a cost for accessing the data stream, and provide the calculated cost to the terminal device. Instead of or in addition to receiving charging information at a later time (e.g., a monthly bill or a notification when prepaid data allowance is depleted), the terminal device may receive charging information 'upfront' and enable a user of the terminal device to modify the data stream based on the charging information, such as to adjust the data stream in order to reduce charges. These aspects may therefore provide a mechanism to reduce costs and consequently improve user experience. These aspects may be used with power efficiency aspects described herein.

FIG. 146 shows an exemplary variation of radio communication network 13600 including edge computing server 14602, which may be an edge computing device such as an edge computing server placed between network access node 13610 and core network 13902 that is positioned to monitor data traffic on the 'user plane'. For example, in an LTE setting, edge computing server 14602 may be placed on the S1-U interface between network access node 13610 (e.g., an eNodeB) and an SGW of core network 13902. Edge computing devices may be similarly placed on user traffic interfaces in any type of radio communication network, where the user traffic interfaces may generally by backhaul interfaces for the radio access network that carry uplink and/or downlink data traffic. Furthermore, while FIG. 146 depicts edge computing server 14602 as interfacing with network access node 13610 (and thus able to tap user traffic from terminal devices connected to terminal device 13610), edge computing devices may also be placed further into the network (e.g., at deeper aggregation points for network access nodes) and accordingly may be able to tap user traffic from the terminal devices connected to multiple network access nodes. The placement of edge computing devices such as edge computing server 14602 may enable the edge computing devices to 'tap' user data traffic and provide a variety of services to terminal devices, including content caching (e.g., for popular videos or other multimedia), processing offloading, etc. Edge computing may therefore enable ultra-low latency services (due to the closer proximity to terminal devices), reduce processing load on terminal devices, and reduce signaling load over the core network.

In the setting of FIG. 146, edge computing server 14602 may be able to access data traffic originating and terminating at terminal devices connected to network access node 13610. As previously indicated, such data traffic may include user plane data traffic that is exchanged between terminal devices such as terminal device 13602 and external data networks 13904 and 13906. In addition to various other edge computing services, edge computing server 14602 may be configured to monitor uplink and downlink data traffic passing through network access node 13610 in order to detect active or scheduled data streams, such as a data stream being delivered or scheduled to be delivered to terminal device 13602. Edge computing server 14602 then be able to determine stream parameters, such as stream quality, bitrate, length, and/or duration, and may then calculate a stream cost. Edge computing server 14602 may then report the stream cost to terminal device 13602. A user of terminal device 13602 may therefore be able to receive the stream cost 'upfront' and may be able to modify the stream in order to adjust the stream cost. In contrast to implementations where users are provided with an accumulative bill at a later date (or notified when a prepaid data/voice plan has been depleted), these aspects may enable a user to reduce stream costs prior to initialization of or during delivery of a data stream.

FIG. 147 shows an exemplary internal configuration of edge computing server 14602, which may include packet inspection module 14702 and cost calculation module 14704. In some aspects, edge computing server 14602 may be implemented as a server that executes software-defined program code and provides various edge-computing services defined by the program code. In some aspects, packet inspection module 14702 and cost calculation module 14704 may be software modules defined as program code that edge computing server 14602 is configured to execute. Alternatively, in some aspects packet inspection module 14702 and cost calculation module 14704 may be separate processors that are each configured to execute separate software modules that define their respective functionalities. While the individual components of edge computing server 14602 are depicted separately in FIG. 147, this depiction serves to highlight the operation of edge computing server 14602 on a functional level; consequently, in some aspects one or more of the components of edge computing server 14602 may be integrated into a common hardware and/or software element. Additionally, the functionality detailed herein (in particular e.g., the formulas/equations, flow charts, and prose descriptions) may be readily embodied by skilled persons as program code that can be stored on a non-transitory computer readable medium and subsequently retrieved from the non-transitory computer readable medium and executed by a processor.

As previously indicated, edge computing server 14602 may be configured to monitor the backhaul interface between network access node 13610 and core network 13902 (which may be e.g., an S1-U interface in an LTE setting) in order to detect data streams of terminal devices connected to network access node 13610. Edge computing server 14602 may be perform packet inspection on data being transferred across the backhaul interface in order to detect data streams running through network access node 13610, which may be e.g., video/audio/image/multimedia streams (live or buffered), file downloads, browser and application traffic, realtime machine or device control signaling (e.g., autonomous cars, IoT device control), etc. Upon identifying a data stream being delivered to or from a terminal device, edge computing server 14602 may evaluate stream control signaling in order to determine stream parameters such as the length, duration, size, etc., of the data stream. Edge computing server 14602 may then retrieve charging information for the terminal device and calculate the cost of the stream. Edge computing server 14602 may then report the stream cost to the terminal device, which may enable a user of the terminal device (or autonomous application) to adjust the data stream based on the stream cost.

FIG. 148 shows message sequence chart 14800, which illustrates the operation of edge computing server 14602 according to some aspects. As shown in FIG. 148, terminal device 13602 may first schedule or initiate a data stream in 14802 by exchanging stream control signaling with an external data network such as data network 13904. As previously detailed, in some aspects 14532 may include terminal device 13602 establishing an end-to-end bearer with data network 13904 and initiating or scheduling active exchange of data over the end-to-end bearer. For example, terminal device 13602 (e.g., an application layer at application processor 13712) may exchange stream control signaling with data network 13904 in order to set up a data stream, such as control data that specifies parameters for exchange of e.g., video/audio/image/multimedia streams, file downloads, browser and application traffic, realtime machine or device control signaling. After terminal device 13602 and data network 13904 have agreed upon the stream parameters via exchange of such stream control signaling, terminal device 13602 and data network 13904 may begin exchanging traffic for the data stream over the end-to-end bearer. Although the following description may focus on an individual data stream, in some aspects terminal device 13602 may utilize the end-to-end bearer to exchange multiple separate data streams with data network 13904 (over the same or separate bearers) and may exchange various other data streams with other data networks (where each data stream may take the same or a different path through core network 13902).

Both the stream control signaling and the stream traffic may provide important information that details the data stream. Accordingly, edge computing server 14602 may monitor the backhaul interface between network access node 13610 and core network 13902 for stream data, including both stream control signaling and stream traffic, in order to detect planned or active data streams by terminal devices connected to network access node 13610. In particular, packet inspection module 14702 may perform packet inspection (e.g., Deep Packet Inspection (DPI)) on backhaul interface traffic by decoding data packets on the backhaul interface to determine whether any stream data (stream control signaling or stream traffic) is contained in the packets. Packet inspection module 14702 may decrypt data packets on the backhaul interface according to the specific protocols utilized on the backhaul interface in order to inspect the data contained in the packet. By inspecting the data packets, packet inspection module 14702 may monitor the data packets for stream control signaling and stream traffic in order to detect planned or active data streams. Packet inspection module 14702 may therefore perform the packet inspection by decrypting the data packets, inspecting contents of the data packets (e.g., with plaintext analysis or other operations), re-encrypting the data packets, and forwarding the data packets on the original path.

For example, in some aspects terminal device 13602 may transmit user-plane IP packets to data network 13904 in connection with a first data stream, where the IP packets may include both stream control signaling and stream traffic as payload data. In addition to the payload, terminal device 13602 may generate the IP packets with an IP header that identifies terminal device 13602 as the source and data network 13904 as the destination. Controller 13710 of terminal device 13602 may process the original IP packets according to the user-plane cellular radio access protocols (e.g., Packet Data Convergence Protocol (PDCP), Radio Link Control (RLC), Media Access Control (MAC), and PHY in an LTE setting) and transmit the resulting PHY data over a radio access connection with network access node 13610. Network access node 13610 may receive the transmitted data from terminal device 13602 and revert the cellular protocol stack processing to obtain the original IP packets.

Network access node 13610 may then utilize 'tunneling' protocols in order to transmit the IP packets through radio communication network 13600 (which may include a sequence of tunneling between network nodes of core network 13902) to a network gateway of core network 13902, which may route the IP packets to data network 13904. For example, in an LTE setting network access node 13610 may utilize GPRS Tunnel Protocol (GTP) to encapsulate the IP packets with a GTP tunnel header and to transmit the GTP packets to an SGW of core network 13902. The SGW may then examine the GTP tunnel header to identify a destination PGW, re-encapsulate the IP packets with a GTP tunnel header addressed to the destination PGW, and transmit the GTP packets to the PGW. The PGW may then remove the GTP tunnel header, read the IP header of the IP packet that identifies data network 13902 as the destination, and transmit the IP packet to data network 13902. Network access node 13610 and core network 13902 may similarly utilize tunneling in the reverse downlink direction. Each GTP tunnel header may include a GTP header that specifies a Tunnel Endpoint ID (TEID), which uniquely identifies the associated terminal device. Various other radio access technologies may similarly utilize tunneling protocols in order to govern transport of IP data across radio communication networks.

As edge computing server 14602 may sit on the backhaul interface of network access node 13610, edge computing server 14602 may obtain GTP packets that are being tunneled from network access node 13610 to core network 13902 (e.g., to an SGW of core network 13902 in an LTE setting). As indicated above, the GTP packets may contain a GTP tunnel header and IP packet. The GTP tunnel header may include a GTP header that identifies the associated terminal device, e.g., terminal device 13602, while the IP packet contains an IP header (identifying the source and destination IP addresses) and IP payload.

In some aspects, packet inspection module 14702 may therefore inspect the data packets on the backhaul interface in 14804 by reverting the tunneling protocol and inspecting the IP header and payload data. The IP header may identify the source and destination of the IP packets; accordingly, packet inspection module 14702 may be able to determine which terminal devices and data network are attached to each IP packet (in both the uplink and downlink directions). Packet inspection module 14702 may also be configured to analyze the payload data (e.g., using plaintext analysis) in order to determine the contents of the IP packets. By evaluating the payload data in 14804, packet inspection module 14702 may be able to identify stream control signaling and stream traffic associated with a particular data stream and may be able to determine various stream parameters of the data stream.

Accordingly, packet inspection module 14702 may detect the data stream from terminal device 13602 and data network 13904 in 14806. For example, in some aspects packet inspection module 14702 may identify stream control signaling, such as stream setup or stream maintenance information, in the payload data. Additionally or alternatively, in some aspects packet inspection module 14702 may identify stream traffic in the payload data. As each IP packet can contain information about the destination and source IP addresses, packet inspection module 14702 may be able to identify terminal device 13602 and data network 13904 as the endpoints of the data stream (where the destination and source of the IP packets may depend on whether the IP packet is an uplink or downlink packet). As each GTP packet can also contain a GTP header with a field (e.g., a TEID) that uniquely identifies the associated terminal device, packet inspection module 14702 may also be able to identify terminal device 13602 based on the GTP header.

As edge computing server 14602 may aim to calculate the cost of the data stream, in some aspects packet inspection module 14702 may identify certain stream parameters from the IP packets that are related to the stream cost in 14808. For example, packet inspection module 14702 may inspect the IP packets (which may contain stream control signaling or stream traffic) in order to identify one or more of a service tier, video codec, audio codec, destination/source/intermediate IP addresses, destination/source/intermediate MAC addresses, client device identity, client device type, content (e.g., audio, video, etc.) provider (e.g., an Over-The-Top (OTT) provider), operating system, browser type, media stream type, session protocol, transport protocol, media container, stream resolution/bitrate/quality (e.g., audio or video resolution), stream/file size/length, stream/file duration, etc. In some aspects, packet inspection module 14702 may identify such stream parameters by performing plain-text analysis on the IP headers and payload data. In some aspects, certain stream parameters may be explicitly specified in the IP headers and payload data while packet inspection module 14702 may infer other stream parameters, such as by estimating a duration or size of the data stream (e.g., based on historical streaming data, origin of stream, destination of stream, route through network, etc.), tracking frequently visited websites, popular content providers, etc., from the IP headers and payload data.

In some aspects, the stream parameters may depend on the type of stream. In some aspects, terminal device 13602 may initiate a data stream with data network 13902 in order to retrieve a video stream, e.g., where data network 13902 is a video server. As part of the initialization of the data stream, terminal device 13602 may transmit a Hypertext Transfer Protocol (HTTP) request to data network 13902. The HTTP request, which may be stream control signaling and embodied as IP payload data, may identify data network 13902 and specify a variety of stream parameters for the video stream (including any one or more of service tier, video codec, audio codec, destination/source/intermediate IP addresses, destination/source/intermediate MAC addresses, client device identity, client device type, content (e.g., audio, video, etc.) provider (e.g., an Over-The-Top (OTT) provider), operating system, browser type, media stream type, session protocol, transport protocol, media container, stream resolution/bitrate/quality (e.g., audio or video resolution), stream/file size/length, stream/file duration, etc.). Packet inspection module 14702 may detect the HTTP request during inspection of IP packets and may therefore detect the data stream. In some aspects, packet inspection module 14702 may additionally or alternatively detect stream traffic (after the video stream has started), which may also contain certain stream parameters, to detect the data stream. Packet inspection module 14702 may similarly detect a variety of different data streams and determine the related stream parameters using packet inspection.

After determining the stream parameters in 14808, packet inspection module 14702 may then provide the stream parameters to cost calculation module 14704, which may be responsible for calculating a stream cost based on the stream parameters. As indicated above, in some aspects the stream parameters may be indicative of the stream cost. For example, in an exemplary scenario terminal device 13602 may have a 'pay-as-you-go' subscription or contract where a user of terminal device 13602 is charged based on the amount of data used by terminal device 13602. Stream parameters such as bitrate/resolution, length/size, and duration may thus have a particularly large impact on stream cost. For example, data streams of large size, length, or duration may incur a larger cost to a user as they inherently consume more data. If a data stream is live, such as a live television stream, the cost of the stream may directly depend on the stream bitrate/resolution and the duration of time that a user accesses the data stream. Additionally, users may need to pay more (per bit) for higher-quality streams or may need to pay more (per bit) for streams provided by certain providers. Furthermore, certain types of streams, such as an audio stream vs. a video stream, may also incur different costs (per bit).

Other billing agreements such as prepaid plans may also be relevant to some aspects. For example, a user may prepay for a certain amount of data or may be allotted a certain amount of data as part of an ongoing subscription (e.g., monthly bills that are paid after). The user may then consume the allotted data at a rate according to the stream parameters, where higher quality, larger size, and longer duration streams may incur larger deductions from the allotted data. These aspects may therefore be applicable to any type of billing agreement.

Cost calculation module 14702 may be responsible for calculating the stream cost (which may be an exact cost or an estimation). As different billing agreements can have different cost parameters (e.g., a different price per kilobit/megabit/gigabit of data, different prices for different qualities, different prices for different stream types, etc.), cost calculation module 14702 may access the charging information for terminal device 13602 in order to calculate the stream cost. In some aspects, the charging information for terminal device 13602 may be stored at charging server 14604, which may be located in core network 13902 as shown in FIG. 146 (charging server 14604 may be in a different core network if terminal device 13602 is roaming). For example, in an LTE setting, charging server 14604 may be a server entity that is configured to perform LTE Policy Charging and Control (PCC), which can include Policy and Charging Rules Function (PCRF, which provides policy control and flow based charging control decisions), Policy and Charging Enforcement Function (PCEF, implemented in the SGW and enforces gating and QoS for individual IP flows on the behalf of the PCRF; also provides usage measurements to support charging), Online Charging System (OCS, provides credit management and grants credit to the PCEF based on time, traffic volume or chargeable events), or Offline Charging System (OFCS, receives events from the PCEF and generates charging data records (CDRs) for the billing system). In some aspects, charging server 14604 may be or may be part of a Business Support System (BSS). Other radio access technologies may similarly have charging functions that charging server may assume.

Regardless of radio access technology specifics, charging server 14604 may be a server that stores charging information for terminal device 13602. As noted above, if terminal device 13602 is roaming, charging server 14604 may be located external to core network 13902, e.g., in a core network of the 'home' radio communication network of terminal device 13602.

Cost calculation module 14704 may therefore query charging server 14604 in 14810 for charging information for terminal device 13602. Charging server 14604 may receive the charging information query, access a database containing charging information for various terminal devices, retrieve the charging information for terminal device 13602, and respond to the query in 14812 by providing the charging information for terminal device 13602 to cost calculation module 14704. Edge computing server 14602 may utilize a software-level connection with charging server 14604 in order to request and receive the charging information in 14810-14812, such as a Diameter or Radius protocol that may be implemented in radio communication network 13600 that allows that various nodes to communicate with each other over the various inter-node interfaces.

In some aspects, the charging information may include subscriber plan and available data allowance information that may detail the specific charging rates for certain types of streams (that may vary based on any one or more of the stream parameters introduced above). Cost calculation module 14704 may calculate the stream cost in 14814 based on the charging information provided by charging server 14604 and the stream parameters identified by packet inspection module 14702. For example, if the stream is fixed in size or duration (which may be indicated by the stream parameters identified by packet inspection module 14702), such as a video or audio stream of finite duration or a file of finite size, cost calculation module 14814 may utilize the charging information and stream parameters to calculate the fixed cost of the stream. Alternatively, if the stream has floating size or duration, such as a live stream, cost calculation module 14704 may utilize the charging information and stream parameters to calculate the stream cost as a floating cost, such as cost per second, cost per minute, etc. Cost calculation module 14704 may thus calculate stream cost information in 14814 that indicates a cost of the data stream. In some aspects, cost calculation module 14704 can also calculate stream cost information in 14814 based on competitive factors, such as the actual or estimated cost of the stream as provided by a competitor network. In some aspects, cost calculation module 14704 can may also interface with charging server 14604 to negotiate the cost of the stream, such as with a counter-offer feature. Cost calculation module 14704 and charging server 14604 may then work to match or beat competing offers from other networks and allow users (e.g., of terminal device 13602) to make counter offers.

As shown in FIG. 148, cost calculation module 14704 may then provide the stream cost information to terminal device 13602 in 14816. The delivery method of the stream cost information by edge computing server 14602 may depend on the specific interface between terminal device 13602 and edge computing server 14602. For example, in some aspects where edge computing server 14602 and terminal device 13602 have a direct software-level connection for exchanging data at the cellular protocol stack layers, edge computing server 14602 may provide the stream cost information to terminal device 13602 over the software-level connection. However, in many edge computing implementations, MEC servers may be substantially 'transparent' to terminal devices at the cellular level and therefore may not have a direct software-level connection to terminal devices at the cellular protocol stack layers. Accordingly, in some aspects edge computing server 14602 may utilize a higher-layer mechanism to deliver the stream cost information to terminal device 13602 in 14816. For example, edge computing server 14602 may utilize Short Message Service (SMS) messaging to provide the stream cost information to terminal device 13602. In this case, edge computing server 14602 may open a connection to an SMS server (e.g., a SMS Center (SMSC) in an LTE setting) in core network 13902 and transmit an SMS to terminal device 13602 via the SMS server that specifies the stream cost information. Terminal device 13602 may then receive the SMS and present the SMS contents including the stream cost information to a user. Alternatively, in some aspects edge computing server 14602 may provide the stream cost information to terminal device 13602 using an application-layer mechanism, such as a push notification or in-app message. For example, edge computing server 14602 may have a software-level connection at the application-layer with application processor 13712 and may deliver the stream cost information to application processor 13712 as e.g., a push notification or in-app message. The push notification or in-app message may be for an application specifically dedicated to user billing, e.g., a dedicated billing application, or may be an in-app message for an application that is using the data stream, e.g., a dedicated streaming application. For example, if a user of terminal device 13602 is using a video watching application (executed at application processor 13712; e.g., a YouTube mobile application), edge computing server 14602 may deliver the stream cost information to terminal device 13602 as a push notification or in-app message to the video watching application (e.g., over an application layer connection between edge computing server 14602 and application processor 13712). Regardless, cost calculation module 14704 may provide the stream cost information to terminal device 13602 in 14816.

Accordingly, some aspects may enable delivery of 'upfront' stream cost information to a user, e.g., either during an active stream or prior to a scheduled stream (e.g., depending on when packet inspection module 14702 detects the data stream in 14806). The user of terminal device 13602 may then be able to decide in real-time whether to continue the data stream, cancel the data stream, or modify the data stream in 14818 based on the stream cost information provided by edge computing server 14602. For example, terminal device 13602 may present a user with an SMS message from edge computing server 14602 that specifies the stream cost information. Alternatively, in some aspects terminal device 13602 may present the stream cost information provided by edge computing server 14602 to a user via a dedicated billing application or dedicated streaming application. The user may then be able to evaluate the stream cost information and decide how to proceed in 14818. For example, if the user decides that the cost of the data stream is too expensive, the user may cancel the stream via user input to terminal device 13602. If the user decides that the data stream is not too expensive, the user may not cancel the stream and may passively allow the data stream to continue.

In some aspects, the user may also be able to modify the data stream in order to adjust the cost. Such functionality may rely on cooperation from the provider of the data stream. For example, if the user decides that the data stream is too expensive, the user may provide user input that requests a cost reduction. The cost reduction may be e.g., a reduction in quality/resolution/bitrate, a reduction in stream duration, etc. For example, if the data stream is fixed in size/duration/length, the stream cost information provided by edge computing server 14602 may be a fixed stream cost. The user may then request a cost reduction (via user input to terminal device 13602 at the application layer) from the provider (e.g., at data network 13904), in response to which the provider may reduce the quality/resolution/bitrate of the data stream. Such may reduce the data transferred on a bit-level and consequently reduce the cost of the stream. Alternatively, in some aspects where the data stream is floating in size/duration/length, e.g., a live or realtime stream, the stream cost information provided by edge computing server 14602 may be a floating cost, e.g., a cost per minute (or other measure of time). The user may then request a cost reduction (via user input to terminal device 13602 at the application layer) from the provider, in response to which the provider may reduce the quality/resolution/bitrate of the data stream. Such may reduce the data transferred over time and may consequently reduce the cost of the stream per time. Alternatively, in some aspects, the user may be able to specify (via user input) a specific cost that the user is willing to pay. Terminal device 13602 may then execute the data stream until the cost has reached the cost specified by the user. Alternative to user input cases, an application at application processor 13712 of terminal device 13602 may automatically handle cost reduction requests in 14818, e.g., using a set of rules, etc., or making a suggestion to the user, e.g., based on a set of rules, etc. For example, application processor 13712 may utilize a set of rules (e.g., embodied as executable instructions) to determine when to trigger a cost reduction request and to determine the specifics of the cost reduction request. In some aspects, application processor 13712 may trigger suggestions to the user based on the set of rules, such as by determining when a cost reduction request should be triggered, and wait for user input to confirm or deny the cost reduction request before actually sending the cost reduction request. In some aspects, application processor 13712 can perform such decisions in a fully autonomous manner (e.g., with no input from a user) or in a semi-autonomous (or hybrid) manner (e.g., where a user provides some input regarding the cost reduction).

In some aspects, cost reduction measures arising from stream modification requests may depend on the provider of the data stream. For example, certain providers may provide the functionality to modify the data stream (e.g., by modifying bitrate/quality/resolution, such as offering a stream in High Definition (HD) and non-HD) while other providers may not provide such functionality. In some aspects where the provider does not provide stream modification functionality, a user of terminal device 13602 may instead be able to cancel or passively allow the data stream, such as by terminating the data stream with the streaming application that is using the data stream. Additionally or alternatively, in some aspects edge computing server 14602 may provide functionality to modify a data stream. For example, edge computing server 14602 may be able to reduce the quality/bitrate/resolution of a data stream in the downlink direction (e.g., by decrypting the packets of the data stream, processing the data packets to reduce the quality/bitrate/resolution, and forwarding the processed data packets on the interface to terminal device 13602 instead of the original data stream). Terminal device 13602 may be configured to request such functionality from edge computing server 14602.

In some aspects, terminal device 13602 may modify the data stream in order to adjust stream cost using network slices. Specifically, instead of modifying the data stream at the provider (e.g., data network 13904) or with edge computing server 14602, in some aspects radio communication network 13600 may transfer the network bearer supporting the data stream onto a network slice with different parameters. For example, a first network slice of radio communication network 13600 may be configured with resources that result in high quality/bitrate/resolution data streams while a second network slice of radio communication network 13600 may be configured with resources that result in lower quality/bitrate/resolution data streams. If terminal device 13602 is initially receiving the data stream over the first network slice and a user of terminal device 13602 wishes to e.g., reduce the cost of the data stream, terminal device 13602 may request or trigger a network slice change, such as with a network slice control entity of core infrastructure 14006. Core infrastructure 14006 may then transfer the network bearer (thus also modifying the overlaying end-to-end bearer) from the first network slice to the second network slice and may consequently reduce the cost of the data stream. Alternatively, in some aspects terminal device 13602 may be charged higher rates for data transfer on certain network slices for other reasons (such as where certain network slices have higher priority, reliability, latency, etc.); accordingly, terminal device 13602 may reduce the stream cost by requesting to transfer the network bearer for the data stream to a less-expensive network slice. Core infrastructure 14006 may then transfer the network bearer to the less expensive network slice, which may reduce the stream cost to terminal device 13602.

In some aspects, instead of calculating a single stream cost (fixed cost or floating cost over time) to provide to terminal device 13602, cost calculation module 14704 may calculate several different costs that are each based on different stream parameters (e.g., different quality/bitrate/resolution, different duration, etc.) in 14814 and provide the different costs and associated stream parameters to terminal device 13602 in 14816. A user of terminal device 13602 may then be able to consider the different costs and stream parameters and select an appropriate version of the data stream (defined by the stream parameters). The provider (e.g., data network 13904) may then provide the selected version of the data stream to terminal device 13602 (or edge computing server 14602 may process the stream to provide the selected version).

In some aspects, edge computing server 14602 may be the provider of the data stream. For example, edge computing server 14602 may perform multimedia delivery or caching functions, such as storing popular multimedia at the network edge for ultra-low latency delivery to terminal devices. Edge computing server 14602 may then perform the same functions detailed in FIG. 148 in addition to modifying the data stream based on any decisions by terminal device 13602 (if any).

In some aspects, the placement of edge computing server 14602 within radio communication network 13600 may be flexible. For example, the functionality of edge computing server 14602 detailed above may be placed at network access node 13610 or at a network gateway (such as an SGW) of core network 13900. Various other placements of edge computing server 14602 where edge computing server 14602 is able to tap user plane traffic on various different interfaces within radio communication network 13600 are also within the scope of this disclosure.

These aspects may therefore provide a mechanism for terminal devices to receive upfront stream cost information for data streams. Instead of or in addition to receiving a bill at a later time or a notification that a prepaid allowance has been depleted, these aspects may provide users with stream cost information that indicates e.g., fixed stream costs and floating per-bit costs of streams. These aspects may enable users to make dynamic decisions (e.g., whether to continue with a data stream, to cancel a data stream, or to modify a data stream) based on the stream cost information, which may reduce costs to users and improve user experience.

FIG. 149 shows method 14900 of managing a data stream in accordance with some aspects. As shown in FIG. 149, method 14900 includes performing packet inspection on a backhaul interface for a radio access network (14910), detecting a data stream for a terminal device based on the packet inspection and identifying one or more stream parameters of the first data stream based on the packet inspection (14920), determining a stream cost for the first data stream based on the one or more stream parameters (14930), and providing the stream cost to the terminal device (14940).

FIG. 150 shows method 15000 of managing a data stream in accordance with some aspects. As shown in FIG. 150, method 15000 includes performing packet inspection on a backhaul interface for a radio access network to detect a data stream of a first terminal device (15010), receiving charging information for the terminal device from a charging server (15020), calculating a stream cost of the terminal device based on the charging information and one or more parameters of the data stream (15030), and providing the stream cost to the terminal device (15040).

4.3 QoS #3

In some aspects of this disclosure, a terminal device may modify or optimize services (e.g., voice, SMS, IP data, IP messaging, push notifications, etc.) provided by a network in order to ensure that battery power is sufficient to support certain priority services for an extended duration of time. For example, in an exemplary use scenario, a user may be expecting a voice call in the next two hours. The user may therefore indicate to a terminal device that voice service is a priority service and that the priority service period is two hours. In some aspects, the terminal device may interact with the radio communication network in order that voice services are enabled while other non-priority services (such as SMS, IP data, IP messaging, push notifications, etc.) are suspended or limited over the priority service period. By suspending or limiting the non-priority services, the terminal device may conserve battery power and may instead dedicate battery power to voice services, e.g., the priority service, over the two-hour priority service period. The terminal device may therefore improve the likelihood that there will be sufficient battery power to receive the call at any point during the two-hour priority service period. As will be detailed, these aspects may be applied in a variety of similar scenarios to ensure that a terminal device has sufficient battery power to execute priority services over a priority service period. These aspects may be used with power efficiency aspects described herein FIG. 151 shows an exemplary internal configuration of terminal device 13602 in accordance with some aspects. As shown in FIG. 151, terminal device 13602 may include antenna system 13702, RF transceiver 13704, physical layer processing module 13708, processing module 15102, and power supply 13716. Antenna system 13702, RF transceiver 13704, physical layer processing module 13708, and power supply 13716 may each be configured in the manner detailed above regarding FIG. 137. Processing module 15102 may be implemented as a hardware-defined and/or software-defined module. In some aspects, processing module 15102 may be include baseband modem and/or application processor components, and may in some aspects include controller 13710 and application processor 13712. In some aspects, in addition to the functionality detailed herein these aspects, processing module 15102 may also perform the functionality of controller 13710 and application processor 13712. In some aspects, processing module 15102 may be integrated with physical layer processing module 13708, such as where controller 13710 of processing module 15102 may be implemented in a baseband modem with physical layer processing module 13708.

As previously indicated, terminal device 13602 may be configured to identify scenarios where low battery power may prevent terminal device 13602 from performing certain services. Terminal device 13602 may then identify priority services that should be maintained and non-priority services that can be suspended or limited. Terminal device 13602 may additionally identify a priority service period during which terminal device 13602 wishes to ensure that the priority services are available.

In some aspects, terminal device 13602 may aim to ensure that there is sufficient battery power to perform the priority services over the priority service period. Accordingly, terminal device 13602 may rely on cooperation from the radio communication network in order to ensure that the priority services are maintained and that the non-priority services are suspended or limited. Accordingly, terminal device 13602 may report the priority information, including the priority services and priority service period, to a network access node, e.g., network access node 13610 of FIG. 136. Network access node 13610 may then be responsible for continuing to execute the priority services and to suspend or limit the non-priority services for the duration of the priority service period. Terminal device 13602 may therefore avoid using battery power on the non-priority services for the duration of the priority service period and may instead dedicate the remaining battery power to the priority services. In some aspects, this may assist terminal device 13602 in executing the priority services, such as in the case introduced above where terminal device 13602 needs to receive a call in the near future.

FIG. 152 shows message sequence chart 15200 in accordance with some aspects. As shown in FIG. 152, these aspects may involve cooperation between terminal device 13602 and network access node 13610 in order to maintain priority services and suspend or limit non-priority services. Terminal device 13602 may implement these aspects at processing module 15102. In some aspects, processing module 15102 may be configured to retrieve and execute software-defined program code that when executed by processing module 15102 controls terminal device 13602 to perform the functionality detailed herein. In some aspects, processing module 15102 may utilize RF transceiver 13704, and antenna system 13702 to transmit and receive radio signal with network access node 13610. On the network side, control module 13810 may be configured with software-defined program code that when executed by control module 13810 controls network access node 13610 to perform the functionality detailed herein.

As shown in FIG. 152, processing module 15102 may first trigger service prioritization in 15202. In some aspects, processing module 15102 may trigger the service prioritization in 15202 in response to various different trigger scenarios, which may include user-initiated triggers and/or battery power-initiated triggers. For example, a user of terminal device 13602 may trigger the service prioritization in 15202 by specifying one or more priority services optionally in addition to a priority service period. In particular, in some aspects a user may specify one or more priority services, such as voice services, SMS services, IP data services, IP messaging services, push notification services, etc., via user input to terminal device 13602 (e.g., via key input, touchscreen input, button input, etc., which may interface with application processor 13712). In some aspects, the user may also specify a priority service period, in other words, a time period during which the priority services should be maintained. In some aspects, the user may provide the user input at the application layer of terminal device 13602, such as at a settings application provided by processing module 15102.

Processing module 15102 may recognize such user input and trigger service prioritization based on the user input in 15202. For example, a user of terminal device 13602 may be expecting a voice call within the next two hours. The user may therefore specify to processing module 15102 that voice services are a priority for the next two hours. Upon receipt of such user input, processing module 15102 may trigger service prioritization in 15202. There may be a variety of similar use scenarios based on user-initiated triggering. For example, a user may wish to place an outgoing voice call in the next two hours, may need to utilize a specific application (e.g., an email application) in the next three hours, may need to view a certain multimedia stream (e.g., a live video feed) in the next four hours, may be expecting an SMS in the next two hours, may wish to send an SMS in the next three hours, etc. All variations of priority services and priority service periods are within the scope of this disclosure. Additionally, in some aspects a user may also specify multiple services that should be prioritized.

After triggering service prioritization in 15202, processing module 15102 may identify priority services and non-priority services in 15204. Processing module 15102 may identify each service received by user input as a priority service and may identify the remaining services (if any) as non-priority services, or may use a set of rules, which may be defined by a user, and which may be context-sensitive, e.g., setting service priorities during a meeting. Accordingly, in the exemplary use scenario introduced above, processing module 15102 may identify voice service as a priority service and may identify SMS services, IP data services, IP messaging services, push notification services, etc., as non-priority services in 15204. Alternatively, instead of identifying all remaining services as non-priority services, processing module 15102 may evaluate the remaining battery power of power supply 13716 and determine which (if any) of the remaining services should be disabled in order to ensure that terminal device 13602 has sufficient battery power to support the priority services. Processing module 15102 may therefore be configured to identify the non-priority services based on the remaining battery power level.

Processing module 15102 may then determine the priority service period in 15206. As indicated above, in some aspects a user of terminal device 13602 may specify (via user input) a duration of time during which the priority services should be available. Processing module 15102 may utilize this duration of time as the priority service period. If the user does not specify a duration of time, in some aspects processing module 15102 may determine that the priority service period is indefinite. If the user does not specify a duration of time, in some aspects processing module 15102 may select a 'default' priority service period, which may be any duration such as one hour, two hours, etc.

Processing module 15102 may therefore identify one or more priority services, non-priority services, and a service priority period during which the priority services should be maintained. Although shown sequentially in FIG. 152, processing module 15102 may also determine the priority service period in 15206 and determine which network services should be disabled as non-priority services in order to ensure that terminal device 13602 has sufficient battery power to operate the priority services for the duration of the priority service period. For example, in some aspects processing module 15102 may be aware of the power consumption of the network services and, based on the priority service period, may be configured to determine which network services can remain active during the priority service period (to increase the likelihood that there is sufficient battery power for the priority services) and which network services will be interrupted during the priority service period. Processing module 15102 may therefore identify the non-priority services based on the remaining battery power of power supply 13716 in addition to the power consumption attributes of the network services.

Processing module 15102 may then report the priority service information (the priority services, non-priority services, and priority service period, where the priority service period may be a definite time period or may be indefinite) to network access node 13610 in 15208. As previously indicated, processing module 15102 may transmit the priority service information to network access node 13610 with physical layer processing module 13708, RF transceiver 13704, and antenna system 13702 via a radio access connection.

Control module 13810 of network access node 13610 may receive the priority service information (via antenna system 13802, radio module 13804, and physical layer module 13808) in 15208. As the priority service information indicates one or more priority services that terminal device 13602 is requested be maintained for the duration of the priority service period and one or more non-priority services that do not need to be maintained for the duration of the priority service period, in some aspects control module 13810 may then suspend or limit the non-priority services in 15210 for the priority service period. Control module 13810 may continue to execute the priority services in 15212. As the non-priority services have been suspended or limited by network access node 13610, in some aspects processing module 15102 may interrupt the non-priority services for the duration of the priority service period, which may include interrupting reception of non-priority service data or only receiving limited non-priority service data. After the priority service period expires in 15214, processing module 15102 and control module 13810 may continue executing non-priority services along with priority services in 15214. Furthermore, instead of explicitly specifying the non-priority services in the priority service information in 15208, in some aspects processing module 15102 may explicitly specify the priority services without explicitly specifying the non-priority services. Control module 13810 may then identify the priority services that are explicitly specified and may infer that some or all other services are non-priority services. Alternatively, in some aspects processing module 15102 may explicitly specific the non-priority services without explicitly specifying the priority services in the priority service information. In any case, control module 13810 may identify the priority services and the non-priority services based on the priority service information in 15208.

In order to suspend/limit non-priority services in 15210 and continue executing priority services in 15212, control module 13810 may identify data arriving at network access node 13610 (e.g., from core network 13902 as shown in FIG. 139) that is addressed to terminal device 13602 and associated with the priority services and to identify data arriving at network access node 13610 that is addressed to terminal device 13602 and associated with the non-priority services. Control module 13810 may then allow the priority service data to pass through network access node 13610 (by transmitting the priority service data to terminal device 13602, thus executing priority services in 15212) while preventing or limiting the non-priority service data (thus suspending/limiting non-priority services in 15210).

In some aspects, control module 13810 may filter incoming data packets addressed to terminal device 13602 in 15210 and 15212 to identify priority service data and non-priority service data. For example, each priority service may be associated with a QoS class, where voice traffic, SMS traffic, IP data traffic, IP messaging traffic, push notifications, etc., may each have different QoS classes. In some aspects, processing module 15102 may specify the QoS classes along with the priority service information in 15208. Alternatively, in some aspects control module 13810 may be able to determine the QoS classes for the priority service data and non-priority service data based on a predefined and/or standardized relationship (such as QCI mappings for different traffic types in an LTE setting) between communication service types and QoS classes. Control module 13810 may therefore be able to determine the QoS classes for the priority service data and the QoS classes for the non-priority service data. Control module 13810 may then compare the QoS class for incoming data to the priority service QoS classes and the non-priority service QoS classes to determine which data is priority service data and which data is non-priority service data.

As terminal device 13602 has requested that priority services be maintained for the duration of the priority service period, control module 13810 may route the priority service data to terminal device 13602 over the radio access network in 15212. In order to conserve battery power at terminal device 13602 for the duration of the priority service period, in some aspects control module 13810 may suspend or limit non-priority service data in 15210 during the duration of the priority service period. For example, control module 13810 may suspend non-priority service data by 'buffering' identified non-priority service data at network access node 13610. Accordingly, control module 13810 may hold the non-priority service data for the duration of the priority service period and thus may not route the non-priority service data to terminal device 13602. As terminal device 13602 may not receive the non-priority service data for the duration of the priority service period, terminal device 13602 may not expend battery power receiving non-priority service data and may therefore conserve battery power to receive priority service data (e.g., in 15212). After the priority service period has expired in 15210, control module 13810 may retrieve the buffered non-priority service data and route the non-priority service data to terminal device 13602 over the radio access connection.

In some aspects, control module 13810 may additionally or alternatively limit the non-priority services in 15210 for the duration of the priority service period. Instead of completely suspending non-priority service data, control module 13810 may instead route limited non-priority service data to terminal device 13602, where the limited non-priority service data may be reduced in size or delayed. For example, instead of immediately routing non-priority service data to terminal device 13602 as in typical scheduling operations, control module 13810 may buffer incoming non-priority service data (addressed to terminal device 13602) until there is a sizable amount of buffered non-priority service data (e.g., the amount of buffered non-priority service data exceeds a threshold). Control module 13810 may then route the buffered non-priority service data to terminal device 13602 for the duration of the priority service period. As the buffered non-priority service data has been delayed, it may be considered 'limited'. However, in some aspects it may be more power efficient for terminal device 13602 to receive a limited number of condensed 'bursts' of non-priority service data than to receive a constant stream of sporadic non-priority service data. After the priority service period has expired in 15214, control module 13810 may stop limited non-priority service data and may route the non-priority service data to terminal device 13602 as it arrives according to typical scheduling.

In some aspects, control module 13810 may buffer non-priority service data for the duration of the priority service period and may transmit a limited amount of data to terminal device 13602 in place of the non-priority service data. For example, control module 13810 may transmit a notification to terminal device 13602 (not explicitly shown in FIG. 152) that specifies that non-priority service data is waiting for terminal device 13602, where the notification may also identify the type and/or source of the non-priority service data. Processing module 15102 of terminal device 13602 may then receive the notification and decide whether or not to receive the non-priority service data. For example, processing module 15102 may check the remaining battery power of power supply 13716 and determine whether there is sufficient remaining battery power (e.g., that will be sufficient to support priority services for the duration of the priority service period) to receive the non-priority service data. In some aspects, processing module 15102 may also consider the importance of the non-priority service data indicated by network access node 13610. If processing module 15102 decides to receive the non-priority service data, processing module 15102 may transmit a positive response to network access node 13610 that instructs network access node 13610 to transmit the non-priority service data. Controller 13810 may then receive the response and transmit the non-priority service data (for the duration of the priority service period). If processing module 15102 decides not to receive the non-priority service data, processing module 15102 may transmit a negative response to network access node 13610 that instructs network access node 13610 not to transmit the non-priority service data.

Control module 13810 may therefore suspend or limit non-priority services in 15210 for the duration of the priority service period. As detailed above, control module 13810 may have several different options that may be used to suspend or limit non-priority service data. Control module 13810 may apply the same suspending/limiting procedure to all incoming non-priority service data (addressed to terminal device 13602) or may apply different suspending/limiting procedures to different incoming non-priority service data (addressed to terminal device 13602), such as by suspending some non-priority service data and limiting other non-priority service data (e.g., based on the type or source of the non-priority service data).

As shown in FIG. 152, control module 13810 may continue executing priority services with terminal device 13602 in 15212 and may therefore continue routing incoming priority service data (addressed to terminal device 13602) to terminal device 13602 for the duration of the priority service period. After the priority service period has expired, control module 13810 may resume execution of non-priority services by routing incoming non-priority service data to terminal device 13602 (without suspension or limiting) along with priority service data.

The priority and non-priority services detailed in the exemplary scenario detailed above regarding FIG. 152 may be considered 'network' services, e.g., services that rely on an online network connection. As these network services are therefore supported by network access node 13610, terminal device 13602 may rely on cooperation from network access node 13610 to suspend or limit the non-priority services. For example, if terminal device 13602 ignored the non-priority services without notifying network access node 13610, terminal device 13602 may miss the non-priority service data. Terminal device 13602 may therefore notify network access node 13610 of the non-priority services in order to enable network access node 13610 to 'buffer' or 'hold' the non-priority service data and subsequently deliver the non-priority service data at a later time, such as after expiry of the priority service period.

In some aspects, terminal device 13602 may also utilize 'local' services as the priority services, which may be 'offline' services that do not rely on a network connection. For example, a user of terminal device 13602 may wish to conserve battery power at terminal device 13602 in order to utilize a local service, such as an application executed at application processor 13712. In order to conserve battery power to dedicate to the local service, terminal device 13602 may aim to suspend or limit non-priority network services while locally performing the priority local services (which may not rely on a network connection via network access node 13610). FIG. 153 shows message sequence chart 15300 illustrating this procedure. Similar to message sequence chart 15200, processing module 15102 may trigger service prioritization in 15302, which may be prompted by user input. For example, a user of terminal device 13602 may indicate that a local service such as a locally executed application is a priority service. In some aspects, the user may also indicate a time period during which the user wishes to ensure that terminal device 13602 has sufficient battery power to continue operating the local priority service.

Processing module 15102 may then identify priority services and non-priority services in 15304. In particular, processing module 15102 may identify the local service specified by the user as a priority service. Processing module 15102 may then identify some or all network services as non-priority services. For example, in some aspects processing module 15102 may be configured to identify all network services as non-priority services. In some aspects, processing module 15102 may be configured to evaluate the remaining battery power of power supply 13716 and determine which network services should be disabled as non-priority services in order to ensure that terminal device 13602 retains sufficient battery power to operate the priority services.

Processing module 15102 may then determine the priority service period in 15306, which may be, for example, based on a user input or a default priority service period. Although shown sequentially in FIG. 153, in some aspects processing module 15102 may determine the priority service period in 15306 and determine which network services should be disabled as non-priority services in order to increase the likelihood that terminal device 13602 has sufficient battery power to operate the priority services for the duration of the priority service period. For example, processing module 15102 may be aware of the power consumption of the network services and, based on the priority service period, may be configured to determine which network services can remain active during the priority service period (to ensure that there is sufficient battery power for the priority services) and which network services should be interrupted during the priority service period. In some aspects, processing module 15102 may therefore identify the non-priority services based on the remaining battery power of power supply 13716 in addition to the power consumption attributes of the network services.

Processing module 15102 may then report the priority service information to network access node 13610 in 15308. As the priority services may only be local services and the non-priority services may only be network services, processing module 15102 may only report the non-priority services (in addition to the priority service period) to network access node 13610 in 15308. Control module 13810 may then suspend or limit non-priority services in 15310 for the duration of the priority service period. As the priority services may be local services, processing module 15102 may locally execute the priority services in 15312. As the non-priority services have been suspended or limited by network access node 13610, processing module 15102 may interrupt the non-priority services for the duration of the priority service period, which may include interrupting reception of non-priority service data or only receiving limited non-priority service data. After the priority service period expires, control module 13810 may resume the non-priority services in 15314. Terminal device 13602 may therefore also utilize local 'offline' services as priority services and, with cooperation from network access node 13610, may suspend or limit non-priority services in order to conserve battery power for operation of local services.

In the exemplary scenarios of FIGS. 152 and 153, control module 13810 may utilize a timer to define the priority service period. In other aspects, the priority service period may be based on location or movement parameters, For example, processing module 15102 may provide the service priority period (e.g., as provided by a user of terminal device 13602) with the priority service information in 15408. In some aspects, control module 13810 of network access node 13610 may start a timer at 15210 or 15310 when non-priority services are suspended/limited, where the timer is set to run for the duration of the priority service period. Control module 13810 may then suspend/limit priority services for the duration of the timer and, upon timer expiry in 15214 or 15314, resume execution of the non-priority services in 15214 or 15314.

In some aspects, processing module 15102 may be configured to prematurely terminate service prioritization, e.g., prior to the priority service period expiring. FIG. 154 shows an exemplary scenario in message sequence chart 15400 where processing module 15102 may prematurely terminate service prioritization. Processing module 15102 and control module 13810 may perform 15402-15412 in the same manner as 15202-15212 of FIG. 152. Accordingly, control module 13810 may start a timer at 15410 to track the priority service period, during which control module 13810 will suspend/limit non-priority services in 15410 and execute priority services in 15412. However, prior to expiry of the timer, processing module 15102 may terminate service prioritization in 15414 by transmitting a notification to network access node 13610 that instructs network access node 13610 to terminate service prioritization. Control module 13810 may therefore stop suspending/limiting non-priority service data and may resume routing non-priority service data to terminal device 13602 along with priority service data in 15416.

Processing module 15102 may terminate service prioritization in 15414 based on user input or automatically. For example, a user of terminal device 13602 may provide user input that service prioritization should be disabled. Further to the example, a user of terminal device 13602 that triggered service prioritization in order to e.g., conserve battery power to receive a voice call (or another priority service) may receive the voice call. Accordingly, the user may no longer need service prioritization and may provide user input to processing module 15102 that instructs processing module 15102 to terminate service prioritization. In an alternative example, processing module 15102 may detect that the priority service (e.g., indicated by user input in 15402) has been received from network access node 13610 and may automatically terminate service prioritization in 15414. In another alternative example, a user of terminal device 13602 may plug terminal device 13602 into a charging supply, which may alleviate the need to conserve battery power through service prioritization. The user may then provide user input to processing module 15102 that instructs processing module 15102 to terminate service prioritization; alternatively, processing module 15102 may automatically detect that power supply 13716 is being charged and may automatically terminate service prioritization. In some aspects, processing module 15102 may then reengage service prioritization if terminal device 13602 is subsequently unplugged from the charging supply.

In some aspects, processing module 15102 and control module 13810 may implement the process of message sequence chart 15400 in scenarios where terminal device 13602 does not specify a definite priority service period. For example, a user of terminal device 13602 that triggers service prioritization in 15402 via user input may not specify a definite priority service period. For example, a user may be expecting e.g., a voice call but may not know when the voice call will occur. Accordingly, the user may not provide a definite priority service period and processing module 15102 therefore may determine the priority service period in 15406 as being an indefinite priority service period. Processing module 15102 may then indicate in the priority service information in 15408 that the priority service period is an indefinite priority service period.

Instead of starting a timer set to track the priority service period and suspending/limiting non-priority services for the duration of the priority service period, in some aspects control module 13810 may indefinitely suspend/limit non-priority services in 15410. Control module 13810 may continue to suspend/limit non-priority services until terminal device 13602 instructs network access node 13610 to terminate service prioritization in 15414, which may be e.g., triggered when terminal device 13602 receives the priority services (indicated by user input or automatically) or when terminal device 13602 is plugged into a charging supply. Alternatively, as suspending/limiting non-priority services for an indefinite duration may not be reasonable (as the suspending/limiting could continue endlessly), control module 13810 may use a default long-term priority service period when terminal device 13602 reports an indefinite priority service period in 15408. Control module 13810 may then start a timer set to track the long-term priority service period in 15410 and may suspend/limit non-priority services for the duration of the long-term priority service period. In some aspects, the long-term priority service period may be an extended duration of time, e.g., 10 hours, 24 hours, etc. Control module 13810 may then continue to suspend/limit non-priority services until the long-term priority service period expires or until terminal device 13602 instructs network access node 13610 to terminate service prioritization in 15414. Such may enable network access node 13610 to suspend/limit non-priority services for extended durations of time without becoming stuck in an endless priority service period (e.g., if terminal device 13602 never instructs network access node 13610 to terminate service prioritization).

As previously indicated, service prioritization triggering (e.g., in 15202 and 15402) may be prompted by user-initiated triggers (e.g., user input) as well as battery power-initiated triggers. In some aspects, processing module 15102 and control module 13810 may implement the process of message sequence chart 15400 to respond to battery power-initiated triggers. For example, processing module 15102 may continuously monitor the remaining battery power at power supply 13716 and compare the remaining battery power to a predefined threshold. If the battery power is below the threshold, processing module 15102 may automatically (e.g., without being prompted by user input) trigger service prioritization in 15402. As processing module 15102 may not have been informed of any priority services (e.g., via user input), processing module 15102 may then autonomously identify the priority and non-priority services in 15404. For example, processing module 15102 may be preprogrammed to automatically select certain services, such as voice services, as priority services and to select the remaining services as non-priority services. For example, a user of terminal device 13602 may be able to preprogram via user input into processing module 15102 which services are priority services (and thus should be prioritized in low battery power scenarios); alternatively, processing module 15102 may be preprogrammed with certain priority services by a manufacturer, software update, or another external configured mechanism.

Processing module 15102 and control module 13810 may then perform the process of message sequence chart 15400 in the manner detailed above. Specifically, processing module 15102 may therefore identify the priority and non-priority services in 15404 based on such preprogramming. Processing module 15102 may then determine the priority service period in 15406, which may be e.g., an indefinite priority service period as a definite priority service period has not been specified. Processing module 15102 may then report the priority service information to network access node 13610 in 15408, which may then suspend or limit non-priority services in 15410. Control module 13810 may either utilize a default long-term priority service period or an indefinite priority service period and may suspend or limit non-priority service data until either the priority service period expires or until terminal device 13602 instructs network access node 13610 to terminate service prioritization. For example, processing module 15102 may detect if terminal device 13602 has been plugged into a charging supply and, if so, may terminate service prioritization in 15414. Terminal device 13602 may therefore automatically trigger service prioritization in order to conserve battery power for certain priority services when battery power is low (e.g., falls below a predefined threshold).

In some aspects, terminal device 13602 may be configured to progressively disable services as battery power decreases. FIG. 155 shows priority curve 15500 that illustrates an exemplary progressive disablement scheme. As shown in FIG. 155, processing module 15102 may initially have all services (voice, SMS, IP messaging, and IP data) active when battery power of power supply 13716 is high. Processing module 15102 may monitor the remaining battery power of power supply 13716 over time to determine if the remaining battery power falls below any of a set of predefined thresholds 15502-15508 and may progressively disable services based on which thresholds the remaining battery power falls below. In some aspects, the services may be organized in a hierarchical priority, where IP data services are the lowest priority (threshold 15502), IP messaging services is the second lowest priority (threshold 15504), SMS services is the second highest priority (threshold 15506), and voice services is the highest priority (threshold 15508). The hierarchical priority shown in FIG. 155 is exemplary and the services may be organized in any prioritized order.

FIG. 156 shows message sequence chart 15600 illustrating the progressive service disablement according to some aspects. As shown in FIG. 156, processing module 15102 may trigger service prioritization in 15602. Processing module 15102 may trigger service prioritization either based on battery power or a combination of battery power and a user indication of a priority service. For example, in a battery power-triggering case, processing module 15102 may continuously monitor the remaining battery power at power supply 13716 over time and compare the remaining battery power to predefined thresholds 15502-15508. Accordingly, in a use scenario starting from full or substantially full battery power, processing module 15102 may continuously compare the remaining battery power to threshold 15502. As the remaining battery power of power supply 13716 gradually drops, the remaining battery power may eventually fall below threshold 15502. Processing module 15102 may then automatically trigger service prioritization in 15602 and identify IP data services as a non-priority service in 15604. Processing module 15102 may then disable IP data services in 15606 by reporting to network access node 13610 that IP data services should be disabled. Control module 13810 may then suspend or limit IP data services in 15608. As control module 13810 has suspended or limited IP data services, processing module 15102 may interrupt IP data services, which may include interrupting reception of IP data services or only receiving limited IP data services.

In the battery power triggering case, processing module 15102 may in some aspects trigger service prioritization in 15602 based on battery power alone. Alternatively, in a combined battery power and user-initiated triggering case, processing module 15102 may in some aspects only trigger service prioritization in 15602 in response to a user indication of a priority service. For example, a user may indicate a priority service (via user input), which may either be a local service or a network service. In response to this user indication, processing module 15102 may trigger service prioritization in 15602 and begin monitoring battery power to identify potential non-priority services in 15604. Accordingly, in the combined battery power and user-initiated triggering case, processing module 15102 may, in some cases, only initiate disablement of network services if a user indicates that there is a priority service. Processing module 15102 may then progressively disable network services as battery power drops in order to preserve battery power for priority services.

After triggering service prioritization in 15602, processing module 15102 may continue to monitor the remaining battery power of power supply 13716, which may gradually become depleted. As the remaining battery power becomes depleted, processing module 15102 may progressively disable services with network access node 13610 based on the thresholds associated with each service. If the user has indicated that any of the services (IP data services, IP messaging services, SMS services, or voice services) is a priority service, processing module 15102 may not disable the priority service and may not take any action when the battery power falls below the threshold associated with the priority service.

When the remaining battery power falls below threshold 15504, processing module 15102 may identify the associated service (e.g., IP messaging services in the exemplary setting of FIG. 155) as a non-priority service and instruct network access node 13610 to disable the identified non-priority service in 15610. Control module 13810 may therefore suspend or limit the identified non-priority service in 15612. Processing module 15102 may then interrupt the identified non-priority service. In some aspects, processing module 15102 may continue to monitor the remaining battery power of power supply 13716 and notify network access node 13610 of non-priority services when the remaining battery power falls below one of the progressive predefined thresholds. Accordingly, if the remaining battery power falls below threshold 15504, processing module 15102 may identify the associated service (e.g., IP messaging services) as a non-priority service and instruct network access node 13610 to disable the identified non-priority service in 15610.

Eventually, the remaining battery power will either fall below threshold 15508 (prompting processing module 15102 to notify network access node 13610 that voice services are a non-priority service and should be disabled) or terminal device 13602 will be plugged into a charging supply. If terminal device 13602 is plugged into a power supply, processing module 15102 may terminate service prioritization in 15614, which may prompt control module 13810 to resume the previously disabled non-priority services. In some aspects, processing module 15102 may immediately terminate service prioritization for all services or may progressively re-enable communicate services (e.g., according to thresholds 15502-15508 or another progressive threshold scheme) as power supply 13716 gradually becomes charged. Processing module 15102 and control module 13810 may therefore cooperate according to these aspects in order to progressively disable services (e.g., arranged in a prioritized hierarchy) based on a gradual depletion of battery power.

Alternatively, if processing module 15102 is using a combined battery power and user-initiated triggering, in some aspects a user of terminal device 13602 may provide a service priority period when identifying the priority service. For example, the user may wish to preserve battery power over a definite period in order to ensure that terminal device 13602 can execute the priority service. Processing module 15102 may provide the priority service period to network access node 13610, e.g., in 15606 when disabling the non-priority service in 15606. Accordingly, instead of suspending or limiting non-priority services until terminal device 13602 terminates service prioritization in 15614, control module 13810 of network access node 13610 may suspend or limit non-priority services until the priority service period has expired. Control module 13810 may utilize a timer set to the priority service period in order to determine when to terminate service prioritization and resume non-priority services.

Although detailed above as implemented in a network access node, e.g., network access node 13610, in some aspects the network side functionality may be implemented in an edge computing device, such as edge computing server 14602 as previously shown in FIG. 146. As edge computing server 14602 may be positioned on the backhaul interface (e.g., an S1-U interface in an LTE setting) of network access node 13610, edge computing server 14602 may be able to monitor the backhaul interface for data addressed to terminal device 13602. Similar to the manner previously detailed regarding packet inspection, edge computing server 14602 may be configured to inspect packets on the backhaul interface in order to detect data addressed to terminal device 13602 and to identify which communication service the data is associated with. For example, network access node 13610 and core network 13902 may exchange data on the backhaul interface with a tunneling protocol (e.g., GTP in an LTE setting). Edge computing server 14602 may therefore inspect the data packets according to the tunneling protocol in order to identify which bearer each data packet is mapped to (e.g., by examining TEID in the GTP tunneling header in an LTE setting) and accordingly may be able to determine the QoS class of the bearer. By identifying the QoS class of a given data packet, edge computing server 14602 may be able to determine which communication service the data packet is associated with, e.g., voice services, SMS services, IP data services, IP messaging services, etc. Processing module 15102 may therefore notify edge computing server 14602 (e.g., via a software-level connection) of priority services, non-priority services, and priority service periods in the same manner as detailed in FIGS. 152, 154, and 156. Edge computing server 14602 may then suspend or limit non-priority services for the duration of the priority service period or until processing module 15102 instructs edge computing server 14602 to terminate service prioritization. Edge computing server 14602 may therefore be configured to retrieve (e.g., from a non-transitory computer readable medium) and execute software-defined program code in order to execute this functionality.

As some edge computing devices may be capable of deeper packet inspection than network access nodes (e.g., may be able to perform inspection on application-layer and IP data), in some aspects edge computing server 14602 may also be configured to enforce more specific priority service rules. For example, as opposed to filtering traffic into priority and non-priority services based on QoS class, processing module 15102 and edge computing server 14602 may also enforce fine-grained priority service filtering. For example, processing module 15102 may specify to edge computing server 14602 that only data from certain data networks (e.g., PDNs) are considered priority services. Edge computing server 14602 may then perform packet inspection (e.g., by evaluating IP headers or payload) to determine which traffic addressed to terminal device 13602 is tied to these data networks. Edge computing server 14602 may then route this priority service data to terminal device 13602 and may suspend or limit all other data as non-priority service data. In some aspects, the deep packet inspection may also be implemented in network access node 13610, which may enable terminal device 13602 and network access node 13610 to implement fine-grained priority service filtering (e.g., without the use of an edge computing device).

The priority and non-priority service filtering may be performed on any type of communication service. For example, terminal device 13602 and network access node 13610/edge computing server 14602 may apply priority service filtering based on any of the above-indicated voice services, SMS services, IP data services, IP messaging services, push notification services in addition to emergency calls, specific contacts or phone numbers, phone calls/messages from specific areas, emails from specific people, etc. In another exemplary use scenario, terminal device 13602 may wish to prioritize a 'tracking service', which may be an application that continuously tracks the location of terminal device 13602 such as part of an emergency application. The tracking service may rely on a network connection via network access node 13610 to 'ping' terminal device 13602. Accordingly, in order to ensure that terminal device 13602 has sufficient battery power to operate the tracking service, terminal device 13602 may instruct network access node 13610 to treat the tracking service as a priority service and one or more other network services as non-priority services. Network access node 13610 may then suspend or limit non-priority services data and route priority service data for the tracking service to terminal device 13602.

These aspects may therefore enable terminal device 13602 to conserve battery power and dedicate remaining battery power to certain priority services. As network access node 13610 or edge computing server 14602 may suspend or limit non-priority services, terminal device 13602 may minimize the amount of radio activity and processing, thus conserving power. Terminal device 13602 may also be able to enter longer sleep states during periods in which no priority service data is incoming which may not be possible if non-priority services were also activated. Furthermore, the suspension or limiting of non-priority services data may also reduce congestion over the radio access network. In some aspects, terminal device 13602 may not report the priority service information to network access node 13610, and may unilaterally cease executing the non-priority services (e.g., without actively receiving or transmitting data to network access node 13610). This may, however, in some cases cause the network to determine that terminal device 13602 is unresponsive and terminate the non-priority services. This may depend on the configuration and behavior of the network.

FIG. 157 shows method 15700 of performing radio communications in accordance with some aspects. As shown in FIG. 157, method 15700 includes monitoring a remaining battery power of the terminal device (15710), determining that the remaining battery power has fallen below a first threshold (15720), selecting a first network service from a prioritized set of network services and interrupting the first network service by reporting the first network service to a radio communication network (15730), determining that the remaining battery power has fallen below a second threshold that is less than the first threshold (15740), and selecting a second network service from the prioritized set of network services with a higher priority than the first network service, and interrupting the second network service by reporting the second network service to the radio communication network (15750).

FIG. 158 shows method 15800 of performing radio communications in accordance with some aspects. As shown in FIG. 158, method 15800 includes receiving user input that identifies a priority service and a time period during which the priority service is requested (15810), interrupting a non-priority service by reporting the non-priority service to a radio access network (15820), executing the priority service during the time period (15830), and resuming the non-priority service over the radio access network after the time period has expired (15840).

4.4 QoS #4

In some aspects of this disclosure, a terminal device may determine when power- or thermal-constrained scenarios occur, classify traffic based on QoS characteristics, and throttle (or 'restrict') non-critical traffic while continuing to transmit critical traffic. Accordingly, instead of delaying or throttling all traffic in a substantially uniform matter, these aspects may identify traffic that is critical (e.g., realtime traffic, other latency-sensitive traffic, user-priority traffic, etc.) and other traffic that is non-critical (e.g., non-realtime traffic, other latency-tolerant traffic, non-user-priority traffic, etc.) and apply the throttling to the non-critical traffic. These aspects may therefore reduce power consumption or temperature in power- or thermal-constrained scenarios by throttling non-critical traffic. Transfer of critical traffic such as realtime and/or user-priority traffic may, in some cases, not be interrupted.

FIG. 159 shows an internal configuration of terminal device 13602 in accordance with some aspects. As shown in FIG. 159, terminal device 13602 may include antenna system 13702, RF transceiver 13704, physical layer processing module 13708, processing module 15912, power supply 13716, and sensor 13718, which may each be configured in the same manner detailed above regarding FIG. 137. Other components of terminal device 13602 not directly related to these aspects in addition to control, power, and clock lines may not be expressly shown in FIG. 159. In some aspects, processing module 15912 may include controller 13710 and application processor 13712. In some aspects, processing module 15912 may be implemented as a software-defined module, such as one or more processors configured to retrieve and execute program code to perform arithmetic, control, and I/O instructions. In some aspects, processing module 15912 may be implemented as a hardware-defined module such as one or more dedicated hardware circuits configured to perform specific tasks, e.g., one or more hardware accelerators. The functionality of these aspects may therefore be implemented in processing module 15912 with software-defined and/or hardware-defined modules. These aspects may be used with power efficiency aspects described herein.

As shown in FIG. 159, processing module 15912 may include traffic control module 15902, classification module 15904, detection module 15906, application 15908, and application 15910. Traffic control module 15902, classification module 15904, and detection module 15906 may be structurally realized as a hardware-defined module, e.g., as one or more dedicated hardware circuits or FPGAs, as a software-defined module, e.g., one or more processors configured to execute program code defining arithmetic, control, and I/O instructions (e.g., software and/or firmware) stored in a non-transitory computer-readable storage medium, or as a mixed hardware-defined and software-defined module. As processing module 15912 may in some aspects include controller 13710 and application processor 13712, traffic control module 15902, classification module 15904, detection module 15906, application 15908, and application 15910 may be software-defined and/or hardware-defined components of controller 13710 or application processor 13712. While the individual components of processing module 15912 are depicted separately in FIG. 159, this depiction serves to highlight the operation of processing module 15912 on a functional level. One or more of the components of processing module 15912 may therefore also be integrated into a common hardware and/or software component.

Application 15908 and application 15910 may be software-defined applications executed on a processor, such as software modules defined as program code that can be retrieved and executed by a processor. For example, application 15908 and application 15910 may be executed at processing module 15912 by application processor 13712 (which may also execute one or more additional applications), and may be application programs that are user-interactive. For example, applications 15908 and 15910 may be web browser applications, email applications, news applications, stock market applications, messaging applications, voice/video call applications, gaming applications, multimedia streaming applications, camera applications, etc. Applications 15908 and 15910 may be 'online' applications that exchange data over a communication network. For example, applications 15908 and 15910 may establish data connections with various data networks, e.g., data networks 13904 and 13906 as shown in FIG. 139, that rely on radio access and core network connections provided by network access node 13610 and core network 13902 for data transfer through radio communication network 13600.

As detailed above regarding bearers and QoS requirements, applications 15908 and 15910 may have certain service requirements for the data connections that may be targeted to ensure smooth operation. Accordingly, in an exemplary scenario application 15908 may be a realtime application (such as a voice call application, a video call application, a live multimedia streaming application, a live gaming application, etc.) and application 15910 may be a non-realtime application (such as an email application, a web browser application, a messaging application, a news application, a stock market application, etc.). Data networks 13904 and 13906 may be counterpart servers to application 15908 and 15910, respectively, that provide data for the associated realtime and non-realtime services. The data connection (or bearer) for application 15908 may therefore have stricter latency and throughput requirements than the data connection for application 15910 in order to support the latency-sensitive and traffic-heavy realtime service of application 15908. Conversely, the data connection for application 15910 may have less sensitive requirements to support the best-effort non-realtime services of application 15910.

The data connection for application 15910 may therefore be more tolerant towards scheduling delays and throughput reductions than the data connection for application 15908. However, there may be certain operational scenarios in which terminal device 13602 may restrict data transfer, which may impact the data connections for applications 15908 and 15910. For example, if terminal device 13602 has low battery power (at power supply 13716), terminal device 13602 may throttle radio transmissions in order to reduce power consumption. In another example, if terminal device 13602 is overheating, terminal device 13602 may throttle radio transmissions in order to reduce the temperature of terminal device 13602.

However, if terminal device 13602 applies uniform throttling (e.g., where data is affected uniformly), the data transfer for applications 15908 and 15910 may be affected to the same degree. While application 15910 may be able to tolerate such throughput and latency restrictions (as a non-realtime application), application 15908 may suffer noticeable service degradation (as a realtime application). This may frustrate user experience.

Throttling may also have a negative impact if certain applications are prioritized by a user. For example, a user of terminal device 13602 may provide user input to processing module 15912 that indicates that application 15908 or application 15910 is a user-priority application. A user may therefore indicate that e.g., application 15908 is a user-priority application, for example, because the user frequently uses or checks application 15908. For example, the user may utilize application 15908 as an email application for work or business, and accordingly may wish to receive new incoming emails and send outgoing emails as quickly as possible. In another example, a user may be driving or on a hike and use application 15908 as a navigation application. The user may therefore wish to receive updates and interact with application 15908 in a prompt manner. In another example, a user may frequently engage in stock trading and may utilize application 15908 as a stock market application. The user may therefore wish to receive price updates and quotes as soon as possible. Other variations regarding user preferences and applications 15908 and 15910 may yield similar scenarios in which a user may wish to prioritize application 15908 or 15910.

If terminal device 13602 applies uniform throttling in power-constrained or thermal-constrained scenarios (collectively referred to herein as 'critical scenarios'), data transfer for applications 15908 and 15910 may be equally affected. Accordingly, even if application 15908 is prioritized by a user, terminal device 13602 may throttle traffic for application 15908, which may cause the user to receive application updates and other online application functions on a delay. This may frustrate user experience.

Accordingly, these aspects may employ selective power and thermal management based on the criticality of data traffic. When in critical scenarios such as thermal- and/or power-constrained scenarios, terminal device 13602 may therefore classify data as either critical traffic (e.g., realtime traffic or user-priority traffic) or non-critical traffic (e.g., non-realtime traffic or non-user-priority traffic) and subsequently restrict (e.g., by throttling) transmission of the non-critical traffic while continuing to transmit the critical traffic. By selectively applying transmission restrictions to non-critical traffic, terminal device 13602 may reduce power consumption or temperature in power- or thermal-constrained situations while still maintaining sufficient transfer of critical traffic. In the exemplary scenario introduced above (where application 15908 is a realtime application or user-priority application and application 15910 is a non-realtime application or non-user-priority application), terminal device 13602 may continue to transmit data for application 15908 while restricting transmission for application 15910. Terminal device 13602 may therefore continue to meet the QoS requirements of application 15908 at the expense of application 15910. However, as application 15910 may be non-realtime or non-user-priority, the degradation in service to application 15910 may be acceptable to a user. Terminal device 13602 may implement these aspects for one or both of thermal- and power-management. Accordingly, in some aspects terminal device 13602 may implement throttling counter high temperature or overheating scenarios. In other aspects, terminal device 13602 may implement throttling to counter low battery power. In other aspects, terminal device 13602 may implement throttling to counter both high temperature/overheating and low battery.

FIG. 160 shows method 16000, which processing module 15912 may be configured to execute in accordance with some aspects to detect and respond to thermal-constrained scenarios. As shown in FIG. 160, detection module 15906 may monitor the temperature of terminal device in 16002. Accordingly, detection module 15906 may monitor measurement data provided by sensor 13718, which may be a thermal sensor such as a thermometer or other temperature sensor. Detection module 15906 may monitor sensor 13718 to track the temperature of terminal device 13602. In some aspects, detection module 15906 may continuously (or periodically, e.g., with a fixed measurement period) monitor the temperature of terminal device 13602 in 16002.

Detection module 15906 may then determine in 16004 whether terminal device 13602 is thermal-constrained in 16004. For example, detection module 15906 may compare the temperature obtained in 16002 with a temperature threshold. If the temperature is below the temperature threshold, detection module 15906 may determine that terminal device 13602 is not thermal-constrained, e.g., that terminal device 13602 is not overheating. Traffic control module 15902 may then apply normal traffic control in 16006 and accordingly may not apply any restrictions to data transmissions. In the exemplary scenario introduced above regarding applications 15908 and 15910, traffic control module 15902 may continue to execute data transfer for applications 15908 and 15910 in a normal manner, such as by executing data transfer for applications 15908 and 15910 according to the appropriate communication protocols and/or according to the QoS requirements of applications 15908 and 15910.

If detection module 15906 determines that the temperature is above the temperature threshold, detection module 15906 may determine that terminal device 13602 is thermal-constrained and continue to 16008, where classification module 15904 may classify incoming traffic (e.g., provided by applications 15908 and 15910) as critical traffic or non-critical traffic. The number of applications detailed herein (e.g., two) is exemplary and may be scalable to any number of applications.

Classification module 15904 may implement any of a variety of techniques to classify the traffic of applications 15908 and 15910 as critical or non-critical traffic. For example, in some aspects classification module 15904 may classify realtime traffic as critical traffic and non-realtime traffic as non-critical traffic. In some aspects, classification module 15904 may classify user-priority traffic as critical traffic and non-user priority traffic as non-critical traffic. In some aspects, classification module 15904 may consider realtime vs. non-realtime in identifying critical traffic without considering user-priority vs. non-user priority. In some aspects, classification module 15904 may consider user-priority vs. non-user priority in identifying critical traffic, without considering user-priority vs non-user priority. In some aspects, classification module 15904 may consider both realtime vs. non-realtime and user-priority vs. non-user priority in identifying critical traffic.

For example, in some aspects, a user may select via user input whether classification module 15904 will consider only one of realtime and user-priority or both of realtime and user-priority in identifying critical traffic. For example, classification module 15904 may receive user input that specifies user instructions as to whether classification module 15904 should consider realtime and/or user-priority in identifying critical traffic. In some aspects, classification module 15904 may be preprogrammed to consider only one of realtime and user-priority in identifying critical traffic. In some aspects, classification module 15904 may be preprogrammed to consider both of realtime and user-priority in identifying critical traffic. In some aspects, classification module 15904 may be configured to consider only realtime in identifying critical traffic unless a user provides user input that indicates user-priority of certain applications or services and, if a user provides user input that indicates user-priority of certain applications or services, may be configured to consider only user-priority or may be configured to consider both user-priority and realtime.

In some aspects where classification module 15904 is configured to classify traffic based on user-priority, a user may provide user input (e.g., prior to or during method 16000) that indicates applications and/or services that are user-priority. For example, in some aspects a user may provide user input to classification module 15904 that specifies one or more applications (e.g., applications 15908 or 15910) that are user-priority applications. Classification module 15904 may then record application identification information (such as an application ID) for each user-priority application. In some aspects, a user may provide user input to classification module 15904 that specifies one or more services that are user-priority applications, where each service may correspond to a general class of applications.

For example, a user may wish to prioritize messaging applications. Instead of identifying each of the messaging applications individually, the user may provide user input to classification module 15904 that specifies that messaging services are user-priority. Classification module 15904 may then consider traffic for messaging applications as user-priority traffic. In another example, a user may wish to prioritize multimedia streaming applications. Instead of identifying each multimedia streaming application individually, the user may provide user input to classification module 15904 that specifies that multimedia streaming services are user-priority. Classification module 15904 may then consider traffic for multimedia applications as user-priority traffic. Classification module 15904 may record user-priority services specified by a user input.

Classification module 15904 may therefore be configured in 16008 to classify data packets as either critical or non-critical based on criteria related to e.g., realtime, user-priority, rules, etc. Classification module 15904 may use a variety of different information and techniques to classify data packets. For example, in some aspects applications 15908 and 15910 may be configured to provide metadata that indicates characteristics of the data packets that are generated by applications 15908 and 15910. For example, applications 15908 and 15910 may be executed on application processor 13712 as dedicated applications that interface with controller 13710 via the Operating System (OS) of application processor 13712 and a modem driver with baseband modem 13706. Applications 15908 and 15910 may therefore generate uplink data packets (which may be e.g., IP packets) and provide the data packets to controller 13710 (via the OS and modem driver) for transmission. Controller 13710 may process the data packets according to the user-plane cellular protocol stack protocols and provide the resulting uplink data to physical layer processing module 13708 for radio transmission via RF transceiver 13704 and antenna system 13702.

In some aspects, applications 15908 and 15910 may 'tag' data packets (e.g., provided to the OS and modem driver) with a traffic priority indicator that indicates whether the data packets are realtime or non-realtime. For example, applications 15908 and 15910 may tag data packets with a Type of Service (TOS) or Differentiated Services Code Point (DSCP) in the IP header that indicates the QoS of the data packet. Classification module 15904 may therefore check the traffic priority indicators of the data packets provided by applications 15908 and 15910 to determine whether the data packets are realtime or non-realtime. In some aspects, classification module 15904 may check the traffic priority indicator of each data packet to classify each data packet as realtime traffic or non-realtime traffic. For example, certain applications may generate some data packets that are real-time traffic and other data packets that are non-realtime traffic, such as a multimedia streaming application that provides streaming traffic (realtime traffic) and signaling traffic (non-realtime traffic). Accordingly, applications 15908 and 15910 may tag each data packet with a traffic priority indicator that indicates whether each data packet is realtime or non-realtime. Classification module 15904 may then classify each data packet (regardless of the originating application) as realtime or non-realtime traffic based on the traffic priority indicator.

In some aspects, applications 15908 and 15910 may be preprogrammed as either a realtime application or a non-realtime application. Applications 15908 and 15910 may then be configured to tag each uplink data packet with a traffic priority indicator that indicates the preprogrammed traffic priority configuration. Accordingly, regardless of whether the data packet is realtime or non-realtime, applications 15908 and 15910 may tag each data as realtime or non-realtime in the traffic priority indicator based on the preprogrammed traffic priority configuration. In some aspects, classification module 15904 may therefore classify data packets in 16008 as real-time or non-realtime data based on the traffic priority indicator, which may reflect the preprogrammed traffic priority configuration of each application.

In some aspects, applications 15908 and 15910 may tag data packets with application identification information. For example, application 15908 and application 15910 may be assigned application IDs (e.g., externally, such as by an online application store, developer, or another source of the application, or locally, such as by terminal device 13602). The application ID of applications 15908 and 15910 may uniquely identify each application. Accordingly, in some aspects where classification module 15904 is configured to consider user-priority in identifying critical traffic, classification module 15904 may receive user input that identifies a user-priority application (e.g., application 15908) and identify the application ID of the user-priority application. Classification module 15904 may therefore check the application identification information tagged on data packets to determine whether the data packets originated from a user-priority application. In some aspects, classification module 15904 may store a list of application IDs of priority applications and check whether application identification information of a given data packet matches any application ID in the list. In some aspects, classification module 15904 may therefore classify data packets as user-priority or non-user priority traffic in 16008 based on application identification information tagged to the data packets.

In some aspects, applications 15908 and 15910 may tag data packets with service indicators. As indicated above, applications 15908 and 15910 may tag data packets with a service indicator such as a Type of Service (TOS) or Differentiated Services Code Point (DSCP) in the IP header. If a user has specified a user-priority service (e.g., a general class of applications), classification module 15904 may identify data packets of the user-priority service by checking service indicators such as TOS or DSCP for a given data packet to determine whether the data packet is associated with a user-priority service. For example, in some aspects where a user indicates (via user input) a user-priority service, classification module 15904 may identify a service indicator (such e.g., as one or specific ToS and/or DSCP values) that are associated with the user-priority service. When classifying traffic in 16008, classification module 15904 may compare the service indicators of a data packet to the service indicators of user-priority services. If the service indicator matches a service indicator of a user-priority service, classification module 15904 may classify the data packet as critical traffic.

In some aspects, at least one of applications 15908 and 15910 may not tag data packets with metadata that indicates whether the data packets are realtime traffic and/or user-priority traffic. Classification module 15904 may therefore classify the data packets in 16008 based on other 'inferred' information. For example, classification module 15904 may evaluate the traffic profile of the data packets produced by each of applications 15908 and 15910 in order to estimate whether applications 15908 and 15910 are realtime or non-realtime applications. For example, classification module 15904 may evaluate the data plane packet inter-arrival (the time between successively arriving downlink packets) and packet inter-send (the time between successively sent uplink packets) times for applications 15908 and 15910, where realtime traffic can be expected to have low inter-arrival and inter-send times (e.g., average below some threshold) and non-realtime traffic can be expected to have higher inter-arrival and inter-send times (e.g., average above some threshold).

In the exemplary scenario introduced above regarding application 15908 and application 15910, classification module 15904 may evaluate the inter-send/arrival times for application 15908 by monitoring the data packets originating and terminating at application 15908 and evaluate the inter-send/arrival times for application 15910 by monitoring the data packets originating and terminating at application 15910. Classification module 15904 may therefore identify which application generated each data packet. After identifying the originating application of the data packets, classification module 15904 may evaluate parameters such as the inter-send/arrival times of data packets for applications 15908 and 15910 in order to obtain an inter-send and inter-arrival time measurement (e.g., an average) for each application. Classification module 15904 may then compare the inter-send and inter-arrival times to predefined thresholds to determine whether applications 15908 and 15910 are realtime applications or non-realtime applications. In the exemplary scenario introduced above, the inter-send and inter-arrival times for application 15908 may fall below the predefined threshold; consequently, classification module 15904 may classify application 15908 as a realtime application. Conversely, the inter-send and inter-arrival times for application 15910 may exceed the predefined threshold; consequently, classification module 15904 may classify application 15910 as a non-realtime application. After classifying a given application as realtime or non-realtime, classification module 15904 may apply the classification uniformly to all traffic associated with the application.

In some aspects, classification module 15904 may utilize connection endpoint information such as IP, port, and socket information to classify traffic. For example, each data connection may terminate at a socket, which may be a logical endpoint of an IP connection. Each socket may be identified as a '5-tuple' that is defined by an IP source address, IP destination address, source port number, destination port number, and protocol. Classification module 15904 may therefore be able to classify the traffic received at each socket as realtime or non-realtime traffic (e.g., based on inter-send/arrival times). Classification module 15904 may then apply the realtime or non-realtime classification of a given socket to all traffic associated with the socket.

In some aspects, classification module 15904 may also utilize predefined information of port number assignments to classify realtime and non-realtime traffic. For example, certain port numbers may be associated with certain protocols or applications. For example, certain ports (by port number) may be assigned (e.g., via a predefined relationship) to email-related protocols such as Internet Message Access Protocol (IMAP), Post Office Protocol (POP), or Simple Mail Transfer Protocol (SMTP). Classification module 15904 may then be able to determine that traffic on these ports is email traffic, which may be non-realtime. Other ports may be assigned to file transfer protocols such as File Transfer Protocol (FTP), which classification module 15904 may classify as non-realtime traffic. Other ports may be assigned to realtime traffic protocols such as Real-time Transport Protocol (RTP) or Real Time Streaming Protocol (RTSP), which classification module 15904 may classify as non-realtime traffic. Other ports may be assigned to web-based traffic protocols such as HyperText Transfer Protocol (HTTP), which may be either realtime or non-realtime traffic. In some aspects, classification module 15904 may perform deeper inspection on traffic from HTTP ports in order to determine whether the traffic is realtime or non-realtime.

In some aspects, classification module 15904 may utilize predefined information of port number assignments to classify user-priority and non-user-priority traffic. As certain port numbers noted above may be associated with certain services, such as email services, file transfer services, realtime streaming services, etc. Classification module 15904 may therefore classify traffic on certain port numbers as being associated with a user-priority service (and thus user-priority traffic) if the port number is associated with a user-priority service specified by a user.

In some aspects, classification module 15904 may utilize other inferred information to classify applications 15908 and 15910 as realtime or non-realtime in 16008. For example, classification module 15904 may apply traffic pattern evaluation techniques and/or packet inspection techniques to classify applications 15908 and 15910 as realtime or non-realtime. For example, classification module 15904 may evaluate source/destination Access Point Names (APNs) and/or IP addresses (which may identify data networks 13904 and 13906) obtained via packet inspection and classify applications 15908 and 15910 based on which data networks applications 15908 and 15910 are communicating with. For example, certain data networks may be associated with realtime services while other data networks may be associated with non-realtime services; accordingly, classification module 15904 may classify applications 15908 and 15910 based on information about the counterpart data networks. In some aspects, classification module 15904 may utilize more advanced traffic pattern analysis, such as techniques based on heuristic approaches, machine learning support vector machines, etc., that can classify traffic as realtime or non-realtime and/or as user-priority or non-user-priority.

In some aspects, classification module 15904 may utilize a combination of explicit information (e.g., traffic priority indicators, service indicators, port numbers, etc.) and inferred information (e.g., inter-send/arrival times, machine learning, packet inspection, etc.) in 16008 to classify the data packets of applications 15908 and 15910 as realtime or non-realtime. For example, in some aspects classification module 15904 may not be able to classify a given data packet as realtime/non-realtime or user-priority/non-user-priority based on a traffic priority indicator, service indicator, or port number associated with the packet. Classification module 15904 may then utilize inferred information to classify the data packet, such as by measuring an inter-send/arrival time associated with the data packet (e.g., on a stream of packets that includes the data packet), performing machine learning on the data packet (e.g., on a stream of packets that includes the data packet), performing deep packet inspection on the packet, etc. Classification module 15904 may therefore utilize any such information to classify data packets as realtime/non-realtime and/or user-priority/non-user-priority.

In some aspects, classification module 15904 may perform classification in 16008 parallel to the other processes of method 16000. For example, classification module 15904 may evaluate data packets from applications 15908 and 15910 over an extended time period (e.g., to classify applications 15908 and 15910 as realtime/non-realtime and/or user-priority/non-user-priority via inferred information) which may overlap with one or more other processes of method 16000.

In some aspects, a user may also provide user input to classification module 15904 that specifies a hierarchical priority of multiple applications or services. For example, a user may provide user input that 'ranks' applications or services according to user-priority. For example, a user may specify that a first application has the highest user-priority, a second application has the second-highest user-priority, a third application has the third-highest user-priority, etc. In another example, a user may specify that that e.g., email services (e.g., email applications) are the highest priority, multimedia streaming services are the second-highest priority, etc. Classification module 15904 may therefore classify data packets in 16008 as critical or non-critical based on varying degrees of criticality. For example, in some aspects classification module 15904 may classify data packets as the most critical, other data packets as the second-most critical, other data packets as the third-most critical, etc.

Classification module 15904 may therefore have various different techniques for classifying data packets as realtime vs. non-realtime traffic and/or user-priority vs. non-user-priority traffic in 16008. In some aspects where classification module 15904 is configured to classify realtime traffic as critical traffic (and not classify user-priority traffic as critical traffic), classification module 15904 may only perform realtime vs. non-realtime classification and subsequently classify realtime traffic as critical traffic and non-realtime traffic as non-critical traffic in 16008. In some aspects where classification module 15904 is configured to classify user-priority traffic as critical traffic (and not classify realtime traffic as critical traffic), classification module 15904 may only perform user-priority vs. non-user-priority classification and subsequently classify user-priority traffic as critical traffic and non-user-priority traffic as non-critical traffic in 16008. In some aspects where classification module 15904 is configured to classify both realtime traffic and user-priority traffic as critical traffic, classification module 15904 may perform realtime vs. non-realtime classification and user-priority vs. non-user-priority classification. Classification module 15904 may then classify realtime traffic and user-priority traffic as critical traffic and non-realtime traffic and non-user-priority traffic as non-critical traffic in 16008.

After classifying data packets as critical or non-critical with classification module 15904 in 16008, processing module 15912 may apply traffic restrictions based on critical and non-critical data packets with traffic control module 15902 in 16010. As previously indicated, processing module 15912 may aim to reduce or manage the temperature of terminal device 13602 by restricting traffic. In order to avoid interrupting critical traffic (realtime or user priority) with such traffic restrictions, processing module 15912 may focus the traffic restriction on non-critical traffic. Accordingly, traffic control module 15902 may be configured to restrict the non-critical traffic in 16010 and avoid restricting the critical traffic.

In various aspects, traffic control module 15902 may implement the traffic restrictions with various different techniques. In some aspects, traffic control module 15902 may determine that there is only non-critical traffic, such as if classification module 15904 classifies the data packets of both applications 15908 and 15910 (e.g., all pending/waiting data packets) as non-critical traffic. Accordingly, in exemplary scenarios where there is only non-critical traffic and no critical traffic, traffic control module 15902 may enter the transmission components of terminal device 13602 (one or more of antenna system 13702, RF transceiver 13704, and baseband modem 13706) into a sleep or low-power state. If the transmission components of terminal device 13602 are already in a sleep or low-power state, traffic control module 15902 may keep the transmission components in the sleep or low-power state. Traffic control module 15902 may then buffer the non-critical traffic while the transmission components are in the sleep or low-power state, which may allow the heat of terminal device 13602 to dissipate and cause terminal device 13602 to drop in temperature. Traffic control module 15902 may therefore apply the traffic restrictions in 16010 by 'throttling' the non-critical traffic, e.g., delaying transmission of the non-critical traffic.

In some aspects, traffic control module 15902 may continue to buffer the non-critical traffic for a predefined throttling period as part of the traffic restrictions in 16010, such as in the order of milliseconds, seconds or minutes, and subsequently re-activate the transmission components to transmit the non-critical traffic after the throttling period has expired. Traffic control module 15902 may also have received and buffered further non-critical traffic during the throttling period and, after the expiry of the throttling period, may then transmit the buffered traffic. In some aspects, traffic control module 15902 may continue to periodically implement throttling periods in 16010, where traffic control module 15902 may deactivate (sleep or low-power state) the transmission components for the duration of the throttling period and buffer any further traffic. Traffic control module 15902 may then transmit the buffered traffic after each throttling period has expired and enter into another throttling period. Transmission control module 15902 may therefore employ throttling with a throttling period in the traffic restrictions of 16010.

In some aspects, traffic control module 15902 may prematurely terminate the throttling period when any critical traffic is received. For example, traffic control module 15902 may deactivate the transmission components and buffer incoming non-critical data (e.g., received from classification module 15904) during the throttling period in 16010. If traffic control module 15902 then receives data packets that are classified as critical traffic by classification module 15904, traffic control module 15902 may terminate the throttling period and transmit the buffered data non-critical traffic and the newly received critical traffic.

In some aspects, traffic control module 15902 may receive both critical and non-critical traffic from classification module 15904. Traffic control module 15902 may then focus traffic restrictions in 16010 on non-critical traffic and avoid interruption of critical traffic. For example, traffic control module 15902 may act as a scheduler and transmit critical traffic as soon as it arrives from classification module 15904. Traffic control module 15902 may therefore avoid interrupting critical traffic. However, traffic control module 15902 may restrict transmission of non-critical traffic, such as by throttling, which may consequently reduce the heat accumulation of terminal device 13602 on account of the reduced transmission volume. For example, in some aspects traffic control module 15902 may delay non-critical traffic for a predefined throttling period (e.g., in the order of milliseconds, seconds, or minutes), thus throttling the non-critical. Traffic control module 15902 may then buffer the non-critical traffic while continuing to transmit the critical traffic, which may reduce heat accumulation. After the throttling period has expired, traffic control module 15902 may transmit the buffered non-critical traffic. In some aspects, traffic control module 15902 may periodically repeat the throttling period by repeatedly delaying and buffering non-critical traffic for the duration of the throttling period before transmitting the buffered non-critical data at the expiry of the throttling period.

In some aspects, traffic control module 15902 may apply the traffic restrictions in 16010 by reducing the periodicity of certain repetitive non-critical traffic (which may be another form of throttling as transmission of the non-critical traffic is delayed). For example, application 15910 may be an application that 'syncs' a counterpart server (e.g., data network 13906) in order to update application data, such as an email application, messaging application, weather application, stock trading application, etc. Such applications may periodically request sync procedures with the counterpart server. Classification module 15904 may classify such sync requests as non-critical traffic in 16008 (e.g., the requests are not realtime traffic and/or application 15910 is not a user-priority application; if application 15910 is a user-priority application, classification module 15904 may classify sync requests as critical traffic). Traffic control module 15902 may therefore throttle sync requests in order to reduce transmission volume. In some aspects, traffic control module 15902 may increase the sync period, such as by only transmitting one sync request for every two sync requests received at traffic control module 15902. In some aspects, traffic control module 15902 may completely restrict periodic sync procedures by not sending any periodic sync requests. In some aspects, traffic control module 15902 may only transmit sync requests when the sync request is triggered by a user and may not transmit periodic sync requests that are triggered automatically by application 15910.

In some aspects, traffic control module 15902 may be implemented as part of controller 13710, for example as a scheduler. For example, traffic control module 15902 may implement the traffic restrictions in 16110 as part of the cellular protocol stack and accordingly may buffer and control traffic at the protocol-stack layers (e.g., MAC layer). Traffic control module 15902 may then be configured to perform throttling at the modem-level, which may enable more 'fine-grained' throttling. In some aspects, traffic control module 15902 may be implemented as part of application processor 13712. For example, traffic control module 15902 may be implemented as part of the modem driver executed by application processor 13712, and accordingly may buffer and control data traffic at the application layer. Traffic control module 15902 may then be configured to perform throttling at the application-level, which may enable more 'coarse' throttling. In some aspects, traffic control module 15902 may have access to more memory for buffering throttled data when implemented at application processor 13712 than in baseband modem 13706. In some aspects traffic control module 15902 may be partially implemented at both application processor 13712 and baseband modem 13706, and may be configured to perform application-level throttling and modem-level throttling.

In some aspects where a user provides a hierarchical priority for applications and/or services, traffic control module 15902 may apply traffic restrictions in 16010 based on the hierarchical priority. For example, classification module 15904 may classify data packets based on the hierarchical priority, e.g., most critical, second-most critical, etc. Traffic control module 15902 may then vary the level of traffic restrictions based on the criticality level in 16010. For example, traffic control module 15902 may apply the least throttling (e.g., shortest delay) to most critical traffic, the second-least throttling to the second-most critical traffic, etc., and the most throttling (e.g., longest delay) to the least critical (e.g., non-critical) traffic.

Traffic control module 15902 may therefore execute the traffic restrictions in 16010 based on the classification of data packets (by classification module 15904), which may indicate whether the data packets are critical (e.g., realtime and/or user-priority) or non-critical (e.g., non-realtime and/or non-user priority) traffic. In various aspects, traffic control module 15902 may apply throttling to non-critical traffic by delaying transmission of the non-critical traffic. As traffic control module 15902 may selectively apply traffic restrictions, e.g., by focusing the restriction on non-critical traffic while continuing to transmit critical traffic without traffic restrictions, traffic control module 15902 may reduce heat accumulation at terminal device 13602 and avoid overheating.

Terminal control module 15902 may continue to apply traffic restrictions in 16010. In some aspects, traffic control module 15902 may terminate traffic restrictions in 16010 based on input from detection module 15906. For example, detection module 15902 may continue monitoring temperature data provided by sensor 13718 and checking whether the temperature is above the temperature threshold. If the temperature remains above the temperature threshold, detection module 15906 may continue to instruct traffic control module 15902 to apply traffic restrictions. If the temperature falls below the temperature threshold, detection module 15906 may instruct traffic control module 15902 to terminate traffic restrictions. In some aspects, detection module 15906 may utilize a different temperature threshold for deactivating traffic restrictions (e.g., a deactivation temperature threshold that is less than the activation temperature threshold) for activating traffic restrictions, such as for hysteresis thresholding. In some aspects, detection module 15906 may deactivate traffic restriction when the temperature measurements provided by sensor 13718 fall below and remain below the deactivation temperature threshold (which may be the same or different from the activation temperature threshold) for a predefined deactivation period.

Processing module 15912 may therefore apply traffic restrictions until the temperature of terminal device 13602 falls to manageable levels. In some aspects, processing module 15912 may continue to repeat method 16000 (e.g., indefinitely or for a definite time period) and may cycle between activating and deactivating traffic restrictions based on whether the temperature of terminal device 13602 is less than or greater than one or more temperature thresholds (e.g., a single activation/deactivation threshold or an activation and deactivation threshold pair).

In some aspects, processing module 15912 may also progressively scale the level of traffic restrictions based on the temperature measurement data provided by sensor 13718. For example, detection module 15906 may utilize multiple temperature thresholds in 16004, where each temperature threshold maps to a predefined traffic restriction level. For example, detection module 15906 may utilize e.g., three temperature thresholds and may compare the temperature measurement data provided by sensor 13718 to the three temperature thresholds in 16004. If the temperature measurement is less than the first temperature threshold (the lowest temperature threshold), detection module 15906 may instruct traffic control module 15902 to perform normal traffic control in 16006. If the temperature measurement is greater than the first temperature threshold but less than the second temperature threshold (the middle temperature threshold), detection module 15906 may instruct traffic control module 15902 to restrict traffic at a first traffic restriction level. If the temperature measurement is greater than the second temperature threshold but less than the third temperature threshold (the highest temperature threshold), detection module 15906 may instruct traffic control module 15902 to restrict traffic at a second traffic restriction level. If the temperature measurement is greater than the third temperature threshold, detection module 15906 may instruct traffic control module 15902 to restrict traffic at a third traffic restriction level. The number of temperature thresholds and restriction levels is exemplary and may be scalable to any number.

The traffic restriction levels may progress in terms of restrictiveness (the specifics may be configurable). For example, the first traffic restriction level may throttle (e.g., delay) non-realtime traffic for a first throttling period, the second traffic restriction level may throttle non-realtime traffic for a second throttling period, and the third traffic restriction level may throttle non-realtime traffic for a third throttling period, where the third throttling period may be the longest throttling period and the first throttling period may be the shortest throttling period. Processing module 15912 may therefore progressively restrict non-realtime traffic to a greater degree as the temperature of terminal device 13602 increases.

In some aspects, traffic control module 15902 may also apply the traffic restriction levels to critical traffic. For example, the second or third traffic restriction level may also throttle critical traffic by a throttling period (that is e.g., less than the throttling period for non-critical traffic, which may therefore focus the traffic restrictions on non-critical traffic). In some aspects detection module 15906 may use a temperature threshold that may be a cutoff threshold that indicates that severe overheating may occur and, if the temperature exceeds the cutoff threshold, may instruct traffic control module 15902 to apply traffic restrictions (throttling) to both critical and non-critical traffic. In some aspects, processing module 15912 may utilize a continuous range instead of the discrete range provided by the temperature thresholds, where the restriction levels applied by traffic control module 15902 may progressively increase in a continuous manner with temperature.

FIG. 161 shows method 16100, which processing module 15912 may be configured to execute in accordance with some aspects of this disclosure to detect and respond to power-constrained scenarios. As will be detailed, processing module 15912 may execute method 16100 in an analogous manner as to method 16000 using remaining battery power at power supply 13716 in place of temperature measurements from sensor 13718. As shown in FIG. 161, detection module 15906 may monitor the remaining battery power of terminal device 13602 in 16102. Accordingly, detection module 15906 may monitor the remaining battery power of power supply 13716. Detection module 15906 may therefore continuously or periodically (e.g., with a fixed measurement period) monitor the remaining battery power of terminal device 13602 in 16102.

Detection module 15906 may then determine in 16104 whether terminal device 13602 is power-constrained in 16104. For example, detection module 15906 may compare the remaining battery power obtained in 16102 with a battery power threshold. If the remaining battery power is below the battery power threshold, detection module 15906 may determine that terminal device 13602 is not power-constrained, e.g., that terminal device 13602 has sufficient remaining battery power. Traffic control module 15902 may then apply normal traffic control in 16106 and accordingly may not apply any restrictions to data transmissions. In the exemplary scenario introduced above regarding applications 15908 and 15910, traffic control module 15902 may continue to execute data transfer for applications 15908 and 15910 in a normal manner, such as by executing data transfer for applications 15908 and 15910 according to the appropriate communication protocols and/or according to the QoS requirements of applications 15908 and 15910.

If detection module 15906 determines that the temperature is above the battery power threshold, detection module 15906 may determine that terminal device 13602 is power-constrained and continue to 16108, where classification module 15904 may classify incoming traffic (e.g., provided by applications 15908 and 15910) as critical traffic or non-critical traffic. The number of applications detailed herein (e.g., two) is exemplary and may be scalable to any number of applications.

Classification module 15904 may implement any of a variety of techniques to classify the traffic of applications 15908 and 15910 as critical or non-critical traffic. For example, in some aspects classification module 15904 may classify realtime traffic as critical traffic and non-realtime traffic as non-critical traffic. In some aspects, classification module 15904 may classify user-priority traffic as critical traffic and non-user priority traffic as non-critical traffic. In some aspects, classification module 15904 may consider realtime vs. non-realtime in identifying critical traffic without considering user-priority vs. non-user priority. In some aspects, classification module 15904 may consider user-priority vs. non-user priority in identifying critical traffic, without considering user-priority vs non-user priority. In some aspects, classification module 15904 may consider both realtime vs. non-realtime and user-priority vs. non-user priority in identifying critical traffic.

For example, in some aspects, a user may select via user input whether classification module 15904 considers only one of or both of realtime and user-priority in identifying critical traffic. For example, classification module 15904 may receive user input that specifies user instructions as to whether classification module 15904 should consider realtime and/or user-priority in identifying critical traffic. In some aspects, classification module 15904 may be preprogrammed to consider only one of realtime or user-priority or both of realtime and user-priority in identifying critical traffic. In some aspects, classification module 15904 may be configured to consider only realtime in identifying critical traffic unless a user provides user input that indicates user-priority of certain applications or services and, if a user provides user input that indicates user-priority of certain applications or services, may be configured to consider only user-priority or may be configured to consider both user-priority and realtime.

In some aspects where classification module 15904 is configured to classify traffic based on user-priority, a user may provide user input (e.g., prior to or during method 16100) that indicates applications and/or services that are user-priority. For example, in some aspects a user may provide user input to classification module 15904 that specifies one or more applications (e.g., applications 15908 or 15910) that are user-priority applications. Classification module 15904 may then record application identification information (such as an application ID) for each user-priority application. In some aspects, a user may provide user input to classification module 15904 that specifies one or more services that are user-priority applications, where each service may correspond to a general class of applications.

For example, a user may wish to prioritize messaging applications. Instead of identifying each of the messaging applications individually, the user may provide user input to classification module 15904 that specifies that messaging services are user-priority. Classification module 15904 may then consider traffic for messaging applications as user-priority traffic. In another example, a user may wish to prioritize multimedia streaming applications. Instead of identifying each multimedia streaming application individually, the user may provide user input to classification module 15904 that specifies that multimedia streaming services are user-priority. Classification module 15904 may then consider traffic for messaging applications as user-priority traffic. Classification module 15904 may record user-priority services specified by a user input.

Classification module 15904 may therefore be configured in 16108 to classify data packets as either critical or non-critical based on criteria related to realtime and/or user-priority. Classification module 15904 may use a variety of different information and techniques to classify data packets. For example, in some aspects applications 15908 and 15910 may be configured to provide metadata that indicates characteristics of the data packets that are generated by applications 15908 and 15910. For example, applications 15908 and 15910 may be executed on application processor 13712 as dedicated applications that interface with controller 13710 via the Operating System (OS) of application processor 13712 and a modem driver with baseband modem 13706. Applications 15908 and 15910 may therefore generate uplink data packets (which may be e.g., IP packets) and provide the data packets to controller 13710 (via the OS and modem driver) for transmission. Controller 13710 may process the data packets according to the user-plane cellular protocol stack protocols and provide the resulting uplink data to physical layer processing module 13708 for radio transmission via RF transceiver 13704 and antenna system 13702.

In some aspects, applications 15908 and 15910 may 'tag' data packets (e.g., provided to the OS and modem driver) with a traffic priority indicator that indicates whether the data packets are realtime or non-realtime. For example, applications 15908 and 15910 may tag data packets with a Type of Service (TOS) or Differentiated Services Code Point (DSCP) in the IP header that indicates the QoS of the data packet. Classification module 15904 may therefore check the traffic priority indicators of the data packets provided by applications 15908 and 15910 to determine whether the data packets are realtime or non-realtime. In some aspects, classification module 15904 may check the traffic priority indicator of each data packet to classify each data packet as realtime traffic or non-realtime traffic. For example, certain applications may generate some data packets that are real-time traffic and other data packets that are non-realtime traffic, such as a multimedia streaming application that provides streaming traffic (realtime traffic) and signaling traffic (non-realtime traffic). Accordingly, applications 15908 and 15910 may tag each data packet with a traffic priority indicator that indicates whether each data packet is realtime or non-realtime. Classification module 15904 may then classify each data packet (regardless of the originating application) as realtime or non-realtime traffic based on the traffic priority indicator.

In some aspects, applications 15908 and 15910 may be preprogrammed as either a realtime application or a non-realtime application. Applications 15908 and 15910 may then be configured to tag each uplink data packet with a traffic priority indicator that indicates the preprogrammed traffic priority configuration. Accordingly, regardless of whether the data packet is realtime or non-realtime, applications 15908 and 15910 may tag each data as realtime or non-realtime in the traffic priority indicator based on the preprogrammed traffic priority configuration. In some aspects, classification module 15904 may therefore classify data packets in 16108 as real-time or non-realtime data based on the traffic priority indicator, which may reflect the preprogrammed traffic priority configuration of each application.

In some aspects, applications 15908 and 15910 may tag data packets with application identification information. For example, application 15908 and application 15910 may be assigned application IDs (e.g., externally, such as by an online application store, developer, or another source of the application, or locally, such as by terminal device 13602). The application ID of applications 15908 and 15910 may uniquely identify each application. Accordingly, in some aspects where classification module 15904 is configured to consider user-priority in identifying critical traffic, classification module 15904 may receive user input that identifies a user-priority application (e.g., application 15908) and identify the application ID of the user-priority application. Classification module 15904 may therefore check the application identification information tagged on data packets to determine whether the data packets originated from a user-priority application. In some aspects, classification module 15904 may store a list of application IDs of priority applications and check whether application identification information of a given data packet matches any application ID in the list. In some aspects, classification module 15904 may therefore classify data packets as user-priority or non-user priority traffic in 16108 based on application identification information tagged to the data packets.

In some aspects, applications 15908 and 15910 may tag data packets with service indicators. As indicated above, applications 15908 and 15910 may tag data packets with a service indicator such as a Type of Service (TOS) or Differentiated Services Code Point (DSCP) in the IP header. If a user has specified a user-priority service (e.g., a general class of applications), classification module 15904 may identify data packets of the user-priority service by checking service indicators such as ToS or DSCP for a given data packet to determine whether the data packet is associated with a user-priority service. For example, in some aspects where a user indicates (via user input) a user-priority service, classification module 15904 may identify a service indicator (such e.g., as one or specific ToS and/or DSCP values) that are associated with the user-priority service. When classifying traffic in 16108, classification module 15904 may compare the service indicators of a data packet to the service indicators of user-priority services. If the service indicator matches a service indicator of a user-priority service, classification 15904 may classify the data packet as critical traffic.

In some aspects, at least one of applications 15908 and 15910 may not tag data packets with metadata that indicates whether the data packets are realtime traffic and/or user-priority traffic. Classification module 15904 may therefore classify the data packets in 16108 based on other 'inferred' information. For example, classification module 15904 may evaluate the traffic profile of the data packets produced by each of applications 15908 and 15910 in order to estimate whether applications 15908 and 15910 are realtime or non-realtime applications. For example, classification module 15904 may evaluate the data plane packet inter-arrival (the time between successively arriving downlink packets) and packet inter-send (the time between successively sent uplink packets) times for applications 15908 and 15910, where realtime traffic can be expected to have low inter-arrival and inter-send times (e.g., average below some threshold) and non-realtime traffic can be expected to have higher inter-arrival and inter-send times (e.g., average above some threshold).

In the exemplary scenario introduced above regarding application 15908 and application 15910, classification module 15904 may evaluate the inter-send/arrival times for application 15908 by monitoring the data packets originating and terminating at application 15908 and evaluate the inter-send/arrival times for application 15910 by monitoring the data packets originating and terminating at application 15910. Classification module 15904 may therefore identify which application generated each data packet. After identifying the originating application of the data packets, classification module 15904 may evaluate parameters such as the inter-send/arrival times of data packets for applications 15908 and 15910 in order to obtain an inter-send and inter-arrival time measurement (e.g., an average) for each application. Classification module 15904 may then compare the inter-send and inter-arrival times to predefined thresholds to determine whether applications 15908 and 15910 are realtime applications or non-realtime applications. In the exemplary scenario introduced above, the inter-send and inter-arrival times for application 15908 may fall below the predefined threshold; consequently, classification module 15904 may classify application 15908 as a realtime application. Conversely, the inter-send and inter-arrival times for application 15910 may exceed the predefined threshold; consequently, classification module 15904 may classify application 15910 as a non-realtime application. After classifying a given application as realtime or non-realtime, classification module 15904 may apply the classification uniformly to all traffic associated with the application.

In some aspects, classification module 15904 may utilize connection endpoint information such as IP, port, and socket information to classify traffic as critical or non-critical. For example, each data connection may terminate at a socket, which may be a logical 'endpoint' of an IP connection. Each socket may be identified as a '5-tuple' that is defined by an IP source address, IP destination address, source port number, destination port number, and protocol. Classification module 15904 may therefore be able to classify the traffic received at each socket as realtime or non-realtime traffic (e.g., based on inter-send/arrival times). Classification module 15904 may then apply the realtime or non-realtime classification of a given socket to all traffic associated with the socket.

In some aspects, classification module 15904 may also utilize predefined information of port number assignments to classify realtime and non-realtime traffic. For example, certain port numbers may be associated with certain protocols or applications. For example, certain ports (by port number) may be assigned (e.g., via a predefined relationship) to email-related protocols such as Internet Message Access Protocol (IMAP), Post Office Protocol (POP), or Simple Mail Transfer Protocol (SMTP). Classification module 15904 may then be able to determine that traffic on these ports is email traffic, which may be non-realtime. Other ports may be assigned to file transfer protocols such as File Transfer Protocol (FTP), which classification module 15904 may classify as non-realtime traffic. Other ports may be assigned to realtime traffic protocols such as Real-time Transport Protocol (RTP) or Real Time Streaming Protocol (RTSP), which classification module 15904 may classify as non-realtime traffic. Other ports may be assigned to web-based traffic protocols such as HyperText Transfer Protocol (HTTP), which may be either realtime or non-realtime traffic. In some aspects, classification module 15904 may perform deeper inspection on traffic from HTTP ports in order to determine whether the traffic is realtime or non-realtime.

In some aspects, classification module 15904 may utilize predefined information of port number assignments to classify user-priority and non-user-priority traffic. As certain port numbers noted above may be associated with certain services, such as email services, file transfer services, real-time streaming services, etc. Classification module 15904 may therefore classify traffic on certain port numbers as being associated with a user-priority service (and thus user-priority traffic) if the port number is associated with a user-priority service specified by a user.

In some aspects, classification module 15904 may utilize other inferred information to classify applications 15908 and 15910 as realtime or non-realtime in 16108. For example, classification module 15904 may apply traffic pattern evaluation techniques and/or packet inspection techniques to classify applications 15908 and 15910 as realtime or non-realtime. For example, classification module 15904 may evaluate source and/or destination Access Point Names (APNs) and/or IP addresses (which may identify data networks 13904 and 13906) obtained via packet inspection and classify applications 15908 and 15910 based on which data networks applications 15908 and 15910 are communicating with. For example, certain data networks may be associated with realtime services while other data networks may be associated with non-realtime services; accordingly, classification module 15904 may classify applications 15908 and 15910 based on information about the counterpart data networks. In some aspects, classification module 15904 may utilize more advanced traffic pattern analysis, such as techniques based on heuristic approaches, machine learning, support vector machines, etc., that can classify traffic as realtime or non-realtime and/or as user-priority or non-user-priority.

In some aspects, classification module 15904 may utilize a combination of explicit information (e.g., traffic priority indicators, service indicators, port numbers, etc.) and inferred information (e.g., inter-send/arrival times, machine learning, packet inspection, etc.) in 16108 to classify the data packets of applications 15908 and 15910 as realtime or non-realtime. For example, in some aspects classification module 15904 may not be able to classify a given data packet as realtime/non-realtime or user-priority/non-user-priority based on a traffic priority indicator, service indicator, or port number associated with the packet. Classification module 15904 may then utilize inferred information to classify the data packet, such as by measuring an inter-send/arrival time associated with the data packet (e.g., on a stream of packets that includes the data packet), performing machine learning on the data packet ((e.g., on a stream of packets that includes the data packet), performing deep packet inspection on the packet, etc. Classification module 15904 may therefore utilize any such information to classify data packets as realtime/non-realtime and/or user-priority/non-user-priority.

In some aspects, classification module 15904 may perform classification in 16108 parallel to the other processes of method 16100. For example, classification module 15904 may evaluate data packets from applications 15908 and 15910 over an extended time period (e.g., to classify applications 15908 and 15910 as realtime/non-realtime and/or user-priority/non-user-priority via inferred information) which may overlap with one or more other processes of method 16100.

In some aspects, a user may also provide user input to classification module 15904 that specifies a hierarchical priority of multiple applications or services. For example, a user may provide user input that 'ranks' applications or services according to user-priority. For example, a user may specify that a first application has the highest user-priority, a second application has the second-highest user-priority, a third application has the third-highest user-priority, etc. In another example, a user may specify that that e.g., email services (e.g., email applications) are the highest priority, multimedia streaming services are the second-highest priority, etc. Classification module 15904 may therefore classify data packets in 16208 as critical or non-critical based on varying degrees of criticality. For example, in some aspects classification module 15904 may classify data packets as the most critical, other data packets as the second-most critical, other data packets as the third-most critical, etc.

Classification module 15904 may therefore have various different techniques for classifying data packets as realtime vs. non-realtime traffic and/or user-priority vs. non-user-priority traffic in 16108. In some aspects where classification module 15904 is configured to classify realtime traffic as critical traffic (and not user-priority traffic as critical traffic), classification module 15904 may only perform realtime vs. non-realtime classification and subsequently classify realtime traffic as critical traffic and non-realtime traffic as non-critical traffic in 16108. In some aspects where classification module 15904 is configured to classify user-priority traffic as critical traffic (and not realtime traffic as critical traffic), classification module 15904 may only perform user-priority vs. non-user-priority classification and subsequently classify user-priority traffic as critical traffic and non-user-priority traffic as non-critical traffic in 16108. In some aspects where classification module 15904 is configured to classify both realtime traffic and user-priority traffic as critical traffic, classification module 15904 may perform realtime vs. non-realtime classification and user-priority vs. non-user-priority classification. Classification module 15904 may then classify realtime traffic and user-priority traffic as critical traffic and non-realtime traffic and non-user-priority traffic as non-critical traffic in 16108.

After classifying data packets as realtime or non-realtime with classification module 15904 in 16108, processing module 15912 may apply traffic restrictions based on critical and non-critical data packets with traffic control module 15902 in 16110. As previously indicated, processing module 15912 may aim to reduce or manage the temperature of terminal device 13602 by restricting traffic. In order to avoid interrupting critical traffic (realtime or user priority) with such traffic restrictions, processing module 15912 may focus the traffic restriction on non-critical traffic. Accordingly, traffic control module 15902 may be configured to restrict the non-critical traffic in 16110 and avoid restricting the critical traffic.

In various aspects, traffic control module 15902 may implement the traffic restrictions with any of a variety of different techniques. In some aspects, traffic control module 15902 may determine that there is only non-critical traffic, such as if classification module 15904 classified the data packets of both applications 15908 and 15910 (e.g., all pending/waiting data packets) as non-critical traffic. Accordingly, in exemplary scenarios where there is only non-critical traffic and no critical traffic, traffic control module 15902 may enter the transmission components of terminal device 13602 (one or more of antenna system 13702, RF transceiver 13704, and baseband modem 13706) into a sleep or low-power state. If the transmission components of terminal device 13602 are already in a sleep or low-power state, traffic control module 15902 may keep the transmission components in the sleep or low-power state. Traffic control module 15902 may then buffer the non-critical traffic while the transmission components are in the sleep or low-power state, which may conserve battery power at power supply 13716. Traffic control module 15902 may therefore apply the traffic restrictions in 16110 by 'throttling' the non-critical traffic, e.g., delaying transmission of the non-critical traffic.

In some aspects, traffic control module 15902 may continue to buffer the non-critical traffic for a predefined throttling period as part of the traffic restrictions in 16110, such as in the order of milliseconds, seconds or minutes, and subsequently re-activate the transmission components to transmit the non-critical traffic after the throttling period has expired. Traffic control module 15902 may also have received and buffered further non-critical traffic during the throttling period and, after the expiry of the throttling period, may then transmit the buffered traffic. In some aspects, traffic control module 15902 may continue to periodically implement throttling periods in 16110, where traffic control module 15902 may deactivate (sleep or low-power state) the transmission components for the duration of the throttling period and buffer any further traffic. Traffic control module 15902 may then transmit the buffered traffic after each throttling period has expired and enter into another throttling period. Transmission control module 15902 may therefore employ throttling with a throttling period in the traffic restrictions of 16110.

In some aspects, traffic control module 15902 may prematurely terminate the throttling period when any critical traffic is received. For example, traffic control module 15902 may deactivate the transmission components and buffer incoming non-critical data (e.g., received from classification module 15904) during the throttling period in 16110. If traffic control module 15902 then receives data packets that are classified as critical traffic by classification module 15904, traffic control module 15902 may terminate the throttling period and transmit the buffered data non-critical traffic and the newly received critical traffic.

In some aspects, traffic control module 15902 may receive both critical and non-critical traffic from classification module 15904. Traffic control module 15902 may then focus traffic restrictions in 16110 on non-critical traffic and avoid interruption of critical traffic. For example, traffic control module 15902 may act as a scheduler and transmit critical traffic as soon as it arrives from classification module 15904. Traffic control module 15902 may therefore avoid interrupting critical traffic. However, traffic control module 15902 may restrict transmission of non-critical traffic, such as by throttling, which may consequently reduce the power consumption of terminal device 13602 on account of the reduced transmission volume. For example, in some aspects traffic control module 15902 may delay non-critical traffic for a predefined throttling period (e.g., in the order of milliseconds, seconds, or minutes), thus throttling the non-critical traffic. Traffic control module 15902 may then buffer the non-critical traffic while continuing to transmit the critical traffic, which may reduce power consumption. After the throttling period has expired, traffic control module 15902 may transmit the buffered non-critical traffic. In some aspects, traffic control module 15902 may periodically repeat the throttling period by repeatedly delaying and buffering non-critical traffic for the duration of the throttling period before transmitting the buffered non-critical data at the expiry of the throttling period.

In some aspects, traffic control module 15902 may apply the traffic restrictions in 16110 by reducing the periodicity of certain repetitive non-critical traffic (which may be another form of throttling as transmission of the non-critical traffic is delayed). For example, application 15910 may be an application that 'syncs' a counterpart server (e.g., data network 13906) in order to update application data, such as an email application, messaging application, weather application, stock trading application, etc. Such applications may periodically request sync procedures with the counterpart server. Classification module 15904 may classify such sync requests as non-critical traffic in 16108 (e.g., the requests are not realtime traffic and/or application 15910 is not a user-priority application; if application 15910 is a user-priority application, classification module 15904 may classify sync requests as critical traffic) Traffic control module 15902 may therefore throttle sync requests in order to reduce transmission volume. In some aspects, traffic control module 15902 may increase the sync period, such as only transmitting one sync request for every two sync requests received at traffic control module 15902. In some aspects, traffic control module 15902 may completely restrict periodic sync procedures by not sending any periodic sync requests. In some aspects, traffic control module 15902 may only transmit sync requests when the sync request is triggered by a user and may not transmit periodic sync requests that are triggered automatically by application 15910.

In some aspects, traffic control module 15902 may be implemented as part of controller 13710, for example as a scheduler. For example, traffic control module 15902 may implement the traffic restrictions in 16110 as part of the cellular protocol stack and accordingly may buffer and control traffic at the protocol-stack layers (e.g., MAC layer). Traffic control module 15902 may then be configured to perform throttling at the modem-level, which may enable more 'fine-grained' throttling. In some aspects, traffic control module 15902 may be implemented as part of application processor 13712. For example, traffic control module 15902 may be implemented as part of the modem driver executed by application processor 13712, and accordingly may buffer and control data traffic at the application layer. Traffic control module 15902 may then be configured to perform throttling at the application-level, which may enable more 'coarse' throttling. In some aspects, traffic control module 15902 may have access to more memory for buffering throttled data when implemented at application processor 13712 than in baseband modem 13706. In some aspects traffic control module 15902 may be partially implemented at both application processor 13712 and baseband modem 13706, and may be configured to perform application-level throttling and modem-level throttling.

In some aspects where a user provides a hierarchical priority for applications and/or services, traffic control module 15902 may apply traffic restrictions in 16110 based on the hierarchical priority. For example, classification module 15904 may classify data packets based on the hierarchical priority, e.g., most critical, second-most critical, etc. Traffic control module 15902 may then vary the level of traffic restrictions based on the criticality level in 16110. For example, traffic control module 15902 may apply the least throttling (e.g., shortest delay) to most critical traffic, the second-least throttling to the second-most critical traffic, etc., and the most throttling (e.g., longest delay) to the least critical (e.g., non-critical) traffic.

Traffic control module 15902 may therefore execute the traffic restrictions in 16110 based on the classification of data packets (by classification module 15904), which may indicate whether the data packets are critical (e.g., realtime and/or user-priority) or non-critical (e.g., non-realtime and/or non-user priority) traffic. In various aspects, traffic control module 15902 may apply throttling to non-critical traffic by delaying transmission of the non-critical traffic. As traffic control module 15902 may selectively apply traffic restrictions, e.g., by focusing the restriction on non-critical traffic while continuing to transmit critical traffic without traffic restrictions, traffic control module 15902 may reduce heat accumulation at terminal device 13602 and avoid overheating.

Terminal control module 15902 may continue to apply traffic restrictions in 16110. In some aspects, traffic control module 15902 may terminate traffic restrictions in 16110 based on input from detection module 15906. For example, detection module 15902 may continue monitoring the remaining battery power of power supply 13716 and checking whether the remaining battery power is below the battery power threshold. If the remaining battery power remains below the battery power threshold (e.g., if terminal device 13602 has not been connected to charging power supply), detection module 15906 may continue to instruct traffic control module 15902 to apply traffic restrictions. If terminal device 13602 is connected to a charging power supply, the remaining battery power of power supply 13716 may begin to rise. In some aspects, detection module 15906 may instruct traffic control module 15902 to terminate traffic restrictions as soon as power supply 13716 is charging. In some aspects, detection module 15906 may instruct traffic control module 15902 to terminate restrictions when the remaining battery power level rises above the battery power threshold. In some aspects, detection module 15906 may utilize a different battery power threshold (e.g., a deactivation battery power threshold that is higher than the activation battery power threshold) for deactivating traffic restrictions, such as for hysteresis thresholding. In some aspects, detection module 15906 may deactivate traffic restriction when the remaining battery power of power supply 13716 rises above and remains above the deactivation battery power threshold (which may the same or different from the activation battery power threshold) for a predefined deactivation period.

In some aspects, processing module 15912 may also progressively scale the level of traffic restrictions based on the remaining battery power of power supply 13716. For example, detection module 15906 may utilize multiple battery power thresholds in 16104, where each battery power threshold maps to a predefined traffic restriction level. For example, detection module 15906 may utilize e.g., three battery power thresholds and may compare the remaining battery power to the three battery power thresholds in 16104. If the remaining battery power is greater than the first battery power threshold (the highest battery power threshold), detection module 15906 may instruct traffic control module 15902 to perform normal traffic control in 16106. If the remaining battery power is less than the first battery power threshold but greater than the second battery power threshold (the middle battery power threshold), detection module 15906 may instruct traffic control module 15902 to restrict traffic at a first traffic restriction level. If the remaining battery power is less than the second battery power threshold but greater than the third battery power threshold (the lowest battery power threshold), detection module 15906 may instruct traffic control module 15902 to restrict traffic at a second traffic restriction level. If the remaining battery power is less than the third battery power threshold, detection module 15906 may instruct traffic control module 15902 to restrict traffic at a third traffic restriction level. The number of battery power thresholds and restriction levels is exemplary and may be scalable to any number.

The traffic restriction levels may progress in terms of restrictiveness (the specifics may be configurable). For example, the first traffic restriction level may throttle (e.g., delay) non-realtime traffic for a first throttling period, the second traffic restriction level may throttle non-realtime traffic for a second throttling period, and the third traffic restriction level may throttle non-realtime traffic for a third throttling period, where the third throttling period may be the longest throttling period and the first throttling period may be the shortest throttling period. Processing module 15912 may therefore progressively restrict non-realtime traffic to a greater degree as the temperature of terminal device 13602 increases.

In some aspects, traffic control module 15902 may also apply the traffic restriction levels to critical traffic. For example, the second or third traffic restriction level may also throttle critical traffic by a throttling period (that is e.g., less than the throttling period for non-critical traffic, which may therefore focus the traffic restrictions on non-critical traffic). In some aspects detection module 15906 may use a battery power threshold that may be a cutoff threshold that indicates that there is very low battery power (e.g., terminal device 13602 may be in danger of shutting down and/or undervoltage conditions that occur during peak battery current transients due to resistive losses on power supply lines). If the remaining battery power falls below the cutoff threshold, detection module 15906 may instruct traffic control module 15902 to apply traffic restrictions (throttling) to both critical and non-critical traffic. In some aspects, processing module 15912 may utilize a continuous range instead of the discrete range provided by the battery power thresholds, where the restriction levels applied by traffic control module 15902 may progressively increase in a continuous manner with temperature.

Processing module 15912 may therefore apply traffic restrictions until power supply 13716 runs out of power, until power supply 13716 is connected to a charging power supply, or until power supply 13716 is connected to a charging power supply and the remaining battery power exceeds a threshold. In some aspects, processing module 15912 may continue to repeat method 16100 (e.g., indefinitely or for a definite time period) and may cycle between activating and deactivating traffic restrictions based on whether the remaining battery power of terminal device 13602 is less than or greater than one or more battery power thresholds (e.g., a single activation/deactivation threshold or an activation and deactivation threshold pair).

In some aspects, terminal device 13602 may be configured to implement method 16000 and not be configured to implement method 16100. In some aspects, terminal device 13602 may be configured to implement method 16100 and not be configured to implement method 16000.

In some aspects, terminal device 13602 may be configured to consider both temperature and remaining battery power in applying traffic restrictions. FIG. 162 shows method 16200, which processing module 15912 may apply to restrict traffic based on remaining battery and temperature in accordance with some aspects. As shown in FIG. 162, detection module 15906 may monitor remaining battery power and temperature in 16202. Detection module 15906 may therefore track the remaining battery power and the temperature of terminal device 13602 over time. Detection module 15906 may compare the remaining battery power and temperature respectively to a battery power threshold and a temperature threshold in 16204 to determine whether terminal device 13602 is power- or temperature-constrained. In some aspects, detection module 15906 may determine in 16204 whether terminal device 13602 is both power-constrained and thermal constrained, such as if the remaining battery power is less than the battery power threshold and the temperature is greater than the temperature threshold. Processing module 15912 may then proceed to 16206 to apply normal traffic control with traffic control module 15902 if terminal device 13602 is not both power-constrained and thermal-constrained. If detection module 15906 determines that terminal device 13602 is both power-constrained and thermal-constrained in 16204, processing module 15912 may continue to 16208.

In some aspects, detection module 15906 may determine in 16204 whether terminal device 13602 is at least one of power-constrained or thermal-constrained in 16204, such as if the remaining battery power is less than the battery power threshold or if the temperature is greater than the temperature threshold. If one or both of the power-constrained and thermal-constrained threshold criteria are met, processing module 15912 may continue to 16208. If terminal device 13602 is neither power-constrained nor thermal-constrained, processing module 15912 may proceed to 16206 to apply normal traffic control with traffic control module 15902 if terminal device 13602. If terminal 13602 is one or both of power-constrained or thermal-constrained, processing module 15912 may continue to 16208.

Detection module 15906 may therefore perform 16204 based on whether terminal device 13602 is power-constrained and thermal-constrained, or based on whether terminal device 13602 is power-constrained or thermal-constrained. Classification module 16208 may then classify data packets as critical or non-critical traffic (e.g., realtime/non-realtime and/or user-priority/non-user-priority), and may utilize any of the techniques previously detailed regarding 16008 and 16108. Traffic control module 15902 may then apply traffic restrictions to critical and non-critical traffic in 16210. In some aspects, traffic control module 15902 may apply traffic restrictions in 16210 that are fixed regardless of the remaining battery power or temperature, e.g., that do not progressively scale based on a discrete or continuous range. In some aspects, traffic control module 15902 may apply traffic restrictions in 16210 that progressively scale based on the remaining battery power or temperature. For example, if terminal device 13602 is only one of power-constrained or thermal-constrained, traffic control module 15902 may apply one-dimensional progressive scaling as detailed above regarding 16010 (discrete or continuous progressive scaling based on temperature) or 16110 (discrete or continuous progressive scaling based on remaining batter power). If terminal device 13602 is both power-constrained and thermal constrained, traffic control module 15902 may apply two-dimensional progressive scaling. For example, in some aspects traffic control module 15902 may utilize a two-dimensional lookup table that receives remaining battery power and temperature as inputs and produces a traffic restriction level (for one or both of realtime and non-realtime traffic) as output. The lookup table may be predefined and/or preprogrammed at traffic control module 15902. As the lookup table may produce traffic restriction levels based on remaining battery power and temperature, the traffic restriction levels provided as output may vary based on remaining battery power and temperature, where higher remaining battery power and lower temperatures may generally yield less restrictive traffic restrictions (e.g., shorter throttling periods) and lower remaining battery power and higher temperatures may generally yield more restrictive traffic restrictions (e.g., longer throttling periods).

Processing module 15912 may therefore apply thermal-constrained traffic restrictions (method 16000), power-constrained traffic restrictions (16100), or thermal- and power-constrained traffic restriction (method 16200; with traffic restrictions based on both remaining battery power and temperature or based on at least one of remaining battery power and temperature). The configurations of processing module 15912 may therefore provide a mechanism for terminal device 13602 to reduce or manage temperature in overheating scenarios and/or to reduce or manage power consumption in low battery power scenarios. Various aspects may therefore avoid overheating, potential electronic damage from overheating, and user discomfort from overheating when applied in thermal-constrained scenarios. These aspects may reduce power consumption and extend battery life when applied in power-constrained scenarios.

FIG. 163 shows an exemplary functional diagram according to some aspects. As shown in FIG. 163, processing module 16302 may include applications 16304, user-experience (UX)-driven classification module 16306, networking stack module 16308, modem queues/scheduler module 16310, modem TX/RX module 16312, and throttling control module 16314. Processing module 16302 may interact with TX/RX module 16316, sensors 16318, and platform power state tracking module 16320. In some aspects, processing module 16302 may include controller 13710 and application processor 13712; accordingly, one or more of applications 16304, user-experience (UX)-driven classification module 16306, networking stack module 16308, modem queues/scheduler module 16310, and throttling control module 16314 may be a baseband controller or application processor component. Applications 16304, user-experience (UX)-driven classification module 16306, networking stack module 16308, modem queues/scheduler module 16310, modem TX/RX module 16312, and throttling control module 16314 may be implemented as hardware-defined and/or software-defined modules. FIG. 163 illustrates processing module 16302 on a functional level; consequently, one or more of the components of processing module 16302 may be integrated into a common hardware and/or software element.

Applications 16304 may be applications executed on application processor 13712 of terminal device 13602. Applications 16304 may therefore generate application-layer data for uplink transmission. Applications 16304 may provide the application-layer traffic to UX-driven classification module 16306. UX-driven classification module 16306 may then classify the traffic from applications 16304 as critical or non-critical traffic. In some aspects, UX-driven classification module 16306 may be configured in the manner of classification module 15904. In some aspects, UX-driven classification module 16306 may classify the traffic based on whether the traffic is realtime traffic or non-realtime traffic. In some aspects, UX-driven classification module 16306 may classify the traffic based on whether the traffic is user-priority or non-user priority, which a user of terminal device 13602 may provide via user input, e.g., user-priority applications and/or user-priority services. In some aspects, UX-driven classification module 16306 may classify the traffic based on a hierarchical priority, such as where a user of terminal device 13602 may provide a 'ranking' of applications and/or services according to user-priority. UX-driven classification module 16306 may also classify the traffic based on actual QoS feedback provided by throttling control module 16314.

UX-driven classification module 16306 may generate classification metadata for data packets that indicates the criticality (e.g., critical, non-critical, or criticality level) of the data. UX-driven classification module 16306 may provide the classification metadata to throttling control module 16314 and networking stack module 16308. UX-driven classification module 16306 may then provide the traffic to networking stack module 16306, which may be uplink traffic. As shown in FIG. 163, UX-driven classification module 16306 may also receive downlink traffic from networking stack module 16308. In some aspects, UX-driven classification module 16306 may evaluate the downlink traffic in order to assist in classifying uplink traffic provided by applications 16304. For example, UX-driven classification module 16306 may utilize the downlink traffic to obtain inferred information that may assist in classifying uplink traffic, such as in determining inter-send/arrival times, checking port numbers, performing deep packet inspection, etc. (e.g., in the manner of classification module 15904).

Networking stack module 16308 may be configured to apply network stack protocols on downlink and uplink traffic. For example, networking stack module 16308 may apply TCP/IP protocols to uplink and downlink traffic. Networking stack module 16308 may then provide the traffic to modem queues/scheduler module 16310 along with the classification metadata.

Modem queues/scheduler module 16310 may be configured to manage traffic queues and perform scheduling for uplink and downlink traffic from terminal device 13602. Modem queues/scheduler module 16310 may be configured to transmit uplink traffic under the control of throttling control module 16314, which may render throttling decisions and instruct modem queues/scheduler module 16310 to transmit uplink traffic according to the throttling decisions. Modem queues/scheduler module 16310 may provide uplink traffic according to the queues and scheduling to modem TX/RX module 16312, which may perform uplink processing and transmit the uplink traffic via TX/RX module 16316 (e.g., RF transceiver 13704 and antenna system 13702). Modem TX/RX module 16312 may also perform downlink processing on downlink traffic received via TX/RX module 16316 and provide the downlink traffic to modem queues/scheduler module 16310.

Throttling control module 16314 may be configured to receive input from UX-driven classification module 16306, sensors and inputs 16318 (e.g., sensor 13718 and/or power supply 13716), platform power state tracking module 16320, and modem TX/RX module 16312. In some aspects, throttling control module 16314 may be configured in the manner of detection module 15906. Throttling control module 16314 may evaluate one or more of the inputs and determine whether to perform traffic restrictions and, if so, determine the level of traffic restrictions. Throttling control module 16314 may provide instructions to modem queues/scheduler module 16310, which may be configured to enforce the traffic restrictions, such as by applying throttling to traffic.

In some aspects, throttling control module 16314 may monitor the temperature and/or remaining battery power of terminal device 13602 and apply the temperature and/or remaining battery power to render throttling decisions. For example, throttling module 16314 may receive temperature measurements from sensors and inputs 16318 (e.g., sensor 13718) and/or remaining battery power levels from sensors and inputs 16318 (e.g., power supply 13716). Throttling control module 16314 may then determine whether to institute throttling based on the temperature and/or remaining battery power. In some aspects, throttling control module 16314 may be configured to render throttling decisions based on temperature and/or remaining battery power in the manner detailed above regarding traffic control module 15902 and/or detection module 15906.

In some aspects, throttling control module 16314 may also consider input from platform power state tracking module 16320 in rendering throttling decisions. The platform power state may indicate the current consumption of terminal device 13602. For example, when a cover of terminal device 13602 (e.g., a screen cover) is open and/or a display of terminal device 13602 is on, the power consumption of terminal device 13602 may be significantly higher (e.g., several watts) than when the cover is closed and the display is off. In another example, baseband modem 13706 may have different power states, which may depend on whether baseband modem 13706 is in radio connected state, whether baseband modem 13706 is actively transmitting or receiving, etc. Throttling control module 16314 may consider such scenarios when rendering throttling decisions. For example, when the display is on, baseband modem 13706 may be actively transmitting and receiving. When the display is off, baseband modem 13706 may keep applications 16304 updated by periodically accessing the network and waking up for event triggers (e.g., messaging, voice calls, text messages, geofencing wake-up event, etc.).

In some aspects, throttling control module 16314 may also consider radio metadata from modem TX/RX module 16312. For example, modem TX/RX module 16312 may provide radio metadata that indicates radio conditions and radio states. For example, modem TX/RX module 16312 may provide radio measurements (e.g., signal strength measurements, signal quality measurements, signal-to-noise ratio (SNR) measurements, etc.) to throttling control module 16314 that indicate radio conditions. Modem TX/RX module 16312 may also specify the current radio state (e.g., radio connected state, radio idle state, etc.) to throttling control module 16314.

Throttling control module 16314 may therefore consider various inputs from sensors and inputs 16318, platform power state tracking module 16320, and modem TX/RX module 16312 in rendering throttling decisions for modem queues/scheduler module 16310 to execute. In some aspects, throttling control module 16314 may apply a cost metric to evaluate whether to institute throttling at modem queues/scheduler module 16310. For example, throttling control module 16314 may consider the various inputs and evaluate the potential power cost to terminal device 13602 if modem queues/scheduler module 16310 institutes throttling. For example, in some aspects throttling control module 16314 may evaluate whether terminal device 13602 is close to temperature overheating limits (e.g., based on temperature measurements from input from sensors and inputs 16318 and an overheating threshold), throttling control module 16314 may determine that there is a high power cost for transmitting data and may consequently throttle traffic at modem queues/scheduler module 16310. In some aspects, throttling control module 16314 may evaluate whether terminal device 13602 is close to low-battery (or brown-out) limits (e.g., based on remaining battery power levels from sensors and inputs 16318 and a battery power threshold). If throttling control module 16314 determines that terminal device 13602 is close to low-battery, throttling control module 16314 may determine that there is a high power cost for transmitting data and may consequently throttle traffic at modem queues/scheduler module 16310.

In some aspects throttling control module 16314 may evaluate whether modem TX/RX module 16312 is in a low power-usage state as part of the cost metric, such as a radio idle state (e.g., Radio Resource Control (RRC) idle) or a discontinuous reception (DRX, including Connected DRX (C-DRX)) state. For example, if throttling control module 16314 determines that modem TX/RX module 16312 is currently in a low power-usage state (e.g., based on input from modem TX/RX state 16312 and/or platform power state tracking module 16320) and that only low criticality traffic (e.g., non-critical traffic such as non-realtime or non-user-priority traffic or traffic assigned a low criticality level) is pending at modem queues/scheduler module 16310, throttling control module 16314 may instruct modem queues/scheduler 16310 to throttle the pending traffic. Modem TX/RX module 16312 may therefore remain in the low power-usage state. In some aspects, throttling control module 16314 may instruct modem queues/scheduler 16310 to throttle non-critical traffic and, if there is critical traffic or critical traffic arrives from networking stack 16308, to schedule and transmit critical traffic (which may include taking modem TX/RX module 16312 out of the low-low power-usage).

In some aspects, throttling control module 16314 may evaluate radio conditions provided by modem TX/RX module 16312 as part of the metric. For example, throttling control module 16314 may evaluate radio measurements provided by modem TX/RX module 16312 to determine whether modem TX/RX module 16312 is operating under poor radio conditions. As poor radio conditions may yield a low probability of successful transmission, modem TX/RX module 16312 may need to execute multiple retransmissions in order to successfully transmit data. More retransmissions may increase power usage. As a result, throttling control module 16314 may determine that there is a high power cost for transmitting data. Throttling control module 16314 may therefore instruct modem queues/scheduler module 16310 to throttle traffic.

As detailed above regarding traffic control module 15902, in some aspects throttling control module 16314 may consider the criticality of traffic in the cost metric. Throttling control module 16314 may therefore consider classification metadata provided by UX-driven classification module 16306 that indicates the criticality of data. For example, in some aspects, if throttling control module 16314 determines that modem TX/RX module 16312 is already active (e.g., radio connected state) and critical data (classified by UX-driven classification module 16306) is pending at modem queues/scheduler module 16310, throttling control module 16314 may determine that there is a low power cost to transmit data. Accordingly, throttling control module 16314 may instruct modem queues/scheduler module 16310 to transmit data. In some aspects, throttling control module 16314 may instruct modem queues/scheduler module 16310 to transmit the critical traffic but throttle other non-critical traffic.

Throttling control module 16314 may be configured to quantitatively evaluate the cost metric based on one or more of criticality classification (e.g., realtime and/or user-priority), temperature, battery power, power states, and radio conditions. For example, in some aspects, throttling control module 16314 may calculate the cost metric based on one or more of these inputs and, based on the cost metric, trigger throttling of traffic at modem queues/scheduler module 16310.

Different architectural configurations of processing module 16302 are within the scope of this disclosure. In some aspects, modem queues/scheduler module 16310 may be implemented as part of baseband modem 13706, and may queue, schedule, and throttle traffic at the modem level. In some aspects, modem queues/scheduler module 16310 may be implemented as part of application processor 13712 and may queue, schedule, and throttle traffic at the application-level. For example, modem/queues scheduler module 16310 may be part of a modem driver for baseband modem 13706 executed at application processor 13712, and may throttle traffic by buffering the traffic at the modem driver. In some aspects, implementing modem queues/scheduler module 16310 at application processor 13712 may be advantageous due to the greater memory capacity available at application processor 13712 compared to baseband modem 13706. Accordingly, modem queues/scheduler module 16310 may have a greater capacity to buffer traffic during throttling when implemented at application processor 13712. In some aspects, implementing modem queues/scheduler module 16310 at baseband modem 13706 may be advantageous as modem queues/scheduler module 16310 may be able to perform more 'fine-grained' throttling. In particular, instead of throttling application-level traffic, modem queues/scheduler module 16310 may be able to throttle modem-level traffic (e.g., at the MAC layer). In some aspects where modem queues/scheduler module 16310 is implemented at application processor 13712, modem TX/RX module 16312 may feed radio metadata back to throttling control module 16314, which may be implemented at application processor 13712 (or alternatively, if throttling control module 16314 is implemented at baseband modem 13706, UX-driven classification module 16306 may need to provide the classification metadata to baseband modem 13706). In some aspects where modem queues/scheduler module 16310 is implemented at baseband modem 13706, throttling control module 16314 (which may be implemented at application processor 13712) may feed throttling instructions to modem queues/scheduler module 16310 at modem 13706 (or alternatively, if throttling control module 16314 is implemented at baseband modem 13706, UX-driven classification module 16306 may provide the classification metadata to baseband modem 13706). In some aspects, modem queues/scheduler module 16310 may be implemented partially at application processor 13712 and baseband modem 13706. For example, an application-level section of modem queues/scheduler module 16310 may perform throttling at the application level, e.g., by buffering and throttling traffic at a modem driver, while a modem-level section of modem queues/scheduler module 16310 may perform throttling at the modem level, e.g., by buffering and throttling traffic in the modem (e.g., at the MAC layer). The specific implementation of processing module 16302 may therefore be a system design issue and may vary depending on a variety of factors, including platform type (e.g., IoT and machine-to-machine (M2M) usage vs. client device usage such as PCs, tablets, smartphones, etc.).

These aspects may therefore provide aspects to trigger selective traffic throttling in response to power-constrained and/or thermal-constrained scenarios. Some aspects may identify realtime and/or user-priority traffic as critical traffic and non-realtime and/or non-user-priority traffic as non-critical traffic. These aspects may then focus throttling on the non-critical traffic by throttling the non-critical traffic more than the critical traffic.

FIG. 164 shows method 16400 of performing radio communications in accordance with some aspects. As shown in FIG. 164, method 16400 includes determining that a terminal device is in a critical scenario based on a battery power or a temperature measurement of the terminal device (16410), classifying data from one or more applications of the terminal device into critical traffic and non-critical traffic based on whether the data is user-priority traffic or realtime traffic (16420), throttling the non-critical traffic relative to the critical traffic while the terminal device is in the critical scenario (16430), and terminating the throttling of the non-critical traffic in response to the terminal device exiting the critical scenario (16440).

5 Enhanced Communication

FIG. 165 shows radio communication network 16500 in accordance with some aspects, which may include terminal devices 16502 and 16504 in addition to network access nodes 16510 and 16512. Although certain aspects of this disclosure may describe certain radio communication network setting (such as an LTE, UMTS, GSM, other 3$^{rd}$ Generation Partnership Project (3GPP) networks, WLAN/Wi-Fi, Bluetooth, 5G, mmWave, etc.), the subject matter detailed herein is considered demonstrative in nature and may therefore be analogously applied to any other radio communication network, including other technologies either already developed or to be developed. The number of network access nodes and terminal devices in radio communication network 16500 is exemplary and is scalable to any amount.

Accordingly, in an exemplary cellular setting network access nodes 16510 and 16512 may be base stations (e.g., eNodeBs, NodeBs, Base Transceiver Stations (BTSs), etc.) while terminal devices 16502 and 16504 may be cellular terminal devices (e.g., Mobile Stations (MSs), User Equipments (UEs), etc.). Network access nodes 16510 and 16512 may therefore interface (e.g., via backhaul interfaces) with a cellular core network such as an Evolved Packet Core (EPC, for LTE), Core Network (CN, for UMTS), or other cellular core network, which may also be considered part of radio communication network 16500. The cellular core network may interface with one or more external data networks. In an exemplary short-range setting, network access node 16510 and 16512 may be access points (APs, e.g., WLAN or Wi-Fi APs) while vehicles or terminal device 16502 and 16504 may be short range terminal devices (e.g., stations (STAs)). Network access nodes 16510 and 16512 may interface (e.g., via an internal or external router) with one or more external data networks.

Network access nodes 16510 and 16512 (and other network access nodes of radio communication network 16500 not explicitly shown in FIG. 165) may accordingly provide a radio access network to terminal devices 16502 and 16504 (and other terminal devices of radio communication network 16500 not explicitly shown in FIG. 165). In an exemplary cellular setting, the radio access network provided by network access nodes 16510 and 16512 may enable terminal devices 16502 and 16504 to wirelessly access the core network via radio communications. The core network may provide switching, routing, and transmit for traffic data related to terminal devices 16502 and 16504 and may provide access to various internal (e.g., control nodes, other terminal devices on radio communication network 16500, etc.) and external data networks (e.g., data networks providing voice, text, multimedia (audio, video, image), and other Internet and application data). In an exemplary short-range setting, the radio access network provided by network access nodes 16510 and 16512 may provide access to internal (e.g., other terminal devices connected to radio communication network 16500) and external data networks (e.g., data networks providing voice, text, multimedia (audio, video, image), and other Internet and application data).

The radio access network and core network (if applicable) of radio communication network 16500 may be governed by network protocols that may vary depending on the specifics of radio communication network 16500. Such network protocols may define the scheduling, formatting, and/or routing of both user and control data traffic through radio communication network 16500, which includes the transmission and reception of such data through both the radio access and core network domains of radio communication network 16500. Accordingly, terminal devices 16502 and 16504 and network access nodes 16510 and 16512 may follow the defined network protocols to transmit and receive data over the radio access network domain of radio communication network 16500 while the core network may follow the defined network protocols to route data within and outside of the core network. Exemplary network protocols include LTE, UMTS, GSM, WiMAX, Bluetooth, Wi-Fi, mmWave, etc., any of which may be applicable to radio communication network 16500.

FIG. 166 shows an exemplary internal configuration of terminal device 16502 in accordance with some exemplary aspects, which may include antenna system 16602, radio frequency (RF) transceiver 16604, baseband modem 16606 (including physical layer processing module 16608 and controller 16610), application processor 16612, memory 16614, and power supply 16616. Vehicle or terminal device 16502 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identify module(s) (SIMs), user input/output (I/O) devices (display(s), keypad(s), touchscreen(s), speaker(s), external button(s), camera(s), microphone(s), etc.), etc.

Vehicle or terminal device 16502 may transmit and receive radio signals on one or more radio access networks. Baseband modem 16606 may direct such communication functionality of terminal device 16502 according to the communication protocols associated with each radio access network, and may execute control over antenna system 16602 and RF transceiver 16604 in order to transmit and receive radio signals according to the formatting and scheduling parameters defined by each communication protocol. Although various practical designs may include separate communication components for each supported radio access technology (e.g., a separate antenna, RF transceiver, physical layer processing module, and controller), for purposes of conciseness the configuration of terminal device 16502 shown in FIG. 166 depicts only a single instance of each such components.

Vehicle or terminal device 16502 may transmit and receive radio signals with antenna system 16602, which may be a single antenna or an antenna array include multiple antennas and may additionally include analog antenna combination and/or beamforming circuitry. In the receive path (RX), RF transceiver 16604 may receive analog radio frequency signals from antenna system 16602 and perform analog and digital RF front-end processing on the analog radio frequency signals to produce digital baseband samples (e.g., In-Phase/Quadrature (IQ) samples) to provide to baseband modem 16606. RF transceiver 16604 may accordingly include analog and digital reception components including amplifiers (e.g., a Low Noise Amplifier (LNA)), filters, RF demodulators (e.g., an RF IQ demodulator)), and analog-to-digital converters (ADCs) to convert the received radio frequency signals to digital baseband samples. In the transmit path (TX), RF transceiver 16604 may receive digital baseband samples from baseband modem 16606 and perform analog and digital RF front-end processing on the digital baseband samples to produce analog radio frequency signals to provide to antenna system 16602 for wireless transmission. RF transceiver 16604 may thus include analog and digital transmission components including amplifiers (e.g., a Power Amplifier (PA), filters, RF modulators (e.g., an RF IQ modulator), and digital-to-analog converters (DACs) to mix the digital baseband samples received from baseband modem 16606 to produce the analog radio frequency signals for wireless transmission by antenna system 16602. Baseband modem 16606 may control the RF transmission and reception of RF transceiver 16604, including specifying the transmit and receive radio frequencies for operation of RF transceiver 16604.

As shown in FIG. 166, baseband modem 16606 may include physical layer processing module 16608, which may perform physical layer (Layer 1) transmission and reception processing to prepare outgoing transmit data provided by controller 16610 for transmission via RF transceiver 16604 and prepare incoming received data provided by RF transceiver 16604 for processing by controller 16610. Physical layer processing module 16608 may accordingly perform one or more of error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Although not explicitly shown in FIG. 166, physical layer processing module 16608 may include a physical layer controller configured to control the various hardware and software processing components of physical layer processing module 16608 in accordance with physical layer control logic defined by the communications protocol for the relevant radio access technologies. Furthermore, while physical layer processing module 16608 is depicted as a single component in FIG. 166, physical layer processing module 16608 may collectively include separate sections of physical layer processing components where each respective section is, for example, dedicated to the physical layer processing of a particular radio access technology.

Vehicle or terminal device 16502 may be configured to operate according to one or more radio access technologies, which may be directed by controller 16610. Controller 16610 may thus be responsible for controlling the radio communication components of terminal device 16502 (antenna system 16602, RF transceiver 16604, and physical layer processing module 16608) in accordance with the communication protocols of each supported radio access technology, and accordingly may represent the Access Stratum and Non-Access Stratum (NAS) (also encompassing Layer 2 and Layer 3) of each supported radio access technology. Controller 16610 may be structurally embodied as a protocol processor configured to execute protocol software (retrieved from a controller memory) and subsequently control the radio communication components of terminal device 16502 in order to transmit and receive communication signals in accordance with the corresponding protocol control logic defined in the protocol software.

Controller 16610 may therefore be configured to manage the radio communication functionality of terminal device 16502 in order to communicate with the various radio and core network components of radio communication network 16500, and accordingly may be configured according to the communication protocols for multiple radio communication networks. In some aspects, controller 16610 may be configured according to multiple cellular radio communication technologies, e.g., according to LTE, UMTS, and GSM. In some aspects, controller 16610 may be configured according to cellular radio communication technologies and short-range radio communication technologies, such as at least one of Wi-Fi or Bluetooth and at least one of LTE, UMTS, and GSM. Controller 16610 may either be a unified controller that is collectively responsible for all supported radio access technologies (e.g., LTE, UMTS, GSM, Bluetooth, Wi-Fi, etc.) or may include multiple separate controllers where each controller is a dedicated controller for a particular radio access technology (e.g., a dedicated LTE controller, a dedicated UMTS controller, a dedicated GSM controller, a dedicated Wi-Fi controller, a dedicated Bluetooth controller). Regardless, controller 16610 may be responsible for directing radio communication activity of terminal device 16502 according to the communication protocols of the supported radio communication networks. As previously noted regarding physical layer processing module 16608, one or both of antenna system 16602 and RF transceiver 16604 may similarly be partitioned into multiple dedicated components that each respectively correspond to one or more of the supported radio access technologies. Depending on the specifics of each such configuration and the number of supported radio access technologies, controller 16610 may be configured to control the radio communication operations of terminal device 16502 in accordance with a master/slave RAT hierarchical or multi-SIM scheme.

Vehicle or terminal device 16502 may also include application processor 16612, memory 16614, and power supply 16612. Application processor 16612 may be a CPU configured to execute various applications and/or programs of terminal device 16502 at an application layer of terminal device 16502, such as an operating system (OS), a user interface (UI) for supporting user interaction with terminal device 16502, and/or various user applications. The application processor may interface with baseband modem 16606 as an application layer to transmit and receive user data such as voice data, audio/video/image data, messaging data, application data, basic Internet/web access data, etc., over the radio network connection(s) provided by baseband modem 16606. Although shown separately in FIG. 166, this distinction highlights the differences between baseband modem 16606 and application processor 16612 on a functional level. Accordingly, in some aspects baseband modem 16606 and application processor 16612 may be structurally separate, e.g., a separate baseband modem 16606 and a separate application processor 16612. In some aspects, baseband modem 16606 and application processor 16612 may be structurally integrated, such as an integrated baseband modem/application processor 16606/16612.

Memory 16614 may embody a memory component of terminal device 16502, such as a hard drive or another such permanent memory device. Although not explicitly depicted in FIG. 166, the various other components of terminal device 16502 shown in FIG. 166 may additionally each include integrated permanent and non-permanent memory components, such as for storing software program code, buffering data, etc.

Power supply 16616 may be an electrical power source that provides power to the various electrical components of terminal device 16502. Depending on the design of terminal device 16502, power supply 16616 may be a 'finite' power source such as a battery (rechargeable or disposable) or an 'indefinite' power source such as a wired electrical connection. Operation of the various components of terminal device 16502 may thus pull electrical power from power supply 16616.

vehicle or terminal devices 16502 and 16504 may execute mobility procedures to connect to, disconnect from, and switch between available network access nodes of the radio access network of radio communication network 16500. As each network access node of radio communication network 16500 may have a specific coverage area, terminal devices 16502 and 16504 may be configured to select and re-select between the available network access nodes in order to maintain a strong radio access connection with the radio access network of radio communication network 16500. For example, terminal device 16502 may establish a radio access connection with network access node 16510 while terminal device 16504 may establish a radio access connection with network access node 16512. In the event that the current radio access connection degrades, terminal devices 16502 or 16504 may seek a new radio access connection with another network access node of radio communication network 16500; for example, terminal device 16504 may move from the coverage area of network access node 16512 into the coverage area of network access node 16510. As a result, the radio access connection with network access node 16512 may degrade, which terminal device 16504 may detect via radio measurements such as signal strength or signal quality measurements of network access node 16512. Depending on the mobility procedures defined in the appropriate network protocols for radio communication network 16500, terminal device 16504 may seek a new radio access connection (which may be triggered at terminal device 16504 or by the radio access network), such as by performing radio measurements on neighboring network access nodes to determine whether any neighboring network access nodes can provide a suitable radio access connection. As terminal device 16504 may have moved into the coverage area of network access node 16510, terminal device 16504 may identify network access node 16510 (which may be selected by terminal device 16504 or selected by the radio access network) and transfer to a new radio access connection with network access node 16510. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

FIG. 167 shows an exemplary internal configuration of a network access node such as network access node 16510 in accordance with some aspects. As shown in FIG. 167, network access node 16510 may include antenna system 16702, radio module 16704, and communication module 16706 (including physical layer module 16708 and control module 16710). Network access node 16510 may transmit and receive radio signals via antenna system 16702, which may be an antenna array including one or more antennas. Radio module 16704 may perform transmit and receive RF processing to convert outgoing digital data from communication module 16706 into analog RF signals to provide to antenna system 16702 for radio transmission and to convert incoming analog RF signals received from antenna system 16702 into digital data to provide to communication module 16706. Physical layer module 16708 may be configured to perform physical layer reception processing on digital data received from radio module 16704 to provide to control module 16710 and to perform physical layer transmission processing on digital data received from control module 16710 to provide to radio module 16704. Control module 16710 may control the communication functionality of network access node 16510 according to the corresponding radio access protocols, e.g., LTE, which may include exercising control over antenna system 16702, radio module 16704, and physical layer module 16708. Each of radio module 16704, physical layer module 16708, and control module 16710 may be structurally realized as a hardware-defined module, e.g., as one or more dedicated hardware circuits or FPGAs, as a software-defined module, e.g., as one or more processors executing program code that define arithmetic, control, and I/O instructions (e.g., software and/or firmware) stored in a non-transitory computer-readable storage medium, or as a mixed hardware-defined and software-defined module. In some aspects, radio module 16704 may be a radio transceiver including digital and analog radio frequency processing and amplification components. In some aspects, radio module 16704 may be a software-defined radio (SDR) component that includes a processor configured to execute software-defined instructions that specify radio frequency processing routines. In some aspects, physical layer module 16708 may include a processor and one or more hardware accelerators, wherein the processor is configured to control physical layer processing and offload certain processing tasks to the one or more hardware accelerators. In some aspects, control module 16710 may be a controller configured to execute software-defined instructions that specify upper-layer control functions. In some aspects, control module 16710 may be limited to radio communication protocol stack layer functions, while in other aspects control module 16710 may also be responsible for transport, internet, and application layer functions.

Network access node 16510 may interface with a core network and/or internet networks (directly/via a router or via the core network), which may be through a wired or wireless interface. Network access node 16510 may also interface with other network access nodes over a wired or wireless interface. Network access node 17002 may thus provide the conventional functionality of network access nodes in radio communication networks by providing a radio access network to enable served terminal devices to access desired communication data.

Radio communication networks or communication paths through such networks may be highly dynamic due to a variety of factors that impact radio communications. For example, terminal devices 16502 and 16504 may move (e.g., by a user) to various different positions relative to network access nodes 16510 and 16512, which may affect the relative distances and radio propagation channels between terminal devices 16502 and 16504 and network access node 16510 and 16512. The radio propagation channels may also vary due to factors unrelated to mobility such as interference, moving obstacles, and atmospheric changes. Additionally, local conditions at terminal device 16502 and 16504, such as battery power, the use of multiple radio access technologies, varying user activity and associated data traffic demands, etc., may also impact radio communication. Radio communications may also be affected by conditions at network access nodes 16510 and 16512 in addition to the underlying core network, such as network load and available radio resources.

As previously indicated, in some aspects network access nodes 16510 and 16512 may interface with a core network e.g., to enable communication between terminal devices connected to different radio communication networks, for vehicles and terminal devices enable the access to cloud services, let vehicles and terminal devices benefit from high throughput of wireline core networks, etc. FIG. 168 shows an exemplary configuration in accordance with some aspects where network access node 16510 interfaces with core network 16802, which may be a cellular core network. Core network 16802 may provide a variety of functions for operation of radio communication network 16500, such as data routing, authenticating and managing users/subscribers, interfacing with external networks, and various network control tasks. Core network 16802 may therefore provide an infrastructure to route data between terminal device 16502 and various external networks such as data network 16804 and data network 16806. Accordingly, terminal device 16502 may rely on the radio access network provided by network access node 16510 to wirelessly transmit and receive data with network access node 16510, which may then provide the data to core network 16802 for further routing to external locations such as data networks 16804 and 16806 (which may be packet data networks (PDNs), or circuit-switched networks, or virtual circuit-switched networks, or hybrid packet-switched and circuit-switched networks, or internet servers, etc.). Vehicle or terminal device 16502 may therefore establish a data connection with data network 16804 and/or data network 16806 that relies on network access node 16510 and core network 16802 for data transfer and routing.

5.1 Enhanced Communication #1

Power consumption may be an important consideration for terminal devices. For example, in some aspects terminal devices such as terminal device 16502 may operate on battery power, such as where power supply 16616 is a battery. Vehicle or terminal device 16502 may expend power in performing uplink and downlink communications, e.g., for uplink radio transmissions and processing-intensive decoding and demodulation during downlink communications. Vehicle or terminal device 16502 may also expend power for non-communication related purposes, such as to support various applications and services at application processor 16612. As power supply 16616 may be finite or battery charging is limited e.g., using photovoltaic cells, etc., terminal device 16502 may gradually drain the remaining battery power of power supply 16616 and may require frequent charging or battery replacement. Conserving battery power and reducing power consumption may therefore extend battery life and reduce the frequency of charging, amount of charging and battery replacement. Alternatively, in some aspects terminal devices such as terminal device 16502 may operate on a fixed power supply, such as where power supply 16616 is a wired power supply such as an Alternating Current (AC) outlet, or an alternator/generator driven by an engine. In such cases, high power consumption by terminal device 16502 may increase power consumption costs to a user of terminal device 16502. Power efficiency may therefore be a relevant property for terminal devices.

Various technologies such as IoT communications may place interest on power efficiency for terminal devices. For example, some IoT devices may target long-term (e.g., in the order of months or years, such as five to ten years) operation without recharging. Certain IoT devices may be implemented with non-rechargeable batteries (e.g., coin cell batteries and other configurations) and/or may be designed for operation in hard to reach areas. For example, IoT sensor networks may be deployed that include multiple IoT sensors that are designed to be positioned in sensor locations (which may be inconvenient to access or maintain, such as high ceilings above staircases, on top of buildings or in attics, inside of HVAC systems, etc.). Frequent recharging or battery replacement of the IoT sensors may therefore be both inconvenient and expensive, and for some use cases unfeasible, e.g., livestock monitoring, embedded sensors in plants, space applications, etc. Many IoT devices designed for a variety of different purposes may similarly target power-efficient aspects to help avoid the need for frequent maintenance.

According to an aspect of this disclosure, a terminal device may utilize an assisting device to relay communications to a network access node. To assist with reducing power consumption, the terminal device may utilize a reduced transmit power. The terminal device may also utilize a low-power waveform format to transmit to the assisting device, which may also reduce power consumption. The assisting device may receive the low-power format transmissions from the terminal device and relay the transmissions to the network access node. The assisting device may also handle channel reservation and contention procedures for the terminal device to enable the terminal device to perform collision-free transmissions to the assisting device.

Vehicles or terminal devices may transmit and receive radio communications directly with network access nodes. Vehicles or terminal devices may therefore utilize sufficient transmit power to ensure that uplink transmissions reach the target network access node. If a terminal device is far from the target network access node, the terminal device may therefore utilize a higher transmit power to compensate for pathloss-, shadowing-, and multipath-related attenuation in uplink transmissions. However, the use of high transmit powers may cause battery drain on terminal devices, which may result in low battery life and increased recharging or battery replacement.

Additionally, many radio communication technologies may utilize wideband physical layer waveforms. For example, various cellular broadband (e.g., LTE) and short-range (e.g., IEEE 802.11 Wi-Fi) radio communication technologies use wideband waveforms with a system bandwidth in the range of 20 MHz. Vehicles or terminal devices may expend power in both transmitting and receiving such wideband waveforms. For example, a terminal device transmitting and receiving a 20 MHz downlink waveform may expend more battery power than a terminal device that is transmitting and receiving a 5 MHz downlink waveform. Additionally, some wideband physical layer waveforms may have a high peak-to-average-power ratio (PAPR), which may lead to further power consumption for uplink transmissions.

Accordingly, in some aspects power consumption issues related to uplink transmit power and high-power physical layer waveforms may be alleviated by using an assisting device for forwarding low-power transmissions and managing coexistence-related issues for narrowband waveforms. The assisting device may forward low-power uplink transmissions from a terminal device to a destination network access node, and may enable the terminal device to utilize a low-power waveform format. Risk of transmission collisions with other coexisting devices may be reduced.

FIG. 169 shows an exemplary depiction of radio communication network 16500 in accordance with some aspects of the disclosure. As shown in FIG. 169, radio communication network 16500 may include network access node 16510, terminal device 16502, and assisting device 16902. In some aspects, terminal device 16502 may be structurally configured in the manner of FIG. 166, and can include at least one or more of antenna system 16602, an RF transceiver 16604, a baseband modem 16606 (including a physical layer processing module 16608 and a controller 16610), an application processor 16612, a memory 16614, and a power supply 16616. In some aspects, network access node 16510 may be structurally configured in the manner of FIG. 167, and can include at least one or more of an antenna system 16702, a radio module 16704, and a communication module 16706 (including a physical layer module 16708 and a control module 16710). Accordingly, terminal device 16502 may aim to transmit and receive radio communications with network access node 16510 to exchange user and control data. For example, in an exemplary cellular radio communication setting network, network access node 16510 may interface with a core network (e.g., core network 16802 of FIG. 168) that provides routing functions to enable terminal device 16502 to exchange user data with external data networks (e.g., data networks 16804 or 16806). In an exemplary short-range communication setting, network access node 16510 may interface with external data networks (e.g., data networks 16804 or 16806) via a router (which may be internal or external to network access node 16510).

FIG. 170 shows an exemplary internal configuration of assisting device 16902 in accordance with some aspects. As shown in FIG. 170, assisting device 16902 may include antenna system 17002, radio module 17004, and communication module 17006 (including physical layer module 17008 and control module 17010). Assisting device 16902 may transmit and receive radio signals via antenna system 17002, which may be an antenna array including one or more antennas. Radio module 17004 may perform transmit and receive RF processing to convert outgoing digital data from communication module 17006 into analog RF signals for antenna system 17002 to transmit and to convert incoming analog RF signals received from antenna system 17002 into digital data for communication module 17006. Physical layer module 17008 may be configured to perform physical layer reception processing on digital data received from radio module 17004 to provide to control module 17010 and to perform physical layer transmission processing on digital data received from control module 17010 to provide to radio module 17004. Control module 17010 may control the communication functionality of assisting device 16902 according to the corresponding radio access protocol, which may include exercising control over antenna system 17002, radio module 17004, and physical layer module 17008. Each of radio module 17004, physical layer module 17008, and control module 17010 may be structurally realized as a hardware-defined module, e.g., as one or more dedicated hardware circuits or FPGAs, as a software-defined module, e.g., as one or more processors executing program code that define arithmetic, control, and I/O instructions (e.g., software and/or firmware) stored in a non-transitory computer-readable storage medium, or as a mixed hardware-defined and software-defined module.

FIG. 171 depicts a diagram that illustrates aspects of a communications scheme. Network access node 16510 may oversee radio communications for various terminal devices and other nodes that are connected to network access node 16510, such as terminal device 16502, terminal device 16504, and assisting device 16902. Network access node 16510 may therefore transmit and receive radio signals with terminal device 16502, terminal device 16504, and assisting device 16902 according to a multiple access scheme that defines rules and parameters for performing multilateral communications. For example, in some aspects the communication nodes of radio communication 16500 (network access node 16510, terminal device 16502, terminal device 16504, assisting device 16902, and other network access nodes, terminal devices, and assisting devices not explicitly shown in FIG. 169) may communicate according to a Wi-Fi radio communication technology. In some aspects, the communication nodes of radio communication network 16500 may communicate according to another short-range radio communication technology, such as Bluetooth. In some aspects, the communication nodes of radio communication network 16500 may communicate according to a cellular radio communication technology.

As shown in FIG. 171, network access node 16510 may transmit downlink transmissions to terminal device 16502 on interface 17110. In particular, communication module 16706 of network access node 16510 may transmit and receive signals with baseband modem 16606 of terminal device 16502 over a logical connection (e.g., a software-level connection) that uses radio module 16704, antenna system 16702, antenna system 16602, and radio transceiver 16604 to for physical radio transmission and reception. Network access node 16510 and terminal device 16502 may transmit and receive signals over interface 17110 using a first waveform format, which may define a format for transmitting and receiving signals between network access node 16510 and terminal device 16502. Network access node 16510 and terminal device 16502 may both be configured (e.g., with the internal components of 16702-16706 and 16602-16606) to receive, process and decode, generate, and transmit signals according to the first waveform format.

As shown in FIG. 171, network access node 16510 may transmit and receive signals with terminal device 16504 on interface 17108. Communication module 16706 of network access node 16510 may transmit and receive signals with baseband modem 17106 of terminal device 16504 over a logical connection (e.g., a software-level connection) that uses radio module 16704, antenna system 16702, antenna system 17102, and radio transceiver 17104 for physical radio transmission and reception. Network access node 16510 and terminal device 16504 may transmit and receive signals over interface 17108 using a second waveform format. Network access node 16510 and terminal device 16504 may both be configured (e.g., with the internal components of 16702-16706 and 17102-17106) to receive, process and decode, generate, and transmit signals according to the second waveform format.

In some aspects, the first waveform format may be more power-efficient than the second waveform format. For example, in some aspects the first waveform format may have a narrower system bandwidth than the second waveform format. In some aspects, the first waveform format may be a narrowband waveform format and the second waveform format may be a wideband waveform format. In some aspects, the second waveform format may have a system bandwidth of e.g., 20 MHz, 40 MHz, 80 MHz, 160 MHz, etc., and the first waveform format may have a system bandwidth of e.g., 5 MHz, 2 MHz, 1 MHz, etc. In some aspects, the first waveform format may have a lower PAPR than the second waveform format.

Accordingly, network access node 16510 and terminal device 16502 may be configured to receive, process and decode, generate, and transmit signals according to the first waveform format. For example, antenna system 16602, RF transceiver 16604, and baseband modem 16606 of terminal device 16502 may be configured according to the first waveform format. In some aspects, radio module 16704 and/or antenna system 16702 of network access node 16510 may have a first section dedicated to first format transmission and reception (for use on interface 17110) and a second section dedicated to second format transmission and reception (for use on interface 17108). For example, in some aspects radio module 16704 may include first radio components (the first section) configured to perform first format transmission and reception and second radio components (the second section) configured to perform second format transmission and reception. In some aspects antenna system 16702 may include one or more first antennas (the first section) configured to perform first format transmission and reception and one or more second antennas (the second section) configured to perform second format transmission and reception, such as where the second format transmission uses MIMO techniques in a wider bandwidth of operation (e.g., 2×2 MIMO). In some aspects, radio module 16704 may include with radio components configured to perform both first format and second format transmission and reception. In some aspects, antenna system 16702 may include one or more antennas configured to perform both first format and second format transmission and reception. In addition to the first and second formats, it will be appreciated that network access node 16510 may be configured to process additional formats.

Terminal device 16502 may therefore receive first format transmissions (e.g., transmissions in the first waveform format) from network access node 16510 and process the received first format transmissions at antenna system 16602, RF transceiver 16604, and baseband modem 16606. As terminal device 16502 may receive first format transmissions as opposed to second format transmissions (e.g., transmissions in the second waveform format), terminal device 16502 may consume less power performing downlink processing on the first format transmissions compared to what terminal device 16502 would consume if performing downlink processing on second format transmissions (e.g., less power than terminal device 16504 consumes processing second format transmissions). Accordingly, terminal device 16502 may be more power efficient. In some aspects, terminal device 16502 may have longer battery life, less frequent charging demands, less frequent battery maintenance demands, and/or less frequent battery replacement demands.

Terminal device 16502 may be configured to transmit uplink transmissions (in the first waveform format) to network access node 16510. However, as previously indicated, terminal devices may expend an increased amount of power performing uplink transmission to network access nodes. The amount of expended power may be increased when a target network access node is located far from a transmitting terminal device. Accordingly, instead of transmitting uplink transmissions directly to network access node 16510, terminal device 16502 may utilize assisting device 16902 as a relay. As shown in FIG. 171, terminal device 16502 may transmit an uplink transmission (that is intended for network access node 16510) to assisting device 16902 over interface 17112. Baseband modem 16606 may generate and transmit the uplink transmission to assisting device 16902 over interface 17110 on a logical connection with RF transceiver 16604 and antenna system 16602, which communication module 17006 of assisting device may receive with antenna system 17002 and radio module 17004.

Communication module 17006 of assisting device 16902 may then receive the uplink transmission from terminal device 16502 (via antenna system 17002 and radio module 17004). Communication module 17006 may then forward the uplink transmission to network access node 16510 over interface 17114 by transmitting the uplink transmission to communication module 16706 of network access node 16510 over a logical connection with radio module 17004 and antenna system 17002. Network access node 16510 may then receive the forwarded uplink transmission (which originated at terminal device 16502) at communication module 16706 via antenna system 3302 and radio module 16704. In some aspects, assisting device 16902 may forward the uplink transmissions to network access node 16510 as first format transmissions. In some aspects, assisting device 16902 may forward the uplink transmissions to network access node 16510 as second format transmissions. For example, communication module 17006 may convert the first format uplink transmission received from terminal device 16502 into the second waveform format and transmit the transmission to network access node 16706 in the second waveform format.

Terminal device 16502 may reduce power consumption by transmitting the uplink transmission to network access node 16510 over a forwarding link that includes assisting device 16902, e.g., by using assisting device 16902 as a relay node to transmit signals to network access node 16510. According to some aspects, assisting device 16902 may be closer to terminal device 16502 than network access node 16510 (e.g., as in the exemplary scenario of FIG. 169), so that terminal device 16502 can use a lower transmit power to transmit the uplink transmission to assisting device 16902 than terminal device 16502 would use if transmitting the uplink transmission directly to network access node 16510 (e.g., without using a forwarding link). Terminal device 16502 may therefore reduce power consumption by transmitting uplink transmissions to network access node 16510 via a forwarding link that includes assisting device 16902.

In some aspects, baseband modem 16606 of terminal device 16502 may generate uplink transmissions based on the forwarding link provided by assisting device 16902 to network access node 16510. For example, in some aspects baseband modem 16606 may generate header information for an uplink transmission that provides a network address of network access node 16510 as the intended destination. Communication module 17006 of assisting device 16902 may then receive the uplink transmission, read the header information, and identify network access node 16510 as the intended destination for the uplink transmission based on the network address included in the header information. Communication module 17006 may then transmit the uplink transmission to network access node 16510 based on the intended destination. In some aspects, communication module 17006 may transmit the uplink transmission to network access node 16510 using directional transmission techniques. For example, as communication module 17006 may identify that network access node 16510 is the intended destination, communication module 17006 may control antenna system 17002 to transmit the uplink transmission using beamsteering/beamforming based on the direction of network access node 16510 from assisting device 16902. In some aspects, communication module 17006 may transmit the uplink transmission to network access node 16510 using transmit power control. For example, as communication module 17006 may identify that network access node 16510 is the intended destination, communication module 17006 may control radio module 17004 (e.g., a power amplifier component) to transmit the uplink transmission to network access node 16510 with a transmit power that depends on the distance between network access node 16510 and assisting device 16902.

In some aspects, baseband modem 16606 of terminal device 16502 may generate header information for an uplink transmission that additionally or alternatively provides a network address of assisting device 16902 as the intended relay node. Communication module 17006 of assisting device 16902 may then receive the uplink transmission, read the header information, and determine that assisting device 16902 is the intended relay node. As communication module 17006 has identified that assisting device 16902 is the intended relay node, communication module 17006 may determine that assisting device 16902 should forward the uplink transmission. In some aspects, communication module 17006 may determine whether to forward received uplink transmission based on information in the uplink transmission that indicates an intended relay node. For example, if an uplink transmission indicates that assisting device 16902 is the intended relay node, communication module 17006 may forward the uplink transmission. Conversely, if an uplink transmission does not indicate that assisting device 16902 is the intended relay node, communication module 17006 may not forward the uplink transmission. In other aspects, it is possible that the assisting device need not be explicitly identified in order for communication module 17006 to forward the uplink transmission. For example, in some aspects communication module 17006 may forward the uplink transmission even if assisting device 16902 is not explicitly identified. Conversely, in some aspects communication module 17006 may only forward uplink transmissions if assisting device 16902 is explicitly identified. Due to the preset condition of the channel (e.g., NAV setting), communication module 17006 may refrain from forwarding received uplink transmissions until channel becomes available.

Assisting device 16902 may have greater power capacity than terminal device 16502. For example, assisting device 16902 may be powered by an 'indefinite' power source such as a wired AC connection, or can be power by a large rechargeable or replaceable battery (e.g., as a primary source or as a backup source in case the wired AC connection is lost). Assisting device 16902 may be less power-constrained than terminal device 16502. Accordingly, assisting device 16902 may forward the uplink transmissions received from terminal device 16502 to network access node 16510 with a greater transmission power than terminal device 16502 used to transmit the uplink transmission to assisting device 16902. In some aspects, communication module 17006 may receive the uplink transmission from terminal device 16502 and transmit the received uplink transmission to network access node 16510 (e.g., with greater transmission power than used by terminal device 16502). In some aspects, communication module 17006 may demodulate and decode the uplink transmission (according to the first waveform format) received from terminal device 16502. In doing so, communication module 17006 may perform error correction and recover the original uplink data (e.g., PHY layer data) transmitted by terminal device 16502. Communication module 17006 may then re-encode and re-modulate the recovered uplink data and transmit the resulting uplink transmission to network access node 16510 (via radio module 17004 and antenna system 17002; e.g., with a greater transmission power than terminal device 16502). As communication module 17006 has corrected errors (incurred during radio transmission), network access node 16510 may receive the uplink transmissions with better error performance.

In some aspects, terminal device 16502 may be configured to transmit uplink transmissions to assisting device 16902 as first format transmissions. As previously indicated, first format transmission may incur less power consumption than second format transmission. Accordingly, in some aspects terminal device 16502 may be configured to receive downlink transmissions from network access node 16510 in the first waveform format or the second waveform format and to transmit uplink transmissions to network access node 16502 (via a relay node in assisting device 16902) in the first waveform format.

As previously detailed, network access node 16510 may transmit and receive uplink and downlink second format transmissions with terminal device 16504. As terminal device 16502 may transmit first format transmissions (e.g., to assisting device 16902 as part of a relay link to network access node 16510), radio communication network 16500 may include both first format and second format transmissions. In some aspects, the use of both first format and second format transmissions in proximity may cause coexistence issues. For example, radio communication network 16500 may utilize a contention-based multiple access scheme in which the communication nodes of radio communication network 16500 may share a channel (or 'medium') by detecting whether any other communication nodes are transmitting before performing a transmission. If a communication node with a pending transmission detects that another communication node is transmitting, the communication node may wait until the channel is free (e.g., until no other communication nodes are transmitting) and execute the pending transmission).

In some aspects, radio communication network 16500 may utilize a Carrier Sense Multiple Access (CSMA) scheme. For example, radio communication network 16500 may utilize CSMA Collision Avoidance (CSMA/CA). Accordingly, the communication nodes of radio communication network 16500 (e.g., that form a Basic Service Set (BSS)) may perform carrier sensing to determine whether they are permitted to access the radio channel. For example, in an exemplary scenario terminal device 16504 may have pending uplink data scheduled for transmission to network access node 16510. As the communication nodes of radio communication network 16500 may share the channel, terminal device 16504 may perform carrier sensing to determine whether the channel is 'busy', such as whether another communication node is currently transmitting on the channel. Terminal device 16504 may therefore listen to the channel for a predefined sensing window (e.g., a Distributed Coordination Function (DCF) Inter-frame Space (DIFS)). If terminal device 16504 does not detect any transmissions during the sensing window, e.g., if the channel is free, terminal device 16504 may immediately access the channel and transmit the pending uplink data. If terminal device 16504 detects transmissions during the sensing window, e.g., if the channel is busy, terminal device 16504 may perform a 'backoff' procedure before attempting to transmit again. In such a backoff procedure terminal device 16504 may continue listening to the channel until to the channel to determine when the detected transmission ends. Once the detected transmission ends, terminal device 16504 may listen to the channel for the duration of the sensing window. If terminal device 16504 detects another transmission during the sensing window, terminal device 16504 may again listen to the channel to determine when the detected transmission ends and continue listening to the channel for the sensing window.

If terminal device 16504 does not detect any further transmissions during the sensing window, terminal device 16504 may initiate a backoff counter (e.g., a randomly selected number of slots) and begin decrementing the backoff counter. Each time terminal device 16504 detects a transmission on the channel during the backoff counter, terminal device 16504 may pause the counter, wait until the detected transmission ends, listen for the duration of the sensing window, and continue the counter after a sensing window elapses following a detected transmission. When the backoff counter expires, terminal device 16504 may then access the channel and perform the transmission.

In some aspects, network access node 16510 may also be configured to perform an equivalent carrier sensing procedure to perform transmissions, which may be known as distributed-coordinated channel access (e.g., Distributed Coordination Function (DCF) in Wi-Fi). Network access node 16510 may alternatively be configured to have priority access to the channel by being allotted a shorter sensing window (and thus being able to access the channel first prior to the end of a transmission), which may be known as point-coordinated channel access (e.g., Point Coordination Function (PCF) in Wi-Fi). The terminal devices and network access nodes in a CSMA/CA scheme may therefore contend for access to the channel with one another by listening for transmissions (also known as a listen before talk (LBT) scheme), where each contending transmitter may avoid collisions by first listening to the channel and waiting to transmit (for at least a sensing window potentially in addition to a backoff counter) if any transmissions are detected.

Communication nodes operating in a CSMA/CA scheme may utilize certain techniques to detect other transmissions. For example, certain technologies may employ 'physical' carrier sensing and/or 'virtual' carrier sensing to detect transmissions during carrier sensing. In physical carrier sensing, a communication node such as terminal device 16504 may monitor the channel by receiving channel data and processing the channel data (e.g., a Clear Channel Assessment (CCA) in an exemplary Wi-Fi setting). In some aspects of physical carrier sensing, terminal device 16504 may perform energy detection (ED), which may involve determining whether the channel is busy based on the radio energy observed in the channel (which may be radio energy from other RATs, noise, interference, corrupted transmissions from the same RAT, etc.). If the observed radio energy is above a threshold, terminal device 16504 may determine that the channel is busy. As terminal device 16504 may only observe unattributed radio energy, terminal device 16504 may have to continue listening to the channel to determine when the channel is free, e.g., when the observed radio energy falls below the threshold.

In some aspects of physical carrier sensing, terminal device 16504 may perform preamble detection (e.g., for IEEE 802.11 preambles in an exemplary Wi-Fi setting), in which terminal device 16504 may process received channel data to determine if the channel contains any preambles transmitted by other transmitters of the same RAT. If terminal device 16504 detects a preamble, terminal device 16504 may determine that the channel is busy for the current frame (in contrast to ED, in which terminal device 16504 may need to continue listening to determine when the observed radio energy falls).

Communication nodes performing physical carrier sensing may therefore actively monitor and sample the channel to determine whether the channel is busy or not. As detailed above, in the preamble detection case a communication node such as terminal device 16504 may be able to determine that the channel is busy for the current frame if a preamble is detected (as the duration of the detected transmission may be deterministic). In the ED case, terminal device 16504 may continue monitoring the channel during the current frame if sufficient radio energy is observed (to determine when the radio energy falls below the threshold) as the duration of the detected transmission may not be deterministic. Physical carrier sensing may therefore only inform terminal device 16504 that the channel is busy for at most the current frame.

In virtual carrier sensing, communication nodes may be able to obtain more information about the duration of any detected transmissions. Specifically, communication nodes may in some cases use a transmission request-grant handshake procedure to reserve the channel for a duration of time, e.g., a reservation period. In these transmission request-grant handshake procedures (e.g., a Request to Send (RTS)/Clear to Send (CTS) sequence in an exemplary Wi-Fi setting), a potential transmitter such as terminal device 16504 may transmit a transmission request (e.g., an RTS) to a network access node, such as network access node 16510, that contains a reservation period (e.g., a Network Allocation Vector (NAV) in an exemplary Wi-Fi setting) for which the potential transmitter wishes to reserve the channel to transmit a pending transmission. Network access node 16510, may receive the transmission request and, assuming the channel reservation is permitted, transmit a transmission grant (e.g., a CTS) to terminal device 16504 that also contains an updated reservation period that also counts for the time elapsed since the transmission request. Terminal device 16504 may then transmit the pending transmission to network access node 16510, which may respond with an acknowledgement (ACK) or non-acknowledgement (NACK) to signal whether the transmission was successfully received or not. In some aspects, terminal device 16504 and network access node 16510 may utilize an ACK/NACK scheme, while in other aspects terminal device 16504 and network access node 16510 may utilize an ACK-only scheme. In an ACK/NACK scheme, the receiving device may transmit either an ACK or a NACK depending on whether the transmission was successfully received. In an ACK-only scheme (e.g., as used in Wi-Fi), the receiving device may transmit an ACK if the transmission was successfully received and may not transmit anything if the transmission was not successfully received. The transmitting device may therefore set a timer upon transmitting the transmission and, if the timer expires and no ACK has been received, may re-transmit the transmission (in other words, may treat the non-response as an implicit NACK). Both can be implemented into these aspects.

Any other transmitters that are listening to the channel during the transmission request-grant handshake procedure (and are capable of decoding the handshake messages) may receive the transmission request and transmission grant. As the reservation period and updated reservation period specify how long the transmission request-grant handshake procedure (which may include the duration of the transmission request, transmission grant, the transmission, and ACK/NACK response) will last, the other transmitters may read the reservation period from the transmission request and/or transmission grant and determine that the channel will be busy for the duration of the reservation period/updated reservation period (which may end at the same time). In accordance with virtual carrier sensing, the other transmitters may set and initiate a reservation counter (e.g., a NAV) equal to the reservation period/updated reservation period and assume that the channel will be busy until at least the reservation counter has expired. As the reservation period/updated reservation period may be multiple frames in length, transmitters operating with virtual carrier sensing may be able to determine that the channel will be busy for longer periods of time (relative to the maximum single frame of physical carrier sensing). The transmitters may therefore 'virtually' determine that the channel will be busy for the extra frames of the reservation period/updated reservation period without actively checking the channel during these extra frames. Additionally, other transmitters can set a reservation counter (e.g., a NAV) by decoding other signal components. For example, another transmitter in an exemplary Wi-Fi-setting may be able to detect a Wi-Fi preamble and decode the Signal Field. The Signal Field may indicate the length of the packet (e.g., in IEEE 802.11n onwards), which the other transmitter may determine and use to set the NAV as part of virtual sensing. There may accordingly be various different mechanisms by which transmitters can determine the length of a given transmission as part of virtual carrier sensing and use this information to set a reservation counter.

The ability to sense transmissions by other transmitters may be a component of collision sensing networks. If a transmitter does not detect a transmission by another transmitter, the transmitter may cause a collision by transmitting at the same time as the other transmitter. The intended receiver may then have difficulty in receiving the transmissions as they may become corrupted by the collision. Excessive collisions may therefore degrade network performance.

Due to formatting differences, the use of both the first waveform format and the second waveform format for transmissions may cause coexistence-related collision issues between transmissions. For example, terminal device 16504 may have a pending uplink transmission that terminal device 16504 wants to transmit to network access node 16510 as in the second waveform format (such as a 20 MHz Wi-Fi signal in an exemplary Wi-Fi setting). In accordance with a contention-based multiple access scheme such as CSMA/CA, terminal device 16504 may first perform carrier sensing on the channel (shared between the communication nodes of radio communication network 16500) to determine whether the channel is busy, e.g., whether another communication node is currently transmitting on the channel. As terminal device 16504 may be configured to transmit and receive according to the second waveform format, terminal device 16504 may perform the carrier sensing in the second waveform format. While energy detection may detect energy from any transmission, preamble detection and virtual carrier sensing (e.g., detection of transmission request-grant handshakes or decoding a packet length) may depend on the format of the transmissions. Accordingly, terminal device 16504 may be able to perform preamble detection and virtual carrier sensing to detect second format transmissions but, as first format transmissions are in a different waveform format, may not be able to detect first format transmissions with preamble detection or virtual carrier sensing.

Accordingly, if another communication node is transmitting with the same waveform format, e.g., if network access node 16510 is transmitting a second format transmission, terminal device 16504 may detect the second format transmission (via carrier sensing analysis performed at baseband modem 17106 on signals received via antenna system 17102 and RF transceiver 17104) and consequently determine that the channel is busy. As terminal device 16504 may be configured to receive and decode second format transmissions, terminal device 16504 may be able to detect the second format transmission by network access node 16510 with preamble detection, such as by reading the preamble of the second format transmission. Additionally, if the second format transmission is a transmission request (e.g., RTS), transmission grant (e.g., CTS), or another packet with a decodable packet length (e.g., in the Signal Field), terminal device 16504 may be able to detect the second format transmission with virtual carrier sensing, such as by decoding the packet to read the reservation period (e.g., the NAV in the RTS or CTS) or packet length. Accordingly, as the second format transmission may be in a waveform format that is compatible with terminal device 16504, terminal device 16504 may be able to detect the second format via preamble detection and/or virtual carrier sensing. As indicated above, terminal device 16504 may determine that the channel is busy for one or more frames based on the detected preamble and/or identified reservation period.

However, if a transmission of a different waveform format is occupying the channel when terminal device 16504 is performing carrier sensing, terminal device 16504 may run into difficulties in detecting the transmission (e.g., if terminal device 16504 is not configured for the different waveform format and/or is not performing carrier sensing according to the different waveform format). For example, if terminal device 16504 is not configured to receive and decode the first format transmissions, terminal device 16504 may not be able to decode a first format transmission. Accordingly, if network access node 16510, terminal device 16502, or assisting device 16902 is performing a first format transmission, terminal device 16504 may not be able to successfully detect the first format transmission with preamble detection or virtual carrier sensing. Additionally, if terminal device 16502 is performing a low-power transmission (e.g., in the first waveform format) when terminal device 16504 is performing carrier sensing, the low-power transmission may be too weak for terminal device 16504 to detect via energy detection. For example, terminal device 16502 may be transmitting with a low transmit power, e.g., 3 or 4 dBm, which may be significantly lower than a 'standard' transmit of e.g., 10-13 dBm. Accordingly, while terminal device 16504 may receive the low-power transmission from terminal device 16502, the energy from the low-power transmission may be less than the detection threshold utilized by terminal device 16504 to determine that the channel is busy. Terminal device 16504 may therefore incorrectly determine that the channel is free and may begin a transmission, which may collide with the low-power transmission by terminal device 16502 and corrupt the low-power transmission.

Accordingly, the inability of coexisting devices (e.g., proximate devices that are configured to utilize a different waveform format) to detect first format transmissions may cause coexistence issues for terminal device 16502. For example, in an exemplary Wi-Fi setting, network access node 16510 and terminal device 16504 may communicate using a wideband 20 MHz IEEE 802.11 Wi-Fi waveform, e.g., a second waveform format, while network access node 16510, terminal device 16502, and assisting device 16902 may communicate using a narrowband IEEE 802.11 Wi-Fi waveform, such as a 5 MHz signal, a 2 MHz signal, etc., e.g., a first waveform format. In an exemplary Bluetooth setting, the first waveform format and/or the second waveform format may be a Bluetooth waveform. Terminal device 16504 may therefore be a considered a coexisting device, and may not be able to read and decode the first format transmissions. Terminal device 16504 may also be considered a legacy device. If terminal device 16502 is performing a first format transmission to assisting device 16902 with a low transmit power, terminal device 16504 may not be able to successfully detect the first format transmission and may perform a colliding second format transmission to network access node 16510. The colliding transmissions may corrupt the transmissions (or may in some cases only corrupt the first format transmission as the second format transmission may have much higher transmit power), which may impede the ability of assisting device 16902 and network access node 16510 to successfully receive the first format and second format transmissions, respectively.

In some aspects, collision-related coexistence issues may be addressed with channel reservation assistance and/or coexistence preamble encapsulation. For example, in the channel reservation assistance case, assisting device 16902 may compete for access to the channel with other communication nodes, such as terminal device 16502 and/or network access node 16510, and reserve the channel (e.g., by sending transmission requests) for terminal device 16502 to perform first format transmissions. In the coexistence preamble encapsulation case, assisting device 16902 may encapsulate its first format transmissions (e.g., to network access node 16510 and/or terminal device 16502) with a valid preamble for coexisting devices (e.g., a coexistence preamble) such as terminal device 16504, which may enable terminal device 16504 to detect the coexistence preamble and consequently refrain from transmitting during the remainder of the frame that contains the first format transmission. Additionally, as some preambles (such as Wi-Fi 802.11n preambles in the Signal Field) may specify the length of the transmission, terminal device 16504 may also be able to utilize the detected coexistence preamble to perform virtual carrier sensing, e.g., by reading the transmission length from the detected coexistence preamble and setting the reservation counter accordingly. This use of virtual carrier sensing may enable terminal device 16502 to identify multiple frames that will be busy (as opposed to single frame for normal preamble detection). In some aspects, network access node 16510 may also perform coexisting preamble encapsulation.

Accordingly, in some aspects assisting device 16902 may perform channel reservation assistance for terminal device 16502. In particular, assisting device 16902 may contend for access to the channel with other communication nodes, reserve the channel for terminal device 16502 via a transmission request (e.g., an RTS), notify terminal device 16502 of the channel reservation, receive an uplink transmission (e.g., in the first waveform format) from terminal device 16502, and forward the uplink transmission to network access node 16510. By reserving the channel for terminal device 16502 for a reservation period, assisting device 16902 may enable terminal device 16502 to transmit a first format uplink transmission to assisting device 16902 during the reservation period without risk of collision with a coexisting device.

FIG. 172 shows message sequence chart 17200 illustrating channel reservation assistance in accordance with some aspects. As shown in FIG. 172, network access node 16510 may transmit one or more downlink transmissions to terminal device 16502 in 17202. In some aspects, network access node 16510 may transmit the downlink transmissions to terminal device 16502 in 17202 in the first waveform format. In some aspects, network access node 16510 may transmit the downlink transmissions to terminal device 16502 in 17202 as first format transmissions that are encapsulated with a coexistence preamble, e.g., a preamble in the second waveform format. In some aspects, network access node 16510 may transmit the downlink transmissions to terminal device 16502 in 17202 as second format transmissions, for which terminal device 16502 may in some aspects be configured in the first waveform format and the second waveform format (e.g., one or more second waveform format antennas of antenna system 16602, second waveform format RF components at RF transceiver 16604, second waveform format functionality at baseband modem 16606, one or more first waveform format antennas of antenna system 16602, first waveform format RF components at RF transceiver 16604, first waveform format functionality at baseband modem 16606).

Assisting device 16902 (under the control of communication module 17006) may then reserve the channel for terminal device 16502 in 17204. In particular, assisting device 16902 may perform carrier sensing in 17204 (e.g., as part of a CSMA/CA scheme as detailed above), in which assisting device 16902 may monitor the channel for other transmissions before accessing the channel. In some aspects, assisting device 16902 may perform carrier sensing in the second waveform format to detect transmissions by coexisting devices. In some aspects, assisting device 16902 may perform carrier sensing in the first waveform format and the second waveform format to detect transmissions by coexisting devices and other first waveform format devices. Once the channel is free and assisting device 16902 is permitted to access the channel (e.g., after assisting device 16902 has completed any sensing periods and/or backoff procedures), assisting device 16902 may reserve the channel for a reservation period by transmitting a transmission request (e.g., an RTS) that specifies a reservation period (e.g., a NAV) for which assisting device 16902 wishes to reserve the channel. Network access node 16510 may then respond with a transmission grant (e.g., a CTS) that specifies an updated reservation period (e.g., a NAV, where the expiry of the reservation period and the updated reservation period coincide). Assisting device 16902 may therefore have reserved the channel for the reservation period.

Assisting device 16902 may transmit the transmission request as a second format transmission during the channel reservation of 17204. As the transmission request is a second format transmission that is decodable by coexisting devices (e.g., communication nodes that are configured according to the second waveform format), coexisting devices such as terminal device 16504 may be able to detect and read the transmission request. For example, terminal device 16504 may decode the transmission request and read the reservation period specified in the transmission request (in addition to, potentially, the transmission grant and updated reservation period) as part of virtual carrier sensing. In accordance with virtual carrier sensing, terminal device 16504 may set a reservation counter (e.g., a NAV) that expires at the end of the reservation period/updated reservation period and assume that the channel will be busy until at least the reservation counter expires. Accordingly, coexisting devices may assume that the channel is busy, or 'reserved', until the end of the reservation period/updated reservation period. Assisting device 16902 may therefore reserve the channel for terminal device 16502 in 17204.

As the channel may be reserved for the duration of the reservation period following 17204, assisting device 16902 may notify terminal device 16502 of the channel reservation in 17206. In some aspects, assisting device 16902 may notify terminal device 16502 of the channel reservation with a first format transmission. As the channel may remain reserved during at least 17206, there may not be any colliding transmissions.

Assisting device 16902 may specify the reservation period to terminal device 16502 as part of the channel reservation notification in 17206. Terminal device 16502 may then (under the control of baseband modem 16606) determine how much data terminal device 16502 can transmit in accordance with the reservation period (during the reservation period) and/or transmission bitrate, e.g., a transmission size. In some aspects, terminal device 16502 may consider the amount of time for the transmission to assisting device 16902, forwarding the transmission to network access node 16510 (including any processing at assisting device 16902), and an ACK/NACK period (e.g., SIFS) following the forwarded transmission in determining the transmission size.

Terminal device 16502 may then retrieve pending uplink data intended for network access node 16510 (up to the transmission size) and transmit the uplink data as a first format uplink transmission to assisting device 16902 in 17208. In some aspects, terminal device 16502 may utilize a lower transmission power than would be sufficient to transmit the uplink transmission to network access node 16510. As the channel is reserved for the reservation period, there may not be any colliding transmissions. Assisting device 16902 may then receive the uplink transmission from terminal device 16502 and forward the uplink transmission to network access node 16510 in 17210. In some aspects, assisting device 16902 may transmit an ACK/NACK to terminal device 16502 following reception of the uplink transmission in 17210. In some aspects, assisting device 16902 may repeat the uplink transmission in 17210. In some aspects, assisting device 16902 may decode and error-correct the uplink transmission, re-encode the uplink transmission, and transmit the re-encoded uplink transmission in 17210. In some aspects, assisting device 16902 may forward the uplink transmission to network access node 16510 in 17210 as a second format transmission. In some aspects, assisting device 16902 may forward the uplink transmission to network access node 16510 in 17210 as a first format transmission. As the channel may continue to be reserved for the duration of the reservation period, there may not be any collisions.

Network access node 16510 may then receive the forwarded uplink transmission from assisting device 16902. Network access node 16510 may then (under the control of communication module 16706) decode the forwarded uplink transmission and check for errors. If there are no errors, network access node 16510 may transmit an ACK in 17212. If there are errors, network access node 16510 may transmit a NACK in 17212 (e.g., in an ACK/NACK scheme) or may not transmit any ACK or NACK in 17212 (e.g., in an ACK-only scheme). In some aspects, network access node 16510 may transmit the ACK/NACK in 17212 as a first format transmission. In some aspects, network access node 16510 may identify that the forwarded uplink transmission originated at terminal device 16502 (e.g., via addressing information in the forwarded uplink transmission) and transmit the ACK/NACK in 17212 as a first format transmission in response to determining that the forwarded uplink transmission originated at terminal device 16502 (e.g., as network access node 16510 may identify that terminal device 16502 is configured for first format operation). In some aspects, network access node 16510 may transmit the ACK/NACK in 17212 as a second format transmission. In some aspects, assisting device 16902 may be configured to receive the second format ACK/NACK from network access node 16510, generate a first format ACK/NACK, and transmit the first format ACK/NACK to terminal device 16502.

The ACK/NACK transmission in 17212 may occur at the end the reservation period (e.g., an SIFS following a RTS/CTS exchange). Accordingly, assisting device 16902 may reserve the channel for terminal device 16502 via the channel reservation assistance procedure detailed in FIG. 172. The channel reservation assistance procedure may enable terminal device 16502 to transmit uplink transmissions in the first waveform format to network access node 16510 via assisting device 16902 when the channel is reserved. As assisting device 16902 may perform the channel reservation (e.g., RTS/CTS exchange) with network access node 16510 with second format transmissions, e.g., a coexistence-compatible format, other coexisting devices such as terminal device 16504 may detect the channel reservation and consider the channel reserved for the duration of the reservation period (e.g., in accordance with virtual carrier sensing, such as by using a NAV). This may help prevent colliding transmissions and enable terminal device 16502 to utilize the first waveform format for transmissions.

In some aspects, assisting device 16902 and/or network access node 16510 may perform coexistence preamble encapsulation to address coexistence-related collision issues. For example, if network access node 16510 transmits the downlink transmission to terminal device 16502 in 17202 as a first format transmission, other coexisting devices such as terminal device 16504 may not be able to detect the first format transmission via preamble detection. Additionally, in some cases the energy seen at terminal device 16504 from the first format transmission may not exceed the energy detection threshold. Accordingly, in an exemplary scenario, terminal device 16504 may then mistakenly determine that the channel is free (by performing carrier sensing) and may begin a transmission. The transmission by terminal device 16504 may collide with the first format transmission by network access node 16510 in 17202 and may corrupt the transmissions.

In some aspects, network access node 16510 may therefore encapsulate the first format transmission to terminal device 16502 with a coexistence preamble, e.g., a first waveform format preamble that terminal device 16504 can decode and read. Accordingly, terminal device 16504 may detect the coexistence preamble encapsulating the first format transmission from network access node 16510 to terminal device 16502 in 17202 during carrier sensing. Terminal device 16504 may then correctly determine that the channel is busy and refrain from transmitting until the channel is free (including any sensing windows and/or backoff procedures and reservation counters if applicable). Network access node 16510 may therefore protect first format transmissions to terminal device 16502 from collisions with coexistence preamble encapsulation. In some aspects, as coexisting devices configured to perform carrier sensing according to the second waveform format may be able to detect the coexistence preamble, the coexistence preamble may be resistant to collisions by coexisting devices configured according to the second waveform format.

In some aspects, assisting device 16902 may also encapsulate first format transmissions with coexistence preambles. FIG. 173 shows message sequence chart 17300 illustrating an example of coexistence preamble encapsulation in accordance with some aspects. Network access node 16510, assisting device 16902, and terminal device 16502 may perform 17302-17308 in the manner detailed above for 17202-17208, respectively. Accordingly, assisting device 16902 may contend for the channel and reserve the channel for terminal device 16502 for a reservation period.

Terminal device 16502 may then transmit the initial uplink transmission in 17308 in the first waveform format, which may be protected from collisions due to the channel reservation. Assisting device 16902 may then receive the uplink transmission. In some aspects, assisting device 16902 may transmit an ACK/NACK to terminal device 16502 following reception of the uplink transmission.

In the setting of message sequence chart 17300, the reservation period may have sufficient duration to include the channel reservation notification of 17306 and the initial uplink transmission in 17308 (in addition to any ACK/NACK from assisting device 16902). Accordingly, in some aspects assisting device 16902 may only reserve the channel (e.g., via a NAV specified in an RTS) with network access node 16510 for a duration of time intended to include the initial channel reservation notification and the initial uplink transmission. In some aspects, assisting device 16902 may reserve the channel for a shorter reservation period. In some aspects, the initial uplink transmission by terminal device 16502 may occupy a longer duration within the reservation period (and leave less remaining time for a forwarding transmission by assisting device 16902 within the reservation period).

Accordingly, in contrast to message sequence chart 17200 of FIG. 172, the reservation period of the channel reservation negotiated by assisting device 16902 in 17304 may be sufficient to include the channel reservation notification in 17306 and initial uplink transmission in 17306 but not the forwarding transmission (and any following ACK/NACK). Assisting device 16902 may therefore forward the uplink transmission to network access node 16510 after the channel reservation has expired, e.g., after the reservation period is over. To help protect the forwarded uplink transmission (which may be a first format uplink transmission) from collisions by coexisting devices, assisting device 16902 (under the control of communication module 17006) may encapsulate the first format uplink transmission with a coexistence preamble in 17310. Assisting device 16902 may then perform carrier sensing in 17312 to determine when the channel is free. After determining that the channel is free in 17312, assisting device 16902 may forward the first format uplink transmission with the coexistence preamble (which in some aspects may include transmitting the coexistence preamble followed by the first format uplink transmission) in 17314. As assisting device 16902 has determined that the channel is free in 17312 and transmitted the first format uplink transmission with a coexistence preamble, the forwarded uplink transmission may be protected from collisions (as coexisting devices such as terminal device 16504 may detect the coexistence preamble and determine that the channel is busy). Network access node 16510 may receive the forwarded uplink transmission in 17314 and transmit an ACK/NACK in 17316 (or an ACK or no ACK in an ACK-only scheme). In some aspects, network access node 16510 may transmit the ACK/NACK in 17316 to assisting device 16902 as a first format transmission. In some aspects, assisting device 16902 may forward the ACK/NACK to terminal device 16502. In some aspects, assisting device 16902 may forward the ACK/NACK to terminal device 16502 as a first format transmission encapsulated with a coexistence preamble. In some aspects, network access node 16510 may transmit the ACK/NACK to assisting device 16902 as a first format transmission. As network access node

16510 may transmit the first format ACK/NACK to terminal device 16502 during an ACK/NACK period (e.g., an SIFS) following the forwarded uplink transmission by assisting device 16902 in 17314, the first format ACK/NACK may be protected from collisions.

In some aspects, instead of adding a coexistence preamble and performing carrier sensing in 17310-17312, assisting device 16902 may reserve the channel again with network access node 16510 (e.g., with an RTS/CTS exchange) and forward the first format uplink transmission to network access node 16510 as a second format transmission. (e.g., without a coexistence preamble). As the channel is reserved, the forwarded uplink transmission may be protected from collisions.

Coexistence preamble encapsulation and channel reservation assistance may therefore help protect first format transmissions from collisions from coexisting devices. In some aspects, network access node 16510, assisting device 16902, and terminal device 16502 may perform only one of coexistence preamble encapsulation and channel reservation assistance. In some aspects, network access node 16510, assisting device 16902, and terminal device 16502 may perform both of coexistence preamble encapsulation and channel reservation assistance.

In some aspects, terminal device 16502 may request channel reservation assistance from assisting device 16902, in response to which assisting device 16902 may reserve the channel for terminal device 16502 to perform a transmission. For example, terminal device 16502 may have pending uplink data that terminal device 16502 aims to transmit to assisting device 16902 or network access node 16510 (e.g., via assisting device 16902). Accordingly, before 17204 or 17304, terminal device 16502 may perform carrier sensing (in accordance with the first waveform format) to determine if the channel is free. In some aspects, the first waveform format may have a narrower bandwidth than the second waveform format, which may include the first waveform format having a narrowband bandwidth and the second waveform format having a wideband bandwidth. Accordingly, terminal device 16502 may perform the carrier sensing on a narrowband channel. As the narrowband channel may be located within a wideband channel for the second waveform format, terminal device 16502 may be able to detect second format transmissions by coexisting devices (e.g., by energy detection) in addition to first format transmissions (by other first format devices that fall on the same narrowband channel). If terminal device 16502 determines that the channel is free, terminal device 16502 may transmit a first format transmission to assisting device 16902 that contains a channel reservation assistance request for assisting device 16902. While terminal device 16502 may be able to determine that the channel is free before starting the first format transmission, as previously detailed coexisting devices may not be able to detect first format transmissions via carrier sensing. Accordingly, there may be a risk that the first format transmission from terminal device 16502 containing the channel reservation assistance request may be corrupted by a colliding second format transmission from a coexisting device (e.g., that failed to detect the first format transmission), e.g., terminal device 16504.

If assisting device 16902 successfully receives the channel reservation assistance request from terminal device 16502 (e.g., if no colliding transmissions occurred that irreversibly corrupted the first format transmission), assisting device 16902 may transmit an ACK to terminal device 16502 in response (e.g., with a first format transmission) and proceed to perform 17204-17212 or 17304-17316 to reserve the channel for terminal device 16502. Terminal device 16502, assisting device 16902, and network access node 16510 may then perform 17202-17212 to enable terminal device 16502 to transmit a first format uplink transmission to network access node 16510 via assisting device 16902. If assisting device 16902 does not successfully receive the channel reservation assistance request, assisting device 16902 may transmit a NACK (e.g., if assisting device 16902 detected the first format transmission but did not successfully decode it) or may not transmit a response (e.g., if a colliding transmission occurred that irreversibly corrupted the first format transmission and assisting device 16902 did not detect any of the first format transmission). If terminal device 16502 receives a NACK or no response, terminal device 16502 may perform carrier sensing again to determine when the channel is free and attempt to transmit a channel reservation assistance request in another first format transmission. While collisions may occur due to the inability of coexisting devices to detect the first format transmissions, terminal device 16502 may continue to re-attempt the first format transmission until receiving an ACK in response from assisting device 16902, which may be followed by 17204-17212 or 17304-17316.

In some aspects, terminal device 16502 may perform uplink first format transmissions to network access node 16510 via assisting device 16902 by transmitting a transmission request (e.g., an RTS) with a first format transmission to assisting device 16902. For example, terminal device 16502 may identify pending uplink data for network access node 16510 and determine a reservation period that can fit an uplink transmission including the pending uplink data. Terminal device 16502 may then generate a transmission request that specifies the reservation period (e.g., as a NAV) and transmit the transmission request to assisting device 16902 as a first format transmission. As noted above, terminal device 16502 may attempt to transmit the transmission request without collision protection, e.g., by performing carrier sensing to determine when the channel is free and transmitting the transmission request to assisting device 16902 as a first format transmission. As the first format transmission may in some cases not be detectable by coexisting devices such as terminal device 16504, there may be a risk of collision. If assisting device 16902 successfully receives the transmission request, assisting device 16902 may then transmit a transmission grant (e.g., a CTS) to terminal device 16502 as a first format transmission. In some aspects, assisting device 16902 may encapsulate the first format transmission grant with a coexistence preamble, which may protect the first format transmission grant from collisions. In some aspects, assisting device 16902 may also transmit a coexistence transmission grant, e.g., a first format transmission grant, which may contain a coexistence-compatible reservation period e.g., a NAV, where a reservation period is specified in the second waveform format. Accordingly, coexisting devices such as terminal device 16504 may be able to read the reservation period and set a reservation counter that will reserve the channel for the duration of the reservation period.

Terminal device 16502 may then receive the first format transmission grant from assisting device 16902 in response to the transmission request, which may indicate that the channel is reserved. Terminal device 16502 may then transmit the pending uplink data to assisting device 16902 as a first format transmission in accordance with the reservation period (e.g., during the reservation period). In some aspects, assisting device 16902 may then forward the first format transmission during the reservation period. In some aspects, assisting device 16902 may reserve the channel again with network access node 16510 via a transmission request-grant handshake procedure (after the initial reservation period expires) and transmit the first format transmission to network access node 16510 in accordance with the transmission request-grant handshake procedure. In some aspects, assisting device 16902 may encapsulate the first format transmission with a coexistence preamble, contend for the channel after the reservation period is over, and transmit the first format transmission with the encapsulated coexistence preamble. In some aspects, terminal device 16502 may also utilize the transmission request-grant handshake procedure with assisting device 16902 to transmit data to assisting device 16902, e.g., data that is intended for assisting device 16902 and not intended for network access node 16510.

In some aspects, assisting device 16902 and terminal device 16502 may communicate locally with each other (in addition to the forwarding capacity to network access node 16510 detailed above). In order to protect first format transmissions from assisting device 16902 to terminal device 16502, assisting device 16902 may encapsulate the first format transmissions with a coexistence preamble. In some aspects, assisting device 16902 may perform first waveform format and/or second waveform format carrier sensing to determine when the channel is free before transmitting to terminal device 16502. In some aspects where the first waveform format is a narrowband waveform format, assisting device 16902 may perform first waveform format carrier sensing by performing carrier sensing on a narrowband channel.

As previously indicated, in some aspects network access node 16510 and/or assisting device 16902 may protect first format transmissions to terminal device 16502 with coexistence preamble encapsulation. To help protect first format transmissions from terminal device 16502, in some aspects terminal device 16502 may utilize certain allocated first format transmission periods to perform first format transmissions. For example, network access node 16510 and/or assisting device 16902 may be configured to periodically (e.g., with a fixed period or schedule) reserve the channel for first format transmissions. In some aspects, network access node 16510 and/or assisting device 16902 may be configured to reserve the first format transmission periods by periodically transmitting transmission requests and/or transmission grants that specify a reservation period. Coexisting devices may then detect the transmission requests and/or grants and determine that the channel will be busy for the reservation period.

In some aspects, terminal device 16502 may have knowledge of the fixed period or schedule and therefore may be able to identify the reserved first format transmission periods ahead of time. In some aspects, terminal device 16502 may listen for transmission requests and/or grants from network access node 16510 or assisting device 16902 that are related to reserved first format transmission periods and, upon identifying a reserved first format transmission period, transmit first format transmissions during the reserved first format transmission period. As the channel is reserved, the first format transmissions may be protected. In some aspects, terminal device 16502 may have pending uplink data for network access node 16510 or assisting device 16902 and decide whether to wait for a scheduled reserved first format transmission period or to attempt to transmit the pending uplink data before the scheduled reserved first format transmission period without collision protection. For example, if the pending uplink data is low-priority, terminal device 16502 may decide to attempt to transmit the pending uplink data without collisions protection, e.g., not within a reserved first format transmission period. If the pending uplink data is high-priority, terminal device 16502 may decide to wait until a scheduled reserved first format transmission period to transmit the pending uplink data. In some aspects, terminal device 16502 may utilize a reserved first format transmission period to request channel reservation assistance from assisting device 16902 or to transmit a transmission request to assisting device 16902. Terminal device 16502 may then transmit the pending uplink data in the resulting reservation period (where terminal device 16502 may be able to specify the reservation period) instead of in the reserved first format transmission period.

In some aspects, terminal device 16502 may enter a sleep or low-power state in between reserved first format transmission periods. For example, terminal device 16502 may identify when reserved first format transmission periods are scheduled, enter a sleep or low-power state in between the scheduled reserved first format transmission periods, and wake up for the scheduled reserved first format transmission periods. This may enable terminal device 16502 to conserve power.

In some aspects, terminal device 16502 may contend for access to the channel during a reserved first format transmission period. For example, there may be other communication nodes attempting to perform first format transmissions that may also identify the reserved first format transmission period. The contending communication nodes including terminal device 16502 may perform carrier sensing to determine when the channel is free and then access the channel according to the contention rules (including, e.g., sensing windows and/or backoff procedures).

In some aspects, a distributed-coordinated channel access scheme (e.g., DCF) can be utilized, such as where the communication nodes contend for access to the channel on a largely equitable basis. In some aspects, the communication nodes of radio communication network 16500 can utilize a point-coordinated channel access scheme (e.g., PCF). For example, network access node 16510 may act as the point coordinator and may have priority access to the channel. In some aspects, such as Wi-Fi use scenarios, network access node 16510 may utilize a shorter sensing period (e.g., PCF Interframe Space (PIFS)) following a transmission than the other communication nodes (which may use e.g., DIFS, where PIFS<DIFS).

As network access node 16510 may be able to occupy the channel before the other communication nodes, network access node 16510 may have control over the channel. Instead of competing for access to the channel (e.g., with contention protocols governed by carrier sensing), the other communication nodes may wait until receiving permission from network access node 16510 before accessing the channel. For example, network access node 16510 may send a polling frame (e.g., Contention Free Poll (CF-Poll)) frame to a given communication node that grants the communication node permission to access the channel. Network access node 16510 may cycle between the communication nodes and sequentially grant access to the channel to each communication node. If a communication node has pending data to transmit, the communication node may perform a transmission on the channel after receiving a polling frame from network access node 16510. If the communication node does not have pending data to transmit and receives a polling frame from network access node 16510, the communication node may transmit a null frame, e.g., a null transmission without any data. In some aspects of point-coordinated channel access schemes, the channel may be divided in time between contention periods (CPs) during which all communication nodes (including network access node 16510) may utilize a distributed-coordinated channel access scheme and contention-free periods (CFPs) during which a point coordinator such as network access node 16510 may control access to the channel with a point-coordinated channel access scheme.

In some aspects, radio communication network 16500 may also utilize a point-coordinated channel access scheme to control access to the channel. Accordingly, network access node 16510 may cycle through the communication nodes (assisting device 16902, terminal device 16504, terminal device 16504, and any other communication nodes) and sequentially grant access to the communication nodes with polling frames. Terminal device 16504 may respond (as conventionally) by performing a data transmission or null transmission upon receiving a polling frame from network access node 16510.

Network access node 16510 may also transmit polling frames to terminal device 16502 to grant terminal device 16502 access to the channel. FIG. 174 shows message sequence chart 17400 illustrating an example in accordance with some aspects. As shown in FIG. 174, network access node 16510 may transmit a polling frame to terminal device 16502 in 17402. In some aspects, network access node 16510 may transmit the polling frame in 17402 as a first format transmission, e.g., a first format polling frame. In some aspects, network access node 16510 may encapsulate the first format polling frame to terminal device 16502 with a coexistence preamble. In some aspects, network access node 16510 may not encapsulate the first format polling frame to terminal device 16502 with a coexistence preamble (as there may not be a risk of collision due to communication nodes needing to receive a polling frame from network access node 16510 before accessing the channel).

After receiving the polling frame from network access node 16510, terminal device 16502 may then transmit pending uplink data to assisting device 16902 as a first format transmission in 17404. In some aspects, terminal device 16502 may use a lower transmission power than would be sufficient to reach network access node 16510.

Assisting device 16902 may then receive the first format transmission from terminal device 16502. Assisting device 16902 may then forward the first format transmission to network access node 16510 in 17406. To uphold the point-coordinated channel access scheme, assisting device 16902 may forward the first format transmission in a short amount of time (e.g., in the duration allowed for transmissions following a polling frame). In some aspects, assisting device 16902 may forward the first format transmission to network access node 16510 as a first format transmission. In some aspects, assisting device 16902 may process the first format transmission to make the first format transmission appear as if it was transmitted directly to network access node 16510 from terminal device 16502, such as by removing any addressing or forwarding information that relates to assisting device 16902 and/or re-addressing the first format transmission to be from terminal device 16502 to network access node 16502. In some aspects, assisting device 16902 may convert the first format transmission to a second format transmission and transmit the second format transmission in 17406.

As the polling frame was for terminal device 16502, network access node 16510 may then transmit an ACK/NACK to terminal device 16502 in 17408, e.g., as a first format transmission. In some aspects, such as if the forwarded first format transmission appears to be directly from terminal device 16502, network access node 16510 may assume that the forwarded first format transmission was transmitted directly to network access node 16510 by terminal device 16502 (e.g., without assisting device 16902).

FIG. 175 shows message sequence chart 17500 as an alternate example to message sequence chart 17400 in accordance with some aspects. As shown in FIG. 175, network access node 16510 may transmit a first format polling frame to terminal device 16502 in 17502. Terminal device 16502 may then transmit a first format transmission to assisting device 16902 in 17504. Instead of forwarding the first format transmission quickly (e.g., as in the case of 17406), assisting device 16902 may hold (e.g., buffer) the first format transmission and wait for network access node 16510 to transmit a polling frame to assisting device 16902 in 17506. In some aspects, network access node 16510 may transmit polling frames to other communication nodes, such as terminal device 16504, during 17506.

Network access node 16510 may then transmit a polling frame to assisting device 16902 in 17508. In some aspects, network access node 16510 may transmit the polling frame in 17508 as a first format transmission. In some aspects, network access node 16510 may transmit the polling frame in 17508 as a second format transmission. After receiving the polling frame from network access node 16510 in 17508, assisting device 16902 may forward the first format transmission (received from terminal device 16502) to network access node 16510 in 17510. In some aspects, assisting device 16902 may forward the first format transmission in 17510 as a first format transmission. In some aspects, assisting device 16902 may forward the first format transmission in 17510 as a second format transmission.

Network access node 16510 may receive the forwarded transmission and transmit an ACK/NACK to assisting device 16902 in 17512 (as either a second format or first format transmission). In some aspects, assisting device 16902 may forward the ACK/NACK to terminal device 16502, e.g., as a first format transmission. Alternatively, in some aspects network access node 16510 may utilize an ACK-only scheme in 17512.

FIG. 176 shows message sequence chart 17600 illustrating another example using a port-coordinated channel access scheme in accordance with some aspects. As shown in FIG. 176, network access node 16510 may transmit a polling frame (second format or first format) to assisting device 16902 in 17602. Assisting device 16902 may therefore determine that it has access to the channel over the following frame, e.g., that the channel is reserved for assisting device 16902. Assisting device 16902 may then notify terminal device 16502 of the channel reservation in 17604 (with a first format transmission). Terminal device 16502 may then transmit a first format transmission to assisting device 16902 in 17606. Assisting device 16902 may then forward the first format transmission (as a first format transmission or after converting to the second waveform format) to network access node 16510 in 17608. As the polling frame may only have been originally intended to grant access to assisting device 16902 to perform a transmission, in some aspects assisting device 16902 and terminal device 16502 may need to perform 17604-17608 in a short duration of time. Network access node 16510 may then transmit an ACK/NACK to assisting device 16902 in 17610 (in the second waveform format or the first waveform format). In some aspects, assisting device 16902 may then forward the ACK/NACK to terminal device 16502.

Additionally, in some aspects assisting device 16902 may also function in a point coordinator role. Accordingly, assisting device 16902 may have point coordinator credentials any may be configured to transmit polling frames to coordinate transmissions by terminal devices connected to assisting device 16902, including terminal device 16502. Accordingly, assisting device 16902 may be configured to seize the channel according to the shorter sensing period for point coordinators (e.g., PIFS) by sending polling frames. In order to ensure that the polling frames are detected by coexisting devices, assisting device 16902 may transmit both first format and second format polling frames. The first format polling frame may identify the terminal device that assisting device 16902 is permitting to use the channel while the format polling frame may be detectable by coexisting devices and used to ensure that coexisting devices such as terminal device 16504 detect the polling frame and refrain from transmitting. Accordingly, assisting device 16902 may utilize point coordinator functionality to reserve the channel for first format devices such as terminal device 16502. In some aspects, assisting device 16902 may only provide point coordinator functionality locally, e.g., for terminal devices connected to assisting device 16902, while network access node 16510 may retain primary point coordinator responsibilities.

The operation of the communication nodes of radio communication network 16500 in a point-coordinated channel access scheme may protect first format transmissions from coexisting devices due to the operation of network access node 16510 as the point coordinator. In some aspects where radio communication network 16500 has both contention periods and contention-free periods, network access node 16510, assisting device 16902, and terminal device 16502 may operate in any manner detailed above regarding distributed-coordination channel access schemes during the contention periods and in any manner detailed above regarding point-coordinated channel access schemes during the contention-free periods.

Various mechanisms may be provided to protect first format transmissions from coexisting devices. For example, in some aspects, an assisting device (e.g., assisting device 16902) may perform channel reservation assistance to reserve the channel for devices configured for first format operation (e.g., terminal device 16502), which may provide protection to the first format devices from collisions caused by coexisting devices. In some aspects, assisting devices and/or network access nodes (e.g., network access node 16510) may encapsulate first format transmissions with coexistence preambles, which may enable coexisting devices to detect the first format transmissions and refrain from accessing the channel. Additionally, due to the use of assisting devices as forwarding links and/or the use of first format transmissions, terminal devices may be enabled to reduce power consumption.

In some aspects, terminal device 16502 may be located closer (e.g., due to mobility) to network access node 16510 than assisting device 16902. Terminal device 16502 may therefore perform first format transmissions directly to network access node 16510. In some aspects, assisting device 16902 may perform channel reservation assistance for terminal device 16502 (e.g., without forwarding) to protect the first format transmissions from terminal device 16502.

The first format transmissions used by terminal device 16502, network access node 16510, and/or assisting device 16902 may be more power efficient than the second format transmission, in particularly at terminal device 16502. In some aspects, the first waveform format may be a single-carrier waveform while in some aspects the second waveform format may be a multi-carrier waveform. In some aspects, the first waveform format may have a low peak-to-average-power ratio (PAPR), which may in some aspects be lower than the PAPR of the second waveform format. In some aspects, the first waveform format may be modulated with binary phase-shift keying (BPSK), quadrature phase-shift keying (QPSK), or Gaussian minimum-shift keying (GMSK). In some aspects, the first waveform format may use a spread-spectrum waveform. In some aspects, the data rate of the first format transmissions (e.g., for spread-spectrum waveforms) may be in the kilobit range, which may provide high spreading gain (e.g., 10-30 dB for a 1 MHz bandwidth). Terminal device 16502, network access node 16510, and/or assisting device 16902 may therefore be configured (at the antenna, radio, and baseband/communication levels) to transmit and receive the first format transmissions.

In an exemplary Wi-Fi setting, the second waveform format may be a wideband Wi-Fi waveform, such as an IEEE 802.11 20 MHz waveform. In some aspects, the first waveform format may be a narrowband Wi-Fi waveform, such as a 5 MHz, 2 MHz, 1 MHz IEEE 802.11 waveform. It will be appreciated that the terms "wideband" and "narrowband" used herein can apply to the sizes of the bands in comparison to each other and are not limited to the exemplary noted frequencies. In some aspects, the first waveform format may be an IEEE 802.11ax OFDMA sub-allocation of 26-tone or 52-tone Resource Units (RUs). Accordingly, network access node 16510 and terminal device 16504 may communicate with wideband Wi-Fi signals on a wideband channel (e.g., 20 MHz) while network access node 16510, terminal device 16502, and assisting device 16902 may communicate with narrowband Wi-Fi signals on a narrowband channel (e.g., 5 MHz, 2 MHz, 1 MHz, etc.) that overlaps with the wideband channel. In some aspects, collision between the wideband and narrowband Wi-Fi signals may be alleviated while enabling power savings at terminal device 16502. In some aspects, the second waveform format and/or the first waveform format may be waveform formats of another radio access technology, such as another short-range or cellular radio access technology, such as LTE or LTE NB IoT deployments in unlicensed spectrum.

In some aspects, assisting device 16902 may be configured to assist multiple terminal devices. As shown in FIG. 177, in an exemplary scenario, terminal devices 16502, 16506, and 16508 may be served by assisting device 16902 (where the number of terminal devices is scalable to any number). In some aspects, assisting device 16902 may operate in a heterogeneous network with network access node 16510, where the coverage area of network access node 16510 may be significantly larger than the coverage area of assisting device 16902. Assisting device 16902 may then serve terminal devices located in its local coverage area, such as terminal devices 16502, 16506, and 16508.

In some aspects, assisting device 16902 may therefore separately perform channel reservation assistance (e.g., in the manner of message sequence chart 17200 or 17300) for each of terminal devices 16502, 16506, and 16508. Assisting device 16902 may perform a channel reservation procedure (e.g., RTS/CTS exchange) for terminal device 16502 to protect transmissions from terminal device 16502. Afterward, assisting device 16902 may perform a channel reservation procedure for terminal device 16506. Afterward, assisting device 16902 may perform a channel reservation procedure for terminal device 16508. In the case of message sequence chart 17200, each channel reservation procedure may involve two channel reservations: a first channel reservation for the initial uplink transmission from the terminal device to assisting device 16902, and a second channel reservation for the forwarding uplink transmission from assisting device 16902.

In some aspects, assisting device 16902 may perform a common channel reservation that enables each of terminal devices 16502, 16506, and 16508 to access the channel simultaneously. For example, as previously indicated, in some aspects the first waveform format may use a narrowband waveform while the second waveform format may use a wideband waveform. The first waveform format may therefore use a narrowband channel while the second waveform format may use a wideband channel, where the narrowband channel may overlap or fall within the wideband channel. As terminal devices 16502, 16506, and 16508 may be configured for narrowband first format operation, multiple of terminal devices 16502, 16506, and 16508 may be able to access the wideband channel concurrently at narrowband 'subchannels' of the wideband channel. For example, if the wideband channel is e.g., 20 MHz and the narrowband channel is e.g., 2 MHz, up to ten terminal devices may each utilize a separate 2 MHz narrowband 'subchannel' of the 10 MHz wideband channel to transmit and receive narrowband first format signals.

Accordingly, in some aspects, assisting device 16902 may reserve the wideband channel and allocate multiple terminal devices to each utilize a different narrowband subchannel for narrowband first format transmission. For example, assisting device 16902 may reserve the wideband channel with network access node 16510 (e.g., as in 17202 or 17204, e.g., with an RTS/CTS exchange that specifies a NAV). Assisting device 16902 may then notify terminal devices 16502, 16506, and 16508 of the channel reservation (e.g., as in 17206 or 17306). In some aspects, assisting device 16902 may specify a narrowband subchannel allocation in the channel reservation notifications, where the narrowband subchannel allocations may specify a different frequency subband, or narrowband subchannel, of the wideband channel that each of terminal devices 16502, 16506, and 16508 are assigned. As terminal devices 16502, 16506, and 16508 are assigned different narrowband subchannels, terminal devices 16502, 16506, and 16508 may transmit concurrently (e.g., with narrowband first format transmissions each using a different narrowband subchannel) without interfering with each other.

Accordingly, after receiving the channel reservation notifications and subchannel allocations, terminal devices 16502, 16506, and 16508 may each perform a narrowband first format uplink transmission to assisting device 16902 (during the reservation period) on the respectively assigned narrowband subchannel allocation. In some aspects (e.g., where the reservation period has sufficient duration to include both an initial uplink transmission and forwarded uplink transmission), assisting device 16902 may then forward the narrowband first format uplink transmissions to network access node 16510 (e.g., as in 17210-17212).

In some aspects, assisting device 16902 may forward the narrowband first format uplink transmissions using the first format, such as by forwarding each respective narrowband first format uplink transmission on the corresponding narrowband subchannel allocation. In some aspects, (e.g., where the reservation period does not have sufficient duration to include both an initial uplink transmission and forwarded uplink transmission), assisting device 16902 may encapsulate the narrowband first format uplink transmissions with a coexistence preamble, hold (e.g., buffer) the narrowband first format uplink transmissions, and perform carrier sensing (e.g., as in 17310-17312) to gain access to the channel via contention. After gaining access to the channel, assisting device 16902 may then transmit the narrowband first format uplink transmissions encapsulated by the coexistence preamble (e.g., as in 17314-17316). In some aspects, assisting device 16902 may reserve the channel again (e.g., with an RTS/CTS exchange) and forward the narrowband first format uplink transmissions (e.g., without coexistence preamble encapsulation) to network access node 16510 during the reservation period.

Assisting device 16902 may therefore perform a common channel reservation to enable multiple terminal devices to perform protected first format transmissions concurrently. This may reduce the number of channel reservation assistance procedures that assisting device 16902 performs (compared to performing separate channel reservation assistance procedures), and may improve network efficiency.

In an exemplary Wi-Fi scenario, terminal devices 16502, 16506, and 16508 may transmit the concurrent narrowband first format transmissions to assisting device 16902 using an OFDMA scheme, such as by using narrowband subchannel allocations that have the minimum Resource Unit (RU) size in IEEE 802.11ax OFDMA mode. Assisting device 16902 may therefore assign the narrowband subchannel allocations based on RUs in IEEE 802.11ax OFDMA. In some aspects, assisting device 16902 may assign the narrowband subchannel allocations based on FDMA (as opposed to OFDMA). This may loosen the transmit timing, frequency, and power control requirements compared to OFDMA, which may reduce the cost of terminal devices 16502, 16506, and 16508. However, OFDMA may in some aspects enable a smaller RU size, e.g., a smaller narrowband subchannel allocation size. Furthermore, in some aspects the narrowband subchannel allocations may be different sizes, where e.g., terminal device 16502 is allocated a larger narrowband subchannel (by bandwidth) than terminal device 16506, and may consequently be able to transmit with a higher data rate (potentially at the cost of higher power consumption). Assisting device 16902 may also be configured with more complex receiver components (e.g., at antenna system 17006 and radio module 17004) to support common channel reservation due to the narrowband subchannel allocations and/or FDMA/OFDMA/MIMO schemes. In some aspects, assisting device 16902 may support Bluetooth, Zigbee, and/or different flavors of LTE, which may operate in the same unlicensed band.

In some aspects, assisting device 16902 may utilize 'trigger frames' to schedule transmissions for terminal devices 16502, 16506, and 16508. Accordingly, assisting device 16902 may utilize trigger frames (e.g., Wi-Fi trigger frames) to schedule concurrent transmissions by terminal devices 16502, 16506, and 16508 on specific time-frequency radio resources, e.g., specific FDMA or OFDMA subcarriers. These trigger frames may convey uplink scheduling, modulation and other uplink transmission parameters. In addition, scheduled devices may use the information in trigger frames to synchronize their frequency and timing to the network access node 16510 and/or assisting device 16902 prior to performing an uplink transmission In some aspects, assisting device 16902 may also perform relaying in the downlink direction on transmissions from network access node 16510 to terminal device 16502. For example, in some aspects, network access node 16510 may transmit second format downlink transmissions intended for terminal device 16502 (e.g., with addressing information specifying terminal device 16502) to assisting device 16902. Assisting device 16902 may receive and forward the second format downlink transmissions to terminal device 16502. In some aspects, assisting device 16902 may receive the second format downlink transmission from network access node 16510, contend for the channel (e.g., with carrier sensing and/or channel reservations), and forward the second format downlink transmission to terminal device 16502 after gaining access to the channel. In some aspects, assisting device 16902 may forward the second format downlink transmission to terminal device 16502 by converting the second format downlink transmission to a first format downlink transmission and transmitting the first format downlink transmission to terminal device 16502. In some aspects, assisting device 16902 may reserve the channel (e.g., via an RTS/CTS exchange with network access node 16510) and transmit the first format downlink transmission during the reservation period. In some aspects, assisting device 16902 may encapsulate the first format downlink transmission with a coexistence preamble and transmit the first format downlink transmission to terminal device 16502 with the encapsulating header.

Accordingly, in some aspects, network access node 16510 may be configured only for second format operation. Assisting device 16902 may then perform second waveform format-to-first waveform format conversion to forward downlink transmissions from network access node 16510 to terminal device 16502 and first waveform format-to-second waveform format conversion to forward uplink transmissions from terminal device 16502 to network access node 16510. Assisting device 16902 may also handle coexistence issues such as with channel reservation assistance and/or coexistence preamble encapsulation.

In some aspects, network access node 16510 may be configured only for first format operation. Accordingly, network access node 16510 and terminal device 16502 may communicate using the first waveform format. Assisting device 16902 may then forward uplink transmissions from terminal device 16502 to network access node 16510 in the first waveform format. In some aspects, assisting device 16902 may perform channel reservation assistance and/or coexistence preamble encapsulation for network access nodes 16510 and/or terminal device 16502.

FIG. 178 shows an exemplary deployment of some aspects in a Wi-Fi IoT setting. As shown in FIG. 178, network access node 16510 may serve a group of communication nodes including terminal devices 16502, 16504, 16506, and 16508, and assisting device 16902 (in addition to various other communication nodes, if applicable). As shown in FIG. 178, network access node 16510 may be configured as an access point, terminal device 16502 may be configured as a smoke detector, terminal device 16504 may be configured as a front door camera, terminal device 16506 may be configured as light bulb, terminal device 16508 may be configured as a weight scale, and assisting device 16902 may be configured as an electrical plug. These IoT devices are exemplary and the communication nodes of radio communication network 16500 may be configured as various other types of devices.

Terminal device 16504 may be configured to utilize the second waveform format with a wideband channel, e.g., where the second waveform format is a wideband waveform. For example, terminal device 16504 may require higher data rates to support video feeds. In accordance with the exemplary Wi-Fi setting, terminal device 16504 may utilize an e.g., 20 MHz IEEE 802.11 wideband channel to transmit and receive signals with network access node 16510. As terminal devices 16502, 16506, and 16508 may have less demanding data needs, terminal devices 16502, 16506, and 16508 may be configured to utilize the first waveform format with a narrowband channel, e.g., where the first waveform format is a narrowband waveform. For example, smoke detectors, light bulbs, weight scales, and various other low-bandwidth IoT devices may not require high data rates and/or may transmit and receive data only sparingly and/or in low quantities. Continuing with the exemplary Wi-Fi setting, terminal devices 16502, 16506, and 16508 may utilize a 2 MHz narrowband channel to transmit and receive signals with network access node 16510 and/or assisting device 16902. As previously detailed, the narrowband channel may be single carrier, may have a low PAPR, may use a BPSK, QPSK, or GMSK modulation scheme, may be a spread spectrum, and/or may utilize a low data rate (e.g., in the kilobit range).

Use of the narrowband channel may reduce power consumption at terminal devices 16502, 16506, and 16508. High power efficiency may be important in IoT deployments such as the exemplary deployment shown in FIG. 178. For example, in some aspects one or more of terminal devices 16502, 16506, and 16508 may be powered with non-rechargeable batteries, such as a coin cell battery. In some aspects, one or more of terminal devices 16502, 16506, and 16508 may be powered by rechargeable batteries. In some aspects, one or more of terminal devices 16502, 16506, and 16508 may target long battery life, such as one year, five years, ten years, etc., which may reduce the frequency of battery replacements and/or recharging. In some aspects, one or more of terminal devices 16502, 16506, and 16508 may be utilize solar power (e.g., if located outside) or ambient energy harvesting (e.g., if located inside) as a partial or sole power supply.

Terminal device 16502 may also reduce power consumption by using assisting device 16902 as a relay node to forward transmissions to network access node 16510. As terminal device 16502 may be located closer to assisting device 16902 (such as in the same room as shown in FIG. 178) than to network access node 16510 (which may be in a different room as shown in FIG. 178), terminal device 16502 may utilize a lower transmission power to transmit to assisting device 16902 than would be sufficient to transmit to network access node 16510. As assisting device 16902 may be an AC-powered device, assisting device 16902 may be able to receive uplink transmissions from terminal device 16502 (intended for network access node 16510) and forward the uplink transmissions to network access node 16510 with greater transmission power (than used by terminal device 16502 for the original transmission).

In some aspects, network access node 16510 may transmit downlink transmissions to terminal device 16502 in the narrowband first waveform format with a narrowband channel (where the narrowband channel is a lesser portion of the wideband channel used by terminal device 16504). In some aspects, network access node 16510 may protect the narrowband first format downlink transmissions to terminal device 16502 by encapsulating the narrowband first format downlink transmissions with a coexistence preamble, e.g., a header that is detectable and readable by other coexisting devices that are not using the narrowband channel and/or are using a different waveform format, which can include coexisting devices configured according to the first waveform format. For example, network access node 16510 may encapsulate the narrowband first format downlink transmissions with a 20 MHz IEEE 802.11 preamble. As coexisting terminal devices (operating on the wideband channel) such as terminal device 16504 may be able to detect and read first waveform format preambles, e.g., 20 MHz IEEE 802.11 preambles, terminal device 16504 may be able to detect the narrowband first format downlink transmissions and refrain from accessing the channel during the narrowband first format downlink transmissions.

In some aspects, assisting device 16902 may perform channel reservation assistance and/or coexistence preamble encapsulation for terminal device 16502, such as in the manner detailed above regarding any of FIGS. 172-176. Accordingly, assisting device 16902 may exchange RTS/CTS messages with network access node 16510 that specify a NAV. Coexisting terminal devices such as terminal device 16504 may detect the RTS/CTS messages and determine that the channel will be busy for the duration of the NAV. Terminal device 16502 may then transmit narrowband first format uplink transmission to assisting device 16902, which may forward the narrowband first format uplink transmission to network access node 16510 before expiry of the NAV, after expiry of the NAV and after reserving the channel again (which may be a narrowband first format transmission), and/or after expiry of the NAV and after gaining access to the channel via contention (which may be a narrowband first format transmission encapsulated with a coexistence preamble). In some aspects, assisting device 16902 may perform common channel reservation for multiple of terminal devices 16502, 16508, and 16508.

In some aspects, collisions from coexisting networks may be avoided. For example, in addition to avoiding collisions from coexisting devices in the same network such as terminal device 16504, assisting device 16902 may perform channel reservations and/or coexistence preamble encapsulation for terminal device 16502 that can protect transmissions by terminal device 16502 from transmissions by communication nodes of other networks, e.g., networks provided by network access nodes other than network access node 16510.

Terminal devices (including IoT devices) may therefore be enabled to reduce power consumption while successfully coexisting with other terminal devices (e.g., terminal devices using a different waveform format). In particular, terminal devices may reduce uplink transmit power by using assisting devices as relay nodes. In some aspects, the terminal devices may also use waveform format that has low power characteristics, such as a narrowband waveform, a single carrier waveform, and/or a low PAPR waveform. In some aspects, assisting devices and/or network access nodes may assist in protecting transmissions to and from the terminal devices from collisions with channel reservation assistance and/or coexistence header encapsulation.

FIG. 179 shows method 17900 of performing radio communications at a terminal device in accordance with some aspects. As shown in FIG. 179, method 17900 includes receiving a downlink radio transmission in a first waveform format from a network access node on a radio channel (17910). A notification is received from a forwarding device that indicates that the radio channel is protected from collisions with transmissions of a second waveform format during a reservation period (17920). An uplink radio transmission is transmitted in accordance with the reservation period to the forwarding device that instructs the forwarding device to route the uplink radio transmission to the network access node (17930).

FIG. 180 shows method 18000 of performing radio communications at a communication device in accordance with some aspects. As shown in FIG. 180, method 18000 includes receiving, on a radio channel, an uplink radio transmission in a first waveform format from a terminal device that instructs the communication device to forward the uplink radio transmission to a network access node (18010). The uplink radio transmission is transmitted, on the radio channel, to the network access node with a preamble in a second waveform format to protect the uplink radio transmission from collisions (18020).

FIG. 181 shows method 18100 of performing radio communications at a communication device in accordance with some aspects. As shown in FIG. 181, method 18100 includes communicating with a terminal device on a radio channel according to a first waveform format (18110). A transmission request is transmitted on the radio channel in a second waveform format to a network access node that specifies a reservation period (18120). A terminal device is notified that the radio channel is reserved for the reservation period (18130). A radio transmission is received in the first waveform format from the terminal device (18140). The radio transmission is transmitted to the network access node in accordance with the reservation period (18150).

5.2 Enhanced Communication #2

In some aspects, a vehicle may provide a local vehicle radio network for terminal devices traveling in the vehicle to access. When the terminal devices initially enter the vehicle, the local vehicle radio network may exchange context information with the terminal devices that indicates user data content preferences, e.g., information about one or more data files and/or types of data files (e.g., media or multimedia content) that users of the terminal devices will predictably access during travel. The local vehicle radio network may then use the context information to anticipate target data that the terminal devices may request during travel. The local vehicle radio network may then access an available internet connection to retrieve the target data and locally cache the target data. During travel (when the internet connection may no longer be available), if a terminal device requests any of the cached data from the local vehicle radio network, the local vehicle radio network may provide the requested data to the terminal device. The local vehicle radio network may also act as a gateway to an external radio network for the terminal devices during travel.

FIG. 182 shows an exemplary illustration of some aspects. As shown in FIG. 182, vehicle 18202 may be initially located in loading area 18210 in scenario 18200*a*. Loading area 18210 may include any general area where the vehicle 18202 is parked. Vehicle 18202 may be e.g., a bus, a plane, an airplane, a train, a car, a boat, or any other type of vehicle. Terminal devices 18206 and 18208 may enter vehicle 18202 at loading area 18210 and connect to a local vehicle radio network provided by vehicle network access node 18204 of vehicle 18202. In some aspects, terminal devices 18206 and 18208 may be configured in the manner of terminal device 16502 as shown and described regarding FIG. 166. Vehicle network access node 18204 may then predict target data that terminal device 18206 or 18208 may wish to access during travel. Vehicle network access node 18204 may then download the target data from loading network node 18212 (which may have an internet connection) via interface 18214 and locally store, or 'cache', the retrieved data (e.g., cached data). When vehicle 18202 is traveling, such as in scenario 18200*b*, terminal device 18206 or 18208 may request certain data (e.g., one or more data files, which can include stored data files and active/ongoing data streams) from vehicle network access node 18204. If vehicle network access node 18204 has already downloaded and cached requested data, vehicle network access node 18204 may provide the requested data to terminal device 18206 or 18208 via the local cloud network. If vehicle network access node 18204 does not have the requested data cached locally, terminal device 18206 or 18208 may utilize an external radio network, such as provided by network access node 18218, to retrieve the requested data. Alternatively, vehicle network access node 18204 may act as a gateway between terminal device 18206 or 18208 and the external radio network and retrieve the requested data via network access node 18218.

Accordingly, vehicle network access node 18204 may predict target data that terminal devices traveling on vehicle 18202 may request during travel. By retrieving the target data from a loading network node 18212 and caching the target data, vehicle network access node 18204 may provide data to the terminal devices on demand. The terminal devices may therefore not need to utilize an external radio network to retrieve the data, which may avoid depletion of data allotments of the terminal devices. In some aspects, the local vehicle radio network provided by vehicle network access node 18204 may be a high-capacity, high-speed, and/or high reliability connection (e.g., due to the close proximity within vehicle 18202), which may enable terminal devices traveling in vehicle 18202 to quickly download any requested data that is locally cached by vehicle network access node 18204. In some aspects, the local vehicle radio network provided by vehicle network access node 18204 may have higher speed/capacity/reliability than an external network used by terminal devices 18206 or 18208, such as a cellular radio access network provided by network access node 18218.

FIG. 183 shows an exemplary internal configuration of vehicle network access node 18204 in accordance with some aspects. As shown in FIG. 183, vehicle network access node 18204 may include antenna system 18302, radio module 18304, communication module 18306 (including physical layer module 18308 and control module 18310), and cache memory 18312. Vehicle network access node 18204 may transmit and receive radio signals via antenna system 18302, which may be an antenna array including one or more antennas. Radio module 18304 may perform transmit and receive RF processing to convert outgoing digital data from communication module 18306 into analog RF signals to provide to antenna system 18302 for radio transmission and to convert incoming analog RF signals received from antenna system 18302 into digital data to provide to communication module 18306. Physical layer module 18308 may be configured to perform physical layer reception processing on digital data received from radio module 18304 to provide to control module 18310 and to perform physical layer transmission processing on digital data received from control module 18310 to provide to radio module 18304. Control module 18310 may control the communication functionality of vehicle network access node 18204 according to the corresponding radio access protocols, which may include exercising control over antenna system 18302, radio module 18304, and physical layer module 18308. In some aspects, communication module 18306 may also be configured to perform application-layer functions. Each of radio module 18304, communication module 18306, physical layer module 18308, and control module 18310 may be structurally realized as a hardware-defined module, e.g., as one or more dedicated hardware circuits or FPGAs, as a software-defined module, e.g., as one or more processors executing program code that define arithmetic, control, and I/O instructions (e.g., software and/or firmware) stored in a non-transitory computer-readable storage medium, or as a mixed hardware-defined and software-defined module.

In some aspects, vehicle network access node 18204 may be structurally integrated with vehicle 18202. In some aspects, vehicle network access node 18204 may utilize a power supply that is part of or provided by vehicle 18202. In some aspects, components of vehicle network access node 18204 may be mounted onto or into the frame of vehicle 18202. For example, in some aspects antenna system 18302 may be deployed as a roof-mounted antenna. In some aspects, the components of vehicle network access node 18204 may be distributed at separate locations in vehicle 18202 and may be connected with one another via wired or wireless connections.

As previously indicated, vehicle network access node 18204 may retrieve target data from loading network node 18212 over interface 18214. In some aspects, interface 18214 may be a radio interface. Accordingly, communication module 18306 may transmit and receive radio signals (via radio module 18304 and antenna system 18302) with loading network node 18212 over interface 18214 according to specific radio access protocols. In some aspects, the radio access protocols may be cellular or short-range radio access protocols.

In some aspects, interface 18214 may be a wired interface (where both wired and radio options for interface 18214 are depicted for exemplary purposes in FIG. 183). Accordingly, communication module 18306 may exchange digital data with loading network node 18212 over a wired connection. In some aspects, the wired connection may be e.g., an Ethernet or fiber connection. In some aspects where interface 18214 is a wired interface, vehicle 18202 may connect, or 'dock', with a docking station of loading area 18210 to complete the wired connection between vehicle network access node 18204 and loading network node 18212. In some aspects where interface 18214 is a radio interface, vehicle network access node 18204 may connect with loading network node 18212 over interface 18214 (a wireless connection) when vehicle 18202 enters loading area 18210.

Communication module 18306 may also interface with cache memory 18312. Communication module 18306 may utilize cache memory 18312 to store cached data, such as cached data retrieved from loading network node 18212 based on target data that vehicle network access node 18204 anticipates that terminal devices traveling in vehicle 18202 will request. Communication module 18306 may receive requests for certain data (e.g., one or more data files, which may include e.g., movies, video clips, television show episodes, songs, podcasts, websites, files, albums, audiobooks, etc.) from terminal devices that are traveling in vehicle 18302, such as terminal devices 18206 and 18208, retrieve the requested data from cache memory 18312, and provide the requested data to the requesting terminal device via radio module 18304 and antenna system 18302.

FIG. 184 shows message sequence chart 18400 in accordance with some aspects. As shown in FIG. 184, terminal device 18206 may initially enter vehicle 18202 in 18402. In some aspects, terminal device 18208 may also perform the process of message sequence chart 18400. After entering vehicle 18202 in 18402 (or moving within the vicinity of vehicle network access node 18204, in other words, close enough to connect or detect), terminal device 18206 may connect with vehicle network access node 18204 in 18404. For example, baseband modem 16606 of terminal device 18206 (where terminal device 18206 is configured in the manner of terminal device 16502 shown in FIG. 166) may establish a radio connection with vehicle network access node 18204 (via exchange of connection/attach signals with RF transceiver 16604 and antenna system 16602), which may be a software-level connection between baseband modem 16606 of terminal device 16502 and communication module 18306 of vehicle network access node 18204 that relies on a radio connection provided by antenna system 16602, RF transceiver 16604, antenna system 18302, and radio module 18304 to transmit and receive radio signals.

After connecting in 18404, terminal device 18206 and vehicle network access node 18204 may exchange context information in 18406. The context information may be relevant for determining the target data (e.g., one or more data files) that terminal device 18206 may request during travel of vehicle 18202. In some aspects, the context information may be trip duration information and/or user data content preference information. For example, in some aspects terminal device 18206 (under the control of baseband modem 16606) may provide information related to the duration of time and/or distance that terminal device 18206 is expected to travel in vehicle 18202, e.g., trip duration information. For example, terminal device 18206 may provide vehicle network access node 18204 with a target destination of terminal device 18206 (which may be, but not necessarily, initially provided by a user of terminal device 18206 via user input), an expected disembarking time, etc.

In some aspects, terminal device 18206 may provide context information in 18406 that indicates user data content preferences. For example, terminal device 18206 may identify types of multimedia (e.g., media content) that a user of terminal device 18206 frequently accesses. In an exemplary scenario, a user of terminal device 18206 may frequently watch a particular television show, may frequently watch a particular genre of television show or movie, may frequently listen to a particular music artist, may frequently listen to a particular genre of music, may frequently listen to a particular podcast, may frequently read a particular news or online website, may frequently access a particular video or image sharing/hosting website, etc. Numerous other scenarios, types of media content, and media access habits are also within the scope of this disclosure. Terminal device 18206 may then provide information that indicates such user data content preferences to vehicle network access node 18204. In some aspects, terminal device 18206 may collect historical data) based on user interaction with terminal device 18206 that indicates user data. This historical data may be collected before initiation of the process of message sequence chart 18400, such as during normal operation of terminal device 18206. Terminal device 18206 may then determine the user data content preferences from the historical data and provide the user data content preferences to vehicle network access node 18204 in 18406. In some aspects, the user data content preferences may indicate the likelihood or probability that a user of terminal device 18206 will request a particular data file or type of data file (e.g., movies, video clips, songs, albums, websites, etc.). In some aspects, the user data content preferences may indicate data (e.g., one or more data files) that a user of terminal device 18206 may request at a later time. In some aspects, the user data content preferences may indicate historical data regarding data that a user of terminal device 16502 has accessed. In some aspects, the user data content preferences indicate user habits for media content access or viewing. These aspects can be used with context awareness aspects described herein.

In some aspects, vehicle network access node 18204 may query terminal device 18206 for user data content preferences. In some aspects, when terminal device 18206 connects to vehicle network access node 18204, vehicle network access node 18204 may direct terminal device 18206 to a user data content preference website or application. Terminal device 18206 may then load the user data content preference website or application and display the user data content preference website or application to a user of terminal device 18206 (e.g., at the application layer via application processor 16612 and user I/O components of terminal device 18206). Terminal device 18206 may then accept user input from a user of terminal device 18206 that specifies the user data content preferences, such as any of the types of user data content preferences (preferred movies, television shows, music, websites, etc.). Terminal device 18206 may collect the user data content preferences provided by the user and send the user data content preferences to vehicle network access node 18204 in 18406, such as through the user data content preference website or application. A user of terminal device 18206 may therefore be able to select or specify the data that the user or terminal device 18206 may access or use during the trip.

In some aspects, the exchange of context information in 18406, in addition to subsequent exchange of data between vehicle network access node 18204 and terminal devices via the local vehicle radio network, may be governed by specific communication protocols that define communication rules for exchange of wireless data. Vehicle network access node 18204 and terminal device 18206 may therefore exchange the context information in 18406 according to the communication protocols. In some aspects, vehicle network access node 18204 and terminal device 18206 may communicate over the local vehicle radio network using a short-range or a cellular radio access technology.

Vehicle network access node 18204 may then identify target data in 18408, (e.g., one or more data files) that a user of terminal device 18206 may request during travel of vehicle 18202. or data in general that the terminal device 18206 will use. In some aspects, communication module 18306 of vehicle network access node 18204 may process the context information in order to identify the target data in 18408. For example, if terminal device 18206 provides a particular genre of television show or movie that a user of terminal device 18206 frequently watches, vehicle network access node 18204 may identify one or more television shows or movies of the particular genre as target data in 18408. In another example, terminal device 18206 may provide the identity of a television show that a user of terminal device 18206 is currently watching, such as by accessing a video-on demand website or application that the user watches the television show on. Vehicle network access node 18204 may then identify the television show as target data in 18408. In some aspects, terminal device 18206 may also provide a current episode (e.g., by accessing the video-on demand website or application to identify previously viewed video content) of the television show. Vehicle network access node 18204 may then identify the current episode (optionally in addition to one or more upcoming episodes) as target data in 18408. In another example, if terminal device 18206 provides a particular website (e.g., a news website, an image/video hosting/sharing website, etc.) that a user of terminal device 18206 frequently visits, vehicle network access node 18204 may identify website data of the particular website as target data in 18408. In another example, if terminal device 18206 provides a particular podcast that a user of terminal device 18206 frequently listens to, vehicle network access node 18204 may identify a current podcast episode as target data in 18408.

In some aspects, vehicle network access node 18204 may identify the target data in 18408 based on the trip duration information. For example, in an exemplary scenario, the trip duration information provided by terminal device 18206 may indicate that terminal device 18206 is expected to travel on vehicle 18202 for a short duration of time (e.g., less than an hour, several hours, etc.). In another exemplary scenario, the trip duration information provided by terminal device 18206 may indicate that terminal device 18206 is expected to travel on vehicle 18202 for a long duration of time (e.g., five hours, ten hours, one day, etc.). As users taking long trips may be expected to access more data, network access node 18204 may be configured to identify a larger amount of target data in 18408 if the trip duration information indicates that terminal device 18206 will take a long trip compared to if the trip duration information indicates that terminal device 18206 will take a short trip.

In some aspects, vehicle network access node 18204 (at communication module 18306) may also utilize spatial-temporal trip information to identify the target data in 18408. For example, there may be certain times of day when terminal devices can be expected to access more data during trips than others. For example, users can be expected to access more data during daytime than nighttime (when some users may be sleeping). In some aspects, vehicle network access node 18204 may identify a larger amount of target data in 18408 if terminal device 18206 is taking a daytime trip (which may be indicated by trip duration information) than if terminal device 18206 is taking a nighttime trip.

In another example, certain data may be popular in certain geographical areas, such as 'viral' videos that are popular in a given geographic area, news websites that provide coverage focused in a given geographic area, etc. Vehicle network access node 18204 may therefore identify spatial-temporal trip information that indicates a geographic area that vehicle 18202 is currently in and/or is travelling through. Vehicle network access node 18204 may then identify target data based on the geographic area, such as content that is popular in the geographic area. In some aspects, vehicle network access node 18204 may access the internet (via loading network node 18212 over interface 18214) to determine which content is popular in the identified geographic area. In some aspects, a library of content may be downloaded according to aforementioned aspects, e.g., popularity, preferences, geographic area, etc.

As previously indicated, in some aspects communication module 18306 of vehicle network access node 18204 may process the context information, in addition to other spatial-temporal trip information (if any), to identify the target data in 18408. For example, communication module 18306 may perform machine learning-based techniques to 'learn' what types of data that users of terminal devices frequently access while on trips. Nonlimiting examples of machine learning techniques that communication module 18306 can apply include supervised or unsupervised learning, reinforcement learning, genetic algorithms, rule-based learning support vector machines, artificial neural networks, Bayesian-tree modeling, or hidden Markov modeling. In some aspects, communication module 18306 calculates a likelihood that certain data will be accessed by terminal device 18206. For example, communication module 18306 may determine that a television show that a user has watched multiple episodes and/or seasons of (as indicated in the user data content preference information provided in 18406) is more likely to be accessed during the trip than a television show that a user has only watched e.g., one episode of. In another example, communication module 18306 may determine that new episodes of television show that a user of terminal device 18206 recently watched television show is more likely to be accessed during the trip than a television show that the user has not watched recently. In another example, communication module 18306 may determine that an episode or movie in a user's queue (e.g., at a video-on demand website or application) is more likely to be watched during the trip than episodes or movies that are not in the user's queue. In some aspects, communication module 18306 may calculate a probability metric (that indicates a likelihood of being accessed during the trip) for different data (e.g., different data files) based on the context information and/or spatial-temporal trip information and select the data (e.g., one or more data files) with the highest probability metric as the target data in 18408. In some aspects, communication module 18306 may select a predefined number of data files with the highest probability metrics (where the probability metrics indicated the likelihood or probability that a terminal device will request the data during travel) as the target data in 18408. In some aspects, communication module 18306 may select the data files with the highest probability metrics up to a predefined total data size (which may be e.g., dependent on the total capacity or remaining capacity of cache memory 18312) as the target data in 18408.

In some aspects, communication module 18306 may process the context information and/or spatial-temporal trip information with a probabilistic (or predictive) algorithm that is embodied as software-defined program code (and retrievable from a non-transitory computer readable medium), where the probabilistic algorithm may assign probability scores (or predictive weights) to different data (e.g., one or more data files). Communication module 18306 may then identify the target data in 18408 based on the probability scores, which may be a quantitative analysis of the context information and/or spatial-temporal trip information. In some aspects, communication module 18306 may access the internet (via loading network node 18212) to exchange learning results and/or current trends, which may e.g., originate from vehicle network access nodes in other vehicles.

In some aspects, vehicle network access node 18204 may consider the user data content preference information from multiple terminal devices in identifying the target data in 18408. For example, multiple terminal devices may provide network access node 18204 with user data content preference information. Communication module 18306 of network access node 18204 may then aggregate the user data content preference information to identify data that is most likely to be accessed by any of the terminal devices e.g., that have the highest collective probability of being requested by the terminal devices. Communication module 18306 may then be configured to identify the target data 18408 based on the collective probabilities, e.g., based on the user data content preference information from multiple terminal devices.

After identifying the target data in 18408, vehicle network access node 18204 may access loading network node 18212 to request and receive the target data in 18410 and 18412. Accordingly, vehicle network access node 18204 may request the target data from loading network node 18212 via interface 18214 in 18410. Vehicle network access node 18204 may request the target data while vehicle 18202 is still in loading area 18210, e.g., when interface 18214 is still active between loading network node 18212 and vehicle network access node 18204.

As previously indicated, in some aspects, interface 18214 may be a radio interface. Accordingly, loading network node 18212 may be a network access node such as a base station or an access point. In some aspects, interface 18214 may provide a high-speed or high-speed/capacity/reliability wireless connection between loading network node 18212 and vehicle network access node 18204, which may enable vehicle network access node 18204 to quickly download large amounts of data via loading network node 18212 via a wireless connection. Alternatively, in some aspects, interface 18214 may be a wired interface, such as an Ethernet or fiber interface. Accordingly, loading network node 18212 may be a router or gateway. In some aspects, interface 18214 may provide a high-speed/capacity/reliability wired connection between loading network node 18212 and vehicle network access node 18204, which may enable vehicle network access node 18204 to quickly download large amounts of data (e.g., in the order of hundreds of gigabytes, terabytes, etc.) via loading network node 18212 via a wired connection.

Loading network node 18212 may interface (via a backhaul interface) with the internet, and accordingly may provide vehicle network access node 18204 with an internet connection. In some aspects where interface 18214 is a radio interface, loading network node 18212 may interface with a core network (such as a cellular core network) that provides internet access. In some aspects where interface 18214 is a wired interface, loading network node 18212 may include or may interface with an internet router configured to query and receive internet data from various internet locations and servers.

Accordingly, after receiving the request for target data from vehicle network access node 18204 in 18410, loading network node 18212 may retrieve the target data from the internet in 18412. For example, if the target data requested by vehicle network access 18204 is a movie or television show from an on-demand video website or application, loading network node 18212 may download the movie or television show from a server of the on-demand video website or application in 18412. In another example, if the target data requested by vehicle network access node 18204 is a website, loading network node 18212 may download website data (including e.g., one or more sections, pages, article, etc., of the website) from a server supporting the website in 18412. In another example, if the target data requested by vehicle network access node 18204 is one or more videos from a video hosting website, loading network node 18212 may download the one or more videos from a server of the video hosting website in 18412. In another example, if the target data requested by vehicle network access node 18204 is music files from a music streaming website or application, loading network node 18212 may download the music files from a server of the music streaming website or application. In some aspects where the target data is accessible with subscriber information (e.g., a subscriber login for a video on-demand website, a subscriber login for a music streaming website, etc.), terminal device 18206 may provide the subscriber information to vehicle network access node 18204, which may then provide the subscriber information to loading network 18212 with the target data request in 18410. Loading network node 18212 may then access the target data from the associated servers with the subscriber information. In some aspects, vehicle network access node 18204 may have a subscription and may provide loading network node 18212 with the subscriber information for vehicle network access node 18204.

Loading network node 18212 may then provide the target data to vehicle network access node 18204 in response to the target data request in 18414. In some aspects, loading network node 18212 may not be able to retrieve some of the requested target data in 18412. Loading network node 18212 may notify vehicle network access node 18204 of any target data that loading network node 18212 was not able to retrieve. In some aspects, if loading network node 18212 is unable to retrieve some of the requested data, vehicle network access node 18204 may attempt to access the unretrieved data at a later time, such as when vehicle network access node 18204 connects to another loading network node.

Vehicle network access node 18204 may then cache the target data in 18416. In some aspects, communication module 18306 of vehicle network access node 18204 may receive the target data from loading network node 18212 over interface 18214 (either wired or radio) and store the target data in cache memory 18312 in 18416.

Accordingly, vehicle network access node 18204 may retrieve target data that a user of terminal device 18206 may access during travel of vehicle 18202. Vehicle network access node 18204 may complete caching of target data in 18416 while vehicle 18202 is still located in loading area 18210 (as interface 18214 may remain active while vehicle 18202 is located in the vicinity of loading area 18210, e.g., via wired docking or wireless radio connection). In some aspects, vehicle network access node 18204 may collect context information, identify target data, retrieve the target data, and cache the target data (e.g., in the manner of 18404-18416) for multiple terminal devices that enter vehicle 18202 while in loading area 18210. For example, vehicle network access node 18204 may identify target data for terminal device 18208, which may be different from the target data for terminal device 18206 (based on different context information, e.g., trip duration information and/or user data content preference information, provided by terminal device 18208). Vehicle network access node 18204 may then retrieve and cache the target data terminal device 18208. In some aspects, vehicle network access node 18204 may request and receive the target data for terminal devices 18206 and 18208 in the same target data request to loading network node 18212. In some aspects, vehicle network access node 18204 may request and receive the target data for terminal devices 18206 and 18208 in different target data requests to loading network node 18212. Vehicle network access node 18204 may therefore retrieve and cache target data for multiple different terminal devices.

As shown in FIG. 182, vehicle 18202 may begin traveling and leave loading area 18210 (as denoted between scenario 18200*a* and scenario 18200*b*). After leaving loading area 18210, interface 18214 between vehicle network access node may be disconnected (e.g., as a wired docking connection may be disconnected or vehicle 18202 may move outside of the wireless range of loading network node 18212). As terminal devices 18206 and 18208 are located inside vehicle 18202, terminal devices 18206 and 18208 may be stationary relative to vehicle 18202 (in addition to limited movement inside vehicle 18202), and may remain within range and connected to vehicle network access node 18204.

Accordingly, terminal device 18206 may request data (e.g., one or more data files) from vehicle network access node 18204 in 18418. Vehicle network access node 18204 may then determine whether the requested data is in cache memory 18312 in 18420. For example, communication module 18306 may receive the data request from terminal device 18206 in 18418 (via antenna system 18302 and radio module 18304). The data request may specifically identify data that terminal device 18206 is requesting. For example, the data request may identify e.g., a movie, a video clip, an episode of a television show, a song, a podcast, a website, a file, an album, etc. Communication module 18306 may then query cache memory 18312 in 18420 whether the requested data is stored in cache memory 16602.

If communication module 18306 determines in 18420 that the requested data is stored in cache memory 18312, communication module 18306 may retrieve the requested data from cache memory 18312 and provide the requested data to terminal device 18206 in 18424 (as shown in conditional block 18422 referenced by the "Yes" vertex of 18420). Accordingly, terminal device 18206 may be able to retrieve the requested data locally from vehicle network access node 18204, and neither vehicle network access node 18204 nor terminal device 18206 may utilize an external network (e.g., network access node 18218) to provide the requested data to terminal device 18206. After receiving the requested data from vehicle network access node 18204, terminal device 18206 may present the requested data to a user of terminal device 18206 (e.g., at an application layer of application processor 16612 via user I/O, e.g., a visual display/screen, audio speakers, etc.).

In some aspects, vehicle network access node 18204 may have previously retrieved the requested data via loading network node 18212 while vehicle 18202 was in loading area 18210 in scenario 18200*a*. Alternatively, in some aspects, network access node 18204 may have previously retrieved the requested data via another loading network node while vehicle 18202 was at a different loading area. In some aspects, network access node 18204 may have retrieved the requested data via loading network node 18212 in response to context information provided by terminal device 18206. In some aspects, network access node 18204 may have retrieved the requested data via loading network node 18212 in response to context information provided by another terminal device, such as terminal device 18208.

If communication module 18306 of vehicle network access node 18204 determines in 18420 that the requested data is not in cache memory 18312, vehicle network access node 18204 may inform terminal device 18206 that the requested data is not available in 18428 (as shown in conditional block 18426 referenced by the "No" vertex of 18420), e.g., that the requested data is not locally available by vehicle network access node 18204. As shown in FIG. 182, in an exemplary scenario, vehicle 18202 may be within coverage area 18216 of network access node 18218. Terminal device 18206 (under the control of baseband modem 16606) may therefore retrieve the data from network access node 18218. In some aspects, network access node 18218 may be a cellular network access node, e.g., a base station, and may provide internet access via a core network. In some aspects, network access node 18218 may be a roadside unit (RSU). In some aspects, network access node 18218 may be a short-range network access node, e.g., an access point, and may provide internet access via an internet router. Accordingly, terminal device 18206 may utilize network access node 18218 as a radio access connection to interface with the internet via network access node 18218. Terminal device 18206 may therefore request the data via network access node 18218 in 18430 and receive the data from network access node 18218 in 18432. In some aspects, terminal device 18206 may establish an IP connection with an internet server or data network that is storing the requested data (e.g., Packet Data Network (PDN)) via network access node 18218 and exchange data, including the requested data, with the internet server or data network storing the requested data (which may include routing of data through a core network connected to network access node 18218 to a network gateway that interfaces with the internet server or data network). Terminal device 18206 may therefore receive the requested data from network access node 18218 in 18432. In some aspects, terminal device 18206 can utilize aspects described above regarding any of FIGS. 169-181 to transmit and/or receive with vehicle network access node 18204 using a low-power waveform format (e.g., the first waveform format) and to transmit and receive with network access node 18218 with a higher-power waveform format (e.g., the second waveform format). Vehicle network access node 18204 may in some aspects perform channel reservation assistance and/or preamble header encapsulation in addition to relaying to assist terminal device 18206 in transmitting and receiving with network access node 18218.

In some aspects, the local vehicle radio network provided by vehicle network access node 18204 may provide a high-speed/capacity/reliability connection, which may be higher speed speed/capacity/reliability than the radio connection provided by network access node 18218. Accordingly, in some aspects, terminal device 18206 may be able to receive the requested data faster from vehicle network access node 18204 (e.g., if the requested data is cached at vehicle network access node 18204, such as in the case of conditional block 18422) than from network access node 18218 (e.g., if the requested data is not cached at vehicle network access node 18204, such as in the case of conditional block 18426). In some aspects, terminal device 18206 may not utilize any of a data allotment if receiving the requested data from network access node 18204, e.g., may not utilize data from a monthly subscriber data allotment, which may reduce user costs. If terminal device 18206 receives the requested data from an external radio network, such as network access node 18218, the received data may count against a data allotment and deplete the remaining data allotment. Data retrieval times and/or data plan depletion may be reduced. Furthermore, according to some aspects, exchanging data over an external radio network (and instead provide requested data to terminal devices via a local cache memory) may be avoided, so as to reduce network traffic and congestion.

Additionally, in some aspects, terminal device 18206 may 'stream' the requested data from vehicle network access node 18204 in 18424 or from network access node 18218 in 18432. Accordingly, the quality and capacity of the radio connection between terminal device 18206 and vehicle network access node 18204/network access node 18218 may in some aspects affect streaming quality. Accordingly, as the local vehicle radio network provided by vehicle network access node 18204 may have higher speed/capacity/reliability than the external radio network provided by network access node 18218, stream quality may be higher when streaming from vehicle network access node 18204 compared to network access node 18218. Receiving the requested data from vehicle network access node 18204 may therefore be preferable to receiving the requested data from network access node 18218.

In some aspects, the request and provision of data between vehicle network access node 18204 and terminal device 18206 may include further exchange of data. For example, in some aspects, vehicle network access node 18204 may provide a list of cached data to terminal device 18206, which may list the data stored in cache memory 18312. In some aspects where vehicle network access node 18204 caches target data for multiple terminal devices, vehicle network access node 18204 may provide a complete list of data stored in cache memory 18312, which may include data retrieved specifically for terminal device 18206 in addition to data retrieved for other terminal devices, e.g., terminal device 18208.

In some aspects, vehicle network access node 18204 may provide the list of cached target data as a multimedia website or application, which vehicle network access node 18204 may send to terminal device 18206. Terminal device 18206 may receive and load the multimedia website or application and present the multimedia website or application to the user (via user I/O of terminal device 18206). The user may then select data from the list of cached target data, which terminal device 18206 may receive as input and send to vehicle network access node 18204 as a data request in 18418. As the list can indicate the data stored in cache memory 18312, vehicle network access node 18204 may determine that the requested data is in cache memory 18312 in 18420. Vehicle network access node 18204 may then retrieve the requested data from cache memory 18312 and provide the requested data to terminal device 18206 in 18424. In some aspects, provision of a complete list of cached data may avoid 'failed' requests, e.g., as in 18428 when vehicle network access node 18204 does not have the requested data stored in cache memory 18312.

FIG. 185 shows message sequence chart 18500 according to some aspects. Loading network node 18212, vehicle network access node 18204, and terminal device 18206 may perform 18502-18524 in the manner of 18402-18424, respectively. Accordingly, vehicle network access node 18204 may determine in 18520 whether the data requested by terminal device 18206 is stored in cache memory 18312. If the requested data is stored in cache memory 18312, vehicle network access node 18204 may retrieve the requested data from cache memory 18312 and provide the requested data to terminal device 18206 in 18524 (as shown in conditional block 18522 referenced by the "Yes" vertex of 18520). However, if the requested data is not stored in cache memory 18312, vehicle network access node 18204 may retrieve the requested data from network access node 18218 and provide the requested data to terminal device 18206 in 18528-18532 (as shown in conditional block 18526 referenced by the "No" vertex of 18520). Accordingly, instead of notifying terminal device 18206 that the requested data is not available (e.g., as in 18428), vehicle network access node 18204 may request the requested data from network access node 18218 in 18528. Network access node 18218 may then retrieve the requested data via an internet connection (e.g., through a core network or internet router, such as from an internet server or data network storing the requested data) and provide the requested data to vehicle network access node 18204 in 18530. After receiving the requested data from network access node 18218 in 18530, vehicle network access node 18204 may provide the requested data to terminal device 18206 in 18532. Accordingly, terminal device 18206 may receive the requested data without accessing an external radio network, as vehicle network access node 18204 may retrieve the data via an external radio network provided by network access node 18218. In some aspects, vehicle network access node 18204 may store data received from network access node 18218 in cache memory 18312 (in addition to providing the data to terminal device 18206), and may provide the data to other terminal devices upon request.

In some aspects, vehicle network access node 18204 may be configured with higher transmission power and/or processing power than terminal device 18206. In some aspects, vehicle network access node 18204 may be configured with more advanced transmission and reception features, such as more advanced beamforming, more advanced beamsteering, more antennas, etc., than terminal device 18206. In some aspects, vehicle network access node 18204 may be able to exchange data with network access node 18218 at a higher speed/capacity/reliability, and/or at a greater range than what terminal device 18206 is capable of. For example, if vehicle 18202 is e.g., a train, vehicle network access node 18204 may have access to a power source (via vehicle 18202) that has much higher capacity and peak power than the power supply of terminal device 18206, which may be powered by e.g., a small battery. Additionally, the larger area provided by vehicle 18202, e.g., the train body and structure, may provide greater space for larger and more powerful components. For example, antenna system 18302 of vehicle network access node 18204 may be deployed on the train structure (e.g., as a roof-mounted antenna) and/or radio module 18304 may be a large radio power amplifier capable of much higher transmit powers than terminal device 18206. Radio module 18304 and communication module 18306 may also include more complex processing components capable of higher-performance transmission and reception processing than RF transceiver 16604 and baseband modem 16606 of terminal device 18206. Similar power and processing aspects may also be realized in variety of other vehicle types for vehicle 18202, such as buses, cars, planes, boats, etc.

Accordingly, in some aspects, it may be appropriate for vehicle network access node 18204 to retrieve the requested data from network access node 18218 (instead of terminal device 18206 retrieving the requested data from network access node 18218). For example, in some exemplary scenarios, terminal device 18206 may not have sufficient uplink transmit power to reach network access node 18204 and/or may be too far from network access node 18204 to effectively receive downlink signals. However, the superior transmission and reception performance of vehicle network access node 18204 (as noted above) may enable vehicle network access node 18204 to communicate with network access node 18218. Furthermore, the higher performance of vehicle network 18204 may enable vehicle network access node 18204 to transmit and receive data with network access node 18218 with higher data rates and/or reliability. Accordingly, it may in some scenarios be appropriate for network access node 18204 to acquire the requested data from network access node 18218 and provide the requested data to terminal device 18206 via the local vehicle radio network.

Furthermore, in some aspects vehicle network access node 18204 may be configured to operate on a different radio access technology for external radio networks than terminal device 18204 and/or may have a different service provider than terminal device 18204. For example, in an exemplary scenario, vehicle network access node 18204 and network access node 18218 may be configured to operate according to a first radio access technology and terminal device 18206 may be configured to operate according to a second radio access technology. Due to the differing radio access technologies, terminal device 18206 may not be able to communicate with network access node 18218 (as network access node 18218 is not configured to operate according to the second radio access technology), while vehicle network access node 18204 may be able to communicate with network access node 18218 via the first radio access technology. In another exemplary scenario, vehicle network access node 18204 and network access node 18218 may have a first service provider and terminal device 18206 may be configured to operate according to a second provider. Due to the differing service providers, terminal device 18206 may not be able to communicate with network access node 18218 or may have to use roaming to communicate with network access node 18218. However, vehicle network access node 18204 may be able to communicate with network access node 18218 via the first service provider.

Accordingly, scenarios may occur where it may be more efficient for vehicle network access node 18204 to communicate with network access node 18218, and may consequently be appropriate for network access node 18204 to retrieve the requested data via network access node 18218 for terminal device 18206.

After receiving the requested data from network access node 18218 in 18530, vehicle network access node 18204 may provide the requested data to terminal device 18206 in 18532. In some aspects, the radio connection between vehicle network access node 18204 and terminal device 18206 (over the local vehicle radio network) may be different from the radio connection between vehicle network access node 18204 and network access node 18218. For example, vehicle network access node 18204 may utilize a first radio access technology to communicate with terminal device 18206 and a second radio access technology to communicate with network access node 18218. In some aspects, the first radio access technology may be a short-range radio access technology and the second radio access technology may be a cellular radio access technology. In some aspects, network access node 18204 may utilize different subcomponents of antenna system 18302, radio module 18304, and/or communication module 18306 to communicate with terminal device 18206 than with network access node 18218. For example, antenna system 18302, radio module 18304, and/or communication module 18306 may include a first subsection configured to transmit and receive signals according to the first radio access technology and further include a second subsection configured to transmit and receive signals according to the second radio access technology. Additionally, in some aspects vehicle network access node 18204 may utilize a satellite radio access technology to communicate with network access node 18218, such as if vehicle 18202 is an airplane, a boat, a train, etc., while vehicle network access node 18204 may utilize a short-range or cellular radio access technology to communicate with terminal device 18206.

Accordingly, in some aspects of FIG. 185, vehicle network access node 18204 may have previously pre-loaded (or 'cached') data, via a high-speed/capacity/reliability connection loading network node 18212, based on a probability that terminal device 18206 will request the data during travel of vehicle. If terminal device 18206 requests the pre-loaded data during travel, e.g., after the high speed/capacity/reliability connection is disconnected, vehicle network access node 18204 may provide the pre-loaded data from a cache memory via the local vehicle radio network. As the local vehicle radio network may be short range, this may enable fast delivery of the pre-loaded data to terminal device 18206. If terminal device 18206 request data that is not-preloaded, vehicle network access node 18204 may retrieve the requested data via an external radio network with network access node 18218. While the connection between vehicle network access node 18204 and network access node 18218 may not be as high-speed/capacity/reliability as the connection with loading network node 18212 (used to pre-load data), the connection between vehicle network access node 18204 and network access node 18218 may be superior (e.g., higher speed/capacity/reliability) than another connection between terminal device 18206 and network access node 18218 (or another network access node serving terminal device 18206). Accordingly, aspects disclosed herein may be appropriate in exemplary scenarios where vehicle network access node 18204 has not pre-loaded the requested data.

In some aspects, such as in the case of message sequence chart 18500, vehicle network access node 18204 may act as a gateway between terminal devices traveling in vehicle 18202 and the external radio network provided by network access node 18218. For example, vehicle network access node 18204 may receive data requests from terminal devices traveling in vehicle 18202, such as terminal device 18206, and fulfill the data requests by either retrieving the requested data locally from cache memory 18312 (e.g., as in 18524) or by retrieving the requested data externally via network access node 18218. In some aspects, communication module 18306 of vehicle network access node 18204 may therefore perform gateway functionality in receiving data requests from terminal devices and routing the data requests to an external radio network, e.g., as provided by network access node 18218.

In some aspects, terminal device 18206 may not be aware of whether vehicle network access node 18204 provides the requested data from cache memory 18312 (e.g., in 18524) or retrieves and provides the requested data via network access node 18218 (e.g., in 18528-18532) (other than potential differences in retrieval time). For example, terminal device 18206 may connect and interact with vehicle network access node 18204 in a conventional manner for network access nodes. For example, if terminal device 18206 visits a website on a browser application of terminal device 18206 (while connected to vehicle network access node 18204), terminal device 18206 may request the website data from vehicle network access node 18204 in 18518, which may be e.g., a Hypertext Transfer Protocol (HTTP) request addressed to an internet server storing the website data. In other exemplary scenarios, e.g., for movies, songs, podcasts, video clips, etc., terminal device 18206 may transmit a similar internet data request to an internet server as part of a conventional internet connection procedures.

Communication module 18306 of vehicle network access node 18204 may then act as a gateway for terminal device 18206. For example, communication module 18306 may inspect the internet data request to determine how to fulfill the internet data request. In some aspects, communication module 18306 may inspect internet traffic (e.g., with deep packet inspection (DPI)) originating from terminal device 18206 to identify any internet data requests. If communication module 18306 identifies an internet data request transmitted by terminal device 18206, communication module 18306 may 'intercept' the internet data request and determine how to fulfill the internet data request, e.g., either with locally stored data at cache memory 18312 or via externally retrieved data from network access node 18218. Communication module 18306 may therefore reference cache memory 18312 in 18520 to determine whether the data requested in the internet data request (e.g., the HTTP request) is stored in cache memory 18312. If the requested data is stored in cache memory 18312, communication module 18306 may retrieve the requested data from cache memory 18312 and provide the requested data to terminal device 18206 in 18524. As terminal device 18206 may have sent the internet data request as part of a conventional internet connection procedure (e.g., in the manner as if terminal device 18206 was connected to any network access node), terminal device 18206 may not be aware that vehicle network access node 18204 retrieved the requested data from cache memory 18312.

If communication module 18306 of vehicle network access node 18204 determines in 18520 that the requested data is not stored in cache memory 18312, communication module 18306 may then utilize the external radio connection by network access node 18218 to retrieve the requested data. Accordingly, communication module 18306 may transmit the internet data request to network access node 18218 in 18528, where the internet data request may be addressed to the internet server storing the requested data. Network access node 18218 which may forward the internet data request to the internet server (e.g., via a core network or internet router) and may provide the requested data to vehicle network access node 18204. Vehicle network access node 18204 may then provide the requested data to terminal device 18206 in 18530.

In some aspects, vehicle network access node 18204 may provide multicast streaming to multiple terminal devices traveling in vehicle 18202. For example, vehicle network access node 18204 may perform multicast streaming of data stored in cache memory 18312 to multiple terminal devices, e.g., terminal device 18206 and terminal device 18208. Accordingly, network access node 18204 may provide a radio signal (via radio module 18304 and antenna system 18302) containing a data stream (retrieved from cache memory 18312) that is accessible by terminal devices 18206 and 18208. In some aspects, instead of retrieving the data stream from cache memory 18312, vehicle network access node 18204 may receive the data stream from network access node 18218 over the external radio network and re-broadcast the data stream over the local vehicle radio network to terminal device 18206 and 18208.

In some aspects, vehicle network access node 18204 may transfer between different network access nodes while vehicle 18202 is traveling. For example, as shown in FIG. 186, vehicle 18202 may move from coverage area 18216 of network access node 18218 (as shown in scenario 18200*b* of FIG. 182) to coverage area 18616 of network access node 18618 (as shown in scenario 18600*a* of FIG. 186). Accordingly, instead of exchanging data with network access node 18218, vehicle network access node 18204 may exchange data with network access node 18618 via interface 18620, such as to retrieve data requested by terminal devices 18206 and 18208 from the internet. In some aspects, vehicle network access node 18204 may continue to transfer between network access nodes as vehicle 18202 travels, such as according to mobility procedures governed by signal strength and/or signal quality.

In some aspects, vehicle 18202 may eventually stop at loading area 18610 (as shown in scenario 18600*b*) of FIG. 186. As shown in FIG. 186, loading area 18610, which may include a general parking area, may include loading network node 18612. Vehicle network access node 18204 may then interface with loading network node 18612, e.g., either by 'docking' with a wired interface or wirelessly via a radio interface. In some aspects, vehicle network access node 18204 may then repeat target data identification, retrieval and caching via loading network node 18612 (e.g., as in 18508-18516 or 18408-18416). In some aspects, vehicle network access node 18204 may establish new connections (e.g., as in 18404 or 18504) with terminal devices that enter vehicle 18202 at loading area 18610, and may exchange context information with these terminal devices (e.g., as in 18406 or 18506). Vehicle network access node 18204 may then identify target data for these terminal devices, retrieve the target data, and cache the target data at cache memory 18312 (e.g., as in 18508-18516 or 18408-18416). In some aspects, vehicle network access node 18204 may exchange updated context information with terminal devices that remain in vehicle 18202, e.g., terminal device 18206 or 18208, identify updated target data based on the updated context information, and retrieve and cache the updated target data via loading network node 18612. In some aspects, vehicle network access node 18204 may clear certain data from cache memory 18312, such as data that a terminal device has already accessed during travel of vehicle 18202 and/or data that was cached for a terminal device that has left vehicle 18202.

In some aspects, vehicle network access node 18204 and terminal devices traveling in vehicle 18202 may interface with different network access nodes during travel. FIG. 187 shows exemplary scenario 18700 in accordance with some aspects where vehicle network access node 18204 may interface with network access node 18702, terminal device 18206 may interface with network access node 18704, and terminal device 18208 may interface with network access node 18706. In some aspects, network access nodes 18702, 18704, and 18706 may be operated by different network operators. In some aspects, vehicle network access node 18204, terminal device 18206, and terminal device 18208 may be subscribers of different networks according to the respectively different network operators of network access nodes 18702, 18704, and 18706. Accordingly, in some aspects vehicle network access node 18204 may interface with a different network access node than e.g., terminal device 18206 or 18208 when retrieving data via an external radio network.

In some aspects, communication module 18306 of vehicle network access node 18204 may perform machine learning in order to 'learn' what data users of terminal devices will request. Communication module 18306 may therefore update the logic (e.g., a predictive algorithm defined as software code) used to identify target data in 18408/18508 by applying machine learning to evaluate the data that users accessed while vehicle 18202 was traveling vs. the data that users did not access while vehicle 18202 was traveling. Communication module 18306 may therefore adapt identification of target data over time. In some aspects, communication module 18306 may also utilize loading network node 18612 to exchange learning results and/or current trends with other vehicle network access nodes, e.g., via a direct internet connection or via a central server that stores learning results/current trends provided by vehicle network access nodes.

In some aspects, vehicle network access node 18204 may also utilize terminal devices traveling on vehicle 18202 as caches. For example, vehicle network access node 18204 may retrieve data cached at e.g., terminal device 18208 to respond to a data request for the cached data from terminal device 18206. For example, in addition to exchanging context information in 18406 or 18506, terminal devices entering vehicle 18202 may provide information to vehicle network access node 18204 that details data (e.g., one or more data files, which includes stored data files and active/ongoing data streams) that are stored by the terminal devices. For example, terminal device 18208 may notify vehicle network access node 18204 of one or more data files that terminal device 18208 has locally stored. Vehicle network access node 18204 may store a record of such information in cache memory 18312. If terminal device 18206 later requests a first data file of the one or more data files, vehicle network access node 18204 may retrieve the first data file from terminal device 18208 over the local vehicle radio network and provide the first data file to terminal device 18206. In some aspects, vehicle network access node 18204 may utilize terminal devices traveling in vehicle 18202 for cache storage, such as by retrieving target data from loading network node 18212 and providing the target data to a terminal device, e.g., terminal device 18208, for storage. If terminal device 18206 requests the target data during travel, vehicle network access node 18204 may retrieve the target data from terminal device 18208 and provide the target data to terminal device 18206.

In some aspects, there may not be an available external radio network during travel of vehicle 18202. For example, vehicle 18202 may travel through an area which is not within the coverage area of any network access nodes that provide an external radio network. Accordingly, vehicle network access node 18204 may only be able to provide data to requesting terminal devices that is already stored in cache memory 18312 (or, if using terminal devices for caching, that is already cached at a terminal device in vehicle 18202).

In some aspects, terminal devices traveling in vehicle 18202 may choose between receiving data from vehicle network access node 18204 over the local vehicle radio network or from a network access node that provides an external radio network. For example, terminal device 18206 may be configured to evaluate radio conditions of the local vehicle radio network provided by vehicle network access node 18204 versus radio conditions of an external radio network, e.g., as provided by network access node 18218. For example, baseband modem 16606 of terminal device 18206 may perform radio measurements (via antenna system 16602 and RF transceiver 16604) on signals received from vehicle network access node 18204 and network access node 18218. Baseband modem 16606 may then select whether to receive data from vehicle network access node 18204 or from network access node 18218 based on the radio measurements. For example, if the radio measurements indicate that the local vehicle radio network provided by vehicle network access node 18204 provides a better radio connection than the external radio network provided by network access node 18218, baseband modem 16606 may select to receive data from vehicle network access node 18204. Conversely, if the radio measurements indicate that the external radio network provided by network access node 18218 provides a better radio connection than the local vehicle radio network provided by vehicle network access node 18204, baseband modem 16606 may select to receive data from network access node 18218. In some aspects, baseband modem 16606 may select to receive data from vehicle network access node 18204 if the data is cached by vehicle network access node 18204, and may select between vehicle network access node 18204 and network access node 18218 based on radio measurements if the data is not cached by vehicle network access node 18204.

In some aspects, vehicle network access node 18204 may additionally provide cloud computing services to terminal devices traveling on vehicle 18202. For example, communication module 18306 may offer cloud computing to terminal devices such as terminal device 18206. Accordingly, if terminal device 18206 has a computationally-intensive processing task, terminal device 18206 may offload the processing task to vehicle network access node 18204 (via the local vehicle radio network). Communication module 18306 may then perform the processing task and provide the results back to terminal device 18206 (via the local vehicle radio network). Terminal device 18206 may therefore conserve battery power by offloading processing tasks to vehicle network access node 18204 for cloud computing. In some aspects, vehicle 18202 may be an autonomous vehicle that performs autonomous driving tasks at communication module 18306. As communication module 18306 may have substantial processing power (e.g., for handling autonomous driving computations) there may be periods of time where communication module 18306 has spare computing resources that terminal devices traveling in vehicle 18202 can use for cloud computing. Additionally, in some aspects communication module 18306 may have substantial processing power in order to perform the computations involved in predicting target data. Communication module 18306 may similarly offer spare computing resources to terminal devices traveling in vehicle 18202 for cloud computing.

Vehicle 18202 is not limited to any particular type of vehicle. For example, vehicle 18202 may be a bus, a plane, an airplane, a train, a car, a boat, or any other type of terrestrial, aerial, aquatic, aerospace, or sub-aquatic vehicle. Loading area 18210 may be a bus station, a gas station, an airport, an airport gate or airport vehicle or terminal, a train station or train station platform, a garage, a carpool area, a parking lot, a dock, a stoplight, an intersection, or any other type of final or intermediary stopping point or loading point. If interface 18214 is a wired interface, vehicle 18202 may 'dock' with loading network node 18212 to complete the wired connection. If interface 18214 is a radio interface, vehicle 18202 may interface with loading network node 18212 while in range of loading network node 18212, e.g., while in loading area 18210.

In some aspects detailed above, vehicle network access node 18204 may provide user data to requesting terminal devices, such as video clips, movies, songs, websites, etc. Alternatively or additionally, in some aspects, vehicle network access node 18204 may take over control plane duties including procedures to maintain an external radio connection for terminal devices traveling in vehicle 18202. For example, a terminal device traveling in vehicle 18202 such as terminal device 18206 may wish to maintain an external radio connection during travel. Terminal device 18206 may maintain an external radio connection by managing control plane duties including one or more of receiving control information from an external radio network (e.g., as provided by network access node 18218), managing radio connectivity states (e.g., radio connected vs. radio idle), performing mobility operations such as handovers or cell selection/re-selection with the external radio network, performing radio measurements, monitoring for paging messages from the external radio network, maintaining a control-plane identity, maintaining time and/or frequency synchronization, maintaining a connection with a serving cell, etc. Accordingly, in some aspects terminal device 18206 may temporarily transfer such control plane duties to vehicle network access node 18204. Terminal device 18206 may then conserve battery power while vehicle network access node 18204 performs the control plane duties on behalf of terminal device 18206.

FIG. 188 shows message sequence chart 18800 illustrating an example in accordance with some aspects. As shown in FIG. 188, terminal device 18206 may initially have a radio connection with radio access network 18828, which may include one or more network access nodes that interface with a core network. Terminal device 18206 may enter vehicle 18202 in 18804 and connect to vehicle network access node 18204 in 18806. In some aspects, terminal device 18206 and vehicle network access node 18204 may also exchange context information, and vehicle network access node 18204 may identify, retrieve, and cache target data based on the context information.

After connecting to vehicle network access node 18204, terminal device 18206 may then provide a 'control plane profile' of terminal device 18206 to vehicle network access node 18204, which may be information that uniquely identifies the terminal device for control purposes, such as a Radio Network Temporary Identifier (RNTI). In some aspects, the control plane profile may also include e.g., timing and/or frequency synchronization information, radio measurement information, current serving cell identity information, radio connectivity state, etc. Vehicle network access node 18204 may then assume responsibility for the control plane duties of terminal device 18206 and perform the control plane duties with radio access network 18828.

In some aspects, vehicle network access node 18204 may be configured with specific components (hardware-defined and/or software-defined) to perform the control plane duties of a terminal device. For example, communication module 18306 (e.g., at physical layer module 18308 and/or control module 18310) may be configured to control radio module 18304 and/or antenna system 18302 in accordance with the transmission and reception rules of a terminal device protocol stack. In some aspects, communication module 18306, radio module 18304, and antenna system 18302 may include separate components to perform network access node functionality and terminal device functionality. Accordingly, vehicle network access node 18204 may be configured to perform control plane duties for a terminal device.

Vehicle network access node 18204 may (under the control of communication module 18306) then perform control plane duties for terminal device 18206 based on the control plane profile in 18810. For example, vehicle network access node 18204 may perform one or more of receiving control information from radio access network 18828, maintaining synchronization with radio access network 18828, managing radio connectivity states (e.g., radio connected vs. radio idle), performing mobility operations such as handovers or cell selection/re-selection with radio access network 18828, performing radio measurements, monitoring for paging messages from the radio access network 18828, etc. In some aspects, vehicle network access node 18204 may utilize the control plane profile to seamlessly continue the radio connection with radio access network 18828. For example, network access node 18204 may utilize one or more of control plane identity, timing and/or frequency synchronization information, radio measurement information, or current serving cell identity information of the control plane profile to continue communicating with radio access network 18828. In some aspects, terminal device 18206 may enter a sleep or low-power state during 18810, as vehicle network access node 18204 may have taken over radio monitoring functions as part of the control plane duties.

Terminal device 18206 may initially be connected to a first network access node of radio access network 18828, which vehicle network access node 18204 may initially perform control plane duties with to maintain the radio connection on behalf of terminal device 18206. As vehicle 18202 travels, vehicle network access node 18204 may move into and out of the coverage areas of different network access nodes. In accordance with the control plane duties of terminal device 18206, vehicle network access node 18204 may perform mobility operations (e.g., handover or cell-reselection) and transfer the radio connection between the different network access nodes (e.g., based on radio measurement-triggered mobility procedures), such as from the first network access node to one or more other network access nodes of radio access network 18828. Accordingly, vehicle network access node 18204 may perform control plane duties with one or more network access nodes of network access node 18828 depending on which network access node is serving vehicle network access node 18204 at a given point in time.

By performing control plane duties in 18810, vehicle network access node 18204 may maintain a radio connection with radio access network 18828. Vehicle network access node 18204 may update the control plane information based on any changes, such as changes to the control plane identity (e.g., RNTI), changes in timing and/or frequency synchronization information, updated radio measurements, changes in the current serving cell, changes the current radio connectivity state, etc. Vehicle network access node 18204 may locally store the updated control plane profile (e.g., at a local memory of communication module 18306).

Vehicle network access node 18204 may continue performing control plane duties for terminal device 18206 in 18810. As shown in conditional box 18812, there may be a mobile terminating (MT) event for terminal device 18206, which may be a voice call addressed to terminal device 18206, a text message addressed to terminal device 18206, downlink data addressed to terminal device 18206, etc. Radio access network 18828 may therefore identify the pending MT event and attempt to page terminal device 18206. Radio access network 18828 may therefore broadcast a paging message in 18814 that specifies the control plane identity (e.g., RNTI) of terminal device 18206. Radio access network 18828 may broadcast the paging message through one or more network access nodes of radio access network 18828 that are in the vicinity of terminal device 18206 (e.g., in a tracking area (TA) last reported by vehicle network access node 18204 in a Tracking Area Update (TAU) as part of control plane duties in 18810). As vehicle network access node 18204 may be performing control plane duties for terminal device 18206, vehicle network access node 18204 may be monitoring for paging messages addressed to the control plane identity (e.g., RNTI) of terminal device 18206. Vehicle network access node 18204 may therefore receive the paging message from radio access network 18828 and identify that the paging message is addressed to the control plane identity of terminal device 18206.

Vehicle network access node 18204 may then notify terminal device 18206 of the paging message via the local vehicle radio network and provide the current control plane profile to terminal device 18206 in 18816, which may include e.g., current timing and/or frequency synchronization information, recent radio measurements, current serving cell identity information, current radio connectivity state, information identifying the network access node of radio access network 18828 from which the paging message was received, etc. Terminal device 18206 may then use the current control plane profile provided by vehicle network access node 18204 to execute the MT event in 18818, which may include e.g., answering/declining the voice call, receiving the text message, downloading the downlink data, etc. Terminal device 18206 may therefore utilize the external radio network provided by radio access network 18828 to execute the MT event. As terminal device 18206 may have the current control plane profile, terminal device 18206 may in some aspects be able to seamlessly (e.g., without interruption or with minimal interruption) take over the radio connection with radio access network 18828.

Alternative to transferring the MT event to terminal device 18206 to handle via the external radio network, in some aspects vehicle network access node 18204 may handle the MT event with radio access network 18828 and route the MT event data between terminal device 18206 and radio access network 18828, e.g., both via the local vehicle radio network between terminal device 18206 and vehicle network access node 18204 and via the external radio network between vehicle network access node 18204 and radio access network 18828.

In some aspects, there may be a mobile originating (MO) event at terminal device 18206 as shown in conditional block 18820 of FIG. 188. For example, a user of terminal device 18206 may trigger an MO event in 18822, such as an outgoing voice call, an outgoing text message, outgoing uplink data (or downlink data request), etc. Vehicle network access node 18204 may then provide the current control plane profile to terminal device 18206 in 18824 via the local vehicle radio network. Terminal device 18206 may then utilize the current control plane profile to execute the MO event with radio access network 18828. Alternatively, in some aspects vehicle network access node 18204 may execute the MO event for terminal device 18206 in 18826 and route data between terminal device 18206 and radio access network 18828 via the local vehicle radio network and the external radio network.

Accordingly, in some aspects vehicle network access node 18204 may 'act' as a terminal device and handle control plane duties for a terminal device traveling in vehicle 18202. Upon identifying a trigger event such as an MT or MO event, vehicle network access node 18204 may transfer control plane duties back to the terminal device by providing the current control plane profile to the terminal device. In some aspects, vehicle network access node 18204 may handle control plane duties for multiple terminal devices traveling in vehicle 18202, such as terminal devices 18206 and 18208. In some aspects, vehicle network access node 18204 may operate similarly to a multi-SIM Dual-Sim Dual Active (DSDA) device, where vehicle network access node 18204 may act as a 'remote' second SIM (although vehicle network access node 18204 may also observe a different radio channel than terminal device 18206 due to the differences between the small 'phone' antenna of antenna system 16602 of terminal device 18206 versus the large antennas of antenna system 18302 of vehicle network access node 18204, which may be e.g., roof-mounted).

Aspects disclosed herein may therefore provide a mechanism for a vehicle network access node to predict target data that users will request during travel on a vehicle and pre-load the target data into a storage location. The vehicle network access node may then retrieve the target data when it is requested by a terminal device during travel. The vehicle network access node may also act as a gateway for terminal devices traveling on the vehicle and may manage connections between the terminal devices and an external radio network. Some aspects disclosed herein can increase delivery speed of requested data, avoid depletion of data allowances by terminal devices, improve streaming quality, and/or conserve battery power at terminal devices.

FIG. 189 shows method 18900 of performing radio communications at a local network access node of a vehicle in accordance with some aspects. As shown in FIG. 189, method 18900 includes receiving user context information from a terminal device (18910). First data is identified based on a probability indicated by the user context information that the terminal device will request the first data at a later time (18920). The first data is retrieved via a first internet connection of the vehicle and storing the first data (18930). After the first internet connection becomes unavailable at the vehicle, a request is received for the first data and the first data is provided to the terminal device (18940).

FIG. 190 shows method 19000 of performing radio communications at a local network access node of a vehicle in accordance with some aspects. As shown in FIG. 190, method 19000 includes obtaining user data content preferences from a terminal device when the terminal device enters the vehicle in loading area (19010), predicting data, based on the user data content preferences, that the terminal device will probabilistically request at a later time to identify first data (19020), pre-loading the first data via a first internet connection of the vehicle available in the loading area (19030), and, after movement of the vehicle causes the first internet connection to become unavailable, receiving a request for the first data from the terminal device and providing the first data to the terminal device (19040).

6 Device Cooperation

The ability for terminal devices to communicate directly with each other may open numerous possibilities for device cooperation. Direct communication links such as device to device (D2D) and vehicle to vehicle (V2V) may enable exchange of important information between terminal devices and provide applications for processing offloading.

FIG. 191 shows radio communication network 19100 in accordance with some aspects, which may include terminal devices 19102 and 19104 in addition to network access nodes 19110 and 19112. Although certain aspects of this disclosure may describe certain radio communication network setting (such as an LTE, UMTS, GSM, other 3$^{rd}$ Generation Partnership Project (3GPP) networks, WLAN/Wi-Fi, Bluetooth, 5G, mmWave, etc.), the subject matter detailed herein is considered demonstrative in nature and may therefore be analogously applied to any other radio communication network. The number of network access nodes and terminal devices in radio communication network 19100 is exemplary and is scalable to any amount. These aspects, e.g., device cooperation, direct communication links (e.g., D2D, V2V, etc.), etc., may be used with common channel aspects, e.g., a common channel instrumental in dynamically coordinating direct device to device communication links and device to radio access node communication links, or may be used with power efficiency aspects, e.g., selecting the type of link according to device or network power efficiency levels, or may be used with enhanced communication aspects, e.g., selecting the type of link according to radio environment map (REM) information.

Accordingly, in an exemplary cellular setting network access nodes 19110 and 19112 may be base stations (e.g., eNodeBs, NodeBs, Base Transceiver Stations (BTSs), etc.) while terminal devices 19102 and 19104 may be cellular terminal devices (e.g., Mobile Stations (MSs), User Equipments (UEs), etc.). Network access nodes 19110 and 19112 may therefore interface (e.g., via backhaul interfaces) with a cellular core network such as an Evolved Packet Core (EPC, for LTE), Core Network (CN, for UMTS), or other cellular core network, which may also be considered part of radio communication network 19100. The cellular core network may interface with one or more external data networks. In an exemplary short-range setting, network access node 19110 and 19112 may be access points (APs, e.g., WLAN or Wi-Fi APs) while terminal device 19102 and 19104 may be short range terminal devices (e.g., stations (STAs)). Network access nodes 19110 and 19112 may interface (e.g., via an internal or external router) with one or more external data networks.

Network access nodes 19110 and 19112 (and other network access nodes of radio communication network 19100 not explicitly shown in FIG. 191) may accordingly provide a radio access network to terminal devices 19102 and 19104 (and other terminal devices of radio communication network 19100 not explicitly shown in FIG. 191). In an exemplary cellular setting, the radio access network provided by network access nodes 19110 and 19112 may enable terminal devices 19102 and 19104 to wirelessly access the core network via radio communications. The core network may provide switching, routing, and transmit for traffic data related to terminal devices 19102 and 19104 and may provide access to various internal (e.g., control nodes, other terminal devices on radio communication network 19100, etc.) and external data networks (e.g., data networks providing voice, text, multimedia (audio, video, image), and other Internet and application data). In an exemplary short-range setting, the radio access network provided by network access nodes 19110 and 19112 may provide access to internal (e.g., other terminal devices connected to radio communication network 19100) and external data networks (e.g., data networks providing voice, text, multimedia (audio, video, image), and other Internet and application data). Network access nodes 19110 and 19112 may be network access nodes for any other type of radio access technology and analogously provide a radio access network to proximate terminal devices in this manner.

The radio access network and core network (if applicable) of radio communication network 19100 may be governed by network protocols that may vary depending on the specifics of radio communication network 19100. Such network protocols may define the scheduling, formatting, and routing of both user and control data traffic through radio communication network 19100, which includes the transmission and reception of such data through both the radio access and core network domains of radio communication network 19100. Accordingly, terminal devices 19102 and 19104 and network access nodes 19110 and 19112 may follow the defined network protocols to transmit and receive data over the radio access network domain of radio communication network 19100 while the core network may follow the defined network protocols to route data within and outside of the core network. Exemplary network protocols include LTE, UMTS, GSM, WiMAX, Bluetooth, Wi-Fi, mmWave, etc., any of which may be applicable to radio communication network 19100.

FIG. 192 shows an internal configuration of terminal device 19102, which may include antenna system 19202, radio frequency (RF) transceiver 19204, baseband modem 19206 (including physical layer processing module 19208 and controller 19210), application processor 19212, memory 19214, power supply 19216, sensor 19218, and sensor 19220. Although not explicitly shown in FIG. 192, terminal device 19102 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identify module(s) (SIMs), user input/output devices (display(s), keypad(s), touchscreen(s), speaker(s), external button(s), camera(s), microphone(s), etc.), etc.

In an abridged operational overview, terminal device 19102 may transmit and receive radio signals on one or more radio access networks. Baseband modem 19206 may direct such communication functionality of terminal device 19102 according to the communication protocols associated with each radio access network, and may execute control over antenna system 19202 and RF transceiver 19204 in order to transmit and receive radio signals according to the formatting and scheduling parameters defined by each communication protocol. Although various practical designs may include separate communication components for each supported radio access technology (e.g., a separate antenna, RF transceiver, physical layer processing module, and controller), for purposes of conciseness the configuration of terminal device 19102 shown in FIG. 192 depicts only a single instance of each such components.

Terminal device 19102 may transmit and receive radio signals with antenna system 19202, which may be a single antenna or an antenna array that includes multiple antennas and may additionally include analog antenna combination and/or beamforming circuitry. In the receive path (RX), RF transceiver 19204 may receive analog radio frequency signals from antenna system 19202 and perform analog and digital RF front-end processing on the analog radio frequency signals to produce digital baseband samples (e.g., In-Phase/Quadrature (IQ) samples) to provide to baseband modem 19206. RF transceiver 19204 may accordingly include analog and digital reception components including amplifiers (e.g., a Low Noise Amplifier (LNA)), filters, RF demodulators (e.g., an RF IQ demodulator)), and analog-to-digital converters (ADCs) to convert the received radio frequency signals to digital baseband samples. In the transmit path (TX), RF transceiver 19204 may receive digital baseband samples from baseband modem 19206 and perform analog and digital RF front-end processing on the digital baseband samples to produce analog radio frequency signals to provide to antenna system 19202 for wireless transmission. RF transceiver 19204 may thus include analog and digital transmission components including amplifiers (e.g., a Power Amplifier (PA), filters, RF modulators (e.g., an RF IQ modulator), and digital-to-analog converters (DACs) to mix the digital baseband samples received from baseband modem 19206 to produce the analog radio frequency signals for wireless transmission by antenna system 19202. Baseband modem 19206 may control the RF transmission and reception of RF transceiver 19204, including specifying the transmit and receive radio frequencies for operation of RF transceiver 19204.

As shown in FIG. 192, baseband modem 19206 may include physical layer processing module 19208, which may perform physical layer (PHY, Layer 1) transmission and reception processing to prepare outgoing transmit data provided by controller 19210 for transmission via RF transceiver 19204 and prepare incoming received data provided by RF transceiver 19204 for processing by controller 19210. Physical layer processing module 19210 may accordingly perform one or more of error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Physical layer processing module 19208 may be structurally realized as a hardware-defined module, e.g., as one or more dedicated hardware circuits or FPGAs, as a software-defined module, e.g., one or more processors configured to execute program code defining arithmetic, control, and I/O instructions (e.g., software and/or firmware) stored in a non-transitory computer-readable storage medium, or as a mixed hardware-defined and software-defined module. Although not explicitly shown in FIG. 192, physical layer processing module 19208 may include a physical layer controller configured to control the various hardware and software processing components of physical layer processing module 19208 in accordance with physical layer control logic defined by the communications protocol for the relevant radio access technologies. Furthermore, while physical layer processing module 19208 is depicted as a single component in FIG. 192, physical layer processing module 19208 may be collectively implemented as separate sections of physical layer processing components where each respective section is dedicated to, for example, the physical layer processing of a particular radio access technology.

Terminal device 19102 may be configured to operate according to one or more radio access technologies, which may be directed by controller 19210. Controller 19210 may thus be responsible for controlling the radio communication components of terminal device 19102 (antenna system 19202, RF transceiver 19204, and physical layer processing module 19208) in accordance with the communication protocols of each supported radio access technology, and accordingly may represent the Access Stratum and Non-Access Stratum (NAS) (also encompassing Layer 2 and Layer 3) of each supported radio access technology. Controller 19210 may be structurally embodied as a protocol processor configured to execute protocol software (retrieved from a controller memory) and subsequently control the radio communication components of terminal device 19102 in order to transmit and receive communication signals in accordance with the corresponding protocol control logic defined in the protocol software.

Controller 19210 may therefore be configured to manage the radio communication functionality of terminal device 19102 in order to communicate with the various radio and core network components of radio communication network 19100, and accordingly may be configured according to the communication protocols for multiple radio access technologies. Controller 19210 may either be a unified controller that is collectively responsible for all supported radio access technologies or may include multiple separate controllers where each controller is a dedicated controller for a particular radio access technology or group of technologies, such as a dedicated controller for a first radio access technology and a dedicated controller for a second radio access technology. Regardless, controller 19210 may be responsible for directing radio communication activity of terminal device 19102 according to the communication protocols of the supported RATs. As previously noted regarding physical layer processing module 19208, one or both of antenna system 19202 and RF transceiver 19204 may similarly be partitioned into multiple dedicated components that each respectively correspond to one or more of the supported radio access technologies. Depending on the specifics of each such configuration and the number of supported radio access technologies, controller 19210 may be configured to control the radio communication operations of terminal device 19102 in accordance with, e.g., a master/slave RAT hierarchical or multi-SIM scheme.

Terminal device 19102 may also include application processor 19212, memory 19214, and power supply 19212. Application processor 19212 may be a CPU configured to execute various applications and/or programs of terminal device 19102 at an application layer of terminal device 19102, such as an operating system (OS), a user interface (UI) for supporting user interaction with terminal device 19102, and/or various user applications. The application processor may interface with baseband modem 19206 as an application layer to transmit and receive user data such as voice data, audio/video/image data, messaging data, application data, basic Internet/web access data, etc., over the radio network connection(s) provided by baseband modem 19206.

Memory 19214 may embody a memory component of terminal device 19102, such as a hard drive or another such permanent memory device. Although not explicitly depicted in FIG. 192, the various other components of terminal device 19102 shown in FIG. 192 may additionally each include integrated permanent and non-permanent memory components, such as for storing software program code, buffering data, etc.

Power supply 19216 may be an electrical power source that provides power to the various electrical components of terminal device 19102. Depending on the design of terminal device 19102, power supply 19216 may be a 'definite' power source such as a battery (rechargeable or disposable) or an 'indefinite' power source such as a wired electrical connection. Operation of the various components of terminal device 19102 may thus pull electrical power from power supply 19216.

Sensors 19218 and 19220 may be sensors that provide sensor data to application processor 19212. Sensors 19218 and 19220 may be any of a location sensor (e.g., a global navigation satellite system (GNSS) such as a Global Positioning System (GPS)), a time sensor (e.g., a clock), an acceleration sensor/gyroscope, a radar sensor, a light sensor, an image sensor (e.g., a camera), a sonar sensor, etc.

In accordance with some radio communication networks, terminal devices 19102 and 19104 may execute mobility procedures to connect to, disconnect from, and switch between available network access nodes of the radio access network of radio communication network 19100. As each network access node of radio communication network 19100 may have a specific coverage area, terminal devices 19102 and 19104 may be configured to select and re-select between the available network access nodes in order to maintain a strong radio access connection with the radio access network of radio communication network 19100. For example, terminal device 19102 may establish a radio access connection with network access node 19110 while terminal device 19104 may establish a radio access connection with network access node 19112. In the event that the current radio access connection degrades, terminal devices 19102 or 19104 may seek a new radio access connection with another network access node of radio communication network 19100; for example, terminal device 19104 may move from the coverage area of network access node 19112 into the coverage area of network access node 19110. As a result, the radio access connection with network access node 19112 may degrade, which terminal device 19104 may detect via radio measurements such as signal strength or signal quality measurements of network access node 19112. Depending on the mobility procedures defined in the appropriate network protocols for radio communication network 19100, terminal device 19104 may seek a new radio access connection (which may be, for example, triggered at terminal device 19104 or by the radio access network), such as by performing radio measurements on neighboring network access nodes to determine whether any neighboring network access nodes can provide a suitable radio access connection. As terminal device 19104 may have moved into the coverage area of network access node 19110, terminal device 19104 may identify network access node 19110 (which may be selected by terminal device 19104 or selected by the radio access network) and transfer to a new radio access connection with network access node 19110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

FIG. 193 shows an internal configuration of a network access node such as network access node 19110, which may be configured to execute method 20100. As shown in FIG. 193, network access node 19110 may include antenna system 19302, radio module 19304, and communication module 19306 (including physical layer module 19308 and control module 310310). In an abridged overview of the operation of network access node 19110, network access node 19110 may transmit and receive radio signals via antenna system 19302, which may be an antenna array that includes multiple antennas. Radio module 19304 may perform transmit and receive RF processing in order to convert outgoing digital data from communication module 19306 into analog RF signals to provide to antenna system 19302 for radio transmission and to convert incoming analog RF signals received from antenna system 19302 into digital data to provide to communication module 19306. Physical layer module 19308 may be configured to perform transmit and receive PHY processing on digital data received from radio module 19304 to provide to control module 19110 and on digital data received from control module 19310 to provide to radio module 19304. Control module 19310 may control the communication functionality of network access node 19110 according to the corresponding radio access protocols, e.g., LTE, which may include exercising control over antenna system 19302, radio module 19304, and physical layer module 19308. Each of radio module 19304, physical layer module 19308, and control module 19310 may be structurally realized as a hardware-defined module, e.g., as one or more dedicated hardware circuits or FPGAs, as a software-defined module, e.g., as one or more processors executing program code that define arithmetic, control, and I/O instructions (e.g., software and/or firmware) stored in a non-transitory computer-readable storage medium, or as a mixed hardware-defined and software-defined module. In some aspects, radio module 19304 may be a software-defined radio (SDR) component implemented as a processor configured to execute software-defined instructions that specify radio frequency processing routines. In some aspects, physical layer module 19308 may include a processor and one or more hardware accelerators, wherein the processor is configured to control physical layer processing and offload certain processing tasks to the one or more hardware accelerators. In some aspects, control module 19310 may be a controller configured to execute software-defined instructions that specify upper-layer control functions. In some aspects, control module 19310 may be limited to radio communication protocol stack layer functions, while in other aspects control module 19310 may also be responsible for transport, internet, and application layer functions.

Network access node 19110 may interface with a core network and/or internet networks (directly/via a router or via the core network), which may be through a wired or wireless interface. Network access node 19110 may also interface with other network access nodes over a wired or wireless (e.g., microwave radio or other wireless transceiver system) interface. Network access node 19110 may thus provide the functionality of network access nodes in radio communication networks by providing a radio access network to enable served terminal devices to access desired communication data.

Radio communication networks may be highly dynamic due to a variety of factors that impact radio communications. For example, terminal devices 19102 and 19104 may move (e.g., transported by a user) to various different positions relative to network access nodes 19110 and 19112, which may affect the relative distances and radio propagation channels between terminal devices 19102 and 19104 and network access node 19110 and 19112. The radio propagation channels may also vary due to factors unrelated to mobility such as interference, moving obstacles, and atmospheric changes. Additionally, local conditions at terminal device 19102 and 19104, such as battery power, the use of multiple radio access technologies, varying user activity and associated data traffic demands, etc., may also impact radio communication. Radio communications may also be affected by conditions at network access nodes 19110 and 19112 in addition to the underlying core network, such as network load and available radio resources.

The radio communication environment between terminal devices 19102 and 19104 and network access nodes 19110 and 19112 may thus be in a constant state of flux. In order to operate effectively and enhance user experience, terminal devices 19102 and 19104 and network access nodes 19110 and 19112 may need to recognize such changes and adapt operation accordingly.

Radio communication systems may therefore utilize device cooperation between terminal devices 19102 and 19104, in which the terminal devices (and, in some cases, network access points 19110 and 19112) may coordinate the distribution, computation, and communication of information in order to meet effectively implement autonomous systems which satisfy stringent latency requirements.

6.1 Device Cooperation #1

In some aspects of this disclosure, a terminal device may utilize device cooperation to develop a framework for distributed computation over wireless networks. In particular, the framework developed in an aspect of this disclosure may, for example, account for link quality, computational ability of terminal devices within the network as well as opportunity for simultaneous improvement or reduction or optimization of computation and communication tasks. Additional examples of device cooperation may include, sharing of local radio conditions to collectively determine a map of radio conditions in the neighborhood. Further, examples include, exploiting and sharing any local shared content across devices in the local neighborhood. The device cooperation methods and devices in this aspect of the disclosure may be implemented, for example, in autonomous systems (e.g., automated vehicles, drones, robots, etc.).

A collection of cooperating devices, may provide opportunities for collective or distributed computation across nodes. Especially, a distributed computation framework for wireless systems may be enabled for automated applications such as those with real-time constraints which may not be met with cloud offloading or augmented cloud offload (e.g., where some computations are performed locally by a vehicle and other computations are performed at an external network cloud, such as where certain computations can be pseudo-real-time). These applications can include automated vehicles, especially those moving in platoons or convoys, multiple agent robotics, a swarm of drones, or even road-side units that comprise fixed infrastructure nodes, that can cooperate via wireless mesh networking for local and timely computation, rather than offloading processing to the cloud, etc.

Autonomous systems can sense, learn, and/or act in real-time to complete time critical tasks. In the case of autonomous driving, for example, vehicles (cars, drones, etc.) information may need to be processed in real-time for dynamic collision avoidance. In this scenario, there may be sufficient storage and compute power within the vehicles and/or surrounding infrastructure that distributed computation at the edge may be used to meet real-time latency constraints (5-10 ms) of the End-to-End (E2E) processing (e.g., scene reconstruction from locally captured images). Cloud computing may not be able to meet these constraints without significant investments in infrastructure. Devices and methods in the disclosure present techniques which may be distributed locally since infrastructure support may be unavailable.

FIG. 194 shows a vehicular ad hoc network (VANET) 19400 configured with a computation distribution framework in accordance with some aspects. It is appreciated that VANET 19400 is exemplary in nature and may thus be simplified for purposes of this explanation.

One or more of vehicular terminal devices 19402-19406 and 19412-19416 may include the internal configuration of terminal device 19102 as shown in FIG. 192 as a communication system, and accordingly may include a modem (e.g., baseband modem 19206) that transmits and receives data as radio signals via an RF transceiver (e.g., RF transceiver 19204) and antenna system (e.g., antenna system 19202) in the manner detailed above for terminal device 19102. In some aspects, one or more of vehicular terminal devices 19402-19406 and 19412-19416 may also include a processing platform for performing distributed computations, which may be implemented as an application-layer component (e.g., at application processor 19212) or a modem-layer component (e.g., at baseband modem 19206).

Vehicular terminal devices 19402-19406 and 19412-19416 can also include one or more of a vehicle frame and housing, windows and doors, an engine, a steering and movement system (e.g., terrestrial in the form of wheels or tracks, aerial in the form of rotors, propellers, or jet engines, or another vehicular movement system), and associated control electronics. In some aspects, vehicular terminal devices 19402-19406 and 19412-19416 may be autonomous vehicles. In some aspects, vehicular terminal devices 19402-19406 and 19412-19416 may not be autonomous, and may be controlled (either locally or remotely) by a driver.

One or more of roadside network access nodes 19420 and 19430 may be configured with an internal configuration in the manner of network access node 19110 shown in FIG. 193, and accordingly may include a communication module (e.g., communication module 19306) that transmits and receives data as radio signals via a radio module (e.g., radio module 19304) and antenna system (e.g., antenna system 19302) in the manner detailed above for network access node 19110. In some aspects, one or more of roadside network access nodes 19420 and 19430 may also include a processing platform for performing distributed computations, which may be implemented as a modem-layer or application-layer component of communication module 19306. Roadside network access nodes 19420 and 19430 can be Roadside Units (RSUs) or a similarly type of network access node positioned to service passing vehicles.

Vehicular terminal devices 19402-19406 and 19412-19416 within VANET 19400 are equipped with radio access technology, such as a cellular or short-range radio access technology e.g., LTE, mmWave, 5G, WiMax, Wi-Fi, Bluetooth, etc. Communication in these networks may be vehicle-to-vehicle (V2V), where the vehicles communicate directly with each other; vehicle-to-infrastructure (V2I), where the vehicles communicate with an RSU, base station, or any other radio access infrastructure; or vehicle-to-network (V2N), where the vehicles communicate with core or internet network components via end-to-end connections.

Roadside network access nodes 19420 and 19430 may be installed to provide infrastructure support by limiting the communication and dissemination of information to a confined area, resulting in smaller message delay. In this manner, roadside network access nodes 19420 and 19430 function as local stations capable of coordinating communication with vehicles within their range and also act as an interface with the overall network, for example, an underlying core network and/or external cloud or internet networks. Roadside network access nodes 19420 and 19430 are configured to disseminate information obtained from vehicular terminal devices 19402-19406 and 19412-19416 in scenarios such as those involving stringent latency requirements, high mobility, and constantly changing environments. Roadside network access nodes 19420 and 19430 may be available and configured to adapt depending on different scenarios, e.g., high speed traffic on a high-way vs. rush-hour traffic in a city. Roadside network access nodes 19420 and 19430 may be configured to receive reports from vehicular terminal devices 19402-19406 and 19412-19416 and distribute the computation of information obtained from these reports to the vehicles based on wireless link quality and a particular vehicle's computational ability.

In some aspects, roadside network access nodes 19420 and 19430 may further be configured to transmit/broadcast information regarding characteristics of each of their respective areas to any passing vehicles. For example, roadside network access node 19420 may broadcast information regarding turns in road 19450, objects (e.g., trees, bridges, signs, etc.) along road 19450 so that passing vehicular terminal devices 19402-19406 do not have to perform computations on this information and may supplement their own locally gathered information and computations with the information from roadside network access node 19420.

However, in certain scenarios, roadside network access nodes 19420 and 19430 may not be available to coordinate the communication between the vehicles. In this case, the vehicles themselves may be configured to distribute the computations needed for autonomous driving amongst themselves. In this case, a vehicle can be identified as the anchor control node responsible for orchestrating the data collection and distribution of the computations. In some aspects, this vehicle may be assigned on the basis of being the most powerful 'node' (in terms of, e.g., computational ability and/or wireless link quality), on the basis of geographic location (e.g., the most centrally located vehicle), and/or on a random or other basis.

Self-driving cars may generate upwards of 1 Gbps of data from sensors, cameras, etc. The latency requirement in some cases for enabling control decisions from such data is can be in the range of milliseconds (e.g., 5 to 10 ms)). In some cases, the latency requirement may be more stringent and may, for example, be less than 5 ms and/or even less than 1 ms (e.g., in the order of tens of microseconds), and in some cases the latency requirement may be less stringent, and may, for example, be greater than 10 ms. In order for the car to make decisions in a timely manner, the communication and processing delays should be within the tolerance limits. The latency requirement also depends on the control action, and for such actions that are time-critical for navigation, executing these actions within the latency requirement is important. Furthermore, for actions such as platooning, e.g., smart coordination between a set of vehicles, the latency requirements may be even more stringent.

In the case of platooning, where a roadside network access node is available, the roadside network access node may need to know the relative positions of the cars and be aware of the overall environment. This data gathering may require fusing some or all the sensor inputs from different vehicles (e.g., camera inputs for joint scene reconstruction). Such a task may not be computationally feasible in a single vehicle.

Furthermore, having a centralized computation of all the data (e.g., at a roadside network access node) at an RSU) may impose a heavy load on the communication channels. By implementing the programing models of this disclosure, the computations of portions of the data may be calculated at different vehicles, thereby improving, or in some cases optimizing, communication of the overall set of data in order to better meet the latency requirements. These computations of data may include, for example, the location and orientations of the vehicles, a subset of features extracted from the images captured from vehicle cameras, the camera parameters for each vehicle, and/or distance estimates to adjacent vehicles based on radar sensors.

A similar framework may be implemented for the coordinated movement of drones, for example. In this scenario, there may not be a coordinating network access node, so one drone may act as the hub and distribute the computation across other drones for path planning. In the performance of cooperative tasks amongst drones (e.g., lifting and transporting heavy payloads), heavy computations may be performed to determine the actions of each of the drones. While some aspects assume a centralized server and processing where the drones may transmit and receive data remotely, distributed implementations may be preferable and applicable in certain scenarios, e.g., in rural areas, wilderness, etc. Such high-level coordination distributes the computation load across the drones while communicating the load in a manner that satisfies the latency requirements.

The programming models disclosed herein may account for wireless constraints in distributing, computing, and communicating the necessary data in scenarios such as those which have been described. The models of this disclosure may be leveraged to apply techniques that provide improved compute-communication trade-offs. The use of technology described herein is generally applicable across alternate mobile edge computing scenarios and may work across different radio access technologies used in the implementation of wireless links.

In an aspect of this disclosure, the devices within a wireless network (e.g., autonomous cars communicating with each other) are configured to compute and communicate information to satisfy the latency requirements by exploiting a distributed computation model that may be based on a MapReduce programming model, taking into account wireless link quality and individual device (e.g., vehicle) computational ability.

FIG. 195 shows a computation distribution framework 19500 which may be implemented in a wireless network in accordance with some aspects. It is appreciated that framework 19500 is exemplary in nature and may thus be simplified for purposes of this explanation.

Framework 19500 is a high-level illustration of a MapReduce framework, wherein each of devices A, B, and C may represent, for example, processing units located within separate vehicular terminal devices, such as vehicular terminal devices 19402-19406 and 19412-19416. As previously indicated, in some aspects one or more of vehicular terminal devices 19402-19406 and 19412-19416 may be equipped with a processing platform for performing distributed computations (e.g., as a modem-layer or application-layer component), which may correspond to Device A, B, and C.

Each of Devices A, B, and C may be assigned a subset of inputs to map, e.g., Device A may be assigned input files 1 and 2, Device B may be assigned input files 3 and 4, and Device C may be assigned input files 5 and 6 (for example these files may represent information related to different local areas) For example, each of these input files may include information such as vehicular location, orientation, and travel velocity information, images captured by cameras in the vehicles, distance estimates based on radar sensors, etc., for geographically separated regions of a given area of interest. Devices A, B, and C may, for example, then perform a mapping task on the assigned inputs, such as count vehicles that exceed the set speed limit, or identify vehicles that are proximal to each other, or that are passing an intersection. The outputs of these partial computation/mapping may then need to be shuffled between the devices, to perform a reduce task to collate the results of the different map tasks.

In a simplified example of a MapReduce computation, framework 19500 will be assigned the task of counting the occurrence of words (Word A, Word B and Word C) in a given text file. However, such a framework may be applied to provide computation, for example, to perform a scene reconstruction from data captured from one or more vehicles, the data including at least one of radar sensor information, images captured from cameras, vehicular location, orientation, and/or travel velocity information.

In framework 19500, the text file is split into 6 sub-files. For purposes of applying such a framework 19500 to autonomous driving, for example, the sub-files may contain information such as vehicle velocity, radar sensor information etc. Each sub-file may contain this information for a different geographical neighborhood. Devices A, B, and C are assigned two of these sub-files each (device A is assigned sub-files 1 and 2, device B is assigned sub-files 3 and 4, device C is assigned sub-files 5 and 6). The distribution of word counting tasks across different devices is referred to as the mapping phase, where each of Devices A, B, and C will perform a respective iteration of a map task on the assigned inputs. Here, each device will count the occurrence of Words A, B, and C in the two sub-files it has been assigned as the map task.

In order for each of Devices A, B, and C to obtain the final count results for each of Words A, B, and C, Device A delivers the total count of Word A by collecting not only its own computation of Word A in sub-files 1 and 2, but also collecting the count of Word A in sub-files 3 and 4 from Device B and the count of Word A in sub-files 5 and 6 from Device C. Similarly, Device B delivers the total count of Word B and Device C delivers the count of Word C. Accordingly, the MapReduce computation includes shuffling phase 19510 which may be performed to collate the results of the interim computations. In the word count example, each of Devices A, B and C collects the results of four additional computations. Devices A, B, and C may then perform a respective iteration of the reduce task, using the map task output obtained locally (e.g., the count of Word A in sub-files 1 and 2) and the map task outputs obtained via the data shuffling, to deliver the final results of occurrence of each word.

MapReduce can therefore provide a framework for vehicular terminal devices to perform distributed computation tasks, for example, those related to vehicular movement, such as driving scene reconstructions, collision avoidance decisions, or autonomous driving decisions. For example, vehicular terminal devices 19402-19406 can each obtain sensor data for their respective local surrounding areas (e.g., image data, video data, sonar data, positioning data, movement (direction or velocity) data, and/or radar data), which may be analogous to the distribution of input files in the example above. Further, an anchor control node can provide sensor data to vehicular terminal devices 19402-19406 for analysis, similarly analogous to the distribution of input files. Each of vehicular terminal devices 19402-19406 may then process the local sensor data as their respective iterations of the mapping task (e.g., a distributed mapping processing task) to obtain respective mapping task results (e.g., intermediate distributed processing results). Vehicular terminal devices 19402-19406 may then shuffle the mapping task results according to the shuffling scheme (e.g., a distributed processing shuffling scheme) such that vehicular terminal devices 19402-19406 receive the mapping task results for performing their respective iterations of the reduce tasks. Vehicular terminal devices 19402-19406 may then perform their respective iteration of the reduce task on their own mapping task results and on the mapping task results received from other of vehicular terminal devices 19402-19406 during the shuffling phase. Vehicular terminal devices 19402-19406 may then obtain the final results (e.g., final distributed processing results) at the reduce task results. Vehicular terminal devices 19402-19406 may then use the reduce task results to influence or perform vehicular movement, such as for autonomous driving.

In some aspects, vehicular terminal devices 19402-19406 may execute the distributed computation task under the coordination of an anchor control node, which may be one of vehicular terminal devices 19402-19406 that is assigned or selected as an anchor control node, another vehicular terminal device that is designated as an anchor control node, or a network access node such as a roadside network access node that is acting as an anchor control node. The anchor control node may be responsible for one or more of assigning input data for mapping tasks, specifying the shuffling scheme, executing the shuffling scheme, and coordinating final results if necessary. For example, in some aspects, the anchor control node may collect the input data (for example, sensor data provided by vehicular terminal devices 19402-19406) and provide the input data to vehicular terminal devices 19402-19406 as input for their respective mapping tasks. In some aspects, the anchor control node may broadcast or multicast the input data, using downlink broadcast/multicast if the anchor control node is a network access node or a D2D/V2V broadcast/multicast (e.g., Anycast) if the anchor control node is a vehicular terminal device. In some aspects, the anchor control node may also collect mapping task results from vehicular terminal devices 19402-19406 and redistribute the mapping task results according to the shuffling scheme of the Shuffling phase. In some aspects, the anchor control node may similarly use broadcast or multicast techniques during the shuffling phase to provide the mapping task results to the appropriate vehicular terminal devices 19402-19406 for their respective reduce tasks. In some aspects, the anchor control node may provide the shuffling scheme (e.g., identify the destination vehicular terminal device for a vehicular terminal device to send its mapping task results to and identify the source vehicular terminal device for a vehicular terminal device to receive mapping task results from), which the vehicular terminal devices may execute using e.g., D2D/V2V unicast transmissions.

In some aspects, vehicular terminal devices 19402-19406 may perform the distributed computation task without an anchor control node, and may coordinate with each other to distribute the input data and determine and execute the shuffling scheme (e.g., using D2D/V2V broadcast/multicast or unicast).

While MapReduce may provide a mechanism for vehicular terminal devices to efficiently perform distributed computation tasks, there may be a bottleneck when distributing the work load across different vehicular terminal devices due, for example, to the cost of the shuffling phase, especially when the communication is performed over wireless links. For example, in some data center settings, 30-70% of execution time is spent in the Shuffling phase, providing mapping task results to the appropriate vehicular terminal devices for use in their respective reducing tasks. For example, if a large group of vehicular terminal devices are arranged to exchange mapping task results with all or almost all of the other vehicular terminal devices of the group during the Shuffling phase, the Shuffling phase may occupy a substantial bandwidth and/or take significant time to complete. Therefore, it may important to improve, or in some cases to optimize, framework 19500 to improve the time spent in communication of data shuffling, especially in autonomous system scenarios where latency requirements are exceedingly stringent.

FIG. 196 shows a modified framework 19600 implemented into a wireless network in accordance with some aspects. It is appreciated that framework 19600 is exemplary in nature and may thus be simplified for purposes of this explanation.

Framework 19600 is a high-level illustration of a coded MapReduce framework configure to apply network coding principles to distribute the computation tasks across the nodes (for example, terminal devices or vehicles) so that multicasting opportunities are created to reduce the amount of communication needed in the Shuffling phase. In some aspects, framework 19600 can achieve an optimal compute versus communication tradeoff in that as the computation per node increase, the communication load decreases sub-linearly. Framework 19600 illustrates that by increasing the computation load per device, coded multicast opportunities are created in each transmission in the data shuffling, providing the necessary input for two devices. In framework 19600, for example, device A maps the values of sub-files 5 and 6; device B maps the values of sub-files 1 and 2; and device C maps the values of sub-files 3 and 4. Only one coded transmission is used by each device to recover the values it uses: device A transmits a coded communication with sub-files 1 and 2; device B with sub-files 5 and 4; and device C with sub-files 2 and 6. For example, device A can derive the value of sub-file 5 from the transmission from device B as device A already knows the value for sub-file 4, and so on.

mapping framework 19600 to the word count example from FIG. 195, each device doubles its computational load by processing four sub-files instead of two, e.g., device A searches for Words A, B, and C in sub-files 1, 2, 3, and 4; device B processes sub-files 3, 4, 5, and 6; and device C processes sub-files 5, 6, 1, and 2. While the computational load increase may not be desirable in some cases, repetitive computation can significantly reduce data transfer during the Shuffling phase, as, for example, device A only needs the values from sub-files 5 and 6, device B from sub-files 1 and 2, and device C from sub-files 3 and 4.

In the coded Shuffling phase 19610, Device A can send an XOR of results from sub-files 1 and 3, from which Device B can recover the results of sub-file 1 (since it already knows the results from sub-file 3, which it computed) and Device C can recover the results of sub-file 3 (since it already knows the results from sub-file 1, which it computed). Similarly, Device B can send an XOR message with the results from sub-files 5 and 4 to allow Device A to recover the results of sub-file 5 and Device C to recover the results of sub-file 4; and Device C can send an XOR message with the results from sub-file 2 and 6 to allow Device A to recovers the results of sub-file 6 and Device B to recover the results from of sub-file 2.

In some cases, by increasing the computation load of each device, only two additional values per device are used in the reduce phase (e.g., 2×3=6 messages, resulting in a two times reduction in communication load). The coding process can allow for a further two times reduction, since, in this example, only three message (each of the XOR messages) are required instead of six.

Therefore, in this example, in framework 19600, only one coded transmission is needed from each device, and this coded transmission is useful for two other devices. Framework 19600 may be generalized to several other applications based off of MapReduce frameworks. For example, an image captured by a vehicular camera may be analyzed for the presence of several target objects. The image may then be segmented for analysis across different nodes, such that each of the nodes (e.g., vehicles) may give overlapping segments. Each node then scans for the presence of the targeted features within the assigned segments as their respective mapping tasks and shuffles the mapping task results during the Shuffling phase. In the reduce phase, the combiner nodes may then collate the partial results for each target object across some or all of the segments. By suitably encoding the outputs of the mapping task phase, the overall communication load of the Shuffling phase may be reduced.

In frameworks 19500 and 19600, the execution of the structured mapping phase is carried out through the use of a centralized server which assigns the partitioning of the data set and the mapping, encoding, and reduce phase operations. In another aspect of this disclosure, each node (e.g., terminal device, vehicle, etc.) may also randomly cache the dataset with a known redundancy and compute the assigned tasks on the locally stored dataset. Each node may then also encode the results across the datasets and broadcast the encoded results to be used for the reduce phase. The encoding may be based on knowledge of the datasets at adjacent nodes. Such knowledge may be discovered through an out-of-band channel or through the help of the assigned anchor control node. The exact encoding details may then be pre-pended to the broadcast data as meta-data. The nodes collating the results of the distributed computation may then decode this transmission by decoding the meta-data. It is assumed that the overhead of adding meta-data and the required control coordination is negligible compared to the size of the data being exchanged.

In some aspects, the vehicular terminal devices of the autonomous network can communicate with each other via a central server, for example, network access node 19420 and/or 19430 of FIG. 194, or an access point, eNB, or another type of network access node that acts as a central coordinator, or 'anchor control node', for the Shuffling phase. In this scenario, each of the nodes (e.g., vehicular terminal devices 19402-19406) may send their coded output (coded mapping task results) to the anchor control node, e.g., vehicular network access node 19420, which then broadcasts the coded outputs to some or all of the vehicles using a multicast or broadcast framework for the Shuffling phase, such as the evolved Multimedia Broadcast/Multimedia Service (eMBMS) interface of an LTE network or another type of multicast or broadcast framework. Alternatively, for the Shuffling phase, device to device (D2D/V2V communications may be used to exchange information directly between nodes. By employing D2D/V2V, nodes within the network may be configured to communicate directly with each other, either on a node-to-node basis or on a node-to-multiple node (e.g., multicast) basis. Accordingly, in some aspects, the vehicular terminal devices can execute the Shuffling phase by using unicast D2D/V2V to directly transmit the coded mapping task results to the destination vehicular terminal devices (according to the shuffling scheme). In some aspects, an anchor control node of the vehicular terminal devices may collect the mapping task results from the other vehicular terminal devices (e.g., with D2D/V2V) and then distribute the mapping task results to the appropriate vehicular terminal devices according to the shuffling scheme. Additionally or alternatively, in some aspects, the vehicular terminal devices can execute the Shuffling phase using multicast D2D/V2V by multicasting the mapping task results to the other vehicular terminal devices.

In some aspects, vehicular terminal devices such as any of vehicular terminal devices 19402-19406, 19412-19416, or 19732-19736 may be configured to decide whether to offload a processing task. In other words, a vehicular terminal device may decide whether to offload the processing task to be processed in a distributed manner according to these aspects or to perform processing task locally without offloading. For example, a vehicular terminal device may identify a processing task that and decide whether or not to offload the processing task based on certain situational criteria such as, without limitation, a computational load of the processing task, a latency constraint of the processing task, an available bandwidth, a current level of network congestion, a number of proximate vehicular terminal devices that are available for offloading, or a link quality of vehicular links and/or infrastructure links.

Accordingly, a vehicular terminal device may evaluate one or more of such factors to decide whether to offload the processing task. Scenarios that may shift the decision toward offloading can be a large computational load of the processing task, a relaxed latency constraint (e.g., if the processing task is not realtime and/or has a larger latency tolerance), a large available bandwidth, a low current level of network congestion, a large number of proximate vehicular terminal devices, and strong link qualities of vehicular and/or infrastructure links. The vehicular terminal device may then either perform the processing task locally without offloading or may offload the processing task based on the evaluation of one or more of these factors. In an exemplary scenario, a vehicular terminal device may determine that the network congestion is high and the latency constraint of the processing task may not be met if offloading is utilized. The vehicular terminal device may then decide against offloading and consequently perform the processing task locally Other variations related to the degree of offloading are also within the scope of this disclosure, such as deciding how much of a processing task or which sub-tasks of a processing task to offload. For example, a vehicular terminal device may be configured to decide to offload part of a processing task for distributed processing, and may decide how much of the processing task should be offloaded and how much of the processing task should be performed locally. In some aspects, a vehicular terminal device may identify certain sub-tasks of the processing task (e.g., certain instructions or subroutines) that should be offloaded for distributed processing and other sub-tasks that should be performed locally without offloading. A non-limiting example may be deciding to offload non-realtime tasks while deciding to perform realtime tasks locally.

FIG. 197 shows an autonomous vehicle radio access network 19700 in accordance with some aspects. It is appreciated that network 19700 is exemplary in nature and may thus be simplified for purposes of this explanation.

Network 19700 may include anchor control nodes 19702-19704, which include roadside network access nodes, RSUs, eNB, base stations, APs, other types of network access nodes, or any combination thereof. Anchor control nodes 19702 and 19704 may cover regions 19712 and 19714, respectively. Although shown as having distinct boundaries, it is appreciated that regions 19712 and 19714 may overlap. Anchor control nodes 19702 and 19704 may communicate with each other as components of a core network and/or radio access network structure.

Road 19720 may traverse regions 19712 and 19714, and therefore, vehicular terminal devices (such as those in clusters 19732-19736) operating in regions 19712 and 19714 may be configured to operate with the inter-RAT cell handover protocols of the network 19700.

The distribution of the tasks in this scheme can be done randomly at each vehicular terminal device without significant loss in performance. In this model, the uplink (UL) information exchange occurs using UL protocols such as those defined for LTE, WLAN, LTE-U/LAA (Licensed Assisted Access), or any other radio access technology.

Alternatively, in some aspects a D2D (e.g., one to some or all proximity services (e.g., ProSe for LTE) using the PC5 interface, etc.) or V2V interface may be used to exchange information directly between vehicular terminal devices, e.g., vehicular terminal devices within each of clusters 19732-19736. By employing D2D/V2V, nodes within the network may be configured to communicate directly with each other. This may be done on a device to device basis, or may be achieved on a device-to-multiple-device basis (e.g., multicast or broadcast).

In some aspects, network slicing can also be employed. In network slicing, a network, such as network 19700, may be sliced into multiple smaller networks, e.g., one smaller network for each set of vehicular terminal devices 19732-19736 shown in FIG. 197. As a result, resource sharing is enabled among network nodes and vehicular terminal devices. High capable network nodes or vehicular terminal devices may share their resources (e.g., computational capacity) to assist less capable nodes or devices.

Such network slicing can be end-to-end (E2E), including slicing in the core network and the radio access network (RAN). Each slice may have its own specific architecture, and as a result, splice-specific operation is needed. In other words, resources may be shared among the nodes of each network slice. This sharing may be applied to one aspect of the network focusing on a specific application or service or may be spread across various applications or services. When operating across multiple applications or services, the network slice may be virtualized and improved, or in some cases optimized, specific to each application or service.

Upon reaching an outer edge of a region, such as cluster 19736, the vehicular terminal devices of the cluster may initiate inter-RAT handover procedures with anchor control node 19704 to another anchor control node (not pictured) for the implementation of the computational frameworks described in FIGS. 195 and 196. However, if no other anchor control node is detected, one of vehicular terminal devices in cluster 19736 may be assigned as the anchor control node responsible for data collection and distribution computations for cluster 19736. This vehicular terminal device may, for example, be determined by being the one with the highest computational capacity, the vehicular terminal device with an optimal location (e.g., centrally located within cluster 19736), a vehicular terminal device with the best transmission quality, or any similar method.

The following provide exemplary scenarios by which the frameworks described in FIGS. 195 and 196 may be implemented in wireless networks, e.g., autonomous driving of vehicles (cars, drones, etc.), in aspects of this disclosure.

In some aspects, the distribution of computations from anchor control node 19702 to each of vehicular terminal devices in cluster 19732 may account for link quality. In this scenario, anchor control node 19732 may be a network access node such as a base station, and the may determine the link quality with each of a plurality of vehicular terminal devices by measuring parameters such as the channel state information (CSI) of the links, e.g., channel estimation. can enable the network access node may use the CSI to adapt transmissions to each of the vehicular terminal devices based on current channel conditions, e.g., the signal-to-interference-plus-noise ratio (SINR), the Doppler effect, etc. The transmissions, e.g., the assignment of the computations and transmissions during the Shuffling phase (both coded and un-coded), may be adapted to the current channel conditions to achieve reliable communication and satisfy the stringent latency requirements of systems such as autonomous driving systems. In LTE, for example, CSI reports may include a Channel Quality Indicator (CQI), a Pre-coding Matrix Indicator, and/or a Rank Indicator. Other CSI and similar radio channel information may be used for other radio access technologies depending on the RAT-specific implementational details. In this manner, the vehicular terminal devices of cluster 19732 may be assigned computational tasks based on the link quality with base station (anchor control node) 19702.

In some aspects, the communication protocol for the uplink (between the vehicular terminal devices and the anchor control node) can be done based on protocols such as LTE-Uu, WLAN, LTE-LM, etc., and the downlink (between the anchor control node and each of the vehicular devices in a cluster, for example) can be performed in broadcast mode using LTE-Uu, eMBMS/V2X protocol.

In some aspects, vehicular terminal devices within each cluster 19732-19736 may communicate with each other using D2D/V2V communications. In this case, only one vehicular terminal device of cluster 19732, for example, may act as the master node when communicating with the anchor control node, e.g., base station, 19702. This master node may be determined by which of the vehicular terminal devices in cluster 19732 has the highest link quality with base station 19702 as determined by the CSI reports. Accordingly, the assignment of the computations and the ensuing distribution of the computations may be controlled by base station 19702 through this master node of cluster 19732.

In some aspects, if there is no suitable anchor control node (for example, no base station, RSU, AP, or other network access node to the core network), one of the vehicular terminal devices within a cluster may be assigned the responsibility of the anchor node and communicate with the other vehicular terminal devices via D2D/V2V communication, either on a device to device basis or a multicast basis. The computations may be assigned, for example, based on the computation capacity of each of the vehicular terminal devices in relation to the anchor control node, or based on the link quality between the anchor control node and the other vehicular terminal devices.

In some aspects, the distribution of computations in the Shuffling phase used for the reduce phase may be performed based on certain factors. One of these factors may be a geographical location of the vehicular terminal device as determined by, for example, by Global Positioning System (GPS). The geographical location of a vehicular terminal device may be used to limit the amount of information transmitted to certain vehicular terminal devices so that only critical information is transmitted. In one exemplary scenario, the vehicular terminal device at the head of cluster 19732 (the block, e.g., "car," furthest to the right of cluster 19732, assuming the "cars" are traveling towards region 19714) may, for example, not have use for certain information and/or computations that the last "car" in cluster 19732 uses, since the lead "car" has already passed this location. Similarly, network 19700 may be configured to pass information and computations from one cluster, e.g., from a lead cluster 19734, to another cluster, e.g., a trailing cluster 19732, in order to reduce or minimize the amount of information needed to be performed in the by cluster 19732.

FIG. 198 shows communication system 19800 for a vehicular terminal device in an aspect of this disclosure. It is appreciated that communication system 19800 is exemplary in nature and may be simplified for purposes of this explanation. While certain components of communication system 19800 are shown as individual components, it is appreciated that multiple components may be combined into one component with the function of each of its constituents. Similarly, each individual component of communication system 19800 may be split into two or more separate components.

It is further appreciated that some aspects of communication system 19800 can overlap with components described in FIG. 192. Communication system 19800 shows components to illustrate the application of the methods and processes described herein, and therefore, may not show all of the components of a vehicular terminal device.

Communication system 19800 may include antenna system 19802 configured to transmit and receive radio signals. In some aspects, antenna system 19802 may be one or more antennas configured in the manner of antenna system 19202 of terminal device 19102 in FIG. 192.

Communication system 19800 may include transceiver 19804 configured to transmit and/or receive communications with external sources via wireless interfaces, e.g., LTE, Wi-Fi, D2D communications, etc. In some aspects, transceiver 19804 may be configured in the manner of RF transceiver 19204 of terminal device 19102 in FIG. 192.

Communication system 19800 may further include processing module 19806, including data acquisition module 19808, computation module 19810, and reduction module 19810. In some aspects, one or more of processing module 19806, data acquisition module 19808, computation module 19810, and reduction module 19810 may be structurally realized as a hardware-defined module, e.g., as one or more dedicated hardware circuits or FPGAs, as a software-defined module, e.g., as one or more processors executing program code that define arithmetic, control, and I/O instructions (e.g., software and/or firmware) stored in a non-transitory computer-readable storage medium, or as a mixed hardware-defined and software-defined module. In some aspects, one or more of processing module 19806, data acquisition module 19808, computation module 19810, and reduction module 19810 may be modem-layer or application-layer components, such as components of a baseband modem in the manner of baseband modem 19206 of FIG. 192 or as components of an application processor in the manner of application processor 19212 of FIG. 192.

Processing module 19806 is configured to transmit and receive data as radio signals via radio transceiver 19804 and antenna system 19802. Processing module 19806 may transmit and receive the data on a logical software-level connection that relies on a radio access connection for low-layer transport.

Data acquisition module 19808 may include any form of component which the terminal device uses to acquire data to be employed in the computations of this disclosure, such as cameras configured for capturing images, radar sensors configured to determine distance estimates, GPS circuitry configured for determining geographic information, speedometer circuitry configured for determining speed information of the vehicular terminal device, etc. Data acquired by each vehicular terminal device may be transmitted to an anchor control node, or directly to other vehicular terminal devices (e.g., via D2D communications), via transceiver 19804.

Computation module 8010 may be configured to perform the mapping and/or coding processes described above. Computation module 19810 may be configured to receive the mapping assignments via transceiver 19804 and perform the computations of the mapping tasks. Furthermore, computation module 19810 may be configured to code the transmissions to be sent via transceiver 19804 in accordance with the framework described in FIG. 196, such as with a coded MapReduce scheme.

reduction module 19812 may be configured to receive computations from other nodes via transceiver 19804 and perform a reducing task to compile (reduce) the information to obtain the final results which will be used by the vehicular terminal device, e.g., a complete scene reconstruction for autonomous driving, an autonomous driving decision, or a collision avoidance decision.

FIG. 199 shows method 19900 of wireless distributed computation in accordance with some aspects. In some aspects, method 19900 can provide a method for execution at a first vehicular terminal device of coordinating with other vehicular terminal devices to perform a distributed computation. As shown in FIG. 199, method 19900 includes obtaining local sensor data for a local area of the first vehicular terminal device (19910), performing a distributed mapping processing task on the local sensor data to obtain a first intermediate distributed processing output (19920), providing the first intermediate distributed processing output to a second vehicular terminal device according to a distributed processing shuffling scheme (19930), receiving a second intermediate distributed processing output from a third vehicular terminal device according to the distributed processing shuffling scheme (19940), and performing a distributed reducing processing task on the first intermediate distributed processing output and the second intermediate distributed processing output to obtain a final distributed processing output at (19950).

FIG. 200 shows method 20000 of wireless distributed computation in accordance with some aspects. In some aspects, method 20000 can provide a method for execution at an anchor control node for coordinating a distributed computation between vehicular terminal devices. As shown in FIG. 200, method 20000 includes assigning a respective distributed mapping processing task to each of a plurality of vehicular terminal devices (20010), receiving a plurality of distributed intermediate processing outputs from the plurality of vehicular terminal devices based on the respective distributed processing tasks at (20020), and routing the plurality of distributed intermediate processing outputs between the plurality of vehicular terminal devices according to a distributed processing shuffling scheme at (20030).

6.2 Device Cooperation #2

In some aspects of this disclosure, terminal devices may utilize D2D communications to pair with incumbent peer devices already on a network in order to implement a cell search and acquisition process to establish a network connection.

FIG. 11 shows the problem with a terminal device connecting to wireless network 20100 in an unknown environment identified in an aspect of this disclosure. Wireless network 20100 may include a macro cell station 20110 and small cell stations 20112-20114 with their corresponding coverage regions 20120-20124, respectively. Terminal devices 20150-20158 are within coverage of heterogeneous network 20100, which may support several radio access technologies (RATs), e.g., LTE, 5G, GSM, CDMA, UMTS, etc. Furthermore, terminal devices 20150-20158 are capable of supporting D2D communications, and may be, for example, user equipment (UE). It is appreciated that network 20100 is exemplary in nature and may thus be simplified for purposes of this explanation.

Macro cell station 20110 may be associated with a specific RAT of heterogeneous network 20100. In an exemplary LTE setting, macro cell station 20110 may be for example, an eNodeB (eNB) station of an LTE network, in which case macro cell station 20120 supports at least LTE communications. Macro cell station 20110 may therefore act as an interface between the RAN of the LTE network and an underlying core network of wireless network 20100 and may allow closely located terminal devices, e.g., terminal devices 20150-20158, to exchange data with the core network of wireless network 20100 and any other connected networks. Macro cell station 20110 and terminal devices 20150 and 20158 may operate in the manner for other radio access technologies. Small cell stations 20112-20114 may each be associated with the same RAT as macro cell station 20110 or may be associated with a different RAT, in which case wireless network 20100 may be a heterogeneous wireless network. Either of small cells 20122-20124 may be a femtocell, picocell, or microcell, for example, and may further be configured as closed subscriber group (CSG) cell.

In an unknown network environment, terminal devices may execute a full band search in order to register with the network and acquire further radio access network parameters in order to establish a network connection. The respective search and acquisition process may both be time-consuming and power-intensive.

For example, upon entering within range of the network 20100, terminal device 20150 may have to perform a full band search of all of the RAT frequencies which are supported by terminal device 20150 and obtain the network parameters from the results of the scan in order to find the most suitable connection to network 20100. After conducting the full frequency band search 20160 of all of the RAT frequencies supported by terminal device 20150, terminal device 20150 will identify that it is within range of cells 20120-20124. Terminal device 20150 will then receive the network parameters from each of the stations 20110-20114 and identify which cell provides the most suitable connection to the network.

In an LTE example, LTE downlink is the signal from the base station to the UE. LTE downlink uses Orthogonal Frequency Division Multiple Access (OFDMA) scheme, which is a multiple access version of Orthogonal Frequency Division Multiplexing (OFDM). OFDM is a frequency-division multiplexing which splits the carrier frequency bandwidth into many small subcarriers and then modulates each individual subcarrier using a digital modulation format. This allows encoding of digital data on multiple carrier frequencies.

OFDMA provides for high data rate through the radio channel as well as other advantages, for example, efficient implementation using Fast Fourier Transforms (FFT) and robustness against inter-symbol interference. However, it also has a high Peak-to-Average Power Ratio (PAPR). While in the downlink this may not be much of a concern since the base station may be well equipped to handle the power consumption and heat dissipation issues, this presents a problem if used in the LTE uplink.

LTE uplink is the signal from the UE to the base station and uses Single Carrier Frequency Division Multiple Access (SC-FDMA) scheme. SC-FDMA has a lower PAPR than OFDM. As a result, SC-FDMA reduces battery power consumption and design complexity compared to OFDM. SC-FDMA also differs from OFDM in that data may be spread across multiple subcarriers, whereas in OFDM, each subcarrier (or frequency component) carries unique information.

In LTE standards supporting D2D communication, a portion of the available bandwidth spectrum may be dedicated for the support of D2D communication. The direct interface between two devices supporting D2D communication may reuse the existing frequency allocation. To reduce or minimize the power consumption and hardware impact on the UE, transmission of D2D communications may occur in the uplink band, e.g., D2D communications also employ SC-FDMA. Other radio access technologies may similarly allocate certain bandwidth spectrum for D2D communication, and can analogously be used in the manner detailed below.

In the exemplary setting of FIG. 201, terminal device 20150 enters into an unknown environment consisting of cells 20120-20124 in scenario 20100A. Upon entering into the unknown environment, terminal device 20150 may be configured to search for a peer group, e.g., other terminal devices, within range of its D2D communication capabilities (shown as the shaded oval), and contacts terminal devices 20152-20156. The peer group may be pre-defined by loose selection criteria, e.g., same operator, same original equipment manufacturer (OEM) or same employer/enterprise information technology (IT) managed device, etc. While terminal device 20158 may fall within the pre-defined peer group, it may be out of range of the D2D capabilities of terminal device 20150.

As shown in 20100A, the "incumbent" (e.g., with network connections already established) terminal devices 20152-20154 are connected to cells 20122, 20120, and 20124 of stations 20112, 20110, and 20114, respectively, and therefore, have the requisite network parameters for connecting to network 20100 via the respective station.

Terminal devices 20152-20156, may provide terminal device 20150 (the new terminal device) with the radio access parameters via messages over the low power and fast D2D link in 20100B. These network parameters may include, for example, location of the station and connectivity or telemetry data for enabling a new device to register with the network. In another aspect of this disclosure, the incumbent devices may share their position (e.g., as obtained via any GNSS or other geopositioning system) with terminal device 20150 in order to speed up the time for terminal device 20150 to establish a connection to network 20100. Once the appropriate data is received from the incumbent terminal devices 20152-20156, terminal device 20150 will just need to verify this connectivity or telemetry data, but not perform a full scan.

By establishing a D2D link with a peer group of incumbent terminal devices, terminal device 20150 may obtain connectivity and telemetry data from each of the incumbent terminal devices. The link can be established with device discovery and link setup procedures, which may rely on RAT-specific procedures, such as device discovery and link setup procedures as outlined by the 3GPP in LTE Device to Device Proximity Services (Release 12) or LTE-Based Vehicle-to-X Services (Release 14). This data may include any parameters that facilitate the connection of terminal device 20150 to network 20100 via any one of stations 20110-20114, such as, for example, RAT type (e.g., GSM, UMTS, LTE, etc.), frequency band, mobile country code (MCC), mobile network code (MNC), downlink carrier frequency (e.g., E-UTRA Absolute Radio Frequency Channel Number (EARFCN)), cell identity parameters (e.g., physical cell ID (PCI)), reference signal receive power (RSRP), reference signal receive quality (RSRQ), Signal-to-Noise Ratio (SNR), Signal-to-Interference-Plus-Noise Ratio (SINR) values, round trip delays, system information (e.g., MIB and SIBs (e.g., SIB1-SIB12), which may be decoded or encoded such as with Abstract Syntax Notation one (ASN.1)) of best/strongest cells, etc.

Once terminal device 20150 has received the necessary network parameters from incumbent terminal devices 20152-20156, terminal device 20150 may select the best cell from which to connect to network 20100, e.g., the cell providing the most optimal or most reliable connection. In 20100C, small cell 20124 is selected as the interface providing the best connection to network 20100.

By implementing the procedure described in 20100A-20100C, terminal device 20150 may establish a connection with network 20100 faster while consuming less power than a full band/cell search in public landline mobile network (PLMN). Furthermore, in some aspects, only the terminal devices are configured to implement this aspect of the disclosure, so no changes to infrastructure are required.

In the case that small cell 20124 is a CSG cell, terminal device 20150 may obtain the necessary CSG cell parameters to check to see if it is on the whitelist in order to establish a connection via small cell (CSG) station 20114. If terminal device 20150 is not a member of CSG cell 20124, then terminal device may be configured to select the next best cell in order to connect to network 20100. Terminal device 20150 may employ a similar method in other scenarios in which case it cannot connect to the network via its first choice from the parameters obtained from the incumbent terminal devices.

FIG. 202 shows the channel mapping for the physical, transport, and logical channels of D2D communication. While FIG. 202 may refer to an exemplary LTE setting, this is only for demonstrative purposes, and the concepts can be applied in the same manner to other radio access technologies.

As shown for the exemplary LTE setting for FIG. 202, the physical channels for D2D communication can include the Physical Sidelink Broadcast Channel (PSBCH), the Physical Sidelink Discovery Channel (PSDCH), the Physical Sidelink Shared Channel (PSSCH), and the Physical Sidelink Control Channel (PSCCH).

In some aspects, the PSBCH carries the system and synchronization related information transmitted from the transmitting UE. The PSBCH is the channel responsible for the discovery phase of D2D communications. The PSDCH carries the Proximity Service (ProSe) discovery message from the UE. The PSCCH carries the Sidelink Control Information (SCI) block which is responsible for carrying the control information for a UE for ProSe direct communication. The PSSCH carries data for D2D communication.

In some aspects, the transport channels include the Sidelink Broadcast Channel (SL-BCH), Sidelink Discovery Channel (SL-DCH), and the Sidelink Shared Channel (SL-SCH). The SL-BCH is mapped onto the PSBCH, the SL-DCH is mapped onto the PSDCH and the SL-SCH is mapped onto the PSSCH. The SL-BCH is a predefined transport format, as is the SL-DCH, which provides a pre-defined format for broadcast information. The SL-SCH provides support for the broadcast transmission.

In some aspects, the logical channels are the Sidelink Broadcast Control Channel (SBCCH) and the Sidelink Traffic Channel (STCH). The SBCCH is mapped onto the SL-BCH and the STCH is mapped onto the SL-SCH. The STCH is a point to multipoint channel for transfer of user information from one terminal device to other terminal devices. In some cases, this channel may only be used by ProSe capable terminal devices, e.g., at least terminal device 20150-20156 shown in FIG. 201.

The following examples highlight improvements in which utilizing D2D communications to pair with incumbent peer devices already on a network facilitate (e.g., faster, less power consumption) connecting with a network. Generally, in each example, parameters which are useful for the new (e.g., terminal device 20150 in FIG. 201) device's fast operation and power saving are provided by at least one other incumbent device, rather than the new device acquiring the parameters from a lengthy and power intensive frequency scanning procedure.

In general, terminal devices may discover the 'incumbent' terminal devices through D2D device discovery. A pre-action for D2D communication is for a terminal device to discover another terminal device which transmits the appropriate D2D signals, a process referred to as synchronization. This procedure is similar to the LTE downlink cell search procedure, although at a much lower power. In synchronization, the timing information is first detected from the Primary Sidelink Synchronization Signals (PSSS). Then, the Secondary Synchronization Signal (SSSS) is used in order to obtain the physical-sidelink synchronization identity ($N_{ID}^{SL}$). Once the $N_{ID}^{SL}$ has been detected by the receiving terminal device, the receiving terminal device can use the $N_{ID}^{SL}$ to decode the demodulation reference signal (DMRS) and apply the sidelink reference signal received power (S-RSRP) measurement in order to report the strength of the detected sidelink.

In a first case, the user experience is improved in national/international roaming or out of service recovery use cases where the legacy terminal device procedures (e.g., full frequency band scan) are not efficient. For example, a terminal device will attempt to camp on a previously known cell, but the terminal device will be unsuccessful in establishing a connection by these means if in a new cell. Rather than falling back to the full operating band search (e.g., a 3GPP Operating Band search), the new terminal device will be able to receive related important parameters from an incumbent terminal device, which it may detect via D2D device discovery methods. These important parameters may include, but are not limited to, RAT type, frequency band, MCC, MNC, downlink carrier frequency, cell identity parameters, RSRP, RSRQ, SNR, SINR, round trip delays, system information, etc.

Under some methods, a full operating band search may take several minutes for cell camping, e.g., in international roaming cases. With help of an incumbent device, e.g., from a same operator, with D2D communications range, cell camping time can be significantly reduced compared to certain cases (e.g., some 3GPP LTE cell camping times).

For example, some full band scans in LTE Band 3 may take a few seconds (700 frequencies times a few ms per frequency). Each band, however, has a different number of frequencies and therefore, total time between bands may vary. In a possible worst case scenario, the total band search across all bands will be the sum of all the bands. This band scan may include acquisition of master information block (MIB), system information block (SIB) 1, and SIB 2, which may take a few hundred ms.

By implementing the methods and devices of this disclosure, the new terminal device may determine the MCC and MNC from location information, e.g., latitude and longitude from GPS position fix, provided by at least one incumbent device (e.g., closely located terminal device from a pre-defined peer group). The number of bands and cells searched are therefore significantly reduced, resulting in faster cell camping at reduced power expenditure.

In a second case, the radio resource control (RRC) connection may be quickly established by implementing methods and devices of this disclosure. Abstract Syntax Notation one (ASN.1) encoded MIB, SIB1 and other SIBs (e.g., SIB1-SIB12) of the best/strongest signal quality cells as reported by the incumbent UEs can be shared with the new terminal device for fast RRC connection. In certain searches (e.g., some 3GPP legacy searches), this may take several hundred ms receive activity for the new terminal device, e.g., this search may be both time and power intensive. However, by obtaining these parameters from incumbent terminal devices, the new terminal device is prepared for quick RRC Connection Establishment without needing such time and power intensive methods.

In another case, the GPS time to first fix is significantly shortened and/or less power intensive. The new terminal device receives a message with location information from at least one other incumbent device in order to assist with data to speed up the GPS positioning fix. In another aspect, the new device uses location information from the incumbent devices as an approximate location for location based services, thereby allowing the new device to keep its own positioning engines in low power mode, rather than using the power intensive GPS subsystem to determine position.

In some aspects, the methods and devices of this disclosure may further be configured to exploit D2D deployment topology to provide for faster and less power intensive search and connection procedures.

In a one-to-one topology scenario, the methods and devices of this disclosure according to some aspects may be applied to paired devices, e.g., a smart watch (with terminal device functionality) paired with a smart phone. Smart watches typically have much smaller batteries than smart phones, and as a result, the power saving methods described in this disclosure are highly effective in improving user experience. The smart watch can receive the GPS fix and other parameters mentioned in this disclosure from the smart watch owner's phone via D2D links to save power for cell camping (selection/re-selection) and RRC connection establishment or re-re-establishment procedures or positioning.

In a one-to-many or many-to-many topology scenario, for a closed user group of terminal devices of the same operator, e.g., company employees at a certain office site, the methods and devices of this disclosure according to some aspects may be configured so that some or all of the terminal devices of the group do not need to perform serving cell and neighbor cell measurements and SIB acquisition during the time the terminal device is within the office site during office hours. Instead, only a few terminal devices may become the 'incumbent' devices and perform cell measurements while the 'other' terminal devices may obtain these measurements from the 'incumbent' devices by querying the 'incumbent' devices via D2D communications. In this manner, the other terminal devices conserve power resources.

The 'incumbent' (e.g., master) and 'other' (e.g., slave), roles can be assigned, for example, in a round robin fashion to distribute the power penalty incurred on the master role (e.g., attributed to the conducting of measurement procedures) uniformly over different UEs during the day. This topology will reduce energy consumption of the terminal devices because at any moment in time only a few terminal devices will perform the regular measurement jobs (e.g., as defined by 3GPP standards) and the rest of the terminal devices (others, e.g., slaves) can rely on the master terminal devices to provide the needed information via more power efficient D2D links either periodically or on request. In a further aspect of this disclosure, more than one terminal device is assigned the master role for redundancy purposes.

For mobile-originated calls, the slave terminal device receives the latest information from the master terminal device (including the case of more than one master terminal device for redundancy). For mobile-terminated calls, the slave can receive a paging notification forwarded from the master terminal device(s) on the D2D channel in addition to the necessary radio access network (RAN) parameters required to establish the connection.

This one-to-many or many-to-many topology of D2D communications of this disclosure may be applied to different scenarios, including public environments such as schools, campuses, shopping venues, hospitals, etc. and private environments such as commercial offices and private residences (e.g., homes, apartments, dormitories, hotels, etc.), Cellular, as well as non-cellular D2D physical (PHY) layers, can be used to communicate among peer group, e.g., Wi-Fi-Direct technology, Bluetooth low energy (BLE) or LTE D2D (Release 12 or later). The peer group operator (e.g., mobile network operator, OEM, employer IT department) may pre-configure the data (e.g., PHY layer parameters, security credentials (authentication/encryption) and pairing information) necessary to pair with other devices.

A new protocol can be implemented on top of the radio communication protocol stack (e.g., in the application layer) to exchange the radio access network (RAN) parameters, similar to the ASN.1 structure for data exchange. Security techniques may be used to validate that the RAN parameters are provided by an authorized device. In some aspects, the radio communication protocol stack can provide connectivity-related information such as the RAN parameters to the new upper protocol via a pre-defined interface between the existing radio communication protocol stack and the new upper protocol.

In some aspects, in order to implement the methods of this disclosure, a peer group management component is installed into each device and pre-configured by the peer group operator. This management component manages the peer group operation and handles user interaction.

When a new device is turned on and wants to join a peer group, the new device searches for peers using, for example, established discovery procedures. In response, the incumbent devices expose themselves to the new device. If there are no discovered incumbent devices, the new device may then perform the scanning and connection procedures, and thereby become the incumbent device for some or all subsequent new devices.

When a device needs assistance information, it may multi-cast a request for assistance data to incumbent devices. For example, in the case of a "same operator" per group, this may include a request for RAN parameters for fast cell camping procedures.

In a further aspect of this disclosure, the incumbent devices may multi-cast specific sets of assistance data to the peer group in an unsolicited manner. For example, in the case of the 'same operator' peer group, this may include broadcasting RAN parameters for fast cell camping procedures.

In another aspect of this disclosure, user approval may be requested, e.g., by clicking a button, before accepting incumbent device input before implementing any procedure resulting from said incumbent device input.

In general, these aspects can be applied to all systems and use cases in which time-consuming and power hungry procedures are required by a terminal device to receive and acquire context and telemetry information broadcast by the network and required to establish or maintain a connection to the network. Context and telemetry data broadcast by the network may be considered non-sensitive in terms of privacy or security, thereby eliminating the need for additional protection mechanisms.

FIG. 203 shows method for connecting to a network using D2D links in an aspect of this disclosure. It is appreciated the method 20300 is exemplary in nature and may therefore be simplified for purposes of this disclosure.

Upon entering into a new cell or powering on at 20302, a terminal device (e.g., a UE) searches for an incumbent device at 20304 from a peer group as defined by its peer group management component. After performing the D2D discovery procedure, the terminal device determines if an appropriate incumbent device is found at 20306.

If no incumbent device is found (or if no suitable connection with an incumbent device of a peer group could be established), the device will perform the regular frequency band scan and connect to the network and establish itself as an incumbent device for some or all subsequent new devices at 20320.

However, if an incumbent device (or multiple incumbent devices) is found at 20306, the device will establish a connection with the incumbent device(s) via D2D at 20308. The device will then receive the network parameters from the incumbent device(s) via the established D2D link at 20310. If multiple incumbent devices belonging to different cells are found, the device may be further configured to select the parameters from the incumbent device which provides the best network connection e.g., highest RSRP, RSRQ, lowest SINR, etc. In some aspects of one-to-many or many-to-many topologies, the number of incumbent devices that are queried can be limited to a configurable quantity. Non-limiting examples can include 3 or 4 incumbent devices. Accordingly, the device will only query up to the configurable quantity of incumbent devices, which may limit the processing effort for received messages at the device. This may limit power consumption at the device and keep power consumption below that of conventional cell search procedures (e.g., a 3GPP cell search procedure).

After receiving the network parameters from the incumbent device (or selecting the network parameters from the incumbent device which provides the best network connection), the device may connect to the network at 20312.

FIG. 204 shows communication system 20400 for a terminal device in accordance with some aspects. It is appreciated that communication system 20400 is exemplary in nature and may be simplified for purposes of this explanation. While certain components of communication system 20400 are shown as individual components, it is appreciated that multiple components may be combined into one component with the function of each of its constituents. Similarly, each individual component of communication system 20400 may be split into two or more separate components.

It is further appreciated that aspects of communication system 20400 may overlap with components described in FIG. 192. Communication system 20400 shows components to illustrate the application of the methods and processes described herein, and therefore, may not show all of the components of a vehicular terminal device.

Communication system 20400 may include antenna system 20402 configured to transmit and receive radio signals. In some aspects, antenna system 20402 may be one or more antennas configured in the manner of antenna system 19202 of terminal device 19102 in FIG. 192.

Communication system 20400 may include transceiver 20404 configured to transmit and/or receive communications with external sources via wireless interfaces, e.g., LTE, Wi-Fi, D2D communications, etc. In some aspects, transceiver 20404 may be configured in the manner of RF transceiver 19204 of terminal device 19102 in FIG. 192.

Communication system 20400 may further include processing module 20406, including acquisition and verification module 20408, selection module 20410, and scanning module 20412. In some aspects, one or more of processing module 20406, acquisition and verification module 20408, selection module 20410, and scanning module 20412 may be structurally realized as a hardware-defined module, e.g., as one or more dedicated hardware circuits or FPGAs, as a software-defined module, e.g., as one or more processors executing program code that define arithmetic, control, and I/O instructions (e.g., software and/or firmware) stored in a non-transitory computer-readable storage medium, or as a mixed hardware-defined and software-defined module. In some aspects, one or more of processing module 20406, acquisition and verification module 20408, selection module 20410, and scanning module 20412 may be modem-layer components, such as components of a baseband modem in the manner of baseband modem 19206 of FIG. 192.

Processing module 20406 is configured to transmit and receive data as radio signals via radio transceiver 20404 and antenna system 20402. Processing module 20406 may transmit and receive the data on a logical software-level connection that relies on a radio access connection for low-layer transport.

Acquisition and verification module 20408 is configured, upon establishment of a D2D communication link with a discovered incumbent device, to acquire network parameters from the incumbent device and verify these parameters in order to connect to the network using these acquired network parameters.

Selection module 20410 is configured, in the case where more than one incumbent device is discovered, to select the network parameters from the incumbent device which provides the best connection to the network. Selection module 20410 may be configured to determine which network parameters provide the best connection to the network based on RSRP, RSRQ, SINR, round trip delays, or other related parameters which may determine link quality.

Scanning module 20412 is configured to perform a conventional frequency band scan if no incumbent devices are discovered by the terminal device, or in the case where the appropriate network parameters were unable to be obtained via the D2D link with an incumbent device.

In either case, upon establishing a network connection, the terminal device may establish itself as an incumbent device, and be able to transmit the network parameters of its connection to the network to other devices through its transceiver 20404.

FIG. 205 shows method 20500 for telemetry aid over D2D in accordance with some aspects. As shown in FIG. 205, method 20500 includes establishing a direct wireless link with at least one other terminal device, wherein the at least one other terminal device is connected to a wireless network (20510), receiving, over the direct wireless link from the at least one other terminal device, network connection parameters to the wireless network (20520), and attempting a connection to the wireless network based on the network connection parameters (20530).

In some aspects, if the communication device establishes a wireless link with more than one other terminal device, the communication device may be further configured to evaluate the multiple network connection parameters and select the network parameters used for attempting to connect to the network based on a criteria, e.g., one or a combination of: highest RSRP, highest RSRQ, lowest SINR, lowest round trip delay, etc.

6.3 Device Cooperation #3

In some aspects of this disclosure, a terminal device may share information through D2D communication to provide channel parameter information to closely located terminal devices in order to improve link robustness (uplink and/or downlink throughput) and mobility performance (handover and cell selection/reselection performance) of each of the terminal devices.

FIG. 206 shows a D2D cooperative communication scenario 20600 in accordance with some aspects. As shown in FIG. 206, co-located (e.g., within range of a direct D2D channel) terminal devices 20730-20732 are grouped together and can use D2D link 20650 to directly exchange information. For example, terminal devices 20730-20732 can share parameter information for network access node such as network access node interferences, neighboring network access node database, etc. with each other through D2D link 20650. Terminal devices 20730-20732 can then utilize this shared parameter information to improve various key performance indicators (KPIs), in particular related to downlink scenarios including downlink throughput and successful inter-cell handover rate. Terminal devices may explore co-located channel correlations to apply joint network access node channel state information (CSI) estimation to improve the link robustness between each terminal device and the network access node.

In accordance with some aspects of this disclosure, terminal devices such as terminal devices 20730-20732 may utilize D2D links to share information such as radio channel information. Terminal devices 20730-20732 may then utilize the shared radio channel information to improve downlink reception, such as by combining the shared radio channel information along with locally obtained radio channel information to obtain joint radio channel information or by using the shared radio channel information for interference mitigation.

In particular, many radio access technologies rely on channel estimation in order to improve, or in some cases to optimize, uplink and downlink performance. Accurate channel estimation may yield highly effective channel equalization, and enable terminal devices to enjoy high performance radio transmission and reception. For example, in an exemplary LTE setting, downlink transmissions may use Orthogonal Frequency Division Multiple Access (OFDMA) modulation schemes to overcome Inter-Symbol Interference (ISI) caused by multipath fading in multiple input multiple output (MIMO) schemes. OFDMA implements orthogonal spaced sub-carrier signals and inserts a cyclic prefix (CP) as a guard interval to eliminate ISI. To compensate for distortion resulting from the propagation of transmission of the signal through communication channels, terminal devices can perform channel estimation to increase capacity and enable proper signal detection and data demodulation. The more accurate the channel estimation, the better the receiver is generally able to receive data from the transmitter. To facilitate channel estimation, LTE uses reference signals consisting of pilot symbols in the time and frequency domains to provide an estimate of the channel at given locations within a subframe. The pilot symbols are used to provide a reliable estimate of the complex gains of each resource element of signal transmission through the communication channel. Using the known pilot symbols to estimate the channel, the terminal device may equalize the effects of the communication channel and reduce the noise on the received signals.

Many other radio access technologies may similarly use channel estimation techniques to perform channel equalization during downlink reception. Precoding techniques also rely on accurate channel estimation, where a transmitter such as a network access node may 'precode' downlink transmissions based on knowledge of the channel response, which may mitigate corruptive channel effects and enable a receiver such as a terminal device to have high reception performance.

Some aspect may group co-located terminal devices, such as closely located terminal devices 20730-20732, through D2D communications and, within the group, enable sharing of the radio channel information obtained from each terminal device and the common network access node. This radio channel information can include, but is not limited to: inter-network access node interferences, neighboring network access node database information, and other parameters used in channel estimation methods, for example. Sharing such radio channel information between the terminal devices provides for improved KPIs between each of the network access node(s) and the terminal device(s).

By sharing radio channel information over D2D links, terminal devices 20730-20732 can share their channel correlations (by virtue of co-location) by combining local radio channel information (e.g., locally estimated) with the shared radio channel information received from the other terminal devices. For example, terminal device 20730 may derive local radio channel information by receiving and processing downlink signals from network access node 20610, and may then receive shared radio channel information from terminal device 20732, where terminal device 20732 obtained the shared radio channel information by similarly receiving radio signals from network access node 20610. Terminal device 20730 may then combine the local radio channel information with the shared radio channel information as part of a joint radio channel estimation procedure for network access node 20610, which may yield a more accurate radio channel estimate (compared to performing the radio channel estimation procedure with only the local information). Downlink reception performance may therefore be improved. Terminal device 20732 can similarly use shared radio channel information provided by terminal device 20730 in a joint radio channel estimation procedure.

The information sharing via the D2D link may produce a latency, where the shared radio channel information provided by terminal device 20732 may have an earlier time basis than the local radio channel information at terminal device 20730. Accordingly, in some aspects may utilize a time-interpolation method so that the shared radio channel information is combined with the local radio channel information on the same time basis.

In FIG. 206, the arrows between the terminal devices 20730-20732 and network access node 20610 illustrate the network access node-terminal device link (high throughput), for example, through multiple user MIMO schemes. The dashed line 20650 represents the cooperative D2D link (low throughput, low latency) used in an aspect of this disclosure to share joint channel parameter estimation, neighboring cell database, interference, and other information.

To implement the cooperative sharing methods for fast handover, terminal devices can share radio channel information for a network access node with other terminal devices. The radio channel information can include neighboring network access node database and downlink channel state information (CSI) such as power level, frequency offset, delay spread, channel response (e.g., channel estimate), or another measure of radio channel information. As previously indicated, in some aspects such as where terminal devices 20730-20732 are communicating with the same network access node, e.g., network access node 20610, the terminal devices may combine the shared radio channel information (received from the other of terminal devices 20730-20732) with local radio channel information as part of a joint radio channel estimation procedure. Accordingly, in these aspects terminal devices 20730-20732 may utilize the joint radio channel estimation procedure to improve downlink field performance, such as in channel equalization or channel estimation reporting (e.g., to network access node 20610 for precoding purposes). In some aspects, terminal devices 20730-20732 may calculate a precoding matrix and transmit a precoding matrix indicator (PMI) that corresponds to the precoding matrix to network access node 20610, which may then precode downlink data for terminal devices 20730-20732 according to the precoding matrix corresponding to the PMI.

Further, in some aspects terminal devices 20730-20732 may be located proximate to each other but be receiving from different network access nodes, such as where terminal devices 20730-20732 are located at the cell edge of their respective serving network access nodes. Accordingly, the downlink transmissions from the first network access node that is serving terminal device 20730 appear as interference to terminal device 20732, and vice versa for the second network access node that is serving terminal device 20730. In order to mitigate the interference, terminal devices 20730-20732 may exchange radio channel information for their respective serving network access nodes. Each of terminal devices 20730-20732 may then utilize the shared radio channel information to estimate and cancel the interference from the other network access node, thus mitigating the interference and improving downlink reception performance.

In general, the data sharing methods in accordance with some aspects can be implemented in the physical layer (PHY) by:

(1) Identifying cooperative device candidates and establishing a D2D sharing link. This may be initialized by the network access node based on terminal device location information, or by either of the terminal devices based on spontaneous neighbor device discovery based on D2D signal detection.

(2) Operating the D2D sharing link and applying cooperative communications between the terminal devices through the D2D link.

(3) Terminating the D2D link. The termination of the D2D link may be triggered, for example, by the network access node based on awareness of a terminal device status change (e.g., turning off a terminal device), or it may be triggered by a terminal device based on the awareness of an environment change (e.g., a change from low mobility to high mobility).

As introduced above, two general scenarios are identified in an aspect of this disclosure for the operation and application of the D2D sharing link.

FIG. 207 shows a first scenario 20700 with an accompanying time chart 20800 in FIG. 208 for the operation and application of the D2D sharing link between two terminal devices (in this example, terminal devices) in accordance with some aspects.

Multiple terminal devices, e.g., terminal device 20730 and terminal device 20732, which are in close proximity (e.g., close enough to exchange information on a D2D channel, which may be, for example, in the range of 500 meters) may be performing downlink reception from different network access nodes in the same frequency carrier, e.g., at a cell edge between the two network access nodes. In this case, the downlink radio channel information is shared between the two terminal devices through the established D2D link for the enhancement of interference estimation. Terminal device 20730 is receiving downlink signals from network access node 20710 and terminal device 20732 is receiving downlink signals from network access node 20712 in the same intra-frequency. The network access node 20710 downlink signal is an interference source to terminal device 20732 reception and network access node 20712 downlink signal is an interference source to terminal device 20730 reception. By establishing a D2D link between the two terminal devices, each of the terminal devices is able to share the radio channel information from their respective network access node with the other, and the terminal devices may use this information to mitigate or cancel the interference from the other network access node, e.g., terminal device 20730 may make use of the radio channel information from network access node 20712 shared from terminal device 20732 to mitigate the inference from network access node 20712, and vice versa.

Time chart 20800 shows the method by which the terminal devices may implement this interference cancellation in an aspect of this disclosure. It is assumed that terminal device 20730 and terminal device 20732 have already established the D2D link between their devices and that terminal device 20730 and terminal device 20732 share the same time reference.

At t0 (time 0), terminal device 20730 demodulates the network access node 20710 burst data (e.g., 1 Time Transmission Interval (TTI)). Subsequently, through the established D2D link, terminal device 20730 sends the estimated radio channel information of network access node 20710 (e.g., power level, frequency offset error, delay spread, channel transfer function, etc.) with the timestamp (e.g., t0) to terminal device 20732. At t3, terminal device 20732 needs to demodulate the downlink data burst from network access node 20712, which is interfered with by network access node 20710 downlink. Here, the infinite impulse response (IIR) model of this disclosure interpolates the network access node 20710-terminal device 20732 interference at t3

[RCI(t3)] based on the radio channel information (RCI) at t0 received from terminal device 20730 and the previously interpolated interference state from network access node 20710 at tn (time n, at some point n in the future) [RCI(tn)]. The time interval between t3 and tn, as well as the time interval between t3 and t0, weights this interpolation, e.g., RCI(t3)=f(RCI(tn), t3-tn, RCI(t0), t3-t0).

After RCI(t3) is interpolated, it is used as the estimated network access node 20710 interference as the input for network access node 20712-terminal device 20732 demodulation at t3, e.g., for terminal device 20732 to demodulate signals from network access node 20732 by canceling the estimated interference RCI(t3) from downlink signals. After that, the radio channel information at tn, e.g., RCI(tn), and tn are updated: RCI(tn)=RCI(t3) and tn=t3, which are used in the next RCI interpolation.

FIG. 209 shows a second scenario 20900 with an accompanying time chart 21000 in FIG. 210 for the operation and application of the D2D sharing link between two terminal devices (in this example, terminal devices) in accordance with some aspects.

In scenario 20900, two terminal devices, e.g., terminal device 20730 and terminal device 20732, are receiving downlink from network access node 20710, e.g., the same network access node, on the same frequency carrier. For example, network access node 20710 may be broadcasting a same stream to both terminal device 20730 and terminal device 20732, and as a result terminal devices 20730 and 20732 may be receiving the same data from network access node 20710. Examples of same streams can include, without limitation, broadcast or multicast streams such as Multimedia Broadcast Multicast Service (MBMS), broadcast or multicast control data or system information, or other types of same data that a network access node can transmit to multiple terminal devices. In this case, terminal devices 20730 and 20732 can implement joint radio channel estimation by sharing radio channel information between the terminal devices by a D2D link. As terminal devices 20730 and 20732 may as a result have both local radio channel information (obtained locally) and shared radio channel information (from the other terminal device), terminal devices 20730 and 20732 may apply joint radio channel estimation using both the local and shared radio channel information to improve downlink robustness at each of terminal devices 20730 and 20732. For example, terminal devices 20730 and 20732 can apply the joint radio channel estimates in channel equalization to correct channel corruptions, which may yield improved downlink performance (in particular relative to radio channel estimation that uses only local radio channel information).

Time chart 21000 shows an exemplary application of the joint radio channel estimation by the two terminal devices in an aspect of this disclosure. In time chart 21000, the network access node broadcasts a stream to terminal device 20730 and terminal device 20732. Terminal device 20730 and terminal device 20732 can be located in a manner in which a D2D link is established between them, e.g., D2D synchronization and communication between terminal device 20730 and terminal device 20732 is established. In this scenario, it is assumed that terminal device 20730 and terminal device 20732 share the same time reference. Furthermore, strong radio channel correlations between network access node-terminal device 20730 and network access node-terminal device 20732 are assumed due to the close proximity between terminal device 20730 and terminal device 20732.

At t0, terminal device 20730 demodulates burst data from network access node 20710 (e.g., 1TTI) and obtains local radio channel information, e.g., a local radio channel estimate. Subsequently, through the established D2D link with terminal device 20732, terminal device 20730 sends the local radio channel estimate of network access node 20710 (e.g., power level, frequency offset error, delay spread, channel transfer function, etc.) together with a timestamp (e.g., t0) to terminal device 20732.

At t3, terminal device 20732 demodulates the downlink from network access node 20710. By implementing an IIR model to make use of the radio channel estimate shared from terminal device 20730 at t0, the local radio channel estimate at t3 between terminal device 20732-network access node is interpolated based on the shared radio channel estimate at t0 of terminal device 20730-network access node 20710 and a previous interpolation of the local radio channel estimate between terminal device 20732-network access node at time tn. Furthermore, the radio channel interpolation at t2 may be configured to weight the current terminal device 20732 local radio channel estimate at t3 (e.g., RCI'(t3)) and may be shown by the following: RCI(t3)=f (RCI(t1), t3-t1, RCI(t0), t3-t0), RCI'(t3)).

After RCI(t3) of terminal device 20732-network access node 20710 is interpolated the RCI(tn) and tn are updated: RCI(tn)=RCI(t3) and tn=t3, which are used in the next radio channel estimate interpolation.

In some aspects, differentiation between terminal device knowledge history (e.g., information from multiple network access nodes) can be exploited for extending and implementing the information sharing between terminal devices at higher layers (e.g., layers above the PHY layer).

In some cases, a first terminal device in high mobility (e.g., in a train or car) may not only have information on the local communication conditions (e.g., currently camped on cell) but also have information it has acquired from near-by and/or far-locations. This may include information, for example, of the heterogeneous communication environment. The information fathered by the first terminal device may be of interest to a second terminal device which may be moving in a similar direction from which the first terminal device came from, and therefore, the second terminal device may need the corresponding information for planning its configuration ahead of time. For example, the second terminal device may request the presence of specific RATs from the highly mobile terminal device.

However, for a third terminal device of static/low-mobility, the information from the first terminal device may be of little value, and therefore, not required for optimizing device performance. Furthermore, the first terminal device (e.g., the highly mobile terminal device) may not have highly detailed information from a previously visited location because it spent very little time in that location, e.g., drove through the cell in a car on a highway. When requesting information from a device such as the first terminal device, in an aspect of this disclosure, the trade-off between broad geographic coverage and low level of detailed observation is thus accounted for.

The third terminal device (e.g., a terminal device in low mobility or static setting) may, on the other hand, have detailed knowledge of a heterogeneous wireless environment in a specific location where it is largely stationed. However, this terminal device may have little or no information from more distant network environments due to its low mobility range. When requesting information from such terminal a device, in an aspect of this disclosure, the trade-off between limited geographic coverage and the high level of detailed observation of a specific wireless environment is thus accounted for.

In another setting, there may be a hybrid case of the characteristics exhibited by the first terminal device and the third terminal device, e.g., a terminal device which stays in a particular location for a while and then travels to another location. Such a terminal device may be highly valuable for sharing information from its first location to other devices at the second location since it will be able to provide detailed information for the environment of multiple specific further away locations.

In order to more effectively share network information between terminal devices by D2D communications, some aspects can implement a device knowledge history (DKH) classification system which may be stored on each terminal device and may be communicated to other terminal devices through D2D links in order to effectively share information between terminal devices.

A terminal device, therefore, may be configured to classify itself into a particular DKH class, thereby indicating to other terminal devices the kind of information it may have obtained. The following are exemplary classes in which a terminal device may be classified.

A first class may be "Local Knowledge Class-Heterogeneous." A terminal device in this class has detailed knowledge on a local heterogeneous communication environment (e.g., a low mobility device with network parameters of one or more closely located macro cells and other small cells located within the closely located macro cells, e.g., a CSG cell).

A second class may be "Local Knowledge-homogeneous." A terminal device in this class has detailed knowledge on a local homogeneous communication environment (e.g., information on a specific wireless standard such as LTE, Wi-Fi, etc.)

A third class may be "Wide Spread Knowledge-heterogeneous." A terminal device in this class has some limited knowledge on the heterogeneous communication environment over a larger area.

A fourth class may be "Wide Spread Knowledge-homogenous." A terminal device in this class has a limited knowledge on the homogeneous communication environment over a large area (e.g., information on a specific wireless standard such as LTE, Wi-Fi, etc.)

A fifth class may be "Wide Spread Knowledge with some hotspots-heterogeneous." A terminal device in this class has limited knowledge on the heterogeneous communication environment over a large area with some detailed knowledge of some specific areas (e.g., high mobility device that spent more than extended period of time in a particular location along its journey).

A sixth class may be "Wide Spread Knowledge with some hotspots-homogeneous." A terminal device in this class has some limited knowledge on the homogenous communication environment over a large area with some detailed knowledge of specific areas (e.g., information related to a specific wireless standard, such as, for example, LTE, Wi-Fi, etc.)

Accordingly, when a first terminal device seeks to exchange information with a second terminal device, each of the terminal devices may identify themselves under the right DKH class such that an improved, and in some cases the optimum, type of information is exchanged.

FIG. 211 shows a communication network 21100 with two terminal devices, terminal devices 21130 and 21140, of different DKH classes. In this exemplary scenario, it is assumed that all network access nodes 21110-21115 are cellular network access nodes (e.g., eNodeBs or another type of cellular network access node) with corresponding coverage areas 21120-21125. Furthermore, small cell 21131 may be a short-range network access node or cellular small cell network access node, such as a Wi-Fi hotspot, LTE femtocell, or other type of short-range or cellular small cell network access node.

In this scenario, terminal device 21130 is classified as a "Wide Spread Knowledge-homogenous" device and terminal device 20990 is classified as a "Local Knowledge Class-Heterogeneous" device. Accordingly, if terminal device 21130 enters into cell 21121 and establishes a D2D link with terminal device 21140, terminal device 21150 can benefit from obtaining the highly detailed information for coverage area 21121 and coverage area 21131 from terminal device 21140.

In some aspects, protection bands in unlicensed spectrum can be coordinated among neighboring groups of terminal devices so that various levels of interference protection are guaranteed between the terminal devices. Depending on the requisite needs, terminal device groups can be forced into band slots of high/medium/low additional interference protection. For example, terminal devices experiencing significant interference, e.g., cell-edge terminal devices, can be forced into the highest quality band slot in a hybrid automatic request (HARQ) process.

In some aspects, neighboring terminal devices may exchange information via D2D on the observed performance gains and performance/power consumption trade-offs of lower layer software components.

In some aspects, some communication standards allow devices to add specific lower layer (such as PHY, MAC, etc.) software components to their existing configuration. These are typically provided through so-called "RadioApps". Terminal devices with an established D2D link can be further configured to exchange information on the observed performance gains and performance/power consumption trade-offs related to specific "RadioApps". For example, a terminal device may observe performance gains at minimum power expense when using a "RadioApp" which improves, or in some cases optimizes, antenna selection in the given local radio environment. Then, the usage of such an App can be recommended to other terminal devices, for example, the "RadioApp" can directly be shared if the compatibility of the linked terminal devices allows for it.

FIG. 212 shows communication system 21200 for a terminal device in accordance with some aspects. It is appreciated that communication system 21200 is exemplary in nature and may be simplified for purposes of this explanation. While certain components of communication system 21200 are shown as individual components, it is appreciated that multiple components may be combined into one component with the function of each of its constituents. Similarly, each individual component of communication system 21200 may be split into two or more separate components.

It is further appreciated that aspects of communication system 21200 may overlap with components described in FIG. 192. Communication system 21200 shows components to illustrate the application of the methods and processes described herein, and therefore, may not show all of the components of a vehicular terminal device.

Communication system 21200 may include antenna system 21202 configured to transmit and receive radio signals. In some aspects, antenna system 21202 may be one or more antennas configured in the manner of antenna system 19202 of terminal device 19102 in FIG. 192.

Communication system 21200 may include transceiver 21204 configured to transmit and/or receive communications with external sources via wireless interfaces, e.g., LTE, Wi-Fi, D2D communications, etc. In some aspects, transceiver 21204 may be configured in the manner of RF transceiver 19204 of terminal device 19102 in FIG. 192.

Communication system 21200 may further include processing module 21206, including acquisition module 21208, demodulation/channel estimation module 21210, and interference mitigation module 21212. In some aspects, one or more of processing module 21206, acquisition module 21208, demodulation/channel estimation module 21210, and interference mitigation module 21212 may be structurally realized as a hardware-defined module, e.g., as one or more dedicated hardware circuits or FPGAs, as a software-defined module, e.g., as one or more processors executing program code that define arithmetic, control, and I/O instructions (e.g., software and/or firmware) stored in a non-transitory computer-readable storage medium, or as a mixed hardware-defined and software-defined module. In some aspects, one or more of processing module 21206, acquisition module 21208, demodulation/channel estimation module 21210, and interference mitigation module 19221 may be modem-layer components, such as components of a baseband modem in the manner of baseband modem 19206 of FIG. 192.

Processing module 21206 is configured to transmit and receive data as radio signals via radio transceiver 21204 and antenna system 21202. Processing module 21206 may transmit and receive the data on a logical software-level connection that relies on a radio access connection for low-layer transport.

Acquisition module 21208 is configured to acquire network information from both network access node and from at least one co-located terminal device via transceiver 21204. The information acquired from the network access node is used by the demodulation/channel estimation module 21210 to, for example, calculate the CSI between the terminal device and the network access node at a particular time.

Demodulation/channel estimation module 21210 is configured to demodulate data received from the network access node and perform channel estimation based on the demodulated data. Demodulation/channel estimation module 21210 may be further configured to demodulate data (e.g., CSI reports) received from co-located terminal devices.

Interference mitigation module 21212 is configured to perform interference mitigation based on the channel estimation information from both the terminal device and channel information received from co-located terminal devices. For example, a terminal device may use a CSI report received from a co-located terminal device in order to determine the interference caused by the co-located device and use this information to mitigate interference between the terminal device and the network access node at a given moment in time.

It is appreciated that while depicted as separate components, two or more components may be implemented into a single module configured to perform the same function as the two or more modules. For example, demodulation/channel estimation module 21210 and interference mitigation module 21212 may be combined into a single module to perform the necessary procedures shown in time charts 20800 and 21000. Similarly, one component may be split into two or more components.

FIG. 213 shows method 21300 of performing radio communications at a terminal device in accordance with some aspects. As shown in FIG. 213, method 21300 includes receiving, from a proximate terminal device on a device-to-device (D2D) link, shared radio channel information that characterizes a radio downlink radio channel for a network access node that the terminal device is connected to (21310), applying the shared radio channel information and local radio channel information to obtain a joint radio channel information at (21320), and receiving downlink data from the network access node based on the joint radio channel information (21330).

FIG. 214 shows method 21400 of performing radio communications at a terminal device in accordance with some aspects. As shown in FIG. 214, method 21400 includes receiving, from a proximate terminal device on a device-to-device (D2D) link, shared radio channel information that characterizes a downlink radio channel of a first network access node that is causing interference to the terminal device (21410), receiving downlink data from a second network access node (21420), and performing interference cancellation on the downlink data based on the shared radio channel information (21430).

FIG. 215 shows method 21500 of performing radio communications at a terminal device in accordance with some aspects. As shown in FIG. 215, method 21500 includes identifying a proximate terminal device as part of a device-to-device (D2D) discovery procedure (21510), receiving, on a D2D link, a device knowledge history class from the proximate terminal device that indicates a geographic range for which the proximate terminal device has communication information or a quantity of radio access technologies for which the proximate terminal device has communication information (21520), and deciding whether to request communication information from the proximate terminal device based on the device knowledge history class (21530).

7 Hierarchical Communication

As used herein, the term "Device-to-Device" (D2D) protocol may refer to any type of communication protocols (including existing, emerging, and future protocols) between two or more devices. Furthermore, the use of D2D herein generally refers to communication between any type of devices (including e.g., vehicles, drones, Internet of Things (IoT) devices), which in some aspects may not be explicitly defined in the D2D protocol. The term D2D may therefore apply to any of device-to-device, vehicle-to-vehicle communication, drone-to-drone communication, device-to-vehicle communication, device-to-drone communication, and vehicle-to-drone communication.

Although a number of specific protocols have emerged, or are emerging, with respect to communication between devices, the aspects detailed herein (e.g., opportunistic side-channel transmission for vehicles and drones) is not limited to a specific communications protocol, but rather spans a wide array of communications protocols. The aspects detailed herein may be used, without limitation, with D2D, device-to-infrastructure (D2I), device-to-everything (D2X), vehicle-to-vehicle (V2V), vehicle-to-infrastructure (V2I), vehicle-to-network (V2N), vehicle-to-everything (V2X), and with other communications protocols that are likely to emerge in the future. It is specifically anticipated that the aspects detailed herein may be used with current and/or future protocols related to communication between drones, or communication between a drone and a device, or a drone and a network. To the extent that any one of the above protocols is referenced in this disclosure, it is expressly anticipated that the method, apparatus, means, or principles discussed herein can be used with any other of the above protocols.

Recent developments in radio technology have brought forth a wide range of new radio connectivity applications in a variety of devices. For example, in addition to radio connectivity for user devices such as cell phones, tablets, and laptops, there has been a recent emergence of connectivity implementations in a wide range of devices from wearable devices and accessories (e.g., smart watches, fitness trackers, smart glasses) to home and consumer appliances (e.g., smart thermostats, refrigerators, security systems) to vehicles (e.g., autonomous vehicles, drones). These new types of connected devices have also introduced new concepts in inter-device communications. Accordingly, in addition to the terminal device-to-network radio links, a variety of different technologies related to device-to-device (D2D) communications have emerged to provide different ways of connecting devices to communicate and interact with one another. These D2D communications have also produced a wide range of possibilities regarding different hierarchies of communication devices, including relaying and extension of network coverage using intermediate hierarchical levels of devices. These aspects, e.g., hierarchical communications, etc., may be used with common channel aspects, e.g., a common channel instrumental in dynamically coordinating hierarchical communication structures, or may be used with power efficiency aspects, e.g., selecting the hierarchical communication structure to required device or network power efficiency levels, or may be used with enhanced communication aspects, e.g., selecting the hierarchical communication structure according to radio environment map (REM) information, or may be used with device cooperation aspects, e.g., selecting the hierarchical communication structure according to available D2D or V2V links.

FIG. 216 shows radio communication network 21600 in accordance with some aspects, which may include terminal devices 21602 and 21604 in addition to network access nodes 21610 and 21612. Although certain aspects of this disclosure may describe certain radio communication network applications (such as an LTE, UMTS, GSM, other 3$^{rd}$ Generation Partnership Project (3GPP) networks, WLAN/Wi-Fi, Bluetooth, 5G, mmWave, device-to-device (D2D), etc.), the subject matter detailed herein is considered demonstrative in nature and may therefore be analogously applied to any other radio communication network. The number of network access nodes and terminal devices in radio communication network 21600 is exemplary and is scalable to any amount.

Accordingly, in an exemplary cellular setting, network access nodes 21610 and 21612 may be base stations (e.g., eNodeBs, NodeBs, Base Transceiver Stations (BTSs), etc.) while terminal devices 21602 and 21604 may be cellular terminal devices (e.g., Mobile Stations (MSs), User Equipment (UEs), etc.). Network access nodes 21610 and 21612 may therefore interface (e.g., via backhaul interfaces) with a cellular core network such as an Evolved Packet Core (EPC, for LTE), Core Network (CN, for UMTS), or other cellular core network, which may also be considered part of radio communication network 21600. The cellular core network may interface with one or more external data networks. In an exemplary short-range setting, network access node 21610 and 21612 may be access points (APs, e.g., WLAN or Wi-Fi APs) while terminal device 21602 and 21604 may be short range terminal devices (e.g., stations (STAs)). Network access nodes 21610 and 21612 may interface (e.g., via an internal or external router) with one or more external data networks.

Network access nodes 21610 and 21612 (and other network access nodes of radio communication network 21600 not explicitly shown in FIG. 216) may accordingly provide a radio access network to terminal devices 21602 and 21604 (and other terminal devices of radio communication network 21600 not explicitly shown in FIG. 216). In an exemplary cellular setting, the radio access network provided by network access nodes 21610 and 21612 may enable terminal devices 21602 and 21604 to wirelessly access the core network via radio communications. The core network may provide switching, routing, and transmit for traffic data related to terminal devices 21602 and 21604 and may provide access to various internal (e.g., control nodes, other terminal devices on radio communication network 21600, etc.) and external data networks (e.g., data networks providing voice, text, multimedia (audio, video, image), and other Internet and application data). In an exemplary short-range setting, the radio access network provided by network access nodes 21610 and 21612 may provide access to internal (e.g., other terminal devices connected to radio communication network 21600) and external data networks (e.g., data networks providing voice, text, multimedia (audio, video, image), and other Internet and application data).

The radio access network and core network (if applicable) of radio communication network 21600 may be governed by network protocols that may vary depending on the specifics of radio communication network 21600. Such network protocols may define the scheduling, formatting, and routing of both user and control data traffic through radio communication network 21600, which includes the transmission and reception of such data through both the radio access and core network domains of radio communication network 21600. Accordingly, terminal devices 21602 and 21604 and network access nodes 21610 and 21612 may follow the defined network protocols to transmit and receive data over the radio access network domain of radio communication network 21600 while the core network may follow the defined network protocols to route data within and outside of the core network. Exemplary network protocols include LTE, UMTS, GSM, WiMAX, Bluetooth, Wi-Fi, mmWave, etc., any of which may be applicable to radio communication network 21600.

FIG. 217 shows an exemplary internal configuration of terminal device 21602 in accordance with some aspects, which may include antenna system 21702, radio frequency (RF) transceiver 21704, baseband modem 21706 (including physical layer processing module 21708 and controller 21710), application processor 21712, memory 21714, and power supply 21716. Although not explicitly shown in FIG. 217, terminal device 21602 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identify module(s) (SIMs), user input/output (I/O) devices (display(s), keypad(s), touchscreen(s), speaker(s), external button(s), camera(s), microphone(s), etc.), etc.

In an abridged operational overview, terminal device 21602 may transmit and receive radio signals on one or more radio access networks. Baseband modem 21706 may direct such communication functionality of terminal device 21602 according to the communication protocols associated with each radio access network, and may execute control over antenna system 21702 and RF transceiver 21704 in order to transmit and receive radio signals according to the formatting and scheduling parameters defined by each communication protocol. Although various practical designs may include separate communication components for each supported radio access technology (e.g., a separate antenna, RF transceiver, physical layer processing module, and controller), for purposes of conciseness the configuration of terminal device 21602 shown in FIG. 217 depicts only a single instance of each such components.

Terminal device 21602 may transmit and receive radio signals with antenna system 21702, which may be a single antenna or an antenna array including multiple antennas and may additionally include analog antenna combination and/or beamforming circuitry. In the receive path (RX), RF transceiver 21704 may receive analog radio frequency signals from antenna system 21702 and perform analog and digital RF front-end processing on the analog radio frequency signals to produce digital baseband samples (e.g., In-Phase/Quadrature (IQ) samples) to provide to baseband modem 21706. RF transceiver 21704 may accordingly include analog and digital reception components including amplifiers (e.g., a Low Noise Amplifier (LNA)), filters, RF demodulators (e.g., an RF IQ demodulator)), and analog-to-digital converters (ADCs) to convert the received radio frequency signals to digital baseband samples.

In the transmit path (TX), RF transceiver 21704 may receive digital baseband samples from baseband modem 21706 and perform analog and digital RF front-end processing on the digital baseband samples to produce analog radio frequency signals to provide to antenna system 21702 for wireless transmission. RF transceiver 21704 may thus include analog and digital transmission components including amplifiers (e.g., a Power Amplifier (PA)), filters, RF modulators (e.g., an RF IQ modulator), and digital-to-analog converters (DACs) to mix the digital baseband samples received from baseband modem 21706 to produce the analog radio frequency signals for wireless transmission by antenna system 21702. Baseband modem 21706 may control the RF transmission and reception of RF transceiver 21704, including specifying the transmit and receive radio frequencies for operation of RF transceiver 21704.

As shown in FIG. 217, baseband modem 21706 may include physical layer processing module 21708, which may perform physical layer (PHY, or Layer 1) transmission and reception processing to prepare outgoing transmit data provided by controller 21710 for transmission via RF transceiver 21704 and prepare incoming received data provided by RF transceiver 21704 for processing by controller 21710. Physical layer processing module 21708 may accordingly perform one or more of error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Although not explicitly shown in FIG. 217, physical layer processing module 21708 may include a physical layer controller configured to control various hardware and software processing components of physical layer processing module 21708 in accordance with physical layer control logic defined by the communications protocol for the relevant radio access technologies. Furthermore, while physical layer processing module 21708 is depicted as a single component in FIG. 217, physical layer processing module 21708 may include separate sections of physical layer processing components where each respective section is dedicated to the physical layer processing of a particular radio access technology.

Terminal device 21602 may be configured to operate according to one or more radio access technologies, which may be directed by controller 21710. Controller 21710 may thus be configured to control the radio communication components of terminal device 21602 (e.g., antenna system 21702, RF transceiver 21704, and physical layer processing module 21708) in accordance with the communication protocols of one or more supported radio access technologies. Also, controller 21710 may be configured to represent the Access Stratum and Non-Access Stratum (NAS) (also encompassing Layer 2 and Layer 3) of one or more supported radio access technologies. Controller 21710 may be structurally embodied as a protocol processor configured to execute protocol software (retrieved from a controller memory) and subsequently control the radio communication components of terminal device 21602 in order to transmit and receive communication signals in accordance with the corresponding protocol control logic defined in the protocol software.

Controller 21710 may therefore be configured to manage the radio communication functionality of terminal device 21602 in order to communicate with the various radio and core network components of radio communication network 21600. Controller 21710 may also be configured according to the communication protocols for multiple radio communication networks.

In some aspects, controller 21710 may be configured according to multiple cellular radio communication technologies, for example, according to LTE, UMTS, and/or GSM. In some aspects, controller 21710 may be configured according to cellular radio communication technologies and short-range radio communication technologies, such as, for example, at least one of Wi-Fi or Bluetooth and at least one of LTE, UMTS, or GSM. Controller 21710 may either be a unified controller that is collectively responsible for all supported radio access technologies (e.g., LTE, UMTS, GSM, Bluetooth, Wi-Fi, etc.) or may include multiple separate controllers where each controller is a dedicated controller for a particular radio access technology (e.g., a dedicated LTE controller, a dedicated UMTS controller, a dedicated GSM controller, a dedicated Wi-Fi controller, a dedicated Bluetooth controller). Regardless, controller 21710 may be responsible for directing radio communication activity of terminal device 21602 according to the communication protocols of the supported radio communication networks.

As previously noted regarding physical layer processing module 21708, one or both of antenna system 21702 and RF transceiver 21704 may similarly be partitioned into multiple dedicated components that each respectively correspond to one or more of the supported radio access technologies. Depending on the specifics of each such configuration and the number of supported radio access technologies, controller 21710 may be configured to control the radio communication operations of terminal device 21602 in accordance with a master/slave RAT hierarchical or multi-SIM scheme.

Terminal device 21602 may also include application processor 21712, memory 21714, and power supply 21712. Application processor 21712 may be a CPU configured to execute various applications and/or programs of terminal device 21602 at an application layer of terminal device 21602, such as an Operating System (OS), a User Interface (UI) for supporting user interaction with terminal device 21602, and/or various user applications. The application processor 21712 may interface with baseband modem 21706 as an application layer to transmit and receive user data such as voice data, audio/video/image data, messaging data, application data, basic Internet/web access data, etc., over the radio access connection(s) provided by baseband modem 21706. Although shown separately in FIG. 217, this distinction highlights the differences between baseband modem 21706 and application processor 21712 on a functional level. Accordingly, in some aspects baseband modem 21706 and application processor 21712 may be structurally separate, e.g., a separate baseband modem 21706 and a separate application processor 21712. In some aspects, baseband modem 21706 and application processor 21712 may be structurally integrated, such as an integrated baseband modem/application processor 21706/21712.

Memory 21714 may embody a memory component of terminal device 21602, such as a hard drive or another such memory device. Although not explicitly depicted in FIG. 217, the various other components of terminal device 21602 shown in FIG. 217 may additionally each include integrated permanent and non-permanent memory components, such as for storing software program code, buffering data, etc.

Power supply 21716 may be an electrical power source that provides power to the various electrical components of terminal device 21602. Depending on the design of terminal device 21602, power supply 21716 may be a 'finite' power source such as a battery (rechargeable or disposable) or an 'indefinite' power source such as a wired electrical connection. Operation of the various components of terminal device 21602 may thus pull electrical power from power supply 21716.

In accordance with radio communication networks, terminal devices 21602 and 21604 may execute mobility procedures to connect to, disconnect from, and/or switch between available network access nodes of the radio access network of radio communication network 21600. As each network access node of radio communication network 21600 may have a specific coverage area, terminal devices 21602 and 21604 may be configured to select and re-select between the available network access nodes in order to maintain a strong radio access connection with the radio access network of radio communication network 21600. For example, terminal device 21602 may establish a radio access connection with network access node 21610 while terminal device 21604 may establish a radio access connection with network access node 21612. In the event that the current radio access connection degrades, terminal devices 21602 or 21604 may seek a new radio access connection with another network access node of radio communication network 21600. For example, terminal device 21604 may move from the coverage area of network access node 21612 into the coverage area of network access node 21610. As a result, the radio access connection with network access node 21612 may degrade, which terminal device 21604 may detect via radio measurements such as signal strength or signal quality measurements of network access node 21612.

Depending on the mobility procedures defined in the appropriate network protocols for radio communication network 21600, terminal device 21604 may seek a new radio access connection (which may be triggered at terminal device 21604 or by the radio access network), such as by performing radio measurements on neighboring network access nodes to determine whether any neighboring network access nodes can provide a suitable radio access connection. As terminal device 21604 may have moved into the coverage area of network access node 21610, terminal device 21604 may identify network access node 21610 (which may be selected by terminal device 21604 or selected by the radio access network) and transfer to a new radio access connection with network access node 21610. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

FIG. 218 shows an exemplary internal configuration of a network access node such as network access node 21610 in accordance with some aspects. As shown in FIG. 218, network access node 21610 may include antenna system 21802, radio module 21804, communication module 21806 (including, for example, physical layer module 21808 and control module 21810), and backhaul interface 21812. In an abridged overview of the operation of network access node 21610, network access node 21610 may transmit and receive radio signals via antenna system 21802, which may be an antenna array including one or more antennas. Radio module 21804 may perform transmit RF processing in order to convert outgoing digital data from communication module 21806 into analog RF signals to provide to antenna system 21802 for radio transmission. Radio module 21804 may also perform receive RF processing in order to convert incoming analog RF signals received from antenna system 21802 into digital data to provide to communication module 21806.

Physical layer module 21808 may be configured to perform physical layer reception processing on digital data received from radio module 21804 to provide to control module 21810 and to perform physical layer transmission processing on digital data received from control module 21810 to provide to radio module 21804. Control module 21810 may control the communication functionality of network access node 21610 according to the corresponding radio access protocols, such as UMTS, LTE, and LTE-A, which may include exercising control over antenna system 21802, radio module 21804, and physical layer module 21808.

In some aspects, each of radio module 21804, physical layer module 21808, and control module 21810 may be structurally realized as a hardware-defined module, for example, as one or more dedicated hardware circuits or FPGAs, as a software-defined module, for example, as one or more processors executing program code that define arithmetic, control, and I/O instructions (e.g., software and/or firmware) stored in a non-transitory computer-readable storage medium, or as a mixed hardware-defined and software-defined module. In some aspects, radio module 21804 may be a radio transceiver including digital and analog radio frequency processing and amplification circuitry. In some aspects, radio module 21804 may be a software-defined radio (SDR) component implemented as a processor configured to execute software-defined instructions that specify radio frequency processing routines. In some aspects, physical layer module 21808 may include a processor and one or more hardware accelerators, wherein the processor is configured to control physical layer processing and offload certain processing tasks to the one or more hardware accelerators. In some aspects, control module 21810 may be a controller configured to execute software-defined instructions that specify upper-layer control functions. In some aspects, control module 21810 may be limited to radio communication protocol stack layer functions, while in other aspects control module 21810 may also be responsible for transport, internet, and application layer functions.

Network access node 21610 may interface with a core network and/or internet networks (directly/via a router or via the core network), which may be through a wired or wireless interface. Network access node 21610 may also interface with other network access nodes over a wired or wireless interface. Network access node 21610 may thus provide the functionality of network access nodes in radio communication networks by providing a radio access network to enable served terminal devices to access desired communication data.

Radio communication networks may be highly dynamic due to a variety of factors that impact radio communications. For example, terminal devices 21602 and 21604 may move (e.g., by a user) to various different positions relative to network access nodes 21610 and 21612, which may affect the relative distances and radio propagation channels between terminal devices 21602 and 21604 and network access node 21610 and 21612. The radio propagation channels may also vary due to factors unrelated to mobility such as interference, moving obstacles, and atmospheric changes. Additionally, local conditions at terminal device 21602 and 21604, such as battery power, the use of multiple radio access technologies, varying user activity and associated data traffic demands, etc., may also impact radio communication. Radio communications may also be affected by conditions at network access nodes 21610 and 21612 in addition to the underlying core network, such as network load and available radio resources.

As previously indicated, in some aspects network access nodes 21610 and 21612 may interface with a core network. FIG. 219 shows an exemplary configuration in accordance with some aspects where network access node 21610 interfaces with core network 21902, which may be a cellular core network. Core network 21902 may provide a variety of functions essential to operation of radio communication network 21600, such as data routing, authenticating and managing users/subscribers, interfacing with external networks, and various network control tasks. Core network 21902 may therefore provide an infrastructure to route data between terminal device 21602 and various external networks such as data network 21904 and data network 21906. Accordingly, terminal device 21602 may rely on the radio access network provided by network access node 21610 to wirelessly transmit and receive data with network access node 21610, which may then provide the data to core network 21902 for further routing to external locations such as data networks 21904 and 21906 (which may be packet data networks (PDNs)). Terminal device 21602 may therefore establish a data connection with data network 21904 and/or data network 21906 that relies on network access node 21610 and core network 21902 for data transfer and routing.

7.1 Hierarchical Communication #1

In some aspects, D2D communications may provide direct communication between terminal devices or users without the necessity of communicating through network access nodes and core networks. This is a marked departure from a traditional radio communication network, where communication between terminal devices is generally routed through a radio access network and core network, regardless of range or potential for wireless link between the terminal devices. Conversely, in the setting of D2D communications multiple terminal devices can communicate directly with each other, thus avoiding any routing through the radio access or core network.

Furthermore, when wireless communication networks were primarily voice-call based, a terminal device primarily communicated with other terminal devices that were not located in close proximity to one another. However, modern wireless communications have introduced new use cases for data exchange between terminal devices, conceivably even between terminal devices that are in close proximity to each other. In this environment, the ability to share information directly between terminal devices fulfills the demand for data sharing while easing the corresponding burden on the network. Moreover, where terminal devices in close proximity transmit in a D2D communication, high data rates can often be achieved at lower power levels compared to the power levels necessary for uplink and downlink communications with network access nodes.

In 5G and other emerging radio access technologies, wireless transmission is likely to occur on shorter wavelengths than those used in other radio access technologies such as LTE. These shorter wavelengths can include millimeter wavelengths, such as in the case of mmWave. Although millimeter wavelengths may provide higher data rates than longer wavelengths, millimeter wavelengths are subject to outage, due to the physical properties of millimeter wavelengths, resulting poor coverage, or the presence of nearby blockers.

The problem of outage may be particularly acute in V2I and V2V applications in which vehicular terminal devices may transmit and receive data with radio access infrastructure and/or with other network locations further downstream. The high mobility involved in V2I and V2V applications may lead to scenarios where vehicular terminal devices may enter areas of poor signal coverage or areas where the signal is obstructed or blocked. However, when a vehicular terminal device experiences poor coverage or poor signal with respect to the base station or network, it may be possible for the vehicular terminal device to have appreciably better coverage or signal strength with respect to a second vehicular terminal device.

In a first hierarchical communication system of this disclosure, relaying vehicular terminal devices, such as a vehicle or a drone, can be utilized opportunistically to improve overall link quality and thus the reliability of V2I or D2I links. For example, a vehicular terminal device can be configured to interact with one or more other vehicular terminal devices via D2D communications in order to discover nearby vehicular terminal devices and evaluate the link quality of the D2D sidelink channels between the nearby vehicular terminal devices to obtain link quality measurements. One or more of the vehicular terminal devices may then report the link quality measurements to a network access node. The network access node may then evaluate the link quality measurements to schedule uplink and downlink channels for the vehicular terminal devices, some of which may include D2D sidelink channels as part of the uplink and downlink channels via relaying. Accordingly, some aspects may involve cooperation between vehicular terminal devices and network access nodes in order to identify suitable uplink and downlink interfaces for vehicular terminal devices. Some aspects may also utilize other terminal devices as part of the D2D links, such as for D2D links between vehicles and other terminal devices.

This D2D relaying assistance for V2I/V2N links may improve cell-edge throughput performance through an opportunistic use of D2D sidelink channels, even when the sidelink channels are also being used for device to infrastructure links. The sidelink channel communication may be carried over licensed or unlicensed frequencies. These frequencies for sidelink channel communication are not limited in wavelength and may be transmitted on any wavelength suitable for the relevant installation.

The first hierarchical communication system may use a vehicular terminal device as relay. In some aspects, the use of a vehicular terminal device, such as a vehicle or a drone, as a relay may be advantageous compared to the use of opportunistic side-channel transmission through a wireless phone or other UE. In particular, opportunistic side-channel transmission through a wireless phone may present challenges related to the device power budget or an incentive to cooperate. These problems can be greatly mitigated with vehicular terminal devices. With respect to battery life, vehicular terminal devices may have battery resources well in excess of a cellular phone or other common user device. Vehicular terminal devices may also have engines or fuel cells that result in the local creation of electric current, or even the ability to locally recharge batteries. They may also be fitted with solar cells that are capable of powering the device or storing energy in batteries for later use. With these power-related advantages in vehicular terminal devices, they are particularly well-suited for opportunistic side-channel transmission, compared to cellular phones. At least because of the more robust power-resources, vehicular terminal devices may be more willing or able to cooperate in opportunistic side-channel transmission than cellular phones. There may be various important considerations in the use of terminal devices for relaying. For example, terminal device relaying may introduce additional latency. This may be solved by separating services in the hierarchical network architecture, and then only using terminal device relaying for latency-tolerant services such as IoT services. Terminal device relay may also require high processing power in the relaying devices. This may be addressed by dynamically selecting the relaying device based on certain KPI parameter measurements, and only selecting 'strong' terminals (e.g., with good remaining battery status, good channel conditions) as relays.

FIGS. 220 and 221 show exemplary scenarios illustrating an operation of the first hierarchical communication system in accordance with some aspects. As shown in the exemplary scenario of FIG. 220, network access node 22001 may provide a radio access network to proximate terminal devices including vehicular terminal devices 22003 and 22008-22010 in addition to terminal device 22002. Vehicular terminal device 22003 and 22008-22010 may be any type of vehicular node, including, for example, a motor-vehicle, a non-motor-vehicle, or a drone.

As shown in FIG. 220, network access node 22001 may transmit downlink data to vehicular terminal devices 22008-22009 via main downlink channel 22005, which may be a direct path between network access node 22001 and vehicular terminal devices 22008-22010. Vehicular terminal devices 22008-22010 may then transmit uplink data to network access node 22001 via the reverse path of main downlink channel 22005 (not explicitly denoted in FIG. 220). The communications between vehicular terminal devices 22008-22010 and network access node 22001 may be characterized as V2I and/or V2N. Accordingly, in some aspects of a V2I setting, network access node 22001 may be a roadside equipment that handles local communication and control, such as a stoplight or other roadside infrastructure that handles communication, integration, and movement control locally between traveling vehicles. In some aspects of a V2N setting, network access node 22001 may interface with external data networks (e.g., via a core network) to provide internet and cloud services.

As indicated above, the first hierarchical communication system may utilize sidelink channels between vehicular terminal devices and/or terminal devices to improve uplink and downlink channels, for example, to realize relaying uplink and/or downlink channels that utilize sidelink channels. Accordingly, vehicular terminal device 22003 may not utilize main uplink channel 22007 to transmit uplink data to network access node 22001. As shown in FIG. 220, vehicular terminal device 22003 may instead utilize sidelink channel 22006 to transmit uplink data to terminal device 22002, which may then relay the uplink data to network access node 22001 on main uplink channel 22004. Accordingly, vehicular terminal device 22003 may utilize D2D relaying (e.g., D2D cooperation) to transmit uplink data to network access node 22001 via another terminal device, for example, on a relaying uplink channel that includes a sidelink channel. The uplink channel between vehicular terminal device 22003 and network access node 22001 may therefore be a relaying uplink channel including sidelink channel 22006 and uplink channel 22004 of terminal device 22002. The components FIG. 220 may therefore utilize D2D sidelink assistance to perform V2I or V2N communications.

FIG. 221 depicts another exemplary scenario of the first hierarchical communication system in accordance with some aspects. As shown in FIG. 221, network access node 22001 may transmit downlink data to terminal device 22002 on a relaying downlink channel that includes multiple sidelink channels. Accordingly, instead of using main downlink channel 22105 to transmit to terminal device 22002, network access node 22001 may utilize downlink channel 22101 and a sequence of sidelink channels 22102, 22103, and 22104 between vehicular terminal devices 22008, 22009, and 22010 to transmit downlink data to terminal device 22002. Accordingly, in some aspects, network access node 22001 may utilize a plurality of sidelink channels to complete a relaying downlink channel. The D2D sidelink assistance shown in FIG. 221 may be applied for V2I or V2N communications. The scenarios shown in FIGS. 220 and 221 are exemplary in nature. The number of sidelink channels utilized in D2D sidelink assistance may be scalable to any number, and may be executed in the uplink and/or downlink directions. The sidelink channels utilized for D2D relaying assistance may be provided by any combination of terminal devices and vehicular terminal devices. Sidelinks may be used by different terminal devices, e.g., user equipment within a vehicle, a group of proximate vehicles, a group of proximate IoT devices, a group of implantable devices in a body, etc.

FIG. 222 shows an exemplary internal configuration of vehicular terminal device 22200 in accordance with some aspects. As shown in FIG. 222, vehicular terminal device 21600 may include antenna system 22202, RF transceiver 22204, and processing module 22206 that includes discovery module 22208, measurement module 22210, and communication module 22212. In some aspects, FIG. 222 may only depict the components of vehicular terminal device 22200 used in the setting of radio communications. Accordingly, in some aspects vehicular terminal device 22200 may be integrated into a vehicle and may also include vehicular components such as an engine, housing, vehicular electronics, a transmission, windows, doors, etc.

Vehicular terminal device 22200 may transmit and receive signals via antenna system 22202 and RF transceiver 22204, which may be configured in the manner of antenna system 21702 and RF transceiver 21704 of terminal device 21602 as previously detailed regarding FIG. 217. Processing module 22206 may the control radio communication functionality of vehicular terminal device 22200 at discovery module 22208, measurement module 22210, and communication module 22212. In some aspects, processing module 22206 and/or one or more of discovery module 22208, measurement module 22210, and communication module 22212 may be realized as baseband modem and/or application layer components, and/or may be implemented as a hardware-defined module, e.g., as one or more dedicated hardware circuits or FPGAs, as a software-defined module, e.g., as one or more processors executing program code that define arithmetic, control, and I/O instructions (e.g., software and/or firmware) stored in a non-transitory computer-readable storage medium, or as a mixed hardware-defined and software-defined module.

Discovery module 22208 may be configured to perform discovery (via antenna system 22202 and RF transceiver 22204) in order to discover other terminal devices and vehicular terminal devices, such as in accordance with a D2D discovery procedure. In some aspects, discovery module 22208 may apply blind time and frequency synchronization and sidelink ID detection functionalities using predefined preambles, such as by detecting predefined preambles (e.g., a Primary Sidelink Synchronization Signal (PSSS) and Secondary Sidelink Synchronization Signal (SSSS)) in received radio signals. The predefined preambles may be predefined in a standard (e.g., LTE), and may thus be known a priori at discovery module 22208. Measurement module 22210 may be configured to perform radio measurements (via antenna system 22202 and RF transceiver 22204) on uplink and/or downlink channels and sidelink channels. In some aspects, measurement module 22210 may be configured to perform radio measurements on signals received on main uplink and/or downlink channels (from a network access node) and on signals received on sidelink channels (from other vehicular terminal devices) to obtain link quality measurements. In various aspects, the link quality measurements may be signal strength measurements, signal quality measurements, SNR measurements, SINR measurements, error rate measurements, or any other type of link quality measurement.

Communication module 22212 may be configured to control radio communication functions of vehicular terminal device 22200, including triggering of discovery, measurement, transmission and reception control and timing, and mobility. Accordingly, communication module 22212 may be configured to consolidate the link quality measurements obtained by measurement module 22210 and report the link quality measurements to a network access node. Communication module 22212 may also be configured to transmit and receive signals (via RF transceiver 22204 and antenna system 22202) on uplink, downlink, and sidelink channels in accordance with corresponding radio access protocols.

Accordingly, processing module 22206 can include a discovery module (22208), configured to determine one or more devices enabled for wireless communication within a proximity of a user equipment, a measurement module (22210), configured to determine a link quality for the one or more devices enabled for wireless communication, and a communication module (22212) configured to transmit the determined link quality for the one or more devices enabled for wireless communication, receive a transmission including a selected device enabled for wireless communication, and receive a scheduling protocol for transmission with the selected device, and transmit data to the selected device.

FIG. 223 shows an exemplary internal configuration of network access node 22300 in accordance with some aspects of the first hierarchical communication system. In various aspects, network access node 22001 may be configured in the manner of network access node 22300. Network access node 22300 may transmit and receive signals via antenna system 22302 and radio module 22304, which may be configured in the manner of antenna system 21802 and radio module 21804 of network access node 21610 as previously detailed regarding FIG. 217. Processing module 22306 may control radio communication functionality of network access node 22300 at communication module 22308.

In some aspects, processing module 22306 and/or communication module 22308 may be realized as baseband and/or application layer components, and/or may be implemented as a hardware-defined module, for example, as one or more dedicated circuits or FPGAs, as a software-defined module, e.g., as one or more processors executing program code that define arithmetic, control, and I/O instructions (e.g., software and/or firmware) stored in a non-transitory computer-readable storage medium, or as a mixed hardware-defined and software-defined module. Communication module 22300 may be configured to perform one or more of D2D discovery scheduling, network assistance information provisioning, evaluation of link measurements for uplink, downlink, and sidelink channels, selection of uplink/downlink channels and channel scheduling, D2D pairing, and transmission and reception of downlink and uplink signals.

Accordingly, processing module 22306 includes a communication module (22302) configured to receive from a user equipment a link quality of one or more devices enabled for wireless transmission, select, from the one or more devices enabled for wireless transmission, a device for side channel transmission based on the link quality, and transmit to the user equipment and the selected device a schedule for side channel transmission.

FIG. 224 shows message sequence chart 22400 in accordance with some aspects. In some aspects, communication nodes operating in a V2I or V2N setting may apply the procedure of message sequence chart 22400 to utilize sidelink channels to improve a main channel, which may be a V2I or V2N downlink or uplink channel between a network access node and a terminal device. As indicated in FIG. 224, vehicular terminal devices 22008, 22009, and 22010 and network access node 22001 may execute the procedure of message sequence chart 22400. However, the following description is demonstrative and may be analogously applied to other combinations of terminal devices, including any combination of vehicular and non-vehicular terminal devices. In some aspects, vehicular terminal devices 22008-22010 may be configured in the manner of vehicular terminal device 22200 as detailed regarding FIG. 222. In some aspects, network access node 22001 may be configured in the manner of network access node 22300 as detailed regarding FIG. 223.

Vehicular terminal devices 22008-22010 may first discover neighboring devices with available sidelink channels in 22402 (e.g., at a discovery module such as discovery module 22208 as shown in FIG. 222). In some aspects, vehicular terminal devices 22008-22010 may perform 22402 by performing D2D discovery, such as by monitoring sidelink channels (which may be assigned to specific frequencies) for D2D discovery signals. Vehicular terminal devices 22008-22010 may then identify any detectable D2D discovery signals and subsequently identify neighboring devices with available sidelink channels. For example, in an exemplary scenario, vehicular terminal devices 22008-22010 may be proximate to one another (e.g., in range of D2D discovery) and may detect one another in 22402.

In various aspects, vehicular terminal devices 22008-22010 may utilize any inter-device radio access technology to discover neighboring devices with available sidelink channels in 22402. For example, in various aspects, vehicular terminal devices 22008-22010 may utilize LTE Direct (e.g., over a PC5 interface), LTE Proximity Services (ProSe), Dedicated Short-Range Communications (DSRC), WLAN/Wi-Fi (including Wi-Fi Direct), Bluetooth, mmWave, etc. In some aspects, one or more of vehicular terminal devices 22008-22010 may utilize multiple inter-device radio access technologies, and may perform discovery for a plurality of the multiple inter-device radio access technologies.

Additionally or alternatively, in some aspects, terminal devices 22008-22010 may discover neighboring devices in 22402 with network assistance provided by network access node 22001. For example, network access node 22001 may provide information in 22402 that indicates neighboring devices, for example, may provide neighboring device information. For instance, network access node 22001 may provide neighboring device information to vehicular terminal device 22008 that vehicular terminal devices 22009 and 22010 are proximate (or expected to be proximate) to vehicular terminal device 22008. Network access node 22001 may obtain such neighboring device information based on geolocation information and/or topology information for the vehicular terminal devices served by network access node 22001, including vehicular terminal devices 22008-22010. Vehicular terminal devices 22008-22010 may then utilize the neighboring device information to identify neighboring devices in 22402, and may in some aspects also perform D2D discovery in 22402 in order to verify the neighboring device information (or may utilize the neighboring device information as a preliminary starting information for D2D discovery).

In some aspects, network access node 22001 may schedule 22402 as a 'neighbor discovery phase'. For example, network access node 22001 may transmit control information to vehicular terminal devices 22008-22010 that specifies that an upcoming time period (or periodically occurring time period) will be a neighbor discovery phase. Vehicular terminal devices 22008-22010 may then perform discovery during the neighbor discovery phase. In some cases, as vehicular terminal devices 22008-22010 may be simultaneously performing discovery in accordance with the neighbor discovery phase. This may increase the effectiveness of discovery and avoid missed connections.

After discovering neighboring devices with available sidelink channels in 22402, vehicular terminal devices 22008-22010 may evaluate the available channels in 22404 (e.g., at a measurement module such as measurement module 22210 as shown in FIG. 222). More specifically, vehicular terminal devices 22008-22010 may evaluate available sidelink channels (e.g., with the neighboring devices discovered in 22402) and main uplink and downlink channels with network access node 22001. Accordingly, vehicular terminal devices 22008-22010 may perform radio measurements on the sidelink channels in 22404 in order to characterize the link quality of the sidelink channels. As previously indicated, vehicular terminal devices 22008-22010 may utilize any radio access technology for the sidelink channels, including LTE Direct, LTE ProSe, DSRC, WLAN/Wi-Fi, Bluetooth, mmWave, etc.

In some aspects, one or more of vehicular terminal devices 22008-22010 may perform radio measurements for sidelink channels of multiple radio access technologies. Accordingly, vehicular terminal devices 22008-22010 may consider sidelink channels for a plurality of radio access technologies.

Additionally, in some aspects terminal devices 22008-22010 may perform radio measurements on the main uplink and/or downlink channels in 22404, which may include receiving signals from network access node 22001 (e.g., on the main downlink channel, an LTE-Uu interface) and performing radio measurements on the received signals. In exemplary cases where the main link between network access node and terminal devices 22008-22010 exhibits channel reciprocity (e.g., a time division duplexing (TDD) system), the radio measurements on the main downlink channel may reflect the link quality of both the main downlink and uplink channels.

Vehicular terminal devices 22008-22010 may then report the link quality measurements to network access node 22001 in 22406. In various aspects, vehicular terminal devices 22008-22010 may utilize any radio access technology to report the link quality measurements to network access node 22001 in 22406, including standard LTE (on the LTE-Uu interface), LTE Direct, LTE ProSe, DSRC, WLAN/Wi-Fi, Bluetooth, or mmWave. In some aspects, one or more of vehicular terminal devices 22008-22010 may utilize a sidelink channel (e.g., with another of vehicular terminal devices 22008-22010) to transmit the link quality measurements to network access node 22001 via a relaying link.

Network access node 22001 may then receive the link quality measurements and evaluate the link quality measurements in 22408 (e.g., at a communication module such as communication module 22308 as shown in FIG. 223). In particular, network access node 22001 may determine which uplink and downlink channels to schedule for V2I/V2N communications between network access node 22001 and vehicular terminal devices 22008-22010, where uplink and/or downlink channels may include a sidelink channel as part of the uplink or downlink channel path (e.g., relaying channels), and other uplink and/or downlink channels may be direct paths, (e.g., main channels). As some of the uplink and/or downlink channels may be relaying channels that utilize sidelink channels, network access node 22001 may also determine which vehicular terminal devices to schedule as D2D pairs in 22408 as part of any relaying uplink and/or downlink channels.

Network access node 22001 may therefore select uplink and downlink channels to schedule for vehicular terminal devices 22008-22010 for V2I/V2N communications in 22408. While in a scenario network access node 22001 may simply use the main uplink and downlink channels (e.g., the direct uplink and downlink paths between vehicular terminal devices 22008-22010 and network access node 22001), network access node 22001 may consider additional options for uplink and downlink channels that include sidelink channels in addition to the main uplink and downlink channels.

In some aspects, network access node 22001 may apply utility maximization techniques to identify which uplink or downlink channels (potentially including sidelink channels) provide optimal downlink and uplink paths for vehicular terminal devices. For example, in an exemplary application of message sequence chart 22400 to the vehicular terminal device 22003 in FIG. 220, vehicular terminal device 22003 may discover terminal devices 22002 during discovery in 22402, evaluate the sidelink channel (over path 22006) and the main uplink and downlink channels (over path 22007) to obtain link quality measurements in 22404, and report the link quality measurements to network access node 22001 in 22406. Terminal device 22002 may similarly evaluate the sidelink channel (over path 22006) and the main uplink and downlink channels (over path 22004) to obtain link quality measurements in 22404 and report the link quality measurements to network access node 22001 in 22406. In various aspects, the link quality measurements may be signal strength measurements, signal quality measurements, SNR measurements, SINR measurements, error rate measurements, or any other type of link quality measurement.

Network access node 22001 may then evaluate the link quality measurements to evaluate the potential uplink and downlink channels in accordance with utility maximization in 22408, for instance, to identify which uplink and downlink channel (e.g., the utility) improves the link performance (e.g., the maximization parameter, the link with the highest throughput, the link with the lowest error rate, etc.). For example, network access node 22001 may consider the main uplink and downlink channels (over path 22007) and the uplink and downlink channels that utilize the sidelink channel (over path 22006) (where these uplink and downlink channels may be relaying channels that include the sidelink channel over path 22006 and the main uplink/downlink channel over path 22004) in order to schedule an uplink and downlink channel for vehicular terminal device 22003 to use for V2I/V2N communications. Accordingly, network access node 22001 may compare the link quality measurements for the main uplink/downlink channel for vehicular terminal device 22003 (path 22007), the sidelink channel (path 22006), and the main uplink/downlink channel for terminal device 22003 (path 22004) to determine which potential uplink and/or downlink channel improves the link performance.

For example, network access node 22001 may determine in 22408 that the link quality measurements indicate that the main downlink channel on path 22007 provides better link performance than the relaying downlink channel via paths 22004 and 22006 that utilizes relaying. However, network access node 22001 may determine in 22408 that the link quality measurements indicate that the relaying uplink channel via 22006 and 22004 provides better link performance than the main uplink channel over path 22007. Network access node 22001 may therefore select the main downlink channel on path 22007 as the downlink channel for vehicular terminal device 22003 and the relaying channel over paths 22006 and 22004 as the uplink channel for vehicular terminal device 22003, e.g., a relaying uplink channel that includes a sidelink channel In some aspects, network access node 22001 may utilize proportionally fair throughput (e.g., an acceptable tradeoff between overall throughput and minimal service for individual users) as the link performance parameter that is maximized via the utility maximization analysis. In other words, network access node 22001 may perform scheduling and D2D pairings based on fairly balancing service between the terminal devices, e.g., such that certain terminal devices do not unfairly experience higher throughput or latency than other terminal devices. For example, network access node 22001 may consider that utilizing vehicular terminal devices for relaying may skew the data throughput to the vehicular terminal devices, and may cause imbalances where some vehicular terminal devices enjoy higher throughput than others due to the relaying channels. Accordingly, in some aspects, network access node 22001 may evaluate the link quality measurements in 22408 to schedule uplink and/or downlink channels that maximize proportional fair throughput (e.g., a link with good quality could be used to provide minimal but guaranteed services to users, while a link with not so good quality could be used to opportunistically maximize overall throughput). Network access node 22001 may therefore evaluate the potential uplink and downlink channels in a joint procedure that considers the impacts of using sidelink channels for relaying on throughput to the other vehicular terminal devices.

In some aspects, network access node 22001 may also consider relaying strategies in scheduling uplink and/or downlink channels in 22408. For example, there may be different relaying strategies available for D2D pairings, including amplify-and-forward, decode-and-forward, compress-and-forward, or quantize-map-and-forward (which are available for use in order to exchange received signals between D2D pairs for proper MIMO processing). The various relaying strategies may provide different performance levels and/or have different requirements (e.g., for synchronization or device capabilities). In some aspects, vehicular terminal devices 22008-22010 may provide information to network access node 22001 that indicates their capabilities (e.g., in 22406 or another reporting stage), e.g., may provide their relaying capabilities for D2D (V2V) cooperation as device capability signaling. Network access node 22001 may also consider the impact of the relaying strategies as part of the utility maximization analysis, and may schedule relaying uplink and/or downlink channels with a specific relaying strategy (e.g., a relaying strategy with many hops might have negative impacts on latency-critical services and the utility maximization analysis).

As previously indicated, in some aspects, one or more of vehicular terminal devices 22008-22010 may support sidelink channels for multiple radio access technologies, e.g., multiple of LTE Direct, LTE ProSe, DSRC, WLAN/Wi-Fi, Bluetooth, or mmWave, and may provide link quality measurements for sidelink channels of multiple radio access technologies in 22406. In some aspects, network access node 22001 may therefore evaluate potential sidelink channels for multiple different radio access technologies and, if a given D2D sidelink between a pair of vehicular terminal devices is available in multiple radio access technologies, may select a radio access technology for the sidelink channel.

Network access node 22001 may therefore apply a utility maximization analysis to vehicular terminal devices 22008-22010 in 22408 based on the link quality measurements. Accordingly, network access node 22001 may consider the sidelink channels as part of potential relaying channels in addition to the main uplink and downlink channels for channel selection in 22408 (e.g., as part of utility maximization analysis). Network access node 22001 may therefore select uplink and downlink channels to schedule for vehicular terminal devices 22008-22010 in 22408, which may include consideration of proportional fair throughput, relaying strategies, and/or sidelink channel radio access technologies (e.g., a video streamed to a vehicular terminal device might result in the selection of a more low-latency low-throughput uplink channel and a high-latency high-throughput multi-relay downlink channel).

In some aspects, network access node 22001 may treat one or more D2D pairs as a MIMO link with appropriate modification of the rate to address non-collocated antennas. Although pairs of D2D collaborators (e.g., relaying channels that utilize one or more sidelink channels) may be common, network access node 22001 may also schedule links of D2D collaborators that include more than two terminal devices.

After evaluating the uplink and/or downlink channels and determining the scheduling in 22408, network access node 22001 may provide the scheduling to vehicular terminal devices 22008-22010 in 22410. As some of the scheduled uplink and downlink may be relaying channels and include sidelink channels, network access node 22001 may also organize the corresponding D2D pairings (e.g., V2V pairing) in 22410 by providing D2D pairing information that identifies the sidelink channel configuration. The D2D pairing information may identify which of vehicular terminal devices 22008-22010 are to form D2D pairs, the relaying strategy for the D2D pairing, and the radio access technology for the D2D pairing.

Vehicular terminal devices 22008-22010 may then apply the D2D pairings in 22412 (e.g., at a communication module such as communication module 22212 as shown in FIG. 222) to realize the uplink and/or downlink channels scheduled by network access node 22001. Depending on the scheduling identified by network access node 22001 in 22408, some of vehicular terminal devices 22008-22010 may utilize main downlink and/or uplink channels (e.g., direct paths with network access nodes 22001) while others of vehicular terminal devices 22008-22010 may utilize relaying uplink and/or downlink channels that utilize sidelink channels as part of the uplink and/or downlink channel path (as indicated by the D2D pairing and scheduling). Accordingly, vehicular terminal devices 22008-22010 may execute downlink and uplink communications in 22412 according to the scheduled uplink and downlink channels, where any of vehicular terminal devices 22008-22010 that are involved in D2D pairings may utilize the D2D pairing information to realize the sidelink channels for any relaying uplink and/or downlink channels.

Vehicular terminal devices 22008-22010 and network access node 22001 may then also execute ACK/NACK feedback and retransmission in 22414 until uplink and/or downlink data is successfully received by the intended recipient. In some aspects, this may involve relaying of ACK/NACKs on sidelink channels so that the data on each sidelink channel and across the entire relaying uplink/downlink channel is received successfully. In some aspects, vehicular terminal devices 22008-22010 may apply error detection and/or correction method such as an automatic repeat request protocol, or hybrid automatic repeat request protocol in 22414.

Network access node 22001 and vehicular terminal devices 22008-22010 may therefore utilize D2D relaying assistance (V2V assistance) in order to realize links in V2I/V2N applications. As network access node 22001 may consider both main uplink/downlink channels and relaying uplink/downlink channels in scheduling in 22408, network access node 22001 may be able to improve (e.g., maximize) link performance by selecting from a large set of potential uplink and/or downlink channels that also includes relaying uplink and/or downlink channels that use sidelink channels. Furthermore, by maximizing some criteria such as proportionally fair throughput, network access node 22001 can be configured to provide that any scheduled D2D pairings fairly balance throughput across multiple vehicular terminal devices.

In some aspects, vehicular terminal devices 22008-22010 and network access node 22001 may repeat the process of message sequence chart 22400. This may include updating the neighboring devices with available D2D sidelinks and updating the link quality measurements for sidelink channels and the main uplink and/or downlink channels, which may be dynamically impacted by movement of vehicular terminal devices 22008-22010 in addition to other dynamic factors affecting radio communication environments. Network access node 22001 may therefore update the scheduled uplink/downlink channels and corresponding D2D pairings based on the changing links between vehicular terminal devices 22008-22010. In some aspects, network access node 22001 and vehicular terminal devices 22008-22010 may repeat the procedure of message sequence chart 22400 with low period, e.g., every frame/subframe or every several frames/subframes. Network access node 22001 and vehicular terminal devices 22008-22010 may therefore frequently adapt the scheduled uplink and downlink channels and corresponding D2D pairings. In some aspects, the vehicular terminal devices involved in the procedure of message sequence chart 22400 may change over time, as vehicular terminal devices move into and out of the concerned area of network access node 22001 and into and out of D2D range of the other vehicular terminal devices.

In some aspects, a central controller may assume some or all of the role of network access node 22001 in the setting of message sequence chart 22400. For example, in some aspects, a central controller (e.g., a server) located in a core network behind the radio access network may perform D2D discovery period scheduling, provide network assistance information, and/or evaluate uplink/downlink channels and determine scheduling as in 22402 and 22408 of message sequence chart 22400. In some aspects, the central controller may receive the link quality measurements and transmit the D2D pairing and scheduling via a network access node. Furthermore, in some aspects the central controller may interface with multiple network access nodes and may consequently be configured to arrange D2D pairings for vehicular terminal devices that are connected to different network access nodes, neighboring network access nodes.

In some aspects, the use of D2D relaying assistance for V2I/V2N communications between vehicular terminal devices and network access nodes may improve the link quality of the uplink and/or downlink channels. For example, relaying uplink and/or downlink channels (e.g., uplink and/or downlink channels that include one or more sidelink channel) may have superior quality than the main uplink and/or downlink channels (e.g., the direct channels between network access nodes and vehicular terminal devices). In some aspects, the relaying gains introduced by effective relaying strategies, in particular for decode-and-forward and quantize-map-and-forward, may improve the V2I/V2N links. In some aspects, network access nodes and vehicular terminal devices may employ D2D relaying assistance for V2I/V2N communications opportunistically and/or intermittently, which may depend on the available sidelink channels (including the associated D2D pairing information, including radio access technologies and device relaying capabilities) and the current state of the main uplink and/or downlink channels.

Some aspects may also result in better signal strength or wireless link at the edge of a network and unburdening of a wireless network. Some aspects, may create an assisted infrastructure link, which may be used to bolster an existing infrastructure. In some aspects, where participation in the D2D relaying assistance is optional, there may be incentives for cooperation in D2D relaying assistance. For example, in some aspects, vehicular terminal devices may be granted access to D2D relaying assistance in exchange for cooperating with the D2D relaying assistance, e.g., by being available to provide D2D sidelink channels to other vehicular terminal devices as part of D2D relaying assistance. In some aspects, other incentives such as service benefits, credits, reduction in fees, or other benefits may also be offered.

As detailed above, a network access node, such as network access node 22001, may determine channels or pairing for V2V cooperation. In some aspects, network access node 22001 can receive from a terminal device, such as any of vehicular terminal devices 22003 and 22008-22010 or terminal device 22002, a transmission including a determination of link quality between the terminal device and one or more side devices (e.g., terminal devices that are available for communication via a sidelink channel) for opportunistic side-channel transmission, said side devices including any combination of vehicles, drones, or other devices. Having received said link qualities, network access node 22001 may then determine D2D/V2V channels and pairing for cooperation.

In reporting link quality, a vehicular terminal device such as vehicular terminal device 22008 may report a link quality using a variety of protocols, including, and without limitation, LTE-Uu, PC5, dedicated short range communications (DSRC), WLAN, etc.

In some aspects, network access node 22001 can transmit a schedule for D2D cooperation to both the vehicular terminal device and a vehicular terminal device selected for pairing. This transmission can enable synchronization of a transmission schedule between the vehicular terminal device and the vehicular terminal device selected for pairing. This method of evaluating devices for pairing and transmitting communications schedules can also be performed between chains of side devices, such as where a first side device relays to a second side device. The second side device may connect to a base station or may further relay to a third side device. This pattern may be repeated as long as appropriate to achieve the desired connection.

In some aspects, network access node 22001 may schedule D2D cooperation or opportunistic device relaying based on acknowledgement (ACK)/non-acknowledgement (NACK) eavesdropping (ACK/NACK eavesdropping). In this case, network access node 22001 may not receive from a vehicular terminal device a transmission of link quality between the vehicular terminal device and other terminal devices. Rather, as the vehicular terminal device and side devices communicate and determine link quality, they may transmit ACK/NACK receipts, which network access node 22001 can overhear. After overhearing the ACK/NACK exchanges, network access node 22001 can independently assess the link quality between the vehicular terminal device and other side devices and can select a side device for pairing and transmit a transmission schedule accordingly. Network access node 22001 may notify the scheduled D2D pairs via a variety of services or protocols, including, but not limited to, LTE-Uu, WLAN, and DSRC. In some aspects, the communication between terminal devices and the base station or access point may follow V2X standards based on LTE-Direct Extensions (PC5), LTE Uu, DSRC or WLAN, or any air interface protocols. Said standards may be expanded to allow for scheduling of D2D, or to permit a V2X neighbor discovery phase. Where applicable, these standards may rely on ProSe protocols for scheduling of D2D discovery.

In some aspects, the V2V assistance may use a variety of relaying strategies. These may include, without limitation, amplify-and-forward, decode-and-forward, compress-and-forward, or quantize-map-and-forward relaying. In some aspects, the vehicular terminal devices may employ rateless coding technology (e.g., fountain codes, variable proportion of redundancy, etc.) to resend packets upon failure. Accordingly, in some aspects, selected D2D pairs (e.g., pairs of vehicular terminal devices selected for D2D pairing) can use standard protocols such as LTE-Direct extensions, PC5-Interface, or DSRC for D2D communication.

Where a D2D relay is scheduled (e.g., as part of a relaying uplink or downlink channel selected by network access node 22001), the D2D relay may be configured with a relaying strategy. In some aspects, network access node 22001 may select the relaying strategy for a D2D pairing, such as based on vehicular terminal device capabilities specified by the vehicular terminal devices as uplink control signaling. In some aspects, network access node 22001 may select the relaying strategy as part of D2D pairing selection, and may select D2D pairings based on the relaying strategies supported by the involved vehicular terminal devices. In some aspects, network access node 22001 may first select a D2D pairing and subsequently select a relaying strategy for the D2D pairing. In some aspects, the vehicular terminal devices of a selected D2D pairing may select a relaying strategy to use for the D2D pairing.

In some aspects, vehicles or drones may be used as relays for transmission of wireless communications. This may result in increased link quality, better signal strength or wireless link at the edge of a network, or unburdening of a wireless network. This method of D2D relaying may create an assisted infrastructure link, which may be used to bolster an existing infrastructure.

In some aspects where participation in the D2D relaying assistance is optional, it may be advantageous to create and/or implement incentives for cooperation in D2D relaying. These may include access to D2D relaying for the cooperating device, service benefits, credits, reduction in fees, or other benefits.

In some aspects, the methods of D2D relaying described herein can be performed on an LTE network or a 5G network. It is further contemplated that said methods can be performed on other RATs, including legacy RATs and RATs that are currently unknown, specifically including RATs to be released following the implementation of 5G.

The wireless radio access network, which may include LTE, WLAN, 5G, or any other radio access network, may be capable of using D2D cooperation to improve the quality of the link between a network access node and a vehicular terminal device. This D2D cooperation may be structure to occur opportunistically and intermittently.

In some aspects, network access node 22001 and the vehicular terminal devices may be configured such that the vehicular terminal devices conduct D2D relaying over licensed spectrum. In some aspects, network access node 22001 and the vehicular terminal devices may be configured such that the vehicular terminal devices conduct D2D relaying over unlicensed spectrum. The operation over unlicensed spectrum may occur using air interface technologies such as WLAN, LTE Unlicensed Spectrum (LTE-U), Bluetooth, or another unlicensed spectrum technology.

As indicated above, in some aspects network access node 22001 may schedule a neighbor discovery phase for the vehicular terminal devices to perform D2D discovery. Additionally or alternatively, in some aspects the vehicular terminal devices may initiate the neighbor discovery phase. For example, one or more of the vehicular terminal devices may trigger the neighbor discovery phase due to weakened or unacceptable wireless link or signal strength between the terminal device and the base station.

In some aspects, the vehicular terminal device may discover their D2D neighbors through existing protocols, such as LTE ProSe discovery or Wi-Fi-Direct. Upon discovering D2D neighbors, the vehicular terminal device may identify a quality of the wireless link between the vehicular terminal device and the D2D neighbors, and report the quality of the link to a network access node that is serving the vehicular terminal device. Additionally, in some aspects terminal device may report a quality of the wireless link to a network access node that is D2D neighbor.

In some aspects, in scheduling the D2D assisted communication, network access node 22001 may apply a utility maximization criteria to schedule each terminal device or a D2D/V2V pair, treating the D2D/V2V pair as a generalized MIMO link, with appropriate modification of the MIMO rate estimate. Network access node 22001 may alternatively, or in addition, use a proportional fair metric to schedule users, as well as for D2D pairings. Once a vehicular terminal device and D2D neighbor are paired and scheduled for D2D cooperation, the vehicular terminal devices can exchange their received signal through standard D2D or V2V communications via WLAN or via LTE-Prose.

The neighbor discovery phase may be important in order to identify prospective D2D pairings. In some aspects, vehicular terminal devices discover D2D neighbors based on a variety of factors, including proximity to the terminal device, proximity to the base station, strength of the wireless link with the terminal device, or strength of the wireless link with the base station. In some aspects, vehicular terminal devices may trigger D2D discovery autonomously, such as where the vehicular terminal device initiates D2D discovery without receiving instructions for discovery initiation from the base station.

In some aspects, vehicular terminal devices may perform sidelink channel measurements on discovered D2D neighbors, such as by determining the link quality through a communications exchange with a discovered D2D neighbor. For example, vehicular terminal devices may utilize any known method to measure the link quality between the terminal device and the prospective D2D pairing device, including, but not limited to signal strength, acknowledgment or non-acknowledgment frequency, error rate, or otherwise. Upon determining a link quality between with a discovered D2D neighbor, the vehicular terminal device may transmit the link quality to network access node 22001.

In some aspects, the discovery of D2D neighbors for pairing may be limited to other vehicular terminal devices within a specified or predetermined proximity to a vehicular terminal device. In some aspects, a vehicular terminal device may trigger D2D discovery opportunistically, such as where D2D discovery is performed as needed or as available. In some aspects, a vehicular terminal device may be configured to search for vehicular terminal devices via D2D discovery only when needed, when there are reasonable indicia of usefulness in the near future, or at any time. In some aspects, one or more vehicular terminal devices may trigger D2D discovery intermittently, based on a time to schedule or periodic search, or based on any other desired schedule.

FIG. 225 shows method 22500 performing radio communications at a vehicular terminal device in accordance with some aspects. As shown in FIG. 225, method 22500 includes discovering one or more vehicular terminal devices that are available for V2V pairings (22510), determining one or more V2V link qualities for the one or more vehicular terminal devices and reporting the one or more V2V link qualities to a network access node (22520), receiving a scheduling instruction from the base station that specifies a scheduled V2V pairing with a target vehicular terminal device of the one or more vehicular terminal devices (22530), and relaying data between the target vehicular terminal device and the network access node according to the scheduled V2V pairing (22540).

FIG. 226 shows method 22600 organizing vehicle-to-infrastructure (V2I) or vehicle-to-network (V2N) communications for a network access node in accordance with some aspects. As shown in FIG. 226, method 22600 includes receiving link quality measurements from a plurality of vehicular terminal devices that characterize V2V links between the plurality of vehicular terminal devices (22610), selecting, based on the link quality measurements, a communication channel for a first vehicular terminal device of the plurality of vehicular terminal devices that includes a V2V sidelink channel as part of the communication channel (22520), transmitting an instruction scheduling a V2V pairing to the first vehicular terminal device (22530), and transmitting or receiving data with the first vehicular terminal device on the communication channel according to the V2V pairing (22530).

FIG. 227 shows method 22700 of terminal device management of device-to-device communication in accordance with some aspects. In some aspects, a network access node such as network access node 22001 may execute method 22700. As shown in FIG. 227, method 22700 includes determining one or more devices enabled for wireless communication within a proximity of a terminal device (22710), determining a link quality for the one or more devices enabled for wireless communication (22720), transmitting the determined link quality for the one or more devices enabled for wireless communication (22730), receiving a transmission that identifies a selected device of the one or more devices enabled for wireless communication (22740), receiving a scheduling protocol for transmission with the selected device (22750), and transmitting data to the selected device (22760).

FIG. 228 shows method 22800 of network management of device-to-device communication in accordance with some aspects. In some aspects, a network access node such as network access node 22001 may execute method 22800. As shown in FIG. 228, method 22800 includes receiving from a terminal device a link quality of one or more devices enabled for wireless transmission (22810), selecting, from the one or more devices enabled for wireless transmission, a device for side channel transmission based on the link quality (22820), and transmitting to the terminal device and the selected device a schedule for side channel transmission (22830).

7.2 Hierarchical Communication #2

In some aspects of this disclosure, a group of airborne vehicles (e.g., drones, balloons, aircraft, satellites, etc.) may form a ‘floating cell’ that is served by a directional beam provided by a terrestrial network access node, or also relayed by another floating cell. The floating cell may be anchored by an anchor airborne vehicle, which other airborne vehicles in the floating cell may generally remain proximate to. The directional beam provided by the terrestrial network access node may track the floating cell to provide radio access connections to the individual airborne vehicles of the floating cell. The anchor airborne vehicle may handle floating cell positioning and other control functions.

FIG. 229 shows an exemplary network scenario in accordance with some aspects. As shown in FIG. 229, floating cell 22905 may include a plurality of aerial terminal devices including anchor aerial device 22903 and secondary aerial devices 22904*a*-22904*c*. Network access node 22901 may transmit and receive wireless signals to provide a radio access connection to the aerial terminal devices of floating cell 22905. In some aspects, anchor aerial device 22903 and secondary aerial devices 22904*a*-22904*c* may be aerial drones, which may be airborne, grounded, or situated upon a surface at an elevation other than ground level. In some aspects, network access node 22901 may be a terrestrial network access node, and may be positioned on the ground, on a tower, or on a building. Alternatively, in some aspects network access node 22901 may be a non-terrestrial network access node, such as positioned in the air (e.g., as another drone or other aerial network access node) or in the water (e.g., surface or underwater vehicles, etc.).

As shown in FIG. 230, network access node 22901 can include antenna system 23002, radio module 23004, and processing module 23006 including beamsteering module 23008 and communication module 23010. In some aspects, antenna system 23002 and radio module 23004 may be configured in the manner of antenna system 21802 and radio module 21804 as detailed regarding FIG. 218, and may transmit and receive radio signals under the control of processing module 23006. Processing module 23006 may therefore control radio communication functionality of network access node 22300.

In some aspects, processing module 23006 and/or one or more of beamsteering module 23008 or communication module 23008 may be realized as baseband and/or application layer components, and/or may be implemented as a hardware-defined module, e.g., as one or more dedicated hardware circuits or FPGAs, as a software-defined module, e.g., as one or more processors executing program code that define arithmetic, control, and I/O instructions (e.g., software and/or firmware) stored in a non-transitory computer-readable storage medium, or as a mixed hardware-defined and software-defined module.

Beamsteering module 23008 may be configured to perform beamsteering operations, such as by determining the desired steering direction of a directional beam produced by antennas system 23002 and controlling antenna system 23002 (e.g., as a phased antenna array) to steer the directional beam towards a floating cell of aerial terminal devices. Communication module 23010 may be configured to transmit and receive downlink and uplink signals with the aerial terminal devices of the floating cell, which may include control data exchanged with an anchor aerial device of the floating cell. Communication module 23010 may also be configured to perform handshake operations with the anchor aerial device and provide the resulting data to beamsteering module 23008, which may then determine the steering direction of the directional beam.

Accordingly, in some aspects network access node 22901 can include a transceiver (23004) configured to transmit a wireless signal from a network access node for a plurality of drones, said drones including one anchor drone and at least one secondary drone, a communication module (23010) configured to establish a wireless link with the anchor drone, and a beamsteering module (23008) configured to calculate a beamforming setting, wherein the transceiver is configured to transmit to the anchor drone control information for the at least one secondary drone, and to receive a location information from the anchor drone, and beamsteering module further configured to determine a beamforming setting to steer a directional antenna beam towards the floating cell based on the location information.

FIG. 231 shows an exemplary internal configuration of anchor aerial device 22903 in accordance with some aspects. As shown in FIG. 231, anchor aerial device 22903 may include antenna system 23102, RF transceiver 23104, communication module 23106, steering and movement system 23108, and sensor 23110. In some aspects, antenna system 23102 and RF transceiver 23104 may be configured in the manner of antenna system 21702 and RF transceiver 21704 of terminal device 21602 as detailed regarding FIG. 217. In some aspects, communication module 23106 may be realized as baseband and/or application layer components, and/or may be implemented as a hardware-defined module, e.g., as one or more dedicated hardware circuits or FPGAs, as a software-defined module, e.g., as one or more processors executing program code that define arithmetic, control, and I/O instructions (e.g., software and/or firmware) stored in a non-transitory computer-readable storage medium, or as a mixed hardware-defined and software-defined module. Steering and movement system 23108 may be implemented as a set of rotors and/or aerial propulsion engines and associated electronics control circuitry.

Communication module 23106 may be configured to transmit and receive signals in accordance with the operations detailed herein anchor aerial devices, including maintaining a control signaling connection with one or more secondary aerial devices of a floating cell (such as secondary aerial devices 22904*a*-22904*c*) and exchanging control data with the secondary aerial devices. Communication module 23106 may further be configured to transmit and receive uplink and downlink signals with a network access node (such as network access node 22901) in the manner detailed above regarding anchor aerial devices. Communication module 23106 may coordinate with the network access node to steer the directional beam provided by the network access node to cover the area occupied by the floating cell.

Sensor 23110 may be an image sensor, a distance sensor, a radar sensor, or a sonar sensor. Sensor 23110 may provide sensor data to communication module 23106 that indicates the positions of secondary aerial devices relative to anchor aerial device 22903. In some aspects, communication module 23106 may monitor the relative positions of the secondary aerial devices via the sensor data provided by sensor 23110 and, if communication module 23106 determines that a secondary aerial device is outside of the confined floating cell area (e.g., further away from anchor aerial device 22903 than a certain distance), communication module 23106 may generate and transmit an instruction to the secondary aerial device that instructs the secondary aerial device to move back towards anchor aerial device 22903.

In some aspects, communication module 23106 may additionally or alternatively evaluate radio measurements provided by secondary aerial devices to monitor the positions of the secondary aerial devices, such as by comparing a signal strength, signal quality, or latency measurement to a threshold to determine whether any of the secondary aerial devices are outside of the confined floating cell area. Communication module 23106 may generate and transmit an instruction to a secondary aerial device that is outside of the confined floating cell area that instructs the secondary aerial device to move back towards anchor aerial device 22903.

In some aspects, anchor aerial device 22903 may utilize sensor 23110 and/or radio measurements to monitor the positions of multiple secondary aerial devices of the floating cell to determine a floating cell radius, which communication module 23106 may provide to the network access node to enable the network access node to adjust a beamwidth of the directional antenna beam based on the floating cell radius.

Accordingly, in some aspects anchor aerial drone 23100 can include a communication module (23106) configured to establish a wireless link with a secondary drone and a network access node, transceiver (23104) configured to transmit to the secondary drone a cell identification for use by the anchor drone and the secondary drone, and a maximum distance between the anchor drone and the secondary drone, the communication module further configured to determine a location information of the anchor drone, and the transceiver further configured to transmit the location information to the network access node for beamforming, receive a control information from the network access node, and transmit the control information to the secondary drone.

FIG. 232 shows an exemplary internal configuration of secondary aerial device 22904*a* in accordance with some aspects. In some aspects, secondary aerial devices 22904*b* and 22904*c* may be configured in the manner of secondary aerial device 22904*a*. As shown in FIG. 232, secondary aerial device 22904*a* may include antenna system 23202, RF transceiver 23204, communication module 23206, positioning module 23208, steering and movement system 23210, and a sensor system 23212. In some aspects, antenna system 23202 and RF transceiver 23204 may be configured in the manner of antenna system 21702 and RF transceiver 21704 of terminal device 21602 as detailed regarding FIG. 217.

In some aspects, communication module 23206 and/or positioning module 23208 may be realized as baseband and/or application layer components, and/or may be implemented as a hardware-defined module, e.g., as one or more dedicated hardware circuits or FPGAs, as a software-defined module, e.g., as one or more processors executing program code that define arithmetic, control, and I/O instructions (e.g., software and/or firmware) stored in a non-transitory computer-readable storage medium, or as a mixed hardware-defined and software-defined module. Steering and movement system 23210 may be implemented as a set of rotors and/or aerial propulsion engines and associated electronics control module.

Communication module 23206 may be configured to transmit and receive signals in accordance with the operations introduced above for secondary aerial devices, including maintaining a control signaling connection with an anchor aerial device, exchanging control information with the anchor device, and transmitting and receiving communications with a network access node. As previously detailed regarding secondary aerial devices 22904*a*-22904*c*, communication module 23206 may maintain the control signaling connection with the anchor aerial device either directly or via a multi-hop or mesh network scheme. Communication module 23206 may transmit and receive uplink and downlink signals with the network access node either directly or via a relaying link with the anchor aerial device.

Positioning module 23208 may be configured to enforce a confined floating cell area of the floating cell by attempting to keep secondary aerial device 22904*a* within a certain distance of the anchor aerial device. Sensor 23212 may be an image sensor, a distance sensor, a radar sensor, or a sonar sensor. Positioning module 23208 may monitor the distance between secondary aerial device 22904*a* and the anchor aerial device based on sensor data provided by sensor 23212 to determine whether secondary aerial device 22904*a* is outside of the confined floating cell area that is defined by the position of an anchor aerial device of the floating cell. In some aspects, positioning module 23208 may also interface with communication module 23206 to evaluate radio measurements on signals received from the anchor aerial device to determine whether the radio measurements indicate that secondary aerial device 22904*a* is outside of the confined floating cell area. Positioning module 23208 may interface with steering and movement module 23210 to trigger movement of secondary aerial device 22904*a* towards the anchor aerial device when secondary aerial device 22904*a* moves outside of the confined floating cell area.

In some aspects, communication module 23206 may receive an instruction from the anchor terminal device that instructs secondary aerial device 22904*a* to move closer to the anchor aerial device, such as in response to secondary aerial device 22904*a* moving outside of the confined floating cell area. Communication module 23206 may provide the instruction to positioning module 23208, which may control steering and movement system 23210 to move secondary aerial device 22904*a* towards the anchor aerial device.

Accordingly, in some aspects secondary aerial device 22904*a* can include a transceiver 23204, configured to receive from an anchor drone a maximum allowable distance from the anchor drone, a cell identification, and a control information, a positioning module 23208, configured to determine a location of the anchor drone and determine travel to remaining within the maximum allowable distance from the anchor drone, and a communication module 23206, configured to operate on the cell identification received from the anchor drone.

As shown in FIG. 229, network access node 22901 may transmit directional beam 22906 to serve floating cell 22905, such as utilizing a beamsteering antenna array. The aerial terminal devices of floating cell 22905 may be distributed across a three-dimensional space. Accordingly, network access node 22901 may direct directional beam 22906 in the direction of floating cell 22905.

As the aerial terminal devices of floating cell 22905 may be mobile (e.g., may move aerially in a three-dimensional space), network access node 22901 may 'track' the position of floating cell 22901 and steer directional beam 22906 in accordance with the moving position of floating cell 22905. In some aspects, network access node 22901 may utilize the directional beam 22906 in the downlink and uplink directions (e.g., with a phased antenna array or other beamsteering technique) and may consequently transmit and receive radio signals with floating cell 22905 via directional beam 22906.

In some aspects, anchor aerial device 22903 may coordinate with network access node 22901 to maintain accurate beamtracking for directional beam 22906. For example, anchor aerial device 22903 and network access node 22901 may perform handshake procedures to exchange information about the height and direction of floating cell 22905 (e.g., positioning information of floating cell 22905), the radius of floating cell 22905, the movement speed of floating cell 22905, etc. In some aspects, anchor aerial device 22903 may perform radio measurements (e.g., signal strength and/or signal quality) on directional beam 22906 and provide feedback to network access node 22901, which network access node 22901 may utilize to adjust the steering direction and/or beamwidth (e.g., via directional steering and/or beam broadening/narrowing of a phased array antenna for antenna system 22902) of directional beam 22906. In some aspects, secondary aerial devices 22904*a*-22904*c* may perform radio measurements on directional beam 22906 and provide feedback to network access node 22901 (e.g., directly or via anchor aerial device 22903), which network access node 22901 may then utilize to adjust the steering direction and/or beamwidth of directional beam 22906. In some aspects, this may be part of a sector sweep procedure in which network access node 22901 may sweep through different steering directions for directional beam 22906, receive feedback (e.g., a signal strength measurement) for each steering direction from anchor aerial device 22903, and determine which steering direction is appropriate based on the feedback.

In some aspects, anchor aerial device 22903 may act as a relay to relay uplink and/or downlink data between network access node 22901 and secondary aerial devices 22904*a*-22904*c*. For example, network access node 22901 may steer directional beam 22906 towards anchor device 22903 and transmit downlink data to anchor device 22903 via directional beam 22906, where the downlink data may be intended for one of secondary aerial devices 22904*a*-22904*c*, e.g., secondary aerial device 22904*a*. Anchor device 22903 may then receive the downlink data and relay the downlink data to secondary aerial device 22904*a*, e.g., over a D2D connection between anchor device 22903 and secondary aerial device 22904*a*. Additionally or alternatively, in some aspects, anchor aerial device 22903 may relay uplink data from one or more of secondary aerial devices 22904*a*-22904*c* to network access node 22901 (which may receive the uplink data via directional beam 22906 using receive-direction beamsteering).

In some aspects, secondary aerial devices 22904*a*-22904*c* may receive downlink data directly from network access node 22901 (e.g., not via a relay from anchor aerial device 22903). Accordingly, in some aspects, network access node 22901 may steer directional beam 22906 towards the entirety of floating cell 22905. For example, network access node 22901 may adjust the beamwidth of directional beam 22906 based on the floating cell radius of floating cell 22905, which may increase link performance. In some aspects, network access node 22901 may direct directional beam 22906 substantially in the direction of anchor aerial device 22903. In some aspects, network access node 22901 may direct directional beam 22906 towards a central point of floating cell 22905.

In some aspects, floating cell 22905 may maintain a confined floating cell area, which may assist network access node 22901 to steer directional beam 22906 beam to cover the individual positions of the various aerial terminal devices of floating cell 22905. In some aspects, secondary aerial devices 22904*a*-22904*c* may maintain a confined floating cell area by staying within a certain distance from anchor device 22903. In some aspects, secondary aerial devices 22904*a*-22904*c* may attempt to stay within the certain distance from anchor aerial device 22903 by measuring a physical distance to anchor aerial device 22903, such as with positional and/or geolocational sensors (e.g., GPS, proximity sensor data, sonar sensor data, camera data, etc.). If the measured physical distance is greater than the certain distance for a given secondary aerial device, the secondary aerial device may move back towards anchor aerial device 22903 to meet the distance criteria of floating cell 22905.

In some aspects, secondary aerial devices 22904*a*-22904*c* may attempt to stay within the certain distance from anchor aerial device 22903 by measuring radio signals and evaluating the signal strength. If the signal strength is less than a predefined signal strength threshold for a given secondary aerial device, the secondary aerial device may move back towards anchor aerial device 22903 to meet the distance criteria of floating cell 22905. In some aspects, secondary aerial devices 22904*a*-22904*c* may maintain the certain distance based on other radio measurements, such as staying within a distance of floating cell 22905 for which a link quality stays above a predefined threshold, for which latency stays below a predefined threshold, etc. In some aspects, secondary aerial devices 22904*a*-22904*c* may consider multiple of such criteria, for example, multiple distance parameters (e.g., physical distance or signal strength distance), in maintaining the confined floating cell area. In some aspects, the aerial terminal devices of floating cell 22905 may additionally monitor the relative distances between one another and/or with anchor aerial device 22903 as part of beamforming and/or security checks (e.g., by GPS, proximity sensor data, sonar sensor data, camera data, etc.).

In some aspects, anchor aerial device 22903 may serve as a hub for secondary aerial devices 22904*a*-22904*c*. For example, as secondary aerial devices 22904*a*-22904*c* may remain within a certain distance of anchor aerial device 22903 to maintain the confined floating cell area, anchor aerial device 22903 may serve as a movement hub for secondary aerial devices 22904*a*-22904*c*. Accordingly, secondary aerial devices 22904*a*-22904*c* may follow, or 'shadow', the movement of anchor aerial device 22903 as anchor aerial device 22903 moves in order to maintain the confined floating cell area.

In some aspects, anchor aerial device 22903 may also enforce the confined floating cell area by monitoring the positions of secondary aerial devices 22904*a*-22904*c*. If anchor aerial device 22903 determines that any of secondary aerial devices 22904*a*-22904*c* have moved further than the certain distance from anchor aerial device 22903, anchor aerial device 22903 may transmit an instruction to the secondary aerial device that is outside of the confined floating cell area to instruct that secondary aerial device to move back within the confined floating cell area. In some aspects, anchor aerial device 22903 may monitor the positions of secondary aerial devices 22904*a*-22904*c* by with an imaging sensor, a radar sensor, a sonar sensor, and/or by radio measurements.

In some aspects, anchor aerial device 22903 may serve as a control hub for secondary aerial devices 22904*a*-22904*c*. For example, anchor aerial device 22903 may provide control information to secondary aerial devices 22904*a*-22904*c*, which may be local control information generated by anchor aerial device 22903 or control information provided by network access node 22901. Secondary aerial devices 22904*a*-22904*c* may maintain a control signaling connection with anchor aerial device 22903 in order to receive such control information from anchor aerial device 22903.

The aerial terminal devices of floating cell 22905 may locally communicate with one another according to a D2D communication scheme, such as, without limitation, LTE Direct, LTE ProSe, DSRC, WLAN/Wi-Fi, Bluetooth, and/or mmWave. FIG. 229 shows an exemplary D2D link 22907 between secondary aerial device 22904*c* and secondary aerial device 22904*a*. In some aspects, secondary aerial devices 22904*a*-22904*c* may maintain direct connections with anchor aerial device 22903. Alternatively, in some aspects, secondary aerial devices 22904*a*-22904*c* may utilize relaying connections to communicate with anchor aerial device 22903. For example, in some aspects, the aerial terminal devices of floating cell 22905 may utilize a multi-hop communication scheme to communicate with each other, and may in some aspects be arranged as a mesh network.

In some aspects, network access node 22901 may utilize mmWave to communicate with floating cell 22905 (e.g., for directional beam 22906). In some aspects, network access node 22901 may utilize another radio access technology, such as, without limitation, LTE, UMTS, GMTS, WLAN/Wi-Fi, Bluetooth, or 5G.

In some aspects, floating cell 22905 may handover to another network access node. For example, as shown in FIG. 229, network access node 22908 may also be configured to serve floating cells such as floating cell 22905. Accordingly, in an exemplary scenario where floating cell 22905 moves from the coverage area of network access node 22901 to the coverage area of network access node 22908, floating cell 22905 may handover from network access node 22901 to network access node 22908. Accordingly, network access node 22908 may generate a directional beam steered in the direction of floating cell 22905 and begin transmitting and receiving data with floating cell 22905 (e.g., in the manner detailed above regarding network access node 22901), while network access node 22901 may discontinue directional beam 22906.

In some aspects, anchor device 22903 may be configured to manage handovers for floating cell 22905, and may accordingly make decisions (e.g., based on radio measurements by anchor aerial device 22903 and/or secondary aerial devices 22904*a*-22904*c*) regarding when to handover and which network access nodes to handover to. In some aspects, the initial network access node (e.g., network access node 22901) and/or the target network access node (e.g., network access node 22908) may also contribute partially or completely to handover decisions for floating cell 22905.

In some aspects, the same cell ID may be used for floating cell 22905 even when floating cell 22905 transitions between network access nodes. In some aspects, individual secondary aerial devices may also engage in mobility operations, such as by transferring to another floating cell. For example, a secondary aerial device such as secondary aerial device 22904*a* may transfer from floating cell 22905 to another floating cell. For instance, as the secondary aerial devices may be constrained to remain within a certain distance of anchor aerial device 22903, in an exemplary scenario secondary aerial device 22904*a* may desire to move to a location outside of the constrained limits of floating cell 22905. Accordingly, if there is another proximate floating cell that is closer to the desired location of secondary aerial device 22904*a*, secondary aerial device 22904*a* may transfer to the other floating cell. In some aspects, secondary aerial device transfers may include a specific procedure between the transferring secondary aerial device, the anchor aerial device of the initial floating cell, and/or the anchor aerial device of the new floating cell. Secondary aerial devices may also transfer for reasons other than movement, such as to transfer to a floating cell that offers better radio conditions. In another aspect, floating cells may join up (e.g., dock to one another, or keep in close proximity to each other, etc.) to increase transmit or receive cell power or cell coverage or number of aerial devices able to connect to. In other aspects, aerial devices may be handed over to another floating cell or floating relay or terrestrial cell.

FIG. 233 shows frequency diagram 23300 that illustrates an exemplary spectrum allocation in accordance with some aspects. As shown in FIG. 233, operating bandwidth 23310 may be the total spectrum allocated to the floating cell and network access node communications. In some aspects, operating bandwidth 23310 may be divided into bandwidth 23320 and bandwidth 23330, where bandwidth 23320 may be allocated for transmissions between network access nodes, e.g., network access node 22901, and floating cells, e.g., floating cell 22905, and bandwidth 23330 may be allocated for local transmissions between aerial terminal devices of a floating cell, e.g., floating cell 22905. Accordingly, in some aspects, the aerial terminal devices of floating cell 22905 may execute local D2D communications on bandwidth 23320.

In some aspects, the aerial terminal devices of floating cell 22905 may share bandwidth 23320 according to a shared channel access scheme. For example, aerial terminal devices of floating cell 22905 may access bandwidth 23320 according to a contention-based channel access scheme such as carrier sense multiple access (CSMA). Alternatively, in some aspects, anchor aerial device 22903 may operate in a coordinator role in order to schedule and grant access to bandwidth 23320 amongst secondary aerial devices 22904*a*-22904*c*, such as for time and/or frequency resource allocations of bandwidth 23320. As previously indicated, floating cell 22905 may utilize any radio access technology for local communication, such as LTE Direct, LTE ProSe, DSRC, WLAN/Wi-Fi, Bluetooth, or mmWave. Although FIG. 233 depicts the inter-floating cell transmissions of bandwidth 23320 as having variable lengths, in some aspects, the inter-floating cell transmissions of bandwidth 23320 may be confined to a fixed length.

Network access node 22901 may transmit downlink signals to floating cell 22905 and receive downlink signals from floating cell 22905 on bandwidth 23330. As previously indicated, in some aspects, network access node 22901 may communicate directly with anchor aerial device 22903 (which may then relay signals to and from secondary aerial devices 22904*a*-22904*c*), while in other aspects network access node 22901 may communicate directly with anchor aerial device 22903 and secondary aerial devices 22904*a*-22904*c*. In some aspects, network access node 22901 and floating cell 22905 may utilize bandwidth 23330 according to a time division duplexing (TDD) scheme (such as shown in the exemplary setting of FIG. 233). Alternatively, in some aspects network access node 22901 and floating cell 22905 may utilize bandwidth 23330 in a frequency division duplexing scheme, where bandwidth 23330 may be divided into a downlink subband (for transmissions from network access node 22901 to floating cell 22905) and an uplink subband (for transmissions from floating cell 22905 to network access node 22901).

Although depicted as being equally allocated in frequency in FIG. 233, this depiction is exemplary. Accordingly, in some aspects operating bandwidth 23310 may be allocated such that bandwidth 23320 occupies a different band size (e.g., more or less frequency) than bandwidth 23330. In some aspects, network access node 22901 and floating cell 22905 (e.g., anchor aerial device 22901) may determine the allocation of operating bandwidth 23310 into bandwidth 23320 and 23330 as part of a bandwidth negotiation procedure, which may be triggered during initial attach of floating cell 22905 to network access node 22901 and/or repeatedly during the duration of the connection of floating cell 22905 to network access node 22901. In some aspects, network access node 22901 and floating cell 22905 may determine the allocation of operating bandwidth 23310 based on the number of aerial terminal devices in floating cell 22905 and/or the bandwidth requirements of the aerial terminal devices in floating cell 22905.

Accordingly, some aspects may provide a method of managing a floating cell of drones, e.g., floating cell 22905, using one or more anchor drones, e.g., anchor aerial device 22903. Where multiple drones are clustered within a floating cell, it may be possible or beneficial to communicate with or control the drones by limiting the ground-to-drone-communication to communication between a network access node and a single anchor drone within the drone cluster. Further drone-to-drone-communication can be achieved between the anchor drone and the remaining secondary drones, for example, one or more of secondary aerial devices 22904*a*-22904*c*, using millimeter wave beamforming as communication channels, with limited transmission power to prevent interference with ground cell signals.

In some aspects, a ground-based network access node, e.g., network access node 22901, can transmit to the floating cell, e.g., floating cell 22905. Network access node 22901 may form a beam over the sky, e.g., directional beam 22906, to serve the floating cell in the uplink and downlink. Drones located within floating cell 22905 may become members of floating cell 22905. These drones, such as secondary aerial devices 22904*a*-22904*c* may be configured to remain a specified distance from an anchor drone, e.g., anchor aerial device 22903.

In some aspects, anchor aerial device 22903 and secondary aerial devices 22904*a*-22904*c* can share a single cell ID.

This cell ID can remain constant, even as the aerial terminal devices transfer from one ground-based network access node to another, e.g., from network access node 22901 to network access node 22908. In some aspects, anchor aerial device 22903 can provide the cell ID to secondary aerial devices 22904*a*-22904*c*.

In some aspects, anchor aerial device 22903 can serve as a hub for other members of floating cell 22905, e.g., secondary aerial devices 22904*a*-22904*c*. Anchor aerial device 22903 may provide secondary aerial devices 22904*a*-22904*c* with control information. Anchor aerial device 22903 can receive this control information from network access node 22901 and/or generate the control information locally. Anchor aerial device 22903 may then provide the control information to secondary aerial devices 22904*a*-22904*c*.

In some aspects, transmission between anchor aerial device 22903 and secondary aerial devices 22904*a*-22904*c* may happen directly or indirectly. For example, anchor aerial device 22903 and one or more of secondary aerial devices 22904*a*-22904*c* may be in direct communication with one another, anchor aerial device 22903 and the one or more of secondary aerial devices 22904*a*-22904*c* transmit and receive data over a direct channel. Alternatively, in some aspects, anchor aerial device 22903 and one or more of secondary aerial devices 22904*a*-22904*c* transmit and receive data indirectly, such as where information is relayed between anchor aerial device 22903 and one or more of secondary aerial devices 22904*a*-22904*c*, for example, over a multi-hop or mesh network such as an IEEE 802.11s Extended Service Set (ESS) Mesh Networking enhancement of IEEE 802.11, IEEE 802.15.5 wireless personal area network (WPAN) Mesh Networking, or another multi-hop or mesh networking framework.

In some aspects, anchor aerial device 22903 may be in communication with network access node 22901 to coordinate in beamsteering for directional antenna beam 22906. For example, anchor aerial device 22903 and network access node 22901 may perform a handshake in which anchor aerial device 22903 can provide information about the altitude and direction of floating cell 22905 to network access node 22901. Anchor aerial device 22903 can also provide a floating cell radius or any other physical, geographical, or structural information that can be used by network access node 22901 to calculate beamsteering settings for directional antenna beam 22906. With this information, network access node 22901 can determine beamsteering settings to appropriately steer directional antenna beam 22906 to cover an area occupied by floating cell 23004.

In some aspects, the bandwidth used for communication between anchor aerial device 22903, secondary aerial devices 22904*a*-22904*c*, and network access node 22901 can be divided into two subbands, which may assist in reducing interference and enable higher communication efficiency.

In some aspects, an operating bandwidth may be divided into one or more sections, such as section W1 and section W2, wherein W1 is used for communication between network access node 22901 and anchor aerial device 22903, and wherein W2 is used for inter-drone communication such as communication between anchor aerial device 22903 and secondary aerial devices 22904*a*-22904*c*. In some aspects, the allocation of the operating band into W1 and W2 can be determined by negotiation between network access node 22901 and anchor aerial device 22903. Network access node 22901 and terminal anchor aerial device 22903 may perform these negotiations based on requirements or demand such as number of users, throughput, applications, services, cost, level of interference, etc.

In some aspects, a confined floating cell area may be maintained for floating cell 22905. This may be useful in determining appropriate beamforming settings (with manageable beamwidth for directional antenna beam 22906) or performing security checks. In some aspects, secondary aerial devices 22904*a*-22904*c* may be responsible for maintaining the confined floating cell area by remaining within a certain distance of anchor aerial device 22903. Secondary aerial devices 22904*a*-22904*c* can monitor the distance based on a physical distance (e.g., based on image/video data or a distance sensor) or by radio measurements. In some aspects, anchor aerial device 22903 can utilize a combination of geolocation and intelligent 3D network quality measurements to cause the area of floating cell 22905 to be covered by directional antenna beam 22906 with guaranteed minimal data path bandwidth.

In some aspects, floating cell 22905 may not have an anchor aerial device, such as where anchor aerial device 22903 leaves floating cell 22905 or is deactivated. Secondary aerial devices 22904*a*-22904*c* can then select amongst themselves an anchor aerial device. Criteria for anchor aerial device selection can be chosen from a broad array of options and may include one or more of: signal strength, wireless link quality, position, flight or movement capabilities, power availability, battery charge, battery life, and/or any other relevant factors.

In some aspects, the ability to control a floating cell such as floating cell 22905 through communication between network access node 22901 and anchor aerial device 22903 can simplify the management of a drone swarm. In light of the confined floating cell area that secondary aerial devices 22904*a*-22904*c* are expected to maintain, movement by anchor aerial device 22903 can result in secondary aerial devices 22904*a*-22904*c* following the movement anchor aerial device 22903. This can result in a drone swarm. Some aspects can simplify the management of a drone swarm by restricting network access node communications to a single anchor drone, rather than a plurality of drones. In an exemplary scenario, the drone swarm may be a dynamic drone swarm, which can be directed to a location to complete a function. Moreover, the dynamic drone swarm may be increased or decreased in size or drone members on a planned or ad hoc basis to complete tasks as necessary.

Some of the current aspects can be applied to motor vehicles. For example, a network access node may be in communication with an anchor vehicle (analogous to anchor aerial device 22903), wherein the anchor vehicle responsible for coordinating with one or more secondary vehicles (analogous to secondary aerial devices 22904*a*-22904*c*). The secondary vehicles can follow the movements of the anchor vehicle in the manner that secondary aerial devices 22904*a*-22904*c* follow the movements of anchor aerial device 22903 as detailed above. This can allow for manipulation or control over multiple vehicles while only exhibiting actual control over a single vehicle, which may greatly simplify the process of remotely managing a fleet or platoon of vehicles.

Some of the current aspects can be applied to mobile robots, wherein a network access node is in communication with an anchor robot (analogous to anchor aerial device 22903), and further communication is established between the anchor robot and one or more secondary robots (analogous to secondary aerial devices 22904*a*-22904*c*). Wherein the secondary robots are configured to remain within a specified distance of the anchor robot, control by the network access node of the anchor robot may effectively control a group or platoon of mobile robots.

Some of the current aspects can be applied to a plurality of drones that are utilized for delivery. For example, delivery of shipments or packages via a single drone may be undesirable or impossible, and such delivery may more desirably be achieved with a plurality of drones. Some aspects may provide a mechanism to control of a plurality of drones for the delivery of packages or shipment. Where a plurality of drones is used for delivery, the weight of a shipment may be spread across the carrying capabilities of a plurality of drones, such that the plurality can effectively deliver the package where delivery would be undesirable or impossible with a single drone.

In some aspects, a cluster of nodes (e.g., swarm of drones, mixed group of aircraft and drones, etc.) may be selected based on the specified drone application. Examples of specified drone applications include delivery drones, organized for the delivery of a shipment or package, or drones for dynamic network function, wherein drones gather within a radius of a locality for creation or bolstering of a network.

In some aspects, a floating cell such as floating cell 22905 can utilize a communication protocol to enable communications between anchor aerial device 22903 and secondary aerial devices 22904*a*-22904*c*. The communication protocol can include both a broadcast or multicast mechanism that permits anchor aerial device 22903 to send data and control messages to secondary aerial devices 22904*a*-22904*c*, as well as a unicast mechanism to enable anchor aerial device 22903 to send unicast data to one or more secondary aerial devices 22904*a*-22904*c* individually.

In some aspects, anchor aerial device 22903 can have the authority to associate or disassociate secondary aerial devices as members of floating cell 23004. Anchor aerial device 22903 may receive or issue requests from prospective secondary aerial devices for admission to floating cell 22905, which anchor aerial device 22903 may approve or deny.

In some aspects, anchor aerial device 22903 may communicate with network access node 22901 to decide whether to accept or deny the requests. Anchor aerial device 22903 may request or receive from network access node 22901 information related to the requesting drone for determination of a course of action with respect to the request. In responding to a request, anchor aerial device 22903 may take into consideration any data that is relevant to the request, including, but not limited to quality of the wireless link and location of the prospective secondary aerial device.

In certain exemplary scenarios, anchor aerial device 22903 may identify or otherwise come into contact with the one or more additional floating cells. In this event, anchor aerial device 22903 may instruct the one or more additional floating cells to establish a wireless connection with anchor aerial device 22903. Anchor aerial device 22903 may receive or issue requests to join floating cell 22905. Anchor aerial device 22903 may grant such requests. Upon issue of permission, the one or more additional floating cells may join the original floating cell.

In some aspects, anchor aerial device 22903 may monitor the positions of secondary aerial devices 22904*a*-22904*c* in order to enforce the confined floating cell area. When a secondary aerial device communicates to anchor aerial device 22903 a position of the secondary aerial device, that position may be in absolute location or distance from anchor aerial device 22903. When anchor aerial device 22903 communicates to network access node 22901 a position of anchor aerial device 22903 or floating cell 22905, the position may be in absolute location, or may be a distance from network access node 22901, or otherwise.

When a secondary aerial device communicates its position to anchor aerial device 22903, the secondary aerial device may first obtain a position of anchor aerial device 22903. The secondary aerial device can calculate this position using data obtained from photos, videos, or radar. The secondary aerial device may obtain the position by requesting set location from anchor aerial device 22903. Anchor aerial device 22903 may then respond with a transmission of its location.

In some aspects, floating cell 22905 may improve the radio links, such as the wireless link within LTE or 5G, by providing opportunistic D2D assistance in accordance with some aspects. In some aspects, the techniques detailed regarding any of FIGS. 229-233 may be applied to types of vehicles other than aerial terminal devices, such as terrestrial or aquatic vehicles. Accordingly, network access node 22901 may steer an antenna beam towards a cell of these vehicles using any of the techniques described above. An anchor device of the devices may manage the positioning of the cell and/or forward information between the devices. The devices may then maintain a radius of the cell by during movement by maintaining within a certain distance of the anchor device.

FIG. 234 shows method 23400 for controlling a floating cell at an anchor aerial device of the floating cell in accordance with some aspects. As shown in FIG. 234, method 23400 includes maintaining a signaling connection with one or more secondary aerial devices of the floating cell during collective movement of the floating cell (23410), and coordinating with the network access node to steer a directional antenna beam provided by the network access node to cover an area occupied by the floating cell (23420).

FIG. 235 shows method 23500 of operating a secondary aerial device in a floating cell including a plurality of aerial terminal devices in accordance with some aspects. As shown in FIG. 235, method 23500 includes maintaining a signaling connection with an anchor aerial device of the floating cell and transmitting and receiving data with a network access node (23510), and controlling a position of the secondary aerial device to maintain less than a predefined distance between the secondary aerial device and the anchor aerial device according to one or more distance parameters (23520).

FIG. 236 shows method 23600 of operating a network access node in accordance with some aspects. As shown in FIG. 236, method 23600 includes transmitting and receiving data with a floating cell including an anchor aerial device and one or more secondary aerial devices that follow the movement of the anchor aerial device (23610), and coordinating with the anchor aerial device to steer a directional antenna beam to cover an area occupied by the floating cell (23620).

FIG. 237 shows method 23700 for network management of a floating cell in accordance with some aspects. As shown in FIG. 237, method 23700 includes transmitting a wireless signal from a network access node for a plurality of drones (23710), said drones including one anchor drone and at least one secondary drone, establishing a wireless link with the anchor drone (23720), transmitting to the anchor drone control information for the at least one secondary drone (23730), receiving a location information from the anchor drone (23740), and determining a beamforming setting to steer a directional antenna beam towards the floating cell based on the location information (23750).

FIG. 238 shows method 23800 of anchor drone operation within a floating cell in accordance with some aspects. As shown in FIG. 238, method 23800 includes establishing a wireless link with a secondary drone and a network access node (23810), transmitting to the secondary drone a cell identification for use by the anchor drone and the secondary drone (23820), transmitting to the secondary drone a maximum distance between the anchor drone and the secondary drone (23830), transmitting location information to the network access node for beamforming (23840), receiving control information from the network access node (23850), and transmitting the control information to the secondary drone (23860).

FIG. 239 shows method 23900 of operating a secondary drone within a floating cell in accordance with some aspects. As shown in FIG. 239, method 23900 includes establishing a wireless link with an anchor drone (23910), receiving from the anchor drone a maximum allowable distance from the anchor drone (23920), determining a location of the anchor drone (23930), determining travel to remaining within the maximum allowable distance from the anchor drone (23940), receiving a cell identification from the anchor drone (23950), operating on the cell identification received from the anchor drone (23960), and receiving control information from the anchor drone (23970).

7.3 Hierarchical Communication #3

In some aspects of this disclosure, a vehicular terminal device may be enabled as a mobile infrastructure node to provide network connectivity to other proximate terminal devices. As vehicular terminal devices may have many features that are absent from other types of terminal devices, such as a greater power supply, higher transmit power, larger processing capacity, more/larger antennas, and greater mobility, vehicular terminal devices acting as mobile infrastructure nodes may provide a gateway to an underlying radio communication network to proximate terminal devices that would otherwise not have network connectivity (e.g., due to nearby infrastructure failure, network overload or maintenance, insufficient transmit power, etc.).

FIG. 240 shows an exemplary scenario in which vehicular terminal device 24002 is deployed as mobile infrastructure node 24002 in accordance with some aspects. As shown in FIG. 240, mobile infrastructure node 24002 may act as a gateway for various other proximate terminal devices 24018, 24020, 24022, and 24024, which may be any type of terminal device (including other vehicular terminal devices). Accordingly, mobile infrastructure node 24002 may act as an interface between terminal devices 24018-24024 and radio access infrastructure 24016 (which may be a base station, an access point, or another type of network access node that has a backhaul connection to a core or internet network) to provide network connectivity to terminal devices 24018-24024.

As shown in FIG. 240, mobile infrastructure node 24002 can include processing module 24004, memory 24006, camera 24008, backhaul antenna system 24010, fronthaul antenna system 24012, and power supply 24014. Although shown as being external to the frame of mobile infrastructure node 24002 in the exemplary setting of FIG. 240, one or more of camera 24008, backhaul antenna system 24010, and fronthaul antenna system 24012 may be integrated within mobile infrastructure node 24002 and may in some aspects be protected from external damage by the external frame/chassis of mobile infrastructure node 24002.

Processing module 24004 may be a processor or controller that executes software-defined program code which controls the operations of mobile infrastructure node 24002 related to radio communications. In some aspects, processing module 24004 may also include hardware-defined components such as hardware accelerators and/or other dedicated integrated circuitry configured to perform specific processing tasks.

In some aspects, processing module 24004 may also include radio circuitry configured to perform transmission and reception functions for radio communication operations, such as preparing radio signals for transmission and processing received radio signals. Control, decision, and communication functionality for mobile infrastructure node 24002 can therefore be implemented via operation of software-defined components and/or hardware-defined components of processing module 24004.

Processing module 24004 may transmit and receive radio signals via backhaul antenna system 24010, which may include one or more antennas. In some aspects, backhaul antenna system 24010 may be deployed as roof-mounted antennas or another type of large-antenna architecture, which may enable mobile infrastructure node 24002 to have high performance radio transmission and reception.

In some aspects, backhaul antenna system 24010 may be deployed as a steerable antenna array (e.g., a phased array antenna) that can enable mobile infrastructure node 24002 to steer one or more beams towards an intended target, such as towards radio access infrastructure 24016. In some aspects, mobile infrastructure node 24002 may utilize backhaul antenna system 24010 to transmit and receive signals with radio access infrastructure 24016, and accordingly may utilize backhaul antenna system 24010 as a backhaul connection to a communication network.

Processing module 24004 may utilize backhaul antenna system 24010 in accordance with any radio access technology, such as, without limitation, LTE, UMTS, GSM, Wi-Fi/WLAN, Bluetooth, mmWave, 5G, DSRC, or LTE Direct. In some aspects, processing module 24004 may utilize backhaul antenna system 24010 in accordance with a cellular radio access technology, which may provide longer transmission and reception range to enable distant communications with radio access infrastructure 24016. In some aspects, processing module 24004 may utilize backhaul antenna system 24010 in accordance with a satellite radio access technology, which may provide even longer transmission and reception ranges than terrestrial radio access technologies (e.g., cellular and short-range radio access technologies).

Although depicted as a terrestrial network access node in FIG. 240, in some aspects radio access infrastructure 24016 may be an orbital satellite (e.g., a satellite-based radio access infrastructure) that can relay signals between mobile infrastructure 24002 and an associated communication network. In some aspects, mobile infrastructure node 24002 may communicate with radio access infrastructure 24016 according to V2N or V2I communications.

In some aspects, processing module 24004 may also transmit and receive signals with fronthaul antenna system 24012, which may include one or more antennas that mobile infrastructure node 24002 can utilize to transmit and receive signals with proximate terminal devices, such as one or more of terminal devices 24018-24024. Accordingly, in some aspects, mobile infrastructure node 24002 may utilize fronthaul antenna system 24012 as a fronthaul connection to provide a local radio access network in an area around mobile infrastructure node 24002. Processing module 24004 may utilize fronthaul antenna system 24012 in accordance with any radio access technology, such as, without limitation, LTE, UMTS, GSM, Wi-Fi/WLAN, Bluetooth, mmWave, 5G, DSRC, or LTE Direct. In some aspects, processing module 24004 may utilize fronthaul antenna system 24012 in accordance with a short-range radio access technology or a small-cell version of a cellular radio access technology (e.g., a 3GPP femtocell). In some aspects, mobile infrastructure node 24002 may communicate with terminal devices 24018-24024 according to V2V or D2D communications. In some aspects, mobile infrastructure node 24002 may utilize massive MIMO and/or point-to-multipoint communications to transmit and receive data with terminal devices 24018-24024.

In some aspects, memory 24006 may be a memory component. In some aspects, memory 24006 can function as a server to store data from proximate terminal devices, such as one or more of terminal devices 24018-24024 in the exemplary setting of FIG. 240. Camera 24008 may be a video or image camera that processing module 24004 can use for autonomous driving, positioning of mobile infrastructure node 24002, emergency scenario surveillance and monitoring, etc. Mobile infrastructure node 24002 may also include one or more other sensors or peripheral devices, such as GPS positioning components, audio input/output devices, radar sensors, etc., that processing module 24004 may utilize to observe the local environment of mobile infrastructure node 24002.

In some aspects, power supply 24014 may be a battery that provides power to the components of mobile infrastructure node 24002. In some aspects, power supply 24014 may recharge in the manner of a car battery. In some aspects, power supply 24014 may be configured for solar recharging, and may be connected with solar panels mounted on mobile infrastructure node 24002 (not explicitly shown in FIG. 240).

Mobile infrastructure node 24002 may therefore receive downlink communications intended for one or more of terminal devices 24018-24024 from radio access infrastructure 24016 (via backhaul antenna system 24010) and relay the downlink communications to terminal devices 24018-24024 (via fronthaul antenna system 24012). Mobile infrastructure node 24002 may receive uplink communications intended for radio access infrastructure 24016 from one or more of terminal devices 24018-24014 (via fronthaul antenna system 24012) and relay the uplink communications to radio access infrastructure 24016 (via backhaul antenna system 24010). Mobile infrastructure node 24002 may provide a local radio access network via fronthaul antenna system 24012 and act as a gateway to provide network connectivity to proximate terminal devices 24018-24024.

As mobile infrastructure node 24002 may be implemented in the framework of a vehicle, mobile infrastructure node 24002 may have superior transmission and reception capabilities than terminal devices 24018-24024. Accordingly, even if terminal devices 24018-24024 are not within range of a radio access connection, mobile infrastructure node 24002 may provide network connectivity to terminal devices 24018-24024 via radio access infrastructure 24016. Accordingly, while in certain scenarios radio access infrastructure 24016 may be out of the range of one or more of terminal devices 24018-24024, mobile infrastructure node 24002 may provide an interface between terminal devices 24018-24024 and radio access infrastructure 24016.

In some aspects, mobile infrastructure node 24002 may have higher sensing, higher storage (e.g., at memory 24006), higher processing (e.g., at processing module 24004), higher power (e.g., at power supply 24014), higher transmission power (e.g., at backhaul antenna system 24010 and any radio amplification module of processing module 24004), and/or larger/more antennas (e.g., at backhaul antenna system 24010 and fronthaul antenna system 24012) than one or more of terminal devices 24018-24024. Mobile infrastructure node 24002 may rely on these capabilities to provide network connectivity to terminal devices that otherwise would not have network connectivity.

In some aspects, mobile infrastructure node 24002 can be deployed in critical network scenarios. Non-limiting examples of critical network scenarios can include emergency or natural disaster scenarios where local infrastructure for a radio access network has been damaged or is not operational, network overloading scenarios where the radio access network or is overly congested, or general network malfunction or maintenance scenarios where the radio access network and/or core network is not fully operational.

In some aspects, a critical network scenario may be focused in a geographic area. For example, mobile infrastructure node 24002 may move to the affected area and provide network connectivity to nearby terminal devices via the backhaul connection with radio access infrastructure 24016, which may be out of range of the nearby terminal devices but remain within range of mobile infrastructure node 24002 due to the increased transmission and reception capacities of mobile infrastructure node 24002.

In some aspects, mobile infrastructure node 24002 may collaborate with other mobile infrastructure nodes to provide network connectivity to a large affected area, for example, where each mobile infrastructure node covers a different subset of the affected area and coordinates with one another directly or via central coordination by a central coordinating entity.

In some aspects, mobile infrastructure node 24002 may operate during some time periods as a vehicle, for example, for unofficial use (e.g., private or commercial use not directly related to the mobile infrastructure functions), and may not actively provide mobile infrastructure functions to nearby terminal devices. Mobile infrastructure node 24002 may then dynamically activate the mobile infrastructure functions on demand, and therefore transition from unofficial use to active use as a mobile infrastructure node.

Accordingly, if a critical network scenario occurs, mobile infrastructure node 24002 may activate the mobile infrastructure functions and begin offering its services to nearby terminal devices. In some aspects, mobile infrastructure node 24002 may relocate to the affected area of the critical network scenario, such as under the control of a driver or autonomously (e.g., via autonomous driving functionality).

In some aspects, mobile infrastructure node 24002 may dynamically activate the mobile infrastructure functions in accordance with a network configuration protocol, which may be an end-to-end self-organizing or automatic protocol. For example, in accordance with the network configuration protocol, mobile infrastructure node 24002 may communicate with a central coordinating entity for mobile infrastructure functions (that may be in the underlying core network or may be an external network, e.g., interfacing with radio access infrastructure 24016) in order to configure the backhaul link between mobile infrastructure node 24002 and the core network (via radio access infrastructure 24016) and arrange any other capabilities related to the mobile infrastructure functions. The core network may also verify mobile infrastructure node 24002 and provide instructions. Mobile infrastructure node 24002 may then activate the mobile infrastructure functions in accordance with the core network interaction and begin serving nearby terminal devices.

After activating mobile infrastructure functions, in some aspects mobile infrastructure node 24002 may advertise its capabilities to nearby terminal devices, such as by broadcasting beacon signals via fronthaul antenna system 24012. Nearby terminal devices, in particular nearby terminal devices that are currently searching for available radio access connections, may then discover and connect to mobile infrastructure node 24002.

As previously indicated, nearby terminal devices such as terminal devices 24018-24024 may then utilize mobile infrastructure node 24002 to obtain a connection to a radio access or core network, for example, network connectivity, which mobile infrastructure node 24002 may provide in the form of a radio connection through radio access infrastructure 24016.

In addition to network connectivity, in some aspects, mobile infrastructure node 24002 may also provide other mobile infrastructure functions such as, without limitation, cloud computing (including Mobile Edge Computing (MEC)), cloud storage, video or image processing, and traffic management. For example, one or more nearby terminal devices may offload (via fronthaul antenna system 24012) processing tasks to mobile infrastructure node 24002, which mobile infrastructure node 24002 may then perform at processing module 24004 (e.g., in accordance with cloud computing principles) and provide any processing results back to the corresponding terminal devices.

In some aspects mobile infrastructure node 24002 may receive data from one or more nearby terminal devices and store the data locally at memory 24006. Mobile infrastructure node 24002 may then provide the data on request back to the corresponding terminal devices.

In some aspects, processing module 24004 may perform video or image processing on video or image data provided by camera 24008, such as in order to perform surveillance, monitor an emergency or disaster scenario, or other processing functions.

In some aspects, processing module 24004 may also perform traffic management, such as by using video or image data provided by camera 24008 and/or realtime traffic data (e.g., crowdsourced or provided by a central coordinating entity) to direct and manage traffic in the vicinity of mobile infrastructure node 24002.

The ability to dynamically activate and deactivate mobile infrastructure functions at mobile infrastructure node 24002 may be a particularly advantageous feature. For example, a user (or driver) may utilize mobile infrastructure node 24002 as a vehicle during certain periods, for example, for unofficial use, during which the mobile infrastructure functions may not be active. However, in the event of a critical network scenario, the mobile infrastructure functions of mobile infrastructure node 24002 may be activated, thus transitioning mobile infrastructure node 24002 from unofficial to active use.

In some aspects, the mobile infrastructure functions may be activated by user input, such as when the user of mobile infrastructure node 24002 detects a critical network scenario and activates the mobile infrastructure functions (e.g., via a user input component that interfaces with processing module 24004 such as, without limitation, a button, switch, voice, command interface, touchpad, or touch display). Additionally or alternatively, in some aspects mobile infrastructure node 24002 may be configured to autonomously activate the mobile infrastructure functions. For example, processing module 24004 may detect a service outage (e.g., due to lack of radio coverage) during monitoring of a radio environment around mobile infrastructure node 24002 and activate the mobile infrastructure functions. Additionally or alternatively, in some aspects, mobile infrastructure node 24002 may receive a notification from a central coordinating entity (e.g., over the backhaul connection provided by backhaul antenna system 24010) that instructs mobile infrastructure node 24002 to activate mobile infrastructure functions.

Upon activation, mobile infrastructure node 24002 may initiate a network configuration protocol with a central coordinating entity for mobile infrastructure functions, which may be, for example, a core network entity, government-managed emergency control center, or other type of central control system. Mobile infrastructure node 24002 may indicate its current location and mobile infrastructure capabilities (e.g., backhaul capabilities of backhaul antenna system 24010, fronthaul capabilities of fronthaul antenna system 24012, cloud computing capabilities of processing module 24004, and/or storage capabilities of memory 24006) to the central coordinating entity.

Processing module 24004 may then communicate with the central coordinating entity to verify mobile infrastructure node 24002 for provision of mobile infrastructure functions (which may include authentication and/or security verification mechanisms) and/or to select certain capabilities of mobile infrastructure node 24002 that mobile infrastructure node 24002 should provide as mobile infrastructure functions to nearby terminal devices. In some aspects, processing module 24004 may communicate with the central coordinating entity to set up an end-to-end network connection to provide full network connectivity from mobile infrastructure node 24002 to an underlying core network.

In some aspects, processing module 24004 may communicate with the central coordinating entity to identify a radio access infrastructure for mobile infrastructure node 24002 to interface with via backhaul antenna system 24010, such as radio access infrastructure 24016. Alternatively, in some aspects, backhaul antenna system 24010 may perform a radio scan to identify a radio access infrastructure to connect to, such as radio access infrastructure 24016.

In some aspects, the central coordinating entity may provide directions or instructions for serving a specific area, such as an area affected by the critical network scenario. If mobile infrastructure node 21702 is operated by a driver, the driver may be prompted to drive mobile infrastructure node 24002 to the specific area and follow any additional instructions. If mobile infrastructure node 24002 is an autonomous vehicle, processing module 24004 may interface with an autonomous driving system of mobile infrastructure node 24002 in order to control and drive mobile infrastructure node 24002 to the specific area and follow any further instructions provided by the central coordinating entity.

FIG. 241 shows an example in accordance with some aspects in which mobile infrastructure node 24002 includes autonomous driving system 24102. The autonomous driving system 24102 may be an electronics system that interfaces with the engine, steering, and/or electronics framework of mobile infrastructure node 24002 to autonomously drive mobile infrastructure node 24002. In some aspects, autonomous driving system 24102 may be a computer configured to perform offline or online autonomous driving of mobile infrastructure node 24002. Accordingly, processing module 24004 may interact with autonomous driving system 24102 to control mobile infrastructure node 24002 to drive to various locations, such as an area affected by a critical network scenario.

In some aspects, processing module 24006 may receive a location, for example, via user input or by a central coordinating entity, and may interface with autonomous driving system 24102 to control mobile infrastructure node 24002 to travel to the location. Processing module 24006 may then activate mobile infrastructure functions at or around the location.

As previously indicated, in some aspects, backhaul antenna system 24010 may be configured for satellite communications, and may communicate with a satellite-based radio access infrastructure 24016 to maintain connectivity and provide network connectivity to nearby terminal devices via satellite-based radio access infrastructure 24016.

In some aspects, mobile infrastructure node 24002 may coordinate with other mobile infrastructure nodes to provide network connectivity to a large area affected by a critical network scenario. Accordingly, mobile infrastructure node 24002 may act in concert with one or more other mobile infrastructure nodes to provide network connectivity across an affected area, where each mobile infrastructure node (or multiple mobile infrastructure nodes) may serve a subset of the affected area. In some aspects, the coordination between multiple mobile infrastructure nodes may be managed by a central coordinating entity. In some aspects, the coordination between multiple mobile infrastructure nodes may be managed in a distributed manner, such as where processing module 24004 may communicate with other mobile infrastructure nodes via backhaul antenna system 24010 to coordinate the positioning and services offered by the mobile infrastructure nodes across the affected area.

Accordingly, some aspects can provide a method of enabling vehicles or drones as a mobile infrastructure node, for example, mobile infrastructure node 24002. Vehicles (e.g., cars, trains, buses, airplanes) and drones can be mobile platforms with a large capacity for sensing, storing, or processing. Depending upon the configuration, vehicle and drones may have a local power source, or derive power from an external source, such as solar energy. Taken together, these characteristics can offer a platform to dynamically provide infrastructure or gateway functions to nearby terminal devices. This may be particularly useful in situations where infrastructure is unavailable, such as in critical network scenarios including emergency or natural disaster scenarios where local infrastructure for a radio access network has been damaged or is not operational, network overloading scenarios where the radio access network or is overly congested, or general network malfunction or maintenance scenarios where the radio access network and/or core network is not fully operational.

Accordingly, a vehicle or drone may be configured as a mobile infrastructure node, such as mobile infrastructure node 24002, which may be configured to offer network connectivity to nearby terminal devices (e.g., terminal devices 24018-24024) in addition to a variety of other mobile infrastructure functions such as cloud computing and storage.

In some aspects, self-organizing end-to-end protocols may permit dynamic configuration of a vehicle or drone as a mobile infrastructure node, and accordingly mobile infrastructure node 24002 can be configured to both operate as a normal vehicle (e.g., for unofficial use unrelated to mobile infrastructure functions) and as a dedicated platform for providing mobile infrastructure functions. The mobility and available equipment of mobile infrastructure nodes may thus provide an on-demand and cost-efficient deployment of mobile infrastructure functions on an as-needed basis. Furthermore, these resources can also enable on-demand bolstering of infrastructure resources as-needed, such as during network congestion or periods of network unavailability.

To achieve mobile infrastructure deployment, one or more vehicles or drones can be designated as a mobile infrastructure node. This can be achieved via centralized control or on an ad hoc selection basis. Appropriate signaling, authentication, and security mechanisms can be employed for communication between mobile infrastructure nodes and nearby terminal devices (e.g., fronthaul links) and/or for communication between the mobile infrastructure node and radio access infrastructure (e.g., backhaul links).

The designation of the mobile infrastructure node, like the increase or decrease of a mobile node network, permits dynamic service creation, where said service creation can bolster existing resources or permit connectivity in areas of network unavailability. Examples of such network unavailability may include areas of poor network coverage, disasters, or areas of network overload, such as sporting events or concerts. For example, mobile infrastructure node 24002 can provide mobile infrastructure functions to a local area on an on-demand basis to increase local radio access resources and/or provide network connectivity in areas where service is sparse or non-existent.

In some aspects, an existing mobile infrastructure node, or an existing mobile infrastructure node network (e.g., a network of multiple mobile infrastructure nodes that act in concert), may create, issue, or broadcast advertisements for the mobile infrastructure node or mobile infrastructure node network. This may permit or encourage use of the mobile infrastructure node or mobile infrastructure node network by nearby terminal devices, such as terminal devices 24018-24024.

Mobile infrastructure node 24002 may communicate wirelessly via extensions of known and unknown communication protocols, including, but not limited to V2V, V2I, and single cell point-to-multipoint (SC-PTM). Existing protocols for licensed and unlicensed bands may be defined. Wireless communication may be performed on licensed frequency bands or unlicensed frequency bands.

In some aspects, mobile infrastructure node 24002 node may be assigned to constantly provide mobile infrastructure functions (e.g., may be assigned for continuous active use). Alternatively, in some aspects mobile infrastructure node 24002 may be to provide mobile infrastructure functions during some time periods (active use) and may not provide mobile infrastructure functions during other time periods (unofficial use). In other words, mobile infrastructure node 24002, may be assigned for intermittent active use. In some aspects, where mobile infrastructure node 24002 is assigned for intermittent active use, mobile infrastructure node 24002 may deactivate components that are dedicated for mobile infrastructure functions when not in active use, which may reduce power consumption.

In some aspects, mobile infrastructure node 24002 may deactivate completely when not in active use and may completely shut off power. This may be triggered independently at mobile infrastructure node 24002, or by a radio access network or other centralized control source such as a central coordinating entity for mobile infrastructure functions. The centralized control source may employ an algorithm for powering on or powering off mobile infrastructure node 24002.

In some aspects, one or more mobile infrastructure nodes may be deployed based on machine calculated allocation of resources, which may be executed by a central coordinating entity. This machine calculation may respond to current, identified needs, or to predicted needs. Prediction may be based on a variety of factors including historical networking needs, historical networking disturbances, future scheduled events, and future unscheduled predicted events, such as natural disasters. In light of these factors, the location and magnitude of the desired mobile data network required may be calculated, and a corresponding allotment of mobile infrastructure nodes may be deployed to the necessary area.

For example, a central coordinating entity for mobile infrastructure functions may be implemented as a central server, for example, as part of the core network or an external network. The central coordinating entity may evaluate needs of the radio access network, such as, without limitation, which geographical areas are (or will be or have been) experiencing poor or no service, which geographic areas are highly congested, which geographic areas are affected by a disaster or emergency, which geographic areas have a high number of users. The central coordinating entity may then evaluate which geographic areas are in most need of extra radio access resources in the form of mobile infrastructure nodes.

In some aspects, mobile infrastructure node 24002 may utilize massive MIMO techniques to transmit and receive communications with terminal devices and/or radio access infrastructure.

In some aspects, mobile infrastructure node 24002 may be utilized for any suitable networking function, including and in addition to the provision of radio access resources. For example, mobile infrastructure node 24002 may provide functions including, but not limited to, cloud connectivity, storage for sensed data, mobile edge computing for analytics, video processing, and/or traffic management.

In some aspects, mobile infrastructure node 24002 may be deployed or expanded in accordance with several different procedures. For example, in some scenarios a mobile infrastructure node 24002 may be deployed to a specific area of need for a network, such as when mobile infrastructure node 24002 is relocated to a specific area upon request. Alternatively, in some scenarios mobile infrastructure node 24002 may already be located within the area of need, and can be incorporated into the network on demand.

In some aspects, mobile infrastructure node 24002 may not currently be active, for example, may be in the area but may not be actively providing mobile infrastructure functions. Mobile infrastructure node 24002 may then activate the mobile infrastructure functions upon request from the network, and thus incorporate the mobile infrastructure functions as part of the network. Accordingly, in some aspects, the network or a central coordinating entity may identify vehicles or drones eligible for mobile infrastructure node operation within an area of need, designating the vehicles or drones as a mobile infrastructure node, and incorporating them within the network.

According to various aspects, mobile infrastructure node 24002 may be any object that is capable of self-locomotion, remote-controlled locomotion, or being driven. Without limitation, this may include an automobile, an all-terrain vehicle, a motorcycle, a truck, a tractor-trailer, a drone, a helicopter, a balloon, or any other similar object.

In some aspects, mobile infrastructure node 24002 may be designed to serve as mobile infrastructure to provide network connectivity to a surrounding area. Mobile infrastructure node 24002 may perform functions of cloud storage, storage for sensed data, mobile edge computing for analytics, video processing, traffic management, operation as a network access node, operation as a gateway, operation as a cloud storage node, or operation as a computer server.

In some aspects, mobile infrastructure node 24002 may be identified for inclusion in a wireless network based on a need of the wireless network. Without limitation, such needs may include location of mobile infrastructure node 24002, service capability of mobile infrastructure node 24002, availability of mobile infrastructure node 24002, or computing resources of mobile infrastructure node 24002. In some aspects, mobile infrastructure node 24002 may be identified via an Anycast method, such as an Anycast method pursuant to 3GPP Technical Report (TR) 23.785.

In some aspects, mobile infrastructure node 24002 may be deployed to general areas or specific locations to meet a network need. The network need may be acute or chronic, e.g., may take place over a short duration of time (e.g., seconds, minutes, hours days) or may take place over a longer duration of time (e.g., weeks, months, years). The network need may be current or anticipated. Without limitation, examples of current needs include faulty, broken, defective, or inoperable network equipment, network overload, or large gatherings such as in concerts or sporting events. Without limitation, examples of anticipated needs include predicted faulty, broken, defective, or inoperable equipment, such as in a natural disaster, or planned events, concerts, sports games, parades, or other events where large numbers of mobile network users are anticipated. In addition, and separate from an acute event, mobile infrastructure node 24002 may be deployed to specific areas to bolster existing networks where the growth of use has caused demand to near or exceed capacity.

In some aspects, the network may control the power supply of mobile infrastructure node 24002. For example, in some aspects where mobile infrastructure node 24002 consents to participation in the network, the network may control the power usage of mobile infrastructure node 24002 for its provision of mobile infrastructure functions. This may provide increased efficiency by decreasing power usage when mobile infrastructure node 24002 is not actively being used, for example, when the mobile infrastructure functions, e.g., when mobile infrastructure node 24002 is not expected to provide mobile infrastructure functions to nearby terminal devices. It may, for example, be desirable to instruct mobile infrastructure node 24002 to travel to a site for mobile network transmission. In this case, the network could deactivate or simply leave the mobile infrastructure functions of mobile infrastructure node 24002 inactive until they are needed.

In some aspects, the communication between the network, e.g., a central coordinating entity, and mobile infrastructure node 24002 can occur on a licensed wireless band or an unlicensed wireless band. The communication may occur on multiple bands, wherein all are licensed, all are unlicensed, or the bands are a mixture of licensed and unlicensed.

Some of the current aspects can provide a method of a mobile infrastructure node operating within a dynamic mobile infrastructure including receiving an invitation for inclusion in a wireless network, accepting the invitation for inclusion in a wireless network, establishing a wireless connection with wireless network receiving data from the wireless network, and performing a wireless network function using the received data.

FIG. 242 shows method 24200 of activating a mobile infrastructure node as a dynamic mobile infrastructure in accordance with some aspects. As shown in FIG. 242, method 24200 includes identifying a mobile infrastructure node for inclusion in a wireless network (24210), establishing a wireless connection with the mobile infrastructure node (24220), joining the mobile infrastructure node to the wireless network (24230), determining a network function of the mobile infrastructure node within the wireless network (24240), and configuring the mobile infrastructure node to perform the determined function (24250).

FIG. 243 shows method 24300 of operating a mobile infrastructure node in accordance with some aspects. As shown in FIG. 243, method 24300 includes establishing a wireless connection with wireless network (24310), accepting an invitation for inclusion in a wireless network (24320), joining a wireless network as a mobile infrastructure node (24330), and performing a designated wireless network function (24340).

FIG. 244 shows method 24400 of operating a vehicle as a mobile infrastructure node in accordance with some aspects. As shown in FIG. 236, method 24400 includes detecting network outage or network overload in a geographic area at processing module of the vehicle (24410), and activating a fronthaul antenna system and a backhaul antenna system of the vehicle to provide network connectivity to one or more terminal devices connected to the fronthaul antenna system via a backhaul connection, provided by the backhaul antenna system, with radio access infrastructure located outside of the geographic area (24420).

7.4 Hierarchical Communication #4

In some aspects of this disclosure, a mobile infrastructure node may detect a potential critical network scenario and notify an emergency network management server of the potential critical network scenario. The emergency network management server may then verify whether the potential critical network scenario is an isolated event or a critical network scenario and, if the potential critical network scenario is a critical network scenario, subsequently select and instruct one or more mobile infrastructure nodes to provide network connectivity to the affected area.

For example, mobile infrastructure nodes may be particularly advantageous in emergency and disaster scenarios. For example, major disasters may destroy cellular communications infrastructure such as base stations, thus leaving large affected areas without network connectivity. However, vehicles such as cars and trucks may still contain operational communication systems that have backhaul and infrastructure mode capabilities, which may be mechanically protected by strong car body and chassis and supplied by the car battery. These communication systems may avoid the critical damage that can cripple radio access infrastructure, and accordingly may be configured as infrastructure nodes to provide network connectivity to users and terminal devices.

FIG. 245 shows an exemplary scenario in accordance with some aspects. In the exemplary setting of FIG. 245, there may be a disaster or emergency scenario that disables the local radio access infrastructure, such as network access nodes 24516 and 24518 (which may be, e.g., base stations of a cellular radio access network, access points of a widespread WLAN/Wi-Fi connected area, or another type of radio access infrastructure that offers network connectivity to terminal devices). The disaster or emergency scenario may damage the physical structure of network access nodes 24516 and 24518 and/or damage backhaul links or core network components that support network access nodes 24516 and 24518 and, accordingly, network access nodes 24516 and 24518 may not be able to provide a radio access network to proximate terminal devices. As a result, proximate terminal devices such as terminal devices 24520, 24522, and 24524 may lose network connectivity and users may not be able to place calls, receive data, access the internet, etc.

However, mobile infrastructure node 24502 may restore network connectivity to terminal devices 24520-24524 via operational fronthaul and backhaul connections. As shown in FIG. 245, mobile infrastructure node 24502 may include processing module 24504, primary antenna system 24506, backhaul antenna system 24508, and fronthaul antenna system 24510. Although shown as being external to the frame of mobile infrastructure node 24502 in the exemplary setting of FIG. 245, one or more of primary antenna system 24506, backhaul antenna system 24508, and fronthaul antenna system 24510 may be integrated within mobile infrastructure node 24502 and may in some aspects be protected from external damage by the external frame/chassis of mobile infrastructure node 24502.

Accordingly, mobile infrastructure node 24502 may provide a local radio access network via fronthaul antenna system 24510 to area 24512 surrounding mobile infrastructure node 24502. Terminal devices within area 24512 such as terminal devices 24520-24524 may therefore be able to connect to mobile infrastructure node 24502 via the local radio access network. Mobile infrastructure node 24502 may then provide network connectivity via a backhaul connection through backhaul antenna system 24508, which may interface with core/internet network 24528 via radio access infrastructure 24514.

As shown in FIG. 245, in some aspects radio access infrastructure 24514 may be a satellite-based radio access infrastructure and backhaul antenna system 24508 may be a satellite communication antenna system. In other aspects, radio access infrastructure 24514 may be a terrestrial radio access infrastructure (such as in the manner of radio access infrastructure 24016 as previously detailed regarding FIG. 240) that is located outside of the area affected by the disaster or emergency scenario. Regardless, radio access infrastructure 24514 may be operable and within range of backhaul antenna system 24508, which may offer a radio transmission and reception range that is substantially further than terminal devices 24520-24524 that lack network connectivity due to the local radio access infrastructure outage.

As shown in FIG. 245, radio access infrastructure 24514 may interface with core/internet network 24528, which may be a satellite-to-terrestrial radio interface or a terrestrial radio or wired interface. Mobile infrastructure node 24502 may accordingly provide network connectivity to proximate terminal devices within the local radio network provided by fronthaul antenna system 24510 (in area 24512) through the backhaul connection provided by backhaul antenna connection 24508. Radio access infrastructure 24514 may route uplink and downlink data between mobile infrastructure node 24502 and core/internet network 24528, thus completing the network connectivity link between the local radio access network of mobile infrastructure node 24502 and core/internet network 24528.

As previously detailed regarding core network 21902 in FIG. 219, core/internet network 24528 may include a core network (supporting a radio access network, which may be the same core network supporting network access nodes 24516 and 24518) and internet-connected network that supports a radio access network and external network. Core/internet network 24528 may provide a full range of network connectivity services to mobile infrastructure node 24502 and any terminal devices connected to mobile infrastructure node 24502.

FIG. 246 shows an exemplary internal configuration of processing module 24504 in accordance with some aspects. As shown in FIG. 245, processing module 24504 may include emergency network management client module 24602, power management module 24604, geopositioning system 24606, baseband modem 24608, backhaul modem 24610, and fronthaul modem 24612. In some aspects, emergency network management client module 24602 may be an application-layer processor (such as an application processor in the manner of application processor 21712 as previously detailed in FIG. 217) configured to execute program code (retrieved from a non-transitory computer readable medium) and execute an emergency network management client application.

As shown in FIG. 246, emergency network management client module 24602 may communicate on a logical software-level connection (defined by a specific protocol for the connection between emergency network management client module 24602 and emergency network management server 24614) with emergency network management server 24614, which may be a server processor configured to execute an emergency network management server application as a counterpart application to the emergency network management client application. In some aspects, emergency network management server 24614 may be located in a core network section or internet-connected network section of core/internet network 24528, such as a server located in a core network or an internet-connected server.

Power management module 24604 may interface with a power supply of mobile infrastructure node 24502, which may be, for example, a car battery or other large power supply integrated into mobile infrastructure node 24502. Power management module 24604 may monitor the remaining battery power of the power supply and provide battery life information to emergency network management client module 24602. In some aspects, power management module 24604 may also have access to emergency self-start functionality of mobile infrastructure node 24502 (e.g., in the manner of keyless ignition or any vehicular start operation that does not require keys) and can start mobile infrastructure done 24502 to charge the power supply of mobile infrastructure node 24502 (e.g., a car battery). This may be important to cause processing module 21800 and the fronthaul and backhaul systems to have sufficient power to operate without risk of battery depletion. In some aspects, power management module 24604 may decide when to start and/or turn-off mobile infrastructure node 24502 via the self-start functionality depending on fuel availability, e.g., the amount of gasoline left in the tank, during critical network scenarios. For example, if power management module 24604 determines that there is sufficient fuel and a demand for recharging, power management 24604 may start mobile infrastructure node 24502 via the self-start functionality. However, if power management module 24604 determines that there is insufficient fuel, power management 24604 may not start mobile infrastructure node 24502 via the self-start functionality (or may turn off mobile infrastructure node 24502 if there is a risk of fuel depletion).

Geopositioning system 24606 may be a satellite-based or other long-distance geopositioning system such as a Global Navigation Satellite System (GNSS) system (e.g., a Global Positioning System (GPS) system, a Global Navigation Satellite System (GLONASS) system, a Galileo system, or a Beidou system). Geopositioning system 24606 may provide positioning information of mobile infrastructure node 24502 to emergency network management client module 24602.

Baseband modem 24608, backhaul modem 24610, and fronthaul modem 24612 may be communication modems including hardware-defined modules (e.g., one or more hardware accelerators and/or other dedicated hardware circuitry) and/or software-defined modules (e.g., one or more processors) configured to control and execute radio communication functionality (e.g., similar to the manner previously detailed regarding baseband modem 21706 in FIG. 217). Baseband modem 24608 may interface with primary antenna system 24506 to transmit and receive radio signals according to a cellular or short-range radio access technology.

Baseband modem 24608 may communicate with network access nodes 24516 or 24518 (when operational). Backhaul modem 24610 may interface with backhaul antenna system 24508 and may transmit and receive signals with radio access infrastructure 24514 according to a backhaul radio access technology, such as a satellite radio access technology or other long-range radio access technology.

Fronthaul modem 24612 may interface with fronthaul antenna system 24510 to transmit and receive signals over a local radio access network, such as to communicate with proximate terminal devices 24520, 24522, and 24524. In some aspects, fronthaul modem 24612 may provide a 'hotspot' connection to the local radio access network, such as in the manner of a cellular small cell (e.g., a 3GPP femtocell) or short-range access point (e.g., a Wi-Fi/WLAN access point).

In some aspects, some vehicles can be pre-equipped with cellular communication technology (e.g., for a connected car system that interfaces with a cellular network) and/or hotspot functionality (e.g., a Wi-Fi/WLAN hotspot). Accordingly, in some aspects baseband modem 24608, primary antenna system 24506, fronthaul modem 24608, and fronthaul antenna system 24510 may be preinstalled and/or be features of the vehicle supporting mobile infrastructure 24502. In some aspects, some vehicles that see current usage by drivers come pre-equipped with geopositioning technology. Accordingly, in some aspects, geopositioning system 24606 may be preinstalled and/or standard feature of the vehicle.

In accordance with some aspects, mobile infrastructure node 24502 may detect critical network scenarios (e.g., disaster or emergency scenarios when radio access infrastructure is damaged or crippled, network outages due to maintenance, network overload conditions, and other scenarios that cripple network connectivity). Mobile infrastructure node 24502 may then operate to restore network connectivity to areas affected by the critical network scenario by providing an interface to the underlying core network via backhaul antenna system 24508 and radio access infrastructure 24514. As backhaul antenna system 24508 may provide a robust, long-range radio connection, backhaul antenna system 24508 may be able to transmit and receive signals with radio access infrastructure 24514 from within the affected area and thus remain operational even in the face of local radio access infrastructure failure.

FIG. 247 shows message sequence chart 24700 in accordance with some aspects. As shown in FIG. 247, mobile infrastructure node 24502 may detect a potential critical network scenario in 24702. In particular, mobile infrastructure node 24502 may rely on baseband modem 24608 and primary antenna system 24506 to detect potential critical network scenarios.

For example, baseband modem 24608 may provide a cellular and/or short-range radio access connection, for example, to provide the vehicle of mobile infrastructure node 24502 with network connectivity, and accordingly may maintain a radio access connection in a substantially continuous manner.

In some aspects, baseband modem 24608 may provide 'always-on' functionality, and may be configured to maintain a radio access connection (e.g., in either a radio idle or radio connected state) on a constant basis. Accordingly, baseband modem 24608 may detect when there is irregular network activity that is indicative of a critical network scenario. For example, in some aspects baseband modem 24608 may be configured to detect an out-of-service (OOS) situation in which baseband modem 24608 does not have network connectivity (e.g., that no radio access and/or core network connection is available). Baseband modem 24608 may detect OOS situations via one or more mechanisms. For example, the baseband modem 24608 can be configured to detect the OOS situation by detecting a loss of a connection to a serving cell (e.g., abruptly), by detecting a performance of a cell scan procedure (e.g., a PLMN scan) that does not return any detected cells, by detecting one or more cells during a cell scan but is not able to acquire system information (e.g., MIB, SIB1, and SIB2). Additionally or alternatively, in some aspects baseband modem 24608 may be configured to detect substantial network load, such as when a radio access connection is abnormally slow or unreactive. Additionally or alternatively, in some aspects baseband modem 24608 may first reset or restart if an OOS situation is detected and, after resetting/restarting, check again to determine if the OOS situation was actual or not. This may prevent 'false positive' OOS situations in which a bug at baseband modem 24608 may incorrectly cause baseband modem 24608 to detect an OOS situation, and may avoid unwanted singling involved in inaccurately reporting a potential critical network scenario. If baseband modem 24608 still detects an OOS situation after resetting/restarting, baseband modem 24518 may then notify emergency network management client module 24602 of the OOS situation.

Additionally or alternatively, in some aspects mobile infrastructure node 24502 may check for end-to-end network failure (e.g., failure beyond the radio access failures noted above such as OOS). For example, 'keep-alive' or 'heartbeat' mechanisms can be commonly used to maintain end-to-end connectivity from device to servers. Accordingly, emergency network management client module 24602 may be configured to perform a keep-alive procedure in order to periodically check whether end-to-end connectivity is still available. For example, emergency network management client module 24602 may periodically (e.g., every few minutes) check if there is any new information from emergency network management server 24614. Additionally or alternatively, emergency network management server 24614 may be configured to periodically send small amounts of data (e.g., a TCP NACK) to emergency network management client module 24602, which may keep open the end-to-end connection and prevent connection timeout (e.g., Packet Data Protocol (PDP) idle timeout in 3GPP networks). If no data passes through on the connection during a certain period, the network operator may close the connection (e.g., PDP Context Idle Timeout may be operator-defined and between 10 minutes and 24 hours; some network operators do not allow polling/pinging at a periodicity greater than every 60 seconds). Emergency network management client module 24602 may therefore periodically check whether the end-to-end connection is still active and detect end-to-end network failure accordingly. In some aspects, other user-plane applications running on an application processor of mobile infrastructure node 24502 (which may be the same or different from an application processor corresponding to emergency network management client module 24602) may notify emergency network management client module 24602 of the potential critical network scenario.

Upon being notified of a potential critical network scenario, emergency network management client module 24602 may then establish a connection with emergency network management server 24614. As network connectivity at baseband modem 24608 and primary antenna system 24506 is unavailable, emergency network management client module 24602 may establish the connection with emergency network management server 24614 via a backhaul connection provided by backhaul modem 24610 and backhaul antenna system 24508. As previously indicated, the backhaul connection provided by backhaul modem 24610 and backhaul antenna system 24508 may be a robust, long-range connection that can transmit and receive signals to radio access infrastructure that is outside of the area affected by a critical network scenario (e.g., can transmit and receive signals at further distances than primary antenna system 24506). Accordingly, emergency network management client module 24602 may utilize backhaul modem 24610 and backhaul antenna system 24508 as a fallback connection that does not depend on local radio access infrastructure.

Emergency network management client module 24602 may therefore establish a backhaul connection with radio access infrastructure 24514 via backhaul modem 24610 and backhaul antenna system 24508. As previously detailed, in some aspects radio access infrastructure 24514 may be a satellite-based radio access infrastructure, and accordingly backhaul modem 24610 and backhaul antenna system 24508 may provide a satellite backhaul connection. Alternatively, in some aspects radio access infrastructure 24514 may be a terrestrial radio access infrastructure, and accordingly backhaul modem 24610 and backhaul antenna system 24508 may provide a long-range terrestrial connection. Radio access infrastructure 24514 may then interface with core/internet network 24528, where emergency network management server 24614 may be located.

In some aspects, emergency network management server 24614 may be a regional or nationwide entity with a fixed, publicly-known IP address, which emergency network management client module 24602 may utilize to connect to emergency network management server 24614 via an internet connection. Emergency network management client module 24602 may therefore connect to emergency network management server 24614.

Emergency network management client module 24602 may then prepare and transmit a notification message for emergency network management server 24614 in 24704 that details the potential critical network scenario. In some aspects, emergency network management client 24602 may collect capability and status information to include in the notification message, such as timestamp information (from a clock of geopositioning module 24606), location information (from geopositioning module 24606), relevant connection information from baseband modem 24608 that details the potential critical scenario as observed by baseband modem 24608, remaining battery power information (from power management module 24604), backhaul capability information (e.g., data rate and other information for backhaul modem 24610 and backhaul antenna system 24508), and fronthaul capability information (from fronthaul modem 24612; e.g., that details the capabilities of fronthaul modem 24612 and fronthaul antenna system 24510 in regards to providing a local radio access network/hotspot such as supported Wi-Fi features).

Emergency network management server 24614 may then evaluate the potential critical network scenario based on the notification message provided by emergency network management client module 24602 in 24706. In particular, emergency network management server 24614 may evaluate the status information provided by emergency network management client module 24602 to determine whether the potential critical scenario is an isolated event or a critical network scenario.

For example, in some aspects emergency network management server 24614 may be configured to automatically distinguish between isolated and/or temporary network outages and errors (that may cause OOS or overload at a single terminal device and/or over an isolated area) and actual critical network scenarios (e.g., those caused by natural disasters, widespread power outages, substantial network overload, unexpected radio access and/or core network failures, maintenance, and other events that can cripple network connectivity).

In some aspects, emergency network management server 24614 may be configured to evaluate single notification messages, for example, received from one mobile infrastructure node. In some aspects, emergency network management server 24614 may be configured to receive notification messages from multiple emergency network management client modules of different mobile infrastructure nodes, such as where a large number or fleet of vehicles are outfitted as mobile infrastructure nodes in the manner of mobile infrastructure node 24502 and similarly configured to report potential critical network scenarios. Accordingly, if emergency network management server 24614 receives a large number of sudden notification messages from different mobile infrastructure nodes located in the same area (e.g., with similar timestamps and location information in the notification messages), emergency network management server 24614 may be configured to classify the potential critical network scenario as a critical network scenario.

In some aspects, emergency network management server 24614 may be configured to execute a machine learning technique (e.g., by retrieval and execution of corresponding program code) to evaluate the status information provided in the notification message(s) in order to classify the potential critical scenario as an isolated event or a critical network scenario. For example, the machine learning technique may apply a classification-based evaluation that considers the timestamps and location information to classify the potential critical scenario as an isolated event or a critical network scenario, such as based on appropriate thresholds that indicate a division between isolated events and critical network scenarios. For example, emergency network management server 24614 can interface with a database in which timestamps are logged together with location and status information, i.e. operational/not operational, for each network access node provided by regular network management & operations functions. Emergency network management server 24614 may store status and location information from emergency network management clients in the same database. These data sets and time series of historical and current status information may be used to train the machine learning algorithms. Non-limiting examples of machine learning algorithms that can be applied include Supervised machine learning algorithms such as support vector machines, artificial neural networks or hidden Markov models.

Emergency network management server 24614 may therefore classify the potential critical scenario as an isolated event (24708) or a critical network scenario (24712) based on the evaluation of 24706, which may include evaluating only the notification message provided by emergency network management client module 24602 or evaluating the notification message provided by emergency network management client module 24602 and notification messages received from one or more other mobile infrastructure nodes. If emergency network management server 24614 classifies the potential critical scenario as an isolated event in 24708, emergency network management server 24614 may notify emergency network management client module 24602 that the potential critical network scenario reported by emergency network management client module 24602 was an isolated event. Mobile infrastructure node 24502 may therefore continue without adjustment, and may wait out the network connectivity issues at baseband modem 24608. Additionally or alternatively, in some aspects emergency network management client module 24602 may trigger baseband modem 24608 to reset or restart, which may eliminate the possibility of any bugs present in baseband modem 24608 that declares the out of service and could not recover from an OOS scenario for some duration.

Alternatively, if emergency network management server 24614 classifies the potential critical scenario as critical network scenario in 24712, emergency network management server 24614 may decide to activate mobile infrastructure nodes in 24714. Emergency network management server 24614 may select one or more mobile infrastructure nodes to activate, for example, one or more mobile infrastructure nodes that are expected to begin providing network connectivity to the area affected by the critical network scenario. As mobile infrastructure node 24502 reported the critical network scenario (and is thus local), emergency network management server 24614 may select mobile infrastructure node 24502 as one of the activated mobile infrastructure nodes (although this is not required). If emergency network management server 24614 received notification messages from multiple mobile infrastructure nodes that identified the critical network scenario, emergency network management server 24614 may also select one or more of the multiple infrastructure nodes to activate.

In some aspects, mobile infrastructure nodes may be expected to maintain a continuous or semi-continuous connection with emergency network management server 24614 (via a respective emergency network management client server protocol). For example, mobile infrastructure nodes may utilize network connectivity provided via always-on functionality of a baseband modem and primary antenna system to provide location updates to with emergency network management server 24614. Accordingly, upon identifying a critical network scenario in 24712, emergency network management server 24614 may be configured to identify one or more mobile infrastructure nodes proximate to the area affected by the critical network scenario (as indicated by the initial notification message) and select to activate the proximate mobile infrastructure nodes on the basis of their proximity to the area affected by the critical network scenario.

In some aspects, emergency network management server 24614 may consider the capability and status information provided by one or more mobile infrastructure nodes in selecting mobile infrastructure nodes to activate in 24714. For example, in some aspects emergency network management server 24614 may apply an optimization technique (retrieved and executed as program code, such as a Pareto optimization technique or other optimizing techniques) that balances battery life with the capabilities (e.g., supported radio access technology/technologies, coverage range, number of supported terminal devices, capacity, etc.) of the fronthaul modem and fronthaul antenna system of the mobile infrastructure nodes.

Accordingly, as shown in FIG. 247, emergency network management server 24614 may select to activate mobile infrastructure node 24502 and provide instructions to emergency network management client module 24602 (via radio access infrastructure 24514 and the backhaul connection) in 24718. For example, in addition to selecting mobile infrastructure nodes to activate, in some aspects emergency network management server 24614 may also select a fronthaul configuration (e.g., a hotspot configuration for the local radio access network provided by fronthaul modem 24612 and fronthaul antenna system 24510). In some aspects, emergency network management server 24614 may also identify a specific area and/or route that mobile infrastructure node 24502 should go to, patrol, or follow. Emergency network management server 24614 may then include such instructions in 24718.

Emergency network management client module 24604 may then receive the instruction from emergency network management server 24614 and provide mobile infrastructure functions according to the instruction in 24720. Any other mobile infrastructure nodes selected for activation by emergency network management server 24614 may similarly provide mobile infrastructure functions based on any received instructions.

For example, in some aspects emergency network management client module 24602 may provide a fronthaul configuration (specified by emergency network management server 24614) to fronthaul modem 24612, which may specify configuration parameters for the local radio access network provided by fronthaul modem 24612 via fronthaul antenna system 24506. Accordingly, fronthaul modem 24612 may begin operating the local radio access network according to the fronthaul configuration and therefore provide network connectivity to proximate terminal devices 24520-24524. In some aspects, fronthaul modem 24612 may be configured to broadcast beacon signals to advertise the local radio access network, and may connect to responding terminal devices.

In some aspects, fronthaul modem 24612 may provide the local radio access network in an 'open-to-all' mode, where the local radio access network (e.g., cellular small cell or short range access point) accepts all SIMs and subscribers.

In some aspects, mobile infrastructure node 24502 may continue to provide mobile infrastructure functions to proximate terminal devices for an extended period of time. In some aspects, baseband modem 24608 may eventually detect that the critical network scenario is resolved, such as a restoration of network connectivity. Baseband modem 24608 may notify emergency network management client module 24602, which may then provide an update to emergency network management server 24616. Emergency network management server 24616 may then decide to terminate the mobile infrastructure functions, for example, to deactivate the activated mobile infrastructure nodes, based on any received updates (such as if a large number of mobile infrastructure nodes notify emergency network management server 24616 that network connectivity has been restored).

In some aspects, emergency network management server 24616 may continue to evaluate the critical network scenario, such as based on continual reports provided by activated mobile infrastructure nodes that indicate status and capability information. For example, emergency network management server 24616 may activate certain mobile infrastructure nodes (e.g., upgrade to provide a local radio access network) that were not previously activated, deactivate certain mobile infrastructure nodes that were previously activated, and/or adjust the fronthaul configuration of activated mobile infrastructure nodes based on the current status and capability information. In some aspects, emergency network management server 24616 may be configured to repetitively perform this reevaluation with a fixed period or may dynamically perform the reevaluation based on received updates.

In some aspects, instead of coordination provided by a central entity such as emergency network management server 24616, a plurality of mobile infrastructure nodes may coordinate with one another in a distributed manner to organize provision of network connectivity in the event of a critical network scenario. FIG. 248 shows an exemplary scenario in accordance with some aspects, where mobile infrastructure nodes 24802, 24804, and 24806 may coordinate with one another to respond to critical network scenarios. Accordingly, upon detection of a potential critical network scenario (e.g., at a baseband modem), one of mobile infrastructure nodes 24802-24806, for example, mobile infrastructure node 24802, may notify mobile infrastructure nodes 24804 and 24806 of the potential critical scenario. As the local radio access network is disabled, mobile infrastructure nodes 24802-24806 may utilize the respective fronthaul systems (including a fronthaul modem and fronthaul antenna system) to communicate with one another. In an exemplary scenario where mobile infrastructure node 24802 detects a potential critical network scenario and no other mobile infrastructure nodes are within range of mobile infrastructure node 24802, mobile infrastructure node 24802 may utilize the backhaul system (including a fronthaul modem and fronthaul antenna system) to communicate with other mobile communication nodes via radio access infrastructure 24814.

Accordingly, upon detecting a potential critical network scenario, mobile infrastructure node 24802 may coordinate with mobile infrastructure nodes 24802-24806 to verify whether the potential critical network scenario is a critical network scenario and, if so, organize provision of network connectivity, including target areas (where each of mobile infrastructure nodes 24802-24806 should serve), fronthaul configurations, routes, etc. As mobile infrastructure nodes 24802-24806 may maintain a backhaul connection to core/internet network 24828, mobile infrastructure nodes 24802-24806 may provide network connectivity to any proximate terminal devices that connect to the local radio access network provided by any of mobile infrastructure nodes 24802-24806 via radio access infrastructure 24814 and the backhaul connection.

Mobile infrastructure nodes 24802-24806 may therefore address critical network scenarios in a distributed manner without coordination by a central entity, for example, may address critical network scenarios in a self-organizing manner.

In some aspects, one or more of the mobile infrastructure nodes may be fully autonomous. Accordingly, a mobile infrastructure node such as mobile infrastructure node 24502 shown in FIG. 249 may utilize autonomous driving system 24902 to control driving of mobile infrastructure node 24502 (e.g., without a driver). Mobile infrastructure node 24502 and other autonomous mobile infrastructure nodes may therefore perform this functionality autonomously.

In some aspects, one or more of the mobile infrastructure nodes may not be autonomous. Accordingly, in some aspects processing module 24504 may obtain explicit approval of a driver or owner of mobile infrastructure node 24502. Processing module 24504 may therefore contact the driver/owner (e.g., via user I/O, e.g., in the event of a potential critical network scenario detected by baseband modem 24608) to notify the driver/owner of a potential critical network scenario. Processing module 24504 may then wait for a user command (via user I/O) to activate the emergency network management functions. In some aspects, emergency network management client module 24514 may provide directions and/or other user instructions to the driver/owner (such as locations, routes, or other instructions provided by emergency network management server 24616) that mobile infrastructure node 24502 is expected to carry out to provide network connectivity to an affected area.

Accordingly, in some aspects mobile infrastructure node 24502 may be used by the driver/owner for unofficial use (e.g., use not directly related to the current aspects) and may be subsequently 'activated' upon detection of a potential critical network scenario. Mobile infrastructure node 24502 may then transition to active use in order to provide network connectivity. In some aspects, the functionality and components may be implemented into a large number of vehicles, which may each be configured to perform the functions of the current aspects on demand.

Furthermore, as previously indicated, critical network scenarios may also include network overload conditions. In an exemplary scenario of a network overload condition, a traffic jam may occur on a particular road, which may have the potential to exert severe strain on the radio access network and/or underlying core network due to the high concentration of users and vehicles with network connections. Accordingly, any mobile infrastructure nodes involved in the traffic jam (e.g., being used for unofficial use when caught in a traffic jam) may be able to provide additional network capacity to alleviate network loading.

For example, in some aspects the fronthaul system (e.g., fronthaul modem 24612 and fronthaul antenna system 24506, which may be providing the local radio access network as e.g., a cellular small cell or short-range access point) of the mobile infrastructure node may be preconfigured with a known identity (e.g., an SSID or cell ID) by a network operator. Accordingly, other proximate terminal devices may utilize this known identity to connect to mobile infrastructure nodes, which may act as a network access node (providing the local radio access network) and provide a gateway to radio access infrastructure.

In some aspects, the mobile infrastructure nodes may act as a gateway to nearby roadside radio access infrastructure (which may be operator-deployed) and/or to more remote radio access infrastructure (such as satellite-based radio access infrastructure). This use of mobile infrastructure nodes may provide a variety of benefits to the network operator, including extended range, increased capacity, reduced signaling load for road side infrastructure base stations, and a greater degree of freedom (due to the increased number of infrastructure nodes) for traffic load distribution and management. In some aspects, network operators may employ updated network management algorithms to account for the mobility of mobile infrastructure nodes, which may present more complex scenarios compared to stationary radio access infrastructure (e.g., where static picocells can be dynamically switched on and off) as the mobile infrastructure nodes may be moving.

Furthermore, in some aspects emergency network management server 24616 (or the functionality and operation of emergency network management server 24616) may be owned and/or controlled by the network operator. The network operator may therefore have full control of dynamically activating cars and vehicles to activate them as mobile infrastructure nodes. Accordingly, the communication protocols between emergency management network client module 24602 and emergency network management server 24616 can be extended to facilitate this greater degree of control by the network operator. For example, emergency network management server 24616 can be configured to send paging messages to all terminal devices proximate to existing radio access infrastructure. Any vehicular terminal devices that have mobile infrastructure node functionality may then receive the paging messages (at the emergency management network client module) and subsequently respond with a capability (e.g., supported mobile infrastructure functions) and status information message. Emergency network management server 24616 may then select and configure local hotspots (provided via fronthaul) using the available mobile infrastructure nodes (e.g., in the manner previously detailed). In some aspects, vehicle manufacturers and network operators may have existing contracts due to the built-in SIM cards and data plans for telematics data. Accordingly, these existing contracts may be extended to cover mobile infrastructure functions and grant network operators access to activation/deactivation and other control of mobile infrastructure nodes.

In some aspects, emergency network management server 24616 may monitor the current load of radio access infrastructure (e.g., roadside radio access infrastructure) and maintain a database of historical roadside radio access infrastructure load. Emergency network management server 24616 can then trigger the paging message dependent on the load profile indicated by the database. In this manner, emergency network management server 24616 may be able to dynamically extend the capacity of the roadside radio access infrastructure using mobile infrastructure nodes as local hotspots during times and locations when and where network congestion occurs.

FIG. 250 shows method 25000 of providing network connectivity to an area impacted by network overload or outage at a mobile infrastructure node in accordance with some aspects. As shown in FIG. 250, method 25000 includes identifying a geographic area in which network connectivity is disrupted (25010), communicating with a management server, via a radio backhaul connection provided by a backhaul antenna system, to receive an instruction (25020), and activating a fronthaul antenna system and providing network connectivity, via the fronthaul antenna system and the backhaul antenna system, to one or more terminal devices in the geographic area according to the instruction (25030).

FIG. 251 shows method 25100 of coordinating one or more mobile infrastructure nodes to respond to network connectivity disruptions in accordance with some aspects. As shown in FIG. 251, method 25100 includes receiving a notification that a potential critical network scenario has occurred in a geographic area (25110), evaluating status information in the notification to determine that the potential critical network scenario is a critical network scenario (25120), and providing instruction to one or more mobile infrastructure nodes to provide network connectivity to the geographic area (25130).

7.5 Hierarchical Communication #5

In some aspects of this disclosure, a cluster of terminal devices may assume the same downlink identity and receive downlink data from a network access node, e.g., via multicast transmission. Accordingly, from the perspective of the network access node, the network access node may function as if it were serving a single device. The terminal devices of the cluster may then share an uplink channel (e.g., by time division, etc.) to transmit data to the network access node, and may coordinate with each other via a sidelink channel.

FIG. 252 shows an exemplary scenario in accordance with some aspects. As shown in FIG. 252, terminal devices

25202*a*-25202*c* can form cluster 25204, which may transmit and receive signals with network access node 25210. Network access node 25210 may interface with internet network 25208 (which may in some aspects through a core network; not explicitly shown in FIG. 252) to provide a network connection to terminal devices 25202*a*-25202*c*.

Terminal devices 25202*a*-25202*c* may communicate with network access node 25210 (transmit and receive radio signals) over radio channel 25206. In some aspects, terminal devices 25202*a*-25202*c* and network access node 25210 may utilize a time division duplexing (TDD) or frequency division duplexing (FDD) scheme to transmit and receive uplink and downlink signals on radio channel 25206.

In some aspects, terminal devices 25202*a*-25202*c* may also maintain a local connection with each other over a sidelink channel, which terminal devices 25202*a*-25202*c* may utilize to communicate and coordinate movement and communications. In some aspects, terminal devices 25202*a*-2502*c* may be aerial terminal devices such as drones. In some aspects, terminal devices 25202*a*-25202*c* may be terrestrial vehicular terminal devices such as robots, autonomous vehicles, or another type of terrestrial vehicular terminal device. In some aspects, terminal devices 25202*a*-25202*c* may be Internet of Things (IoT) terminal devices. In some aspects, terminal devices 25202*a*-25202*c* can include one or more types of terminal devices, such as one or more of aerial terminal devices, terrestrial vehicular terminal devices, and/or IoT terminal devices.

FIG. 253 shows an exemplary internal configuration for terminal device 25300 in accordance with some aspects. In some aspects, one or more of terminal devices 25202*a*-25202*c* may be configured in the manner of FIG. 253 and may communicate and move as detailed regarding terminal device 25300. As shown in FIG. 253, terminal device 25300 may include antenna system 25302, RF transceiver 25304, communication module 25306, and (optionally) steering and movement system 25308. In some aspects, antenna system 25302 and RF transceiver 25304 may be configured in the manner of antenna system 21702 and RF transceiver 21704 of terminal device 21602 as detailed regarding FIG. 217.

In some aspects, communication module 25306 may be realized as baseband and/or application layer components, and/or may be implemented as a hardware-defined module, e.g., as one or more dedicated hardware circuits or FPGAs, as a software-defined module, e.g., as one or more processors executing program code that define arithmetic, control, and I/O instructions (e.g., software and/or firmware) stored in a non-transitory computer-readable storage medium, or as a mixed hardware-defined and software-defined module.

In some aspects, where terminal device 25300 is an aerial terminal device, steering and movement system 25308 can be implemented as a set of rotors and/or aerial propulsion engines and associated electronics control circuitry. In some aspects where terminal device 25300 is a terrestrial vehicular terminal device, steering and movement system 25308 may be a set of wheels, tracks/treads, engine/motor or other terrestrial movement mechanism and associated electronics control circuitry. In some aspects, such as where terminal device 25300 is an IoT device or non-vehicular terminal device, terminal device 25300 may not include steering and movement system 25308 (as indicated by "Optional" and the dashed lines of FIG. 253.

Communication module 25306 may be configured to transmit and receive radio signals (via RF transceiver 25304 and antenna system 25302) according to the communication protocols and mechanisms detailed herein. Communication module 25306 may be configured to transmit and receive data with other terminal devices in a cluster with terminal device 25300 (such as one or more of terminal devices 25202*a*-25202*c* in the exemplary setting of FIG. 252), over a logical software-level connection that transmits and receives data as radio signals via RF transceiver 25304 and antenna system 25302.

Communication module 25306 may be configured to transmit and receive data with a network access node (such as network access node 25210 in the exemplary setting of FIG. 252), over a logical software-level connection that transmits and receives data as radio signals via RF transceiver 25304 and antenna system 25302. As the network access node may interface with an internet network (e.g., internet network 25208), communication module 25306 may transmit and receive data with the internet network on a logical software-level connection via the radio access network and underlying routing provided by the network access node.

In some aspects, communication module 25306 may also be configured to perform one or more of selecting a leader terminal device (e.g., a terminal device selected to perform coordination functionality for a group of terminal devices; the selection may be based on trust, track record, ability to perform coordination functionality, etc.) from a plurality of terminal devices, establishing a connection and communicating with the plurality of terminal devices, configuring a shared terminal device identification among the plurality of terminal devices, configuring a shared downlink channel among the plurality of terminal devices, and sharing an uplink channel with the plurality of terminal devices. The leader terminal device may be the final decision maker on device coordination with regard to communicating with a network access node as a single identity. As terminal device 25300 may in some aspects communicate with other terminal devices over a sidelink channel and a network access node over a main channel (uplink and downlink), RF transceiver 25304 and antenna system 25302 may include a first section for communicating with other terminal devices and a second section for communicating with a network access node, where communication module 25306 may control the first section and the second section to perform the associated communications.

In some aspects, network access node 25210 may be configured in the manner of network access node 21610 as shown and detailed in FIG. 218. Network access node 25210 may therefore transmit and receive data as radio signals via an antenna system, radio module, and communication module. In some aspects, network access node 25210 may be a cellular base station. In some aspects, network access node 25210 may be an access point.

FIG. 254 shows an exemplary scenario that illustrates downlink communications in accordance with some aspects. As shown in FIG. 254, network access node 25210 may transmit downlink data to terminal devices 25202*a*-25202*c* of cluster 25204 on downlink channel 25206*a* (which may be the downlink channel of radio channel 25206 of FIG. 252).

In some aspects, network access node 25210 may transmit the downlink signals as a multicast transmission. Accordingly, instead of unicast transmission in which network access node 25210 may direct downlink transmissions to a single terminal device, network access node 25210 may multicast downlink transmissions to all of cluster 25204, e.g., terminal devices 25202*a*-25202*c*. In some aspects, terminal devices 25202*a*-25202*c* may share a terminal device identification (e.g., an RNTI or similar terminal device identifier). Accordingly, network access node 25210 may transmit downlink data addressed to the shared terminal device identification. Multiple of terminal devices 25202*a*-25202*c* may therefore receive the downlink data. In some aspects, this may be transparent to network access node 25210. For example, network access node 25210 may transmit downlink data to a terminal device identification without explicitly knowing whether the terminal device identification is a shared terminal device identification or a single terminal device identification.

In some aspects, network access node 25210 may use multicast only for certain downlink data to terminal devices 25202*a*-25202*c*. For example, in some aspects network access node 25210 may use multicast to transmit downlink control data and use unicast to transmit downlink user-plane data. Accordingly, terminal devices 25202*a*-25202*c* may all receive the same control data (from the same control channel) via multicast and may receive separate user-plane data. In some aspects, network access node 25210 may use multicast for all downlink data, e.g., both control and user-plane data.

FIG. 255 shows an exemplary scenario that illustrates uplink communications in accordance with some aspects. As shown in FIG. 255, network access node 25210 may transmit downlink data to terminal devices 25202*a*-25202*c* of cluster 25204 on uplink channel 25206*b* (which may be the uplink channel of radio channel 25206 of FIG. 252, counterpart to downlink channel 25206*a* of FIG. 254).

In some aspects, terminal devices 25202*a*-25202*c* may share uplink channel 25206*b* according to a multiple access scheme. For example, terminal devices 25202*a*-25202*c* may take turns performing uplink transmissions to network access node 25210. In some aspects, terminal devices 25202*a*-25202*c* may share uplink channel 25206*b* in a prescheduled manner, such as in accordance with a Time Division Multiple Access (TDMA) scheme that is coordinated between terminal devices 25202*a*-25202*c* (e.g., either in a distributed manner or a centralized manner by a leader terminal device, as further detailed below).

For example, one of terminal devices 25202*a*-25202*c*, such as terminal device 25202*a*, may be scheduled to access uplink channel 25206*b* during a given time slot, where all of terminal devices 25202*a*-25202*c* are aware of the scheduling ahead of time and only transmit during a time slot that is assigned to them. Terminal devices 25202*b* and 25202*c* may refrain from transmitting during the time slot to enable terminal device 25202*a* to transmit an uplink transmission on uplink channel 25206*b* without collision. Other multiple access schemes that preschedule transmissions at terminal devices 25202*a*-25202*c* may also be utilized, such as FDMA, TDMA, or CDMA (assuming the frequency/time/coding synchronization can be realized between terminal devices 25202*a*-25202*c*).

In some aspects, terminal devices 25202*a*-25202*c* may share uplink channel 25206*b* without prescheduling access to the channel to a specific terminal device. For example, in some aspects terminal devices 25202*a*-25202*c* may share uplink channel 25206*a* in accordance with a contention-based multiple access scheme, such as carrier sense multiple access (CSMA). Terminal devices 25202*a*-25202*c* may therefore perform carrier sensing on uplink channel 25206*b* before attempting to transmit and avoiding collisions by waiting until uplink channel 25206*b* is free to begin the transmission.

In some aspects, terminal devices 25202*a*-25202*c* may incorporate the prescheduled transmissions, for example, for TDMA, into an existing schedule enforced by network access node 25210 that specifies certain time slots for uplink communications. Such may be important if the cluster-based communication is implemented in a manner that is transparent to network access node 25210, as network access node 25210 may expect to receive uplink transmissions from terminal devices 25202*a*-25202*c* during specific time slots and may not be able to successfully receive uplink transmissions that are not aligned with the time slots.

In some aspects, terminal devices 25202*a*-25202*c* may select a 'leader' terminal device that is responsible for communicating with network access node 25210 and/or for coordinating cluster 25204. As shown in FIG. 254, terminal devices 25202*a*-25202*c* may locally communicate with one another, such as using sidelink channels that are transparent to network access node 25210. For example, terminal devices 25202*a*-25202*c* may utilize a different radio access technology (such as Bluetooth or Wi-Fi, which may be on a different frequency) for sidelink communication between each other than the radio access technology used on channel 25206 for uplink and/or downlink communications. In some aspects, terminal devices 25202*a*-25202*c* may be connected with a wired connection, for example, a wireline connection, and may utilize the wired connection as the sidelink channel. Accordingly, terminal devices 25202*a*-25202*c* may communicate locally using the sidelink channels.

Using the sidelink channels, terminal devices 25202*a*-25202*c* may select a leader terminal device from terminal devices 25202*a*-25202*c*. The leader terminal device may then assume responsibility for acting as a communication gateway and/or coordinating other functions of cluster 25204. For example, in an exemplary scenario, terminal devices 25202*a*-25202*c* may select terminal device 25202*a* as the leader terminal device. In some aspects, leader terminal device 25202*a* may then act as communication gateway to the other terminal devices of cluster 25204 (e.g., terminal devices 25202*b* and 25202*c*).

For example, instead of transmitting uplink data directly to network access node 25210, terminal devices 25202*b* and 25202*c* may instead transmit the uplink data to leader terminal device 25202*a*, which may then transmit the uplink data to network access node 25210. Leader terminal device 25202*a* may therefore act as a communication gateway by relaying uplink data from terminal devices 25202*b* and 25202*c* to network access node 25210.

In some aspects, terminal devices 25202*a*-25202*c* may select a terminal device that is close (e.g., closest) to network access node 25210, that has high (e.g., the highest) battery power, and/or that has high (e.g., the highest) uplink transmission power capabilities as the leader terminal device. This may in some cases provide a high-performance relaying channel between cluster 25204 and network access node 25210. Accordingly, in some aspects, one or more of terminal devices 25202*a*-25202*c* may not maintain a direct connection with network access node 25210, and may instead maintain an indirect connection (relying on a relaying scheme) via a leader terminal device that is acting as a communication gateway.

In some aspects, the non-leader terminal devices (e.g., 'secondary' terminal devices) may maintain a direct connection with the leader terminal device. In some aspects, the secondary terminal devices may maintain indirect connections with the leader terminal device, such as via a multi-hop or mesh network.

In some aspects, leader terminal device 25202*a* may additionally or alternatively coordinate certain functions of cluster 25204. For example, in some aspects leader terminal device 25202*a* may assume a coordinator role for access to uplink channel 25206*b*, such as by performing the prescheduling functions detailed above for a multiple access scheme for uplink channel 25206*b*. For instance, leader terminal device 25202*a* may allocate time slots of a TDMA scheme (which may in some aspects be aligned with a communication schedule enforced by network access node 25210) between terminal devices 25202*a*-25202*c* to share uplink channel 25206*b*.

In some aspects, leader terminal device 25202*a* may also allocate the sidelink channel resources between terminal devices 25202*a*-25202*c*. As the sidelink channel may be finite (e.g., a radio or wired interface with finite bandwidth), only a certain number of terminal devices may be able to utilize the sidelink channel at a time. Leader terminal device 25202*a* may coordinate access to the sidelink channel to provide terminal devices 25202*a*-25202*c* with a fair opportunity to access the sidelink channel, e.g., according to a multiple access scheme.

For instance, if leader terminal device 25202*a* is acting as a communication gateway between terminal devices 25202*a*-25202*c* and network access node 25210, leader terminal device 25202*a* may coordinate with terminal devices 25202*b* and 25202*c* to provide sidelink channel resources (e.g., certain subcarriers and/or time slots) for terminal devices 25202*b* and 25202*c* to transmit uplink data to leader terminal device 25202*a*. Leader terminal device 25202*a* may receive the uplink data according to the allocated sidelink channel resources and relay the uplink data to network access node 25210. In some aspects, leader terminal device 25202*a* may also allocate sidelink channel resources to terminal devices 25202*b* and 25202*c* for transmission of other local communications, such as for leader terminal device reselection, task offloading, and other control information.

In some aspects, network access node 25210 and terminal devices 25202*a*-25202*c* may utilize a duplexing scheme such as time division duplexing (TDD) or frequency division duplexing (FDD) to duplex between downlink transmissions from network access node 25210 and terminal devices 25202*a*-25202*c* and uplink transmissions from terminal devices 25202*a*-25202*c* to network access node 25210. Accordingly, in an exemplary FDD setting, network access node 25210 may transmit downlink transmissions on a different frequency band than what terminal devices 25202*a*-25202*c* transmits uplink transmissions on. In an exemplary TDD setting, network access node 25210 may transmit downlink transmissions at different times from when terminal devices 25202*a*-25202*c* transmit uplink transmissions.

The current aspects may therefore provide a mechanism to reduce the network burden by establishing interconnectivity between a plurality of terminal devices (e.g., a cluster), from which one terminal device is designated to be the leader terminal device.

Accordingly, in some aspects a plurality of terminal devices 25202*a*-25202*c* (e.g., cluster 25204) and a network access node 25210 can communicate at least through a leader terminal device, where the plurality of terminal devices 25202*a*-25202*c* can select the leader terminal device. In order to select the leader terminal device, terminal devices 25202*a*-25202*c* can establish a communications link with each other, e.g., via sidelink channels. Terminal devices 25202*a*-25202*c* can then select one terminal device to be the leader terminal device, e.g., terminal device 25202*a*, where the remaining terminal devices can be secondary terminal devices.

As noted above, in some aspects, leader terminal device 25202*a* may be responsible for direct communication with network access node 25210 on behalf of secondary terminal devices 25202*b*-25202*c*, for example, as a communication gateway. In some aspects, leader terminal device 25202*a* may additionally or alternatively be responsible for coordinating communications from secondary terminal devices 25202*b*-25202*c* to network access node 25210, such as by scheduling time slots for secondary terminal devices 25202*b*-25202*c* to utilize to transmit to network access node 25210, e.g., in accordance with a TDMA scheme. In some aspects, leader terminal device 25202*a* may also allocate and/or distribute resources for terminal devices 25202*a*-25202*c* to be used for the sidelink channels on which terminal devices 25202*a*-25202*c* locally communicate with each other.

In some aspects, terminal devices 25202*a*-25202*c* can share a terminal device identification. The shared terminal device identification may be a terminal device identification in accordance with any radio access technology, such as an LTE terminal device identification (e.g., RNTI), a 5G terminal device identification, or a terminal device identification of another radio access technology. As terminal device identifications can enable a wireless communication to be designated for a specific device, terminal devices 25202*a*-25202*c* may receive the same wireless communications according to the shared terminal device identification. Accordingly, network access node 25210 may address a downlink transmission using the shared terminal device identification, which terminal devices 25202*a*-25202*c* may receive and determine that the downlink transmission is intended for them. In light of this configuration, network access node 25210 can perform multicast downlink transmissions the terminal devices terminal devices 25202*a*-25202*c* on downlink channel 25206*a* by addressing the multicast downlink transmission with the shared terminal device identification.

Network access node 25210 may therefore multicast data to terminal devices 25202*a*-25202*c* (including leader terminal device 25202*a* and secondary terminal devices 25202*b* and 25202*c*). In order to coordinate multicast data reception, in some aspects leader terminal device 25202*a* may provide the shared device identification to secondary terminal devices 25202*b* and 25202*c*, over the sidelink channel (e.g., a first sidelink channel between leader terminal device 25202*a* and secondary terminal device 25202*b* and a second sidelink channel between leader terminal device 25202*a* and secondary terminal device 25202*c*). Terminal devices 25202*a*-25202*c* may therefore each receive downlink multicast transmissions from network access node 25210.

In an exemplary scenario where one of terminal devices 25202*a*-25202*c*, for example, terminal device 25202*b*, is separated from the remaining terminal devices, for example, terminal devices 25202*a* and 25202*c*, such that the separated terminal device (terminal device 25202*b*) cannot receive the downlink multicast transmission from network access node 25210, it may be possible for one of the remaining terminal devices (25202*a* or 25202*c*; in some aspects the leader terminal device may be responsible for this relaying) to receive the downlink multicast transmission and relay the downlink multicast transmission to the separated terminal device (terminal device 25202*b*).

In some aspects, leader terminal device 25202*a* may decline or terminate its status as the leader terminal device. Similarly, one of secondary terminal devices 25202*b* or 25202*c* may request that the status of leader terminal device 25504 be transferred to it. Additionally or alternatively, in some aspects, one of terminal devices 25202*a*-25202*c* may nominate itself or another of terminal devices 25202*a*-

25202$c$ to become the leader terminal device. Thus, the status as leader terminal device can be gained, lost, or transferred within terminal devices 25202$a$-25202$c$.

In some aspects, one possibility for a change of the leader terminal device is in response to a function indicator of the leader terminal device. For example, in an exemplary scenario where terminal device 25202$a$ is the leader terminal device, the function indicator can be any indicia of functionality of leader terminal device 25202$a$, which may include one or more tasks that leader terminal device 25202$a$ can complete, one or more tasks that leader terminal device 25202$a$ can no longer complete, or one or more tasks that leader terminal device 25202$a$ is unable to complete. An exemplary function indicator may be the battery power of leader terminal device 25202$a$. As leader terminal device 25202$a$ can be responsible for direct communication on behalf of the secondary terminal devices, and because wireless transmission with network access node 24210 may require higher power consumption than communications between terminal devices 25202$a$-25202$c$ on the sidelink channels (e.g., Bluetooth), leader terminal device 25202$a$ may be subject to more rapid power depletion than the secondary terminal devices. Accordingly, in some aspects, leader terminal device 25202$a$ may, upon determining that it has a low or reduced power supply, may reject its status as leader terminal device or may issue a request that another of terminal devices 25202$a$-25202$c$ assume the role of the leader terminal device.

Additionally or alternatively, in some aspects a link quality may be a function indicator, such as the link quality between a terminal device and network access node 25210. As leader terminal device 25202$a$ may in some aspects assume uplink communication responsibilities (e.g., as a communication gateway to relay uplink data) for the secondary terminal devices, a high link quality between the leader terminal device and network access node 25210 may be important.

When the link quality between the leader terminal device, e.g., leader terminal device 25202$a$, and network access node 25210 deteriorates or otherwise becomes undesirable, leader terminal device 25202$a$ may issue a function indicator to the secondary terminal devices, e.g., secondary terminal devices 25202$b$ and 25202$c$ that indicates that the link quality is unsuitable. In that event, one of secondary terminal devices 25202$b$ or 25202$c$ may determine that it has an acceptable (or better) link quality to network access node 25210 and may assume the position of leader terminal device 25202$a$.

In some aspects, terminal devices 25202$a$-25202$c$ may select a leader terminal device, for example, leader terminal device 25202$a$. In some aspects, terminal devices 25202$a$-25202$c$ may communicate with each other over the sidelink channel to coordinate selection of the leader terminal device. In some aspects, terminal devices 25202$a$-25202$c$ may perform the selection based on one or more selection criteria, including but not limited to, available battery power, expected battery life, overall processing power, available processing resources, signal strength, temperature, or wireless link quality with the network access node. In various non-limiting examples, terminal devices 25202$a$-25202$c$ could select the terminal device with the highest battery power as the leader, select the terminal device that physically located in the middle/between the other terminal devices, select the device with sufficient processing power and/or memory, etc. In some aspects, there could be several 'rounds' of an election process to decide on the leader terminal device. This election process may occur on a sidelink and/or may be predefined. It is expressly contemplated that other qualities may render a particular terminal device a more appropriate candidate as a leader terminal device.

As previously indicated, in some aspects the status of leader terminal device can be resigned, lost, or transferred. For example, selection criteria (e.g., as detailed above) for a leader terminal device may vary over time due and, accordingly, the suitability of terminal devices for the leader terminal device role may be transient. For instance, a leader terminal device such as terminal device 25202$a$ may experience expedited battery depletion due to its extra responsibilities as a leader terminal device, while secondary terminal devices 25202$b$ and 25202$c$ may consume considerably less power (e.g., communicating on the low-power sidelink channel). Accordingly, terminal device 25202$a$ may become less suitable for its role as leader terminal device. In this event, the role of leader terminal device may be transferred to another of terminal devices 25202$a$-25202$c$.

In some aspects, it may be advantageous to change the leader terminal device whenever any one of the selection criteria become disadvantageous, such as in the event of a reduction of expected battery life, a diminution in overall processing power or available processing resources, a reduction in signal strength, and change in temperature, or a decline in the wireless link quality with the network access node. In some aspects, terminal devices 25202$a$-25202$c$ may be configured to periodically evaluate the suitability of the leader terminal device based on the selection criteria (e.g., according to a fixed period) and select a new leader terminal device if warranted.

The method of selecting a leader terminal device may be achieved through any suitable known algorithm or communication scheme. For example, in some aspects terminal devices 25202$a$-25202$c$ may exchange selection criteria, nominate, or request a status as leader terminal device through the sidelink channels between terminal devices 25202$a$-25202$c$.

The method of selecting a leader terminal device and the general local communication between terminal devices 25202$a$-25202$c$ may use sidelink channels between terminal devices 25202$a$-25202$c$. The sidelink channels may utilize various different radio access technologies, such as a D2D technology, a V2V technology, or a peer-to-peer (P2P) technology. The sidelink channels may be on licensed or unlicensed frequency bands.

In some aspects, terminal devices 25202$a$-25202$c$ may have wireline connections or another type of wired connection that uses a wire or cable. Under this circumstance, terminal devices 25202$a$-25202$c$ may locally communicate with one another on the sidelink channels over a wire-connection and communicate with network access node 25210 in the uplink direction over a wireless connection (e.g., direct or via the leader terminal device). In the downlink direction, terminal devices 25202$a$-25202$c$ may communicate wireless with network access node 25210 (e.g., in accordance with the shared terminal device identification scheme introduced above for multicast).

In some aspects, one or more of terminal devices 25202$a$-25202$c$ may offload certain tasks to other terminal devices 25202$a$-25202$c$. Exemplary tasks that can be offloaded include decoding, encoding, processing, transmission, reception, control channel search, paging channel monitoring, broadcast channel search, rank indicator monitoring, and modulation and coding scheme monitoring. Accordingly, a first terminal device, for example, terminal device 25202$a$, may request for a second terminal device, e.g., terminal device 25202*b*, to perform a certain task (where the tasks that the second terminal device is capable of performing may be indicated in a function indicator advertised by the second terminal device). The second terminal device may then perform the task and provide the task output back to the first terminal device (e.g., over the sidelink channel).

For example, the first terminal device may request for the second terminal device to perform a control channel search (e.g., on downlink channel 25206*a*) to determine if there is a control message. The second terminal device may perform the control channel search as requested and send any decoded control information to the first terminal device over the sidelink channel. Accordingly, in particular if the sidelink channel is low power (e.g., Bluetooth), this may conserve battery power at the first terminal device. Other tasks can also be offloaded without departing from the scope of this disclosure.

In some aspects, the task offloading process may be transparent to network access node 25210. In some aspects, the overall set of tasks eligible for offloading can be defined in a task set. Task offloading may be particularly useful where a terminal device tasked with coding or decoding lacks the processing power or availability, or is experiencing increased processor temperature, such that the coding or decoding tasks are more desirably offloaded. The delegation may be based on a temporary or a permanent limit or availability of resources, or any combination thereof.

In some aspects, terminal devices 25202*a*-25202*c* may tag uplink data with different respective tags, which may enable an end data sink (e.g., at internet network 25208, network access node 25210, or a core network location such as a routing entity) to identify which of terminal devices 25202*a*-25202*c* transmitted the uplink data. Accordingly, while terminal devices 25202*a*-25202*c* may receive downlink data in a multicast format in accordance with the shared terminal device identification, in some aspects, an end data sink (that is communicating with one or more of terminal devices 25202*a*-25202*c*) may expect to be able to differentiate between uplink data send by each of terminal devices 25202*a*-25202*c*. Accordingly, one or more of terminal devices 25202*a*-25202*c* may embed the tag in the uplink data, such as at the IP layer or at the application layer.

In some aspects, terminal devices 25202*a*-25202*c* may generate and embed the tags according to a tunneling protocol. In some aspects, an alternative tag may be used, whereby users are identified in data packet (e.g., in the payload) to distinguish transmitters. The end data sink may then identify the transmitting terminal device for uplink data based on the embedded tag.

In some aspects, terminal devices 25202*a*-25202*c* (including the leader terminal device) may have one or more of subscriptions to network access node 25210. Although some aspects above contemplate a single leader terminal device within the group of terminal devices 25202*a*-25202*c* where only the single leader terminal device has a direct uplink connection to network access node 25210, in some aspects, there may be multiple leader terminal devices. This may occur in exemplary scenarios where it is desirable that fewer than all of terminal devices 25202*a*-25202*c* be connected to network access node 25210, but where more than one network access node connection is desired. For example, a large industrial machine may include a plurality of sensors and/or devices, each of which may be capable of wired or wireless communication. Although it may suffice for the plurality of sensors and/or devices to connect to a single leader sensor or device, which connects to the network access node on behalf of the other sensors and/or devices, it may be desirable for a plurality of devices to connect to the network access node. Under such a scenario, the total number of sensors and/or devices may connect to a smaller number of leader sensors and/or devices, each of the smaller number having a wireless connection to the network access node. The plurality of terminal devices would then have a number of network access node subscriptions equal to the number of leader sensors and/or devices.

In some aspects, terminal devices 25202*a*-25202*c* may share a terminal device identification and control channel in the downlink direction. From the perspective of network access node 25210, terminal devices 25202*a*-25202*c* can appear to be a single device. These shared resources create a multicasting environment, whereby a downlink transmission from network access node 25210 can be received by one or more of terminal devices 25202*a*-25202*c* positioned to receive the downlink transmission in multicast format.

In some aspects, the wireless connection with network access node 25210, whether in the uplink or downlink direction, may be any type of radio access technology. This may include any cellular radio access technology short-range radio access technology, including 5G and other emerging and upcoming radio access technologies.

In some aspects, terminal devices 25202*a*-25202*c* may utilize one or more techniques detailed above regarding any of FIGS. 229-239, such as to remain within a confined floating cell area surrounding an anchor terminal device, for example, the leader terminal device, and/or to coordinate with network access node 25210 to steer a directional beam provided by network access node 25210 towards the area occupied by terminal devices 25202*a*-25202*c*.

The transmissions between any of terminal devices 25202*a*-25202*c* (whether leader or secondary) and network access node 25210, may include any type of data. Without limitation, this may include data relaying, real-time control forwarding or otherwise.

FIG. 256 shows method 25600 for terminal device communication in accordance with some aspects. As shown in FIG. 256, method 25600 includes establishing a communications link between a plurality of terminal devices (25610), configuring a shared terminal device identification among the plurality of terminal devices (25620), configuring a shared downlink control channel among the plurality of terminal devices (25630), selecting a leader terminal device from the plurality of terminal devices, for wireless communication with a network access node (25640), and transmitting a terminal device request between a terminal device and the leader terminal device (25650).

FIG. 257 shows method 25700 for managing a leader terminal device in accordance with some aspects. As shown in FIG. 257, method 25700 includes establishing a first communications link with one or more terminal devices (25710), establishing a second communications link with a network access node (25720), configuring a shared terminal device identification among the one or more terminal devices (25730), configuring a shared downlink control channel among the one or more terminal devices (25740), receiving a terminal device request from a terminal device (25750), and wirelessly communicating with the network access node based on the terminal device request (25760).

FIG. 258 shows method 25800 for terminal device communication in accordance with some aspects. As shown in FIG. 258, method 25800 includes establishing a first communications link between a plurality of terminal devices (25810), selecting a leader terminal device from the plurality of terminal devices for wireless communication with a network access node (25820), establishing a second communications link between the leader terminal device and the network access node (25830), transmitting a terminal device data from a terminal device to the leader terminal device (25840), and transmitting the terminal device data from the leader terminal device to the network access node (25850).

FIG. 259 shows method 25900 of performing radio communications at a terminal device in accordance with some aspects. As shown in FIG. 259, method 25900 includes receiving, on a downlink channel, multicast data from a network access node that is addressed with a terminal device identification shared by the terminal device and one or more additional terminal devices (25910), and communicating, on a sidelink channel, with a leader terminal device of the one or more additional terminal devices to coordinate transmission of uplink data on a shared uplink channel to the network access node (25920).

FIG. 260 shows method 26000 of performing radio communications at a terminal device in accordance with some aspects. As shown in FIG. 260, method 26000 includes receiving, on a downlink channel, multicast data from a network access node that is addressed to a terminal device identification shared by shared by the terminal device and one or more additional terminal devices (26010), and communicating, on a sidelink channel, with a first terminal device of the one or more additional terminal devices to coordinate transmission of uplink data from the first terminal device to the network access node (26020).

7.6 Hierarchical Communication #6

In some aspects of this disclosure, resources of a radio communication network may be dynamically allocated to a group of terminal devices. According to some aspects, the resources and mechanisms to utilize such resources may be configured to serve a particular application associated with the group of terminal devices. For instance, improved spectrum allocation and management may increase Quality of Service (QoS) for vehicle-to-vehicle (V2V) communications within (e.g., intra) and across (e.g., inter) groups of vehicles.

In one aspect of the disclosure, resources may be configured to serve one or more particular applications associated with a group of terminal devices through a resource block (also referred to as a "resource block configuration"). A resource block may, for instance, include one or more of a frequency band, a time slot, a code, and/or a combination thereof. The resource block may be defined by one or more of a carrier frequency, a numerology configuration, a physical resource block, a logical definition of control/data, and/or an access method.

A terminal device, such as terminal device 21602, or group of terminal devices, such as terminal device 21602 and terminal device 21604, may be configured to support a single resource block individually or several resource blocks simultaneously. Each of the resource blocks may be associated with a particular application and/or a QoS class as discussed below with respect to FIG. 261. In one aspect of the disclosure, a terminal device, such as terminal device 21602, may include one or more physical layer (PHY) interfaces (e.g., one for each configuration) depending upon frequency bands and PHY interfaces. Additionally, or alternatively, a software-based design may also be used to enable the radio(s) to adapt to specific PHY configurations.

FIG. 261 shows a radio communication network 26100 in accordance with some aspects. The radio communication network 26100 includes network access node 26110, vehicles 46A-46C, which define a first group (Group 1), and vehicles 46D-46E, which define a second group (Group 2). According to one aspect of the disclosure, network access node 26110 may correspond to network access node 21610 as configured in FIG. 218 and vehicles 46A-46E may correspond to terminal device 21602 or terminal device 21604. In one example, a same or similar structure of terminal device 21602 or 21604 may be removably attached to or integrated in each of the vehicles 46A-x23E. In other words, vehicle 46A may include terminal device 26102, vehicle 46B may include terminal device 26104, and vehicle 46C may include terminal device 26106. Similarly, vehicle 46D may include terminal device 26112, vehicle 46E may include terminal device 26114, and vehicle 46F may include terminal device 26116. In some aspects, the terminal devices may include modem-layer and/or application-layer processing modules (e.g., in the manner of baseband modem 21706 and/or application processor 21712) configured to control the communication operations related to the current aspects, including transmitting and receiving data as radio signals with transceiver and antenna circuitry (e.g., RF transceiver 21704 and antenna system 21702).

According to some aspects, terminal devices 26102, 26104, 26106, 26112, 26114, 26116 may be able to support dual connectivity over separate bands. Each of these devices may be equipped with multiple RF chains for communication over multiple bands. A licensed band may be used to communicate with the network access node 26116, whereas an unlicensed band may be used to communicate over a D2D link. Other combinations, however, of licensed and/or unlicensed bands may also be implemented to communicate over multiple bands.

Terminal devices 26106 and 26114 may act as leader terminal devices of their respective groups. In one aspect, terminal devices 26106 and 26114 may be leader terminals or cluster-heads of their respective groups. Each group lead may utilize a set of particular applications or quality of service (QoS) classes to improve communications within respective groups. For instance, each group lead may run a set of particular applications in their media access control (MAC) layer queues. By way of example, the set of applications may include at least one of a vehicle-to-vehicle (V2V) safety application or a V2V discovery application. While the cluster heads are depicted as the only terminal devices running the set of particular applications, the disclosure is not so limited. One or more of terminal devices 26102, 26104, and/or 26106 may run the set of particular applications for Group 1. Likewise, one or more of terminal devices 26112, 26114, and/or 26116 may run the set of quality of service enhancements for Group 2.

Network access node 26110 may configure network resources to the set of applications for each group, e.g., may assign radio resources for the network to the set of applications. According to one aspect, resource block configurations may be tailored to a set of particular applications. Resource Block 1 may be configured to the V2V safety application, a licensed spectrum, a scheduled access mode, and Group 1. Resource Block 2 may be configured to a V2V discovery application, unlicensed spectrum, a contention based access mode, and Groups 1 and 2. Resource Block 3 may be configured to the V2V safety application, a licensed spectrum, and Group 2.

In some aspects, the data structure of the resource block configuration includes one or more of the parameters described below in Table 1.

TABLE 1

| Resource Block Configuration | |
|---|---|
| Parameter | Description |
| Carrier Frequency | Frequency band of operation (e.g., 900 MHz, 2.5 GHz, 5.9 GHz)<br>Licensed/unlicensed operation |
| Numerology Configuration | Identifier of the numerology to be used with the resource pool. For instance, LTE, 802.11p or other options specifically designed for V2V scenarios could be used.<br>Terminal devices could have the parameters describing pre-configured numerologies and this field would only identify which option to use.<br>It is possible that various sets of numerologies for slot/subframe/frame are defined in such a way that these time units in various sets are integer or sub-integer multiples of each other. |
| Frequency Parameters | Specific frequency parameters for a given numerology should be provided. For instance, for OFDMA, frequency parameters would be needed: startPRB, endPRB and numPRB<br>This field may not be applicable to some numerologies (e.g., 802.11p where the whole bandwidth is used). |
| Time Parameters | Time parameters may also be specific to the numerology and the access mode used.<br>In an OFDMA system, this could indicate period for control/data resources repetition |
| Access Mode | Several access modes may be possible, for instance:<br>Scheduled: dedicated block assigned to a group of UEs;<br>Shared (listen-before-talk): CSMA-based using priority based access parameters (e.g., 802.11e access parameters) |
| QoS Class | The QoS Class defines the type of data that can use a given resource pool, for instance:<br>V2V Safety Applications;<br>V2V Discovery;<br>Best Effort Traffic; and/or<br>Other traffic; |
| Duration | The duration defines the amount of time during which the resources are considered available for usage according to the specified parameters.<br>This is an optional parameter. |

FIG. 262 shows one example of a contention-based access mode in accordance with some aspects. For instance, the channel is shared between one or more terminal devices. These terminal devices may contend for channel access using a distributed protocol, such as carrier sense multiple access (CMSA) using 802.11p.

FIG. 263 shows one example of a scheduled-based access mode in accordance with some aspects. For instance, the channel is dedicated and access is controlled by a network access node. In other words, the network access node may grant terminal devices access to the channel, and the terminal devices may then be able to access the channel without risk of collision.

In some aspects, a group of terminal devices may operate using different access modes depending upon their requirements.

In some aspects, resource block or portion thereof, or even a plurality of resource block(s) may be pre-configured in a terminal device. For instance, dedicated resource block(s) for public safety may be pre-configured in the terminal device. According to another aspect of the disclosure, resource blocks may be broadcasted by a network access node. For example, resource blocks for D2D communication and discovery may be broadcasted by the network access node as part of system information blocks (e.g., System Information Block type 18 (SIB18) and System Information Block type 19 (SIB19)).

In a static system where dedicated resources may be defined as non-overlapping with other uplink (UL) and downlink (DL) resources used by other terminal devices, pre-configured resource blocks may be appropriate. However, defined resources may also be configured on a group basis in a dynamic system. In such a case, resource block configurations may be broadcasted by the network access node as different SIBs, such that terminal devices are only expected to read the SIBs of interest.

In yet another aspect, a network access node may enable multiple groups to use different resource pools. For instance, a network access node may utilize a control channel, such as a multicast control channel (MCCH) to send a Group Resource Block configuration message. The Group Resource Block may include one or more parameters of Table 1 and a group identifier.

FIG. 264 shows one example of a Group Resource Block in accordance with some aspects. A group identifier of the Group Resource Block may enable a terminal device to be a part of multiple groups using different resource blocks. According to one aspect of the disclosure, the Group Resource Block may be sent during initialization, and/or during normal operation if the configuration of the resource blocks used by a group changes. Allocation may be signaled using a group identifier when, for instance, the MCCH is a logical channel sitting on a physical downlink shared channel (PDSCH). Terminal devices belonging to this group may acquire information on this allocation using the group identifier.

A network access node may monitor context information to determine what configuration to use and/or when to modify the resource block configuration. In one instance, the network access node may update a Group Resource Block for a group of terminal devices when they enter a certain coverage area. For example, a group of vehicles driving in a rural highway coverage may be configured to use a contention-based resource pool in unlicensed spectrum. In another example, the group of vehicles may be configured with a new resource block configuration to activate dedicated reservations for V2V safety traffic. Similar updates could also be performed when approaching situations, such as traffic intersections, which have a higher risk of traffic accidents.

FIG. 265 shows a network access node 26510 in accordance with some aspects, which may send the resource block configuration to a predetermined terminal device 26506 acting as a group leader. Network access node 26510 may correspond to network access node of 26106 of FIG. 261. Terminal devices 26502-26506 may correspond to terminal device 26102-26106 of FIG. 261. Upon receipt, the group leader may forward the resource block configuration within the group. For instance, a D2D communication link may be used to forward such messages within the group. In another example, a single broadcast transmission may be utilized by the group leader to forward the configuration information. The single broadcast channel may be used in cases where at least one of the terminal devices 26502-26504 of the group of terminal devices is outside the coverage area of the network access node 26510.

The terminal device 26506 operating as a group leader may autonomously transmit one or more group resource block configurations messages over one or more communication interfaces, such as its D2D communications link in a broadcast mode or a unicast mode. In one aspect, network access node 26510 may be configured to enable or disable this feature.

The terminal device 26506 operating as a group leader may periodically transmit updates to the current resource block used by the group. Updates, for instance, may include one or more parameters of the current resource block or a new version of the current resource block. This option may be a more resource efficient alternative to the network access node 26510 updating the group over a multicast control channel. The network access node 26510, however, may still update the terminal device 26506 operating as a group leader over the cellular interface, but the other terminal devices 26502-26504 of the group may not be expected to monitor the multicast control channel for updates. Additionally, or alternatively, the network access node 5010 may update each member of the group including the group leader with an update to the current resource block.

According to another aspect, a new terminal device to the group (not depicted) or a terminal device that is not active (also not depicted) may monitor resource blocks that are available within the group. Additionally or alternatively, the new terminal device to the group, for instance, may monitor and share resource block information from a previously associated group, which may enable one or more terminal devices 26502-26506 to join a new group or update an existing resource block configuration associated therewith.

In yet another aspect, terminal device 26506 operating as a group leader may be responsible for configuring resource blocks. In one example, terminal device 26506 may be configured with one or more specific carrier frequencies, which may be used to define new resource blocks in an out-of-coverage scenario. Additionally or alternatively, it may have one or more pre-configured resource blocks and/or portions thereof stored therein, including carrier frequency, numerology, and/or access mode for an out of coverage scenario. In a similar manner, terminal devices 26502-26504 may be pre-configured with resource blocks for communication (e.g., D2D) discovery outside network coverage, whereas other types of resource blocks (e.g., V2V safety) may be acquired from the terminal device 26506 operating as a group leader.

The terminal device 26506 operating as a group leader may transmit (e.g., unicast) a resource block configuration update to terminal device 26502 in response to receiving a request therefrom. For instance, a terminal device with a D2D discovery traffic may activate a V2V safety application. The V2V safety application, however, may utilize a different resource block configuration. Terminal device 26502 may send a request to the terminal device 26506 operating as a group leader for a resource block configuration appropriate for a V2V safety QoS class. The terminal device 26506 operating as a group leader may respond with available resource block information for the requested QoS class as illustrated in FIG. 266. These actions may also be used to enable admission control for certain QoS classes under coordination of the terminal device 26506 operating as a group leader.

FIG. 266 shows terminal device 26606 acting as a group leader in accordance with some aspects, where terminal device 26606 may send the resource block configuration to one or more of terminal devices 26602-26604 in an out-of-coverage scenario. Terminal devices 26602-26606 may correspond to terminal device 26502-26506 of FIG. 26510.

The terminal device 26606 acting as a group leader may apply measurements and context information, if available, to trigger a configuration, updates and/or activation/de-activation of one or more resource blocks. For example, the arrival probability of safety events may be higher in certain weather conditions (e.g., rain or snow). Also, vehicles may benefit more time to react after receiving V2V safety packet, as it may benefit from more braking time. Further more resources can be provisioned for V2V safety traffic, as such low latency packet delivery may provide vehicles with more time for reaction in one or more bad weather scenarios. Similarly, mid-night time is less demanding, while rush hours are more demanding from V2V safety traffic and therefore resource blocks may be configured accordingly.

The current aspects may dynamically optimize device and network operation. For instance, a higher efficiency of network resources in may be achieved, cooperative communication may be selected for better link robustness, and/or spectrum resources may be dynamically allocated based on device capabilities. Further, network efficiency may be increased by exploring end-to-end communications, which may decrease the burden on the radio communication network 21600 while raising the importance of individual computation within terminal devices.

FIG. 267 shows method 26700 for provisioning radio network resources according to application requirements in accordance with some aspects. As shown in FIG. 267, method 26700 includes receiving, by a group lead terminal device, a radio network resource block configuration from a network access node, the radio network resource block configuration having a plurality of parameters that are configured to a particular application (26710), transmitting, by the group lead terminal device, the radio network resource block configuration to a group member terminal device over a direct communication interface (26720), and supporting, by the group lead terminal device, communication between the group member terminal device and the network access node according to the radio network resource block configuration (26730).

FIG. 268 shows method 26800 for provisioning radio network resources according to application requirements in accordance with some aspects. As shown in FIG. 268, method 26800 includes receiving, by a group member terminal device, a radio network resource block configuration from a network access node (26810), the radio network resource block configuration having a plurality of parameters that are configured to a particular application, and communicating, by the group member terminal device, according to the radio network resource block configuration (26820).

7.7 Hierarchical Communication #7

In some aspects of this disclosure, a hierarchy of capabilities may be used to describe an status of device-to-device communications. For instance, hierarchical levels may be assigned to terminal devices of a radio communication network according to their respective capabilities and relative to specified conditions for vertical applications.

The term vertical may refer to vertical use cases and/or applications, such as automotive, medical, public safety, commercial mobile broadband, etc. Each vertical may be subject to certain conditions, as for instance specific service preferences and/or requirements. Although such conditions may be described as being distinct among verticals in one aspect of the disclosure, these conditions may be the same, distinct or overlapping in other aspects. By way of example, an automotive application may require low latency whereas a public safety application may require high priority.

Verticals may be implemented, in whole or part, by the radio communication network 21600 as a vertical slice. More specifically, the term vertical slice may correspond to one or more parts of the radio communication network 21600. In one aspect of the disclosure, a vertical slice may correspond to one or more physical parts of radio communication network 21600, while it may refer to one or more physical and logical parts of the radio communication network 21600 in another. In one example, one or more specific processing elements of the radio communication network 21600 may be allocated to a specific vertical in order to meet its specific service preferences and/or requirements. A majority of the radio communication network 21600 capacity, however, may be allocated to a public safety application and system during a disaster, while capacity for a commercial mobile broadband application and system may be reduced.

A vertical slice relay may correspond to one or more components of the radio communication network 21600 as well. According to one aspect, a vertical slice may refer to one or more subsets of hardware and/or software resources of the radio communication network 21600, which are allocated to one or more specific verticals. While these systems may be described as being separate from each other in one example, a close integration among vertical applications may be realized in another. In one instance, vertical slices may utilize one or more relays therebetween.

Public safety applications and systems may evolve at a slower pace compared to commercial mobile broadband applications and systems. Consequently, the performance of a public safety application and system is likely to be inferior to a commercial mobile broadband application and system. Overall service quality may, however, be improved by forwarding data according to the confidentiality level associated therewith. For instance, the forwarding of confidential data through a secure public safety application and/or system may improve overall service quality. Likewise, the forwarding of non-confidential data through commercial mobile broadband application and/or system may improve overall service quality.

Wireless communication can be achieved through not only the radio communication network 21600, but also through short-range communication interfaces between terminal devices. The short-range communication interfaces may be a direct link therebetween, such as a D2D communication link. Even though D2D communication links are described herein, other types of short-range communication interfaces between terminal devices may be utilized, such as Wi-Fi, Bluetooth, and/or Bluetooth Low Energy.

FIG. 269 shows a mobile cloud network 26900 based on D2D communications in accordance with some aspects, which may include terminal devices 26902-26904, network access node 26910, terminal devices 26912-26920, and/or terminal devices 26922-26930. According to one aspect of the disclosure, terminal devices 26902-26904 may be high performance terminal devices, such as smartphones. In another aspect of the disclosure, terminal devices 26912-26920 may be low performance terminal devices. In yet another aspect of the disclosure, terminal devices 26922-26930 may be ultra-low performance Internet of Things (IoT) terminal devices. For instance, one or more of terminal devices 26922-26930 may include a sensor, such as an IoT medical sensor. The terminal devices within the mobile cloud network 26900 may correspond to terminal device 21602, and may include modem-layer and/or application-layer processing modules (e.g., in the manner of baseband modem 21706 and/or application processor 21712) configured to control the communication operations related to any of FIGS. 261-268, including transmitting and receiving data as radio signals with transceiver and antenna circuitry (e.g., RF transceiver 21704 and antenna system 21702). Additionally or alternatively, one or more terminal devices, such as terminal devices 26922-26930, of the mobile cloud network 26900 may not be capable of directly leveraging higher capability networks, such as 3/4/5G networks. The number and type of devices in the mobile cloud network 26900 illustrated in FIG. 269 is merely one example of the disclosure. In another aspect, more or less of these and/or other types of devices may be implemented in the mobile cloud network 26900.

Terminal devices 26902-26904 may be configured to support a variety of links. For instance, terminal devices 26902-26904 may be configured to support high throughput links, low throughput, low latency D2D links, and/or low throughput, high latency D2D links. Terminal devices 26902-26904 may utilize one or more of the variety of links to communicate with other devices in the mobile cloud network 26900. For instance, terminal device 26902 may communicate directly with network access node 26910 over a high throughput link according to one aspect of the disclosure. According to one aspect of the disclosure, terminal devices 26902-26904 may be identified as being capable of directly communicating with network access node 26910.

Terminal devices 26912-26920 may be configured to support a variety of links as well. For instance, terminal devices 26912-26920 may be configured to support low throughput and high latency D2D links and/or ultra-low throughput, ultra-high latency D2D links. Terminal devices 26912-26920 may communicate with other devices of the mobile cloud network 26900 that are located within a short range. For instance, terminal device 26912 and may utilize terminal device 26902 to communicate with the network access node 26910.

Terminal devices 26922-26930 may be configured to support a variety of links as well. By way of example, terminal devices 26922-26930 may be configured to support ultra-low throughput, ultra-high latency D2D links (e.g., some IoT applications such as livestock monitoring may require only occasional data transmission, e.g., once a day, and may tolerate a delayed transmission, e.g., one hour after sensor measurement). According to one aspect of the disclosure, terminal devices 26922-26930 may not be able to communicate directly with network access node 26910.

Terminal devices 26922-26930 may, however, communicate with other devices of the mobile cloud network 26900 that are located within a short range. For instance, terminal device 26922 may indirectly utilize terminal device 26902 to communicate with the network access node 26910 as shown in FIG. 269.

The terminal devices of the mobile cloud network 26900 may be assigned to hierarchical levels, which correspond the conditions of one or more verticals. The grouping of devices into hierarchical levels may, for instance, be based the conditions of the verticals, the number of respective devices and/or capabilities of the respective devices (e.g., grouping may be realized by clustering parameters). As a result, the grouping may be heterogeneous or homogeneous in nature.

According to one aspect, a terminal device of the mobile cloud network 26900 may have access to each of the verticals associated with its assigned hierarchical level. For instance, the condition(s) of one vertical may be a subset of the conditions of another vertical associated with a higher hierarchical level. Therefore, a terminal device of the mobile cloud network 26900 assigned to the higher hierarchical level may be enabled to access both of these verticals. Additionally or alternatively, a terminal device of the mobile cloud network 26900 meeting the differing conditions of two or more verticals may be assigned to a hierarchical level that enables access to each of the verticals for which the conditions are met. For simplicity, however, the terminal devices of the mobile cloud network 26900 may be graphically depicted within one or more verticals to better illustrate the application of the hierarchical network.

As shown in FIG. 269, vertical A may include terminal devices 26902-26904, vertical B may include terminal devices 26912-26916, vertical C may include terminal devices 26916-26918 and terminal device 26928, vertical D may include terminal devices 26928-26930, and vertical E may include terminal devices 26922-26926. Although terminal device 26920 is not grouped within verticals A-D, it still may be capable of forwarding data between terminal device 26904 and terminal devices 26928-26930.

The particular assignment of the devices to verticals A-D in the mobile cloud network 26900 of FIG. 269 is merely an illustrative in nature. In another aspect, the number and/or type of device in each vertical may vary based on the conditions of the verticals, the number of respective devices and/or capabilities of the respective devices (e.g., in livestock monitoring of a herd, all sensors performing the same measurements (e.g., fertility, location, etc., could be formed into groups).

FIG. 270 shows a message sequence chart 27000 for setting up a temporary hierarchical network by a network access node in accordance with some aspects. The number and type of hierarchical levels and/or terminal devices illustrated in FIG. 270 is merely one example of this disclosure. For instance, the number of hierarchical levels and terminal devices implemented in the hierarchical network may be more or less than in FIG. 270. According to one aspect of the disclosure, the hierarchical network may correspond to the mobile cloud network 26900 of FIG. 269, the network access node may correspond to the network access node 26910 of FIG. 269, and/or the terminal devices may correspond the terminal devices in the mobile cloud network 26900 of FIG. 269.

In 27002, the network access node may decide to set-up the hierarchical network. According to one aspect of the disclosure, this decision may be based on the identification of a communication need. The communication need may refer to a D2D communication, a small-cell communication, a macro-cell communication, etc.

As described below, this identification may be made by implementing a bottom-up approach **27002*a* or a top-down approach 27002*b*. In a bottom-up approach 27002*a*, the identification may be made based on a trigger that is sent from a terminal device to the network access node. The trigger may be, in one instance, a request or proposal to initiate a hierarchical network. In a top-down approach 27002*b***, the identification may be made by the network access node. Upon this identification and a decision to set-up the hierarchical network, a number of hierarchal levels in the hierarchical network is then determined.

In 27004, the network access node may identify the number of hierarchical levels to be used in the hierarchical network. According to one aspect, the number of hierarchical levels may be based at least upon conditions of the vertical and/or user requirements.

In 27006, the network access node may assign terminal devices of the hierarchical network to an identified level. According to one aspect, the network access node may transmit an indication of an assigned hierarchical level to each of the terminal devices of the hierarchical network. Once assigned to a hierarchical level, a terminal device may communicate with terminal devices of the same hierarchical level ("n"), terminal devices of a lower hierarchical level ("n−1"), and/or terminal devices of a higher hierarchical level ("n+1") through the hierarchical network.

In 27008, the network access node may adapt the hierarchical network. According to one aspect, the decision to adapt the hierarchical network may, for instance, be based on one or more parameters, such as channel conditions, and/or capabilities of the terminal devices either collectively or individually. In another aspect, 27008 is optional and may be omitted.

In 27010, the network access node may terminate the hierarchical network. According to one aspect, the decision to terminate the hierarchical network may be triggered if none of the terminal devices are participating in, for instance, D2D communications.

FIG. 271 shows a method 27100 for communication within a hierarchical network in accordance with some aspects. In one example of the disclosure, the hierarchical network may correspond to the mobile cloud network 26900, the network access node may correspond to the network access node 26910, and the terminal devices may correspond a terminal device within the mobile cloud network 26900 of FIG. 269. Additionally or alternatively, method 27100 may correspond to one or more actions performed by a terminal device in message sequence chart 55005400.

In 27102, a first terminal device may trigger a network access node to create the hierarchical network. The trigger may be, in one instance, a request or proposal to create a hierarchical network, which is transmitted to the network access node. The process of 27102, however, is optional and may be omitted where the network access node decides to create the hierarchical network without receiving such a request or proposal from the first terminal device. For instance, the network access node may decide on its own or with the aid of one or more elements of the radio communication network 21600 and/or a different terminal device to create the hierarchical network.

In 27104, the first terminal device may receive an indication from the network access node that the first terminal device is assigned to a first hierarchical level. The first hierarchical level may be associated with a first vertical application set enabling access to one or more vertical applications. The assignment to the first hierarchical level may be based on one or more capabilities of the first terminal device. According to one aspect, the capabilities may include a latency and/or data throughput of a supported short range wireless communication interface, such as a D2D link, supported by the first terminal device.

The received indication of the assigned hierarchical level of the first terminal device and/or the first application set may be stored locally in the first terminal device and/or remotely. For instance, the assigned hierarchical level and/or application set associated therewith may be stored in memory 21714 of the first terminal device, and/or a component of the radio communication network 21600.

In 27106, the first terminal device may communicate with another terminal device in the hierarchical network. For instance, the first terminal device may communicate with a second terminal device that is assigned to a second hierarchical level, which may be different from the first hierarchical level. The second hierarchical level may be associated with a second vertical application set providing access to one or more vertical applications. The vertical applications associated with the first and second hierarchical levels may include one or more of the same vertical applications. Alternatively, the vertical applications associated with the first and second hierarchical level may be mutually exclusive in that they do not share any of the same vertical applications.

The latency and/or data throughput of the short range wireless communication interface of the first and second terminal devices may be different. According to one aspect, the second terminal device is of a higher hierarchical level than the first terminal device. For instance, the first terminal device may support a D2D link having a latency that is higher than the latency associated with the second terminal device. In additional to or alternatively, first terminal device may support a D2D link having a data throughput that is less than the data throughput associated with the second terminal device.

In another aspect of the disclosure, the first terminal device is of a higher hierarchical level than the second terminal device. For instance, the second terminal device may support a D2D link having a latency that is higher than the latency associated with the first terminal device. Additionally or alternatively, second terminal device may support a D2D link having a data throughput that is less than the data throughput associated with the first terminal device. In yet another aspect of the disclosure, the first terminal device may be of the same hierarchical level as the second terminal device.

In some aspects, communication between the first and second terminal devices of the hierarchical network may include a discovery process. According to one aspect, the first device may receive information from the second terminal device indicating that it can forward data packets associated with the second application set to the radio access network. Likewise, the first terminal device may transmit information to the second terminal device indicating that it can forward data packets associated with the first application set to the radio access network. Responsive thereto, a request may be transmitted between the first communication device and the second terminal device to forward data packets to the radio access network. In other words, a terminal device may be enabled to access vertical applications, for instance, associated with a higher or lower hierarchical level than which it is assigned.

The received indication of the assigned hierarchical level of the second terminal device and/or the application set associated therewith may be stored locally in the first terminal device and/or remotely. For instance, the assigned hierarchical level may be stored in memory 21714 of the first terminal device, and/or a component of the radio communication network 21600.

The process of 27106, however, is optional and may be omitted where the first terminal device communicates with the network access node directly and no other terminal devices within range elect to participate in the hierarchical network.

In 27108, the first terminal device may transmit packets to the radio access network. According to one aspect, the first terminal device may transmit data packets to another terminal device in the hierarchical network, which may be relayed to the radio access network. The selection of a terminal device that may be used to access the radio access network may be configured and stored within the first terminal device. For instance, the first terminal device may be configured to forward data packets to the radio access network through terminal devices of an equal or higher hierarchical level. In the case that no equal or higher hierarchical level terminal devices are within a range, the first terminal device may accept a lower hierarchy neighboring terminal device despite a degradation of quality of service or the like.

In one example, the first terminal device may transmit data packets to the second terminal device over a D2D communication link therebetween. For instance, the data packets transmitted by the first terminal device may be associated with the first application set, the second application set, an application set corresponding to a lower hierarchical level, and/or an application set corresponding to a higher hierarchical level. The data packets may originate from the first terminal device, a terminal device of a lower hierarchical level, or a terminal device of a higher hierarchical level. The second terminal device may communicate directly or indirectly with the network access node in forwarding the data packets received from the first terminal device to the radio access network.

In 27110, the first terminal device may receive data packets through the hierarchical network. According to one aspect of the disclosure, the first terminal device may receive data packets directly from the network access node. In another aspect of the disclosure the first terminal device may receive data packets from an intermediary terminal device, such as the second terminal device over a D2D communication link therebetween. The data packets received by the first terminal device may be addressed to and terminate at the first terminal device, a terminal device of a lower hierarchical level, or a terminal device of a higher hierarchical level.

In 27112, the first terminal device may receive an indication of a hierarchical level change from the first hierarchical level to another hierarchical level from the network access node. The process of 27112 is optional, and may be omitted a hierarchical level change is not made in the hierarchical network. Although illustrated sequentially, 27108-27112 are presented in sequence, the may occur in any sequence or repeat according to the hierarchical network.

In 27114, the first terminal device may receive an indication that the hierarchical level is terminated.

By implementing one or more of the current aspects, device and network operation may be improved (e.g., optimized). For instance, a heterogeneous architecture with a higher efficiency may be achieved, cooperative communication may be selected for better link robustness, and/or spectrum resources may be dynamically allocated based on device capabilities. Further, network efficiency may be increased by exploring end-to-end communications, which may decrease the burden on the radio communication network 21600 while raising the importance of individual computation within terminal devices.

FIG. 272 shows method 27200 for communication in a hierarchical network in accordance with some aspects. As shown in FIG. 272, method 27200 includes receiving, at a first terminal device of a plurality of terminal devices, an indication that the first terminal device is assigned to a first hierarchical level associated with a first application set (27210), communicating with a second terminal device of the plurality of terminal devices, the second terminal device being assigned to a second hierarchical level associated with a second application set (27220), and transmitting a data message to a radio access network based on the communicating with the second terminal device (27230).

7.8 Hierarchical Communication #8

In some aspects of this disclosure, a hierarchy of capabilities may be used to dynamically update an status of device-to-device communications. For instance, hierarchical levels may be assigned to terminal devices of a radio communication network and dynamically changed according to one or more parameters.

Wireless communication can be achieved through not only the radio communication network 21600, but also through short-range communication interfaces between terminal devices. The short-range communication interfaces may be a direct link therebetween, such as a D2D communication link. Even though D2D communication links are described herein, other types of short-range communication interfaces between terminal devices may be utilized, such as Wi-Fi, Bluetooth, and/or Bluetooth Low Energy.

FIG. 273 shows a mobile cloud network 27300 based on D2D communications in accordance with some aspects. The mobile cloud network 5700 may include terminal devices 27302-27304, network access node 27310, terminal devices 27312-27320, and/or terminal devices 27322-27330. According to one aspect, terminal devices 27302-27304 may be high performance terminal devices (e.g., a laptop, a tablet, etc.). In another aspect of the disclosure, terminal devices 27312-27320 may be low performance terminal devices (e.g., IoT devices used in factory automation continuously measuring and transmitting data per second, minute, etc.). In yet another aspect of the disclosure, terminal devices 27322-27330 may be ultra-low performance terminal devices (e.g., IoT devices used in livestock monitoring measuring and transmitting data once or only a few times per day). The terminal devices within the mobile cloud network 27300 may correspond to terminal device 21602 of FIG. 217, and may include modem-layer and/or application-layer processing module (e.g., in the manner of baseband modem 21706 and/or application processor 21712) configured to control the communication operations related the current aspects, including transmitting and receiving data as radio signals with transceiver and antenna circuitry (e.g., RF transceiver 21704 and antenna system 21702). Additionally or alternatively, one or more terminal devices, such as terminal devices 27322-27330, of the mobile cloud network 27300 may not be capable of directly leveraging higher capability networks such as 3/4/5G networks. The number and type of devices in the mobile cloud network 27300 illustrated in FIG. 273 is merely one example of the disclosure. In another aspect, more or less of these and/or other types of devices may be implemented in the mobile cloud network 27300.

Terminal devices 27302-27304 may be configured to support a variety of links. For instance, terminal devices 27302-27304 may be configured to support high throughput links, low throughput, low latency D2D links, and/or low throughput, high latency D2D links. Terminal devices 27302-27304 may utilize one or more of the variety of links to communicate with other devices in the mobile cloud network 27300. For instance, terminal device 27302 may communicate directly with network access node 27310 over a high throughput link according to one aspect of the disclosure. According to one aspect of the disclosure, terminal devices 27302-27304 may be identified as being capable of directly communicating with network access node 27310.

Terminal devices 27312-27320 may be configured to support a variety of links as well. For instance, terminal devices 27312-27320 may be configured to support low throughput and high latency D2D links and/or ultra-low throughput, ultra-high latency D2D links. Terminal devices 27312-27320 may communicate with other devices of the mobile cloud network 27300 that are located within a short range. For instance, terminal device 27312 and may utilize terminal device 27302 to communicate with the network access node 27310.

Terminal devices 27322-27330 may be configured to support a variety of links as well. By way of example, terminal devices 27322-27330 may be configured to support ultra-low throughput, ultra-high latency D2D links. According to one aspect, terminal devices 27322-27330 may not be able to communicate directly with network access node 27310. Terminal devices 27322-27330 may, however, communicate with other devices of the mobile cloud network 27300 that are located within a short range. For instance, terminal device 27322 and may indirectly utilize terminal device 27302 to communicate with the network access node 27310 as shown in FIG. 273.

The terminal devices of the mobile cloud network 27300 may be assigned to hierarchical levels, which correspond the conditions of one or more verticals. The grouping of devices into hierarchical levels may, for instance, be based the conditions of the verticals, the number of respective devices and/or capabilities of the respective devices. As a result, the grouping may be heterogeneous or homogeneous in nature.

According to one aspect of the disclosure, a terminal device of the mobile cloud network 27300 may have access to one or more of the verticals associated with its assigned hierarchical level. For instance, the condition(s) of one vertical may be a subset of the conditions of another vertical associated with a higher hierarchical level. Therefore, a terminal device of the mobile cloud network 27300 assigned to the higher hierarchical level, may be enabled to access both of these verticals. Additionally or alternatively, a terminal device of the mobile cloud network 27300 meeting the differing conditions of two or more verticals may be assigned to a hierarchical level that enables access to each of the verticals for which the conditions are met.

The deployment of communication interfaces in mobile cloud network 27300 may be static, quasi static, or dynamic. According to one aspect, the D2D communication links may be static and thus not adapted. For instance, D2D communication links between robots within an industrial automation environment may be fixed. In another aspect, the D2D links may be quasi static and therefore infrequently changed. In yet another aspect, the D2D links may be dynamically changed. In one example, D2D communication links between drones or other terminal devices having a high mobility status may constantly evolve if, for example, a more favorable D2D communication link becomes possible when a new terminal device moves within range. Handovers between D2D communication links may be dynamically initiated to accommodate more favorable D2D communication links.

FIG. 274 shows a message sequence chart 27400 for dynamically changing a hierarchical network by a network access node in accordance with some aspects. According to one aspect, the message sequence chart 27400 may correspond to 27008 of FIG. 270, the hierarchical network may correspond to the mobile cloud network 27300 of FIG. 273, the network access node may correspond to the network access node 27310 of FIG. 273 and/or the terminal devices may correspond to the terminal devices in the mobile cloud network 27300 of FIG. 273.

In 27402, the network access node may identify a need to change a hierarchical level of one or more terminal devices of the hierarchical network. According to one aspect, the timing of 27402 may occur periodically, at pre-determined intervals, at random intervals, and/or in response to a network event, such as a power failure of a neighboring network access node. As described below, this identification may be made by implementing a bottom-up approach 27402*a* or a top-down approach 27402*b*.

In a bottom-up approach 27402*a*, the identification may be made based on a trigger that is sent from a terminal device to the network access node. The trigger may be, in one instance, a request or proposal to modify the hierarchical network. In another instance, the trigger may be based on one or more parameters of the terminal device, such one or more operational parameters of the terminal device. Operational parameters of the terminal device may, for example, include a key performance indicator (KPI) of the terminal device, a location of the terminal device, a network subscription of the terminal device, a target (e.g., by a user) QoS of the terminal device, a battery level of the terminal device, a mobility status of the terminal device, a channel condition of the terminal device, a capability of the terminal device, and/or an operating mode of the terminal device, etc. For instance, a terminal device acting as a relay point to the network access node may switch from a high capability mode to a low capability mode in the event its battery level falls below a predetermined threshold. Responsive thereto, the terminal device may transmit a trigger indicative of the low capability mode to the network access node. Upon receiving a trigger from a terminal device, the network access node may decide to change one or more communications links in the hierarchical network by itself or with the aid of one or more elements of the radio communication network 21600.

In a top-down approach 27002*b*, the identification may be made based on network status and/or one or more network parameters. Network parameters may refer to one or more operational parameters of the radio communication network 21600 and/or parameters of the hierarchical network. Additionally, or alternatively, the number of terminal devices and/or average throughput requirements, etc. may be taken into consideration. Operational parameters of the network may include, for example, key performance indicators and/or averaged channel conditions of the network. In one aspect, the network access node may aggregate operational parameters of one or more of the terminal devices. Upon analyzing, the network access node may decide to change one or more communications links in the hierarchical network by itself or with the aid of one or more elements of the radio communication network 21600.

Upon such deciding to change one or more communication links in the hierarchical network may be made, and the number of hierarchal levels in the hierarchical network also be optionally re-determined.

In 27404, the network access node may dynamically adapt the hierarchical network. For instance, the network access node may assign one or more terminal devices of the hierarchical network to a hierarchical level. The one or more terminal devices may be new to the hierarchical network or previously unassigned to a hierarchical level. The network access node may also reassign one or more terminal devices from their assigned hierarchical level(s) to new hierarchical level(s). The network access node may further remove one or more terminal devices from their respectively assigned hierarchical level. According to one aspect of the disclosure, the network access node may transmit an indication of a hierarchical level change the terminal devices whose hierarchical level(s) are changed. Once assigned and/or reassigned to a hierarchical level, a terminal device may communicate with terminal devices of the same hierarchical level ("n"), terminal devices of a lower hierarchical level ("n−1"), and/or terminal devices of a higher hierarchical level ("n+1") through the hierarchical network.

In 27406, the network access node may confirm the hierarchical change with other terminal devices of the hierarchical network which are impacted. For instance, the network access node may transmit an indication of the hierarchical change to one or more terminal devices of the hierarchical network whose communication links are affected.

FIGS. 275 and 276 show the effect of a hierarchical change on the mobile cloud network 27300 of FIG. 27357 in accordance with some aspects. According to one aspect, mobile cloud network 27300 may have been updated according to message sequence chart 27400 of FIG. 274. The hierarchical changes and effects thereof illustrated in FIGS. 275 and 276 are merely examples of the number and/or types of hierarchical changes that may be made.

FIG. 275 illustrates the mobile cloud network 27300 after reassigning terminal device 27302 from a higher hierarchical level to a lower hierarchical level in accordance with some aspects. According to one aspect, terminal device 27302 may be demoted to a lower hierarchical level in response to an impairment with respect to terminal device 27302. For instance, when the battery level of terminal device 27302 meets or falls below a predetermined threshold, terminal device 27302 may transmit a trigger to network access node 27310 requesting to be moved to a lower hierarchical level. If approved, for example, by network access node 27310, an indication of the hierarchical level change from the higher hierarchical level to the lower hierarchical level may be transmitted to terminal device 27302. The network access node may also transmit a confirmation of the hierarchical level change to terminal device 27304 since its communication link with terminal device 27302 may be reconfigured.

As a result of being reassigned to a lower hierarchical level, one or more communication links may be updated. In one example, terminal device 27302 might not be able to directly communicate with network access node 27310. Instead, terminal device 27302 may reconfigure a communication link with terminal device 27304 to relay a data to network access node 27310. For instance, the communication link between terminal device 27302 and terminal device

27304 may be changed from a low throughput, low latency D2D links to a low throughput, high latency D2D link.

FIG. 276 illustrates the mobile cloud network 27300 after reassigning terminal device 27320 from a lower hierarchical level to a higher hierarchical level. According to one aspect of the disclosure, terminal device 27320 may be promoted to a higher hierarchical level in response to an improvement with respect to terminal device 27320. In one instance, the network access node may itself identify a higher throughput requirement of the mobile cloud network 27300 and thus promote terminal device 27320 to a higher hierarchical level. In another instance, when the channel conditions of terminal device 27320 meet or exceed a predetermined threshold, terminal device 27302 may transmit a trigger to network access node 27310 requesting to be moved to a higher hierarchical level. If approved, for example, by network access node 27310, an indication of the hierarchical level change from the lower hierarchical level to the higher hierarchical level may be transmitted to terminal device 27320. The network access node may also transmit a confirmation of the hierarchical level change to terminal device 27302, terminal device 27304, and terminal device 27322 since at least one of their respective communication links may be reconfigured.

As a result of being reassigned to a higher hierarchical level, one or more new communication links may be established. In one example, terminal device 27320 may be able to directly communicate with network access node 27310. For instance, terminal device 27320 may be configured to establish a high throughput link with network access node 27310. In another example, terminal device 27320 may be able to relay data between terminal device 27318 and network access node 27310. As such, terminal device 27320 may be configured to establish a low throughput, high latency D2D link with terminal device 27318.

As a result of being reassigned to a higher hierarchical level, one or more existing communication links may be reconfigured. In one example, terminal device 27320 may reconfigure an existing communication link with terminal device 27304. For instance, the communication link between terminal device 27320 and terminal device 27304 may be changed from a low throughput, high latency D2D link to a low throughput, low latency D2D link.

As a result of being reassigned to a higher hierarchical level, one or more existing communication links may be removed. In one example, the communication link between terminal device 27318 and terminal device 27304 may be removed since it may be more favorable for terminal device 27320 to relay data between terminal device 27318 and network access node 27310. For instance, terminal device 27320 may provide a more efficient communication link than terminal device 27304 if terminal device 27320 is closer to terminal device 27318 than terminal device 27304.

FIG. 277 shows a method 27700 for dynamic communication within a hierarchical network. According to one aspect of the disclosure, the hierarchical network may correspond to the mobile cloud network 27300, the network access node may correspond to the network access node 27310, and the terminal devices may correspond to a terminal device within the mobile cloud network 27300 of FIG. 273. Additionally or alternatively, method 27700 may correspond to one or more actions performed by a terminal device of message sequence chart 27400.

In 27702, a first terminal device may trigger a network access node to modify the hierarchical network. The trigger may be, in one instance, a request or proposal to modify the hierarchical network, which is transmitted to the network access node. The trigger may be based on one or more operational parameters of the first terminal device. Operational parameters of the first terminal device may, for example, include a key performance indicator of the terminal device, a location of the first terminal device, a network subscription of the terminal device, a target (e.g., by a user) QoS of the terminal device, a battery level of the first terminal device, a mobility status of the first terminal device, a channel condition of the first terminal device, a capability of the first terminal device, and/or an operating mode of the first terminal device, etc. 27702

The process of 27602, however, is optional and may be omitted where the network access node decides to modify the hierarchical network without receiving a request or proposal from the first terminal device. For instance, the network access node may decide on its own or with the aid of one or more elements of the radio communication network 21600 and/or a different terminal device to modify the hierarchical network.

In 27704, the first terminal device may receive an indication from the network access node of a hierarchical level change. The hierarchical level change may indicate that the first terminal device is reassigned from a first hierarchical level to a second hierarchical level, or removed from a hierarchical level assigned to the first terminal device.

The first hierarchical level may be associated with a first vertical application set enabling access to one or more vertical applications, whereas the second hierarchical level may be associated with a second vertical application set enabling access to one or more vertical applications. In one example, the first hierarchical level may higher than the second hierarchical level. In another example, the second hierarchical level may be higher than the first hierarchical level. Additionally or alternatively, the hierarchical level change may indicate one or more communication links of the first terminal device with another terminal device is reconfigured, added, and/or removed.

The received indication of the hierarchical level change of the first terminal device may be stored locally in the first terminal device and/or remotely. For instance, the assigned hierarchical level and/or application set associated therewith may be stored in memory 21714 of the first terminal device of FIG. 217, and/or a component of the radio communication network 21600.

In 27706, the first terminal device may communicate with another terminal device in the hierarchical network. For instance, the first terminal device may communicate with a second terminal device that is assigned to a third hierarchical level, which may be different from the first hierarchical level. The third hierarchical level may be associated with a third vertical application set providing access to one or more vertical applications.

The vertical applications associated with the first, second and third hierarchical levels may include one or more of the same vertical applications. Alternatively, the vertical applications associated with the first, second and third hierarchical levels may be mutually exclusive in that they do not share any of the same vertical applications.

The latency and/or data throughput of the short range wireless communication interface of the first and second terminal devices may be different. According to one aspect, the second terminal device is of a higher hierarchical level than the first terminal device. For instance, the first terminal device may support a D2D link having a latency that is higher than the latency associated with the second terminal device. In additional to or alternatively, first terminal device may support a D2D link having a data throughput that is less than the data throughput associated with the second terminal device.

In another aspect, the first terminal device is of a higher hierarchical level than the second terminal device. For instance, the second terminal device may support a D2D link having a latency that is higher than the latency associated with the first terminal device. In additional to or alternatively, second terminal device may support a D2D link having a data throughput that is less than the data throughput associated with the first terminal device. In yet another aspect of the disclosure, the first terminal device may be of the same hierarchical level as the second terminal device Communication between the first and second terminal devices of the hierarchical network may include a discovery process. According to one aspect of the present disclosure, the first device may receive information from the second terminal device indicating that it can forward data packets associated with the third application set to the radio access network. Likewise, the first terminal device may transmit information to the second terminal device indicating that it can forward data packets associated with the second application set to the radio access network. Responsive thereto, a request may be transmitted between the first communication device and the second terminal device to forward data packets to the radio access network. In other words, a terminal device may be enabled to access vertical applications, for instance, associated with a higher or lower hierarchical level than which it is assigned.

The received indication of the assigned hierarchical level of the second terminal device and/or the application set associated therewith may be stored locally in the first terminal device and/or remotely. For instance, the assigned hierarchical level may be stored in memory 21714 of the first terminal device of FIG. 217, and/or a component of the radio communication network 21600.

The process of 27706, however, is optional and may be omitted where the first terminal device communicates with the network access node directly and no other terminal devices within range elect to participate in the hierarchical network.

In 27708, the first terminal device may transmit packets to the radio access network. According to one aspect, the first terminal device may transmit data packets to another terminal device in the hierarchical network, which may be relayed to the radio access network. The selection of a terminal device that may be used to access the radio access network may be configured and stored within the first terminal device. For instance, the first terminal device may be configured to forward data packets to the radio access network through terminal devices of an equal or higher hierarchical level. In the case that no equal or higher hierarchical level terminal devices are within a range, the first terminal device may accept a lower hierarchy neighboring terminal device despite a degradation of quality of service or the like.

In one example, the first terminal device may transmit data packets to the second terminal device over a D2D communication link therebetween. For instance, the data packets transmitted by the first terminal device may be associated with the first application set, the second application set, the third application set, an application set corresponding to a lower hierarchical level, and/or an application set corresponding to a higher hierarchical level. The data packets may originate from the first terminal device, a terminal device of a lower hierarchical level, or a terminal device of a higher hierarchical level. The second terminal device may communicate directly or indirectly with the network access node in forwarding the data packets received from the first terminal device to the radio access network.

In 27710, the first terminal device may receive data packets through the hierarchical network. According to one aspect, the first terminal device may receive data packets directly from the network access node. In another aspect of the disclosure the first terminal device may receive data packets from an intermediary terminal device, such as the second terminal device over a D2D communication link therebetween. The data packets received by the first terminal device may be addressed to and terminate at the first terminal device, a terminal device of a lower hierarchical level, or a terminal device of a higher hierarchical level.

In 27712, the first terminal device may receive another indication of a hierarchical level change from the first hierarchical level to another hierarchical level from the network access node. The process of 27712 is optional, and may be omitted a hierarchical level change is not made in the hierarchical network. Although illustrated sequentially, 27708-27712 are presented in sequence, the may occur in any sequence or repeat according to the hierarchical network.

In 27714, the first terminal device may receive an indication that the hierarchical level is terminated.

The current aspects may optimize device and network operation. For instance, a heterogeneous architecture with a higher efficiency may be achieved, cooperative communication may be selected for better link robustness, and/or spectrum resources may be dynamically allocated based on device capabilities. Further, network efficiency may be increased by exploring end-to-end communications, which may decrease the burden on the radio communication network 21600 while raising the importance of individual computation within terminal devices.

FIG. 278 shows method 27800 for dynamic communication over a radio access network in accordance with some aspects. As shown in FIG. 278, method 27800 includes receiving, at a first terminal device of a plurality of terminal devices (27810), an indication that the first terminal is assigned to a first hierarchical level, receiving, at a first terminal device, a first hierarchical level change indicating the first terminal device is reassigned from the first hierarchical level to a second hierarchical level (27820), based on an operational parameter, and transmitting a data message to the radio access network based on the first hierarchical level change (27830).

The terms "user equipment", "UE", "mobile terminal", "user terminal", etc., may apply to any wireless communication device, including cellular phones, tablets, laptops, personal computers, wearables, multimedia playback and other handheld electronic devices, consumer/home/office/commercial appliances, vehicles, and any number of additional electronic devices capable of wireless communications.

While the above descriptions and connected figures may depict electronic device components as separate elements, skilled persons will appreciate the various possibilities to combine or integrate discrete elements into a single element. Such may include combining two or more hardware circuits for form a single hardware circuit, mounting two or more hardware circuits onto a common chip or chassis to form an integrated element, executing discrete software routines (e.g., programs, algorithms, or applications) on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software routine into two or more sub-routings and executing each subroutine separately (on the same or different processor cores).

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples relate to further aspects of this disclosure:

Example 1 is a communication system including a first radio module configured to support a first radio access technology, a second radio module configured to support a second radio access technology, a common discovery module configured to receive discovery information for the first radio access technology and the second radio access technology from a common discovery channel, wherein the discovery information is encoded onto one or more discovery signals according to the same signal format, and a controller configured to control the first radio module or the second radio module based on the discovery information.

In Example 2, the subject matter of Example 1 can optionally include wherein the second radio access technology is different from the first radio access technology.

In Example 3, the subject matter of Example 1 or 2 can optionally include wherein the first radio module, the second radio module, and the common discovery module are part of a radio transceiver or a baseband modem.

In Example 4, the subject matter of any one of Examples 1 to 3 can optionally include wherein the common discovery module is configured to decode the discovery information for the first radio access technology and the second radio access technology from the common discovery channel according to the same signal format.

In Example 5, the subject matter of any one of Examples 1 to 4 can optionally include wherein the common discovery module is configured to receive a first discovery signal on the common discovery channel comprising the discovery information for the first radio access technology and to receive a second discovery signal on the common discovery channel comprising the discovery information for the second radio access technology, wherein the first discovery signal and the second discovery signal are encoded according to the signal format.

In Example 6, the subject matter of Example 5 can optionally include wherein the common discovery module is configured to receive the first discovery signal from a first network access node and configured to receive the second discovery signal from a second network access node, wherein the discovery information in the first discovery signal is unique to the first network access node and the discovery information in the second discovery signal is unique to the second network access node.

In Example 7, the subject matter of Example 6 can optionally include wherein the first network access node is different from the second network access node.

In Example 8, the subject matter of Example 6 or 7 can optionally include wherein the discovery information in the second discovery signal is unique to the second network access node in terms of format or scheduling.

In Example 9, the subject matter of any one of Examples 1 to 4 can optionally include wherein the one or more discovery signals are a common discovery signal comprising the discovery information for the first radio access technology and the second radio access technology.

In Example 10, the subject matter of Example 9 can optionally include wherein the discovery information for both the first radio access technology and the second radio access technology are encoded on the common discovery signal according to the signal format.

In Example 11, the subject matter of Example 9 or 10 can optionally include wherein the common discovery module is configured to receive the common discovery signal from a single network access node.

In Example 12, the subject matter of any one of Examples 1 to 11 can optionally include wherein the discovery information for the first radio access technology and the second radio access technology includes discovery information for one or more network access nodes of the first radio access technology and the second radio access technology.

In Example 13, the subject matter of Example 12 can optionally include wherein the controller is configured to select a target network access node from the one or more network access nodes and configured to establish a radio access connection with the target network access node via the first radio module or the second radio module based on the discovery information for the first radio access technology or the second radio access technology.

In Example 14, the subject matter of Example 13 can optionally include wherein the controller is configured to select the target network access node based on geographic location information of the one or more network access nodes in the discovery information for the first radio access technology or the second radio access technology.

In Example 15, the subject matter of any one of Examples 1 to 14 can optionally include wherein the controller is configured to operate a radio access connection with the first radio module or the second radio module according to the discovery information.

In Example 16, the subject matter of any one of Examples 1 to 9 can optionally include wherein the discovery information includes access information for one or more network access nodes, the controller further configured to communicate with or control the one or more network access nodes via the first radio module or the second radio module depending on the discovery information.

In Example 17, the subject matter of Example 16 can optionally include wherein the controller is configured to communicate with or control the one or more network access nodes via the first radio module or the second radio module by receiving data from the one or more network access nodes, establishing a radio access connection with the one or more network access nodes, or performing radio measurements on the one or more network access nodes.

In Example 18, the subject matter of any one of Examples 1 to 17 can optionally include wherein the discovery information includes frequency band and center frequency channel information, channel bandwidth information, service provider information, geographic location information, data rate information, public or private status information, authentication type information, capability information, radio measurement information, or performance metric information.

In Example 19, the subject matter of Example 18 can optionally include wherein the geographic location information includes geopositional information that indicates an absolute position of the one or more network access nodes or a relative position of the one or more network access nodes.

In Example 20, the subject matter of Example 19 can optionally include wherein the geopositional information includes Global Positioning System (GPS) coordinates.

In Example 21, the subject matter of any one of Examples 1 to 20 can optionally include wherein the controller is configured to identify incorrect information in the discovery information and to report the incorrect information to a specific network access node.

In Example 22, the subject matter of any one of Examples 1 to 21 can optionally include wherein the first radio access technology and the second radio access technology are selected from the group consisting of Long Term Evolution (LTE), Universal Mobile Telecommunications System (UMTS), Global System for Mobile Communications (GSM), WiFi, Bluetooth, millimeter Wave (mmWave), WiGig, and Fifth Generation (5G).

In Example 23, the subject matter of any one of Examples 1 to 22 can optionally further include an antenna array and configured as a radio communication terminal device.

Example 25 is a network access node including a control module configured to generate a common discovery signal including discovery information for a plurality of network access nodes of different radio access technologies, and a radio module configured to broadcast the common discovery signal on a common discovery channel.

In Example 25, the subject matter of Example 24 can optionally include wherein the control module is a processor configured to retrieve and execute software-defined instructions.

In Example 26, the subject matter of Example 24 or 25 can optionally include wherein the radio module includes a radio transceiver.

In Example 27, the subject matter of any one of Examples 24 to 26 can optionally further include a detection module configured to collect the discovery information for the plurality of network access nodes.

In Example 28, the subject matter of Example 27 can optionally include wherein the detection module is configured to collect the discovery information for the plurality of network access nodes by receiving a radio access technology (RAT)-specific discovery signal from each of the plurality of network access nodes and extracting the discovery information from the RAT-specific discovery signals.

In Example 29, the subject matter of Example 27 or 28 can optionally include wherein the control module is configured to connect to one or more of the plurality of network access nodes via a backhaul interface, wherein the detection module is configured to collect the discovery information for the plurality of network access nodes via the backhaul link.

In Example 30, the subject matter of any one of Examples 27 to 29 can optionally include wherein the detection module is configured to receive the discovery information for the plurality of network access nodes from a database.

In Example 31, the subject matter of any one of Examples 27 to 30 can optionally include wherein the detection module is configured to receive the discovery information for the plurality of network access nodes from one or more terminal devices served by the network access node.

In Example 32, the subject matter of Example 31 can optionally include wherein the control module is configured to request the discovery information for the plurality of network access nodes from the one or more terminal devices.

In Example 33, the subject matter of any one of Examples 24 to 32 can optionally include wherein the discovery information includes discovery information for the first network access node or the second network access node.

In Example 34, the subject matter of any one of Examples 24 to 33 can optionally include wherein the control module is configured to generate the common discovery signal according to a predefined discovery signal format.

In Example 35, the subject matter of any one of Examples 24 to 34 can optionally include wherein the discovery information includes frequency band and center frequency channel information, channel bandwidth information, service provider information, geographic location information, data rate information, public or private status information, authentication type information, capability information, radio measurement information, or performance metric information.

In Example 36, the subject matter of Example 35 can optionally include wherein the geographic location information includes geopositional information that indicates an absolute position of the network access node or a relative position of the network access node.

In Example 37, the subject matter of any one of Examples 24 to 36 can optionally include wherein the control module is configured to control the radio module to broadcast the common discovery signal on the common discovery channel according to a listen-before-talk or a contention-based channel access scheme.

In Example 38, the subject matter of any one of Examples 24 to 37 can optionally include wherein the radio module is configured to share the common discovery channel with one or more further network access nodes.

In Example 39, the subject matter of any one of Examples 24 to 38 can optionally include wherein the control module is configured to include geographic location information for the plurality of network access nodes with the discovery information in the common discovery signal.

In Example 40, the subject matter of any one of Examples 24 to 39 can optionally include wherein the control module is further configured to operate one or more radio access connections according to Long Term Evolution (LTE), Universal Mobile Telecommunications System (UMTS), Global System for Mobile Communications (GSM), WiFi, millimeter wave (mmWave), WiGiG, Fifth Generation (5G), and Bluetooth.

Example 41 is a network access node including a control module configured to generate a discovery signal, and a radio module configured to broadcast the discovery signal on a common discovery channel comprising discovery information, encoded with the same signal format, for multiple network access nodes of different radio access technologies.

In Example 42, the subject matter of Example 41 can optionally include wherein the control module is a processor configured to retrieve and execute software-defined instructions.

In Example 43, the subject matter of Example 41 or 42 can optionally include wherein the radio module includes a radio transceiver component.

In Example 44, the subject matter of any one of Examples 41 to 43 can optionally include wherein the control module is configured to generate the discovery signal by encoding discovery information for a plurality of network access nodes according to the signal format.

In Example 45, the subject matter of Example 44 can optionally further include a detection module configured to collect the discovery information for the plurality of network access nodes.

In Example 46, the subject matter of Example 45 can optionally include wherein the detection module is configured to collect the discovery information for the plurality of network access nodes by receiving a radio access technology (RAT)-specific discovery signal from each of the plurality of network access nodes and extracting the discovery information from the RAT-specific discovery signals.

In Example 47, the subject matter of Example 45 or 46 can optionally include wherein the module is configured to connect to one or more of the plurality of network access nodes via a backhaul interface, wherein the detection module is configured to collect the discovery information for the plurality of network access nodes via the backhaul link.

In Example 48, the subject matter of any one of Examples 45 to 47 can optionally include wherein the detection module is configured to receive the discovery information for the plurality of network access nodes from a database.

In Example 49, the subject matter of any one of Examples 45 to 48 can optionally include wherein the detection module is configured to receive the discovery information for the plurality of network access nodes from one or more terminal devices served by the network access node.

In Example 50, the subject matter of Example 49 can optionally include wherein the control module is configured to request the discovery information for the plurality of network access nodes from the one or more terminal devices.

In Example 51, the subject matter of any one of Examples 41 to 50 can optionally include wherein the discovery information includes discovery information for the network access node.

In Example 52, the subject matter of any one of Examples 41 to 43 can optionally include wherein the discovery signal comprises discovery information exclusively for the network access node.

In Example 53, the subject matter of any one of Examples 41 to 52 can optionally include wherein the discovery information includes frequency band and center frequency channel information, channel bandwidth information, service provider information, geographic location information, data rate information, public or private status information, authentication type information, capability information, radio measurement information, or performance metric information.

In Example 54, the subject matter of Example 53 can optionally include wherein the geographic location information includes geopositional information that indicates an absolute position of the network access node or a relative position of the network access node.

In Example 55, the subject matter of any one of Examples 41 to 54 can optionally include wherein the control module is configured to control the radio module to broadcast the discovery signal on the common discovery channel according to a listen-before-talk or a contention-based channel access scheme.

In Example 56, the subject matter of any one of Examples 41 to 53 can optionally include wherein the radio module is configured to share the common discovery channel with one or more other broadcasting network access nodes that each broadcast a respective discovery signal.

In Example 57, the subject matter of Example 56 can optionally include wherein the radio module is configured to share the common discovery channel with the one or more other broadcasting network access nodes according to according to a listen-before-talk or a contention-based channel access scheme.

In Example 58, the subject matter of any one of Examples 41 to 57 can optionally include wherein the control module is configured to include geographic location information for the plurality of network access nodes with the discovery information in the discovery signal.

In Example 59, the subject matter of any one of Examples 41 to 58 can optionally include wherein the control module is further configured to operate one or more radio access connections according to Long Term Evolution (LTE), Universal Mobile Telecommunications System (UMTS), Global System for Mobile Communications (GSM), WiFi, millimeter Wave (mmWave), WiGiG, Fifth Generation (5G), or Bluetooth.

In Example 60, the subject matter of any one of Examples 41 to 58 can optionally further include one or more antennas and configured as a cellular base station or Wireless Local Area Network (WLAN) access point.

Example 61 is a communication system including a first radio module configured to support a first radio access connection with a first network access node, a second radio module configured to support a second radio access connection with a second network access node, wherein the first radio access connection and the second radio access connection are for different radio access technologies, and a controller configured to establish a forwarding link that instructs the first network access node to re-route data intended for the first radio access connection to the second radio access connection, the second radio module further configured to receive data for the first radio access connection and the second radio access connection over the second radio access connection.

In Example 62, the subject matter of Example 61 can optionally include wherein the first radio module and the second radio module are part of a radio transceiver or a baseband modem.

In Example 63, the subject matter of Example 61 or 62 can optionally further include one or more antennas and configured as a radio communication terminal device.

In Example 64, the subject matter of any one of Examples 61 to 63 can optionally include wherein the controller is configured to establish the forwarding link that instructs the first network access node to re-route data intended for the first radio access connection to the second radio access connection by transmitting a forwarding setup instruction to the first network access node having a forwarding address for the data intended for the first radio access connection.

In Example 65, the subject matter of Example 64 can optionally include wherein the controller is configured to transmit the forwarding setup instruction to the first network access node over the first radio access connection via the first radio module.

In Example 66, the subject matter of Example 64 or 65 can optionally include wherein the first radio access connection comprises a first terminal-side network address and the second radio access connection comprises a second terminal-side network address, and wherein the controller is configured to provide the second terminal-side network address as the forwarding address.

In Example 67, the subject matter of Example 66 can optionally include wherein the first terminal-side network address and the second terminal-side network address are Internet Protocol (IP) addresses.

In Example 68, the subject matter of any one of Examples 61 to 66 can optionally include wherein the second radio module is configured to receive the data for the first radio access connection and the second radio access connection from the second network access node.

In Example 69, the subject matter of any one of Examples 61 to 64 can optionally include wherein the controller is further configured to deactivate the forwarding link to instruct the first network access node to provide further data intended for the first radio access connection over the first radio access connection.

In Example 70, the subject matter of Example 69 can optionally include wherein the first radio module is configured to receive the further data from the first network access node over the first radio access connection after the forwarding link is deactivated.

In Example 71, the subject matter of Example 69 or 70 can optionally include wherein the controller is configured to deactivate the forwarding link to instruct the first network access node to provide data intended for the first radio access connection over the first radio access connection by re-connecting the first radio access connection with the first network access node and transmitting a forwarding deactivation instruction to the first network access node over the re-connected first radio access connection via the first radio module.

In Example 72, the subject matter of any one of Examples 61 to 70 can optionally include wherein the controller is configured to identify the data intended for the first radio access connection that was re-routed over the second radio access connection and to control the first radio access connection based on the identified data.

In Example 73, the subject matter of Example 72 can optionally include wherein the controller is further configured to identify a paging message in the identified data and configured to control the first radio access connection based on the identified data by re-connecting the first radio access connection with the first network access node, transmitting a forwarding deactivation instruction to the first network access node over the re-connected first radio access connection, and receiving further data indicated in the paging message from the first network access node over the re-connected first radio access connection.

In Example 74, the subject matter of Example 72 can optionally include wherein the controller is further configured to determine that further data intended for the first radio access connection is scheduled to be re-routed over the second radio access connection, and wherein the controller is configured to control the first radio access connection based on the identified data by determining whether or not to re-connect the first radio access connection based on an amount of the further data.

In Example 75, the subject matter of Example 72 can optionally include wherein the controller is further configured to identify a paging message in the identified data and configured to control the first radio access connection based on the identified data by identifying that the first network access node is currently unavailable, establishing a new radio access connection with a third network access node of the first radio access technology via the first radio module, receiving further data indicated in the paging message from the third network access node over the new radio access connection, and transmitting a forwarding deactivation instruction for the first network access node over the new radio access connection via the third network access node.

In Example 76, the subject matter of Example 61 can optionally include wherein the controller is further configured to identify pending uplink data for the first radio access connection, transmit an access request message to the first network access node via the forwarding link to re-establish the first radio access connection with the first network access node, and transmit the pending uplink data to the first network access node via the first radio access connection.

In Example 77, the subject matter of any one of Examples 61 to 75 can optionally include wherein the controller is configured to, before establishing the forwarding link, selecting the first radio access connection and the second radio access connection from a plurality of radio access connections.

In Example 78, the subject matter of any one of Examples 61 to 75 can optionally include wherein the controller is configured to, before establishing the forwarding link, evaluate a plurality of radio access connections according to a predefined criteria and select the first radio access connection and the second radio access connection from the plurality of radio access connections based on the evaluation.

In Example 79, the subject matter of Example 78 can optionally include wherein the predefined criteria is based on power consumption, expected traffic, traffic activity patterns, usage profiles, delay and latency criteria, data security requirements, network coverage area, or network transmitter range.

In Example 80, the subject matter of any one of Examples 61 to 75 can optionally include wherein the controller is configured to, before establishing the forwarding link, evaluate a plurality of radio access connections and select a short-range radio access connection from the plurality of radio access connections as the first radio access connection and select a cellular radio access connection from the plurality of radio access connections as the second radio access connection.

In Example 81, the subject matter of Example 80 can optionally include wherein the first radio access connection is a WiFi or Bluetooth connection and the second radio access connection is a 4GPP cellular radio access connection.

In Example 82, the subject matter of any one of Examples 61 to 75 can optionally include wherein the controller is configured to, before establishing the forwarding link, evaluate a plurality of radio access connections and select an idle radio access connection from the plurality of radio access connections as the first radio access connection.

In Example 83, the subject matter of any one of Examples 61 to 82 can optionally include wherein the first radio module is configured to enter an inactive or reduced power state after the forwarding link is established.

In Example 84, the subject matter of any one of Examples 61 to 83 can optionally include wherein the first radio access connection and the second radio access connection are selected from a group consisting of Long Term Evolution (LTE), Universal Mobile Telecommunications System (UMTS), Global System for Mobile Communications (GSM), WiFi, WiGig, millimeter Wave (mmWave), Fifth Generation (5G), and Bluetooth.

Example 85 is a device including means for receiving discovery information for a first radio access technology and a second radio access technology from a common discovery channel, wherein the discovery information for the first radio access technology and for the second radio access technology is encoded into one or more discovery signals according to the same signal format, and means for controlling one or more radio access connections of different radio access technologies according to the discovery information.

Example 86 is a method of performing radio communications including receiving discovery information for a first radio access technology and a second radio access technology from a common discovery channel, wherein the discovery information for the first radio access technology and for the second radio access technology is encoded into one or more discovery signals according to the same signal format, and controlling one or more radio access connections of different radio access technologies according to the discovery information.

In Example 87, the subject matter of Example 86 can optionally include wherein receiving the discovery information for the first radio access technology and the second radio access technology from the common discovery channel includes decoding the discovery information for the first radio access technology and the second radio access technology from the common discovery channel according to the signal format.

In Example 88, the subject matter of Example 86 can optionally include wherein receiving the discovery information for the first radio access technology and the second radio access technology from the common discovery channel includes receiving a first discovery signal on the common discovery channel comprising the discovery information for the first radio access technology and receiving a second discovery signal on the common discovery channel comprising the discovery information for the second radio access technology, wherein the first discovery signal and the second discovery signal are encoded according to the signal format.

In Example 89, the subject matter of Example 88 can optionally include wherein receiving the first discovery signal on the common discovery channel includes receiving the first discovery signal from a first network access node and wherein receiving the second discovery signal on the common discovery channel includes receiving the second discovery signal from a second network access node different from the first network access node, wherein the discovery information in the first discovery signal is unique to the first network access nodes and the discovery information in the second discovery signal is unique to the second network access node.

In Example 90, the subject matter of Example 86 can optionally include wherein receiving the discovery information for the first radio access technology and the second radio access technology from the common discovery channel includes receiving a common discovery signal on the common discovery channel comprising the discovery information for the first radio access technology and the second radio access technology, wherein the common discovery signal is encoded according to the signal format.

In Example 91, the subject matter of Example 90 can optionally include wherein the discovery information for the first radio access technology and the second radio access technology are both encoded on the common discovery signal according to the signal format.

In Example 92, the subject matter of Example 90 or 91 can optionally include wherein receiving the common discovery signal on the common discovery channel includes receiving the common discovery signal from a single network access node.

In Example 93, the subject matter of Example 86 can optionally include wherein the discovery information for the first radio access technology and the second radio access technology includes discovery information for one or more network access nodes of the first radio access technology and the second radio access technology.

In Example 94, the subject matter of Example 93 can optionally further include selecting a target network access node from the one or more network access nodes and establishing a radio access connection with the target network access node based on the discovery information.

In Example 95, the subject matter of Example 94 can optionally include wherein selecting the target network access node from the one or more network access nodes includes selecting the target network access node based on geographic location information for the one or more network access nodes contained in the discovery information.

In Example 96, the subject matter of any one of Examples 86 to 95 can optionally include wherein the discovery information includes access information for one or more network access nodes and wherein controlling the one or more radio access connections of different radio access technologies according to the discovery information includes receiving data from the one or more network access nodes, establishing a radio access connection with the one or more network access nodes, or performing radio measurements on the one or more network access nodes.

In Example 97, the subject matter of any one of Examples 86 to 95 can optionally include wherein the discovery information includes access information for one or more network access nodes and wherein controlling the one or more radio access connections of different radio access technologies according to the discovery information includes selecting a target network access node from the one or more network access nodes based on the discovery information and establishing radio access connection with the target network access node.

In Example 98, the subject matter of any one of Examples 86 to 96 can optionally include wherein the discovery information includes frequency band and center frequency channel information, channel bandwidth information, service provider information, geographic location information, data rate information, public or private status information, authentication type information, capability information, radio measurement information, or performance metric information for one or more network access nodes.

In Example 99, the subject matter of Example 98 can optionally include wherein the geographic location information includes geopositional information that indicates an absolute position of the one or more network access nodes or a relative position of the one or more network access nodes.

In Example 100, the subject matter of any one of Examples 86 to 99 can optionally further include identifying incorrect information included in the discovery information and reporting the incorrect information to a specific network access node.

In Example 101, the subject matter of any one of Examples 86 to 100 can optionally include wherein the first radio access technology and the second radio access technology are selected from the group consisting of Long Term Evolution (LTE), Universal Mobile Telecommunications System (UMTS), Global System for Mobile Communications (GSM), WiFi, millimeter Wave (mmWave), WiGig, Fifth Generation (GG), and Bluetooth.

Example 102 is a radio communication terminal device including a radio transceiver and a modem configured to perform the method of any one of Examples 86 to 101.

Example 103 is a communication device including one or more processors configured to perform the method of any one of Examples 86 to 101.

Example 104 is a non-transitory computer readable medium storing instructions that when executed by a processor of a radio communication terminal device direct the radio communication terminal device to perform the method of any one of Examples 86 to 101.

Example 105 is a device including means for transmitting and receiving data over a first radio access connection with a first network access node, means for transmitting and receiving data over a second radio access connection with a second network access node, wherein the first radio access connection and the second radio access connection are based on different radio access technologies, means for establishing a forwarding link that instructs the first network access node to re-route data intended for the first radio access connection to the second radio access connection, and means for receiving data for the first radio access connection and the second radio access connection over the second radio access connection.

Example 106 is a method of performing radio communications at a terminal device, the method including transmitting and receiving data over a first radio access connection with a first network access node, transmitting and receiving data over a second radio access connection with a second network access node, wherein the first radio access connection and the second radio access connection are based on different radio access technologies, establishing a forwarding link that instructs the first network access node to re-route data intended for the first radio access connection to the second radio access connection, and receiving data for the first radio access connection and the second radio access connection over the second radio access connection.

In Example 107, the subject matter of Example 106 can optionally include wherein establishing the forwarding link that instructs the first network access node to re-route data intended for the first radio access connection to the second radio access connection includes transmitting a forwarding setup instruction to the first network access node that specifies a forwarding address for the data intended for the first radio access connection.

In Example 108, the subject matter of Example 107 can optionally include wherein transmitting the forwarding setup instruction to the first network access node includes transmitting the forwarding setup instruction to the first network access node over the first radio access connection.

In Example 109, the subject matter of Example 107 or 108 can optionally include wherein the first radio access connection comprises a first terminal-side network address and the second radio access connection comprises a second terminal-side network address, and wherein the control circuit is configured to provide the second terminal-side network address as the forwarding address.

In Example 110, the subject matter of Example 109 can optionally include wherein the first terminal-side network address and the second terminal-side network address are Internet Protocol (IP) addresses.

In Example 111, the subject matter of any one of Examples 106 to 110 can optionally include wherein receiving data for the first radio access connection and the second radio access connection over the second radio access connection includes receiving data for the first radio access connection and the second radio access connection from the second network access node.

In Example 112, the subject matter of any one of Examples 106 to 111 can optionally further include deactivating the forwarding link to instruct the first network access node to provide further data intended for the first radio access connection over the first radio access connection.

In Example 113, the subject matter of Example 112 can optionally further include receiving the further data from the first network access node over the first radio access connection after the forwarding link is deactivated.

In Example 114, the subject matter of Example 112 or 113 can optionally include wherein deactivating the forwarding link includes re-connecting the first radio access connection with the first network access node and transmitting a forwarding deactivation instruction to the first network access node over the re-connected first radio access connection via the first radio circuit.

In Example 115, the subject matter of any one of Examples 106 to 113 can optionally further include identifying the data intended for the first radio access connection that was re-routed over the second radio access connection and controlling the first radio access connection based on the identified data.

In Example 116, the subject matter of Example 115 can optionally further include identifying a paging message in the identified data, wherein controlling the first radio access connection based on the identified data includes re-connecting the first radio access connection with the first network access node, transmitting a forwarding deactivation instruction to the first network access node over the re-connected first radio access connection, and receiving further data indicated in the paging message from the first network access node over the re-connected first radio access connection.

In Example 117, the subject matter of Example 115 can optionally further include determining that further data intended for the first radio access connection is scheduled to be re-routed over the second radio access connection, wherein controlling the first radio access connection based on the identified data includes determining whether or not to re-connect the first radio access connection based on an amount of the further data.

In Example 118, the subject matter of Example 115 can optionally further include identifying a paging message in the identified data, wherein controlling the first radio access connection based on the identified data includes identifying that the first network access node is currently unavailable, establishing a new radio access connection with a third network access node of the first radio access technology, receiving further data indicated in the paging message from the third network access node over the new radio access connection, and transmitting a forwarding deactivation instruction for the first network access node over the new radio access connection via the third network access node.

In Example 119, the subject matter of any one of Examples 106 to 118 can optionally further include before establishing the forwarding link, selecting the first radio access and the second radio access connection from a plurality of radio access connections.

In Example 120, the subject matter of any one of Examples 106 to 118 can optionally further include before establishing the forwarding link, evaluating a plurality of radio access connections according to a predefined criteria and selecting the first radio access connection and the second radio access connection from the plurality of radio access connections based on the evaluation.

In Example 121, the subject matter of Example 120 can optionally include wherein the predefined criteria is based on power consumption, expected traffic, traffic activity patterns, usage profiles, delay and latency criteria, data security requirements, network coverage area, or network transmitter range.

In Example 122, the subject matter of any one of Examples 106 to 121 can optionally further include placing a first radio circuit used to transmit and receive data for the first radio access connection in an inactive or reduced power state after the forwarding link is established.

In Example 123, the subject matter of any one of Examples 106 to 122 can optionally include wherein the first radio access connection and the second radio access connection are selected from a group consisting of Long Term Evolution (LTE), Universal Mobile Telecommunications System (UMTS), Global System for Mobile Communications (GSM), WiFi, and Bluetooth.

Example 124 is a radio communication terminal device including a radio transceiver and modem configured to perform the method of any one of Examples 106 to 123.

Example 125 is a communication device including one or more processors configured to perform the method of any one of Examples 106 to 124.

Example 126 is a non-transitory computer readable medium storing instructions that when executed by a processor of a radio communication terminal device direct the radio communication terminal device to perform the method of any one of Examples 106 to 126.

Example 127 is a communication device including a first radio circuit configured to support a first radio access technology, a second radio circuit configured to support a second radio access technology, a common discovery circuit configured to receive discovery information for the first radio access technology and the second radio access technology from a common discovery channel, wherein the discovery information is encoded onto one or more discovery signals according to the same signal format, and a controller configured to control the first radio circuit or the second radio circuit based on the discovery information.

In Example 128, the subject matter of Example 127 can optionally include wherein the second radio access technology is different from the first radio access technology.

In Example 129, the subject matter of Example 127 or 128 can optionally include wherein the first radio circuit, the second radio circuit, and the common discovery circuit are hardware-defined or software-defined circuitry.

In Example 130, the subject matter of any one of Examples 127 to 129 can optionally include wherein the first radio circuit, the second radio circuit, and the common discovery circuit are part of a radio transceiver or a baseband modem.

In Example 131, the subject matter of any one of Examples 127 to 130 can optionally include wherein the common discovery circuit is configured to decode the discovery information for the first radio access technology and the second radio access technology from the common discovery channel according to the same signal format.

In Example 132, the subject matter of any one of Examples 127 to 131 can optionally include wherein the common discovery circuit is configured to receive a first discovery signal on the common discovery channel comprising the discovery information for the first radio access technology and to receive a second discovery signal on the common discovery channel comprising the discovery information for the second radio access technology, wherein the first discovery signal and the second discovery signal are encoded according to the signal format.

In Example 133, the subject matter of Example 132 can optionally include wherein the common discovery circuit is configured to receive the first discovery signal from a first network access node and configured to receive the second discovery signal from a second network access node, wherein the discovery information in the first discovery signal is unique to the first network access node and the discovery information in the second discovery signal is unique to the second network access node.

In Example 134, the subject matter of Example 133 can optionally include wherein the first network access node is different from the second network access node.

In Example 135, the subject matter of Example 133 or 134 can optionally include wherein the discovery information in the second discovery signal is unique to the second network access node in terms of format or scheduling.

In Example 136, the subject matter of any one of Examples 127 to 135 can optionally include wherein the one or more discovery signals are a common discovery signal comprising the discovery information for the first radio access technology and the second radio access technology.

In Example 137, the subject matter of Example 136 can optionally include wherein the discovery information for both the first radio access technology and the second radio access technology are encoded on the common discovery signal according to the signal format.

In Example 138, the subject matter of Example 136 or 137 can optionally include wherein the common discovery circuit is configured to receive the common discovery signal from a single network access node.

In Example 139, the subject matter of any one of Examples 127 to 138 can optionally include wherein the discovery information for the first radio access technology and the second radio access technology includes discovery information for one or more network access nodes of the first radio access technology and the second radio access technology.

In Example 140, the subject matter of Example 139 can optionally include wherein the controller is configured to select a target network access node from the one or more network access nodes and configured to establish a radio access connection with the target network access node via the first radio circuit or the second radio circuit based on the discovery information for the first radio access technology or the second radio access technology.

In Example 141, the subject matter of Example 140 can optionally include wherein the controller is can optionally include to select the target network access node based on geographic location information of the one or more network access nodes in the discovery information for the first radio access technology or the second radio access technology.

In Example 142, the subject matter of any one of Examples 127 to 141 can optionally include wherein the controller is configured to operate a radio access connection with the first radio circuit or the second radio circuit according to the discovery information.

In Example 143, the subject matter of any one of Examples 127 to 136 can optionally include wherein the discovery information includes access information for one or more network access nodes, the controller further configured to communicate with or control the one or more network access nodes via the first radio circuit or the second radio circuit depending on the discovery information.

In Example 144, the subject matter of Example 143 can optionally include wherein the controller is configured to communicate with or control the one or more network access nodes via the first radio circuit or the second radio circuit by receiving data from the one or more network access nodes, establishing a radio access connection with the one or more network access nodes, or performing radio measurements on the one or more network access nodes.

In Example 145, the subject matter of any one of Examples 127 to 144 can optionally include wherein the discovery information includes frequency band and center frequency channel information, channel bandwidth information, service provider information, geographic location information, data rate information, public or private status information, authentication type information, capability information, radio measurement information, or performance metric information.

In Example 146, the subject matter of Example 145 can optionally include wherein the geographic location information includes geopositional information that indicates an absolute position of the one or more network access nodes or a relative position of the one or more network access nodes.

In Example 147, the subject matter of any one of Examples 127 to 146 can optionally include wherein the controller is configured to identify incorrect information in the discovery information and to report the incorrect information to a specific network access node.

In Example 148, the subject matter of any one of Examples 127 to 147 can optionally include wherein the first radio access technology and the second radio access technology are selected from the group consisting of Long Term Evolution (LTE), Universal Mobile Telecommunications System (UMTS), Global System for Mobile Communications (GSM), WiFi, Bluetooth, millimeter Wave (mmWave), WiGig, and Fifth Generation (5G).

In Example 149, the subject matter of any one of Examples 127 to 148 can optionally further include an antenna array and configured as a radio communication terminal device.

Example 150 is a network access node including a control circuit configured to generate a common discovery signal including discovery information for a plurality of network access nodes of different radio access technologies, and a radio circuit configured to broadcast the common discovery signal on a common discovery channel.

In Example 151, the subject matter of Example 150 can optionally include wherein the control circuit is a processor configured to retrieve and execute software-defined instructions that control operation of the control circuit.

In Example 152, the subject matter of Example 150 or 151 can optionally include wherein the radio circuit includes radio transceiver circuitry.

In Example 153, the subject matter of any one of Examples 150 to 152 can optionally include wherein the control circuit and the radio circuit are hardware-defined circuitry or software-defined circuitry.

In Example 154, the subject matter of any one of Examples 150 to 153 can optionally further include a detection circuit configured to collect the discovery information for the plurality of network access nodes.

In Example 155, the subject matter of Example 154 can optionally include wherein the detection circuit is configured to collect the discovery information for the plurality of network access nodes by receiving a radio access technology (RAT)-specific discovery signal from each of the plurality of network access nodes and extracting the discovery information from the RAT-specific discovery signals.

In Example 156, the subject matter of Example 154 or 155 can optionally include wherein the control circuit is configured to connect to one or more of the plurality of network access nodes via a backhaul interface, wherein the detection circuit is configured to collect the discovery information for the plurality of network access nodes via the backhaul link.

In Example 157, the subject matter of any one of Examples 154 to 156 can optionally include wherein the detection circuit is configured to receive the discovery information for the plurality of network access nodes from a database.

In Example 158, the subject matter of any one of Examples 154 to 157 can optionally include wherein the detection circuit is configured to receive the discovery information for the plurality of network access nodes from one or more terminal devices served by the network access node.

In Example 159, the subject matter of Example 158 can optionally include wherein the control circuit is configured to request the discovery information for the plurality of network access nodes from the one or more terminal devices.

In Example 160, the subject matter of any one of Examples 150 to 159 can optionally include wherein the discovery information includes discovery information for the first network access node or the second network access node.

In Example 161, the subject matter of any one of Examples 150 to 160 can optionally include wherein the control circuit is configured to generate the common discovery signal according to a predefined discovery signal format.

In Example 162, the subject matter of any one of Examples 150 to 161 can optionally include wherein the discovery information includes frequency band and center frequency channel information, channel bandwidth information, service provider information, geographic location information, data rate information, public or private status information, authentication type information, capability information, radio measurement information, or performance metric information.

In Example 163, the subject matter of Example 162 can optionally include wherein the geographic location information includes geopositional information that indicates an absolute position of the network access node or a relative position of the network access node.

In Example 164, the subject matter of any one of Examples 150 to 163 can optionally include wherein the control circuit is configured to control the radio circuit to broadcast the common discovery signal on the common discovery channel according to a listen-before-talk or a contention-based channel access scheme.

In Example 165, the subject matter of any one of Examples 150 to 164 can optionally include wherein the radio circuit is configured to share the common discovery channel with one or more further network access nodes.

In Example 166, the subject matter of any one of Examples 150 to 165 can optionally include wherein the control circuit is configured to include geographic location information for the plurality of network access nodes with the discovery information in the common discovery signal.

In Example 167, the subject matter of any one of Examples 150 to 166 can optionally include wherein the control circuit is further configured to operate one or more radio access connections according to Long Term Evolution (LTE), Universal Mobile Telecommunications System (UMTS), Global System for Mobile Communications (GSM), WiFi, millimeter wave (mmWave), WiGiG, Fifth Generation (5G), and Bluetooth.

Example 168 is a network access node including a control circuit configured to generate a discovery signal, and a radio circuit configured to broadcast the discovery signal on a common discovery channel comprising discovery information, encoded with the same signal format, for multiple network access nodes of different radio access technologies.

In Example 169, the subject matter of Example 168 can optionally include wherein the control circuit and the radio circuit are hardware-defined or software-defined circuitry.

In Example 170, the subject matter of Example 168 or 169 can optionally include wherein the control circuit is a processor configured to retrieve and execute software-defined instructions that control operation of the control circuit.

In Example 171, the subject matter of any one of Examples 168 to 170 can optionally include wherein the radio circuit is a radio transceiver.

In Example 172, the subject matter of any one of Examples 168 to 171 can optionally include wherein the control circuit is configured to generate the discovery signal by encoding discovery information for a plurality of network access nodes according to the signal format.

In Example 173, the subject matter of Example 172 can optionally further include a detection circuit configured to collect the discovery information for the plurality of network access nodes.

In Example 174, the subject matter of Example 173 can optionally include wherein the detection circuit is configured to collect the discovery information for the plurality of network access nodes by receiving a radio access technology (RAT)-specific discovery signal from each of the plurality of network access nodes and extracting the discovery information from the RAT-specific discovery signals.

In Example 175, the subject matter of Example 173 or 174 can optionally include wherein the circuit is configured to connect to one or more of the plurality of network access nodes via a backhaul interface, wherein the detection circuit is configured to collect the discovery information for the plurality of network access nodes via the backhaul link.

In Example 176, the subject matter of any one of Examples 173 to 175 can optionally include wherein the detection circuit is configured to receive the discovery information for the plurality of network access nodes from a database.

In Example 177, the subject matter of any one of Examples 173 to 176 can optionally include wherein the detection circuit is configured to receive the discovery information for the plurality of network access nodes from one or more terminal devices served by the network access node.

In Example 178, the subject matter of Example 177 can optionally include wherein the control circuit is configured to request the discovery information for the plurality of network access nodes from the one or more terminal devices.

In Example 179, the subject matter of any one of Examples 168 to 178 can optionally include wherein the discovery information includes discovery information for the network access node.

In Example 180, the subject matter of any one of Examples 168 to 171 can optionally include wherein the discovery signal comprises discovery information exclusively for the network access node.

In Example 181, the subject matter of any one of Examples 168 to 180 can optionally include wherein the discovery information includes frequency band and center frequency channel information, channel bandwidth information, service provider information, geographic location information, data rate information, public or private status information, authentication type information, capability information, radio measurement information, or performance metric information.

In Example 182, the subject matter of Example 181 can optionally include wherein the geographic location information includes geopositional information that indicates an absolute position of the network access node or a relative position of the network access node.

In Example 183, the subject matter of any one of Examples 168 to 182 can optionally include wherein the control circuit is configured to control the radio circuit to broadcast the discovery signal on the common discovery channel according to a listen-before-talk or a contention-based channel access scheme.

In Example 184, the subject matter of any one of Examples 168 to 183 can optionally include wherein the radio circuit is configured to share the common discovery channel with one or more other broadcasting network access nodes that each broadcast a respective discovery signal.

In Example 185, the subject matter of Example 184 can optionally include wherein the radio circuit is configured to share the common discovery channel with the one or more other broadcasting network access nodes according to according to a listen-before-talk or a contention-based channel access scheme.

In Example 186, the subject matter of any one of Examples 168 to 185 can optionally include wherein the control circuit is configured to include geographic location information for the plurality of network access nodes with the discovery information in the discovery signal.

In Example 187, the subject matter of any one of Examples 168 to 186 can optionally include wherein the control circuit is further configured to operate one or more radio access connections according to Long Term Evolution (LTE), Universal Mobile Telecommunications System (UMTS), Global System for Mobile Communications (GSM), WiFi, millimeter Wave (mmWave), WiGiG, Fifth Generation (5G), or Bluetooth.

In Example 188, the subject matter of any one of Examples 168 to 187 can optionally further include one or more antennas and configured as a cellular base station or Wireless Local Area Network (WLAN) access point.

Example 189 is a communication device including a first radio circuit configured to support a first radio access connection with a first network access node, a second radio circuit configured to support a second radio access connection with a second network access node, wherein the first radio access connection and the second radio access connection are for different radio access technologies, and a control circuit configured to establish a forwarding link that instructs the first network access node to re-route data intended for the first radio access connection to the second radio access connection, the second radio circuit further configured to receive data for the first radio access connection and the second radio access connection over the second radio access connection.

In Example 190, the subject matter of Example 189 can optionally include wherein the first radio circuit and the second radio circuit include radio transceiver or modem components.

In Example 191, the subject matter of Example 189 or 190 can optionally include wherein the control circuit is a processor configured to retrieve and execute software-defined instructions that control operation of the control circuit.

In Example 192, the subject matter of any one of Examples 189 to 191 can optionally include wherein the first radio circuit, the second radio circuit, and the control circuit are hardware-defined circuitry or software-defined circuitry.

In Example 193, the subject matter of any one of Examples 189 to 192 can optionally further include one or more antennas and configured as a radio communication terminal device.

In Example 194, the subject matter of any one of Examples 189 to 193 can optionally include wherein the control circuit is configured to establish the forwarding link that instructs the first network access node to re-route data intended for the first radio access connection to the second radio access connection by transmitting a forwarding setup instruction to the first network access node that specifies a forwarding address for the data intended for the first radio access connection.

In Example 195, the subject matter of Example 194 can optionally include wherein the control circuit is configured to transmit the forwarding setup instruction to the first network access node over the first radio access connection via the first radio circuit.

In Example 196, the subject matter of Example 194 or 195 can optionally include where the first radio access connection comprises a first terminal-side network address and the second radio access connection comprises a second terminal-side network address, and wherein the control circuit is configured to provide the second terminal-side network address as the forwarding address.

In Example 197, the subject matter of Example 196 can optionally include wherein the first terminal-side network address and the second terminal-side network address are Internet Protocol (IP) addresses.

In Example 198, the subject matter of any one of Examples 189 to 197 can optionally include wherein the second radio circuit is configured to receive the data for the first radio access connection and the second radio access connection from the second network access node.

In Example 199, the subject matter of any one of Examples 189 to 195 can optionally include wherein the control circuit is further configured to deactivate the forwarding link to instruct the first network access node to provide further data intended for the first radio access connection over the first radio access connection.

In Example 200, the subject matter of Example 199 can optionally include wherein the first radio circuit is configured to receive the further data from the first network access node over the first radio access connection after the forwarding link is deactivated.

In Example 201, the subject matter of Example 199 or 200 can optionally include wherein the control circuit is configured to deactivate the forwarding link to instruct the first network access node to provide data intended for the first radio access connection over the first radio access connection by re-connecting the first radio access connection with the first network access node and transmitting a forwarding deactivation instruction to the first network access node over the re-connected first radio access connection via the first radio circuit.

In Example 202, the subject matter of any one of Examples 189 to 201 can optionally include wherein the control circuit is configured to identify the data intended for the first radio access connection that was re-routed over the second radio access connection and to control the first radio access connection based on the identified data.

In Example 203, the subject matter of Example 202 can optionally include wherein the control circuit is further configured to identify a paging message in the identified data and configured to control the first radio access connection based on the identified data by re-connecting the first radio access connection with the first network access node, transmitting a forwarding deactivation instruction to the first network access node over the re-connected first radio access connection, and receiving further data indicated in the paging message from the first network access node over the re-connected first radio access connection.

In Example 204, the subject matter of Example 202 can optionally include wherein the control circuit is further configured to determine that further data intended for the first radio access connection is scheduled to be re-routed over the second radio access connection, and wherein the control circuit is configured to control the first radio access connection based on the identified data by determining whether or not to re-connect the first radio access connection based on an amount of the further data.

In Example 205, the subject matter of Example 202 can optionally include wherein the control circuit is further configured to identify a paging message in the identified data and configured to control the first radio access connection based on the identified data by identifying that the first network access node is currently unavailable, establishing a new radio access connection with a third network access node of the first radio access technology via the first radio circuit, receiving further data indicated in the paging message from the third network access node over the new radio access connection, and transmitting a forwarding deactivation instruction for the first network access node over the new radio access connection via the third network access node.

In Example 206, the subject matter of Example 189 can optionally include wherein the control circuit is further configured to identify pending uplink data for the first radio access connection, transmit an access request message to the first network access node via the forwarding link to re-establish the first radio access connection with the first network access node, and transmit the pending uplink data to the first network access node via the first radio access connection.

In Example 207, the subject matter of any one of Examples 189 to 206 can optionally include wherein the control circuit is configured to, before establishing the forwarding link, selecting the first radio access connection and the second radio access connection from a plurality of radio access connections.

In Example 208, the subject matter of any one of Examples 189 to 206 can optionally include wherein the control circuit is configured to, before establishing the forwarding link, evaluate a plurality of radio access connections according to a predefined criteria and select the first radio access connection and the second radio access connection from the plurality of radio access connections based on the evaluation.

In Example 209, the subject matter of Example 208 can optionally include wherein the predefined criteria is based on power consumption, expected traffic, traffic activity patterns, usage profiles, delay and latency criteria, data security requirements, network coverage area, or network transmitter range.

In Example 210, the subject matter of any one of Examples 189 to 205 can optionally include wherein the control circuit is configured to, before establishing the forwarding link, evaluate a plurality of radio access connections and select a short-range radio access connection from the plurality of radio access connections as the first radio access connection and select a cellular radio access connection from the plurality of radio access connections as the second radio access connection.

In Example 211, the subject matter of Example 210 can optionally include wherein the first radio access connection is a WiFi or Bluetooth connection and the second radio access connection is a 4GPP cellular radio access connection.

In Example 212, the subject matter of any one of Examples 189 to 205 can optionally include wherein the control circuit is configured to, before establishing the forwarding link, evaluate a plurality of radio access connections and select an idle radio access connection from the plurality of radio access connections as the first radio access connection.

In Example 213, the subject matter of any one of Examples 189 to 212 can optionally include wherein the first radio circuit is configured to enter an inactive or reduced power state after the forwarding link is established.

In Example 214, the subject matter of any one of Examples 189 to 213 can optionally include wherein the first radio access connection and the second radio access connection are selected from a group consisting of Long Term Evolution (LTE), Universal Mobile Telecommunications System (UMTS), Global System for Mobile Communications (GSM), WiFi, WiGig, millimeter Wave (mmWave), Fifth Generation (5G), and Bluetooth.

Example 215 is a network access node including a radio circuit configured to support a radio access connection of a first radio access technology with a terminal device and configured to receive a forwarding setup instruction from the terminal device specifying an alternate network address, wherein the alternate network address is associated with a second radio access technology different from the first radio access technology, and a control circuit configured to re-route data addressed to the terminal device to the alternate network address.

In Example 216, the subject matter of Example 215 can optionally include wherein the radio circuit includes radio transceiver components and modem components.

In Example 217, the subject matter of Example 215 or 216 can optionally include wherein the control circuit is a processor configured to retrieve and execute software-defined instructions that control operation of the processor.

In Example 218, the subject matter of any one of Examples 215 to 217 can optionally include wherein the radio circuit and the control circuit are hardware-defined or software-defined circuitry.

In Example 219, the subject matter of any one of Examples 215 to 218 can optionally include wherein the control circuit is configured to re-route data addressed to the terminal device to the alternate network address by identifying incoming data addressed to the terminal device at an original network address of the terminal device, re-addressing the identified data according to the alternate network address, and routing the re-addressed data to the terminal device according to the alternate network address via another network access node of the second radio access technology.

In Example 220, the subject matter of any one of Examples 215 to 219 can optionally include wherein the control circuit is configured to re-route data addressed to the terminal device to the alternate network address by checking whether incoming data is addressed to an original network address of the terminal device, and re-routing incoming data addressed to the original network address to the alternate network address.

In Example 221, the subject matter of any one of Examples 215 to 220 can optionally include wherein the control circuit is configured to register the alternate network address and an original network address of the terminal device in a database, compare an address of incoming data to the database to identify the data addressed to the terminal device.

In Example 222, the subject matter of any one of Examples 215 to 221 can optionally include wherein the radio circuit is further configured to receive a forwarding modification instruction from the terminal device that specifies a different alternate network address, the control circuit further configured to re-route data addressed to the terminal device to the different alternate network address.

In Example 223, the subject matter of any one of Examples 215 to 222 can optionally include wherein the radio circuit is further configured to receive a forwarding deactivation instruction from the terminal device, the control circuit further configured to stop re-routing data addressed to the terminal device to the alternate network address after the forwarding deactivation instruction is received.

In Example 224, the subject matter of Example 223 can optionally include wherein the control circuit is configured to control the radio circuit to transmit data addressed to the terminal device over the radio access connection.

In Example 225, the subject matter of any one of Examples 215 to 222 can optionally include wherein the radio circuit is configured to refrain from transmitting data to the terminal device over the radio access connection until receiving a forwarding deactivation instruction from the terminal device.

In Example 226, the subject matter of any one of Examples 215 to 225 can optionally include wherein the alternate network address is an Internet Protocol (IP) address.

In Example 227, the subject matter of any one of Examples 215 to 226 can optionally further include a backhaul link configured to receive the data addressed to the terminal device from a core network.

In Example 228, the subject matter of any one of Examples 215 to 227 can optionally further include one or more antennas and configured as a cellular base station or Wireless Local Area Network (WLAN) access point.

In Example 229, the subject matter of any one of Examples 215 to 228 can optionally include wherein the first radio access technology and the second radio access technology are each one of a Long Term Evolution (LTE), Universal Mobile Telecommunications System (UMTS), Global System for Mobile Communications (GSM), WiFi, or Bluetooth radio access connection.

Example 230 is a device including means for identifying an operational profile of the terminal device based on a power requirement or a connection requirement of the terminal device, means for selecting a channel type from a plurality of channel types, means for identifying, based on the operational profile, a physical channel configuration for the channel type from a plurality of physical channel configurations associated with a radio access network, and means for transmitting or receiving data according to the physical channel configuration.

Example 231 is a method of operating a terminal device, the method including identifying an operational profile of the terminal device based on a power requirement or a connection requirement of the terminal device, selecting a channel type from a plurality of channel types, identifying, based on the operational profile, a physical channel configuration for the channel type from a plurality of physical channel configurations associated with a radio access network, and transmitting or receiving data according to the physical channel configuration.

In Example 232, the subject matter of Example 231 can optionally include wherein the power requirement is a power-efficiency requirement of the terminal device.

In Example 233, the subject matter of Example 231 or 232 can optionally include wherein the data connection is requirement is a latency requirement or a reliability requirement of a connection of an application of the terminal device.

In Example 234, the subject matter of any one of Examples 231 to 233 can optionally include wherein the channel type is a paging channel, a random access channel, a control channel, or a traffic data channel.

In Example 235, the subject matter of any one of Examples 231 to 234 can optionally include wherein the plurality of physical channel configurations include a first physical channel configuration of the channel type and a second physical channel configuration of the channel type, wherein the first physical channel configuration and the second physical channel configuration are simultaneously available from the radio access network.

In Example 236, the subject matter of Example 235 can optionally include wherein the first physical channel configuration has a power-efficiency level different from the second physical channel configuration.

In Example 237, the subject matter of Example 235 can optionally include wherein the first physical channel configuration has a latency level different from the second physical channel configuration.

In Example 238, the subject matter of Example 235 can optionally include wherein the first physical channel configuration has a reliability level different from the second physical channel configuration.

In Example 239, the subject matter of any one of Examples 235 to 238 can optionally include wherein the first physical channel configuration is associated with a first radio access technology and the second physical channel configuration is associated with a second radio access technology different from the first radio access technology.

In Example 240, the subject matter of any one of Examples 231 to 239 can optionally further include prior to identifying the physical channel configuration, receiving channel configuration information from the radio access network that identifies the plurality of physical channel configurations.

In Example 241, the subject matter of Example 240 can optionally include wherein receiving the channel configuration information from the radio access network includes receiving the channel configuration information from the radio access network as broadcast information.

In Example 242, the subject matter of any one of Examples 231 to 241 can optionally include wherein each of the plurality of physical channel configurations has a different power-efficiency level and wherein the operational profile indicates a power efficiency requirement, and wherein identifying the physical channel configuration for the channel type includes selecting a physical channel configuration from the plurality of physical channel configurations that meets the power efficiency requirement as the physical channel configuration.

In Example 243, the subject matter of any one of Examples 231 to 242 can optionally include wherein each of the plurality of physical channel configurations has a different reliability level and wherein the operational profile indicates a reliability requirement, and wherein identifying the physical channel configuration for the channel type includes selecting a physical channel configuration from the plurality of physical channel configurations that meets the reliability requirement as the physical channel configuration.

In Example 244, the subject matter of any one of Examples 231 to 243 can optionally include wherein each of the plurality of physical channel configurations has a different latency level and wherein the operational profile indicates a latency requirement, and wherein identifying the physical channel configuration for the channel type includes selecting a physical channel configuration from the plurality of physical channel configurations that meets the latency requirement as the physical channel configuration.

In Example 245, the subject matter of any one of Examples 231 to 241 can optionally include wherein each of the plurality of physical channel configurations have a different power-efficiency level, a different latency level, or a different reliability level, and wherein identifying the physical channel configuration for the channel type includes selecting the physical channel configuration from the plurality of physical channel configurations based on a power-efficiency requirement, a latency requirement, or a reliability requirement of the operational profile.

In Example 246, the subject matter of any one of Examples 231 to 241 can optionally include wherein identifying the physical channel configuration for the channel type includes prior to identifying the physical channel configuration, reporting the operational profile to the radio access network, and in response to the reporting, receiving a control message that specifies the physical channel configuration.

In Example 247, the subject matter of any one of Examples 231 to 241 can optionally further include prior to identifying the physical channel configuration, requesting channel configuration information from the radio access network, and in response to the requesting, receiving a control message containing configuration information for the plurality of physical channel configurations.

In Example 248, the subject matter of any one of Examples 231 to 247 can optionally further include prior to transmitting or receiving data according to the physical channel configuration, notifying the radio access network of the physical channel configuration.

In Example 249, the subject matter of any one of Examples 231 to 247 can optionally include wherein the channel type is a random access channel and wherein the physical channel configuration is a random access channel configuration that is restricted to a specific set of terminal devices.

In Example 250, the subject matter of any one of Examples 231 to 249 can optionally include wherein the channel type is a paging channel, and wherein transmitting or receiving data according to the physical channel configuration includes receiving a paging message on a first radio access technology according to the physical channel configuration, and responding to the paging message on a second radio access technology different from the first radio access technology.

Example 251 is a radio communication device that includes a processor and a radio transceiver and is configured to perform the method of any one of Examples 231 to 250.

Example 252 is a non-transitory computer readable medium storing instructions that when executed by a controller of a terminal device cause the terminal device to perform the method of any one of Examples 231 to 250.

Example 253 is a device including means for providing a plurality of physical channel configurations of a specific channel type over the radio access network, wherein the specific channel type is a traffic data channel, a control channel, a random access channel, or a paging channel, means for receiving a request to utilize a first physical channel configuration of the plurality of physical channel configurations from a terminal device, and means for transmitting data to the terminal device or receiving data from the terminal device according to the first physical channel configuration.

Example 254 is a method of operating one or more network access nodes of a radio access network, the method including providing a plurality of physical channel configurations of a specific channel type over the radio access network, wherein the specific channel type is a traffic data channel, a control channel, a random access channel, or a paging channel, receiving a request to utilize a first physical channel configuration of the plurality of physical channel configurations from a terminal device, and transmitting data to the terminal device or receiving data from the terminal device according to the first physical channel configuration.

In Example 255, the subject matter of Example 254 can optionally include wherein the plurality of physical channel configurations include the first physical channel configuration and a second physical channel configuration, and wherein providing the plurality of physical channel configurations of the specific channel type includes simultaneously providing the first physical channel configuration and the second physical channel configuration over the radio access network.

In Example 256, the subject matter of Example 255 can optionally include wherein the first physical channel configuration has a different power-efficiency level than the second physical channel configuration.

In Example 257, the subject matter of Example 255 can optionally include wherein the first physical channel configuration has a latency level different from the second physical channel configuration.

In Example 258, the subject matter of Example 255 can optionally include wherein the first physical channel configuration has a reliability level different from the second physical channel configuration.

In Example 259, the subject matter of any one of Examples 255 to 258 can optionally include wherein the first physical channel configuration is associated with a first radio access technology and the second physical channel configuration is associated with a second radio access technology different from the first radio access technology.

In Example 260, the subject matter of any one of Examples 255 to 258 can optionally include wherein the one or more network access nodes include a first network access node of a first radio access technology and a second network access node of a second radio access technology, and wherein providing a plurality of physical channel configurations of a specific channel type over the radio access network includes providing the first physical channel configuration with the first network access node and providing the second physical channel configuration with the second network access node.

In Example 261, the subject matter of any one of Examples 254 to 260 can optionally further include prior to receiving the request to utilize the first physical channel configuration from the terminal device, broadcasting channel configuration information for the plurality of physical channel configurations.

In Example 262, the subject matter of any one of Examples 254 to 261 can optionally further include prior to receiving the request to utilize the first physical channel configuration from the terminal device, receiving an operational profile report from the terminal device that indicates a power requirement or a connection requirement of the terminal device.

In Example 263, the subject matter of Example 262 can optionally further include selecting one or more physical channel configurations from the plurality of physical channel configurations based on the operational profile report, and providing configuration information for one or more of the one or more selected physical channel configurations to the terminal device.

In Example 264, the subject matter of Example 262 can optionally include wherein each of the plurality of physical channel configurations has a different power-efficiency level and wherein the operational profile report indicates a power efficiency requirement, the method further including selecting a physical channel configuration from the plurality of physical channel configurations that meets the power efficiency requirement as the first physical channel configuration, and providing configuration information for the first physical channel configuration to the terminal device.

In Example 265, the subject matter of Example 262 can optionally include wherein each of the plurality of physical channel configurations has a different latency level and wherein the operational profile report indicates a latency requirement, the method further including selecting a physical channel configuration from the plurality of physical channel configurations that meets the latency requirement as the first physical channel configuration, and providing configuration information for the first physical channel configuration to the terminal device.

In Example 266, the subject matter of Example 262 can optionally include wherein each of the plurality of physical channel configurations has a different reliability level and wherein the operational profile report indicates a reliability requirement, the method further including selecting a physical channel configuration, from the plurality of physical channel configurations that meets the reliability requirement as the first physical channel configuration, and providing configuration information for the first physical channel configuration to the terminal device.

In Example 267, the subject matter of Example 262 can optionally include wherein each of the plurality of physical channel configurations have a different power-efficiency level, a different latency level, or a different reliability level, the method further including selecting the first physical channel configuration from the plurality of physical channel configurations based on a power-efficiency requirement, a latency requirement, or a reliability requirement of the operational profile.

Example 268 is a radio communication device that includes a processor and a radio transceiver and is configured to perform the method of any one of Examples 231 to 250.

Example 269 is a non-transitory computer readable medium storing instructions that when executed by a controller of a network access node cause the network access node to perform the method of any one of Examples 231 to 250.

Example 270 is a communication device including a controller configured to identify an operational profile of the terminal device that indicates a power requirement or a connection requirement of the terminal device, select a channel type from a plurality of channel types, and identify, based on the operational profile, a physical channel configuration for the channel type from a plurality of physical channel configurations associated with a radio access network, and a radio transceiver configured to transmit or receive data according to the physical channel configuration.

In Example 271, the subject matter of Example 270 can optionally further include a baseband modem that includes the controller and a physical layer module, wherein the controller is configured to direct radio communication operations of the communication device.

In Example 272, the subject matter of Example 270 or 271 can optionally further include one or more antennas and configured as a radio communication terminal device.

In Example 273, the subject matter of any one of Examples 270 to 272 can optionally include wherein the channel type is a paging channel, a random access channel, a control channel, or a traffic data channel.

In Example 274, the subject matter of any one of Examples 270 to 273 can optionally include wherein the power requirement is a power-efficiency requirement of the terminal device.

In Example 275, the subject matter of any one of Examples 270 to 274 can optionally include wherein the data connection requirement is a latency requirement or a reliability requirement of a connection of an application of the terminal device.

In Example 276, the subject matter of any one of Examples 270 to 273 can optionally include wherein the plurality of physical channel configurations include a first physical channel configuration of the channel type and a second physical channel configuration of the channel type, wherein the first physical channel configuration and the second physical channel configuration are simultaneously available from the radio access network.

In Example 277, the subject matter of Example 276 can optionally include wherein the first physical channel configuration has a power-efficiency level different from the second physical channel configuration.

In Example 278, the subject matter of Example 276 can optionally include wherein the first physical channel configuration has a latency level different from the second physical channel configuration.

In Example 279, the subject matter of Example 276 can optionally include wherein the first physical channel configuration has a reliability level different from the second physical channel configuration.

In Example 280, the subject matter of any one of Examples 276 to 279 can optionally include wherein the first physical channel configuration is associated with a first radio access technology and the second physical channel configuration is associated with a second radio access technology different from the first radio access technology.

In Example 281, the subject matter of any one of Examples 270 to 280 can optionally include wherein the radio transceiver is further configured to prior to identifying the physical channel configuration, receive channel configuration information from the radio access network that identifies the plurality of physical channel configurations.

In Example 282, the subject matter of Example 281 can optionally include wherein the radio transceiver is configured to receive the channel configuration information from the radio access network by receiving the channel configuration information from the radio access network as broadcast information.

In Example 283, the subject matter of any one of Examples 270 to 282 can optionally include wherein each of the plurality of physical channel configurations has a different power-efficiency level and wherein the operational profile indicates a power efficiency requirement, and wherein the controller is configured to identify the physical channel configuration for the channel type by selecting a physical channel configuration from the plurality of physical channel configurations that meets the power efficiency requirement as the physical channel configuration.

In Example 284, the subject matter of any one of Examples 270 to 282 can optionally include wherein each of the plurality of physical channel configurations has a different latency level and wherein the operational profile indicates a latency requirement, and wherein the controller is configured to identify the physical channel configuration for the channel type by selecting a physical channel configuration from the plurality of physical channel configurations that meets the latency requirement as the physical channel configuration.

In Example 285, the subject matter of any one of Examples 270 to 282 can optionally include wherein each of the plurality of physical channel configurations has a different reliability level and wherein the operational profile indicates a reliability requirement, and wherein the controller is configured to identify the physical channel configuration for the channel type by selecting a physical channel configuration from the plurality of physical channel configurations that meets the reliability requirement as the physical channel configuration.

In Example 286, the subject matter of any one of Examples 270 to 282 can optionally include wherein each of the plurality of physical channel configurations have a different power-efficiency level, a different latency level, or a different reliability level, and wherein the controller is configured to identify the physical channel configuration for the channel type by selecting the physical channel configuration from the plurality of physical channel configurations based on a power-efficiency requirement, a latency requirement, or a reliability requirement of the operational profile.

In Example 287, the subject matter of any one of Examples 270 to 282 can optionally include wherein the controller is configured to identify the physical channel configuration for the channel type by prior to identifying the physical channel configuration, reporting the operational profile to the radio access network, and in response to the reporting, receiving a control message that specifies the physical channel configuration.

In Example 288, the subject matter of any one of Examples to 282, can optionally include the controller is further configured to prior to identifying the physical channel configuration, request channel configuration information from the radio access network, and in response to the requesting, receive a control message containing configuration information for the plurality of physical channel configurations.

In Example 289, the subject matter of any one of Examples 270 to 288 can optionally include wherein the controller is further configured to prior to transmitting or receiving data according to the physical channel configuration, notify the radio access network of the physical channel configuration.

In Example 290, the subject matter of any one of Examples 270 to 289 can optionally include wherein the channel type is a random access channel and wherein the physical channel configuration is a random access channel configuration that is restricted to a specific set of terminal devices.

In Example 291, the subject matter of any one of Examples 270 to 290 can optionally include wherein the channel type is a paging channel, and wherein the radio transceiver is configured to transmit or receive data according to the physical channel configuration by receiving a paging message on a first radio access technology according to the physical channel configuration, and responding to the paging message on a second radio access technology different from the first radio access technology.

Example 292 is a radio access network system including one or more network access nodes configured to provide a plurality of physical channel configurations of a specific channel type over a radio access network, wherein the specific channel type is a traffic data channel, a control channel, a random access channel, or a paging channel, wherein a first network access node of the one or more network access nodes is configured to receive a request to utilize a first physical channel configuration of the plurality of physical channel configurations from a terminal device, and transmit data to the terminal device or receiving data from the terminal device according to the first physical channel configuration.

In Example 293, the subject matter of Example 292 can optionally include wherein the plurality of physical channel configurations include the first physical channel configuration and a second physical channel configuration, and wherein the one or more network access nodes are configured to simultaneously provide the first physical channel configuration and the second physical channel configuration over the radio access network.

In Example 294, the subject matter of Example 255 can optionally include wherein the first physical channel configuration has a power-efficiency level different from the second physical channel configuration.

In Example 295, the subject matter of Example 255 can optionally include wherein the first physical channel configuration has a latency level different from the second physical channel configuration.

In Example 296, the subject matter of Example 255 can optionally include wherein the first physical channel configuration has a reliability level different from the second physical channel configuration.

In Example 297, the subject matter of any one of Examples 293 to 296 can optionally include wherein the first physical channel configuration is associated with a first radio access technology and the second physical channel configuration is associated with a second radio access technology different from the first radio access technology.

In Example 298, the subject matter of any one of Examples 293 to 296 can optionally include wherein the first network access node is configured to provide the first physical channel configuration according to a first radio access technology and wherein a second network access node of the one or more network access nodes is configured to provide the second physical channel configuration according to a second radio access technology.

In Example 299, the subject matter of any one of Examples 292 to 298 can optionally include wherein the one or more network access nodes are configured to broadcast channel configuration information for the plurality of physical channel configurations over the radio access network.

In Example 300, the subject matter of any one of Examples 292 to 299 can optionally include wherein the first network access node is further configured to prior to receiving the request to utilize the first physical channel configuration from the terminal device, receiving an operational profile report from the terminal device that indicates a power requirement or a connection requirement of the terminal device.

In Example 301, the subject matter of Example 300 can optionally include wherein the first network access node is further configured to select one or more physical channel configurations from the plurality of physical channel configurations based on the operational profile report, and provide configuration information for one or more of the one or more selected physical channel configurations to the terminal device.

In Example 302, the subject matter of Example 300 can optionally include wherein each of the plurality of physical channel configurations has a different power-efficiency level and wherein the operational profile report indicates a power efficiency requirement, wherein the first network access node is further configured to select a physical channel configuration from the plurality of physical channel configurations that meets the power efficiency requirement as the first physical channel configuration, and provide configuration information for the first physical channel configuration to the terminal device.

In Example 303, the subject matter of Example 300 can optionally include wherein each of the plurality of physical channel configurations has a different latency level and wherein the operational profile report indicates a latency requirement, wherein the first network access node is further configured to select a physical channel configuration from the plurality of physical channel configurations that meets the latency requirement as the first physical channel configuration, and provide configuration information for the first physical channel configuration to the terminal device.

In Example 304, the subject matter of Example 300 can optionally include wherein each of the plurality of physical channel configurations has a different reliability level and wherein the operational profile report indicates a reliability requirement, wherein the first network access node is further configured to select a physical channel configuration from the plurality of physical channel configurations that meets the reliability requirement as the first physical channel configuration, and provide configuration information for the first physical channel configuration to the terminal device.

In Example 305, the subject matter of Example 300 can optionally include wherein each of the plurality of physical channel configurations have a different power-efficiency level, a different latency level, or a different reliability level, wherein the first network access node is further configured to select the first physical channel configuration from the plurality of physical channel configurations based on a power-efficiency requirement, a latency requirement, or a reliability requirement of the operational profile.

Example 306 is a device including means for identifying an operational profile of the terminal device based on a device type of the terminal device and a type of application served by the terminal device, means for selecting a channel type from a plurality of channel types, means for identifying, based on the operational profile, a physical channel configuration for the channel type from a plurality of physical channel configurations associated with a radio access network, and means for transmitting or receiving data according to the physical channel configuration.

Example 307 is a method of operating a terminal device, the method including identifying an operational profile of the terminal device based on a device type of the terminal device and a type of application served by the terminal device, selecting a channel type from a plurality of channel types, identifying, based on the operational profile, a physical channel configuration for the channel type from a plurality of physical channel configurations associated with a radio access network, and transmitting or receiving data according to the physical channel configuration.

In Example 308, the subject matter of Example 307 can optionally include wherein the device type indicates a power-efficiency requirement, a latency requirement, or a reliability requirement of the terminal device.

In Example 309, the subject matter of Example 307 or 308 can optionally include wherein the type of application served by the terminal device indicates a power-efficiency requirement, a latency requirement, or a reliability requirement of the terminal device.

In Example 310, the subject matter of any one of Examples 307 to 309 can optionally include wherein the operational profile characterizes a power-efficiency requirement, a latency requirement, or a reliability requirement of the terminal device.

In Example 311, the subject matter of any one of Examples 307 to 309 can optionally include wherein the operational profile characterizes a power-efficiency requirement, a latency requirement, or a reliability requirement of one or more applications served by the terminal device.

In Example 312, the subject matter of any one of Examples 307 to 310 can optionally include wherein the operational profile is dependent on whether the terminal device is an Internet of Things (IoT) device, a vehicular communication device, a machine control device, or a multi-purpose device.

In Example 313, the subject matter of any one of Examples 307 to 312 can optionally include wherein the channel type is a paging channel, a random access channel, a control channel, or a traffic data channel.

In Example 314, the subject matter of any one of Examples 307 to 313 can optionally include wherein the plurality of physical channel configurations include a first physical channel configuration of the channel type and a second physical channel configuration of the channel type, wherein the first physical channel configuration and the second physical channel configuration are simultaneously available from the radio access network.

In Example 315, the subject matter of Example 314 can optionally include wherein the first physical channel configuration has a power-efficiency level different from the second physical channel configuration.

In Example 316, the subject matter of Example 314 can optionally include wherein the first physical channel configuration has a latency level different from the second physical channel configuration.

In Example 317, the subject matter of Example 314 can optionally include wherein the first physical channel configuration has a reliability level different from the second physical channel configuration.

In Example 318, the subject matter of any one of Examples 314 to 317 can optionally include wherein the first physical channel configuration is associated with a first radio access technology and the second physical channel configuration is associated with a second radio access technology different from the first radio access technology.

In Example 319, the subject matter of any one of Examples 310 to 318 can optionally further include prior to identifying the physical channel configuration, receiving channel configuration information from the radio access network that identifies the plurality of physical channel configurations.

In Example 320, the subject matter of Example 319 can optionally include wherein receiving the channel configuration information from the radio access network includes receiving the channel configuration information from the radio access network as broadcast information.

In Example 321, the subject matter of any one of Examples 310 to 320 can optionally include wherein each of the plurality of physical channel configurations has a different power-efficiency level and wherein the operational profile indicates a power efficiency requirement, and wherein identifying the physical channel configuration for the channel type includes selecting a physical channel configuration from the plurality of physical channel configurations that meets the power efficiency requirement as the physical channel configuration.

In Example 322, the subject matter of any one of Examples 310 to 321 can optionally include wherein each of the plurality of physical channel configurations has a different reliability level and wherein the operational profile indicates a reliability requirement, and wherein identifying the physical channel configuration for the channel type includes selecting a physical channel configuration from the plurality of physical channel configurations that meets the reliability requirement as the physical channel configuration.

In Example 323, the subject matter of any one of Examples 310 to 322 can optionally include wherein each of the plurality of physical channel configurations has a different latency level and wherein the operational profile indicates a latency requirement, and wherein identifying the physical channel configuration for the channel type includes selecting a physical channel configuration from the plurality of physical channel configurations that meets the latency requirement as the physical channel configuration.

In Example 324, the subject matter of any one of Examples 310 to 320 can optionally include wherein each of the plurality of physical channel configurations have a different power-efficiency level, a different latency level, or a different reliability level, and wherein identifying the physical channel configuration for the channel type includes selecting the physical channel configuration from the plurality of physical channel configurations based on a power-efficiency requirement, a latency requirement, or a reliability requirement of the operational profile.

In Example 325, the subject matter of any one of Examples 310 to 324 can optionally include wherein identifying the physical channel configuration for the channel type includes prior to identifying the physical channel configuration, reporting the operational profile to the radio access network, and in response to the reporting, receiving a control message that specifies the physical channel configuration.

In Example 326, the subject matter of any one of Examples 310 to 320 can optionally further include prior to identifying the physical channel configuration, requesting channel configuration information from the radio access network, and in response to the requesting, receiving a control message containing configuration information for the plurality of physical channel configurations.

In Example 327, the subject matter of any one of Examples 310 to 326 can optionally further include prior to transmitting or receiving data according to the physical channel configuration, notifying the radio access network of the physical channel configuration.

In Example 328, the subject matter of any one of Examples 310 to 326 can optionally include wherein the channel type is a random access channel and wherein the physical channel configuration is a random access channel configuration that is restricted to a specific set of terminal devices.

In Example 329, the subject matter of any one of Examples 310 to 328 can optionally include wherein the channel type is a paging channel, and wherein transmitting or receiving data according to the physical channel configuration includes receiving a paging message on a first radio access technology according to the physical channel configuration, and responding to the paging message on a second radio access technology different from the first radio access technology.

Example 330 is a radio communication device that includes a processor and a radio transceiver and is configured to perform the method of any one of Examples 310 to 329.

Example 331 is a non-transitory computer readable medium storing instructions that when executed by a controller of a terminal device causes the terminal device to perform the method of any one of Examples 310 to 329.

Example 332 is a communication device for operation in a terminal device, the communication device including a controller configured to identify an operational profile of the terminal device based on a device type of the terminal device and a type of application served by the terminal device, select a channel type from a plurality of channel types, and identify, based on the operational profile, a physical channel configuration for the channel type from a plurality of physical channel configurations associated with a radio access network, and a radio transceiver configured to transmit or receive data according to the physical channel configuration.

In Example 333, the subject matter of Example 332 can optionally further include a baseband modem that includes the controller and a physical layer module, wherein the controller is configured to direct radio communication operations of the communication device.

In Example 334, the subject matter of Example 332 or 333 can optionally further include one or more antennas and configured as a radio communication terminal device.

In Example 335, the subject matter of any one of Examples 332 to 334 can optionally include wherein the device type indicates a power-efficiency requirement, a latency requirement, or a reliability requirement of the terminal device.

In Example 336, the subject matter of any one of Examples 332 to 335 can optionally include wherein the type of application served by the terminal device indicates a power-efficiency requirement, a latency requirement, or a reliability requirement of the terminal device.

In Example 337, the subject matter of any one of Examples 332 to 336 can optionally include wherein the operational profile characterizes a power-efficiency requirement, a latency requirement, or a reliability requirement of the terminal device.

In Example 338, the subject matter of any one of Examples 332 to 336 can optionally include wherein the operational profile characterizes a power-efficiency requirement, a latency requirement, or a reliability requirement of one or more applications served by the terminal device.

In Example 339, the subject matter of any one of Examples 332 to 337 can optionally include wherein the operational profile is dependent on whether the terminal device is an Internet of Things (IoT) device, a vehicular communication device, a machine control device, or a multi-purpose device.

In Example 340, the subject matter of any one of Examples 332 to 339 can optionally include wherein the channel type is a paging channel, a random access channel, a control channel, or a traffic data channel.

In Example 341, the subject matter of any one of Examples 332 to 340 can optionally include wherein the power requirement is a power-efficiency requirement of the terminal device.

In Example 342, the subject matter of any one of Examples 332 to 341 can optionally include wherein the data connection is requirement is a latency requirement or a reliability requirement of a connection of an application of the terminal device.

In Example 343, the subject matter of any one of Examples 332 to 340 can optionally include wherein the plurality of physical channel configurations include a first physical channel configuration of the channel type and a second physical channel configuration of the channel type, wherein the first physical channel configuration and the second physical channel configuration are simultaneously available from the radio access network.

In Example 344, the subject matter of Example 343 can optionally include wherein the first physical channel configuration has a power-efficiency level different from the second physical channel configuration.

In Example 345, the subject matter of Example 343 can optionally include wherein the first physical channel configuration has a latency level different from the second physical channel configuration.

In Example 346, the subject matter of Example 343 can optionally include wherein the first physical channel configuration has a reliability level different from the second physical channel configuration.

In Example 347, the subject matter of any one of Examples 343 to 346 can optionally include wherein the first physical channel configuration is associated with a first radio access technology and the second physical channel configuration is associated with a second radio access technology different from the first radio access technology.

In Example 348, the subject matter of any one of Examples 332 to 347 can optionally include wherein the radio transceiver is further configured to prior to identifying the physical channel configuration, receive channel configuration information from the radio access network that identifies the plurality of physical channel configurations.

In Example 349, the subject matter of Example 348 can optionally include wherein the radio transceiver is configured to receive the channel configuration information from the radio access network by receiving the channel configuration information from the radio access network as broadcast information.

In Example 350, the subject matter of any one of Examples 332 to 349 can optionally include wherein each of the plurality of physical channel configurations has a different power-efficiency level and wherein the operational profile indicates a power efficiency requirement, and wherein the controller is configured to identify the physical channel configuration for the channel type by selecting a physical channel configuration from the plurality of physical channel configurations that meets the power efficiency requirement as the physical channel configuration.

In Example 351, the subject matter of any one of Examples 332 to 349 can optionally include wherein each of the plurality of physical channel configurations has a different latency level and wherein the operational profile indicates a latency requirement, and wherein the controller is configured to identify the physical channel configuration for the channel type by selecting a physical channel configuration from the plurality of physical channel configurations that meets the latency requirement as the physical channel configuration.

In Example 352, the subject matter of any one of Examples 332 to 349 can optionally include wherein each of the plurality of physical channel configurations has a different reliability level and wherein the operational profile indicates a reliability requirement, and wherein the controller is configured to identify the physical channel configuration for the channel type by selecting a physical channel configuration from the plurality of physical channel configurations that meets the reliability requirement as the physical channel configuration.

In Example 353, the subject matter of any one of Examples 332 to 349 can optionally include wherein each of the plurality of physical channel configurations have a different power-efficiency level, a different latency level, or a different reliability level, and wherein the controller is configured to identify the physical channel configuration for the channel type includes selecting the physical channel configuration from the plurality of physical channel configurations based on a power-efficiency requirement, a latency requirement, or a reliability requirement of the operational profile.

In Example 354, the subject matter of any one of Examples 332 to 349 can optionally include wherein the controller is configured to identify the physical channel configuration for the channel type by prior to identifying the physical channel configuration, reporting the operational profile to the radio access network, and in response to the reporting, receiving a control message that specifies the physical channel configuration.

In Example 355, the subject matter of any one of Examples to 349, can optionally include the controller is further configured to prior to identifying the physical channel configuration, request channel configuration information from the radio access network, and in response to the requesting, receive a control message containing configuration information for the plurality of physical channel configurations.

In Example 356, the subject matter of any one of Examples 332 to 355 can optionally include wherein the controller is further configured to prior to transmitting or receiving data according to the physical channel configuration, notify the radio access network of the physical channel configuration.

In Example 357, the subject matter of any one of Examples 332 to 356 can optionally include wherein the channel type is a random access channel and wherein the physical channel configuration is a random access channel configuration that is restricted to a specific set of terminal devices.

In Example 358, the subject matter of any one of Examples 332 to 357 can optionally include wherein the channel type is a paging channel, and wherein the radio transceiver is configured to transmit or receive data according to the physical channel configuration by receiving a paging message on a first radio access technology according to the physical channel configuration, and responding to the paging message on a second radio access technology different from the first radio access technology.

Example 359 is a communication circuit arrangement including a control circuit configured to identify an operational profile of the terminal device that indicates a power requirement or a connection requirement of the terminal device, select a channel type from a plurality of channel types, and identify, based on the operational profile, a physical channel configuration for the channel type from a plurality of physical channel configurations associated with a radio access network, and a radio transceiver configured to transmit or receive data according to the physical channel configuration.

In Example 360, the subject matter of Example 359 can optionally include wherein the control circuit is a processor configured to retrieve and execute software-defined instructions that control radio communication functionality of the communication circuit arrangement.

In Example 361, the subject matter of Example 359 or 360 can optionally further include a baseband modem that includes the control circuit and a physical layer module that interfaces with the control circuit to apply perform physical layer processing.

In Example 362, the subject matter of any one of Examples 359 to 361 can optionally further include one or more antennas and configured as a radio communication terminal device.

In Example 363, the subject matter of any one of Examples 359 to 362 can optionally include wherein the channel type is a paging channel, a random access channel, a control channel, or a traffic data channel.

In Example 364, the subject matter of any one of Examples 359 to 363 can optionally include wherein the power requirement is a power-efficiency requirement of the terminal device.

In Example 365, the subject matter of any one of Examples 359 to 364 can optionally include wherein the data connection is requirement is a latency requirement or a reliability requirement of a connection of an application of the terminal device.

In Example 366, the subject matter of any one of Examples 359 to 363 can optionally include wherein the plurality of physical channel configurations include a first physical channel configuration of the channel type and a second physical channel configuration of the channel type, wherein the first physical channel configuration and the second physical channel configuration are simultaneously available from the radio access network.

In Example 367, the subject matter of Example 366 can optionally include wherein the first physical channel configuration has a power-efficiency level different from the second physical channel configuration.

In Example 368, the subject matter of Example 366 can optionally include wherein the first physical channel configuration has a latency level different from the second physical channel configuration.

In Example 369, the subject matter of Example 366 can optionally include wherein the first physical channel configuration has a reliability level different from the second physical channel configuration.

In Example 370, the subject matter of any one of Examples 366 to 369 can optionally include wherein the first physical channel configuration is associated with a first radio access technology and the second physical channel configuration is associated with a second radio access technology different from the first radio access technology.

In Example 371, the subject matter of any one of Examples 359 to 370 can optionally include wherein the radio transceiver is further configured to prior to identifying the physical channel configuration, receive channel configuration information from the radio access network that identifies the plurality of physical channel configurations.

In Example 372, the subject matter of Example 371 can optionally include wherein the radio transceiver is configured to receive the channel configuration information from the radio access network by receiving the channel configuration information from the radio access network as broadcast information.

In Example 373, the subject matter of any one of Examples 359 to 372 can optionally include wherein each of the plurality of physical channel configurations has a different power-efficiency level and wherein the operational profile indicates a power efficiency requirement, and wherein the control circuit is configured to identify the physical channel configuration for the channel type by selecting a physical channel configuration from the plurality of physical channel configurations that meets the power efficiency requirement as the physical channel configuration.

In Example 374, the subject matter of any one of Examples 359 to 372 can optionally include wherein each of the plurality of physical channel configurations has a different latency level and wherein the operational profile indicates a latency requirement, and wherein the control circuit is configured to identify the physical channel configuration for the channel type by selecting a physical channel configuration from the plurality of physical channel configurations that meets the latency requirement as the physical channel configuration.

In Example 375, the subject matter of any one of Examples 359 to 372 can optionally include wherein each of the plurality of physical channel configurations has a different reliability level and wherein the operational profile indicates a reliability requirement, and wherein the control circuit is configured to identify the physical channel configuration for the channel type by selecting a physical channel configuration from the plurality of physical channel configurations that meets the reliability requirement as the physical channel configuration.

In Example 376, the subject matter of any one of Examples 359 to 372 can optionally include wherein each of the plurality of physical channel configurations have a different power-efficiency level, a different latency level, or a different reliability level, and wherein the control circuit is configured to identify the physical channel configuration for the channel type includes selecting the physical channel configuration from the plurality of physical channel configurations based on a power-efficiency requirement, a latency requirement, or a reliability requirement of the operational profile.

In Example 377, the subject matter of any one of Examples 359 to 372 can optionally include wherein the control circuit is configured to identify the physical channel configuration for the channel type by prior to identifying the physical channel configuration, reporting the operational profile to the radio access network, and in response to the reporting, receiving a control message that specifies the physical channel configuration.

In Example 378, the subject matter of any one of Examples to 372, can optionally include the control circuit is further configured to prior to identifying the physical channel configuration, request channel configuration information from the radio access network, and in response to the requesting, receive a control message containing configuration information for the plurality of physical channel configurations.

In Example 379, the subject matter of any one of Examples 359 to 378 can optionally include wherein the control circuit is further configured to prior to transmitting or receiving data according to the physical channel configuration, notify the radio access network of the physical channel configuration.

In Example 380, the subject matter of any one of Examples 359 to 379 can optionally include wherein the channel type is a random access channel and wherein the physical channel configuration is a random access channel configuration that is restricted to a specific set of terminal devices.

In Example 381, the subject matter of any one of Examples 359 to 380 can optionally include wherein the channel type is a paging channel, and wherein the radio transceiver is configured to transmit or receive data according to the physical channel configuration by receiving a paging message on a first radio access technology according to the physical channel configuration, and responding to the paging message on a second radio access technology different from the first radio access technology.

Example 382 is a communication circuit arrangement for operation in a terminal device, the communication circuit arrangement including a control circuit configured to identify an operational profile of the terminal device based on a device type of the terminal device and a type of application served by the terminal device, select a channel type from a plurality of channel types, and identify, based on the operational profile, a physical channel configuration for the channel type from a plurality of physical channel configurations associated with a radio access network, and a radio transceiver configured to transmit or receive data according to the physical channel configuration.

In Example 383, the subject matter of Example 382 can optionally include wherein the control circuit is a processor configured to retrieve and execute software-defined instructions that control radio communication functionality of the communication circuit arrangement.

In Example 384, the subject matter of Example 382 or 383 can optionally further include a baseband modem that includes the control circuit and a physical layer module that interfaces with the control circuit to apply perform physical layer processing.

In Example 385, the subject matter of any one of Examples 382 to 384 can optionally further include one or more antennas and configured as a radio communication terminal device.

In Example 386, the subject matter of any one of Examples 382 to 385 can optionally include wherein the device type indicates a power-efficiency requirement, a latency requirement, or a reliability requirement of the terminal device.

In Example 387, the subject matter of any one of Examples 382 to 386 can optionally include wherein the type of application served by the terminal device indicates a power-efficiency requirement, a latency requirement, or a reliability requirement of the terminal device.

In Example 388, the subject matter of any one of Examples 382 to 387 can optionally include wherein the operational profile characterizes a power-efficiency requirement, a latency requirement, or a reliability requirement of the terminal device.

In Example 389, the subject matter of any one of Examples 382 to 387 can optionally include wherein the operational profile characterizes a power-efficiency requirement, a latency requirement, or a reliability requirement of one or more applications served by the terminal device.

In Example 390, the subject matter of any one of Examples 382 to 388 can optionally include wherein the operational profile is dependent on whether the terminal device is an Internet of Things (IoT) device, a vehicular communication device, a machine control device, or a multi-purpose device.

In Example 391, the subject matter of any one of Examples 382 to 390 can optionally include wherein the channel type is a paging channel, a random access channel, a control channel, or a traffic data channel.

In Example 392, the subject matter of any one of Examples 382 to 391 can optionally include wherein the power requirement is a power-efficiency requirement of the terminal device.

In Example 393, the subject matter of any one of Examples 382 to 392 can optionally include wherein the data connection is requirement is a latency requirement or a reliability requirement of a connection of an application of the terminal device.

In Example 394, the subject matter of any one of Examples 382 to 391 can optionally include wherein the plurality of physical channel configurations include a first physical channel configuration of the channel type and a second physical channel configuration of the channel type, wherein the first physical channel configuration and the second physical channel configuration are simultaneously available from the radio access network.

In Example 395, the subject matter of Example 394 can optionally include wherein the first physical channel configuration has a power-efficiency level different from the second physical channel configuration.

In Example 396, the subject matter of Example 394 can optionally include wherein the first physical channel configuration has a latency level different from the second physical channel configuration.

In Example 397, the subject matter of Example 394 can optionally include wherein the first physical channel configuration has a reliability level different from the second physical channel configuration.

In Example 398, the subject matter of any one of Examples 394 to 397 can optionally include wherein the first physical channel configuration is associated with a first radio access technology and the second physical channel configuration is associated with a second radio access technology different from the first radio access technology.

In Example 399, the subject matter of any one of Examples 382 to 398 can optionally include wherein the radio transceiver is further configured to prior to identifying the physical channel configuration, receive channel configuration information from the radio access network that identifies the plurality of physical channel configurations.

In Example 400, the subject matter of Example 399 can optionally include wherein the radio transceiver is configured to receive the channel configuration information from the radio access network by receiving the channel configuration information from the radio access network as broadcast information.

In Example 401, the subject matter of any one of Examples 382 to 400 can optionally include wherein each of the plurality of physical channel configurations has a different power-efficiency level and wherein the operational profile indicates a power efficiency requirement, and wherein the control circuit is configured to identify the physical channel configuration for the channel type by selecting a physical channel configuration from the plurality of physical channel configurations that meets the power efficiency requirement as the physical channel configuration.

In Example 402, the subject matter of any one of Examples 382 to 400 can optionally include wherein each of the plurality of physical channel configurations has a different latency level and wherein the operational profile indicates a latency requirement, and wherein the control circuit is configured to identify the physical channel configuration for the channel type by selecting a physical channel configuration from the plurality of physical channel configurations that meets the latency requirement as the physical channel configuration.

In Example 403, the subject matter of any one of Examples 382 to 400 can optionally include wherein each of the plurality of physical channel configurations has a different reliability level and wherein the operational profile indicates a reliability requirement, and wherein the control circuit is configured to identify the physical channel configuration for the channel type by selecting a physical channel configuration from the plurality of physical channel configurations that meets the reliability requirement as the physical channel configuration.

In Example 404, the subject matter of any one of Examples 382 to 400 can optionally include wherein each of the plurality of physical channel configurations have a different power-efficiency level, a different latency level, or a different reliability level, and wherein the controller is configured to identify the physical channel configuration for the channel type includes selecting the physical channel configuration from the plurality of physical channel configurations based on a power-efficiency requirement, a latency requirement, or a reliability requirement of the operational profile.

In Example 405, the subject matter of any one of Examples 382 to 400 can optionally include wherein the control circuit is configured to identify the physical channel configuration for the channel type by prior to identifying the physical channel configuration, reporting the operational profile to the radio access network, and in response to the reporting, receiving a control message that specifies the physical channel configuration.

In Example 406, the subject matter of any one of Examples to 400, can optionally include the control circuit is further configured to prior to identifying the physical channel configuration, request channel configuration information from the radio access network, and in response to the requesting, receive a control message containing configuration information for the plurality of physical channel configurations.

In Example 407, the subject matter of any one of Examples 382 to 406 can optionally include wherein the control circuit is further configured to prior to transmitting or receiving data according to the physical channel configuration, notify the radio access network of the physical channel configuration.

In Example 408, the subject matter of any one of Examples 382 to 407 can optionally include wherein the channel type is a random access channel and wherein the physical channel configuration is a random access channel configuration that is restricted to a specific set of terminal devices.

In Example 409, the subject matter of any one of Examples 382 to 408 can optionally include wherein the channel type is a paging channel, and wherein the radio transceiver is configured to transmit or receive data according to the physical channel configuration by receiving a paging message on a first radio access technology according to the physical channel configuration, and responding to the paging message on a second radio access technology different from the first radio access technology.

Example 410 is a device including means for navigating a moving device with one or more collision sensors configured at a first sensitivity level, means for receiving, from a wireless network, a traffic update that characterizes obstacle traffic in a surrounding vicinity of the moving device, and means for configuring the one or more collision sensors to operate with a second sensitivity level if the traffic update indicates that obstacle traffic meets a predefined criteria.

Example 411 is a method of operating a moving device, the method including navigating the moving device with one or more collision sensors configured at a first sensitivity level, receiving, from a wireless network, a traffic update that characterizes obstacle traffic in a surrounding vicinity of the moving device, and configuring the one or more collision sensors to operate with a second sensitivity level if the traffic update indicates that obstacle traffic meets a predefined criteria.

In Example 412, the subject matter of Example 411 can optionally include wherein the second sensitivity level is less than the first sensitivity level.

In Example 413, the subject matter of Example 411 or 412 can optionally include wherein configuring the one or more collision sensors to the second sensitivity level if the traffic update indicates that obstacle traffic meets the predefined criteria includes determining that the traffic update indicates that obstacle traffic is below a predefined threshold, and configuring the one or more collision sensors to the second sensitivity level if the traffic update indicates that obstacle traffic is below the predefined threshold.

In Example 414, the subject matter of Example 413 can optionally further include receiving an additional traffic update from the wireless network that characterizes updated obstacle traffic in the surrounding vicinity, and configuring the one or more collision sensors to a third sensitivity level higher than the second sensitivity level if the additional traffic update indicates that obstacle traffic is above the predefined threshold.

In Example 415, the subject matter of any one of Examples 411 to 414 can optionally further include navigating the moving device with the one or more collisions sensors operating or configured at the second sensitivity level.

In Example 416, the subject matter of any one of Examples 411 to 415 can optionally include wherein receiving the traffic update from the wireless network includes receiving the traffic update from a network access node.

In Example 417, the subject matter of any one of Examples 411 to 416 can optionally include wherein receiving the traffic update from the wireless network includes receiving the traffic update from a master autonomous moving device.

In Example 418, the subject matter of any one of Examples 411 to 417 can optionally include wherein the traffic update indicates a quantity of obstacles in the surrounding vicinity, and wherein configuring the one or more collision sensors to the second sensitivity level if the traffic update indicates that obstacle traffic meets the predefined criteria includes configuring the one or more collision sensors to the second sensitivity level if the quantity of obstacles falls below a predefined threshold.

In Example 419, the subject matter of any one of Examples 411 to 418 can optionally include wherein the one or more collision sensors are configured to consume less power when operating at the second sensitivity level than when operating at the first sensitivity level.

In Example 420, the subject matter of any one of Examples 411 to 419 can optionally include wherein the traffic update indicates an obstacle type of one or more obstacles in the surrounding vicinity.

In Example 421, the subject matter of Example 420 can optionally include wherein the obstacle types of the one or more obstacles is one of a mobile obstacle type, an immobile obstacle type, or a moving device obstacle type.

In Example 422, the subject matter of any one of Examples 411 to 421 can optionally include wherein the predefined criteria is a predefined quantity of obstacles in the surrounding vicinity, and wherein configuring the one or more collision sensors to the second sensitivity level if the traffic update indicates that obstacle traffic meets the predefined criteria includes configuring the one or more collision sensors to the second sensitivity level if the traffic update indicates that less than the predefined quantity of obstacles exist or are present in the surrounding vicinity.

In Example 423, the subject matter of any one of Examples 411 to 421 can optionally include wherein configuring the one or more collision sensors to the second sensitivity level if the traffic update indicates that obstacle traffic meets the predefined criteria includes configuring the one or more collision sensors to the second sensitivity level if the traffic update indicates that no obstacles are present or exist in the surrounding vicinity.

In Example 424, the subject matter of any one of Examples 411 to 421 can optionally include wherein configuring the one or more collision sensors to the second sensitivity level if the traffic update indicates that obstacle traffic meets the predefined criteria includes configuring the one or more collision sensors to the second sensitivity level if the traffic update indicates that no mobile obstacles in the surrounding vicinity.

In Example 425, the subject matter of Example 424 can optionally include wherein a first subset of the one or more collision sensors is configured to detect mobile obstacles and a second subset of the one or more collision sensors different from the first subset is configured to detect immobile obstacles, and wherein configuring the one or more collision sensors to the second sensitivity level if the traffic update indicates that no mobile obstacles exist or are present in the surrounding vicinity includes reducing a sensitivity level of the first subset comparatively more than a sensitivity level of the second subset.

In Example 426, the subject matter of any one of Examples 411 to 421 can optionally include wherein configuring the one or more collision sensors to the second sensitivity level if the traffic update indicates that obstacle traffic meets the predefined criteria includes configuring the one or more collision sensors to the second sensitivity level if the traffic update indicates that no other moving devices are present or exist in the surrounding vicinity.

In Example 427, the subject matter of any one of Examples 411 to 426 can optionally further include continually receiving additional traffic updates that characterize obstacle traffic in the surrounding vicinity, and reconfiguring the one or more collision sensors with updated sensitivity levels based on the additional traffic updates.

In Example 428, the subject matter of any one of Examples 411 to 427 can optionally include wherein reconfiguring the one or more collision sensors to the second sensitivity level includes reducing a power consumption of the one or more collision sensors.

In Example 429, the subject matter of any one of Examples 411 to 428 can optionally further include determining a location of the moving device, and reporting the location to the wireless network.

In Example 430, the subject matter of any one of Examples 411 to 429 can optionally include wherein the surrounding vicinity is a predefined area around the moving device.

In Example 431, the subject matter of any one of Examples 411 to 429 can optionally include wherein the surrounding vicinity is a planned movement path of the moving device.

Example 432 is a moving device configured to perform the method of any one of Examples 411 to 431.

Example 433 is a navigation system of a moving device configured to perform the method of any one of Examples 411 to 431.

Example 434 is a non-transitory computer readable medium storing instructions that when executed by a controller of a moving device cause the moving device to perform the method of any one of Examples 411 to 431.

Example 435 is a navigation system including one or more collision sensors, a navigation control module configured to navigate a moving device with the one or more collision sensors configured at a first sensitivity level, and a communication module configured to receive a traffic update from a wireless network that characterizes obstacle traffic in a surrounding vicinity of the moving device, the navigation control module further configured to configure the one or more collision sensors to a second sensitivity if the traffic update indicates that obstacle traffic meets a predefined criteria.

In Example 436, the subject matter of Example 435 can optionally include wherein the second sensitivity level is less than the first sensitivity level.

In Example 437, the subject matter of Example 435 or 436 can optionally further include a steering and movement system, wherein the navigation control module is configured to navigate the moving device with the steering and movement system.

In Example 438, the subject matter of any one of Examples 435 to 437 can optionally include wherein the navigation control module is configured to configure the one or more collision sensors to the second sensitivity level if the traffic update indicates that obstacle traffic meets the predefined criteria by determining that the traffic update indicates that obstacle traffic is below a predefined threshold, and configuring the one or more collision sensors to the second sensitivity level if the traffic update indicates that obstacle traffic is below the predefined threshold.

In Example 439, the subject matter of Example 438 can optionally include wherein the communication module is further configured to receive an additional traffic update from the wireless network that characterizes updated obstacle traffic in the surrounding vicinity, and wherein the navigation control module is configured to configure the one or more collision sensors to a third sensitivity level higher than the second sensitivity level if the additional traffic update indicates that obstacle traffic is above the predefined threshold.

In Example 440, the subject matter of any one of Examples 435 to 439 can optionally include wherein the navigation control module is further configured to navigate the moving device with the one or more collisions sensors operating or configured at the second sensitivity level.

In Example 441, the subject matter of any one of Examples 435 to 440 can optionally include wherein the communication module is configured to receive the traffic update from a network access node.

In Example 442, the subject matter of any one of Examples 435 to 440 can optionally include wherein the communication module is configured to receive the traffic update from a master autonomous moving device.

In Example 443, the subject matter of any one of Examples 435 to 442 can optionally include wherein the traffic update indicates a quantity of obstacles in the surrounding vicinity, and wherein the navigation control module is configured to configure the one or more collision sensors to the second sensitivity level if the traffic update indicates that obstacle traffic meets the predefined criteria by configuring the one or more collision sensors to the second sensitivity level if the quantity of obstacles falls below a predefined threshold.

In Example 444, the subject matter of any one of Examples 435 to 443 can optionally include wherein the one or more collision sensors are configured to consume less power when operating at the second sensitivity level than when operating at the first sensitivity level.

In Example 445, the subject matter of any one of Examples 435 to 444 can optionally include wherein the traffic update indicates an obstacle type of one or more obstacles in the surrounding vicinity, and wherein the navigation control module is configured to configure the one or more collision sensors to the second sensitivity level if the traffic update indicates that obstacle traffic meets the predefined criteria by configuring the one or more collision sensors to the second sensitivity level if the obstacle types of the one or more obstacles meets the predefined criteria.

In Example 446, the subject matter of Example 445 can optionally include wherein the obstacle types of the one or more obstacles is one of a mobile obstacle type, an immobile obstacle type, or a moving device obstacle type.

In Example 447, the subject matter of any one of Examples 435 to 446 can optionally include wherein the predefined criteria is a predefined quantity of obstacles in the surrounding vicinity, and wherein the navigation control module is configured to configure the one or more collision sensors to the second sensitivity level if the traffic update indicates that obstacle traffic meets the predefined criteria by configuring the one or more collision sensors to the second sensitivity level if the traffic update indicates that less than the predefined quantity of obstacles exist or are present in the surrounding vicinity.

In Example 448, the subject matter of any one of Examples 435 to 446 can optionally include wherein the navigation control module is configured to configure the one or more collision sensors to the second sensitivity level if the traffic update indicates that obstacle traffic meets the predefined criteria by configuring the one or more collision sensors to the second sensitivity level if the traffic update indicates that there are no obstacles in the surrounding vicinity.

In Example 449, the subject matter of any one of Examples 435 to 446 can optionally include wherein the navigation control module is configured to configure the one or more collision sensors to the second sensitivity level if the traffic update indicates that obstacle traffic meets the predefined criteria by configuring the one or more collision sensors to the second sensitivity level if the traffic update indicates that there are no mobile obstacles in the surrounding vicinity.

In Example 450, the subject matter of Example 449 can optionally include wherein a first subset of the one or more collision sensors are configured to detect mobile obstacles and a second subset of the one or more collision sensors different from the first subset is configured to detect immobile obstacles, and wherein the navigation control module is configured to configure the one or more collision sensors to the second sensitivity level if the traffic update indicates that there are no mobile obstacles in the surrounding vicinity by reducing a sensitivity level of the first subset comparatively more than a sensitivity level of the second subset.

In Example 451, the subject matter of any one of Examples 435 to 446 can optionally include wherein the navigation control module is configured to configure the one or more collision sensors to the second sensitivity level if the traffic update indicates that obstacle traffic meets the predefined criteria by configuring the one or more collision sensors to the second sensitivity level if the traffic update indicates that there are no other moving devices in the surrounding vicinity.

In Example 452, the subject matter of any one of Examples 435 to 451 can optionally include wherein the communication module is configured to continually receive additional traffic updates that characterize obstacle traffic in the surrounding vicinity, and wherein the navigation control module is configured to reconfigure the one or more collision sensors with updated sensitivity levels based on the additional traffic updates.

In Example 453, the subject matter of any one of Examples 435 to 452 can optionally include wherein the navigation control module is configured to configure the one or more collision sensors to the second sensitivity level includes reducing a power consumption of the one or more collision sensors.

In Example 454, the subject matter of any one of Examples 435 to 453 can optionally include wherein the navigation system is further configured to determine a location of the moving device and to report the location to the wireless network.

In Example 455, the subject matter of any one of Examples 435 to 454 can optionally include wherein the surrounding vicinity is a predefined area around the moving device.

In Example 456, the subject matter of any one of Examples 435 to 454 can optionally include wherein the surrounding vicinity is a planned movement path of the moving device.

Example 457 is a moving device including a steering and movement system and the navigation system of any one of Examples 435 to 456.

Example 458 is a non-transitory computer readable medium storing instructions that when executed by a processor cause the processor to perform a method including navigating a moving device with one or more collision sensors configured at a first sensitivity level, receiving a traffic update from a wireless network that characterizes obstacle traffic in a surrounding vicinity of the moving device, and configuring the one or more collision sensors to a second sensitivity level if the traffic update indicates that obstacle traffic meets a predefined criteria.

In Example 459, the subject matter of Example 458 can optionally include wherein the second sensitivity level is less than the first sensitivity level.

In Example 460, the subject matter of Example 458 can optionally include wherein configuring the one or more collision sensors to the second sensitivity level if the traffic update indicates that obstacle traffic meets the predefined criteria includes determining that the traffic update indicates that obstacle traffic is below a predefined threshold, and configuring the one or more collision sensors to the second sensitivity level if the traffic update indicates that obstacle traffic is below the predefined threshold.

In Example 461, the subject matter of Example 460 can optionally include the method further including receiving an additional traffic update from the wireless network that characterizes updated obstacle traffic in the surrounding vicinity, and configuring the one or more collision sensors to a third sensitivity level higher than the second sensitivity level if the additional traffic update indicates that obstacle traffic is above the predefined threshold.

In Example 462, the subject matter of any one of Examples 458 to 461 can optionally include the method further including navigating the moving device with the one or more collisions sensors at the second sensitivity level.

In Example 463, the subject matter of any one of Examples 458 to 462 can optionally include wherein receiving the traffic update from the wireless network includes receiving the traffic update from a network access node.

In Example 464, the subject matter of any one of Examples 458 to 463 can optionally include wherein receiving the traffic update from the wireless network includes receiving the traffic update from a master autonomous moving device.

In Example 465, the subject matter of any one of Examples 458 to 464 can optionally include wherein the traffic update indicates a quantity of obstacles in the surrounding vicinity, and wherein configuring the one or more collision sensors to the second sensitivity level if the traffic update indicates that obstacle traffic meets the predefined criteria includes configuring the one or more collision sensors to the second sensitivity level if the quantity of obstacles falls below a predefined threshold.

In Example 466, the subject matter of any one of Examples 458 to 465 can optionally include wherein the one or more collision sensors are configured to consume less power when operating at the second sensitivity level than when operating at the first sensitivity level.

In Example 467, the subject matter of any one of Examples 458 to 466 can optionally include wherein the traffic update indicates an obstacle type of one or more obstacles in the surrounding vicinity.

In Example 468, the subject matter of Example 467 can optionally include wherein the obstacle types of the one or more obstacles is one of a mobile obstacle type, an immobile obstacle type, or a moving device obstacle type.

In Example 469, the subject matter of any one of Examples 458 to 468 can optionally include wherein the predefined criteria is a predefined quantity of obstacles in the surrounding vicinity, and wherein configuring the one or more collision sensors to the second sensitivity level if the traffic update indicates that obstacle traffic meets the predefined criteria includes configuring the one or more collision sensors to the second sensitivity level if the traffic update indicates that less than the predefined quantity of obstacles exist or are present in the surrounding vicinity.

In Example 470, the subject matter of any one of Examples 458 to 469 can optionally include wherein configuring the one or more collision sensors to the second sensitivity level if the traffic update indicates that obstacle traffic meets the predefined criteria includes configuring the one or more collision sensors to the second sensitivity level if the traffic update indicates that there are no obstacles in the surrounding vicinity.

In Example 471, the subject matter of any one of Examples 458 to 469 can optionally include wherein configuring the one or more collision sensors to the second sensitivity level if the traffic update indicates that obstacle traffic meets the predefined criteria includes configuring the one or more collision sensors to the second sensitivity level if the traffic update indicates that there are no mobile obstacles in the surrounding vicinity.

In Example 472, the subject matter of Example 471 can optionally include wherein a first subset of the one or more collision sensors are configured to detect mobile obstacles and a second subset of the one or more collision sensors different from the first subset is configured to detect immobile obstacles, and wherein configuring the one or more collision sensors to the second sensitivity level if the traffic update indicates that there are no mobile obstacles in the surrounding vicinity includes reducing a sensitivity level of the first subset comparatively more than a sensitivity level of the second subset.

In Example 473, the subject matter of any one of Examples 458 to 469 can optionally include wherein configuring the one or more collision sensors to the second sensitivity level if the traffic update indicates that obstacle traffic meets the predefined criteria includes configuring the one or more collision sensors to the second sensitivity level if the traffic update indicates that there are no other moving devices in the surrounding vicinity.

In Example 474, the subject matter of any one of Examples 458 to 473 can optionally include the method further including continually receiving additional traffic updates that characterize obstacle traffic in the surrounding vicinity, and reconfiguring the one or more collision sensors with updated sensitivity levels based on the additional traffic updates.

In Example 475, the subject matter of any one of Examples 458 to 474 can optionally include wherein reconfiguring the one or more collision sensors to the second sensitivity level includes reducing a power consumption of the one or more collision sensors.

In Example 476, the subject matter of any one of Examples 458 to 475 can optionally include the method further including determining a location of the moving device, and reporting the location to the wireless network.

In Example 477, the subject matter of any one of Examples 458 to 476 can optionally include wherein the surrounding vicinity is a predefined area around the moving device.

In Example 478, the subject matter of any one of Examples 458 to 477 can optionally include wherein the surrounding vicinity is a planned movement path of the moving device.

Example 479 is a navigation circuit arrangement including one or more collision sensors, a navigation control circuit configured to navigate a moving device with the one or more collision sensors configured at a first sensitivity level, and a communication circuit configured to receive a traffic update from a wireless network that characterizes obstacle traffic in a surrounding vicinity of the moving device, the navigation control circuit further configured to configure the one or more collision sensors to a second sensitivity if the traffic update indicates that obstacle traffic meets a predefined criteria.

In Example 480, the subject matter of Example 479 can optionally include wherein the second sensitivity level is less than the first sensitivity level.

In Example 481, the subject matter of Example 479 or 480 can optionally further include a steering and movement system, wherein the navigation control circuit is configured to navigate the moving device with the steering and movement system.

In Example 482, the subject matter of any one of Examples 479 to 481 can optionally include wherein the navigation control circuit is configured to configure the one or more collision sensors to the second sensitivity level if the traffic update indicates that obstacle traffic meets the predefined criteria by determining that the traffic update indicates that obstacle traffic is below a predefined threshold, and configuring the one or more collision sensors to the second sensitivity level if the traffic update indicates that obstacle traffic is below the predefined threshold.

In Example 483, the subject matter of Example 482 can optionally include wherein the communication circuit is further configured to receive an additional traffic update from the wireless network that characterizes updated obstacle traffic in the surrounding vicinity, and wherein the navigation control circuit is configured to configure the one or more collision sensors to a third sensitivity level higher than the second sensitivity level if the additional traffic update indicates that obstacle traffic is above the predefined threshold.

In Example 484, the subject matter of any one of Examples 479 to 483 can optionally include wherein the navigation control circuit is further configured to navigate the moving device with the one or more collisions sensors operating or configured at the second sensitivity level.

In Example 485, the subject matter of any one of Examples 479 to 484 can optionally include wherein the communication circuit is configured to receive the traffic update from a network access node.

In Example 486, the subject matter of any one of Examples 479 to 484 can optionally include wherein the communication circuit is configured to receive the traffic update from a master autonomous moving device.

In Example 487, the subject matter of any one of Examples 479 to 486 can optionally include wherein the traffic update indicates a quantity of obstacles in the surrounding vicinity, and wherein the navigation control circuit is configured to configure the one or more collision sensors to the second sensitivity level if the traffic update indicates that obstacle traffic meets the predefined criteria by configuring the one or more collision sensors to the second sensitivity level if the quantity of obstacles falls below a predefined threshold.

In Example 488, the subject matter of any one of Examples 479 to 487 can optionally include wherein the one or more collision sensors are configured to consume less power when operating at the second sensitivity level than when operating at the first sensitivity level.

In Example 489, the subject matter of any one of Examples 479 to 488 can optionally include wherein the traffic update indicates an obstacle type of one or more obstacles in the surrounding vicinity, and wherein the navigation control circuit is configured to configure the one or more collision sensors to the second sensitivity level if the traffic update indicates that obstacle traffic meets the predefined criteria by configuring the one or more collision sensors to the second sensitivity level if the obstacle types of the one or more obstacles meets the predefined criteria.

In Example 490, the subject matter of Example 489 can optionally include wherein the obstacle types of the one or more obstacles is one of a mobile obstacle type, an immobile obstacle type, or a moving device obstacle type.

In Example 491, the subject matter of any one of Examples 479 to 490 can optionally include wherein the predefined criteria is a predefined quantity of obstacles in the surrounding vicinity, and wherein the navigation control circuit is configured to configure the one or more collision sensors to the second sensitivity level if the traffic update indicates that obstacle traffic meets the predefined criteria by configuring the one or more collision sensors to the second sensitivity level if the traffic update indicates that less than the predefined quantity of obstacles exist or are present in the surrounding vicinity.

In Example 492, the subject matter of any one of Examples 479 to 490 can optionally include wherein the navigation control circuit is configured to configure the one or more collision sensors to the second sensitivity level if the traffic update indicates that obstacle traffic meets the predefined criteria by configuring the one or more collision sensors to the second sensitivity level if the traffic update indicates that there are no obstacles in the surrounding vicinity.

In Example 493, the subject matter of any one of Examples 479 to 490 can optionally include wherein the navigation control circuit is configured to configure the one or more collision sensors to the second sensitivity level if the traffic update indicates that obstacle traffic meets the predefined criteria by configuring the one or more collision sensors to the second sensitivity level if the traffic update indicates that there are no mobile obstacles in the surrounding vicinity.

In Example 494, the subject matter of Example 493 can optionally include wherein a first subset of the one or more collision sensors are configured to detect mobile obstacles and a second subset of the one or more collision sensors different from the first subset is configured to detect immobile obstacles, and wherein the navigation control circuit is configured to configure the one or more collision sensors to the second sensitivity level if the traffic update indicates that there are no mobile obstacles in the surrounding vicinity by reducing a sensitivity level of the first subset comparatively more than a sensitivity level of the second subset.

In Example 495, the subject matter of any one of Examples 479 to 490 can optionally include wherein the navigation control circuit is configured to configure the one or more collision sensors to the second sensitivity level if the traffic update indicates that obstacle traffic meets the predefined criteria by configuring the one or more collision sensors to the second sensitivity level if the traffic update indicates that there are no other moving devices in the surrounding vicinity.

In Example 496, the subject matter of any one of Examples 479 to 495 can optionally include wherein the communication circuit is configured to continually receive additional traffic updates that characterize obstacle traffic in the surrounding vicinity, and wherein the navigation control circuit is configured to reconfigure the one or more collision sensors with updated sensitivity levels based on the additional traffic updates.

In Example 497, the subject matter of any one of Examples 479 to 496 can optionally include wherein the navigation control circuit is configured to configure the one or more collision sensors to the second sensitivity level includes reducing a power consumption of the one or more collision sensors.

In Example 498, the subject matter of any one of Examples 479 to 497 can optionally include wherein the navigation circuit arrangement is further configured to determine a location of the moving device and to report the location to the wireless network.

In Example 499, the subject matter of any one of Examples 479 to 498 can optionally include wherein the surrounding vicinity is a predefined area around the moving device.

In Example 500, the subject matter of any one of Examples 479 to 498 can optionally include wherein the surrounding vicinity is a planned movement path of the moving device.

Example 501 is a moving device including a steering and movement system and the navigation circuit arrangement of any one of Examples 479 to 500.

Example 502 is a device for operation in a communications system including at least one terminal device of a first type and at least one terminal device of a second type, the device including means for identifying a set of terminal devices currently connected to a network access node, means for determining whether each terminal device of the set of terminal devices is of the first type, if each terminal device of the identified set of terminal devices is of the first type, means for selecting a discontinuous communication schedule to obtain a selected schedule for the network access node for the set of terminal devices, if at least one terminal device of the set of terminal devices is of the second type, means for selecting a continuous communication schedule to obtain the selected schedule for the network access node for the set of terminal devices, and means for transmitting or receiving data with the set of terminal devices according to the selected schedule.

Example 503 is a method of performing radio communications in a communications system including at least one terminal device of a first type and at least one terminal device of a second type, the method including identifying a set of terminal devices currently connected to a network access node, determining whether each terminal device of the set of terminal devices is of the first type, if each terminal device of the identified set of terminal devices is of the first type, selecting a discontinuous communication schedule to obtain a selected schedule for the network access node for the set of terminal devices, if at least one terminal device of the set of terminal devices is of the second type, selecting a continuous communication schedule to obtain the selected schedule for the network access node for the set of terminal devices, and transmitting or receiving data with the set of terminal devices according to the selected schedule.

In Example 504, the subject matter of Example 503 can optionally include wherein the second type is different from the first type.

In Example 505, the subject matter of Example 503 or 504 can optionally include wherein the at least one terminal device of the first type has data traffic activity that is more predictable than the at least one terminal device of the second type.

In Example 506, the subject matter of any one of Examples 503 to 505 can optionally include wherein the first type is mutually exclusive from the second type.

In Example 507, the subject matter of any one of Examples 503 to 506 can optionally include wherein the at least one terminal device of the first type includes one or more Internet of Things (IoT) devices and the at least one terminal device of the second type includes one or more smartphones, one or more laptops, or one or more tablets.

In Example 508, the subject matter of any one of Examples 503 to 507 can optionally further include classifying each of the set of terminal devices as either the first type or as the second type.

In Example 509, the subject matter of any one of Examples 503 to 508 can optionally include wherein the discontinuous communication schedule is a discontinuous reception (DRX) schedule or a discontinuous transmission (DTX) schedule.

In Example 510, the subject matter of any one of Examples 503 to 508 can optionally include wherein the discontinuous communication schedule is a discontinuous transmission (DTX) schedule with continuous reception, or a discontinuous reception (DRX) and a discontinuous transmission (DTX) schedule.

In Example 511, the subject matter of any one of Examples 503 to 510 can optionally include wherein the network access node is a small cell.

In Example 512, the subject matter of any one of Examples 503 to 511 can optionally include wherein the selected schedule is the discontinuous communication schedule, the method further including determining that a first terminal device of the second type has connected to the network access node as one of the set of terminal devices, transmitting or receiving data with the set of terminal devices according to the continuous communication schedule.

In Example 513, the subject matter of Example 512 can optionally further include determining that the first terminal device has disconnected from the network access node and that no other terminal devices of the second type are connected to the network access node, and transmitting or receiving data with the set of terminal devices according to the discontinuous communication schedule.

In Example 514, the subject matter of any one of Examples 503 to 511 can optionally include wherein the selected schedule is the discontinuous communication schedule and wherein one or more of the set of terminal devices have transmission or reception schedules with a periodic active phase, the method further including selecting a communication schedule with active phases that match the periodic active phases of the transmission or reception schedules of the one or more of the set of terminal devices.

In Example 515, the subject matter of any one of Examples 503 to 514 can optionally further include providing control signaling to the set of terminal devices that specifies the selected schedule.

In Example 516, the subject matter of any one of Examples 503 to 515 can optionally include wherein the selected schedule is the discontinuous communication schedule and wherein the discontinuous communication schedule has one or more active communication phases and one or more inactive communication phases, the method further including instructing the set of terminal devices to utilize the one or more active phases of the discontinuous communication schedule.

In Example 517, the subject matter of any one of Examples 503 to 516 can optionally include wherein the selected schedule is the discontinuous communication schedule, the method further including selecting a discontinuous communication schedule with an activity pattern based on a quantity of the set of terminal devices, a data traffic level of the set of terminal devices, or a data traffic frequency of the set of terminal devices.

Example 518 is a network access node configured to perform the method of any one of Examples 503 to 517.

Example 519 is a communication system for a network access node configured to perform the method of any one of Examples 503 to 517.

Example 520 is a non-transitory computer readable medium storing instructions that when executed by a controller of a network access node control the network access node to perform the method of any one of Examples 503 to 517.

Example 521 is a device including means for monitoring which terminal devices are connected to a network access node, wherein each of the terminal devices is of a first type or a second type mutually exclusive from the first type, means for using a discontinuous communication schedule for the network access node when each of the terminal devices connected to the network access node are of the first type, and means for using a continuous communication schedule for the network access node when at least one of the terminal devices connected to the network access node is of the second type Example 522 is a method of performing radio communications, the method including monitoring which terminal devices are connected to a network access node, wherein each of the terminal devices is of a first type or a second type mutually exclusive from the first type, using a discontinuous communication schedule for the network access node when each of the terminal devices connected to the network access node are of the first type, and using a continuous communication schedule for the network access node when at least one of the terminal devices connected to the network access node is of the second type.

In Example 523, the subject matter of Example 522 can optionally include wherein terminal devices of the first type have data traffic activity that is more predictable than terminal devices of the second type.

In Example 524, the subject matter of Example 522 or 523 can optionally include wherein terminal devices of the first type have more regular data traffic activity than terminal devices of the second type.

In Example 525, the subject matter of any one of Examples 522 to 524 can optionally include wherein data traffic activity of terminal devices of the first type is scheduled earlier in time than data traffic activity of terminal devices of the second type.

In Example 526, the subject matter of any one of Examples 522 to 525 can optionally include wherein terminal devices of the first type are Internet of Things (IoT) devices and terminal devices of the second type are smartphones, laptops, or tablets.

In Example 527, the subject matter of any one of Examples 522 to 526 can optionally further include classifying each of the terminal devices connected to the network node at a first time as either being the first type or the second type.

In Example 528, the subject matter of any one of Examples 522 to 526 can optionally further include classifying each of the terminal devices connected to the network node at a first time as either being the first type or the second type based on a data traffic pattern of each of the terminal devices.

In Example 529, the subject matter of any one of Examples 522 to 528 can optionally include wherein the discontinuous communication schedule is a discontinuous reception (DRX) schedule or a discontinuous transmission (DTX) schedule.

In Example 530, the subject matter of any one of Examples 522 to 529 can optionally include wherein the discontinuous communication schedule is a discontinuous transmission (DTX) schedule with continuous reception, or a discontinuous reception (DRX) and a discontinuous transmission (DTX) schedule.

In Example 531, the subject matter of any one of Examples 522 to 530 can optionally include wherein the network access node is a small cell.

In Example 532, the subject matter of any one of Examples 522 to 531 can optionally include wherein using the discontinuous communication schedule for the network access node when each of the terminal devices connected to the network access node are of the first type includes transmitting or receiving data with the terminal devices connected to the network access node according to the discontinuous communication schedule.

In Example 533, the subject matter of any one of Examples 522 to 531 can optionally include wherein using the continuous communication schedule for the network access node when at least one of the terminal devices connected to the network access node is of the second type includes transmitting or receiving data with the terminal devices connected to the network access node according to the continuous communication schedule.

In Example 534, the subject matter of any one of Examples 522 to 533 can optionally include wherein using the discontinuous communication schedule for the network access node when each of the terminal devices connected to the network access node are of the first type and using the continuous communication schedule for the network access node when at least one of the terminal devices connected to the network access node is of the second type includes switching from the discontinuous communication schedule to the continuous communication schedule when at least one terminal device of the second type connects to the network access node and switching from the continuous communication schedule to the discontinuous communication schedule a terminal device of the second type disconnects from the network access node and no other terminal devices of the second type are connected to the network access node.

In Example 535, the subject matter of any one of Examples 522 to 534 can optionally further include providing control signaling to the terminal devices connected to the network access node that specifies whether the continuous communication schedule or the discontinuous communication schedule is being used.

In Example 536, the subject matter of any one of Examples 522 to 535 can optionally include wherein the discontinuous communication schedule has one or more active communication phases and one or more inactive communication phases, the method further including instructing the terminal devices connected to the network access node to utilize the one or more active phases of the discontinuous communication schedule when the discontinuous communication schedule is being used.

In Example 537, the subject matter of any one of Examples 522 to 536 can optionally include wherein using the discontinuous communication schedule for the network access node when each of the terminal devices connected to the network access node are of the first type includes selecting a discontinuous communication schedule with an activity pattern based on a quantity of the terminal devices connected to the network access node, a data traffic level of the terminal devices connected to the network access node, or a data traffic frequency of the terminal devices connected to the network access node.

Example 538 is a network access configured to perform the method of any one of Examples 522 to 537.

Example 539 is a communication system for a network access node configured to perform the method of any one of Examples 522 to 537.

Example 540 is a non-transitory computer readable medium storing instructions that when executed by a controller of a network access node control the network access node to perform the method of any one of Examples 522 to 537.

Example 541 is a communication system including a detection module configured to monitor which terminal devices are connected to a network access node over time, wherein each of the terminal devices is of a first type or a second type mutually exclusive from the first type, and a scheduler module configured to use a discontinuous communication schedule for the network access node when each of the terminal devices connected to the network access node are of the first type and use a continuous communication schedule for the network access node when at least one of the terminal devices connected to the network access node is of the second type.

In Example 542, the subject matter of Example 541 can optionally include wherein terminal devices of the first type have data traffic activity that is more predictable than terminal devices of the second type.

In Example 543, the subject matter of Example 541 or 542 can optionally include wherein terminal devices of the first type have more regular data traffic activity than terminal devices of the second type.

In Example 544, the subject matter of any one of Examples 541 to 543 can optionally include wherein data traffic activity of terminal devices of the first type is scheduled earlier in time than data traffic activity of terminal devices of the second type.

In Example 545, the subject matter of any one of Examples 541 to 544 can optionally include wherein terminal devices of the first type are Internet of Things (IoT) devices and terminal devices of the second type are smartphones, laptops, or tablets.

In Example 546, the subject matter of any one of Examples 541 to 545 can optionally include wherein the detection module is further configured to classify each of the terminal devices connected to the network node at a first time as either being the first type or the second type.

In Example 547, the subject matter of any one of Examples 541 to 545 can optionally include wherein the detection module is further configured to classify each of the terminal devices connected to the network node at a first time as either being the first type or the second type based on a data traffic pattern of each of the terminal devices.

In Example 548, the subject matter of any one of Examples 541 to 547 can optionally include wherein the discontinuous communication schedule is a discontinuous reception (DRX) schedule or a discontinuous transmission (DTX) schedule.

In Example 549, the subject matter of any one of Examples 541 to 548 can optionally include wherein the discontinuous communication schedule is a discontinuous transmission (DTX) schedule with continuous reception, or a discontinuous reception (DRX) and a discontinuous transmission (DTX) schedule.

In Example 550, the subject matter of any one of Examples 541 to 549 can optionally include wherein the network access node is a small cell.

In Example 551, the subject matter of any one of Examples 541 to 550 can optionally further include a radio transceiver configured to transmit or receive data with the terminal devices connected to the network access node according to the discontinuous communication schedule when the scheduler module selects the discontinuous communication schedule.

In Example 552, the subject matter of any one of Examples 541 to 550 can optionally further include a radio transceiver configured to transmit or receive data with the terminal devices connected to the network access node according to the continuous communication schedule when the scheduler module selects the continuous communication schedule.

In Example 553, the subject matter of any one of Examples 541 to 552 can optionally include wherein the scheduler module is configured to use the discontinuous communication schedule for the network access node when each of the terminal devices connected to the network access node are of the first type and use the continuous communication schedule for the network access node when at least one of the terminal devices connected to the network access node is of the second type by switching from the discontinuous communication schedule to the continuous communication schedule when at least one terminal device of the second type connects to the network access node and switching from the continuous communication schedule to the discontinuous communication schedule a terminal device of the second type disconnects from the network access node and no other terminal devices of the second type are connected to the network access node.

In Example 554, the subject matter of any one of Examples 541 to 553 can optionally include wherein the scheduler module is further configured to provide control signaling to the terminal devices connected to the network access node that specifies whether the continuous communication schedule or the discontinuous communication schedule is being used.

In Example 555, the subject matter of any one of Examples 541 to 554 can optionally include wherein the discontinuous communication schedule has one or more active communication phases and one or more inactive communication phases, and wherein the scheduler module is further configured to instruct the terminal devices connected to the network access node to utilize the one or more active phases of the discontinuous communication schedule when the discontinuous communication schedule is being used.

In Example 556, the subject matter of any one of Examples 541 to 555 can optionally include wherein the scheduler module is configured to use the discontinuous communication schedule for the network access node when each of the terminal devices connected to the network access node are of the first type by selecting a discontinuous communication schedule with an activity pattern based on a quantity of the terminal devices connected to the network access node, a data traffic level of the terminal devices connected to the network access node, or a data traffic frequency of the terminal devices connected to the network access node.

Example 557 is a non-transitory computer readable medium storing instructions that when executed by a controller of a network access node control the network access node to perform a method including monitoring which terminal devices are connected to a network access node, wherein each of the terminal devices is of a first type or a second type mutually exclusive from the first type, using a discontinuous communication schedule for the network access node when each of the terminal devices connected to the network access node are of the first type, and using a continuous communication schedule for the network access node when at least one of the terminal devices connected to the network access node is of the second type.

In Example 558, the subject matter of Example 557 can optionally include wherein terminal devices of the first type have data traffic activity that is more predictable than terminal devices of the second type.

In Example 559, the subject matter of Example 557 or 558 can optionally include wherein terminal devices of the first type have more regular data traffic activity than terminal devices of the second type.

In Example 560, the subject matter of any one of Examples 557 to 559 can optionally include wherein data traffic activity of terminal devices of the first type is scheduled earlier in time than data traffic activity of terminal devices of the second type.

In Example 561, the subject matter of any one of Examples 557 to 560 can optionally include wherein terminal devices of the first type are Internet of Things (IoT) devices and terminal devices of the second type are smartphones, laptops, or tablets.

In Example 562, the subject matter of any one of Examples 557 to 561 can optionally include the method further including classifying each of the terminal devices connected to the network node at a first time as either being the first type or the second type.

In Example 563, the subject matter of any one of Examples 557 to 561 can optionally include the method further including classifying each of the terminal devices connected to the network node at a first time as either being the first type or the second type based on a data traffic pattern of each of the terminal devices.

In Example 564, the subject matter of any one of Examples 557 to 563 can optionally include wherein the discontinuous communication schedule is a discontinuous reception (DRX) schedule or a discontinuous transmission (DTX) schedule.

In Example 565, the subject matter of any one of Examples 557 to 564 can optionally include wherein the discontinuous communication schedule is a discontinuous transmission (DTX) schedule with continuous reception, or a discontinuous reception (DRX) and a discontinuous transmission (DTX) schedule.

In Example 566, the subject matter of any one of Examples 557 to 565 can optionally include wherein the network access node is a small cell.

In Example 567, the subject matter of any one of Examples 557 to 566 can optionally include wherein using the discontinuous communication schedule for the network access node when each of the terminal devices connected to the network access node are of the first type includes transmitting or receiving data with the terminal devices connected to the network access node according to the discontinuous communication schedule.

In Example 568, the subject matter of any one of Examples 557 to 566 can optionally include wherein using the continuous communication schedule for the network access node when at least one of the terminal devices connected to the network access node is of the second type includes transmitting or receiving data with the terminal devices connected to the network access node according to the continuous communication schedule.

In Example 569, the subject matter of any one of Examples 557 to 568 can optionally include wherein using the discontinuous communication schedule for the network access node when each of the terminal devices connected to the network access node are of the first type and using the continuous communication schedule for the network access node when at least one of the terminal devices connected to the network access node is of the second type includes switching from the discontinuous communication schedule to the continuous communication schedule when at least one terminal device of the second type connects to the network access node and switching from the continuous communication schedule to the discontinuous communication schedule a terminal device of the second type disconnects from the network access node and no other terminal devices of the second type are connected to the network access node.

In Example 570, the subject matter of any one of Examples 557 to 569 can optionally include the method further including providing control signaling to the terminal devices connected to the network access node that specifies whether the continuous communication schedule or the discontinuous communication schedule is being used.

In Example 571, the subject matter of any one of Examples 557 to 570 can optionally include wherein the discontinuous communication schedule has one or more active communication phases and one or more inactive communication phases, the method further including instructing the terminal devices connected to the network access node to utilize the one or more active phases of the discontinuous communication schedule when the discontinuous communication schedule is being used.

In Example 572, the subject matter of any one of Examples 557 to 571 can optionally include wherein using the discontinuous communication schedule for the network access node when each of the terminal devices connected to the network access node are of the first type includes selecting a discontinuous communication schedule with an activity pattern based on a quantity of the terminal devices connected to the network access node, a data traffic level of the terminal devices connected to the network access node, or a data traffic frequency of the terminal devices connected to the network access node.

Example 573 is a communication circuit arrangement including a detection circuit configured to monitor which terminal devices are connected to a network access node over time, wherein each of the terminal devices is of a first type or a second type mutually exclusive from the first type, and a scheduler circuit configured to use a discontinuous communication schedule for the network access node when each of the terminal devices connected to the network access node are of the first type and use a continuous communication schedule for the network access node when at least one of the terminal devices connected to the network access node is of the second type.

In Example 574, the subject matter of Example 573 can optionally include wherein the detection circuit and the scheduler circuit are software-defined circuitry or hardware-defined circuitry.

In Example 575, the subject matter of Example 573 or 574 can optionally include wherein terminal devices of the first type have data traffic activity that is more predictable than terminal devices of the second type.

In Example 576, the subject matter of any one of Examples 573 to 575 can optionally include wherein terminal devices of the first type have more regular data traffic activity than terminal devices of the second type.

In Example 577, the subject matter of any one of Examples 573 to 576 can optionally include wherein data traffic activity of terminal devices of the first type is scheduled earlier in time than data traffic activity of terminal devices of the second type.

In Example 578, the subject matter of any one of Examples 573 to 577 can optionally include wherein terminal devices of the first type are Internet of Things (IoT) devices and terminal devices of the second type are smartphones, laptops, or tablets.

In Example 579, the subject matter of any one of Examples 573 to 578 can optionally include wherein the detection circuit is further configured to classify each of the terminal devices connected to the network node at a first time as either being the first type or the second type.

In Example 580, the subject matter of any one of Examples 573 to 578 can optionally include wherein the detection circuit is further configured to classify each of the terminal devices connected to the network node at a first time as either being the first type or the second type based on a data traffic pattern of each of the terminal devices.

In Example 581, the subject matter of any one of Examples 573 to 580 can optionally include wherein the discontinuous communication schedule is a discontinuous reception (DRX) schedule or a discontinuous transmission (DTX) schedule.

In Example 582, the subject matter of any one of Examples 573 to 581 can optionally include wherein the discontinuous communication schedule is a discontinuous transmission (DTX) schedule with continuous reception, or a discontinuous reception (DRX) and a discontinuous transmission (DTX) schedule.

In Example 583, the subject matter of any one of Examples 573 to 582 can optionally include wherein the network access node is a small cell.

In Example 584, the subject matter of any one of Examples 573 to 583 can optionally further include radio circuitry configured to transmit or receive data with the terminal devices connected to the network access node according to the discontinuous communication schedule when the scheduler circuit selects the discontinuous communication schedule.

In Example 585, the subject matter of any one of Examples 573 to 583 can optionally further include radio circuitry configured to transmit or receive data with the terminal devices connected to the network access node according to the continuous communication schedule when the scheduler circuit selects the continuous communication schedule.

In Example 586, the subject matter of any one of Examples 573 to 585 can optionally include wherein the scheduler circuit is configured to use the discontinuous communication schedule for the network access node when each of the terminal devices connected to the network access node are of the first type and use the continuous communication schedule for the network access node when at least one of the terminal devices connected to the network access node is of the second type by switching from the discontinuous communication schedule to the continuous communication schedule when at least one terminal device of the second type connects to the network access node and switching from the continuous communication schedule to the discontinuous communication schedule a terminal device of the second type disconnects from the network access node and no other terminal devices of the second type are connected to the network access node.

In Example 587, the subject matter of any one of Examples 573 to 586 can optionally include wherein the scheduler circuit is further configured to provide control signaling to the terminal devices connected to the network access node that specifies whether the continuous communication schedule or the discontinuous communication schedule is being used.

In Example 588, the subject matter of any one of Examples 573 to 587 can optionally include wherein the discontinuous communication schedule has one or more active communication phases and one or more inactive communication phases, and wherein the scheduler circuit is further configured to instruct the terminal devices connected to the network access node to utilize the one or more active phases of the discontinuous communication schedule when the discontinuous communication schedule is being used.

In Example 589, the subject matter of any one of Examples 573 to 588 can optionally include wherein the scheduler circuit is configured to use the discontinuous communication schedule for the network access node when each of the terminal devices connected to the network access node are of the first type by selecting a discontinuous communication schedule with an activity pattern based on a quantity of the terminal devices connected to the network access node, a data traffic level of the terminal devices connected to the network access node, or a data traffic frequency of the terminal devices connected to the network access node.

Example 590 is a device including means for monitoring uplink or downlink data traffic associated with a radio access network to determine traffic load conditions, means for selecting a duty cycle with an active phase and an inactive phase based on the traffic load conditions, and means for processing additional uplink or downlink data traffic with the network processing infrastructure in a high power state during the active phase and in a low power state during the inactive phase.

Example 591 is a method of operating a network processing infrastructure, the method including monitoring uplink or downlink data traffic associated with a radio access network to determine traffic load conditions, selecting a duty cycle with an active phase and an inactive phase based on the traffic load conditions, and processing additional uplink or downlink data traffic with the network processing infrastructure in a high power state during the active phase and in a low power state during the inactive phase.

In Example 592, the subject matter of Example 591 can optionally include wherein monitoring uplink or downlink data traffic associated with the radio access network to determine traffic load conditions includes monitoring downlink traffic at core network interface of a network access node to obtain an average downlink throughput measurement, wherein selecting the duty cycle with the active phase and the inactive phase based on the traffic load conditions includes selecting the duty cycle based on the average downlink throughput measurement.

In Example 593, the subject matter of Example 592 can optionally include wherein selecting the duty cycle based on the average downlink throughput measurement includes selecting a duty cycle where a ratio of the active phase to the inactive phase is directly proportional to the average downlink throughput measurement.

In Example 594, the subject matter of Example 592 can optionally include wherein selecting the duty cycle with the active phase and the inactive phase based on the traffic load conditions includes selecting the duty cycle based on a predefined mapping scheme, where the predefined mapping scheme is configured to select duty cycles with a ratio of active phase length to inactive phase length that is directly proportional to traffic load conditions.

In Example 595, the subject matter of any one of Examples 591 to 594 can optionally include wherein monitoring uplink or downlink data traffic associated with the radio access network to determine traffic load conditions includes monitoring uplink traffic at an air interface of a network access node to obtain an average uplink throughput measurement, wherein selecting the duty cycle based on the traffic load conditions includes selecting the duty cycle based on the average uplink throughput measurement.

In Example 596, the subject matter of any one of Examples 591 to 594 can optionally include wherein monitoring uplink or downlink data traffic associated with the radio access network to determine traffic load conditions includes monitoring uplink scheduling requests or buffer status reports at an air interface of a network access node to obtain a predicted uplink traffic measurement, wherein selecting the duty cycle based on the traffic load conditions includes selecting the duty cycle based on the predicted uplink traffic measurement.

In Example 597, the subject matter of any one of Examples 591 to 596 can optionally further include detecting that traffic load conditions have increased and selecting a new duty cycle that has a larger ratio of active phase to inactive phase than the duty cycle, or detecting that traffic load conditions have decreased and selecting a new duty cycle that has a smaller ratio of active phase to inactive phase than the duty cycle.

In Example 598, the subject matter of any one of Examples 591 to 597 can optionally include wherein the network processing infrastructure is configured to operate in a plurality of power states that each provide a different processing capability, the method further including selecting the high power state and the low power state from the plurality of power states based on the traffic load conditions.

In Example 599, the subject matter of Example 598 can optionally include wherein the plurality of power states are finite and predefined.

In Example 600, the subject matter of Example 598 or 599 can optionally include wherein the plurality of power states differ from one another according to one or more of processing clock frequency, voltage, number of active processor cores, dynamic voltage and frequency scaling, clock gating, or power gating.

In Example 601, the subject matter of any one of Examples 591 to 600 can optionally include wherein the high power state has a higher processing clock frequency, a higher voltage, a higher number of active processor cores, a higher amount of dynamic voltage and frequency scaling, a higher amount of clock gating, or a higher amount of power gating than the low power state.

In Example 602, the subject matter of any one of Examples 591 to 601 can optionally further include scheduling the additional uplink or downlink data traffic according to the active phase and the inactive phase of the duty cycle.

In Example 603, the subject matter of Example 602 can optionally include wherein scheduling the additional uplink or downlink data traffic based on the active phase and the inactive phase of the duty cycle includes scheduling downlink grants or uplink grants during the active phase of the duty cycle.

In Example 604, the subject matter of any one of Examples 591 to 601 can optionally further include scheduling the additional uplink or downlink data traffic in the active phase and the inactive phase based on latency requirements of the additional uplink or downlink data traffic.

In Example 605, the subject matter of Example 604 can optionally include wherein scheduling the additional uplink or downlink data traffic in the active phase and the inactive phase based on the latency requirements of the additional uplink or downlink data traffic includes identifying latency-critical data traffic and non-latency-critical data traffic in the additional uplink or downlink data traffic, and scheduling the latency-critical data traffic in the active phase and the inactive phase and scheduling the non-latency-critical-data traffic in the active phase.

In Example 606, the subject matter of any one of Examples 591 to 601 can optionally further include scheduling the additional uplink or downlink data traffic in the active phase and the inactive phase based on quality of service (QoS) requirements of the additional uplink or downlink data traffic.

In Example 607, the subject matter of Example 606 can optionally include wherein the QoS requirements include QoS Class Indicator (QCI) values.

In Example 608, the subject matter of any one of Examples 591 to 607 can optionally include wherein the network processing infrastructure is configured with always-on processing resources that are active during the active phase and the inactive phase and duty-cycled processing resources that are active exclusively during the active phase.

In Example 609, the subject matter of Example 608 can optionally include wherein processing the additional uplink or downlink data traffic with the network processing infrastructure in the high power state during the active phase and in the low power state during the inactive phase includes processing latency-critical data traffic of the additional uplink or downlink data traffic with the always-on processing resources and processing non-latency-critical data traffic of the additional uplink or downlink data traffic with the duty-cycled processing resources.

In Example 610, the subject matter of any one of Examples 591 to 609 can optionally include wherein the network processing infrastructure has uplink processing resources and downlink processing resources and wherein the duty cycle is an uplink duty cycle, the method further including selecting a downlink duty cycle with an active phase and an inactive phase based on the traffic load conditions, wherein processing the additional uplink or downlink data traffic with the network processing infrastructure includes processing uplink data of the additional uplink or downlink data with the uplink processing resources in a high power state during the active phase of the uplink duty cycle and in a low power state during the inactive phase of the uplink duty cycle, and processing downlink data of the additional uplink or downlink data with the downlink processing resources in a high power state during the active phase of the downlink duty cycle and in a low power state during the inactive phase of the downlink duty cycle.

In Example 611, the subject matter of any one of Examples 591 to 610 can optionally further include receiving a control message from a terminal device that indicates a possible increase in the additional uplink or downlink data traffic, and adjusting the duty cycle based on the possible increase.

In Example 612, the subject matter of Example 611 can optionally include wherein adjusting the duty cycle based on the possible increase includes increasing a ratio of the active phase to the inactive phase or increasing a power level of the high power state.

In Example 613, the subject matter of any one of Examples 591 to 612 can optionally include wherein the network processing infrastructure is a component of a network access node.

In Example 614, the subject matter of any one of Examples 591 to 612 can optionally include wherein the network processing infrastructure is a component of a core network node.

Example 615 is a processor configured to perform the method of any one of Examples 591 to 614.

Example 616 is a non-transitory computer readable medium storing instructions that when executed by a processor direct the processor to perform the method of any one of Examples 591 to 614.

Example 617 is a network access node including a processor and a network processing infrastructure, the network access node configured to perform the method of any one of Examples 591 to 614.

Example 618 is a core network node including a processor and a network processing infrastructure, the core network node configured to perform the method of any one of Examples 591 to 614.

Example 619 is a communication system including a traffic monitoring module configured to monitor uplink or downlink data traffic associated with a radio access network to determine traffic load conditions, an activity control module configured to select a duty cycle with an active phase and an inactive phase based on the traffic load conditions, and a network processing infrastructure configured to process additional uplink or downlink data traffic with the network processing infrastructure in a high power state during the active phase and in a low power state during the inactive phase.

In Example 620, the subject matter of Example 619 can optionally include wherein the network processing infrastructure includes a processor and one or more hardware accelerators configured to perform the processing.

In Example 621, the subject matter of Example 619 or 620 can optionally further include a radio transceiver and configured as a network access node.

In Example 622, the subject matter of Example 619 or 620 can optionally be configured as a core network node.

In Example 623, the subject matter of any one of Examples 619 to 622 can optionally include wherein the traffic monitoring module is configured to monitor uplink or downlink data traffic associated with the radio access network to determine traffic load conditions by monitoring downlink traffic at core network interface of a network access node to obtain an average downlink throughput measurement, and wherein the activity control module is configured to select the duty cycle based on the traffic load conditions by selecting the duty cycle based on the average downlink throughput measurement.

In Example 624, the subject matter of Example 623 can optionally include wherein the activity control module is configured to select the duty cycle based on the average downlink throughput measurement by selecting a duty cycle where a ratio of the active phase to the inactive phase is directly proportional to the average downlink throughput measurement.

In Example 625, the subject matter of Example 623 can optionally include wherein the activity control module is configured to select the duty cycle with the active phase and the inactive phase based on the traffic load conditions by selecting the duty cycle based on a predefined mapping scheme, where the predefined mapping scheme is configured to select duty cycles with a ratio of active phase length to inactive phase length that is directly proportional to traffic load conditions.

In Example 626, the subject matter of any one of Examples 619 to 625 can optionally include wherein the traffic monitoring module is configured to monitor uplink or downlink data traffic associated with the radio access network to determine traffic load conditions by monitoring uplink traffic at an air interface of a network access node to obtain an average uplink throughput measurement, wherein the activity control module is configured to select the duty cycle with based on the traffic load conditions includes selecting the duty cycle based on the average uplink throughput measurement.

In Example 627, the subject matter of any one of Examples 619 to 626 can optionally include wherein the traffic monitoring module is configured to monitor uplink or downlink data traffic associated with the radio access network to determine traffic load conditions by monitoring uplink scheduling requests or buffer status reports at an air interface of a network access node to obtain a predicted uplink traffic measurement, wherein the activity control module is configured to select the duty cycle based on the traffic load conditions includes selecting the duty cycle based on the predicted uplink traffic measurement.

In Example 628, the subject matter of any one of Examples 619 to 627 can optionally include wherein the activity control module is further configured to detect that traffic load conditions have increased and select a new duty that has a larger ratio of active phase to inactive phase than the duty cycle, or detect that traffic load conditions have decreased and select a new duty cycle that has a smaller ratio of active phase to inactive phase than the duty cycle.

In Example 629, the subject matter of any one of Examples 619 to 628 can optionally include wherein the network processing infrastructure is configured to operate in a plurality of power states that each provide a different processing capability, the communication system further including a power management module configured to select the high power state and the low power state based on the traffic load conditions.

In Example 630, the subject matter of Example 629 can optionally include wherein the plurality of power states are finite and predefined.

In Example 631, the subject matter of Example 629 or 630 can optionally include wherein the plurality of power states differ from one another according to one or more of processing clock frequency, voltage, number of active processor cores, dynamic voltage and frequency scaling, clock gating, or power gating.

In Example 632, the subject matter of any one of Examples 619 to 631 can optionally include wherein the high power state has a higher processing clock frequency, a higher voltage, a higher number of active processor cores, a higher amount of dynamic voltage and frequency scaling, a higher amount of clock gating, or a higher amount of power gating than the low power state.

In Example 633, the subject matter of any one of Examples 619 to 632 can optionally further include a scheduling module configured to schedule the additional uplink or downlink data traffic according to the active phase and the inactive phase of the duty cycle.

In Example 634, the subject matter of Example 633 can optionally include wherein the scheduling module is configured to schedule the additional uplink or downlink data traffic according to the active phase and the inactive phase of the duty cycle by scheduling downlink grants or uplink grants during the active phase of the duty cycle.

In Example 635, the subject matter of any one of Examples 619 to 632 can optionally further include a scheduling module configured to schedule the additional uplink or downlink data traffic in the active phase and the inactive phase based on latency requirements of the additional uplink or downlink data traffic.

In Example 636, the subject matter of Example 635 can optionally include wherein the scheduling module is configured to schedule the additional uplink or downlink data traffic in the active phase and the inactive phase based on the latency requirements of the additional uplink or downlink data traffic by identifying latency-critical data traffic and non-latency-critical data traffic in the additional uplink or downlink data traffic, and scheduling the latency-critical data traffic in the active phase and the inactive phase and scheduling the non-latency-critical-data traffic in the active phase.

In Example 637, the subject matter of any one of Examples 619 to 632 can optionally further include a scheduling module configured to schedule the additional uplink or downlink data traffic in the active phase and the inactive phase based on quality of service (QoS) requirements of the additional uplink or downlink data traffic.

In Example 638, the subject matter of Example 637 can optionally include wherein the QoS requirements include QoS Class Indicator (QCI) values.

In Example 639, the subject matter of any one of Examples 619 to 638 can optionally include wherein the network processing is configured with always-on processing resources that are active during the active phase and the inactive phase and duty-cycled processing resources that are active exclusively during the active phase.

In Example 640, the subject matter of Example 639 can optionally include wherein the network processing infrastructure is configured to process latency-critical data traffic of the additional uplink or downlink data traffic with the always-on processing resources and to process non-latency-critical data traffic of the additional uplink or downlink data traffic with the duty-cycled processing resources.

In Example 641, the subject matter of any one of Examples 619 to 640 can optionally include wherein the network processing infrastructure has uplink processing resources and downlink processing resources and wherein the duty cycle is an uplink duty cycle, and wherein the activity control module is further configured to select a downlink duty cycle with an active phase and an inactive phase based on the traffic load conditions, and wherein the network processing infrastructure is configured to process the additional uplink or downlink data traffic by processing uplink data of the additional uplink or downlink data with the uplink processing resources in a high power state during the active phase of the uplink duty cycle and in a low power state during the inactive phase of the uplink duty cycle, and processing downlink data of the additional uplink or downlink data with the downlink processing resources in a high power state during the active phase of the downlink duty cycle and in a low power state during the inactive phase of the downlink duty cycle.

In Example 642, the subject matter of any one of Examples 619 to 641 can optionally include wherein the activity control module is further configured to receive a control message from a terminal device that indicates a possible increase in the additional uplink or downlink data traffic, and adjust the duty cycle based on the possible increase.

In Example 643, the subject matter of Example 642 can optionally include wherein the activity control module is configured to adjust the duty cycle based on the possible increase by increasing a ratio of the active phase to the inactive phase or increasing a power level of the high power state.

Example 644 is a non-transitory computer readable medium storing instructions that when executed by a processor control the processor to perform a method including monitoring uplink or downlink data traffic associated with a radio access network to determine traffic load conditions, selecting a duty cycle with an active phase and an inactive phase based on the traffic load conditions, and controlling a network processing infrastructure to process additional uplink or downlink data traffic in a high power state during the active phase and in a low power state during the inactive phase.

In Example 645, the subject matter of Example 644 can optionally include wherein monitoring uplink or downlink data traffic associated with the radio access network to determine traffic load conditions includes monitoring downlink traffic at core network interface of a network access node to obtain an average downlink throughput measurement, wherein selecting the duty cycle based on the traffic load conditions includes selecting the duty cycle based on the average downlink throughput measurement.

In Example 646, the subject matter of Example 645 can optionally include wherein selecting the duty cycle based on the average downlink throughput measurement includes selecting a duty cycle where a ratio of the active phase to the inactive phase is directly proportional to the average downlink throughput measurement.

In Example 647, the subject matter of Example 645 can optionally include wherein selecting the duty cycle with the active phase and the inactive phase based on the traffic load conditions includes selecting the duty cycle based on a predefined mapping scheme, where the predefined mapping scheme is configured to select duty cycles with a ratio of active phase length to inactive phase length that is directly proportional to traffic load conditions.

In Example 648, the subject matter of any one of Examples 644 to 647 can optionally include wherein monitoring uplink or downlink data traffic associated with the radio access network to determine traffic load conditions includes monitoring uplink traffic at an air interface of a network access node to obtain an average uplink throughput measurement, wherein selecting the duty cycle with based on the traffic load conditions includes selecting the duty cycle based on the average uplink throughput measurement.

In Example 649, the subject matter of any one of Examples 644 to 647 can optionally include wherein monitoring uplink or downlink data traffic associated with the radio access network to determine traffic load conditions includes monitoring uplink scheduling requests or buffer status reports at an air interface of a network access node to obtain a predicted uplink traffic measurement, wherein selecting the duty cycle based on the traffic load conditions includes selecting the duty cycle based on the predicted uplink traffic measurement.

In Example 650, the subject matter of any one of Examples 644 to 649 can optionally include the method further including detecting that traffic load conditions have increased and selecting a new duty cycle that has a larger ratio of active phase to inactive phase than the duty cycle, or detecting that traffic load conditions have decreased and selecting a new duty cycle that has a smaller ratio of active phase to inactive phase than the duty cycle.

In Example 651, the subject matter of any one of Examples 644 to 650 can optionally include wherein the network processing infrastructure is configured to operate in a plurality of power states that each provide a different processing capability, the method further including selecting the high power state and the low power state from the plurality of power states based on the traffic load conditions.

In Example 652, the subject matter of Example 651 can optionally include wherein the plurality of power states are finite and predefined.

In Example 653, the subject matter of Example 651 or 652 can optionally include wherein the plurality of power states differ from one another according to one or more of processing clock frequency, voltage, number of active processor cores, dynamic voltage and frequency scaling, clock gating, or power gating.

In Example 654, the subject matter of any one of Examples 644 to 653 can optionally include wherein the high power state has a higher processing clock frequency, a higher voltage, a higher number of active processor cores, a higher amount of dynamic voltage and frequency scaling, a higher amount of clock gating, or a higher amount of power gating than the low power state.

In Example 655, the subject matter of any one of Examples 644 to 654 can optionally include the method further including scheduling the additional uplink or downlink data traffic according to the active phase and the inactive phase of the duty cycle.

In Example 656, the subject matter of Example 655 can optionally include wherein scheduling the additional uplink or downlink data traffic according to the active phase and the inactive phase of the duty cycle includes scheduling downlink grants or uplink grants during the active phase of the duty cycle.

In Example 657, the subject matter of any one of Examples 644 to 654 can optionally include the method further including scheduling the additional uplink or downlink data traffic in the active phase and the inactive phase based on latency requirements of the additional uplink or downlink data traffic.

In Example 658, the subject matter of Example 657 can optionally include wherein scheduling the additional uplink or downlink data traffic in the active phase and the inactive phase based on the latency requirements of the additional uplink or downlink data traffic includes identifying latency-critical data traffic and non-latency-critical data traffic in the additional uplink or downlink data traffic, and scheduling the latency-critical data traffic in the active phase and the inactive phase and scheduling the non-latency-critical-data traffic in the active phase.

In Example 659, the subject matter of any one of Examples 644 to 654 can optionally include the method further including scheduling the additional uplink or downlink data traffic in the active phase and the inactive phase based on Quality of Service (QoS) requirements of the additional uplink or downlink data traffic.

In Example 660, the subject matter of Example 659 can optionally include wherein the QoS requirements include QoS Class Indicator (QCI) values.

In Example 661, the subject matter of any one of Examples 644 to 660 can optionally include wherein the network processing infrastructure is configured with always-on processing resources that are active during the active phase and the inactive phase and duty-cycled processing resources that are active exclusively during the active phase.

In Example 662, the subject matter of Example 661 can optionally include wherein controlling the network processing infrastructure to process the additional uplink or downlink data traffic in the high power state during the active phase and in the low power state during the inactive phase includes controlling the network processing infrastructure to process latency-critical data traffic of the additional uplink or downlink data traffic with the always-on processing resources and controlling the network processing infrastructure to process non-latency-critical data traffic of the additional uplink or downlink data traffic with the duty-cycled processing resources In Example 663, the subject matter of any one of Examples 644 to 662 can optionally include wherein the network processing infrastructure has uplink processing resources and downlink processing resources and wherein the duty cycle is an uplink duty cycle, the method further including selecting a downlink duty cycle with an active phase and an inactive phase based on the traffic load conditions, and wherein controlling the network processing infrastructure to process the additional uplink or downlink data traffic in the high power state during the active phase and in the low power state during the inactive phase includes controlling the network processing infrastructure to process uplink data of the additional uplink or downlink data with the uplink processing resources in a high power state during the active phase of the uplink duty cycle and in a low power state during the inactive phase of the uplink duty cycle, and controlling the network processing infrastructure to process downlink data of the additional uplink or downlink data with the downlink processing resources in a high power state during the active phase of the downlink duty cycle and in a low power state during the inactive phase of the downlink duty cycle.

In Example 664, the subject matter of any one of Examples 644 to 663 can optionally include wherein the method further includes receiving a control message from a terminal device that indicates a possible increase in the additional uplink or downlink data traffic, and adjusting the duty cycle based on the possible increase.

In Example 665, the subject matter of Example 664 can optionally include wherein adjusting the duty cycle based on the possible increase includes increasing a ratio of the active phase to the inactive phase or increasing a power level of the high power state.

In Example 666, the subject matter of any one of Examples 644 to 665 can optionally include wherein the network processing infrastructure is a component of a network access node.

In Example 667, the subject matter of any one of Examples 644 to 665 can optionally include wherein the network processing infrastructure is a component of a core network node.

Example 668 is a communication circuit arrangement including a traffic monitoring circuit configured to monitor uplink or downlink data traffic associated with a radio access network to determine traffic load conditions, an activity control circuit configured to select a duty cycle with an active phase and an inactive phase based on the traffic load conditions, and a network processing circuit configured to process additional uplink or downlink data traffic with the network processing circuit in a high power state during the active phase and in a low power state during the inactive phase.

In Example 669, the subject matter of Example 668 can optionally include wherein the network processing circuit includes a processor and one or more hardware accelerators configured to perform the processing.

In Example 670, the subject matter of Example 668 or 669 can optionally further include radio circuitry and configured as a network access node.

In Example 671, the subject matter of Example 668 or 669 can optionally be configured as a core network node.

In Example 672, the subject matter of any one of Examples 668 to 671 can optionally include wherein the traffic monitoring circuit is configured to monitor uplink or downlink data traffic associated with the radio access network to determine traffic load conditions by monitoring downlink traffic at core network interface of a network access node to obtain an average downlink throughput measurement, and wherein the activity control circuit is configured to select the duty cycle based on the traffic load conditions by selecting the duty cycle based on the average downlink throughput measurement.

In Example 673, the subject matter of Example 672 can optionally include wherein the activity control circuit is configured to select the duty cycle based on the average downlink throughput measurement by selecting a duty cycle where a ratio of the active phase to the inactive phase is directly proportional to the average downlink throughput measurement.

In Example 674, the subject matter of Example 672 can optionally include wherein the activity control circuit is configured to select the duty cycle with the active phase and the inactive phase based on the traffic load conditions by selecting the duty cycle based on a predefined mapping scheme, where the predefined mapping scheme is configured to select duty cycles with a ratio of active phase length to inactive phase length that is directly proportional to traffic load conditions.

In Example 675, the subject matter of any one of Examples 668 to 674 can optionally include wherein the traffic monitoring circuit is configured to monitor uplink or downlink data traffic associated with the radio access network to determine traffic load conditions by monitoring uplink traffic at an air interface of a network access node to obtain an average uplink throughput measurement, wherein the activity control circuit is configured to select the duty cycle with based on the traffic load conditions includes selecting the duty cycle based on the average uplink throughput measurement.

In Example 676, the subject matter of any one of Examples 668 to 675 can optionally include wherein the traffic monitoring circuit is configured to monitor uplink or downlink data traffic associated with the radio access network to determine traffic load conditions by monitoring uplink scheduling requests or buffer status reports at an air interface of a network access node to obtain a predicted uplink traffic measurement, wherein the activity control circuit is configured to select the duty cycle based on the traffic load conditions includes selecting the duty cycle based on the predicted uplink traffic measurement.

In Example 677, the subject matter of any one of Examples 668 to 676 can optionally include wherein the activity control circuit is further configured to detect that traffic load conditions have increased and select a new duty that has a larger ratio of active phase to inactive phase than the duty cycle, or detect that traffic load conditions have decreased and select a new duty cycle that has a smaller ratio of active phase to inactive phase than the duty cycle.

In Example 678, the subject matter of any one of Examples 668 to 677 can optionally include wherein the network processing circuit is configured to operate in a plurality of power states that each provide a different processing capability, the communication circuit arrangement further including a power management circuit configured to select the high power state and the low power state based on the traffic load conditions.

In Example 679, the subject matter of Example 678 can optionally include wherein the plurality of power states are finite and predefined.

In Example 680, the subject matter of Example 678 or 679 can optionally include wherein the plurality of power states differ from one another according to one or more of processing clock frequency, voltage, number of active processor cores, dynamic voltage and frequency scaling, clock gating, or power gating.

In Example 681, the subject matter of any one of Examples 668 to 680 can optionally include wherein the high power state has a higher processing clock frequency, a higher voltage, a higher number of active processor cores, a higher amount of dynamic voltage and frequency scaling, a higher amount of clock gating, or a higher amount of power gating than the low power state.

In Example 682, the subject matter of any one of Examples 668 to 681 can optionally further include a scheduling circuit configured to schedule the additional uplink or downlink data traffic according to the active phase and the inactive phase of the duty cycle.

In Example 683, the subject matter of Example 682 can optionally include wherein the scheduling circuit is configured to schedule the additional uplink or downlink data traffic according to the active phase and the inactive phase of the duty cycle by scheduling downlink grants or uplink grants during the active phase of the duty cycle.

In Example 684, the subject matter of any one of Examples 668 to 681 can optionally further include a scheduling circuit configured to schedule the additional uplink or downlink data traffic in the active phase and the inactive phase based on latency requirements of the additional uplink or downlink data traffic.

In Example 685, the subject matter of Example 684 can optionally include wherein the scheduling circuit is configured to schedule the additional uplink or downlink data traffic in the active phase and the inactive phase based on the latency requirements of the additional uplink or downlink data traffic by identifying latency-critical data traffic and non-latency-critical data traffic in the additional uplink or downlink data traffic, and scheduling the latency-critical data traffic in the active phase and the inactive phase and scheduling the non-latency-critical-data traffic in the active phase.

In Example 686, the subject matter of any one of Examples 668 to 681 can optionally further include a scheduling circuit configured to schedule the additional uplink or downlink data traffic in the active phase and the inactive phase based on quality of service (QoS) requirements of the additional uplink or downlink data traffic.

In Example 687, the subject matter of Example 686 can optionally include wherein the QoS requirements include QoS Class Indicator (QCI) values.

In Example 688, the subject matter of any one of Examples 668 to 687 can optionally include wherein the network processing is configured with always-on processing resources that are active during the active phase and the inactive phase and duty-cycled processing resources that are active exclusively during the active phase.

In Example 689, the subject matter of Example 688 can optionally include wherein the network processing circuit is configured to process latency-critical data traffic of the additional uplink or downlink data traffic with the always-on processing resources and to process non-latency-critical data traffic of the additional uplink or downlink data traffic with the duty-cycled processing resources.

In Example 690, the subject matter of any one of Examples 668 to 689 can optionally include wherein the network processing circuit has uplink processing resources and downlink processing resources and wherein the duty cycle is an uplink duty cycle, and wherein the activity control circuit is further configured to select a downlink duty cycle with an active phase and an inactive phase based on the traffic load conditions, and wherein the network processing circuit is configured to process the additional uplink or downlink data traffic by processing uplink data of the additional uplink or downlink data with the uplink processing resources in a high power state during the active phase of the uplink duty cycle and in a low power state during the inactive phase of the uplink duty cycle, and processing downlink data of the additional uplink or downlink data with the downlink processing resources in a high power state during the active phase of the downlink duty cycle and in a low power state during the inactive phase of the downlink duty cycle.

In Example 691, the subject matter of any one of Examples 668 to 690 can optionally include wherein the activity control circuit is further configured to receive a control message from a terminal device that indicates a possible increase in the additional uplink or downlink data traffic, and adjust the duty cycle based on the possible increase.

In Example 692, the subject matter of Example 691 can optionally include wherein the activity control circuit is configured to adjust the duty cycle based on the possible increase by increasing a ratio of the active phase to the inactive phase or increasing a power level of the high power state.

Example 693 is a communication system including a plurality of communication modules including a first communication module and a second communication module, wherein the first communication module is configured to perform a first communication processing task and is disabled according to a first communication schedule if no first communication processing task is performed, wherein the second communication module is configured to perform a second communication processing task and is disabled according to a second communication schedule if no second communication processing task is performed, and a control module configured to report a power level to a radio access network and receive a power-saving communication schedule in response to the reported power level, the power-saving communication schedule including scheduling requirements for the first communication processing task and the second communication processing task, wherein the first communication module is disabled according to the scheduling requirements for the first communication processing task and the second communication module is disabled according to the scheduling requirements for the second communication processing task.

In Example 694, the subject matter of Example 693 can optionally further include a radio transceiver and one or more antennas and configured as a radio communication terminal device.

In Example 695, the subject matter of Example 693 or 694 can optionally include wherein the first processing task and the second processing task are selected from the group consisting of a control channel search task, a radio channel measurement task, and a beamtracking task.

In Example 696, the subject matter of any one of Examples 693 to 695 can optionally include wherein the first processing task and the second processing task are physical (PHY) layer processing tasks.

In Example 697, the subject matter of any one of Examples 693 to 696 can optionally further include a controller configured to control the plurality of communication modules to disable the plurality of communication modules.

In Example 698, the subject matter of any one of Examples 693 to 697 can optionally include wherein the first communication module and the second communication module are hardware components.

In Example 699, the subject matter of any one of Examples 693 to 698 can optionally include wherein the first communication module and the second communication modules are mounted on a chip and physically separated.

In Example 700, the subject matter of any one of Examples 693 to 699 can optionally further include a power supply, wherein the controller is configured to determine a power level of the power supply as the reported power level.

In Example 701, the subject matter of any one of Examples 693 to 699 can optionally include wherein the controller is configured to evaluate a current power level of a power supply according to a predefined power class scheme to obtain a current power class and to report a power class of the predefined power class scheme as the power level.

In Example 702, the subject matter of Example 700 or 701 can optionally include wherein the power supply is a battery.

In Example 703, the subject matter of any one of Examples 693 to 702 can optionally include wherein the first processing task is a control channel search task and wherein the scheduling requirements for the first communication processing task indicate that a control channel for the communication system is allocated to a fixed set of radio resources.

In Example 704, the subject matter of Example 703 can optionally include wherein the first communication module is configured to process the fixed set of radio resources during one or more first time periods and is disabled during one or more other time periods.

In Example 705, the subject matter of any one of Examples 693 to 702 can optionally include wherein the first processing task is a radio channel measurement task and wherein the scheduling requirements for the first communication module require less frequent radio channel measurements than the first communication schedule.

In Example 706, the subject matter of any one of Examples 693 to 702 can optionally include wherein the first processing task is a beamtracking task and wherein the scheduling requirements for the first communication processing task require less frequent beamtracking in time than the first communication schedule.

In Example 707, the subject matter of any one of Examples 693 to 706 can optionally include wherein the power-saving communication schedule permits the first communication module or the second processing module to be disabled more frequently than the first communication schedule.

In Example 708, the subject matter of any one of Examples 693 to 707 can optionally include wherein the first communication module is disabled by entering a low-power state and wherein the second communication module is disabled by entering a low-power state.

In Example 709, the subject matter of any one of Examples 693 to 708 can optionally include wherein the power-saving schedule specifies a fixed modulation and coding scheme or a fixed traffic data channel resource allocation.

In Example 710, the subject matter of any one of Examples 693 to 709 can optionally include wherein the power level indicates a low battery power level.

Example 711 is a device including means for performing a first communication processing task with a first communication module and means for disabling the first communication module according to a first communication schedule when the first communication module is not performing the first communication processing task, means for performing a second communication processing task with a second communication module and means for disabling the second communication module according to a second communication schedule when the second communication module is not performing the second communication processing task, means for reporting a power level to a radio access network and means for receiving a power-saving communication schedule in response to the reported power level, wherein the power-saving communication schedule includes scheduling requirements for the first communication processing task and the second communication processing task, and means for disabling the first communication module according to the scheduling requirements for the first communication processing task and means for disabling the second communication module according to the scheduling requirements for the second processing task.

Example 712 is a method of operating a communication system, the method including performing a first communication processing task with a first communication module and disabling the first communication module according to a first communication schedule when the first communication module is not performing the first communication processing task, performing a second communication processing task with a second communication module and disabling the second communication module according to a second communication schedule when the second communication module is not performing the second communication processing task, reporting a power level to a radio access network and receiving a power-saving communication schedule in response to the reported power level, wherein the power-saving communication schedule includes scheduling requirements for the first communication processing task and the second communication processing task, and disabling the first communication module according to the scheduling requirements for the first communication processing task and disabling the second communication module according to the scheduling requirements for the second processing task.

In Example 713, the subject matter of Example 712 can optionally include wherein the first processing task and the second processing task are selected from the group consisting of a control channel search task, a radio channel measurement task, and a beamtracking task.

In Example 714, the subject matter of Example 712 or 713 can optionally include wherein the first processing task and the second processing task are physical (PHY) layer processing tasks.

In Example 715, the subject matter of any one of Examples 712 to 714 can optionally further include disabling the first communication module and the second communication module with a controller.

In Example 716, the subject matter of any one of Examples 712 to 715 can optionally include wherein the first communication module and the second communication module are hardware components.

In Example 717, the subject matter of any one of Examples 712 to 716 can optionally include wherein the first communication module and the second communication module s are mounted on a chip and physically separated.

In Example 718, the subject matter of any one of Examples 712 to 717 can optionally further include prior to reporting the power level to the radio access network, determining a power level of a power supply as the power level.

In Example 719, the subject matter of any one of Examples 712 to 717 can optionally further include prior to reporting the power level to the radio access network, evaluating a current power level of a power supply according to a predefined power class scheme to obtain a current power class, and reporting the current power class as the power level.

In Example 720, the subject matter of Example 718 or 719 can optionally include wherein the power supply is a battery.

In Example 721, the subject matter of any one of Examples 712 to 720 can optionally include wherein the first processing task is a control channel search task and wherein the scheduling requirements for the first communication processing task indicate that a control channel for the communication system is allocated to a fixed set of radio resources.

In Example 722, the subject matter of Example 721 can optionally further include activating the first communication module to process the fixed set of radio resources during one or more first time periods and wherein disabling the first communication module according to the scheduling requirements for the first communication processing task includes disabling first communication module during one or more other time periods.

In Example 723, the subject matter of any one of Examples 712 to 720 can optionally include wherein the first processing task is a radio channel measurement task and wherein the scheduling requirements for the first communication module require less frequent radio channel measurements than the first communication schedule.

In Example 724, the subject matter of any one of Examples 712 to 720 can optionally include wherein the first processing task is a beamtracking task and wherein the scheduling requirements for the first communication processing task require less frequent beamtracking than the first communication schedule.

In Example 725, the subject matter of any one of Examples 712 to 724 can optionally include wherein disabling the first communication module according to the scheduling requirements for the first communication processing task includes entering the first communication module into a low-power state and wherein disabling the second communication module according to the scheduling requirements for the second communication processing task includes entering the second communication module into a low-power state.

In Example 726, the subject matter of any one of Examples 712 to 725 can optionally include wherein the power-saving schedule specifies a fixed modulation and coding scheme or a fixed traffic data channel resource allocation.

In Example 727, the subject matter of any one of Examples 712 to 725 can optionally include wherein the power level indicates a low battery power level.

Example 728 is a non-transitory computer readable medium storing instructions that when executed by a controller of a communication system control the communication system to perform a method including performing a first communication processing task with a first communication module and disabling the first communication module according to a first communication schedule when the first communication module is not performing the first communication processing task, performing a second communication processing task with a second communication module and disabling the second communication module according to a second communication schedule when the second communication module is not performing the second communication processing task, reporting a power level to a radio access network and receiving a power-saving communication schedule in response to the reported power level, wherein the power-saving communication schedule includes scheduling requirements for the first communication processing task and the second communication processing task, and disabling the first communication module according to the scheduling requirements for the first communication processing task and disabling the second communication module according to the scheduling requirements for the second processing task.

In Example 729, the subject matter of Example 728 can optionally include wherein the first processing task and the second processing task are selected from the group consisting of a control channel search task, a radio channel measurement task, and a beamtracking task.

In Example 730, the subject matter of Example 728 or 729 can optionally include wherein the first processing task and the second processing task are physical (PHY) layer processing tasks.

In Example 731, the subject matter of any one of Examples 728 to 730 can optionally include the method further including disabling the first communication module and the second communication module with a controller.

In Example 732, the subject matter of any one of Examples 728 to 731 can optionally include wherein the first communication module and the second communication module are hardware components.

In Example 733, the subject matter of any one of Examples 728 to 732 can optionally include wherein the first communication module and the second communication module s are mounted on a chip and physically separated.

In Example 734, the subject matter of any one of Examples 728 to 733 can optionally include the method further including prior to reporting the power level to the radio access network, determining a power level of a power supply as the power level.

In Example 735, the subject matter of any one of Examples 728 to 733 can optionally include the method further including prior to reporting the power level to the radio access network, evaluating a current power level of a power supply according to a predefined power class scheme to obtain a current power class, and reporting the current power class as the power level.

In Example 736, the subject matter of Example 734 or 735 can optionally include wherein the power supply is a battery.

In Example 737, the subject matter of any one of Examples 728 to 736 can optionally include wherein the first processing task is a control channel search task and wherein the scheduling requirements for the first communication processing task indicate that a control channel for the communication system is allocated to a fixed set of radio resources.

In Example 738, the subject matter of Example 737 can optionally include the method further including activating the first communication module to process the fixed set of radio resources during one or more first time periods and wherein disabling the first communication module according to the scheduling requirements for the first communication processing task includes disabling first communication module during one or more other time periods.

In Example 739, the subject matter of any one of Examples 728 to 736 can optionally include wherein the first processing task is a radio channel measurement task and wherein the scheduling requirements for the first communication module require less frequent radio channel measurements than the first communication schedule.

In Example 740, the subject matter of any one of Examples 728 to 736 can optionally include wherein the first processing task is a beamtracking task and wherein the scheduling requirements for the first communication processing task require less frequent beamtracking than the first communication schedule.

In Example 741, the subject matter of any one of Examples 728 to 740 can optionally include wherein disabling the first communication module according to the scheduling requirements for the first communication processing task includes entering the first communication module into a low-power state and wherein disabling the second communication module according to the scheduling requirements for the second communication processing task includes entering the second communication module into a low-power state.

In Example 742, the subject matter of any one of Examples 728 to 741 can optionally include wherein the power-saving schedule specifies a fixed modulation and coding scheme or a fixed traffic data channel resource allocation.

In Example 743, the subject matter of any one of Examples 728 to 741 can optionally include wherein the power level indicates a low battery power level.

Example 744 is a communication circuit arrangement including a plurality of communication circuits including a first communication circuit and a second communication circuit, wherein the first communication circuit is configured to perform a first communication processing task and is disabled according to a first communication schedule if no first communication processing task is performed, wherein the second communication circuit is configured to perform a second communication processing task and is disabled according to a second communication schedule if no second communication processing task is performed, and a control circuit configured to report a power level to a radio access network and receive a power-saving communication schedule in response to the reported power level, the power-saving communication schedule including scheduling requirements for the first communication processing task and the second communication processing task, wherein the first communication circuit is disabled according to the scheduling requirements for the first communication processing task and the second communication circuit is disabled according to the scheduling requirements for the second communication processing task.

In Example 745, the subject matter of Example 744 can optionally further include a radio transceiver and one or more antennas and configured as a radio communication terminal device.

In Example 746, the subject matter of Example 744 or 745 can optionally include wherein the first processing task and the second processing task are selected from the group consisting of a control channel search task, a radio channel measurement task, and a beamtracking task.

In Example 747, the subject matter of any one of Examples 744 to 746 can optionally include wherein the first processing task and the second processing task are physical (PHY) layer processing tasks.

In Example 748, the subject matter of any one of Examples 744 to 747 can optionally further include a control circuit configured to control the plurality of communication circuits to disable the plurality of communication circuits.

In Example 749, the subject matter of any one of Examples 744 to 748 can optionally include wherein the first communication circuit and the second communication circuit are hardware components.

In Example 750, the subject matter of any one of Examples 744 to 749 can optionally include wherein the first communication circuit and the second communication circuits are mounted on a chip and physically separated.

In Example 751, the subject matter of any one of Examples 744 to 750 can optionally further include a power supply, wherein the control circuit is configured to determine a power level of the power supply as the reported power level.

In Example 752, the subject matter of any one of Examples 744 to 750 can optionally include wherein the control circuit is configured to evaluate a current power level of a power supply according to a predefined power class scheme to obtain a current power class and to report a power class of the predefined power class scheme as the power level.

In Example 753, the subject matter of Example 751 or 752 can optionally include wherein the power supply is a battery.

In Example 754, the subject matter of any one of Examples 744 to 753 can optionally include wherein the first processing task is a control channel search task and wherein the scheduling requirements for the first communication processing task indicate that a control channel for the communication circuit arrangement is allocated to a fixed set of radio resources.

In Example 755, the subject matter of Example 754 can optionally include wherein the first communication circuit is configured to process the fixed set of radio resources during one or more first time periods and is disabled during one or more other time periods.

In Example 756, the subject matter of any one of Examples 744 to 753 can optionally include wherein the first processing task is a radio channel measurement task and wherein the scheduling requirements for the first communication circuit require less frequent radio channel measurements than the first communication schedule.

In Example 757, the subject matter of any one of Examples 744 to 753 can optionally include wherein the first processing task is a beamtracking task and wherein the scheduling requirements for the first communication processing task require less frequent beamtracking in time than the first communication schedule.

In Example 758, the subject matter of any one of Examples 744 to 757 can optionally include wherein the power-saving communication schedule permits the first communication circuit or the second processing circuit to be disabled more frequently than the first communication schedule.

In Example 759, the subject matter of any one of Examples 744 to 758 can optionally include wherein the first communication circuit is disabled by entering a low-power state and wherein the second communication circuit is disabled by entering a low-power state.

In Example 760, the subject matter of any one of Examples 744 to 759 can optionally include wherein the power-saving schedule specifies a fixed modulation and coding scheme or a fixed traffic data channel resource allocation.

In Example 761, the subject matter of any one of Examples 744 to 760 can optionally include wherein the power level indicates a low battery power level.

Example 762 is a device including means for identifying a target operational change of the communication system based on a current radio condition and a current power supply status, wherein the target operational change is a performance adjustment or a power consumption adjustment, based on the target operational change, means for selecting a configuration for the communication system from a plurality of configurations having different performance properties or different power consumption properties, and means for transmitting or receiving data with the communication system according to the selected configuration.

Example 763 is a method of operating a communication system, the method including identifying a target operational change of the communication system based on a current radio condition and a current power supply status, wherein the target operational change is a performance adjustment or a power consumption adjustment, based on the target operational change, selecting a configuration for the communication system from a plurality of configurations having different performance properties or different power consumption properties, and transmitting or receiving data with the communication system according to the selected configuration.

In Example 764, the subject matter of Example 763 can optionally include wherein selecting the configuration for the communication system from the plurality of configurations includes selecting a configuration from the plurality of configurations that has a performance property or power consumption property that matches the target operational change as the selected configuration.

In Example 765, the subject matter of Example 763 or 764 can optionally include wherein the communication system includes a plurality of structurally different transmitter modules, and wherein selecting the configuration for the communication system from the plurality of configurations includes selecting a physical transmitter module from the plurality of structurally different transmitter modules to use for transmitting the data.

In Example 766, the subject matter of Example 763 or 764 can optionally include wherein the communication system includes a transmitter module, and wherein selecting the configuration for the communication system from the plurality of configurations includes selecting a configuration for the transmitter module to use for receiving the data.

In Example 767, the subject matter of Example 765 or 766 can optionally include wherein the plurality of configurations differ according to one or more of radio frequency oversampling rates, transmission powers, power control, number of antennas, beamforming setting, beamsteering setting, or antenna sensitivity.

In Example 768, the subject matter of Example 763 or 764 can optionally include wherein the communication system includes a plurality of structurally different receiver modules, and wherein selecting the configuration for the communication system from the plurality of configurations includes selecting a physical receiver module from the plurality of structurally different receiver modules to use for receiving the data.

In Example 769, the subject matter of Example 763 or 764 can optionally include wherein the communication system includes a receiver module, and wherein selecting the configuration for the communication system from the plurality of configurations includes selecting a configuration for the receiver module to use for receiving the data.

In Example 770, the subject matter of Example 768 or 769 can optionally include wherein the plurality of configurations differ according to one or more of decoders, equalizers, filter lengths, channel estimation techniques, interference cancelation techniques, noise cancelation techniques, processing bit width, clock frequencies, component voltages, packet combination techniques, number of antennas, beamforming setting, beamsteering setting, or antenna sensitivity.

In Example 771, the subject matter of any one of Examples 763 to 770 can optionally include wherein the communication system is composed of one or more antennas, radio frequency transceivers, physical (PHY) layer processing module, or cellular protocol stack controllers.

In Example 772, the subject matter of any one of Examples 763 to 771 can optionally further include monitoring radio conditions and power supply status to obtain the current radio condition and the current power supply status and triggering the identifying of the target operational change based on the monitoring.

In Example 773, the subject matter of Example 772 can optionally include wherein monitoring radio conditions and power supply and triggering the identifying of the target operational change based on the monitoring includes determining that radio conditions have fallen below a predefined threshold, and identifying a performance increase as the target operational change, and selecting a configuration from the plurality of configurations that has higher performance than a current configuration of the communication system as the selected configuration.

In Example 774, the subject matter of Example 772 can optionally include wherein monitoring radio conditions and power supply and triggering the identifying the target operational change based on the monitoring includes determining that radio conditions have exceeded a predefined threshold, identifying a power consumption decrease as the target operational change, and selecting a configuration from the plurality of configurations that has lower power consumption than a current configuration of the communication system as the selected configuration.

In Example 775, the subject matter of Example 772 can optionally include wherein monitoring radio conditions and power supply and triggering the identifying of the target operational change based on the monitoring includes determining that a remaining power supply level has fallen below a predefined threshold, identifying a power consumption decrease as the target operational change, and selecting a configuration from the plurality of configurations that has lower power consumption than a current configuration of the communication system as the selected configuration.

In Example 776, the subject matter of Example 772 can optionally include wherein monitoring radio conditions and power supply and triggering the identifying of the target operational change based on the monitoring includes determining that a power consumption level has exceeded a predefined threshold, identifying a power consumption decrease as the target operational change, and selecting a configuration from the plurality of configurations that has lower power consumption than a current configuration of the communication system as the selected configuration.

In Example 777, the subject matter of any one of Examples 772 to 776 can optionally include wherein monitoring radio conditions includes monitoring one or more of signal power, signal quality, signal-to-noise ratio (SNR), signal-to-interference-plus-noise ratio (SINR), channel Doppler spread, channel delay spread, decoder error rate, decoder soft bit magnitude, or retransmission rate.

In Example 778, the subject matter of any one of Examples 772 to 777 can optionally include wherein monitoring power supply includes monitoring one or more of battery power supply level, battery power consumption level, or power consumption level of the communication system.

In Example 779, the subject matter of any one of Examples 763 to 778 can optionally further include selecting a target communication schedule based on the target operational change, and transmitting a request for the target communication schedule to a network access node.

Example 780 is a communication system, configured to perform the method of any one of Examples 763 to 779.

Example 781 is a non-transitory computer readable medium storing instructions that when executed by a processor direct the processor to perform a method of identifying a target operational change of a communication system based on a current radio condition and a current power supply status, wherein the target operational change is a performance adjustment or a power consumption adjustment, based on the target operational change, selecting a configuration for the communication system from a plurality of configurations having different performance properties or different power consumption properties, and controlling the communication system to transmit or receive data according to the selected configuration.

In Example 782, the subject matter of Example 781 can optionally include wherein selecting the configuration for the communication system from the plurality of configurations includes selecting a configuration from the plurality of configurations that has a performance property or power consumption property that matches the target operational change as the selected configuration.

In Example 783, the subject matter of Example 781 or 782 can optionally include wherein the communication system includes a plurality of structurally different transmitter modules, and wherein selecting the configuration for the communication system from the plurality of configurations includes selecting a physical transmitter module from the plurality of structurally different transmitter modules to use for transmitting the data.

In Example 784, the subject matter of Example 781 or 782 can optionally include wherein the communication system includes a transmitter module, and wherein selecting the configuration for the communication system from the plurality of configurations includes selecting a configuration for the transmitter module to use for receiving the data.

In Example 785, the subject matter of Example 783 or 784 can optionally include wherein the plurality of configurations differ according to one or more of radio frequency oversampling rates, transmission powers, power control, number of antennas, beamforming setting, beamsteering setting, or antenna sensitivity.

In Example 786, the subject matter of Example 781 or 782 can optionally include wherein the communication system includes a plurality of structurally different receiver modules, and wherein selecting the configuration for the communication system from the plurality of configurations includes selecting a physical receiver module from the plurality of structurally different receiver modules to use for receiving the data.

In Example 787, the subject matter of Example 781 or 782 can optionally include wherein the communication system includes a receiver module, and wherein selecting the configuration for the communication system from the plurality of configurations includes selecting a configuration for the receiver module to use for receiving the data.

In Example 788, the subject matter of Example 786 or 787 can optionally include wherein the plurality of configurations differ according to one or more of decoders, equalizers, filter lengths, channel estimation techniques, interference cancelation techniques, noise cancelation techniques, processing bit width, clock frequencies, component voltages, packet combination techniques, number of antennas, beamforming setting, beamsteering setting, or antenna sensitivity.

In Example 789, the subject matter of any one of Examples 781 to 788 can optionally include wherein the communication system is composed of one or more antennas, radio frequency transceivers, physical (PHY) layer processing modules, or cellular protocol stack controllers.

In Example 790, the subject matter of any one of Examples 781 to 789 can optionally include the method further including monitoring radio conditions and power supply status to obtain the current radio condition and the current power supply status and triggering the identifying of the target operational change based on the monitoring.

In Example 791, the subject matter of Example 790 can optionally include wherein monitoring radio conditions and power supply and triggering the identifying of the target operational change based on the monitoring includes determining that radio conditions have fallen below a predefined threshold, and identifying a performance increase as the target operational change, and selecting a configuration from the plurality of configurations that has higher performance than a current configuration of the communication system as the selected configuration.

In Example 792, the subject matter of Example 790 can optionally include wherein monitoring radio conditions and power supply and triggering the identifying the target operational change based on the monitoring includes determining that radio conditions have exceeded a predefined threshold, identifying a power consumption decrease as the target operational change, and selecting a configuration from the plurality of configurations that has lower power consumption than a current configuration of the communication system as the selected configuration.

In Example 793, the subject matter of Example 790 can optionally include wherein monitoring radio conditions and power supply and triggering the identifying of the target operational change based on the monitoring includes determining that a remaining power supply level has fallen below a predefined threshold, identifying a power consumption decrease as the target operational change, and selecting a configuration from the plurality of configurations that has lower power consumption than a current configuration of the communication system as the selected configuration.

In Example 794, the subject matter of Example 790 can optionally include wherein monitoring radio conditions and power supply and triggering the identifying of the target operational change based on the monitoring includes determining that a power consumption level has exceeded a predefined threshold, identifying a power consumption decrease as the target operational change, and selecting a configuration from the plurality of configurations that has lower power consumption than a current configuration of the communication system as the selected configuration.

In Example 795, the subject matter of any one of Examples 790 to 794 can optionally include wherein monitoring radio conditions includes monitoring one or more of signal power, signal quality, signal-to-noise ratio (SNR), signal-to-interference-plus-noise ratio (SINR), channel Doppler spread, channel delay spread, decoder error rate, decoder soft bit magnitude, or retransmission rate.

In Example 796, the subject matter of any one of Examples 790 to 795 can optionally include wherein monitoring power supply includes monitoring one or more of battery power supply level, battery power consumption level, or power consumption level of the communication system.

In Example 797, the subject matter of any one of Examples 781 to 796 can optionally include the method further including selecting a target communication schedule based on the target operational change, and transmitting a request for the target communication schedule to a network access node.

Example 798 is a communication system including a controller configured to identify a target operational change of the communication system based on a current radio condition and a current power supply status, wherein the target operational change is a performance adjustment or a power consumption adjustment, and, based on the target operational change, select a configuration for the communication system from a plurality of configurations having different performance properties or different power consumption properties, and one or modules configured to transmit or receive data according to the selected configuration.

In Example 799, the subject matter of Example 798 can optionally be configured as a radio communication terminal device.

In Example 800, the subject matter of Example 798 or 799 can optionally include wherein the controller is configured to select the configuration for the communication system from the plurality of configurations by selecting a configuration from the plurality of configurations that has a performance property or power consumption property that matches the target operational change as the selected configuration.

In Example 801, the subject matter of any one of Examples 798 to 800 can optionally include wherein the one or more modules include a plurality of structurally different transmitter modules, and wherein the controller is configured to select the configuration for the communication system from the plurality of configurations by selecting a transmitter module from the plurality of structurally different transmitter modules to use to transmit the data.

In Example 802, the subject matter of any one of Examples 798 to 800 can optionally include wherein the one or more modules include a transmitter module, and wherein the controller is configured to select the configuration for the communication system from the plurality of configurations by selecting a configuration for the transmitter module to use to receive the data.

In Example 803, the subject matter of Example 801 or 802 can optionally include wherein the plurality of configurations differ according to one or more of radio frequency oversampling rates, transmission powers, power control, number of antennas, beamforming setting, beamsteering setting, or antenna sensitivity.

In Example 804, the subject matter of any one of Examples 798 to 800 can optionally include wherein the one or more modules include a plurality of structurally different receiver modules, and wherein the controller is configured to select the configuration for the communication system from the plurality of configurations by selecting a receiver module from the plurality of structurally different receiver modules to use to receive the data.

In Example 805, the subject matter of any one of Examples 798 to 800 can optionally include wherein the one or more modules include a receiver module, and wherein the controller is configured to select the configuration for the communication system from the plurality of configurations by selecting a configuration for the receiver module to use for receiving the data.

In Example 806, the subject matter of Example 804 or 805 can optionally include wherein the plurality of configurations differ according to one or more of decoders, equalizers, filter lengths, channel estimation techniques, interference cancelation techniques, noise cancelation techniques, processing bit width, clock frequencies, component voltages, packet combination techniques, number of antennas, beamforming setting, beamsteering setting, or antenna sensitivity.

In Example 807, the subject matter of any one of Examples 798 to 806 can optionally include wherein the one or more modules are composed of one or more antennas, radio frequency transceivers, physical (PHY) layer processing modules, or cellular protocol stack controllers.

In Example 808, the subject matter of any one of Examples 798 to 807 can optionally further include a radio condition monitoring module configured to monitor radio conditions to obtain the current radio condition, and a power supply monitoring module configured to monitor power supply status to obtain the current power supply status, wherein the controller is configured to trigger the identifying of the target operational change when the radio conditions and the power supply status meet a predefined criteria.

In Example 809, the subject matter of Example 808 can optionally include wherein the controller is configured to trigger the identifying of the target operational change when the radio conditions and the power supply status meet the predefined criteria by determining that radio conditions have fallen below a predefined threshold, identifying a performance increase as the target operational change, and selecting a configuration from the plurality of configurations that has higher performance than a current configuration of the communication system as the selected configuration.

In Example 810, the subject matter of Example 808 can optionally include wherein the controller is configured to trigger the identifying of the target operational change when the radio conditions and the power supply status meet the predefined criteria by determining that radio conditions have exceeded a predefined threshold, identifying a power consumption decrease as the target operational change, and selecting a configuration from the plurality of configurations that has lower power consumption than a current configuration of the communication system as the selected configuration.

In Example 811, the subject matter of Example 808 can optionally include wherein the controller is configured to trigger the identifying of the target operational change when the radio conditions and the power supply status meet the predefined criteria by determining that a remaining power supply level has fallen below a predefined threshold, identifying a power consumption decrease as the target operational change, and selecting a configuration from the plurality of configurations that has lower power consumption than a current configuration of the communication system as the selected configuration.

In Example 812, the subject matter of Example 808 can optionally include wherein the controller is configured to trigger the identifying of the target operational change when the radio conditions and the power supply status meet the predefined criteria by determining that a power consumption level has exceeded a predefined threshold, identifying a power consumption decrease as the target operational change, and selecting a configuration from the plurality of configurations that has lower power consumption than a current configuration of the communication system as the selected configuration.

In Example 813, the subject matter of any one of Examples 808 to 812 can optionally include wherein the radio condition monitoring module is configured to monitor radio conditions by monitoring one or more of signal power, signal quality, signal-to-noise ratio (SNR), signal-to-interference-plus-noise ratio (SINR), channel Doppler spread, channel delay spread, decoder error rate, decoder soft bit magnitude, or retransmission rate.

In Example 814, the subject matter of any one of Examples 808 to 813 can optionally include wherein the power supply monitoring module is configured to monitor power supply by monitoring one or more of battery power supply level, battery power consumption level, or power consumption level of the communication system.

In Example 815, the subject matter of any one of Examples 798 to 814 can optionally include wherein the controller is further configured to select a target communication schedule based on the target operational change, and transmit a request for the target communication schedule to a network access node.

Example 816 is a communication system including one or more modules configured to transmit or receive data according to a first configuration of the communication system, and a controller configured to identify that current radio conditions and a current power supply status meet a predefined criteria and select a second configuration of the communication system that has a different performance property or different power consumption property than the first configuration, the one or more modules further configured to transmit or receive second data with the communication system according to the second configuration.

In Example 817, the subject matter of Example 816 can optionally be configured as a radio communication terminal device.

In Example 818, the subject matter of Example 816 or 817 can optionally include wherein the controller is configured to select a configuration from a finite plurality of predefined configurations of the communication system as the second configuration.

In Example 819, the subject matter of any one of Examples 816 to 818 can optionally include wherein the one or more modules include a plurality of structurally different transmitter modules, and wherein the controller is configured to select the second configuration of the communication system by selecting a transmitter module from the plurality of structurally different transmitter modules to use to transmit the second data.

In Example 820, the subject matter of any one of Examples 816 to 818 can optionally include wherein the one or more modules include a transmitter module, and wherein the controller is configured to select the second configuration of the communication system by selecting a configuration for the transmitter module to use to receive the data.

In Example 821, the subject matter of Example 819 or 820 can optionally include wherein the first configuration differs from the second configuration according to one or more of radio frequency oversampling rates, transmission powers, power control, number of antennas, beamforming setting, beamsteering setting, or antenna sensitivity.

In Example 822, the subject matter of any one of Examples 816 to 818 can optionally include wherein the one or more modules include a plurality of structurally different receiver modules, and wherein the controller is configured to select the second configuration for the communication system by selecting a receiver module from the plurality of structurally different receiver modules to use to receive the data.

In Example 823, the subject matter of any one of Examples 816 to 818 can optionally include wherein the one or more modules include a receiver module, and wherein the controller is configured to select the second configuration of the communication system by selecting a configuration for the receiver module to use for receiving the data.

In Example 824, the subject matter of Example 822 or 823 can optionally include wherein the first configuration differs from the second configuration according to one or more of decoders, equalizers, filter lengths, channel estimation techniques, interference cancelation techniques, noise cancelation techniques, processing bit width, clock frequencies, component voltages, packet combination techniques, number of antennas, beamforming setting, beamsteering setting, or antenna sensitivity.

In Example 825, the subject matter of any one of Examples 816 to 824 can optionally include wherein the one or more modules are composed of one or more antennas, radio frequency transceivers, physical (PHY) layer processing modules, or cellular protocol stack controllers.

In Example 826, the subject matter of any one of Examples 816 to 825 can optionally further include a radio condition monitoring module configured to monitor radio conditions to obtain the current radio conditions, and a power supply monitoring module configured to monitor power supply status to obtain the current power supply status.

In Example 827, the subject matter of Example 826 can optionally include wherein the radio condition monitoring module is configured to monitor radio conditions by monitoring one or more of signal power, signal quality, signal-to-noise ratio (SNR), signal-to-interference-plus-noise ratio (SINR), channel Doppler spread, channel delay spread, decoder error rate, decoder soft bit magnitude, or retransmission rate.

In Example 828, the subject matter of Example 826 or 827 can optionally include wherein the power supply monitoring module is configured to monitor power supply by monitoring one or more of battery power supply level, battery power consumption level, or power consumption level of the communication system.

In Example 829, the subject matter of any one of Examples 816 to 828 can optionally include wherein the controller is configured to identify that the current radio conditions and the current power supply status meet the predefined criteria and select the second configuration of the communication system by determining that the current radio conditions are below a predefined threshold, and selecting a configuration of the communication system that has a higher performance than the first configuration as the second configuration.

In Example 830, the subject matter of any one of Examples 816 to 828 can optionally include wherein the controller is configured to identify that the current radio conditions and the current power supply status meet the predefined criteria and select the second configuration of the communication system by determining that the current radio conditions are above a predefined threshold, and selecting a configuration of the communication system that has lower power consumption than the first configuration as the second configuration.

In Example 831, the subject matter of any one of Examples 816 to 828 can optionally include wherein the controller is configured to identify that the current radio conditions and the current power supply status meet the predefined criteria and select the second configuration of the communication system by determining that a current power supply level indicated by the current power supply status is below a predefined threshold, and selecting a configuration of the communication system that has lower power consumption than the first configuration as the second configuration.

In Example 832, the subject matter of any one of Examples 816 to 828 can optionally include wherein the controller is configured to identify that the current radio conditions and the current power supply status meet the predefined criteria and select the second configuration of the communication system by determining that a current power consumption level indicated by the current power supply status is below a predefined threshold, and selecting a configuration of the communication system that has lower power consumption than the first configuration as the second configuration.

Example 833 is a communication circuit arrangement including a control circuit configured to identify a target operational change of the communication circuit arrangement based on a current radio condition and a current power supply status, wherein the target operational change is a performance adjustment or a power consumption adjustment, and, based on the target operational change, select a configuration for the communication circuit arrangement from a plurality of configurations having different performance properties or different power consumption properties, and one or circuits configured to transmit or receive data according to the selected configuration.

In Example 834, the subject matter of Example 833 can optionally include wherein the one or more circuits are hardware-defined circuitry, software-defined circuitry, or a mixed hardware-defined and software-defined circuitry.

In Example 835, the subject matter of Example 833 or 834 can optionally include wherein the control circuit is a controller configured to retrieve and execute software-defined instructions to control radio communication functionality of the communication circuit arrangement.

In Example 836, the subject matter of any one of Examples 833 to 835 can optionally be configured as a radio communication terminal device.

In Example 837, the subject matter of any one of Examples 833 to 836 can optionally include wherein the control circuit is configured to select the configuration for the communication circuit arrangement from the plurality of configurations by selecting a configuration from the plurality of configurations that has a performance property or power consumption property that matches the target operational change as the selected configuration.

In Example 838, the subject matter of any one of Examples 833 to 837 can optionally include wherein the one or more circuits include a plurality of structurally different transmitter circuits, and wherein the control circuit is configured to select the configuration for the communication circuit arrangement from the plurality of configurations by selecting a transmitter circuit from the plurality of structurally different transmitter circuits to use to transmit the data.

In Example 839, the subject matter of any one of Examples 833 to 837 can optionally include wherein the one or more circuits include a transmitter circuit, and wherein the control circuit is configured to select the configuration for the communication circuit arrangement from the plurality of configurations by selecting a configuration for the transmitter circuit to use to receive the data.

In Example 840, the subject matter of Example 838 or 839 can optionally include wherein the plurality of configurations differ according to one or more of radio frequency oversampling rates, transmission powers, power control, number of antennas, beamforming setting, beamsteering setting, or antenna sensitivity.

In Example 841, the subject matter of any one of Examples 833 to 837 can optionally include wherein the one or more circuits include a plurality of structurally different receiver circuits, and wherein the control circuit is configured to select the configuration for the communication circuit arrangement from the plurality of configurations by selecting a receiver circuit from the plurality of structurally different receiver circuits to use to receive the data.

In Example 842, the subject matter of any one of Examples 833 to 837 can optionally include wherein the one or more circuits include a receiver circuit, and wherein the control circuit is configured to select the configuration for the communication circuit arrangement from the plurality of configurations by selecting a configuration for the receiver circuit to use for receiving the data.

In Example 843, the subject matter of Example 841 or 842 can optionally include wherein the plurality of configurations differ according to one or more of decoders, equalizers, filter lengths, channel estimation techniques, interference cancelation techniques, noise cancelation techniques, processing bit width, clock frequencies, component voltages, packet combination techniques, number of antennas, beamforming setting, beamsteering setting, or antenna sensitivity.

In Example 844, the subject matter of any one of Examples 833 to 843 can optionally include wherein the one or more circuits are composed of one or more antenna circuits, radio frequency transceiver circuits, physical (PHY) layer processing circuits, or cellular protocol stack control circuits.

In Example 845, the subject matter of any one of Examples 833 to 844 can optionally further include a radio condition monitoring circuit configured to monitor radio conditions to obtain the current radio condition, and a power supply monitoring circuit configured to monitor power supply status to obtain the current power supply status, wherein the control circuit is configured to trigger the identifying of the target operational change when the radio conditions and the power supply status meet a predefined criteria.

In Example 846, the subject matter of Example 845 can optionally include wherein the control circuit is configured to trigger the identifying of the target operational change when the radio conditions and the power supply status meet the predefined criteria by determining that radio conditions have fallen below a predefined threshold, identifying a performance increase as the target operational change, and selecting a configuration from the plurality of configurations that has higher performance than a current configuration of the communication circuit arrangement as the selected configuration.

In Example 847, the subject matter of Example 845 can optionally include wherein the control circuit is configured to trigger the identifying of the target operational change when the radio conditions and the power supply status meet the predefined criteria by determining that radio conditions have exceeded a predefined threshold, identifying a power consumption decrease as the target operational change, and selecting a configuration from the plurality of configurations that has lower power consumption than a current configuration of the communication circuit arrangement as the selected configuration.

In Example 848, the subject matter of Example 845 can optionally include wherein the control circuit is configured to trigger the identifying of the target operational change when the radio conditions and the power supply status meet the predefined criteria by determining that a remaining power supply level has fallen below a predefined threshold, identifying a power consumption decrease as the target operational change, and selecting a configuration from the plurality of configurations that has lower power consumption than a current configuration of the communication circuit arrangement as the selected configuration.

In Example 849, the subject matter of Example 845 can optionally include wherein the control circuit is configured to trigger the identifying of the target operational change when the radio conditions and the power supply status meet the predefined criteria by determining that a power consumption level has exceeded a predefined threshold, identifying a power consumption decrease as the target operational change, and selecting a configuration from the plurality of configurations that has lower power consumption than a current configuration of the communication circuit arrangement as the selected configuration.

In Example 850, the subject matter of any one of Examples 845 to 849 can optionally include wherein the radio condition monitoring circuit is configured to monitor radio conditions by monitoring one or more of signal power, signal quality, signal-to-noise ratio (SNR), signal-to-interference-plus-noise ratio (SINR), channel Doppler spread, channel delay spread, decoder error rate, decoder soft bit magnitude, or retransmission rate.

In Example 851, the subject matter of any one of Examples 845 to 850 can optionally include wherein the power supply monitoring circuit is configured to monitor power supply by monitoring one or more of battery power supply level, battery power consumption level, or power consumption level of the communication circuit arrangement.

In Example 852, the subject matter of any one of Examples 833 to 851 can optionally include wherein the control circuit is further configured to select a target communication schedule based on the target operational change, and transmit a request for the target communication schedule to a network access node.

Example 853 is a communication circuit arrangement including one or more circuits configured to transmit or receive data according to a first configuration of the communication circuit arrangement, and a control circuit configured to identify that current radio conditions and a current power supply status meet a predefined criteria and select a second configuration of the communication circuit arrangement that has a different performance property or different power consumption property than the first configuration, the one or more circuits further configured to transmit or receive second data with the communication circuit arrangement according to the second configuration.

In Example 854, the subject matter of Example 853 can optionally be configured as a radio communication terminal device.

In Example 855, the subject matter of Example 853 can optionally include wherein the one or more circuits are hardware-defined circuitry, software-defined circuitry, or a mixed hardware-defined and software-defined circuitry.

In Example 856, the subject matter of any one of Examples 853 to 855 can optionally include wherein the control circuit is a controller configured to retrieve and execute software-defined instructions to control radio communication functionality of the communication circuit arrangement.

In Example 857, the subject matter of any one of Examples 853 to 856 can optionally include wherein the control circuit is configured to select a configuration from a finite plurality of predefined configurations of the communication circuit arrangement as the second configuration.

In Example 858, the subject matter of any one of Examples 853 to 857 can optionally include wherein the one or more circuits include a plurality of structurally different transmitter circuits, and wherein the control circuit is configured to select the second configuration of the communication circuit arrangement by selecting a transmitter circuit from the plurality of structurally different transmitter circuits to use to transmit the second data.

In Example 859, the subject matter of any one of Examples 853 to 857 can optionally include wherein the one or more circuits include a transmitter circuit, and wherein the control circuit is configured to select the second configuration of the communication circuit arrangement by selecting a configuration for the transmitter circuit to use to receive the data.

In Example 860, the subject matter of Example 858 or 859 can optionally include wherein the first configuration differs from the second configuration according to one or more of radio frequency oversampling rates, transmission powers, power control, number of antennas, beamforming setting, beamsteering setting, or antenna sensitivity.

In Example 861, the subject matter of any one of Examples 853 to 857 can optionally include wherein the one or more circuits include a plurality of structurally different receiver circuits, and wherein the control circuit is configured to select the second configuration for the communication circuit arrangement by selecting a receiver circuit from the plurality of structurally different receiver circuits to use to receive the data.

In Example 862, the subject matter of any one of Examples 853 to 857 can optionally include wherein the one or more circuits include a receiver circuit, and wherein the control circuit is configured to select the second configuration of the communication circuit arrangement by selecting a configuration for the receiver circuit to use for receiving the data.

In Example 863, the subject matter of Example 861 or 862 can optionally include wherein the first configuration differs from the second configuration according to one or more of decoders, equalizers, filter lengths, channel estimation techniques, interference cancelation techniques, noise cancelation techniques, processing bit width, clock frequencies, component voltages, packet combination techniques, number of antennas, beamforming setting, beamsteering setting, or antenna sensitivity.

In Example 864, the subject matter of any one of Examples 853 to 863 can optionally include wherein the one or more circuits are composed of one or more antenna circuits, radio frequency transceiver circuits, physical (PHY) layer processing circuits, or cellular protocol stack control circuits.

In Example 865, the subject matter of any one of Examples 853 to 864 can optionally further include a radio condition monitoring circuit configured to monitor radio conditions to obtain the current radio conditions, and a power supply monitoring circuit configured to monitor power supply status to obtain the current power supply status.

In Example 866, the subject matter of Example 865 can optionally include wherein the radio condition monitoring circuit is configured to monitor radio conditions by monitoring one or more of signal power, signal quality, signal-to-noise ratio (SNR), signal-to-interference-plus-noise ratio (SINR), channel Doppler spread, channel delay spread, decoder error rate, decoder soft bit magnitude, or retransmission rate.

In Example 867, the subject matter of Example 865 or 866 can optionally include wherein the power supply monitoring circuit is configured to monitor power supply by monitoring one or more of battery power supply level, battery power consumption level, or power consumption level of the communication circuit arrangement.

In Example 868, the subject matter of any one of Examples 853 to 867 can optionally include wherein the control circuit is configured to identify that the current radio conditions and the current power supply status meet the predefined criteria and select the second configuration of the communication circuit arrangement by determining that the current radio conditions are below a predefined threshold, and selecting a configuration of the communication circuit arrangement that has a higher performance than the first configuration as the second configuration.

In Example 869, the subject matter of any one of Examples 853 to 867 can optionally include wherein the control circuit is configured to identify that the current radio conditions and the current power supply status meet the predefined criteria and select the second configuration of the communication circuit arrangement by determining that the current radio conditions are above a predefined threshold, and selecting a configuration of the communication circuit arrangement that has lower power consumption than the first configuration as the second configuration.

In Example 870, the subject matter of any one of Examples 853 to 867 can optionally include wherein the control circuit is configured to identify that the current radio conditions and the current power supply status meet the predefined criteria and select the second configuration of the communication circuit arrangement by determining that a current power supply level indicated by the current power supply status is below a predefined threshold, and selecting a configuration of the communication circuit arrangement that has lower power consumption than the first configuration as the second configuration.

In Example 871, the subject matter of any one of Examples 853 to 867 can optionally include wherein the control circuit is configured to identify that the current radio conditions and the current power supply status meet the predefined criteria and select the second configuration of the communication circuit arrangement by determining that a current power consumption level indicated by the current power supply status is below a predefined threshold, and selecting a configuration of the communication circuit arrangement that has lower power consumption than the first configuration as the second configuration.

Example 872 is a device including means for receiving a data stream including first data of a first data bearer and second data of a second data bearer, means for selecting a first communication module from a plurality of communication modules for the first data bearer based on a quality requirement of the first data bearer and a performance level of the first communication module, means for selecting a second communication module from the plurality of communication modules for the second data bearer based on a quality requirement of the second data bearer and a performance level of the second communication module, and means for processing first data from the first data bearer with the first communication module and means for processing second data from the second data bearer with the second communication module Example 873 is a method of performing radio communications, the method including receiving a data stream including first data of a first data bearer and second data of a second data bearer, selecting a first communication module from a plurality of communication modules for the first data bearer based on a quality requirement of the first data bearer and a performance level of the first communication module, selecting a second communication module from the plurality of communication modules for the second data bearer based on a quality requirement of the second data bearer and a performance level of the second communication module, and processing first data from the first data bearer with the first communication module and processing second data from the second data bearer with the second communication module.

In Example 874, the subject matter of Example 873 can optionally further include separating the first data from the data stream and routing the first data to the first communication module, and separating the second data from the data stream and routing the second data to the second communication module.

In Example 875, the subject matter of Example 874 can optionally further include receiving bearer information identifying the position of the first data and the second data in the data stream, wherein separating the first data from the data stream includes separating the first data from the data stream using the bearer information and wherein separating the second data from the data stream includes separating the second data from the data stream using the bearer information.

In Example 876, the subject matter of Example 875 can optionally include wherein receiving the bearer information includes receiving the bearer information from a network access node as control signaling.

In Example 877, the subject matter of Example 875 or 876 can optionally include wherein the bearer information specifies the position of the first data and the second data in the data stream on a bit-level.

In Example 878, the subject matter of any one of Examples 875 to 877 can optionally include wherein the quality requirement of the first data bearer is less than the quality requirement of the second data bearer, and wherein the bearer information specifies that the first data is compressed or has a higher coding rate than the second data.

In Example 879, the subject matter of any one of Examples 873 to 878 can optionally include wherein selecting the first communication module from the plurality of communication modules for the first data bearer based on the quality requirement of the first data bearer and the performance level of the first communication module includes selecting a communication module from the plurality of communication modules that has a performance level that meets the quality requirement of the first data bearer as the first communication module.

In Example 880, the subject matter of any one of Examples 873 to 879 can optionally include wherein the data stream is a physical layer (PHY) data stream.

In Example 881, the subject matter of any one of Examples 873 to 880 can optionally include wherein the first communication module meets the quality requirement of the first data bearer and fails to meet the quality requirement of the second data bearer.

In Example 882, the subject matter of any one of Examples 873 to 881 can optionally include wherein the first communication module and the second communication module are composed of structurally distinct hardware or software components.

In Example 883, the subject matter of any one of Examples 873 to 881 can optionally include wherein the first communication module is a processing module configured in a first configuration and the second communication module is the processing module configured in a second configuration.

In Example 884, the subject matter of Example 883 can optionally include wherein the processing module configured in the first configuration has different software logic or different hardware operating parameters from the processing module configured in the second configuration.

In Example 885, the subject matter of any one of Examples 873 to 884 can optionally include wherein the first communication module and the second communication differ according to one or more of decoders, equalizers, filter lengths, channel estimation techniques, interference cancelation techniques, noise cancelation techniques, processing bit width, clock frequencies, component voltages, packet combination techniques, number of algorithmic iterations, usage of iterative techniques in or between components, null-steering setting, number of antennas, beamforming setting, beamsteering setting, or antenna sensitivity.

In Example 886, the subject matter of any one of Examples 873 to 885 can optionally include wherein selecting the first communication module from the plurality of communication modules includes selecting the first communication module based on a power consumption rate of the first communication module.

In Example 887, the subject matter of any one of Examples 873 to 886 can optionally include wherein selecting the first communication module from the plurality of communication modules includes selecting a communication module from the plurality of communication modules with the lowest power consumption rate that meets the quality requirement of the first data bearer as the first communication module.

In Example 888, the subject matter of any one of Examples 873 to 887 can optionally further include adjusting a configuration of the first communication module to scale the performance level of the first communication module to match the quality requirement of the first data bearer.

In Example 889, the subject matter of any one of Examples 873 to 888 can optionally include wherein the quality requirement of the first data bearer and the quality requirement of the second data bearer are maximum latency requirements, maximum error rate requirements, or minimum data rate requirements.

In Example 890, the subject matter of any one of Examples 873 to 889 can optionally include wherein the quality requirement of the first data bearer is less than the quality requirement of the second data bearer, and wherein the performance level of the first communication module is less than the performance level of the second communication module.

In Example 891, the subject matter of any one of Examples 873 to 890 can optionally include wherein the first communication module has a lower power consumption rate than the second communication module.

In Example 892, the subject matter of any one of Examples 873 to 891 can optionally include wherein receiving the data stream including the first data of the first data bearer and the second data of the second data bearer includes receiving the first data on a first carrier of a carrier aggregation scheme and receiving the second data on a second carrier of the carrier aggregation scheme.

In Example 893, the subject matter of any one of Examples 873 to 892 can optionally further include placing the first communication module in a low power state during time intervals when no first data is present in the data stream and placing the second communication module in a low power state during time intervals when no second data is present in the data stream.

Example 894 is a communication system that includes one or more communication modules and is configured to perform the method of any one of Examples 873 to 893.

Example 895 is a non-transitory computer readable medium storing instructions that when executed by a controller of a radio communication terminal device direct the radio communication terminal device to perform the method of any one of Examples 873 to 894.

Example 896 is a radio communication terminal device configured to perform the method of any one of Examples 873 to 894.

Example 897 is a device including means for identifying first data for a first data bearer of a terminal device and second data for a second data bearer of the terminal device, means for generating a physical layer data stream by allocating the first data and the second data in the physical layer data stream based on quality requirements of the first data bearer and the second data bearer, and means for transmitting the physical layer data stream and a physical layer message to the terminal device, wherein the physical layer message specifies the allocation of the first data and the second data within the physical layer data stream.

Example 898 is a method of performing radio communications, the method including identifying first data for a first data bearer of a terminal device and second data for a second data bearer of the terminal device, generating a physical layer data stream by allocating the first data and the second data in the physical layer data stream based on quality requirements of the first data bearer and the second data bearer, and transmitting the physical layer data stream and a physical layer message to the terminal device, wherein the physical layer message specifies the allocation of the first data and the second data within the physical layer data stream.

In Example 899, the subject matter of Example 898 can optionally include wherein the physical layer message specifies the bit-level position of the first data and the second data bearer in the physical layer data stream.

In Example 900, the subject matter of Example 898 can optionally include wherein generating the physical layer data stream by allocating the first data and the second data in the physical layer data stream includes allocating the first data to a first carrier of a carrier aggregation scheme and allocating the second data to a second carrier of the carrier aggregation scheme.

In Example 901, the subject matter of Example 900 can optionally include wherein the physical layer message specifies that the first data is allocated to the first carrier and the second data is allocated to the second carrier.

In Example 902, the subject matter of Example 898 or 899 can optionally include wherein the first data bearer has lower quality requirements than the second data bearer and wherein the first data is scheduled to be transmitted over a plurality of data intervals over time, and wherein generating the physical layer data stream by allocating the first data and the second data in the physical layer data stream includes delaying a first data interval of the plurality of data intervals to be aligned in time within the physical layer data stream with a second data interval of the plurality of data intervals.

In Example 903, the subject matter of Example 898 or 899 can optionally include wherein the first data bearer has lower quality requirements than the second data bearer and the first data and the second data are scheduled to be transmitted over a plurality of data intervals over time, and wherein generating the physical layer data stream by allocating the first data and the second data in the physical layer data stream includes identifying a data interval of the plurality of data intervals that exceeds a data capacity limit and delaying first data in the data interval to a later data interval of the plurality of data intervals.

In Example 904, the subject matter of Example 898 or 899 can optionally include wherein the first data bearer has lower quality requirements than the second data bearer and the first data and the second data are scheduled to be transmitted over a plurality of data intervals over time, and wherein generating the physical layer data stream by allocating the first data and the second data in the physical layer data stream includes identifying a data interval of the plurality of data intervals that exceeds a data capacity limit and encoding the first data in the data interval with a higher coding rate than the second data in the data interval.

In Example 905, the subject matter of Example 898 or 899 can optionally include wherein the physical layer data stream is composed of a plurality of data intervals over time, and wherein generating the physical layer data stream by allocating the first data and the second data in the physical layer data stream includes allocating the first data onto different data intervals of the plurality of data intervals than the second data.

Example 906 is a communication system configured to perform the method of any one of Examples 898 to 905.

Example 907 is a non-transitory computer readable medium storing instructions that when executed by a controller of a radio communication network access node direct the radio communication network access node to perform the method of any one of Examples 898 to 905.

Example 908 is a radio communication network access node configured to perform the method of any one of Examples 898 to 905.

Example 909 is a communication system including a plurality of communication modules, a radio module configured to receive a data stream including first data of a first data bearer and second data of a second data bearer, and a controller configured to select a first communication module from the plurality of communication modules for the first data bearer based on a quality requirement of the first data bearer and a performance level of the first communication module, and select a second communication module from the plurality of communication modules for the second data bearer based on a quality requirement of the second data bearer and a performance level of the second communication module, the first communication module configured to process the first data and the second communication module configured to process the second data.

In Example 910, the subject matter of Example 909 can optionally be configured as a radio communication terminal device.

In Example 911, the subject matter of Example 909 or 910 can optionally further include a mapping module configured to separate the first data from the data stream and route the first data to the first communication module, and separate the second data from the data stream and route the second data to the second communication module.

In Example 912, the subject matter of Example 911 can optionally include wherein the controller is further configured to receive bearer information identifying the position of the first data and the second data in the data stream, and wherein the mapping module is configured to separate the first data from the data stream using the bearer information and configured to separate the second data from the data stream using the bearer information.

In Example 913, the subject matter of Example 912 can optionally include wherein the controller is configured to receive the bearer information from a network access node as control signaling.

In Example 914, the subject matter of Example 912 or 913 can optionally include wherein the bearer information specifies the position of the first data and the second data in the data stream in the data stream on a bit-level.

In Example 915, the subject matter of any one of Examples 912 to 914 can optionally include wherein the controller is configured to select the first communication module from the plurality of communication modules for the first data bearer based on the quality requirement of the first data bearer and the performance level of the first communication module by selecting a communication module from the plurality of communication modules that has a performance level that meets the quality requirement of the first data bearer as the first communication module.

In Example 916, the subject matter of any one of Examples 912 to 915 can optionally include wherein the first communication module meets the quality requirement of the first data bearer and fails to meet the quality requirement of the second data bearer.

In Example 917, the subject matter of any one of Examples 909 to 916 can optionally include wherein the first communication module and the second communication module are composed of structurally distinct hardware or software components.

In Example 918, the subject matter of any one of Examples 909 to 916 can optionally include wherein the first communication module is a processing module configured in a first configuration and the second communication module is the processing module configured in a second configuration.

In Example 919, the subject matter of Example 918 can optionally include wherein the processing module configured in the first configuration has different software logic or different hardware operating parameters from the processing module configured in the second configuration.

In Example 920, the subject matter of any one of Examples 909 to 919 can optionally include wherein the first communication module and the second communication module differ according to one or more of decoders, equalizers, filter lengths, channel estimation techniques, interference cancelation techniques, noise cancelation techniques, processing bit width, clock frequencies, component voltages, packet combination techniques, number of antennas, beamforming setting, beamsteering setting, or antenna sensitivity.

In Example 921, the subject matter of any one of Examples 909 to 920 can optionally include wherein the control module is configured to select the first communication module from the plurality of communication modules by selecting the first communication module based on a power consumption rate of the first communication module.

In Example 922, the subject matter of any one of Examples 909 to 921 can optionally include wherein the control module is further configured to adjust a configuration of the first communication module to scale the performance level of the first communication module to match the quality requirement of the first data bearer.

In Example 923, the subject matter of any one of Examples 909 to 922 can optionally include wherein the controller is configured to select the first communication module from the plurality of communication modules by selecting a communication module from the plurality of communication modules with the lowest power consumption rate that meets the quality requirement of the first data bearer as the first communication module.

In Example 924, the subject matter of any one of Examples 909 to 923 can optionally include wherein the quality requirement of the first data bearer and the quality requirement of the second data bearer are maximum latency requirements, maximum error rate requirements, or minimum data rate requirements.

In Example 925, the subject matter of any one of Examples 909 to 924 can optionally include wherein the quality requirement of the first data bearer is less than the quality requirement of the second data bearer, and wherein the performance level of the first communication module is less than the performance level of the second communication module.

In Example 926, the subject matter of any one of Examples 909 to 925 can optionally include wherein the first communication module has a lower power consumption rate than the second communication module.

In Example 927, the subject matter of any one of Examples 909 to 926 can optionally include wherein the radio module is configured to receive the data stream including the first data of the first data bearer and the second data of the second data bearer by receiving the first data on a first carrier of a carrier aggregation scheme and receiving the second data on a second carrier of the carrier aggregation scheme.

In Example 928, the subject matter of any one of Examples 909 to 927 can optionally include wherein the first communication module is configured to enter a low power state during time intervals when no first data is present in the data stream and the second communication module is configured to enter a low power state during time intervals when no second data is present in the data stream.

Example 929 is a communication system including a controller configured to identify first data for a first data bearer of a terminal device and second data for a second data bearer of the terminal device, and generate a physical layer data stream by allocating the first data and the second data in the physical layer data stream based on quality requirements of the first data bearer and the second data bearer, and a radio module configured to transmit the physical layer data stream and a physical layer message to the terminal device, wherein the physical layer message specifies the allocation of the first data and the second data within the physical layer data stream.

In Example 930, the subject matter of Example 929 can optionally be configured as a radio communication network access node.

In Example 931, the subject matter of Example 929 or 930 can optionally include wherein the physical layer message specifies that the bit-level position of the first data and the second data bearer in the physical layer data stream.

In Example 932, the subject matter of Example 929 or 930 can optionally include wherein the controller is configured to generate the generating the physical layer data stream by allocating the first data and the second data in the physical layer data stream by allocating the first data to a first carrier of a carrier aggregation scheme and allocating the second data to a second carrier of the carrier aggregation scheme.

In Example 933, the subject matter of Example 932 can optionally include wherein the physical layer message specifies that the first data is allocated to the first carrier and the second data is allocated to the second carrier.

In Example 934, the subject matter of Example 929 or 930 can optionally include wherein the first data bearer has lower quality requirements than the second data bearer and wherein the first data is scheduled to be transmitted over a plurality of data intervals over time, and wherein the controller is configured to generate the physical layer data stream by allocating the first data and the second data in the physical layer data stream by delaying a first data interval of the plurality of data intervals to be aligned in time within the physical layer data stream with a second data interval of the plurality of data intervals.

In Example 935, the subject matter of Example 929 or 930 can optionally include wherein the first data bearer has lower quality requirements than the second data bearer and the first data and the second data are scheduled to be transmitted over a plurality of data intervals over time, and wherein the controller is configured to generate the physical layer data stream by allocating the first data and the second data in the physical layer data stream by identifying a data interval of the plurality of data intervals that exceeds a data capacity limit and delaying first data in the data interval to a later data interval of the plurality of data intervals.

In Example 936, the subject matter of Example 929 or 930 can optionally include wherein the first data bearer has lower quality requirements than the second data bearer and the first data and the second data are scheduled to be transmitted over a plurality of data intervals over time, and wherein the controller is configured to generate the physical layer data stream by allocating the first data and the second data in the physical layer data stream by identifying a data interval of the plurality of data intervals that exceeds a data capacity limit and encoding the first data in the data interval with a higher coding rate than the second data in the data interval.

In Example 937, the subject matter of Example 929 or 930 can optionally include wherein the physical layer data stream is composed of a plurality of data intervals over time, and wherein the controller is configured to generate the physical layer data stream by allocating the first data and the second data in the physical layer data stream by allocating the first data onto different data intervals of the plurality of data intervals than the second data.

Example 938 is a communication system including a plurality of communication modules, and a controller configured to select a first communication module from the plurality of communication modules for a first data bearer based on a quality requirement of the first data bearer and a performance level of the first communication module, and select a second communication module from the plurality of communication modules for a second data bearer based on a quality requirement of the second data bearer and a performance level of the second communication module, the first communication module configured to process first data from the first data bearer to obtain processed first data and the second communication module configured to process second data from the second data bearer to obtain processed second data, the communication system further including a radio module configured to transmit a data stream including the processed first data and the processed second data.

In Example 939, the subject matter of Example 938 can optionally be configured as a radio communication terminal device.

In Example 940, the subject matter of Example 938 or 939 can optionally further include a mapping module configured to provide the first data to the first communication module and to provide the second data to the second communication module.

In Example 941, the subject matter of Example 940 can optionally include wherein the controller is further configured to obtain bearer information identifying the quality requirements of the first data bearer and the second data bearer and to generate a physical layer message.

In Example 942, the subject matter of Example 941 can optionally further include a combining module configured to combine the processed first data and the processed second data to obtain the data stream.

In Example 943, the subject matter of any one of Examples 938 to 942 can optionally include wherein the controller is configured to select the first communication module from the plurality of communication modules for the first data bearer based on the quality requirement of the first data bearer and the performance level of the first communication module by selecting a communication module from the plurality of communication modules that has a performance level that meets the quality requirement of the first data bearer as the first communication module.

In Example 944, the subject matter of any one of Examples 938 to 943 can optionally include wherein the first communication module meets the quality requirement of the first data bearer and fails to meet the quality requirement of the second data bearer.

In Example 945, the subject matter of any one of Examples 938 to 944 can optionally include wherein the first communication module and the second communication module are composed of structurally distinct hardware or software components.

In Example 946, the subject matter of any one of Examples 938 to 945 can optionally include wherein the first communication module is a processing module configured in a first configuration and the second communication module is the processing module configured in a second configuration.

In Example 947, the subject matter of Example 946 can optionally include wherein the processing module configured in the first configuration has different software logic or different hardware operating parameters from the processing module configured in the second configuration.

In Example 948, the subject matter of any one of Examples 938 to 947 can optionally include wherein the first communication module and the second communication module differ according to one or more of decoders, equalizers, filter lengths, channel estimation techniques, interference cancelation techniques, noise cancelation techniques, processing bit width, clock frequencies, component voltages, packet combination techniques, number of antennas, beamforming setting, beamsteering setting, or antenna sensitivity.

In Example 949, the subject matter of any one of Examples 938 to 948 can optionally include wherein the controller is configured to select the first communication module from the plurality of communication modules by selecting the first communication module based on a power consumption rate of the first communication module.

In Example 950, the subject matter of any one of Examples 938 to 949 can optionally include wherein the controller is configured to adjust a configuration of the first communication module to scale the performance level of the first communication module to match the quality requirement of the first data bearer.

In Example 951, the subject matter of any one of Examples 938 to 950 can optionally include wherein the controller is configured to select the first communication module from the plurality of communication modules by selecting a communication module from the plurality of communication modules with the lowest power consumption rate that meets the quality requirement of the first data bearer as the first communication module.

In Example 952, the subject matter of any one of Examples 938 to 951 can optionally include wherein the quality requirement of the first data bearer and the quality requirement of the second data bearer are maximum latency requirements, maximum error rate requirements, or minimum data rate requirements.

In Example 953, the subject matter of any one of Examples 938 to 952 can optionally include wherein the quality requirement of the first data bearer is less than the quality requirement of the second data bearer, and wherein the performance level of the first communication module is less than the performance level of the second communication module.

In Example 954, the subject matter of any one of Examples 938 to 953 can optionally include wherein the first communication module has a lower power consumption rate than the second communication module.

Example 955 is a communication circuit arrangement including a plurality of communication circuits, radio circuitry configured to receive a data stream including first data of a first data bearer and second data of a second data bearer, and a control circuit configured to select a first communication circuit from the plurality of communication circuits for the first data bearer based on a quality requirement of the first data bearer and a performance level of the first communication circuit, and select a second communication circuit from the plurality of communication circuits for the second data bearer based on a quality requirement of the second data bearer and a performance level of the second communication circuit, the first communication circuit configured to process the first data and the second communication circuit configured to process the second data.

In Example 956, the subject matter of Example 955 can optionally include wherein the control circuit is a processor configured to retrieve and execute software-defined instructions.

In Example 957, the subject matter of Example 955 or 956 can optionally include wherein the plurality of communication circuits are hardware-defined circuitry, software-defined circuitry, or mixed hardware-defined and software-defined circuitry.

In Example 958, the subject matter of any one of Examples 955 to 957 can optionally be configured as a radio communication terminal device.

In Example 959, the subject matter of any one of Examples 955 to 959 can optionally further include a mapping circuit configured to separate the first data from the data stream and route the first data to the first communication circuit, and separate the second data from the data stream and route the second data to the second communication circuit.

In Example 960, the subject matter of Example 959 can optionally include wherein the control circuit is further configured to receive bearer information identifying the position of the first data and the second data in the data stream, and wherein the mapping circuit is configured to separate the first data from the data stream using the bearer information and configured to separate the second data from the data stream using the bearer information.

In Example 961, the subject matter of Example 960 can optionally include wherein the control circuit is configured to receive the bearer information from a network access node as control signaling.

In Example 962, the subject matter of Example 960 or 961 can optionally include wherein the bearer information specifies the position of the first data and the second data in the data stream in the data stream on a bit-level.

In Example 963, the subject matter of any one of Examples 960 to 962 can optionally include wherein the control circuit is configured to select the first communication circuit from the plurality of communication circuits for the first data bearer based on the quality requirement of the first data bearer and the performance level of the first communication circuit by selecting a communication circuit from the plurality of communication circuits that has a performance level that meets the quality requirement of the first data bearer as the first communication circuit.

In Example 964, the subject matter of any one of Examples 960 to 963 can optionally include wherein the first communication circuit meets the quality requirement of the first data bearer and fails to meet the quality requirement of the second data bearer.

In Example 965, the subject matter of any one of Examples 955 to 964 can optionally include wherein the first communication circuit and the second communication circuit are composed of structurally distinct hardware or software circuitry.

In Example 966, the subject matter of any one of Examples 955 to 964 can optionally include wherein the first communication circuit is a processing circuit configured in a first configuration and the second communication circuit is the processing circuit configured in a second configuration.

In Example 967, the subject matter of Example 966 can optionally include wherein the processing circuit configured in the first configuration has different software logic or different hardware operating parameters from the processing circuitry configured in the second configuration.

In Example 968, the subject matter of any one of Examples 955 to 967 can optionally include wherein the first communication circuit and the second communication circuit differ according to one or more of decoders, equalizers, filter lengths, channel estimation techniques, interference cancelation techniques, noise cancelation techniques, processing bit width, clock frequencies, component voltages, packet combination techniques, number of antennas, beamforming setting, beamsteering setting, or antenna sensitivity.

In Example 969, the subject matter of any one of Examples 955 to 968 can optionally include wherein the control circuit is configured to select the first communication circuit from the plurality of communication circuits by selecting the first communication circuit based on a power consumption rate of the first communication circuit.

In Example 970, the subject matter of any one of Examples 955 to 969 can optionally include wherein the control circuit is further configured to adjust a configuration of the first communication circuit to scale the performance level of the first communication circuit to match the quality requirement of the first data bearer.

In Example 971, the subject matter of any one of Examples 955 to 970 can optionally include wherein the control circuit is configured to select the first communication circuit from the plurality of communication circuits by selecting a communication circuit from the plurality of communication circuits with the lowest power consumption rate that meets the quality requirement of the first data bearer as the first communication circuit.

In Example 972, the subject matter of any one of Examples 955 to 971 can optionally include wherein the quality requirement of the first data bearer and the quality requirement of the second data bearer are maximum latency requirements, maximum error rate requirements, or minimum data rate requirements.

In Example 973, the subject matter of any one of Examples 955 to 972 can optionally include wherein the quality requirement of the first data bearer is less than the quality requirement of the second data bearer, and wherein the performance level of the first communication circuit is less than the performance level of the second communication circuit.

In Example 974, the subject matter of any one of Examples 955 to 973 can optionally include wherein the first communication circuit has a lower power consumption rate than the second communication circuit.

In Example 975, the subject matter of any one of Examples 955 to 974 can optionally include wherein the radio circuitry is configured to receive the data stream including the first data of the first data bearer and the second data of the second data bearer by receiving the first data on a first carrier of a carrier aggregation scheme and receiving the second data on a second carrier of the carrier aggregation scheme.

In Example 976, the subject matter of any one of Examples 955 to 975 can optionally include wherein the first communication circuit is configured to enter a low power state during time intervals when no first data is present in the data stream and the second communication circuit is configured to enter a low power state during time intervals when no second data is present in the data stream.

Example 977 is a communication circuit arrangement including a control circuit configured to identify first data for a first data bearer of a terminal device and second data for a second data bearer of the terminal device, and generate a physical layer data stream by allocating the first data and the second data in the physical layer data stream based on quality requirements of the first data bearer and the second data bearer, and radio circuitry configured to transmit the physical layer data stream and a physical layer message to the terminal device, wherein the physical layer message specifies the allocation of the first data and the second data within the physical layer data stream.

In Example 978, the subject matter of Example 977 can optionally include wherein the control circuit includes a processor configured to retrieve and execute software-defined instructions that control operation of the processor.

In Example 979, the subject matter of Example 977 or 978 can optionally be configured as a radio communication network access node.

In Example 980, the subject matter of any one of Examples 977 to 979 can optionally include wherein the physical layer message specifies that the bit-level position of the first data and the second data bearer in the physical layer data stream.

In Example 981, the subject matter of any one of Examples 977 to 979 can optionally include wherein the control circuit is configured to generate the generating the physical layer data stream by allocating the first data and the second data in the physical layer data stream by allocating the first data to a first carrier of a carrier aggregation scheme and allocating the second data to a second carrier of the carrier aggregation scheme.

In Example 982, the subject matter of Example 981 can optionally include wherein the physical layer message specifies that the first data is allocated to the first carrier and the second data is allocated to the second carrier.

In Example 983, the subject matter of any one of Examples 977 to 979 can optionally include wherein the first data bearer has lower quality requirements than the second data bearer and wherein the first data is scheduled to be transmitted over a plurality of data intervals over time, and wherein the control circuit is configured to generate the physical layer data stream by allocating the first data and the second data in the physical layer data stream by delaying a first data interval of the plurality of data intervals to be aligned in time within the physical layer data stream with a second data interval of the plurality of data intervals.

In Example 984, the subject matter of any one of Examples 977 to 979 can optionally include wherein the first data bearer has lower quality requirements than the second data bearer and the first data and the second data are scheduled to be transmitted over a plurality of data intervals over time, and wherein the control circuit is configured to generate the physical layer data stream by allocating the first data and the second data in the physical layer data stream by identifying a data interval of the plurality of data intervals that exceeds a data capacity limit and delaying first data in the data interval to a later data interval of the plurality of data intervals.

In Example 985, the subject matter of any one of Examples 977 to 979 can optionally include wherein the first data bearer has lower quality requirements than the second data bearer and the first data and the second data are scheduled to be transmitted over a plurality of data intervals over time, and wherein the control circuit is configured to generate the physical layer data stream by allocating the first data and the second data in the physical layer data stream by identifying a data interval of the plurality of data intervals that exceeds a data capacity limit and encoding the first data in the data interval with a higher coding rate than the second data in the data interval.

In Example 986, the subject matter of any one of Examples 977 to 979 can optionally include wherein the physical layer data stream is composed of a plurality of data intervals over time, and wherein the control circuit is configured to generate the physical layer data stream by allocating the first data and the second data in the physical layer data stream by allocating the first data onto different data intervals of the plurality of data intervals than the second data.

Example 987 is a communication circuit arrangement including a plurality of communication circuits, and a control circuit configured to select a first communication circuit from the plurality of communication circuits for a first data bearer based on a quality requirement of the first data bearer and a performance level of the first communication circuit, and select a second communication circuit from the plurality of communication circuits for a second data bearer based on a quality requirement of the second data bearer and a performance level of the second communication circuit, the first communication circuit configured to process first data from the first data bearer to obtain processed first data and the second communication circuit configured to process second data from the second data bearer to obtain processed second data, the communication circuit arrangement further including radio circuitry configured to transmit a data stream including the processed first data and the processed second data.

In Example 988, the subject matter of Example 987 can optionally include wherein the control circuit is a processor configured to retrieve and execute software-defined instructions.

In Example 989, the subject matter of Example 987 or 988 can optionally include wherein the plurality of communication circuits are hardware-defined circuitry, software-defined circuitry, or mixed hardware-defined and software-defined circuitry.

In Example 990, the subject matter of any one of Examples 987 to 989 can optionally be configured as a radio communication terminal device.

In Example 991, the subject matter of any one of Examples 987 to 990 can optionally further include a mapping circuit configured to provide the first data to the first communication circuit and to provide the second data to the second communication circuit.

In Example 992, the subject matter of Example 991 can optionally include wherein the control circuit is further configured to obtain bearer information identifying the quality requirements of the first data bearer and the second data bearer and to generate a physical layer message.

In Example 993, the subject matter of Example 992 can optionally further include a combining circuit configured to combine the processed first data and the processed second data to obtain the data stream.

In Example 994, the subject matter of any one of Examples 987 to 993 can optionally include wherein the control circuit is configured to select the first communication circuit from the plurality of communication circuits for the first data bearer based on the quality requirement of the first data bearer and the performance level of the first communication circuit by selecting a communication circuit from the plurality of communication circuits that has a performance level that meets the quality requirement of the first data bearer as the first communication circuit.

In Example 995, the subject matter of any one of Examples 987 to 994 can optionally include wherein the first communication circuit meets the quality requirement of the first data bearer and fails to meet the quality requirement of the second data bearer.

In Example 996, the subject matter of any one of Examples 987 to 995 can optionally include wherein the first communication circuit and the second communication circuit are composed of structurally distinct hardware or software circuitry.

In Example 997, the subject matter of any one of Examples 987 to 996 can optionally include wherein the first communication circuit is a processing circuit configured in a first configuration and the second communication circuit is the processing circuit configured in a second configuration.

In Example 998, the subject matter of Example 997 can optionally include wherein the processing circuit configured in the first configuration has different software logic or different hardware operating parameters from the processing circuitry configured in the second configuration.

In Example 999, the subject matter of any one of Examples 987 to 998 can optionally include wherein the first communication circuit and the second communication circuit differ according to one or more of decoders, equalizers, filter lengths, channel estimation techniques, interference cancelation techniques, noise cancelation techniques, processing bit width, clock frequencies, component voltages, packet combination techniques, number of antennas, beamforming setting, beamsteering setting, or antenna sensitivity.

In Example 1000, the subject matter of any one of Examples 987 to 999 can optionally include wherein the control circuit is configured to select the first communication circuit from the plurality of communication circuits by selecting the first communication circuit based on a power consumption rate of the first communication circuit.

In Example 1001, the subject matter of any one of Examples 987 to 1000 can optionally include wherein the control circuit is configured to adjust a configuration of the first communication circuit to scale the performance level of the first communication circuit to match the quality requirement of the first data bearer.

In Example 1002, the subject matter of any one of Examples 987 to 1001 can optionally include wherein the control circuit is configured to select the first communication circuit from the plurality of communication circuits by selecting a communication circuit from the plurality of communication circuits with the lowest power consumption rate that meets the quality requirement of the first data bearer as the first communication circuit.

In Example 1003, the subject matter of any one of Examples 987 to 1002 can optionally include wherein the quality requirement of the first data bearer and the quality requirement of the second data bearer are maximum latency requirements, maximum error rate requirements, or minimum data rate requirements.

In Example 1004, the subject matter of any one of Examples 987 to 1003 can optionally include wherein the quality requirement of the first data bearer is less than the quality requirement of the second data bearer, and wherein the performance level of the first communication circuit is less than the performance level of the second communication circuit.

In Example 1005, the subject matter of any one of Examples 987 to 1004 can optionally include wherein the first communication circuit has a lower power consumption rate than the second communication circuit.

Example 1006 is a device including monitoring means for processing demand indicators for first uplink data of a radio access network, wherein the processing demand indicators indicate future processing demand at a network processing infrastructure, means for selecting a first power state for the network processing infrastructure based on the processing demand indicators and a processing efficiency of the first power state, and means for processing second uplink data of the radio access network with the network processing infrastructure according to the first power state.

Example 1007 is a method of operating a network processing infrastructure, the method including monitoring processing demand indicators for first uplink data of a radio access network, wherein the processing demand indicators indicate future processing demand at the network processing infrastructure, selecting a first power state for the network processing infrastructure based on the processing demand indicators and a processing efficiency of the first power state, and processing second uplink data of the radio access network with the network processing infrastructure according to the first power state.

In Example 1008, the subject matter of Example 1007 can optionally include wherein the processing demand indicators include retransmission feedback processing time or uplink data scheduling information.

In Example 1009, the subject matter of Example 1007 can optionally further include processing the first uplink data to determine whether the first uplink data was successfully received, wherein the processing demand indicators include a processing completion time, and wherein monitoring the processing demand indicators for the first uplink data includes determining the processing completion time as a duration of the processing of the first uplink data.

In Example 1010, the subject matter of Example 1009 can optionally include wherein processing the first uplink data to determine whether the first uplink data was successfully received includes performing an error check on the first uplink data as part of a hybrid automatic repeat request (HARQ) retransmission scheme.

In Example 1011, the subject matter of Example 1009 or 1010 can optionally include wherein the first uplink data includes multiple time intervals of data, and wherein the processing completion time is an average duration of the processing over the multiple time intervals.

In Example 1012, the subject matter of Example 1011 can optionally further include calculating the average duration of the processing over the multiple time intervals.

In Example 1013, the subject matter of any one of Examples 1007 to 1012 can optionally include wherein the processing demand indicators include uplink data scheduling information, and wherein monitoring the processing demand indicators for the first uplink data includes evaluating the uplink data scheduling information to anticipate the future processing demand.

In Example 1014, the subject matter of Example 1013 can optionally include wherein the uplink data scheduling information includes one or more of a number of allocated resource blocks, a modulation and coding scheme, a data stream priority, or a number of random access occasions.

In Example 1015, the subject matter of Example 1013 can optionally include wherein the first uplink data includes multiple time intervals of data, and wherein the uplink data scheduling information includes one or more of an average number of allocated resource blocks, an average modulation and coding scheme, an average data stream priority, or an average number of random access occasions over the multiple time intervals of data.

In Example 1016, the subject matter of Example 1013 can optionally include wherein the first uplink data is arranged in an uplink data scheduling scheme composed of multiple time intervals of data, and wherein the uplink data scheduling information is derived from uplink data scheduling information for one or more time intervals that occur prior to the selecting the first power state action.

In Example 1017, the subject matter of Example 1013 can optionally include wherein the first uplink data is arranged in an uplink data scheduling scheme composed of multiple time intervals of data, and wherein the uplink data scheduling information is derived from uplink data scheduling information for one or more time intervals that occur after the selecting the first power state action.

In Example 1018, the subject matter of any one of Examples 1013 to 1017 can optionally include wherein the uplink data scheduling information is Media Access Control (MAC) protocol layer scheduling information.

In Example 1019, the subject matter of any one of Examples 1007 to 1018 can optionally further include processing the first uplink data to determine whether the first uplink data was successfully received within a processing time limit.

In Example 1020, the subject matter of Example 1019 can optionally include wherein selecting the first power state for the network processing infrastructure based on the processing demand indicators and the processing efficiency of the first power state includes selecting a power state that has sufficient processing efficiency to process the future processing demand indicated by the processing demand indicators within the processing time limit as the first power state.

In Example 1021, the subject matter of any one of Examples 1007 to 1018 can optionally include wherein selecting the first power state for the network processing infrastructure based on the processing demand indicators and the processing efficiency of the first power state includes selecting a power state that has sufficient processing efficiency to process the future processing demand indicated by the processing demand indicators within a processing time limit as the first power state.

In Example 1022, the subject matter of Example 1020 or 1021 can optionally include wherein the processing time limit is a hybrid automatic repeat request (HARQ) turnaround time limit.

In Example 1023, the subject matter of any one of Examples 1007 to 1022 can optionally include wherein the network processing infrastructure is configured to operate according to a plurality of predefined power states, and wherein selecting the first power state for the network processing infrastructure based on the processing demand indicators and the processing efficiency of the first power state includes selecting the first power state from the predefined plurality of power states based on the processing efficiency of the first power state meeting the future processing demand indicated by the processing demand indicators.

In Example 1024, the subject matter of Example 1023 can optionally include wherein the plurality of predefined power states each have a different processing efficiency or a different power consumption and each define a different configuration of the network processing infrastructure related to one or more of processing clock frequency, voltage, number of active processing cores, dynamic voltage and frequency scaling, clock gating, or power gating.

In Example 1025, the subject matter of any one of Examples 1007 to 1024 can optionally further include monitoring processing demand indicators for the second uplink data to obtain updated processing demand indicators that indicate updated future processing demand for the network processing infrastructure, selecting a second power state different from the first power state based on the updated processing demand indicators, and processing third uplink data with the network processing infrastructure according to the second power state.

In Example 1026, the subject matter of Example 1025 can optionally include wherein the updated processing demand indicators indicate lower future processing demand than the processing demand indicators, and wherein selecting the second power state different from the first power state based on the updated processing demand indicators includes selecting the second power state based on the second power state having a lower power consumption than the first power state.

In Example 1027, the subject matter of Example 1025 can optionally include wherein the updated processing demand indicators indicate higher future processing demand than the processing demand indicators, and wherein selecting the second power state different from the first power state based on the updated processing demand indicators includes selecting the second power state based on the second power state having a higher processing efficiency than the first power state.

Example 1028 is a network access node including the network processing infrastructure and a communication module configured to perform the method of any one of Examples 1007 to 1027.

Example 1029 is a communication device configured to perform the method of any one of Examples 1007 to 1027.

In Example 1030, the subject matter of Example 1029 can optionally further include the network processing infrastructure.

Example 1031 is a non-transitory computer readable medium storing instructions that when executed by a processor control the processor to perform the method of any one of Examples 1007 to 1027.

Example 1032 is a communication device including a network processing infrastructure, one or more monitoring modules configured to monitor processing demand indicators for first uplink data of a radio access network, wherein the processing demand indicators indicate future processing demand at the network processing infrastructure, an activity control module configured to select a first power state for the network processing infrastructure based on the processing demand indicators and a processing efficiency of the first power state, the network processing infrastructure configured to process second uplink data of the radio access according to the first power state.

In Example 1033, the subject matter of Example 1032 can optionally include wherein the processing demand indicators include retransmission feedback processing time and uplink data scheduling information and wherein the one or more monitoring modules include a scheduling module configured to monitor the uplink data scheduling information, and a processing monitoring module configured to monitor the retransmission feedback processing time at the network processing infrastructure.

In Example 1034, the subject matter of Example 1032 can optionally include wherein the network processing infrastructure is further configured to process the first uplink data to determine whether the first uplink data was successfully received, wherein the processing demand indicators include a processing completion time and wherein the one or more monitoring modules are configured to monitor the processing demand indicators for the first uplink data by determining the processing completion time as the duration of the processing of the first uplink data.

In Example 1035, the subject matter of Example 1034 can optionally include wherein the network processing infrastructure is configured to process the first uplink data to determine whether the first uplink data was successfully received by performing an error check on the first uplink data as part of a hybrid automatic repeat request (HARQ) retransmission scheme.

In Example 1036, the subject matter of Example 1034 or 1035 can optionally include wherein the first uplink data includes multiple time intervals of data, and wherein the processing completion time is an average duration of the processing of the first uplink data over the multiple time intervals.

In Example 1037, the subject matter of Example 1036 can optionally include wherein the one or more monitoring modules are configured to calculate the average duration of the processing of the first uplink data over the multiple time intervals.

In Example 1038, the subject matter of any one of Examples 1032 to 1037 can optionally include wherein the processing demand indicators include uplink data scheduling information, and wherein the one or more monitoring modules are configured to monitor the processing demand indicators for the first uplink data by evaluating the uplink data scheduling information to anticipate the future processing demand.

In Example 1039, the subject matter of Example 1038 can optionally include wherein the uplink data scheduling information includes one or more of a number of allocated resource blocks, a modulation and coding scheme, a data stream priority, or a number of random access occasions.

In Example 1040, the subject matter of Example 1038 can optionally include wherein the first uplink data includes multiple time intervals of data, and wherein the uplink data scheduling information includes one or more of an average number of allocated resource blocks, an average modulation and coding scheme, an average data stream priority, or an average number of random access occasions over the multiple time intervals of data.

In Example 1041, the subject matter of Example 1038 can optionally include wherein the first uplink data is arranged in an uplink data scheduling scheme composed of multiple time intervals of data, and wherein the uplink data scheduling information is derived from uplink data scheduling information for one or more time intervals that occur prior to the selecting the first power state action.

In Example 1042, the subject matter of Example 1038 can optionally include wherein the first uplink data is arranged in an uplink data scheduling scheme composed of multiple time intervals of data, and wherein the uplink data scheduling information is derived from uplink data scheduling information for one or more time intervals that occur after the selecting the first power state action.

In Example 1043, the subject matter of any one of Examples 1038 to 1042 can optionally include wherein the uplink data scheduling information is Media Access Control (MAC) protocol layer scheduling information.

In Example 1044, the subject matter of any one of Examples 1032 to 1043 can optionally include wherein the network processing infrastructure is further configured to process the first uplink data to determine whether the first uplink data was successfully received within a processing time limit.

In Example 1045, the subject matter of Example 1044 can optionally include wherein the activity control module is configured to select the first power state for the network processing infrastructure based on the processing demand indicators and the processing efficiency of the first power state by selecting a power state that has sufficient processing efficiency to process the future processing demand indicated by the processing demand indicators within the processing time limit as the first power state.

In Example 1046, the subject matter of any one of Examples 1032 to 1043 can optionally include wherein the activity control module is configured to select the first power state for the network processing infrastructure based on the processing demand indicators and the processing efficiency of the first power state by selecting a power state that has sufficient processing efficiency to process the future processing demand indicated by the processing demand indicators within a processing time limit as the first power state.

In Example 1047, the subject matter of Example 1046 can optionally include wherein the processing time limit is a hybrid automatic repeat request (HARQ) turnaround time limit.

In Example 1048, the subject matter of any one of Examples 1032 to 1047 can optionally include wherein the network processing infrastructure is configured to operate according to a plurality of predefined power states, and wherein the activity control module is configured to select the first power state for the network processing infrastructure based on the processing demand indicators and the processing efficiency of the first power state by selecting the first power state from the predefined plurality of power states based on the processing efficiency of the first power state meeting the future processing demand indicated by the processing demand indicators.

In Example 1049, the subject matter of Example 1048 can optionally include wherein the plurality of predefined power states each have a different processing efficiency or a different power consumption and each define a different configuration of the network processing infrastructure related to one or more of processing clock frequency, voltage, number of active processing cores, dynamic voltage and frequency scaling, clock gating, or power gating.

In Example 1050, the subject matter of any one of Examples 1032 to 1049 can optionally include wherein the one or more monitoring modules are further configured to monitor processing demand indicators for the second uplink data to obtain updated processing demand indicators that indicate updated future processing demand for the network processing infrastructure, wherein the activity control module is further configured to select a second power state different from the first power state based on the updated processing demand indicators, and wherein the network processing infrastructure is configured to process third uplink data with the network processing infrastructure according to the second power state.

In Example 1051, the subject matter of Example 1050 can optionally include wherein the updated processing demand indicators indicate lower future processing demand than the processing demand indicators, and wherein the activity control module is configured to select the second power state different from the first power state based on the updated processing demand indicators by selecting the second power state based on the second power state having a lower power consumption than the first power state.

In Example 1052, the subject matter of Example 1050 can optionally include wherein the updated processing demand indicators indicate higher future processing demand than the processing demand indicators, and wherein the activity control module is configured to select the second power state different from the first power state based on the updated processing demand indicators by selecting the second power state based on the second power state having a higher processing efficiency than the first power state.

In Example 1053, the subject matter of any one of Examples 1032 to 1052 can optionally be configured as a network access node.

Example 1054 is a non-transitory computer readable medium storing instructions that when executed by a controller of a network access node control the network access node to perform a method including monitoring processing demand indicators for first uplink data of a radio access network, wherein the processing demand indicators indicate future processing demand at a network processing infrastructure of the network access node, selecting a first power state for the network processing infrastructure based on the processing demand indicators and a processing efficiency of the first power state, and processing second uplink data of the radio access network with the network processing infrastructure according to the first power state.

In Example 1055, the subject matter of Example 1054 can optionally include wherein the processing demand indicators include retransmission feedback processing time or uplink data scheduling information.

In Example 1056, the subject matter of Example 1054 can optionally include the method further including processing the first uplink data to determine whether the first uplink data was successfully received, wherein the processing demand indicators include a processing completion time, and wherein monitoring the processing demand indicators for the first uplink data includes determining the processing completion time as the duration of the processing of the first uplink data.

In Example 1057, the subject matter of Example 1056 can optionally include wherein processing the first uplink data to determine whether the first uplink data was successfully received includes performing an error check on the first uplink data as part of a hybrid automatic repeat request (HARQ) retransmission scheme.

In Example 1058, the subject matter of Example 1056 or 1057 can optionally include wherein the wherein the first uplink data includes multiple time intervals of data, and wherein the processing completion time is an average duration of the processing over the multiple time intervals.

In Example 1059, the subject matter of Example 1058 can optionally include the method further including calculating the average duration of the processing over the multiple time intervals.

In Example 1060, the subject matter of any one of Examples 1054 to 1059 can optionally include wherein the processing demand indicators include uplink data scheduling information, and wherein monitoring the processing demand indicators for the first uplink data includes evaluating the uplink data scheduling information to anticipate the future processing demand.

In Example 1061, the subject matter of Example 1060 can optionally include wherein the uplink data scheduling information includes one or more of a number of allocated resource blocks, a modulation and coding scheme, a data stream priority, or a number of random access occasions.

In Example 1062, the subject matter of Example 1060 can optionally include wherein the first uplink data includes multiple time intervals of data, and wherein the uplink data scheduling information includes one or more of an average number of allocated resource blocks, an average modulation and coding scheme, an average data stream priority, or an average number of random access occasions over the multiple time intervals of data.

In Example 1063, the subject matter of Example 1060 can optionally include wherein the first uplink data is arranged in an uplink data scheduling scheme composed of multiple time intervals of data, and wherein the uplink data scheduling information is derived from uplink data scheduling information for one or more time intervals that occur prior to the selecting the first power state action.

In Example 1064, the subject matter of Example 1060 can optionally include wherein the first uplink data is arranged in an uplink data scheduling scheme composed of multiple time intervals of data, and wherein the uplink data scheduling information is derived from uplink data scheduling information for one or more time intervals that occur after the selecting the first power state action.

In Example 1065, the subject matter of any one of Examples 1060 to 1064 can optionally include wherein the uplink data scheduling information is Media Access Control (MAC) protocol layer scheduling information.

In Example 1066, the subject matter of any one of Examples 1054 to 1065 can optionally include the method further including processing the first uplink data to determine whether the first uplink data was successfully received within a processing time limit.

In Example 1067, the subject matter of Example 1066 can optionally include wherein selecting the first power state for the network processing infrastructure based on the processing demand indicators and the processing efficiency of the first power state includes selecting a power state that has sufficient processing efficiency to process the future processing demand indicated by the processing demand indicators within the processing time limit as the first power state.

In Example 1068, the subject matter of any one of Examples 1054 to 1065 can optionally include wherein selecting the first power state for the network processing infrastructure based on the processing demand indicators and the processing efficiency of the first power state includes selecting a power state that has sufficient processing efficiency to process the future processing demand indicated by the processing demand indicators within a processing time limit as the first power state.

In Example 1069, the subject matter of Example 1067 can optionally include 1068, wherein the processing time limit is a hybrid automatic repeat request (HARQ) turnaround time limit.

In Example 1070, the subject matter of any one of Examples 1054 to 1069 can optionally include wherein the network processing infrastructure is configured to operate according to a plurality of predefined power states, and wherein selecting the first power state for the network processing infrastructure based on the processing demand indicators and the processing efficiency of the first power state includes selecting the first power state from the predefined plurality of power states based on the processing efficiency of the first power state meeting the future processing demand indicated by the processing demand indicators.

In Example 1071, the subject matter of Example 1070 can optionally include wherein the plurality of predefined power states each have a different processing efficiency or a different power consumption and each define a different configuration of the network processing infrastructure related to one or more of processing clock frequency, voltage, number of active processing cores, dynamic voltage and frequency scaling, clock gating, or power gating.

In Example 1072, the subject matter of any one of Examples 1054 to 1071 can optionally include the method further including monitoring processing demand indicators for the second uplink data to obtain updated processing demand indicators that indicate updated future processing demand for the network processing infrastructure, selecting a second power state different from the first power state based on the updated processing demand indicators, and processing third uplink data with the network processing infrastructure according to the second power state.

In Example 1073, the subject matter of Example 1072 can optionally include wherein the updated processing demand indicators indicate lower future processing demand than the processing demand indicators, and wherein selecting the second power state different from the first power state based on the updated processing demand indicators includes selecting the second power state based on the second power state having a lower power consumption than the first power state.

In Example 1074, the subject matter of Example 1072 can optionally include wherein the updated processing demand indicators indicate higher future processing demand than the processing demand indicators, and wherein selecting the second power state different from the first power state based on the updated processing demand indicators includes selecting the second power state based on the second power state having a higher processing efficiency than the first power state.

Example 1075 is a communication circuit arrangement including a network processing circuit, one or more monitoring circuits configured to monitor processing demand indicators for first uplink data of a radio access network, wherein the processing demand indicators indicate future processing demand at the network processing circuit, an activity control circuit configured to select a first power state for the network processing circuit based on the processing demand indicators and a processing efficiency of the first power state, the network processing circuit configured to process second uplink data of the radio access according to the first power state.

In Example 1076, the subject matter of Example 1075 can optionally include wherein the network processing circuit includes a processor.

In Example 1077, the subject matter of Example 1076 can optionally include wherein the network processing circuit further includes one or more hardware accelerators, and the processor is configured to offload processing tasks to the one or more hardware accelerators.

In Example 1078, the subject matter of any one of Examples 1075 to 1077 can optionally include wherein the activity control circuit is a processor configured to execute software-defined instructions that direct the activity control circuit.

In Example 1079, the subject matter of any one of Examples 1075 to 1078 can optionally include wherein the processing demand indicators include retransmission feedback processing time and uplink data scheduling information and wherein the one or more monitoring circuits include a scheduling circuit configured to monitor the uplink data scheduling information, and a processing monitoring circuit configured to monitor the retransmission feedback processing time at the network processing circuit.

In Example 1080, the subject matter of any one of Examples 1075 to 1078 can optionally include wherein the network processing circuit is further configured to process the first uplink data to determine whether the first uplink data was successfully received, wherein the processing demand indicators include a processing completion time and wherein the one or more monitoring circuits are configured to monitor the processing demand indicators for the first uplink data by determining the processing completion time as the duration of the processing of the first uplink data.

In Example 1081, the subject matter of Example 1080 can optionally include wherein the network processing circuit is configured to process the first uplink data to determine whether the first uplink data was successfully received by performing an error check on the first uplink data as part of a hybrid automatic repeat request (HARQ) retransmission scheme.

In Example 1082, the subject matter of Example 1080 or 1081 can optionally include wherein the first uplink data includes multiple time intervals of data, and wherein the processing completion time is an average duration of the processing of the first uplink data over the multiple time intervals.

In Example 1083, the subject matter of Example 1082 can optionally include wherein the one or more monitoring circuits are configured to calculate the average duration of the processing of the first uplink data over the multiple time intervals.

In Example 1084, the subject matter of any one of Examples 1075 to 1083 can optionally include wherein the processing demand indicators include uplink data scheduling information, and wherein the one or more monitoring circuits are configured to monitor the processing demand indicators for the first uplink data by evaluating the uplink data scheduling information to anticipate the future processing demand.

In Example 1085, the subject matter of Example 1084 can optionally include wherein the uplink data scheduling information includes one or more of a number of allocated resource blocks, a modulation and coding scheme, a data stream priority, or a number of random access occasions.

In Example 1086, the subject matter of Example 1084 can optionally include wherein the first uplink data includes multiple time intervals of data, and wherein the uplink data scheduling information includes one or more of an average number of allocated resource blocks, an average modulation and coding scheme, an average data stream priority, or an average number of random access occasions over the multiple time intervals of data.

In Example 1087, the subject matter of Example 1084 can optionally include wherein the first uplink data is arranged in an uplink data scheduling scheme composed of multiple time intervals of data, and wherein the uplink data scheduling information is derived from uplink data scheduling information for one or more time intervals that occur prior to the selecting the first power state action.

In Example 1088, the subject matter of Example 1084 can optionally include wherein the first uplink data is arranged in an uplink data scheduling scheme composed of multiple time intervals of data, and wherein the uplink data scheduling information is derived from uplink data scheduling information for one or more time intervals that occur after the selecting the first power state action.

In Example 1089, the subject matter of any one of Examples 1084 to 1088 can optionally include wherein the uplink data scheduling information is Media Access Control (MAC) protocol layer scheduling information.

In Example 1090, the subject matter of any one of Examples 1075 to 1089 can optionally include wherein the network processing circuit is further configured to process the first uplink data to determine whether the first uplink data was successfully received within a processing time limit.

In Example 1091, the subject matter of Example 1090 can optionally include wherein the activity control circuit is configured to select the first power state for the network processing circuit based on the processing demand indicators and the processing efficiency of the first power state by selecting a power state that has sufficient processing efficiency to process the future processing demand indicated by the processing demand indicators within the processing time limit as the first power state.

In Example 1092, the subject matter of any one of Examples 1075 to 1089 can optionally include wherein the activity control circuit is configured to select the first power state for the network processing circuit based on the processing demand indicators and the processing efficiency of the first power state by selecting a power state that has sufficient processing efficiency to process the future processing demand indicated by the processing demand indicators within a processing time limit as the first power state.

In Example 1093, the subject matter of Example 1092 can optionally include wherein the processing time limit is a hybrid automatic repeat request (HARQ) turnaround time limit.

In Example 1094, the subject matter of any one of Examples 1075 to 1093 can optionally include wherein the network processing circuit is configured to operate according to a plurality of predefined power states, and wherein the activity control circuit is configured to select the first power state for the network processing circuit based on the processing demand indicators and the processing efficiency of the first power state by selecting the first power state from the predefined plurality of power states based on the processing efficiency of the first power state meeting the future processing demand indicated by the processing demand indicators.

In Example 1095, the subject matter of Example 1094 can optionally include wherein the plurality of predefined power states each have a different processing efficiency or a different power consumption and each define a different configuration of the network processing circuit related to one or more of processing clock frequency, voltage, number of active processing cores, dynamic voltage and frequency scaling, clock gating, or power gating.

In Example 1096, the subject matter of any one of Examples 1075 to 1095 can optionally include wherein the one or more monitoring circuits are further configured to monitor processing demand indicators for the second uplink data to obtain updated processing demand indicators that indicate updated future processing demand for the network processing circuit, wherein the activity control circuit is further configured to select a second power state different from the first power state based on the updated processing demand indicators, and wherein the network processing circuit is configured to process third uplink data with the network processing circuit according to the second power state.

In Example 1097, the subject matter of Example 1096 can optionally include wherein the updated processing demand indicators indicate lower future processing demand than the processing demand indicators, and wherein the activity control circuit is configured to select the second power state different from the first power state based on the updated processing demand indicators by selecting the second power state based on the second power state having a lower power consumption than the first power state.

In Example 1098, the subject matter of Example 1096 can optionally include wherein the updated processing demand indicators indicate higher future processing demand than the processing demand indicators, and wherein the activity control circuit is configured to select the second power state different from the first power state based on the updated processing demand indicators by selecting the second power state based on the second power state having a higher processing efficiency than the first power state.

In Example 1099, the subject matter of any one of Examples 1075 to 1098 can optionally be configured as a network access node.

Example 1100 is a terminal device including means for transmitting or receiving first data over a data connection with a server or network node, wherein the data connection is an end-to-end connection between the terminal device and the server or network node, and means for transmitting an instruction to a network processing component to transmit one or more connection continuity messages on the data connection to the server or network node for the terminal device.

Example 1101 is a method of performing radio communications at a terminal device, the method including transmitting or receiving first data over a data connection with a server or network node, wherein the data connection is an end-to-end connection between the terminal device and the server or network node, and transmitting an instruction to a network processing component to transmit one or more connection continuity messages on the data connection to the server or network node for the terminal device.

In Example 1102, the subject matter of Example 1101 can optionally include wherein the data connection is a transport layer connection and wherein the instruction instructs the network processing component to transmit the one or more connection continuity messages according to a transport layer protocol.

In Example 1103, the subject matter of Example 1102 can optionally include wherein transmitting the instruction to the network processing component includes transmitting the instruction to the network processing component on a layer lower than the transport layer.

In Example 1104, the subject matter of any one of Examples 1101 to 1103 can optionally include wherein the data connection is a Transmission Control Protocol (TCP) connection and wherein the instruction instructs the network processing component to transmit the one or more keep alive messages according to the TCP.

In Example 1105, the subject matter of any one of Examples 1101 to 1104 can optionally include wherein the data connection is a transport layer connection between an application program of the terminal device and a counterpart application program of the server or network node.

In Example 1106, the subject matter of any one of Examples 1101 to 1105 can optionally include wherein the server or network node is an internet server.

In Example 1107, the subject matter of any one of Examples 1101 to 1106 can optionally include wherein the network processing component is a network access node.

In Example 1108, the subject matter of any one of Examples 1101 to 1107 can optionally include wherein the network processing component is a cellular base station or a short-range access point.

In Example 1109, the subject matter of any one of Examples 1101 to 1104 can optionally include wherein the network processing component is an edge computing server.

In Example 1110, the subject matter of any one of Examples 1101 to 1104 can optionally include wherein the network processing component is a Mobile Edge Computing (MEC) server.

In Example 1111, the subject matter of any one of Examples 1101 to 1110 can optionally include wherein the instruction instructs the network processing component to repeatedly transmit connection continuity messages on the data connection over a duration of time.

In Example 1112, the subject matter of Example 1111 can optionally further include configuring the terminal device in a low-power or sleep state during the duration of time.

In Example 1113, the subject matter of any one of Examples 1101 to 1110 can optionally include wherein the instruction instructs the network processing component to repeatedly transmit connection continuity messages on the data connection with an interval between successive connection continuity messages that is less than a connection timeout period for the data connection.

In Example 1114, the subject matter of any one of Examples 1101 to 1113 can optionally further include after transmitting the instruction to the network processing component, receiving second data from the server or network node needing to re-establish the data connection.

In Example 1115, the subject matter of Example 1114 can optionally include wherein the second data is a push notification.

Example 1116 is a communication device configured to perform the method of any one of Examples 1101 to 1115.

Example 1117 is a non-transitory computer readable medium storing instructions that when executed by a processor control the processor to perform the method of any one of Examples 1101 to 1115.

Example 1118 is a non-transitory computer readable medium storing instructions that when executed by a controller of a terminal device control the terminal device to perform the method of any one of Examples 1101 to 1115.

Example 1119 is a terminal device configured to perform the method of any one of Examples 1101 to 1115.

Example 1116 is a device including means for receiving a message from a terminal device that instructs the a processing component to maintain a data connection between the terminal device and a server or network node, wherein the data connection is an end-to-end data connection between the terminal device and the server or network node, and means for transmitting one or more connection continuity messages on the data connection to the server or network node for the terminal device.

Example 1121 is a method of performing radio communication at a network processing component, the method including receiving a message from a terminal device that instructs the network processing component to maintain a data connection between the terminal device and a server or network node, wherein the data connection is an end-to-end data connection between the terminal device and the server or network node, and transmitting one or more connection continuity messages on the data connection to the server or network node for the terminal device.

In Example 1122, the subject matter of Example 1121 can optionally include wherein the data connection is a transport layer connection, and wherein transmitting the one or more connection continuity messages on the data connection to the server or network node for the terminal device includes transmitting the one or more connection continuity messages on the data connection to the server or network node according to a transport layer protocol.

In Example 1123, the subject matter of Example 1122 can optionally include wherein receiving the message from the terminal device includes receiving the instruction on a layer lower layer than the transport layer.

In Example 1124, the subject matter of any one of Examples 1121 to 1123 can optionally include wherein the data connection is a Transmission Control Protocol (TCP) connection and wherein transmitting the one or more connection continuity messages on the data connection to the server or network node for the terminal device includes transmitting the one or more connection continuity messages on the data connection to the server or network node according to a TCP protocol.

In Example 1125, the subject matter of any one of Examples 1121 to 1124 can optionally include wherein the data connection is a transport layer connection between an application program of the terminal device and a counterpart application program of the server or network node.

In Example 1126, the subject matter of any one of Examples 1121 to 1125 can optionally include wherein the server or network node is an internet server.

In Example 1127, the subject matter of any one of Examples 1121 to 1126 can optionally include wherein the network processing component is a network access node.

In Example 1128, the subject matter of any one of Examples 1121 to 1127 can optionally include wherein the network processing component is a cellular base station or a short-range access point.

In Example 1129, the subject matter of any one of Examples 1121 to 1124 can optionally include wherein the network processing component is an edge computing server.

In Example 1130, the subject matter of any one of Examples 1121 to 1124 can optionally include wherein the network processing component is a Mobile Edge Computing (MEC) server.

In Example 1131, the subject matter of any one of Examples 1121 to 1130 can optionally include wherein the message instructs the network processing component to repeatedly transmit connection continuity messages on the data connection over a duration of time, and wherein transmitting the one or more connection continuity messages on the data connection to the server or network node for the terminal device includes repeatedly transmitting connection continuity messages on the data connection over the duration of time.

In Example 1132, the subject matter of any one of Examples 1121 to 1130 can optionally include wherein the message instructs the network processing component to repeatedly transmit connection continuity messages on the data connection with an interval between successive connection continuity messages that is less than a connection timeout period for the data connection, and wherein transmitting the one or more connection continuity messages on the data connection to the server or network node for the terminal device includes transmitting successive connection continuity messages within the interval that is less than the connection timeout period.

In Example 1133, the subject matter of any one of Examples 1121 to 1132 can optionally include wherein the network processing component interfaces with a core network and wherein the server or network node is external to the core network In Example 1134, the subject matter of any one of Examples 1121 to 1133 can optionally further include generating the one or more connection continuity messages at the network processing component according to a protocol of the end-to-end connection prior to transmitting the one or more connection continuity messages.

Example 1135 is a network processing component configured to perform the method of any one of Examples 1121 to 1134.

Example 1136 is a communication device configured to perform the method of any one of Examples 1121 to 1134.

Example 1137 is a non-transitory computer readable medium storing instructions that when executed by a processor control the processor to perform the method of any one of Examples 1121 to 1134.

Example 1138 is a non-transitory computer readable medium storing instructions that when executed by a controller of a network processing component control the network processing component to perform the method of any one of Examples 1121 to 1134.

Example 1139 is a communication device including a radio transceiver configured to transmit or receive first data over a data connection with a server or network node, wherein the data connection is an end-to-end connection between the communication device and the server or network node, and a processor configured to generate an instruction for the network processing component to transmit one or more connection continuity messages on the data connection to the server or network node for the communication device, the radio transceiver further configured to transmit the instruction to the network processing component.

In Example 1140, the subject matter of Example 1139 can optionally be configured as a terminal device.

In Example 1141, the subject matter of Example 1139 or 1140 can optionally include wherein the data connection is a transport layer connection and wherein the processor is configured to generate the instruction to instruct the network processing component to transmit the one or more connection continuity messages according to a transport layer protocol.

In Example 1142, the subject matter of Example 1141 can optionally include wherein the radio transceiver is configured to transmit the instruction to the network processing component on a layer lower than the transport layer.

In Example 1143, the subject matter of any one of Examples 1139 to 1142 can optionally include wherein the data connection is a Transmission Control Protocol (TCP) connection and wherein the processor is configured to generate the instruction to instruct the network processing component to transmit the one or more connection continuity messages according to TCP.

In Example 1144, the subject matter of any one of Examples 1139 to 1143 can optionally include wherein the data connection is a transport layer connection of an application program of the processor and a counterpart application program of the server or network node.

In Example 1145, the subject matter of any one of Examples 1139 to 1144 can optionally include wherein the server or network node is an internet server.

In Example 1146, the subject matter of any one of Examples 1139 to 1145 can optionally include wherein the network processing component is a network access node.

In Example 1147, the subject matter of any one of Examples 1139 to 1146 can optionally include wherein the network processing component is a cellular base station or a short-range access point.

In Example 1148, the subject matter of any one of Examples 1139 to 1144 can optionally include wherein the network processing component is an edge computing server.

In Example 1149, the subject matter of any one of Examples 1139 to 1144 can optionally include wherein the network processing component is a Mobile Edge Computing (MEC) server.

In Example 1150, the subject matter of any one of Examples 1139 to 1149 can optionally include wherein the processor is configured to generate the instruction to instruct the network processing component to repeatedly transmit connection continuity messages on the data connection over a duration of time.

In Example 1151, the subject matter of Example 1150 can optionally include wherein the radio transceiver is configured to enter a low-power or sleep state during the duration of time.

In Example 1152, the subject matter of any one of Examples 1139 to 1149 can optionally include wherein the processor is configured to generate the instruction to instruct the network processing component to repeatedly transmit connection continuity messages on the data connection with an interval between successive connection continuity messages that is less than a connection timeout period for the data connection.

In Example 1153, the subject matter of any one of Examples 1139 to 1152 can optionally include wherein the radio transceiver is further configured to receive second data from the server or network node without needing to re-establish the data connection after transmitting the instruction to the network processing component.

In Example 1154, the subject matter of Example 1153 can optionally include wherein the second data is a push notification.

Example 1155 is a communication device including a processor configured to receive a message from a terminal device that instructs the communication device to maintain a data connection between the terminal device and a server or network node, wherein the data connection is an end-to-end data connection between the terminal device and the server or network node, and further configured to transmit, on a backhaul interface, one or more connection continuity messages on the data connection to the server or network node for the terminal device.

In Example 1156, the subject matter of Example 1155 can optionally include wherein the data connection is a transport layer connection, wherein the processor is configured to generate the one or more connection continuity messages according to a transport layer protocol.

In Example 1157, the subject matter of Example 1156 can optionally include wherein the processor is configured to receive the message from the terminal device on a lower layer than the transport layer.

In Example 1158, the subject matter of Example 1155 can optionally include wherein the data connection is a Transmission Control Protocol (TCP) connection, wherein the processor is configured to generate the one or more connection continuity messages according to a TCP protocol.

In Example 1159, the subject matter of any one of Examples 1155 to 1158 can optionally include wherein the data connection is a transport layer connection between an application program of the terminal device and a counterpart application program of the server or network node.

In Example 1160, the subject matter of any one of Examples 1155 to 1159 can optionally include wherein the server or network node is an internet server.

In Example 1161, the subject matter of any one of Examples 1155 to 1160 can optionally be configured as a network access node.

In Example 1162, the subject matter of any one of Examples 1155 to 1161 can optionally be configured as a cellular base station or a short-range access point.

In Example 1163, the subject matter of any one of Examples 1155 to 1159 can optionally be configured as an edge computing server.

In Example 1164, the subject matter of any one of Examples 1155 to 1159 can optionally be configured as a Mobile Edge Computing (MEC) server.

In Example 1165, the subject matter of any one of Examples 1155 to 1164 can optionally include wherein the message instructs the communication device to repeatedly transmit connection continuity messages on the data connection over a duration of time, wherein the processor is configured to transmit the one or more connection continuity messages on the data connection to the server or network node for the terminal device by repeatedly transmitting connection continuity messages on the data connection over the duration of time.

In Example 1166, the subject matter of any one of Examples 1155 to 1164 can optionally include wherein the message instructs the network processing component to repeatedly transmit connection continuity messages on the data connection with an interval between successive connection continuity messages that is less than a connection timeout period for the data connection, and wherein the processor is configured to transmit the one or more connection continuity messages on the data connection to the server or network node for the terminal device by transmitting successive connection continuity messages within the interval that is less than the connection timeout period.

In Example 1167, the subject matter of any one of Examples 1155 to 1166 can optionally include wherein the backhaul interface is an interface with a core network, wherein the server or network node is external to the core network.

Example 1168 is a non-transitory computer readable medium storing instructions that when executed by a controller of a network processing component control the network processing component to perform a method including receiving a message from a terminal device that instructs the network processing component to maintain a data connection between the terminal device and a server or network node, wherein the data connection is an end-to-end data connection between the terminal device and the server or network node, transmitting one or more connection continuity messages on the data connection to the server or network node for the terminal device.

In Example 1169, the subject matter of Example 1168 can optionally include wherein the data connection is a transport layer connection, and wherein transmitting the one or more connection continuity messages on the data connection to the server or network node for the terminal device includes transmitting the one or more connection continuity messages on the data connection to the server or network node according to a transport layer protocol.

In Example 1170, the subject matter of Example 1169 can optionally include wherein receiving the message from the terminal device includes receiving the instruction on a layer lower layer than the transport layer.

In Example 1171, the subject matter of any one of Examples 1168 to 1170 can optionally include wherein the data connection is a Transmission Control Protocol (TCP) connection and wherein transmitting the one or more connection continuity messages on the data connection to the server or network node for the terminal device includes transmitting the one or more connection continuity messages on the data connection to the server or network node according to a TCP protocol.

In Example 1172, the subject matter of any one of Examples 1168 to 1171 can optionally include wherein the server or network node is an internet server.

In Example 1173, the subject matter of any one of Examples 1168 to 1171 can optionally include wherein the data connection is a transport layer connection between an application program of the terminal device and a counterpart application program of the server or network node.

In Example 1174, the subject matter of any one of Examples 1168 to 1173 can optionally include wherein the network processing component is a network access node.

In Example 1175, the subject matter of any one of Examples 1168 to 1174 can optionally include wherein the network processing component is a cellular base station or a short-range access point.

In Example 1176, the subject matter of any one of Examples 1168 to 1173 can optionally include wherein the network processing component is an edge computing server.

In Example 1177, the subject matter of any one of Examples 1168 to 1173 can optionally include wherein the network processing component is a Mobile Edge Computing (MEC) server.

In Example 1178, the subject matter of any one of Examples 1168 to 1177 can optionally include wherein the message instructs the network processing component to repeatedly transmit connection continuity messages on the data connection over a duration of time, and wherein transmitting the one or more connection continuity messages on the data connection to the server or network node for the terminal device includes repeatedly transmitting connection continuity messages on the data connection over the duration of time.

In Example 1179, the subject matter of any one of Examples 1168 to 1178 can optionally include wherein the message instructs the network processing component to repeatedly transmit connection continuity messages on the data connection with an interval between successive connection continuity messages that is less than a connection timeout period for the data connection, and wherein transmitting the one or more connection continuity messages on the data connection to the server or network node for the terminal device includes transmitting successive connection continuity messages the interval that is less than the connection timeout period.

In Example 1180, the subject matter of any one of Examples 1168 to 1179 can optionally include wherein the network processing component interfaces with a core network and wherein the server or network node is external to the core network.

In Example 1181, the subject matter of any one of Examples 1168 to 1180 can optionally further include generating the one or more connection continuity messages at the network processing component according to a protocol of the end-to-end connection prior to transmitting the one or more connection continuity messages.

Example 1182 is a communication circuit arrangement including radio circuitry configured to transmit or receive first data over a data connection with an server or network node, wherein the data connection is an end-to-end connection between the communication circuit arrangement and the server or network node, and a processor configured to generate an instruction for the network processing component to transmit one or more connection continuity messages on the data connection to the server or network node for the communication circuit arrangement, the radio circuitry further configured to transmit the instruction to the network processing component.

In Example 1183, the subject matter of Example 1182 can optionally be configured as a terminal device.

In Example 1184, the subject matter of Example 1182 or 1183 can optionally include wherein the data connection is a transport layer connection and wherein the processor is configured to generate the instruction to instruct the network processing component to transmit the one or more connection continuity messages according to a transport layer protocol.

In Example 1185, the subject matter of Example 1184 can optionally include wherein the radio circuitry is configured to transmit the instruction to the network processing component on a layer lower than the transport layer.

In Example 1186, the subject matter of any one of Examples 1182 to 1185 can optionally include wherein the data connection is a Transmission Control Protocol (TCP) connection and wherein the processor is configured to generate the instruction to instruct the network processing component to transmit the one or more connection continuity messages according to TCP.

In Example 1187, the subject matter of any one of Examples 1182 to 1186 can optionally include wherein the data connection is a transport layer connection of an application program of the processor and a counterpart application program of the server or network node.

In Example 1188, the subject matter of any one of Examples 1182 to 1187 can optionally include wherein the server or network node is an internet server.

In Example 1189, the subject matter of any one of Examples 1182 to 1188 can optionally include wherein the network processing component is a network access node.

In Example 1190, the subject matter of any one of Examples 1182 to 1189 can optionally include wherein the network processing component is a cellular base station or a short-range access point.

In Example 1191, the subject matter of any one of Examples 1182 to 1187 can optionally include wherein the network processing component is an edge computing server.

In Example 1192, the subject matter of any one of Examples 1182 to 1187 can optionally include wherein the network processing component is a Mobile Edge Computing (MEC) server.

In Example 1193, the subject matter of any one of Examples 1182 to 1192 can optionally include wherein the processor is configured to generate the instruction to instruct the network processing component to repeatedly transmit connection continuity messages on the data connection over a duration of time.

In Example 1194, the subject matter of Example 1193 can optionally include wherein the radio circuitry is configured to enter a low-power or sleep state during the duration of time.

In Example 1195, the subject matter of any one of Examples 1182 to 1192 can optionally include wherein the processor is configured to generate the instruction to instruct the network processing component to repeatedly transmit connection continuity messages on the data connection with an interval between successive connection continuity messages that is less than a connection timeout period for the data connection.

In Example 1196, the subject matter of any one of Examples 1182 to 1195 can optionally include wherein the radio circuitry is further configured to receive second data from the server or network node without needing to re-establish the data connection after transmitting the instruction to the network processing component.

In Example 1197, the subject matter of Example 1196 can optionally include wherein the second data is a push notification.

Example 1198 is a communication circuit arrangement including a processor configured to receive a message from a terminal device that instructs the communication circuit arrangement to maintain a data connection between the terminal device and a server or network node, wherein the data connection is an end-to-end data connection between the terminal device and the server or network node, and further configured to transmit, on a backhaul interface, one or more connection continuity messages over the data connection to the server or network node for the terminal device.

In Example 1199, the subject matter of Example 1198 can optionally include wherein the data connection is a transport layer connection, wherein the processor is configured to generate the one or more connection continuity messages according to a transport layer protocol.

In Example 1200, the subject matter of Example 1199 can optionally include wherein the processor is configured to receive the message from the terminal device on a lower layer than the transport layer.

In Example 1201, the subject matter of Example 1198 can optionally include wherein the data connection is a Transmission Control Protocol (TCP) connection, wherein the processor is configured to generate the one or more connection continuity messages according to a TCP protocol.

In Example 1202, the subject matter of any one of Examples 1198 to 1201 can optionally include wherein the data connection is a transport layer connection between an application program of the terminal device and a counterpart application program of the server or network node.

In Example 1203, the subject matter of any one of Examples 1198 to 1202 can optionally include wherein the server or network node is an internet server.

In Example 1204, the subject matter of any one of Examples 1198 to 1203 can optionally be configured as a network access node.

In Example 1205, the subject matter of any one of Examples 1198 to 1204 can optionally be configured as a cellular base station or a short-range access point.

In Example 1206, the subject matter of any one of Examples 1198 to 1202 can optionally be configured as an edge computing server.

In Example 1207, the subject matter of any one of Examples 1198 to 1202 can optionally be configured as a Mobile Edge Computing (MEC) server.

In Example 1208, the subject matter of any one of Examples 1198 to 1207 can optionally include wherein the message instructs the communication circuit arrangement to repeatedly transmit connection continuity messages on the data connection over a duration of time, wherein the processor is configured to transmit the one or more connection continuity messages on the data connection to the server or network node for the terminal device by repeatedly transmitting connection continuity messages on the data connection over the duration of time.

In Example 1209, the subject matter of any one of Examples 1198 to 1207 can optionally include wherein the message instructs the network processing component to repeatedly transmit connection continuity messages on the data connection with an interval between successive connection continuity messages that is less than a connection timeout period for the data connection, and wherein the processor is configured to transmit the one or more connection continuity messages on the data connection to the server or network node for the terminal device by transmitting successive connection continuity messages within the interval that is less than the connection timeout period.

In Example 1210, the subject matter of any one of Examples 1198 to 1209 can optionally include wherein the network backhaul interface is an interface with a core network, wherein the server or network node is external to the core network.

Example 1211 is a device including means for receiving one or more requests specifying instructions to perform connection continuity services for one or more data connections of a plurality of terminal devices, means for evaluating connection continuity requirements for each of the one or more data connections to determine a connection continuity message schedule, and means for transmitting connection continuity messages on the one or more data connections according to the connection continuity message schedule Example 1212 is a method for performing radio communications, the method including receiving one or more requests specifying instructions to perform connection continuity services for one or more data connections of a plurality of terminal devices, evaluating connection continuity requirements for each of the one or more data connections to determine a connection continuity message schedule, and transmitting connection continuity messages on the one or more data connections according to the connection continuity message schedule.

In Example 1213, the subject matter of Example 1212 can optionally include wherein the one or more data connections are end-to-end data connections between the plurality of terminal devices and one or more internet servers.

In Example 1214, the subject matter of Example 1212 or 1213 can optionally include wherein the one or more data connections are transport layer connections, the method further including generating the connection continuity messages according to a transport layer protocol.

In Example 1215, the subject matter of Example 1212 or 1213 can optionally include wherein the one or more data connections are Transmission Control Protocol (TCP) connections, the method further including generating the connection continuity messages according to a TCP protocol.

In Example 1216, the subject matter of Example 1215 can optionally include wherein the connection continuity messages are TCP heartbeats.

In Example 1217, the subject matter of any one of Examples 1212 to 1216 can optionally include wherein the connection continuity messages are keepalive messages.

In Example 1218, the subject matter of any one of Examples 1212 to 1217 can optionally include wherein the one or more requests specify a connection timeout interval as a connection continuity requirement for each of the one or more data connections, and wherein evaluating the connection continuity requirements for each of the one or more data connections to determine the connection continuity message schedule includes for each respective data connection of the one or more data connections, scheduling a sequence of connection continuity messages transmissions that are consecutively separated from each other within the connection timeout interval for the respective data connection.

In Example 1219, the subject matter of Example 1218 can optionally include wherein the one or more data connections are to different internet servers.

In Example 1220, the subject matter of any one of Examples 1212 to 1216 can optionally include wherein the one or more data connections are to a same internet server and wherein the one or more requests specify a connection timeout interval as a connection continuity requirement for each of the one or more data connections, wherein evaluating the connection continuity requirements for each of the one or more data connections to determine the connection continuity message schedule includes selecting a transmission interval that is less than or equal to the connection timeout intervals of each of the one or more requests, and scheduling a sequence of connection continuity message transmissions to the same internet server that are consecutively separated by the transmission interval.

In Example 1221, the subject matter of Example 1220 can optionally include wherein at least two of the one or more requests specify different connection timeout intervals.

In Example 1222, the subject matter of any one of Examples 1212 to 1221 can optionally include wherein the one or more requests further indicate data traffic requirements for each of the plurality of terminal devices, the method further including interfacing with a network access node to arrange for a radio access connection between the network access node and the plurality of terminal devices to include radio resources that meet the data traffic requirements for each of the plurality of terminal devices.

In Example 1223, the subject matter of Example 1222 can optionally include wherein receiving the one or more requests includes receiving the one or more requests from a gateway device of the plurality of terminal device that provides forwarding services for other terminal devices of the plurality of terminal devices.

In Example 1224, the subject matter of Example 1223 can optionally include wherein interfacing with the network access node to arrange for the radio access connection between the network access node and the plurality of terminal devices to include radio resources that meet the data traffic requirements for each of the plurality of terminal devices includes determining a radio resource allocation for a radio access connection between the network access node and the gateway device that provides radio resources that meet the data traffic requirements for all of the plurality of terminal devices.

In Example 1225, the subject matter of any one of Examples 1212 to 1224 can optionally include wherein transmitting the connection continuity messages on the one or more data connections according to the connection continuity message schedule includes transmitting the connection continuity messages through a core network to one or more internet servers external to the core network that are endpoints of the one or more data connections.

In Example 1226, the subject matter of any one of Examples 1212 to 1225 can optionally include performed at an edge computing device.

In Example 1227, the subject matter of any one of Examples 1212 to 1226 can optionally include performed at a Mobile Edge Computing (MEC) server.

Example 1228 is a communication device including one or more processors configured to perform the method of any one of Examples 1212 to 1225.

Example 1229 is an edge computing device configured to perform the method of any one of Examples 1212 to 1225.

Example 1230 is a non-transitory computer readable medium storing instructions that when executed by a processor direct the processor to perform the method of any one of Examples 1212 to 1225.

Example 1231 is a device including means for receiving one or more requests from a gateway terminal device for a plurality of terminal devices, wherein the one or more requests specify connection continuity requirements and data traffic requirements of one or more data connections of the plurality of terminal devices, transmitting connection continuity messages on the one or more data connections according to the connection continuity requirements specified of the one or more data connections, and interfacing with a network access node to arrange for a radio access connection between the network access node and the gateway terminal device to include radio resources that meet the data traffic requirements of the one or more data connections.

Example 1232 is a method for performing radio communications including receiving one or more requests from a gateway terminal device for a plurality of terminal devices, wherein the one or more requests specify connection continuity requirements and data traffic requirements of one or more data connections of the plurality of terminal devices, transmitting connection continuity messages on the one or more data connections according to the connection continuity requirements specified of the one or more data connections, and interfacing with a network access node to arrange for a radio access connection between the network access node and the gateway terminal device to include radio resources that meet the data traffic requirements of the one or more data connections.

In Example 1233, the subject matter of Example 1232 can optionally include wherein the one or more data connections are end-to-end data connections between the plurality of terminal devices and one or more internet servers.

In Example 1234, the subject matter of Example 1232 or 1233 can optionally include wherein the one or more data connections are transport layer connections, the method further including generating the connection continuity messages according to a transport layer protocol.

In Example 1235, the subject matter of Example 1232 or 1233 can optionally include wherein the one or more data connections are Transmission Control Protocol (TCP) connections, the method further including generating the connection continuity messages according to a TCP protocol.

In Example 1236, the subject matter of Example 1235 can optionally include wherein the connection continuity messages are TCP heartbeats.

In Example 1237, the subject matter of any one of Examples 1232 to 1236 can optionally include wherein the connection continuity messages are keepalive messages.

In Example 1238, the subject matter of any one of Examples 1232 to 1237 can optionally include wherein the one or more requests specify a connection timeout interval as a connection continuity requirement for each of the one or more data connections, and wherein transmitting the connection continuity messages on the one or more data connections according to the connection continuity requirements specified of the one or more data connections includes for each respective data connection of the one or more data connections, transmitting a sequence of connection continuity messages that are consecutively separated from each other within the connection timeout interval for the respective data connection.

In Example 1239, the subject matter of Example 1238 can optionally include wherein the one or more data connections are to different internet servers.

In Example 1240, the subject matter of any one of Examples 1232 to 1236 can optionally include wherein the one or more data connections are to a same internet server and wherein the one or more requests specify a connection timeout interval as a connection continuity requirement for each of the one or more data connections, and wherein transmitting the connection continuity messages on the one or more data connections according to the connection continuity requirements specified of the one or more data connections includes selecting a transmission interval that is less than or equal to the connection timeout intervals of each of the one or more requests, and transmitting a sequence of consecutive connection continuity messages to the same internet server that are consecutively separated by the transmission interval.

In Example 1241, the subject matter of Example 1240 can optionally include wherein at least two of the one or more requests specify different connection timeout intervals.

In Example 1242, the subject matter of any one of Examples 1232 to 1241 can optionally further include determining a radio resource allocation for a radio access connection between the network access node and the gateway device that provides radio resources that meet the data traffic requirements for all of the plurality of terminal devices.

In Example 1243, the subject matter of any one of Examples 1232 to 1242 can optionally include wherein transmitting the connection continuity messages on the one or more data connections according to the connection continuity requirements specified for the one or more data connections includes transmitting the connection continuity messages through a core network to one or more internet servers external to the core network that are endpoints of the one or more data connections.

In Example 1244, the subject matter of any one of Examples 1232 to 1243 can optionally include performed at an edge computing device.

In Example 1245, the subject matter of any one of Examples 1232 to 1244 can optionally include performed at a Mobile Edge Computing (MEC) server.

Example 1246 is a communication device including one or more processing components configured to perform the method of any one of Examples 1232 to 1243.

Example 1247 is an edge computing device configured to perform the method of any one of Examples 1232 to 1243.

Example 1248 is a non-transitory computer readable medium storing instructions that when executed by a processor direct the processor to perform the method of any one of Examples 1232 to 1243.

Example 1249 is a non-transitory computer readable medium storing instructions that when executed by a processor direct the processor to perform a method including receiving one or more requests specifying instructions to perform connection continuity services for one or more data connections of a plurality of terminal devices, evaluating connection continuity requirements for each of the one or more data connections to determine a connection continuity message schedule, and transmitting connection continuity messages on the one or more data connections according to the connection continuity message schedule.

In Example 1250, the subject matter of Example 1249 can optionally include wherein the one or more data connections are end-to-end data connections between the plurality of terminal devices and one or more internet servers.

In Example 1251, the subject matter of Example 1249 or 1250 can optionally include wherein the one or more data connections are transport layer connections, the method further including generating the connection continuity messages according to a transport layer protocol.

In Example 1252, the subject matter of Example 1249 or 1250 can optionally include wherein the one or more data connections are Transmission Control Protocol (TCP) connections, the method further including generating the connection continuity messages according to a TCP protocol.

In Example 1253, the subject matter of Example 1252 can optionally include wherein the connection continuity messages are TCP heartbeats.

In Example 1254, the subject matter of any one of Examples 1249 to 1253 can optionally include wherein the connection continuity messages are keepalive messages.

In Example 1255, the subject matter of any one of Examples 1249 to 1253 can optionally include wherein the one or more requests specify a connection timeout interval as a connection continuity requirement for each of the one or more data connections, and wherein evaluating the connection continuity requirements for each of the one or more data connections to determine the connection continuity message schedule includes for each respective data connection of the one or more data connections, scheduling a sequence of connection continuity messages transmissions that are consecutively separated from each other within the connection timeout interval for the respective data connection.

In Example 1256, the subject matter of Example 1255 can optionally include wherein the one or more data connections are to different internet servers.

In Example 1257, the subject matter of any one of Examples 1249 to 1253 can optionally include wherein the one or more data connections are to a same internet server and wherein the one or more requests specify a connection timeout interval as a connection continuity requirement for each of the one or more data connections, wherein evaluating the connection continuity requirements for each of the one or more data connections to determine the connection continuity message schedule includes selecting a transmission interval that is less than or equal to the connection timeout intervals of each of the one or more requests, and scheduling a sequence of connection continuity message transmissions to the same internet server that are consecutively separated by the transmission interval.

In Example 1258, the subject matter of Example 1257 can optionally include wherein at least two of the one or more requests specify different connection timeout intervals.

In Example 1259, the subject matter of any one of Examples 1249 to 1258 can optionally include wherein the one or more requests further indicate data traffic requirements for each of the plurality of terminal devices, the method further including interfacing with a network access node to arrange for a radio access connection between the network access node and the plurality of terminal devices to include radio resources that meet the data traffic requirements for each of the plurality of terminal devices.

In Example 1260, the subject matter of Example 1259 can optionally include wherein receiving the one or more requests includes receiving the one or more requests from a gateway device of the plurality of terminal device that provides forwarding services for other terminal devices of the plurality of terminal devices.

In Example 1261, the subject matter of Example 1260 can optionally include wherein interfacing with the network access node to arrange for the radio access connection between the network access node and the plurality of terminal devices to include radio resources that meet the data traffic requirements for each of the plurality of terminal devices includes determining a radio resource allocation for a radio access connection between the network access node and the gateway device that provides radio resources that meet the data traffic requirements for all of the plurality of terminal devices.

In Example 1262, the subject matter of any one of Examples 1249 to 1261 can optionally include wherein transmitting the connection continuity messages on the one or more data connections according to the connection continuity message schedule includes transmitting the connection continuity messages through a core network to one or more internet servers external to the core network that are endpoints of the one or more data connections.

In Example 1263, the subject matter of any one of Examples 1249 to 1262 can optionally include the instructions configured for execution at an edge computing device.

In Example 1264, the subject matter of any one of Examples 1249 to 1263 can optionally include the instructions configured for execution at a Mobile Edge Computing (MEC) server.

Example 1265 is a non-transitory computer readable medium storing instructions that when executed by a processor direct the processor to perform a method including receiving one or more requests from a gateway terminal device on behalf of a plurality of terminal devices, wherein the one or more requests specify connection continuity requirements and data traffic requirements of one or more data connections of the plurality of terminal devices, transmitting connection continuity messages on the one or more data connections according to the connection continuity requirements specified of the one or more data connections, and interfacing with a network access node to arrange for a radio access connection between the network access node and the gateway terminal device to include radio resources that meet the data traffic requirements of the one or more data connections.

In Example 1266, the subject matter of Example 1265 can optionally include wherein the one or more data connections are end-to-end data connections between the plurality of terminal devices and one or more internet servers.

In Example 1267, the subject matter of Example 1265 or 1266 can optionally include wherein the one or more data connections are transport layer connections, the method further including generating the connection continuity messages according to a transport layer protocol.

In Example 1268, the subject matter of Example non-transitory can optionally include readable medium of Example 1265 or 1266, wherein the one or more data connections are Transmission Control Protocol (TCP) connections, the method further including generating the connection continuity messages according to a TCP protocol.

In Example 1269, the subject matter of Example 1268 can optionally include wherein the connection continuity messages are TCP heartbeats.

In Example 1270, the subject matter of any one of Examples 1265 to 1269 can optionally include wherein the connection continuity messages are keepalive messages.

In Example 1271, the subject matter of any one of Examples 1265 to 1269 can optionally include wherein the one or more requests specify a connection timeout interval as a connection continuity requirement for each of the one or more data connections, and wherein transmitting the connection continuity messages on the one or more data connections according to the connection continuity requirements specified of the one or more data connections includes for each respective data connection of the one or more data connections, transmitting a sequence of connection continuity messages that are consecutively separated from each other within the connection timeout interval for the respective data connection.

In Example 1272, the subject matter of Example 1271 can optionally include wherein the one or more data connections are to different internet servers.

In Example 1273, the subject matter of any one of Examples 1265 to 1269 can optionally include wherein the one or more data connections are to a same internet server and wherein the one or more requests specify a connection timeout interval as a connection continuity requirement for each of the one or more data connections, and wherein transmitting the connection continuity messages on the one or more data connections according to the connection continuity requirements specified of the one or more data connections includes selecting a transmission interval that is less than or equal to the connection timeout intervals of each of the one or more requests, and transmitting a sequence of consecutive connection continuity messages to the same internet server that are consecutively separated by the transmission interval.

In Example 1274, the subject matter of Example 1273 can optionally include wherein at least two of the one or more requests specify different connection timeout intervals.

In Example 1275, the subject matter of any one of Examples 1265 to 1274 can optionally include the method further including determining a radio resource allocation for a radio access connection between the network access node and the gateway device that provides radio resources that meet the data traffic requirements for all of the plurality of terminal devices.

In Example 1276, the subject matter of any one of Examples 1265 to 1275 can optionally include wherein transmitting the connection continuity messages on the one or more data connections according to the connection continuity requirements specified of the one or more data connections includes transmitting the connection continuity messages through a core network to one or more internet servers external to the core network that are endpoints of the one or more data connections.

In Example 1277, the subject matter of any one of Examples 1265 to 1276 can optionally include the instructions configured for execution at an edge computing device.

In Example 1278, the subject matter of any one of Examples 1265 to 1276 can optionally include the instructions configured for execution at a Mobile Edge Computing (MEC) server.

Example 1279 is a device including means for determining a predicted user movement based on context information related to a user location to obtain a predicted route, means for determining predicted radio conditions along the predicted route, based on the predicted radio conditions, means for identifying one or more first areas expected to have a first type of radio conditions and one or more second areas expected to have a second type of radio conditions different from the first type of radio conditions, and means for controlling radio activity while traveling on the predicted route according to the one or more first areas and the one or more second areas.

Example 1280 is a method of performing radio communications, the method including determining a predicted user movement based on context information related to a user location to obtain a predicted route, determining predicted radio conditions along the predicted route, based on the predicted radio conditions, identifying one or more first areas expected to have a first type of radio conditions and one or more second areas expected to have a second type of radio conditions different from the first type of radio conditions, and controlling radio activity while traveling on the predicted route according to the one or more first areas and the one or more second areas.

In Example 1281, the subject matter of Example 1280 can optionally include wherein identifying the one or more first areas expected to have the first type of radio conditions and the one or more second areas expected to have the second type of radio conditions includes identifying one or more areas that the predicted radio conditions indicate will have weak radio conditions as the one or more first areas and identifying one or more other areas that the predicted radio conditions indicate will have strong radio conditions as the one or more second areas.

In Example 1282, the subject matter of Example 1281 can optionally include wherein controlling the radio activity while traveling on the predicted route according to the one or more first areas and the one or more second areas includes suspending cell scans while traveling in the one or more first areas.

In Example 1283, the subject matter of Example 1282 can optionally include wherein controlling the radio activity while traveling on the predicted route according to the one or more first areas and the one or more second areas further includes triggering cell scans after entering the one or more second areas.

In Example 1284, the subject matter of Example 1281 can optionally further include determining that a user is currently traveling in the one or more first areas, and determining that the predicted route runs through the one or more second areas, wherein controlling the radio activity while traveling on the predicted route according to the one or more first areas and the one or more second areas includes suspending cell scans while traveling in the one or more first areas until the one or more second areas is reached.

In Example 1285, the subject matter of Example 1281 can optionally include wherein controlling the radio activity while traveling on the predicted route according to the one or more first areas and the one or more second areas includes suspending data transfer while traveling in the one or more first areas.

In Example 1286, the subject matter of Example 1285 can optionally include wherein controlling the radio activity while traveling on the predicted route according to the one or more first areas and the one or more second areas further includes triggering data transfer after entering the one or more second areas.

In Example 1287, the subject matter of Example 1285 can optionally include wherein suspending data transfer while traveling in the one or more first areas includes identifying latency-tolerant data and latency-sensitive data, and suspending data transfer of the latency-tolerant data and transferring the latency-sensitive data while traveling in the one or more first areas.

In Example 1288, the subject matter of Example 1285 can optionally further include determining that a user is currently traveling in the one or more first areas, and determining that the predicted route runs through the one or more second areas, wherein controlling the radio activity while traveling on the predicted route according to the one or more first areas and the one or more second areas includes suspending data transfer while traveling in the one or more first areas until the one or more second areas is reached.

In Example 1289, the subject matter of any one of Examples 1281 to 1288 can optionally include wherein the predicted radio conditions indicate that the one or more first areas are out-of-coverage (OOC).

In Example 1290, the subject matter of Example 1280 can optionally include wherein the predicted radio conditions indicate predicted radio conditions of one or more first network access nodes of the one or more first areas, and wherein controlling the radio activity while traveling on the predicted route according to the one or more first areas and the one or more second areas includes selecting a serving network access node from the one or more first network access nodes based on the predicted radio conditions of the one or more first network access nodes.

In Example 1291, the subject matter of any one of Examples selecting the serving can optionally include access node from the one or more first network access nodes based on the predicted radio conditions of the one or more first network access nodes includes selecting a network access node from the one or more first network access nodes that has a highest signal strength or signal quality measurement of the predicted radio conditions as the serving network access node.

In Example 1292, the subject matter of Example 1280 can optionally include wherein the predicted radio conditions indicate a network identity or a radio access technology type of one or more first network access nodes of the one or more first areas, and wherein controlling the radio activity while traveling on the predicted route according to the one or more first areas and the one or more second areas includes selecting a network access node from the one or more first network access nodes based on the network identity and the radio access technology type of the one or more first network access nodes.

In Example 1293, the subject matter of Example 1280 can optionally include wherein the predicted radio conditions indicate predicted radio conditions of one or more first network access nodes of the one or more first areas and predicted radio conditions of one or more second network access nodes of the one or more second areas, and wherein controlling the radio activity while traveling on the predicted route according to the one or more first areas and the one or more second areas includes selecting a first serving access node from the one or more first network access nodes while traveling in the one or more first areas based on the predicted radio conditions, and selecting a second serving access node from the one or more second network access nodes while traveling in the one or more second areas based on the predicted radio conditions.

In Example 1294, the subject matter of any one of Examples 1280 to 1293 can optionally include wherein determining the predicted user movement based on the context information related to the user location to obtain the predicted route includes learning one or more regular user travel routes based on past location information of context information, detecting that a user is currently traveling on a first regular user travel route of the one or more regular user travel routes based on a match between current location information of the context information and the past location information of the context information, and determining the first regular user travel route as the predicted route.

In Example 1295, the subject matter of any one of Examples 1280 to 1293 can optionally include wherein determining the predicted user movement based on the context information related to the user location to obtain the predicted route includes identifying from current or recent location information of the context information that a user is currently traveling on a known travel route, and determining the known travel route as the predicted route.

In Example 1296, the subject matter of any one of Examples 1280 to 1293 can optionally include wherein determining the predicted user movement based on the context information related to the user location to obtain the predicted route includes detecting that a user has indicated a planned route in an application program of a terminal device, and determining the planned route as the predicted route.

In Example 1297, the subject matter of Example 1296 can optionally include wherein detecting that the user has indicated the planned route in the application program of the terminal device includes determining that a user has entered a navigation route into a navigation application program, determining that a user has planned a trip or vacation in a travel application program, or determining that a user has scheduled an event in a schedule application program.

In Example 1298, the subject matter of any one of Examples 1280 to 1297 can optionally further include prior to determining the predicted radio conditions, measuring radio condition information at one or more user locations, and wherein determining the predicted radio conditions along the predicted route includes identifying a subset of the one or more user locations that are along the predicted route, and determining the predicted radio conditions based on the radio condition information measured at the subset of the one or more user locations.

In Example 1299, the subject matter of any one of Examples 1280 to 1297 can optionally include wherein determining the predicted radio conditions along the predicted route includes generating a Radio Environment Map (REM), and obtaining the predicted radio conditions from the REM based on locations of the REM along the predicted route.

In Example 1300, the subject matter of any one of Examples 1280 to 1297 can optionally include wherein determining the predicted radio conditions along the predicted route includes receiving a message from an external server that indicates the predicted radio conditions.

In Example 1301, the subject matter of Example 1300 can optionally include wherein the message comprises the predicted radio conditions.

In Example 1302, the subject matter of Example 1300 can optionally include wherein the message comprises radio conditions at one or more locations along the predicted route, and wherein determining the predicted radio conditions along the predicted route further includes determining the predicted radio conditions based on the radio conditions at the one or more locations along the predicted route.

In Example 1303, the subject matter of any one of Examples 1300 to 1302 can optionally include wherein the message comprises crowdsourced data related to radio conditions.

In Example 1304, the subject matter of any one of Examples 1298 to 1303 can optionally include wherein the external server is a Radio Environment Map (REM) server.

In Example 1305, the subject matter of any one of Examples 1280 to 1304 can optionally include Example 1306 is a non-transitory computer readable medium storing instructions that when executed by a controller of a terminal device cause the terminal device to perform the method of any one of Examples 1280 to 1304.

Example 1307 is a non-transitory computer readable medium storing instructions that when executed by a processor cause the processor to perform the method of any one of Examples 1280 to 1304.

Example 1308 is a circuit arrangement configured to perform the method of any one of Examples 1280 to 1304.

Example 1309 is a communication system including a preprocessing module configured to obtain context information related to a user location, a learning module configured to determine a predicted user movement based on context information related to a user location to obtain a predicted route and to determine predicted radio conditions along the predicted route, and a decision module configured to, based on the predicted radio conditions, identify one or more first areas expected to have a first type of radio conditions and one or more second areas expected to have a second type of radio conditions different from the first type of radio conditions and to control radio activity while traveling on the predicted route according to the one or more first areas and the one or more second areas.

In Example 1310, the subject matter of Example 1309 can optionally further include a baseband modem, wherein the decision module is configured to control radio activity of the baseband modem.

In Example 1311, the subject matter of Example 1309 can optionally further include an antenna, a radio transceiver, a baseband modem and configured as a terminal device.

In Example 1312, the subject matter of Example 1311 can optionally include wherein the learning module and the decision module are configured as part of an application processor of the terminal device.

In Example 1313, the subject matter of any one of Examples 1309 to 1312 can optionally include wherein the decision module is configured to identify identifying the one or more first areas expected to have the first type of radio conditions and the one or more second areas expected to have the second type of radio conditions by identifying one or more areas that the predicted radio conditions will have weak radio conditions as the one or more first areas and identifying one or more other areas that the predicted radio conditions that will have strong radio conditions as the one or more second areas.

In Example 1314, the subject matter of Example 1313 can optionally include wherein the decision module is configured to control the radio activity while traveling on the predicted route according to the one or more first areas and the one or more second areas by suspending cell scans while traveling in the one or more first areas.

In Example 1315, the subject matter of Example 1314 can optionally include wherein the decision module is configured to control the radio activity while traveling on the predicted route according to the one or more first areas and the one or more second areas further by triggering cell scans after entering the one or more second areas.

In Example 1316, the subject matter of Example 1313 can optionally include wherein the decision module is further configured to determine that a user is currently traveling in the one or more first areas, and determine that the predicted route runs through the one or more second areas, and wherein the decision module is configured to control the radio activity while traveling on the predicted route according to the one or more first areas and the one or more second areas by suspending cell scans while traveling in the one or more first areas until the one or more second areas is reached.

In Example 1317, the subject matter of Example 1313 can optionally include wherein the decision module is configured to control controlling the radio activity while traveling on the predicted route according to the one or more first areas and the one or more second areas by suspending data transfer while traveling in the one or more first areas.

In Example 1318, the subject matter of Example 1317 can optionally include wherein the decision module is further configured to control the radio activity while traveling on the predicted route according to the one or more first areas and the one or more second areas further by triggering data transfer after entering the one or more second areas.

In Example 1319, the subject matter of Example 1317 can optionally include wherein the decision module is configured to suspend data transfer while traveling in the one or more first areas by identifying latency-tolerant data and latency-sensitive data, and suspending data transfer of the latency-tolerant data and transferring the latency-sensitive data while traveling in the one or more first areas.

In Example 1320, the subject matter of Example 1317 can optionally include wherein the decision module is further configured to determine that a user is currently traveling in the one or more first areas, and determine that the predicted route runs through the one or more second areas, and wherein the decision module is configured to control the radio activity while traveling on the predicted route according to the one or more first areas and the one or more second areas by suspending data transfer while traveling in the one or more first areas until the one or more second areas is reached.

In Example 1321, the subject matter of any one of Examples 1313 to 1320 can optionally include wherein the predicted radio conditions indicate that the one or more first areas are out-of-coverage (OOC).

In Example 1322, the subject matter of Example 1313 can optionally include wherein the predicted radio conditions indicate predicted radio conditions of one or more first network access nodes of the one or more first areas, and wherein the decision module is configured to control the radio activity while traveling on the predicted route according to the one or more first areas and the one or more second areas by selecting a serving network access node from the one or more first network access nodes based on the predicted radio conditions of the one or more first network access nodes.

In Example 1323, the subject matter of Example 1313 can optionally include wherein the decision module is configured to select the serving network access node from the one or more first network access nodes based on the predicted radio conditions of the one or more first network access nodes by selecting a network access node from the one or more first network access nodes that has a highest signal strength or signal quality measurement of the predicted radio conditions as the serving network access node.

In Example 1324, the subject matter of Example 1313 can optionally include wherein the predicted radio conditions indicate a network identity or a radio access technology type of one or more first network access nodes of the one or more first areas, and wherein the decision module is configured to control the radio activity while traveling on the predicted route according to the one or more first areas and the one or more second areas by selecting a network access node from the one or more first network access nodes based on the network identity and the radio access technology type of the one or more first network access nodes.

In Example 1325, the subject matter of Example 1313 can optionally include wherein the predicted radio conditions indicate predicted radio conditions of one or more first network access nodes of the one or more first areas and predicted radio conditions of one or more second network access nodes of the one or more second areas, and wherein the decision module is configured to control the radio activity while traveling on the predicted route according to the one or more first areas and the one or more second areas includes selecting a first serving access node from the one or more first network access nodes while traveling in the one or more first areas based on the predicted radio conditions, and selecting a second serving access node from the one or more second network access nodes while traveling in the one or more second areas based on the predicted radio conditions.

In Example 1326, the subject matter of any one of Examples 1309 to 1325 can optionally further include a repository database configured to receive the context information from the preprocessing module and to store the context information as stored context information, wherein the learning module is configured to determine the predicted user movement based on the context information related to the user location to obtain the predicted route by learning one or more regular user travel routes based on past location information of stored context information, detecting that a user is currently traveling on a first regular user travel route of the one or more regular user travel routes based on a match between current location information of the context information and the past location information of the stored context information, and determining the first regular user travel route as the predicted route.

In Example 1327, the subject matter of any one of Examples to 1325, can optionally include the learning module is configured to determine the predicted user movement based on the context information related to the user location to obtain the predicted route by identifying from current or recent location information of the context information that a user is currently traveling on a known travel route, and determining the known travel route as the predicted route.

In Example 1328, the subject matter of any one of Examples 1309 to 1325 can optionally include wherein the learning module is configured to determine the predicted user movement based on the context information related to the user location to obtain the predicted route by detecting that a user has indicated a planned route in an application program of a terminal device, and determining the planned route as the predicted route.

In Example 1329, the subject matter of Example 1328 can optionally include wherein the learning module is configured to detect that the user has indicated the planned route in the application program of the terminal device by determining that a user has entered a navigation route into a navigation application program, determining that a user has planned a trip or vacation in a travel application program, or determining that a user has scheduled an event in a schedule application program.

In Example 1330, the subject matter of any one of Examples 1309 to 1329 can optionally further include wherein the preprocessing module is further configured to obtain radio condition information at one or more user locations prior to the learning module determining the predicted radio conditions, wherein the learning module is configured to determine the predicted radio conditions along the predicted route includes identifying a subset of the one or more user locations that are along the predicted route, and determining the predicted radio conditions based on the radio condition information measured at the subset of the one or more user locations.

In Example 1331, the subject matter of any one of Examples 1309 to 1329 can optionally include wherein the learning module is configured to determine the predicted radio conditions along the predicted route by generating a Radio Environment Map (REM), and obtaining the predicted radio conditions from the REM based on locations of the REM along the predicted route.

In Example 1332, the subject matter of any one of Examples 1309 to 1329 can optionally include wherein the learning module is configured to determine the predicted radio conditions along the predicted route by receiving a message from an external server that indicates the predicted radio conditions.

In Example 1333, the subject matter of Example 1332 can optionally include wherein the message comprises the predicted radio conditions.

In Example 1334, the subject matter of Example 1332 can optionally include wherein the message comprises radio conditions at one or more locations along the predicted route, and wherein the learning module is configured to determine the predicted radio conditions along the predicted route further by determining the predicted radio conditions based on the radio conditions at the one or more locations along the predicted route.

In Example 1335, the subject matter of any one of Examples 1332 to 1334 can optionally include wherein the message comprises crowdsourced data related to radio conditions.

In Example 1336, the subject matter of any one of Examples 1332 to 1335 can optionally include wherein the external server is a Radio Environment Map (REM) server.

Example 1337 is a communication system including a preprocessing module configured to process context information related to a user location to obtain processed context information, a repository database configured to store the processed context information as stored context information, a learning module configured to evaluate the processed context information or the stored context information to determine a predicted user travel route and further configured to determine predicted radio conditions at different locations on the predicted user travel route, and a decision module configured to control radio activity while the user is traveling on the predicted user travel route based on the predicted radio conditions.

In Example 1338, the subject matter of Example 1337 can optionally be configured as a terminal device and further including an antenna and a radio transceiver.

In Example 1339, the subject matter of Example 1337 or 1338 can optionally include wherein the preprocessing module, the repository database, the learning module, and the decision module are configured as part of an application processor.

In Example 1340, the subject matter of Example 1337 can optionally include wherein the decision module is configured to control radio activity while the user is traveling on the predicted user travel route based on the predicted radio conditions by identifying one or more areas along the predicted user travel route that the predicted radio conditions indicate have poor radio coverage, and suspending cell scans while traveling in the one or more areas.

In Example 1341, the subject matter of Example 1337 can optionally include wherein the decision module is configured to control radio activity while the user is traveling on the predicted user travel route based on the predicted radio conditions by identifying one or first more areas the predicted user travel route that the predicted radio conditions indicate have poor radio coverage and identifying one or more second areas on the predicted user travel route that the predicted radio conditions indicate have strong radio coverage, and delaying data transfer during travel in the one or more first areas until the one or more second areas is reached.

In Example 1342, the subject matter of Example 1337 can optionally include wherein the predicted radio conditions indicate expected available network access nodes on the predicted travel route, and wherein the decision module is configured to control radio activity while the user is traveling on the predicted user travel route based on the predicted radio conditions by selecting a serving network access node from the expected available network access nodes while traveling on the predicted user travel route using the predicted radio conditions.

In Example 1343, the subject matter of Example 1342 can optionally include wherein the decision module is further configured to trigger a cell search for the serving network access node at a baseband modem.

In Example 1344, the subject matter of any one of Examples 1337 to 1343 can optionally include wherein the learning module is configured to evaluate the processed context information or the stored context information to determine the predicted user travel route by identifying one or more regularly traveled user routes based on the stored context information, detecting that a user is traveling on a first route of the one or more regularly traveled routes based on a match between user locations of the processed context information and user locations of the stored context information related to the first route, and determining the first route as the predicted user travel route.

In Example 1345, the subject matter of any one of Examples 1337 to 1343 can optionally include wherein the processed context information indicates that a user has planned a route in an application program, and wherein the learning module is configured to evaluate the processed context information or the stored context information to determine the predicted user travel route by determining that the user has entered a navigation route into a navigation application program, determining that the user has planned a trip or vacation in a travel application program, or determining that the user has scheduled an event in a schedule application program.

In Example 1346, the subject matter of any one of Examples 1337 to 1345 can optionally include wherein the stored context information indicates radio measurements at one or more user locations, and wherein the learning module is configured to determine predicted radio conditions at different locations on the predicted user travel route by identifying a subset of the one or more user locations that are along the predicted route, and determining the predicted radio conditions based on the radio measurements at the subset of the one or more user locations.

In Example 1347, the subject matter of any one of Examples 1337 to 1346 can optionally include wherein the learning module is configured to determine the predicted radio conditions at different locations on the predicted user travel route by receiving a message from an external server that indicates the predicted radio conditions.

In Example 1348, the subject matter of Example 1347 can optionally include wherein the message comprises the predicted radio conditions.

In Example 1349, the subject matter of Example 1347 can optionally include wherein the message comprises radio conditions at the different locations on the predicted user travel route, and wherein the learning module is configured to determine the predicted radio conditions at the different locations on the predicted user travel route by determining the predicted radio conditions based on the radio conditions at the different locations on the predicted user travel route.

In Example 1350, the subject matter of any one of Examples 1347 to 1349 can optionally include wherein the message comprises crowdsourced data related to radio conditions.

Example 1351 is a non-transitory computer readable medium storing instructions that when executed by a processor cause the processor to perform a method including determining a predicted user movement based on context information related to a user location to obtain a predicted route, determining predicted radio conditions along the predicted route, based on the predicted radio conditions, identifying one or more first areas expected to have a first type of radio conditions and one or more second areas expected to have a second type of radio conditions different from the first type of radio conditions, and controlling radio activity while traveling on the predicted route according to the one or more first areas and the one or more second areas.

In Example 1352, the subject matter of Example 1351 can optionally include wherein identifying the one or more first areas expected to have the first type of radio conditions and the one or more second areas expected to have the second type of radio conditions includes identifying one or more areas that the predicted radio conditions will have weak radio conditions as the one or more first areas and identifying one or more other areas that the predicted radio conditions that will have strong radio conditions as the one or more second areas.

In Example 1353, the subject matter of Example 1352 can optionally include wherein controlling the radio activity while traveling on the predicted route according to the one or more first areas and the one or more second areas includes suspending cell scans while traveling in the one or more first areas.

In Example 1354, the subject matter of Example 1353 can optionally include wherein controlling the radio activity while traveling on the predicted route according to the one or more first areas and the one or more second areas further includes triggering cell scans after entering the one or more second areas.

In Example 1355, the subject matter of Example 1352 can optionally include the method further including determining that a user is currently traveling in the one or more first areas, and determining that the predicted route runs through the one or more second areas, wherein controlling the radio activity while traveling on the predicted route according to the one or more first areas and the one or more second areas includes suspending cell scans while traveling in the one or more first areas until the one or more second areas is reached.

In Example 1356, the subject matter of Example 1355 can optionally include wherein controlling the radio activity while traveling on the predicted route according to the one or more first areas and the one or more second areas includes suspending data transfer while traveling in the one or more first areas.

In Example 1357, the subject matter of Example 1356 can optionally include wherein controlling the radio activity while traveling on the predicted route according to the one or more first areas and the one or more second areas further includes triggering data transfer after entering the one or more second areas.

In Example 1358, the subject matter of Example 1356 can optionally include wherein suspending data transfer while traveling in the one or more first areas includes identifying latency-tolerant data and latency-sensitive data, and suspending data transfer of the latency-tolerant data and transferring the latency-sensitive data while traveling in the one or more first areas.

In Example 1359, the subject matter of Example 1356 can optionally include the method further including determining that a user is currently traveling in the one or more first areas, and determining that the predicted route runs through the one or more second areas, wherein controlling the radio activity while traveling on the predicted route according to the one or more first areas and the one or more second areas includes suspending data transfer while traveling in the one or more first areas until the one or more second areas is reached.

In Example 1360, the subject matter of any one of Examples 1352 to 1359 can optionally include wherein the predicted radio conditions indicate that the one or more first areas are out-of-coverage (OOC).

In Example 1361, the subject matter of Example 1351 can optionally include wherein the predicted radio conditions indicate predicted radio conditions of one or more first network access nodes of the one or more first areas, and wherein controlling the radio activity while traveling on the predicted route according to the one or more first areas and the one or more second areas includes selecting a serving network access node from the one or more first network access nodes based on the predicted radio conditions of the one or more first network access nodes.

In Example 1362, the subject matter of Example 1351 can optionally include wherein selecting the serving network access node from the one or more first network access nodes based on the predicted radio conditions of the one or more first network access nodes includes selecting a network access node from the one or more first network access nodes that has a highest signal strength or signal quality measurement of the predicted radio conditions as the serving network access node.

In Example 1363, the subject matter of Example 1351 can optionally include wherein the predicted radio conditions indicate a network identity or a radio access technology type of one or more first network access nodes of the one or more first areas, and wherein controlling the radio activity while traveling on the predicted route according to the one or more first areas and the one or more second areas includes selecting a network access node from the one or more first network access nodes based on the network identity and the radio access technology type of the one or more first network access nodes.

In Example 1364, the subject matter of Example 1351 can optionally include wherein the predicted radio conditions indicate predicted radio conditions of one or more first network access nodes of the one or more first areas and predicted radio conditions of one or more second network access nodes of the one or more second areas, and wherein controlling the radio activity while traveling on the predicted route according to the one or more first areas and the one or more second areas includes selecting a first serving access node from the one or more first network access nodes while traveling in the one or more first areas based on the predicted radio conditions, and selecting a second serving access node from the one or more second network access nodes while traveling in the one or more second areas based on the predicted radio conditions.

In Example 1365, the subject matter of any one of Examples 1351 to 1364 can optionally include wherein determining the predicted user movement based on the context information related to the user location to obtain the predicted route includes learning one or more regular user travel routes based on past location information of context information, detecting that a user is currently traveling on a first regular user travel route of the one or more regular user travel routes based on a match between current location information of the context information and the past location information, and determining the first regular user travel route as the predicted route.

In Example 1366, the subject matter of any one of Examples 1351 to 1364 can optionally include wherein determining the predicted user movement based on the context information related to the user location to obtain the predicted route includes identifying from current or recent location information of the context information that a user is currently traveling on a known travel route, and determining the known travel route as the predicted route.

In Example 1367, the subject matter of any one of Examples 1351 to 1364 can optionally include wherein determining the predicted user movement based on the context information related to the user location to obtain the predicted route includes detecting that a user has indicated a planned route in an application program of a terminal device, and determining the planned route as the predicted route.

In Example 1368, the subject matter of Example 1367 can optionally include wherein detecting that the user has indicated the planned route in the application program of the terminal device includes determining that a user has entered a navigation route into a navigation application program, determining that a user has planned a trip or vacation in a travel application program, or determining that a user has scheduled an event in a schedule application program.

In Example 1369, the subject matter of any one of Examples 1351 to 1368 can optionally further include prior to determining the predicted radio conditions, measuring radio condition information at one or more user locations, wherein determining the predicted radio conditions along the predicted route includes identifying a subset of the one or more user locations that are along the predicted route determining the predicted radio conditions based on the radio condition information measured at the subset of the one or more user locations.

In Example 1370, the subject matter of any one of Examples 1351 to 1368 can optionally include wherein determining the predicted radio conditions along the predicted route includes generating a Radio Environment Map (REM), and obtaining the predicted radio conditions from the REM based on locations of the REM along the predicted route.

In Example 1371, the subject matter of any one of Examples 1351 to 1368 can optionally include wherein determining the predicted radio conditions along the predicted route includes receiving a message that indicates the predicted radio conditions from an external server.

In Example 1372, the subject matter of Example 1371 can optionally include wherein the message comprises the predicted radio conditions.

In Example 1373, the subject matter of Example 1371 can optionally include wherein the message comprises radio conditions at one or more locations along the predicted route, and wherein determining the predicted radio conditions along the predicted route further includes determining the predicted radio conditions based on the radio conditions at the one or more locations along the predicted route.

In Example 1374, the subject matter of any one of Examples 1371 to 1373 can optionally include wherein the message comprises crowdsourced data related to radio conditions.

In Example 1375, the subject matter of any one of Examples 1371 to 1374 can optionally include wherein the external server is a Radio Environment Map (REM) server.

Example 1376 is a circuit arrangement including a preprocessing circuit configured to obtain context information related to a user location, a learning circuit configured to determine a predicted user movement based on context information related to a user location to obtain a predicted route and to determine predicted radio conditions along the predicted route, and a decision circuit configured to, based on the predicted radio conditions, identify one or more first areas expected to have a first type of radio conditions and one or more second areas expected to have a second type of radio conditions different from the first type of radio conditions and to control radio activity while traveling on the predicted route according to the one or more first areas and the one or more second areas.

In Example 1377, the subject matter of Example 1376 can optionally further include a baseband modem, wherein the decision circuit is configured to control radio activity of the baseband modem.

In Example 1378, the subject matter of Example 1376 can optionally further include an antenna, a radio transceiver, a baseband modem and configured as a terminal device.

In Example 1379, the subject matter of Example 1378 can optionally include wherein the learning circuit and the decision circuit are configured as part of an application processor of the terminal device.

In Example 1380, the subject matter of any one of Examples 1376 to 1379 can optionally include wherein the preprocessing circuit, the learning circuit, and the decision circuit are hardware-defined circuitry or software-defined circuitry.

In Example 1381, the subject matter of any one of Examples 1376 to 1380 can optionally include wherein the decision circuit is configured to identify identifying the one or more first areas expected to have the first type of radio conditions and the one or more second areas expected to have the second type of radio conditions by identifying one or more areas that the predicted radio conditions will have weak radio conditions as the one or more first areas and identifying one or more other areas that the predicted radio conditions that will have strong radio conditions as the one or more second areas.

In Example 1382, the subject matter of Example 1381 can optionally include wherein the decision circuit is configured to control the radio activity while traveling on the predicted route according to the one or more first areas and the one or more second areas by suspending cell scans while traveling in the one or more first areas.

In Example 1383, the subject matter of Example 1382 can optionally include wherein the decision circuit is configured to control the radio activity while traveling on the predicted route according to the one or more first areas and the one or more second areas further by triggering cell scans after entering the one or more second areas.

In Example 1384, the subject matter of Example 1381 can optionally include wherein the decision circuit is further configured to determine that a user is currently traveling in the one or more first areas, and determine that the predicted route runs through the one or more second areas, and wherein the decision circuit is configured to control the radio activity while traveling on the predicted route according to the one or more first areas and the one or more second areas by suspending cell scans while traveling in the one or more first areas until the one or more second areas is reached.

In Example 1385, the subject matter of Example 1381 can optionally include wherein the decision circuit is configured to control controlling the radio activity while traveling on the predicted route according to the one or more first areas and the one or more second areas by suspending data transfer while traveling in the one or more first areas.

In Example 1386, the subject matter of Example 1385 can optionally include wherein the decision circuit is further configured to control the radio activity while traveling on the predicted route according to the one or more first areas and the one or more second areas further by triggering data transfer after entering the one or more second areas.

In Example 1387, the subject matter of Example 1385 can optionally include wherein the decision circuit is configured to suspend data transfer while traveling in the one or more first areas by identifying latency-tolerant data and latency-sensitive data, and suspending data transfer of the latency-tolerant data and transferring the latency-sensitive data while traveling in the one or more first areas.

In Example 1388, the subject matter of Example 1385 can optionally include wherein the decision circuit is further configured to determine that a user is currently traveling in the one or more first areas, and determine that the predicted route runs through the one or more second areas, and wherein the decision circuit is configured to control the radio activity while traveling on the predicted route according to the one or more first areas and the one or more second areas by suspending data transfer while traveling in the one or more first areas until the one or more second areas is reached.

In Example 1389, the subject matter of any one of Examples 1381 to 1388 can optionally include wherein the predicted radio conditions indicate that the one or more first areas are out-of-coverage (OOC).

In Example 1390, the subject matter of Example 1381 can optionally include wherein the predicted radio conditions indicate predicted radio conditions of one or more first network access nodes of the one or more first areas, and wherein the decision circuit is configured to control the radio activity while traveling on the predicted route according to the one or more first areas and the one or more second areas by selecting a serving network access node from the one or more first network access nodes based on the predicted radio conditions of the one or more first network access nodes.

In Example 1391, the subject matter of Example 1381 can optionally include wherein the decision circuit is configured to select the serving network access node from the one or more first network access nodes based on the predicted radio conditions of the one or more first network access nodes by selecting a network access node from the one or more first network access nodes that has a highest signal strength or signal quality measurement of the predicted radio conditions as the serving network access node.

In Example 1392, the subject matter of Example 1381 can optionally include wherein the predicted radio conditions indicate a network identity or a radio access technology type of one or more first network access nodes of the one or more first areas, and wherein the decision circuit is configured to control the radio activity while traveling on the predicted route according to the one or more first areas and the one or more second areas by selecting a network access node from the one or more first network access nodes based on the network identity and the radio access technology type of the one or more first network access nodes.

In Example 1393, the subject matter of Example 1381 can optionally include wherein the predicted radio conditions indicate predicted radio conditions of one or more first network access nodes of the one or more first areas and predicted radio conditions of one or more second network access nodes of the one or more second areas, and wherein the decision circuit is configured to control the radio activity while traveling on the predicted route according to the one or more first areas and the one or more second areas includes selecting a first serving access node from the one or more first network access nodes while traveling in the one or more first areas based on the predicted radio conditions, and selecting a second serving access node from the one or more second network access nodes while traveling in the one or more second areas based on the predicted radio conditions.

In Example 1394, the subject matter of any one of Examples 1376 to 1393 can optionally further include a repository database configured to receive the context information from the preprocessing circuit and to store the context information as stored context information, wherein the learning circuit is configured to determine the predicted user movement based on the context information related to the user location to obtain the predicted route by learning one or more regular user travel routes based on past location information of stored context information, detecting that a user is currently traveling on a first regular user travel route of the one or more regular user travel routes based on a match between current location information of the context information and the past location information of the stored context information, and determining the first regular user travel route as the predicted route.

In Example 1395, the subject matter of any one of Examples to 1393, can optionally include the learning circuit is configured to determine the predicted user movement based on the context information related to the user location to obtain the predicted route by identifying from current or recent location information of the context information that a user is currently traveling on a known travel route, and determining the known travel route as the predicted route.

In Example 1396, the subject matter of any one of Examples 1376 to 1393 can optionally include wherein the learning circuit is configured to determine the predicted user movement based on the context information related to the user location to obtain the predicted route by detecting that a user has indicated a planned route in an application program of a terminal device, and determining the planned route as the predicted route.

In Example 1397, the subject matter of Example 1396 can optionally include wherein the learning circuit is configured to detect that the user has indicated the planned route in the application program of the terminal device by determining that a user has entered a navigation route into a navigation application program, determining that a user has planned a trip or vacation in a travel application program, or determining that a user has scheduled an event in a schedule application program.

In Example 1398, the subject matter of any one of Examples 1376 to 1397 can optionally further include wherein the preprocessing circuit is further configured to obtain radio condition information at one or more user locations prior to the learning circuit determining the predicted radio conditions, wherein the learning circuit is configured to determine the predicted radio conditions along the predicted route includes identifying a subset of the one or more user locations that are along the predicted route, and determining the predicted radio conditions based on the radio condition information measured at the subset of the one or more user locations.

In Example 1399, the subject matter of any one of Examples 1376 to 1397 can optionally include wherein the learning circuit is configured to determine the predicted radio conditions along the predicted route by generating a Radio Environment Map (REM), and obtaining the predicted radio conditions from the REM based on locations of the REM along the predicted route.

In Example 1400, the subject matter of any one of Examples 1376 to 1397 can optionally include wherein the learning circuit is configured to determine the predicted radio conditions along the predicted route by receiving a message from an external server that indicates the predicted radio conditions.

In Example 1401, the subject matter of Example 1400 can optionally include wherein the message comprises the predicted radio conditions.

In Example 1402, the subject matter of Example 1400 can optionally include wherein the message comprises radio conditions at one or more locations along the predicted route, and wherein the learning circuit is configured to determine the predicted radio conditions along the predicted route further by determining the predicted radio conditions based on the radio conditions at the one or more locations along the predicted route.

In Example 1403, the subject matter of any one of Examples 1400 to 1402 can optionally include wherein the message comprises crowdsourced data related to radio conditions.

In Example 1404, the subject matter of any one of Examples 1400 to 1403 can optionally include wherein the external server is a Radio Environment Map (REM) server.

Example 1405 is a circuit arrangement including a preprocessing circuit configured to process context information related to a user location to obtain processed context information, a repository database configured to store the processed context information as stored context information, a learning circuit configured to evaluate the processed context information or the stored context information to determine a predicted user travel route and further configured to determine predicted radio conditions at different locations on the predicted user travel route, and a decision circuit configured to control radio activity while the user is traveling on the predicted user travel route based on the predicted radio conditions.

In Example 1406, the subject matter of Example 1405 can optionally be configured as a terminal device and further including an antenna and a radio transceiver.

In Example 1407, the subject matter of Example 1405 or 1406 can optionally include wherein the preprocessing circuit, the repository database, the learning circuit, and the decision circuit are configured as part of an application processor.

In Example 1408, the subject matter of any one of Examples 1405 to 1407 can optionally include wherein the preprocessing circuit, the learning circuit, and the decision circuit are hardware-defined or software-defined circuitry.

In Example 1409, the subject matter of any one of Examples 1405 to 1408 can optionally include wherein the decision circuit is configured to control radio activity while the user is traveling on the predicted user travel route based on the predicted radio conditions by identifying one or more areas along the predicted user travel route that the predicted radio conditions indicate have poor radio coverage, and suspending cell scans while traveling in the one or more areas.

In Example 1410, the subject matter of any one of Examples 1405 to 1408 can optionally include wherein the decision circuit is configured to control radio activity while the user is traveling on the predicted user travel route based on the predicted radio conditions by identifying one or first more areas the predicted user travel route that the predicted radio conditions indicate have poor radio coverage and identifying one or more second areas on the predicted user travel route that the predicted radio conditions indicate have strong radio coverage, and delaying data transfer during travel in the one or more first areas until the one or more second areas is reached.

In Example 1411, the subject matter of any one of Examples 1405 to 1408 can optionally include wherein the predicted radio conditions indicate expected available network access nodes on the predicted travel route, and wherein the decision circuit is configured to control radio activity while the user is traveling on the predicted user travel route based on the predicted radio conditions by selecting a serving network access node from the expected available network access nodes while traveling on the predicted user travel route using the predicted radio conditions.

In Example 1412, the subject matter of Example 1411 can optionally include wherein the decision circuit is further configured to trigger a cell search for the serving network access node at a baseband modem.

In Example 1413, the subject matter of any one of Examples 1405 to 1412 can optionally include wherein the learning circuit is configured to evaluate the processed context information or the stored context information to determine the predicted user travel route by identifying one or more regularly traveled user routes based on the stored context information, detecting that a user is traveling on a first route of the one or more regularly traveled routes based on a match between user locations of the processed context information and user locations of the stored context information related to the first route, and determining the first route as the predicted user travel route.

In Example 1414, the subject matter of any one of Examples 1405 to 1412 can optionally include wherein the processed context information indicates that a user has planned a route in an application program, and wherein the learning circuit is configured to evaluate the processed context information or the stored context information to determine the predicted user travel route by determining that the user has entered a navigation route into a navigation application program, determining that the user has planned a trip or vacation in a travel application program, or determining that the user has scheduled an event in a schedule application program.

In Example 1415, the subject matter of any one of Examples 1405 to 1414 can optionally include wherein the stored context information indicates radio measurements at one or more user locations, and wherein the learning circuit is configured to determine predicted radio conditions at different locations on the predicted user travel route by identifying a subset of the one or more user locations that are along the predicted route, and determining the predicted radio conditions based on the radio measurements at the subset of the one or more user locations.

In Example 1416, the subject matter of any one of Examples 1405 to 1415 can optionally include wherein the learning circuit is configured to determine the predicted radio conditions at different locations on the predicted user travel route by receiving a message from an external server that indicates the predicted radio conditions.

In Example 1417, the subject matter of Example 1416 can optionally include wherein the message comprises the predicted radio conditions.

In Example 1418, the subject matter of Example 1416 can optionally include wherein the message comprises radio conditions at the different locations on the predicted user travel route, and wherein the learning circuit is configured to determine the predicted radio conditions at the different locations on the predicted user travel route by determining the predicted radio conditions based on the radio conditions at the different locations on the predicted user travel route.

In Example 1419, the subject matter of any one of Examples 1416 to 1418 can optionally include wherein the message comprises crowdsourced data related to radio conditions.

Example 1420 is a device including means for determining a predicted user movement based on context information related to a user location to obtain a predicted route, means for determining the predicted radio conditions along the predicted route, means for reporting the predicted route to a network access node and means for receiving predicted network conditions from the network access node, and means for controlling radio activity while traveling on the predicted route based on the predicted network conditions and the predicted radio conditions.

Example 1421 is a method of performing radio communications, the method including determining a predicted user movement based on context information related to a user location to obtain a predicted route, determining the predicted radio conditions along the predicted route, reporting the predicted route to a network access node and receiving predicted network conditions from the network access node, and controlling radio activity while traveling on the predicted route based on the predicted network conditions and the predicted radio conditions.

In Example 1422, the subject matter of Example 1421 can optionally include wherein the predicted radio conditions indicate one or more of predicted signal strength, predicted signal quality, or predicted interference for one or more network access nodes along the predicted route.

In Example 1423, the subject matter of Example 1421 or 1422 can optionally include wherein the predicted network conditions indicate one or more of predicted latency, predicted congestion, predicted transport layer disconnection duration, or predicted network load of one or more network access nodes along the predicted route.

In Example 1424, the subject matter of Example 1422 or 1423 can optionally include wherein controlling radio activity while traveling on the predicted route based on the predicted network conditions and the predicted radio conditions includes selecting a serving network access node from the one or more network access nodes while traveling on the predicted user route based on the predicted radio conditions and the predicted network conditions.

In Example 1425, the subject matter of any one of Examples 1421 to 1423 can optionally include wherein controlling radio activity while traveling on the predicted route based on the predicted network conditions and the predicted radio conditions includes identifying one or more first areas on the predicted route that have stronger predicted radio conditions or stronger predicted network conditions than one or more second areas on the predicted route, and scheduling data transfer to occur in the one or more first areas while traveling on the predicted route.

In Example 1426, the subject matter of any one of Examples 1421 to 1425 can optionally further include prior to determining the predicted radio conditions, monitoring radio measurements at one or more user locations, wherein determining the predicted radio conditions along the predicted route includes determining the predicted radio conditions based on radio measurements at a subset of the one or more user locations that are along the predicted route.

In Example 1427, the subject matter of any one of Examples 1421 to 1425 can optionally include wherein determining the predicted radio conditions along the predicted route includes receiving the predicted radio conditions from an external server.

In Example 1428, the subject matter of Example 1426 or 1427 can optionally include wherein the predicted radio conditions are part of a Radio Environment Map (REM).

In Example 1429, the subject matter of any one of Examples 1421 to 1428 can optionally include wherein reporting the predicted route to the network access node and receiving the predicted network conditions from the network access node includes reporting the predicted route to the network access node and receiving the predicted network conditions from the network access node via a cloud computing architecture.

In Example 1430, the subject matter of any one of Examples 1421 to 1428 can optionally include wherein at least one of determining the predicted user movement to obtain the predicted route or determining the predicted radio conditions along the predicted route includes utilizing a cloud computing architecture to perform obtain the predicted route or to determine the predicted radio conditions.

In Example 1431, the subject matter of any one of Examples 1421 to 1430 can optionally include wherein determining the predicted user movement based on the context information to obtain the predicted route includes learning one or more regular user travel routes based on past location information of context information, detecting that a user is currently traveling on a first regular user travel route of the one or more regular user travel routes based on a match between current location information of the context information and the past location information of the context information, and determining the first regular user travel route as the predicted route.

In Example 1432, the subject matter of any one of Examples 1421 to 1430 can optionally include wherein determining the predicted user movement based on the context information to obtain the predicted route includes identifying from current or recent location information of the context information that a user is currently traveling on a known travel route, and determining the known travel route as the predicted route.

In Example 1433, the subject matter of any one of Examples 1421 to 1430 can optionally include wherein determining the predicted user movement based on the context information to obtain the predicted route includes detecting that a user has indicated a planned route in an application program of a terminal device, and determining the planned route as the predicted route.

In Example 1434, the subject matter of Example 1433 can optionally include wherein detecting that the user has indicated the planned route in the application program of the terminal device includes determining that a user has entered a navigation route into a navigation application program, determining that a user has planned a trip or vacation in a travel application program, or determining that a user has scheduled an event in a schedule application program.

Example 1435 is a terminal device configured to perform the method of any one of Examples 1421 to 1434.

Example 1436 is a non-transitory computer readable medium storing instructions that when executed by a controller of a terminal device cause the terminal device to perform the method of any one of Examples 1421 to 1434.

Example 1437 is a non-transitory computer readable medium storing instructions that when executed by a processor cause the processor to perform the method of any one of Examples 1421 to 1434.

Example 1438 is a circuit arrangement configured to perform the method of any one of Examples 1421 to 1434.

Example 1439 is a non-transitory computer readable medium storing instructions that when executed by a processor of a terminal device cause the terminal device to perform a method including determining a predicted user movement based on context information related to a user location to obtain a predicted route, determining the predicted radio conditions along the predicted route, reporting the predicted route to a network access node and receiving predicted network conditions from the network access node, controlling radio activity while traveling on the predicted route based on the predicted network conditions and the predicted radio conditions.

In Example 1440, the subject matter of Example 1439 can optionally include wherein the predicted radio conditions indicate one or more of predicted signal strength, predicted signal quality, or predicted interference for one or more network access nodes along the predicted route.

In Example 1441, the subject matter of Example 1439 or 1440 can optionally include wherein the predicted network conditions indicate one or more of predicted latency, predicted congestion, predicted transport layer disconnection duration, or predicted network load of one or more network access nodes along the predicted route.

In Example 1442, the subject matter of Example 1440 or 1441 can optionally include wherein controlling radio activity while traveling on the predicted route based on the predicted network conditions and the predicted radio conditions includes selecting serving network access nodes from the one or more network access nodes while traveling on the predicted user route based on the predicted radio conditions and the predicted network conditions.

In Example 1443, the subject matter of any one of Examples 1439 to 1442 can optionally include wherein controlling radio activity while traveling on the predicted route based on the predicted network conditions and the predicted radio conditions includes identifying one or more first areas on the predicted route that have stronger predicted radio conditions or stronger predicted network conditions than one or more second areas on the predicted route, and scheduling data transfer to occur in the one or more first areas while traveling on the predicted route.

In Example 1444, the subject matter of any one of Examples 1439 to 1443 can optionally include the method further including prior to determining the predicted radio conditions, monitoring radio measurements at one or more user locations, wherein determining the predicted radio conditions along the predicted route includes determining the predicted radio conditions based on radio measurements at a subset of the one or more user locations that are along the predicted route.

In Example 1445, the subject matter of any one of Examples 1439 to 1443 can optionally include wherein determining the predicted radio conditions along the predicted route includes receiving the predicted radio conditions from an external server.

In Example 1446, the subject matter of Example 1444 or 1445 can optionally include wherein the predicted radio conditions are part of a Radio Environment Map (REM).

In Example 1447, the subject matter of any one of Examples 1439 to 1446 can optionally include wherein reporting the predicted route to the network access node and receiving the predicted network conditions from the network access node includes reporting the predicted route to the network access node and receiving the predicted network conditions from the network access node via a cloud computing architecture.

In Example 1448, the subject matter of any one of Examples 1439 to 1446 can optionally include wherein at least one of determining the predicted user movement to obtain the predicted route or determining the predicted radio conditions along the predicted route includes utilizing a cloud computing architecture to obtain the predicted route or to determine the predicted radio conditions.

In Example 1449, the subject matter of any one of Examples 1439 to 1448 can optionally include wherein determining the predicted user movement based on the context information to obtain the predicted route includes learning one or more regular user travel routes based on past location information of context information, detecting that a user is currently traveling on a first regular user travel route of the one or more regular user travel routes based on a match between current location information of the context information and the past location information of the context information, and determining the first regular user travel route as the predicted route.

In Example 1450, the subject matter of any one of Examples 1439 to 1448 can optionally include wherein determining the predicted user movement based on the context information to obtain the predicted route includes identifying from current or recent location information of the context information that a user is currently traveling on a known travel route, and determining the known travel route as the predicted route.

In Example 1451, the subject matter of any one of Examples 1439 to 1448 can optionally include wherein determining the predicted user movement based on the context information to obtain the predicted route includes detecting that a user has indicated a planned route in an application program of a terminal device, and determining the planned route as the predicted route.

In Example 1452, the subject matter of Example 1451 can optionally include wherein detecting that the user has indicated the planned route in the application program of the terminal device includes determining that a user has entered a navigation route into a navigation application program, determining that a user has planned a trip or vacation in a travel application program, or determining that a user has scheduled an event in a schedule application program.

Example 1453 is a device including means for receiving a plurality of predicted routes and a plurality of predicted data service requirements from a plurality of terminal devices, means for collectively evaluating the plurality of predicted routes and the plurality of predicted data service requirements to obtain predicted network conditions, and means for controlling communication activity for the plurality of terminal devices based on the predicted network conditions.

Example 1454 is a method of performing radio communications, the method including receiving a plurality of predicted routes and a plurality of predicted data service requirements from a plurality of terminal devices, collectively evaluating the plurality of predicted routes and the plurality of predicted data service requirements to obtain predicted network conditions, and controlling communication activity for the plurality of terminal devices based on the predicted network conditions.

In Example 1455, the subject matter of Example 1454 can optionally include wherein controlling communication activity for the plurality of terminal devices includes performing a spectrum allocation or a resource allocation for the plurality of terminal devices based on the predicted network conditions.

In Example 1456, the subject matter of Example 1454 can optionally include wherein controlling communication activity for the plurality of terminal devices includes adjusting spectrum pricing or spectrum leasing based on the predicted network conditions.

In Example 1457, the subject matter of Example 1454 can optionally include wherein controlling communication activity for the plurality of terminal devices includes performing handovers for the plurality of terminal devices based on the predicted network conditions.

In Example 1458, the subject matter of Example 1454 can optionally include wherein controlling communication activity for the plurality of terminal devices includes performing handovers for the plurality of terminal devices based on the predicted network conditions.

In Example 1459, the subject matter of any one of Examples 1454 to 1458 can optionally include wherein collectively evaluating the plurality of predicted routes and the plurality of predicted data service requirements to obtain the predicted network conditions includes identifying one or more of the plurality of terminal devices that have predicted routes that run through a coverage area of one or more network access nodes, and estimating demand on the one or more network access nodes based on the predicted data service requirements of the one or more of the plurality of terminal devices.

In Example 1460, the subject matter of any one of Examples 1454 to 1459 can optionally include wherein receiving the plurality of predicted routes and the plurality of predicted data service requirements from the plurality of terminal devices includes receiving the plurality of predicted routes and the plurality of predicted data service requirements from the plurality of terminal devices via a cloud computing architecture.

In Example 1461, the subject matter of any one of Examples 1454 to 1460 can optionally further include determining preliminary predicted network conditions based on locally observed network information, wherein collectively evaluating the plurality of predicted routes and the plurality of predicted data service requirements to obtain the predicted network conditions includes updating the preliminary predicted network conditions based on the plurality of predicted routes and the plurality of predicted data service requirements to obtain the predicted network conditions.

Example 1462 is a network access node configured to perform the method of any one of Examples 1454 to 1461.

Example 1463A cloud server configured to perform the method of any one of Examples 1454 to 1461

Example 1464 is a non-transitory computer readable medium storing instructions that when executed by a controller of a network access node cause the network access node to perform the method of any one of Examples 1454 to 1461.

Example 1465 is a non-transitory computer readable medium storing instructions that when executed by a processor cause the processor to perform the method of any one of Examples 1454 to 1461.

Example 1466 is a circuit arrangement configured to perform the method of any one of Examples 1450 to 1461.

Example 1467 is a communication device including a prediction module configured to receive a plurality of predicted routes and plurality of predicted data service requirements from a plurality of terminal devices and further configured to collectively evaluate the plurality of predicted routes and the plurality of predicted data service requirements to obtain predicted network conditions, and a decision module configured to control communication activity for the plurality of terminal devices based on the predicted network conditions.

In Example 1468, the subject matter of Example 1467 can optionally further include an antenna and a radio transceiver and configured as a network access node.

In Example 1469, the subject matter of Example 1467 can optionally be configured as a cloud computing infrastructure.

In Example 1470, the subject matter of any one of Examples 1467 to 1469 can optionally include wherein the decision module is configured to control communication activity for the plurality of terminal devices by performing a spectrum allocation or a resource allocation for the plurality of terminal devices based on the predicted network conditions.

In Example 1471, the subject matter of any one of Examples 1467 to 1469 can optionally include wherein the decision module is configured to control communication activity for the plurality of terminal devices by adjusting spectrum pricing or spectrum leasing based on the predicted network conditions.

In Example 1472, the subject matter of any one of Examples 1467 to 1469 can optionally include wherein the decision module is configured to control communication activity for the plurality of terminal devices by performing handovers for the plurality of terminal devices based on the predicted network conditions.

In Example 1473, the subject matter of any one of Examples 1467 to 1472 can optionally include wherein the predicted network conditions indicate one or more of predicted latency, predicted congestion, predicted transport layer disconnection duration, or predicted network load of one or more network access nodes.

In Example 1474, the subject matter of any one of Examples 1467 to 1473 can optionally include wherein the learning module is configured to collectively evaluate the plurality of predicted routes and the plurality of predicted data service requirements to obtain the predicted network conditions by identifying one or more of the plurality of terminal devices that have predicted routes that run through a coverage area of one or more network access nodes, and estimating demand on the one or more network access nodes based on the predicted data service requirements of the one or more of the plurality of terminal devices.

In Example 1475, the subject matter of any one of Examples 1467 to 1474 can optionally include wherein the learning module is configured to receive the plurality of predicted routes and the plurality of predicted data service requirements from the plurality of terminal devices by receiving the plurality of predicted routes and the plurality of predicted data service requirements from the plurality of terminal devices via a cloud computing architecture.

In Example 1476, the subject matter of any one of Examples 1467 to 1475 can optionally include wherein the learning module is further configured to determine preliminary predicted network conditions based on locally observed network information, and wherein the learning module is configured to collectively evaluate the plurality of predicted routes and the plurality of predicted data service requirements to obtain the predicted network conditions by updating the preliminary predicted network conditions based on the plurality of predicted routes and the plurality of predicted data service requirements to obtain the predicted network conditions.

Example 1477 is a non-transitory computer readable medium storing instructions that when executed by a processor cause the processor to perform a method including receiving a plurality of predicted routes and a plurality of predicted data service requirements from a plurality of terminal devices, collectively evaluating the plurality of predicted routes and the plurality of predicted data service requirements to obtain predicted network conditions, and controlling communication activity for the plurality of terminal devices based on the predicted network conditions.

In Example 1478, the subject matter of Example 1477 can optionally include wherein controlling communication activity for the plurality of terminal devices includes performing a spectrum allocation or a resource allocation for the plurality of terminal devices based on the predicted network conditions.

In Example 1479, the subject matter of Example 1477 can optionally include wherein controlling communication activity for the plurality of terminal devices includes adjusting spectrum pricing or spectrum leasing based on the predicted network conditions.

In Example 1480, the subject matter of Example 1477 can optionally include wherein controlling communication activity for the plurality of terminal devices includes performing handovers for the plurality of terminal devices based on the predicted network conditions.

In Example 1481, the subject matter of Example 1477 can optionally include wherein controlling communication activity for the plurality of terminal devices includes performing handovers for the plurality of terminal devices based on the predicted network conditions.

In Example 1482, the subject matter of any one of Examples 1477 to 1481, wherein collectively evaluating the plurality of predicted routes and the plurality of predicted data service requirements to obtain the predicted network conditions includes identifying one or more of the plurality of terminal devices that have predicted routes that run through a coverage area of one or more network access nodes, and estimating demand on the one or more network access nodes based on the predicted data service requirements of the one or more of the plurality of terminal devices.

In Example 1483, the subject matter of any one of Examples 1477 to 1482 can optionally include wherein receiving the plurality of predicted routes and the plurality of predicted data service requirements from the plurality of terminal devices includes receiving the plurality of predicted routes and the plurality of predicted data service requirements from the plurality of terminal devices via a cloud computing architecture.

In Example 1484, the subject matter of any one of Examples 1477 to 1483 can optionally include the method further including determining preliminary predicted network conditions based on locally observed network information, wherein collectively evaluating the plurality of predicted routes and the plurality of predicted data service requirements to obtain the predicted network conditions includes updating the preliminary predicted network conditions based on the plurality of predicted routes and the plurality of predicted data service requirements to obtain the predicted network conditions.

Example 1485 is a non-transitory computer readable medium including instructions that when executed by processor cause the processor cause the processor to perform a method including receiving predicted network conditions from one or more network access nodes receiving predicted routes, predicted radio conditions, and predicted data service requirements from one or more terminal devices, aggregating the predicted network conditions, predicted routes, predicted radio conditions, and predicted data service requirements to obtain updated predicted network conditions for the one or more network access nodes and updated predicted radio conditions for the one or more terminal devices, and controlling radio activity between the one or more network access nodes and the one or more terminal devices based on the updated predicted network conditions and the updated predicted radio conditions.

In Example 1486, the subject matter of Example 1485 can optionally include wherein controlling radio activity between the one or more network access nodes and the one or more terminal devices based on the updated predicted network conditions and the updated predicted radio conditions includes performing a spectrum allocation or a resource allocation for the plurality of terminal devices based on the updated predicted network conditions.

In Example 1487, the subject matter of Example 1485 can optionally include wherein controlling radio activity between the one or more network access nodes and the one or more terminal devices based on the updated predicted network conditions and the updated predicted radio conditions includes adjusting spectrum pricing or spectrum leasing based on the predicted network conditions.

In Example 1488, the subject matter of Example 1485 can optionally include wherein controlling radio activity between the one or more network access nodes and the one or more terminal devices based on the updated predicted network conditions and the updated predicted radio conditions includes performing handovers for the plurality of terminal devices based on the predicted network conditions.

In Example 1489, the subject matter of Example 1485 can optionally include wherein controlling radio activity between the one or more network access nodes and the one or more terminal devices based on the updated predicted network conditions and the updated predicted radio conditions includes scheduling data transfer or cell scans for the one or more terminal devices based on the predicted network conditions.

In Example 1490, the subject matter of Example 1485 can optionally include wherein controlling radio activity between the one or more network access nodes and the one or more terminal devices based on the updated predicted network conditions and the updated predicted radio conditions includes selecting serving network access nodes for the one or more terminal devices based on the updated predicted radio conditions.

In Example 1491, the subject matter of any one of Examples 1485 to 1490 can optionally include wherein the updated predicted network conditions indicate one or more of predicted latency, predicted congestion, predicted transport layer disconnection duration, or predicted network load of one or more network access nodes.

In Example 1492, the subject matter of any one of Examples 1485 to 1491 can optionally include wherein the updated predicted radio conditions indicate one or more of predicted signal strength, predicted signal quality, or predicted interference for one or more network access nodes along the predicted route.

In Example 1493, the subject matter of any one of Examples 1485 to 1492 can optionally include the method further including generating a radio environment map (REM) with the updated predicted network conditions or the updated predicted radio conditions.

In Example 1494, the subject matter of any one of Examples 1485 to 1493 can optionally further include receiving a request from a network access node of the one or more network access nodes for network condition information, and providing the updated predicted network conditions to the network access node.

In Example 1495, the subject matter of any one of Examples 1485 to 1493 can optionally further include receiving a request from a terminal device of the one or more terminal devices for radio condition information, and providing the updated predicted radio conditions to the terminal device.

Example 1496 is a circuit arrangement including a prediction circuit configured to receive a plurality of predicted routes and plurality of predicted data service requirements from a plurality of terminal devices and further configured to collectively evaluate the plurality of predicted routes and the plurality of predicted data service requirements to obtain predicted network conditions, and a decision circuit configured to control communication activity for the plurality of terminal devices based on the predicted network conditions.

In Example 1497, the subject matter of Example 1496 can optionally further include an antenna and radio communication circuitry and configured as a network access node.

In Example 1498, the subject matter of Example 1496 or 1497 can optionally include wherein the prediction circuit and the decision circuit are configured as software-defined circuitry or hardware-defined circuitry.

In Example 1499, the subject matter of Example 1496 can optionally be configured as a cloud computing infrastructure.

In Example 1500, the subject matter of any one of Examples 1496 to 1499 can optionally include wherein the decision circuit is configured to control communication activity for the plurality of terminal devices by performing a spectrum allocation or a resource allocation for the plurality of terminal devices based on the predicted network conditions.

In Example 1501, the subject matter of any one of Examples 1496 to 1499 can optionally include wherein the decision circuit is configured to control communication activity for the plurality of terminal devices by adjusting spectrum pricing or spectrum leasing based on the predicted network conditions.

In Example 1502, the subject matter of any one of Examples 1496 to 1499 can optionally include wherein the decision circuit is configured to control communication activity for the plurality of terminal devices by performing handovers for the plurality of terminal devices based on the predicted network conditions.

In Example 1503, the subject matter of any one of Examples 1496 to 1502 can optionally include wherein the predicted network conditions indicate one or more of predicted latency, predicted congestion, predicted transport layer disconnection duration, or predicted network load of one or more network access nodes.

In Example 1504, the subject matter of any one of Examples 1496 to 1503 can optionally include wherein the learning circuit is configured to collectively evaluate the plurality of predicted routes and the plurality of predicted data service requirements to obtain the predicted network conditions by identifying one or more of the plurality of terminal devices that have predicted routes that run through a coverage area of one or more network access nodes, and estimating demand on the one or more network access nodes based on the predicted data service requirements of the one or more of the plurality of terminal devices.

In Example 1505, the subject matter of any one of Examples 1496 to 1504 can optionally include wherein the learning circuit is configured to receive the plurality of predicted routes and the plurality of predicted data service requirements from the plurality of terminal devices by receiving the plurality of predicted routes and the plurality of predicted data service requirements from the plurality of terminal devices via a cloud computing architecture.

In Example 1506, the subject matter of any one of Examples 1496 to 1505 can optionally include wherein the learning circuit is further configured to determine preliminary predicted network conditions based on locally observed network information, and wherein the learning circuit is configured to collectively evaluate the plurality of predicted routes and the plurality of predicted data service requirements to obtain the predicted network conditions by updating the preliminary predicted network conditions based on the plurality of predicted routes and the plurality of predicted data service requirements to obtain the predicted network conditions.

Example 1507 is a device for managing a wireless multi-hop network, the device including means for receiving radio measurements from one or more nodes of the wireless multi-hop network, means for evaluating the radio measurements to estimate operating conditions of the wireless mesh network related to network density or transmission contention, and means for adjusting a configuration of the wireless multi-hop network based on a contention level of the wireless multi-hop network indicated by the operating conditions.

Example 1508 is a method of managing a wireless multi-hop network, the method including receiving radio measurements from one or more nodes of the wireless multi-hop network, evaluating the radio measurements to estimate operating conditions of the wireless mesh network related to network density or transmission contention, and adjusting a configuration of the wireless multi-hop network based on a contention level of the wireless multi-hop network indicated by the operating conditions.

In Example 1509, the subject matter of Example 1508 can optionally include wherein the one or more nodes are Internet of Things (IoT) nodes.

In Example 1510, the subject matter of Example 1508 or 1509 can optionally include wherein the radio measurements include one or more of received frame count measurements, neighbor count measurements, signal strength measurements, or channel activity measurements.

In Example 1511, the subject matter of Example 1510 can optionally include wherein evaluating the radio measurements to estimate the operating conditions of the wireless multi-hop network related to network density or transmission contention includes interpreting high received frame count measurements as indicating high network density or high transmission contention, interpreting high neighbor count measurements as indicating high network density or high transmission contention, estimating high signal strength measurements as indicating high network density or high transmission contention, or estimating a high frequency of busy channel activity measurements as indicating high network density or high transmission contention.

In Example 1512, the subject matter of Example 1510 can optionally include wherein the channel activity measurements are Clear Channel Assessment (CCA) measurements.

In Example 1513, the subject matter of Example 1510 can optionally include wherein the signal strength measurements are Received Signal Strength Indicator (RSSI) measurements.

In Example 1514, the subject matter of any one of Examples 1508 to 1513 can optionally include wherein adjusting the configuration of the wireless multi-hop network based on the contention level of the wireless multi-hop network indicated by the operating conditions includes determining that the operating conditions indicate a contention level that exceeds a predefined threshold, and adjusting one or more scheduling or contention parameters of the wireless multi-hop network to reduce the contention level.

In Example 1515, the subject matter of Example 1514 can optionally include wherein adjusting the one or more scheduling or contention parameters of the wireless multi-hop network to reduce the contention level includes adjusting listen before talk parameters of the one or more nodes, adjusting transmission wait times of the one or more nodes, adjusting transmission schedules of the one or more nodes, or adjusting physical (PHY) layer or media access control (MAC) layer parameters of the one or more nodes.

In Example 1516, the subject matter of any one of Examples 1508 to 1513 can optionally include wherein adjusting the configuration of the wireless multi-hop network based on the contention level of the wireless multi-hop network indicated by the operating conditions includes adjusting power consumption parameters of the one or more nodes according to the contention level.

In Example 1517, the subject matter of Example 1516 can optionally include wherein adjusting the power consumption parameters of the one or more nodes according to the contention level includes adjusting a duty cycling parameter of the one or more nodes to reduce power consumption at the one or more nodes in high contention conditions.

In Example 1518, the subject matter of any one of Examples 1508 to 1513 can optionally include wherein adjusting the configuration of the wireless multi-hop network based on the contention level of the wireless multi-hop network indicated by the operating conditions includes adjusting which of the one or more nodes are connected to the wireless multi-hop network or adjusting routing configurations of the one or more nodes.

In Example 1519, the subject matter of any one of Examples 1508 to 1518 can optionally include wherein receiving the radio measurements from the one or more nodes of the wireless multi-hop network includes receiving at least one of the radio measurements from a first node of the one or more nodes with an association request from the first node prior to permitting the first node to connect to the wireless multi-hop network.

In Example 1520, the subject matter of Example 1519 can optionally further include verifying whether the first node is authorized to join the wireless multi-hop network, and accepting the radio measurement if the first node is authorized to join the wireless multi-hop network.

In Example 1521, the subject matter of any one of Examples 1508 to 1520 can optionally include wherein receiving the radio measurements from the one or more nodes of the wireless multi-hop network includes receiving at least one of the radio measurements from a second node of the one or more nodes after the second node has connected to the wireless multi-hop network.

In Example 1522, the subject matter of any one of Examples 1508 to 1520 can optionally include wherein receiving the radio measurements from the one or more nodes of the wireless multi-hop network includes receiving at least one of the radio measurements from a second node of the one or more nodes as piggybacked data on a data packet.

In Example 1523, the subject matter of any one of Examples 1508 to 1522 can optionally include wherein the wireless multi-hop network is a non-3$^{rd}$ Generation Partnership Project (3GPP) network, the method further including receiving data packets from the one or more nodes on the wireless multi-hop network, and routing the data packets to a 4GPP network.

In Example 1524, the subject matter of Example 1523 can optionally include wherein receiving the data packets from the one or more nodes on the wireless multi-hop network includes receiving the data packets from the one or more nodes with a non-3GPP radio interface, and wherein routing the data packets to the 4GPP network includes routing the data packets to the 4GPP network with a 4GPP radio interface.

In Example 1525, the subject matter of Example 1523 can optionally further include uploading the radio measurements to a database via a management interface server that interfaces between the 4GPP network and another network, receiving a configuration change instruction from a managing device via the management interface server, and reconfiguring the wireless multi-hop network according to the configuration change instruction.

In Example 1526, the subject matter of Example 1523 can optionally further include uploading current configuration information for the wireless multi-hop network to a database via a management interface server that interfaces between the 4GPP network and another network, receiving a configuration change instruction from a managing device via the management interface server, and reconfiguring the wireless multi-hop network according to the configuration change instruction.

Example 1527 is A gateway device for managing a wireless multi-hop network including a modem, a radio transceiver, and one or more antennas and configured to perform the method of any one of Examples 1508 to 1526.

Example 1528 is a communication circuit arrangement configured to perform the method of any one of Examples 1508 to 1526.

Example 1529 is a non-transitory computer readable medium storing instructions that when executed by a processor of a gateway device cause the gateway device to perform the method of any one of Examples 1508 to 1526.

Example 1530 is a gateway device for managing a wireless multi-hop network, the gateway device including a radio and antenna module configured to receive radio measurements from one or more nodes of the wireless multi-hop network, and a control module configured to evaluate the radio measurements to estimate operating conditions of the wireless multi-hop network related to network density or transmission contention and to adjust a configuration of the wireless multi-hop network based on a contention level of the wireless multi-hop network indicated by the operating conditions.

In Example 1531, the subject matter of Example 1530 can optionally be configured as a coordinator node of the wireless multi-hop network.

In Example 1532, the subject matter of Example 1530 or 1531 can optionally include wherein the one or more nodes are Internet of Things (IoT) nodes.

In Example 1533, the subject matter of any one of Examples 1530 to 1532 can optionally include wherein the radio measurements include received frame count measurements, neighbor count measurements, signal strength measurements, channel activity measurements, channel access delay measurements, frame transmission delay measurements, packet or frame error rate measurements, or retransmission count measurements.

In Example 1534, the subject matter of Example 1533 can optionally include wherein the control module is configured to evaluate the radio measurements to estimate the operating conditions of the wireless multi-hop network related to network density or transmission contention by interpreting high received frame count measurements as indicating high network density or high transmission contention, interpreting high neighbor count measurements as indicating high network density or high transmission contention, estimating high signal strength measurements as indicating high network density or high transmission contention, or estimating a high frequency of busy channel activity measurements as indicating high network density or high transmission contention.

In Example 1535, the subject matter of Example 1533 can optionally include wherein the channel activity measurements are Clear Channel Assessment (CCA) measurements.

In Example 1536, the subject matter of Example 1532 can optionally include wherein the signal strength measurements are Received Signal Strength Indicator (RSSI) measurements.

In Example 1537, the subject matter of any one of Examples 1530 to 1536 can optionally include wherein the control module is configured to adjust the configuration of the wireless multi-hop network based on the contention level of the wireless multi-hop network indicated by the operating conditions by determining that the operating conditions indicate a contention level that exceeds a predefined threshold, and adjusting one or more scheduling or contention parameters of the wireless multi-hop network to reduce the contention level.

In Example 1538, the subject matter of Example 1537 can optionally include wherein the control module is configured to adjust the one or more scheduling or contention parameters of the wireless multi-hop network to reduce the contention level by adjusting listen before talk parameters of the one or more nodes, adjusting transmission wait times of the one or more nodes, adjusting transmission schedules of the one or more nodes, or adjusting physical (PHY) layer or media access control (MAC) layer parameters of the one or more nodes.

In Example 1539, the subject matter of any one of Examples 1530 to 1536 can optionally include wherein the control module is configured to adjust the configuration of the wireless multi-hop network based on the contention level of the wireless multi-hop network indicated by the operating conditions by adjusting power consumption parameters of the one or more nodes according to the contention level.

In Example 1540, the subject matter of Example 1539 can optionally include wherein the control module is configured to adjust the power consumption parameters of the one or more nodes according to the contention level by adjusting a duty cycling parameter of the one or more nodes to reduce power consumption at the one or more nodes in high contention conditions.

In Example 1541, the subject matter of any one of Examples 1530 to 1536 can optionally include wherein the control module is configured to adjust the configuration of the wireless multi-hop network based on the contention level of the wireless multi-hop network indicated by the operating conditions by adjusting which of the one or more nodes are connected to the wireless multi-hop network or adjusting routing configurations of the one or more nodes.

In Example 1542, the subject matter of any one of Examples 1530 to 1541 can optionally include wherein the radio and antenna module is configured to receive the radio measurements from the one or more nodes of the wireless multi-hop network by receiving at least one of the radio measurements from a first node of the one or more nodes with an association request from the first node prior to permitting the first node to connect to the wireless multi-hop network.

In Example 1543, the subject matter of Example 1542 can optionally include wherein the control module is further configured to verify whether the first node is authorized to join the wireless multi-hop network, and accept the radio measurement if the first node is authorized to join the wireless multi-hop network.

In Example 1544, the subject matter of any one of Examples 1530 to 1543 can optionally include wherein the radio and antenna module is configured to receive the radio measurements from the one or more nodes of the wireless multi-hop network by receiving at least one of the radio measurements from a second node of the one or more nodes after the second node has connected to the wireless multi-hop network.

In Example 1545, the subject matter of any one of Examples 1530 to 1543 can optionally include wherein the radio and antenna module is configured to receive the radio measurements from the one or more nodes of the wireless multi-hop network by receiving at least one of the radio measurements from a second node of the one or more nodes as piggybacked data on a data packet.

In Example 1546, the subject matter of any one of Examples 1530 to 1545 can optionally include wherein the wireless multi-hop network is a non-3$^{rd}$ Generation Partnership Project (3GPP) network, the radio and antenna module configured to receive data packets from the one or more nodes on the wireless multi-hop network, and the gateway device further including additional radio and antenna module configured to route the data packets to a 4GPP network.

In Example 1547, the subject matter of Example 1546 can optionally include wherein the radio and antenna module is configured to receive the data packets from the one or more nodes on the wireless multi-hop network by receiving the data packets from the one or more nodes with a non-3GPP radio interface, and wherein the additional radio and antenna module is configured to route the data packets to the 4GPP network includes routing the data packets to the 4GPP network with a 4GPP radio interface.

In Example 1548, the subject matter of Example 1546 can optionally include wherein the control module is further configured to upload the radio measurements to a database via a management interface server that interfaces between the 4GPP network and another network, receive a configuration change instruction from a managing device via the management interface server, and reconfigure the wireless multi-hop network according to the configuration change instruction.

In Example 1549, the subject matter of Example 1546 can optionally include wherein the control module is further configured to upload current configuration information for the wireless multi-hop network to a database via a management interface server that interfaces between the 4GPP network and another network, receive a configuration change instruction from a managing device via the management interface server, and reconfigure the wireless multi-hop network according to the configuration change instruction.

In Example 1550, the subject matter of any one of Examples 1530 to 1545 can optionally include wherein the wireless multi-hop network operates with a first radio access technology, the radio and antenna module configured to receive data packets from the one or more nodes on the wireless multi-hop network, and the gateway device further including additional radio and antenna module configured to route the data packets to a second network that operates with a second radio access technology different from the first radio access technology.

In Example 1551, the subject matter of Example 1550 can optionally include wherein the radio and antenna module is configured to receive the data packets from the one or more nodes on the wireless multi-hop network by receiving the data packets from the one or more nodes with a radio interface of the first radio access technology, and wherein the additional radio and antenna module is configured to route the data packets to the second network includes routing the data packets to the second network with a radio interface of the second radio access technology.

In Example 1552, the subject matter of Example 1551 can optionally include wherein the control module is further configured to upload the radio measurements to a database via a management interface server that interfaces between the 4GPP network and another network, receive a configuration change instruction from a managing device via the management interface server, and reconfigure the wireless multi-hop network according to the configuration change instruction.

In Example 1553, the subject matter of Example 1546 can optionally include wherein the control module is further configured to upload current configuration information for the wireless multi-hop network to a database via a management interface server that interfaces between the second network and a third network, receive a configuration change instruction from a managing device via the management interface server, and reconfigure the wireless multi-hop network according to the configuration change instruction.

Example 1554 is a device including means for initiating a measurement timer and performing a radio scan to identify proximate wireless networks and to obtain one or more radio measurements of the proximate wireless networks, means for, after the measurement timer expires, selecting a target wireless network based on the identified proximate wireless networks, and means for transmitting an association request to a coordinator node of the target wireless network that includes the one or more radio measurements.

Example 1555 is a method of performing radio communications, the method including initiating a measurement timer and performing a radio scan to identify proximate wireless networks and to obtain one or more radio measurements of the proximate wireless networks, after the measurement timer expires, selecting a target wireless network based on the identified proximate wireless networks, and transmitting an association request to a coordinator node of the target wireless network that includes the one or more radio measurements.

In Example 1556, the subject matter of Example 1555 can optionally include wherein the target wireless network is an Internet of Things (IoT) network.

In Example 1557, the subject matter of Example 1555 or 1556 can optionally include wherein performing the radio scan to obtain the one or more radio measurements of the proximate wireless network includes performing received frame count measurements, neighbor count measurements, signal strength measurements, channel activity measurements, channel access delay measurements, frame transmission delay measurements, packet or frame error rate measurements, or retransmission count measurements.

In Example 1558, the subject matter of any one of Examples 1555 to 1557 can optionally include wherein performing the radio scan to identify proximate wireless networks includes receiving data packets from one or more nodes of the target wireless network, and identifying the target network based on the data packets.

In Example 1559, the subject matter of any one of Examples 1555 to 1558 can optionally include wherein the coordinator node is a gateway device that provides an interface to a second wireless network, the method further including transmitting data packets to the coordinator node that are intended for the second wireless network.

In Example 1560, the subject matter of Example 1559 can optionally include wherein the target wireless network is a non-3$^{rd}$ Generation Partnership Project (3GPP) network and the second wireless network is a 4GPP network.

In Example 1561, the subject matter of Example 1559 can optionally include wherein the target wireless network and the second wireless network operate on different radio access technologies.

In Example 1562, the subject matter of Example one can optionally include Examples 1555 to 1560, further including after connecting to the target wireless network via the coordinator node, periodically performing radio measurements, and reporting the radio measurements to the coordinator node.

In Example 1563, the subject matter of Example 1562 can optionally include wherein reporting the radio measurements to the coordinator node includes piggybacking the radio measurements on data packets addressed to the coordinator node.

In Example 1564, the subject matter of Example 1562 can optionally include wherein reporting the radio measurements to the coordinator node includes transmitting a standalone measurement report that includes the radio measurements to the coordinator node.

In Example 1565, the subject matter of any one of Examples 1555 to 1564 can optionally further include receiving a configuration change from the coordinator node that specifies a scheduling or contention parameter adjustment, and transmitting or receiving data according to the scheduling or contention parameter adjustment.

Example 1566 is a terminal device configured to perform the method of any one of Examples 1555 to 1564.

Example 1567 is a circuit arrangement configured to perform the method of any one of Examples 1555 to 1564.

Example 1568 is a non-transitory computer readable medium storing instructions that when executed by a controller of a terminal device cause the terminal device to perform the method of any one of Examples 1555 to 1564.

Example 1569 is a communication device including a measurement module configured to perform a radio scan to identify proximate wireless networks and to obtain one or more radio measurements of the proximate wireless networks during a duration of a measurement timer, a control module configured to select a target wireless network based on the identified proximate wireless networks after the measurement timer expires and to transmit an association request to a coordinator node of the target wireless network that includes the one or more radio measurements In Example 1570, the subject matter of Example 1569 can optionally be configured as a terminal device and further including a radio transceiver and an antenna.

In Example 1571, the subject matter of Example 1569 or 1570 can optionally be configured to operate as an Internet of Things (IoT) node and wherein the target wireless network is an IoT network.

In Example 1572, the subject matter of any one of Examples 1569 to 1571 can optionally include wherein the measurement module is configured to perform the radio scan to obtain the one or more radio measurements of the proximate wireless network by performing one or more of received frame count measurements, neighbor count measurements, signal strength measurements, channel activity measurements, channel access delay measurements, frame transmission delay measurements, packet or frame error rate measurements, or retransmission count measurements.

In Example 1573, the subject matter of any one of Examples 1569 to 1572 can optionally include wherein the measurement module is configured to perform the radio scan to identify proximate wireless networks by receiving data packets from one or more nodes of the target wireless network, and identifying the target network based on the data packets.

In Example 1574, the subject matter of any one of Examples 1569 to 1573 can optionally include wherein the coordinator node is a gateway device that provides an interface to a second wireless network, the control module further configured to transmit data packets to the coordinator node that are intended for the second wireless network.

In Example 1575, the subject matter of Example 1574 can optionally include wherein the target wireless network is a non-3$^{rd}$ Generation Partnership Project (3GPP) network and the second wireless network is a 4GPP network.

In Example 1576, the subject matter of any one of Examples 1569 to 1575 can optionally include wherein the measurement module is further configured to periodically perform radio measurements after connecting to the target wireless network, and wherein the control module is configured to report the radio measurements to the coordinator node.

In Example 1577, the subject matter of Example 1576 can optionally include wherein the control module is configured to report the radio measurements to the coordinator node by piggybacking the radio measurements on data packets addressed to the coordinator node.

In Example 1578, the subject matter of Example 1576 can optionally include wherein the control module is configured to report the radio measurements to the coordinator node by transmitting a standalone measurement report that includes the radio measurements to the coordinator node.

In Example 1579, the subject matter of any one of Examples 1569 to 1578 can optionally include wherein the control module is further configured to receive a configuration change from the coordinator node that specifies a scheduling or contention parameter adjustment, and transmit or receive data according to the scheduling or contention parameter adjustment.

Example 1580 is a management interface server configured to operate as an interface between a first network and a second network, the management interface server further configured to execute program code to collect operating information from a gateway device of a wireless multi-hop network via the first network, receive a request for operating conditions of a wireless multi-hop network from a managing device operating on the second network, verify that the managing device is authorized to manage the wireless multi-hop network, and access a database to retrieve the requested operating information and providing the requested operating information to the gateway device via the second network.

In Example 1581, the subject matter of Example 1580 can optionally include wherein the first network is a 3$^{rd}$ Generation Partnership Project (3GPP) network and the second network is a non-3GPP network.

In Example 1582, the subject matter of Example 1580 or 1581 can optionally include wherein the management interface server is configured as an application programming interface (API) between the first network and the second network.

In Example 1583, the subject matter of Example one can optionally include Examples 1580 to 1582, wherein the wireless multi-hop network is an Internet of Things (IoT) network.

In Example 1584, the subject matter of any one of Examples 1580 to 1583 can optionally be further configured to receive a configuration change instruction from the managing device, and forward the configuration change instruction to the wireless multi-hop network via the first network.

In Example 1585, the subject matter of any one of Examples 1580 to 1584 can optionally include wherein the operating information is measurement information or configuration information of the wireless multi-hop network.

Example 1586 is a gateway device for managing a wireless multi-hop network, the gateway device including radio and antenna circuitry configured to receive radio measurements from one or more nodes of the wireless multi-hop network, and a control circuit configured to evaluate the radio measurements to estimate operating conditions of the wireless multi-hop network related to network density or transmission contention and to adjust a configuration of the wireless multi-hop network based on a contention level of the wireless multi-hop network indicated by the operating conditions.

In Example 1587, the subject matter of Example 1586 can optionally include wherein the control circuit is a processor configured to execute software-defined instructions that direct operation of the processor.

In Example 1588, the subject matter of Example 1586 or 1587 can optionally be configured as a coordinator node of the wireless multi-hop network.

In Example 1589, the subject matter of any one of Examples 1586 to 1588 can optionally include wherein the one or more nodes are Internet of Things (IoT) nodes.

In Example 1590, the subject matter of any one of Examples 1586 to 1589 can optionally include wherein the radio measurements include received frame count measurements, neighbor count measurements, signal strength measurements, channel activity measurements, channel access delay measurements, frame transmission delay measurements, packet or frame error rate measurements, or retransmission count measurements.

In Example 1591, the subject matter of Example 1590 can optionally include wherein the control circuit is configured to evaluate the radio measurements to estimate the operating conditions of the wireless multi-hop network related to network density or transmission contention by interpreting high received frame count measurements as indicating high network density or high transmission contention, interpreting high neighbor count measurements as indicating high network density or high transmission contention, estimating high signal strength measurements as indicating high network density or high transmission contention, or estimating a high frequency of busy channel activity measurements as indicating high network density or high transmission contention.

In Example 1592, the subject matter of Example 1590 can optionally include wherein the channel activity measurements are Clear Channel Assessment (CCA) measurements.

In Example 1593, the subject matter of Example 1589 can optionally include wherein the signal strength measurements are Received Signal Strength Indicator (RSSI) measurements.

In Example 1594, the subject matter of any one of Examples 1586 to 1593 can optionally include wherein the control circuit is configured to adjust the configuration of the wireless multi-hop network based on the contention level of the wireless multi-hop network indicated by the operating conditions by determining that the operating conditions indicate a contention level that exceeds a predefined threshold, and adjusting one or more scheduling or contention parameters of the wireless multi-hop network to reduce the contention level.

In Example 1595, the subject matter of Example 1594 can optionally include wherein the control circuit is configured to adjust the one or more scheduling or contention parameters of the wireless multi-hop network to reduce the contention level by adjusting listen before talk parameters of the one or more nodes, adjusting transmission wait times of the one or more nodes, adjusting transmission schedules of the one or more nodes, or adjusting physical (PHY) layer or media access control (MAC) layer parameters of the one or more nodes.

In Example 1596, the subject matter of any one of Examples 1586 to 1593 can optionally include wherein the control circuit is configured to adjust the configuration of the wireless multi-hop network based on the contention level of the wireless multi-hop network indicated by the operating conditions by adjusting power consumption parameters of the one or more nodes according to the contention level.

In Example 1597, the subject matter of Example 1596 can optionally include wherein the control circuit is configured to adjust the power consumption parameters of the one or more nodes according to the contention level by adjusting a duty cycling parameter of the one or more nodes to reduce power consumption at the one or more nodes in high contention conditions.

In Example 1598, the subject matter of any one of Examples 1586 to 1593 can optionally include wherein the control circuit is configured to adjust the configuration of the wireless multi-hop network based on the contention level of the wireless multi-hop network indicated by the operating conditions by adjusting which of the one or more nodes are connected to the wireless multi-hop network or adjusting routing configurations of the one or more nodes.

In Example 1599, the subject matter of any one of Examples 1586 to 1598 can optionally include wherein the radio and antenna circuitry is configured to receive the radio measurements from the one or more nodes of the wireless multi-hop network by receiving at least one of the radio measurements from a first node of the one or more nodes with an association request from the first node prior to permitting the first node to connect to the wireless multi-hop network.

In Example 1600, the subject matter of Example 1599 can optionally include wherein the control circuit is further configured to verify whether the first node is authorized to join the wireless multi-hop network, and accept the radio measurement if the first node is authorized to join the wireless multi-hop network.

In Example 1601, the subject matter of any one of Examples 1586 to 1600 can optionally include wherein the radio and antenna circuitry is configured to receive the radio measurements from the one or more nodes of the wireless multi-hop network by receiving at least one of the radio measurements from a second node of the one or more nodes after the second node has connected to the wireless multi-hop network.

In Example 1602, the subject matter of any one of Examples 1586 to 1600 can optionally include wherein the radio and antenna circuitry is configured to receive the radio measurements from the one or more nodes of the wireless multi-hop network by receiving at least one of the radio measurements from a second node of the one or more nodes as piggybacked data on a data packet.

In Example 1603, the subject matter of any one of Examples 1586 to 1602 can optionally include wherein the wireless multi-hop network is a non-3$^{rd}$ Generation Partnership Project (3GPP) network, the radio and antenna circuitry configured to receive data packets from the one or more nodes on the wireless multi-hop network, and the gateway device further including additional radio and antenna circuitry configured to route the data packets to a 4GPP network.

In Example 1604, the subject matter of Example 1603 can optionally include wherein the radio and antenna circuitry is configured to receive the data packets from the one or more nodes on the wireless multi-hop network by receiving the data packets from the one or more nodes with a non-3GPP radio interface, and wherein the additional radio and antenna circuitry is configured to route the data packets to the 4GPP network includes routing the data packets to the 4GPP network with a 4GPP radio interface.

In Example 1605, the subject matter of Example 1603 can optionally include wherein the control circuit is further configured to upload the radio measurements to a database via a management interface server that interfaces between the 4GPP network and another network, receive a configuration change instruction from a managing device via the management interface server, and reconfigure the wireless multi-hop network according to the configuration change instruction.

In Example 1606, the subject matter of Example 1603 can optionally include wherein the control circuit is further configured to upload current configuration information for the wireless multi-hop network to a database via a management interface server that interfaces between the 4GPP network and another network, receive a configuration change instruction from a managing device via the management interface server, and reconfigure the wireless multi-hop network according to the configuration change instruction.

In Example 1607, the subject matter of any one of Examples 1586 to 1602 can optionally include wherein the wireless multi-hop network operates with a first radio access technology, the radio and antenna circuitry configured to receive data packets from the one or more nodes on the wireless multi-hop network, and the gateway device further including additional radio and antenna circuitry configured to route the data packets to a second network that operates with a second radio access technology different from the first radio access technology.

In Example 1608, the subject matter of Example 1607 can optionally include wherein the radio and antenna circuitry is configured to receive the data packets from the one or more nodes on the wireless multi-hop network by receiving the data packets from the one or more nodes with a radio interface of the first radio access technology, and wherein the additional radio and antenna circuitry is configured to route the data packets to the second network includes routing the data packets to the second network with a radio interface of the second radio access technology.

In Example 1609, the subject matter of Example 1608 can optionally include wherein the control circuit is further configured to upload the radio measurements to a database via a management interface server that interfaces between the 4GPP network and another network, receive a configuration change instruction from a managing device via the management interface server, and reconfigure the wireless multi-hop network according to the configuration change instruction.

In Example 1610, the subject matter of Example 1603 can optionally include wherein the control circuit is further configured to upload current configuration information for the wireless multi-hop network to a database via a management interface server that interfaces between the second network and a third network, receive a configuration change instruction from a managing device via the management interface server, and reconfigure the wireless multi-hop network according to the configuration change instruction.

Example 1611 is a circuit arrangement including a measurement circuit configured to perform a radio scan to identify proximate wireless networks and to obtain one or more radio measurements of the proximate wireless networks during a duration of a measurement timer, a control circuit configured to select a target wireless network based on the identified proximate wireless networks after the measurement timer expires and to transmit an association request to a coordinator node of the target wireless network that includes the one or more radio measurements In Example 1612, the subject matter of Example 1611 can optionally be configured as a terminal device and further including a radio circuit and antenna.

In Example 1613, the subject matter of Example 1611 or 1612 can optionally include wherein the control circuit is a processor configured to execute software-defined instructions that control operation of the processor.

In Example 1614, the subject matter of any one of Examples 1611 to 1613 can optionally include wherein the measurement circuit is configured as hardware-defined circuitry or software-defined circuitry.

In Example 1615, the subject matter of any one of Examples 1611 to 1614 can optionally be configured to operate as an Internet of Things (IoT) node and wherein the target wireless network is an IoT network.

In Example 1616, the subject matter of any one of Examples 1611 to 1615 can optionally include wherein the measurement circuit is configured to perform the radio scan to obtain the one or more radio measurements of the proximate wireless network by performing one or more of received frame count measurements, neighbor count measurements, signal strength measurements, channel activity measurements, channel access delay measurements, frame transmission delay measurements, packet or frame error rate measurements, or retransmission count measurements.

In Example 1617, the subject matter of any one of Examples 1611 to 1616 can optionally include wherein the measurement circuit is configured to perform the radio scan to identify proximate wireless networks by receiving data packets from one or more nodes of the target wireless network, and identifying the target network based on the data packets.

In Example 1618, the subject matter of any one of Examples 1611 to 1617 can optionally include wherein the coordinator node is a gateway device that provides an interface to a second wireless network, the control circuit further configured to transmit data packets to the coordinator node that are intended for the second wireless network.

In Example 1619, the subject matter of Example 1618 can optionally include wherein the target wireless network is a non-3$^{rd}$ Generation Partnership Project (3GPP) network and the second wireless network is a 4GPP network.

In Example 1620, the subject matter of any one of Examples 1611 to 1619 can optionally include wherein the measurement circuit is further configured to periodically perform radio measurements after connecting to the target wireless network, and wherein the control circuit is configured to report the radio measurements to the coordinator node.

In Example 1621, the subject matter of Example 1620 can optionally include wherein the control circuit is configured to report the radio measurements to the coordinator node by piggybacking the radio measurements on data packets addressed to the coordinator node.

In Example 1622, the subject matter of Example 1620 can optionally include wherein the control circuit is configured to report the radio measurements to the coordinator node by transmitting a standalone measurement report that includes the radio measurements to the coordinator node.

In Example 1623, the subject matter of any one of Examples 1611 to 1622 can optionally include wherein the control circuit is further configured to receive a configuration change from the coordinator node that specifies a scheduling or contention parameter adjustment, and transmit or receive data according to the scheduling or contention parameter adjustment.

Example 1624 is a management interface server configured to operate as an interface between a first network and a second network, the management interface server further configured to execute program code to collect operating information from a gateway device of a wireless multi-hop network via the first network, receive a request for operating conditions of a wireless multi-hop network from a managing device operating on the second network, verify that the managing device is authorized to manage the wireless multi-hop network, and access a database to retrieve the requested operating information and providing the requested operating information to the gateway device via the second network.

In Example 1625, the subject matter of Example 1624 can optionally include wherein the first network is a 3$^{rd}$ Generation Partnership Project (3GPP) network and the second network is a non-3GPP network.

In Example 1626, the subject matter of Example 1624 or 1625 can optionally include wherein the management interface server is configured as an application programming interface (API) between the first network and the second network.

In Example 1627, the subject matter of any one of Examples 1624 to 1626 can optionally include wherein the wireless multi-hop network is an Internet of Things (IoT) network.

In Example 1628, the subject matter of any one of Examples 1624 to 1627 can optionally be further configured to receive a configuration change instruction from the managing device, and forward the configuration change instruction to the wireless multi-hop network via the first network.

In Example 1629, the subject matter of any one of Examples 1624 to 1628 can optionally include wherein the operating information is measurement information or configuration information of the wireless multi-hop network.

Example 1630 is a device including means for receiving vehicle movement information from a vehicle, means for determining a predicted trajectory of the vehicle based on the vehicle movement information, and means for steering an antenna beam towards the vehicle based on the predicted trajectory.

Example 1631 is a method of performing radio communications, the method including receiving vehicle movement information from a vehicle, determining a predicted trajectory of the vehicle based on the vehicle movement information, and steering an antenna beam towards the vehicle based on the predicted trajectory.

In Example 1632, the subject matter of Example 1631 can optionally further include determining a steering direction towards the vehicle based on the predicted trajectory, wherein steering the antenna beam towards the vehicle based on the predicted trajectory includes steering the antenna beam in the steering direction.

In Example 1633, the subject matter of Example 1631 or 1632 can optionally include wherein the vehicle movement information includes a location and a velocity of the vehicle, and wherein determining the predicted trajectory of the vehicle based on the vehicle movement information includes anticipating that the vehicle will continue moving at the velocity from the position to determine the predicted trajectory.

In Example 1634, the subject matter of Example 1633 can optionally include wherein the velocity is a directional velocity, and wherein determining the predicted trajectory based on the vehicle movement information includes determining a direction of the predicted trajectory based on the directional velocity.

In Example 1635, the subject matter of Example 1631 or 1632 can optionally include wherein the vehicle movement information includes a current route of the vehicle, and wherein determining the predicted trajectory of the vehicle based on the vehicle movement information includes anticipating that the vehicle will continue moving on the current route to determine the predicted trajectory.

In Example 1636, the subject matter of any one of Examples 1631 to 1635 can optionally include wherein receiving the vehicle movement information from the vehicle includes receiving an initial context report from the vehicle when an initial connection with the vehicle is established.

In Example 1637, the subject matter of any one of Examples 1631 to 1636 can optionally include wherein receiving the vehicle movement information from the vehicle includes receiving periodic context reports from the vehicle over a period of time, and wherein determining the predicted trajectory of the vehicle based on the vehicle movement information and steering the antenna beam towards the vehicle based on the predicted trajectory includes obtaining an updated predicted trajectory based on each periodic context report, and tracking the vehicle with the antenna beam based on each updated predicted trajectory.

In Example 1638, the subject matter of any one of Examples 1631 to 1637 can optionally include wherein the vehicle is traveling on a fixed path, and wherein determining the predicted trajectory of the vehicle based on the vehicle movement information includes applying information about a route of the fixed path to determine the predicted trajectory.

In Example 1639, the subject matter of Example 1638 can optionally include wherein the fixed path is a road.

In Example 1640, the subject matter of any one of Examples 1631 to 1639 can optionally further include detecting that an obstacle that is blocking a path of the antenna beam to the vehicle, and adjusting wireless communications to the vehicle based on the obstacle.

In Example 1641, the subject matter of Example 1640 can optionally include wherein adjusting wireless communications to the vehicle based on the obstacle includes adjusting a width of the antenna beam based on a degree of blockage that the obstacle is causing to the path of the antenna beam.

In Example 1642, the subject matter of Example 1640 can optionally include wherein adjusting wireless communications to the vehicle based on the obstacle includes switching to a different radio access technology that is less sensitive to pathloss than a current radio access technology.

In Example 1643, the subject matter of any one of Examples 1640 to 1642 can optionally include wherein detecting that the obstacle that is blocking the path of the antenna beam to the vehicle includes detecting the obstacle with a sensor.

In Example 1644, the subject matter of any one of Examples 1640 to 1642 can optionally include wherein the obstacle that is blocking the path of the antenna beam to the vehicle is a second vehicle, and wherein detecting that the obstacle that is blocking the path of the antenna beam to the vehicle includes receiving vehicle movement information from the second vehicle, determining a predicted trajectory of the second vehicle based on the vehicle movement information from the second vehicle, and detecting that the predicted trajectory of the second vehicle will cause the second vehicle to block the path of the antenna beam to the vehicle.

In Example 1645, the subject matter of Example 1644 can optionally include wherein adjusting the wireless communications to the vehicle based on the obstacle includes utilizing the second vehicle as a relay point to route wireless data to the vehicle.

In Example 1646, the subject matter of any one of Examples 1631 to 1645 can optionally further include receiving vehicle movement information from one or more additional vehicles, determining a predicted trajectory for each of the one or more additional vehicles based on the vehicle movement information, and steering a respective antenna beam towards each of the one or more additional vehicles based on the predicted trajectory for each of the one or more additional vehicles.

In Example 1647, the subject matter of any one of Examples 1631 to 1646 can optionally include wherein the vehicle is a car.

In Example 1648, the subject matter of any one of Examples 1631 to 1646 can optionally include wherein the vehicle is a drone.

Example 1649 is a network access node configured to perform the method of any one of Examples 1631 to 1648.

Example 1650 is a circuit arrangement configured to perform the method of any one of Examples 1631 to 1648.

Example 1651 is a non-transitory computer readable medium storing instructions that when executed by a controller of a network access node cause the network access node to perform the method of any one of Examples 1631 to 1648.

Example 1652 is a network access node infrastructure for providing wireless data to vehicles, the network access node infrastructure including a collection module configured to receive vehicle movement information from a vehicle, a prediction module configured to determine a predicted trajectory of the vehicle based on the vehicle movement information, and a steering control module configured to steer an antenna beam towards the vehicle based on the predicted trajectory.

In Example 1662, the subject matter of Example 1652 can optionally further include an antenna array configured to generate the antenna beam, wherein the steering control module is configured to steer the antenna beam by controlling the antenna array.

In Example 1654, the subject matter of Example 1652 or 1653 can optionally further include a radio transceiver.

In Example 1655, the subject matter of any one of Examples 1652 to 1654 can optionally include wherein the steering control module is further configured to determine a steering direction towards the vehicle based on the predicted trajectory, and wherein the steering control module is configured to steer the antenna beam towards the vehicle based on the predicted trajectory includes steering the antenna beam in the steering direction.

In Example 1656, the subject matter of any one of Examples 1652 to 1655 can optionally include wherein the vehicle movement information includes a location and a velocity of the vehicle, and wherein the prediction module is configured to determine the predicted trajectory of the vehicle based on the vehicle movement by anticipating that the vehicle will continue moving at the velocity from the position to determine the predicted trajectory.

In Example 1657, the subject matter of Example 1656 can optionally include wherein the velocity is a directional velocity, and wherein the prediction module is configured to determine a direction of the predicted trajectory based on the directional velocity.

In Example 1658, the subject matter of any one of Examples 1652 to 1655 can optionally include wherein the vehicle movement information includes a current route of the vehicle, and wherein the prediction module is configured to determine the predicted trajectory of the vehicle based on the vehicle movement information includes anticipating that the vehicle will continue moving on the current route to determine the predicted trajectory.

In Example 1659, the subject matter of any one of Examples 1652 to 1658 can optionally include wherein the collection module is configured to receive the vehicle movement information by receiving an initial context report from the vehicle when the vehicle connects to the network access node infrastructure.

In Example 1660, the subject matter of any one of Examples 1652 to 1659 can optionally include wherein the collection module is configured to receive the vehicle movement information from the vehicle by receiving periodic context reports from the vehicle over a period of time, and wherein the prediction module is configured to determine the predicted trajectory of the vehicle based on the vehicle movement information and steering the antenna beam towards the vehicle based on the predicted trajectory by obtaining an updated predicted trajectory based on each periodic context report, and tracking the vehicle with the antenna beam based on each updated predicted trajectory.

In Example 1661, the subject matter of any one of Examples 1652 to 1660 can optionally include wherein the vehicle is traveling on a fixed path, and wherein the prediction module is configured to determine the predicted trajectory of the vehicle based on the vehicle movement information by applying information about a route of the fixed path to determine the predicted trajectory.

In Example 1662, the subject matter of Example 1661 can optionally include wherein the fixed path is a road.

In Example 1663, the subject matter of any one of Examples 1652 to 1662 can optionally include wherein the steering control module is further configured to detect that an obstacle that is blocking a path of the antenna beam to the vehicle, and adjust wireless communications to the vehicle based on the obstacle.

In Example 1664, the subject matter of Example 1663 can optionally include wherein the steering control module is further configured to adjust the wireless communications to the vehicle based on the obstacle by adjusting a width of the antenna beam based on a degree of blockage that the obstacle is causing to the path of the antenna beam.

In Example 1665, the subject matter of Example 1663 can optionally include wherein the steering control module is further configured to adjust the wireless communications to the vehicle based on the obstacle by switching to a different radio access technology that is less sensitive to pathloss than a current radio access technology.

In Example 1666, the subject matter of any one of Examples 1663 to 1665 can optionally include wherein the steering control module is configured to detect the that the obstacle that is blocking the path of the antenna beam to the vehicle by detecting the obstacle based on a sensor.

In Example 1667, the subject matter of any one of Examples 1663 to 1665 can optionally include wherein the obstacle that is blocking the path of the antenna beam to the vehicle is a second vehicle, the collection module is further configured to receive vehicle movement information from the second vehicle, the prediction module is further configured to determine a predicted trajectory of the second vehicle based on the vehicle movement information from the second vehicle, and the steering control module is configured to detect that the obstacle that is blocking the path of the antenna beam to the vehicle by detecting that the predicted trajectory of the second vehicle will cause the second vehicle to block the path of the antenna beam to the vehicle.

In Example 1668, the subject matter of Example 1667 can optionally include wherein the steering control module is configured to adjust wireless communications to the vehicle based on the obstacle by utilizing the second vehicle as a relay point to route wireless data to the vehicle.

In Example 1669, the subject matter of any one of Examples 1652 to 1668 can optionally include wherein the collection module is further configured to receive vehicle movement information from one or more additional vehicles, the prediction module is further configured to determine a predicted trajectory for each of the one or more additional vehicles based on the vehicle movement information, and the steering control module is further configured to steer a respective antenna beam towards each of the one or more additional vehicles based on the predicted trajectory for each of the one or more additional vehicles.

In Example 1670, the subject matter of any one of Examples 1652 to 1669 can optionally include wherein the vehicle is a car.

In Example 1671, the subject matter of any one of Examples 1652 to 1669 can optionally include wherein the vehicle is a drone.

Example 1672 is a network access node infrastructure including a collection module configured to receive movement reports from vehicles traveling in a coverage area of the network access node infrastructure that indicate current movement information of the vehicles, a prediction module configured to determine a predicted trajectory for each of the vehicles, and an antenna array configured to perform beamsteering to steer a respective antenna beam towards each of the vehicles based on the predicted trajectory for each of the vehicles.

In Example 1673, the subject matter of Example 1672 can optionally further include a steering control module configured to determine a steering direction for each respective antenna beam based on the predicted trajectory for each of the vehicles.

In Example 1674, the subject matter of Example 1672 can optionally include wherein the vehicles are traveling on a fixed route.

In Example 1675, the subject matter of Example 1674 can optionally include wherein the vehicles are cars and wherein the fixed route is a road.

In Example 1676, the subject matter of any one of Examples 1672 to 1675 can optionally include wherein each of the measurement reports indicates a current location and a current velocity of a respective vehicle, wherein the prediction module is configured to determine the predicted trajectory for each of the vehicles based on the current location and the current velocity of the respective vehicle.

In Example 1677, the subject matter of Example 1676 can optionally include wherein the prediction is configured to determine the predicted trajectory for each of the vehicles based on the current location and the current velocity of each of the vehicles by anticipating that each of the vehicles will continue moving at the current velocity from the current location.

In Example 1678, the subject matter of any one of Examples 1672 to 1677 can optionally include wherein the collection module is configured to receive an initial movement report from each of the vehicles when each of the vehicles connects to the network access node infrastructure, and wherein the prediction module is configured to determine the predicted trajectory for each of the vehicles by determining an initial predicted trajectory for each of the vehicles based on the initial movement reports.

In Example 1679, the subject matter of any one of Examples 1672 to 1678 can optionally include wherein the collection module is configured to receive periodic updated movement reports from each of the vehicles, and wherein the prediction module is configured to determine an updated predicted trajectory for each of the vehicles based on the periodic updated movement reports.

In Example 1680, the subject matter of any one of Examples 1672 to 1679 can optionally include wherein the antenna array is configured to perform beamsteering to steer the respective antenna beam towards each of the vehicles based on the predicted trajectory for each of the vehicles by performing open-loop beamsteering.

In Example 1681, the subject matter of any one of Examples 1672 to 1680 can optionally further include a steering control module configured to detect obstacles between the network access node infrastructure and each of the vehicles and to alter a steering direction of the antenna beams to avoid the obstacles.

In Example 1682, the subject matter of any one of Examples 1672 to 1680 can optionally further include a steering control module configured to determine when a predicted trajectory of a first vehicle of the vehicles will cause the first vehicle to block a path from the antenna array and a second vehicle of the vehicles, and trigger a change in wireless communications from the antenna array to the first vehicle.

In Example 1683, the subject matter of Example 1682 can optionally include wherein the steering control module is configured to trigger the change in wireless communications from the antenna array to the first vehicle by adjusting a width of an antenna beam from the antenna array to the first vehicle to avoid the second vehicle.

In Example 1684, the subject matter of Example 1682 can optionally include wherein the steering control module is configured to trigger the change in wireless communications from the antenna array to the first vehicle by switching to an alternate radio access technology than a current radio access technology to perform the wireless communications with the first vehicle.

In Example 1685, the subject matter of Example 1682 can optionally include wherein the steering control module is configured to trigger the change in wireless communications from the antenna array to the first vehicle by using the second vehicle as a relay point to route data to the first vehicle.

Example 1686 is a non-transitory computer readable medium storing instructions that when executed by a controller of a network access node cause the network access node to perform a method including receiving vehicle movement information from a vehicle, determining a predicted trajectory of the vehicle based on the vehicle movement information, and steering an antenna beam towards the vehicle based on the predicted trajectory.

In Example 1687, the subject matter of Example 1686 can optionally include the method further including determining a steering direction towards the vehicle based on the predicted trajectory, wherein steering the antenna beam towards the vehicle based on the predicted trajectory includes steering the antenna beam in the steering direction.

In Example 1688, the subject matter of Example 1686 or 1687 can optionally include wherein the vehicle movement information includes a location and a velocity of the vehicle, and wherein determining the predicted trajectory of the vehicle based on the vehicle movement information includes anticipating that the vehicle will continue moving at the velocity from the position to determine the predicted trajectory.

In Example 1689, the subject matter of Example 1688 can optionally include wherein the velocity is a directional velocity, and wherein determining the predicted trajectory based on the vehicle movement information includes determining a direction of the predicted trajectory based on the directional velocity.

In Example 1690, the subject matter of Example 1686 or 1687 can optionally include wherein the vehicle movement information includes a current route of the vehicle, and wherein determining the predicted trajectory of the vehicle based on the vehicle movement information includes anticipating that the vehicle will continue moving on the current route to determine the predicted trajectory.

In Example 1691, the subject matter of any one of Examples 1686 to 1690 can optionally include wherein receiving the vehicle movement information from the vehicle includes receiving an initial context report from the vehicle when an initial connection with the vehicle is established.

In Example 1692, the subject matter of any one of Examples 1686 to 1691 can optionally include wherein receiving the vehicle movement information from the vehicle includes receiving periodic context reports from the vehicle over a period of time, and wherein determining the predicted trajectory of the vehicle based on the vehicle movement information and steering the antenna beam towards the vehicle based on the predicted trajectory includes obtaining an updated predicted trajectory based on each periodic context report, and tracking the vehicle with the antenna beam based on each updated predicted trajectory.

In Example 1693, the subject matter of any one of Examples 1686 to 1692 can optionally include wherein the vehicle is traveling on a fixed path, and wherein determining the predicted trajectory of the vehicle based on the vehicle movement information includes applying information about a route of the fixed path to determine the predicted trajectory.

In Example 1694, the subject matter of Example 1693 can optionally include wherein the fixed path is a road.

In Example 1695, the subject matter of any one of Examples 1686 to 1694 can optionally include the method further including detecting that an obstacle that is blocking a path of the antenna beam to the vehicle, and adjusting wireless communications to the vehicle based on the obstacle.

In Example 1696, the subject matter of Example 1695 can optionally include wherein adjusting wireless communications to the vehicle based on the obstacle includes adjusting a width of the antenna beam based on a degree of blockage that the obstacle is causing to the path of the antenna beam.

In Example 1697, the subject matter of Example 1695 can optionally include wherein adjusting wireless communications to the vehicle based on the obstacle includes switching to a different radio access technology that is less sensitive to pathloss than a current radio access technology.

In Example 1698, the subject matter of any one of Examples 1695 to 1697 can optionally include wherein detecting that the obstacle that is blocking the path of the antenna beam to the vehicle includes detecting the obstacle with a sensor.

In Example 1699, the subject matter of any one of Examples 1695 to 1697 can optionally include wherein the obstacle that is blocking the path of the antenna beam to the vehicle is a second vehicle, and wherein detecting that the obstacle that is blocking the path of the antenna beam to the vehicle includes receiving vehicle movement information from the second vehicle, determining a predicted trajectory of the second vehicle based on the vehicle movement information from the second vehicle, and detecting that the predicted trajectory of the second vehicle will cause the second vehicle to block the path of the antenna beam to the vehicle.

In Example 1700, the subject matter of Example 1699 can optionally include wherein adjusting the wireless communications to the vehicle based on the obstacle includes utilizing the second vehicle as a relay point to route wireless data to the vehicle.

In Example 1701, the subject matter of any one of Examples 1686 to 1700 can optionally further include receiving vehicle movement information from one or more additional vehicles, determining a predicted trajectory for each of the one or more additional vehicles based on the vehicle movement information, and steering a respective antenna beam towards each of the one or more additional vehicles based on the predicted trajectory for each of the one or more additional vehicles.

In Example 1702, the subject matter of any one of Examples 1686 to 1701 can optionally include wherein the vehicle is a car.

In Example 1703, the subject matter of any one of Examples 1686 to 1701 can optionally include wherein the vehicle is a drone.

Example 1704 is a network access node infrastructure for providing wireless data to vehicles, the network access node infrastructure including a collection circuit configured to receive vehicle movement information from a vehicle, a prediction circuit configured to determine a predicted trajectory of the vehicle based on the vehicle movement information, and a steering control circuit configured to steer an antenna beam towards the vehicle based on the predicted trajectory.

In Example 1705, the subject matter of Example 1704 can optionally include wherein the collection circuit, the prediction circuit, and the steering control circuit are hardware-defined circuitry or software-defined circuitry.

In Example 1706, the subject matter of Example 1704 or 1705 can optionally further include an antenna array configured to generate the antenna beam, wherein the steering control circuit is configured to steer the antenna beam by controlling the antenna array.

In Example 1707, the subject matter of any one of Examples 1704 to 1706 can optionally further include radio transceiver circuitry.

In Example 1708, the subject matter of any one of Examples 1704 to 1707 can optionally include wherein the steering control circuit is further configured to determine a steering direction towards the vehicle based on the predicted trajectory, and wherein the steering control circuit is configured to steer the antenna beam towards the vehicle based on the predicted trajectory includes steering the antenna beam in the steering direction.

In Example 1709, the subject matter of any one of Examples 1704 to 1708 can optionally include wherein the vehicle movement information includes a location and a velocity of the vehicle, and wherein the prediction circuit is configured to determine the predicted trajectory of the vehicle based on the vehicle movement by anticipating that the vehicle will continue moving at the velocity from the position to determine the predicted trajectory.

In Example 1710, the subject matter of Example 1709 can optionally include wherein the velocity is a directional velocity, and wherein the prediction circuit is configured to determine a direction of the predicted trajectory based on the directional velocity.

In Example 1711, the subject matter of any one of Examples 1704 to 1708 can optionally include wherein the vehicle movement information includes a current route of the vehicle, and wherein the prediction circuit is configured to determine the predicted trajectory of the vehicle based on the vehicle movement information includes anticipating that the vehicle will continue moving on the current route to determine the predicted trajectory.

In Example 1712, the subject matter of any one of Examples 1704 to 1711 can optionally include wherein the collection circuit is configured to receive the vehicle movement information by receiving an initial context report from the vehicle when the vehicle connects to the network access node infrastructure.

In Example 1713, the subject matter of any one of Examples 1704 to 1712 can optionally include wherein the collection circuit is configured to receive the vehicle movement information from the vehicle by receiving periodic context reports from the vehicle over a period of time, and wherein the prediction circuit is configured to determine the predicted trajectory of the vehicle based on the vehicle movement information and steering the antenna beam towards the vehicle based on the predicted trajectory by obtaining an updated predicted trajectory based on each periodic context report, and tracking the vehicle with the antenna beam based on each updated predicted trajectory.

In Example 1714, the subject matter of any one of Examples 1704 to 1713 can optionally include wherein the vehicle is traveling on a fixed path, and wherein the prediction circuit is configured to determine the predicted trajectory of the vehicle based on the vehicle movement information by applying information about a route of the fixed path to determine the predicted trajectory.

In Example 1715, the subject matter of Example 1714 can optionally include wherein the fixed path is a road.

In Example 1716, the subject matter of any one of Examples 1704 to 1715 can optionally include wherein the steering control circuit is further configured to detect that an obstacle that is blocking a path of the antenna beam to the vehicle, and adjust wireless communications to the vehicle based on the obstacle.

In Example 1717, the subject matter of Example 1716 can optionally include wherein the steering control circuit is further configured to adjust the wireless communications to the vehicle based on the obstacle by adjusting a width of the antenna beam based on a degree of blockage that the obstacle is causing to the path of the antenna beam.

In Example 1718, the subject matter of Example 1716 can optionally include wherein the steering control circuit is further configured to adjust the wireless communications to the vehicle based on the obstacle by switching to a different radio access technology that is less sensitive to pathloss than a current radio access technology.

In Example 1719, the subject matter of any one of Examples 1716 to 1718 can optionally include wherein the steering control circuit is configured to detect the that the obstacle that is blocking the path of the antenna beam to the vehicle by detecting the obstacle based on a sensor.

In Example 1720, the subject matter of any one of Examples 1716 to 1718 can optionally include wherein the obstacle that is blocking the path of the antenna beam to the vehicle is a second vehicle, the collection circuit is further configured to receive vehicle movement information from the second vehicle, the prediction circuit is further configured to determine a predicted trajectory of the second vehicle based on the vehicle movement information from the second vehicle, and the steering control circuit is configured to detect that the obstacle that is blocking the path of the antenna beam to the vehicle by detecting that the predicted trajectory of the second vehicle will cause the second vehicle to block the path of the antenna beam to the vehicle.

In Example 1721, the subject matter of Example 1720 can optionally include wherein the steering control circuit is configured to adjust wireless communications to the vehicle based on the obstacle by utilizing the second vehicle as a relay point to route wireless data to the vehicle.

In Example 1722, the subject matter of any one of Examples 1704 to 1721 can optionally include wherein the collection circuit is further configured to receive vehicle movement information from one or more additional vehicles, the prediction circuit is further configured to determine a predicted trajectory for each of the one or more additional vehicles based on the vehicle movement information, and the steering control circuit is further configured to steer a respective antenna beam towards each of the one or more additional vehicles based on the predicted trajectory for each of the one or more additional vehicles.

In Example 1723, the subject matter of any one of Examples 1704 to 1722 can optionally include wherein the vehicle is a car.

In Example 1724, the subject matter of any one of Examples 1704 to 1722 can optionally include wherein the vehicle is a drone.

Example 1725 is a network access node infrastructure including a collection circuit configured to receive movement reports from vehicles traveling in a coverage area of the network access node infrastructure that indicate current movement information of the vehicles, a prediction circuit configured to determine a predicted trajectory for each of the vehicles, and an antenna array configured to perform beamsteering to steer a respective antenna beam towards each of the vehicles based on the predicted trajectory for each of the vehicles.

In Example 1726, the subject matter of Example 1725 can optionally include wherein the collection circuit and the prediction circuit are hardware-defined circuitry or software-defined circuitry.

In Example 1727, the subject matter of Example 1725 or 1726 can optionally further include a steering control circuit configured to determine a steering direction for each respective antenna beam based on the predicted trajectory for each of the vehicles.

In Example 1728, the subject matter of Example 1725 or 1726 can optionally include wherein the vehicles are traveling on a fixed route.

In Example 1729, the subject matter of Example 1728 can optionally include wherein the vehicles are cars and wherein the fixed route is a road.

In Example 1730, the subject matter of any one of Examples 1725 to 1729 can optionally include wherein each of the measurement reports indicates a current location and a current velocity of a respective vehicle, wherein the prediction circuit is configured to determine the predicted trajectory for each of the vehicles based on the current location and the current velocity of the respective vehicle.

In Example 1731, the subject matter of Example 1730 can optionally include wherein the prediction is configured to determine the predicted trajectory for each of the vehicles based on the current location and the current velocity of each of the vehicles by anticipating that each of the vehicles will continue moving at the current velocity from the current location.

In Example 1732, the subject matter of any one of Examples 1725 to 1731 can optionally include wherein the collection circuit is configured to receive an initial movement report from each of the vehicles when each of the vehicles connects to the network access node infrastructure, and wherein the prediction circuit is configured to determine the predicted trajectory for each of the vehicles by determining an initial predicted trajectory for each of the vehicles based on the initial movement reports.

In Example 1733, the subject matter of any one of Examples 1725 to 1732 can optionally include wherein the collection circuit is configured to receive periodic updated movement reports from each of the vehicles, and wherein the prediction circuit is configured to determine an updated predicted trajectory for each of the vehicles based on the periodic updated movement reports.

In Example 1734, the subject matter of any one of Examples 1725 to 1733 can optionally include wherein the antenna array is configured to perform beamsteering to steer the respective antenna beam towards each of the vehicles based on the predicted trajectory for each of the vehicles by performing open-loop beamsteering.

In Example 1735, the subject matter of any one of Examples 1725 to 1734 can optionally further include a steering control circuit configured to detect obstacles between the network access node infrastructure and each of the vehicles and to alter a steering direction of the antenna beams to avoid the obstacles.

In Example 1736, the subject matter of any one of Examples 1725 to 1734 can optionally further include a steering control circuit configured to determine when a predicted trajectory of a first vehicle of the vehicles will cause the first vehicle to block a path from the antenna array and a second vehicle of the vehicles, and trigger a change in wireless communications from the antenna array to the first vehicle.

In Example 1737, the subject matter of Example 1736 can optionally include wherein the steering control circuit is configured to trigger the change in wireless communications from the antenna array to the first vehicle by adjusting a width of an antenna beam from the antenna array to the first vehicle to avoid the second vehicle.

In Example 1738, the subject matter of Example 1736 can optionally include wherein the steering control circuit is configured to trigger the change in wireless communications from the antenna array to the first vehicle by switching to an alternate radio access technology than a current radio access technology to perform the wireless communications with the first vehicle.

In Example 1739, the subject matter of Example 1736 can optionally include wherein the steering control circuit is configured to trigger the change in wireless communications from the antenna array to the first vehicle by using the second vehicle as a relay point to route data to the first vehicle.

Example 1740 is a server system for storing radio environment map (REM) data in a distributed manner, the server system including a central REM server, and a plurality of local REM servers each configured to generate local REM data for a different respective geographic area based on radio information provided by devices within the respective geographic area, and further configured to upload the local REM data to the central REM server, wherein the central REM server is configured to store REM data for a collective geographic area composed of the respective geographic areas of each of the plurality of local REM servers.

In Example 1741, the subject matter of Example 1740 can optionally include wherein the central REM server is deployed in a cloud network and wherein the plurality of local REM servers are deployed at a network location closer to the devices than the central REM server.

In Example 1742, the subject matter of Example 1741 can optionally include wherein the plurality of local REM servers are deployed at a network access node or at an edge computing network.

In Example 1743, the subject matter of any one of Examples 1740 to 1742 can optionally include wherein the plurality of local REM servers are configured to periodically upload the local REM data to the central REM server and to update the local REM data between uploads.

In Example 1744, the subject matter of any one of Examples 1740 to 1743 can optionally include wherein a first local REM server of the plurality of local REM servers is configured to generate the local REM data for its respective geographic area by receiving radio information from devices within its respective geographic area by receiving radio measurements from the devices in the respective geographic area, processing the radio measurements to generate the local REM data, and storing the local REM data.

In Example 1745, the subject matter of Example 1744 can optionally include wherein the radio measurements are tagged with locations inside the respective geographic area of the first local REM server.

In Example 1746, the subject matter of any one of Examples 1740 to 1745 can optionally include wherein the devices include terminal devices.

In Example 1747, the subject matter of any one of Examples 1740 to 1746 can optionally include wherein the devices include network access nodes.

In Example 1748, the subject matter of any one of Examples 1740 to 1747 can optionally include wherein a first local REM server of the plurality of local REM servers is further configured to receive a request for local REM data from a requesting device, retrieve the local REM data from a REM database of the first local REM server, and provide the local REM data to the requesting device.

In Example 1749, the subject matter of Example 1748 can optionally include wherein the request is for the local REM data in the respective geographic area of the first local REM server.

In Example 1750, the subject matter of Example 1748 can optionally include wherein the request specifies a device capability class and an information detail level, and wherein the local REM server is configured to identify the local REM data in the REM database according to the device capability class and the information detail level.

In Example 1751, the subject matter of Example 1750 can optionally include wherein the information detail level indicates a scope of REM data requested by the requesting device and wherein the device capability class indicates which radio access technologies are supported by the requesting device.

In Example 1752, the subject matter of any one of Examples 1740 to 1751 can optionally include wherein the local REM data of a first local REM server of the plurality of local REM severs indicates available radio access technologies and performance metric information across the respective geographic area of the first local REM server.

In Example 1753, the subject matter of Example 1752 can optionally include wherein the performance metric information includes network load data, retransmission parameters, packet/bit/block error rate (PER/BER/BLER) statistics, call drop probabilities, signal strength and signal quality data, pathloss and obstacle information, or interference levels.

In Example 1754, the subject matter of any one of Examples 1740 to 1753 can optionally include wherein the local REM data of a first local REM server of the plurality of local REM severs indicates radio conditions at different locations in the respective geographic area of the first local REM server.

In Example 1755, the subject matter of any one of Examples 1740 to 1754 can optionally include wherein the radio information includes one or more of available networks, available cells, available radio access technologies, network load data, retransmission parameters, packet/bit/block error rate (PER/BER/BLER) statistics, call drop probabilities, signal strength and signal quality data, pathloss and obstacle information, or interference levels.

Example 1756 is a server unit for storing radio environment map (REM) data, the server unit including a controller configured to receive a REM data request from a requesting device, wherein the REM data request includes a device capability class and an information detail level, and a REM database configured to store REM data for a geographic area associated with the REM database, the controller further configured to identify REM data from the REM database according to the device capability class and the information detail level and to provide the REM data to the requesting device.

In Example 1757, the subject matter of Example 1756 can optionally include wherein the requesting device is a terminal device.

In Example 1758, the subject matter of Example 1756 can optionally include wherein the requesting device is a network access node.

In Example 1759, the subject matter of any one of Examples 1756 to 1758 can optionally include wherein the controller is further configured to receive radio measurements from one or more reporting devices, process the radio measurements to generate updated REM data, and store the updated REM data in the REM database.

In Example 1760, the subject matter of Example 1759 can optionally include wherein the radio measurements are tagged with location information for locations in the geographic area, and wherein the controller is configured to store the updated REM data in the REM database according to the location information of the radio measurements.

In Example 1761, the subject matter of Example 1760 can optionally include wherein the controller is configured to store the updated REM data in the REM database according to the location information of the radio measurements by replacing or updating existing REM data in the REM database that is associated with the same location in the geographic area with the updated REM data.

In Example 1762, the subject matter of any one of Examples 1759 to 1761 can optionally include wherein the controller is configured to periodically upload the REM data stored in the REM database to a central REM server and to update the REM data in the REM database in between uploads.

In Example 1763, the subject matter of any one of Examples 1756 to 1762 can optionally include wherein the REM data stored in the REM database represents radio conditions across the geographic area.

In Example 1764, the subject matter of any one of Examples 1756 to 1763 can optionally include wherein the REM data stored in the REM database indicates network availability and performance metrics for available networks at different locations across the geographic area.

In Example 1765, the subject matter of Example 1764 can optionally include where in the performance metrics include network load data, retransmission parameters, packet/bit/block error rate (PER/BER/BLER) statistics, call drop probabilities, signal strength and signal quality data, pathloss and obstacle information, or interference levels.

In Example 1766, the subject matter of any one of Examples 1756 to 1765 can optionally include wherein the device capability class indicates which radio access technologies are supported by the requesting device, and wherein the controller is configured to identify the REM data from the REM database according to the device capability class and the information detail level and to provide the REM data to the requesting device by identifying REM data from the REM database that is related to the radio access technologies supported by the requesting device, and providing only the identified REM data to the requesting device.

In Example 1767, the subject matter of any one of Examples 1756 to 1765 can optionally include wherein the REM data stored in the REM database indicates radio access technology availability information and performance metric information for available networks at different locations across the geographic area. and wherein the information detail level indicates a scope of REM data requested by the requesting device.

In Example 1768, the subject matter of Example 1767 can optionally include wherein the information detail level indicates that the requesting device is requesting basic radio access technology availability information, and wherein the controller is configured to identify the REM data from the REM database according to the device capability class and the information detail level and to provide the REM data to the requesting device by retrieving the radio access technology availability information from the REM database and providing the radio access technology availability information to the requesting device.

In Example 1769, the subject matter of Example 1767 can optionally include wherein the information detail level indicates that the requesting device is requesting detailed performance metric information, and wherein the controller is configured to identify the REM data from the REM database according to the device capability class and the information detail level and to provide the REM data to the requesting device by retrieving the performance metric information from the REM database and providing the performance metric information to the requesting device.

In Example 1770, the subject matter of any one of Examples 1756 to 1769 can optionally include wherein the controller is configured to identify the REM data from the REM database according to the device capability class and the information detail level and to provide the REM data to the requesting device by retrieving data specific to certain radio access technologies and with a certain data scope according to the device capability class and the information detail level.

In Example 1771, the subject matter of any one of Examples 1756 to 1769 can optionally include wherein the device capability class is a predefined device capability class that corresponds to one or more radio access technologies and the information detail level is a predefined information detail level that corresponds to certain types of data, and wherein the controller is configured to identify the REM data from the REM database according to the device capability class and the information detail level and to provide the REM data to the requesting device by retrieving REM data from the REM database that relate to the one or more radio access technologies and are of the certain types of data.

In Example 1772, the subject matter of any one of Examples 1756 to 1771 can optionally include wherein the controller is configured to determine whether the requesting device is a terminal device or a network access node and configured to identify the REM data from the REM database according to the device capability class and the information detail level and to provide the REM data to the requesting device based on whether the requesting device is a terminal device or a network access node.

In Example 1773, the subject matter of any one of Examples 1756 to 1772 can optionally include wherein the requesting device is a network access node, and wherein the REM data stored in the REM database is relevant only for a finite geographic area surrounding the network access node.

In Example 1774, the subject matter of any one of Examples 1756 to 1773 can optionally include deployed in an edge network.

Example 1775 is a device including means for generating local REM data at each of a plurality of local REM servers for a different respective geographic area based on radio information provided by devices within the respective geographic area, means for uploading the local REM data from each of the plurality of local REM servers to a central REM server, and means for storing the REM data at the central REM server for a collective geographic area composed of the respective geographic area.

Example 1776 is a method for managing radio environment map (REM) data in a distributed manner, the method including generating local REM data at each of a plurality of local REM servers for a different respective geographic area based on radio information provided by devices within the respective geographic area, uploading the local REM data from each of the plurality of local REM servers to a central REM server, and storing the REM data at the central REM server for a collective geographic area composed of the respective geographic area.

In Example 1777, the subject matter of Example 1776 can optionally include wherein the central REM server is deployed in a cloud network and wherein the plurality of local REM servers are deployed at a network location closer to the devices than the central REM server.

In Example 1778, the subject matter of Example 1777 can optionally include wherein the plurality of local REM servers are deployed at a network access node or at an edge computing network.

In Example 1779, the subject matter of any one of Examples 1776 to 1778 can optionally further include periodically uploading the local REM data from the plurality of local REM servers to the central REM server, and updating the local REM data at the plurality of local REM servers between uploads.

In Example 1780, the subject matter of any one of Examples 1776 to 1779 can optionally further include at a first local REM server of the plurality of local REM servers, generating the local REM data for the respective geographic area of the first local REM server by receiving radio measurements from the devices in the respective geographic area, process the radio measurements to generate local REM data, and store the local REM data.

In Example 1781, the subject matter of Example 1780 can optionally include wherein the radio measurements are tagged with locations inside the respective geographic area of the first local REM server.

In Example 1782, the subject matter of any one of Examples 1776 to 1781 can optionally include wherein the devices include terminal devices.

In Example 1783, the subject matter of any one of Examples to 1782, can optionally include the devices include network access nodes.

In Example 1784, the subject matter of any one of Examples 1776 to 1783 can optionally further include receiving, at a first local REM server of the plurality of local REM servers, a request for local REM data from a requesting device, retrieving the local REM data from a REM database of the first local REM server, and providing the local REM data to the requesting device.

In Example 1785, the subject matter of Example 1784 can optionally include wherein the request is for the local REM data in the respective geographic area of the first local REM server.

In Example 1786, the subject matter of Example 1784 can optionally include wherein the request specifies a device capability class and an information detail level, the method further including identifying, at the first local REM server, the local REM data in the REM database according to the device capability class and the information detail level.

In Example 1787, the subject matter of Example 1786 can optionally include wherein the information detail level indicates a scope of REM data requested by the requesting device and wherein the device capability class indicates which radio access technologies are supported by the requesting device.

In Example 1788, the subject matter of any one of Examples 1776 to 1787 can optionally include wherein the local REM data of a first local REM server of the plurality of local REM servers indicates available radio access technologies and performance metrics across the respective geographic area of the first local REM server.

In Example 1789, the subject matter of Example 1788 can optionally include wherein the performance metric information includes network load data, retransmission parameters, packet/bit/block error rate (PER/BER/BLER) statistics, call drop probabilities, signal strength and signal quality data, pathloss and obstacle information, or interference levels.

In Example 1790, the subject matter of any one of Examples 1776 to 1789 can optionally include wherein the local REM data of a first local REM server of the plurality of local REM servers indicates radio conditions at different locations in the respective geographic area of the first local REM server.

In Example 1791, the subject matter of any one of Examples 1776 to 1790 can optionally include wherein the radio information includes one or more of available networks, available cells, available radio access technologies, network load data, retransmission parameters, packet/bit/block error rate (PER/BER/BLER) statistics, call drop probabilities, signal strength and signal quality data, pathloss and obstacle information, or interference levels Example 1792 is a non-transitory computer readable medium storing instructions that when executed by a processor cause the processor to perform the method of any one of Examples 1776 to 1791.

Example 1793 is a device including means for receiving a REM data request from a requesting device, wherein the REM data request includes a device capability class and an information detail level, means for identifying REM data from a REM database according to the device capability class and the information detail level, wherein the REM database is configured to store REM data for a geographic area associated with the REM database, and means for providing the REM data to the requesting device.

Example 1794 is a method for managing radio environment map (REM) data, the method including receiving a REM data request from a requesting device, wherein the REM data request includes a device capability class and an information detail level, identifying REM data from a REM database according to the device capability class and the information detail level, wherein the REM database is configured to store REM data for a geographic area associated with the REM database, and providing the REM data to the requesting device.

In Example 1795, the subject matter of Example 1794 can optionally include wherein the requesting device is a terminal device.

In Example 1796, the subject matter of Example 1794 can optionally include wherein the requesting device is a network access node.

In Example 1797, the subject matter of any one of Examples 1794 to 1796 can optionally further include receiving radio measurements from one or more reporting devices, processing the radio measurements to generate updated REM data, and storing the updated REM data in the REM database.

In Example 1798, the subject matter of Example 1797 can optionally include wherein the radio measurements are tagged with location information for locations in the geographic area, the method further including storing the updated REM data in the REM database according to the location information of the radio measurements.

In Example 1799, the subject matter of Example 1798 can optionally include wherein storing the updated REM data in the REM database according to the location information of the radio measurements includes replacing or updating existing REM data in the REM database that is associated with the same location in the geographic area with the updated REM data.

In Example 1800, the subject matter of any one of Examples 1797 to 1799 can optionally further include periodically uploading the REM data stored in the REM database to a central REM server, and updating the REM data in the REM database in between uploads.

In Example 1801, the subject matter of any one of Examples 1794 to 1800 can optionally include wherein the REM data stored in the REM database represents radio conditions across the geographic area.

In Example 1802, the subject matter of any one of Examples 1794 to 1801 can optionally include wherein the REM data stored in the REM database indicates network availability and performance metrics for available networks at different locations across the geographic area.

In Example 1803, the subject matter of Example 1802 can optionally include wherein the performance metrics include network load data, retransmission parameters, packet/bit/block error rate (PER/BER/BLER) statistics, call drop probabilities, signal strength and signal quality data, pathloss and obstacle information, or interference levels.

In Example 1804, the subject matter of any one of Examples 1794 to 1803 can optionally include wherein the device capability class indicates which radio access technologies are supported by the requesting device, and wherein identifying the REM data from the REM database according to the device capability class and the information detail level and providing the REM data to the requesting device includes identifying REM data from the REM database that is related to the radio access technologies supported by the requesting device, and providing only the identified REM data to the requesting device.

In Example 1805, the subject matter of any one of Examples 1794 to 1803 can optionally include wherein the REM data stored in the REM database indicates radio access technology availability information and performance metric information for available networks at different locations across the geographic area. and wherein the information detail level indicates a scope of REM data requested by the requesting device.

In Example 1806, the subject matter of Example 1805 can optionally include wherein the information detail level indicates that the requesting device is requesting basic radio access technology availability information, and wherein identifying the REM data from the REM database according to the device capability class and the information detail level and to provide the REM data to the requesting device includes retrieving the radio access technology availability information from the REM database and providing the radio access technology availability information to the requesting device.

In Example 1807, the subject matter of Example 1805 can optionally include wherein the information detail level indicates that the requesting device is requesting detailed performance metric information, and wherein identifying the REM data from the REM database according to the device capability class and the information detail level and to provide the REM data to the requesting device includes retrieving the performance metric information from the REM database and providing the performance metric information to the requesting device.

In Example 1808, the subject matter of any one of Examples 1794 to 1807 can optionally include wherein identifying the REM data from the REM database according to the device capability class and the information detail level and to provide the REM data to the requesting device includes retrieving data specific to certain radio access technologies and with a certain data scope according to the device capability class and the information detail level.

In Example 1809, the subject matter of any one of Examples 1794 to 1807 can optionally include wherein the device capability class is a predefined device capability class that corresponds to one or more radio access technologies and the information detail level is a predefined information detail level that corresponds to certain types of data, and wherein identifying the REM data from the REM database according to the device capability class and the information detail level and to provide the REM data to the requesting device includes retrieving REM data from the REM database that relate to the one or more radio access technologies and are of the certain types of data.

In Example 1810, the subject matter of any one of Examples 1794 to 1809 can optionally further include determining whether the requesting device is a terminal device or a network access node, and identifying the REM data from the REM database according to the device capability class and the information detail level and providing the REM data to the requesting device based on whether the requesting device is a terminal device or a network access node.

In Example 1811, the subject matter of any one of Examples 1794 to 1810 can optionally include wherein the requesting device is a network access node, and wherein the REM data stored in the REM database is relevant only for a finite geographic area surrounding the network access node.

Example 1812 is a non-transitory computer readable medium storing instructions that when executed by a controller of a server cause the server unit to perform the method of any one of Examples 1794 to 1811.

Example 1813 is a device including means for selecting a service profile key that represents service requirements of one or more applications of a terminal device, means for reporting the service profile key to a radio communication network, wherein the radio communication network includes a plurality of network slices, and means for receiving a response that causes the terminal device to utilize a target network slice of the plurality of network slices to transfer data for the one or more applications.

Example 1814 is a method of performing radio communications, the method including selecting a service profile key that represents service requirements of one or more applications of a terminal device, reporting the service profile key to a radio communication network, wherein the radio communication network includes a plurality of network slices, and receiving a response that causes the terminal device to utilize a target network slice of the plurality of network slices to transfer data for the one or more applications.

In Example 1815, the subject matter of Example 1814 can optionally further include identifying the one or more applications as one or more applications that are installed on the terminal device or one or more applications that are frequently executed by the terminal device.

In Example 1816, the subject matter of Example 1814 or 1815 can optionally include wherein the service requirements of the one or more applications are Quality of Service (QoS) requirements.

In Example 1817, the subject matter of any one of Examples 1814 to 1816 can optionally include wherein the service requirements include a latency requirement, a reliability requirement, a mobility requirement, a charging requirement, a security requirement, a data rate requirement, a policy control requirement, a power consumption requirement, a battery life requirement, a capacity requirement, or a coverage requirement.

In Example 1818, the subject matter of any one of Examples 1814 to 1817 can optionally include wherein selecting the service profile key includes identifying the service requirements of the one or more applications of the terminal device, and selecting from a plurality of predefined service profile keys based on the service requirements to obtain the service profile key.

In Example 1819, the subject matter of any one of Examples 1814 to 1818 can optionally further include identifying a first application of the one or more applications that is executed more often than a second application of the one or more applications, wherein selecting the service profile key that represents the service requirements of the one or more applications of the terminal device includes weighting the service requirements of the first application to a higher degree than the service requirements of the second application when selecting the service profile key.

In Example 1820, the subject matter of any one of Examples 1814 to 1819 can optionally include wherein reporting the service profile key to the radio communication network includes reporting the service profile key to the radio communication network as part of an initial registration with the radio communication network.

In Example 1821, the subject matter of any one of Examples 1814 to 1819 can optionally include wherein reporting the service profile key to the radio communication network includes reporting the service profile key to the radio communication network as part of a registration update with the radio communication network.

In Example 1822, the subject matter of Example 1821 can optionally include wherein the registration update is a Tracking Area Update (TAU).

In Example 1823, the subject matter of any one of Examples 1814 to 1822 can optionally include wherein selecting the service profile key includes referencing a mapping table that specifies a mapping between applications and service requirements, and identifying the service requirements of the one or more applications based on the mapping table.

In Example 1824, the subject matter of Example 1823 can optionally include wherein the mapping table is predefined.

In Example 1825, the subject matter of Example 1823 can optionally further include receiving the mapping table from the radio communication network.

In Example 1826, the subject matter of Example 1823 can optionally further include establishing one or more bearers over the target network slice for the one or more applications using the mapping table.

In Example 1827, the subject matter of any one of Examples 1814 to 1822 can optionally include wherein selecting the service profile key includes tallying a respective point count for each of a plurality of network slice dimensions, that correspond to the plurality of network slices, based on the service requirements of the one or more applications, and selecting the service profile key based on which of the respective point counts is the highest.

In Example 1828, the subject matter of Example 1827 can optionally include wherein the respective point counts indicate whether the service requirements of the one or more applications meet predefined criteria of the plurality of network slice dimensions.

In Example 1829, the subject matter of any one of Examples 1814 to 1828 can optionally include wherein selecting the service profile key includes selecting the service profile key based on a service optimization target, a cost optimization target, or a power consumption optimization target.

In Example 1830, the subject matter of any one of Examples 1814 to 1829 can optionally further include updating the service profile key to obtain an updated service profile key, reporting the updated service profile key to the radio communication network, and receiving a response causes the terminal device to utilize a second target network slice of the plurality of network slices to transfer data for the one or more applications.

In Example 1831, the subject matter of any one of Examples 1814 to 1830 can optionally further include registering with the target network slice and establishing one or more bearers with the target network slice.

In Example 1832, the subject matter of Example 1831 can optionally include wherein establishing the one or more bearers with the target network slice includes establishing the one or more bearers based on the service requirements of the one or more applications.

In Example 1833, the subject matter of any one of Examples 1814 to 1830 can optionally further include exchanging data with one or more data networks with one or more bearers of the target network slice.

In Example 1834, the subject matter of any one of Examples 1814 to 1833 can optionally include wherein receiving the response that causes the terminal device to utilize the target network slice of the plurality of network slices to transfer data for the one or more applications includes receiving a response that identifies the target network slice, and registering with the target network slice.

In Example 1835, the subject matter of Example 1834 can optionally include wherein the response indicates a radio interface configuration corresponding to the target network slice, the method further including transmitting or receiving the data for the one or more applications according to the radio interface configuration.

In Example 1836, the subject matter of any one of Examples 1814 to 1833 can optionally include wherein receiving the response that causes the terminal device to utilize the target network slice of the plurality of network slices to transfer data for the one or more applications includes receiving a response that indicates a radio interface configuration, and transmitting or receiving the data for the one or more applications according to the radio interface configuration.

In Example 1837, the subject matter of Example 1836 can optionally include wherein the radio interface configuration corresponds to the target network slice.

Example 1838 is a terminal device including a processor configured to perform the method of any one of Examples 1814 to 1837.

Example 1839 is a processing circuitry arrangement configured to perform the method of any one of Examples 1814 to 1837.

Example 1840 is a non-transitory computer readable medium storing instructions that when executed by a controller of a terminal device cause the terminal device to perform the method of any one of Examples 1814 to 1837.

Example 1841 is a non-transitory computer readable medium storing instructions that when executed by a processor cause the processor to perform the method of any one of Examples 1814 to 1837.

Example 1842 is a device including means for receiving a service profile key from a terminal device that indicates service requirements of one or more applications of the terminal device, means for selecting a target network slice from a plurality of network slices based on the service profile key, wherein the plurality of network slices provide different service characteristics, and means for configuring the terminal device to utilize the target network slice to transfer data for the one or more applications.

Example 1843 is a method of performing radio communications, the method including receiving a service profile key from a terminal device that indicates service requirements of one or more applications of the terminal device, selecting a target network slice from a plurality of network slices based on the service profile key, wherein the plurality of network slices provide different service characteristics, and configuring the terminal device to utilize the target network slice to transfer data for the one or more applications.

In Example 1844, the subject matter of Example 1843 can optionally include wherein a first network slice of the plurality of network slices has a different latency, a different packet loss rate, or a different bitrate than a second network slice of the plurality of network slices.

In Example 1845, the subject matter of Example 1843 can optionally include wherein the plurality of network slices have different latencies, different packet loss rates, or different bitrates and wherein the service profile key indicates a latency requirement, an acceptable packet loss rate requirement, or a bitrate requirement of the one or more applications, and wherein selecting the target network slice from the plurality of network slices includes selecting a network slice that meets the service requirements indicated by the service profile key.

In Example 1846, the subject matter of any one of Examples 1843 to 1845 can optionally include wherein selecting the target network slice from the plurality of network slices based on the service profile key includes comparing the service requirements indicated by the service profile key to the different service characteristics of the plurality of network slices, and selecting a network slice from the plurality of network slices that meets the service requirements indicated by the service profile key.

In Example 1847, the subject matter of any one of Examples 1843 to 1846 can optionally include wherein the plurality of network slices are logically separate end-to-end networks that are implemented on a radio communication network.

In Example 1848, the subject matter of any one of Examples 1843 to 1847 can optionally include wherein receiving the service profile key from the terminal device includes receiving the service profile key as part of signaling for an initial registration of the terminal device with the radio communication network.

In Example 1849, the subject matter of any one of Examples 1843 to 1847 can optionally include wherein receiving the service profile key from the terminal device includes receiving the service profile key as part of signaling for a registration update of the terminal device with the radio communication network.

In Example 1850, the subject matter of any one of Examples 1843 to 1849 can optionally further include providing a mapping table to the terminal device that specifies a mapping between applications and service requirements to the terminal device.

In Example 1851, the subject matter of any one of Examples 1843 to 1850 can optionally further include establishing bearers for the one or more applications on the target network slice.

In Example 1852, the subject matter of any one of Examples 1843 to 1851 can optionally include wherein each of the one or more applications has specific service requirements, the method further including establishing one or more bearers for the one or more applications based on the specific service requirements of the one or more applications.

In Example 1853, the subject matter of any one of Examples 1843 to 1852 can optionally include wherein configuring the terminal device to utilize the target network slice to transfer the data for the one or more applications includes providing a slice identity for the target network slice to the terminal device.

In Example 1854, the subject matter of any one of Examples 1843 to 1852 can optionally include wherein configuring the terminal device to utilize the target network slice to transfer the data for the one or more applications includes providing a radio interface configuration to the terminal device without providing a slice identity for the target network slice to the terminal device, and configuring resources of the target network slice to support transfer of the data.

Example 1855 is a non-transitory computer readable medium storing instructions that when executed by a processor cause the processor to perform the method of any one of Examples 1843 to 1854.

Example 1856 is a processing circuitry arrangement for a radio communication network node configured to execute the method of any one of Examples 1843 to 1854.

Example 1857A radio communication network node including one or more processors configured to perform the method of any one of Examples 1843 to 1854.

Example 1858 is a radio communication device including one or more processors configured to select a service profile key that represents service requirements of one or more applications of a terminal device, report the service profile key to a radio communication network, wherein the radio communication network includes a plurality of network slices, and receive a response that causes the terminal device to utilize a target network slice of the plurality of network slices to transfer data for the one or more applications.

In Example 1859, the subject matter of Example 1858 can optionally be configured as a terminal device and further including a radio transceiver and an antenna.

In Example 1860, the subject matter of Example 1858 can optionally include wherein the one or more processors include an application processor configured to execute the one or more applications.

In Example 1861, the subject matter of Example 1858 can optionally include wherein the radio communication device is an electronic component adapted for use in a terminal device.

In Example 1862, the subject matter of any one of Examples 1858 to 1861 can optionally include wherein the one or more processors are further configured to identify the one or more applications as one or more applications that are installed on the terminal device or one or more applications that are frequently executed by the terminal device.

In Example 1863, the subject matter of any one of Examples 1858 to 1862 can optionally include wherein the service requirements of the one or more applications are Quality of Service (QoS) requirements.

In Example 1864, the subject matter of any one of Examples 1858 to 1863 can optionally include wherein the service requirements include a latency requirement, a reliability requirement, a mobility requirement, a charging requirement, a security requirement, a data rate requirement, a policy control requirement, a power consumption requirement, a battery life requirement, a capacity requirement, or a coverage requirement.

In Example 1865, the subject matter of any one of Examples 1858 to 1864 can optionally include wherein the one or more processors are configured to selecting the service profile key by identifying the service requirements of the one or more applications of the terminal device, and selecting from a plurality of predefined service profile keys based on the service requirements to obtain the service profile key.

In Example 1866, the subject matter of any one of Examples 1858 to 1865 can optionally include wherein the one or more processors are further configured to identify a first application of the one or more applications that is executed more often than a second application of the one or more applications, and wherein the one or more processors are configured to select the service profile key that represents the service requirements of the one or more applications of the terminal device by weighting the service requirements of the first application to a higher degree than the service requirements of the second application when selecting the service profile key.

In Example 1867, the subject matter of any one of Examples 1858 to 1866 can optionally include wherein the one or more processors are further configured to report the service profile key to the radio communication network by reporting the service profile key to the radio communication network as part of an initial registration with the radio communication network.

In Example 1868, the subject matter of any one of Examples 1858 to 1866 can optionally include wherein the one or more processors are configured to report the service profile key to the radio communication network by reporting the service profile key to the radio communication network as part of a registration update with the radio communication network.

In Example 1869, the subject matter of Example 1868 can optionally include wherein the registration update is a Tracking Area Update (TAU).

In Example 1870, the subject matter of any one of Examples 1858 to 1869 can optionally include wherein the one or more processors are configured to select the service profile key by referencing a mapping table that specifies a mapping between applications and service requirements, and identifying the service requirements of the one or more applications based on the mapping table.

In Example 1871, the subject matter of Example 1870 can optionally include wherein the mapping table is predefined.

In Example 1872, the subject matter of Example 1870 can optionally include wherein the one or more processors are further configured to receive the mapping table from the radio communication network.

In Example 1873, the subject matter of Example 1870 can optionally include wherein the one or more processors are further configured to establish one or more bearers over the target network slice for the one or more applications using the mapping table.

In Example 1874, the subject matter of any one of Examples 1858 to 1869 can optionally include wherein the one or more processors are configured to select the service profile key by tallying a respective point count for each of a plurality of network slice dimensions, that correspond to the plurality of network slices, based on the service requirements of the one or more applications, and selecting the service profile key based on which of the respective point counts is the highest.

In Example 1875, the subject matter of Example 1874 can optionally include wherein the respective point counts indicate whether the service requirements of the one or more applications meet predefined criteria of the plurality of network slice dimensions.

In Example 1876, the subject matter of any one of Examples 1858 to 1873 can optionally include wherein the one or more processors are configured to select the service profile key by selecting the service profile key based on a service optimization target, a cost optimization target, or a power consumption optimization target.

In Example 1877, the subject matter of any one of Examples 1858 to 1876 can optionally include wherein the one or more processors are further configured to update the service profile key to obtain an updated service profile key, report the updated service profile key to the radio communication network, receive a response that causes the terminal device to utilize a second target network slice of the plurality of network slices to transfer data for the one or more applications.

In Example 1878, the subject matter of any one of Examples 1858 to 1877 can optionally include wherein the one or more processors are further configured to register with the target network slice and establish one or more bearers with the target network slice.

In Example 1879, the subject matter of Example 1878 can optionally include wherein the one or more processors are configured to establish the one or more bearers with the target network slice by establishing the one or more bearers based on the service requirements of the one or more applications.

In Example 1880, the subject matter of any one of Examples 1858 to 1879 can optionally include wherein the one or more processors are further configured to exchange data with one or more data networks with one or more bearers of the target network slice.

In Example 1881, the subject matter of any one of Examples 1858 to 1880 can optionally include wherein the one or more processors are configured to receive the response that causes the terminal device to utilize the target network slice of the plurality of network slices to transfer data for the one or more applications by receiving a response that identifies the target network slice, and registering with the target network slice.

In Example 1882, the subject matter of Example 1881 can optionally include wherein the response indicates a radio interface configuration corresponding to the target network slice, the method further including transmitting or receiving the data for the one or more applications according to the radio interface configuration.

In Example 1883, the subject matter of any one of Examples 1858 to 1880 can optionally include wherein the one or more processors are configured to receive the response that causes the terminal device to utilize the target network slice of the plurality of network slices to transfer data for the one or more applications by receiving a response that indicates a radio interface configuration, and transmitting or receiving the data for the one or more applications according to the radio interface configuration.

In Example 1884, the subject matter of Example 1883 can optionally include wherein the radio interface configuration corresponds to the target network slice.

Example 1885 is a radio communication device including one or more processors configured to receive a service profile key from a terminal device that indicates service requirements of one or more applications of the terminal device, select a target network slice from a plurality of network slices based on the service profile key, wherein the plurality of network slices provide different service characteristics, and configure the terminal device to utilize the target network slice to transfer data for the one or more applications.

In Example 1886, the subject matter of Example 1885 can optionally be configured as a server or cloud computing processor of a core network.

In Example 1887, the subject matter of Example 1885 can optionally include wherein a first network slice of the plurality of network slices has a different latency, a different packet loss rate, or a different bitrate than a second network slice of the plurality of network slices.

In Example 1888, the subject matter of Example 1885 can optionally include wherein the plurality of network slices have different latencies, different packet loss rates, or different bitrates and wherein the service profile key indicates a latency requirement, an acceptable packet loss rate requirement, or a bitrate requirement of the one or more applications, and wherein the one or more processors are configured to select the target network slice from the plurality of network slices includes selecting a network slice that meets the service requirements indicated by the service profile key.

In Example 1889, the subject matter of any one of Examples 1885 to 1888 can optionally include wherein the one or more processors are configured to select the target network slice from the plurality of network slices based on the service profile key by comparing the service requirements indicated by the service profile key to the different service characteristics of the plurality of network slices, and selecting a network slice from the plurality of network slices that meets the service requirements indicated by the service profile key.

In Example 1890, the subject matter of any one of Examples 1885 to 1889 can optionally include wherein the plurality of network slices are logically separate end-to-end networks that are implemented on a radio communication network.

In Example 1891, the subject matter of any one of Examples 1885 to 1890 can optionally include wherein the one or more processors are configured to receive the service profile key from the terminal device by receiving the service profile key as part of signaling for an initial registration of the terminal device with the radio communication network.

In Example 1892, the subject matter of any one of Examples 1885 to 1891 can optionally include wherein the one or more processors are configured to receive the service profile key from the terminal device by receiving the service profile key as part of signaling for a registration update of the terminal device with the radio communication network.

In Example 1893, the subject matter of any one of Examples 1885 to 1892 can optionally include the one or more processors further configured to provide a mapping table to the terminal device that specifies a mapping between applications and service requirements to the terminal device.

In Example 1894, the subject matter of any one of Examples 1885 to 1893 can optionally include the one or more processors further configured to establish bearers for the one or more applications on the target network slice.

In Example 1895, the subject matter of any one of Examples 1885 to 1894 can optionally include wherein each of the one or more applications has specific service requirements, the one or more processors further configured to establish one or more bearers for the one or more applications based on the specific service requirements of the one or more applications.

In Example 1896, the subject matter of any one of Examples 1843 to 1852 can optionally include wherein the one or more processors are configured to configure the terminal device to utilize the target network slice to transfer the data for the one or more applications by providing a slice identity for the target network slice to the terminal device.

In Example 1897, the subject matter of any one of Examples 1843 to 1852 can optionally include wherein the one or more processors are configured to configure the terminal device to utilize the target network slice to transfer the data for the one or more applications by providing a radio interface configuration to the terminal device without providing a slice identity for the target network slice to the terminal device, and configuring resources of the target network slice to support transfer of the data.

Example 1898 is a device including means for identifying quality of service (QoS) class assignments of one or more applications of a terminal device, means for selecting from a plurality of service profile keys to identify a service profile key that meets the QoS class assignments of the one or more applications, means for reporting the service profile key to a radio communication network and means receiving a response that identifies a target network slice, and means executing data transfer using the target network slice.

Example 1899 is a method of performing radio communications, the method including identifying quality of service (QoS) class assignments of one or more applications of a terminal device, selecting from a plurality of service profile keys to identify a service profile key that meets the QoS class assignments of the one or more applications, reporting the service profile key to a radio communication network and receiving a response that identifies a target network slice, and executing data transfer using the target network slice.

In Example 1900, the subject matter of Example 1899 can optionally include wherein the QoS class assignments are QoS Class Identifiers (QCIs).

In Example 1901, the subject matter of Example 1899 or 1900 can optionally further include receiving the QoS class assignments from the radio communication network.

In Example 1902, the subject matter of Example 1899 or 1900 can optionally include wherein the QOS class assignments are preprogrammed in the terminal device.

In Example 1903, the subject matter of any one of Examples 1899 to 1902 can optionally include wherein the QoS class assignments indicate a latency requirement, an acceptable packet loss rate requirement, or a bitrate requirement of the one or more applications.

In Example 1904, the subject matter of any one of Examples 1899 to 1903 can optionally further include identifying the one or more applications as one or more applications that are installed on the terminal device or one or more applications that are frequently executed by the terminal device.

In Example 1905, the subject matter of any one of Examples 1899 to 1904 can optionally include wherein reporting the service profile key to the radio communication network includes reporting the service profile key to the radio communication network as part of an initial registration procedure or a registration update procedure.

In Example 1906, the subject matter of any one of Examples 1899 to 1905 can optionally include wherein identifying the QoS class assignments of the one or more applications includes referencing a mapping table that specifies a mapping between applications and QoS class assignments to identify the QoS class assignments of the one or more applications.

In Example 1907, the subject matter of Example 1906 can optionally further include prior to executing data transfer with the target network slice, establishing one or more bearers over the target network slice using the mapping table to determine QoS class assignments for the one or more bearers.

In Example 1908, the subject matter of any one of Examples 1899 to 1907 can optionally further include updating the service profile key to obtain an updated service profile key, reporting the updated service profile key to the radio communication network, receiving a response that indicates a second target network slice of the plurality of network slices, and executing data transfer using the second target network slice.

Example 1909 is a terminal device including one or more processors configured to perform the method of any one of Examples 1899 to 1908

Example 893 is a non-transitory computer readable medium storing instructions that when executed by a controller of a terminal device cause the terminal device to perform the method of any one of Examples 1899 to 1908.

Example 1911 is a non-transitory computer readable medium storing instructions that when executed by a processor cause the processor to perform the method of any one of Examples 1899 to 1908.

Example 1912 is a communication circuit arrangement including one or more processors configured to perform the method of any one of Examples 1899 to 1908.

Example 1913 is a radio communication device including processing circuitry configured to select a service profile key that represents service requirements of one or more applications of a terminal device, report the service profile key to a radio communication network, wherein the radio communication network includes a plurality of network slices, and receive a response that causes the terminal device to utilize a target network slice of the plurality of network slices to transfer data for the one or more applications.

In Example 1914, the subject matter of Example 1913 can optionally be configured as a terminal device and further including a radio transceiver and an antenna.

In Example 1915, the subject matter of Example 1913 can optionally include wherein the processing circuitry includes an application processor configured to execute the one or more applications.

In Example 1916, the subject matter of Example 1913 can optionally include wherein the radio communication device is an electronic component adapted for use in a terminal device.

In Example 1917, the subject matter of any one of Examples 1913 to 1916 can optionally include wherein the processing circuitry is further configured to identify the one or more applications as one or more applications that are installed on the terminal device or one or more applications that are frequently executed by the terminal device.

In Example 1918, the subject matter of any one of Examples 1913 to 1917 can optionally include wherein the service requirements of the one or more applications are Quality of Service (QoS) requirements.

In Example 1919, the subject matter of any one of Examples 1913 to 1918 can optionally include wherein the service requirements include a latency requirement, a reliability requirement, a mobility requirement, a charging requirement, a security requirement, a data rate requirement, a policy control requirement, a power consumption requirement, a battery life requirement, a capacity requirement, or a coverage requirement.

In Example 1920, the subject matter of any one of Examples 1913 to 1919 can optionally include wherein the processing circuitry is configured to selecting the service profile key by identifying the service requirements of the one or more applications of the terminal device, and selecting from a plurality of predefined service profile keys based on the service requirements to obtain the service profile key.

In Example 1921, the subject matter of any one of Examples 1913 to 1920 can optionally include wherein the processing circuitry is further configured to identify a first application of the one or more applications that is executed more often than a second application of the one or more applications, and wherein the processing circuitry is configured to select the service profile key that represents the service requirements of the one or more applications of the terminal device by weighting the service requirements of the first application to a higher degree than the service requirements of the second application when selecting the service profile key.

In Example 1922, the subject matter of any one of Examples 1913 to 1921 can optionally include wherein the processing circuitry is further configured to report the service profile key to the radio communication network by reporting the service profile key to the radio communication network as part of an initial registration with the radio communication network.

In Example 1923, the subject matter of any one of Examples 1913 to 1921 can optionally include wherein the processing circuitry is configured to report the service profile key to the radio communication network by reporting the service profile key to the radio communication network as part of a registration update with the radio communication network.

In Example 1924, the subject matter of Example 1923 can optionally include wherein the registration update is a Tracking Area Update (TAU).

In Example 1925, the subject matter of any one of Examples 1913 to 1924 can optionally include wherein the processing circuitry is configured to select the service profile key by referencing a mapping table that specifies a mapping between applications and service requirements, and identifying the service requirements of the one or more applications based on the mapping table.

In Example 1926, the subject matter of Example 1925 can optionally include wherein the mapping table is predefined.

In Example 1927, the subject matter of Example 1925 can optionally include wherein the processing circuitry is further configured to receive the mapping table from the radio communication network.

In Example 1928, the subject matter of Example 1925 can optionally include wherein the processing circuitry is further configured to establish one or more bearers over the target network slice for the one or more applications using the mapping table.

In Example 1929, the subject matter of any one of Examples 1913 to 1924 can optionally include wherein the processing circuitry is configured to select the service profile key by tallying a respective point count for each of a plurality of network slice dimensions, that correspond to the plurality of network slices, based on the service requirements of the one or more applications, and selecting the service profile key based on which of the respective point counts is the highest.

In Example 1930, the subject matter of Example 1929 can optionally include wherein the respective point counts indicate whether the service requirements of the one or more applications meet predefined criteria of the plurality of network slice dimensions.

In Example 1931, the subject matter of any one of Examples 1913 to 1928 can optionally include wherein the processing circuitry is configured to select the service profile key by selecting the service profile key based on a service optimization target, a cost optimization target, or a power consumption optimization target.

In Example 1932, the subject matter of any one of Examples 1913 to 1931 can optionally include wherein the processing circuitry is further configured to update the service profile key to obtain an updated service profile key, report the updated service profile key to the radio communication network, receive a response that causes the terminal device to utilize a second target network slice of the plurality of network slices to transfer data for the one or more applications.

In Example 1933, the subject matter of any one of Examples 1913 to 1932 can optionally include wherein the processing circuitry is further configured to register with the target network slice and establish one or more bearers with the target network slice.

In Example 1934, the subject matter of Example 1933 can optionally include wherein the processing circuitry is configured to establish the one or more bearers with the target network slice by establishing the one or more bearers based on the service requirements of the one or more applications.

In Example 1935, the subject matter of any one of Examples 1913 to 1934 can optionally include wherein the processing circuitry is further configured to exchange data with one or more data networks with one or more bearers of the target network slice.

In Example 1936, the subject matter of any one of Examples 1913 to 1935 can optionally include wherein the processing circuitry is configured to receive the response that causes the terminal device to utilize the target network slice of the plurality of network slices to transfer data for the one or more applications by receiving a response that identifies the target network slice, and registering with the target network slice.

In Example 1937, the subject matter of Example 1936 can optionally include wherein the response indicates a radio interface configuration corresponding to the target network slice, the method further including transmitting or receiving the data for the one or more applications according to the radio interface configuration.

In Example 1938, the subject matter of any one of Examples 1913 to 1935 can optionally include wherein the processing circuitry is configured to receive the response that causes the terminal device to utilize the target network slice of the plurality of network slices to transfer data for the one or more applications by receiving a response that indicates a radio interface configuration, and transmitting or receiving the data for the one or more applications according to the radio interface configuration.

In Example 1939, the subject matter of Example 1938 can optionally include wherein the radio interface configuration corresponds to the target network slice.

Example 1940 is a radio communication device including processing circuitry configured to receive a service profile key from a terminal device that indicates service requirements of one or more applications of the terminal device, select a target network slice from a plurality of network slices based on the service profile key, wherein the plurality of network slices provide different service characteristics, and configure the terminal device to utilize the target network slice to transfer data for the one or more applications.

In Example 1941, the subject matter of Example 1940 can optionally be configured as a server or cloud computing processor of a core network.

In Example 1942, the subject matter of Example 1940 can optionally include wherein a first network slice of the plurality of network slices has a different latency, a different packet loss rate, or a different bitrate than a second network slice of the plurality of network slices.

In Example 1943, the subject matter of Example 1940 can optionally include wherein the plurality of network slices have different latencies, different packet loss rates, or different bitrates and wherein the service profile key indicates a latency requirement, an acceptable packet loss rate requirement, or a bitrate requirement of the one or more applications, and wherein the processing circuitry is configured to select the target network slice from the plurality of network slices includes selecting a network slice that meets the service requirements indicated by the service profile key.

In Example 1944, the subject matter of any one of Examples 1940 to 1943 can optionally include wherein the processing circuitry is configured to select the target network slice from the plurality of network slices based on the service profile key by comparing the service requirements indicated by the service profile key to the different service characteristics of the plurality of network slices, and selecting a network slice from the plurality of network slices that meets the service requirements indicated by the service profile key.

In Example 1945, the subject matter of any one of Examples 1940 to 1944 can optionally include wherein the plurality of network slices are logically separate end-to-end networks that are implemented on a radio communication network.

In Example 1946, the subject matter of any one of Examples 1940 to 1945 can optionally include wherein the processing circuitry is configured to receive the service profile key from the terminal device by receiving the service profile key as part of signaling for an initial registration of the terminal device with the radio communication network.

In Example 1947, the subject matter of any one of Examples 1940 to 1946 can optionally include wherein the processing circuitry is configured to receive the service profile key from the terminal device by receiving the service profile key as part of signaling for a registration update of the terminal device with the radio communication network.

In Example 1948, the subject matter of any one of Examples 1940 to 1947 can optionally include the processing circuitry further configured to provide a mapping table to the terminal device that specifies a mapping between applications and service requirements to the terminal device.

In Example 1949, the subject matter of any one of Examples 1940 to 1948 can optionally include the processing circuitry further configured to establish bearers for the one or more applications on the target network slice.

In Example 1950, the subject matter of any one of Examples 1940 to 1949 can optionally include wherein each of the one or more applications has specific service requirements, the processing circuitry further configured to establish one or more bearers for the one or more applications based on the specific service requirements of the one or more applications.

In Example 1951, the subject matter of any one of Examples 1940 to 1950 can optionally include wherein the processing circuitry is configured to configure the terminal device to utilize the target network slice to transfer the data for the one or more applications by providing a slice identity for the target network slice to the terminal device.

In Example 1952, the subject matter of any one of Examples 1940 to 1950 can optionally include wherein the processing circuitry is configured to configure the terminal device to utilize the target network slice to transfer the data for the one or more applications by providing a radio interface configuration to the terminal device without providing a slice identity for the target network slice to the terminal device, and configuring resources of the target network slice to support transfer of the data.

Example 1953 is a terminal device including means for receiving, from a radio communication network, a mapping of Quality of Service (QoS) class assignments for one or more applications of the terminal device, means for identifying a first application of the one or more applications that is requesting a data connection to the radio communication network, means for selecting a QoS class assignment for the first application based on the mapping of the QoS class assignments, and means for establishing, with the radio communication network, a data connection for the first application according to the QoS class assignment for the first application.

Example 1954 is a method of performing radio communications at a terminal device, the method including receiving, from a radio communication network, a mapping of Quality of Service (QoS) class assignments for one or more applications of the terminal device, identifying a first application of the one or more applications that is requesting a data connection to the radio communication network, selecting a QoS class assignment for the first application based on the mapping of the QoS class assignments, and establishing, with the radio communication network, a data connection for the first application according to the QoS class assignment for the first application.

In Example 1955, the subject matter of Example 1954 can optionally include wherein the one or more applications are executable by an operating system of the terminal device, and wherein identifying the first application of the one or more applications that is requesting the data connection to the radio communication network includes identifying the first application based on an application identifier specific to the operating system.

In Example 1956, the subject matter of Example 1954 or 1955 can optionally include wherein selecting the QoS class assignment for the first application based on the mapping of QoS class assignments includes selecting the QoS class assignment for the first application based on the mapping of QoS class assignments instead of a default QoS class assignment provided by the first application.

In Example 1957, the subject matter of any one of Examples 1954 to 1956 can optionally include wherein receiving the mapping of QoS class assignments for the one or more applications of the terminal device includes receiving the mapping of QoS class assignments from the radio communication network in an Open Mobile Alliance (OMA) Managed Object (MO) format.

In Example 1958, the subject matter of any one of Examples 1954 to 1957 can optionally include wherein the QoS class assignments of the mapping are QoS class assignments of a radio communication standard.

In Example 1959, the subject matter of Example 1958 can optionally include wherein the QoS class assignments are QoS Class Identifiers (QCIs) of a Long Term Evolution (LTE) standard.

In Example 1960, the subject matter of any one of Examples 1954 to 1957 can optionally include wherein the QoS class assignments of the mapping are different from standardized QoS class assignments associated with a radio access technology associated with the radio communication network.

In Example 1961, the subject matter of any one of Examples 1954 to 1957 can optionally include wherein the QoS class assignments of the mapping are specific to an operator of the radio communication network.

In Example 1962, the subject matter of any one of Examples 1954 to 1957 can optionally include wherein the mapping of QoS class assignments for the one or more applications depends on an optimization target of the terminal device.

In Example 1963, the subject matter of Example 1962 can optionally include wherein the optimization target is a service optimization target, a cost optimization target, or a battery usage optimization target.

In Example 1964, the subject matter of Example 1962 or 1963 can optionally include wherein one or more QoS properties of the data connection depend on the optimization target.

In Example 1965, the subject matter of any one of Examples 1954 to 1964 can optionally include wherein establishing the data connection for the first application according to the QoS class assignment includes establishing a dedicated bearer for the first application based on the QoS class assignment.

In Example 1966, the subject matter of any one of Examples 1954 to 1964 can optionally include wherein establishing the data connection for the first application according to the QoS class assignment includes requesting a dedicated bearer for the first application from the radio communication network that is assigned the QoS class assignment.

In Example 1967, the subject matter of any one of Examples 1954 to 1966 can optionally further include executing transfer of data for the first application on the data connection.

In Example 1968, the subject matter of any one of Examples 1954 to 1967 can optionally further include receiving user input from a user of the terminal device that specifies an alternate mapping of QoS class assignments for the one or more applications, and establishing a data connection for a second application of the one or more applications based on the alternate mapping of QoS class assignments.

In Example 1969, the subject matter of any one of Examples 1954 to 1967 can optionally further include receiving user input from a user of the terminal device that specifies an alternate mapping of QoS class assignments for the one or more applications, identifying a second application of the one or more applications that is requesting a data connection, selecting an alternate QoS class assignment for the second application based on the alternate mapping of QoS class assignment instead of the mapping of QoS class assignments, and establishing, with the radio communication network, a data connection for the second application based on the alternate QoS class assignment.

In Example 1970, the subject matter of any one of Examples 1954 to 1967 can optionally further include receiving user input from a user of the terminal device that specifies an alternate mapping of QoS class assignments for the one or more applications, identifying a second application of the one or more applications that is requesting a data connection, selecting a QoS class assignment for the second application based on the mapping of QoS class assignment instead of the alternate mapping of QoS class assignments, and establishing, with the radio communication network, a data connection for the second application based on the QoS class assignment for the second application.

Example 1971 is a terminal device including one or more processors configured to perform the method of any one of Examples 1954 to 1970.

Example 1972 is a circuit arrangement configured to perform the method of any one of Examples 1954 to 1970.

Example 1973 is a non-transitory computer readable medium storing instructions that when executed by a processor cause the processor to perform the method of any one of Examples 1954 to 1970.

Example 1974 is a non-transitory computer readable medium storing instructions that when executed by one or more processors of a terminal device cause the terminal device to perform the method of any one of Examples 1954 to 1970.

Example 1975 is a radio communication device including one or more processors configured to receive, from a radio communication network, a mapping of Quality of Service (QoS) class assignments for one or more applications of the radio communication device, identify a first application of the one or more applications that is requesting a data connection to the radio communication network, select a QoS class assignment for the first application based on the mapping of the QoS class assignments, and establish, with the radio communication network, a data connection for the first application according to the QoS class assignment for the first application.

In Example 1976, the subject matter of Example 1975 can optionally include wherein an application processor of the one or more processors is configured to identify the first application, select the QoS class assignment for the first application, and request for a baseband modem of the one or more processors to establish the data connection for the first application with the QoS class assignment for the first application.

In Example 1977, the subject matter of Example 1976 can optionally include wherein the baseband modem is configured receive the request from the application processor and to establish the data connection for the first application with the QoS class assignment for the first application.

In Example 1978, the subject matter of Example 1976 or 1977 can optionally include wherein the baseband modem is configured to receive the mapping of QoS class assignment for the one or more applications from the radio communication network and to provide the mapping of QoS class assignments to the application processor.

In Example 1979, the subject matter of any one of Examples 1975 to 1978 can optionally further include a radio transceiver and one or more antennas, and configured as a terminal device for radio communications.

In Example 1980, the subject matter of Example 1979 can optionally include wherein the one or more processors are configured to transmit and receive data as radio signals via the radio transceiver and the one or more antennas.

In Example 1981, the subject matter of any one of Examples 1975 to 1978 can optionally be configured as an electrical component for a terminal device.

In Example 1982, the subject matter of any one of Examples 1975 to 1981 can optionally include wherein the one or more applications are executable by an operating system of the one or more processors, and wherein the one or more processors are configured to identify the first application of the one or more applications that is requesting the data connection to the radio communication network by identifying the first application based on an application identifier specific to the operating system.

In Example 1983, the subject matter of any one of Examples 1975 to 1982 can optionally include wherein the one or more processors are configured to select the QoS class assignment for the first application based on the mapping of QoS class assignments by selecting the QoS class assignment for the first application based on the mapping of QoS class assignments instead of a default QoS class assignment provided by the first application.

In Example 1984, the subject matter of any one of Examples 1975 to 1983 can optionally include wherein the one or more processors are configured to receive the mapping of QoS class assignments for the one or more applications of the terminal device by receiving the mapping of QoS class assignments from the radio communication network in an Open Mobile Alliance (OMA) Managed Object (MO) format.

In Example 1985, the subject matter of any one of Examples 1975 to 1984 can optionally include wherein the QoS class assignments of the mapping are QoS class assignments of a radio communication standard.

In Example 1986, the subject matter of Example 1985 can optionally include wherein the QoS class assignments are QoS Class Identifiers (QCIs) of a Long Term Evolution (LTE) standard.

In Example 1987, the subject matter of any one of Examples 1975 to 1986 can optionally include wherein the QoS class assignments of the mapping are different from standardized QoS class assignments associated with a radio access technology associated with the radio communication network.

In Example 1988, the subject matter of any one of Examples 1975 to 1986 can optionally include wherein the QoS class assignments of the mapping are specific to an operator of the radio communication network.

In Example 1989, the subject matter of any one of Examples 1975 to 1986 can optionally include wherein the mapping of QoS class assignments for the one or more applications depends on an optimization target of the terminal device.

In Example 1990, the subject matter of Example 1989 can optionally include wherein the optimization target is a service optimization target, a cost optimization target, or a battery usage optimization target.

In Example 1991, the subject matter of Example 1989 or 1990 can optionally include wherein one or more QoS properties of the data connection depend on the optimization target.

In Example 1992, the subject matter of any one of Examples 1975 to 1991 can optionally include wherein the one or more processors are configured to establish the data connection for the first application according to the QoS class assignment by establishing a dedicated bearer for the first application based on the QoS class assignment.

In Example 1993, the subject matter of any one of Examples 1975 to 1992 can optionally include wherein the one or more processors are configured to establish the data connection for the first application according to the QoS class assignment by requesting a dedicated bearer for the first application from the radio communication network that is assigned the QoS class assignment.

In Example 1994, the subject matter of any one of Examples 1975 to 1993 can optionally include wherein the one or more processors are further configured to execute transfer of data for the first application on the data connection.

In Example 1995, the subject matter of any one of Examples 1975 to 1994 can optionally include wherein the one or more processors are further configured to receive user input from a user of the terminal device that specifies an alternate mapping of QoS class assignments for the one or more applications, and establish a data connection for a second application of the one or more applications based on the alternate mapping of QoS class assignments.

In Example 1996, the subject matter of any one of Examples 1975 to 1994 can optionally include wherein the one or more processors are further configured to receive user input from a user of the terminal device that specifies an alternate mapping of QoS class assignments for the one or more applications, identify a second application of the one or more applications that is requesting a data connection, select an alternate QoS class assignment for the second application based on the alternate mapping of QoS class assignment instead of the mapping of QoS class assignments, and establish, with the radio communication network, a data connection for the second application based on the alternate QoS class assignment.

In Example 1997, the subject matter of any one of Examples 1975 to 1994 can optionally include wherein the one or more processors are further configured to receive user input from a user of the terminal device that specifies an alternate mapping of QoS class assignments for the one or more applications, identify a second application of the one or more applications that is requesting a data connection, select a QoS class assignment for the second application based on the mapping of QoS class assignment instead of the alternate mapping of QoS class assignments, and establish, with the radio communication network, a data connection for the second application based on the QoS class assignment for the second application.

Example 1998 is a device including means for performing packet inspection on a backhaul interface for a radio access network, means for detecting a data stream for a terminal device based on the packet inspection and means for identifying one or more stream parameters of the first data stream based on the packet inspection, means for determining a stream cost for the first data stream based on the one or more stream parameters, and means for providing the stream cost to the terminal device.

Example 1999 is a method of managing a data stream, the method including performing packet inspection on a backhaul interface for a radio access network, detecting a data stream for a terminal device based on the packet inspection and identifying one or more stream parameters of the first data stream based on the packet inspection, determining a stream cost for the first data stream based on the one or more stream parameters, and providing the stream cost to the terminal device.

In Example 2000, the subject matter of Example 1999 can optionally include wherein performing the packet inspection on the backhaul interface for the radio access network includes performing the packet inspection at a Mobile Edge Computing (MEC) server located on the backhaul interface.

In Example 2001, the subject matter of Example 1999 or 2000 can optionally include wherein the backhaul interface is an interface between the radio access network and a core network.

In Example 2002, the subject matter of any one of Examples 1999 to 2001 can optionally include wherein performing the packet inspection on the backhaul interface for the radio access network includes decrypting data on the backhaul interface according to a tunneling protocol used for the backhaul interface to obtain internet protocol (IP) data, and performing packet inspection on the IP data.

In Example 2003, the subject matter of Example 2002 can optionally include wherein performing the packet inspection on the IP data includes performing plaintext analysis on the IP data.

In Example 2004, the subject matter of Example 2002 can optionally include wherein performing the packet inspection on the IP data includes evaluating IP header data or IP payload data of the IP data.

In Example 2005, the subject matter of any one of Examples 1999 to 2004 can optionally include wherein detecting the data stream for the terminal device based on the packet inspection includes detecting stream traffic or stream control signaling of the data stream on the backhaul interface during the packet inspection.

In Example 2006, the subject matter of any one of Examples 1999 to 2005 can optionally include wherein identifying the one or more stream parameters of the first data stream based on the packet inspection includes identifying a service tier, a video codec, an audio codec, a destination internet protocol (IP) address, a source IP address, an intermediate IP address, a destination Media Access Control (MAC) address, a source MAC address, an intermediate MAC address, a client device identity, a client device type, a stream content provider, an operating system, a browser type, a media stream type, a session protocol, a transport protocol, a media container, a stream resolution, a stream bitrate, a stream quality, a stream length, a stream size, a stream duration, a file size, or a file length as the one or more stream parameters.

In Example 2007, the subject matter of any one of Examples 1999 to 2006 can optionally include wherein providing the stream cost to the terminal device includes providing the stream cost to the terminal device during the duration of the first data stream.

In Example 2008, the subject matter of any one of Examples 1999 to 2007 can optionally include wherein determining the stream cost for the first data stream based on the one or more stream parameters includes calculating the stream cost based on one or more of a stream length, a stream duration, a stream resolution, a stream bitrate, or a stream content provider included in the one or more stream parameters.

In Example 2009, the subject matter of any one of Examples 1999 to 2008 can optionally include wherein determining the stream cost for the first data stream includes requesting charging information of the terminal device from a charging server, and calculating the stream cost based on the charging information and the one or more stream parameters.

In Example 2010, the subject matter of any one of Examples 1999 to 2009 can optionally include wherein the packet inspection is transparent to the terminal device.

In Example 2011, the subject matter of any one of Examples 1999 to 2010 can optionally include wherein providing the stream cost to the terminal device includes providing the stream cost to the terminal device as application layer signaling.

In Example 2012, the subject matter of Example 2011 can optionally include wherein providing the stream cost to the terminal device as application layer signaling includes providing the stream cost to an application of the terminal device that is executing the first data stream.

In Example 2013, the subject matter of any one of Examples 1999 to 2010 can optionally include wherein providing the stream cost to the terminal device includes providing the stream cost to the terminal device as a short message service (SMS) message or a push notification.

In Example 2014, the subject matter of any one of Examples 1999 to 2013 can optionally include wherein providing the stream cost to the terminal device includes providing the stream cost to the terminal device by transmitting the stream cost via the radio access network.

In Example 2015, the subject matter of any one of Examples 1999 to 2014 can optionally include wherein the first data stream is a video stream, an audio stream, an image stream, a multimedia stream, a file download, browser traffic, application traffic, or realtime machine or device control signaling.

In Example 2016, the subject matter of any one of Examples 1999 to 2015 can optionally include wherein the first data stream has a definite duration, and wherein determining the stream cost for the first data stream includes calculating a fixed stream cost of the first data stream based on definite duration.

In Example 2017, the subject matter of Example one can optionally include Examples 1999 to 2015, wherein the first data stream has an indefinite duration, and wherein determining the stream cost for the first data stream includes calculating a floating stream cost of the first stream that indicates a cost per time of receiving the first data stream.

Example 2018 is a communication device including one or more processors configured to perform the method of any one of Examples 1999 to 2017.

Example 2019 is a non-transitory computer readable medium storing instructions that when executed by a processor cause the processor to perform the method of any one of Examples 1999 to 2017.

Example 2020 is an edge computing server including a processor configured to perform the method of any one of Examples 1999 to 2017.

Example 2021 is a communication device including a packet inspection module configured to perform packet inspection on a backhaul interface for a radio access network, detect a data stream for a terminal device based on the packet inspection, and identify stream parameters for the first data stream, and a cost calculation module configured to determine a stream cost for the first data stream based on the stream parameters, and provide the stream cost to the terminal device.

In Example 2022, the subject matter of Example 2021 can optionally be configured as a Mobile Edge Computing (MEC) server.

In Example 2023, the subject matter of Example 2021 can optionally be configured as a device component of a Mobile Edge Computing (MEC) server.

In Example 2024, the subject matter of Example 2021 can optionally include wherein the packet inspection module and the cost calculation module are processors.

In Example 2025, the subject matter of Example 2021 or 2022 can optionally include wherein the backhaul interface is an interface between the radio access network and a core network.

In Example 2026, the subject matter of any one of Examples 2021 to 2025 can optionally include wherein the packet inspection module is configured to perform the packet inspection on the backhaul interface for the radio access network by decrypting data on the backhaul interface according to a tunneling protocol used for the backhaul interface to obtain internet protocol (IP) data, and performing packet inspection on the IP data.

In Example 2027, the subject matter of Example 2026 can optionally include wherein the packet inspection module is configured to perform the packet inspection on the IP data by performing plaintext analysis on the IP data.

In Example 2028, the subject matter of Example 2026 can optionally include wherein the packet inspection module is configured to perform the packet inspection on the IP data by evaluating IP header data or IP payload data of the IP data.

In Example 2029, the subject matter of any one of Examples 2021 to 2028 can optionally include wherein the packet inspection module is configured to detect the data stream for the terminal device based on the packet inspection by detecting stream traffic or stream control signaling of the data stream on the backhaul interface during the packet inspection.

In Example 2030, the subject matter of any one of Examples 2021 to 2029 can optionally include wherein the packet inspection module is configured to identify the one or more stream parameters of the first data stream based on the packet inspection by identifying a service tier, a video codec, an audio codec, a destination internet protocol (IP) address, a source IP address, an intermediate IP address, a destination Media Access Control (MAC) address, a source MAC address, an intermediate MAC address, a client device identity, a client device type, a stream content provider, an operating system, a browser type, a media stream type, a session protocol, a transport protocol, a media container, a stream resolution, a stream bitrate, a stream quality, a stream length, a stream size, a stream duration, a file size, or a file length as the one or more stream parameters.

In Example 2030, the subject matter of any one of Examples 2021 to 2030 can optionally include wherein the cost calculation module is configured to provide the stream cost to the terminal device by providing the stream cost to the terminal device during the duration of the first data stream.

In Example 2032, the subject matter of any one of Examples 2021 to 2031 can optionally include wherein the cost calculation module is configured to determine the stream cost for the first data stream based on the one or more stream parameters by calculating the stream cost based on one or more of a stream length, a stream duration, a stream resolution, a stream bitrate, or a stream content provider included in the one or more stream parameters.

In Example 2033, the subject matter of any one of Examples 2021 to 2032 can optionally include wherein the cost calculation module is configured to determine the stream cost for the first data stream by requesting charging information of the terminal device from a charging server, and calculating the stream cost based on the charging information and the one or more stream parameters.

In Example 2034, the subject matter of any one of Examples 2021 to 2033 can optionally include wherein the packet inspection is transparent to the terminal device.

In Example 2035, the subject matter of any one of Examples 2021 to 2034 can optionally include wherein the cost calculation module is configured to provide the stream cost to the terminal device by providing the stream cost to the terminal device as application layer signaling.

In Example 2036, the subject matter of Example 2035 can optionally include wherein the cost calculation module is configured to provide the stream cost to the terminal device as application layer signaling by providing the stream cost to an application of the terminal device that is executing the first data stream.

In Example 2037, the subject matter of any one of Examples 2021 to 2036 can optionally include wherein the cost calculation module is configured to provide the stream cost to the terminal device includes providing the stream cost to the terminal device as a short message service (SMS) message or a push notification.

In Example 2038, the subject matter of any one of Examples 2021 to 2037 can optionally include wherein the cost calculation module is configured to provide the stream cost to the terminal device by transmitting the stream cost to the terminal device via the radio access network.

In Example 2039, the subject matter of any one of Examples 2021 to 2038 can optionally include wherein the first data stream is a video stream, an audio stream, an image stream, a multimedia stream, a file download, browser traffic, application traffic, or realtime machine or device control signaling.

In Example 2040, the subject matter of any one of Examples 2021 to 2039 can optionally include wherein the first data stream has a definite duration, and wherein the cost calculation module is configured to determine the stream cost for the first data stream by calculating a fixed stream cost of the first data stream based on definite duration.

In Example 2041, the subject matter of any one of Examples 2021 to 2039 can optionally include wherein the first data stream has an indefinite duration, and wherein the cost calculation module is configured to determine the stream cost for the first data stream by calculating a floating stream cost of the first stream that indicates a cost per time of receiving the first data stream.

Example 2042 is a non-transitory computer readable medium storing instructions that when executed by a processor cause the processor to perform a method including performing packet inspection on a backhaul interface for a radio access network, detecting a data stream for a terminal device based on the packet inspection and identifying one or more stream parameters of the first data stream based on the packet inspection, determining a stream cost for the first data stream based on the one or more stream parameters, and providing the stream cost to the terminal device.

In Example 2043, the subject matter of Example 2042 can optionally include wherein performing the packet inspection on the backhaul interface for the radio access network includes performing the packet inspection at a Mobile Edge Computing (MEC) server located on the backhaul interface.

In Example 2044, the subject matter of Example 2042 or 2043 can optionally include wherein the backhaul interface is an interface between the radio access network and a core network.

In Example 2045, the subject matter of any one of Examples 2042 to 2044 can optionally include wherein performing the packet inspection on the backhaul interface for the radio access network includes decrypting data on the backhaul interface according to a tunneling protocol used for the backhaul interface to obtain internet protocol (IP) data, and performing packet inspection on the IP data.

In Example 2046, the subject matter of Example 2045 can optionally include wherein performing the packet inspection on the IP data includes performing plaintext analysis on the IP data.

In Example 2047, the subject matter of Example 2045 can optionally include wherein performing the packet inspection on the IP data includes evaluating IP header data or IP payload data of the IP data.

In Example 2048, the subject matter of any one of Examples 2042 to 2047 can optionally include wherein detecting the data stream for the terminal device based on the packet inspection includes detecting stream traffic or stream control signaling of the data stream on the backhaul interface during the packet inspection.

In Example 2049, the subject matter of any one of Examples 2042 to 2048 can optionally include wherein identifying the one or more stream parameters of the first data stream based on the packet inspection includes identifying a service tier, a video codec, an audio codec, a destination internet protocol (IP) address, a source IP address, an intermediate IP address, a destination Media Access Control (MAC) address, a source MAC address, an intermediate MAC address, a client device identity, a client device type, a stream content provider, an operating system, a browser type, a media stream type, a session protocol, a transport protocol, a media container, a stream resolution, a stream bitrate, a stream quality, a stream length, a stream size, a stream duration, a file size, or a file length as the one or more stream parameters.

In Example 2050, the subject matter of any one of Examples 2042 to 2049 can optionally include wherein providing the stream cost to the terminal device includes providing the stream cost to the terminal device during the duration of the first data stream.

In Example 2051, the subject matter of any one of Examples 2042 to 2050 can optionally include wherein determining the stream cost for the first data stream based on the one or more stream parameters includes calculating the stream cost based on one or more of a stream length, a stream duration, a stream resolution, a stream bitrate, or a stream content provider included in the one or more stream parameters.

In Example 2052, the subject matter of any one of Examples 2042 to 2051 can optionally include wherein determining the stream cost for the first data stream includes requesting charging information of the terminal device from a charging server, and calculating the stream cost based on the charging information and the one or more stream parameters.

In Example 2053, the subject matter of any one of Examples 2042 to 2052 can optionally include wherein the packet inspection is transparent to the terminal device.

In Example 2054, the subject matter of any one of Examples 2042 to 2053 can optionally include wherein providing the stream cost to the terminal device includes providing the stream cost to the terminal device as application layer signaling.

In Example 2055, the subject matter of Example 2054 can optionally include wherein providing the stream cost to the terminal device as application layer signaling includes providing the stream cost to an application of the terminal device that is executing the first data stream.

In Example 2056, the subject matter of any one of Examples 2042 to 2053 can optionally include wherein providing the stream cost to the terminal device includes providing the stream cost to the terminal device as a short message service (SMS) message or a push notification.

In Example 2057, the subject matter of any one of Examples 2042 to 2056 can optionally include wherein providing the stream cost to the terminal device includes providing the stream cost to the terminal device by transmitting the stream cost via the radio access network.

In Example 2058, the subject matter of any one of Examples 2042 to 2057 can optionally include wherein the first data stream is a video stream, an audio stream, an image stream, a multimedia stream, a file download, browser traffic, application traffic, or realtime machine or device control signaling.

In Example 2059, the subject matter of any one of Examples 2042 to 2058 can optionally include wherein the first data stream has a definite duration, and wherein determining the stream cost for the first data stream includes calculating a fixed stream cost of the first data stream based on definite duration.

In Example 2060, the subject matter of any one of Examples 2042 to 2058 can optionally include wherein the first data stream has an indefinite duration, and wherein determining the stream cost for the first data stream includes calculating a floating stream cost of the first stream that indicates a cost per time of receiving the first data stream.

Example 2061 is a computing server adapted for use in radio communications, the computing server including one or more processors configured to perform packet inspection on a backhaul interface for a radio access network to detect a data stream of a first terminal device, receive charging information for the terminal device from a charging server, calculate a stream cost of the terminal device based on the charging information and one or more parameters of the data stream, and provide the stream cost to the terminal device.

In Example 2062, the subject matter of Example 2061 can optionally include wherein the one or more processors are configured to perform the packet inspection on the backhaul interface by decrypting tunneling packets on the backhaul interface according to a tunneling protocol used by the backhaul interface to obtain internet protocol (IP) packets, and detecting the data stream based on an analysis of IP header data and IP payload data of the IP packets.

In Example 2063, the subject matter of Example 2062 can optionally include the one or more processors further configured to identify the one or more parameters of the data stream based on the analysis of the IP header data and the IP payload data.

In Example 2064, the subject matter of any one of Examples 2061 to 2063 can optionally include wherein the one or more parameters of the data stream include a service tier, a video codec, an audio codec, a destination internet protocol (IP) address, a source IP address, an intermediate IP address, a destination Media Access Control (MAC) address, a source MAC address, an intermediate MAC address, a client device identity, a client device type, a stream content provider, an operating system, a browser type, a media stream type, a session protocol, a transport protocol, a media container, a stream resolution, a stream bitrate, a stream quality, a stream length, a stream size, a stream duration, a file size, or a file length.

In Example 2065, the subject matter of any one of Examples 2061 to 2064 can optionally include wherein the one or more processors are further configured to determine an identity of the terminal device based on the packet inspection, and request the charging information for terminal device from the charging server with the identity of the terminal device.

In Example 2066, the subject matter of any one of Examples 2061 to 2065 can optionally include wherein the one or more processors are configured to provide the stream cost to the terminal device by providing the stream cost to the terminal device as application layer signaling.

In Example 2067, the subject matter of Example 2066 can optionally include wherein the one or more processors are configured to provide the stream cost to the terminal device as application layer signaling by providing the stream cost to an application of the terminal device that is executing the first data stream.

In Example 2068, the subject matter of any one of Examples 2061 to 2065 can optionally include wherein the one or more processors are configured to provide the stream cost to the terminal device by providing the stream cost to the terminal device as a short message service (SMS) message or a push notification.

In Example 2069, the subject matter of any one of Examples 2061 to 2068 can optionally include wherein the one or more processors are configured to provide the stream cost to the terminal device by providing the stream cost to the terminal device by transmitting the stream cost via the radio access network.

In Example 2070, the subject matter of any one of Examples 2061 to 2069 can optionally include wherein the first data stream is a video stream, an audio stream, an image stream, a multimedia stream, a file download, browser traffic, application traffic, or realtime machine or device control signaling.

In Example 2071, the subject matter of any one of Examples 2061 to 2070 can optionally include wherein the one or more processors are configured to provide the stream cost to the terminal device by providing the stream cost to the terminal device during the duration of the first data stream.

In Example 2072, the subject matter of any one of Examples 2061 to 2071 can optionally be configured as a Mobile Edge Computing (MEC) server.

Example 2073 is a device including means for performing packet inspection on a backhaul interface for a radio access network to detect a data stream of a first terminal device, means for receiving charging information for the terminal device from a charging server, means for calculating a stream cost of the terminal device based on the charging information and one or more parameters of the data stream, and means for providing the stream cost to the terminal device.

Example 2074 is a method of managing a data stream, the method including performing packet inspection on a backhaul interface for a radio access network to detect a data stream of a first terminal device, receiving charging information for the terminal device from a charging server, calculating a stream cost of the terminal device based on the charging information and one or more parameters of the data stream, and providing the stream cost to the terminal device.

In Example 2075, the subject matter of Example 2074 can optionally include wherein performing the packet inspection on the backhaul interface includes decrypting tunneling packets on the backhaul interface according to a tunneling protocol used by the backhaul interface to obtain internet protocol (IP) packets, and detecting the data stream based on an analysis of IP header data and IP payload data of the IP packets.

In Example 2076, the subject matter of Example 2075 can optionally further include identifying the one or more parameters of the data stream based on the analysis of the IP header data and the IP payload data.

In Example 2077, the subject matter of any one of Examples 2074 to 2076 can optionally include wherein the one or more parameters of the data stream include a service tier, a video codec, an audio codec, a destination internet protocol (IP) address, a source IP address, an intermediate IP address, a destination Media Access Control (MAC) address, a source MAC address, an intermediate MAC address, a client device identity, a client device type, a stream content provider, an operating system, a browser type, a media stream type, a session protocol, a transport protocol, a media container, a stream resolution, a stream bitrate, a stream quality, a stream length, a stream size, a stream duration, a file size, or a file length.

In Example 2078, the subject matter of any one of Examples 2074 to 2077 can optionally further include determining an identity of the terminal device based on the packet inspection, and requesting the charging information for terminal device from the charging server with the identity of the terminal device.

In Example 2079, the subject matter of any one of Examples 2074 to 2078 can optionally include wherein providing the stream cost to the terminal device includes providing the stream cost to the terminal device as application layer signaling.

In Example 2080, wherein providing the stream cost to the terminal device as application layer signaling includes providing the stream cost to an application of the terminal device that is executing the first data stream.

In Example 2081, the subject matter of any one of Examples 2074 to 2078 can optionally include wherein providing the stream cost to the terminal device includes providing the stream cost to the terminal device as a short message service (SMS) message or a push notification.

In Example 2082, the subject matter of any one of Examples 2074 to 2078 can optionally include wherein providing the stream cost to the terminal device includes providing the stream cost to the terminal device by transmitting the stream cost via the radio access network.

In Example 2083, the subject matter of any one of Examples 2074 to 2082 can optionally include wherein the first data stream is a video stream, an audio stream, an image stream, a multimedia stream, a file download, browser traffic, application traffic, or realtime machine or device control signaling.

In Example 2084, the subject matter of any one of Examples 2074 to 2083 can optionally include wherein providing the stream cost to the terminal device includes providing the stream cost to the terminal device during the duration of the first data stream.

Example 2085 is a communication device including a packet inspection circuit configured to perform packet inspection on a backhaul interface for a radio access network, detect a data stream for a terminal device based on the packet inspection, and identify stream parameters for the first data stream, and a cost calculation circuit configured to determine a stream cost for the first data stream based on the stream parameters, and provide the stream cost to the terminal device.

In Example 2086, the subject matter of Example 2085 can optionally be configured as a Mobile Edge Computing (MEC) server.

In Example 2087, the subject matter of Example 2085 can optionally be configured as a device component of a Mobile Edge Computing (MEC) server.

In Example 2088, the subject matter of Example 2085 can optionally include wherein the packet inspection circuit and the cost calculation circuit are hardware-defined circuitry or software-defined circuitry.

In Example 2089, the subject matter of Example 2085 or 2086 can optionally include wherein the backhaul interface is an interface between the radio access network and a core network.

In Example 2090, the subject matter of any one of Examples 2085 to 2089 can optionally include wherein the packet inspection circuit is configured to perform the packet inspection on the backhaul interface for the radio access network by decrypting data on the backhaul interface according to a tunneling protocol used for the backhaul interface to obtain internet protocol (IP) data, and performing packet inspection on the IP data.

In Example 2091, the subject matter of Example 2090 can optionally include wherein the packet inspection circuit is configured to perform the packet inspection on the IP data by performing plaintext analysis on the IP data.

In Example 2092, the subject matter of Example 2090 can optionally include wherein the packet inspection circuit is configured to perform the packet inspection on the IP data by evaluating IP header data or IP payload data of the IP data.

In Example 2093, the subject matter of any one of Examples 2085 to 2092 can optionally include wherein the packet inspection circuit is configured to detect the data stream for the terminal device based on the packet inspection by detecting stream traffic or stream control signaling of the data stream on the backhaul interface during the packet inspection.

In Example 2094, the subject matter of any one of Examples 2085 to 2093 can optionally include wherein the packet inspection circuit is configured to identify the one or more stream parameters of the first data stream based on the packet inspection by identifying a service tier, a video codec, an audio codec, a destination internet protocol (IP) address, a source IP address, an intermediate IP address, a destination Media Access Control (MAC) address, a source MAC address, an intermediate MAC address, a client device identity, a client device type, a stream content provider, an operating system, a browser type, a media stream type, a session protocol, a transport protocol, a media container, a stream resolution, a stream bitrate, a stream quality, a stream length, a stream size, a stream duration, a file size, or a file length as the one or more stream parameters.

In Example 2095, the subject matter of any one of Examples 2085 to 2094 can optionally include wherein the cost calculation circuit is configured to provide the stream cost to the terminal device by providing the stream cost to the terminal device during the duration of the first data stream.

In Example 2096, the subject matter of any one of Examples 2085 to 2095 can optionally include wherein the cost calculation circuit is configured to determine the stream cost for the first data stream based on the one or more stream parameters by calculating the stream cost based on one or more of a stream length, a stream duration, a stream resolution, a stream bitrate, or a stream content provider included in the one or more stream parameters.

In Example 2097, the subject matter of any one of Examples 2085 to 2096 can optionally include wherein the cost calculation circuit is configured to determine the stream cost for the first data stream by requesting charging information of the terminal device from a charging server, and calculating the stream cost based on the charging information and the one or more stream parameters.

In Example 2098, the subject matter of any one of Examples 2085 to 2097 can optionally include wherein the packet inspection is transparent to the terminal device.

In Example 2099, the subject matter of any one of Examples 2085 to 2098 can optionally include wherein the cost calculation circuit is configured to provide the stream cost to the terminal device by providing the stream cost to the terminal device as application layer signaling.

In Example 2100, the subject matter of Example 2099 can optionally include wherein the cost calculation circuit is configured to provide the stream cost to the terminal device as application layer signaling by providing the stream cost to an application of the terminal device that is executing the first data stream.

In Example 2101, the subject matter of any one of Examples 2085 to 2100 can optionally include wherein the cost calculation circuit is configured to provide the stream cost to the terminal device includes providing the stream cost to the terminal device as a short message service (SMS) message or a push notification.

In Example 2102, the subject matter of any one of Examples 2085 to 2101 can optionally include wherein the cost calculation circuit is configured to provide the stream cost to the terminal device by transmitting the stream cost to the terminal device via the radio access network.

In Example 2103, the subject matter of any one of Examples 2085 to 2102 can optionally include wherein the first data stream is a video stream, an audio stream, an image stream, a multimedia stream, a file download, browser traffic, application traffic, or realtime machine or device control signaling.

In Example 2104, the subject matter of any one of Examples 2085 to 2103 can optionally include wherein the first data stream has a definite duration, and wherein the cost calculation circuit is configured to determine the stream cost for the first data stream by calculating a fixed stream cost of the first data stream based on definite duration.

In Example 2105, the subject matter of any one of Examples 2085 to 2103 can optionally include wherein the first data stream has an indefinite duration, and wherein the cost calculation circuit is configured to determine the stream cost for the first data stream by calculating a floating stream cost of the first stream that indicates a cost per time of receiving the first data stream.

Example 2106 is a computing server adapted for use in radio communications, the computing server including processing circuitry configured to perform packet inspection on a backhaul interface for a radio access network to detect a data stream of a first terminal device, receive charging information for the terminal device from a charging server, calculate a stream cost of the terminal device based on the charging information and one or more parameters of the data stream, and provide the stream cost to the terminal device.

In Example 2107, the subject matter of Example 2106 can optionally include wherein the processing circuitry is configured to perform the packet inspection on the backhaul interface by decrypting tunneling packets on the backhaul interface according to a tunneling protocol used by the backhaul interface to obtain internet protocol (IP) packets, and detecting the data stream based on an analysis of IP header data and IP payload data of the IP packets.

In Example 2108, the subject matter of Example 2107 can optionally include the processing circuitry further configured to identify the one or more parameters of the data stream based on the analysis of the IP header data and the IP payload data.

In Example 2109, the subject matter of any one of Examples 2106 to 2108 can optionally include wherein the one or more parameters of the data stream include a service tier, a video codec, an audio codec, a destination internet protocol (IP) address, a source IP address, an intermediate IP address, a destination Media Access Control (MAC) address, a source MAC address, an intermediate MAC address, a client device identity, a client device type, a stream content provider, an operating system, a browser type, a media stream type, a session protocol, a transport protocol, a media container, a stream resolution, a stream bitrate, a stream quality, a stream length, a stream size, a stream duration, a file size, or a file length.

In Example 2110, the subject matter of any one of Examples 2106 to 2109 can optionally include wherein the processing circuitry is further configured to determine an identity of the terminal device based on the packet inspection, and request the charging information for terminal device from the charging server with the identity of the terminal device.

In Example 2111, the subject matter of any one of Examples 2106 to 2110 can optionally include wherein the processing circuitry is configured to provide the stream cost to the terminal device by providing the stream cost to the terminal device as application layer signaling.

In Example 2112, the subject matter of Example 2111 can optionally include wherein the processing circuitry is configured to provide the stream cost to the terminal device as application layer signaling by providing the stream cost to an application of the terminal device that is executing the first data stream.

In Example 2113, the subject matter of any one of Examples 2106 to 2110 can optionally include wherein the processing circuitry is configured to provide the stream cost to the terminal device by providing the stream cost to the terminal device as a short message service (SMS) message or a push notification.

In Example 2114, the subject matter of any one of Examples 2106 to 2113 can optionally include wherein the processing circuitry is configured to provide the stream cost to the terminal device by providing the stream cost to the terminal device by transmitting the stream cost via the radio access network.

In Example 2115, the subject matter of any one of Examples 2106 to 2114 can optionally include wherein the first data stream is a video stream, an audio stream, an image stream, a multimedia stream, a file download, browser traffic, application traffic, or realtime machine or device control signaling.

In Example 2116, the subject matter of any one of Examples 2106 to 2115 can optionally include wherein the processing circuitry is configured to provide the stream cost to the terminal device by providing the stream cost to the terminal device during the duration of the first data stream.

In Example 2117, the subject matter of any one of Examples 2106 to 2116 can optionally be configured as a Mobile Edge Computing (MEC) server.

Example 2118 is a terminal device including means for monitoring a remaining battery power of the terminal device, means for determining that the remaining battery power has fallen below a first threshold, means for selecting a first network service from a predefined set of network services and means for interrupting the first network service by reporting the first network service to a radio communication network, means for determining that the remaining battery power has fallen below a second threshold that is less than the first threshold, and means for selecting a second network service from the predefined set of network services with a higher priority than the first network service, and means for interrupting the second network service by reporting the second network service to the radio communication network.

Example 2119 is a method of performing radio communications at a terminal device, the method including monitoring a remaining battery power of the terminal device, determining that the remaining battery power has fallen below a first threshold, selecting a first network service from a predefined set of network services and interrupting the first network service by reporting the first network service to a radio communication network, determining that the remaining battery power has fallen below a second threshold that is less than the first threshold, and selecting a second network service from the predefined set of network services with a higher priority than the first network service, and interrupting the second network service by reporting the second network service to the radio communication network.

In Example 2120, the subject matter of Example 2119 can optionally include wherein the predefined set of network services each have a predefined priority.

In Example 2121, the subject matter of Example 2119 or 2120 can optionally include wherein the predefined set of network services is a predefined set of network services including one or more of voice services, Short Message Service (SMS) services, Internet Protocol (IP) messaging services, or IP data services.

In Example 2122, the subject matter of any one of Examples 2119 to 2121 can optionally further include identifying a quality of service (QoS) class of the first network service, wherein reporting the first network service to the radio communication network includes providing the QoS class of the first network service to the radio communication network.

In Example 2123, the subject matter of any one of Examples 2119 to 2122 can optionally further include receiving user input that indicates a priority service period during which battery power is requested, providing the priority service period to the radio communication network, and resuming the first network service after the priority service period has expired.

In Example 2124, the subject matter of any one of Examples 2119 to 2122 can optionally further include after interrupting the second network service, receiving user input that requests for the first network service and the second network service to be resumed, and instructing the radio communication service to resume the first network service and the second network service.

In Example 2125, the subject matter of any one of Examples 2119 to 2122 can optionally further include determining that the terminal device is charging, instructing the radio communication network to resume the first network service and the second network service, and resuming the first network service and the second network service with the radio communication network.

In Example 2126, the subject matter of any one of Examples 2119 to 2122 can optionally further include before determining that the remaining battery power has fallen below the first threshold, receiving a user input request to preserve battery power for a priority service period, reporting the priority service period to the radio communication network, and resuming the first network service and the second network service over the radio communication network after the priority service period has expired.

In Example 2127, the subject matter of any one of Examples 2119 to 2122 can optionally further include before determining that the remaining battery power has fallen below the first threshold, receiving user input that identifies a third network service of the predefined set of network services as a priority service, and continuing to perform the third network service when the remaining battery power falls below a third threshold associated with the third network service.

In Example 2128, the subject matter of any one of Examples 2119 to 2127 can optionally include wherein the predefined set of network services is are arranged in a hierarchy that is set by a user.

Example 2129 is a radio communication device including one or more processors configured to perform the method of any one of Examples 2119 to 2128.

Example 2130 is a communication device including one or more processors configured to perform the method of any one of Examples 2119 to 2128.

Example 2131 is a non-transitory computer readable medium storing instructions that when executed by a controller of a terminal device cause the terminal device to perform the method of any one of Examples 2119 to 2128.

Example 2132 is a non-transitory computer readable medium storing instructions that when executed by a processor cause the processor to perform the method of any one of Examples 2119 to 2128.

Example 2133 is a communication device including one or more processors configured to monitor a remaining battery power of the communication device, determine that the remaining battery power has fallen below a first threshold, select a first network service from a predefined set of network services and interrupting the first network service by reporting the first network service to a radio communication network, determine that the remaining battery power has fallen below a second threshold that is less than the first threshold, and select a second network service from the predefined set of network services with a higher priority than the first network service, and interrupting the second network service by reporting the second network service to the radio communication network.

In Example 2134, the subject matter of Example 2133 can optionally be configured as a terminal device and further including a radio transceiver and an antenna.

In Example 2135, the subject matter of Example 2133 or 2134 can optionally be configured as an internal component adapted for use in a terminal device.

In Example 2136, the subject matter of any one of Examples 2133 to 2135 can optionally include wherein the predefined set of network services each have a predefined priority.

In Example 2137, the subject matter of any one of Examples 2133 to 2136 can optionally include wherein the predefined set of network services is a predefined set of network services including one or more of voice services, Short Message Service (SMS) services, Internet Protocol (IP) messaging services, or IP data services.

In Example 2138, the subject matter of any one of Examples 2133 to 2137 can optionally include wherein the one or more processors are further configured to identify a quality of service (QoS) class of the first network service, wherein the one or more processors are configured to report the first network service to the radio communication network by providing the QoS class of the first network service to the radio communication network.

In Example 2139, the subject matter of any one of Examples 2133 to 2138 can optionally include wherein the one or more processors are further configured to receive user input that indicates a priority service period during which battery power is requested, provide the priority service period to the radio communication network, and resume the first network service after the priority service period has expired.

In Example 2140, the subject matter of any one of Examples 2133 to 2138 can optionally include wherein the one or more processors are further configured to after interrupting the second network service, receive user input that requests for the first network service and the second network service to be resumed, and instructing the radio communication service to resume the first network service and the second network service.

In Example 2141, the subject matter of any one of Examples 2133 to 2138 can optionally include wherein the one or more processors are further configured to determine that the terminal device is charging, instruct the radio communication network to resume the first network service and the second network service, and resume the first network service and the second network service with the radio communication network.

In Example 2142, the subject matter of any one of Examples 2133 to 2138 can optionally include wherein the one or more processors are further configured to before determining that the remaining battery power has fallen below the first threshold, receive a user input request to preserve battery power for a priority service period, report the priority service period to the radio communication network, and resume the first network service and the second network service over the radio communication network after the priority service period has expired.

In Example 2143, the subject matter of any one of Examples 2133 to 2138 can optionally include wherein the one or more processors are further configured to before determining that the remaining battery power has fallen below the first threshold, receive user input that identifies a third network service of the predefined set of network services as a priority service, and continue to perform the third network service when the remaining battery power falls below a third threshold associated with the third network service.

In Example 2144, the subject matter of any one of Examples 2133 to 2143 can optionally include wherein the predefined set of network services are arranged in a hierarchy that is set by a user.

Example 2145 is a device including means for receiving user input that identifies a priority service and a period of time during which the priority service is requested, means for interrupting a non-priority service by reporting the non-priority service to a radio access network, means for executing the priority service during the period of time, and means for resuming the non-priority service over the radio access network after the period of time has expired.

Example 2146 is a method of performing radio communications, the method including receiving user input that identifies a priority service and a period of time during which the priority service is requested, interrupting a non-priority service by reporting the non-priority service to a radio access network, executing the priority service during the period of time, and resuming the non-priority service over the radio access network after the period of time has expired.

In Example 2147, the subject matter of Example 2146 can optionally include wherein the priority service and the non-priority service are selected from a group consisting of a voice service, a Short Message Service (SMS) service, an Internet Protocol (IP) messaging service, or an IP data service.

In Example 2148, the subject matter of Example 2146 or 2147 can optionally include wherein executing the priority service during the period of time includes performing the priority service over the radio access network during the period of time.

In Example 2149, the subject matter of Example 2146 or 2147 can optionally include wherein executing the priority service during the period of time includes performing the priority service offline.

In Example 2150, the subject matter of any one of Examples 2146 to 2149 can optionally further include monitoring a remaining battery power, determining that the remaining battery power has fallen below a threshold, and interrupting a second non-priority service by reporting the second non-priority service to the radio access network.

In Example 2151, the subject matter of Example 2150 can optionally further include resuming the second non-priority service after the period of time has expired.

In Example 2152, the subject matter of any one of Examples 2146 to 2151 can optionally further include identifying a quality of service (QoS) class of the non-priority service, wherein interrupting the non-priority service by reporting the non-priority service to the radio access network includes providing the QoS class of the non-priority service to the radio access network.

Example 2153 A radio communication device including one or more processors configured to perform the method of any one of Examples 2146 to 2151.

Example 2154 is a non-transitory computer readable medium storing instructions that when executed by a controller of a terminal device cause the terminal device to perform the method of any one of Examples 2146 to 2151.

Example 2155 is a non-transitory computer readable medium storing instructions that when executed by a processor cause the processor to perform the method of any one of Examples 2146 to 2151.

Example 2156 is a communication device including one or more processors configured to receive user input that identifies a priority service and a period of time during which the priority service is requested, interrupt a non-priority service by reporting the non-priority service to a radio access network, execute the priority service during the period of time, and resume the non-priority service over the radio access network after the period of time has expired.

In Example 2157, the subject matter of Example 2156 can optionally be configured as a terminal device and further including a radio transceiver and an antenna.

In Example 2158, the subject matter of Example 2156 or 2157 can optionally be configured as an internal component adapted for use in a terminal device.

In Example 2159, the subject matter of any one of Examples 2156 to 2158 can optionally include wherein the priority service and the non-priority service are selected from a group consisting of a voice service, a Short Message Service (SMS) service, an Internet Protocol (IP) messaging service, or an IP data service.

In Example 2160, the subject matter of any one of Examples 2156 to 2159 can optionally include wherein the one or more processors are configured to execute the priority service during the period of time by performing the priority service over the radio access network during the period of time.

In Example 2161, the subject matter of any one of Examples 2156 to 2160 can optionally include wherein the one or more processors are configured to execute the priority service during the period of time by performing the priority service offline.

In Example 2162, the subject matter of any one of Examples 2156 to 2161 can optionally include the one or more processors further configured to monitor a remaining battery power, determine that the remaining battery power has fallen below a threshold, and interrupt a second non-priority service by reporting the second non-priority service to the radio access network.

In Example 2163, the subject matter of Example 2162 can optionally include the one or more processors further configured to resume the second non-priority service after the period of time has expired.

In Example 2164, the subject matter of any one of Examples 2156 to 2163 can optionally include the one or more processors further configured to identify a quality of service (QoS) class of the non-priority service, wherein the one or more processors are configured to interrupt the non-priority service by reporting the non-priority service to the radio access network by providing the QoS class of the non-priority service to the radio access network.

Example 2165 is a communication device including one or more processors configured to execute a non-priority service with a terminal device over a radio access network, receive an instruction to interrupt execution of the non-priority service for a period of time, filter incoming data from a backhaul interface addressed to the terminal device to identify non-priority service data associated with the non-priority service, and suspend or limit transmittal of the non-priority service data to the terminal device during the period of time.

In Example 2166, the subject matter of Example 2165 can optionally be configured as a network access node and further including a radio transceiver.

In Example 2167, the subject matter of Example 2165 can optionally be configured as a component adapted for use in a network access node.

In Example 2168, the subject matter of any one of Examples 2165 to 2167 can optionally include the one or more processors further configured to receive an instruction from the terminal device to resume execution of the non-priority service prior to the end of the period of time, and resume execution of the non-priority service with the terminal device prior to the end of the period of time.

In Example 2169, the subject matter of any one of Examples 2165 to 2167 can optionally include the one or more processors further configured to suspend or limit transmittal of the non-priority service data to the terminal device for the entirety of the period of time.

In Example 2170, the subject matter of any one of Examples 2165 to 2167 can optionally include wherein the one or more processors is configured to suspend or limit transmittal of the non-priority service data to the terminal device during the period of time by buffering the non-priority service data until the period of time has expired, and transmitting the non-priority service data to the terminal device.

In Example 2171, the subject matter of any one of Examples 2165 to 2167 can optionally include wherein the one or more processors are configured to suspend or limit transmittal of the non-priority service data to the terminal device during the period of time by buffering the non-priority service data until the buffered non-priority service data is larger than a size threshold, and transmitting the buffered non-priority service data to the terminal device.

In Example 2172, the subject matter of any one of Examples 2165 to 2171 can optionally include wherein the one or more processors are configured to filter the incoming data from the backhaul interface addressed to the terminal device to identify the non-priority service data associated with the non-priority service by identifying a quality of service (QoS) class of the non-priority service, and identifying incoming data addressed to the terminal device that has the QoS class as the non-priority service data associated with the non-priority service.

In Example 2173, the subject matter of any one of Examples 2165 to 2171 can optionally include the one or more processors further configured to receive an instruction to interrupt execution of a second non-priority service, filter incoming data from the backhaul interface addressed to the terminal device to identify second non-priority service data associated with the second non-priority service, and suspend or limit transmittal of the second non-priority service data to the terminal device.

Example 2174 is a non-transitory computer readable medium storing instructions that when executed by a controller of a terminal device cause the terminal device to perform a method including receiving user input that identifies a priority service and a period of time during which the priority service is requested, interrupting a non-priority service by reporting the non-priority service to a radio access network, executing the priority service during the period of time, and resuming the non-priority service over the radio access network after the period of time has expired.

In Example 2175, the subject matter of Example 2174 can optionally include wherein the priority service and the non-priority service are selected from a group consisting of a voice service, a Short Message Service (SMS) service, an Internet Protocol (IP) messaging service, or an IP data service.

In Example 2176, the subject matter of Example 2174 or 2175 can optionally include wherein executing the priority service during the period of time includes performing the priority service over the radio access network during the period of time.

In Example 2177, the subject matter of Example 2174 or 2175 can optionally include wherein executing the priority service during the period of time includes performing the priority service offline.

In Example 2178, the subject matter of any one of Examples 2174 to 2177 can optionally include the method further including monitoring a remaining battery power, determining that the remaining battery power has fallen below a threshold, and interrupting a second non-priority service by reporting the second non-priority service to the radio access network.

In Example 2179, the subject matter of Example 2178 can optionally include the method further including resuming the second non-priority service after the period of time has expired.

In Example 2180, the subject matter of any one of Examples 2174 to 2179 can optionally further include identifying a quality of service (QoS) class of the non-priority service, wherein interrupting the non-priority service by reporting the non-priority service to the radio access network includes providing the QoS class of the non-priority service to the radio access network.

Example 2181 is a circuit arrangement including processing circuitry configured to monitor a remaining battery power of the circuit arrangement, determine that the remaining battery power has fallen below a first threshold, select a first network service from a predefined set of network services and interrupting the first network service by reporting the first network service to a radio communication network, determine that the remaining battery power has fallen below a second threshold that is less than the first threshold, and select a second network service from the predefined set of network services with a higher priority than the first network service, and interrupting the second network service by reporting the second network service to the radio communication network.

In Example 2182, the subject matter of Example 2181 can optionally be configured as a terminal device and further including a radio transceiver and an antenna.

In Example 2183, the subject matter of Example 2181 or 2182 can optionally be configured as an internal component adapted for use in a terminal device.

In Example 2184, the subject matter of any one of Examples 2181 to 2183 can optionally include wherein the processing circuitry is hardware-defined circuitry or as software-defined circuitry.

In Example 2185, the subject matter of any one of Examples 2181 to 2184 can optionally include wherein the predefined set of network services each have a predefined priority.

In Example 2186, the subject matter of any one of Examples 2181 to 2185 can optionally include wherein the predefined set of network services is a predefined set of network services including one or more of voice services, Short Message Service (SMS) services, Internet Protocol (IP) messaging services, or IP data services.

In Example 2187, the subject matter of any one of Examples 2181 to 2186 can optionally include wherein the processing circuitry is further configured to identify a quality of service (QoS) class of the first network service, wherein the processing circuitry is configured to report the first network service to the radio communication network by providing the QoS class of the first network service to the radio communication network.

In Example 2188, the subject matter of any one of Examples 2181 to 2187 can optionally include wherein the processing circuitry is further configured to receive user input that indicates a priority service period during which battery power is requested, provide the priority service period to the radio communication network, and resume the first network service after the priority service period has expired.

In Example 2189, the subject matter of any one of Examples 2181 to 2187 can optionally include wherein the processing circuitry is further configured to after interrupting the second network service, receive user input that requests for the first network service and the second network service to be resumed, and instructing the radio communication service to resume the first network service and the second network service.

In Example 2190, the subject matter of any one of Examples 2181 to 2187 can optionally include wherein the processing circuitry is further configured to determine that the terminal device is charging, instruct the radio communication network to resume the first network service and the second network service, and resume the first network service and the second network service with the radio communication network.

In Example 2191, the subject matter of any one of Examples 2181 to 2187 can optionally include wherein the processing circuitry is further configured to before determining that the remaining battery power has fallen below the first threshold, receive a user input request to preserve battery power for a priority service period, report the priority service period to the radio communication network, and resume the first network service and the second network service over the radio communication network after the priority service period has expired.

In Example 2192, the subject matter of any one of Examples 2181 to 2187 can optionally include wherein the processing circuitry is further configured to before determining that the remaining battery power has fallen below the first threshold, receive user input that identifies a third network service of the predefined set of network services as a priority service, and continue to perform the third network service when the remaining battery power falls below a third threshold associated with the third network service.

In Example 2193, the subject matter of any one of Examples 2181 to 2192 can optionally include wherein the predefined set of network services are arranged in a hierarchy that is set by a user.

Example 2194 is a circuit arrangement including processing circuitry configured to receive user input that identifies a priority service and a period of time during which the priority service is requested, interrupt a non-priority service by reporting the non-priority service to a radio access network, execute the priority service during the period of time, and resume the non-priority service over the radio access network after the period of time has expired.

In Example 2195, the subject matter of Example 2194 can optionally be configured as a terminal device and further including a radio transceiver and an antenna.

In Example 2196, the subject matter of Example 2194 or 2195 can optionally be configured as an internal component adapted for use in a terminal device.

In Example 2197, the subject matter of any one of Examples 2194 to 2196 can optionally include wherein the processing circuitry is hardware-defined circuitry or as software-defined circuitry.

In Example 2198, the subject matter of any one of Examples 2194 to 2197 can optionally include wherein the priority service and the non-priority service are selected from a group consisting of a voice service, a Short Message Service (SMS) service, an Internet Protocol (IP) messaging service, or an IP data service.

In Example 2199, the subject matter of any one of Examples 2194 to 2198 can optionally include wherein the processing circuitry is configured to execute the priority service during the period of time by performing the priority service over the radio access network during the period of time.

In Example 2200, the subject matter of any one of Examples 2194 to 2199 can optionally include wherein the processing circuitry is configured to execute the priority service during the period of time by performing the priority service offline.

In Example 2201, the subject matter of any one of Examples 2194 to 2200 can optionally include the processing circuitry further configured to monitor a remaining battery power, determine that the remaining battery power has fallen below a threshold, and interrupt a second non-priority service by reporting the second non-priority service to the radio access network.

In Example 2202, the subject matter of Example 2201 can optionally include the processing circuitry further configured to resume the second non-priority service after the period of time has expired.

In Example 2203, the subject matter of any one of Examples 2194 to 2202 can optionally include the processing circuitry further configured to identify a quality of service (QoS) class of the non-priority service, wherein the processing circuitry is configured to interrupt the non-priority service by reporting the non-priority service to the radio access network by providing the QoS class of the non-priority service to the radio access network.

Example 2204 is a circuit arrangement including processing circuitry configured to execute a non-priority service with a terminal device over a radio access network, receive an instruction to interrupt execution of the non-priority service for a period of time, filter incoming data from a backhaul interface addressed to the terminal device to identify non-priority service data associated with the non-priority service, and suspend or limit transmittal of the non-priority service data to the terminal device during the period of time.

In Example 2205, the subject matter of Example 2204 can optionally be configured as a network access node and further including a radio transceiver.

In Example 2206, the subject matter of Example 2204 can optionally be configured as a component adapted for use in a network access node.

In Example 2207, the subject matter of any one of Examples 2204 to 2206 can optionally include wherein the processing circuitry is hardware-defined circuitry or software-defined circuitry.

In Example 2208, the subject matter of any one of Examples 2204 to 2207 can optionally include the processing circuitry further configured to receive an instruction from the terminal device to resume execution of the non-priority service prior to the end of the period of time, and resume execution of the non-priority service with the terminal device prior to the end of the period of time.

In Example 2209, the subject matter of any one of Examples 2204 to 2207 can optionally include the processing circuitry further configured to suspend or limit transmittal of the non-priority service data to the terminal device for the entirety of the period of time.

In Example 2210, the subject matter of any one of Examples 2204 to 2207 can optionally include wherein the processing circuitry is configured to suspend or limit transmittal of the non-priority service data to the terminal device during the period of time by buffering the non-priority service data until the period of time has expired, and transmitting the non-priority service data to the terminal device.

In Example 2211, the subject matter of any one of Examples 2204 to 2207 can optionally include wherein the processing circuitry is configured to suspend or limit transmittal of the non-priority service data to the terminal device during the period of time by buffering the non-priority service data until the buffered non-priority service data is larger than a size threshold, and transmitting the buffered non-priority service data to the terminal device.

In Example 2212, the subject matter of any one of Examples 2204 to 2211 can optionally include wherein the processing circuitry is configured to filter the incoming data from the backhaul interface addressed to the terminal device to identify the non-priority service data associated with the non-priority service by identifying a quality of service (QoS) class of the non-priority service, and identifying incoming data addressed to the terminal device that has the QoS class as the non-priority service data associated with the non-priority service.

In Example 2213, the subject matter of any one of Examples 2204 to 2211 can optionally include the processing circuitry further configured to receive an instruction to interrupt execution of a second non-priority service, filter incoming data from the backhaul interface addressed to the terminal device to identify second non-priority service data associated with the second non-priority service, and suspend or limit transmittal of the second non-priority service data to the terminal device.

Example 2214 is a device including means for determining that a terminal device is in a critical scenario based on a battery power or a temperature measurement of the terminal device, means for classifying data from one or more applications of the terminal device into critical traffic and non-critical traffic based on whether the data is user-priority traffic or realtime traffic, means for throttling the non-critical traffic relative to the critical traffic while the terminal device is in the critical scenario, and means for terminating the throttling of the non-critical traffic in response to the terminal device exiting the critical scenario Example 2215 is a method of performing radio communications, the method including determining that a terminal device is in a critical scenario based on a battery power or a temperature measurement of the terminal device, classifying data from one or more applications of the terminal device into critical traffic and non-critical traffic based on whether the data is user-priority traffic or realtime traffic, throttling the non-critical traffic relative to the critical traffic while the terminal device is in the critical scenario, and terminating the throttling of the non-critical traffic in response to the terminal device exiting the critical scenario.

In Example 2216, the subject matter of Example 2215 can optionally include wherein determining that the terminal device is in the critical scenario based on the battery power or the temperature measurement of the terminal device includes comparing the battery power to a battery power threshold, and determining that the terminal device is in the critical scenario in response to the battery power being less than the battery power threshold.

In Example 2217, the subject matter of Example 2216 can optionally include wherein terminating the throttling of the non-critical traffic in response to the terminal device exiting the critical scenario includes comparing an updated battery power to the battery power threshold, and terminating the throttling of the non-critical traffic in response to the updated battery power being greater than the battery power threshold.

In Example 2218, the subject matter of Example 2216 can optionally include wherein terminating the throttling of the non-critical traffic in response to the terminal device exiting the critical scenario includes determining that the terminal device is charging, and terminating the throttling of the non-critical traffic in response to the terminal device charging.

In Example 2219, the subject matter of Example 2215 can optionally include wherein determining that the terminal device is in the critical scenario based on the battery power or the temperature measurement of the terminal device includes comparing the temperature to a temperature threshold, and determining that the terminal device is in the critical scenario in response to the temperature being greater than the temperature threshold.

In Example 2220, the subject matter of Example 2219 can optionally include wherein terminating the throttling of the non-critical traffic in response to the terminal device exiting the critical scenario includes comparing an updated temperature to the temperature threshold, and terminating the throttling of the non-critical traffic in response to the updated temperature being less than the temperature threshold.

In Example 2221, the subject matter of Example 2215 can optionally include wherein determining that the terminal device is in the critical scenario based on the battery power or the temperature measurement of the terminal device includes comparing the temperature to a temperature threshold, comparing the battery power to a battery power threshold, and determining that the terminal device is in the critical scenario in response to the temperature being greater than the temperature threshold or the battery power being less than the battery power threshold.

In Example 2222, the subject matter of any one of Examples 2215 to 2221 can optionally further include receiving user input that specifies criteria for user-priority traffic, wherein classifying the data from the one or more applications of the terminal device into the critical traffic and the non-critical traffic based on whether the data is user-priority traffic or realtime traffic includes determining that a subset of the data meets the criteria for user-priority traffic, and classifying the subset of the data as critical traffic.

In Example 2223, the subject matter of Example 2222 can optionally include wherein the user input specifies that a first application of the one or more applications is a user-priority application, and wherein determining that the subset of the data meets the criteria for user-priority traffic includes determining that the subset of the data originated from the first application.

In Example 2224, the subject matter of Example 2222 can optionally include wherein the user input specifies that an application class is a user-priority service, and wherein determining that the subset of the data meets the criteria for user-priority traffic includes determining that the subset of the data originated from a subset of the one or more applications that are of the application class.

In Example 2225, the subject matter of any one of Examples 2215 to 2224 can optionally include wherein classifying the data from the one or more applications of the terminal device into the critical traffic and the non-critical traffic based on whether the data is user-priority traffic or realtime traffic includes determining that a subset of the one or more applications are realtime applications, and classifying a subset of the data that originates from the subset of the one or more applications as critical traffic.

In Example 2226, the subject matter of any one of Examples 2215 to 2225 can optionally include wherein classifying the data from the one or more applications of the terminal device into the critical traffic and the non-critical traffic based on whether the data is user-priority traffic or realtime traffic includes calculating a packet inter-arrival time and a packet inter-send time for a first application of the one or more applications, and classifying a subset of the data that originates from the first application as critical traffic if the packet inter-arrival time and the packet inter-send time meet a predefined criteria.

In Example 2227, the subject matter of any one of Examples 2215 to 2226 can optionally include wherein classifying the data from the one or more applications of the terminal device into the critical traffic and the non-critical traffic based on whether the data is user-priority traffic or realtime traffic includes performing packet inspection on the data, identifying a subset of the data that is user-priority traffic or realtime traffic based on the packet inspection, and classifying the subset of the data as critical traffic.

In Example 2228, the subject matter of any one of Examples 2215 to 2227 can optionally include wherein classifying the data from the one or more applications of the terminal device into the critical traffic and the non-critical traffic based on whether the data is user-priority traffic or realtime traffic includes reading a service type field for a first data packet of the data, determining whether the first data packet is realtime traffic or user-priority traffic based on the service type field.

In Example 2229, the subject matter of Example 2228 can optionally include wherein the service type field is a Type of Service (TOS) field or a Differentiated Services Code Point (DSCP) field.

In Example 2230, the subject matter of any one of Examples 2215 to 2229 can optionally include wherein classifying the data from the one or more applications of the terminal device into the critical traffic and the non-critical traffic based on whether the data is user-priority traffic or realtime traffic includes determining a port number or a socket address that a first data packet of the data originated from or is addressed to, and determining whether the first data packet is realtime traffic or user-priority traffic based on the port number or the socket address.

In Example 2231, the subject matter of any one of Examples 2215 to 2230 can optionally include wherein classifying the data from the one or more applications of the terminal device into the critical traffic and the non-critical traffic based on whether the data is user-priority traffic or realtime traffic includes classifying the data into the critical traffic and the non-critical traffic based on a service type header of the data, a packet inspection of the data, a packet inter-send arrival time of the data, a packet inter-arrival time of the data, a port number of the data, a socket address of the data, or user input.

In Example 2232, the subject matter of any one of Examples 2215 to 2231 can optionally include wherein throttling the non-critical traffic relative to the critical traffic while the terminal device is in the critical scenario includes buffering the non-critical traffic during a throttling period, and transmitting the critical traffic during the throttling period.

In Example 2233, the subject matter of any one of Examples 2215 to 2232 can optionally include wherein throttling the non-critical traffic relative to the critical traffic while the terminal device is in the critical scenario includes transmitting the non-critical traffic with a longer transmission delay than the critical traffic.

In Example 2234, the subject matter of any one of Examples 2215 to 2232 can optionally include wherein throttling the non-critical traffic relative to the critical traffic while the terminal device is in the critical scenario includes transmitting the non-critical traffic with a transmission delay, and transmitting the critical traffic with no delay.

In Example 2235, the subject matter of any one of Examples 2215 to 2234 can optionally include wherein classifying the data from the one or more applications of the terminal device into the critical traffic and the non-critical traffic based on whether the data is user-priority traffic or realtime traffic includes classifying the data at an application processor of the terminal device, wherein the application processor is configured to execute the one or more applications.

In Example 2236, the subject matter of any one of Examples 2215 to 2235 can optionally include wherein throttling the non-critical traffic relative to the critical traffic while the terminal device is in the critical scenario includes throttling the non-critical traffic at a modem driver of an application processor of the terminal device, wherein the application processor is configured to execute the one or more applications.

In Example 2237, the subject matter of any one of Examples 2215 to 2236 can optionally include wherein throttling the non-critical traffic relative to the critical traffic while the terminal device is in the critical scenario includes throttling the non-critical traffic at a baseband modem of the application processor.

In Example 2238, the subject matter of any one of Examples 2215 to 2237 can optionally include wherein throttling the non-critical traffic relative to the critical traffic while the terminal device is in the critical scenario includes performing fine-grained throttling of the non-critical traffic at a baseband modem of the terminal device, and performing coarse throttling of the non-critical traffic at an application processor of the terminal device.

Example 2239 is a communication device including one or more processors and configured to perform the method of any one of Examples 2215 to 2238.

Example 2240 is a non-transitory computer readable medium storing instructions that when executed by a processor cause the processor to perform the method of any one of Examples 2215 to 2238.

Example 2241 is a non-transitory computer readable medium storing instructions that when executed by a processor of a terminal device cause the terminal device to perform the method of any one of Examples 2215 to 2238.

Example 2242 is a communication device adapted for use in radio communications, the communication device including a detection module configured to determine that the communication device is in a critical scenario based on a battery power or a temperature measurement of the communication device, a classification module configured to classify data from one or more applications of the communication device into critical traffic and non-critical traffic based on whether the data is user-priority traffic or realtime traffic, a traffic control module configured to throttle the non-critical traffic relative to the critical traffic while the communication device is in the critical scenario, and to terminate the throttling of the non-critical traffic in response to the communication device exiting the critical scenario.

In Example 2243, the subject matter of Example 2242 can optionally be configured as a radio communication device and further including a radio transceiver and an antenna.

In Example 2244, the subject matter of Example 2242 can optionally be configured as a radio communication component adapted for use in a radio communication device.

In Example 2245, the subject matter of Example 2242 can optionally further include a power supply, wherein the battery power is a remaining battery power of the power supply.

In Example 2246, the subject matter of any one of Examples 2242 to 2245 can optionally include wherein the detection module is configured to determine that the communication device is in the critical scenario based on the battery power or the temperature measurement of the communication device by comparing the battery power to a battery power threshold, and determining that communication device is in the critical scenario in response to the battery power being less than the battery power threshold.

In Example 2247, the subject matter of Example 2246 can optionally include wherein the traffic control module is configured to terminate the throttling of the non-critical traffic in response to the communication device exiting the critical scenario by comparing an updated battery power to the battery power threshold, and terminating the throttling of the non-critical traffic in response to the updated battery power being greater than the battery power threshold.

In Example 2248, the subject matter of Example 2246 can optionally include wherein the traffic control module is configured to terminate the throttling of the non-critical traffic in response to the communication device exiting the critical scenario by determining that the communication device is charging, and terminating the throttling of the non-critical traffic in response to the communication device charging.

In Example 2249, the subject matter of any one of Examples 2242 to 2245 can optionally include wherein the detection module is configured to determine that the communication device is in the critical scenario based on the battery power or the temperature measurement of the communication device by comparing the temperature to a temperature threshold, and determining that communication device is in the critical scenario in response to the temperature being greater than the temperature threshold.

In Example 2250, the subject matter of Example 2249 can optionally include wherein the traffic control module is configured to terminate the throttling of the non-critical traffic in response to the communication device exiting the critical scenario by comparing an updated temperature to the temperature threshold, and terminating the throttling of the non-critical traffic in response to the updated temperature being less than the temperature threshold.

In Example 2251, the subject matter of any one of Examples 2242 to 2245, can optionally include the detection module is configured to determine that the communication device is in the critical scenario based on the battery power or the temperature measurement of the communication device by comparing the temperature to a temperature threshold, comparing the battery power to a battery power threshold, and determining that communication device is in the critical scenario in response to the temperature being greater than the temperature threshold or the battery power being less than the battery power threshold.

In Example 2252, the subject matter of any one of Examples 2242 to 2251 can optionally include wherein the classification module is further configured to receive user input that specifies criteria for user-priority traffic, and wherein the classification module is configured to classify the data from the one or more applications of the communication device into the critical traffic and the non-critical traffic based on whether the data is user-priority traffic or realtime traffic by determining that a subset of the data meets the criteria for user-priority traffic, and classifying the subset of the data as critical traffic.

In Example 2253, the subject matter of Example 2252 can optionally include wherein the user input specifies that a first application of the one or more applications is a user-priority application, and wherein the classification module is configured to determine that the subset of the data meets the criteria for user-priority traffic by determining that the subset of the data originated from the first application.

In Example 2254, the subject matter of Example 2252 can optionally include wherein the user input specifies that an application class is a user-priority service, and wherein the classification module is configured to determine that the subset of the data meets the criteria for user-priority traffic by determining that the subset of the data originated from a subset of the one or more applications that are of the application class.

In Example 2255, the subject matter of any one of Examples 2242 to 2254 can optionally include wherein the classification module is configured to classify the data from the one or more applications of the communication device into the critical traffic and the non-critical traffic based on whether the data is user-priority traffic or realtime traffic by determining that a subset of the one or more applications are realtime applications, and classifying a subset of the data that originates from the subset of the one or more applications as critical traffic.

In Example 2256, the subject matter of any one of Examples 2242 to 2255 can optionally include wherein the classification module is configured to classify the data from the one or more applications of the communication device into the critical traffic and the non-critical traffic based on whether the data is user-priority traffic or realtime traffic by calculating a packet inter-arrival time and a packet inter-send time for a first application of the one or more applications, and classifying a subset of the data that originates from the first application as critical traffic if the packet inter-arrival time and the packet inter-send time meet a predefined criteria.

In Example 2257, the subject matter of any one of Examples 2242 to 2256 can optionally include wherein the classification module is configured to classify the data from the one or more applications of the communication device into the critical traffic and the non-critical traffic based on whether the data is user-priority traffic or realtime traffic by performing packet inspection on the data, identifying a subset of the data that is user-priority traffic or realtime traffic based on the packet inspection, and classifying the subset of the data as critical traffic.

In Example 2258, the subject matter of any one of Examples 2242 to 2256, can optionally include the classification module is configured to classify the data from the one or more applications of the communication device into the critical traffic and the non-critical traffic based on whether the data is user-priority traffic or realtime traffic by reading a service type field for a first data packet of the data, determining whether the first data packet is realtime traffic or user-priority traffic based on the service type field.

In Example 2259, the subject matter of Example 2258 can optionally include wherein the service type field is a Type of Service (TOS) field or a Differentiated Services Code Point (DSCP) field.

In Example 2260, the subject matter of any one of Examples 2242 to 2258 can optionally include wherein the classification module is configured to classify the data from the one or more applications of the communication device into the critical traffic and the non-critical traffic based on whether the data is user-priority traffic or realtime traffic by determining a port number or a socket address that a first data packet of the data originated from or is addressed to, and determining whether the first data packet is realtime traffic or user-priority traffic based on the port number or the socket address.

In Example 2261, the subject matter of any one of Examples 2242 to 2260 can optionally include wherein the classification module is configured to classify the data from the one or more applications of the communication device into the critical traffic and the non-critical traffic based on whether the data is user-priority traffic or realtime traffic by classifying the data into the critical traffic and the non-critical traffic based on a service type header of the data, a packet inspection of the data, a packet inter-send arrival time of the data, a packet inter-arrival time of the data, a port number of the data, a socket address of the data, or user input.

In Example 2262, the subject matter of any one of Examples 2242 to 2261 can optionally include wherein the traffic control module is configured to throttle the non-critical traffic relative to the critical traffic while the communication device is in the critical scenario by buffering the non-critical traffic during a throttling period, and transmitting the critical traffic during the throttling period.

In Example 2263, the subject matter of any one of Examples 2242 to 2262 can optionally include wherein the traffic control module is configured to throttle the non-critical traffic relative to the critical traffic while the communication device is in the critical scenario by transmitting the non-critical traffic with a longer transmission delay than the critical traffic.

In Example 2264, the subject matter of any one of Examples 2242 to 2263 can optionally include wherein the traffic control module is configured to throttle the non-critical traffic relative to the critical traffic while the communication device is in the critical scenario by transmitting the non-critical traffic with a transmission delay, and transmitting the critical traffic with no delay.

In Example 2265, the subject matter of any one of Examples 2242 to 2264 can optionally include wherein the classification module is configured to classify the data from the one or more applications of the communication device into the critical traffic and the non-critical traffic based on whether the data is user-priority traffic or realtime traffic by classifying the data at an application processor of the communication device, wherein the application processor is configured to execute the one or more applications.

In Example 2266, the subject matter of any one of Examples 2242 to 2265 can optionally include wherein the traffic control module is configured to throttle the non-critical traffic relative to the critical traffic while the communication device is in the critical scenario by throttling the non-critical traffic at a modem driver of an application processor of the communication device, wherein the application processor is configured to execute the one or more applications.

In Example 2267, the subject matter of any one of Examples 2242 to 2266 can optionally include wherein the traffic control module is configured to throttle the non-critical traffic relative to the critical traffic while the communication device is in the critical scenario by throttling the non-critical traffic at a baseband modem of the application processor.

In Example 2268, the subject matter of any one of Examples 2242 to 2267 can optionally include wherein the traffic control module is configured to throttle the non-critical traffic relative to the critical traffic while the communication device is in the critical scenario by performing fine-grained throttling of the non-critical traffic at a baseband modem of the communication device, and performing coarse throttling of the non-critical traffic at an application processor of the communication device.

Example 2269 is a non-transitory computer readable medium storing instructions that when executed by a controller of a radio communication device cause the radio communication device to perform a method including determining that the radio communication device is in a critical scenario based on a battery power or a temperature measurement of the radio communication device, classifying data from one or more applications of the radio communication device into critical traffic and non-critical traffic based on whether the data is user-priority traffic or realtime traffic, throttling the non-critical traffic relative to the critical traffic while the radio communication device is in the critical scenario, and terminating the throttling of the non-critical traffic in response to the radio communication device exiting the critical scenario.

In Example 2270, the subject matter of Example 2269 can optionally include wherein determining that the radio communication device is in the critical scenario based on the battery power or the temperature measurement of the radio communication device includes comparing the battery power to a battery power threshold, and determining that radio communication device is in the critical scenario in response to the battery power being less than the battery power threshold.

In Example 2271, the subject matter of Example 2270 can optionally include wherein terminating the throttling of the non-critical traffic in response to the radio communication device exiting the critical scenario includes comparing an updated battery power to the battery power threshold, and terminating the throttling of the non-critical traffic in response to the updated battery power being greater than the battery power threshold.

In Example 2272, the subject matter of Example 2270 can optionally include wherein terminating the throttling of the non-critical traffic in response to the radio communication device exiting the critical scenario includes determining that the radio communication device is charging, and terminating the throttling of the non-critical traffic in response to the radio communication device charging.

In Example 2273, the subject matter of Example 2269 can optionally include wherein determining that the radio communication device is in the critical scenario based on the battery power or the temperature measurement of the radio communication device includes comparing the temperature to a temperature threshold, and determining that radio communication device is in the critical scenario in response to the temperature being greater than the temperature threshold.

In Example 2274, the subject matter of Example 2273 can optionally include wherein terminating the throttling of the non-critical traffic in response to the radio communication device exiting the critical scenario includes comparing an updated temperature to the temperature threshold, and terminating the throttling of the non-critical traffic in response to the updated temperature being less than the temperature threshold.

In Example 2275, the subject matter of Example 2274 can optionally include wherein determining that the radio communication device is in the critical scenario based on the battery power or the temperature measurement of the radio communication device includes comparing the temperature to a temperature threshold, comparing the battery power to a battery power threshold, and determining that radio communication device is in the critical scenario in response to the temperature being greater than the temperature threshold or the battery power being less than the battery power threshold.

In Example 2276, the subject matter of any one of Examples 2269 to 2275 can optionally further include receiving user input that specifies criteria for user-priority traffic, wherein classifying the data from the one or more applications of the radio communication device into the critical traffic and the non-critical traffic based on whether the data is user-priority traffic or realtime traffic includes determining that a subset of the data meets the criteria for user-priority traffic, and classifying the subset of the data as critical traffic.

In Example 2277, the subject matter of Example 2276 can optionally include wherein the user input specifies that a first application of the one or more applications is a user-priority application, and wherein determining that the subset of the data meets the criteria for user-priority traffic includes determining that the subset of the data originated from the first application.

In Example 2278, the subject matter of Example 2276 can optionally include wherein the user input specifies that an application class is a user-priority service, and wherein determining that the subset of the data meets the criteria for user-priority traffic includes determining that the subset of the data originated from a subset of the one or more applications that are of the application class.

In Example 2279, the subject matter of any one of Examples 2269 to 2278 can optionally include wherein classifying the data from the one or more applications of the radio communication device into the critical traffic and the non-critical traffic based on whether the data is user-priority traffic or realtime traffic includes determining that a subset of the one or more applications are realtime applications, and classifying a subset of the data that originates from the subset of the one or more applications as critical traffic.

In Example 2280, the subject matter of any one of Examples 2269 to 2279 can optionally include wherein classifying the data from the one or more applications of the radio communication device into the critical traffic and the non-critical traffic based on whether the data is user-priority traffic or realtime traffic includes calculating a packet inter-arrival time and a packet inter-send time for a first application of the one or more applications, and classifying a subset of the data that originates from the first application as critical traffic if the packet inter-arrival time and the packet inter-send time meet a predefined criteria.

In Example 2281, the subject matter of any one of Examples 2269 to 2280 can optionally include wherein classifying the data from the one or more applications of the radio communication device into the critical traffic and the non-critical traffic based on whether the data is user-priority traffic or realtime traffic includes performing packet inspection on the data, identifying a subset of the data that is user-priority traffic or realtime traffic based on the packet inspection, and classifying the subset of the data as critical traffic.

In Example 2282, the subject matter of any one of Examples 2269 to 2281 can optionally include wherein classifying the data from the one or more applications of the radio communication device into the critical traffic and the non-critical traffic based on whether the data is user-priority traffic or realtime traffic includes reading a service type field for a first data packet of the data, determining whether the first data packet is realtime traffic or user-priority traffic based on the service type field.

In Example 2283, the subject matter of Example 2282 can optionally include wherein the service type field is a Type of Service (TOS) field or a Differentiated Services Code Point (DSCP) field.

In Example 2284, the subject matter of any one of Examples 2269 to 2283 can optionally include wherein classifying the data from the one or more applications of the radio communication device into the critical traffic and the non-critical traffic based on whether the data is user-priority traffic or realtime traffic includes determining a port number or a socket address that a first data packet of the data originated from or is addressed to, and determining whether the first data packet is realtime traffic or user-priority traffic based on the port number or the socket address.

In Example 2284, the subject matter of any one of Examples 2269 to 2284 can optionally include wherein classifying the data from the one or more applications of the radio communication device into the critical traffic and the non-critical traffic based on whether the data is user-priority traffic or realtime traffic includes classifying the data into the critical traffic and the non-critical traffic based on a service type header of the data, a packet inspection of the data, a packet inter-send arrival time of the data, a packet inter-arrival time of the data, a port number of the data, a socket address of the data, or user input.

In Example 2286, the subject matter of any one of Examples 2269 to 2285 can optionally include throttling the non-critical traffic relative to the critical traffic while the radio communication device is in the critical scenario includes buffering the non-critical traffic during a throttling period, and transmitting the critical traffic during the throttling period.

In Example 2287, the subject matter of any one of Examples 2269 to 2286 can optionally include wherein throttling the non-critical traffic relative to the critical traffic while the radio communication device is in the critical scenario includes transmitting the non-critical traffic with a longer transmission delay than the critical traffic.

In Example 2288, the subject matter of any one of Examples 2269 to 2286 can optionally include wherein throttling the non-critical traffic relative to the critical traffic while the radio communication device is in the critical scenario includes transmitting the non-critical traffic with a transmission delay, and transmitting the critical traffic with no delay.

In Example 2289, the subject matter of any one of Examples 2269 to 2288 can optionally include wherein classifying the data from the one or more applications of the radio communication device into the critical traffic and the non-critical traffic based on whether the data is user-priority traffic or realtime traffic includes classifying the data at an application processor of the radio communication device, wherein the application processor is configured to execute the one or more applications.

In Example 2290, the subject matter of any one of Examples 2269 to 2289 can optionally include wherein throttling the non-critical traffic relative to the critical traffic while the radio communication device is in the critical scenario includes throttling the non-critical traffic at a modem driver of an application processor of the radio communication device, wherein the application processor is configured to execute the one or more applications.

In Example 2291, the subject matter of any one of Examples 2269 to 2290 can optionally include throttling the non-critical traffic relative to the critical traffic while the radio communication device is in the critical scenario includes throttling the non-critical traffic at a baseband modem of the application processor.

In Example 2292, the subject matter of any one of Examples 2269 to 2291 can optionally include wherein throttling the non-critical traffic relative to the critical traffic while the radio communication device is in the critical scenario includes performing fine-grained throttling of the non-critical traffic at a baseband modem of the radio communication device, and performing coarse throttling of the non-critical traffic at an application processor of the radio communication device.

Example 2293 is a communication device including a processing module including an application processor and a baseband modem, the processing module configured to execute one or more applications, classify data from the one or more applications into critical traffic and non-critical traffic based on whether the data is realtime traffic or user-priority traffic, determine whether the communication device is in a critical scenario based on a temperature of the communication device, a battery power of the communication device, a power state of the communication device, and radio conditions of the communication device, and throttle transmission of the non-critical traffic in response to the critical scenario.

In Example 2294, the subject matter of Example 2293 can optionally be configured as a radio communication device and further including a radio transceiver and an antenna.

In Example 2295, the subject matter of Example 2293 or 2294 can optionally include wherein the baseband modem is configured to perform the throttling of the transmission of the non-critical data.

In Example 2296, the subject matter of Example 2293 or 2294 can optionally include wherein the application processor is configured to perform the throttling of the transmission of the non-critical data.

In Example 2297, the subject matter of Example 2293 or 2294 can optionally include wherein the application processor is configured to perform the throttling of the transmission of the non-critical data with a modem driver of the application processor.

In Example 2298, the subject matter of Example 2293 or 2294 can optionally include wherein the baseband modem is configured to perform fine-grained throttling of the transmission of the non-critical data and the application processor is configured to perform coarse throttling of the transmission of the non-critical data.

In Example 2299, the subject matter of any one of Examples 2293 to 2298 can optionally include wherein the processing module is configured to classify the data from the one or more applications into the critical traffic and the non-critical traffic based on whether the data is realtime traffic or user-priority traffic by classifying the data into the critical traffic and the non-critical traffic based on a service type header of the data, a packet inspection of the data, a packet inter-send arrival time of the data, a packet inter-arrival time of the data, a port number of the data, a socket address of the data, or user input.

In Example 2300, the subject matter of any one of Examples 2293 to 2299 can optionally include wherein the application processor is configured to receive user input that specifies criteria for user-priority traffic, wherein the processing module is configured to classify the data from the one or more applications into the critical traffic and the non-critical traffic based on whether the data is realtime traffic or user-priority traffic by determining that a subset of the data meets the criteria for user-priority traffic, and classifying the subset of the data as critical traffic.

In Example 2301, the subject matter of any one of Examples 2293 to 2300 can optionally include wherein the processing module is further configured to determine that the communication device has exited the critical scenario, and terminate throttling of the non-critical traffic in response to determining that the communication device has exited the critical scenario.

In Example 2302, the subject matter of any one of Examples 2293 to 2300 can optionally include wherein the processing module is configured to throttle transmission of the non-critical traffic in response to the critical scenario by buffering the non-critical traffic during a throttling period, and transmitting the critical traffic during the throttling period.

In Example 2303, the subject matter of any one of Examples 2293 to 2300 can optionally include wherein the processing module is configured to throttle transmission of the non-critical traffic in response to the critical scenario by transmitting the non-critical traffic with a longer transmission delay than the critical traffic.

Example 2304 is a communication device adapted for use in radio communications, the communication device including a detection circuit configured to determine that the communication device is in a critical scenario based on a battery power or a temperature measurement of the communication device, a classification circuit configured to classify data from one or more applications of the communication device into critical traffic and non-critical traffic based on whether the data is user-priority traffic or realtime traffic, a traffic control circuit configured to throttle the non-critical traffic relative to the critical traffic while the communication device is in the critical scenario, and to terminate the throttling of the non-critical traffic in response to the communication device exiting the critical scenario.

In Example 2305, the subject matter of Example 2304 can optionally be configured as a radio communication device and further including a radio transceiver and an antenna.

In Example 2306, the subject matter of Example 2304 can optionally be configured as a radio communication circuitry component adapted for use in a radio communication device.

In Example 2307, the subject matter of Example 2304 can optionally further include a power supply, wherein the battery power is a remaining battery power of the power supply.

In Example 2308, the subject matter of any one of Examples 2304 to 2307 can optionally include wherein the detection circuit, the classification circuit, and the traffic control circuit are hardware-defined circuitry or software-defined circuitry.

In Example 2309, the subject matter of any one of Examples 2304 to 2308 can optionally include wherein the detection circuit is configured to determine that the communication device is in the critical scenario based on the battery power or the temperature measurement of the communication device by comparing the battery power to a battery power threshold, and determining that communication device is in the critical scenario in response to the battery power being less than the battery power threshold.

In Example 2310, the subject matter of Example 2309 can optionally include wherein the traffic control circuit is configured to terminate the throttling of the non-critical traffic in response to the communication device exiting the critical scenario by comparing an updated battery power to the battery power threshold, and terminating the throttling of the non-critical traffic in response to the updated battery power being greater than the battery power threshold.

In Example 2311, the subject matter of Example 2309 can optionally include wherein the traffic control circuit is configured to terminate the throttling of the non-critical traffic in response to the communication device exiting the critical scenario by determining that the communication device is charging, and terminating the throttling of the non-critical traffic in response to the communication device charging.

In Example 2312, the subject matter of any one of Examples 2304 to 2307 can optionally include wherein the detection circuit is configured to determine that the communication device is in the critical scenario based on the battery power or the temperature measurement of the communication device by comparing the temperature to a temperature threshold, and determining that communication device is in the critical scenario in response to the temperature being greater than the temperature threshold.

In Example 2313, the subject matter of Example 2312 can optionally include wherein the traffic control circuit is configured to terminate the throttling of the non-critical traffic in response to the communication device exiting the critical scenario by comparing an updated temperature to the temperature threshold, and terminating the throttling of the non-critical traffic in response to the updated temperature being less than the temperature threshold.

In Example 2314, the subject matter of any one of Examples 2304 to 2307 can optionally include wherein the detection circuit is configured to determine that the communication device is in the critical scenario based on the battery power or the temperature measurement of the communication device by comparing the temperature to a temperature threshold, comparing the battery power to a battery power threshold, and determining that communication device is in the critical scenario in response to the temperature being greater than the temperature threshold or the battery power being less than the battery power threshold.

In Example 2315, the subject matter of any one of Examples 2304 to 2314 can optionally include wherein the classification circuit is further configured to receive user input that specifies criteria for user-priority traffic, and wherein the classification circuit is configured to classify the data from the one or more applications of the communication device into the critical traffic and the non-critical traffic based on whether the data is user-priority traffic or realtime traffic by determining that a subset of the data meets the criteria for user-priority traffic, and classifying the subset of the data as critical traffic.

In Example 2316, the subject matter of Example 2315 can optionally include wherein the user input specifies that a first application of the one or more applications is a user-priority application, and wherein the classification circuit is configured to determine that the subset of the data meets the criteria for user-priority traffic by determining that the subset of the data originated from the first application.

In Example 2317, the subject matter of Example 2315 can optionally include wherein the user input specifies that an application class is a user-priority service, and wherein the classification circuit is configured to determine that the subset of the data meets the criteria for user-priority traffic by determining that the subset of the data originated from a subset of the one or more applications that are of the application class.

In Example 2318, the subject matter of any one of Examples 2304 to 2317 can optionally include wherein the classification circuit is configured to classify the data from the one or more applications of the communication device into the critical traffic and the non-critical traffic based on whether the data is user-priority traffic or realtime traffic by determining that a subset of the one or more applications are realtime applications, and classifying a subset of the data that originates from the subset of the one or more applications as critical traffic.

In Example 2319, the subject matter of any one of Examples 2304 to 2318 can optionally include wherein the classification circuit is configured to classify the data from the one or more applications of the communication device into the critical traffic and the non-critical traffic based on whether the data is user-priority traffic or realtime traffic by calculating a packet inter-arrival time and a packet inter-send time for a first application of the one or more applications, and classifying a subset of the data that originates from the first application as critical traffic if the packet inter-arrival time and the packet inter-send time meet a predefined criteria.

In Example 2320, the subject matter of any one of Examples 2304 to 2319 can optionally include wherein the classification circuit is configured to classify the data from the one or more applications of the communication device into the critical traffic and the non-critical traffic based on whether the data is user-priority traffic or realtime traffic by performing packet inspection on the data, identifying a subset of the data that is user-priority traffic or realtime traffic based on the packet inspection, and classifying the subset of the data as critical traffic.

In Example 2321, the subject matter of any one of Examples 2304 to 2320 can optionally include wherein the classification circuit is configured to classify the data from the one or more applications of the communication device into the critical traffic and the non-critical traffic based on whether the data is user-priority traffic or realtime traffic by reading a service type field for a first data packet of the data, determining whether the first data packet is realtime traffic or user-priority traffic based on the service type field.

In Example 2322, the subject matter of Example 2321 can optionally include wherein the service type field is a Type of Service (TOS) field or a Differentiated Services Code Point (DSCP) field.

In Example 2323, the subject matter of any one of Examples 2304 to 2322 can optionally include wherein the classification circuit is configured to classify the data from the one or more applications of the communication device into the critical traffic and the non-critical traffic based on whether the data is user-priority traffic or realtime traffic by determining a port number or a socket address that a first data packet of the data originated from or is addressed to, and determining whether the first data packet is realtime traffic or user-priority traffic based on the port number or the socket address.

In Example 2324, the subject matter of any one of Examples 2304 to 2323 can optionally include wherein the classification circuit is configured to classify the data from the one or more applications of the communication device into the critical traffic and the non-critical traffic based on whether the data is user-priority traffic or realtime traffic by classifying the data into the critical traffic and the non-critical traffic based on a service type header of the data, a packet inspection of the data, a packet inter-send arrival time of the data, a packet inter-arrival time of the data, a port number of the data, a socket address of the data, or user input.

In Example 2325, the subject matter of any one of Examples 2304 to 2324 can optionally include wherein the traffic control circuit is configured to throttle the non-critical traffic relative to the critical traffic while the communication device is in the critical scenario by buffering the non-critical traffic during a throttling period, and transmitting the critical traffic during the throttling period.

In Example 2326, the subject matter of any one of Examples 2304 to 2325 can optionally include wherein the traffic control circuit is configured to throttle the non-critical traffic relative to the critical traffic while the communication device is in the critical scenario by transmitting the non-critical traffic with a longer transmission delay than the critical traffic.

In Example 2327, the subject matter of any one of Examples 2304 to 2326 can optionally include wherein the traffic control circuit is configured to throttle the non-critical traffic relative to the critical traffic while the communication device is in the critical scenario by transmitting the non-critical traffic with a transmission delay, and transmitting the critical traffic with no delay.

In Example 2328, the subject matter of any one of Examples 2304 to 2327 can optionally include wherein the classification circuit is configured to classify the data from the one or more applications of the communication device into the critical traffic and the non-critical traffic based on whether the data is user-priority traffic or realtime traffic by classifying the data at an application processor of the communication device, wherein the application processor is configured to execute the one or more applications.

In Example 2329, the subject matter of any one of Examples 2304 to 2328 can optionally include wherein the traffic control circuit is configured to throttle the non-critical traffic relative to the critical traffic while the communication device is in the critical scenario by throttling the non-critical traffic at a modem driver of an application processor of the communication device, wherein the application processor is configured to execute the one or more applications.

In Example 2330, the subject matter of any one of Examples 2304 to 2329 can optionally include wherein the traffic control circuit is configured to throttle the non-critical traffic relative to the critical traffic while the communication device is in the critical scenario by throttling the non-critical traffic at a baseband modem of the application processor.

In Example 2331, the subject matter of any one of Examples 2304 to 2330 can optionally include wherein the traffic control circuit is configured to throttle the non-critical traffic relative to the critical traffic while the communication device is in the critical scenario by performing fine-grained throttling of the non-critical traffic at a baseband modem of the communication device, and performing coarse throttling of the non-critical traffic at an application processor of the communication device.

Example 1 is a communication device including processing circuitry including an application processor and a baseband modem, the processing circuitry configured to execute one or more applications, classify data from the one or more applications into critical traffic and non-critical traffic based on whether the data is realtime traffic or user-priority traffic, determine whether the communication device is in a critical scenario based on a temperature of the communication device, a battery power of the communication device, a power state of the communication device, and radio conditions of the communication device, and throttle transmission of the non-critical traffic in response to the critical scenario.

In Example 2333, the subject matter of Example 1 can optionally be configured as a radio communication device and further including a radio transceiver and an antenna.

In Example 2334, the subject matter of Example 1 or 2333 can optionally include wherein the baseband modem is configured to perform the throttling of the transmission of the non-critical data.

In Example 2335, the subject matter of Example 1 or 2333 can optionally include wherein the application processor is configured to perform the throttling of the transmission of the non-critical data.

In Example 2336, the subject matter of Example 1 or 2333 can optionally include wherein the application processor is configured to perform the throttling of the transmission of the non-critical data with a modem driver of the application processor.

In Example 2337, the subject matter of Example 1 or 2333 can optionally include wherein the baseband modem is configured to perform fine-grained throttling of the transmission of the non-critical data and the application processor is configured to perform coarse throttling of the transmission of the non-critical data.

In Example 2338, the subject matter of any one of Examples 1 to 2337 can optionally include wherein the processing circuitry is configured to classify the data from the one or more applications into the critical traffic and the non-critical traffic based on whether the data is realtime traffic or user-priority traffic by classifying the data into the critical traffic and the non-critical traffic based on a service type header of the data, a packet inspection of the data, a packet inter-send arrival time of the data, a packet inter-arrival time of the data, a port number of the data, a socket address of the data, or user input.

In Example 2339, the subject matter of any one of Examples 1 to 2338 can optionally include wherein the application processor is configured to receive user input that specifies criteria for user-priority traffic, wherein the processing circuitry is configured to classify the data from the one or more applications into the critical traffic and the non-critical traffic based on whether the data is realtime traffic or user-priority traffic by determining that a subset of the data meets the criteria for user-priority traffic, and classifying the subset of the data as critical traffic.

In Example 2340, the subject matter of any one of Examples 1 to 2339 can optionally include wherein the processing circuitry is further configured to determine that the communication device has exited the critical scenario, and terminate throttling of the non-critical traffic in response to determining that the communication device has exited the critical scenario.

In Example 2341, the subject matter of any one of Examples 1 to 2339 can optionally include wherein the processing circuitry is configured to throttle transmission of the non-critical traffic in response to the critical scenario by buffering the non-critical traffic during a throttling period, and transmitting the critical traffic during the throttling period.

In Example 2342, the subject matter of any one of Examples 1 to 2339 can optionally include wherein the processing circuitry is configured to throttle transmission of the non-critical traffic in response to the critical scenario by transmitting the non-critical traffic with a longer transmission delay than the critical traffic.

Example 2343 is a communication device including a processor configured to receive, on a radio channel, an uplink radio transmission in a first waveform format from a terminal device that instructs the communication device to forward the uplink radio transmission to a network access node, and transmit, on the radio channel, the uplink radio transmission to the network access node with a preamble in a second waveform format to protect the uplink radio transmission from collisions.

In Example 2344, the subject matter of Example 2343 can optionally further include a radio transceiver and one or more antennas.

In Example 2345, the subject matter of Example 2343 or 2344 can optionally include wherein the processor is configured to receive the uplink radio transmission in the first waveform format as a narrowband transmission and configured to transmit the preamble in the second waveform format as a wideband transmission.

In Example 2346, the subject matter of any one of Examples 2343 to 2345 can optionally include wherein the first waveform format uses a different bandwidth than the second waveform format.

In Example 2347, the subject matter of any one of Examples 2343 to 2346 can optionally include wherein the first waveform format is a narrowband Wi-Fi waveform format and the second waveform format is a wideband Wi-Fi waveform format.

In Example 2348, the subject matter of any one of Examples 2343 to 2347 can optionally include wherein the preamble in the second waveform format is decodable by coexisting devices that are configured according to the second waveform format.

In Example 2349, the subject matter of any one of Examples 2343 to 2347 can optionally include where in the preamble in the second waveform format is resistant to collisions by coexisting devices configured according to the second waveform format.

In Example 2350, the subject matter of any one of Examples 2343 to 2349 can optionally include wherein the processor is further configured to before receiving the uplink transmission in the first waveform from the terminal device, receive a channel reservation assistance request from the terminal device, reserve the radio channel with the network access node in accordance with a contention-based channel access scheme, and notify the terminal device that channel is reserved.

In Example 2351, the subject matter of Example 2350 can optionally include wherein the processor is configured to reserve the radio with the network access node in accordance with a contention-based channel access scheme by performing carrier sensing on the radio channel to determine when the radio channel is free, transmitting a transmission request, in the second waveform format, to the network access node, and receiving a transmission grant from the network access node.

In Example 2352, the subject matter of any one of Examples 2343 to 2348 can optionally include wherein the processor is further configured to before receiving the uplink transmission in the first waveform from the terminal device, reserve the radio channel for the terminal device for a reservation period in accordance with a contention-based channel access scheme, and wherein the processor is configured to receive the uplink radio transmission in the first waveform from the terminal device during the reservation period and to transmit the uplink radio transmission to the network access node after the reservation period is over.

In Example 2353, the subject matter of Example 2352 can optionally include wherein the processor is configured to reserve the radio channel for the terminal device with a request-to-send/clear-to-send (RTS/CTS) handshake, and wherein the reservation period is a network allocation vector (NAV) of the RTS/CTS handshake.

In Example 2354, the subject matter of any one of Examples 2343 to 2353 can optionally include wherein the processor is further configured to before transmitting the uplink radio transmission to the network access node, perform carrier sensing on the radio channel to determine when the radio channel is free, and wherein the processor is configured to transmit the uplink radio transmission to the network access node after determining that the radio channel is free.

In Example 2355, the subject matter of Example 2354 can optionally include wherein the processor is configured to perform carrier sensing on the radio channel to determine when the radio channel is free according to a carrier sensing multiple access (CSMA) scheme.

In Example 2356, the subject matter of Example 2354 or 2355 can optionally include wherein the processor is configured to perform the carrier sensing on the radio channel for the first waveform format and the second waveform format.

In Example 2357, the subject matter of any one of Examples 2343 to 2356 can optionally include wherein the processor is further configured to reserve the radio channel with the network access node for radio transmissions in the first waveform format during a plurality of reservation periods, wherein the processor is configured to receive the uplink radio transmission in the first waveform format during one of the plurality of reservation periods.

In Example 2358, the subject matter of any one of Examples 2343 to 2357 can optionally include wherein the processor is further configured to transmit a radio transmission to the terminal device in the first waveform format with a preamble in the second waveform format to protect the radio transmission from collisions.

In Example 2359, the subject matter of any one of Examples 2343 to 2358 can optionally include wherein the first waveform format is a spread spectrum waveform.

In Example 2360, the subject matter of any one of Examples 2343 to 2359 can optionally include wherein the first waveform format is a single carrier waveform.

In Example 2361, the subject matter of any one of Examples 2343 to 2360 can optionally include wherein the first waveform format has a lower peak-to-average-power ratio (PAPR) than the second waveform format.

In Example 2362, the subject matter of any one of Examples 2343 to 2361 can optionally include wherein the processor is further configured to before receiving the uplink radio transmission in the first waveform format from the terminal device, transmit a polling frame in the first waveform format to the terminal device that invites the terminal device to access the radio channel.

In Example 2363, the subject matter of Example 2362 can optionally include wherein the processor is configured to receive the uplink radio transmission in the first waveform format from the terminal device in response to the polling frame.

In Example 2364, the subject matter of any one of Examples 2343 to 2363 can optionally be configured as a baseband processor component for use in a radio communication device.

Example 2365 is a communication device including a processor configured to communicate with a terminal device on a radio channel according to a first waveform format, transmit a transmission request on the radio channel in a second waveform format to a network access node that specifies a reservation period, notify a terminal device that the radio channel is reserved for the reservation period, receive a radio transmission in the first waveform format from the terminal device, and transmit the radio transmission to the network access node in accordance with the reservation period.

In Example 2366, the subject matter of Example 2365 can optionally further include a radio transceiver and one or more antennas.

In Example 2367, the subject matter of Example 2365 or 2366 can optionally include wherein the processor is configured to transmit the transmission request in the second waveform format as a wideband transmission and configured to receive the radio transmission in the first waveform format as a narrowband transmission.

In Example 2368, the subject matter of any one of Examples 2365 to 2367 can optionally include wherein the first waveform format uses a different bandwidth than the second waveform format.

In Example 2369, the subject matter of any one of Examples 2365 to 2368 can optionally include wherein the first waveform format is a narrowband Wi-Fi waveform format and the second waveform format is a wideband Wi-Fi waveform format.

In Example 2370, the subject matter of any one of Examples 2365 to 2369 can optionally include wherein the processor is further configured to receive a channel reservation assistance request on the radio channel in the first waveform format from the terminal device, wherein the processor is configured to transmit the transmission request on the radio channel in the second waveform format to the network access node in response to the channel reservation assistance request.

In Example 2371, the subject matter of any one of Examples 2365 to 2370 can optionally include wherein the processor is further configured to perform carrier sensing on the radio channel to determine when the radio channel is free according to a contention-based channel access scheme, and wherein the processor is configured to transmit the transmission request on the radio channel in the second waveform format to the network access node in response to determining that the radio channel is free.

In Example 2372, the subject matter of any one of Examples 2365 to 2371 can optionally include wherein the processor is configured to receive the radio transmission in the first waveform format from the terminal device during the reservation period.

In Example 2373, the subject matter of any one of Examples 2365 to 2372 can optionally include wherein the transmission request is a request-to-send (RTS) and the reservation period is a network allocation vector (NAV).

In Example 2374, the subject matter of any one of Examples 2365 to 2373 can optionally include wherein the transmission request is a request-to-send (RTS) as part of a request-to-send/clear-to-send (RTS/CTS) handshake.

In Example 2375, the subject matter of any one of Examples 2365 to 2374 can optionally include wherein the processor is configured to periodically reserve the radio channel for the terminal device according to a schedule, and wherein the processor is configured to transmit the transmission request on the radio channel in the second waveform format to the network access node according to the schedule.

In Example 2376, the subject matter of any one of Examples 2365 to 2375 can optionally include wherein the processor is further configured to specify a first subchannel of the radio channel that is reserved for the terminal device for the reservation period, specify a second subchannel of the radio channel that is reserved for a second terminal device for the reservation period, receive the radio transmission in the first waveform format from the terminal device on the first subchannel, and receive a second radio transmission in the second waveform format from the second terminal device on the second subchannel.

In Example 2377, the subject matter of Example 2376 can optionally include wherein the processor is further configured to transmit the second radio transmission to the network access node in accordance with the reservation period.

In Example 2378, the subject matter of any one of Examples 2365 to 2377 can optionally include wherein the first waveform format is a spread spectrum waveform.

In Example 2379, the subject matter of any one of Examples 2365 to 2378 can optionally include wherein the first waveform format is a single carrier waveform.

In Example 2380, the subject matter of any one of Examples 2365 to 2379 can optionally include wherein the first waveform format has a lower peak-to-average-power ratio (PAPR) than the second waveform format.

In Example 2381, the subject matter of any one of Examples 2365 to 2380 can optionally be configured as a baseband processor component for use in a radio communication device.

Example 2382 is a terminal device including means for receiving a downlink radio transmission in a first waveform format from a network access node on a radio channel, means for receiving a notification from a forwarding device that indicates that the radio channel is protected from collisions with transmissions of a second waveform format during a reservation period, and means for transmitting an uplink radio transmission in accordance with the reservation period to the forwarding device that instructs the forwarding device to route the uplink radio transmission to the network access node.

Example 2383 is a method of performing radio communications at a terminal device, the method including receiving a downlink radio transmission in a first waveform format from a network access node on a radio channel, receiving a notification from a forwarding device that indicates that the radio channel is protected from collisions with transmissions of a second waveform format during a reservation period, and transmitting an uplink radio transmission in accordance with the reservation period to the forwarding device that instructs the forwarding device to route the uplink radio transmission to the network access node.

In Example 2384, the subject matter of Example 2383 can optionally include wherein the first waveform format is a narrowband waveform format and the second waveform format is a wideband waveform format.

In Example 2385, the subject matter of Example 2383 or 2384 can optionally include wherein the first waveform format uses a different bandwidth than the second waveform format.

In Example 2386, the subject matter of any one of Examples 2383 to 2385 can optionally include wherein the first waveform format is a narrowband Wi-Fi format and the second waveform format is a wideband Wi-Fi waveform format.

In Example 2387, the subject matter of any one of Examples 2383 to 2386 can optionally include wherein the first waveform format is a spread spectrum waveform.

In Example 2388, the subject matter of any one of Examples 2383 to 2387 can optionally include wherein the first waveform format is a single carrier waveform.

In Example 2389, the subject matter of any one of Examples 2383 to 2388 can optionally include wherein the first waveform format has a lower peak-to-average-power ratio (PAPR) than the second waveform format.

In Example 2390, the subject matter of any one of Examples 2383 to 2389 can optionally further include before receiving the notification from the forwarding device, transmitting a channel reservation assistance request to the forwarding device, wherein receiving the notification from the forwarding device includes receiving the notification from the forwarding device in response to the channel reservation assistance request.

In Example 2391, the subject matter of Example 2390 can optionally include wherein transmitting the channel reservation assistance request to the forwarding device includes transmitting the channel reservation assistance request to the forwarding device in the first waveform format.

In Example 2392, the subject matter of Example 2390 or 2391 can optionally further include before transmitting the channel reservation assistance request to the forwarding device, performing carrier sensing on the radio channel according to a contention-based channel access scheme to determine when the radio channel is free.

In Example 2393, the subject matter of any one of Examples 2383 to 2392 can optionally include wherein transmitting the uplink radio transmission in accordance with the reservation period to the forwarding device includes transmitting the uplink radio transmission to the network access node during the reservation period.

In Example 2394, the subject matter of any one of Examples 2383 to 2393 can optionally include wherein transmitting the uplink radio transmission in accordance with the reservation period to the forwarding device includes transmitting the uplink radio transmission in the first waveform format.

In Example 2395, the subject matter of any one of Examples 2383 to 2394 can optionally include wherein transmitting the uplink radio transmission in accordance with the reservation period to the forwarding device includes transmitting the uplink radio transmission with a lower transmit power than would be sufficient to reach the network access node.

Example 2396 is a communication device configured to perform the method of any one of Examples 2383 to 2395.

Example 2397 is a communication device including a processor configured to perform the method of any one of Examples 2383 to 2395.

Example 2398 is a non-transitory computer readable medium storing instructions that when executed by a processor cause the processor to perform the method of any one of Examples 2383 to 2395.

Example 2399 is a non-transitory computer readable medium storing instructions that when executed by a processor of a terminal device cause the terminal device to perform the method of any one of Examples 2383 to 2395.

Example 2400 is a communication device including a processor configured to receive a downlink radio transmission in a first waveform format from a network access node on a radio channel, receive a notification from a forwarding device that indicates that the radio channel is protected from collisions with transmissions of a second waveform format during a reservation period, and transmit an uplink radio transmission in accordance with the reservation period to the forwarding device that instructs the forwarding device to route the uplink radio transmission to the network access node.

In Example 2401, the subject matter of Example 2400 can optionally further include a radio transceiver and one or more antennas.

In Example 2402, the subject matter of Example 2400 or 2401 can optionally include wherein the first waveform format is a narrowband waveform format and the second waveform format is a wideband waveform format.

In Example 2403, the subject matter of any one of Examples 2400 to 2402 can optionally include wherein the first waveform format uses a different bandwidth than the second waveform format.

In Example 2404, the subject matter of any one of Examples 2400 to 2403 can optionally include wherein the first waveform format is a narrowband Wi-Fi format and the second waveform format is a wideband Wi-Fi waveform format.

In Example 2405, the subject matter of any one of Examples 2400 to 2404 can optionally include wherein the first waveform format is a spread spectrum waveform.

In Example 2406, the subject matter of any one of Examples 2400 to 2405 can optionally include wherein the first waveform format is a single carrier waveform.

In Example 2407, the subject matter of any one of Examples 2400 to 2406 can optionally include wherein the first waveform format has a lower peak-to-average-power ratio (PAPR) than the second waveform format.

In Example 2408, the subject matter of any one of Examples 2400 to 2407 can optionally include wherein the processor is further configured to before receiving the notification from the forwarding device, transmit a channel reservation assistance request to the forwarding device, wherein the processor is configured to receive the notification from the forwarding device includes receiving the notification from the forwarding device in response to the channel reservation assistance request.

In Example 2409, the subject matter of Example 2408 can optionally include wherein the processor is configured to transmit the channel reservation assistance request to the forwarding device by transmitting the channel reservation assistance request to the forwarding device in the first waveform format.

In Example 2410, the subject matter of Example 2408 or 2409 can optionally include wherein the processor is further configured to before transmitting the channel reservation assistance request to the forwarding device, perform carrier sensing on the radio channel according to a contention-based channel access scheme to determine when the radio channel is free.

In Example 2411, the subject matter of any one of Examples 2400 to 2410 can optionally include wherein the processor is configured to transmit the uplink radio transmission in accordance with the reservation period to the forwarding device by transmitting the uplink radio transmission to the network access node during the reservation period.

In Example 2412, the subject matter of any one of Examples 2400 to 2411 can optionally include wherein the processor is configured to transmit the uplink radio transmission in accordance with the reservation period to the forwarding device by transmitting the uplink radio transmission in the first waveform format.

In Example 2413, the subject matter of any one of Examples 2400 to 2412 can optionally include wherein the processor is configured to transmit the uplink radio transmission in accordance with the reservation period to the forwarding device by transmitting the uplink radio transmission with a lower transmit power than would be sufficient to reach the network access node.

In Example 2414, the subject matter of any one of Examples 2400 to 2413 can optionally be configured as a baseband processor component for use in a radio communication device.

Example 2415 is a communication device including means for receiving, on a radio channel, an uplink radio transmission in a first waveform format from a terminal device that instructs the communication device to forward the uplink radio transmission to a network access node, and means for transmitting, on the radio channel, the uplink radio transmission to the network access node with a preamble in a second waveform format to protect the uplink radio transmission from collisions.

Example 2416 is a method of performing radio communications at a communication device, the method including receiving, on a radio channel, an uplink radio transmission in a first waveform format from a terminal device that instructs the communication device to forward the uplink radio transmission to a network access node, and transmitting, on the radio channel, the uplink radio transmission to the network access node with a preamble in a second waveform format to protect the uplink radio transmission from collisions.

In Example 2417, the subject matter of Example 2416 can optionally include wherein receiving the uplink radio transmission in the first waveform format includes receiving the uplink radio transmission as a narrowband transmission and wherein transmitting the uplink radio transmission to the network access node with the preamble in the second waveform format includes transmitting the preamble as a wideband transmission.

In Example 2418, the subject matter of Example 2416 or 2417 can optionally include wherein the first waveform format uses a different bandwidth than the second waveform format.

In Example 2419, the subject matter of any one of Examples 2416 to 2418 can optionally include wherein the first waveform format is a narrowband Wi-Fi waveform format and the second waveform format is a wideband Wi-Fi waveform format.

In Example 2420, the subject matter of any one of Examples 2416 to 2419 can optionally include wherein the preamble in the second waveform format is decodable by coexisting devices that are configured according to the second waveform format.

In Example 2421, the subject matter of any one of Examples 2416 to 2420 can optionally include where in the preamble in the second waveform format is resistant to collisions by coexisting devices configured according to the second waveform format.

In Example 2422, the subject matter of any one of Examples 2416 to 2421 can optionally further include before receiving the uplink transmission in the first waveform from the terminal device, receiving a channel reservation assistance request from the terminal device, reserving the radio channel with the network access node in accordance with a contention-based channel access scheme, and notifying the terminal device that channel is reserved.

In Example 2423, the subject matter of Example 2422 can optionally include wherein reserving the radio with the network access node in accordance with a contention-based channel access scheme includes performing carrier sensing on the radio channel to determine when the radio channel is free, transmitting a transmission request, in the second waveform format, to the network access node, and receiving a transmission grant from the network access node.

In Example 2424, the subject matter of any one of Examples 2416 to 2420 can optionally further include before receiving the uplink transmission in the first waveform from the terminal device, reserving the radio channel for the terminal device for a reservation period in accordance with a contention-based channel access scheme, and wherein receiving the uplink radio transmission in the first waveform from the terminal device includes receiving the uplink radio transmission during the reservation period and transmitting the uplink radio transmission to the network access node includes transmitting the uplink radio transmission to the network access node after the reservation period is over.

In Example 2425, the subject matter of Example 2424 can optionally include wherein reserving the radio channel for the terminal device includes reserving the radio channel with a request-to-send/clear-to-send (RTS/CTS) handshake, and wherein the reservation period is a network allocation vector (NAV) of the RTS/CTS handshake.

In Example 2426, the subject matter of any one of Examples 2416 to 2425 can optionally further include before transmitting the uplink radio transmission to the network access node, performing carrier sensing on the radio channel to determine when the radio channel is free, and wherein transmitting the uplink radio transmission to the network access node includes transmitting the uplink radio transmission to the network access node after determining that the radio channel is free.

In Example 2427, the subject matter of Example 2426 can optionally include wherein performing carrier sensing on the radio channel to determine when the radio channel is free includes performing carrier sensing according to a carrier sensing multiple access (CSMA) scheme.

In Example 2428, the subject matter of Example 2426 or 2427 can optionally include wherein performing carrier sensing on the radio channel to determine when the channel is free includes performing carrier sensing on the radio channel for the first waveform format and the second waveform format.

In Example 2429, the subject matter of any one of Examples 2416 to 2428 can optionally further include reserving the radio channel with the network access node for radio transmissions in the first waveform format during a plurality of reservation periods, wherein receiving the uplink radio transmission in the first waveform format includes receiving the uplink radio transmission in the first waveform format during one of the plurality of reservation periods.

In Example 2430, the subject matter of any one of Examples 2416 to 2429 can optionally further include transmitting a radio transmission to the terminal device in the first waveform format with a preamble in the second waveform format to protect the radio transmission from collisions.

In Example 2431, the subject matter of any one of Examples 2416 to 2430 can optionally include wherein the first waveform format is a spread spectrum waveform.

In Example 2432, the subject matter of any one of Examples 2416 to 2431 can optionally include wherein the first waveform format is a single carrier waveform.

In Example 2433, the subject matter of any one of Examples 2416 to 2432 can optionally include wherein the first waveform format has a lower peak-to-average-power ratio (PAPR) than the second waveform format.

In Example 2434, the subject matter of any one of Examples 2416 to 2433 can optionally further include before receiving the uplink radio transmission in the first waveform format from the terminal device, transmitting a polling frame in the first waveform format to the terminal device that invites the terminal device to access the radio channel.

In Example 2435, the subject matter of Example 2434 can optionally include wherein receiving the uplink radio transmission in the first waveform format include receiving the uplink radio transmission in the first waveform format from the terminal device in response to the polling frame.

Example 2436 is a communication device configured to perform the method of any one of Examples 2416 to 2435.

Example 2437 is a communication device including a processor configured to perform the method of any one of Examples 2416 to 2435.

Example 2438 is a non-transitory computer readable medium storing instructions that when executed by a processor cause the processor to perform the method of any one of Examples 2416 to 2435.

Example 2439 is a non-transitory computer readable medium storing instructions that when executed by a processor of a terminal device cause the terminal device to perform the method of any one of Examples 2416 to 2435.

Example 2440 is a communication device including means for communicating with a terminal device on a radio channel according to a first waveform format, means for transmitting a transmission request on the radio channel in a second waveform format to a network access node that specifies a reservation period, means for notifying a terminal device that the radio channel is reserved for the reservation period, means for receiving a radio transmission in the first waveform format from the terminal device, and means for transmitting the radio transmission to the network access node in accordance with the reservation period.

Example 2441 is a method of performing radio communications at a communication device, the method including communicating with a terminal device on a radio channel according to a first waveform format, transmitting a transmission request on the radio channel in a second waveform format to a network access node that specifies a reservation period, notifying a terminal device that the radio channel is reserved for the reservation period, receiving a radio transmission in the first waveform format from the terminal device, and transmitting the radio transmission to the network access node in accordance with the reservation period.

In Example 2442, the subject matter of Example 2441 can optionally include wherein transmitting the transmission request on the radio channel in the second waveform format includes transmitting the transmission request as a wideband transmission, and wherein receiving the radio transmission in the first waveform format from the terminal device includes receiving the radio transmission as a narrowband transmission.

In Example 2443, the subject matter of Example 2441 or 2442 can optionally include wherein the first waveform format uses a different bandwidth than the second waveform format.

In Example 2444, the subject matter of any one of Examples 2441 to 2443 can optionally include wherein the first waveform format is a narrowband Wi-Fi waveform format and the second waveform format is a wideband Wi-Fi waveform format.

In Example 2445, the subject matter of any one of Examples 2441 to 2444 can optionally further include receiving a channel reservation assistance request on the radio channel in the first waveform format from the terminal device, wherein transmitting the transmission request on the radio channel in the second waveform to the network access node includes transmitting the transmission request I response to the channel reservation assistance request.

In Example 2446, the subject matter of any one of Examples 2441 to 2445 can optionally further include performing carrier sensing on the radio channel to determine when the radio channel is free according to a contention-based channel access scheme, and wherein transmitting the transmission request on the radio channel in the second waveform format to the network access node includes transmitting the transmission request in response to determining that the radio channel is free.

In Example 2447, the subject matter of any one of Examples 2441 to 2446 can optionally include wherein receiving the radio transmission in the first waveform format from the terminal device includes receiving the radio transmission during the reservation period.

In Example 2448, the subject matter of any one of Examples 2441 to 2447 can optionally include wherein the transmission request is a request-to-send (RTS) and the reservation period is a network allocation vector (NAV).

In Example 2449, the subject matter of any one of Examples 2441 to 2448 can optionally further include periodically reserving the radio channel for the terminal device according to a schedule, wherein transmitting the transmission request on the radio channel in the second waveform format to the network access node includes transmitting the transmission request on the radio channel in the second waveform format to the network access node according to the schedule.

In Example 2450, the subject matter of any one of Examples 2441 to 2449 can optionally further include specifying a first subchannel of the radio channel that is reserved for the terminal device for the reservation period, specifying a second subchannel of the radio channel that is reserved for a second terminal device for the reservation period, receiving the radio transmission in the first waveform format from the terminal device on the first subchannel, and receiving a second radio transmission in the second waveform format from the second terminal device on the second subchannel.

In Example 2451, the subject matter of Example 2450 can optionally further include transmitting the second radio transmission to the network access node in accordance with the reservation period.

In Example 2452, the subject matter of any one of Examples 2441 to 2451 can optionally include wherein the first waveform format is a spread spectrum waveform.

In Example 2453, the subject matter of any one of Examples 2441 to 2452 can optionally include wherein the first waveform format is a single carrier waveform.

In Example 2454, the subject matter of any one of Examples 2441 to 2453 can optionally include wherein the first waveform format has a lower peak-to-average-power ratio (PAPR) than the second waveform format.

Example 2455 is a communication device configured to perform the method of any one of Examples 2441 to 2454.

Example 2456 is a communication device including a processor configured to perform the method of any one of Examples 2441 to 2454.

Example 2457 is a non-transitory computer readable medium storing instructions that when executed by a processor cause the processor to perform the method of any one of Examples 2441 to 2454.

Example 2458 is a non-transitory computer readable medium storing instructions that when executed by a processor of a terminal device cause the terminal device to perform the method of any one of Examples 2441 to 2454.

Example 2459 is a communication device including processing circuitry configured to receive, on a radio channel, an uplink radio transmission in a first waveform format from a terminal device that instructs the communication device to forward the uplink radio transmission to a network access node, and transmit, on the radio channel, the uplink radio transmission to the network access node with a preamble in a second waveform format to protect the uplink radio transmission from collisions.

In Example 2460, the subject matter of Example 2459 can optionally further include a radio transceiver and one or more antennas.

In Example 2461, the subject matter of Example 2459 or 2460 can optionally include wherein the processing circuitry includes hardware-defined circuitry or software-defined circuitry.

In Example 2462, the subject matter of any one of Examples 2459 to 2461 can optionally include wherein the processing circuitry is configured to receive the uplink radio transmission in the first waveform format as a narrowband transmission and configured to transmit the preamble in the second waveform format as a wideband transmission.

In Example 2463, the subject matter of any one of Examples 2459 to 2462 can optionally include wherein the first waveform format uses a different bandwidth than the second waveform format.

In Example 2464, the subject matter of any one of Examples 2459 to 2463 can optionally include wherein the first waveform format is a narrowband Wi-Fi waveform format and the second waveform format is a wideband Wi-Fi waveform format.

In Example 2465, the subject matter of any one of Examples 2459 to 2464 can optionally include wherein the preamble in the second waveform format is decodable by coexisting devices that are configured according to the second waveform format.

In Example 2466, the subject matter of any one of Examples 2459 to 2464 can optionally include where in the preamble in the second waveform format is resistant to collisions by coexisting devices configured according to the second waveform format.

In Example 2467, the subject matter of any one of Examples 2459 to 2466 can optionally include wherein the processing circuitry is further configured to before receiving the uplink transmission in the first waveform from the terminal device, receive a channel reservation assistance request from the terminal device, reserve the radio channel with the network access node in accordance with a contention-based channel access scheme, and notify the terminal device that channel is reserved.

In Example 2468, the subject matter of Example 2467 can optionally include wherein the processing circuitry is configured to reserve the radio with the network access node in accordance with a contention-based channel access scheme by performing carrier sensing on the radio channel to determine when the radio channel is free, transmitting a transmission request, in the second waveform format, to the network access node, and receiving a transmission grant from the network access node.

In Example 2469, the subject matter of any one of Examples 2459 to 2465 can optionally include wherein the processing circuitry is further configured to before receiving the uplink transmission in the first waveform from the terminal device, reserve the radio channel for the terminal device for a reservation period in accordance with a contention-based channel access scheme, and wherein the processing circuitry is configured to receive the uplink radio transmission in the first waveform from the terminal device during the reservation period and to transmit the uplink radio transmission to the network access node after the reservation period is over.

In Example 2470, the subject matter of Example 2469 can optionally include wherein the processing circuitry is configured to reserve the radio channel for the terminal device with a request-to-send/clear-to-send (RTS/CTS) handshake, and wherein the reservation period is a network allocation vector (NAV) of the RTS/CTS handshake.

In Example 2471, the subject matter of any one of Examples 2459 to 2470 can optionally include wherein the processing circuitry is further configured to before transmitting the uplink radio transmission to the network access node, perform carrier sensing on the radio channel to determine when the radio channel is free, and wherein the processing circuitry is configured to transmit the uplink radio transmission to the network access node after determining that the radio channel is free.

In Example 2472, the subject matter of Example 2471 can optionally include wherein the processing circuitry is configured to perform carrier sensing on the radio channel to determine when the radio channel is free according to a carrier sensing multiple access (CSMA) scheme.

In Example 2473, the subject matter of Example 2471 or 2472 can optionally include wherein the processing circuitry is configured to perform the carrier sensing on the radio channel for the first waveform format and the second waveform format.

In Example 2474, the subject matter of any one of Examples 2459 to 2473 can optionally include wherein the processing circuitry is further configured to reserve the radio channel with the network access node for radio transmissions in the first waveform format during a plurality of reservation periods, wherein the processing circuitry is configured to receive the uplink radio transmission in the first waveform format during one of the plurality of reservation periods.

In Example 2475, the subject matter of any one of Examples 2459 to 2474 can optionally include wherein the processing circuitry is further configured to transmit a radio transmission to the terminal device in the first waveform format with a preamble in the second waveform format to protect the radio transmission from collisions.

In Example 2476, the subject matter of any one of Examples 2459 to 2475 can optionally include wherein the first waveform format is a spread spectrum waveform.

In Example 2477, the subject matter of any one of Examples 2459 to 2476 can optionally include wherein the first waveform format is a single carrier waveform.

In Example 2478, the subject matter of any one of Examples 2459 to 2477 can optionally include wherein the first waveform format has a lower peak-to-average-power ratio (PAPR) than the second waveform format.

In Example 2479, the subject matter of any one of Examples 2459 to 2478 can optionally include wherein the processing circuitry is further configured to before receiving the uplink radio transmission in the first waveform format from the terminal device, transmit a polling frame in the first waveform format to the terminal device that invites the terminal device to access the radio channel.

In Example 2480, the subject matter of Example 2479 can optionally include wherein the processing circuitry is configured to receive the uplink radio transmission in the first waveform format from the terminal device in response to the polling frame.

In Example 2481, the subject matter of any one of Examples 2459 to 2480 can optionally be configured as a baseband processing circuitry component for use in a radio communication device.

Example 2482 is a communication device including processing circuitry configured to communicate with a terminal device on a radio channel according to a first waveform format, transmit a transmission request on the radio channel in a second waveform format to a network access node that specifies a reservation period, notify a terminal device that the radio channel is reserved for the reservation period, receive a radio transmission in the first waveform format from the terminal device, and transmit the radio transmission to the network access node in accordance with the reservation period.

In Example 2483, the subject matter of Example 2482 can optionally further include a radio transceiver and one or more antennas.

In Example 2484, the subject matter of Example 2482 or 2483 can optionally include wherein the processing circuitry includes hardware-defined circuitry or software-defined circuitry.

In Example 2485, the subject matter of any one of Examples 2482 to 2484 can optionally include wherein the processing circuitry is configured to transmit the transmission request in the second waveform format as a wideband transmission and configured to receive the radio transmission in the first waveform format as a narrowband transmission.

In Example 2486, the subject matter of any one of Examples 2482 to 2485 can optionally include wherein the first waveform format uses a different bandwidth than the second waveform format.

In Example 2487, the subject matter of any one of Examples 2482 to 2486 can optionally include wherein the first waveform format is a narrowband Wi-Fi waveform format and the second waveform format is a wideband Wi-Fi waveform format.

In Example 2488, the subject matter of any one of Examples 2482 to 2487 can optionally include wherein the processing circuitry is further configured to receive a channel reservation assistance request on the radio channel in the first waveform format from the terminal device, wherein the processing circuitry is configured to transmit the transmission request on the radio channel in the second waveform format to the network access node in response to the channel reservation assistance request.

In Example 2489, the subject matter of any one of Examples 2482 to 2488 can optionally include wherein the processing circuitry is further configured to perform carrier sensing on the radio channel to determine when the radio channel is free according to a contention-based channel access scheme, and wherein the processing circuitry is configured to transmit the transmission request on the radio channel in the second waveform format to the network access node in response to determining that the radio channel is free.

In Example 2490, the subject matter of any one of Examples 2482 to 2489 can optionally include wherein the processing circuitry is configured to receive the radio transmission in the first waveform format from the terminal device during the reservation period.

In Example 2491, the subject matter of any one of Examples 2482 to 2490 can optionally include wherein the transmission request is a request-to-send (RTS) and the reservation period is a network allocation vector (NAV).

In Example 2492, the subject matter of any one of Examples 2482 to 2491 can optionally include wherein the transmission request is a request-to-send (RTS) as part of a request-to-send/clear-to-send (RTS/CTS) handshake.

In Example 2493, the subject matter of any one of Examples 2482 to 2492 can optionally include wherein the processing circuitry is configured to periodically reserve the radio channel for the terminal device according to a schedule, and wherein the processing circuitry is configured to transmit the transmission request on the radio channel in the second waveform format to the network access node according to the schedule.

In Example 2494, the subject matter of any one of Examples 2482 to 2493 can optionally include wherein the processing circuitry is further configured to specify a first subchannel of the radio channel that is reserved for the terminal device for the reservation period, specify a second subchannel of the radio channel that is reserved for a second terminal device for the reservation period, receive the radio transmission in the first waveform format from the terminal device on the first subchannel, and receive a second radio transmission in the second waveform format from the second terminal device on the second subchannel.

In Example 2495, the subject matter of Example 2494 can optionally include wherein the processing circuitry is further configured to transmit the second radio transmission to the network access node in accordance with the reservation period.

In Example 2496, the subject matter of any one of Examples 2482 to 2495 can optionally include wherein the first waveform format is a spread spectrum waveform.

In Example 2497, the subject matter of any one of Examples 2482 to 2496 can optionally include wherein the first waveform format is a single carrier waveform.

In Example 2498, the subject matter of any one of Examples 2482 to 2497 can optionally include wherein the first waveform format has a lower peak-to-average-power ratio (PAPR) than the second waveform format.

In Example 2499, the subject matter of any one of Examples 2482 to 2498 can optionally be configured as a baseband processing circuitry component for use in a radio communication device.

Example 2500 is a communication device including processing circuitry configured to receive a downlink radio transmission in a first waveform format from a network access node on a radio channel, receive a notification from a forwarding device that indicates that the radio channel is protected from collisions with transmissions of a second waveform format during a reservation period, and transmit an uplink radio transmission in accordance with the reservation period to the forwarding device that instructs the forwarding device to route the uplink radio transmission to the network access node.

In Example 2501, the subject matter of Example 2500 can optionally further include a radio transceiver and one or more antennas.

In Example 2502, the subject matter of Example 2500 or 2501 can optionally include wherein the processing circuitry includes hardware-defined circuitry or software-defined circuitry.

In Example 2503, the subject matter of any one of Examples 2500 to 2502 can optionally include wherein the first waveform format is a narrowband waveform format and the second waveform format is a wideband waveform format.

In Example 2504, the subject matter of any one of Examples 2500 to 2503 can optionally include wherein the first waveform format uses a different bandwidth than the second waveform format.

In Example 2505, the subject matter of any one of Examples 2500 to 2504 can optionally include wherein the first waveform format is a narrowband Wi-Fi format and the second waveform format is a wideband Wi-Fi waveform format.

In Example 2506, the subject matter of any one of Examples 2500 to 2505 can optionally include wherein the first waveform format is a spread spectrum waveform.

In Example 2507, the subject matter of any one of Examples 2500 to 2506 can optionally include wherein the first waveform format is a single carrier waveform.

In Example 2508, the subject matter of any one of Examples 2500 to 2507 can optionally include wherein the first waveform format has a lower peak-to-average-power ratio (PAPR) than the second waveform format.

In Example 2509, the subject matter of any one of Examples 2500 to 2508 can optionally include wherein the processing circuitry is further configured to before receiving the notification from the forwarding device, transmit a channel reservation assistance request to the forwarding device, wherein the processing circuitry is configured to receive the notification from the forwarding device includes receiving the notification from the forwarding device in response to the channel reservation assistance request.

In Example 2510, the subject matter of Example 2509 can optionally include wherein the processing circuitry is configured to transmit the channel reservation assistance request to the forwarding device by transmitting the channel reservation assistance request to the forwarding device in the first waveform format.

In Example 2511, the subject matter of Example 2509 or 2510 can optionally include wherein the processing circuitry is further configured to before transmitting the channel reservation assistance request to the forwarding device, perform carrier sensing on the radio channel according to a contention-based channel access scheme to determine when the radio channel is free.

In Example 2512, the subject matter of any one of Examples 2500 to 2511 can optionally include wherein the processing circuitry is configured to transmit the uplink radio transmission in accordance with the reservation period to the forwarding device by transmitting the uplink radio transmission to the network access node during the reservation period.

In Example 2513, the subject matter of any one of Examples 2500 to 2512 can optionally include wherein the processing circuitry is configured to transmit the uplink radio transmission in accordance with the reservation period to the forwarding device by transmitting the uplink radio transmission in the first waveform format.

In Example 2514, the subject matter of any one of Examples 2500 to 2513 can optionally include wherein the processing circuitry is configured to transmit the uplink radio transmission in accordance with the reservation period to the forwarding device by transmitting the uplink radio transmission with a lower transmit power than would be sufficient to reach the network access node.

In Example 2515, the subject matter of any one of Examples 2500 to 2514 can optionally be configured as a baseband processing circuitry component for use in a radio communication device.

Example 2516 is a local network access node for a vehicle, the local network access node including means for receiving user context information from a terminal device, means for identifying first data based on a probability indicated by the user context information that the terminal device will request the first data at a later time, means for retrieving the first data via a first internet connection of the vehicle and storing the first data, and means for, after the first internet connection becomes unavailable at the vehicle, receiving a request for the first data and providing the first data to the terminal device.

Example 2517 is a method of performing radio communications at a local network access node of a vehicle, the method including receiving user context information from a terminal device, identifying first data based on a probability indicated by the user context information that the terminal device will request the first data at a later time, retrieving the first data via a first internet connection of the vehicle and storing the first data, and after the first internet connection becomes unavailable at the vehicle, receiving a request for the first data and providing the first data to the terminal device.

In Example 2518, the subject matter of Example 2517 can optionally include wherein receiving the user context information from the terminal device includes establishing a radio connection with the terminal device when the terminal device enters the vehicle in a loading area, wherein the first internet connection is available in the loading area.

In Example 2519, the subject matter of Example 2518 can optionally include wherein retrieving the first data via the first internet connection of the vehicle and storing the first data includes retrieving the first data via the first internet connection of the vehicle and storing the first data while the vehicle is in the loading area.

In Example 2520, the subject matter of Example 2518 can optionally include wherein retrieving the first data via the first internet connection of the vehicle includes retrieving the first data via the first internet connection of the vehicle from a loading network node located in the loading area.

In Example 2521, the subject matter of any one of Examples 2517 to 2520 can optionally include wherein retrieving the first data via the first internet connection of the vehicle includes receiving the first data from a loading network node that provides the first internet connection via a wired interface.

In Example 2522, the subject matter of any one of Examples 2517 to 2520 can optionally include wherein retrieving the first data via the first internet connection of the vehicle includes receiving the first data from a loading network node that provides the first internet connection via a wireless interface.

In Example 2523, the subject matter of any one of Examples 2517 to 2522 can optionally include wherein receiving the request for the first data and providing the first data to the terminal device includes receiving the request for the first data from the terminal device over a local vehicle radio network, and providing the first data to the terminal device over the local vehicle radio network.

In Example 2524, the subject matter of any one of Examples 2517 to 2523 can optionally further include receiving a request for second data that is not included in the first data from the terminal device, retrieving the second data via a second internet connection of the vehicle, and providing the second data to the terminal device.

In Example 2525, the subject matter of any one of Examples 2517 to 2523 can optionally further include receiving a request for second data that is not included in the first data from the terminal device, retrieving the second data via a second internet connection of the vehicle while the first internet connection of the vehicle is unavailable, and providing the second data to the terminal device.

In Example 2526, the subject matter of any one of Examples 2517 to 2523 can optionally further include receiving a request for second data that is not included in the first data from the terminal device, retrieving the second data via a second internet connection of the vehicle while the vehicle is traveling and the first internet connection of the vehicle is unavailable, and providing the second data to the terminal device.

In Example 2527, the subject matter of any one of Examples 2524 to 2526 can optionally include wherein receiving the request for the second data that is not included in the first data and providing the second data to the terminal device includes receiving the request for the second data via a local vehicle radio network, and providing the second data to the terminal device via the local vehicle radio network.

In Example 2528, the subject matter of any one of Examples 2523 to 2526 can optionally include wherein the first internet connection of the vehicle is a short-range wired or wireless internet connection, and wherein the second internet connection of the vehicle is a long-range wireless internet connection.

In Example 2529, the subject matter of any one of Examples 2523 to 2526 can optionally include wherein the second internet connection of the vehicle is a wireless connection with a longer range than the first internet connection of the vehicle.

In Example 2530, the subject matter of any one of Examples 2517 to 2529 can optionally further include receiving a request for second data that is not included in the first data from the terminal device when the first internet connection is not available, and notifying the terminal device that the second data is not available.

In Example 2531, the subject matter of any one of Examples 2517 to 2530 can optionally include wherein the first data is a video clip, an audio file, a song, an album, a website, a podcast, an audiobook, a file, or a television show.

In Example 2532, the subject matter of any one of Examples 2517 to 2531 can optionally include wherein the first data is media content.

In Example 2533, the subject matter of any one of Examples 2517 to 2532 can optionally include wherein the user context information indicates media content that a user of the terminal device regularly accesses.

In Example 2534, the subject matter of any one of Examples 2517 to 2532 can optionally include wherein the user context information indicates historical data regarding media content that a user of the terminal device has accessed.

In Example 2535, the subject matter of any one of Examples 2517 to 2532 can optionally include wherein the user context information indicates user media content access habits.

In Example 2536, the subject matter of any one of Examples 2517 to 2535 can optionally include wherein identifying the first data based on the probability indicated by the user context information that the terminal device will request the first data at the later time includes processing the user context information to identify one or more data files that a user of the terminal device is probabilistically likely to access during travel of the vehicle, and selecting the first data from the one or more data files.

In Example 2537, the subject matter of Example 2536 can optionally include wherein processing the user context information to identify the one or more data files that the user of the terminal device is probabilistically likely to access during travel of the vehicle and selecting the first data from the one or more data files includes calculating probabilities for the one or more data files and selecting the first data from the one or more data files based on the probabilities.

In Example 2538, the subject matter of any one of Examples 2517 to 2535 can optionally include wherein identifying the first data based on the probability indicated by the user context information that the terminal device will request the first data at the later time includes applying machine learning on the user context information to identify the first data.

In Example 2539, the subject matter of any one of Examples 2517 to 2536 can optionally include wherein identifying the first data based on the probability indicated by the user context information that the terminal device will request the first data at the later time includes applying a predictive algorithm to the context information to generate a probability for each of a plurality of data files, and selecting the first data from the plurality of data files based on the probability of each of the plurality of data files.

In Example 2540, the subject matter of Example 2539 can optionally include wherein retrieving the first data via the first internet connection of the vehicle includes retrieving the first data from one or more internet servers via the first internet connection of the vehicle.

In Example 2541, the subject matter of any one of Examples 2517 to 2540 can optionally include wherein identifying the first data based on the probability indicated by the user context information that the terminal device will request the first data at the later time includes identifying the first data based on the user context information and user context information provided by one or more other terminal devices.

In Example 2542, the subject matter of any one of Examples 2517 to 2540 can optionally include wherein identifying the first data based on the probability indicated by the user context information that the terminal device will request the first data at the later time includes identifying the first data based on at least one of trip duration information or spatial-temporal trip information of a planned trip of the vehicle.

Example 2543 is a communication system including hardware-defined circuitry or software-defined circuitry configured to perform the method of any one of Examples 2517 to 2540.

Example 2543 is a radio communication device including hardware-defined circuitry or software-defined circuitry configured to perform the method of any one of Examples 2517 to 2540.

Example 2545 is a non-transitory computer readable medium storing instructions that when executing by a processor cause the processor to perform the method of any one of Examples 2517 to 2540.

Example 2546 is a non-transitory computer readable medium storing instructions that when executing by a processor of a network access node cause the network access node to perform the method of any one of Examples 2517 to 2540.

Example 2550 is a communication device for use in a vehicle network access node of a vehicle, the communication device including a processor configured to receive user context information from a terminal device, identify first data based on a probability indicated by the user context information that the terminal device will request the first data at a later time, retrieve the first data via a first internet connection of the vehicle and store the first data, and after the first internet connection is unavailable at the vehicle, receiving a request for the first data and providing the first data to the terminal device.

In Example 2548, the subject matter of Example 2547 can optionally further include a memory, wherein the processor is configured to store the first data in the memory.

In Example 2549, the subject matter of Example 2547 or 2548 can optionally be configured as a processing component for the vehicle network access node.

In Example 2550, the subject matter of Example 2547 or 2548 can optionally further include a radio transceiver and an antenna.

In Example 2551, the subject matter of Example 2550 can optionally be configured as a network access node.

In Example 2552, the subject matter of any one of Examples 2547 to 2551 can optionally include wherein the processor is configured to receive the user context information from the terminal device by establishing a radio connection with the terminal device when the terminal device enters the vehicle in a loading area, wherein the first internet connection is available in the loading area.

In Example 2553, the subject matter of Example 2552 can optionally include wherein the processor is configured to retrieve the first data via the first internet connection of the vehicle and storing the first data by retrieving the first data via the first internet connection of the vehicle and storing the first data while the vehicle is in the loading area.

In Example 2554, the subject matter of Example 2552 can optionally include wherein the processor is configured to retrieve the first data via the first internet connection of the vehicle by retrieving the first data via the first internet connection of the vehicle from a loading network node located in the loading area.

In Example 2555, the subject matter of any one of Examples 2547 to 2554 can optionally include wherein the processor is configured to retrieve the first data via the first internet connection of the vehicle by receiving the first data from a loading network node that provides the first internet connection via a wired interface.

In Example 2556, the subject matter of any one of Examples 2547 to 2554 can optionally include wherein the processor is configured to retrieve the first data via the first internet connection of the vehicle by receiving the first data from a loading network node that provides the first internet connection via a wireless interface.

In Example 2557, the subject matter of any one of Examples 2547 to 2556 can optionally include wherein the processor is configured to receive the request for the first data and providing the first data to the terminal device by receiving the request for the first data from the terminal device over a local vehicle radio network, and providing the first data to the terminal device over the local vehicle radio network.

In Example 2558, the subject matter of any one of Examples 2547 to 2557 can optionally include wherein the processor is further configured to receive a request for second data that is not included in the first data from the terminal device, retrieve the second data via a second internet connection of the vehicle, and provide the second data to the terminal device.

In Example 2559, the subject matter of any one of Examples 2547 to 2557 can optionally include wherein the processor is further configured to receive a request for second data that is not included in the first data from the terminal device, retrieve the second data via a second internet connection of the vehicle while the first internet connection of the vehicle is not available, and provide the second data to the terminal device.

In Example 2560, the subject matter of any one of Examples 2547 to 2557 can optionally include wherein the processor is further configured to receive a request for second data that is not included in the first data from the terminal device, retrieve the second data via a second internet connection of the vehicle while the vehicle is traveling and the first internet connection of the vehicle is not available, and provide the second data to the terminal device.

In Example 2561, the subject matter of any one of Examples 2558 to 2560 can optionally include wherein the first internet connection of the vehicle is a short-range wired or wireless internet connection, and wherein the second internet connection of the vehicle is a long-range wireless internet connection.

In Example 2562, the subject matter of any one of Examples 2558 to 2560 can optionally include wherein the second internet connection of the vehicle is a wireless connection with a longer range than the first internet connection of the vehicle.

In Example 2563, the subject matter of any one of Examples 2547 to 2562 can optionally include wherein the processor is further configured to receive a request for second data that is not included in the first data from the terminal device when the first internet connection is not available, and notify the terminal device that the second data is not available.

In Example 2564, the subject matter of any one of Examples 2547 to 2563 can optionally include wherein the first data is a video clip, an audio file, a song, an album, a website, a podcast, an audiobook, a file, or a television show.

In Example 2565, the subject matter of any one of Examples 2547 to 2564 can optionally include wherein the first data is media content.

In Example 2566, the subject matter of any one of Examples 2547 to 2565 can optionally include wherein the user context information indicates media content that a user of the terminal device regularly accesses.

In Example 2567, the subject matter of any one of Examples 2547 to 2565 can optionally include wherein the user context information indicates historical data regarding media content that a user of the terminal device has accessed.

In Example 2568, the subject matter of any one of Examples 2547 to 2565 can optionally include wherein the user context information indicates user media content access habits.

In Example 2569, the subject matter of any one of Examples 2547 to 2568 can optionally include wherein the processor is configured to identify the first data based on the probability indicated by the user context information that the terminal device will request the first data at the later time by processing the user context information to identify one or more data files that a user of the terminal device is probabilistically likely to access during travel of the vehicle, and selecting the first data from the one or more data files.

In Example 2570, the subject matter of Example 2569 can optionally include wherein the processor is configured to process the user context information to identify the one or more data files that the user of the terminal device is probabilistically likely to access during travel of the vehicle and selecting the first data from the one or more data files by calculating probabilities for the one or more data files and selecting the first data from the one or more data files based on the probabilities.

In Example 2571, the subject matter of any one of Examples 2547 to 2570 can optionally include wherein the processor is configured to identify the first data based on the probability indicated by the user context information that the terminal device will request the first data at the later time by applying machine learning on the user context information to identify the first data.

In Example 2572, the subject matter of any one of Examples 2547 to 2568 can optionally include wherein the processor is configured to identify the first data based on the probability indicated by the user context information that the terminal device will request the first data at the later time by applying a predictive algorithm to the context information to generate a probability for each of a plurality of data files, and selecting the first data from the plurality of data files based on the probability of each of the plurality of data files.

In Example 2573, the subject matter of Example 2572 can optionally include wherein the processor is configured to retrieve the first data via the first internet connection of the vehicle by retrieving the first data from one or more internet servers via the first internet connection of the vehicle.

In Example 2574, the subject matter of any one of Examples 2547 to 2573 can optionally include wherein the processor is configured to identify the first data based on the probability indicated by the user context information that the terminal device will request the first data at the later time by identifying the first data based on the user context information and user context information provided by one or more other terminal devices.

In Example 2575, the subject matter of any one of Examples 2547 to 2573 can optionally include wherein the processor is configured to identify the first data based on the probability indicated by the user context information that the terminal device will request the first data at the later time by identifying the first data based on at least one of trip duration information or spatial-temporal trip information of a planned trip of the vehicle.

Example 2576 is a local network access node for a vehicle, the local network access node including means for obtaining user data content preferences from a terminal device when the terminal device enters the vehicle in loading area, means for predicting data, based on the user data content preferences, that the terminal device will probabilistically request at a later time to identify first data, means for pre-loading the first data via a first internet connection of the vehicle available in the loading area, and means for, after movement of the vehicle causes the first internet connection to become unavailable, receiving a request for the first data from the terminal device and means for providing the first data to the terminal device.

Example 2577 is a method of performing radio communications at a local network access node of a vehicle, the method including obtaining user data content preferences from a terminal device when the terminal device enters the vehicle in loading area, predicting data, based on the user data content preferences, that the terminal device will probabilistically request at a later time to identify first data, pre-loading the first data via a first internet connection of the vehicle available in the loading area, and after movement of the vehicle causes the first internet connection to become unavailable, receiving a request for the first data from the terminal device and providing the first data to the terminal device.

In Example 2578, the subject matter of Example 2577 can optionally include wherein the first internet connection of the vehicle is unavailable when the vehicle travels outside of the loading area.

In Example 2579, the subject matter of Example 2577 or 2578 can optionally further include before obtaining the user data content preferences from the terminal device, establishing a radio connection with the terminal device over a local vehicle radio network of the vehicle, wherein providing the first data to the terminal device includes providing the first data to the terminal device via the local vehicle radio network.

In Example 2580, the subject matter of Example 2579 can optionally include wherein receiving the request for the first data from the terminal device includes receiving the request from the terminal device via the local vehicle radio network.

In Example 2581, the subject matter of any one of Examples 2577 to 2580 can optionally include wherein pre-loading the first data via a first internet connection of the vehicle available in the loading area includes receiving the first data from an internet server via the first internet connection and storing the first data at a memory of the local network access node.

In Example 2582, the subject matter of any one of Examples 2577 to 2581 can optionally further include receiving a request for second data that is not included in the first data from the terminal device, retrieving the second data via a second internet connection of the vehicle while the first internet connection of the vehicle is unavailable, and providing the second data to the terminal device.

In Example 2583, the subject matter of any one of Examples 2577 to 2581 can optionally further include receiving a request for second data that is not included in the first data from the terminal device, retrieving the second data via a second internet connection of the vehicle while the first internet connection of the vehicle is unavailable and the vehicle is traveling, and providing the second data to the terminal device.

In Example 2584, the subject matter Example 2398 or 2399 can optionally include wherein the first internet connection of the vehicle is a short-range wired or wireless internet connection, and wherein the second internet connection of the vehicle is a long-range wireless internet connection.

In Example 2585, the subject matter of Example 2398 or 2399 can optionally include wherein the second internet connection of the vehicle is a wireless connection with a longer range than the first internet connection of the vehicle.

In Example 2586, the subject matter of any one of Examples 2577 to 2585 can optionally include wherein the first data is a video clip, an audio file, a song, an album, a website, a podcast, an audiobook, a file, or a television show.

In Example 2587, the subject matter of any one of Examples 2577 to 2586 can optionally include wherein the first data is media content.

In Example 2588, the subject matter of any one of Examples 2577 to 2587 can optionally include wherein the user data content preferences indicate historical data regarding media content that a user of the terminal devices has accessed.

In Example 2589, the subject matter of any one of Examples 2577 to 2587 can optionally include wherein the user data content preferences indicate data files or types of data files that a user of the terminal device regularly accesses.

In Example 2590, the subject matter of any one of Examples 2577 to 2589 can optionally include wherein predicting the data, based on the user data content preferences, that the terminal device will probabilistically request at the later time to identify the first data includes calculating probabilities for one or more data files available via the first internet connection of the vehicle, and selecting the first data based on the probabilities for the one or more data files.

In Example 2591, the subject matter of any one of Examples 2577 to 2590 can optionally include wherein predicting the data, based on the user data content preferences, that the terminal device will probabilistically request at the later time to identify the first data includes applying machine learning on the user data content preferences to identify the first data.

In Example 2592, the subject matter of any one of Examples 2577 to 2590 can optionally include wherein predicting the data, based on the user data content preferences, that the terminal device will probabilistically request at the later time to identify the first data includes applying a predictive algorithm to the user data content preferences to generate a probability for each of a plurality of data files, and selecting the first data from the plurality of data files based on the probability of each of the plurality of data files.

In Example 2593, the subject matter of Example 2592 can optionally include wherein retrieving the first data via the first internet connection of the vehicle includes retrieving the first data from one or more internet servers via the first internet connection of the vehicle.

Example 2594 is a communication system including hardware-defined circuitry or software-defined circuitry configured to perform the method of any one of Examples 2577 to 2593.

Example 2595 is a radio communication device including hardware-defined circuitry or software-defined circuitry configured to perform the method of any one of Examples 2577 to 2593.

Example 2291 is a non-transitory computer readable medium storing instructions that when executing by a processor cause the processor to perform the method of any one of Examples 2577 to 2593.

Example 2292 is a non-transitory computer readable medium storing instructions that when executing by a processor of a network access node cause the network access node to perform the method of any one of Examples 2577 to 2590.

Example 2598 is a communication device for use in a vehicle network access node of a vehicle, the communication device including a processor configured to obtain user data content preferences from a terminal device when the terminal device enters the vehicle in loading area, predict data, based on the user data content preferences, that the terminal device will probabilistically request at a later time to identify first data, pre-load the first data via a first internet connection of the vehicle available in the loading area, and after movement of the vehicle causes the first internet connection to become unavailable, receive a request for the first data from the terminal device and provide the first data to the terminal device.

In Example 2599, the subject matter of Example 2598 can optionally further include a memory, wherein the processor is configured to store the first data in the memory.

In Example 2600, the subject matter of Example 2598 or 2599 can optionally be configured as a processing component for a network access node of the vehicle.

In Example 2601, the subject matter of Example 2598 or 2599 can optionally further include a radio transceiver and an antenna.

In Example 2602, the subject matter of Example 2601 can optionally be configured as a network access node.

In Example 2603, the subject matter of any one of Examples 2598 to 2602 can optionally include wherein the first internet connection of the vehicle is unavailable when the vehicle travels outside of the loading area.

In Example 2604, the subject matter of any one of Examples 2598 to 2603 can optionally include wherein the processor is further configured to before obtaining the user data content preferences from the terminal device, establish a radio connection with the terminal device over a local vehicle radio network of the vehicle, wherein the processor is configured to provide the first data to the terminal device by providing the first data to the terminal device via the local vehicle radio network.

In Example 2605, the subject matter of Example 2604 can optionally include wherein the processor is configured to receive the request for the first data from the terminal device via the local vehicle radio network.

In Example 2606, the subject matter of any one of Examples 2588 to 2605 can optionally include wherein the processor is configured to pre-load the first data from an internet server via the first internet connection and store the first data at a memory of the vehicle network access node.

In Example 2607, the subject matter of any one of Examples 2588 to 2606 can optionally include wherein the processor is further configured to receive a request for second data that is not included in the first data from the terminal device, retrieve the second data via a second internet connection of the vehicle while the first internet connection of the vehicle is unavailable, and provide the second data to the terminal device.

In Example 2608, the subject matter of any one of Examples 2588 to 2606 can optionally include wherein the processor is further configured to receive a request for second data that is not included in the first data from the terminal device, retrieve the second data via a second internet connection of the vehicle while the first internet connection of the vehicle is unavailable and the vehicle is traveling, and provide the second data to the terminal device.

In Example 2609, the subject matter of Example 2607 or 2608 can optionally include wherein the first internet connection of the vehicle is a short-range wired or wireless internet connection, and wherein the second internet connection of the vehicle is a long-range wireless internet connection.

In Example 2610, the subject matter of Example 2607 or 2608 can optionally include wherein the second internet connection of the vehicle is a wireless connection with a longer range than the first internet connection of the vehicle.

In Example 2611, the subject matter of any one of Examples 2598 to 2610 can optionally include wherein the first data is a video clip, an audio file, a song, an album, a website, a podcast, an audiobook, a file, or a television show.

In Example 2612, the subject matter of any one of Examples 2598 to 2611 can optionally include wherein the first data is media content.

In Example 2613, the subject matter of any one of Examples 2598 to 2612 can optionally include wherein the user data content preferences indicate historical data regarding media content that a user of the terminal devices has accessed.

In Example 2614, the subject matter of any one of Examples 2598 to 2612 can optionally include wherein the user data content preferences indicate data files or types of data files that a user of the terminal device regularly accesses.

In Example 2615, the subject matter of any one of Examples 2598 to 2614 can optionally include wherein the processor is configured to predict the data, based on the user data content preferences, that the terminal device will probabilistically request at the later time to identify the first data by calculating probabilities for one or more data files available via the first internet connection of the vehicle, and selecting the first data based on the probabilities for the one or more data files.

In Example 2616, the subject matter of any one of Examples 2598 to 2614 can optionally include wherein the processor is configured to predict the data, based on the user data content preferences, that the terminal device will probabilistically request at the later time to identify the first data by applying machine learning on the user data content preferences to identify the first data.

In Example 2617, the subject matter of any one of Examples 2598 to 2614 can optionally include wherein the processor is configured to predict the data, based on the user data content preferences, that the terminal device will probabilistically request at the later time to identify the first data by applying a predictive algorithm to the user data content preferences to generate a probability for each of a plurality of data files, and selecting the first data from the plurality of data files based on the probability of each of the plurality of data files.

In Example 2618, the subject matter of Example 2617 can optionally include wherein the processor is configured to retrieve the first data via the first internet connection of the vehicle by retrieving the first data from one or more internet servers via the first internet connection of the vehicle.

Example 2619 is a communication device for use in a vehicle network access node of a vehicle, the communication device including processing circuitry configured to receive user context information from a terminal device, identify first data based on a probability indicated by the user context information that the terminal device will request the first data at a later time, retrieve the first data via a first internet connection of the vehicle and store the first data, and after the first internet connection is unavailable at the vehicle, receiving a request for the first data and providing the first data to the terminal device.

In Example 2620, the subject matter of Example 2619 can optionally further include a memory, wherein the processing circuitry is configured to store the first data in the memory.

In Example 2621, the subject matter of Example 2619 or 2620 can optionally be configured as a circuitry component for the vehicle network access node.

In Example 2622, the subject matter of Example 2619 or 2620 can optionally further include radio transceiver circuitry and an antenna.

In Example 2623, the subject matter of Example 2622 can optionally be configured as a network access node.

In Example 2624, the subject matter of any one of Examples 2619 to 2623 can optionally include wherein the processing circuitry is hardware-defined circuitry or software-defined circuitry.

In Example 2625, the subject matter of any one of Examples 2619 to 2624 can optionally include wherein the processing circuitry is configured to receive the user context information from the terminal device by establishing a radio connection with the terminal device when the terminal device enters the vehicle in a loading area, wherein the first internet connection is available in the loading area.

In Example 2626, the subject matter of Example 2625 can optionally include wherein the processing circuitry is configured to retrieve the first data via the first internet connection of the vehicle and storing the first data by retrieving the first data via the first internet connection of the vehicle and storing the first data while the vehicle is in the loading area.

In Example 2627, the subject matter of Example 2625 can optionally include wherein the processing circuitry is configured to retrieve the first data via the first internet connection of the vehicle by retrieving the first data via the first internet connection of the vehicle from a loading network node located in the loading area.

In Example 2628, the subject matter of any one of Examples 2619 to 2627 can optionally include wherein the processing circuitry is configured to retrieve the first data via the first internet connection of the vehicle by receiving the first data from a loading network node that provides the first internet connection via a wired interface.

In Example 2629, the subject matter of any one of Examples 2619 to 2627 can optionally include wherein the processing circuitry is configured to retrieve the first data via the first internet connection of the vehicle by receiving the first data from a loading network node that provides the first internet connection via a wireless interface.

In Example 2630, the subject matter of any one of Examples 2619 to 2629 can optionally include wherein the processing circuitry is configured to receive the request for the first data and providing the first data to the terminal device by receiving the request for the first data from the terminal device over a local vehicle radio network, and providing the first data to the terminal device over the local vehicle radio network.

In Example 2631, the subject matter of any one of Examples 2619 to 2630 can optionally include wherein the processing circuitry is further configured to receive a request for second data that is not included in the first data from the terminal device, retrieve the second data via a second internet connection of the vehicle, and provide the second data to the terminal device.

In Example 2632, the subject matter of any one of Examples 2619 to 2630 can optionally include wherein the processing circuitry is further configured to receive a request for second data that is not included in the first data from the terminal device, retrieve the second data via a second internet connection of the vehicle while the first internet connection of the vehicle is not available, and provide the second data to the terminal device.

In Example 2633, the subject matter of any one of Examples 2619 to 2630 can optionally include wherein the processing circuitry is further configured to receive a request for second data that is not included in the first data from the terminal device, retrieve the second data via a second internet connection of the vehicle while the vehicle is traveling and the first internet connection of the vehicle is not available, and provide the second data to the terminal device.

In Example 2634, the subject matter of any one of Examples 2631 to 2633 can optionally include wherein the first internet connection of the vehicle is a short-range wired or wireless internet connection, and wherein the second internet connection of the vehicle is a long-range wireless internet connection.

In Example 2635, the subject matter of any one of Examples 2631 to 2633 can optionally include wherein the second internet connection of the vehicle is a wireless connection with a longer range than the first internet connection of the vehicle.

In Example 2636, the subject matter of any one of Examples 2619 to 2635 can optionally include wherein the processing circuitry is further configured to receive a request for second data that is not included in the first data from the terminal device when the first internet connection is not available, and notify the terminal device that the second data is not available.

In Example 2637, the subject matter of any one of Examples 2619 to 2636 can optionally include wherein the first data is a video clip, an audio file, a song, an album, a website, a podcast, an audiobook, a file, or a television show.

In Example 2638, the subject matter of any one of Examples 2619 to 2637 can optionally include wherein the first data is media content.

In Example 2639, the subject matter of any one of Examples 2619 to 2638 can optionally include wherein the user context information indicates media content that a user of the terminal device regularly accesses.

In Example 2640, the subject matter of any one of Examples 2619 to 2638 can optionally include wherein the user context information indicates historical data regarding media content that a user of the terminal device has accessed.

In Example 2641, the subject matter of any one of Examples 2619 to 2638 can optionally include wherein the user context information indicates user media content access habits.

In Example 2642, the subject matter of any one of Examples 2619 to 2641 can optionally include wherein the processing circuitry is configured to identify the first data based on the probability indicated by the user context information that the terminal device will request the first data at the later time by processing the user context information to identify one or more data files that a user of the terminal device is probabilistically likely to access during travel of the vehicle, and selecting the first data from the one or more data files.

In Example 2643, the subject matter of Example 2642 can optionally include wherein the processing circuitry is configured to process the user context information to identify the one or more data files that the user of the terminal device is probabilistically likely to access during travel of the vehicle and selecting the first data from the one or more data files by calculating probabilities for the one or more data files and selecting the first data from the one or more data files based on the probabilities.

In Example 2644, the subject matter of any one of Examples 2619 to 2643 can optionally include wherein the processing circuitry is configured to identify the first data based on the probability indicated by the user context information that the terminal device will request the first data at the later time by applying machine learning on the user context information to identify the first data.

In Example 2645, the subject matter of any one of Examples 2619 to 2641 can optionally include wherein the processing circuitry is configured to identify the first data based on the probability indicated by the user context information that the terminal device will request the first data at the later time by applying a predictive algorithm to the context information to generate a probability for each of a plurality of data files, and selecting the first data from the plurality of data files based on the probability of each of the plurality of data files.

In Example 2646, the subject matter of Example 2645 can optionally include wherein the processing circuitry is configured to retrieve the first data via the first internet connection of the vehicle by retrieving the first data from one or more internet servers via the first internet connection of the vehicle.

In Example 2647, the subject matter of any one of Examples 2619 to 2646 can optionally include wherein the processing circuitry is configured to identify the first data based on the probability indicated by the user context information that the terminal device will request the first data at the later time by identifying the first data based on the user context information and user context information provided by one or more other terminal devices.

In Example 2648, the subject matter of any one of Examples 2619 to 2646 can optionally include wherein the processing circuitry is configured to identify the first data based on the probability indicated by the user context information that the terminal device will request the first data at the later time by identifying the first data based on at least one of trip duration information or spatial-temporal trip information of a planned trip of the vehicle.

Example 2649 is a communication device for use in a vehicle network access node of a vehicle, the communication device including processing circuitry configured to obtain user data content preferences from a terminal device when the terminal device enters the vehicle in loading area, predict data, based on the user data content preferences, that the terminal device will probabilistically request at a later time to identify first data, pre-load the first data via a first internet connection of the vehicle available in the loading area, and after movement of the vehicle causes the first internet connection to become unavailable, receive a request for the first data from the terminal device and provide the first data to the terminal device.

In Example 2650, the subject matter of Example 2649 can optionally further include a memory, wherein the processing circuitry is configured to store the first data in the memory.

In Example 2651, the subject matter of Example 2649 or 2650 can optionally be configured as a circuitry component for a network access node of the vehicle.

In Example 2652, the subject matter of Example 2649 or 2650 can optionally further include radio transceiver circuitry and an antenna.

In Example 2653, the subject matter of Example 2652 can optionally be configured as a network access node.

In Example 2654, the subject matter of any one of Examples 2649 to 2653 can optionally include wherein the processing circuitry is hardware-defined circuitry or software-defined circuitry.

In Example 2655, the subject matter of any one of Examples 2649 to 2654 can optionally include wherein the first internet connection of the vehicle is unavailable when the vehicle travels outside of the loading area.

In Example 2656, the subject matter of any one of Examples 2649 to 2655 can optionally include wherein the processing circuitry is further configured to before obtaining the user data content preferences from the terminal device, establish a radio connection with the terminal device over a local vehicle radio network of the vehicle, wherein the processing circuitry is configured to provide the first data to the terminal device by providing the first data to the terminal device via the local vehicle radio network.

In Example 2657, the subject matter of Example 2656 can optionally include wherein the processing circuitry is configured to receive the request for the first data from the terminal device via the local vehicle radio network.

In Example 2658, the subject matter of any one of Examples 2649 to 2657 can optionally include wherein the processing circuitry is configured to pre-load the first data from an internet server via the first internet connection and store the first data at a memory of the vehicle network access node.

In Example 2659, the subject matter of any one of Examples 2649 to 2658 can optionally include wherein the processing circuitry is further configured to receive a request for second data that is not included in the first data from the terminal device, retrieve the second data via a second internet connection of the vehicle while the first internet connection of the vehicle is unavailable, and provide the second data to the terminal device.

In Example 2660, the subject matter of any one of Examples 2649 to 2658 can optionally include wherein the processing circuitry is further configured to receive a request for second data that is not included in the first data from the terminal device, retrieve the second data via a second internet connection of the vehicle while the first internet connection of the vehicle is unavailable and the vehicle is traveling, and provide the second data to the terminal device.

In Example 2661, the subject matter of Example 2659 or 2660 can optionally include wherein the first internet connection of the vehicle is a short-range wired or wireless internet connection, and wherein the second internet connection of the vehicle is a long-range wireless internet connection.

In Example 2662, the subject matter of Example 2659 or 2660 can optionally include wherein the second internet connection of the vehicle is a wireless connection with a longer range than the first internet connection of the vehicle.

In Example 2663, the subject matter of any one of Examples 2649 to 2662 can optionally include wherein the first data is a video clip, an audio file, a song, an album, a website, a podcast, an audiobook, a file, or a television show.

In Example 2664, the subject matter of any one of Examples 2649 to 2663 can optionally include wherein the first data is media content.

In Example 2665, the subject matter of any one of Examples 2649 to 2664 can optionally include wherein the user data content preferences indicate historical data regarding media content that a user of the terminal devices has accessed.

In Example 2666, the subject matter of any one of Examples 2649 to 2664 can optionally include wherein the user data content preferences indicate data files or types of data files that a user of the terminal device regularly accesses.

In Example 2667, the subject matter of any one of Examples 2649 to 2666 can optionally include wherein the processing circuitry is configured to predict the data, based on the user data content preferences, that the terminal device will probabilistically request at the later time to identify the first data by calculating probabilities for one or more data files available via the first internet connection of the vehicle, and selecting the first data based on the probabilities for the one or more data files.

In Example 2668, the subject matter of any one of Examples 2649 to 2666 can optionally include wherein the processing circuitry is configured to predict the data, based on the user data content preferences, that the terminal device will probabilistically request at the later time to identify the first data by applying machine learning on the user data content preferences to identify the first data.

In Example 2669, the subject matter of any one of Examples 2649 to 2666 can optionally include wherein the processing circuitry is configured to predict the data, based on the user data content preferences, that the terminal device will probabilistically request at the later time to identify the first data by applying a predictive algorithm to the user data content preferences to generate a probability for each of a plurality of data files, and selecting the first data from the plurality of data files based on the probability of each of the plurality of data files.

In Example 2670, the subject matter of Example 2669 can optionally include wherein the processing circuitry is configured to retrieve the first data via the first internet connection of the vehicle by retrieving the first data from one or more internet servers via the first internet connection of the vehicle.

Example 2671 is a first vehicular terminal device for coordinating with other vehicular terminal devices to perform a distributed computation, the first vehicular terminal device including means for obtaining local sensor data for a local area of the first vehicular terminal device, means for performing a distributed processing mapping task on the local sensor data to obtain a first intermediate distributed processing result, means for providing the first intermediate distributed processing result to a second vehicular terminal device according to a distributed processing shuffling scheme, means for receiving a second intermediate distributed processing result from a third vehicular terminal device according to the distributed processing shuffling scheme, and means for performing a distributed processing reducing task on the first intermediate distributed processing result and the second intermediate distributed processing result to obtain a final distributed processing result.

Example 2672 is a method at a first vehicular terminal device of coordinating with other vehicular terminal devices to perform a distributed computation, the method including obtaining local sensor data for a local area of the first vehicular terminal device, performing a distributed processing mapping task on the local sensor data to obtain a first intermediate distributed processing result, providing the first intermediate distributed processing result to a second vehicular terminal device according to a distributed processing shuffling scheme, receiving a second intermediate distributed processing result from a third vehicular terminal device according to the distributed processing shuffling scheme, and performing a distributed processing reducing task on the first intermediate distributed processing result and the second intermediate distributed processing result to obtain a final distributed processing result.

In Example 2673, the subject matter of Example 2672 can optionally include wherein the distributed processing mapping task is a map task of a MapReduce computation, the distributed processing reducing task is a reduce task of the MapReduce computation, and the distributed processing shuffling scheme is a shuffling scheme of the MapReduce computation.

In Example 2674, the subject matter of Example 2672 or 2673 can optionally include wherein the second vehicular terminal device is different from the third vehicular terminal device.

In Example 2675, the subject matter of Example 2672 or 2673 can optionally include wherein the second vehicular terminal device is the same as the third vehicular terminal device.

In Example 2676, the subject matter of any one of Examples 2672 to 2675 can optionally further include receiving one or more additional intermediate distributed processing results from one or more additional vehicular terminal devices, and wherein performing the distributed processing reducing task on the first intermediate distributed processing result and the second intermediate distributed processing result to obtain the final distributed processing result includes performing the distributed processing reducing task on the first intermediate distributed processing result, second intermediate distributed processing result, and the one or more additional intermediate distributed processing results to obtain the final distributed processing result.

In Example 2677, the subject matter of any one of Examples 2672 to 2676 can optionally include wherein the final distributed processing result is a driving scene reconstruction, a collision avoidance decision, or an autonomous driving decision.

In Example 2678, the subject matter of any one of Examples 2672 to 2677 can optionally include wherein the second intermediate distributed processing result indicates information of a local area of the third vehicular terminal device.

In Example 2679, the subject matter of any one of Examples 2672 to 2678 can optionally include wherein performing the distributed processing mapping task on the local sensor data to obtain the first intermediate distributed processing result includes performing the distributed processing mapping task on the local sensor data to obtain a raw first intermediate distributed processing result, and coding the raw first intermediate distributed processing result according to a distributed coding processing task to obtain the first raw intermediate output.

In Example 2680, the subject matter of Example 2679 can optionally include wherein the distributed coding processing task is a coding task for a coded MapReduce computation.

In Example 2681, the subject matter of Example 2679 or 2680 can optionally include wherein the second intermediate distributed processing result is encoded, and wherein performing the distributed processing reducing task on the first intermediate distributed processing result and the second intermediate distributed processing result to obtain the final distributed processing result includes decoding the second intermediate distributed processing result with the raw first intermediate distributed processing result according to a coded MapReduce scheme.

In Example 2682, the subject matter of any one of Examples 2672 to 2681 can optionally include wherein providing the first intermediate distributed processing result to the second vehicular terminal device according to the distributed processing shuffling scheme includes transmitting the first intermediate distributed processing result to the second vehicular terminal device over a Vehicle-to-Vehicle (V2V) connection according to the distributed processing shuffling scheme.

In Example 2683, the subject matter of any one of Examples 2672 to 2682 can optionally include wherein receiving the second intermediate distributed processing result from the third vehicular terminal device according to the distributed processing shuffling scheme includes receiving the second intermediate distributed processing result from the third vehicular terminal device over a Vehicle-to-Vehicle (V2V) connection according to the distributed processing shuffling scheme.

In Example 2684, the subject matter of any one of Examples 2672 to 2683 can optionally further include receiving an instruction from an anchor control node that specifies the distributed processing shuffling scheme.

In Example 2685, the subject matter of Example 2684 can optionally include wherein the instruction identifies the second vehicular terminal device as a destination for the first intermediate distributed processing result or the third vehicular terminal device as a source of the second intermediate distributed processing result.

In Example 2686, the subject matter of any one of Examples 2672 to 2681 can optionally include wherein providing the first intermediate distributed processing result to the second vehicular terminal device according to the distributed processing shuffling scheme includes transmitting the first intermediate distributed processing result to the second vehicular terminal device via an anchor control node that is coordinating the distributed computation.

In Example 2687, the subject matter of any one of Examples 2672 to 2681 can optionally include wherein receiving the second intermediate distributed processing result from the third vehicular terminal device according to the distributed processing shuffling scheme includes receiving the second intermediate distributed processing result from the third vehicular terminal device via an anchor control node that is coordinating the distributed computation.

In Example 2688, the subject matter of Example 2687 can optionally include wherein receiving the second intermediate distributed processing result from the third vehicular terminal device via the anchor control node that is coordinating the distributed computation includes receiving the second intermediate distributed processing result from the anchor control node as a multicast transmission.

In Example 2689, the subject matter of any one of Examples 2684 to 2688 can optionally include wherein the anchor control node is a network access node.

In Example 2690, the subject matter of Example 2689 can optionally include wherein the anchor control node is a roadside unit (RSU).

In Example 2691, the subject matter of any one of Examples 2684 to 2688 can optionally include wherein the anchor control node is a vehicular terminal device.

In Example 2692, the subject matter of any one of Examples 2672 to 2691 can optionally further include performing autonomous driving based on the final distributed processing result.

In Example 2693, the subject matter of any one of Examples 2672 to 2691 can optionally further include controlling a vehicular movement of the first vehicular terminal device based on the final distributed processing result.

In Example 2694, the subject matter of any one of Examples 2672 to 2692 can optionally include wherein the first vehicular terminal device is an autonomous terrestrial vehicle.

In Example 2695, the subject matter of any one of Examples 2672 to 2692 can optionally include wherein the first vehicular terminal device is an autonomous aerial vehicle.

In Example 2696, the subject matter of any one of Examples 2672 to 2695 can optionally include wherein the local sensor data is image data, video data, sonar data, positioning data, movement data, or radar data.

In Example 2697, the subject matter of any one of Examples 2672 to 2696 can optionally further include identifying a processing task, evaluating one or more situational criteria of the first vehicular terminal device to determine whether to perform the processing task locally or to perform the processing task as a distributed computation, and performing the processing task locally or as a distributed computation based on the determining.

In Example 2698, the subject matter of Example 2697 can optionally include wherein the one or more situational criteria include a computational load of the processing task, a latency constraint of the processing task, an available bandwidth, a current level of network congestion, a number of proximate vehicular terminal devices that are available for offloading, or a link quality of a vehicular link, or a link quality of an infrastructure link.

Example 2699 is a vehicular terminal device including one or more processors configured to perform the method of any one of Examples 2672 to 2698.

Example 2700 is a processing component configured to perform the method of any one of Examples 2672 to 2698.

Example 2701 is a non-transitory computer readable medium storing instructions that when executed by a processor cause the processor to perform the method of any one of Examples 2672 to 2698.

Example 2702 is a non-transitory computer readable medium storing instructions that when executed by one or more processors of a vehicular terminal device cause the vehicular terminal device to perform the method of any one of Examples 2672 to 2698.

Example 2703 is an anchor control node including means for assigning a respective distributed processing mapping task to each of a plurality of vehicular terminal devices, means for receiving a plurality of distributed intermediate processing results from the plurality of vehicular terminal devices based on the respective distributed processing mapping tasks, and means for routing the plurality of distributed intermediate processing results between the plurality of vehicular terminal devices according to a distributed processing shuffling scheme.

Example 2704 is a method at an anchor control node for coordinating a distributed computation between vehicular terminal devices, the method including assigning a respective distributed processing mapping task to each of a plurality of vehicular terminal devices, receiving a plurality of distributed intermediate processing results from the plurality of vehicular terminal devices based on the respective distributed processing mapping tasks, and routing the plurality of distributed intermediate processing results between the plurality of vehicular terminal devices according to a distributed processing shuffling scheme.

In Example 2705, the subject matter of Example 2704 can optionally include wherein the respective distributed processing mapping tasks are map tasks of a MapReduce computation and the distributed processing shuffling scheme is a shuffling scheme of the MapReduce computation.

In Example 2706, the subject matter of Example 2704 can optionally include wherein the respective distributed processing mapping tasks are map tasks of a coded MapReduce computation and the distributed processing shuffling scheme is a coded shuffling scheme of the coded MapReduce computation.

In Example 2707, the subject matter of any one of Examples 2704 to 2706 can optionally include wherein routing the plurality of distributed intermediate processing results between the plurality of vehicular terminal devices according to the distributed processing shuffling scheme includes performing a broadcast or multicast transmission to the plurality of vehicular terminal devices that includes the plurality of distributed intermediate processing results.

In Example 2708, the subject matter of Example 2707 can optionally include wherein the anchor control node is a network access node, and wherein performing the broadcast or multicast transmission to the plurality of vehicular terminal devices that includes the plurality of distributed intermediate processing results includes performing the broadcast or multicast transmission as a downlink transmission.

In Example 2709, the subject matter of Example 2708 can optionally include wherein the anchor control node is a roadside unit (RSU) network access node.

In Example 2710, the subject matter of any one of Examples 2704 to 2709 can optionally include wherein the anchor control node is a vehicular terminal device that is coordinating the distributed computation, and wherein routing the plurality of distributed intermediate processing results between the plurality of vehicular terminal devices according to the distributed processing shuffling scheme includes transmitting the plurality of distributed intermediate processing results to the plurality of terminal devices over one or more Vehicle-to-Vehicle (V2V) connections.

In Example 2711, the subject matter of any one of Examples 2704 to 2710 can optionally further include generating the distributed processing shuffling scheme based on one or more of a link quality between the plurality of vehicular terminal devices, a location of the plurality of terminal devices, or a processing capacity of the plurality of terminal devices.

In Example 2712, the subject matter of any one of Examples 2704 to 2711 can optionally include wherein the distributed computation is a driving scene reconstruction, a collision avoidance decision, or an autonomous driving decision.

Example 2713 is an anchor control node including a processing component configured to perform the method of any one of Examples 2704 to 2712.

Example 2714 is a processing circuit configured to perform the method of any one of Examples 2704 to 2712.

Example 2715 is a non-transitory computer readable medium storing instructions that when executed by a processor cause the processor to perform the method of any one of Examples 2704 to 2712.

Example 2716 is a non-transitory computer readable medium storing instructions that when executed by one or more processors of an anchor control node cause the anchor control node to perform the method of any one of Examples 2704 to 2712.

Example 2717 is a communication device including one or more processors configured to obtain local sensor data for a local area of the communication device, perform a distributed processing mapping task on the local sensor data to obtain a first intermediate distributed processing result, provide the first intermediate distributed processing result to a destination vehicular terminal device according to a distributed processing shuffling scheme, receive a second intermediate distributed processing result from a source vehicular terminal device according to the distributed processing shuffling scheme, and perform a distributed processing reducing task on the first intermediate distributed processing result and the second intermediate distributed processing result to obtain a final distributed processing result.

In Example 2718, the subject matter of Example 2717 can optionally further include a radio transceiver and one or more antennas, wherein the one or more processors are configured to transmit and receive data as radio signals via the radio transceiver and the one or more antennas.

In Example 2719, the subject matter of Example 2717 or 2718 can optionally be configured as an electronic component for a vehicular terminal device.

In Example 2720, the subject matter of Example 2718 can optionally be configured as a vehicular terminal device.

In Example 2721, the subject matter of any one of Examples 2717 to 2720 can optionally include wherein the destination vehicular terminal device is different from the source vehicular terminal device.

In Example 2722, the subject matter of any one of Examples 2717 to 2721 can optionally include wherein the destination vehicular terminal device is the same as the source vehicular terminal device.

In Example 2723, the subject matter of any one of Examples 2717 to 2722 can optionally include wherein the one or more processors are further configured to receive one or more additional intermediate distributed processing results from one or more additional vehicular terminal devices, and wherein the one or more processors are configured to perform the distributed processing reducing task on the first intermediate distributed processing result and the second intermediate distributed processing result to obtain the final distributed processing result by performing the distributed processing reducing task on the first intermediate distributed processing result, second intermediate distributed processing result, and the one or more additional intermediate distributed processing results to obtain the final distributed processing result.

In Example 2724, the subject matter of any one of Examples 2717 to 2723 can optionally include wherein the final distributed processing result is a driving scene reconstruction, a collision avoidance decision, or an autonomous driving decision.

In Example 2725, the subject matter of any one of Examples 2717 to 2724 can optionally include wherein the second intermediate distributed processing result indicates information of a local area of the source vehicular terminal device.

In Example 2726, the subject matter of any one of Examples 2717 to 2725 can optionally include wherein the one or more processors are configured to perform the distributed processing mapping task on the local sensor data to obtain the first intermediate distributed processing result by performing the distributed processing mapping task on the local sensor data to obtain a raw first intermediate distributed processing result, and coding the raw first intermediate distributed processing result according to a distributed coding processing task to obtain the first raw intermediate output.

In Example 2727, the subject matter of Example 2726 can optionally include wherein the distributed coding processing task is a coding task for a coded MapReduce computation.

In Example 2728, the subject matter of any one of Examples, wherein the can optionally include intermediate distributed processing result is encoded, and wherein the one or more processors are configured to perform the distributed processing reducing task on the first intermediate distributed processing result and the second intermediate distributed processing result to obtain the final distributed processing result by decoding the second intermediate distributed processing result with the raw first intermediate distributed processing result according to a coded MapReduce scheme.

In Example 2729, the subject matter of any one of Examples 2717 to 2728 can optionally include wherein the one or more processors are configured to provide the first intermediate distributed processing result to the destination vehicular terminal device according to the distributed processing shuffling scheme by transmitting the first intermediate distributed processing result to the destination vehicular terminal device over a Vehicle-to-Vehicle (V2V) connection according to the distributed processing shuffling scheme.

In Example 2730, the subject matter of any one of Examples 2717 to 2729 can optionally include wherein the one or more processors are configured to receive the second intermediate distributed processing result from the source vehicular terminal device according to the distributed processing shuffling scheme by receiving the second intermediate distributed processing result from the source vehicular terminal device over a Vehicle-to-Vehicle (V2V) connection according to the distributed processing shuffling scheme.

In Example 2731, the subject matter of any one of Examples 2717 to 2730 can optionally include wherein the one or more processors are further configured to receive an instruction from an anchor control node that specifies the distributed processing shuffling scheme.

In Example 2732, the subject matter of Example 2731 can optionally include wherein the instruction identifies the destination vehicular terminal device as a destination for the first intermediate distributed processing result or the source vehicular terminal device as a source of the second intermediate distributed processing result.

In Example 2733, the subject matter of any one of Examples 2717 to 2732 can optionally include wherein the one or more processors are configured to provide the first intermediate distributed processing result to the destination vehicular terminal device according to the distributed processing shuffling scheme by transmitting the first intermediate distributed processing result to the destination vehicular terminal device via an anchor control node that is coordinating the distributed processing shuffling scheme.

In Example 2734, the subject matter of any one of Examples 2717 to 2732 can optionally include wherein the one or more processors are configured to receive the second intermediate distributed processing result from the source vehicular terminal device according to the distributed processing shuffling scheme by receiving the second intermediate distributed processing result from the source vehicular terminal device via an anchor control node that is coordinating the distributed processing shuffling scheme.

In Example 2735, the subject matter of Example 2734 can optionally include wherein the one or more processors are configured to receive the second intermediate distributed processing result from the source vehicular terminal device via the anchor control node that is coordinating the distributed processing shuffling scheme by receiving the second intermediate distributed processing result from the anchor control node as a multicast transmission.

In Example 2736, the subject matter of any one of Examples 2731 to 2735 can optionally include wherein the anchor control node is a network access node.

In Example 2737, the subject matter of Example 2736 can optionally include wherein the anchor control node is a roadside unit (RSU).

In Example 2738, the subject matter of any one of Examples 2731 to 2735 can optionally include wherein the anchor control node is a vehicular terminal device.

In Example 2739, the subject matter of any one of Examples 2717 to 2738 can optionally include wherein the one or more processors are further configured to perform autonomous driving based on the final distributed processing result.

In Example 2740, the subject matter of any one of Examples 2717 to 2739 can optionally include wherein the one or more processors are further configured to control a vehicular movement of a vehicular terminal device housing the communication device based on the final distributed processing result.

In Example 2741, the subject matter of any one of Examples 2717 to 2740 can optionally further include a sensor configured to provide the sensor data to the one or more processors, wherein the sensor is an image sensor, a video sensor, a sonar sensor, a positioning sensor, a movement sensor, or a radar sensor.

In Example 2742, the subject matter of any one of Examples 2717 to 2741 can optionally include wherein the one or more processors are further configured to identify a processing task, evaluate one or more situational criteria of the first vehicular terminal device to determine whether to perform the processing task locally or to perform the processing task as a distributed computation, and perform the processing task locally or as a distributed computation based on the determining.

In Example 2743, the subject matter of Example 2742 can optionally include wherein the one or more situational criteria include a computational load of the processing task, a latency constraint of the processing task, an available bandwidth, a current level of network congestion, a number of proximate vehicular terminal devices that are available for offloading, or a link quality of a vehicular link, or a link quality of an infrastructure link.

Example 2744 is a communication device including one or more processors configured to assign a respective distributed processing mapping task to each of a plurality of vehicular terminal devices, receive a plurality of distributed intermediate processing results from the plurality of vehicular terminal devices based on the respective distributed processing mapping tasks, and route the plurality of distributed intermediate processing results between the plurality of vehicular terminal devices according to a distributed processing shuffling scheme.

In Example 2745, the subject matter of Example 2744 can optionally further include a radio transceiver and one or more antennas, wherein the one or more processors are configured to transmit and receive data as radio signals via the radio transceiver and the one or more antennas.

In Example 2746, the subject matter of Example 2744 or 2745 can optionally be configured as an electronic component for a network access node.

In Example 2747, the subject matter of Example 2746 can optionally be configured as a network access node.

In Example 2748, the subject matter of any one of Examples 2744 to 2747 can optionally include wherein the respective distributed processing mapping tasks are map tasks of a MapReduce computation and the distributed processing shuffling scheme is a shuffling scheme of the MapReduce computation.

In Example 2749, the subject matter of any one of Examples 2744 to 2748 can optionally include wherein the respective distributed processing mapping tasks are map tasks of a coded MapReduce computation and the distributed processing shuffling scheme is a coded shuffling scheme of the coded MapReduce computation.

In Example 2750, the subject matter of any one of Examples 2744 to 2749 can optionally include wherein the one or more processors are configured to route the plurality of distributed intermediate processing results between the plurality of vehicular terminal devices according to the distributed processing shuffling scheme by performing a broadcast or multicast transmission to the plurality of vehicular terminal devices that includes the plurality of distributed intermediate processing results.

In Example 2751, the subject matter of Example 2750 can optionally include adapted for operation in a network access node, and wherein performing the broadcast or multicast transmission to the plurality of vehicular terminal devices that includes the plurality of distributed intermediate processing results includes performing the broadcast or multicast transmission as a downlink transmission.

In Example 2752, the subject matter of Example 2751 can optionally include adapted for operation in a roadside unit (RSU) network access node.

In Example 2753, the subject matter of any one of Examples 2744 to 2752 can optionally include adapted for operation in a vehicular terminal device that is coordinating the distributed processing shuffling scheme, and wherein the one or more processors are configured to route the plurality of distributed intermediate processing results between the plurality of vehicular terminal devices according to the distributed processing shuffling scheme by transmitting the plurality of distributed intermediate processing results to the plurality of terminal devices over one or more Vehicle-to-Vehicle (V2V) connections.

In Example 2754, the subject matter of any one of Examples 2744 to 2753 can optionally include wherein the one or more processors are further configured to generate the distributed processing shuffling scheme based on one or more of a link quality between the plurality of vehicular terminal devices, a location of the plurality of terminal devices, or a processing capacity of the plurality of terminal devices.

In Example 2755, the subject matter of any one of Examples 2744 to 2754 can optionally include wherein the respective distributed processing mapping tasks are part of a driving scene reconstruction, a collision avoidance decision, or an autonomous driving decision.

Example 2756 is a communication device including processing circuitry configured to obtain local sensor data for a local area of the communication device, perform a distributed processing mapping task on the local sensor data to obtain a first intermediate distributed processing result, provide the first intermediate distributed processing result to a destination vehicular terminal device according to a distributed processing shuffling scheme, receive a second intermediate distributed processing result from a source vehicular terminal device according to the distributed processing shuffling scheme, and perform a distributed processing reducing task on the first intermediate distributed processing result and the second intermediate distributed processing result to obtain a final distributed processing result.

In Example 2757, the subject matter of Example 2756 can optionally further include a radio transceiver and one or more antennas, wherein the processing circuitry is configured to transmit and receive data as radio signals via the radio transceiver and the one or more antennas.

In Example 2758, the subject matter of Example 2756 or 2757 can optionally be configured as an electronic circuitry component for a vehicular terminal device.

In Example 2759, the subject matter of Example 2757 can optionally be configured as a vehicular terminal device.

In Example 2760, the subject matter of any one of Examples 2756 to 2759 can optionally include wherein the processing circuitry is hardware-defined circuitry of software-defined circuitry.

In Example 2761, the subject matter of any one of Examples 2756 to 2760 can optionally include wherein the destination vehicular terminal device is different from the source vehicular terminal device.

In Example 2762, the subject matter of any one of Examples 2756 to 2761 can optionally include wherein the destination vehicular terminal device is the same as the source vehicular terminal device.

In Example 2763, the subject matter of any one of Examples 2756 to 2762 can optionally include wherein the processing circuitry is further configured to receive one or more additional intermediate distributed processing results from one or more additional vehicular terminal devices, and wherein the processing circuitry is configured to perform the distributed processing reducing task on the first intermediate distributed processing result and the second intermediate distributed processing result to obtain the final distributed processing result by performing the distributed processing reducing task on the first intermediate distributed processing result, second intermediate distributed processing result, and the one or more additional intermediate distributed processing results to obtain the final distributed processing result.

In Example 2764, the subject matter of any one of Examples 2756 to 2763 can optionally include wherein the final distributed processing result is a driving scene reconstruction, a collision avoidance decision, or an autonomous driving decision.

In Example 2765, the subject matter of any one of Examples 2756 to 2764 can optionally include wherein the second intermediate distributed processing result indicates information of a local area of the source vehicular terminal device.

In Example 2766, the subject matter of any one of Examples 2756 to 2765 can optionally include wherein the processing circuitry is configured to perform the distributed processing mapping task on the local sensor data to obtain the first intermediate distributed processing result by performing the distributed processing mapping task on the local sensor data to obtain a raw first intermediate distributed processing result, and coding the raw first intermediate distributed processing result according to a distributed coding processing task to obtain the first raw intermediate output.

In Example 2767, the subject matter of Example 2766 can optionally include wherein the distributed coding processing task is a coding task for a coded MapReduce computation.

In Example 2768, the subject matter of Example 2766 or 2767 can optionally include wherein the second intermediate distributed processing result is encoded, and wherein the processing circuitry is configured to perform the distributed processing reducing task on the first intermediate distributed processing result and the second intermediate distributed processing result to obtain the final distributed processing result by decoding the second intermediate distributed processing result with the raw first intermediate distributed processing result according to a coded MapReduce scheme.

In Example 2769, the subject matter of any one of Examples 2756 to 2768 can optionally include wherein the processing circuitry is configured to provide the first intermediate distributed processing result to the destination vehicular terminal device according to the distributed processing shuffling scheme by transmitting the first intermediate distributed processing result to the destination vehicular terminal device over a Vehicle-to-Vehicle (V2V) connection according to the distributed processing shuffling scheme.

In Example 2770, the subject matter of any one of Examples 2756 to 2769 can optionally include wherein the processing circuitry is configured to receive the second intermediate distributed processing result from the source vehicular terminal device according to the distributed processing shuffling scheme by receiving the second intermediate distributed processing result from the source vehicular terminal device over a Vehicle-to-Vehicle (V2V) connection according to the distributed processing shuffling scheme.

In Example 2771, the subject matter of any one of Examples 2756 to 2770 can optionally include wherein the processing circuitry is further configured to receive an instruction from an anchor control node that specifies the distributed processing shuffling scheme.

In Example 2772, the subject matter of Example 2771 can optionally include wherein the instruction identifies the destination vehicular terminal device as a destination for the first intermediate distributed processing result or the source vehicular terminal device as a source of the second intermediate distributed processing result.

In Example 2773, the subject matter of any one of Examples 2756 to 2768 can optionally include wherein the processing circuitry is configured to provide the first intermediate distributed processing result to the destination vehicular terminal device according to the distributed processing shuffling scheme by transmitting the first intermediate distributed processing result to the destination vehicular terminal device via an anchor control node that is coordinating the distributed processing shuffling scheme.

In Example 2774, the subject matter of any one of Examples 2756 to 2768 can optionally include wherein the processing circuitry is configured to receive the second intermediate distributed processing result from the source vehicular terminal device according to the distributed processing shuffling scheme by receiving the second intermediate distributed processing result from the source vehicular terminal device via an anchor control node that is coordinating the distributed processing shuffling scheme.

In Example 2775, the subject matter of Example 2774 can optionally include wherein the processing circuitry is configured to receive the second intermediate distributed processing result from the source vehicular terminal device via the anchor control node that is coordinating the distributed processing shuffling scheme by receiving the second intermediate distributed processing result from the anchor control node as a multicast transmission.

In Example 2776, the subject matter of any one of Examples 2771 to 2775 can optionally include wherein the anchor control node is a network access node.

In Example 2777, the subject matter of Example 2776 can optionally include wherein the anchor control node is a roadside unit (RSU).

In Example 2778, the subject matter of any one of Examples 2771 to 2775 can optionally include wherein the anchor control node is a vehicular terminal device.

In Example 2779, the subject matter of any one of Examples 2756 to 2778 can optionally include wherein the processing circuitry is further configured to perform autonomous driving based on the final distributed processing result.

In Example 2780, the subject matter of any one of Examples 2756 to 2778 can optionally include wherein the processing circuitry is further configured to control a vehicular movement of a vehicular terminal device housing the communication device based on the final distributed processing result.

In Example 2781, the subject matter of any one of Examples 2756 to 2780 can optionally further include a sensor configured to provide the sensor data to the processing circuitry, wherein the sensor is an image sensor, a video sensor, a sonar sensor, a positioning sensor, a movement sensor, or a radar sensor.

In Example 2782, the subject matter of any one of Examples 2756 to 2781 can optionally include wherein the processing circuitry is further configured to identify a processing task, evaluate one or more situational criteria of the first vehicular terminal device to determine whether to perform the processing task locally or to perform the processing task as a distributed computation, and perform the processing task locally or as a distributed computation based on the determining.

In Example 2783, the subject matter of Example 2782 can optionally include wherein the one or more situational criteria include a computational load of the processing task, a latency constraint of the processing task, an available bandwidth, a current level of network congestion, a number of proximate vehicular terminal devices that are available for offloading, or a link quality of a vehicular link, or a link quality of an infrastructure link.

Example 2784 is a communication device including processing circuitry configured to assign a respective distributed processing mapping task to each of a plurality of vehicular terminal devices, receive a plurality of distributed intermediate processing results from the plurality of vehicular terminal devices based on the respective distributed processing mapping tasks, and route the plurality of distributed intermediate processing results between the plurality of vehicular terminal devices according to a distributed processing shuffling scheme.

In Example 2785, the subject matter of Example 2784 can optionally further include a radio transceiver and one or more antennas, wherein the processing circuitry is configured to transmit and receive data as radio signals via the radio transceiver and the one or more antennas.

In Example 2786, the subject matter of Example 2784 or 2785 can optionally be configured as an electronic circuitry component for a network access node.

In Example 2787, the subject matter of Example 2785 can optionally be configured as a network access node.

In Example 2788, the subject matter of any one of Examples 2784 to 2787 can optionally include wherein the processing circuitry is hardware-defined circuitry of software-defined circuitry.

In Example 2789, the subject matter of any one of Examples 2784 to 2788 can optionally include wherein the respective distributed processing mapping tasks are map tasks of a MapReduce computation and the distributed processing shuffling scheme is a shuffling scheme of the MapReduce computation.

In Example 2790, the subject matter of any one of Examples 2784 to 2789 can optionally include wherein the respective distributed processing mapping tasks are map tasks of a coded MapReduce computation and the distributed processing shuffling scheme is a coded shuffling scheme of the coded MapReduce computation.

In Example 2791, the subject matter of any one of Examples 2784 to 2790 can optionally include wherein the processing circuitry is configured to route the plurality of distributed intermediate processing results between the plurality of vehicular terminal devices according to the distributed processing shuffling scheme by performing a broadcast or multicast transmission to the plurality of vehicular terminal devices that includes the plurality of distributed intermediate processing results.

In Example 2792, the subject matter of Example 2791 can optionally include adapted for operation in a network access node, and wherein performing the broadcast or multicast transmission to the plurality of vehicular terminal devices that includes the plurality of distributed intermediate processing results includes performing the broadcast or multicast transmission as a downlink transmission.

In Example 2793, the subject matter of Example 2792 can optionally include adapted for operation in a roadside unit (RSU) network access node.

In Example 2794, the subject matter of any one of Examples 2784 to 2793 can optionally include adapted for operation in a vehicular terminal device that is coordinating the distributed processing shuffling scheme, and wherein the processing circuitry is configured to route the plurality of distributed intermediate processing results between the plurality of vehicular terminal devices according to the distributed processing shuffling scheme by transmitting the plurality of distributed intermediate processing results to the plurality of terminal devices over one or more Vehicle-to-Vehicle (V2V) connections.

In Example 2795, the subject matter of any one of Examples 2784 to 2794 can optionally include wherein the processing circuitry is further configured to generate the distributed processing shuffling scheme based on one or more of a link quality between the plurality of vehicular terminal devices, a location of the plurality of terminal devices, or a processing capacity of the plurality of terminal devices.

In Example 2796, the subject matter of any one of Examples 2784 to 2795 can optionally include wherein the respective distributed processing mapping tasks are part of a driving scene reconstruction, a collision avoidance decision, or an autonomous driving decision.

Example 2797 is a communication device including one or more processors configured to establish a direct wireless link with another terminal device, wherein the other terminal device is connected to a wireless network, receive, over the direct wireless link from the other terminal device, network connection parameters to the wireless network, and attempt a connection to the wireless network based on the network connection parameters.

In Example 2798, the subject matter of Example 2797 can optionally further include a transceiver and one or more antennas.

In Example 2799, the subject matter of Example 2798 can optionally include wherein the transceiver is configured to communicate with other devices via device to device (D2D) communications.

In Example 2800, the subject matter of Example 2798 or 2799 can optionally include wherein the one or more processors are configured to transmit and receive data via the transceiver and one or more antennas as radio signals.

In Example 2801, the subject matter of any one of Examples 2798 to 2800 can optionally be configured as a terminal device for radio communications.

In Example 2802, the subject matter of any one of Examples 2797 to 2800 can optionally be configured as an electronic circuitry component for operation in a terminal device.

In Example 2803, the subject matter of any one of Examples 2797 to 2802 can optionally include wherein the communication device is configured to establish the direct wireless link, receive the network connection parameters, and attempt the connection to the network prior to executing a full frequency band search.

In Example 2804, the subject matter of any one of Examples 2797 to 2803 can optionally include where the network connection parameters include one or more of reference signal received power (RSRP), reference signal received quality (RSRQ), signal to interference and noise ratio (SINR), or a round trip delay.

In Example 2805, the subject matter of any one of Examples 2797 to 2804 can optionally further include a memory configured to store a list of terminal devices from which the communication device is configured to establish the direct wireless link with.

In Example 2806, the subject matter of Example 2805 can optionally include wherein the list of terminal devices include terminal devices which share a common network operator with the communication device.

In Example 2807, the subject matter of Example 2805 can optionally include wherein the list of terminal devices include terminal devices which share a common original equipment manufacturer with the communication device.

In Example 2808, the subject matter of Example 2805 can optionally include wherein the list of terminal devices include terminal devices which share a common enterprise information technology manager with the communication device.

In Example 2809, the subject matter of any one of Examples 2797 to 2808 can optionally include the one or more processors further configured to receive, over the direct wireless link, positioning data of the other terminal device.

In Example 2810, the subject matter of Example 2809 can optionally include the one or more processors further configured to use the positioning data to determine a public landline mobile (PLMN) country code or operator code.

In Example 2811, the subject matter of any one of Examples 2809 to 2810 can optionally include the one or more processors further configured to use the positioning data as an approximate location for the communication device and suppress the communication device's own positioning components to determine the communication device's location.

In Example 2812, the subject matter of any one of Examples 2809 to 2811 can optionally include wherein the positioning data is related to a latitude, a longitude, or an altitude.

In Example 2813, the subject matter of any one of Examples 2809 to 2812 can optionally include wherein the positioning data is Global Positioning System (GPS) data.

Example 2814 is a communication device including one or more processors configured to establish a direct wireless link with at multiple terminal devices, wherein the multiple terminal devices are connected to a respective wireless network, receive, over each of the direct wireless links from the multiple terminal devices, respective network connection parameters to the respective wireless network, and evaluate each of the respective network connection parameters select, based on a criteria, specific network connection parameters from the respective network connection parameters, attempt a connection to a designated wireless network based on the specific network connection parameters.

In Example 2815, the subject matter of Example 2814 can optionally further include a transceiver and one or more antennas.

In Example 2816, the subject matter of Example 2815 can optionally include wherein the transceiver is configured to communicate with other devices via device to device (D2D) communications.

In Example 2817, the subject matter of Example 2815 or 2816 can optionally include wherein the one or more processors are configured to transmit and receive data via the transceiver and one or more antennas as radio signals.

In Example 2818, the subject matter of any one of Examples 2815 to 2817 can optionally be configured as a terminal device for radio communications.

In Example 2819, the subject matter of any one of Examples 2814 to 2818 can optionally be configured as an electronic circuitry component for operation in a terminal device.

In Example 2820, the subject matter of any one of Examples 2814 to 2819 can optionally include wherein the communication device is configured to establish the direct wireless links, receive the respective network connection parameters, and attempt the connection to the designated network prior to executing a full frequency band search.

In Example 2821, the subject matter of any one of Examples 2814 to 2820 can optionally include where the network connection parameters include a radio access technology type, a frequency band, a mobile country code (MCC), a mobile network code (MNC), a downlink carrier frequency, cell identity information, a reference signal receive power (RSRP), a reference signal receive quality (RSRQ), a Signal-to-Noise Ratio (SNR), a Signal to Noise Interference and Noise Ratio (SINR) value, a round trip delay, or system information.

In Example 2822, the subject matter of any one of Examples 2814 to 2821 can optionally further include a memory configured to store a list of terminal devices from which the communication device is configured to establish the direct wireless link with.

In Example 2823, the subject matter of Example 2822 can optionally include wherein the list of terminal devices include terminal devices which share a common network operator with the communication device.

In Example 2824, the subject matter of Example 2822 can optionally include the list of terminal devices include terminal devices which share a common original equipment manufacturer with the communication device.

In Example 2825, the subject matter of Example 2822 can optionally include wherein the list of terminal devices include terminal devices which share a common enterprise information technology manager with the communication device.

In Example 2826, the subject matter of any one of Examples 2814 to 2825 can optionally include the one or more processors further configured to receive over the direct wireless link, positioning data of the at least one other terminal device.

In Example 2827, the subject matter of Example 2826 can optionally include the one or more processors further configured to use the positioning data to determine a public landline mobile (PLMN) country code or operator code.

In Example 2828, the subject matter of any one of Examples 2826 to 2827 can optionally include the one or more processors further configured to use the positioning data as an approximate location for the communication device and suppress the communication device's own positioning components to determine the communication device's location.

In Example 2829, the subject matter of any one of Examples 2826 to 2828 can optionally include wherein the positioning data is related to a latitude, a longitude, or an altitude.

In Example 2830, the subject matter of any one of Examples 2826 to 2829 can optionally include wherein the positioning data is Global Positioning System (GPS) data.

Example 2831 is a communication device including means for establishing a direct wireless link with another terminal device, wherein the other terminal device is connected to a wireless network, means for receiving, over the direct wireless link from the other terminal device, network connection parameters to the wireless network, and means for attempting a connection to the wireless network based on the network connection parameters.

Example 2832 is a method for a communication device to establish a connection to a wireless network, the method including establishing a direct wireless link with another terminal device, wherein the other terminal device is connected to a wireless network, receiving, over the direct wireless link from the other terminal device, network connection parameters to the wireless network, and attempting a connection to the wireless network based on the network connection parameters.

In Example 2833, the subject matter of Example 2832 can optionally further include establishing the direct wireless link, receiving the network connection parameters, and attempting the connection to the network prior to the communication device executing a full frequency band search.

In Example 2834, the subject matter of any one of Examples 2832 to 2833 can optionally include wherein the communication device includes a transceiver configured to communicate with other devices via device to device (D2D) communications.

In Example 2835, the subject matter of any one of Examples 2832 to 2834 can optionally include wherein the network connection parameters include a radio access technology type, a frequency band, a mobile country code (MCC), a mobile network code (MNC), a downlink carrier frequency, cell identity information, a reference signal receive power (RSRP), a reference signal receive quality (RSRQ), a Signal-to-Noise Ratio (SNR), a Signal to Noise Interference and Noise Ratio (SINR) value, a round trip delay, or system information.

In Example 2836, the subject matter of any one of Examples 2832 to 2835 can optionally further include storing a list of terminal devices from which the communication device is configured to establish the direct wireless link with in a memory component of the communication device.

In Example 2837, the subject matter of Example 2836 can optionally include wherein the list of terminal devices include terminal devices which share a common network operator with the communication device.

In Example 2838, the subject matter of Example 2836 can optionally include wherein the list of terminal devices include terminal devices which share a common original equipment manufacturer with the communication device.

In Example 2839, the subject matter of Example 2836 can optionally include wherein the list of terminal devices include terminal devices which share a common enterprise information technology manager with the communication device.

In Example 2840, the subject matter of any one of Examples 2832 to 2839 can optionally further include receiving, over the direct wireless link, positioning data of the other terminal device.

In Example 2841, the subject matter of Example 2840 can optionally further include using the positioning data to determine a public landline mobile (PLMN) country code or operator code.

In Example 2842, the subject matter of any one of Examples 2840 to 2841 can optionally further include using the positioning data as an approximate location for the communication device and suppressing the communication device's own positioning components.

In Example 2843, the subject matter of any one of Examples 2840 to 2842 can optionally include wherein the positioning data is related to a latitude, a longitude, or an altitude.

In Example 2844, the subject matter of any one of Examples 2840 to 2843 can optionally include wherein the positioning data is Global Positioning System (GPS) data.

Example 2845 is a terminal device including one or more processors configured to perform the method of any one of Examples 2832 to 2842.

Example 2846 is a processing circuit configured to perform the method of any one of Examples 2832 to 2845.

Example 2847 is a non-transitory computer readable medium storing instructions that when executed by a processor cause the processor to perform the method of any one of Examples 2832 to 2842.

Example 2848 is a non-transitory computer readable medium storing instructions that when executed by one or more processors of a terminal device cause the terminal device to perform the method of any one of Examples 2832 to 2842.

Example 2848 is a communication device including means for establishing a direct wireless link with at multiple terminal devices, wherein the multiple terminal devices are connected to a respective wireless network, means for receiving, over each of the direct wireless links from the multiple terminal devices, respective network connection parameters to the respective wireless network, and means for evaluating each of the respective network connection parameters, means for selecting, based on a criteria, specific network connection parameters from the respective network connection parameters, and means for attempting a connection to a designated wireless network based on the specific network connection parameters.

Example 2850 is a method for a communication device to establish a connection to a wireless network, the method including establishing a direct wireless link with at multiple terminal devices, wherein the multiple terminal devices are connected to a respective wireless network, receiving, over each of the direct wireless links from the multiple terminal devices, respective network connection parameters to the respective wireless network, and evaluating each of the respective network connection parameters selecting, based on a criteria, specific network connection parameters from the respective network connection parameters, attempting a connection to a designated wireless network based on the specific network connection parameters.

In Example 2851, the subject matter of Example 2850 can optionally further include establishing the direct wireless links, receiving the respective network connection parameters, and attempting the connection to the designated network prior to executing a full frequency band search.

In Example 2852, the subject matter of Example 2850 or 2851 can optionally include wherein the attempt to connection to the designated wireless network fails, selecting second specific network connection parameters from the respective network connection parameters to and attempting another connection to a second designated wireless network based on the second specific network connection parameters.

In Example 2853, the subject matter of any one of Examples 2850 to 2852 can optionally include wherein the communication device includes a transceiver configured to communicate with other devices via device to device (D2D) communications.

In Example 2854, the subject matter of any one of Examples 2850 to 2853 can optionally include wherein the network connection parameters include a radio access technology type, a frequency band, a mobile country code (MCC), a mobile network code (MNC), a downlink carrier frequency, cell identity information, a reference signal receive power (RSRP), a reference signal receive quality (RSRQ), a Signal-to-Noise Ratio (SNR), a Signal to Noise Interference and Noise Ratio (SINR) value, a round trip delay, or system information.

In Example 2855, the subject matter of any one of Examples 2850 to 2854 can optionally further include storing a list of terminal devices from which the communication device is configured to establish the direct wireless link with in a memory component of the communication device.

In Example 2856, the subject matter of Example 2855 can optionally include wherein the list of terminal devices include terminal devices which share a common network operator with the communication device.

In Example 2857, the subject matter of Example 2855 can optionally include wherein the list of terminal devices include terminal devices which share a common original equipment manufacturer with the communication device.

In Example 2858, the subject matter of Example 2855 can optionally include wherein the list of terminal devices include terminal devices which share a common enterprise information technology manager with the communication device.

In Example 2859, the subject matter of any one of Examples 2850 to 2858 can optionally further include receiving, over the direct wireless link, positioning data of the other terminal device.

In Example 2860, the subject matter of Example 2859 can optionally include including using the positioning data to determine a public landline mobile (PLMN) country code or operator code.

In Example 2861, the subject matter of any one of Examples 2859 to 2860 can optionally further include using the positioning data as an approximate location for the communication device and suppressing the communication device's own positioning components.

In Example 2862, the subject matter of any one of Examples 2859 to 2861 can optionally include wherein the positioning data is related to a latitude, a longitude, or an altitude.

In Example 2863, the subject matter of any one of Examples 2859 to 2862 can optionally include wherein the positioning data is Global Positioning System (GPS) data.

Example 2864 is a terminal device including one or more processors configured to perform the method of any one of Examples 2850 to 2861.

Example 2865 is a processing circuit configured to perform the method of any one of Examples 2850 to 2861.

Example 2866 is a non-transitory computer readable medium storing instructions that when executed by a processor cause the processor to perform the method of any one of Examples 2850 to 2861.

Example 2867 is a non-transitory computer readable medium storing instructions that when executed by one or more processors of a terminal device cause the terminal device to perform the method of any one of Examples 2850 to 2861.

Example 2868 is a device including means for establishing a connection to a network from a first terminal device of a plurality of terminal devices, means for suppressing network frequency band scans of the remaining of the plurality of terminal devices, and means for sharing the network connection data obtained at the first terminal device from its connection to the network with the remaining of the plurality of terminal devices.

Example 2869 is a method for managing a network connection data between a plurality of terminal devices, the method including establishing a connection to a network from a first terminal device of the plurality of terminal devices, suppressing network frequency band scans of the remaining of the plurality of terminal devices, and sharing the network connection data obtained at the first terminal device from its connection to the network with the remaining of the plurality of terminal devices.

In Example 2870, the subject matter of Example 2869 can optionally further include establishing a direct link from the first terminal device to the remaining of the plurality of the terminal devices.

In Example 2871, the subject matter of any one of Examples 2869 to 2870 can optionally include wherein the direct link is a device to device (D2D) link.

In Example 2872, the subject matter of any one of Examples 2869 to 2871 can optionally further include a second terminal device connecting to the network based on the shared network connection data.

In Example 2873, the subject matter of Example 2872 can optionally include wherein upon the second terminal device connecting to the network, terminating the connection between the network and the first terminal device.

Example 2874 is a terminal device including one or more processors configured to perform the method of any one of Examples 2869 to 2873.

Example 2875 is a processing circuit configured to perform the method of any one of Examples 2869 to 2873.

Example 2876 is a non-transitory computer readable medium storing instructions that when executed by a processor cause the processor to perform the method of any one of Examples 2869 to 2873.

Example 2877 is a non-transitory computer readable medium storing instructions that when executed by one or more processors of a terminal device cause the terminal device to perform the method of any one of Examples 2869 to 2873.

Example 2878 is a communication device including processing circuitry configured to establish a direct wireless link with another terminal device, wherein the other terminal device is connected to a wireless network, receive, over the direct wireless link from the other terminal device, network connection parameters to the wireless network, and attempt a connection to the wireless network based on the network connection parameters.

In Example 2879, the subject matter of Example 2878 can optionally further include a transceiver and one or more antennas.

In Example 2880, the subject matter of Example 2879 can optionally include wherein the transceiver is configured to communicate with other devices via device to device (D2D) communications.

In Example 2881, the subject matter of Example 2879 or 2880 can optionally include wherein the processing circuitry is configured to transmit and receive data via the transceiver and one or more antennas as radio signals.

In Example 2882, the subject matter of any one of Examples 2879 to 2881 can optionally be configured as a terminal device for radio communications.

In Example 2883, the subject matter of any one of Examples 2878 to 2881 can optionally be configured as an electronic circuitry component for operation in a terminal device.

In Example 2884, the subject matter of any one of Examples 2878 to 2883 can optionally include wherein the communication device is configured to establish the direct wireless link, receive the network connection parameters, and attempt the connection to the network prior to executing a full frequency band search.

In Example 2885, the subject matter of any one of Examples 2878 to 2884 can optionally include where the network connection parameters include a radio access technology type, a frequency band, a mobile country code (MCC), a mobile network code (MNC), a downlink carrier frequency, cell identity information, a reference signal receive power (RSRP), a reference signal receive quality (RSRQ), a Signal-to-Noise Ratio (SNR), a Signal to Noise Interference and Noise Ratio (SINR) value, a round trip delay, or system information.

In Example 2886, the subject matter of any one of Examples 2878 to 2885 can optionally further include a memory configured to store a list of terminal devices from which the communication device is configured to establish the direct wireless link with.

In Example 2887, the subject matter of Example 2886 can optionally include wherein the list of terminal devices include terminal devices which share a common network operator with the communication device.

In Example 2888, the subject matter of Example 2886 can optionally include wherein the list of terminal devices include terminal devices which share a common original equipment manufacturer with the communication device.

In Example 2889, the subject matter of Example 2886 can optionally include wherein the list of terminal devices include terminal devices which share a common enterprise information technology manager with the communication device.

In Example 2890, the subject matter of any one of Examples 2878 to 2889 can optionally include the processing circuitry further configured to receive over the direct wireless link, positioning data of the other terminal device.

In Example 2891, the subject matter of Example 2890 can optionally include the processing circuitry further configured to use the positioning data to determine a public landline mobile (PLMN) country code or operator code.

In Example 2892, the subject matter of any one of Examples 2890 to 2891 can optionally include the processing circuitry further configured to use the positioning data as an approximate location for the communication device and suppress the communication device's own positioning components to determine the communication device's location.

In Example 2893, the subject matter of any one of Examples 2890 to 2892 can optionally include wherein the positioning data is related to a latitude, a longitude, or an altitude.

In Example 2894, the subject matter of any one of Examples 2890 to 2893 can optionally include wherein the positioning data is Global Positioning System (GPS) data.

Example 2895 is a communication device including processing circuitry configured to establish a direct wireless link with at multiple terminal devices, wherein the multiple terminal devices are connected to a respective wireless network, receive, over each of the direct wireless links from the multiple terminal devices, respective network connection parameters to the respective wireless network, and evaluate each of the respective network connection parameters select, based on a criteria, specific network connection parameters from the respective network connection parameters, attempt a connection to a designated wireless network based on the specific network connection parameters.

In Example 2896, the subject matter of Example 2895 can optionally further include a transceiver and one or more antennas.

In Example 2897, the subject matter of Example 2896 can optionally include wherein the transceiver is configured to communicate with other devices via device to device (D2D) communications.

In Example 2898, the subject matter of Example 2896 or 2897 can optionally include wherein the processing circuitry is configured to transmit and receive data via the transceiver and one or more antennas as radio signals.

In Example 2899, the subject matter of any one of Examples 2896 to 2898 can optionally be configured as a terminal device for radio communications.

In Example 2900, the subject matter of any one of Examples 2895 to 2899 can optionally be configured as an electronic circuitry component for operation in a terminal device.

In Example 2901, the subject matter of any one of Examples 2895 to 2900 can optionally include wherein the communication device is configured to establish the direct wireless links, receive the respective network connection parameters, and attempt the connection to the designated network prior to executing a full frequency band search.

In Example 2902, the subject matter of any one of Examples 2895 to 2901 can optionally include where the network connection parameters include a radio access technology type, a frequency band, a mobile country code (MCC), a mobile network code (MNC), a downlink carrier frequency, cell identity information, a reference signal receive power (RSRP), a reference signal receive quality (RSRQ), a Signal-to-Noise Ratio (SNR), a Signal to Noise Interference and Noise Ratio (SINR) value, a round trip delay, or system information.

In Example 2903, the subject matter of any one of Examples 2895 to 2902 can optionally further include a memory configured to store a list of terminal devices from which the communication device is configured to establish the direct wireless link with.

In Example 2904, the subject matter of Example 2903 can optionally include wherein the list of terminal devices include terminal devices which share a common network operator with the communication device.

In Example 2905, the subject matter of Example 2903 can optionally include the list of terminal devices include terminal devices which share a common original equipment manufacturer with the communication device.

In Example 2906, the subject matter of Example 2903 can optionally include wherein the list of terminal devices include terminal devices which share a common enterprise information technology manager with the communication device.

In Example 2907, the subject matter of any one of Examples 2895 to 2906 can optionally include the processing circuitry further configured to receive over the direct wireless link, positioning data of the at least one other terminal device.

In Example 2908, the subject matter of Example 2907 can optionally include the processing circuitry further configured to use the positioning data to determine a public landline mobile (PLMN) country code or operator code.

In Example 2909, the subject matter of any one of Examples 2907 to 2908 can optionally include the processing circuitry further configured to use the positioning data as an approximate location for the communication device and suppress the communication device's own positioning components to determine the communication device's location.

In Example 2910, the subject matter of any one of Examples 2907 to 2909 can optionally include wherein the positioning data is related to a latitude, a longitude, or an altitude.

In Example 2911, the subject matter of any one of Examples 2907 to 2910 can optionally include wherein the positioning data is Global Positioning System (GPS) data.

Example 2912 is a terminal device including means for receiving, from a proximate terminal device on a direct link, shared radio channel information that characterizes a radio downlink radio channel for a network access node that the terminal device is connected to, means for applying the shared radio channel information and local radio channel information to obtain a joint radio channel information, and means for receiving downlink data from the network access node based on the joint radio channel information.

Example 2913 is a method of performing radio communications at a terminal device, the method including receiving, from a proximate terminal device on a direct link, shared radio channel information that characterizes a radio downlink radio channel for a network access node that the terminal device is connected to, applying the shared radio channel information and local radio channel information to obtain a joint radio channel information, and receiving downlink data from the network access node based on the joint radio channel information.

In Example 2914, the subject matter of Example 2913 can optionally include wherein the direct link is a Device-to-Device (D2D) link.

In Example 2915, the subject matter of Example 2913 can optionally include wherein the direct link is a Vehicle-to-Vehicle (V2V) link.

In Example 2916, the subject matter of Example 2913 can optionally include wherein the direct link is part of a Device-to-Device (D2D) context, a Vehicle-to-Vehicle (V2V) context, a Vehicle-to-Infrastructure (V2I) context, an Infrastructure-to-Vehicle (I2V) context, or a Vehicle-to-Everything (V2X) context.

In Example 2917, the subject matter of any one of Examples 2913 to 2916 can optionally include wherein the shared radio channel information characterizes a downlink radio channel from the network access node and the proximate terminal device, and wherein the local radio channel information characterizes a downlink radio channel from the network access node to the terminal device.

In Example 2918, the subject matter of any one of Examples 2913 to 2918 can optionally include wherein receiving the downlink data from the network access node based on the joint radio channel information includes demodulating the downlink data with the joint radio channel estimate.

In Example 2919, the subject matter of any one of Examples 2913 to 2917 can optionally include wherein receiving the downlink data from the network access node based on the joint radio channel information includes performing channel equalization on the downlink data based on the joint radio channel information.

In Example 2919, the subject matter of any one of Examples 2913 to 2917 can optionally include wherein receiving the downlink data from the network access node based on the joint radio channel information includes reporting the joint radio channel information to the network access node, and receiving the downlink data as downlink data that is precoded based on the joint radio channel information.

In Example 2921, the subject matter of any one of Examples 2913 to 2920 can optionally include wherein the shared radio channel information is a power level, a frequency offset, a delay spread, a channel response, or a channel estimate.

In Example 2922, the subject matter of any one of Examples 2913 to 2920 can optionally further include before receiving the shared radio channel information, performing discovery to identify the proximate terminal device, and establishing the direct link with the proximate terminal device.

In Example 2923, the subject matter of Example 2922 can optionally further include identifying that the proximate terminal device is co-located with the terminal device during the discovery.

In Example 2924, the subject matter of any one of Examples 2913 to 2923 can optionally further include terminating the direct link with the proximate terminal device.

In Example 2925, the subject matter of any one of Examples 2913 to 2924 can optionally include wherein receiving the downlink data from the network access node based on the joint radio channel information includes receiving the same downlink data from the network access node as the proximate terminal device.

In Example 2926, the subject matter of any one of Examples 2913 to 2925 can optionally include wherein applying the shared radio channel information and the local radio channel information to obtain the joint radio channel information includes interpolating between the shared radio channel information and the local radio channel information based on a timing difference between the shared radio channel information and the local radio channel information to obtain the joint radio channel information.

In Example 2927, the subject matter of Example wherein can optionally include shared radio channel information has an earlier originating time than the local radio channel information.

In Example 2928, the subject matter of any one of Examples 2913 to 2927 can optionally further include before receiving the shared radio channel information, receiving a device knowledge history class from the proximate terminal device, and requesting the shared radio channel information from the proximate terminal device based on the device knowledge history class.

In Example 2929, the subject matter of Example 2928 can optionally include wherein the device knowledge history class indicates a geographic range for which the proximate terminal device has radio channel information.

In Example 2930, the subject matter of Example 2928 or 2929 can optionally include wherein the device knowledge history class indicates a quantity of radio access technologies for which the proximate terminal device has radio channel information.

In Example 2931, the subject matter of any one of Examples 2928 to 2930 can optionally include wherein the device knowledge history class indicates whether the proximate terminal device has radio channel information for a concentrated geographic area.

In Example 2932, the subject matter of any one of Examples 2913 to 2931 can optionally further include transmitting the local radio channel information to the proximate terminal device on the direct link.

In Example 2933, the subject matter of any one of Examples 2913 to 2932 can optionally further include before applying the shared radio channel information and local radio channel information to obtain the joint radio channel information, receiving downlink data from the network access node and evaluating the downlink data to obtain the local radio channel information.

Example 2934 is a terminal device including one or more processors configured to perform the method of any one of Examples 2913 to 2933.

Example 2935 is a processing circuit configured to perform the method of any one of Examples 2913 to 2933.

Example 2936 is a non-transitory computer readable medium storing instructions that when executed by a processor cause the processor to perform the method of any one of Examples 2913 to 2933.

Example 2937 is a non-transitory computer readable medium storing instructions that when executed by one or more processors of a terminal device cause the terminal device to perform the method of any one of Examples 2913 to 2933.

Example 2938 is a terminal device including means for receiving, from a proximate terminal device on a direct link, shared radio channel information that characterizes a downlink radio channel of a first network access node that is causing interference to the terminal device, means for receiving downlink data from a second network access node, and means for performing interference cancellation on the downlink data based on the shared radio channel information.

Example 2939 is a method of performing radio communications at a terminal device, the method including receiving, from a proximate terminal device on a direct link, shared radio channel information that characterizes a downlink radio channel of a first network access node that is causing interference to the terminal device, receiving downlink data from a second network access node, and performing interference cancellation on the downlink data based on the shared radio channel information.

In Example 2940, the subject matter of Example 2939 can optionally include wherein the direct link is a Device-to-Device (D2D) link.

In Example 2941, the subject matter of Example 2939 can optionally include wherein the direct link is a Vehicle-to-Vehicle (V2V) link.

In Example 2942, the subject matter of Example 2939 can optionally include wherein the direct link is part of a Device-to-Device (D2D) context, a Vehicle-to-Vehicle (V2V) context, a Vehicle-to-Infrastructure (V2I) context, an Infrastructure-to-Vehicle (I2V) context, or a Vehicle-to-Everything (V2X) context.

In Example 2943, the subject matter of any one of Examples 2939 to 2942 can optionally include wherein the shared radio channel information characterizes a downlink radio channel between the first network access node and the proximate terminal device.

In Example 2944, the subject matter of any one of Examples 2939 to 2943 can optionally include wherein performing the interference cancellation on the downlink data based on the shared radio channel information includes estimating the interference from the first network access node to obtain an estimated interference, and canceling the estimated interference from the downlink data.

In Example 2945, the subject matter of any one of Examples 2939 to 2944 can optionally include wherein the shared radio channel information is a power level, a frequency offset, a delay spread, a channel response, or a channel estimate.

In Example 2946, the subject matter of any one of Examples 2939 to 2945 can optionally further include before receiving the shared radio channel information, performing discovery to identify the proximate terminal device, and establishing the direct link with the proximate terminal device In Example 2947, the subject matter of Example 2946 can optionally further include identifying that the proximate terminal device is co-located with the terminal device during the discovery.

In Example 2948, the subject matter of any one of Examples 2939 to 2947 can optionally further include terminating the direct link with the proximate terminal device.

In Example 2949, the subject matter of any one of Examples 2939 to 2948 can optionally include wherein performing the interference cancellation on the downlink data based on the shared radio channel information includes performing interpolation with the shared radio channel information based on a timing difference between the downlink data and the shared radio channel information to obtain interpolated radio channel information, and performing the interference cancellation on the downlink data with the interpolated radio channel information.

In Example 2950, the subject matter of any one of Examples 2939 to 2949 can optionally further include before receiving the shared radio channel information, receiving a device knowledge history class from the proximate terminal device, and requesting the shared radio channel information from the proximate terminal device based on the device knowledge history class.

In Example 2951, the subject matter of Example 2950 can optionally include wherein the device knowledge history class indicates a geographic range for which the proximate terminal device has radio channel information.

In Example 2952, the subject matter of Example 2950 or 2951 can optionally include wherein the device knowledge history class indicates a quantity of radio access technologies for which the proximate terminal device has radio channel information.

In Example 2953, the subject matter of any one of Examples 2950 to 2952 can optionally include wherein the device knowledge history class indicates whether the proximate terminal device has radio channel information for a concentrated geographic area.

In Example 2954, the subject matter of any one of Examples 2939 to 2953 can optionally further include receiving downlink data from the network access node and evaluating the downlink data to obtain local radio channel information, and transmitting the local radio channel information to the proximate terminal device on the direct link.

Example 2955 is a terminal device including one or more processors configured to perform the method of any one of Examples 2939 to 2954.

Example 2956 is a processing circuit configured to perform the method of any one of Examples 2939 to 2954.

Example 2957 is a non-transitory computer readable medium storing instructions that when executed by a processor cause the processor to perform the method of any one of Examples 2939 to 2954.

Example 2958 is a non-transitory computer readable medium storing instructions that when executed by one or more processors of a terminal device cause the terminal device to perform the method of any one of Examples 2939 to 2954.

Example 2959 is a terminal device including means for identifying a proximate terminal device as part of a device discovery procedure, means for receiving, on a direct link, a device knowledge history class from the proximate terminal device that indicates a geographic range for which the proximate terminal device has communication information or a quantity of radio access technologies for which the proximate terminal device has communication information, and means for deciding whether to request communication information from the proximate terminal device based on the device knowledge history class.

Example 2960 is a method of performing radio communications at a terminal device, the method including identifying a proximate terminal device as part of a device discovery procedure, receiving, on a direct link, a device knowledge history class from the proximate terminal device that indicates a geographic range for which the proximate terminal device has communication information or a quantity of radio access technologies for which the proximate terminal device has communication information, and deciding whether to request communication information from the proximate terminal device based on the device knowledge history class.

In Example 2961, the subject matter of Example 2960 can optionally include wherein the direct link is a Device-to-Device (D2D) link.

In Example 2962, the subject matter of Example 2960 can optionally include wherein the direct link is a Vehicle-to-Vehicle (V2V) link.

In Example 2963, the subject matter of Example 2960 can optionally include wherein the direct link is part of a Device-to-Device (D2D) context, a Vehicle-to-Vehicle (V2V) context, a Vehicle-to-Infrastructure (V2I) context, an Infrastructure-to-Vehicle (I2V) context, or a Vehicle-to-Everything (V2X) context.

In Example 2964, the subject matter of any one of Examples 2960 to 2963 can optionally include wherein the device knowledge history class indicates the geographic range for which the proximate terminal device has communication information and a quantity of radio access technologies over the geographic range for which the proximate terminal device has communication information.

In Example 2965, the subject matter of any one of Examples 2960 to 2964 can optionally further include requesting communication information from the proximate terminal device.

In Example 2966, the subject matter of any one of Examples 2960 to 2965 can optionally include wherein the device knowledge history class indicates a concentrated geographic region in which communication information is available.

In Example 2967, the subject matter of Example 2966 can optionally further include receiving communication information for the concentrated geographic region from the proximate terminal device, and transmitting or receiving data based on the communication information when the terminal device is located in the concentrated geographic region.

Example 2968 is a terminal device including one or more processors configured to perform the method of any one of Examples 2960 to 2969.

Example 2969 is a processing circuit configured to perform the method of any one of Examples 2960 to 2969.

Example 2970 is a non-transitory computer readable medium storing instructions that when executed by a processor cause the processor to perform the method of any one of Examples 2960 to 2969.

Example 2971 is a non-transitory computer readable medium storing instructions that when executed by one or more processors of a terminal device cause the terminal device to perform the method of any one of Examples 2960 to 2969.

Example 2972 is a communication device including one or more processors configured to receive, from a proximate terminal device on a direct link, shared radio channel information that characterizes a radio downlink radio channel for a network access node that the communication device is connected to, apply the shared radio channel information and local radio channel information to obtain a joint radio channel information, and receive downlink data from the network access node based on the joint radio channel information.

In Example 2973, the subject matter of Example 2972 can optionally include wherein the direct link is a Device-to-Device (D2D) link.

In Example 2974, the subject matter of Example 2972 can optionally include wherein the direct link is a Vehicle-to-Vehicle (V2V) link.

In Example 2975, the subject matter of Example 2972 can optionally include wherein the direct link is part of a Device-to-Device (D2D) context, a Vehicle-to-Vehicle (V2V) context, a Vehicle-to-Infrastructure (V2I) context, an Infrastructure-to-Vehicle (I2V) context, or a Vehicle-to-Everything (V2X) context.

In Example 2976, the subject matter of any one of Examples 2972 to 2975 can optionally further include a radio transceiver and one or more antennas, wherein the one or more processors are configured to transmit and receive data as radio signals via the radio transceiver and the one or more antennas.

In Example 2977, the subject matter of Example 2976 can optionally be configured as a terminal device for radio communications.

In Example 2978, the subject matter of Example 2976 can optionally be configured as an electronic component of a terminal device.

In Example 2979, the subject matter of any one of Examples 2976 to 2978 can optionally further include an application processor.

In Example 2980, the subject matter of any one of Examples 2972 to 2979 can optionally include wherein the shared radio channel information characterizes a downlink radio channel from the network access node to the proximate terminal device, and wherein the local radio channel information characterizes a downlink radio channel from the network access node to the communication device.

In Example 2981, the subject matter of Example one can optionally include Examples 2972 to 2980, wherein the one or more processors are configured to receive the downlink data from the network access node based on the joint radio channel information by demodulating the downlink data with the joint radio channel estimate.

In Example 2982, the subject matter of any one of Examples 2972 to 2980 can optionally include wherein the one or more processors are configured to receive the downlink data from the network access node based on the joint radio channel information by performing channel equalization on the downlink data based on the joint radio channel information.

In Example 2983, the subject matter of any one of Examples 2972 to 2980 can optionally include wherein the one or more processors are configured to receive the downlink data from the network access node based on the joint radio channel information by reporting the joint radio channel information to the network access node, and receiving the downlink data as downlink data that is precoded based on the joint radio channel information.

In Example 2984, the subject matter of any one of Examples 2972 to 2983 can optionally include wherein the shared radio channel information is a power level, a frequency offset, a delay spread, a channel response, or a channel estimate.

In Example 2985, the subject matter of any one of Examples 2972 to 2984 can optionally include wherein the one or more processors are further configured to before receiving the shared radio channel information, perform discovery to identify the proximate terminal device, and establish the direct link with the proximate terminal device.

In Example 2986, the subject matter of Example 2985 can optionally include wherein the one or more processors are further configured to identify that the proximate terminal device is co-located with the communication device during the discovery.

In Example 2987, the subject matter of any one of Examples 2972 to 2986 can optionally include wherein the one or more processors are further configured to terminate the direct link with the proximate terminal device.

In Example 2988, the subject matter of any one of Examples 2972 to 2987 can optionally include wherein the one or more processors are configured to receive the same downlink data from the network access node as the proximate terminal device.

In Example 2989, the subject matter of any one of Examples 2972 to 2988 can optionally include wherein the one or more processors are configured to apply the shared radio channel information and the local radio channel information to obtain the joint radio channel information by interpolating between the shared radio channel information and the local radio channel information based on a timing difference between the shared radio channel information and the local radio channel information to obtain the joint radio channel information.

In Example 2990, the subject matter of Example 2989 can optionally include wherein the shared radio channel information has an earlier originating time than the local radio channel information.

In Example 2991, the subject matter of any one of Examples 2972 to 2990 can optionally include wherein the one or more processors are further configured to before receiving the shared radio channel information, receive a device knowledge history class from the proximate terminal device, and request the shared radio channel information from the proximate terminal device based on the device knowledge history class.

In Example 2992, the subject matter of Example 2991 can optionally include wherein the device knowledge history class indicates a geographic range for which the proximate terminal device has radio channel information.

In Example 2993, the subject matter of Example 2991 or 2992 can optionally include wherein the device knowledge history class indicates a quantity of radio access technologies for which the proximate terminal device has radio channel information.

In Example 2994, the subject matter of any one of Examples 2991 to 2993 can optionally include wherein the device knowledge history class indicates whether the proximate terminal device has radio channel information for a concentrated geographic area.

In Example 2995, the subject matter of any one of Examples 2972 to 2994 can optionally include wherein the one or more processors are further configured to transmit the local radio channel information to the proximate terminal device on the direct link.

In Example 2996, the subject matter of any one of Examples 2972 to 2995 can optionally include wherein the one or more processors are further configured to before applying the shared radio channel information and local radio channel information to obtain the joint radio channel information, receive downlink data from the network access node and evaluating the downlink data to obtain the local radio channel information.

Example 2997 is a communication device including one or more processors configured to receive, from a proximate terminal device on a direct link, shared radio channel information that characterizes a downlink radio channel of a first network access node that is causing interference to the communication device, receive downlink data from a second network access node, and perform interference cancellation on the downlink data based on the shared radio channel information.

In Example 2998, the subject matter of Example 2997 can optionally further include a radio transceiver and one or more antennas, wherein the one or more processors are configured to transmit and receive data as radio signals via the radio transceiver and the one or more antennas.

In Example 2999, the subject matter of Example 2998 can optionally be configured as a terminal device for radio communications.

In Example 3000, the subject matter of Example 2998 can optionally be configured as an electronic component of a terminal device.

In Example 3001, the subject matter of any one of Examples 2997 to 3000 can optionally further include an application processor.

In Example 3002, the subject matter of any one of Examples 2997 to 3001 can optionally include wherein the direct link is a Device-to-Device (D2D) link.

In Example 3003, the subject matter of any one of Examples 2997 to 3001 can optionally include wherein the direct link is a Vehicle-to-Vehicle (V2V) link.

In Example 3004, the subject matter of any one of Examples 2997 to 3001 can optionally include wherein the direct link is part of a Device-to-Device (D2D) context, a Vehicle-to-Vehicle (V2V) context, a Vehicle-to-Infrastructure (V2I) context, an Infrastructure-to-Vehicle (I2V) context, or a Vehicle-to-Everything (V2X) context.

In Example 3005, the subject matter of any one of Examples 2997 to 3004 can optionally include wherein the shared radio channel information characterizes a downlink radio channel between the first network access node and the proximate terminal device.

In Example 3006, the subject matter of any one of Examples 2997 to 3005 can optionally include wherein the one or more processors are configured to perform the interference cancellation on the downlink data based on the shared radio channel information by estimate the interference from the first network access node to obtain an estimated interference, and cancel the estimated interference from the downlink data In Example 3007, the subject matter of any one of Examples 2997 to 3006 can optionally include wherein the shared radio channel information is a power level, a frequency offset, a delay spread, a channel response, or a channel estimate.

In Example 3008, the subject matter of any one of Examples 2997 to 3007 can optionally include wherein the one or more processors are further configured to before receiving the shared radio channel information, perform discovery to identify the proximate terminal device, and establish the direct link with the proximate terminal device In Example 3009, the subject matter of Example 3008 can optionally include wherein the one or more processors are further configured to identify that the proximate terminal device is co-located with the communication device during the discovery.

In Example 3010, the subject matter of any one of Examples 2997 to 3009 can optionally include wherein the one or more processors are further configured to terminate the direct link with the proximate terminal device.

In Example 3011, the subject matter of any one of Examples 2997 to 3010 can optionally include wherein the one or more processors are configured to perform the interference cancellation on the downlink data based on the shared radio channel information by performing interpolation with the shared radio channel information based on a timing difference between the downlink data and the shared radio channel information to obtain interpolated radio channel information, and performing the interference cancellation on the downlink data with the interpolated radio channel information.

In Example 3012, the subject matter of any one of Examples 2997 to 3011 can optionally include wherein the one or more processors are further configured to before receiving the shared radio channel information, receive a device knowledge history class from the proximate terminal device, and request the shared radio channel information from the proximate terminal device based on the device knowledge history class.

In Example 3013, the subject matter of Example 3012 can optionally include wherein the device knowledge history class indicates a geographic range for which the proximate terminal device has radio channel information.

In Example 3014, the subject matter of Examples 3012 or 3013 can optionally include wherein the device knowledge history class indicates a quantity of radio access technologies for which the proximate terminal device has radio channel information.

In Example 3015, the subject matter of any one of Examples 3012 to 3014 can optionally include wherein the device knowledge history class indicates whether the proximate terminal device has radio channel information for a concentrated geographic area.

In Example 3016, the subject matter of any one of Examples 3012 to 3015 can optionally include wherein the one or more processors are further configured to receive downlink data from the network access node and evaluating the downlink data to obtain local radio channel information, and transmit the local radio channel information to the proximate terminal device on the direct link.

Example 3017 is a communication device including one or more processors configured to identify a proximate terminal device as part of a device discovery procedure, receive a device knowledge history class from the proximate terminal device that indicates a geographic range for which the proximate terminal device has communication information or a quantity of radio access technologies for which the proximate terminal device has communication information, and decide whether to request communication information from the proximate terminal device based on the device knowledge history class.

In Example 3018, the subject matter of Example 3017 can optionally further include a radio transceiver and one or more antennas, wherein the one or more processors are configured to transmit and receive data as radio signals via the radio transceiver and the one or more antennas.

In Example 3019, the subject matter of Example 3018 can optionally be configured as a terminal device for radio communications.

In Example 3020, the subject matter of Example 3018 can optionally be configured as an electronic component of a terminal device.

In Example 3021, the subject matter of any one of Examples 3017 to 3020 can optionally further include an application processor.

In Example 3022, the subject matter of any one of Examples 3017 to 3021 can optionally include wherein the direct link is a Device-to-Device (D2D) link.

In Example 3023, the subject matter of any one of Examples 3017 to 3021 can optionally include wherein the direct link is a Vehicle-to-Vehicle (V2V) link.

In Example 3024, the subject matter of any one of Examples 3017 to 3021 can optionally include wherein the direct link is part of a Device-to-Device (D2D) context, a Vehicle-to-Vehicle (V2V) context, a Vehicle-to-Infrastructure (V2I) context, an Infrastructure-to-Vehicle (I2V) context, or a Vehicle-to-Everything (V2X) context.

In Example 3025, the subject matter of any one of Examples 3017 to 3024 can optionally include wherein the device knowledge history class indicates the geographic range for which the proximate terminal device has communication information and a quantity of radio access technologies over the geographic range for which the proximate terminal device has communication information.

In Example 3026, the subject matter of any one of Examples 3017 to 3025 can optionally include wherein the one or more processors are further configured to request communication information from the proximate terminal device.

In Example 3027, the subject matter of any one of Examples 3017 to 3026 can optionally include wherein the device knowledge history class indicates a concentrated geographic region in which communication information is available.

In Example 3028, the subject matter of Example 3027 can optionally include wherein the one or more processors are further configured to receive communication information for the concentrated geographic region from the proximate terminal device, and transmit or receiving data based on the communication information when the communication device is located in the concentrated geographic region.

Example 3029 is a communication device including processing circuitry configured to receive, from a proximate terminal device on a direct link, shared radio channel information that characterizes a radio downlink radio channel for a network access node that the communication device is connected to, apply the shared radio channel information and local radio channel information to obtain a joint radio channel information, and receive downlink data from the network access node based on the joint radio channel information.

In Example 3030, the subject matter of Example 3029 can optionally further include a radio transceiver and one or more antennas, wherein the processing circuitry is configured to transmit and receive data as radio signals via the radio transceiver and the one or more antennas.

In Example 3031, the subject matter of Example 3030 can optionally be configured as a terminal device for radio communications.

In Example 3032, the subject matter of Example 3030 can optionally be configured as an electronic circuitry component of a terminal device.

In Example 3033, the subject matter of any one of Examples 3030 to 3032 can optionally further include an application processor.

In Example 3034, the subject matter of any one of Examples 3030 to 3033 can optionally include wherein the direct link is a Device-to-Device (D2D) link.

In Example 3035, the subject matter of any one of Examples 3030 to 3033 can optionally include wherein the direct link is a Vehicle-to-Vehicle (V2V) link.

In Example 3036, the subject matter of any one of Examples 3030 to 3033 can optionally include wherein the direct link is part of a Device-to-Device (D2D) context, a Vehicle-to-Vehicle (V2V) context, a Vehicle-to-Infrastructure (V2I) context, an Infrastructure-to-Vehicle (I2V) context, or a Vehicle-to-Everything (V2X) context.

In Example 3037, the subject matter of any one of Examples 3029 to 3036 can optionally include wherein the shared radio channel information characterizes a downlink radio channel from the network access node to the proximate terminal device, and wherein the local radio channel information characterizes a downlink radio channel from the network access node to the communication device.

In Example 3038, the subject matter of any one of Examples 3029 to 3037 can optionally include wherein the processing circuitry is configured to receive the downlink data from the network access node based on the joint radio channel information by demodulating the downlink data with the joint radio channel estimate.

In Example 3039, the subject matter of any one of Examples 3029 to 3037 can optionally include wherein the processing circuitry is configured to receive the downlink data from the network access node based on the joint radio channel information by performing channel equalization on the downlink data based on the joint radio channel information.

In Example 3040, the subject matter of any one of Examples 3029 to 3037 can optionally include wherein the processing circuitry is configured to receive the downlink data from the network access node based on the joint radio channel information by reporting the joint radio channel information to the network access node, and receiving the downlink data as downlink data that is precoded based on the joint radio channel information.

In Example 3041, the subject matter of any one of Examples 3029 to 3040 can optionally include wherein the shared radio channel information is a power level, a frequency offset, a delay spread, a channel response, or a channel estimate.

In Example 3042, the subject matter of any one of Examples 3029 to 3041 can optionally include wherein the processing circuitry is further configured to before receiving the shared radio channel information, perform discovery to identify the proximate terminal device, and establish the direct link with the proximate terminal device.

In Example 3043, the subject matter of Example 3042 can optionally include wherein the processing circuitry is further configured to identify that the proximate terminal device is co-located with the communication device during discovery.

In Example 3044, the subject matter of any one of Examples 3029 to 3043 can optionally include wherein the processing circuitry is further configured to terminate the direct link with the proximate terminal device.

In Example 3045, the subject matter of any one of Examples 3029 to 3044 can optionally include wherein the processing circuitry is configured to receive the same downlink data from the network access node as the proximate terminal device.

In Example 3046, the subject matter of any one of Examples 3029 to 3045 can optionally include wherein the processing circuitry is configured to apply the shared radio channel information and the local radio channel information to obtain the joint radio channel information by interpolating between the shared radio channel information and the local radio channel information based on a timing difference between the shared radio channel information and the local radio channel information to obtain the joint radio channel information.

In Example 3047, the subject matter of Example 3046 can optionally include wherein the shared radio channel information has an earlier originating time than the local radio channel information.

In Example 3048, the subject matter of any one of Examples 3029 to 3047 can optionally include wherein the processing circuitry is further configured to before receiving the shared radio channel information, receive a device knowledge history class from the proximate terminal device, and request the shared radio channel information from the proximate terminal device based on the device knowledge history class.

In Example 3049, the subject matter of Example 3048 can optionally include wherein the device knowledge history class indicates a geographic range for which the proximate terminal device has radio channel information.

In Example 3050, the subject matter of Example 3048 or 3049 can optionally include wherein the device knowledge history class indicates a quantity of radio access technologies for which the proximate terminal device has radio channel information.

In Example 3051, the subject matter of any one of Examples 3048 to 3050 can optionally include wherein the device knowledge history class indicates whether the proximate terminal device has radio channel information for a concentrated geographic area.

In Example 3052, the subject matter of any one of Examples 3029 to 3051 can optionally include wherein the processing circuitry is further configured to transmit the local radio channel information to the proximate terminal device on the direct link.

In Example 3053, the subject matter of any one of Examples 3029 to 3052 can optionally include wherein the processing circuitry is further configured to before applying the shared radio channel information and local radio channel information to obtain the joint radio channel information, receive downlink data from the network access node and evaluating the downlink data to obtain the local radio channel information.

Example 3054 is a communication device including processing circuitry configured to receive, from a proximate terminal device on a direct link, shared radio channel information that characterizes a downlink radio channel of a first network access node that is causing interference to the communication device, receive downlink data from a second network access node, and perform interference cancellation on the downlink data based on the shared radio channel information.

In Example 3055, the subject matter of Example 3054 can optionally further include a radio transceiver and one or more antennas, wherein the processing circuitry is configured to transmit and receive data as radio signals via the radio transceiver and the one or more antennas.

In Example 3056, the subject matter of Example 3055 can optionally be configured as a terminal device for radio communications.

In Example 3057, the subject matter of Example 3055 can optionally be configured as an electronic circuitry component of a terminal device.

In Example 3058, the subject matter of any one of Examples 3054 to 3057 can optionally further include an application processor.

In Example 3059, the subject matter of any one of Examples 3054 to 3058 can optionally include wherein the direct link is a Device-to-Device (D2D) link.

In Example 3060, the subject matter of any one of Examples 3054 to 3058 can optionally include wherein the direct link is a Vehicle-to-Vehicle (V2V) link.

In Example 3061, the subject matter of any one of Examples 3054 to 3058 can optionally include wherein the direct link is part of a Device-to-Device (D2D) context, a Vehicle-to-Vehicle (V2V) context, a Vehicle-to-Infrastructure (V2I) context, an Infrastructure-to-Vehicle (I2V) context, or a Vehicle-to-Everything (V2X) context.

In Example 3062, the subject matter of any one of Examples 3054 to 3061 can optionally include wherein the shared radio channel information characterizes a downlink radio channel between the first network access node and the proximate terminal device.

In Example 3063, the subject matter of Example 3054 or 3062 can optionally include wherein the processing circuitry is configured to perform the interference cancellation on the downlink data based on the shared radio channel information by estimate the interference from the first network access node to obtain an estimated interference, and cancel the estimated interference from the downlink data In Example 3064, the subject matter of any one of Examples 3054 to 3063 can optionally include wherein the shared radio channel information is a power level, a frequency offset, a delay spread, a channel response, or a channel estimate.

In Example 3065, the subject matter of any one of Examples 3054 to 3064 can optionally include wherein the processing circuitry is further configured to before receiving the shared radio channel information, perform discovery to identify the proximate terminal device, and establish the direct link with the proximate terminal device.

In Example 3066, the subject matter of Example 3065 can optionally include wherein the processing circuitry is further configured to identify that the proximate terminal device is co-located with the communication device during the discovery.

In Example 3067, the subject matter of any one of Examples 3054 to 3066 can optionally include wherein the processing circuitry is further configured to terminate the direct link with the proximate terminal device.

In Example 3068, the subject matter of any one of Examples 3054 to 3067 can optionally include wherein the processing circuitry is configured to perform the interference cancellation on the downlink data based on the shared radio channel information by performing interpolation with the shared radio channel information based on a timing difference between the downlink data and the shared radio channel information to obtain interpolated radio channel information, and performing the interference cancellation on the downlink data with the interpolated radio channel information.

In Example 3069, the subject matter of any one of Examples 3054 to 3068 can optionally include wherein the processing circuitry is further configured to before receiving the shared radio channel information, receive a device knowledge history class from the proximate terminal device, and request the shared radio channel information from the proximate terminal device based on the device knowledge history class.

In Example 3070, the subject matter of Example 3069 can optionally include wherein the device knowledge history class indicates a geographic range for which the proximate terminal device has radio channel information.

In Example 3071, the subject matter of Example 3069 or 3070 can optionally include wherein the device knowledge history class indicates a quantity of radio access technologies for which the proximate terminal device has radio channel information.

In Example 3072, the subject matter of any one of Examples 3069 to 3071 can optionally include wherein the device knowledge history class indicates whether the proximate terminal device has radio channel information for a concentrated geographic area.

In Example 3073, the subject matter of any one of Examples 3069 to 3072 can optionally include wherein the processing circuitry is further configured to receive downlink data from the network access node and evaluating the downlink data to obtain local radio channel information, and transmit the local radio channel information to the proximate terminal device on the direct link.

Example 3074 is a communication device including processing circuitry configured to identify a proximate terminal device as part of a device-to-device discovery procedure, receive a device knowledge history class from the proximate terminal device that indicates a geographic range for which the proximate terminal device has communication information or a quantity of radio access technologies for which the proximate terminal device has communication information, and decide whether to request communication information from the proximate terminal device based on the device knowledge history class.

In Example 3075, the subject matter of Example 3074 can optionally further include a radio transceiver and one or more antennas, wherein the processing circuitry is configured to transmit and receive data as radio signals via the radio transceiver and the one or more antennas.

In Example 3076, the subject matter of Example 3075 can optionally be configured as a terminal device for radio communications.

In Example 3077, the subject matter of Example 3075 can optionally be configured as an electronic circuitry component of a terminal device.

In Example 3078, the subject matter of any one of Examples 3074 to 3077 can optionally further include an application processor.

In Example 3079, the subject matter of any one of Examples 3074 to 3078 can optionally include wherein the direct link is a Device-to-Device (D2D) link.

In Example 3080, the subject matter of any one of Examples 3074 to 3078 can optionally include wherein the direct link is a Vehicle-to-Vehicle (V2V) link.

In Example 3081, the subject matter of any one of Examples 3074 to 3078 can optionally include wherein the direct link is part of a Device-to-Device (D2D) context, a Vehicle-to-Vehicle (V2V) context, a Vehicle-to-Infrastructure (V2I) context, an Infrastructure-to-Vehicle (I2V) context, or a Vehicle-to-Everything (V2X) context.

In Example 3082, the subject matter of any one of Examples 3074 to 3081 can optionally include wherein the device knowledge history class indicates the geographic range for which the proximate terminal device has communication information and a quantity of radio access technologies over the geographic range for which the proximate terminal device has communication information.

In Example 3083, the subject matter of any one of Examples 3074 to 3082 can optionally include wherein the processing circuitry is further configured to request communication information from the proximate terminal device.

In Example 3084, the subject matter of any one of Examples 3074 to 3083 can optionally include wherein the device knowledge history class indicates a concentrated geographic region in which communication information is available.

In Example 3085, the subject matter of Example 3084 can optionally include wherein the processing circuitry is further configured to receive communication information for the concentrated geographic region from the proximate terminal device, and transmit or receiving data based on the communication information when the communication device is located in the concentrated geographic region.

Example 3085 is a device including means for receiving, by a group lead terminal device, a radio network resource block configuration from a network access node, the radio network resource block configuration having a plurality of parameters that are configured to a particular application, means for transmitting, by the group lead terminal device, the radio network resource block configuration to a group member terminal device over a direct communication interface, and means for supporting, by the group lead terminal device, communication between the group member terminal device and the network access node according to the radio network resource block configuration.

Example 3086 is a method for provisioning radio network resources according to application requirements, the method including receiving, by a group lead terminal device, a radio network resource block configuration from a network access node, the radio network resource block configuration having a plurality of parameters that are configured to a particular application, transmitting, by the group lead terminal device, the radio network resource block configuration to a group member terminal device over a direct communication interface, and supporting, by the group lead terminal device, communication between the group member terminal device and the network access node according to the radio network resource block configuration.

In Example 3087, the subject matter of Example 3086 can optionally include wherein the radio network resource block configuration is updated based on at least one of location information or time information.

In Example 3088, the subject matter of Example 3087 can optionally include wherein the location information is at least one of location information of the group lead terminal device or location information of the group member terminal device.

In Example 3089, the subject matter of any one of Examples 3086 to 3088 can optionally include wherein receiving of the radio network resource block configuration includes receiving, by the group lead terminal device, the radio network resource block configuration as a broadcast system information block (SIB).

In Example 3090, the subject matter of any one of Examples 3086 to 3088 can optionally include wherein receiving of the radio network resource block configuration includes receiving, by the group lead terminal device, a group resource block configuration message over a multicast control channel (MCCH), the group resource block configuration message including the radio network resource block configuration and a group identifier.

In Example 3091, the subject matter of Example 3090 can optionally include wherein supporting the communication between the group member terminal device and the network access node includes transmitting, by the group lead terminal device, the group resource block configuration message over the direct communication interface to the group member terminal device.

In Example 3092, the subject matter of any one of Examples 3090 to 3091 can optionally include wherein supporting the communication between the group member terminal device and the network access node further includes supporting, by the group lead terminal device, communication between the group member terminal device and the network access node according to the group resource block configuration message.

In Example 3093, the subject matter of any one of Examples 3086 to 3092 can optionally include wherein the plurality of parameters include at least one of carrier frequency information, numerology configuration information, access mode information, Quality of Service (QoS) class information or duration information.

In Example 3094, the subject matter of Example 3093 can optionally include wherein the carrier frequency information includes a licensed or unlicensed frequency band of operation.

In Example 3095, the subject matter of Example 3093 or 3094 can optionally include wherein the numerology configuration information includes an identifier of a pre-configured parameter in at least one of the group lead terminal device or the group member terminal device.

In Example 3096, the subject matter of any one of Examples 3093 to 3095 can optionally include wherein the access mode information is a contention-based access mode or a scheduled access mode.

In Example 3097, the subject matter of any one of Examples 3093 to 3096 can optionally include wherein the QoS class information defines a type of data that can be used.

In Example 3098, the subject matter of Example 3097 can optionally include wherein the type of data that can be used is one of a vehicle-to-vehicle (V2V) safety application data, a V2V discovery data, a best effort traffic data, or other traffic data.

In Example 3099, the subject matter of any one of Examples 3093 to 3097 can optionally include wherein the duration information defines an amount of time that the radio network resource block configuration is available.

In Example 3100, the subject matter of any one of Examples 3086 to 3099 can optionally include wherein transmitting of the radio network resource block configuration includes transmitting, in unicast mode, the radio network resource block configuration the group member terminal device over the direct communication interface in response to a request from the group member terminal device.

In Example 3101, the subject matter of any one of Examples 3086 to 3099 can optionally include wherein transmitting of the radio network resource block configuration includes transmitting, in broadcast mode, the radio network resource block configuration to the group member terminal device over the direct communication interface when the group member terminal device is outside radio access network coverage.

In Example 3102, the subject matter of any one of Examples 3086 to 3101 can optionally include wherein supporting of communication between the group member terminal device and the network access node includes reconfiguring the radio network resource block configuration based on at least one of a measurement of a radio access network, weather information, or time information, when the group member terminal device is outside radio access network coverage.

In Example 3103, the subject matter of Example 3102 can optionally include wherein supporting of communication between the group member terminal device and the network access node includes transmitting the reconfigured radio network resource block configuration to the group member terminal device over the direct communication interface.

In Example 3104, the subject matter of any one of Examples 3086 to 3103 can optionally include wherein the particular application is a vehicle-to-vehicle (V2V) safety application, a V2V discovery application, or a traffic application.

In Example 3105, the subject matter of any one of Examples, further including can optionally include transmitting, by the group lead terminal device, the radio network resource block configuration to another group member terminal device over a direct communication interface, and supporting, by the group lead terminal device, communication between the other group member terminal device and the network access node according to the radio network resource block configuration.

Example 3106 is a terminal device including one or more processors configured to perform the method of any one of Examples 3086 to 3105.

Example 3104 is a processing circuit configured to perform the method of any one of Examples 3086 to 3105.

Example 3108 is a non-transitory computer readable medium storing instructions that when executed by a processor cause the processor to perform the method of any one of Examples 3086 to 3105.

Example 3109 is a non-transitory computer readable medium storing instructions that when executed by one or more processors of a terminal device cause the terminal device to perform the method of any one of Examples 3086 to 3105.

Example 3110 is a communication device for provisioning radio network resources according to application requirements, the communication device including one or more processors configured to receive a radio network resource block configuration from a network access node, the radio network resource block configuration having a plurality of parameters that are configured to a particular application, transmit the radio network resource block configuration to a group member terminal device over a direct communication interface, and support communication between the group member terminal device and the network access node according to the radio network resource block configuration.

In Example 3111, the subject matter of Example 3110 can optionally further include a radio transceiver and one or more antennas, wherein the one or more processors are configured to transmit and receive data as radio signals via the radio transceiver and the one or more antennas.

In Example 3112, the subject matter of Example 3110 can optionally be configured as a terminal device for radio communications.

In Example 3113, the subject matter of Example 3111 can optionally be configured as an electronic component for a terminal device.

In Example 3114, the subject matter of any one of Examples 3110 to 3113 can optionally include wherein the radio network resource block configuration is updated based on at least one of location information or time information.

In Example 3115, the subject matter of Example 3114 can optionally include wherein the location information is at least one of location information of the group lead terminal device or location information of the group member terminal device.

In Example 3116, the subject matter of any one of Examples 3110 to 3115 can optionally include wherein the one or more processors are further configured to receive the radio network resource block configuration as a broadcast system information block (SIB).

In Example 3117, the subject matter of any one of Examples 3110 to 3115 can optionally include wherein the one or more processors are further configured to receive a group resource block configuration message over a multicast control channel (MCCH), the group resource block configuration message including the radio network resource block configuration and a group identifier.

In Example 3118, the subject matter of Example 3117 can optionally include wherein the one or more processors are further configured to transmit the group resource block configuration message over the direct communication interface to the group member terminal device.

In Example 3119, the subject matter of any one of Examples 3117 to 3118 can optionally include wherein the one or more processors are further configured to support the communication between the group member terminal device and the network access node according to the group resource block configuration message.

In Example 3120, the subject matter of any one of Examples 3110 to 3119 can optionally include wherein the plurality of parameters include at least one of carrier frequency information, numerology configuration information, access mode information, Quality of Service (QoS) class information or duration information.

In Example 3121, the subject matter of Example 3120 can optionally include wherein the carrier frequency information includes a licensed or unlicensed frequency band of operation.

In Example 3122, the subject matter of any one of Examples 3120 to 3121 can optionally include wherein the numerology configuration information includes an identifier of a pre-configured parameter in at least one of the group lead terminal device or the group member terminal device.

In Example 3123, the subject matter of any one of Examples 3120 to 3122 can optionally include wherein the access mode information is a contention-based access mode or a scheduled access mode.

In Example 3124, the subject matter of any one of Examples 3120 to 3123 can optionally include wherein the QoS class information defines a type of data that can be used.

In Example 3125, the subject matter of Example 3124 can optionally include wherein the type of data that can be used is one of a vehicle-to-vehicle (V2V) safety application data, a V2V discovery data, a best effort traffic data, or other traffic data.

In Example 3126, the subject matter of any one of Examples 3120 to 3124 can optionally include wherein the duration information defines an amount of time that the radio network resource block configuration is available.

In Example 3127, the subject matter of any one of Examples 3110 to 3126 can optionally include wherein the one or more processors are further configured to transmit, in unicast mode, the radio network resource block configuration the group member terminal device over the direct communication interface in response to a request from the group member terminal device.

In Example 3128, the subject matter of any one of Examples 3110 to 3126 can optionally include wherein the one or more processors are further configured to transmit, in broadcast mode, the radio network resource block configuration to the group member terminal device over the direct communication interface when the group member terminal device is outside radio access network coverage.

In Example 3129, the subject matter of any one of Examples 3110 to 3128 can optionally include wherein the one or more processors are further configured to reconfigure the radio network resource block configuration based on at least one of a measurement of a radio access network, weather information, or time information, when the group member terminal device is outside radio access network coverage.

In Example 3130, the subject matter of Example 3129 can optionally include wherein the one or more processors are further configured to transmit the reconfigured radio network resource block configuration to the group member terminal device over the direct communication interface.

In Example 3131, the subject matter of any one of Examples 3110 to 3120 can optionally include wherein the particular application is a vehicle-to-vehicle (V2V) safety application, a V2V discovery application, or a traffic application.

In Example 3132, the subject matter of any one of Examples 3110 to 3121 can optionally include wherein the one or more processors are further configured to transmit the radio network resource block configuration to another group member terminal device over a direct communication interface, and support communication between the other group member terminal device and the network access node according to the radio network resource block configuration.

Example 3133 is a non-transitory computer readable medium storing instructions that when executed by one or more processors of a group lead terminal device cause the group lead terminal device to perform a method including receiving, by the group lead terminal device, a radio network resource block configuration from a network access node, the radio network resource block configuration having a plurality of parameters that are configured to a particular application, transmitting, by the group lead terminal device, the radio network resource block configuration to a group member terminal device over a direct communication interface, and supporting, by the group lead terminal device, communication between the group member terminal device and the network access node according to the radio network resource block configuration.

In Example 3134, the subject matter of Example 3133 can optionally include wherein the radio network resource block configuration is updated based on at least one of location information or time information.

In Example 3135, the subject matter of Example 3134 can optionally include wherein the location information is at least one of location information of the group lead terminal device or location information of the group member terminal device.

In Example 3136, the subject matter of any one of Examples 3133 to 3135 can optionally include wherein receiving of the radio network resource block configuration includes receiving, by the group lead terminal device, the radio network resource block configuration as a broadcast system information block (SIB).

In Example 3137, the subject matter of any one of Examples 3133 to 3136 can optionally include wherein receiving of the radio network resource block configuration includes receiving, by the group lead terminal device, a group resource block configuration message over a multicast control channel (MCCH), the group resource block configuration message including the radio network resource block configuration and a group identifier.

In Example 3138, the subject matter of Example 3137 can optionally include wherein supporting the communication between the group member terminal device and the network access node includes transmitting, by the group lead terminal device, the group resource block configuration message over the direct communication interface to the group member terminal device.

In Example 3139, the subject matter of Example 3137 or 3138 can optionally include wherein supporting the communication between the group member terminal device and the network access node further includes supporting, by the group lead terminal device, communication between the group member terminal device and the network access node according to the group resource block configuration message.

In Example 3140, the subject matter of any one of Examples 3133 to 3139 can optionally include wherein the plurality of parameters include at least one of carrier frequency information, numerology configuration information, access mode information, Quality of Service (QoS) class information or duration information.

In Example 3141, the subject matter of Example 3140 can optionally include wherein the carrier frequency information includes a licensed or unlicensed frequency band of operation.

In Example 3142, the subject matter of Example 3140 or 3141 can optionally include wherein the numerology configuration information includes an identifier of a pre-configured parameter in at least one of the group lead terminal device or the group member terminal device.

In Example 3143, the subject matter of any one of Examples 3140 to 3142 can optionally include wherein the access mode information is a contention-based access mode or a scheduled access mode.

In Example 3144, the subject matter of any one of Examples 3140 to 3143 can optionally include wherein the QoS class information defines a type of data that can be used.

In Example 3145, the subject matter of Example 3144 can optionally include wherein the type of data that can be used is one of a vehicle-to-vehicle (V2V) safety application data, a V2V discovery data, a best effort traffic data, or other traffic data.

In Example 3146, the subject matter of any one of Examples 3140 to 3144 can optionally include wherein the duration information defines an amount of time that the radio network resource block configuration is available.

In Example 3147, the subject matter of any one of Examples 3133 to 3146 can optionally include wherein transmitting of the radio network resource block configuration includes transmitting, in unicast mode, the radio network resource block configuration the group member terminal device over the direct communication interface in response to a request from the group member terminal device.

In Example 3148, the subject matter of any one of Examples 3133 to 3146 can optionally include wherein transmitting of the radio network resource block configuration includes transmitting, in broadcast mode, the radio network resource block configuration to the group member terminal device over the direct communication interface when the group member terminal device is outside radio access network coverage.

In Example 3149, the subject matter of any one of Examples 3133 to 3148 can optionally include wherein supporting of communication between the group member terminal device and the network access node includes reconfiguring the radio network resource block configuration based on at least one of a measurement of a radio access network, weather information, or time information, when the group member terminal device is outside radio access network coverage.

In Example 3150, the subject matter of Example 3149 can optionally include wherein supporting of communication between the group member terminal device and the network access node includes transmitting the reconfigured radio network resource block configuration to the group member terminal device over the direct communication interface.

In Example 3151, the subject matter of any one of Examples 3133 to 3150 can optionally include wherein the particular application is a vehicle-to-vehicle (V2V) safety application, a V2V discovery application, or a traffic application.

In Example 3152, the subject matter of any one of Examples 3133 to 3151 can optionally include the method further including transmitting, by the group lead terminal device, the radio network resource block configuration to another group member terminal device over a direct communication interface, and supporting, by the group lead terminal device, communication between the other group member terminal device and the network access node according to the radio network resource block configuration.

Example 3153 is a device including means for receiving, by a group member terminal device, a radio network resource block configuration from a network access node, the radio network resource block configuration having a plurality of parameters that are configured to a particular application, and means for communicating, by the group member terminal device, according to the radio network resource block configuration.

Example 3154 is a method for provisioning radio network resources according to application requirements, the method including receiving, by a group member terminal device, a radio network resource block configuration from a network access node, the radio network resource block configuration having a plurality of parameters that are configured to a particular application, and communicating, by the group member terminal device, according to the radio network resource block configuration.

In Example 3155, the subject matter of Example 3154 can optionally include wherein the radio network resource block configuration is updated based on at least one of location information or time information.

In Example 3156, the subject matter of Example 3154 or 3155 can optionally include wherein the location information is at least one of location information of a group lead terminal device or location information of the group member terminal device.

In Example 3157, the subject matter of any one of Examples 3154 to 3156 can optionally include wherein receiving of the radio network resource block configuration includes receiving, by the group member terminal device, the radio network resource block configuration as a broadcast system information block (SIB).

In Example 3158, the subject matter of any one of Examples 3154 to 3156 can optionally include wherein receiving of the radio network resource block configuration includes receiving, by the group member terminal device, a group resource block configuration message over a multicast control channel (MCCH), the group resource block configuration message including the radio network resource block configuration and a group identifier.

In Example 3159, the subject matter of Example 3154 to 3156 or 3158 can optionally include wherein receiving of the radio network resource block configuration includes receiving, by the group member terminal device, the radio network resource block configuration from a group lead terminal device over a direct communication interface therebetween.

In Example 3160, the subject matter of any one of Examples 3154 to 3158 can optionally include wherein communicating according to the radio network resource block configuration includes communicating, by the group member terminal device, with a network access node indirectly through a group lead terminal device.

In Example 3161, the subject matter of any one of Examples 3154 to 3160 can optionally include wherein the plurality of parameters include at least one of carrier frequency information, numerology configuration information, access mode information, Quality of Service (QoS) class information or duration information.

In Example 3162, the subject matter of Example 3161 can optionally include wherein the carrier frequency information includes a licensed or unlicensed frequency band of operation.

In Example 3163, the subject matter of Example 3161 or 3162 can optionally include wherein the numerology configuration information includes an identifier of a pre-configured parameter in at least one of the group lead terminal device or the group member terminal device.

In Example 3164, the subject matter of any one of Examples 3161 to 3163 can optionally include wherein the access mode information is a contention-based access mode or a scheduled access mode.

In Example 3165, the subject matter of any one of Examples 3161 to 3164 can optionally include wherein the class information defines a type of data that can be used.

In Example 3166, the subject matter of Example 3165 can optionally include wherein the type of data that can be used is one of a vehicle-to-vehicle (V2V) safety application data, a V2V discovery data, a best effort traffic data, or other traffic data.

In Example 3167, the subject matter of any one of Examples 3161 to 3166 can optionally include wherein the duration information defines an amount of time that the radio network resource block configuration is available.

In Example 3168, the subject matter of any one of Examples 3154 to 3156 or 3158 to 3167 can optionally further include transmitting, by the group member terminal device, a request for the radio network resource block configuration, wherein receiving of the radio network configuration block includes receiving, in unicast mode, the radio network resource block configuration from a group lead terminal device over a direct communication interface therebetween in response to the request from the group member terminal device.

In Example 3169, the subject matter of any one of Examples 3154 to 3156 or 3158 to 3167 can optionally include wherein receiving of the radio network resource block configuration includes receiving, in broadcast mode, the radio network resource block configuration from a group lead terminal device over a direct communication interface therebetween when the group member terminal device is outside radio access network coverage.

In Example 3170, the subject matter of any one of Examples 3154 to 3169 can optionally further include receiving, by the group member terminal device, an update to the radio network resource block configuration based on at least one of a measurement of a radio access network, weather information, or time information, when the group member terminal device is outside radio access network coverage.

In Example 3171, the subject matter of Example 3170 can optionally include wherein receiving of the update to the radio network resource block configuration includes receiving the update to the radio network resource block configuration from a group lead terminal device over a direct communication interface therebetween.

In Example 3172, the subject matter of any one of Examples 3154 to 3171 can optionally include wherein the particular application is a vehicle-to-vehicle (V2V) safety application, a V2V discovery application, or a traffic application.

In Example 3173, the subject matter of any one of Examples 3154 to 3172 can optionally include wherein communicating according to the radio network resource block configuration includes communicating, by the group member terminal device, directly with a network access node.

Example 3174 is a terminal device including one or more processors configured to perform the method of any one of Examples 3154 to 3173.

Example 3175 is a processing circuit configured to perform the method of any one of Examples 3154 to 3173.

Example 3176 is a non-transitory computer readable medium storing instructions that when executed by a processor cause the processor to perform the method of any one of Examples 3154 to 3173.

Example 3177 is a non-transitory computer readable medium storing instructions that when executed by one or more processors of a terminal device cause the terminal device to perform the method of any one of Examples 3154 to 3173.

Example 3178 is a communication device for provisioning radio network resources according to application requirements, the communication device including one or more processors configured to receive a radio network resource block configuration from a network access node, the radio network resource block configuration having a plurality of parameters that are configured to a particular application, and communicate according to the radio network resource block configuration.

In Example 3179, the subject matter of Example 3178 can optionally further include a radio transceiver and one or more antennas, wherein the one or more processors are configured to transmit and receive data as radio signals via the radio transceiver and the one or more antennas.

In Example 3180, the subject matter of Example 3178 can optionally be configured as a terminal device for radio communications.

In Example 3181, the subject matter of Example 3180 can optionally be configured as an electronic component for a terminal device.

In Example 3182, the subject matter of any one of Examples 3178 to 3181 can optionally include wherein the radio network resource block configuration is updated based on at least one of location information or time information.

In Example 3183, the subject matter of Example 3182 can optionally include wherein the location information is at least one of location information of a group lead terminal device or location information of the communication device.

In Example 3184, the subject matter of any one of Examples 3178 to 3183 can optionally include wherein the one or more processors are further configured to receive the radio network resource block configuration as a broadcast system information block (SIB).

In Example 3185, the subject matter of any one of Examples 3178 to 3183 can optionally include wherein the one or more processors are further configured to receive a group resource block configuration message over a multicast control channel (MCCH), the group resource block configuration message including the radio network resource block configuration and a group identifier.

In Example 3186, the subject matter of Example 3178 to 3183 or 3185 can optionally include wherein the one or more processors are further configured to receive the radio network resource block configuration from a group lead terminal device over a direct communication interface therebetween.

In Example 3187, the subject matter of any one of Examples 3178 to 3186 can optionally include wherein the one or more processors are further configured to communicate with a network access node according to the radio network resource block configuration and indirectly through a group lead terminal device.

In Example 3188, the subject matter of any one of Examples 3178 to 3187 can optionally include wherein the plurality of parameters include at least one of carrier frequency information, numerology configuration information, access mode information, Quality of Service (QoS) class information or duration information.

In Example 3189, the subject matter of Example 3188 can optionally include wherein the carrier frequency information includes a licensed or unlicensed frequency band of operation.

In Example 3190, the subject matter of Example 3188 or 3189 can optionally include wherein the numerology configuration information includes an identifier of a pre-configured parameter in at least one of the group lead terminal device or the group member terminal device.

In Example 3191, the subject matter of any one of Examples 3188 to 3190 can optionally include wherein the access mode information is a contention-based access mode or a scheduled access mode.

In Example 3192, the subject matter of any one of Examples 3188 to 3191 can optionally include wherein the QoS class information defines a type of data that can be used.

In Example 3193, the subject matter of Example 3192 can optionally include wherein the type of data that can be used is one of a vehicle-to-vehicle (V2V) safety application data, a V2V discovery data, a best effort traffic data, or other traffic data.

In Example 3194, the subject matter of any one of Examples 3188 to 3193 can optionally include wherein the duration information defines an amount of time that the radio network resource block configuration is available.

In Example 3195, the subject matter of any one of Examples 3178 to 3183 or 3185 to 3194 can optionally include wherein the one or more processors are further configured to transmit a request for the radio network resource block configuration, and receive, in unicast mode, the radio network resource block configuration from a group lead terminal device over a direct communication interface therebetween in response to the transmitted request.

In Example 3196, the subject matter of any one of Examples 3178 to 3183 or 3185 to 3194 can optionally include wherein the one or more processors are further configured to receive, in broadcast mode, the radio network resource block configuration from a group lead terminal device over a direct communication interface therebetween when the communication device is outside radio access network coverage.

In Example 3197, the subject matter of any one of Examples 3178 to 3196 can optionally further include receive an update to the radio network resource block configuration based on at least one of a measurement of a radio access network, weather information, or time information, when the group member terminal device is outside radio access network coverage.

In Example 3198, the subject matter of Example 3197 can optionally include wherein the one or more processors are further configured to receive the update to the radio network resource block configuration from a group lead terminal device over a direct communication interface therebetween.

In Example 3199, the subject matter of any one of Examples 3178 to 3198 can optionally include wherein the particular application is a vehicle-to-vehicle (V2V) safety application, a V2V discovery application, or a traffic application.

In Example 3200, the subject matter of any one of Examples 3178 to 3199 can optionally include wherein the one or more processors are further configured to communicate directly with a network access node according to the radio network resource block configuration.

Example 3201 is a non-transitory computer readable medium storing instruction that when executed by one or more processors of a group member terminal device cause the group member terminal device to perform a method including receiving, by a group member terminal device, a radio network resource block configuration from a network access node, the radio network resource block configuration having a plurality of parameters that are configured to a particular application, and communicating, by the group member terminal device, according to the radio network resource block configuration.

In Example 3202, the subject matter of Example 3201 can optionally include wherein the radio network resource block configuration is updated based on at least one of location information or time information.

In Example 3203, the subject matter of any one of Examples 3201 or 3202 can optionally include wherein the location information is at least one of location information of a group lead terminal device or location information of the group member terminal device.

In Example 3204, the subject matter of any one of Examples 3201 to 3203 can optionally include wherein receiving of the radio network resource block configuration includes receiving, by the group member terminal device, the radio network resource block configuration as a broadcast system information block (SIB).

In Example 3205, the subject matter of any one of Examples 3201 to 3203 can optionally include wherein receiving of the radio network resource block configuration includes receiving, by the group member terminal device, a group resource block configuration message over a multicast control channel (MCCH), the group resource block configuration message including the radio network resource block configuration and a group identifier.

In Example 3206, the subject matter of any one of Examples 3201 to 3203 or 3205 can optionally include wherein receiving of the radio network resource block configuration includes receiving, by the group member terminal device, the radio network resource block configuration from a group lead terminal device over a direct communication interface therebetween.

In Example 3207, the subject matter of any one of Examples 3201 to 3205 can optionally include wherein communicating according to the radio network resource block configuration includes communicating, by the group member terminal device, with a network access node indirectly through a group lead terminal device.

In Example 3208, the subject matter of any one of Examples 3201 to 3207 can optionally include wherein the plurality of parameters include at least one of carrier frequency information, numerology configuration information, access mode information, Quality of Service (QoS) class information or duration information.

In Example 3209, the subject matter of Example 3208 can optionally include wherein the carrier frequency information includes a licensed or unlicensed frequency band of operation.

In Example 3210, the subject matter of Example 3208 or 3209 can optionally include wherein the numerology configuration information includes an identifier of a pre-configured parameter in at least one of the group lead terminal device or the group member terminal device.

In Example 3211, the subject matter of any one of Examples 3208 to 3210 can optionally include wherein the access mode information is a contention-based access mode or a scheduled access mode.

In Example 3212, the subject matter of any one of Examples 3208 to 3213 can optionally include wherein the QoS class information defines a type of data that can be used.

In Example 3213, the subject matter of Example 3212 can optionally include wherein the type of data that can be used is one of a vehicle-to-vehicle (V2V) safety application data, a V2V discovery data, a best effort traffic data, or other traffic data.

In Example 3214, the subject matter of any one of Examples 3208 to 3213 can optionally include wherein the duration information defines an amount of time that the radio network resource block configuration is available.

In Example 3215, the subject matter of any one of Examples 3201 to 3203 or 3205 to 3214 can optionally further include transmitting, by the group member terminal device, a request for the radio network resource block configuration, wherein receiving of the radio network configuration block includes receiving, in unicast mode, the radio network resource block configuration from a group lead terminal device over a direct communication interface therebetween in response to the request from the group member terminal device.

In Example 3216, the subject matter of any one of Examples 3201 to 3203 or 3205 to 3214 can optionally include wherein receiving of the radio network resource block configuration includes receiving, in broadcast mode, the radio network resource block configuration from a group lead terminal device over a direct communication interface therebetween when the group member terminal device is outside radio access network coverage.

In Example 3217, the subject matter of any one of Examples 3201 to 3216 can optionally further include receiving, by the group member terminal device, an update to the radio network resource block configuration based on at least one of a measurement of a radio access network, weather information, or time information, when the group member terminal device is outside radio access network coverage.

In Example 3218, the subject matter of Example 3217 can optionally include wherein receiving of the update to the radio network resource block configuration includes receiving the update to the radio network resource block configuration from a group lead terminal device over a direct communication interface therebetween.

In Example 3219, the subject matter of any one of Examples 3201 to 3218 can optionally include wherein the particular application is a vehicle-to-vehicle (V2V) safety application, a V2V discovery application, or a traffic application.

In Example 3220, the subject matter of any one of Examples 3201 to 3219 can optionally include wherein communicating according to the radio network resource block configuration includes communicating, by the group member terminal device, directly with a network access node.

Example 3222 is a vehicular terminal device including means for discovering one or more vehicular terminal devices that are available for vehicle-to-vehicle (V2V) pairings, means for determining one or more V2V link qualities for the one or more vehicular terminal devices and means for reporting the one or more V2V link qualities to a network access node, means for receiving a scheduling instruction from the base station that specifies a scheduled V2V pairing with a target vehicular terminal device of the one or more vehicular terminal devices, and means for relaying data between the target vehicular terminal device and the network access node according to the scheduled V2V pairing.

Example 3222 is a method of performing radio communications at a vehicular terminal device, the method including discovering one or more vehicular terminal devices that are available for vehicle-to-vehicle (V2V) pairings, determining one or more V2V link qualities for the one or more vehicular terminal devices and reporting the one or more V2V link qualities to a network access node, receiving a scheduling instruction from the base station that specifies a scheduled V2V pairing with a target vehicular terminal device of the one or more vehicular terminal devices, and relaying data between the target vehicular terminal device and the network access node according to the scheduled V2V pairing.

In Example 3223, the subject matter of Example 3222 can optionally include wherein discovering the one or more vehicular terminal devices that are available for V2V pairings includes performing discovery during a discovery period scheduled by the network access node, and discovering the one or more vehicular terminal devices during the discovery period.

In Example 3224, the subject matter of Example 3222 or 3223 can optionally include wherein discovering the one or more vehicular terminal devices that are available for V2V pairings includes performing discovery to detect proximate vehicular terminal devices based on network-provided information that indicates potential neighboring vehicular terminal devices.

In Example 3225, the subject matter of any one of Examples 3222 to 3224 can optionally include wherein determining the one or more V2V link qualities for the one or more vehicular terminal devices includes measuring radio signals received on a V2V link from a first vehicular terminal device of the one or more vehicular terminal devices to obtain the link quality measurement.

In Example 3226, the subject matter of any one of Examples 3222 to 3225 can optionally further include determining a main channel link quality and reporting the main channel link quality to the network access node.

In Example 3227, the subject matter of any one of Examples 3222 to 3225 can optionally further include performing a radio measurement on a signal received from the network access node on a main downlink channel to obtain a main channel link quality, and reporting the main channel link quality to the network access node.

In Example 3228, the subject matter of any one of Examples 3222 to 3227 can optionally include wherein the scheduling instruction specifies a relaying strategy for the scheduled V2V pairing, and wherein relaying the data between the target vehicular terminal device and the network access node according to the scheduled V2V pairing includes relaying the data according to the relaying strategy.

In Example 3229, the subject matter of any one of Examples 3222 to 3227 can optionally further include selecting a relaying strategy for the scheduled V2V pairing, and wherein relaying the data between the target vehicular terminal device and the network access node according to the scheduled V2V pairing includes relaying the data according to the relaying strategy.

In Example 3230, the subject matter of Example 3228 or 3229 can optionally include wherein the relaying strategy is an amplify-and-forward relaying strategy, a decode-and-forward relaying strategy, a compress-and-relaying strategy forward, or a quantize-map-and-forward relaying strategy.

In Example 3231, the subject matter of any one of Examples 3222 to 3230 can optionally include wherein relaying the data between the target vehicular terminal device and the network access node according to the scheduled V2V pairing includes transmitting uplink data intended for the network access node to the target vehicular terminal device according to the scheduled V2V pairing.

In Example 3232, the subject matter of Example 3231 can optionally further include refraining from transmitting uplink data to the network access node on a main uplink channel for the duration of the scheduled V2V pairing.

In Example 3233, the subject matter of any one of Examples 3222 to 3230 can optionally include wherein relaying the data between the target vehicular terminal device and the network access node according to the scheduled V2V pairing includes receiving downlink data from the network access node via the target vehicular terminal device according to the scheduled V2V pairing.

In Example 3234, the subject matter of Example 3233 can optionally further include refraining from receiving downlink data from the network access node on a main downlink channel for the duration of the scheduled V2V pairing.

In Example 3235, the subject matter of any one of Examples 3222 to 3234 can optionally include wherein relaying the data between the target vehicular terminal device and the network access node according to the scheduled V2V pairing includes transmitting the data to the target vehicular terminal device on a sidelink channel.

In Example 3236, the subject matter of any one of Examples 3222 to 3234 can optionally include wherein relaying the data between the target vehicular terminal device and the network access node according to the scheduled V2V pairing includes receiving the data from the target vehicular terminal device on a sidelink channel.

In Example 3237, the subject matter of any one of Examples 3222 to 3236 can optionally include wherein the data is part of a Vehicle-to-Infrastructure (V2I) connection or a Vehicle-to-Network (V2N) connection.

In Example 3238, the subject matter of any one of Examples 3222 to 3237 can optionally include wherein relaying the data between the target vehicular terminal device and the network access node according to the scheduled V2V pairing includes receiving the data from the network access node on a main downlink channel and relaying the data to the target vehicular terminal device on a sidelink channel.

In Example 3239, the subject matter of any one of Examples 3222 to 3237 can optionally include wherein relaying the data between the target vehicular terminal device and the network access node according to the scheduled V2V pairing includes receiving the data from the target vehicular terminal device on a sidelink channel and relaying the data to the network access node device on a main uplink channel.

Example 3240 is a vehicular terminal device including one or more processors configured to perform the method of any one of Examples 3222 to 3239.

Example 3241 is a processing circuit configured to perform the method of any one of Examples 3222 to 3239.

Example 3242 is a non-transitory computer readable medium storing instructions that when executed by a processor cause the processor to perform the method of any one of Examples 3222 to 3239.

Example 3243 is a non-transitory computer readable medium storing instructions that when executed by a processor of a vehicular terminal device cause the vehicular terminal device to perform the method of any one of Examples 3222 to 3239.

Example 3244 is a device including means for receiving link quality measurements from a plurality of vehicular terminal devices that characterize vehicle-to-vehicle (V2V) links between the plurality of vehicular terminal devices, means for selecting, based on the link quality measurements, a communication channel for a first vehicular terminal device of the plurality of vehicular terminal devices that includes a V2V sidelink channel as part of the communication channel, means for transmitting an instruction scheduling a V2V pairing to the first vehicular terminal device, and means for transmitting or receiving data with the first vehicular terminal device on the communication channel according to the V2V pairing.

Example 3245 is a method of organizing vehicle-to-infrastructure (V2I) or vehicle-to-network (V2N) communications for a network access node, the method including receiving link quality measurements from a plurality of vehicular terminal devices that characterize vehicle-to-vehicle (V2V) links between the plurality of vehicular terminal devices, selecting, based on the link quality measurements, a communication channel for a first vehicular terminal device of the plurality of vehicular terminal devices that includes a V2V sidelink channel as part of the communication channel, transmitting an instruction scheduling a V2V pairing to the first vehicular terminal device, and transmitting or receiving data with the first vehicular terminal device on the communication channel according to the V2V pairing.

In Example 3246, the subject matter of Example 3245 can optionally include wherein transmitting or receiving the data with the first vehicular terminal device on the communication channel according to the V2V pairing includes transmitting the data downlink data to a second vehicular terminal device that is intended for the first vehicular terminal device.

In Example 3247, the subject matter of Example 3245 can optionally include wherein transmitting or receiving the data with the first vehicular terminal device on the communication channel according to the V2V pairing includes transmitting the data as downlink data to the first vehicular terminal device that is intended for a second vehicular terminal device.

In Example 3248, the subject matter of Example 3245 can optionally include wherein transmitting or receiving the data with the first vehicular terminal device on the communication channel according to the V2V pairing includes receiving the data as uplink data from the first terminal device that originated at a second terminal device.

In Example 3249, the subject matter of Example 3245 can optionally include wherein transmitting or receiving the data with the first vehicular terminal device on the communication channel according to the V2V pairing includes receiving the data as uplink data from a second terminal device that originated at the first terminal device.

In Example 3250, the subject matter of any one of Examples 3245 to 3249 can optionally further include instructing the plurality of vehicular terminal devices to perform discovery during a discovery period.

In Example 3251, the subject matter of any one of Examples 3245 to 3250 can optionally further include providing discovery assistance information to the first vehicular terminal device that indicates that one or more of the plurality of vehicular terminal devices are proximate to the first vehicular terminal device.

In Example 3252, the subject matter of any one of Examples 3245 to 3251 can optionally further include receiving a main channel link quality measurement from the first vehicular terminal device that characterizes a main uplink or downlink channel between the network access node and the first vehicular terminal device.

In Example 3253, the subject matter of Example 3252 can optionally include wherein transmitting or receiving the data with the first vehicular terminal device on the communication channel according to the V2V pairing includes transmitting or receiving the data with the first vehicular terminal device on the communication channel that includes the V2V sidelink channel instead of the main uplink or downlink channel.

In Example 3254, the subject matter of any one of Examples 3245 to 3253 can optionally include wherein selecting, based on the link quality measurements, the communication channel for the first vehicular terminal device includes selecting a second vehicular terminal device of the plurality of vehicular terminal devices as a paired vehicular terminal device for the first vehicular terminal device, wherein the V2V sidelink channel is between the first vehicular terminal device and the second vehicular terminal device.

In Example 3255, the subject matter of Example 3254 can optionally include wherein selecting, based on the link quality measurements, the communication channel for the first vehicular terminal device further includes evaluating the link quality measurements to identify the V2V sidelink channel between the first vehicular terminal device and the second vehicular terminal device.

In Example 3256, the subject matter of any one of Examples 3245 to 3255 can optionally include wherein transmitting the instruction scheduling the V2V pairing to the first vehicular terminal device includes specifying a relaying strategy for the V2V pairing in the instruction.

In Example 3257, the subject matter of Example 3256 can optionally include wherein the relaying strategy is an amplify-and-forward relaying strategy, a decode-and-forward relaying strategy, a compress-and-relaying strategy forward, or a quantize-map-and-forward relaying strategy.

In Example 3258, the subject matter of any one of Examples 3245 to 3257 can optionally include wherein selecting, based on the link quality measurements, the communication channel for the first vehicular terminal device includes evaluating the link quality measurements according to a utility maximization criteria for proportional fair throughput to select the communication channel.

In Example 3259, the subject matter of Example 3258 can optionally include wherein selecting, based on the link quality measurements, the communication channel for the first vehicular terminal device includes evaluating the link quality measurements and one or more main channel link quality measurements according to a utility maximization criteria for proportional fair throughput to select the communication channel.

In Example 3260, the subject matter of Example 3259 can optionally further include receiving the one or more main channel link quality measurements from the first vehicular terminal device, wherein the one or more main channel link quality measurements characterize a main uplink or downlink channel between the network access node and the first vehicular terminal device.

Example 3261 is a network access node including one or more processors configured to perform the method of any one of Examples 3245 to 3260.

Example 3262 is a processing circuit configured to perform the method of any one of Examples 3245 to 3260.

Example 3263 is a non-transitory computer readable medium storing instructions that when executed by a processor cause the processor to perform the method of any one of Examples 3245 to 3260.

Example 3264 is a non-transitory computer readable medium storing instructions that when executed by a processor of a network access node cause the vehicular terminal device to perform the method of any one of Examples 3245 to 3260.

Example 3265 is a communication device adapted for implementation in a vehicular terminal device, the communication device including a discovery module configured to discover one or more vehicular terminal devices that are available for vehicle-to-vehicle (V2V) pairings, a measurement module configured to determine one or more one or more V2V link qualities for the one or more vehicular terminal devices a communication module configured to report the one or more V2V link qualities to a network access node, receive a scheduling instruction from the base station that specifies a scheduled V2V pairing with a target vehicular terminal device of the one or more vehicular terminal devices, and relay data between the target vehicular terminal device and the network access node according to the scheduled V2V pairing In Example 3266, the subject matter of Example 3265 can optionally further include a radio transceiver and one or more antennas.

In Example 3267, the subject matter of Example 3266 can optionally include wherein the communication module is configured to transmit and receive radio signals via the radio transceiver and the one or more antennas.

In Example 3268, the subject matter of Example 3266 can optionally include wherein the communication module is configured to transmit and receive radio data for one or more logical connections as radio signals via the radio transceiver and the one or more antennas.

In Example 3269, the subject matter of any one of Examples 3265 to 3267 can optionally include wherein the discovery module is configured to discover the one or more vehicular terminal devices during a discovery period scheduled by the network access node.

In Example 3270, the subject matter of any one of Examples 3265 to 3269 can optionally include wherein the discovery module is configured to discover the one or more vehicular terminal devices based on network-provided information that indicates potential neighboring vehicular terminal devices.

In Example 3271, the subject matter of any one of Examples 3265 to 3270 can optionally include wherein the measurement module is configured to determine the one or more V2V link qualities for the one or more vehicular terminal devices by measuring radio signals received on a V2V link from a first vehicular terminal device of the one or more vehicular terminal devices to obtain the link quality measurement.

In Example 3272, the subject matter of any one of Examples 3265 to 3271 can optionally include wherein the measurement module is further configured to determine a main channel link quality, the communication module further configured to report the main channel link quality to the network access node.

In Example 3273, the subject matter of any one of Examples 3265 to 3271 can optionally include wherein the measurement module is further configured to perform a radio measurement on a signal received from the network access node on a main downlink channel to obtain a main channel link quality, and wherein the communication module is further configured to report the main channel link quality to the network access node.

In Example 3274, the subject matter of any one of Examples 3265 to 3273 can optionally include wherein the scheduling instruction specifies a relaying strategy for the scheduled V2V pairing, and wherein the communication module is configured to relay the data between the target vehicular device and the network access node according to the relaying strategy.

In Example 3275, the subject matter of any one of Examples 3265 to 3273 can optionally include wherein the communication module is further configured to select a relaying strategy for the scheduled V2V pairing, and wherein the communication module is configured to relay the data between the target vehicular terminal device and the network access node according to the relaying strategy.

In Example 3276, the subject matter of Example 3274 or 3275 can optionally include wherein the relaying strategy is an amplify-and-forward relaying strategy, a decode-andforward relaying strategy, a compress-and-relaying strategy forward, or a quantize-map-and-forward relaying strategy.

In Example 3277, the subject matter of any one of Examples 3265 to 3276 can optionally include wherein the communication module is configured to relay the data between the target vehicular terminal device and the network access node according to the scheduled V2V pairing by transmitting uplink data intended for the network access node to the target vehicular terminal device according to the scheduled V2V pairing.

In Example 3278, the subject matter of Example 3277 can optionally include wherein the communication module is further configured to refrain from transmitting uplink data to the network access node on a main uplink channel for the duration of the scheduled V2V pairing.

In Example 3279, the subject matter of any one of Examples 3265 to 3276 can optionally include wherein the communication module is configured to relay the data between the target vehicular terminal device and the network access node according to the scheduled V2V pairing by receiving downlink data from the network access node via the target vehicular terminal device according to the scheduled V2V pairing.

In Example 3280, the subject matter of Example 3279 can optionally include wherein the communication module is configured to refrain from receiving downlink data from the network access node on a main downlink channel for the duration of the scheduled V2V pairing.

In Example 3281, the subject matter of any one of Examples 3265 to 3280 can optionally include wherein the communication module is configured to relay the data between the target vehicular terminal device and the network access node according to the scheduled V2V pairing by transmitting the data to the target vehicular terminal device on a sidelink channel.

In Example 3282, the subject matter of any one of Examples 3265 to 3281 can optionally include wherein the communication module is configured to relay the data between the target vehicular terminal device and the network access node according to the scheduled V2V pairing by receiving the data from the target vehicular terminal device on a sidelink channel.

In Example 3283, the subject matter of any one of Examples 3265 to 3282 can optionally include wherein the data is part of a Vehicle-to-Infrastructure (V2I) connection or a Vehicle-to-Network (V2N) connection.

In Example 3284, the subject matter of any one of Examples 3265 to 3283 can optionally include wherein the communication module is configured to relay the data between the target vehicular terminal device and the network access node according to the scheduled V2V pairing by receiving the data from the network access node on a main downlink channel and relaying the data to the target vehicular terminal device on a sidelink channel.

In Example 3285, the subject matter of any one of Examples 3265 to 3283 can optionally include wherein the communication module is configured to relay the data between the target vehicular terminal device and the network access node according to the scheduled V2V pairing by receiving the data from the target vehicular terminal device on a sidelink channel and relaying the data to the network access node device on a main uplink channel.

Example 3286 is a vehicle including the communication device of any one of Examples 3265 to 3283.

Example 3287 is a communication device adapted for implementation in a network access node, the communication device including a communication module configured to receive link quality measurements from a plurality of vehicular terminal devices that characterize V2V links between the plurality of vehicular terminal devices, select, based on the link quality measurements, a communication channel for a first vehicular terminal device of the plurality of vehicular terminal devices that includes a V2V sidelink channel as part of the communication channel, transmit an instruction scheduling a V2V pairing to the first vehicular terminal device, and transmit or receive data with the first vehicular terminal device on the communication channel according to the V2V pairing.

In Example 3288, the subject matter of Example 3287 can optionally further include one or more antennas and a radio transceiver.

In Example 3289, the subject matter of Example 3288 can optionally be configured as a network access node.

In Example 3290, the subject matter of Example 3288 or 3289 can optionally include wherein the communication module is configured to transmit and receive radio signals via the one or more antennas and the radio transceiver.

In Example 3291, the subject matter of any one of Examples 3287 to 3290 can optionally include wherein the communication module is configured to transmit and receive data for one or more logical connections as radio signals via the radio transceiver and the one or more antennas.

In Example 3292, the subject matter of any one of Examples 3287 to 3290 can optionally include wherein the communication module is configured to transmit or receive the data with the first vehicular terminal device on the communication channel according to the V2V pairing by transmitting the data as downlink data to a second vehicular terminal device that is intended for the first vehicular terminal device.

In Example 3293, the subject matter of any one of Examples 3287 to 3291 can optionally include wherein the communication module is configured to transmit or receive the data with the first vehicular terminal device on the communication channel according to the V2V pairing by transmitting the data as downlink data to the first vehicular terminal device that is intended for a second vehicular terminal device.

In Example 3294, the subject matter of any one of Examples 3287 to 3291 can optionally include wherein the communication module is configured to transmit or receive the data with the first vehicular terminal device on the communication channel according to the V2V pairing by receiving the data as uplink data from the first terminal device that originated at a second terminal device.

In Example 3295, the subject matter of any one of Examples 3287 to 3291 can optionally include wherein the communication module is configured to transmit or receive the data with the first vehicular terminal device on the communication channel according to the V2V pairing by receiving the data as uplink data from a second terminal device that originated at the first terminal device.

In Example 3296, the subject matter of any one of Examples 3287 to 3295 can optionally include wherein the communication module is further configured to instruct the plurality of vehicular terminal devices to perform discovery during a discovery period.

In Example 3297, the subject matter of any one of Examples 3287 to 3296 can optionally include wherein the communication module is further configured to provide discovery assistance information to the first vehicular terminal device that indicates that one or more of the plurality of vehicular terminal devices are proximate to the first vehicular terminal device.

In Example 3298, the subject matter of any one of Examples 3287 to 3297 can optionally include wherein the communication module is further configured to receive a main channel link quality measurement from the first vehicular terminal device that characterizes a main uplink or downlink channel between the network access node and the first vehicular terminal device.

In Example 3299, the subject matter of Example 3298 can optionally include wherein the communication module is configured to transmit or receive the data with the first vehicular terminal device on the communication channel according to the V2V pairing by transmitting or receiving the data with the first vehicular terminal device on the communication channel that includes the V2V sidelink channel instead of the main uplink or downlink channel.

In Example 3300, the subject matter of any one of Examples 3287 to 3299 can optionally include wherein the communication module is further configured to select, based on the link quality measurements, the communication channel for the first vehicular terminal device by selecting a second vehicular terminal device of the plurality of vehicular terminal devices as a paired vehicular terminal device for the first vehicular terminal device, wherein the V2V sidelink channel is between the first vehicular terminal device and the second vehicular terminal device.

In Example 3301, the subject matter of Example 3300 can optionally include wherein the communication module is further configured to select, based on the link quality measurements, the communication channel for the first vehicular terminal device by evaluating the link quality measurements to identify the V2V sidelink channel between the first vehicular terminal device and the second vehicular terminal device.

In Example 3302, the subject matter of any one of Examples 3287 to 3301 can optionally include wherein the communication module is further configured to specify a relaying strategy for the V2V pairing to the first vehicular terminal device.

In Example 3303, the subject matter of Example 3302 can optionally include wherein the relaying strategy is an amplify-and-forward relaying strategy, a decode-and-forward relaying strategy, a compress-and-relaying strategy forward, or a quantize-map-and-forward relaying strategy.

In Example 3304, the subject matter of any one of Examples 3287 to 3303 can optionally include wherein the communication module is configured to select, based on the link quality measurements, the communication channel for the first vehicular terminal device by evaluating the link quality measurements according to a utility maximization criteria for proportional fair throughput to select the communication channel.

In Example 3305, the subject matter of Example 3304 can optionally include wherein the communication module is configured to select, based on the link quality measurements, the communication channel for the first vehicular terminal device by evaluating the link quality measurements and one or more main channel link quality measurements according to a utility maximization criteria for proportional fair throughput to select the communication channel.

In Example 3306, the subject matter of Example 3305 can optionally include wherein the communication module is further configured to receive the one or more main channel link quality measurements from the first vehicular terminal device, wherein the one or more main channel link quality measurements characterize main uplink or downlink channel between the network access node and the first vehicular terminal device.

Example 3307 is a circuit arrangement adapted for implementation in a vehicular terminal device, the circuit arrangement including a discovery circuit configured to discover one or more vehicular terminal devices that are available for vehicle-to-vehicle (V2V) pairings, a measurement circuit configured to determine one or more one or more V2V link qualities for the one or more vehicular terminal devices a communication circuit configured to report the one or more V2V link qualities to a network access node, receive a scheduling instruction from the base station that specifies a scheduled V2V pairing with a target vehicular terminal device of the one or more vehicular terminal devices, and relay data between the target vehicular terminal device and the network access node according to the scheduled V2V pairing In Example 3308, the subject matter of Example 3307 can optionally further include a radio transceiver and one or more antennas.

In Example 3309, the subject matter of Example 3308 can optionally include wherein the communication circuit is configured to transmit and receive radio signals via the radio transceiver and the one or more antennas.

In Example 3310, the subject matter of Example 3308 can optionally include wherein the communication circuit is configured to transmit and receive radio data for one or more logical connections as radio signals via the radio transceiver and the one or more antennas.

In Example 3311, the subject matter of any one of Examples 3307 to 3309 can optionally include wherein the discovery circuit is configured to discover the one or more vehicular terminal devices during a discovery period scheduled by the network access node.

In Example 3312, the subject matter of any one of Examples wherein the discovery can optionally include is configured to discover the one or more vehicular terminal devices based on network-provided information that indicates potential neighboring vehicular terminal devices.

In Example 3313, the subject matter of any one of Examples 3307 to 3312 can optionally include wherein the measurement circuit is configured to determine the one or more V2V link qualities for the one or more vehicular terminal devices by measuring radio signals received on a V2V link from a first vehicular terminal device of the one or more vehicular terminal devices to obtain the link quality measurement.

In Example 3314, the subject matter of any one of Examples 3307 to 3313 can optionally include wherein the measurement circuit is further configured to determine a main channel link quality, the communication circuit further configured to report the main channel link quality to the network access node.

In Example 3315, the subject matter of any one of Examples 3307 to 3313 can optionally include wherein the measurement circuit is further configured to perform a radio measurement on a signal received from the network access node on a main downlink channel to obtain a main channel link quality, and wherein the communication circuit is further configured to report the main channel link quality to the network access node.

In Example 3316, the subject matter of any one of Examples 3307 to 3315 can optionally include wherein the scheduling instruction specifies a relaying strategy for the scheduled V2V pairing, and wherein the communication circuit is configured to relay the data between the target vehicular device and the network access node according to the relaying strategy.

In Example 3317, the subject matter of any one of Examples 3307 to 3315 can optionally include wherein the communication circuit is further configured to select a relaying strategy for the scheduled V2V pairing, and wherein the communication circuit is configured to relay the data between the target vehicular terminal device and the network access node according to the relaying strategy.

In Example 3318, the subject matter of Example 3316 or 3317 can optionally include wherein the relaying strategy is an amplify-and-forward relaying strategy, a decode-and-forward relaying strategy, a compress-and-relaying strategy forward, or a quantize-map-and-forward relaying strategy.

In Example 3319, the subject matter of any one of Examples 3307 to 3318 can optionally include wherein the communication circuit is configured to relay the data between the target vehicular terminal device and the network access node according to the scheduled V2V pairing by transmitting uplink data intended for the network access node to the target vehicular terminal device according to the scheduled V2V pairing.

In Example 3320, the subject matter of Example 3319 can optionally include wherein the communication circuit is further configured to refrain from transmitting uplink data to the network access node on a main uplink channel for the duration of the scheduled V2V pairing.

In Example 3321, the subject matter of any one of Examples 3307 to 3318 can optionally include wherein the communication circuit is configured to relay the data between the target vehicular terminal device and the network access node according to the scheduled V2V pairing by receiving downlink data from the network access node via the target vehicular terminal device according to the scheduled V2V pairing.

In Example 3322, the subject matter of Example 3321 can optionally include wherein the communication circuit is configured to refrain from receiving downlink data from the network access node on a main downlink channel for the duration of the scheduled V2V pairing.

In Example 3323, the subject matter of any one of Examples 3307 to 3322 can optionally include wherein the communication circuit is configured to relay the data between the target vehicular terminal device and the network access node according to the scheduled V2V pairing by transmitting the data to the target vehicular terminal device on a sidelink channel.

In Example 3324, the subject matter of any one of Examples 3307 to 3323 can optionally include wherein the communication circuit is configured to relay the data between the target vehicular terminal device and the network access node according to the scheduled V2V pairing by receiving the data from the target vehicular terminal device on a sidelink channel.

In Example 3325, the subject matter of any one of Examples 3307 to 3324 can optionally include wherein the data is part of a Vehicle-to-Infrastructure (V2I) connection or a Vehicle-to-Network (V2N) connection.

In Example 3326, the subject matter of any one of Examples 3307 to 3325 can optionally include wherein the communication circuit is configured to relay the data between the target vehicular terminal device and the network access node according to the scheduled V2V pairing by receiving the data from the network access node on a main downlink channel and relaying the data to the target vehicular terminal device on a sidelink channel.

In Example 3327, the subject matter of any one of Examples 3307 to 3325 can optionally include wherein the communication circuit is configured to relay the data between the target vehicular terminal device and the network access node according to the scheduled V2V pairing by receiving the data from the target vehicular terminal device on a sidelink channel and relaying the data to the network access node device on a main uplink channel.

Example 3328 is a vehicle including the circuit arrangement of any one of Examples 3307 to 3325.

Example 3329 is a circuit arrangement adapted for implementation in a network access node, the circuit arrangement including a communication circuit configured to receive link quality measurements from a plurality of vehicular terminal devices that characterize V2V links between the plurality of vehicular terminal devices, select, based on the link quality measurements, a communication channel for a first vehicular terminal device of the plurality of vehicular terminal devices that includes a V2V sidelink channel as part of the communication channel, transmit an instruction scheduling a V2V pairing to the first vehicular terminal device, and transmit or receive data with the first vehicular terminal device on the communication channel according to the V2V pairing.

In Example 3330, the subject matter of Example 3329 can optionally further include one or more antennas and a radio transceiver.

In Example 3331, the subject matter of Example 3330 can optionally be configured as a network access node.

In Example 3332, the subject matter of Example 3330 or 3331 can optionally include wherein the communication circuit is configured to transmit and receive radio signals via the one or more antennas and the radio transceiver.

In Example 3333, the subject matter of any one of Examples 3329 to 3332 can optionally include wherein the communication circuit is configured to transmit and receive data for one or more logical connections as radio signals via the radio transceiver and the one or more antennas.

In Example 3334, the subject matter of any one of Examples 3329 to 3332 can optionally include wherein the communication circuit is hardware-defined circuitry or software-defined circuitry.

In Example 3335, the subject matter of any one of Examples 3329 to 3332 can optionally include wherein the communication circuit is configured to transmit or receive the data with the first vehicular terminal device on the communication channel according to the V2V pairing by transmitting the data as downlink data to a second vehicular terminal device that is intended for the first vehicular terminal device.

In Example 3336, the subject matter of any one of Examples 3329 to 3334 can optionally include wherein the communication circuit is configured to transmit or receive the data with the first vehicular terminal device on the communication channel according to the V2V pairing by transmitting the data as downlink data to the first vehicular terminal device that is intended for a second vehicular terminal device.

In Example 3337, the subject matter of any one of Examples 3329 to 3334 can optionally include wherein the communication circuit is configured to transmit or receive the data with the first vehicular terminal device on the communication channel according to the V2V pairing by receiving the data as uplink data from the first terminal device that originated at a second terminal device.

In Example 3338, the subject matter of any one of Examples 3329 to 3334 can optionally include wherein the communication circuit is configured to transmit or receive the data with the first vehicular terminal device on the communication channel according to the V2V pairing by receiving the data as uplink data from a second terminal device that originated at the first terminal device.

In Example 3339, the subject matter of any one of Examples 3329 to 3338 can optionally include wherein the communication circuit is further configured to instruct the plurality of vehicular terminal devices to perform discovery during a discovery period.

In Example 3340, the subject matter of any one of Examples 3329 to 3339 can optionally include wherein the communication circuit is further configured to provide discovery assistance information to the first vehicular terminal device that indicates that one or more of the plurality of vehicular terminal devices are proximate to the first vehicular terminal device.

In Example 3341, the subject matter of any one of Examples 3329 to 3340 can optionally include wherein the communication circuit is further configured to receive a main channel link quality measurement from the first vehicular terminal device that characterizes a main uplink or downlink channel between the network access node and the first vehicular terminal device.

In Example 3342, the subject matter of Example 3341 can optionally include wherein the communication circuit is configured to transmit or receive the data with the first vehicular terminal device on the communication channel according to the V2V pairing by transmitting or receiving the data with the first vehicular terminal device on the communication channel that includes the V2V sidelink channel instead of the main uplink or downlink channel.

In Example 3343, the subject matter of any one of Examples 3329 to 3342 can optionally include wherein the communication circuit is further configured to select, based on the link quality measurements, the communication channel for the first vehicular terminal device by selecting a second vehicular terminal device of the plurality of vehicular terminal devices as a paired vehicular terminal device for the first vehicular terminal device, wherein the V2V sidelink channel is between the first vehicular terminal device and the second vehicular terminal device.

In Example 3344, the subject matter of Example 3343 can optionally include wherein the communication circuit is further configured to select, based on the link quality measurements, the communication channel for the first vehicular terminal device by evaluating the link quality measurements to identify the V2V sidelink channel between the first vehicular terminal device and the second vehicular terminal device.

In Example 3345, the subject matter of any one of Examples 3329 to 3344 can optionally include wherein the communication circuit is further configured to specify a relaying strategy for the V2V pairing to the first vehicular terminal device.

In Example 3346, the subject matter of Example 3345 can optionally include wherein the relaying strategy is an amplify-and-forward relaying strategy, a decode-and-forward relaying strategy, a compress-and-relaying strategy forward, or a quantize-map-and-forward relaying strategy.

In Example 3347, the subject matter of any one of Examples 3329 to 3346 can optionally include wherein the communication circuit is configured to select, based on the link quality measurements, the communication channel for the first vehicular terminal device by evaluating the link quality measurements according to a utility maximization criteria for proportional fair throughput to select the communication channel.

In Example 3348, the subject matter of Example 3347 can optionally include wherein the communication circuit is configured to select, based on the link quality measurements, the communication channel for the first vehicular terminal device by evaluating the link quality measurements and one or more main channel link quality measurements according to a utility maximization criteria for proportional fair throughput to select the communication channel.

In Example 3349, the subject matter of Example 3348 can optionally include wherein the communication circuit is further configured to receive the one or more main channel link quality measurements from the first vehicular terminal device, wherein the one or more main channel link quality measurements characterize main uplink or downlink channel between the network access node and the first vehicular terminal device.

Example 3350 is an anchor aerial device for controlling a floating cell including the anchor aerial device and one or more secondary aerial devices, the anchor aerial device including one or more processors configured to maintain a signaling connection with the one or more secondary aerial devices of the floating cell during collective movement of the floating cell, and coordinate with the network access node to steer a directional antenna beam provided by the network access node to cover an area occupied by the floating cell.

In Example 3351, the subject matter of Example 3350 can optionally further include a steering and movement system, wherein the anchor aerial device is configured to perform aerial movements with the steering and movement system.

In Example 3352, the subject matter of Example 3351 can optionally be configured as an aerial drone.

In Example 3353, the subject matter of any one of Examples 3350 to 3352 can optionally further include one or more antennas and a radio transceiver, wherein the one or more processors are configured to transmit and receive data via the radio transceiver and the one or more antennas.

In Example 3354, the subject matter of any one of Examples 3350 to 3353 can optionally include wherein the one or more processors are further configured to transmit and receive data with the network access node on a first frequency band via the one or more antennas and the radio transceiver, and transmit and receive data with one or more of the plurality of terminal devices on a second frequency band different from the first frequency band via the one or more antennas and the radio transceiver.

In Example 3355, the subject matter of any one of Examples 3350 to 3354 can optionally include wherein the one or more processors are configured to coordinate with the network access node to steer the directional antenna beam provided by the network access node to cover an area occupied by the floating cell by transmitting positioning information of the floating cell to the network access node.

In Example 3356, the subject matter of any one of Examples 3350 to 3353 can optionally include wherein the one or more processors are further configured to receive control information from the network access node and to relay the control information to the one or more secondary aerial devices via the signaling connection.

In Example 3357, the subject matter of any one of Examples 3350 to 3356 can optionally include wherein the one or more processors are configured to maintain the signaling connection with the one or more secondary aerial devices in accordance over a mesh or multi-hop network of the floating cell.

In Example 3358, the subject matter of any one of Examples 3350 to 3357 can optionally include wherein the one or more processors are configured to coordinate with the network access node to steer the directional antenna beam provided by the network access node to cover an area occupied by the floating cell by performing a radio measurement on a signal received from the network access node and providing the radio measurement to the network access node as feedback.

In Example 3359, the subject matter of any one of Examples 3350 to 3358 can optionally include wherein the one or more processors are configured to coordinate with the network access node to steer the directional antenna beam provided by the network access node to cover an area occupied by the floating cell by providing movement information to the network access node that indicates a speed or movement direction of the floating cell.

In Example 3360, the subject matter of any one of Examples 3350 to 3359 can optionally include wherein the one or more processors are configured to coordinate with the network access node to steer the directional antenna beam provided by the network access node to cover an area occupied by the floating cell by providing cell radius information to the network access node that indicates a cell radius of the floating cell.

In Example 3361, the subject matter of any one of Examples 3350 to 3360 can optionally include wherein the one or more processors are further configured to receive downlink data from the network access node intended for a first aerial device of the one or more secondary aerial devices, and relay the downlink data to the first aerial device via the signaling connection.

In Example 3362, the subject matter of any one of Examples 3350 to 3361 can optionally include wherein the one or more processors are further configured to receive uplink data intended for the network access node from a second aerial device of the one or more secondary aerial devices, and relay the uplink data to the network access node.

In Example 3363, the subject matter of any one of Examples 3350 to 3362 can optionally include wherein the one or more processors are further configured to transmit and receive data with a second network access node to transfer service of the floating cell from the network access node to the second network access node.

In Example 3364, the subject matter of Example 3363 can optionally include wherein the one or more processors are further configured to after transferring service of the floating cell from the network access node to the second network access node, coordinate with the second network access node to steer a directional antenna beam provided by the second network access node to cover an area occupied by the floating cell.

In Example 3365, the subject matter of any one of Examples 3350 to 3364 can optionally include wherein the one or more processors are further configured to monitor a position of a first secondary aerial device of the one or more secondary aerial devices to determine whether the first secondary aerial device is further than a predefined distance from the anchor aerial device, and transmit an instruction that instructs the first secondary aerial device to move closer to the anchor aerial device in response to determining that the first secondary aerial device is further than the predefined distance from the anchor aerial device.

In Example 3366, the subject matter of Example 3365 can optionally further include a sensor configured to generate sensor data that indicates the position of the first secondary aerial device, wherein the one or more processors are configured to use the sensor data to monitor the position of the first secondary aerial device.

Example 3367 is a secondary aerial device for operating in a floating cell including a plurality of aerial terminal devices, the secondary aerial device including a communication module configured to maintain a signaling connection with an anchor aerial device of the floating cell and to transmit and receive data with a network access node, and a positioning module configured to control a position of the secondary aerial device to maintain less than a predefined distance between the secondary aerial device and the anchor aerial device according to one or more distance parameters.

In Example 3368, the subject matter of Example 3367 can optionally further include a steering and movement system, wherein the positioning module is configured to interface with the steering and movement system to control the position of the secondary aerial device.

In Example 3369, the subject matter of any one of Examples 3365 to 3367 can optionally include the positioning module can optionally be configured to determine that the position of the secondary aerial device is greater than the predefined distance from the anchor aerial device, and further configured to control the steering and movement system to move the position of the secondary aerial device to a position within the predefined distance from the anchor aerial device.

In Example 3370, the subject matter of any one of Examples 3367 to 3369 can optionally be configured as an aerial drone.

In Example 3371, the subject matter of any one of Examples 3367 to 3370 can optionally further include one or more antennas and a radio transceiver, wherein the communication module is configured to transmit and receive data via the radio transceiver and the one or more antennas.

In Example 3372, the subject matter of any one of Examples 3367 to 3371 can optionally further include a sensor, wherein the positioning module is configured to monitor sensor data from the sensor to determine whether the secondary aerial device is located within the predefined distance from the anchor aerial device.

In Example 3373, the subject matter of any one of Examples 3367 to 3372 can optionally include wherein the one or more distance parameters include a physical distance, a signal strength measurement, a signal quality measurement, or a latency measurement.

In Example 3374, the subject matter of any one of Examples 3367 to 3373 can optionally include wherein the communication module is configured to maintain the signaling connection with the anchor aerial device over a multi-hop network or a mesh network of the floating cell.

In Example 3375, the subject matter of any one of Examples 3367 to 3373 can optionally include wherein the communication module is configured to maintain the signaling connection via one or more other secondary aerial devices of the plurality of aerial terminal devices with the anchor aerial device over a multi-hop network or a mesh network of the floating cell.

In Example 3376, the subject matter of any one of Examples 3367 to 3375 can optionally include wherein the communication module is configured to transmit data with the network access node by transmitting data to the network access node via the anchor terminal device.

In Example 3377, the subject matter of any one of Examples 3367 to 3376 can optionally include wherein the communication module is configured to receive data from the network access node by receiving data from the network access node via the anchor terminal device.

In Example 3378, the subject matter of any one of Examples 3367 to 3377 can optionally include wherein the communication module is configured to receive an instruction from the anchor terminal device that indicates that the position of the secondary aerial device is greater than the predefined distance from the anchor aerial device, and wherein the positioning module is configured to control the position of the secondary aerial device to move the secondary aerial device to within the predefined distance from the anchor aerial device.

Example 3379 is a radio communication device including a communication module configured to transmit and receive data with a floating cell including an anchor aerial device and one or more secondary aerial devices that follow the movement of the anchor aerial device, a beamsteering module configured to coordinate with the anchor aerial device to steer a directional antenna beam to cover an area occupied by the floating cell.

In Example 3380, the subject matter of Example 3379 can optionally further include an antenna system configured to generate the directional antenna beam and a radio transceiver, wherein the communication module is configured to transmit and receive data with the floating cell via the antenna system and the radio transceiver.

In Example 3381, the subject matter of Example 3379 or 3380 can optionally be configured as a network access node.

In Example 3382, the subject matter of any one of Examples 3379 to 3381 can optionally include wherein the communication module is configured to receive position information of the floating cell from the anchor aerial device, and wherein the beamsteering module is configured to coordinate with the anchor aerial device to steer the directional antenna beam by steering the directional antenna beam based on the position information.

In Example 3383, the subject matter of Example 3382 can optionally include wherein the beamsteering module is configured to control a phased array antenna to steer the directional antenna beam in a direction towards to the floating cell indicated by the position information.

In Example 3384, the subject matter of Example 3382 or 3383 can optionally include wherein the beamsteering module is configured to adjust a beamwidth of the directional antenna beam based on a floating cell radius of the floating cell indicated by the position information.

In Example 3385, the subject matter of any one of Examples 3379 to 3384 can optionally include wherein the communication module is further configured to transmit and receive data with the anchor aerial device to coordinate transfer of the floating cell from the network access node to a second network access node.

In Example 3386, the subject matter of any one of Examples 3379 to 3385 can optionally include wherein the beamsteering module is configured to track a position of the floating cell and to adjust the directional antenna beam in the direction of the position of the floating cell as the floating cell moves.

In Example 3387, the subject matter of any one of Examples 3379 to 3386 can optionally include wherein the communication module is configured to receive uplink data from a first secondary device of the one or more secondary devices via the anchor aerial device.

In Example 3388, the subject matter of any one of Examples 3379 to 3386 can optionally include wherein the communication module is configured to transmit downlink data to a first secondary device of the one or more secondary devices via the anchor aerial device.

In Example 3389, the subject matter of any one of Examples 3379 to 3386 can optionally include wherein the communication module is configured to transmit downlink data directly to a first secondary device of the one or more secondary devices.

In Example 3390, the subject matter of any one of Examples 3379 to 3386 can optionally include wherein the communication module is configured to receive uplink data directly from a first secondary device of the one or more secondary devices.

Example 3392 is an anchor aerial cell including means for maintaining a signaling connection with one or more secondary aerial devices of a floating cell during collective movement of the floating cell, and means for coordinating with the network access node to steer a directional antenna beam provided by the network access node to cover an area occupied by the floating cell.

Example 3392 is a method for controlling a floating cell at an anchor aerial device of the floating cell, the method including maintaining a signaling connection with one or more secondary aerial devices of the floating cell during collective movement of the floating cell, and coordinating with the network access node to steer a directional antenna beam provided by the network access node to cover an area occupied by the floating cell.

In Example 3393, the subject matter of Example 3392 can optionally include wherein coordinating with the network access node to steer the directional antenna beam provided by the network access node to cover an area occupied by the floating cell includes transmitting positioning information of the floating cell to the network access node.

In Example 3394, the subject matter of Example 3392 or 3393 can optionally further include receiving control information from the network access node, and relaying the control information to the one or more secondary aerial devices via the signaling connection.

In Example 3395, the subject matter of any one of Examples 3392 to 3394 can optionally include wherein maintaining the signaling connection with the one or more secondary aerial devices of the floating cell during collective movement of the floating cell includes maintaining the signaling connection with the one or more secondary aerial device over a mesh network or a multi-hop network of the floating cell.

In Example 3396, the subject matter of any one of Examples 3392 to 3395 can optionally include wherein coordinating with the network access node to steer the directional antenna beam provided by the network access node to cover an area occupied by the floating cell includes performing a radio measurement on a signal received from the network access node and providing the radio measurement to the network access node as feedback.

In Example 3397, the subject matter of any one of Examples 3392 to 3396 can optionally include wherein coordinating with the network access node to steer the directional antenna beam provided by the network access node to cover an area occupied by the floating cell includes providing movement information to the network access node that indicates a speed or movement direction of the floating cell.

In Example 3398, the subject matter of any one of Examples 3392 to 3397 can optionally include wherein coordinating with the network access node to steer the directional antenna beam provided by the network access node to cover an area occupied by the floating cell includes providing cell radius information to the network access node that indicates a cell radius of the floating cell.

In Example 3399, the subject matter of any one of Examples 3392 to 3398 can optionally further include receiving downlink data from the network access node intended for a first aerial device of the one or more secondary aerial devices, and relaying the downlink data to the first aerial device via the signaling connection.

In Example 3400, the subject matter of any one of Examples 3392 to 3399 can optionally further include receiving uplink data intended for the network access node from a second aerial device of the one or more secondary aerial devices, and relaying the uplink data to the network access node.

In Example 3401, the subject matter of any one of Examples 3392 to 3400 can optionally further include transmitting and receiving data with a second network access node to transfer service of the floating cell from the network access node to the second network access node.

In Example 3402, the subject matter of Example 3401 can optionally further include after transferring service of the floating cell from the network access node to the second network access node, coordinating with the second network access node to steer a directional antenna beam provided by the second network access node to cover an area occupied by the floating cell.

In Example 3403, the subject matter of any one of Examples 3392 to 3402 can optionally further include monitoring a position of a first secondary aerial device of the one or more secondary aerial devices to determine whether the first secondary aerial device is further than a predefined distance from the anchor aerial device, and transmitting an instruction that instructs the first secondary aerial device to move closer to the anchor aerial device in response to determining that the first secondary aerial device is further than the predefined distance from the anchor aerial device.

Example 3404 is an aerial terminal device including one or more processors configured to perform the method of any one of Examples 3392 to 3403.

Example 3405 is a processing circuit configured to perform the method of any one of Examples 3392 to 3403.

Example 3406 is a non-transitory computer readable medium storing instructions that when executed by a processor cause the processor to perform the method of any one of Examples 3392 to 3403.

Example 3407 is a non-transitory computer readable medium storing instructions that when executed by a processor of an aerial terminal device cause the aerial terminal device to perform the method of any one of Examples 3392 to 3403.

Example 3408 is a secondary aerial device including means for maintaining a signaling connection with an anchor aerial device of a floating cell, and means for transmitting and receiving data with a network access node, and means for controlling a position of the secondary aerial device to maintain less than a predefined distance between the secondary aerial device and the anchor aerial device according to one or more distance parameters.

Example 3409 is a method of operating a secondary aerial device in a floating cell including a plurality of aerial terminal devices, the method including maintaining a signaling connection with an anchor aerial device of the floating cell, and transmitting and receiving data with a network access node, and controlling a position of the secondary aerial device to maintain less than a predefined distance between the secondary aerial device and the anchor aerial device according to one or more distance parameters.

In Example 3410, the subject matter of Example 3409 can optionally further include determining that the position of the secondary aerial device is greater than the predefined distance from the anchor aerial device, and controlling a steering and movement system of the secondary aerial device to move the position of the secondary aerial device to a position within the predefined distance from the anchor aerial device.

In Example 3411, the subject matter of Example 3409 or 3410 can optionally include wherein controlling the position of the secondary aerial device to maintain less than the predefined distance between the secondary aerial device and the anchor aerial device according to the one or more distance parameters includes monitoring sensor data from a sensor of the secondary aerial terminal device to determine whether the secondary aerial device is located within the predefined distance from the anchor aerial device.

In Example 3412, the subject matter of any one of Examples 3409 to 3411 can optionally include wherein the one or more distance parameters include a physical distance, a signal strength measurement, a signal quality measurement, or a latency measurement.

In Example 3413, the subject matter of any one of Examples 3409 to 3412 can optionally include wherein maintaining the signaling connection with the anchor aerial device of the floating cell includes maintaining the signaling connection with the anchor aerial device over a multi-hop network or a mesh network of the floating cell.

In Example 3414, the subject matter of any one of Examples 3409 to 3412 can optionally include wherein maintaining the signaling connection with the anchor aerial device of the floating cell includes maintaining the signaling connection via one or more other secondary aerial devices of the plurality of aerial terminal devices with the anchor aerial device over a multi-hop network or a mesh network of the floating cell.

In Example 3415, the subject matter of any one of Examples 3409 to 3414 can optionally include wherein transmitting and receiving data with the network access node includes transmitting data to the network access node via the anchor terminal device.

In Example 3416, the subject matter of any one of Examples 3409 to 3415 can optionally include wherein transmitting and receiving data with the network access node includes receiving data from the network access node via the anchor terminal device.

In Example 3417, the subject matter of any one of Examples 3409 to 3416 can optionally further include receiving an instruction from the anchor terminal device that indicates that the position of the secondary aerial device is greater than the predefined distance from the anchor aerial device, and controlling the position of the secondary aerial device to move the secondary aerial device to within the predefined distance from the anchor aerial device.

Example 3418 is an aerial terminal device including one or more processors configured to perform the method of any one of Examples 3409 to 3417.

Example 3419 is a processing circuit configured to perform the method of any one of Examples 3409 to 3417.

Example 3420 is a non-transitory computer readable medium storing instructions that when executed by a processor cause the processor to perform the method of any one of Examples 3409 to 3417.

Example 3421 is a non-transitory computer readable medium storing instructions that when executed by a processor of an aerial terminal device cause the aerial terminal device to perform the method of any one of Examples 3409 to 3417.

Example 3422 is a network access node including means for transmitting and receiving data with a floating cell including an anchor aerial device and one or more secondary aerial devices that follow the movement of the anchor aerial device, and means for coordinating with the anchor aerial device to steer a directional antenna beam to cover an area occupied by the floating cell.

Example 3423 is a method of operating a network access node, the method including transmitting and receiving data with a floating cell including an anchor aerial device and one or more secondary aerial devices that follow the movement of the anchor aerial device, and coordinating with the anchor aerial device to steer a directional antenna beam to cover an area occupied by the floating cell.

In Example 3424, the subject matter of Example 3423 can optionally further include receiving position information of the floating cell from the anchor aerial device, wherein coordinating with the anchor aerial device to steer the directional antenna beam includes steering the directional antenna beam based on the position information.

In Example 3425, the subject matter of Example 3424 can optionally include wherein coordinating with the anchor aerial device to steer the directional antenna beam includes controlling a phased array antenna to steer the directional antenna beam in a direction towards to the floating cell indicated by the position information.

In Example 3426, the subject matter of Example 3424 or 3425 can optionally include wherein coordinating with the anchor aerial device to steer the directional antenna beam includes adjusting a beamwidth of the directional antenna beam based on a floating cell radius of the floating cell indicated by the position information In Example 3427, the subject matter of any one of Examples 3423 to 3426 can optionally further include transmitting and receiving data with the anchor aerial device to coordinate transfer of the floating cell from the network access node to a second network access node.

In Example 3428, the subject matter of any one of Examples 3423 to 3427 can optionally include wherein coordinating with the anchor aerial device to steer the directional antenna beam includes tracking a position of the floating cell and to adjust the directional antenna beam in the direction of the position of the floating cell as the floating cell moves.

In Example 3429, the subject matter of any one of Examples 3423 to 3428 can optionally include wherein transmitting and receiving data with the floating cell includes receiving uplink data from a first secondary device of the one or more secondary devices via the anchor aerial device.

In Example 3430, the subject matter of any one of Examples 3423 to 3428 can optionally include wherein transmitting and receiving data with the floating cell includes transmitting downlink data to a first secondary device of the one or more secondary devices via the anchor aerial device.

In Example 3431, the subject matter of any one of Examples 3423 to 3428 can optionally include wherein transmitting and receiving data with the floating cell includes transmitting downlink data directly to a first secondary device of the one or more secondary devices.

In Example 3432, the subject matter of any one of Examples 3423 to 3428 can optionally include wherein transmitting and receiving data with the floating cell includes receiving uplink data directly from a first secondary device of the one or more secondary devices.

Example 3433 is a network access node including one or more processors configured to perform the method of any one of Examples 3423 to 3432.

Example 3434 is a processing circuit configured to perform the method of any one of Examples 3423 to 3432.

Example 3435 is a non-transitory computer readable medium storing instructions that when executed by a processor cause the processor to perform the method of any one of Examples 3423 to 3432.

Example 3436 is a non-transitory computer readable medium storing instructions that when executed by a processor of a network access node causes the network access node to perform the method of any one of Examples 3423 to 3432.

Example 3437 is an anchor aerial device for controlling a floating cell including the anchor aerial device and one or more secondary aerial devices, the anchor aerial device including communication circuitry configured to maintain a signaling connection with the one or more secondary aerial devices of the floating cell during collective movement of the floating cell, and coordinate with the network access node to steer a directional antenna beam provided by the network access node to cover an area occupied by the floating cell.

In Example 3438, the subject matter of Example 3437 can optionally further include a steering and movement system, wherein the anchor aerial device is configured to perform aerial movements with the steering and movement system.

In Example 3439, the subject matter of Example 3438 can optionally be configured as an aerial drone.

In Example 3440, the subject matter of any one of Examples 3437 to 3439 can optionally include wherein the communication circuitry is hardware-defined circuitry or software-defined circuitry.

In Example 3441, the subject matter of any one of Examples 3437 to 3440 can optionally further include one or more antennas and a radio transceiver, wherein the communication circuit is configured to transmit and receive data via the radio transceiver and the one or more antennas.

In Example 3442, the subject matter of any one of Examples 3437 to 3441 can optionally include wherein the communication circuitry is further configured to transmit and receive data with the network access node on a first frequency band via the one or more antennas and the radio transceiver, and transmit and receive data with one or more of the plurality of terminal devices on a second frequency band different from the first frequency band via the one or more antennas and the radio transceiver.

In Example 3443, the subject matter of any one of Examples 3437 to 3442 can optionally include wherein the communication circuitry is configured to coordinate with the network access node to steer the directional antenna beam provided by the network access node to cover an area occupied by the floating cell by transmitting positioning information of the floating cell to the network access node.

In Example 3444, the subject matter of any one of Examples 3437 to 3441 can optionally include wherein the communication circuitry is further configured to receive control information from the network access node and to relay the control information to the one or more secondary aerial devices via the signaling connection.

In Example 3445, the subject matter of any one of Examples 3437 to 3444 can optionally include wherein the communication circuitry is configured to maintain the signaling connection with the one or more secondary aerial devices in accordance over a mesh or multi-hop network of the floating cell.

In Example 3446, the subject matter of any one of Examples 3437 to 3445 can optionally include wherein the communication circuitry is configured to coordinate with the network access node to steer the directional antenna beam provided by the network access node to cover an area occupied by the floating cell by performing a radio measurement on a signal received from the network access node and providing the radio measurement to the network access node as feedback.

In Example 3447, the subject matter of any one of Examples 3437 to 3446 can optionally include wherein the communication circuitry is configured to coordinate with the network access node to steer the directional antenna beam provided by the network access node to cover an area occupied by the floating cell by providing movement information to the network access node that indicates a speed or movement direction of the floating cell.

In Example 3448, the subject matter of any one of Examples 3437 to 3447 can optionally include wherein the communication circuitry is configured to coordinate with the network access node to steer the directional antenna beam provided by the network access node to cover an area occupied by the floating cell by providing cell radius information to the network access node that indicates a cell radius of the floating cell.

In Example 3449, the subject matter of any one of Examples 3437 to 3448 can optionally include wherein the communication circuitry is further configured to receive downlink data from the network access node intended for a first aerial device of the one or more secondary aerial devices, and relay the downlink data to the first aerial device via the signaling connection.

In Example 3450, the subject matter of any one of Examples 3437 to 3449 can optionally include wherein the communication circuitry is further configured to receive uplink data intended for the network access node from a second aerial device of the one or more secondary aerial devices, and relay the uplink data to the network access node.

In Example 3451, the subject matter of any one of Examples 3437 to 3450 can optionally include wherein the communication circuitry is further configured to transmit and receive data with a second network access node to transfer service of the floating cell from the network access node to the second network access node.

In Example 3452, the subject matter of Example 3451 can optionally include wherein the communication circuitry is further configured to after transferring service of the floating cell from the network access node to the second network access node, coordinate with the second network access node to steer a directional antenna beam provided by the second network access node to cover an area occupied by the floating cell.

In Example 3453, the subject matter of any one of Examples 3437 to 3452 can optionally include wherein the communication circuitry is further configured to monitor a position of a first secondary aerial device of the one or more secondary aerial devices to determine whether the first secondary aerial device is further than a predefined distance from the anchor aerial device, and transmit an instruction that instructs the first secondary aerial device to move closer to the anchor aerial device in response to determining that the first secondary aerial device is further than the predefined distance from the anchor aerial device.

In Example 3454, the subject matter of Example 3453 can optionally further include a sensor configured to generate sensor data that indicates the position of the first secondary aerial device, wherein the communication circuit is configured to use the sensor data to monitor the position of the first secondary aerial device.

Example 3455 is a secondary aerial device for operating in a floating cell including a plurality of aerial terminal devices, the secondary aerial device including a communication circuit configured to maintain a signaling connection with an anchor aerial device of the floating cell and to transmit and receive data with a network access node, and a positioning circuit configured to control a position of the secondary aerial device to maintain less than a predefined distance between the secondary aerial device and the anchor aerial device according to one or more distance parameters.

In Example 3456, the subject matter of Example 3455 can optionally further include a steering and movement system, wherein the positioning circuit is configured to interface with the steering and movement system to control the position of the secondary aerial device.

In Example 3457, the subject matter of Example 3456 can optionally include wherein the positioning circuit is configured to determine that the position of the secondary aerial device is greater than the predefined distance from the anchor aerial device, and further configured to control the steering and movement system to move the position of the secondary aerial device to a position within the predefined distance from the anchor aerial device.

In Example 3458, the subject matter of any one of Examples 3455 to 3457 can optionally be configured as an aerial drone.

In Example 3459, the subject matter of any one of Examples 3455 to 3458 can optionally include wherein the communication circuit and the positioning circuit are hardware-defined circuitry or software-defined circuitry.

In Example 3460, the subject matter of any one of Examples 3455 to 3459 can optionally further include one or more antennas and a radio transceiver, wherein the communication circuit is configured to transmit and receive data via the radio transceiver and the one or more antennas.

In Example 3461, the subject matter of any one of Examples 3455 to 3460 can optionally further include a sensor, wherein the positioning circuit is configured to monitor sensor data from the sensor to determine whether the secondary aerial device is located within the predefined distance from the anchor aerial device.

In Example 3462, the subject matter of any one of Examples 3455 to 3461 can optionally include wherein the one or more distance parameters include a physical distance, a signal strength measurement, a signal quality measurement, or a latency measurement.

In Example 3463, the subject matter of any one of Examples 3455 to 3462 can optionally include wherein the communication circuit is configured to maintain the signaling connection with the anchor aerial device over a multi-hop network or a mesh network of the floating cell.

In Example 3464, the subject matter of any one of Examples 3455 to 3462 can optionally include wherein the communication circuit is configured to maintain the signaling connection via one or more other secondary aerial devices of the plurality of aerial terminal devices with the anchor aerial device over a multi-hop network or a mesh network of the floating cell.

In Example 3465, the subject matter of any one of Examples 3455 to 3464 can optionally include wherein the communication circuit is configured to transmit data with the network access node by transmitting data to the network access node via the anchor terminal device.

In Example 3466, the subject matter of any one of Examples 3455 to 3465 can optionally include wherein the communication circuit is configured to receive data from the network access node by receiving data from the network access node via the anchor terminal device.

In Example 3467, the subject matter of any one of Examples 3455 to 3466 can optionally include wherein the communication circuit is configured to receive an instruction from the anchor terminal device that indicates that the position of the secondary aerial device is greater than the predefined distance from the anchor aerial device, and wherein the positioning circuit is configured to control the position of the secondary aerial device to move the secondary aerial device to within the predefined distance from the anchor aerial device.

Example 3468 is a radio communication device including a communication circuit configured to transmit and receive data with a floating cell including an anchor aerial device and one or more secondary aerial devices that follow the movement of the anchor aerial device, a beamsteering circuit configured to coordinate with the anchor aerial device to steer a directional antenna beam to cover an area occupied by the floating cell.

In Example 3469, the subject matter of Example 3468 can optionally further include an antenna system configured to generate the directional antenna beam and a radio transceiver, wherein the communication circuit is configured to transmit and receive data with the floating cell via the antenna system and the radio transceiver.

In Example 3470, the subject matter of Example 3468 or 3469 can optionally be configured as a network access node.

In Example 3471, the subject matter of any one of Examples 3468 to 3470 can optionally include wherein the communication circuit is hardware-defined circuitry or software-defined circuitry.

In Example 3472, the subject matter of any one of Examples 3468 to 3471 can optionally include wherein the communication circuit is configured to receive position information of the floating cell from the anchor aerial device, and wherein the beamsteering circuit is configured to coordinate with the anchor aerial device to steer the directional antenna beam by steering the directional antenna beam based on the position information.

In Example 3473, the subject matter of Example 3472 can optionally include wherein the beamsteering circuit is configured to control a phased array antenna to steer the directional antenna beam in a direction towards to the floating cell indicated by the position information.

In Example 3474, the subject matter of Example 3472 or 3473 can optionally include wherein the beamsteering circuit is configured to adjust a beamwidth of the directional antenna beam based on a floating cell radius of the floating cell indicated by the position information.

In Example 3475, the subject matter of any one of Examples 3468 to 3474 can optionally include wherein the communication circuit is further configured to transmit and receive data with the anchor aerial device to coordinate transfer of the floating cell from the network access node to a second network access node.

In Example 3476, the subject matter of any one of Examples 3468 to 3475 can optionally include wherein the beamsteering circuit is configured to track a position of the floating cell and to adjust the directional antenna beam in the direction of the position of the floating cell as the floating cell moves.

In Example 3477, the subject matter of any one of Examples 3468 to 3476 can optionally include wherein the communication circuit is configured to receive uplink data from a first secondary device of the one or more secondary devices via the anchor aerial device.

In Example 3478, the subject matter of any one of Examples 3468 to 3476 can optionally include wherein the communication circuit is configured to transmit downlink data to a first secondary device of the one or more secondary devices via the anchor aerial device.

In Example 3479, the subject matter of any one of Examples 3468 to 3476 can optionally include wherein the communication circuit is configured to transmit downlink data directly to a first secondary device of the one or more secondary devices.

In Example 3480, the subject matter of any one of Examples 3468 to 3476 can optionally include wherein the communication circuit is configured to receive uplink data directly from a first secondary device of the one or more secondary devices.

Example 3481 is a communication system for a vehicle, the communication system including a fronthaul antenna system configured to transmit and receive radio signals and provide a local radio access network to one or more terminal devices, a backhaul antenna system configured to provide a radio backhaul connection, and one or more processors configured to, in response to detection of network outage or network overload in a geographic area, direct the vehicle to the geographic area, and to activate the fronthaul antenna system and the backhaul antenna system to provide the one or more terminal devices with a wireless connection to radio access infrastructure located outside of the geographic area via the radio backhaul connection.

In Example 3482, the subject matter of Example 3481 can optionally include wherein the one or more processors are configured to automatically detect network outage or network overload by monitoring a radio environment of the vehicle.

In Example 3483, the subject matter of Example 3481 or 3482 can optionally include wherein the one or more processors are further configured to receive a processing task from a first terminal device of the one or more terminal devices, perform the processing task to obtain processing results, and provide the processing results to the first terminal device.

In Example 3484, the subject matter of Example 3483 can optionally include wherein the one or more processors are configured to receive the processing tasks from the first terminal device via the fronthaul antenna system and to provide the processing results to the first terminal device via the backhaul antenna system.

In Example 3485, the subject matter of any one of Examples 3481 to 3484 can optionally further include a memory, wherein the one or more processors are configured to receive data from a second terminal device of the one or more terminal devices, to store the data in the memory, and to provide the data to the second terminal device on request.

In Example 3486, the subject matter of Example 3485 can optionally include wherein the one or more processors are configured to receive the data from the second terminal device via the fronthaul antenna system and to provide the data to the second terminal device via the fronthaul system.

In Example 3487, the subject matter of any one of Examples 3481 to 3486 can optionally include wherein the one or more processors are configured to detect the network outage or network overload by receiving user input from a user of the vehicle.

In Example 3488, the subject matter of any one of Examples 3481 to 3487 can optionally include wherein the one or more processors are configured to detect the network outage or network overload by receiving a notification from a coordinating entity.

In Example 3489, the subject matter of Example 3488 can optionally include wherein the one or more processors are configured to receive the notification from the coordinating entity via the backhaul antenna system.

In Example 3490, the subject matter of any one of Examples 3481 to 3489 can optionally include wherein the one or more processors is configured to relay data between the one or more terminals and the radio access infrastructure via the radio backhaul connection to provide the one or more terminals with the wireless connection.

In Example 3491, the subject matter of any one of Examples 3481 to 3490 can optionally include wherein the backhaul antenna system is a satellite antenna system and the radio access infrastructure is a satellite-based radio access infrastructure.

In Example 3492, the subject matter of any one of Examples 3481 to 3491 can optionally include wherein the fronthaul antenna system is configured to transmit and receive radio signals in accordance with a short-range radio access technology or a small-cell cellular radio access technology.

In Example 3493, the subject matter of any one of Examples 3481 to 3491 can optionally include wherein the fronthaul antenna system is configured to transmit and receive radio signals in accordance with a cellular radio access technology.

In Example 3494, the subject matter of any one of Examples 3481 to 3493 can optionally include wherein the one or more processors are configured to interface with an autonomous driving system of the vehicle to autonomously direct the vehicle to travel to the geographic area.

In Example 3495, the subject matter of Example 3494 can optionally further include the autonomous driving system.

In Example 3496, the subject matter of any one of Examples 3481 to 3495 can optionally include wherein the one or more processors are configured to identify the geographic area based on user input or input from a coordinating entity.

In Example 3497, the subject matter of any one of Examples 3481 to 3496 can optionally include wherein the one or more processors are configured to deactivate the fronthaul antenna system or the backhaul antenna system during time periods where the vehicle is being used for private use.

In Example 3498, the subject matter of Example 3497 can optionally include wherein the one or more processors are configured to activate the fronthaul antenna system or the backhaul antenna system to transition the vehicle from private use to mobile infrastructure use.

Example 3499 is a vehicle including the communication system of any one of Examples 3481 to 3498.

Example 3500 is a communication system adapted for implementation in a vehicle, the communication system including a fronthaul antenna system configured to transmit and receive radio signals and to provide a local radio access network to one or more terminal devices, a backhaul antenna system configured to relay data between the one or more terminal devices and a radio access infrastructure, one or more processors configured to, in response to a triggering condition, activate the fronthaul antenna system and the backhaul antenna system to provide the local radio access network with a relaying connection to the radio access infrastructure.

In Example 3501, the subject matter of Example 3500 can optionally include wherein the triggering condition is user input, and wherein the one or more processors are configured to detect the triggering condition by receiving user input that instructs the one or more processors to activate the fronthaul antenna system and the backhaul antenna system.

In Example 3502, the subject matter of Example 3500 can optionally include wherein the triggering condition is input from a coordinating entity, and wherein the one or more processors are configured to detect the triggering condition by receiving an instruction from the coordinating entity that instructs the one or more processors to activate the fronthaul antenna system and the backhaul antenna system.

In Example 3503, the subject matter of Example 3502 can optionally include wherein the one or more processors are configured to receive the instruction from the coordinating entity via the backhaul antenna system.

In Example 3504, the subject matter of any one of Examples 3500 to 3503 can optionally include wherein the fronthaul antenna system is configured to transmit and receive radio signals in accordance with a short-range radio access technology or a small-cell cellular radio access technology.

In Example 3505, the subject matter of any one of Examples 3500 to 3503 can optionally include wherein the fronthaul antenna system is configured to transmit and receive radio signals in accordance with a cellular radio access technology.

In Example 3506, the subject matter of any one of Examples to 3505, can optionally include the fronthaul antenna system is configured to advertise services of the communication system over the local radio access network.

In Example 3507, the subject matter of any one of Examples 3500 to 3506 can optionally include wherein the backhaul antenna system is a satellite antenna system and the radio access infrastructure is a satellite-based radio access infrastructure.

In Example 3508, the subject matter of any one of Examples 3500 to 3507 can optionally include wherein the one or more processors are further configured to identify a geographic area affected by network outage or network overload, to direct the vehicle to the geographic area, and to activate the fronthaul antenna system and the backhaul antenna system when the vehicle is in the geographic area.

In Example 3509, the subject matter of any one of Examples 3500 to 3508 can optionally include wherein the one or more processors are configured to identify the geographic area based on user input or based on input from a coordinating entity.

In Example 3510, the subject matter of any one of Examples 3500 to 3509 can optionally include wherein the one or more processors are further configured to receive processing tasks from a first terminal device of the one or more terminal devices, perform the processing tasks to obtain processing results, and provide the processing results to the first terminal device.

In Example 3511, the subject matter of Example 3510 can optionally include wherein the one or more processors are configured to receive the processing tasks from the first terminal device via the fronthaul antenna system and to provide the processing results to the first terminal device via the backhaul antenna system.

In Example 3512, the subject matter of any one of Examples 3500 to 3509 can optionally further include a memory, wherein the one or more processors are configured to receive data from a second terminal device of the one or more terminal devices and to store the data in the memory In Example 3513, the subject matter of Example 3512 can optionally include wherein the one or more processors are configured to receive the data from the second terminal device via the fronthaul antenna system.

In Example 3514, the subject matter of any one of Examples 3500 to 3513 can optionally include wherein the one or more processors are configured to deactivate the fronthaul antenna system or the backhaul antenna system during time periods where the vehicle is being used for private use.

In Example 3515, the subject matter of Example 3514 can optionally include wherein the one or more processors are configured to activate the fronthaul antenna system or the backhaul antenna system to transition the vehicle out of private use.

Example 3516 is a vehicle including means for detecting network outage or network overload in a geographic area at one or more processors of the vehicle, and means for activating a fronthaul antenna system and a backhaul antenna system of the vehicle to provide a network connection to one or more terminal devices connected to the fronthaul antenna system via a backhaul connection, provided by the backhaul antenna system, with radio access infrastructure located outside of the geographic area.

Example 3517 is a method of operating a vehicle as a mobile infrastructure node, the method including detecting network outage or network overload in a geographic area at one or more processors of the vehicle, and activating a fronthaul antenna system and a backhaul antenna system of the vehicle to provide a network connection to one or more terminal devices connected to the fronthaul antenna system via a backhaul connection, provided by the backhaul antenna system, with radio access infrastructure located outside of the geographic area.

In Example 3518, the subject matter of Example 3517 can optionally include wherein detecting network outage or network overload in the geographic area includes monitoring a radio environment of the vehicle to automatically detect network outage or network overload.

In Example 3519, the subject matter of Example 3517 or 3518 can optionally further include receiving a processing task from a first terminal device of the one or more terminal devices, performing the processing task at the one or more processors to obtain processing results, and providing the processing results to the first terminal device.

In Example 3520, the subject matter of Example 3519 can optionally include wherein receiving the processing task from the first terminal device of the one or more terminal devices and providing the processing results to the first terminal device includes receiving the processing tasks from the first terminal device via the fronthaul antenna system and to providing the processing results to the first terminal device via the backhaul antenna system.

In Example 3521, the subject matter of any one of Examples 3517 to 3520 can optionally further include receiving data from a second terminal device of the one or more terminal devices, storing the data in a memory of the vehicle, and providing the data to the second terminal device upon request.

In Example 3522, the subject matter of Example 3521 can optionally include wherein receiving the data from the second terminal device and providing the data to the second terminal device includes receiving the data from the second terminal device via the fronthaul system and providing the data to the second terminal device via the fronthaul system.

In Example 3523, the subject matter of any one of Examples 3515 to 3522 can optionally include wherein detecting the network outage or network overload includes detecting the network outage or network overload based on user input at the one or more processors from a user of the vehicle.

In Example 3524, the subject matter of any one of Examples 3515 to 3523 can optionally include wherein detecting the network outage or network overload includes receiving a notification at the one or more processors from a coordinating entity, and detecting the network outage or network overload based on the notification.

In Example 3525, the subject matter of Example 3524 can optionally include wherein receiving the notification at the one or more processors from the coordinating entity includes receiving the notification at the one or more processors via the backhaul antenna system.

In Example 3526, the subject matter of any one of Examples 3515 to 3525 can optionally include wherein activating the fronthaul antenna system and the backhaul antenna system of the vehicle to provide the network connection to the one or more terminal devices connected to the fronthaul antenna system via the radio backhaul connection, provided by the backhaul antenna system, with the radio access infrastructure located outside of the geographic area includes relaying data between the one or more terminals and the radio access infrastructure via the radio backhaul connection to provide the one or more terminals with the network connection.

In Example 3527, the subject matter of any one of Examples 3515 to 3526 can optionally include wherein the radio access infrastructure is a satellite-based radio access infrastructure, the method further including transmitting and receiving satellite signals with the backhaul antenna system on the radio backhaul connection to the satellite-based radio access infrastructure.

In Example 3528, the subject matter of any one of Examples 3515 to 3527 can optionally further include transmitting and receiving radio signals with the one or more terminal devices via the fronthaul antenna system in accordance with a short-range radio access technology or a small-cell cellular radio access technology.

In Example 3529, the subject matter of any one of Examples 3515 to 3527 can optionally further include transmitting and receiving radio signals with the one or more terminal devices via the fronthaul antenna system in accordance with a cellular radio access technology.

In Example 3530, the subject matter of any one of Examples 3515 to 3529 can optionally further include autonomously controlling the vehicle to travel to the geographic area with an autonomous driving system of the vehicle.

In Example 3531, the subject matter of any one of Examples 3515 to 3530 can optionally further include identifying the geographic area based on user input or input from coordinating entity.

In Example 3532, the subject matter of any one of Examples 3515 to 3531 can optionally further include deactivating the fronthaul antenna system or the backhaul antenna system during time periods where the vehicle is being used for private use In Example 3533, the subject matter of Example 3532 can optionally further include activating the fronthaul antenna system or the backhaul antenna system to transition the vehicle from private use to mobile infrastructure use.

Example 3534 is a communication system for a vehicle configured to perform the method of any one of Examples 3515 to 3533.

Example 3535 is a vehicle including one or more processors configured to perform the method of any one of Examples 3515 to 3533.

Example 3536 is a non-transitory computer readable medium storing instructions that when executed by a processor cause the processor to perform the method of any one of Examples 3515 to 3533.

Example 3537 is a non-transitory computer readable medium storing instructions that when executed by one or more processors of a mobile infrastructure node cause the mobile infrastructure node to perform the method of any one of Examples 3515 to 3533.

Example 3538 is a communication system for a vehicle, the communication system including a fronthaul antenna system configured to transmit and receive radio signals and provide a local radio access network to one or more terminal devices, a backhaul antenna system configured to provide a radio backhaul connection, and processing circuitry configured to, in response to detection of network outage or network overload in a geographic area, direct the vehicle to the geographic area, and to activate the fronthaul antenna system and the backhaul antenna system to provide the one or more terminal devices with a wireless connection to radio access infrastructure located outside of the geographic area via the radio backhaul connection.

In Example 3539, the subject matter of Example 3538 can optionally include wherein the processing circuitry is configured to automatically detect network outage or network overload by monitoring a radio environment of the vehicle.

In Example 3540, the subject matter of Example 3538 or 3539 can optionally include wherein the processing circuitry is further configured to receive a processing task from a first terminal device of the one or more terminal devices, perform the processing task to obtain processing results, and provide the processing results to the first terminal device.

In Example 3541, the subject matter of Example 3540 can optionally include wherein the processing circuitry is configured to receive the processing tasks from the first terminal device via the fronthaul antenna system and to provide the processing results to the first terminal device via the backhaul antenna system.

In Example 3542, the subject matter of any one of Examples 3538 to 3541 can optionally further include a memory, wherein the processing circuitry is configured to receive data from a second terminal device of the one or more terminal devices, to store the data in the memory, and to provide the data to the second terminal device on request.

In Example 3543, the subject matter of Example 3542 can optionally include wherein the processing circuitry is configured to receive the data from the second terminal device via the fronthaul antenna system and to provide the data to the second terminal device via the fronthaul system.

In Example 3544, the subject matter of any one of Examples 3538 to 3543 can optionally include wherein the processing circuitry is configured to detect the network outage or network overload by receiving user input from a user of the vehicle.

In Example 3545, the subject matter of any one of Examples 3538 to 3544 can optionally include wherein the processing circuitry is configured to detect the network outage or network overload by receiving a notification from a coordinating entity.

In Example 3546, the subject matter of Example 3545 can optionally include wherein the processing circuitry is configured to receive the notification from the coordinating entity via the backhaul antenna system.

In Example 3547, the subject matter of any one of Examples 3538 to 3546 can optionally include wherein the processing circuitry is configured to relay data between the one or more terminals and the radio access infrastructure via the radio backhaul connection to provide the one or more terminals with the wireless connection.

In Example 3548, the subject matter of any one of Examples 3538 to 3547 can optionally include wherein the backhaul antenna system is a satellite antenna system and the radio access infrastructure is a satellite-based radio access infrastructure.

In Example 3549, the subject matter of any one of Examples 3538 to 3548 can optionally include wherein the fronthaul antenna system is configured to transmit and receive radio signals in accordance with a short-range radio access technology or a small-cell cellular radio access technology.

In Example 3550, the subject matter of any one of Examples 3538 to 3548 can optionally include wherein the fronthaul antenna system is configured to transmit and receive radio signals in accordance with a cellular radio access technology.

In Example 3551, the subject matter of any one of Examples 3538 to 3550 can optionally include wherein the processing circuitry is configured to interface with an autonomous driving system of the vehicle to autonomously direct the vehicle to travel to the geographic area.

In Example 3552, the subject matter of Example 3551 can optionally further include the autonomous driving system.

In Example 3553, the subject matter of any one of Examples 3538 to 3552 can optionally include wherein the processing circuitry is configured to identify the geographic area based on user input or input from a coordinating entity.

In Example 3554, the subject matter of any one of Examples 3538 to 3553 can optionally include wherein the processing circuitry is configured to deactivate the fronthaul antenna system or the backhaul antenna system during time periods where the vehicle is being used for private use.

In Example 3555, the subject matter of Example 3554 can optionally include wherein the processing circuitry is configured to activate the fronthaul antenna system or the backhaul antenna system to transition the vehicle from private use to mobile infrastructure use.

Example 3556 is a vehicle including the communication system of any one of Examples 3538 to 3555.

Example 3557 is communication circuit configuration adapted for implementation in a vehicle, the communication circuit configuration including a fronthaul antenna system configured to transmit and receive radio signals and to provide a local radio access network to one or more terminal devices, a backhaul antenna system configured to relay data between the one or more terminal devices and a radio access infrastructure, processing circuitry configured to, in response to a triggering condition, activate the fronthaul antenna system and the backhaul antenna system to provide the local radio access network with a relaying connection to the radio access infrastructure.

In Example 3558, the subject matter of Example 3557 can optionally include wherein the triggering condition is user input, and wherein the processing circuitry is configured to detect the triggering condition by receiving user input that instructs the processing circuitry to activate the fronthaul antenna system and the backhaul antenna system.

In Example 3559, the subject matter of Example 3557 can optionally include wherein the triggering condition is input from a coordinating entity, and wherein the processing circuitry is configured to detect the triggering condition by receiving an instruction from the coordinating entity that instructs the processing circuitry to activate the fronthaul antenna system and the backhaul antenna system.

In Example 3560, the subject matter of Example 3559 can optionally include wherein the processing circuitry is configured to receive the instruction from the coordinating entity via the backhaul antenna system.

In Example 3561, the subject matter of any one of Examples 3557 to 3560 can optionally include wherein the fronthaul antenna system is configured to transmit and receive radio signals in accordance with a short-range radio access technology or a small-cell cellular radio access technology.

In Example 3562, the subject matter of any one of Examples 3557 to 3560 can optionally include wherein the fronthaul antenna system is configured to transmit and receive radio signals in accordance with a cellular radio access technology.

In Example 3563, the subject matter of any one of Examples to 3562 can optionally include wherein the fronthaul antenna system is configured to advertise services of the communication circuit configuration over the local radio access network.

In Example 3564, the subject matter of any one of Examples 3557 to 3563 can optionally include wherein the backhaul antenna system is a satellite antenna system and the radio access infrastructure is a satellite-based radio access infrastructure.

In Example 3565, the subject matter of any one of Examples 3557 to 3564 can optionally include wherein the processing circuitry is further configured to identify a geographic area affected by network outage or network overload, to direct the vehicle to the geographic area, and to activate the fronthaul antenna system and the backhaul antenna system when the vehicle is in the geographic area.

In Example 3566, the subject matter of any one of Examples 3557 to 3565 can optionally include wherein the processing circuitry is configured to identify the geographic area based on user input or based on input from a coordinating entity.

In Example 3567, the subject matter of any one of Examples 3557 to 3566 can optionally include wherein the processing circuitry is further configured to receive processing tasks from a first terminal device of the one or more terminal devices, perform the processing tasks to obtain processing results, and provide the processing results to the first terminal device.

In Example 3568, the subject matter of Example 3567 can optionally include wherein the processing circuitry is configured to receive the processing tasks from the first terminal device via the fronthaul antenna system and to provide the processing results to the first terminal device via the backhaul antenna system.

In Example 3569, the subject matter of any one of Examples 3557 to 3566 can optionally further include a memory, wherein the processing circuitry is configured to receive data from a second terminal device of the one or more terminal devices and to store the data in the memory In Example 3570, the subject matter of Example 3569 can optionally include wherein the processing circuitry is configured to receive the data from the second terminal device via the fronthaul antenna system.

In Example 3571, the subject matter of any one of Examples 3557 to 3570 can optionally include wherein the processing circuitry is configured to deactivate the fronthaul antenna system or the backhaul antenna system during time periods where the vehicle is being used for private use.

In Example 3572, the subject matter of Example 3571 can optionally include wherein the processing circuitry is configured to activate the fronthaul antenna system or the backhaul antenna system to transition the vehicle out of private use.

Example 3573 is a communication device including one or more processors configured to receive, on a downlink channel, multicast data from a network access node that is addressed with a terminal device identification shared by the communication device and one or more additional terminal devices, and communicate, on a sidelink channel, with a leader terminal device of the one or more additional terminal devices to coordinate transmission of uplink data on a shared uplink channel to the network access node.

In Example 3574, the subject matter of Example 3573 can optionally further include a radio transceiver and one or more antennas.

In Example 3575, the subject matter of Example 3574 can optionally include wherein the one or more processors are configured to transmit and receive data as radio signals via the radio transceiver and one or more antennas.

In Example 3576, the subject matter of Example 3574 or 3575 can optionally further include a steering and movement system and configured as an aerial drone.

In Example 3577, the subject matter of Example 3574 or 3575 can optionally be configured as an Internet of Things (IoT) device.

In Example 3578, the subject matter of Example 3574 or 3575 can optionally be configured as a terminal device for radio communications.

In Example 3579, the subject matter of any one of Examples 3574 to 3578 can optionally further include an application processor.

In Example 3580, the subject matter of Example 3573 can optionally be configured as an electronic component for a terminal device.

In Example 3581, the subject matter of any one of Examples 3573 to 3580 can optionally include wherein the one or more processors are further configured to communicate with the one or more additional terminal devices on the sidelink channel to select the leader terminal device based on selection criteria.

In Example 3582, the subject matter of Example 3581 can optionally include wherein the selection criteria includes one or more of available battery power, expected battery life, overall processing power, available processing resources, signal strength, temperature, or wireless link quality.

In Example 3583, the subject matter of any one of Examples 3573 to 3582 can optionally include wherein the multicast data is control data of a control channel shared by the communication device and the one or more additional terminal devices.

In Example 3584, the subject matter of any one of Examples 3573 to 3583 can optionally include wherein the one or more processors are configured to communicate on the sidelink channel according to a radio access technology that is transparent to the network access node.

In Example 3585, the subject matter of any one of Examples 3573 to 3584 can optionally include wherein the one or more processors are configured to communicate with the leader terminal device to coordinate transmission of uplink data to the network access node by transmitting the uplink data to the network access node via the leader terminal device.

In Example 3586, the subject matter of any one of Examples 3573 to 3584 can optionally include wherein the one or more processors are configured to communicate with the leader terminal device to coordinate transmission of uplink data to the network access node by using the leader terminal device as a relay to transmit the uplink data to the network access node.

In Example 3587, the subject matter of any one of Examples 3573 to 3584 can optionally include wherein the one or more processors are configured to communicate with the leader terminal device to coordinate transmission of uplink data to the network access node by transmitting, on the sidelink channel, the uplink data to the leader terminal device as data intended for the network access node.

In Example 3588, the subject matter of any one of Examples 3585 to 3587 can optionally include wherein the one or more processors are further configured to receive a resource allocation for the sidelink channel from the leader terminal devices that specifies a time or frequency resource for the one or more processors to transmit on the sidelink channel.

In Example 3589, the subject matter of any one of Examples 3573 to 3584 can optionally include wherein the one or more processors are configured to communicate with the leader terminal device to coordinate transmission of uplink data to the network access node by receiving, from the leader terminal device, a resource allocation for the shared uplink channel that specifies a time or frequency resource for the one or more processors to transmit on the shared uplink channel, and transmitting the uplink data to the network access node on the shared uplink channel according to the time or frequency resource specified in the resource allocation.

In Example 3590, the subject matter of any one of Examples 3573 to 3589 can optionally include wherein the one or more processors are further configured to embed a tag in the uplink data that identifies the communication device as an originating point of the uplink data.

In Example 3591, the subject matter of any one of Examples 3573 to 3590 can optionally include wherein the one or more processors are further configured to transmit a request, over the sidelink channel, to a first terminal device of the one or more additional terminal devices to perform a processing task, and receive, over the sidelink channel, results for the processing task.

In Example 3592, the subject matter of Example 3591 can optionally include wherein the processing task is a decoding task, an encoding task, a transmission task, a reception task, a control channel search task, or a paging channel monitoring task.

In Example 3593, the subject matter of Example 3591 or 3592 can optionally include wherein the one or more processors are configured to transmit the request in response to determining that the communication device has a low battery power.

Example 3594 is a communication device including one or more processors configured to receive, on a downlink channel, multicast data from a network access node that is addressed to a terminal device identification shared by shared by the communication device and one or more additional terminal devices, communicate, on a sidelink channel, with a first terminal device of the one or more additional terminal devices to coordinate transmission of uplink data on a shared uplink channel from the first terminal device to the network access node.

In Example 3595, the subject matter of Example 3594 can optionally further include a radio transceiver and one or more antennas.

In Example 3596, the subject matter of Example 3595 can optionally include wherein the one or more processors are configured to transmit and receive data as radio signals via the radio transceiver and one or more antennas.

In Example 3597, the subject matter of Example 3595 or 3596 can optionally further include a steering and movement system and configured as an aerial drone.

In Example 3598, the subject matter of Example 3595 or 3596 can optionally be configured as an Internet of Things (IoT) device.

In Example 3599, the subject matter of Example 3595 or 3596 can optionally be configured as a terminal device for radio communications.

In Example 3600, the subject matter of any one of Examples 3595 to 3600 can optionally further include an application processor.

In Example 3601, the subject matter of Example 3594 can optionally be configured as an electronic component for a terminal device.

In Example 3602, the subject matter of any one of Examples 3594 to 3601 can optionally include wherein the one or more processors are further configured to communicate with the one or more additional terminal devices on the sidelink channel to select a leader terminal device, wherein the communication device is selected as the leader terminal device.

In Example 3603, the subject matter of Example 3602 can optionally include wherein the one or more processors are further configured to communicate with the one or more additional terminal devices on the sidelink channel to select a new leader terminal device at a time after the communication device is selected as the leader terminal device.

In Example 3604, the subject matter of Example 3602 or 3603 can optionally include wherein the one or more processors are configured to communicate with the one or more additional terminal devices on the sidelink channel to select the leader terminal device based on one or more of available battery power, expected battery life, overall processing power, available processing resources, signal strength, temperature, or wireless link quality.

In Example 3605, the subject matter of any one of Examples 3594 to 3604 can optionally include wherein the multicast data is control data of a control channel shared by the communication device and the one or more additional terminal devices.

In Example 3606, the subject matter of any one of Examples 3594 to 3605 can optionally include wherein the one or more processors are configured to communicate on the sidelink channel according to a radio access technology that is transparent to the network access node.

In Example 3607, the subject matter of any one of Examples 3594 to 3606 can optionally include wherein the one or more processors are configured to communicate with the first terminal device of the one or more additional terminal devices to coordinate transmission of the uplink data from the first terminal device to the network access node by receiving the uplink data from the first terminal device on the sidelink channel, and transmitting the uplink data to the network access node on the shared uplink channel.

In Example 3608, the subject matter of Example 3607 can optionally include wherein the one or more processors are further configured to, before receiving the uplink data from the first terminal device on the sidelink channel, transmit a resource allocation to the first terminal device that specifies a time or frequency resource for the first terminal device to transmit on the sidelink channel.

In Example 3609, the subject matter of any one of Examples 3594 to 3606 can optionally include wherein the one or more processors are configured to communicate with the first terminal device of the one or more additional terminal devices to coordinate transmission of the uplink data from the first terminal device to the network access node by transmitting a resource allocation to the first terminal device that specifies a time or frequency resource for the first terminal device to transmit the uplink data to the network access node on the shared uplink channel.

Example 3610 is a terminal device including means for receiving, on a downlink channel, multicast data from a network access node that is addressed with a terminal device identification shared by the terminal device and one or more additional terminal devices, and means for communicating, on a sidelink channel, with a leader terminal device of the one or more additional terminal devices to coordinate transmission of uplink data on a shared uplink channel to the network access node.

Example 3611 is a method of performing radio communications at a terminal device, the method including receiving, on a downlink channel, multicast data from a network access node that is addressed with a terminal device identification shared by the terminal device and one or more additional terminal devices, and communicating, on a sidelink channel, with a leader terminal device of the one or more additional terminal devices to coordinate transmission of uplink data on a shared uplink channel to the network access node.

In Example 3612, the subject matter of Example 3611 can optionally further include communicating with the one or more additional terminal devices on the sidelink channel to select the leader terminal device based on selection criteria.

In Example 3613, the subject matter of Example 3612 can optionally include wherein the selection criteria includes one or more of available battery power, expected battery life, overall processing power, available processing resources, signal strength, temperature, or wireless link quality.

In Example 3614, the subject matter of any one of Examples 3611 to 3613 can optionally include wherein the multicast data is control data of a control channel shared by the terminal device and the one or more additional terminal devices.

In Example 3615, the subject matter of any one of Examples 3611 to 3614 can optionally further include transmitting and receiving signals on the sidelink channel according to a radio access technology that is transparent to the network access node.

In Example 3616, the subject matter of any one of Examples 3611 to 3615 can optionally include wherein communicating, on the sidelink channel, with the leader terminal device of the one or more additional terminal devices to coordinate transmission of the uplink data to the network access node includes transmitting the uplink data to the network access node via the leader terminal device.

In Example 3617, the subject matter of any one of Examples 3611 to 3615 can optionally include wherein communicating, on the sidelink channel, with the leader terminal device of the one or more additional terminal devices to coordinate transmission of the uplink data to the network access node includes using the leader terminal device as a relay to transmit the uplink data to the network access node.

In Example 3618, the subject matter of any one of Examples 3611 to 3615 can optionally include wherein communicating, on the sidelink channel, with the leader terminal device of the one or more additional terminal devices to coordinate transmission of the uplink data to the network access node includes transmitting, on the sidelink channel, the uplink data to the leader terminal device as data intended for the network access node.

In Example 3619, the subject matter of any one of Examples 3616 to 3618 can optionally further include receiving a resource allocation for the sidelink channel from the leader terminal devices that specifies a time or frequency resource for the one or more processors to transmit on the sidelink channel.

In Example 3620, the subject matter of any one of Examples 3611 to 3615 can optionally include wherein communicating, on the sidelink channel, with the leader terminal device of the one or more additional terminal devices to coordinate transmission of the uplink data to the network access node includes receiving, from the leader terminal device, a resource allocation for the shared uplink channel that specifies a time or frequency resource for the one or more processors to transmit on the shared uplink channel, and transmitting the uplink data to the network access node on the shared uplink channel according to the time or frequency resource specified in the resource allocation.

In Example 3621, the subject matter of any one of Examples 3611 to 3620 can optionally further include embedding a tag in the uplink data that identifies the terminal device as an originating point of the uplink data.

In Example 3622, the subject matter of any one of Examples 3611 to 3621 can optionally further include transmitting a request, over the sidelink channel, to a first terminal device of the one or more additional terminal devices to perform a processing task, and receiving, over the sidelink channel, results for the processing task.

In Example 3623, the subject matter of Example 3612 can optionally include wherein the processing task is a decoding task, an encoding task, a transmission task, a reception task, a control channel search task, or a paging channel monitoring task.

In Example 3624, the subject matter of Example 3622 or 3623 can optionally include wherein transmitting the request to the first terminal device includes transmitting the request to the first terminal device in response to determining that the terminal device has a low battery power.

Example 3625 is a terminal device including one or more processors configured to perform the method of any one of Examples 3611 to 3624.

Example 3626 is a processing circuit configured to perform the method of any one of Examples 3611 to 3624.

Example 3627 is a non-transitory computer readable medium storing instructions that when executed by a processor cause the processor to perform the method of any one of Examples 3611 to 3624.

Example 3628 is a non-transitory computer readable medium storing instructions that when executed by one or more processors of a terminal device cause the terminal device to perform the method of any one of Examples 3611 to 3624.

Example 3629 is a terminal device including means for receiving, on a downlink channel, multicast data from a network access node that is addressed to a terminal device identification shared by shared by the terminal device and one or more additional terminal devices, and means for communicating, on a sidelink channel, with a first terminal device of the one or more additional terminal devices to coordinate transmission of uplink data from the first terminal device to the network access node.

Example 3630 is a method of performing radio communications at a terminal device, the method including receiving, on a downlink channel, multicast data from a network access node that is addressed to a terminal device identification shared by shared by the terminal device and one or more additional terminal devices, and communicating, on a sidelink channel, with a first terminal device of the one or more additional terminal devices to coordinate transmission of uplink data from the first terminal device to the network access node.

In Example 3631, the subject matter of Example 3630 can optionally further include communicating with the one or more additional terminal devices on the sidelink channel to select a leader terminal device, wherein the terminal device is selected as the leader terminal device.

In Example 3632, the subject matter of Example 3631 can optionally further include communicating with the one or more additional terminal devices on the sidelink channel to select a new leader terminal device at a time after the terminal device is selected as the leader terminal device.

In Example 3633, the subject matter of Example 3631 or 3632 can optionally include wherein communicating with the one or more additional terminal devices on the sidelink channel to select the leader terminal device includes communicating with the one or more additional terminal devices on the sidelink channel to select the leader terminal device based on one or more of available battery power, expected battery life, overall processing power, available processing resources, signal strength, temperature, or wireless link quality.

In Example 3634, the subject matter of any one of Examples 3630 to 3633 can optionally include wherein the multicast data is control data of a control channel shared by the terminal device and the one or more additional terminal devices.

In Example 3635, the subject matter of any one of Examples 3630 to 3634 can optionally further include communicating on the sidelink channel according to a radio access technology that is transparent to the network access node.

In Example 3636, the subject matter of any one of Examples 3630 to 3635 can optionally include wherein communicating with the first terminal device of the one or more additional terminal devices to coordinate transmission of the uplink data from the first terminal device to the network access node includes receiving the uplink data from the first terminal device on the sidelink channel, and transmitting the uplink data to the network access node on the shared uplink channel.

In Example 3637, the subject matter of Example 3636 can optionally further include before receiving the uplink data from the first terminal device on the sidelink channel, transmitting a resource allocation to the first terminal device that specifies a time or frequency resource for the first terminal device to transmit on the sidelink channel.

In Example 3638, the subject matter of any one of Examples 3630 to 3637 can optionally include wherein communicating with the first terminal device of the one or more additional terminal devices to coordinate transmission of the uplink data from the first terminal device to the network access node includes transmitting a resource allocation to the first terminal device that specifies a time or frequency resource for the first terminal device to transmit the uplink data to the network access node on the shared uplink channel.

Example 3639 is a terminal device including one or more processors configured to perform the method of any one of Examples 3630 to 3637.

Example 3640 is a processing circuit configured to perform the method of any one of Examples 3630 to 3637.

Example 3641 is a non-transitory computer readable medium storing instructions that when executed by a processor cause the processor to perform the method of any one of Examples 3630 to 3637.

Example 3642 is a non-transitory computer readable medium storing instructions that when executed by one or more processors of a terminal device cause the terminal device to perform the method of any one of Examples 3630 to 3637.

Example 3643 is a communication device including processing circuitry configured to receive, on a downlink channel, multicast data from a network access node that is addressed with a terminal device identification shared by the communication device and one or more additional terminal devices, and communicate, on a sidelink channel, with a leader terminal device of the one or more additional terminal devices to coordinate transmission of uplink data on a shared uplink channel to the network access node.

In Example 3644, the subject matter of Example 3643 can optionally further include a radio transceiver and one or more antennas.

In Example 3645, the subject matter of Example 3644 can optionally include wherein the processing circuitry is configured to transmit and receive data as radio signals via the radio transceiver and one or more antennas.

In Example 3646, the subject matter of Example 3644 or 3645 can optionally further include a steering and movement system and configured as an aerial drone.

In Example 3647, the subject matter of Example 3644 or 3645 can optionally be configured as an Internet of Things (IoT) device.

In Example 3648, the subject matter of Example 3644 or 3645 can optionally be configured as a terminal device for radio communications.

In Example 3649, the subject matter of any one of Examples 3644 to 3648 can optionally further include an application processor.

In Example 3650, the subject matter of Example 3643 can optionally be configured as an electronic circuitry component for a terminal device.

In Example 3651, the subject matter of any one of Examples 3643 to 3650 can optionally include wherein the processing circuitry is further configured to communicate with the one or more additional terminal devices on the sidelink channel to select the leader terminal device based on selection criteria.

In Example 3652, the subject matter of Example 3651 can optionally include wherein the selection criteria includes one or more of available battery power, expected battery life, overall processing power, available processing resources, signal strength, temperature, or wireless link quality.

In Example 3653, the subject matter of any one of Examples 3643 to 3652 can optionally include wherein the multicast data is control data of a control channel shared by the communication device and the one or more additional terminal devices.

In Example 3654, the subject matter of any one of Examples 3643 to 3653 can optionally include wherein the processing circuitry is configured to communicate on the sidelink channel according to a radio access technology that is transparent to the network access node.

In Example 3655, the subject matter of any one of Examples 3643 to 3654 can optionally include wherein the processing circuitry is configured to communicate with the leader terminal device to coordinate transmission of uplink data to the network access node by transmitting the uplink data to the network access node via the leader terminal device.

In Example 3656, the subject matter of any one of Examples 3643 to 3654 can optionally include wherein the processing circuitry is configured to communicate with the leader terminal device to coordinate transmission of uplink data to the network access node by using the leader terminal device as a relay to transmit the uplink data to the network access node.

In Example 3657, the subject matter of any one of Examples 3643 to 3654 can optionally include wherein the processing circuitry is configured to communicate with the leader terminal device to coordinate transmission of uplink data to the network access node by transmitting, on the sidelink channel, the uplink data to the leader terminal device as data intended for the network access node.

In Example 3658, the subject matter of any one of Examples 3655 to 3657 can optionally include wherein the processing circuitry is further configured to receive a resource allocation for the sidelink channel from the leader terminal devices that specifies a time or frequency resource for the processing circuitry to transmit on the sidelink channel.

In Example 3659, the subject matter of any one of Examples 3643 to 3654 can optionally include wherein the processing circuitry is configured to communicate with the leader terminal device to coordinate transmission of uplink data to the network access node by receiving, from the leader terminal device, a resource allocation for the shared uplink channel that specifies a time or frequency resource for the processing circuitry to transmit on the shared uplink channel, and transmitting the uplink data to the network access node on the shared uplink channel according to the time or frequency resource specified in the resource allocation.

In Example 3660, the subject matter of any one of Examples 3643 to 3659 can optionally include wherein the processing circuitry is further configured to embed a tag in the uplink data that identifies the communication device as an originating point of the uplink data.

In Example 3661, the subject matter of any one of Examples 3643 to 3660 can optionally include wherein the processing circuitry is further configured to transmit a request, over the sidelink channel, to a first terminal device of the one or more additional terminal devices to perform a processing task, and receive, over the sidelink channel, results for the processing task.

In Example 3662, the subject matter of Example 3661 can optionally include wherein the processing task is a decoding task, an encoding task, a transmission task, a reception task, a control channel search task, or a paging channel monitoring task.

In Example 3663, the subject matter of Example 3661 or 3662 can optionally include wherein the processing circuitry is configured to transmit the request in response to determining that the communication device has a low battery power.

Example 3664 is a communication device including processing circuitry configured to receive, on a downlink channel, multicast data from a network access node that is addressed to a terminal device identification shared by shared by the communication device and one or more additional terminal devices, communicate, on a sidelink channel, with a first terminal device of the one or more additional terminal devices to coordinate transmission of uplink data on a shared uplink channel from the first terminal device to the network access node.

In Example 3665, the subject matter of Example 3664 can optionally further include a radio transceiver and one or more antennas.

In Example 3666, the subject matter of Example 3665 can optionally include wherein the processing circuitry is configured to transmit and receive data as radio signals via the radio transceiver and one or more antennas.

In Example 3667, the subject matter of Example 3665 or 3666 can optionally further include a steering and movement system and configured as an aerial drone.

In Example 3668, the subject matter of Example 3665 or 3666 can optionally be configured as an Internet of Things (IoT) device.

In Example 3669, the subject matter of Example 3665 or 3666 can optionally be configured as a terminal device for radio communications.

In Example 3670, the subject matter of any one of Examples 3665 to 3670 can optionally further include an application processor.

In Example 3671, the subject matter of Example 3664 can optionally be configured as an electronic circuitry component for a terminal device.

In Example 3672, the subject matter of any one of Examples 3664 to 3671 can optionally include wherein the processing circuitry is further configured to communicate with the one or more additional terminal devices on the sidelink channel to select a leader terminal device, wherein the communication device is selected as the leader terminal device.

In Example 3673, the subject matter of Example 3672 can optionally include wherein the processing circuitry is further configured to communicate with the one or more additional terminal devices on the sidelink channel to select a new leader terminal device at a time after the communication device is selected as the leader terminal device.

In Example 3674, the subject matter of Example 3672 or 3673 can optionally include wherein the processing circuitry is configured to communicate with the one or more additional terminal devices on the sidelink channel to select the leader terminal device based on one or more of available battery power, expected battery life, overall processing power, available processing resources, signal strength, temperature, or wireless link quality.

In Example 3675, the subject matter of any one of Examples 3664 to 3674 can optionally include wherein the multicast data is control data of a control channel shared by the communication device and the one or more additional terminal devices.

In Example 3676, the subject matter of any one of Examples 3664 to 3675 can optionally include wherein the processing circuitry is configured to communicate on the sidelink channel according to a radio access technology that is transparent to the network access node.

In Example 3677, the subject matter of any one of Examples 3664 to 3676 can optionally include wherein the processing circuitry is configured to communicate with the first terminal device of the one or more additional terminal devices to coordinate transmission of the uplink data from the first terminal device to the network access node by receiving the uplink data from the first terminal device on the sidelink channel, and transmitting the uplink data to the network access node on the shared uplink channel.

In Example 3678, the subject matter of Example 3677 can optionally include wherein the processing circuitry is further configured to, before receiving the uplink data from the first terminal device on the sidelink channel, transmit a resource allocation to the first terminal device that specifies a time or frequency resource for the first terminal device to transmit on the sidelink channel.

In Example 3679, the subject matter of any one of Examples 3664 to 3676 can optionally include wherein the processing circuitry is configured to communicate with the first terminal device of the one or more additional terminal devices to coordinate transmission of the uplink data from the first terminal device to the network access node by transmitting a resource allocation to the first terminal device that specifies a time or frequency resource for the first terminal device to transmit the uplink data to the network access node on the shared uplink channel.

Example 3680 is a device including means for receiving, at a first terminal device of a plurality of terminal devices, an indication that the first terminal device is assigned to a first hierarchical level associated with a first application set, means for communicating with a second terminal device of the plurality of terminal devices, the second terminal device being assigned to a second hierarchical level associated with a second application set, and means for transmitting a data message to a radio access network based on the communicating with the second terminal device.

Example 3681 is a method for communication in a hierarchical network, the method including receiving, at a first terminal device of a plurality of terminal devices, an indication that the first terminal device is assigned to a first hierarchical level associated with a first application set, communicating with a second terminal device of the plurality of terminal devices, the second terminal device being assigned to a second hierarchical level associated with a second application set, and transmitting a data message to a radio access network based on the communicating with the second terminal device.

In Example 3682, the subject matter of Example 3681 can optionally include wherein the assignment to the first hierarchical level provides the first terminal device access to the first application set.

In Example 3683, the subject matter of Example 3681 or 3682 can optionally include wherein the assignment to the second hierarchical level provides the second terminal device access to the second application set.

In Example 3684, the subject matter of any one of Examples 3681 to 3683 can optionally include wherein the assignment to the first hierarchical level indicates a latency of the first terminal device.

In Example 3685, the subject matter of Example 3684 can optionally include wherein the assignment to the second hierarchical level indicates a latency of the second terminal device.

In Example 3686, the subject matter of Example 3685 can optionally include wherein the latency of the first terminal device is higher than the latency of the second terminal device.

In Example 3687, the subject matter of any one of Examples 3681 to 3686 can optionally include wherein the assignment to the first hierarchical level indicates a data throughput of the first terminal device.

In Example 3688, the subject matter of Example 3687 can optionally include wherein the assignment to the second hierarchical level indicates a data throughput of the second terminal device.

In Example 3689, the subject matter of Example 3688 can optionally include wherein the data throughput of the first terminal device is lower than the data throughput of the second terminal device.

In Example 3690, the subject matter of any one of Examples 3681 to 3689 can optionally include wherein the communicating with the second terminal device includes receiving, from the second terminal device, information indicating that the second terminal device can forward data packets associated with the second application set to the radio access network.

In Example 3691, the subject matter of Example 3690 can optionally include wherein the communicating with the second terminal device includes requesting the second terminal device to forward the data message to the radio access network, the data message being associated with the second application set.

In Example 3692, the subject matter of Example 3690 can optionally include wherein the communicating with the second terminal device includes requesting the second terminal device to forward the data message to the radio access network, the data message being associated with a third application set, the third application set being subset of the second application set.

In Example 3693, the subject matter of any one of Examples 3681 to 3692 can optionally further include transmitting a request, to a network access node of the radio access network, to set-up a hierarchical network.

In Example 3694, the subject matter of Example 3693 can optionally include wherein the receiving of the indication that the first terminal device is assigned to a first hierarchical level is in response to the transmitting of the request to set-up the hierarchical network.

In Example 3695, the subject matter of any one of Examples 3681 to 3694 can optionally include wherein the communicating with the second terminal device includes communicating with the second terminal device over a device-to-device (D2D) communication interface.

In Example 3696, the subject matter of Example 3695 can optionally include wherein the transmitting of the data message to the radio access network includes transmitting, by the first terminal device, the data message to the second terminal device over the D2D communication interface.

In Example 3697, the subject matter of any one of Examples 3681 to 3696 can optionally include wherein the transmitting of the data message to the radio access network includes transmitting, by the first terminal device, the data message to the radio access network, the data message being associated with the first application set.

In Example 3698, the subject matter of any one of Examples 3681 to 3697 can optionally include wherein the transmitting of the data message to the radio access network includes transmitting, by the first terminal device, the data message to the radio access network, the data message being associated with a third application set, the third application set being a subset of the first application set.

In Example 3699, the subject matter of any one of Examples 3681 to 3698 can optionally further include receiving, at the first terminal device, a hierarchical level change indicating that the hierarchical level of the first terminal device is reassigned to a third hierarchical level associated with a third application set, wherein the transmitting of the data message to the radio access network includes transmitting, by the first terminal device, the data message to the radio access network, the data message being associated with a third application set.

In Example 3700, the subject matter of any one of Examples 3681 to 3699 can optionally further include receiving, at the first terminal device, an indication that the hierarchical network is terminated.

Example 3701 is a terminal device including one or more processors configured to perform the method of any one of Examples 3681 to 3700.

Example 3702 is a processing circuit configured to perform the method of any one of Examples 3681 to 3700.

Example 3703 is a non-transitory computer readable medium storing instructions that when executed by a processor cause the processor to perform the method of any one of Examples 3681 to 3700.

Example 3704 is a non-transitory computer readable medium storing instructions that when executed by one or more processors of a terminal device cause the terminal device to perform the method of any one of Examples 3681 to 3700.

Example 3705 is a communication device for communication in a hierarchical network, the communication device including one or more processors configured to receive an indication that the communication device is assigned to a first hierarchical level associated with a first application set, communicate with a second terminal device of a plurality of terminal devices, the second terminal device being assigned to a second hierarchical level associated with a second application set, and transmit a data message to a radio access network based on the communicating with the second terminal device.

In Example 3706, the subject matter of Example 3705 can optionally further include a radio transceiver and one or more antennas, wherein the one or more processors are configured to transmit and receive data as radio signals via the radio transceiver and the one or more antennas.

In Example 3707, the subject matter of Example 3706 can optionally be configured as a terminal device for radio communications.

In Example 3708, the subject matter of Example 3707 can optionally be configured as an electronic component for a terminal device.

In Example 3709, the subject matter of any one of Examples 3705 to 3708 can optionally include wherein the assignment to the first hierarchical level provides the communication device access to the first application set.

In Example 3710, the subject matter of any one of Examples 3705 to 3709 can optionally include wherein the assignment to the second hierarchical level provides the second terminal device access to the second application set.

In Example 3711, the subject matter of any one of Examples 3705 to 3710 can optionally include wherein the assignment to the first hierarchical level indicates a latency of the communication device.

In Example 3712, the subject matter of Example 3711 can optionally include wherein the assignment to the second hierarchical level indicates a latency of the second terminal device.

In Example 3713, the subject matter of Example 3712 can optionally include wherein the latency of the communication device is higher than the latency of the second terminal device.

In Example 3714, the subject matter of any one of Examples 3705 to 3713 can optionally include wherein the assignment to the first hierarchical level indicates a data throughput of the communication device.

In Example 3715, the subject matter of Example 3714 can optionally include wherein the assignment to the second hierarchical level indicates a data throughput of the second terminal device.

In Example 3716, the subject matter of Example 3715 can optionally include wherein the data throughput of the communication device is lower than the data throughput of the second terminal device.

In Example 3717, the subject matter of any one of Examples 3705 to 3716 can optionally include wherein the one or more processors are further configured to receive, from the second terminal device, information indicating that the second terminal device can forward data packets associated with the second application set to the radio access network.

In Example 3718, the subject matter of Example 3717 can optionally include wherein the one or more processors are further configured to request the second terminal device to forward the data message to the radio access network, the data message being associated with the second application set.

In Example 3719, the subject matter of Example 3717 can optionally include wherein the one or more processors are further configured to request the second terminal device to forward the data message to the radio access network, the data message being associated with a third application set, the third application set being subset of the second application set.

In Example 3720, the subject matter of any one of Examples 3705 to 3719 can optionally include wherein the one or more processors are further configured to transmit a request, to a network access node of the radio access network, to set-up a hierarchical network.

In Example 3721, the subject matter of Example 3720 can optionally include wherein the one or more processors are further configured to receive of the indication that the communication device is assigned to a first hierarchical level is in response to the transmitting of the request to set-up the hierarchical network.

In Example 3722, the subject matter of any one of Examples 3705 to 3721 can optionally include wherein the one or more processors are further configured to communicate with the second terminal device over a device-to-device (D2D) communication interface.

In Example 3723, the subject matter of Example 3695 can optionally include wherein the one or more processors are further configured to transmit the data message to the second terminal device over the D2D communication interface.

In Example 3724, the subject matter of any one of Examples 3705 to 3723 can optionally include wherein the one or more processors are further configured to transmit the data message to the radio access network, the data message being associated with the first application set.

In Example 3725, the subject matter of any one of Examples 3705 to 3724 can optionally include wherein the one or more processors are further configured to transmit the data message to the radio access network, the data message being associated with a third application set, the third application set being a subset of the first application set.

In Example 3726, the subject matter of any one of Examples 3705 to 3725 can optionally include wherein the one or more processors are further configured to receive a hierarchical level change indicating that the hierarchical level of the communication device is reassigned to a third hierarchical level associated with a third application set, and transmit the data message to the radio access network, the data message being associated with a third application set.

In Example 3727, the subject matter of any one of Examples 3705 to 3726 can optionally include wherein the one or more processors are further configured to receive an indication that the hierarchical network is terminated.

Example 3728 is a non-transitory computer readable medium storing instructions that when executed by one or more processors of a communication device cause the communication device to perform a method including receiving, at a first terminal device of a plurality of terminal devices, an indication that the first terminal device is assigned to a first hierarchical level associated with a first application set, communicating with a second terminal device of the plurality of terminal devices, the second terminal device being assigned to a second hierarchical level associated with a second application set, and transmitting a data message to a radio access network based on the communicating with the second terminal device.

In Example 3729, the subject matter of Example 3728 can optionally include wherein the assignment to the first hierarchical level provides the first terminal device access to the first application set.

In Example 3730, the subject matter of Example 3728 or 3729 can optionally include wherein the assignment to the second hierarchical level provides the second terminal device access to the second application set.

In Example 3731, the subject matter of any one of Examples 3728 to 3730 can optionally include wherein the assignment to the first hierarchical level indicates a latency of the first terminal device.

In Example 3732, the subject matter of Example 3731 can optionally include wherein the assignment to the second hierarchical level indicates a latency of the second terminal device.

In Example 3733, the subject matter of Example 3732 can optionally include wherein the latency of the first terminal device is higher than the latency of the second terminal device.

In Example 3734, the subject matter of any one of Examples 3728 to 3733 can optionally include wherein the assignment to the first hierarchical level indicates a data throughput of the first terminal device.

In Example 3735, the subject matter of Example 3734 can optionally include wherein the assignment to the second hierarchical level indicates a data throughput of the second terminal device.

In Example 3736, the subject matter of Example 3735 can optionally include wherein the data throughput of the first terminal device is lower than the data throughput of the second terminal device.

In Example 3737, the subject matter of any one of Examples 3728 to 3736 can optionally include wherein communicating with the second terminal device includes receiving, from the second terminal device, information indicating that the second terminal device can forward data packets associated with the second application set to the radio access network.

In Example 3738, the subject matter of Example 3737 can optionally include wherein communicating with the second terminal device includes requesting the second terminal device to forward the data message to the radio access network, the data message being associated with the second application set.

In Example 3739, the subject matter of Example 3737 can optionally include wherein communicating with the second terminal device includes requesting the second terminal device to forward the data message to the radio access network, the data message being associated with a third application set, the third application set being subset of the second application set.

In Example 3740, the subject matter of any one of Examples 3728 to 3739 can optionally include the method further including transmitting a request, to a network access node of the radio access network, to set-up a hierarchical network.

In Example 3741, the subject matter of Example 3740 can optionally include wherein receiving of the indication that the first terminal device is assigned to a first hierarchical level is in response to the transmitting of the request to set-up the hierarchical network.

In Example 3742, the subject matter of any one of Examples 3728 to 3741 can optionally include wherein communicating with the second terminal device includes communicating with the second terminal device over a device-to-device (D2D) communication interface.

In Example 3743, the subject matter of Example 3742 can optionally include wherein transmitting of the data message to the radio access network includes transmitting, by the first terminal device, the data message to the second terminal device over the D2D communication interface.

In Example 3744, the subject matter of any one of Examples 3728 to 3743 can optionally include wherein transmitting of the data message to the radio access network includes transmitting, by the first terminal device, the data message to the radio access network, the data message being associated with the first application set.

In Example 3745, the subject matter of any one of Examples 3728 to 3744 can optionally include wherein transmitting of the data message to the radio access network includes transmitting, by the first terminal device, the data message to the radio access network, the data message being associated with a third application set, the third application set being a subset of the first application set.

In Example 3746, the subject matter of any one of Examples 3728 to 3745 can optionally include the method further including receiving, at the first terminal device, a hierarchical level change indicating that the hierarchical level of the first terminal device is reassigned to a third hierarchical level associated with a third application set, wherein the transmitting of the data message to the radio access network includes transmitting, by the first terminal device, the data message to the radio access network, the data message being associated with a third application set.

In Example 3747, the subject matter of any one of Examples 3728 to 3746 can optionally include the method further including receiving, at the first terminal device, an indication that the hierarchical network is terminated.

Example 3748 is a communication device for communication in a hierarchical network, the communication device including processing circuitry configured to receive an indication that the communication device is assigned to a first hierarchical level associated with a first application set, communicate with a second terminal device of a plurality of terminal devices, the second terminal device being assigned to a second hierarchical level associated with a second application set, and transmit a data message to a radio access network based on the communicating with the second terminal device.

In Example 3749, the subject matter of Example 3748 can optionally further include a radio transceiver and one or more antennas, wherein the processing circuitry is configured to transmit and receive data as radio signals via the radio transceiver and the one or more antennas.

In Example 3750, the subject matter of Example 3749 can optionally be configured as a terminal device for radio communications.

In Example 3751, the subject matter of Example 3750 can optionally be configured as an electronic circuitry component for a terminal device.

In Example 3752, the subject matter of any one of Examples 3748 to 3751 can optionally include wherein the assignment to the first hierarchical level provides the communication device access to the first application set.

In Example 3753, the subject matter of any one of Examples 3748 to 3752 can optionally include wherein the assignment to the second hierarchical level provides the second terminal device access to the second application set.

In Example 3754, the subject matter of any one of Examples 3748 to 3753 can optionally include wherein the assignment to the first hierarchical level indicates a latency of the communication device.

In Example 3755, the subject matter of Example 3754 can optionally include wherein the assignment to the second hierarchical level indicates a latency of the second terminal device.

In Example 3756, the subject matter of Example 3755 can optionally include wherein the latency of the communication device is higher than the latency of the second terminal device.

In Example 3757, the subject matter of any one of Examples 3748 to 3756 can optionally include wherein the assignment to the first hierarchical level indicates a data throughput of the communication device.

In Example 3758, the subject matter of Example 3757 can optionally include wherein the assignment to the second hierarchical level indicates a data throughput of the second terminal device.

In Example 3759, the subject matter of Example 3758 can optionally include wherein the data throughput of the communication device is lower than the data throughput of the second terminal device.

In Example 3760, the subject matter of any one of Examples 3748 to 3759 can optionally include wherein the processing circuitry is further configured to receive, from the second terminal device, information indicating that the second terminal device can forward data packets associated with the second application set to the radio access network.

In Example 3761, the subject matter of Example 3760 can optionally include wherein the processing circuitry is further configured to request the second terminal device to forward the data message to the radio access network, the data message being associated with the second application set.

In Example 3762, the subject matter of Example 3760 can optionally include wherein the processing circuitry is further configured to request the second terminal device to forward the data message to the radio access network, the data message being associated with a third application set, the third application set being subset of the second application set.

In Example 3763, the subject matter of any one of Examples 3748 to 3762 can optionally include wherein the processing circuitry is further configured to transmit a request, to a network access node of the radio access network, to set-up a hierarchical network.

In Example 3764, the subject matter of Example 3763 can optionally include wherein the processing circuitry is further configured to receive of the indication that the communication device is assigned to a first hierarchical level is in response to the transmitting of the request to set-up the hierarchical network.

In Example 3765, the subject matter of any one of Examples 3748 to 3764 can optionally include wherein the processing circuitry is further configured to communicate with the second terminal device over a device-to-device (D2D) communication interface.

In Example 3766, the subject matter of Example 3765 can optionally include wherein the processing circuitry is further configured to transmit the data message to the second terminal device over the D2D communication interface.

In Example 3767, the subject matter of any one of Examples 3748 to 3766 can optionally include wherein the processing circuitry is further configured to transmit the data message to the radio access network, the data message being associated with the first application set.

In Example 3768, the subject matter of any one of Examples 3748 to 3767 can optionally include wherein the processing circuitry is further configured to transmit the data message to the radio access network, the data message being associated with a third application set, the third application set being a subset of the first application set.

In Example 3769, the subject matter of any one of Examples 3748 to 3768 can optionally include wherein the processing circuitry is further configured to receive a hierarchical level change indicating that the hierarchical level of the communication device is reassigned to a third hierarchical level associated with a third application set, and transmit the data message to the radio access network, the data message being associated with a third application set.

In Example 3770, the subject matter of any one of Examples 3748 to 3769 can optionally include wherein the processing circuitry is further configured to receive an indication that the hierarchical network is terminated.

Example 3771 is a device including means for receiving, at a first terminal device of a plurality of terminal devices, an indication that the first terminal is assigned to a first hierarchical level, means for receiving, at a first terminal device, a first hierarchical level change indicating the first terminal device is reassigned from the first hierarchical level to a second hierarchical level, based on an operational parameter, and means for transmitting a data message to a radio access network based on the first hierarchical level change.

Example 3772 is a method for dynamic communication over a radio access network, the method including receiving, at a first terminal device of a plurality of terminal devices, an indication that the first terminal is assigned to a first hierarchical level, receiving, at a first terminal device, a first hierarchical level change indicating the first terminal device is reassigned from the first hierarchical level to a second hierarchical level, based on an operational parameter, and transmitting a data message to the radio access network based on the first hierarchical level change.

In Example 3773, the subject matter of Example 3772 can optionally include wherein the operational parameters includes at least one of a key performance indicator of the first terminal device, a location of the first terminal device, a network subscription of the first terminal device, a target Quality of Service (QoS) of the first terminal device, a mobility status of the first terminal device, a battery power of the first terminal device, or a channel condition of the first terminal device.

In Example 3774, the subject matter of any one of Examples 3772 to 3773 can optionally include wherein the operational parameter includes at least one of a channel condition of the plurality of terminal devices or a throughput requirement for the plurality of devices.

In Example 3775, the subject matter of any one of Examples 3772 to 3774 can optionally further include identifying a change in the operational parameter of the first terminal device, and requesting, by the first terminal device, to be reassigned from the first hierarchical level to the second hierarchical level based on the identified change in the operational parameter.

In Example 3776, the subject matter of any one of Examples 3774 to 3775 can optionally further include communicating with a second terminal of the plurality of terminal devices to transmit the data message to the radio access network, the second terminal being assigned to a third hierarchical level.

In Example 3777, the subject matter of Example 3776 can optionally include wherein communicating with the second terminal device includes receiving, from the second terminal device, information indicating that the second terminal device can forward data packets to the radio access network, and requesting the second terminal device to forward the data message to the radio access network.

In Example 3778, the subject matter of any one of Examples 3776 to 3777 can optionally include wherein the second hierarchical level provides access to a second application set, the third hierarchical level provides access to a third application set, and the data message is associated with the third application set.

In Example 3779, the subject matter of any one of Examples 3772 to 3778 can optionally further include transmitting, by the first terminal device, a request to change from the first hierarchical level to the second hierarchical level.

In Example 3780, the subject matter of Example 3779 can optionally include wherein receiving of the indication that the first terminal device is reassigned from the first hierarchical level to the second hierarchical level is in response to the transmitting of the request to change the first terminal device from the first hierarchical level to the second hierarchical level.

In Example 3781, the subject matter of any one of Examples 3776 to 3778 can optionally include wherein communicating with the second terminal device includes communicating with the second terminal device over a device-to-device (D2D) communication interface.

In Example 3782, the subject matter of Example 3781 can optionally include wherein transmitting of the data message to the radio access network includes transmitting, by the first terminal device, the data message to the second terminal device over the D2D communication interface.

In Example 3783, the subject matter of Example 3776 can optionally further include receiving, at a first terminal device, a second hierarchical level change indicating that a communication link between the first terminal device and the second terminal device is reconfigured to have a higher throughput.

In Example 3784, the subject matter of Example 3776 can optionally further include receiving, at a first terminal device, a second hierarchical level change indicating that a communication link between the first terminal device and the second terminal device is reconfigured to have a lower throughput.

In Example 3785, the subject matter of Example 3776 can optionally further include receiving, at a first terminal device, a second hierarchical level change indicating that a communication link between the first terminal device and the second terminal device is reconfigured to have a higher latency.

In Example 3786, the subject matter of Example 3776 can optionally further include receiving, at a first terminal device, a second hierarchical level change indicating that a communication link between the first terminal device and the second terminal device is reconfigured to have a lower latency.

In Example 3787, the subject matter of Example 3776 can optionally further include receiving, at a first terminal device, a second hierarchical level change indicating that a communication link between the first terminal device and the second terminal device is removed.

In Example 3788, the subject matter of Example 3776 can optionally include wherein receiving of the second hierarchical level change is based on an operational parameter of the second terminal device.

In Example 3789, the subject matter of any one of Examples 3772 to 3788 can optionally include wherein the operational parameter is a battery power of the first terminal device that exceeds a predetermined threshold.

In Example 3790, the subject matter of any one of Examples 3772 to 3789 can optionally include wherein the operational parameter is a mobility status of the first terminal device that indicates a probability of the first terminal device to perform a handover.

In Example 3791, the subject matter of any one of Examples 3772 to 3790 can optionally include wherein the operational parameter is a channel condition of the first terminal device that exceeds a predetermined threshold for a period of time.

Example 3792 is a terminal device including one or more processors configured to perform the method of any one of Examples 3772 to 3791.

Example 3793 is a processing circuit configured to perform the method of any one of Examples 3772 to 3791.

Example 3794 is a non-transitory computer readable medium storing instructions that when executed by a processor cause the processor to perform the method of any one of Examples 3772 to 3791.

Example 3795 is a non-transitory computer readable medium storing instructions that when executed by one or more processors of a terminal device cause the terminal device to perform the method of any one of Examples 3772 to 3791.

Example 3796 is a communication device for dynamic communication over a radio access network, the communication device including one or more processors configured to receive an indication that the communication device is assigned to a first hierarchical level, receive a first hierarchical level change indicating the communication device is reassigned from the first hierarchical level to a second hierarchical level, based on an operational parameter, and transmitting a data message to the radio access network based on the first hierarchical level change.

In Example 3797, the subject matter of Example 3796 can optionally further include a radio transceiver and one or more antennas, wherein the one or more processors are configured to transmit and receive data as radio signals via the radio transceiver and the one or more antennas.

In Example 3798, the subject matter of Example 3797 can optionally be configured as a terminal device for radio communications.

In Example 3799, the subject matter of Example 3797 can optionally be configured as an electronic component for a terminal device.

In Example 3800, the subject matter of any one of Examples 3796 to 3799 can optionally include wherein the operational parameter includes at least one of a key performance indicator of the first terminal device, a location of the first terminal device, a network subscription of the first terminal device, a target Quality of Service (QoS) of the first terminal device, a mobility status of the communication device, a battery power of the communication device, or a channel condition of the communication device.

In Example 3801, the subject matter of any one of Examples 3796 to 3800 can optionally include wherein the operational parameter includes at least one of a channel condition of a plurality of terminal devices or a throughput requirement for the plurality of devices.

In Example 3802, the subject matter of any one of Examples 3796 to 3801 can optionally include wherein the one or more processors is further configured to identify a change in the operational parameter of the communication device, and request to be reassigned from the first hierarchical level to the second hierarchical level based on the identified change in the operational parameter.

In Example 3803, the subject matter of any one of Examples 3801 to 3802 can optionally include wherein the one or more processors is further configured to communicate with a second terminal of the plurality of terminal devices to transmit the data message to the radio access network, the second terminal being assigned to a third hierarchical level.

In Example 3804, the subject matter of Example 3776 can optionally include wherein the one or more processors is further configured to receive, from the second terminal device, information indicating that the second terminal device can forward data packets to the radio access network, and request the second terminal device to forward the data message to the radio access network.

In Example 3805, the subject matter of any one of Examples 3803 to 3804 can optionally include wherein the second hierarchical level provides access to a second application set, the third hierarchical level provides access to a third application set, and the data message is associated with the third application set.

In Example 3806, the subject matter of any one of Examples 3796 to 3804 can optionally include wherein the one or more processors is further configured to transmit a request to change the communication device from the first hierarchical level to the second hierarchical level.

In Example 3807, the subject matter of Example 3806 can optionally include wherein the one or more processors is further configured to receive the indication that the communication device is reassigned from the first hierarchical level to the second hierarchical level is in response to transmitting the request to change the communication device from the first hierarchical level to the second hierarchical level.

In Example 3808, the subject matter of any one of Examples 3803 to 3805 can optionally include wherein the one or more processors is further configured to communicate with the second terminal device over a device-to-device (D2D) communication interface.

In Example 3809, the subject matter of Example 3808 can optionally include wherein the one or more processors is further configured to transmit the data message to the second terminal device over the D2D communication interface.

In Example 3810, the subject matter of Example 3803 can optionally include wherein the one or more processors is further configured to receive a second hierarchical level change indicating that a communication link between the communication device and the second terminal device is reconfigured to have a higher throughput.

In Example 3811, the subject matter of Example 3803 can optionally include wherein the one or more processors is further configured to receive a second hierarchical level change indicating that a communication link between the communication device and the second terminal device is reconfigured to have a lower throughput.

In Example 3812, the subject matter of Example 3803 can optionally include wherein the one or more processors is further configured to receive a second hierarchical level change indicating that a communication link between the communication device and the second terminal device is reconfigured to have a higher latency.

In Example 3813, the subject matter of Example 3803 can optionally include wherein the one or more processors is further configured to receive a second hierarchical level change indicating that a communication link between the communication device and the second terminal device is reconfigured to have a lower latency.

In Example 3814, the subject matter of Example 3803 can optionally include wherein the one or more processors is further configured to receive a second hierarchical level change indicating that a communication link between the communication device and the second terminal device is removed.

In Example 3815, the subject matter of any one of Examples 3803 to 3805, 3808, or 3810 to 3814 can optionally include wherein the second hierarchical level change is based on an operational parameter of the second terminal device.

In Example 3816, the subject matter of any one of Examples 3796 to 3815 can optionally include wherein the operational parameter is a battery power of the first terminal device that exceeds a predetermined threshold.

In Example 3817, the subject matter of any one of Examples 3796 to 3816 can optionally include wherein the operational parameter is a mobility status of the first terminal device that indicates a probability of the first terminal device to perform a handover.

In Example 3818, the subject matter of any one of Examples 3796 to 3817 can optionally include wherein the operational parameter is a channel condition of the first terminal device that exceeds a predetermined threshold for a period of time.

Example 3819 is a non-transitory computer readable medium storing instructions that when executed by one or more processors of a first terminal device cause the first terminal device to perform a method including receiving, at the first terminal device of a plurality of terminal devices, an indication that the first terminal is assigned to a first hierarchical level, receiving, at the first terminal device, a first hierarchical level change indicating the first terminal device is reassigned from the first hierarchical level to a second hierarchical level, based on an operational parameter, and transmitting a data message to the radio access network based on the first hierarchical level change.

In Example 3820, the subject matter of Example 3819 can optionally include wherein the operational parameter includes at least one of a key performance indicator of the first terminal device, a location of the first terminal device, a network subscription of the first terminal device, a target Quality of Service (QoS) of the first terminal device, a mobility status of the first terminal device, a battery power of the first terminal device, or a channel condition of the first terminal device.

In Example 3821, the subject matter of any one of Examples 3819 to 3820 can optionally include wherein the operational parameter includes at least one of a channel condition of the plurality of terminal devices or a throughput requirement for the plurality of devices.

In Example 3822, the subject matter of any one of Examples 3819 to 3821 can optionally include the method further including identifying a change in the operational parameter of the first terminal device, and requesting, by the first terminal device, to be reassigned from the first hierarchical level to the second hierarchical level based on the identified change in the operational parameter.

In Example 3823, the subject matter of any one of Examples 3821 to 3822 can optionally further include communicating with a second terminal of the plurality of terminal devices to transmit the data message to the radio access network, the second terminal being assigned to a third hierarchical level.

In Example 3824, the subject matter of Example 3823 can optionally include wherein communicating with the second terminal device includes receiving, from the second terminal device, information indicating that the second terminal device can forward data packets to the radio access network, and requesting the second terminal device to forward the data message to the radio access network.

In Example 3825, the subject matter of any one of Examples 3823 to 3824 can optionally include wherein the second hierarchical level provides access to a second application set, the third hierarchical level provides access to a third application set, and the data message is associated with the third application set.

In Example 3826, the subject matter of any one of Examples 3819 to 3825 can optionally include the method further including transmitting, by the first terminal device, a request to change from the first hierarchical level to the second hierarchical level.

In Example 3827, the subject matter of Example one can optionally include Examples 3826, wherein receiving of the indication that the first terminal device is reassigned from the first hierarchical level to the second hierarchical level is in response to the transmitting of the request to change the first terminal device from the first hierarchical level to the second hierarchical level.

In Example 3828, the subject matter of any one of Examples 3823 to 3825 can optionally include wherein communicating with the second terminal device includes communicating with the second terminal device over a device-to-device (D2D) communication interface.

In Example 3829, the subject matter of Example 3828 can optionally include wherein transmitting of the data message to the radio access network includes transmitting, by the first terminal device, the data message to the second terminal device over the D2D communication interface.

In Example 3830, the subject matter of Example 3823 can optionally include the method further including receiving, at a first terminal device, a second hierarchical level change indicating that a communication link between the first terminal device and the second terminal device is reconfigured to have a higher throughput.

In Example 3831, the subject matter of Example 3823 can optionally include the method further including receiving, at a first terminal device, a second hierarchical level change indicating that a communication link between the first terminal device and the second terminal device is reconfigured to have a lower throughput.

In Example 3832, the subject matter of Example 3823 can optionally include the method further including receiving, at a first terminal device, a second hierarchical level change indicating that a communication link between the first terminal device and the second terminal device is reconfigured to have a higher latency.

In Example 3833, the subject matter of Example 3823 can optionally include the method further including receiving, at a first terminal device, a second hierarchical level change indicating that a communication link between the first terminal device and the second terminal device is reconfigured to have a lower latency.

In Example 3834, the subject matter of Example 3823 can optionally include the method further including receiving, at a first terminal device, a second hierarchical level change indicating that a communication link between the first terminal device and the second terminal device is removed.

In Example 3835, the subject matter of Example 3823 can optionally include wherein receiving of the second hierarchical level change is based on an operational parameter of the second terminal device.

In Example 3836, the subject matter of any one of Examples 3819 to 3835 can optionally include wherein the operational parameter is a battery power of the first terminal device that exceeds a predetermined threshold.

In Example 3837, the subject matter of any one of Examples 3819 to 3836 can optionally include wherein the operational parameter is a mobility status of the first terminal device that indicates a probability of the first terminal device to perform a handover.

In Example 3838, the subject matter of any one of Examples 3819 to 3837 can optionally include wherein the operational parameter is a channel condition of the first terminal device that exceeds a predetermined threshold for a period of time.

Example 3839 is a communication device for dynamic communication over a radio access network, the communication device including processor circuitry configured to receive an indication that the communication device is assigned to a first hierarchical level, receive a first hierarchical level change indicating the communication device is reassigned from the first hierarchical level to a second hierarchical level, based on an operational parameter, and transmitting a data message to the radio access network based on the first hierarchical level change.

In Example 3840, the subject matter of Example 3839 can optionally further include a radio transceiver and one or more antennas, wherein the processing circuitry is configured to transmit and receive data as radio signals via the radio transceiver and the one or more antennas.

In Example 3841, the subject matter of Example 3840 can optionally be configured as a terminal device for radio communications.

In Example 3842, the subject matter of Example 3840 can optionally be configured as an electronic circuitry component for a terminal device.

In Example 3843, the subject matter of any one of Examples 3839 to 3842 can optionally include wherein the operational parameter includes at least one of a key performance indicator of the first terminal device, a location of the first terminal device, a network subscription of the first terminal device, a target Quality of Service (QoS) of the first terminal device, a mobility status of the communication device, a battery power of the communication device, or a channel condition of the communication device.

In Example 3844, the subject matter of any one of Examples 3839 to 3843 can optionally include wherein the operational parameter includes at least one of a channel condition of a plurality of terminal devices or a throughput requirement for the plurality of devices.

In Example 3845, the subject matter of any one of Examples 3839 to 3844 can optionally include wherein the processor circuitry is further configured to identify a change in the operational parameter of the communication device, and request to be reassigned from the first hierarchical level to the second hierarchical level based on the identified change in the operational parameter.

In Example 3846, the subject matter of any one of Examples 3844 to 3845 can optionally include wherein the processor circuitry is further configured to communicate with a second terminal of the plurality of terminal devices to transmit the data message to the radio access network, the second terminal being assigned to a third hierarchical level.

In Example 3847, the subject matter of Example 3846 can optionally include wherein the processor circuitry is further configured to receive, from the second terminal device, information indicating that the second terminal device can forward data packets to the radio access network, and request the second terminal device to forward the data message to the radio access network.

In Example 3848, the subject matter of any one of Examples 3846 to 3847 can optionally include wherein the second hierarchical level provides access to a second application set, the third hierarchical level provides access to a third application set, and the data message is associated with the third application set.

In Example 3849, the subject matter of any one of Examples 3839 to 3847 can optionally include wherein the processor circuitry is further configured to transmit a request to change the communication device from the first hierarchical level to the second hierarchical level.

In Example 3850, the subject matter of Example 3849 can optionally include wherein the processor circuitry is further configured to receive the indication that the communication device is reassigned from the first hierarchical level to the second hierarchical level is in response to transmitting the request to change the communication device from the first hierarchical level to the second hierarchical level.

In Example 3851, the subject matter of any one of Examples 3846 to 3848 can optionally include wherein the processor circuitry is further configured to communicate with the second terminal device over a device-to-device (D2D) communication interface.

In Example 3852, the subject matter of Example 3851 can optionally include wherein the processor circuitry is further configured to transmit the data message to the second terminal device over the D2D communication interface.

In Example 3853, the subject matter of Example 3846 can optionally include wherein the processor circuitry is further configured to receive a second hierarchical level change indicating that a communication link between the communication device and the second terminal device is reconfigured to have a higher throughput.

In Example 3854, the subject matter of Example 3846 can optionally include wherein the processor circuitry is further configured to receive a second hierarchical level change indicating that a communication link between the communication device and the second terminal device is reconfigured to have a lower throughput.

In Example 3855, the subject matter of Example 3846 can optionally include wherein the processor circuitry is further configured to receive a second hierarchical level change indicating that a communication link between the communication device and the second terminal device is reconfigured to have a higher latency.

In Example 3856, the subject matter of Example 3846 can optionally include wherein the processor circuitry is further configured to receive a second hierarchical level change indicating that a communication link between the communication device and the second terminal device is reconfigured to have a lower latency.

In Example 3857, the subject matter of Example 3846 can optionally include wherein the processor circuitry is further configured to receive a second hierarchical level change indicating that a communication link between the communication device and the second terminal device is removed.

In Example 3858, the subject matter of any one of Examples 3846 to 3848, 3851, or 3853 to 3857 can optionally include wherein the second hierarchical level change is based on an operational parameter of the second terminal device.

In Example 3859, the subject matter of any one of Examples 3839 to 3858 can optionally include wherein the operational parameter is a battery power of the first terminal device that exceeds a predetermined threshold.

In Example 3860, the subject matter of any one of Examples 3839 to 3859 can optionally include wherein the operational parameter is a mobility status of the first terminal device that indicates a probability of the first terminal device to perform a handover.

In Example 3861, the subject matter of any one of Examples 3839 to 3860 can optionally include wherein the operational parameter is a channel condition of the first terminal device that exceeds a predetermined threshold for a period of time.

Example 3862 is a mobile infrastructure node for providing network connectivity to an area impacted by network overload or outage, the mobile infrastructure node including means for identifying a geographic area in which network connectivity is disrupted, means for communicating with a management server, via a radio backhaul connection provided by a backhaul antenna system, to receive an instruction, and means for activating a fronthaul antenna system and providing network connectivity, via the fronthaul antenna system and the backhaul antenna system, to one or more terminal devices in the geographic area according to the instruction.

Example 3863 is a method at a mobile infrastructure node of providing network connectivity to an area impacted by network overload or outage, the method including identifying a geographic area in which network connectivity is disrupted, communicating with a management server, via a radio backhaul connection provided by a backhaul antenna system, to receive an instruction, and activating a fronthaul antenna system and providing network connectivity, via the fronthaul antenna system and the backhaul antenna system, to one or more terminal devices in the geographic area according to the instruction.

In Example 3864, the subject matter of Example 3863 can optionally include wherein identifying the geographic area in which network connectivity is disrupted includes detecting that a baseband modem is experiencing a disruption in network connectivity in the geographic area.

In Example 3865, the subject matter of Example 3864 can optionally further include after identifying that the baseband modem is experiencing a disruption in network connectivity, notifying the management server of a potential critical network scenario via the radio backhaul connection.

In Example 3866, the subject matter of Example 3865 can optionally include wherein communicating with the management server to receive the instructions includes receiving the instruction in response to notifying the management server of the potential critical network scenario.

In Example 3867, the subject matter of Example 3865 or 3866 can optionally include wherein notifying the management server of the potential critical network scenarios via the backhaul connection includes transmitting a notification to the management server that specifies the geographic area.

In Example 3868, the subject matter of Example 3867 can optionally include wherein transmitting the notification to the management server that specifies the geographic area includes indicating a timestamp, fronthaul capability information, or a battery power in the notification.

In Example 3869, the subject matter of Example 3863 can optionally include wherein identifying the geographic area in which network connectivity is disrupted includes receiving an indication from the management server that network connectivity is disrupted in the geographic area.

In Example 3870, the subject matter of Example 3869 can optionally further include interfacing with an autonomous driving system of the mobile infrastructure node to drive the mobile infrastructure node to the geographic area.

In Example 3871, the subject matter of Example 3869 can optionally further include providing instructions to a driver of the mobile infrastructure node that instruct the driver to drive the mobile infrastructure node to the geographic area.

In Example 3872, the subject matter of any one of Examples 3864 to 3871 can optionally further include detecting that network connectivity is restored at the baseband modem, and notifying the management server that network connectivity is restored.

In Example 3873, the subject matter of any one of Examples 3863 to 3872 can optionally further include receiving fronthaul configuration information from the management server, and wherein activating the fronthaul antenna system and providing network connectivity, via the fronthaul antenna system and the backhaul antenna system, includes transmitting and receiving signals with the fronthaul antenna system with a first terminal device of the one or more terminal devices according to the fronthaul configuration information.

In Example 3874, the subject matter of any one of Examples 3863 to 3873 can optionally include wherein the radio backhaul connection is a satellite radio backhaul connection, and wherein communicating with the management server, via the radio backhaul connection provided by the backhaul antenna system, includes transmitting and receiving signals with the management server via a satellite-based radio access infrastructure that is connected to the management server.

In Example 3875, the subject matter of any one of Examples 3863 to 3874 can optionally include wherein providing network connectivity, via the fronthaul antenna system and the backhaul antenna system, to the one or more terminal devices in the geographic area according to the instructions includes receiving data from a second terminal device of the one or more terminal devices with the fronthaul antenna system and transmitting corresponding data to radio access infrastructure with the backhaul antenna system, or receiving data from the radio access infrastructure with the backhaul antenna system and transmitting the data to the second terminal device with the fronthaul antenna system.

In Example 3876, the subject matter of any one of Examples 3863 to 3875 can optionally include wherein providing network connectivity, via the fronthaul antenna system and the backhaul antenna system, to the one or more terminal devices in the geographic area according to the instructions includes transmitting or receiving signals with a third terminal device of the one or more terminal devices with the fronthaul antenna system according to a cellular small cell radio access technology or a short-range radio access technology.

In Example 3877, the subject matter of any one of Examples 3863 to 3876 can optionally include wherein providing network connectivity, via the fronthaul antenna system and the backhaul antenna system, to the one or more terminal devices in the geographic area according to the instructions includes transmitting or receiving signals with radio access infrastructure with the backhaul antenna system according to a satellite radio access technology.

In Example 3878, the subject matter of Example 3877 can optionally include wherein the radio access infrastructure is located outside of the geographic area.

In Example 3879, the subject matter of any one of Examples 3863 to 3877 can optionally include wherein communicating with the management server, via the radio backhaul connection provided by the backhaul antenna system includes communicating with the management server, via the radio backhaul connection over an internet connection Example 3880 is a processing circuit configured to perform the method of any one of Examples 3863 to 3879.

Example 3881 is a mobile infrastructure node including one or more processors configured to perform the method of any one of Examples 3863 to 3879.

In Example 3882, the subject matter of Example 3881 can optionally further include the fronthaul antenna system and the backhaul antenna system of any one of Examples 3863 to 3879.

Example 3883 is a non-transitory computer readable medium storing instructions that when executed by a processor cause the processor to perform the method of any one of Examples 3863 to 3879.

Example 3884 is a non-transitory computer readable medium storing instructions that when executed by controller of a mobile infrastructure node cause the mobile infrastructure node to perform the method of any one of Examples 3863 to 3879.

Example 3885 is a communication device for providing network connectivity to a surrounding area, the communication device including a client module configured to identify a geographic area in which network connectivity is disrupted, and to communicate with a management server, via a radio backhaul connection provided by a backhaul antenna system, to receive an instruction, and a fronthaul modem configured to activate a fronthaul antenna system in response to the instruction, the client module further configured to provide network connectivity, via the fronthaul antenna system and the backhaul antenna system, to one or more terminal devices in the geographic area according to the instructions In Example 3886, the subject matter of Example 3885 can optionally further include the backhaul antenna system and the fronthaul antenna system.

In Example 3887, the subject matter of Example 3886 can optionally be configured as a mobile infrastructure node.

In Example 3888, the subject matter of Example 3885 can optionally be configured as a processing component for a mobile infrastructure node.

In Example 3889, the subject matter of any one of Examples 3885 to 3888 can optionally further include a baseband modem configured to detect a disruption in network connectivity while the communication device is in the geographic area and to notify the client module.

In Example 3890, the subject matter of Example 3889 can optionally include wherein the client module is configured to notify the management server of a potential critical network scenario via the radio backhaul connection in response to the baseband modem notifying the client module of the disruption in network connectivity.

In Example 3891, the subject matter of Example 3890 can optionally include wherein the client module is configured to communicate with the management server to receive the instruction by receiving the instruction in response to notifying the management server of the potential critical network scenario.

In Example 3892, the subject matter of Example 3890 or 3891 can optionally include wherein the client module is configured to notify the management server of the potential critical network scenarios via the backhaul connection by transmitting the notification to the management server that specifies the geographic area.

In Example 3893, the subject matter of Example 3892 can optionally include wherein the client module is configured to indicate a timestamp, fronthaul capability information, or a battery power in the notification.

In Example 3894, the subject matter of any one of Examples 3885 to 3888 can optionally include wherein the client module is configured to identify the geographic area in which network connectivity is disrupted by receiving an indication from the management server that network connectivity is disrupted in the geographic area.

In Example 3895, the subject matter of Example 3894 can optionally include wherein the communication device is configured as a component of a mobile infrastructure node, and wherein the client module is further configured to interface with an autonomous driving system of the mobile infrastructure node to drive the mobile infrastructure node to the geographic area.

In Example 3896, the subject matter of Example 3895 can optionally further include the autonomous driving system.

In Example 3897, the subject matter of Example 3894 can optionally include wherein the communication device is configured as a component of a mobile infrastructure node, and wherein the client module is further configured to provide instructions to a driver of the mobile infrastructure node that instruct the driver to drive the mobile infrastructure node to the geographic area.

In Example 3898, the subject matter of any one of Examples 3889 to 3897 can optionally include wherein the baseband modem is further configured to detect that network connectivity is restored, and wherein the client module is configured to notify the management server that network connectivity is restored.

In Example 3899, the subject matter of any one of Examples 3889 to 3898 can optionally include wherein the client module is further configured to receive fronthaul configuration information from the management server, and wherein the fronthaul modem is configured to provide a local radio access network to a first terminal device of the one or more terminal devices according to the fronthaul configuration information.

In Example 3900, the subject matter of any one of Examples 3885 to 3899 can optionally include wherein the backhaul antenna system is configured according to a satellite radio access technology, and wherein the client module is configured to communicate with the management server, via the radio backhaul connection provided by the backhaul antenna system, by transmitting and receiving signals with the management server via a satellite-based radio access infrastructure that is connected to the management server.

In Example 3901, the subject matter of any one of Examples 3885 to 3900 can optionally include wherein the client module is configured to provide network connectivity, via the fronthaul antenna system and the backhaul antenna system, to the one or more terminal devices in the geographic area according to the instructions by receiving data from a second terminal device of the one or more terminal devices via the fronthaul antenna system and transmitting corresponding data to radio access infrastructure with via backhaul antenna system, or receiving data from the radio access infrastructure via the backhaul antenna system and transmitting the data to the second terminal device via the fronthaul antenna system.

In Example 3902, the subject matter of any one of Examples 3885 to 3901 can optionally include wherein the client module is configured to provide network connectivity, via the fronthaul antenna system and the backhaul antenna system, to the one or more terminal devices in the geographic area according to the instructions by transmitting or receiving signals with a third terminal device of the one or more terminal devices via the fronthaul antenna system according to a cellular small cell radio access technology or a short-range radio access technology.

In Example 3903, the subject matter of any one of Examples 3894 to 3902 can optionally include wherein the client module is configured to provide network connectivity, via the fronthaul antenna system and the backhaul antenna system, to the one or more terminal devices in the geographic area according to the instructions by transmitting or receiving signals with radio access infrastructure via the backhaul antenna system according to a satellite radio access technology.

In Example 3904, the subject matter of Example 3903 can optionally include wherein the radio access infrastructure is located outside of the geographic area.

In Example 3905, the subject matter of any one of Examples 3885 to 3904 can optionally include wherein the client module is configured to communicate with the management server, via the radio backhaul connection provided by the backhaul antenna system by communicating with the management server, via the radio backhaul connection over an internet connection.

Example 3906 is a management server for coordinating one or more mobile infrastructure nodes to respond to network connectivity disruptions, the management server including means for receiving a notification that a potential critical network scenario has occurred in a geographic area, means for evaluating status information in the notification to determine that the potential critical network scenario is a critical network scenario, and means for providing instruction to one or more mobile infrastructure nodes to provide network connectivity to the geographic area.

Example 3907 is a method at a management server of coordinating one or more mobile infrastructure nodes to respond to network connectivity disruptions, the method including receiving a notification that a potential critical network scenario has occurred in a geographic area, evaluating status information in the notification to determine that the potential critical network scenario is a critical network scenario, and providing instruction to one or more mobile infrastructure nodes to provide network connectivity to the geographic area.

In Example 3908, the subject matter of Example 3907 can optionally include wherein receiving the notification that the potential critical scenario has occurred in a geographic area includes receiving the notification from a mobile infrastructure node that is in the geographic area.

In Example 3909, the subject matter of Example 3908 can optionally include wherein the notification received from the mobile infrastructure node includes location information that identifies the geographic area.

In Example 3910, the subject matter of Example 3908 or 3909 can optionally include wherein providing instruction to the one or more mobile infrastructure nodes to provide network connectivity to the geographic area includes providing an instruction to the mobile infrastructure node to provide network connectivity to the geographic area.

In Example 3911, the subject matter of any one of Examples 3908 to 3910 can optionally further include receiving one or more notifications from one or more additional mobile infrastructure nodes in the geographic area that indicate that a potential critical scenario has occurred in the geographic area.

In Example 3912, the subject matter of Example 3911 can optionally include wherein evaluating the status information in the notification to determine that the potential critical network scenario is a critical network scenario includes evaluating the status information in the notification with status information in the one or more notifications to classify the potential critical scenario as an isolated event or a critical network scenario.

In Example 3913, the subject matter of any one of Examples 3907 to 3912 can optionally include wherein providing the instruction to the one or more mobile infrastructure nodes to provide network connectivity to the geographic area includes providing a fronthaul configuration to a first mobile infrastructure node of the one or more mobile infrastructure nodes for the first mobile infrastructure node to use to provide network connectivity to the geographic area.

In Example 3914, the subject matter of any one of Examples 3907 to 3913 can optionally further include selecting the one or more mobile infrastructure nodes from a plurality of mobile infrastructure nodes.

In Example 3915, the subject matter of any one of Examples 3907 to 3913 can optionally include wherein selecting the one or more mobile infrastructure nodes from the plurality of mobile infrastructure nodes includes selecting the one or more mobile infrastructure nodes from the plurality of mobile infrastructure nodes based on one or more of fronthaul capabilities, location, or battery power.

In Example 3916, the subject matter of Example 3914 or 3915 can optionally further include at a time after selecting the one or more mobile infrastructure nodes from the plurality of mobile infrastructure nodes, selecting a different one or more mobile infrastructure nodes from the plurality of mobile infrastructure nodes.

Example 3917 is a non-transitory computer readable medium storing instructions that when executed by a processor cause the processor to perform the method of any one of Examples 3907 to 3916.

Example 3918 is a server configured to perform the method of any one of Examples 3907 to 3916.

Example 3919 is a management server configured to retrieve and execute instructions to cause the management server to perform a method including receiving a notification that a potential critical network scenario has occurred in a geographic area, evaluating status information in the notification to determine that the potential critical network scenario is a critical network scenario, and providing instruction to one or more mobile infrastructure nodes to provide network connectivity to the geographic area.

In Example 3920, the subject matter of Example 3919 can optionally include wherein receiving the notification that the potential critical scenario has occurred in a geographic area includes receiving the notification from a mobile infrastructure node that is in the geographic area.

In Example 3921, the subject matter of Example 3920 can optionally include wherein the notification received from the mobile infrastructure node includes location information that identifies the geographic area.

In Example 3922, the subject matter of Example 3920 or 3921 can optionally include wherein providing instruction to one or more mobile infrastructure nodes to provide network connectivity to the geographic area includes providing an instruction to the mobile infrastructure node to provide network connectivity to the geographic area.

In Example 3923, the subject matter of any one of Examples 3920 to 3922 can optionally include the method further including receiving one or more notifications from one or more additional mobile infrastructure nodes in the geographic area that indicate that a potential critical scenario has occurred in the geographic area.

In Example 3924, the subject matter of Example 3923 can optionally include wherein evaluating the status information in the notification to determine that the potential critical network scenario is a critical network scenario includes evaluating the status information in the notification with status information in the one or more notifications to classify the potential critical scenario as an isolated event or a critical network scenario.

In Example 3925, the subject matter of any one of Examples 3920 to 3924 can optionally include wherein providing the instruction to the one or more mobile infrastructure nodes to provide network connectivity to the geographic area includes providing a fronthaul configuration to a first mobile infrastructure node of the one or more mobile infrastructure nodes for the first mobile infrastructure node to use to provide network connectivity to the geographic area.

In Example 3926, the subject matter of any one of Examples 3920 to 3925 can optionally include the method further including selecting the one or more mobile infrastructure nodes from a plurality of mobile infrastructure nodes.

In Example 3927, the subject matter of any one of Examples 3920 to 3926 can optionally include wherein selecting the one or more mobile infrastructure nodes from the plurality of mobile infrastructure nodes includes selecting the one or more mobile infrastructure nodes from the plurality of mobile infrastructure nodes based on one or more of fronthaul capabilities, location, or battery power.

In Example 3928, the subject matter of Example 3824 or 3825 can optionally further include at a time after selecting the one or more mobile infrastructure nodes from the plurality of mobile infrastructure nodes, selecting a different one or more mobile infrastructure nodes from the plurality of mobile infrastructure nodes.

Example 3929 is a communication device for providing network connectivity to a surrounding area, the communication device including a client circuit configured to identify a geographic area in which network connectivity is disrupted, and to communicate with a management server, via a radio backhaul connection provided by a backhaul antenna system, to receive an instruction, and a fronthaul modem configured to activate a fronthaul antenna system in response to the instruction, the client circuit further configured to provide network connectivity, via the fronthaul antenna system and the backhaul antenna system, to one or more terminal devices in the geographic area according to the instructions In Example 3930, the subject matter of Example 3929 can optionally further include the backhaul antenna system and the fronthaul antenna system.

In Example 3931, the subject matter of Example 3930 can optionally be configured as a mobile infrastructure node.

In Example 3932, the subject matter of Example 3929 can optionally be configured as a processing circuitry component for a mobile infrastructure node.

In Example 3933, the subject matter of any one of Examples 3929 to 3932 can optionally further include a baseband modem configured to detect a disruption in network connectivity while the communication device is in the geographic area and to notify the client circuit.

In Example 3934, the subject matter of Example 3933 can optionally include wherein the client circuit is configured to notify the management server of a potential critical network scenario via the radio backhaul connection in response to the baseband modem notifying the client circuit of the disruption in network connectivity.

In Example 3935, the subject matter of Example 3934 can optionally include wherein the client circuit is configured to communicate with the management server to receive the instruction by receiving the instruction in response to notifying the management server of the potential critical network scenario.

In Example 3936, the subject matter of Example 3934 or 3935 can optionally include wherein the client circuit is configured to notify the management server of the potential critical network scenarios via the backhaul connection by transmitting the notification to the management server that specifies the geographic area.

In Example 3937, the subject matter of Example 3936 can optionally include wherein the client circuit is configured to indicate a timestamp, fronthaul capability information, or a battery power in the notification.

In Example 3938, the subject matter of any one of Examples 3929 to 3932 can optionally include wherein the client circuit is configured to identify the geographic area in which network connectivity is disrupted by receiving an indication from the management server that network connectivity is disrupted in the geographic area.

In Example 3939, the subject matter of Example 3938 can optionally include wherein the communication device is configured as a component of a mobile infrastructure node, and wherein the client circuit is further configured to interface with an autonomous driving system of the mobile infrastructure node to drive the mobile infrastructure node to the geographic area.

In Example 3940, the subject matter of Example 3939 can optionally further include the autonomous driving system.

In Example 3941, the subject matter of Example 3938 can optionally include wherein the communication device is configured as a component of a mobile infrastructure node, and wherein the client circuit is further configured to provide instructions to a driver of the mobile infrastructure node that instruct the driver to drive the mobile infrastructure node to the geographic area.

In Example 3942, the subject matter of any one of Examples 3933 to 3941 can optionally include wherein the baseband modem is further configured to detect that network connectivity is restored, and wherein the client circuit is configured to notify the management server that network connectivity is restored.

In Example 3851, the subject matter of any one of Examples 3933 to 3942 can optionally include wherein the client circuit is further configured to receive fronthaul configuration information from the management server, and wherein the fronthaul modem is configured to provide a local radio access network to a first terminal device of the one or more terminal devices according to the fronthaul configuration information.

In Example 3944, the subject matter of any one of Examples 3929 to 3943 can optionally include wherein the backhaul antenna system is configured according to a satellite radio access technology, and wherein the client circuit is configured to communicate with the management server, via the radio backhaul connection provided by the backhaul antenna system, by transmitting and receiving signals with the management server via a satellite-based radio access infrastructure that is connected to the management server.

In Example 3945, the subject matter of any one of Examples 3929 to 3944 can optionally include wherein the client circuit is configured to provide network connectivity, via the fronthaul antenna system and the backhaul antenna system, to the one or more terminal devices in the geographic area according to the instructions by receiving data from a second terminal device of the one or more terminal devices via the fronthaul antenna system and transmitting corresponding data to radio access infrastructure with via backhaul antenna system, or receiving data from the radio access infrastructure via the backhaul antenna system and transmitting the data to the second terminal device via the fronthaul antenna system.

In Example 3946, the subject matter of any one of Examples 3929 to 3945 can optionally include wherein the client circuit is configured to provide network connectivity, via the fronthaul antenna system and the backhaul antenna system, to the one or more terminal devices in the geographic area according to the instructions by transmitting or receiving signals with a third terminal device of the one or more terminal devices via the fronthaul antenna system according to a cellular small cell radio access technology or a short-range radio access technology.

In Example 3947, the subject matter of any one of Examples 3938 to 3946 can optionally include wherein the client circuit is configured to provide network connectivity, via the fronthaul antenna system and the backhaul antenna system, to the one or more terminal devices in the geographic area according to the instructions by transmitting or receiving signals with radio access infrastructure via the backhaul antenna system according to a satellite radio access technology.

In Example 3948, the subject matter of Example 3947 can optionally include wherein the radio access infrastructure is located outside of the geographic area.

In Example 3949, the subject matter of any one of Examples 3929 to 3948 can optionally include wherein the client circuit is configured to communicate with the management server, via the radio backhaul connection provided by the backhaul antenna system by communicating with the management server, via the radio backhaul connection over an internet connection.

Example 3950 is a non-transitory computer-readable medium storing instructions that when executed by a processor cause the processor to perform a method of any preceding example.

Example 3951 is a device including a processor and a memory storing instructions that, when executed by the processor, cause the processor to perform a method of any preceding example.

While aspects of this disclosure have been particularly shown and described with reference to specific aspects, it should be understood by those skilled in the art that various changes in form and detail may be made therein without departing from the spirit and scope of the aspects as defined by the appended claims. The scope of this disclosure is thus indicated by the appended claims and all changes which come within the meaning and range of equivalency of the claims are therefore intended to be embraced.

What is claimed is:

1. A non-transitory computer readable medium storing instructions that, when executed by one or more processors, cause the processors to perform the steps of:

determining a battery power level of a communication device by measuring a battery power of a battery of the communication device;

comparing the determined battery power level of the communication device to a battery power threshold; classifying data from one or more applications of the communication device into a plurality of priorities; and throttling the data from the one or more applications based on their respective priorities and the comparison of the determined battery power to the battery power threshold;

wherein the communication device is in a power-constrained scenario when the determined power level is outside of the battery power threshold;

wherein throttling the data from the one or more applications comprises throttling data of a first priority at a first level and throttling data of a second priority at a second level;

wherein throttling the data from the one or more applications further comprises transmitting the data of the first priority with a first transmission delay, and transmitting the data of the second priority with a second transmission delay, wherein the second transmission delay is longer than the first transmission delay;

wherein the classifying data comprises classifying data into the first priority and the second priority during a time duration based on a priority of an application corresponding to the data to be classified; and further comprising dynamically adjusting the throttling based on a battery power threshold.

2. The non-transitory computer readable medium of claim 1, wherein the classifying data into a plurality of priorities comprises classifying data based on use of applications during an extended time period.

3. The non-transitory computer readable medium of claim 1, further comprising determining the communication device is in the power-constrained scenario when the battery power falls below a battery power threshold; and terminating the throttling when the communication device exits the scenario, wherein the communication device is determined to have has exited the scenario when the battery power rises above a battery power threshold.

4. The non-transitory computer readable medium of claim 1, wherein the classifying data from one or more applications of the communication device into a plurality of priorities comprises classifying the data at an application processor of the radio communication device, wherein the application processor is configured to execute the one or more applications.

5. The non-transitory computer readable medium of claim 1, wherein the throttling the data from the one or more applications at varying levels based on their respective priorities while the communication device is in the scenario comprises throttling the lowest-priority traffic at a modem driver or throttling the lowest-priority traffic at a baseband modem.

6. A communication device comprising:

a detection circuit configured to determine a battery power level of a communication device by measuring a battery power of a battery of the communication device and to compare the determined battery power level of the communication device to a battery power threshold;

a classification circuit configured to classify data from one or more applications of the communication device into a plurality of priorities; and a traffic control circuit configured to throttle the data from the one or more applications based on their respective user-priorities and the comparison of the determined battery power to the battery power threshold;

wherein the communication device is in a power-constrained scenario when the determined power level is outside of the battery power threshold;

wherein throttling the data from the one or more applications further comprises throttling data of a first priority at a first level and throttling data of a second priority at a second level; wherein throttling the data from the one or more applications further comprises transmitting the data of the first priority with a first transmission delay, and transmitting the data of the second priority with a second transmission delay, wherein the second transmission delay is longer than the first transmission delay;

wherein the classifying data comprises the classification circuit classifying data into the first priority and the second priority during a time duration based on a priority of an application corresponding to the data to be classified; and further comprising the traffic control circuit dynamically adjusting the throttling based on a battery life threshold.

7. The communication device of claim 6, wherein the classification circuit is configured to classify the data from a highest-priority to a lowest-priority and wherein the traffic control circuit is configured to apply the least throttling to the highest-priority data and the most throttling to the lowest-priority data.

8. A method of reducing power consumption comprising:

determining a battery power level of a communication device by measuring a battery power of a battery of the communication device;

comparing the determined battery power level of the communication device to a battery power threshold;

classifying data from one or more applications of the communication device into a plurality of priorities; and throttling the data from the one or more applications based on their respective priorities and the comparison of the determined battery power to the battery power threshold;

wherein the communication device is in a power-constrained scenario when the determined power level is outside of the battery power threshold;

wherein throttling the data from the one or more applications further comprises transmitting the data of the first priority with a first transmission delay, and transmitting the data of the second priority with a second transmission delay, wherein the second transmission delay is longer than the first transmission delay;

wherein the classifying data comprises classifying data into the first priority and the second priority during a time duration based on a priority of an application corresponding to the data to be classified; and further comprising dynamically adjusting the throttling based on a battery power threshold.

9. The method of reducing power consumption of claim 8, wherein throttling the data from the one or more applications comprises throttling data of a first priority at a first level and throttling data of a second priority at a second level.

* * * * *